US011678667B2

(12) United States Patent
Reisinger et al.

(10) Patent No.: US 11,678,667 B2
(45) **Date of Patent: *Jun. 20, 2023**

(54) AGRICULTURAL COMPOSITIONS COMPRISING REMODELED NITROGEN FIXING MICROBES

(71) Applicant: Pivot Bio, Inc., Berkeley, CA (US)

(72) Inventors: Mark Reisinger, Berkeley, CA (US); Ernest Sanders, Berkeley, CA (US); Richard Broglie, Berkeley, CA (US); Karsten Temme, Berkeley, CA (US)

(73) Assignee: PIVOT BIO, INC., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,106

(22) Filed: Jan. 14, 2022

(65) Prior Publication Data

US 2022/0151241 A1 May 19, 2022

Related U.S. Application Data

(63) Continuation of application No. 17/254,175, filed as application No. PCT/US2019/039217 on Jun. 26, 2019.

(60) Provisional application No. 62/808,693, filed on Feb. 21, 2019, provisional application No. 62/690,621, filed on Jun. 27, 2018.

(51) Int. Cl.
*A01N 63/20* (2020.01)

(52) U.S. Cl.
CPC .................................... *A01N 63/20* (2020.01)

(58) Field of Classification Search
None
See application file for complete search history.

(56) References Cited

U.S. PATENT DOCUMENTS

| | | | |
|---|---|---|---|
| 1,520,545 | A | 12/1924 | Murphy |
| 4,782,022 | A | 11/1988 | Puhler et al. |
| 4,832,728 | A | 5/1989 | Allan et al. |
| 5,071,743 | A | 12/1991 | Slilaty et al. |

(Continued)

FOREIGN PATENT DOCUMENTS

| | | | |
|---|---|---|---|
| CA | 2 051 071 | A1 | 3/1993 |
| CN | 1355294 | A | 6/2002 |

(Continued)

OTHER PUBLICATIONS

Office Action dated Feb. 23, 2022 for Chinese Application No. 201980053954.X, with English translation, 16 pages.

(Continued)

*Primary Examiner* — Alton N Pryor
(74) *Attorney, Agent, or Firm* — Cooley LLP

(57) ABSTRACT

The present disclosure provides non-intergeneric remodeled microbes that are able to fix atmostpheric nitrogen and deliver such to plants in a targeted, efficient, and environmentally sustainable manner. The utilization of the taught microbial products will enable farmers to realize more productive and predictable crop yields without the nutrient degradation, leaching, or toxic runoff associated with traditional synthetically derived nitrogen fertilizer. The remodeled microbes taught herein are able to be combined with leading agricultural chemistry and elite germplasm. Furthermore, the disclosure provides seed treatments comprising remodeled microbes.

126 Claims, 39 Drawing Sheets

Specification includes a Sequence Listing.

(56) References Cited

U.S. PATENT DOCUMENTS 5,188,960 A 2/1993 Payne
5,229,291 A 7/1993 Nielsen et al.
5,354,670 A 10/1994 Nickoloff et al.
5,427,785 A 6/1995 Ronson et al.
5,610,044 A 3/1997 Lam et al.
5,780,270 A 7/1998 Lesley
5,789,166 A 8/1998 Bauer et al.
5,916,029 A 6/1999 Smith et al.
6,033,861 A 3/2000 Schafer et al.
6,033,874 A 3/2000 Baum et al.
6,083,499 A 7/2000 Narva et al.
6,107,279 A 8/2000 Estruch et al.
6,114,148 A 9/2000 Seed et al.
6,127,180 A 10/2000 Narva et al.
6,137,033 A 10/2000 Estruch et al.
6,218,188 B1 4/2001 Cardineau et al.
6,248,535 B1 6/2001 Danenberg et al.
6,326,351 B1 12/2001 Donovan et al.
6,340,593 B1 1/2002 Cardineau et al.
6,391,548 B1 5/2002 Bauer et al.
6,399,330 B1 6/2002 Donovan et al.
6,548,289 B1 4/2003 Beynon et al.
6,548,291 B1 4/2003 Narva et al.
6,596,509 B1 7/2003 Bauer et al.
6,624,145 B1 9/2003 Narva et al.
6,673,610 B2 1/2004 Miyawaki et al.
6,713,285 B2 3/2004 Bauer et al.
6,773,900 B2 8/2004 Short et al.
6,841,358 B1 1/2005 Locht et al.
6,949,626 B2 9/2005 Donovan et al.
6,962,705 B2 11/2005 Malvar et al.
7,064,249 B2 6/2006 Corbin et al.
7,070,982 B2 7/2006 Malvar et al.
7,084,331 B2 8/2006 Isawa et al.
7,105,332 B2 9/2006 Abad et al.
7,132,265 B2 11/2006 Bauer et al.
7,244,820 B2 7/2007 Miles et al.
7,329,736 B2 2/2008 Abad et al.
7,378,499 B2 5/2008 Abad et al.
7,385,107 B2 6/2008 Donovan et al.
7,449,552 B2 11/2008 Abad et al.
7,462,760 B2 12/2008 Abad et al.
7,470,427 B2 12/2008 Cocking
7,476,781 B2 1/2009 Abad et al.
7,485,451 B2 2/2009 Vandergheyst et al.
7,491,698 B2 2/2009 Hey et al.
7,491,869 B2 2/2009 Abad et al.
7,504,229 B2 3/2009 Donovan et al.
7,615,686 B2 11/2009 Miles et al.
7,803,943 B2 9/2010 Mao et al.
7,858,849 B2 12/2010 Cerf et al.
8,076,142 B2 12/2011 Huang et al.
8,084,416 B2 12/2011 Sampson et al.
8,084,418 B2 12/2011 Hey et al.
8,137,665 B2 3/2012 Cocking
8,236,757 B2 8/2012 Carozzi et al.
8,237,020 B2 8/2012 Miles et al.
8,268,584 B1 9/2012 Harwood et al.
8,304,604 B2 11/2012 Lira et al.
8,304,605 B2 11/2012 Lira et al.
8,319,019 B2 11/2012 Abad et al.
8,334,366 B1 12/2012 Hughes et al.
8,334,431 B2 12/2012 Sampson et al.
8,377,671 B2 2/2013 Cournac et al.
8,481,026 B1 7/2013 Woodruff et al.
8,513,494 B2 8/2013 Wu et al.
8,530,411 B2 9/2013 Cerf et al.
8,575,433 B2 11/2013 Cerf et al.
8,686,233 B2 4/2014 Cerf et al.
8,759,619 B2 6/2014 Sampson et al.
8,795,965 B2 8/2014 Zhang
8,802,933 B2 8/2014 Abad et al.
8,802,934 B2 8/2014 Abad et al.
9,150,851 B2 10/2015 Wigley et al.
9,321,697 B2 4/2016 Das et al.
9,487,451 B2 11/2016 Doty et al.
9,512,431 B2 12/2016 Mirsky et al.
9,657,298 B2 5/2017 Soto, Sr. et al.
9,957,509 B2 5/2018 Mirsky et al.
9,975,817 B2 5/2018 Temme et al.
9,994,557 B2 6/2018 Davidson et al.
10,384,983 B2 8/2019 Temme et al.
10,525,318 B2 1/2020 Dougherty
10,556,839 B2 2/2020 Temme et al.
10,577,358 B2 3/2020 Davidson et al.
10,602,744 B2 3/2020 Wigley et al.
10,662,432 B2 5/2020 Mirsky et al.
10,918,106 B2 2/2021 Bayer et al.
10,919,814 B2 2/2021 Temme et al.
10,934,226 B2 3/2021 Temme et al.
2004/0197916 A1 10/2004 Carozzi et al.
2004/0197917 A1 10/2004 Carozzi et al.
2004/0210964 A1 10/2004 Carozzi et al.
2004/0210965 A1 10/2004 Carozzi et al.
2004/0216186 A1 10/2004 Carozzi et al.
2004/0235663 A1 11/2004 Cocking
2004/0241847 A1 12/2004 Okuyama et al.
2005/0081262 A1 4/2005 Cook et al.
2005/0266541 A1 12/2005 Dillon
2006/0127988 A1 6/2006 Wood et al.
2006/0191034 A1 8/2006 Baum et al.
2006/0243011 A1 11/2006 Someus
2008/0295207 A1 11/2008 Baum et al.
2008/0311632 A1 12/2008 Figge et al.
2009/0068159 A1 3/2009 Baum et al.
2009/0105076 A1 4/2009 Stewart et al.
2009/0137390 A1 5/2009 Tripplett
2009/0144852 A1 6/2009 Tomso et al.
2009/0162477 A1 6/2009 Nadel et al.
2009/0258404 A1 10/2009 Mikkelsen et al.
2009/0308121 A1 12/2009 Reddy et al.
2010/0005543 A1 1/2010 Sampson et al.
2010/0017914 A1 1/2010 Hart et al.
2010/0028870 A1 2/2010 Welch et al.
2010/0267147 A1 10/2010 Qiao
2010/0298211 A1 11/2010 Carozzi et al.
2011/0023184 A1 1/2011 Desai et al.
2011/0104690 A1 5/2011 Yu et al.
2011/0183347 A1* 7/2011 Hyde ................. A61K 38/1841
435/6.15
2011/0263488 A1 10/2011 Carozzi et al.
2012/0015806 A1 1/2012 Paikray et al.
2012/0107889 A1 5/2012 Doty et al.
2012/0192605 A1 8/2012 McSpadden Gardener et al.
2012/0266332 A1 10/2012 Kuykendall
2012/0278954 A1 11/2012 Bowen et al.
2012/0284813 A1 11/2012 Olivier et al.
2012/0311745 A1 12/2012 Meade et al.
2012/0311746 A1 12/2012 Meade et al.
2012/0317681 A1 12/2012 Meade et al.
2012/0317682 A1 12/2012 Meade et al.
2012/0324605 A1 12/2012 Meade et al.
2012/0324606 A1 12/2012 Meade et al.
2012/0331589 A1 12/2012 Meade et al.
2012/0331590 A1 12/2012 Meade et al.
2013/0116170 A1 5/2013 Graser et al.
2013/0126428 A1 5/2013 Jones et al.
2013/0167268 A1 6/2013 Narva et al.
2013/0167269 A1 6/2013 Narva et al.
2014/0011261 A1 1/2014 Wang et al.
2014/0155283 A1 6/2014 Venkateswaran et al.
2014/0182018 A1 6/2014 Lang et al.
2014/0223598 A1 8/2014 Sampson et al.
2014/0223599 A1 8/2014 Sampson et al.
2014/0230504 A1 8/2014 Finlayson et al.
2014/0273226 A1 9/2014 Wu
2014/0301990 A1 10/2014 Gregory et al.
2014/0329326 A1 11/2014 Mirsky et al.
2014/0336050 A1 11/2014 Soto, Sr. et al.
2015/0080261 A1 3/2015 Wigley et al.
2015/0101373 A1 4/2015 Munusamy et al.
2015/0128670 A1 5/2015 Das
2015/0237807 A1 8/2015 Valiquette
2015/0239789 A1 8/2015 Kang et al.

(56) References Cited

U.S. PATENT DOCUMENTS

| | | | |
|---|---|---|---|
| 2015/0274690 | A1 | 10/2015 | Davidson et al. |
| 2015/0315570 | A1 | 11/2015 | Zhao et al. |
| 2016/0174570 | A1 | 6/2016 | Vujanovic et al. |
| 2016/0264929 | A1 | 9/2016 | Barney et al. |
| 2016/0292355 | A1 | 10/2016 | Lou et al. |
| 2016/0295868 | A1 | 10/2016 | Jones et al. |
| 2017/0152519 | A1 | 6/2017 | Mirsky et al. |
| 2017/0367349 | A1 | 12/2017 | Gruver et al. |
| 2018/0002243 | A1 | 1/2018 | Temme et al. |
| 2018/0020671 | A1 | 1/2018 | Wigley et al. |
| 2018/0065896 | A1 | 3/2018 | Van Iersel et al. |
| 2018/0073028 | A1 | 3/2018 | Mirsky et al. |
| 2018/0290942 | A1 | 10/2018 | Voigt et al. |
| 2018/0297906 | A1 | 10/2018 | Temme et al. |
| 2019/0039964 | A1 | 2/2019 | Temme et al. |
| 2019/0144352 | A1 | 5/2019 | Temme et al. |
| 2019/0339964 | A1 | 11/2019 | Young et al. |
| 2020/0087221 | A1 | 3/2020 | Temme et al. |
| 2020/0115715 | A1 | 4/2020 | Mirsky et al. |
| 2020/0308594 | A1 | 10/2020 | Tamsir et al. |
| 2020/0331820 | A1 | 10/2020 | Tamsir et al. |
| 2021/0009483 | A1 | 1/2021 | Temme et al. |
| 2021/0163374 | A1 | 6/2021 | Bloch et al. |
| 2021/0214282 | A1 | 7/2021 | Temme et al. |
| 2021/0329917 | A1 | 10/2021 | Bayer et al. |
| 2022/0025389 | A1 | 1/2022 | Bayer et al. |
| 2022/0079163 | A1 | 3/2022 | Reisinger et al. |
| 2022/0132861 | A1 | 5/2022 | Reisinger et al. |

FOREIGN PATENT DOCUMENTS

| | | | |
|---|---|---|---|
| WO | WO-87/04182 | A1 | 7/1987 |
| WO | WO-93/05154 | A1 | 3/1993 |
| WO | WO-98/01088 | A1 | 1/1998 |
| WO | WO-99/09834 | A2 | 3/1999 |
| WO | WO-00/57183 | A1 | 9/2000 |
| WO | WO-01/07567 | A1 | 2/2001 |
| WO | WO-2004/074462 | A2 | 9/2004 |
| WO | WO-2005/021585 | A2 | 3/2005 |
| WO | WO-2005/038032 | A1 | 4/2005 |
| WO | WO-2006/005100 | A1 | 1/2006 |
| WO | WO-2006/083891 | A2 | 8/2006 |
| WO | WO-2006/119457 | A1 | 11/2006 |
| WO | WO-2007/027776 | A2 | 3/2007 |
| WO | WO-2009/060012 | A2 | 5/2009 |
| WO | WO-2009/091557 | A1 | 7/2009 |
| WO | WO-2011/099019 | A1 | 8/2011 |
| WO | WO-2011/099024 | A1 | 8/2011 |
| WO | WO-2011/103247 | A2 | 8/2011 |
| WO | WO-2011/103248 | A2 | 8/2011 |
| WO | WO-2011/154960 | A1 | 12/2011 |
| WO | WO-2012/139004 | A2 | 10/2012 |
| WO | WO-2012/174271 | A2 | 12/2012 |
| WO | WO-2013/076687 | A2 | 5/2013 |
| WO | WO-2013/132518 | A1 | 9/2013 |
| WO | WO-2014/042517 | A2 | 3/2014 |
| WO | WO-2014/071182 | A1 | 5/2014 |
| WO | WO-2014/201044 | A2 | 12/2014 |
| WO | WO 2015/061764 | A1 | 4/2015 |
| WO | WO-2016/016629 | A1 | 2/2016 |
| WO | WO-2016/016630 | A1 | 2/2016 |
| WO | WO-2016/100727 | A1 | 6/2016 |
| WO | WO 2016130586 | A2 | 8/2016 |
| WO | WO-2016/146955 | A1 | 9/2016 |
| WO | WO-2016/172655 | A1 | 10/2016 |
| WO | WO-2016/178580 | A2 | 11/2016 |
| WO | WO-2016/179046 | A1 | 11/2016 |
| WO | WO-2016/181228 | A2 | 11/2016 |
| WO | WO-2016/191828 | A1 | 12/2016 |
| WO | WO-2017/011602 | A1 | 1/2017 |
| WO | WO-2017/042833 | A1 | 3/2017 |
| WO | WO-2017/062412 | A1 | 4/2017 |
| WO | WO-2017/069717 | A1 | 4/2017 |
| WO | WO-2018/132774 | A1 | 7/2018 |
| WO | WO-2019/032926 | A1 | 2/2019 |
| WO | WO-2019/084059 | A2 | 5/2019 |
| WO | WO-2019/084342 | A1 | 5/2019 |
| WO | WO-2019/140125 | A1 | 7/2019 |
| WO | WO-2020/006064 | A2 | 1/2020 |
| WO | WO-2020/006246 | A1 | 1/2020 |
| WO | WO-2020/014498 | A1 | 1/2020 |
| WO | WO-2020/061363 | A1 | 3/2020 |
| WO | WO 2020/068946 | A1 | 4/2020 |
| WO | WO-2020/092940 | A1 | 5/2020 |
| WO | WO-2020/118111 | A1 | 6/2020 |
| WO | WO-2020/132632 | A2 | 6/2020 |
| WO | WO-2020/146372 | A1 | 7/2020 |
| WO | WO-2020/163251 | A1 | 8/2020 |
| WO | WO-2020/190363 | A1 | 9/2020 |
| WO | WO 2020/191072 | A1 | 9/2020 |
| WO | WO-2020/191201 | A1 | 9/2020 |
| WO | WO-2020/219893 | A2 | 10/2020 |
| WO | WO-2020/219932 | A1 | 10/2020 |
| WO | WO-2021/113352 | A1 | 6/2021 |
| WO | WO-2021/146209 | A1 | 7/2021 |
| WO | WO 2021/221689 | A1 | 11/2021 |
| WO | WO 2021/221690 | A1 | 11/2021 |
| WO | WO 2021/222567 | A2 | 11/2021 |
| WO | WO 2021/222643 | A1 | 11/2021 |
| WO | WO 2021/231449 | A2 | 11/2021 |
| WO | WO 2021/247915 | A1 | 12/2021 |
| WO | WO 2022/029661 | A1 | 2/2022 |
| WO | WO 2022/140656 | A1 | 6/2022 |

OTHER PUBLICATIONS

Extended European Search Report dated May 27, 2022 for European Application No. 19825926.9, 13 pages.

Gomes, Y. C. B. et al., "Joint use of fungicides, insecticides and inoculants in the treatment of soybean seed," Rev. Ceres, 64(3):258-265 (2017); https://doi.org/10.1590/0034-737X201764030006.

Kutcher, H. R. et al., "Rhizobium inoculant and seed-applied fungicide effects on field pea production," Can. J. Plant Sci., 82:645-651 (2002).

U.S. Appl. No. 17/254,175, filed Jun. 29, 2019.

U.S. Appl. No. 17/576,139, filed Jan. 14, 2022.

US 8,476,226, 11/09/1999, Koenck (Withdrawn)

International Search Report and Written Opinion dated Nov. 19, 2019 for International Application No. PCT/2019/39217, 13 pages.

Bali, A. et al., "Excretion of ammonium by a nifL mutant of Azotobacter vinelandii fixing nitrogen," Appl Environ Microbiol, 58(5):1711-1718 (1992); doi: 10.1128/aem.58.5.1711-1718.1992.

Baum, J. A. et al., "Control of coleopteran insect pests through RNA interference," Nat Biotechnol., 25(11):1322-1326 (2007); doi: 10.1038/nbt1359.

Blanco, G. et al., "Sequence and molecular analysis of the nifL gene of Azotobacter vinelandii," Mol Microbiol, 9(4):869-879(1993); doi: 10.1111/j.1365-2958.1993.tb01745.x.

Bosmans, F. & Tytgat, J., "Sea anemone venom as a source of insecticidal peptides acting on voltagegated Na+ channels," Toxicon., 49(4):550-560 (2007); doi: 10.1016/j.toxicon.2006.11.029.

Chakroun, M. et al., "Bacterial Vegetative Insecticidal Proteins (Vip) from Entomopathogenic Bacteria," Microbiol Mol Biol Rev., 80(2):329-850 (2016); doi: 10.1128/MMBR.00060-15.

Chiang, L. W. et al. "Mutagenic oligonucleotide-directed PCR amplification (Mod-PCR): an efficient method for generating random base substitution mutations in a DNA sequence element." PCR Methods Appl. Feb. 1993;2(3):210-7. doi: 10.1101/gr.2.3.210.

Crickmore, N. et al., "Revision of the nomenclature for the Bacillus thuringiensis pesticidal crystal proteins," Microbiol Mol Biol Rev., 62(3):807-813 (1998).

Crickmore, N. et al., "Bacillus thuringiensis toxin nomenclature," 2016, available at: http://www.lifesci.sussex.ac.uk/home/Neil_Crickmore/Bt/.

Das, S. & DE, T. K. et al., "Microbial assay of N 2 fixation rate, a simple alternate for acetylene reduction assay," MethodsX, 5:909-914(2018); doi: 10.1016/j.mex.2017.11.010.

Eyraud, V. et al., "Expression and biological activity of the cystine knot bioinsecticide PA1b (Pea Albumin 1 Subunit b)," PLoS One, 8(12):e81619 (2013), 9 pages; doi: 10.1371/journal.pone.0081619.

(56) References Cited

OTHER PUBLICATIONS

Gaby, et al. "A comprehensive aligned nifH gene database: a multipurpose tool for studies of nitrogen-fixing bacteria." Database (Oxford). Feb. 5, 2014;2014:bau001. doi: 10.1093/database/bau001.
Hidaka, M. et al., "Promotion of the Growth of Rice by Inoculation of Nitrogen-Fixing-Activity-Enhanced Bacteria to the Rhizosphere," Nitrogen Fixation: From Molecules to Crop Productivity, p. 445 (Jan. 1, 2002).
Kant, S. et al., "Understanding plant response to nitrogen limitation for the improvement of crop nitrogen use efficiency," J Exp Bot., 62(4): 1499-509 (2011); doi: 10.1093/jxb/erq297.
Kim, Y. et al., "Constitutive expression of nitrogenase system in Klebsiella oxytoca by gene targeting mutation to the chromosomal nifLA operon," Journal of Biotechnology, 10(3-4):293-301 (1989).
King, G. F. & Hardy, M. C., "Spider-venom peptides: structure, pharmacology, and potential for control of insect pests," Annu Rev Entomol., 58:475-596 (2013); doi: 10.1146/annurev-ento-120811-153650.
Lin, P. et al., "PC, a Novel Oral Insecticidal Toxin from Bacillus bombysepticus Involved in Host Lethality via APN and BtR-175," Sci Rep., 5:11101 (2015), 14 pages; doi: 10.1038/srep11101.
Martinelli, A. H. S. et al., "Structure-function studies on jaburetox, a recombinant insecticidal peptide derived from jack bean (Canavalia ensiformis) urease," Biochim Biophys Acta., 1840(3):935-944 (2014);doi: 10.1016/j.bbagen.2013.11.010.
Marx, C. J. et al., "Broad-Host-Range cre-lox System for Antibiotic Marker Recycling in Gram-Negative Bacteria," Biotechniques;33(5):1062-1067 (Nov. 1, 2002); doi: 10.2144/02335rr01.
Naimov, S. et al. "Solubilization, activation, and insecticidal activity of Bacillus thuringiensis serovar thompsoni HD542 crystal proteins," Appl Environ Microbiol., 74(23):7145-7151 (2008); doi: 10.1128/AEM.00752-08.
Nestmann, E. R., "Mutagenesis by nitrosoguanidine, ethyl methanesulfonate, and mutator gene mutH in continuous cultures of *Escherichia coli*," Mutat Res., 28(3):323-330 )1975); doi: 10.1016/0027-5107(75)90226-2.
Parker, M. W. & Feil, S. C., "Pore-forming protein toxins: from structure to function," Prog Biophys Mol Biol., 88(1):91-142 (2005). doi: 10.1016/j.pbiomolbio.2004.01.009.
Purcell, J. P. et al., "Cholesterol oxidase: a potent insecticidal protein active against boll weevil larvae," Biochem Biophys Res Commun., 196(3):1406-1413 (1993); doi: 10.1006/bbrc.1993.2409.
Qaim, M. & Zilberman, D., "Yield effects of genetically modified crops in developing countries," Science, 299(5608):900-902 (2003); doi: 10.1126/science.1080609.
Qiu, D. -Y. & Shen, B. -F., "Construction of Genetically Engineered Strains of Enterobacter Cloacae (nifL—Ac)," Acta Phytophysiologica Sinica, 25(3):269 -273 (1999). English translation.
Sanahuja, G. et al., Bacillus thuringiensis: a century of research, development and commercial applications., Plant Biotechnol J., 9(3):283-300 (2011); doi: 10.1111/j.1467-7652.2011.00595.x.
Schuler, T. H. et al., "Potential side effects of insect-resistant transgenic plants on arthropod natural enemies," Trends Biotechnol., 17(5):210-216 (1998); doi: 10.1016/S0167-7799(98)01298-0.
Shamseldin, A., "The Role of Different Genes Involoved in Symbiotic Nitrogen Fixation—Review," Global Journal of Biotechnology & Biochemistry, 8(4):84-94 (2013).
Stemmer, W. P., "DNA shuffling by random fragmentation and reassembly: In vitro recombination for molecular evolution," Proc. Natl. Acad. Sci. USA, 91:10747-10751 (1994).
Stemple. "TILLING—a high-throughput harvest for functional genomics." Nat Rev Genet. Feb. 2004;5(2):145-50. doi: 10.1038/nrg1273.
Stemple, D. L, "TILLING—a high-throughput harvest for functional genomics," Nature Reviews Genetics, 5(2):145-50 (2004); doi: 10.1038/nrg1273.
Tijssen, P., "Hybridization with Nucelic Acid Probes." Laboratory Techniques in Biochemistry and Molecular Biology. Department for Physiological Chemistry,University of Utrecht, Utrecht, The Netherlands, vol. 24 (1993) 65 pages.
Yarza, P et al., "Uniting the classification of cultured and uncultured bacteria and archaea using 16S rRNA gene sequences," Nature Reviews Microbiology, 12:635-645 (2014).
GenBank: CP007215.3. Kosakonia sacchari SP1 chromosome, complete genome. Sep. 19, 2017.
GenBank: AAA22353.1. crystal protein [Bacillus thuringiensis]. Apr. 26, 1993.
GenBank: AAA22552.1. insecticidal crystal protein, partial (plasmid) [Bacillus thuringiensis]. Dec. 3, 2020.
GenBank: BAA00257.1. unnamed protein product [Bacillus thuringiensis serovar aizawai]. Dec. 20, 2002.
GenBank: CAA31886.1. unnamed protein product [Bacillus thuringiensis]. Apr. 18, 2005.
GenBank: BAA04468.1. insecticidal crystal protein [Bacillus thuringiensis]. Jun. 15, 2010.
GenBank: AAA86265.1. CrylA(a), partial [Bacillus thuringiensis serovar kurstaki]. Jan. 30, 1996.
GenBank: AAD46139.1. insecticidal crystal protein [Bacillus thuringiensis]. Aug. 1, 1999.
GenBank: BAA77213.1. BtT84A1 crystal protein [Bacillus thuringiensis]. Mar. 14, 2003.
GenBank: AAD55382.1. 135 kDa insecticidal protein [Bacillus thuringiensis serovar kurstaki]. Sep. 16, 1999.
GenBank: CAA70856.1. delta-endotoxin [Bacillus thuringiensis serovar kurstaki]. May 13, 2010.
GenBank: AAP80146.1. delta-endotoxin [Bacillus thuringiensis]. Jun. 30, 2003.
GenBank: AAM44305.1. crystal protein Cry1Aa13 [Bacillus thuringiensis serovar sotto], Dec. 28, 2004.
GenBank: AAP40639.1. CrylAa [Bacillus thuringiensis]. Dec. 1, 2004.
GenBank: AAY66993.1. CrylAa, partial [Bacillus thuringiensis]. Jul. 26, 2016.
GenBank: HQ439776.1. Bacillus thuringiensis strain PS9-E2 Cry1A-like protein gene, partial cds. Jul. 25, 2016.
GenBank: AAE33526.1. Sequence 7 from patent U.S. Pat. No. 5,973,231. Aug. 31, 2000.
GenBank: ACU57499.1. pesticidal crystal protein [Bacillus thuringiensis]. Feb. 3, 2010.
GenBank: GQ483512.1. Bacillus thuringiensis strain G7-1 Cry56Aa-like protein gene, complete cds. Jun. 1, 2011.
GenBank: JX025567.1. Bacillus thuringiensis strain HS18-1 Cry56Aa1-like protein gene, complete cds. May 7, 2016.
GenBank: ANC87261.1. tRNA pseudouridine(55) synthase TruB [*Sphingomonas* sp. ]. Feb. 28, 2017.
GenBank: ANC87260.1.30S ribosomal protein S15 [*Sphingomonas* sp. NIC1]. Feb. 28, 2017.
GenBank: JN790647.1. Bacillus thuringiensis strain Bm59-2 cry4-like protein gene, complete cds. Sep. 26, 2015.
GenBank: ACR43758.2. cry4 delta-toxin-like protein (plasmid) [Bacillus thuringiensis]. Jul. 24, 2016.
GenBank: ACU24782.1. Cry [Bacillus thuringiensis serovar jegathesan]. May 10, 2013.
GenBank: EA057254.1. Sequence 628 from patent U.S. Pat. No. 7,166,424. Feb. 7, 2007.
GenBank: EEM99278.1. Pesticidial crystal protein cry15Aa [Bacillus thuringiensis IBL 4222]. Apr. 30, 2009.
GenBank: GU810818.1. Bacillus thuringiensis serovar malayensis strain 4AV1 crystal protein gene, complete cds. Apr. 3, 2010.
GenBank: EA057253.1. Sequence 626 from patent U.S. Pat. No. 7,166,424. Feb. 7, 2007.
GenBank: EEM99279.1. Pesticidial crystal protein cry15Aa [Bacillus thuringiensis IBL 4222]. Apr. 30, 2009.
GenBank: HM035087.1. Bacillus thuringiensis strain Sbt009 pesticidal crystal protein Cry0092 (cry0092) gene, complete cds. Dec. 31, 2013.
GenBank: HM132125.1. Bacillus thuringiensis strain HD868(E5) Cry7-like protein gene, partial cds. Jul. 25, 2016.
GenBank: EEM19308.1. hypothetical protein bthur0001_55730 [Bacillus thuringiensis serovar tochigiensis BGSC 4Y1], Apr. 30, 2009.

(56) References Cited

OTHER PUBLICATIONS

GenBank: HM485581.1. Bacillus thuringiensis strain Sbt021 Cry0211 gene, complete cds. Dec. 31, 2019.
GenBank: HM461686.1. *Saturnispora* sp. DC198 isolate CB013 internal transcribed spacer 1, partial sequence; 5.8S ribosomal RNA gene and internal transcribed spacer 2, complete sequence; and 28S ribosomal RNA gene, partial sequence. Jul. 10, 2017.
GenBank: BAJ05397.1. crystal protein [Bacillus thuringiensis], Jul. 10, 2014.
GenBank: HM485582.1. Bacillus thuringiensis strain Sbt009 Cry0094 gene, complete cds. Dec. 31, 2019.
GenBank: HQ113114.1. Bacillus thuringiensis Cry20-like protein (cry20) gene, complete cds. Dec. 30, 2012.
GenBank: HQ401006.1. Bacillus thuringiensis strain BtMC28 Cry-like protein (cry) gene, complete cds. Nov. 1, 2013.
GenBank: JQ821388.1. Bacillus thuringiensis strain BtMC28 Cry69Aa-like protein gene, complete cds. Jan. 1, 2016.
GenBank: JN209957.1. Bacillus thuringiensis strain hs18-1 insecticidal Cry-like protein (cry) gene, complete cds. Jul. 1, 2015.
GenBank: JN646781.1. Bacillus thuringiensis strain HS18-1 cry-like protein gene, complete cds. Sep. 26, 2015.
GenBank: EEL67276.1.83-kDa crystal protein [Bacillus mycoides], Jun. 25, 2018.
GenBank: JX025568.1. Bacillus thuringiensis strain HS18-1 Cry53Ab1-like protein gene, complete cds. May 7, 2016.
GenBank: JX025569.1. Bacillus thuringiensis strain HS18-1 mosquitocidal toxin-like protein gene, complete cds. May 7, 2016.
GenBank: X03182.1. Bacillus thuringiensis gene for crystal protein (Mr 28 000). Oct. 23, 2008.
GenBank: Z14147.1. B.thuringiensis gene for CytB toxin. Apr. 18, 2005.
GenBank: X98793.1. B.thuringiensis cytlAbl gene. Apr. 18, 2005.
GenBank: U37196.1. Bacillus thuringiensis delta endotoxin gene, complete cds. Jul. 11, 1996.
GenBank: U52043.1. Bacillus thuringiensis plasmid pRX80 CytB toxin homolog (cytB) gene, complete cds. Jul. 26, 2016.
GenBank: HQ439788. Bacillus thuringiensis strain PS9-C12 Cry1A-like protein gene, partial cds Jul. 25, 2016.
Genbank: HQ439790. Bacillus thuringiensis strain PS9-D12 Cry1A-like protein gene, partial cds Nov. 4, 2016.
GenBank: HQ68512. Bacillus thuringiensis strain LS-R-21 CrylAa gene, partial cds Jul. 25, 2016.
GenBank: JF340156. Bacillus thuringiensis strain SK-798 plasmid Cry toxin (cry) gene, complete cds Jul. 25, 2016.
GenBank: JN651496. Bacillus thuringiensis strain LTS-209 CrylAa gene, partial cds Feb. 5, 2015.
GenBank: KC158223. Bacillus thuringiensis strain Lip plasmid insecticidal crystal protein (crylAa) gene, complete cds Jul. 26, 2016.
GenBank: AAA22330. entomocidal protoxin [Bacillus thuringiensis] Apr. 26, 1993.
GenBank: AAA22613. insecticidal endotoxin [Bacillus thuringiensis] Apr. 26, 1993.
GenBank: AAA22561. crystal protein precursor [Bacillus thuringiensis] Apr. 26, 1993.
GenBank: BAA00071. delta-endotoxin [Bacillus thuringiensis serovar kurstaki str. HD-1] Sep. 29, 2007.
GenBank: CAA31620. unnamed protein product [Bacillus thuringiensis] Apr. 18, 2005.
GenBank: AAA22551. insecticidal protein [ Bacillus thuringiensis] Apr. 26, 1993.
GenBank: CAA38701. unnamed protein product [Bacillus thuringiensis] Oct. 23, 2008.
GenBank: A29125. Replaced by Q93T21 Cry1Ab16 Nov. 28, 2006.
GenBank: AAV83251. Transcriptional regulator, Cro/Cl family [Idiomarina loihiensis L2TR] Jan. 31, 2014.
GenBank: AAC64003. crystal protein (plasmid) [Bacillus thuringiensis serovar kurstaki] Jul. 25, 2016.
GenBank: AAN76494 insecticidal protein P [Bacillus thuringiensis] Dec. 2, 2002.
GenBank: AAG16877 delta endotoxin [Bacillus thuringiensis] Oct. 1, 2000.
GenBank: AA013302 ze28d06.r1 Soares retina N2b4HR *Homo sapiens* cDNA clone Image:360299 5', mRNA sequence Nov. 29, 1996.
GenBank: AAK55546 Cry1Ab16 [Bacillus thuringiensis] Oct. 16, 2002.
GenBank: AAT46415 parasporal crystal protein [Bacillus thuringiensis] Jun. 20, 2004.
GenBank: AAQ88259 cry1A toxin [Bacillus thuringiensis] Aug. 19, 2005.
GenBank: AAW31761 Cry1Ab [Bacillus thuringiensis] May 20, 2009.
GenBank: ABB72460 insecticidal crystal protein Cry1Ab [Bacillus thuringiensis] Dec. 1, 2008.
GenBank: ABS18384 delta-endotoxin Cry1Ab [Bacillus thuringiensis] Feb. 19, 2008.
GenBank: ABW87320 endotoxin [Bacillus thuringiensis] Nov. 6, 2007.
GenBank: HQ439777 Bacillus thuringiensis strain N32-2-2 Cry1A-like protein gene, partial cds Jul. 25, 2016.
GenBank: HQ439778 Bacillus thuringiensis strain HD12 Cry1A-like protein gene, partial cds Jul. 25, 2016.
GenBank: HQ685122 Bacillus thuringiensis strain LS-R-30 Cry1Ab gene, partial cds Jul. 25, 2016.
GenBank: HQ847729 Bacillus thuringiensis serovar kurstaki strain DOR BT-1 delta-endotoxin Cry1Ab (cry1Ab) gene, complete cds May 6, 2013.
GenBank: JN135249 Bacillus thuringiensis strain SSy125-c clone HA1 delta-endotoxin (cry1A) gene, partial cds Sep. 15, 2012.
GenBank: JN135250 Bacillus thuringiensis strain SSy125-c clone HA2 delta-endotoxin-like (cry1A) gene, complete sequence Sep. 15, 2012.
GenBank: JN135251 Bacillus thuringiensis strain SSy141-c clone HA6 delta-endotoxin (cry1A) gene, complete cds Sep. 15, 2012.
GenBank: JN135252 Bacillus thuringiensis strain SSy126-c clone HA7 delta-endotoxin (cry1A) gene, complete cds Sep. 15, 2012.
GenBank: JN135253 Bacillus thuringiensis strain SSy126-c clone HA9 delta-endotoxin (cry1A) gene, complete cds Sep. 15, 2012.
GenBank: JN135254 Bacillus thuringiensis strain SSy111-c clone HA11 delta-endotoxin (cry1A) gene, complete cds Sep. 15, 2012.
GenBank: AAS93798 cry1A type crystal protein, partial [Bacillus thuringiensis serovar kenyae] Jul. 26, 2016.
GenBank: KC156668 Bacillus thuringiensis strain ARP102 pesticidal protein gene, complete cds Nov. 14, 2013.
GenBank: AAK14336 insecticidal crystal protein BTRX24 [Bacillus thuringiensis serovar kunthalaRX24] Mar. 1, 2001.
GenBank: AAK14337 insecticidal crystal protein BTRX28 [Bacillus thuringiensis serovar kunthalaRX28] Mar. 1, 2001.
GenBank: AAK14338 insecticidal crystal protein BTRX27 [Bacillus thuringiensis serovar kunthalaRX27] Mar. 1, 2001.
GenBank: ABG88858 Cry1Ab-like BT toxin OL2, partial [Bacillus thuringiensis] Jul. 14, 2016.
GenBank: AAA22331 crystal protein [Bacillus thuringiensis] Apr. 26, 1993.
GenBank: AAA22338 delta-endotoxin [Bacillus thuringiensis] Apr. 26, 1993.
GenBank: CAA38098 unnamed protein product, partial [Bacillus thuringiensis] Jul. 26, 2016.
GenBank: AAA73077 insecticidal delta endotoxin [Bacillus thuringiensis serovar kurstaki] Apr. 26, 1993.
GenBank: AAA22339 crylA(c)3 [Bacillus thuringiensis serovar kurstaki] Apr. 26, 1993.
GenBank: AAA86266 CrylA(c), partial [Bacillus thuringiensis serovar kurstaki] Jan. 30, 1996.
GenBank: AAB46989 insecticidal delta-endotoxin CrylA(c) [Bacillus thuringiensis serovar kurstaki] Feb. 11, 1997.
GenBank: AAC44841 crystal protein [Bacillus thuringiensis serovar kurstaki] Feb. 18, 1997.
GenBank: AAB49768 Cry1Ac delta-endotoxin [Bacillus thuringiensis] Mar. 17, 1997.
GenBank: CAA05505 insecticidal crystal protein [Bacillus thuringiensis serovar kurstaki str. YBT-1520] Apr. 15, 2005.

(56) References Cited

OTHER PUBLICATIONS

GenBank: CAA10270 crystal toxin protein [Bacillus thuringiensis] Apr. 15, 2005.
GenBank: AAD38701 insecticidal protein Cry1Ac, partial [Bacillus thuringiensis serovar kurstaki str. HD-1] Jul. 26, 2016.
GenBank: AAQ06607 Cry1Ac [Bacillus thuringiensis] Apr. 1, 2004.
GenBank: AAN07788 insecticidal crystal protein Cry1Ac [Bacillus thuringiensis] Sep. 29, 2002.
GenBank: AAU87037 Cry1Ac (plasmid) [Bacillus thuringiensis] Jul. 26, 2016.
GenBank: AAX18704 Cry1Ac [Bacillus thuringiensis serovar kenyae] Dec. 1, 2008.
GenBank: AAY88347 Cry [Bacillus thuringiensis] Jun. 1, 2007.
GenBank: ABD37053 insecticidal crystal protein [Bacillus thuringiensis serovar kurstaki] Feb. 20, 2006.
GenBank: ABB89046 delta-endocytoxin [Bacillus thuringiensis] May 1, 2006.
GenBank: AAY66992 Cry1Ac, partial [Bacillus thuringiensis] May 16, 2007.
GenBank: ABZ01836 Cry1Ac22 [Bacillus thuringiensis serovar kurstaki] Dec. 1, 2008.
GenBank: CAQ30431 pesticidal crystal protein cry1Ac, partial (plasmid) [Bacillus thuringiensis serovar kurstaki] Jul. 26, 2016.
GenBank: ABL01535 crystal protein [Bacillus thuringiensis] Dec. 6, 2006.
GenBank: FJ513324 Bacillus thuringiensis strain Tm37-6 pesticidal crystal protein (cry1Ac) gene, partial cds Jul. 24, 2016.
GenBank: FJ617446 Bacillus thuringiensis strain Tm41-4 Cry1Ac-like protein (cry1Ac) gene, partial cds Jul. 24, 2016.
GenBank: FJ617447 Bacillus thuringiensis strain Tm44-1B Cry1Ac-like protein (cry1Ac) gene, partial cds Jul. 24, 2016.
GenBank: ACM90319 Cry1Ac [Bacillus thuringiensis] Feb. 17, 2009.
GenBank: DQ438941 Bacillus thuringiensis strain INTATA24-6 insecticidal crystal protein (CrylAc) gene, partial cds Apr. 1, 2006.
GenBank: GQ227507 Bacillus thuringiensis strain S1478-1 toxin crystal protein gene, complete cds Oct. 15, 2010.
GenBank: GU446674 Bacillus thuringiensis strain S3299-1 Cry1Ac gene, complete cds Feb. 1, 2011.
GenBank: HM061081 Bacillus thuringiensis strain ZQ-89 insecticidal crystal protein Cry1Ac gene, complete cds Jun. 1, 2010.
GenBank: GQ866913 Bacillus thuringiensis strain SK-711 plasmid crystal protein (cry1) gene, partial cds Jul. 25, 2016.
GenBank: HQ230364 Synthetic construct clone EC-783 cry1Ac protein (cry1Ac) gene, cry1Ac18 allele, complete cds Dec. 18, 2010.
GenBank: JF340157 Bacillus thuringiensis strain SK-784 plasmid Cry toxin (cry) gene, complete cds Jul. 25, 2016.
GenBank: JN387137 Bacillus thuringiensis isolate SK-958 truncated crystal protein PT-958 gene, complete cds Dec. 1, 2012.
GenBank: JQ317685 Bacillus thuringiensis strain SK-793 plasmid truncated crystal protein gene, complete cds Jul. 25, 2016.
GenBank: AAA22340 crylA(d) [Bacillus thuringiensis serovar aizawai] Apr. 26, 1993.
GenBank: CAA01880 PS81RR1 endotoxin, partial [Bacillus thuringiensis] Sep. 25, 1995.
GenBank: AAA22410 delta-endotoxin [Bacillus thuringiensis serovar alesti] Apr. 26, 1993.
GenBank: AAB82749 insecticidal crystal protein, partial (plasmid) [Bacillus thuringiensis] Jul. 26, 2016.
GenBank: AAD46137 lepidoteran-specific toxin [Bacillus thuringiensis] Aug. 1, 1999.
GenBank: AAQ14326 delta-endotoxin Cry1A [Bacillus thuringiensis] Mar. 4, 2008.
GenBank: ABB76664 Cry1A-type pesticidal crystal protein, partial [Bacillus thuringiensis serovar alesti] Jul. 26, 2016.
GenBank: HQ439779 Bacillus thuringiensis strain S6 Cry1A-like protein gene, partial cds Jul. 25, 2016.
GenBank: AA039719 zf09e10.s1 Soares_fetal_heart_NbHH19W *Homo sapiens* cDNA clone Image:376458 3' similar to gb:X02162 Apolipoprotein A-I Precursor (Human), mRNA sequence Aug. 30, 1996.
GenBank: HQ439780 Bacillus thuringiensis strain SC6H8 Cry1A-like protein gene, partial cds Jul. 25, 2016.
GenBank: AAK14339 insecticidal crystal protein BTRX3 [Bacillus thuringiensis serovar kunthalanags3] Mar. 1, 2001.
GenBank: CAA29898 unnamed protein product [Bacillus thuringiensis] Apr. 18, 2005.
GenBank: CAA65003 cry1Ba2 [Bacillus thuringiensis serovar entomocidus] Apr. 18, 2005.
GenBank: AAK63251 Cry1Ba [Bacillus thuringiensis] Sep. 30, 2003.
GenBank: AAK51084 delta-endotoxin Cry1Ba2 [Bacillus thuringiensis serovar entomocidus] Nov. 2, 2006.
GenBank: AB020894 Oryza sativa Indica Group RNA for retroposon p-SINE1-RC207 Dec. 20, 2010.
GenBank: ABL60921 Cry1B (plasmid) [Bacillus thuringiensis] Jul. 14, 2016.
GenBank: HQ439781 Bacillus thuringiensis strain N17-37 Cry1B-like protein gene, partial cds Jul. 25, 2016.
GenBank: AAA.22344 crystal protein [Bacillus thuringiensis] Apr. 25, 1994.
GenBank: HQ439782 Bacillus thuringiensis strain WBT-2 Cry1B-like protein gene, partial cds Jul. 25, 2016.
GenBank: CAA86568 delta-endotoxin [Bacillus thuringiensis serovar morrisoni] Apr. 18, 2005.
GenBank: AAD10292 insecticidal crystal protein CryE1 [Bacillus thuringiensis serovar wuhanensis] Jan. 29, 1999.
GenBank: AAM93496 CrylBII [Bacillus thuringiensis] Aug. 13, 2002.
GenBank: AAC32850 Cry1Be1 delta-endotoxin (plasmid) [Bacillus thuringiensis] Apr. 3, 2020.
GenBank: AAQ52387 Sequence 63 from patent U.S. Pat. No. 6,593,293 Aug. 17, 2003.
GenBank: ACV96720 Cry1Be2 [Bacillus thuringiensis] Aug. 10, 2010.
GenBank: HM070026 Bacillus thuringiensis strain SC6H8 Cry1Be-like protein gene, partial cds Jul. 25, 2016.
GenBank: CAC50778 unnamed protein product [Bacillus thuringiensis] Aug. 8, 2001.
GenBank: AAQ52380 Sequence 38 from patent U.S. Pat. No. 6,593,293 Aug. 17, 2003.
GenBank: AA039720 zf09e11.r1 Soares_fetal_heart_NbHH19W *Homo sapiens* cDNA clone Image:376460 5' similar to GB:L19686_rna1 Macrophage Migration Inhibitory Factor (Human), mRNA sequence Jan. 28, 2011.
GenBank: HQ589331 Bacillus thuringiensis strain PS46L insecticidal crystal protein DIG-3 gene, complete cds Dec. 20, 2010.
GenBank: KC156700 Bacillus thuringiensis strain ARP260 pesticidal protein gene, complete cds Nov. 14, 2013.
GenBank: CAA30396 unnamed protein product [Bacillus thuringiensis] Apr. 18, 2005.
GenBank: CAA31951 unnamed protein product, partial [Bacillus thuringiensis] Jul. 26, 2016.
GenBank: AAA22343 crylC(b) [Bacillus thuringiensis serovar aizawai] Apr. 26, 1993.
GenBank: CAA01886 bt15 [Bacillus thuringiensis serovar entomocidus] Sep. 25, 1995.
GenBank: CAA65457 delta-endotoxin, partial [Bacillus thuringiensis serovar aizawai] Jul. 14, 2016.
GenBank: AAF37224 toxin Cry1Ca6 [Bacillus thuringiensis] Mar. 2, 2000.
GenBank: AAG50438 Cry1Ca (plasmid) [Bacillus thuringiensis] Jul. 26, 2016.
GenBank: AAM00264 insecticidal protein Cry1Ca [Bacillus thuringiensis] Apr. 2, 2002.
GenBank: AAL79362 delta-endotoxin [Bacillus thuringiensis] Jun. 22, 2007.
GenBank: AAN16462 insecticidal protein Cry1C, partial [Bacillus thuringiensis] Jul. 24, 2016.

(56) References Cited

OTHER PUBLICATIONS

GenBank: AAX53094 insecticidal crystal protein Cry1C [Bacillus thuringiensis] Mar. 28, 2005.
GenBank: HM070027 Bacillus thuringiensis strain mo3-E7 Cry1Ca-like protein gene, partial cds Jul. 25, 2016.
GenBank: HQ412621 Bacillus thuringiensis strain LB-R-78 CrylC-like protein gene, partial cds Nov. 30, 2012.
GenBank: JN651493 Bacillus thuringiensis strain LTS-38 CrylCa gene, partial cds Feb. 5, 2015.
GenBank: M97880 Bacillus thuringiensis crylC-related gene sequence Jun. 11, 1993.
GenBank: AAG35409 insecticidal crystal protein Cry1Cb (plasmid) [Bacillus thuringiensis] Jul. 26, 2016.
GenBank: ACD50894 Cry1C [Bacillus thuringiensis] May 20, 2008.
GenBank: AAX63901 crystal endotoxin, partial [Bacillus thuringiensis] Jul. 26, 2016.
GenBank: CAA38099 unnamed protein product [Bacillus thuringiensis] Oct. 23, 2008.
GenBank: 176415 replaced by X01939 Yeast tRNA-Cys (GCA) Jun. 11, 2003.
GenBank: HQ439784 Bacillus thuringiensis strain HD12 Cry1D-like protein gene, partial cds Jul. 25, 2016.
GenBank: CAA80234 crystal protein [Bacillus thuringiensis] Apr. 18, 2005.
GenBank: AAK48937 insecticidal crystal protein [Bacillus thuringiensis] May 1, 2001.
GenBank: ABK35074 insecticidal delta endotoxin [Bacillus thuringiensis] Nov. 2, 2007.
GenBank: CAA37933 crystal protein [Bacillus thuringiensis] Apr. 18, 2005.
GenBank: CAA39609 crystal protein [Bacillus thuringiensis] Apr. 18, 2005.
GenBank: AAA22345 crylE(a) [Bacillus thuringiensis serovar kenyae] Apr. 26, 1993.
GenBank: AAD04732 Cry1Ea4 [Bacillus thuringiensis] Jan. 14, 1999.
GenBank: A15535 bt18 gene Feb. 18, 1994.
GenBank: AAL50330 Cry032 [Bacillus thuringiensis] Dec. 27, 2001.
GenBank: AAW72936 insecticidal delta endotoxin CrylEa [Bacillus thuringiensis] Mar. 25, 2005.
GenBank: ABX11258 Cry1Ea [Bacillus thuringiensis] Nov. 19, 2007.
GenBank: HQ439785 Bacillus thuringiensis strain S6 Cry1E-like protein gene, partial cds Jul. 25, 2016.
GenBank: ADR00398 Cry1Ea10 [Bacillus thuringiensis] May 27, 2011.
GenBank: JQ652456 Bacillus thuringiensis strain BRC-XQ12 insecticidal crystal protein Cry1Ea11 (cry1Ea11) gene, partial cds Mar. 31, 2012.
GenBank: AAA22346 crylE(b) [Bacillus thuringiensis serovar aizawai] Apr. 26, 1993.
GenBank: AAA22348 insecticidal crystal protein [Bacillus thuringiensis serovar aizawai] Apr. 26, 1993.
GenBank: AAA22347 crylF [Bacillus thuringiensis serovar aizawai] Apr. 26, 1993.
GenBank: HM439638 Bacillus thuringiensis strain mo3-D10 Cry1F-like protein gene, partial cds Jul. 25, 2016.
GenBank: CAA80235 crystal protein [Bacillus thuringiensis] Apr. 18, 2005.
GenBank: BAA25298 CrylNA67-1 [Bacillus thuringiensis serovar morrisoni] Feb. 5, 1999.
GenBank: AAF21767 crystal protein CrylFb [Bacillus thuringiensis serovar morrisoni] Jan. 1, 2000.
GenBank: AAC10641 Sequence 4 from patent U.S. Pat. No. 5,686,069 Apr. 3, 1998.
GenBank: AA013295 ze28c04.r1 Soares retina N2b4HR Homo sapiens cDNA done Image:360294 5', mRNA sequence Nov. 29, 1996.
GenBank: ACD50892 Cry1F [Bacillus thuringiensis] May 20, 2008.
GenBank: ACD50893 Cry1F [Bacillus thuringiensis] May 20, 2008.
GenBank: CAA80233 crystal protein [Bacillus thuringiensis] Apr. 18, 2005.
GenBank: CAA70506 delta-endotoxin [Bacillus thuringiensis serovar wuhanensis] Apr. 2, 1997.
GenBank: AAD10291 insecticidal crystal protein CryH2 [Bacillus thuringiensis serovar wuhanensis] Jan. 29, 1999.
GenBank: AA013756 mh27b10.r1 Soares mouse placenta 4NbMP13.5 14.5 Mus musculus cDNA clone Image:443707 5' similar to GB:D17400 6-Pyruvoyl Tetrahydrobiopterin Synthase (Human), mRNA sequence Jan. 21, 1997.
GenBank: AAQ52381 Sequence 40 from patent U.S. Pat. No. 6,593,293 Aug. 17, 2003.
GenBank: CAA80236 crystal protein [Bacillus thuringiensis] Apr. 18, 2005.
GenBank: AAA79694 crystal toxin [Bacillus thuringiensis] Oct. 19, 1995.
GenBank: HQ439786 Bacillus thuringiensis strain WBT-2 Cry1H-like protein gene, partial cds Jul. 25, 2016.
GenBank: AAF01213 endotoxin, partial [Bacillus thuringiensis] Jul. 26, 2016.
GenBank: CAA44633 delta-endotoxin [Bacillus thuringiensis serovar kurstaki] Apr. 18, 2005.
GenBank: AAA22354 insecticidal protein [Bacillus thuringiensis serovar kurstaki] Jul. 27, 1993.
GenBank: AAC36999 insecticidal protein [Bacillus thuringiensis serovar kurstaki] Jul. 31, 1995.
GenBank: AAB00958 CGCryV [Bacillus thuringiensis] May 28, 1996.
GenBank: CAA70124 Bt toxin [Bacillus thuringiensis] Apr. 18, 2005.
GenBank: AAC26910 insecticidal protein (plasmid) [Bacillus thuringiensis serovar kurstaki] Jul. 25, 2016.
GenBank: AAM73516 Cry [Bacillus thuringiensis] Jul. 5, 2006.
GenBank: AAK66742 Crylla [Bacillus thuringiensis] Oct. 1, 2003.
GenBank: AAQ08616 Cry1la, partial [Bacillus thuringiensis] Jul. 25, 2016.
GenBank: AAP86782 Cry1l [Bacillus thuringiensis] Sep. 25, 2003.
GenBank: CAC85964 delta-endotoxin [Bacillus thuringiensis serovar kurstaki] Jul. 22, 2003.
GenBank: AAV53390 delta endotoxin [Bacillus thuringiensis] Nov. 30, 2007.
GenBank: ABF83202 Cry1la [Bacillus thuringiensis] Apr. 11, 2008.
GenBank: ACG63871 Cry1la [Bacillus thuringiensis] Aug. 17, 2008.
GenBank: FJ617445 Bacillus thuringiensis strain E-1B Cry1la-like protein (cry1la) gene, complete cds Jun. 1, 2011.
GenBank: FJ617448 Bacillus thuringiensis strain E-1A Crylla-like protein (cry1la) gene, complete cds Jun. 1, 2011.
GenBank: ADK23801 Cry1l toxin Crystal protein [Bacillus thuringiensis] Jul. 18, 2010.
GenBank: HQ439787 Bacillus thuringiensis strain SC6H8 Cry1l-like protein gene, partial cds Jul. 25, 2016.
GenBank: JQ228426 Bacillus thuringiensis strain wu1E-3 Cry1la (cry1la) gene, complete cds Nov. 30, 2015.
GenBank: JQ228424 Bacillus thuringiensis strain wu1E-4 Cry1la (cry1la) gene, partial cds Nov. 30, 2015.
GenBank: JQ228427 Bacillus thuringiensis strain wu2B-6 Cry1la (cry1la) gene, complete cds Nov. 30, 2015.
GenBank: JQ228428 Bacillus thuringiensisstrain wu2G-11 Cry1la (cry1la) gene, completecds Nov. 30, 2015.
GenBank: JQ228429 Bacillus thuringiensisstrain wu2G-12 Cry1la (cry1la) gene, completecds Nov. 30, 2015.
GenBank: JQ228430 Bacillus thuringiensisstrain you1D-9 Cry1la (cry1la) gene, completecds Nov. 30, 2015.
GenBank: JQ228431 Bacillus thuringiensisstrain you2D-3 Cry1la (cry1la) gene, completecds Nov. 30, 2015.
GenBank: JQ228432 Bacillus thuringiensisstrain you2E-3 Cry1la (cry1la) gene, complete cds Nov. 30, 2015.
GenBank: JQ228433 Bacillus thuringiensisstrain you2F-3 Cry1la (cry1la) gene, complete cds Nov. 30, 2015.

(56) References Cited

OTHER PUBLICATIONS

GenBank: JQ228434 Bacillus thuringiensis strain wu1H-3 Cry1la (cry1la) gene, complete cds Nov. 30, 2015.
GenBank: JQ317686 Bacillus thuringiensis strain BGSC 4J4 plasmid crystal protein (cry1l) gene, complete cds Jul. 25, 2016.
GenBank: JX944038 Bacillus thuringiensis strain SC-7 Cry1la (cry1la) gene, completecds Oct. 17, 2012.
GenBank: JX944039 Bacillus thuringiensis strain SC-13 Cry1la (cry1la) gene, partial cds Oct. 17, 2012.
GenBank: JX944040 Bacillus thuringiensis strain SC-51 Cry1la (crylla) gene, completecds Oct. 17, 2012.
GenBank: AAA82114 cryV465 [Bacillus thuringiensis] Nov. 29, 1995.
GenBank: ABW88019 Cry1lb-type protein [Bacillus thuringiensis] Nov. 7, 2007.
GenBank: ACD75515 Cry1lb-type protein [Bacillus thuringiensis] May 28, 2008.
GenBank: HM051227 Bacillus thuringiensis delta endotoxin gene, complete cds Jan. 1, 2011.
GenBank: HM070028 Bacillus thuringiensis strain mo3-D8 Cry1Fa-like protein gene, partial cds Jul. 25, 2016.
GenBank: ADK38579 insecticidal crystal protein Cry1lb [Bacillus thuringiensis] Jul. 24, 2010.
GenBank: JN571740 Bacillus thuringiensis strain SK-935 plasmid Cry1l-like protein gene, partial cds Jul. 25, 2016.
GenBank: JN675714 Bacillus thuringiensisstrain BT HMM-AND7B Cry1l crystal toxin protein (cry1l) gene, complete cds Oct. 2, 2011.
GenBank: JN675715 Bacillus thuringiensisstrain BT HMM-BRT2A Cry1l crystal toxin protein (cry1l) gene, complete cds Oct. 2, 2011.
GenBank: JN675716 Bacillus thuringiensis strain BT HMM Cry1l crystal toxin protein (cry1l) gene, complete cds Oct. 2, 2011.
GenBank: JQ228423 Bacillus thuringiensis strain HD12 Cry1lb (cry1lb) gene, partial cds Nov. 30, 2015.
GenBank: AAC62933 crystal protein toxin (plasmid) [Bacillus thuringiensis] Jul. 25, 2016.
GenBank: AAE71691 Sequence 2 from patent U.S. Pat. No. 6,232,439 Aug. 8, 2001.
GenBank: AAD44366 insecticidal crystal protein [Bacillus thuringiensis] Jul. 20, 1999.
GenBank: JQ228422 Bacillus thuringiensis strain HD12 Cry1ld (cry1ld) gene, complete cds Nov. 30, 2015.
GenBank: AAG43526 Cry1l (plasmid) [Bacillus thuringiensis] Jul. 14, 2016.
GenBank: HM439636 Bacillus thuringiensis strain T03B001 Cry1l-like protein gene, partial cds May 6, 2015.
GenBank: KC156647 Bacillus thuringiensis strain ARP058 pesticidal protein gene, complete cds Nov. 14, 2013.
GenBank: KC156681 Bacillus thuringiensis strain ARP058 pesticidal protein gene, complete cds Nov. 14 2013.
GenBank: AAQ52382 Sequence 42 from patent U.S. Pat. No. 6,593,293 Aug. 17, 2003.
GenBank: KC156701 Bacillus thuringiensis strain ARP166 pesticidal protein gene, complete cds Nov. 14, 2013.
GenBank: AAC31094 Sequence 10 from patent U.S. Pat. No. 5,723,758 Aug. 10, 1998.
GenBank: ABG88859 Cry1l-like Bt toxin OL3, partial [Bacillus thuringiensis] Jul. 14, 2016.
GenBank: AAA22341 crystal protein [Bacillus thuringiensis] Apr. 26, 1994.
GenBank: HM070030 Bacillus thuringiensis strain WBT-2 Cry1Ja-like protein gene, partial cds Jul. 25, 2016.
GenBank: JQ228425 Bacillus thuringiensis strain FH21 Cry1Ja (cry1Ja) gene, partial cds Nov. 30, 2015.
GenBank: AAA98959 delta-endotoxin CryET1 [Bacillus thuringiensis] Nov. 26, 2012.
GenBank: AAC31092 Sequence 6 from patent U.S. Pat. No. 5,723,758 Aug. 10, 1998.
GenBank: AAQ52372 Sequence 22 from patent U.S. Pat. No. 6,593,293 Aug. 17, 2003.
GenBank: CAC50779 unnamed protein product [Bacillus thuringiensis] Aug. 8, 2001.
GenBank: AAB00376 Cry1K [Bacillus thuringiensis] May 20, 1996.
GenBank: HQ439783 Bacillus thuringiensis strain WBT-2 Cry1K-like protein gene, partial cds Jul. 25, 2016.
GenBank: AAS60191 crystal protein [Bacillus thuringiensis serovar kurstaki] Mar. 17, 2004.
GenBank: HM070031 Bacillus thuringiensis strain SC6H8 Cry1La-like protein gene, partial cds Jul. 25, 2016.
GenBank: FJ884067 Bacillus thuringiensis strain LBIT 1189 clone S1189-B Cry1-like delta-endotoxin gene, complete cds Jul. 24, 2016.
GenBank: KC156659 Bacillus thuringiensis strain ARP080 pesticidal protein gene, complete cds Nov. 14, 2013.
GenBank: KC156648 Bacillus thuringiensis strain ARP009 pesticidal protein gene, complete cds Nov. 14, 2013.
GenBank: KC156678 Bacillus thuringiensis strain ARP146 pesticidal protein gene, complete cds Nov. 14, 2013.
GenBank: AAC31091 Sequence 4 from patent U.S. Pat. No. 5,723,758 Aug. 10, 1998.
GenBank: AAA22335 P2 crystal protein [Bacillus thuringiensis] Apr. 26, 1993.
GenBank: AAA83516 insecticidal crystal protein [Bacillus thuringiensis serovar kurstaki] Dec. 15, 1995.
GenBank: D86064 by Q8XAT0 RecName: Full=rho operon leader peptide Feb. 10, 2021.
GenBank: AAC04867 insecticidal crystal protein [Bacillus thuringiensis] Mar. 24, 2010.
GenBank: CAA10671 Cry2Aa protein [Bacillus thuringiensis] Apr. 15, 2005.
GenBank: CAA10672 Cry2Aa protein [Bacillus thuringiensis] Apr. 15, 2005.
GenBank: CAA10670 Cry2A protein, partial [Bacillus thuringiensis] Jul. 26, 2016.
GenBank: AA013750.1 mh26g10.r1 Soares mouse placenta 4NbMP13.5 14.5 Mus musculus cDNA clone Image:443682 5', mRNA sequence Jan. 21, 1997.
GenBank: AAQ04263.1 Cry2Aa [Bacillus thuringiensis] Nov. 1, 2004.
GenBank: AAQ52384.1 Sequence 46 from patent U.S. Pat. No. 6,593,293 Aug. 17, 2003.
GenBank: AB183671.1 *Scrippsiella* sp. MBIC11143 gene for 18S rRNA, partial sequence, strain: MBIC11143 Jul. 22, 2004.
GenBank: ABL01536.1 crystal protein [Bacillus thuringiensis] Dec. 6, 2006.
GenBank: ACF04939.1 Cry2Aa [Bacillus thuringiensis serovar kenyae] Jul. 23, 2009.
GenBank: JN426947.1 Bacillus thuringiensis strain SSy77 clone HA22 delta-endotoxin (cry2A) gene, complete cds Sep. 15, 2012.
GenBank: AAA22342.1 crystal protein B2 [Bacillus thuringiensis] Apr. 26, 1993.
GenBank: CAA39075.1 crystal protein CryllB [Bacillus thuringiensis serovar kurstaki] Apr. 18, 2005.
GenBank: AAG36762.1 Cry2Ab [Bacillus thuringiensis] Dec. 2, 2000.
GenBank: AA013296.1 ze28c05.r1 Soares retina N2b4HR *Homo sapiens* cDNA clone Image:360296 5' similar to gb:X58295_rna1 Plasma Glutathione Peroxidase Precursor (HUMAN), mRNA sequence Nov. 29, 1996.
GenBank: AAQ04609.1 Cry2Ab [Bacillus thuringiensis] Nov. 1, 2004.
GenBank: AAP59457.1 crystal delta-endotoxin Cry2ab-HB [Bacillus thuringiensis] Jun. 17, 2003.
GenBank: AAZ66347.1 delta endotoxin [Bacillus thuringiensis] Aug. 1, 2007.
GenBank: ABC95996.1 Cry2Ab [Bacillus thuringiensis] Feb. 8, 2006.
GenBank: ABC74968.1 crystal delta-endotoxin cry2Ab [Bacillus thuringiensis] Feb. 1, 2007.

(56) References Cited

OTHER PUBLICATIONS

GenBank: EF157306.1 Bacillus thuringiensis strain lyD cry2A-type insecticidal crystal protein gene, complete cds Jan. 3, 2007.
GenBank: CAM84575.1 cry2Ab11 delta endotoxin [Bacillus thuringiensis] Jan. 10, 2009.
GenBank: ABM21764.1 cry2A-type insecticidal crystal protein [Bacillus thuringiensis] Jan. 3, 2007.
GenBank: ACG76120.1 pesticidal crystal protein [Bacillus thuringiensis] Aug. 20, 2008.
GenBank: ACG76121.1 pesticidal crystal protein [Bacillus thuringiensis] Aug. 20, 2008.
GenBank: HM037126.1 Bacillus thuringiensis strain YY1 insecticidal crystal protein gene, complete cds Mar. 1, 2011.
GenBank: GQ866914.1 Bacillus thuringiensis strain SK-793 plasmid crystal protein (cry2A) gene, complete cds Jul. 25, 2016.
GenBank: HQ439789.1 Bacillus thuringiensis strain PS9-C12 Cry2A-like protein gene, partial cds Jul. 25, 2016.
GenBank: JN135255.1 Bacillus thuringiensis strain SSy125-c clone HA13 delta-endotoxin (cry2A) gene, complete cds Sep. 15, 2012.
GenBank: JN135256.1 Bacillus thuringiensis strain SSy60-b clone HAM delta-endotoxin (cry2A) gene, complete cds Sep. 15, 2012.
GenBank: JN135257.1 Bacillus thuringiensis strain SSy60-b clone HA16 delta-endotoxin (cry2A) gene, complete cds Sep. 15, 2012.
GenBank: JN135258.1 Bacillus thuringiensis strain SSy141-c clone HA17 delta-endotoxin (cry2A) gene, complete cds Sep. 15, 2012.
GenBank: JN135259.1 Bacillus thuringiensis strain SSy126-c clone HA18 delta-endotoxin (cry2A) gene, complete cds Sep. 15, 2012.
GenBank: JN135260.1 Bacillus thuringiensis strain SSy126-c clone HAW delta-endotoxin (cry2A) gene, partial cds Sep. 15, 2012.
GenBank: JN135261.1 Bacillus thuringiensis strain SSy111-c clone HA20 delta-endotoxin (cry2A) gene, complete cds Sep. 15, 2012.
GenBank: JN415485.1 Bacillus thuringiensis serovar kurstaki strain MnD insecticidal crystal protein (cry2Ab) gene, complete cds Apr. 17, 2013.
GenBank: JN426946.1 Bacillus thuringiensis strain SSy77 clone HA21 delta-endotoxin (cry2A) gene, complete cds Sep. 15, 2012 .
GenBank: JN415764.1 Bacillus thuringiensis strain SP41 Cry2Ab protein (cry2Ab) gene, complete cds Aug. 28, 2011.
GenBank: JN651494.1 Bacillus thuringiensis strain LTS-7 Cry2Aab gene, complete cds Feb. 5, 2015.
GenBank: CAA40536.1 CryllC delta-endotoxin [Bacillus thuringiensis] Apr. 18, 2005.
GenBank: AAG35410.1 insecticidal crystal protein Cry2Ac [Bacillus thuringiensis] Jan. 3, 2006.
GenBank: AAQ52385.1 Sequence 48 from patent U.S. Pat. No. 6,593,293 Aug. 17, 2003.
GenBank: ABC95997.1 Cry2Ac [Bacillus thuringiensis] BCT Feb. 8, 2006.
GenBank: ABC74969.1 crystal delta-endotoxin cry2Ac [Bacillus thuringiensis] Mar. 12, 2007.
GenBank: ABC74793.1 insecticidal crystal protein Cry2Ac [Bacillus thuringiensis serovar wuhanensis] Jan. 29, 2006.
GenBank: CAL18690.1 cry2Ac7 protein [Bacillus thuringiensis] Dec. 17, 2008.
GenBank: CAM09325.1 insecticidal crystal protein Cry2Ac8 [Bacillus thuringiensis] Jan. 10, 2009.
GenBank: ABN15104.1 insecticidal crystal protein [Bacillus thuringiensis] Feb. 12, 2007.
GenBank: CAM83895.1 Cry2Ac11 protein [Bacillus thuringiensis] Jan. 10, 2009.
GenBank: CAM83896.1 Cry2Ac12 protein [Bacillus thuringiensis] Jan. 10, 2009.
GenBank: AAF09583.1 crystal protein [Bacillus thuringiensis] Nov. 22, 1999.
GenBank: ABC86927.1 crystal protein Cry2Ad [Bacillus thuringiensis] Feb. 4, 2006.
GenBank: CAK29504.1 crystal protein [Bacillus thuringiensis] Jan. 10, 2009.
GenBank: CAM32331.1 crystal protein cry2Ad4 [Bacillus thuringiensis] Jan. 10, 2009.
GenBank: CA078739.1 SCRLAM1010G05.g AM1 Saccharum hybrid cultivar SP80-3280 cDNA clone SCRLAM1010G05 5', mRNA sequence Feb. 1, 2011.
GenBank: AAQ52362.1 Sequence 2 from patent U.S. Pat. No. 6,593,293 Aug. 17, 2003.
GenBank: AB030519.1 Crematogaster borneensis mitochondrial COI gene for cytochrome oxidase subunit I, partial cds, isolate:aL1 Jul. 26, 2016.
GenBank: GQ866915.1 Bacillus thuringiensis strain SK-758 plasmid crystal protein (cry2A) gene, complete cds Jul. 25, 2016.
GenBank: ACH91610.1 Cry2Ag [Bacillus thuringiensis] Jul. 2, 2010.
GenBank: EU939453.1 Bacillus thuringiensis strain BTSC6H8 cry2-like protein gene, complete cds Dec. 30, 2011 .
GenBank: ACL80665.1 Cry2Ah2 [Bacillus thuringiensis] Jan. 19, 2009.
GenBank: GU073380.1 Bacillus thuringiensis strain HYW-8 delta-endotoxin (cry2A) gene, complete cds Dec. 30, 2012.
GenBank: KC156702.1 Bacillus thuringiensis strain ARP193 pesticidal protein gene, complete cds Nov. 14, 2013.
GenBank: FJ788388.1 Bacillus thuringiensis strain T 20 Cry2A (cry2A) gene, complete cds Mar. 1, 2012.
GenBank: KC156660.1 Bacillus thuringiensis strain ARP067 pesticidal protein gene, complete cds Nov. 14, 2013.
GenBank: KC156658.1 Bacillus thuringiensis strain ARP026 pesticidal protein gene, complete cds Nov. 14, 2013.
GenBank: AAA22336.1 delta-endotoxin, partial [Bacillus thuringiensis] Apr. 26, 1993.
GenBank: AAA22541.1 insecticidal crystal protein [Bacillus thuringiensis] Apr. 26, 1993.
GenBank: CAA68482.1 unnamed protein product [Bacillus thuringiensis] Apr. 18, 2005.
GenBank: AAA22542.1 insect control protein [Bacillus thuringiensis] Apr. 26, 1993.
GenBank: AAA50255.1 crystal protein [Bacillus thuringiensis serovar morrisoni] Feb. 27, 2002.
GenBank: AAC43266.1 CrylllA [Bacillus thuringiensis serovar tenebrionis] Dec. 9, 1994.
GenBank: CAB41411.1 Cry3Aa protein [Bacillus thuringiensis] Apr. 15, 2005.
GenBank: AAS79487.1 insecticidal crystal protein [Bacillus thuringiensis] Apr. 6, 2004.
GenBank: AAW05659.1 Sequence 2 from patent U.S. Pat. No. 6,797,490 Dec. 15, 2004.
GenBank: AAU29411.1 Cry3Aa protein [Bacillus thuringiensis] Apr. 29, 2005.
GenBank: AAW82872.1 Cry3 delta endotoxin [Bacillus thuringiensis serovar tenebrionis] Feb. 14, 2005.
GenBank: ABY49136.1 Cry3A [Bacillus thuringiensis serovar tenebrionis] Jan. 1, 2008.
GenBank: CAA34983.1 unnamed protein product, partial [Bacillus thuringiensis] Jul. 26, 2016.
GenBank: CAA00645.1 toxin [Bacillus thuringiensis] Apr. 14, 2005.
GenBank: JQ397327.1 Bacillus thuringiensis strain ML090 delta-endotoxin Cry3Ba3 (cry3Ba3) gene, complete cds Jan. 10, 2016.
GenBank: AAA22334.1 crylllB2 [Bacillus thuringiensis] Apr. 26, 1993.
GenBank: AAA74198.1 Cry3Bb2 [Bacillus thuringiensis] Aug. 10, 1995.
GenBank: 115475.1 Sequence 2 from patent U.S. Pat. No. 5,466,597 Apr. 2, 1996.
GenBank: CAA42469.1 CrylllD [Bacillus thuringiensis serovar kurstaki] Apr. 18, 2005.
GenBank: CAA68485.1 unnamed protein product [Bacillus thuringiensis] Apr. 18, 2005.
GenBank: BAA00179.1 130 kDa insecticidal protein (ISRH4) (plasmid) [Bacillus thuringiensis serovar israelensis] Jul. 26, 2016.
GenBank: CAD30148.1 pesticidial crystal protein cry4AA (plasmid) [Bacillus thuringiensis serovar israelensis] Oct. 23, 2008.
GenBank: AFB18317.1 putative cry4A [Bacillus thuringiensis serovar israelensis] Feb. 21, 2012.

(56) References Cited

OTHER PUBLICATIONS

GenBank: AAY96321.1 cry4A insecticidal protein, partial [Bacillus thuringiensis] Jul. 26, 2016.
GenBank: CAA30312.1 unnamed protein product [Bacillus thuringiensis] Oct. 23, 2008.
GenBank: CAA30114.1 unnamed protein product [Bacillus thuringiensis] Apr. 18, 2005.
GenBank: AAA22337.1 mosquitocidal protein [Bacillus thuringiensis] Apr. 26, 1993.
GenBank: BAA00178.1 130 kDa insecticidal protein (ISRH3) (plasmid) [Bacillus thuringiensis serovar israelensis] Jul. 26, 2016.
GenBank: CAD30095.1 pesticidial crystal protein cry4BA (plasmid) [Bacillus thuringiensis serovar israelensis] Oct. 23, 2008.
GenBank: ABC47686.1 pesticidal crystal protein cry4B-like [Bacillus thuringiensis] Dec. 22, 2005.
GenBank: EU646202.1 Bacillus thuringiensis strain BTy41 Cry4-like protein gene, complete cds Dec. 20, 2011.
GenBank: FJ403208.1 Bacillus thuringiensis strain HS18-1 pesticidal crystal protein (cry4Da1) gene, complete cds Apr. 3, 2010.
GenBank: FJ597622.1 Bacillus thuringiensis strain Ywc2-8 pesticidal crystal protein (cry4C) gene, complete cds Jun. 1, 2011.
GenBank: FJ403207.1 Bacillus thuringiensis strain BtMC282 pesticidal crystal protein (cry4Db) gene, complete cds Jun. 1, 2011.
GenBank: AAA67694.1 delta-endotoxin, partial [Bacillus thuringiensis serovar darmstadiensis] May 30, 1995.
GenBank: AAA67693.1 delta-endotoxin, partial [Bacillus thuringiensis serovar darmstadiensis] May 30, 1995.
GenBank: I34543.1 Sequence 42 from patent U.S. Pat. No. 5,596,071 Feb. 6, 1997.
GenBank: ABQ82087.1 CryAd [Bacillus thuringiensis] ul. 23, 2016.
GenBank: AAA68598.1 delta endotoxin, partial [Bacillus thuringiensis] Jun. 21, 1995.
GenBank: ABW88931.1 Cry5B-like protein [Bacillus thuringiensis YBT-1518] Nov. 17, 2008.
GenBank: AFJ04417.1 Cry5B-like delta endotoxin [Bacillus thuringiensis] May 8, 2012.
GenBank: HM461869.1 Bacillus thuringiensis strain Sbt003 nematicidal crystal protein (cry0031) gene, complete cds Dec. 31, 2013.
GenBank: HM461870.1 Bacillus thuringiensis strain Sbt003 Cry0032 (cry0032) gene, complete cds Dec. 31, 2013.
GenBank: HM485580.1 Bacillus thuringiensis strain Sbt003 Cry0033 gene, complete cds Dec. 31, 2019.
GenBank: AAA22357.1 delta-endotoxin, partial [Bacillus thuringiensis] Apr. 26, 1993.
GenBank: AAM46849.1 nematocidal crystal protein R1 [Bacillus thuringiensis YBT-1518] Dec. 23, 2009.
GenBank: ABH03377.1 nematocidal crystal protein 6A [Bacillus thuringiensis] Aug. 5, 2006.
GenBank: AAA22358.1 delta-endotoxin, partial [Bacillus thuringiensis] Apr. 26, 1993.
GenBank: AAA22351.1 crystal protein [Bacillus thuringiensis serovar galleriae] Apr. 26, 1993.
GenBank: AAA21120.1 Crylll delta-endotoxin, partial [Bacillus thuringiensis serovar dakota] Aug. 27, 1994.
GenBank: AAA21121.1 Crylll delta-endotoxin, partial [Bacillus thuringiensis serovar kumamtoensis] Aug. 27, 1994.
GenBank: ABX24522.1 Cry7Ab3 delta-endotoxin [Bacillus thuringiensis] Sep. 11, 2008.
GenBank: EU380678.1 Bacillus thuringiensis strain HQ122 cry7-like protein gene, complete cds Feb. 1, 2011.
GenBank: ABX79555.2 crystal Cry7-like protein (plasmid) [Bacillus thuringiensis serovar monterrey] Jul. 26, 2016.
GenBank: ACJ44005.1 cytochrome oxidase subunit II, partial (mitochondrion) [Coenonympha tullia scotica], Jul. 26, 2016.
GenBank: ADB89216.1 insecticidal crystal protein Cry7Ab [Bacillus thuringiensis] Jul. 1, 2010.
GenBank: GU145299.1 Bacillus thuringiensis strain GWS7 Cry7Ab8 protein (cry7Ab8) gene, complete cds Nov. 11, 2009.
GenBank: ADD92572.1 insecticidal crystal protein [Bacillus thuringiensis] Mar. 27, 2010.
GenBank: ABB70817.1 insecticidal crystal protein Cry7Ba1 [Bacillus thuringiensis serovar huazhongensis] Nov. 1, 2006.
GenBank: KC156653.1 Bacillus thuringiensis strain ARP013 pesticidal protein gene, complete cds Nov. 14, 2013.
GenBank: ABR67863.2 pesticidal crystal protein [Bacillus thuringiensis] Dec. 20, 2016.
GenBank: KC156698.1 Bacillus thuringiensis strain ARP269 pesticidal protein gene, complete cds Nov. 14, 2013.
GenBank: ACQ99547.1 pesticidal crystal protein, partial [Bacillus thuringiensis] Jul. 24, 2016.
GenBank: HM572236.1 Bacillus thuringiensis cry7-like protein 2 gene, partial cds Dec. 30, 2019.
GenBank: KC156679.1 Bacillus thuringiensis strain ARP140 pesticidal protein gene, complete cds Nov. 14, 2013.
GenBank: HM035086.1 Bacillus thuringiensis strain Sbt009 pesticidal crystal protein Cry0091 (cry0091) gene, complete cds Dec. 31, 2013.
GenBank: HM132124.1 Bacillus thuringiensis strain HD868(D8) Cry7-like protein gene, partial cds Jul. 25, 2016.
GenBank: EEM19403.1 hypothetical protein bthur0001_54740 [Bacillus thuringiensis serovar tochigiensis BGSC 4Y1] Apr. 30, 2009.
GenBank: HM035088.1 Bacillus thuringiensis strain Sbt009 pesticidal crystal protein Cry0093 (cry0093) gene, complete cds Dec. 31, 2013.
GenBank: EEM19090.1 hypothetical protein bthur0001_58040 [Bacillus thuringiensis serovar tochigiensis BGSC 4Y1] Apr. 30, 2009.
GenBank: HM572235.1 Bacillus thuringiensis cry7-like protein 1 gene, partial cds Dec. 30, 2019.
GenBank: KC156682.1 Bacillus thuringiensis strain ARP162 pesticidal protein gene, complete cds Nov. 14, 2013.
GenBank: HM572237.1 Bacillus thuringiensis cry7-like protein 3 gene, partial cds Dec. 30, 2019.
GenBank: KC156669.1 Bacillus thuringiensis strain ARP103 pesticidal protein gene, complete cds Nov. 14, 2013.
GenBank: KCL56650.1 DNA-3-methyladenine glycosylase I TagA [Mycobacterium tuberculosis TB_RSA170] Apr. 30, 2014.
GenBank: KC156654.1 Bacillus thuringiensis strain ARP012 pesticidal protein gene, complete cds Nov. 14, 2013.
GenBank: KC156697.1 Bacillus thuringiensis strain ARP271 pesticidal protein gene, complete cds Nov. 14, 2013.
GenBank: KC156651.1 Bacillus thuringiensis strain ARP021 pesticidal protein gene, complete cds Nov. 14, 2013.
GenBank: KC156665.1 Bacillus thuringiensis strain ARP112 pesticidal protein gene, complete cds Nov. 14, 2013.
GenBank: KC156671.1 Bacillus thuringiensis strain ARP114 pesticidal protein gene, complete cds Nov. 14, 2013.
GenBank: KC156680.1 Bacillus thuringiensis strain ARP171 pesticidal protein gene, complete cds Nov. 14, 2013.
GenBank: BAM99306.1 155 kDa hypothetical protein delta-endotoxin [Bacillus thuringiensis serovar dakota] Mar. 14, 2013.
GenBank: BAM99307.1 131 kDa hypothetical protein, delta-endotoxin [Bacillus thuringiensis serovar dakota] Mar. 14, 2013.
GenBank: AAA21117.1 Crylll delta-endotoxin, partial [Bacillus thuringiensis serovar kumamtoensis] Aug. 27, 1994.
GenBank: EU044830.1 Bacillus thuringiensis strain B-JJX insecticidal crystal protein gene, complete cds Dec. 31, 2009.
GenBank: KC156662.1 Bacillus thuringiensis strain ARP068 pesticidal protein gene, complete cds Nov. 14, 2013.
GenBank: KC156684.1 Brevibacillus laterosporus strain ARP215 pesticidal protein gene, complete cds Nov. 14, 2013.
GenBank: AAA21118.1 Crylll delta-endotoxin, partial [Bacillus thuringiensis serovar kumamtoensis] Aug. 27, 1994.
GenBank: CAD57542.1 unnamed protein product [Bacillus thuringiensis] Nov. 23, 2002.
GenBank: CAD57543.1 unnamed protein product [Bacillus thuringiensis] Nov. 23, 2002.
GenBank: AAA21119.1 Crylll delta-endotoxin [Bacillus thuringiensis serovar japonensis] Aug. 27, 1994.
GenBank: AAR98783.1 HBF-1 Crylll delta-endotoxin [Bacillus thuringiensis] Oct. 29, 2007.

(56) References Cited

OTHER PUBLICATIONS

GenBank: EU625349.1 Bacillus thuringiensis strain FB-32 delta-endotoxin gene, complete cds May 1, 2011.
GenBank: ADB54826.1 Crylll insecticidal crystal protein [Bacillus thuringiensis] Jan. 26, 2010.
GenBank: BAC07226.1 cry8 [Bacillus thuringiensis serovar galleriae] Dec. 20, 2003.
GenBank: BD133574.1 Protein having insecticidal activity, DNA encoding the protein, and controlling agent and controlling method of noxious organisms Sep. 18, 2002.
GenBank: BD133575.1 Protein having insecticidal activity, DNA encoding the protein, and controlling agent and controlling method of noxious organisms Sep. 18, 2002.
GenBank: BAF93483.1 Cry8Dlike [Bacillus thuringiensis] Dec. 6, 2008.
GenBank: AAQ73470.1 Cry8Ea1 [Bacillus thuringiensis] Mar. 18, 2009.
GenBank: EU047597.1 Bacillus thuringiensis strain B-DLL crystal protein gene, complete cds Dec. 30, 2009.
GenBank: KC855216.1 Bacillus thuringiensis strain GWL Cry8Ea3 gene, complete cds Jun. 30, 2015.
GenBank: AAT48690.1 Cry8X [Bacillus thuringiensis] Mar. 18, 2009.
GenBank: HQ174208.1 Bacillus thuringiensis strain B-DLL insecticidal crystal protein (cry8Fa2) gene, complete cds Oct. 2, 2010.
GenBank: AFH78109.1 Cry8x [Bacillus thuringiensis] Apr. 21, 2012.
GenBank: AAT46073.1 crystal protein [Bacillus thuringiensis] Sep. 22, 2009.
GenBank: ABC42043.1 toxin pbt145-1 [Bacillus thuringiensis] Dec. 30, 2008.
GenBank: FJ198072.1 Bacillus thuringiensis strain FCD114 spherical crystal protein (cry8Ga) gene, complete cds Aug. 10, 2010.
GenBank: AAW81032.2 Cry8 [Bacillus thuringiensis] Jan. 3, 2011.
GenBank: EU381044.1 Bacillus thuringiensis strain btsu4 cry8-like protein gene, complete cds Feb. 20, 2011.
GenBank: GU073381.1 Bacillus thuringiensis strain HW-11 delta-endotoxin (cry8) gene, complete cds Dec. 30, 2012.
GenBank: HM044664.1 Bacillus thuringiensis Cry0301 (cry0301) gene, complete cds Dec. 31, 2013.
GenBank: KC156674.1 Bacillus thuringiensis strain ARP124 pesticidal protein gene, complete cds Nov. 14, 2013.
GenBank: GU325772.1 Bacillus thuringiensis strain F4 Cry8L (cry8L) gene, complete cds Dec. 30, 2012.
GenBank: KC156677.1 Bacillus thuringiensis strain ARP135 pesticidal protein gene, complete cds Nov. 14, 2013.
GenBank: EU625348.1 Bacillus thuringiensis strain FPT-2 delta-endotoxin gene, complete cds May 1, 2011.
GenBank: FJ422558.1 Bacillus thuringiensis delta-endotoxin (cry8) gene, partial cds Dec. 26, 2011.
GenBank: ACN87262.1 Cry8Ka2 delta-endotoxin (plasmid) [Bacillus thuringiensis serovar kenyae] Jul. 24, 2016.
GenBank: HM123758.1 Bacillus thuringiensis strain ST8 Cry8Kb gene, complete cds Dec. 30, 2013.
GenBank: KC156675.1 Bacillus thuringiensis strain ARP158 pesticidal protein gene, complete cds Nov. 14, 2013.
GenBank: GU325771.1 Bacillus thuringiensis strain F4 Cry8M (cry8M) gene, complete cds Dec. 30, 2012 .
GenBank: HM044665.1 Bacillus thuringiensis Cry0302 (cry0302) gene, complete cds Dec. 31, 2013.
GenBank: EEM86551.1 Pesticidal crystal protein cry8Ba [Bacillus thuringiensis serovar pulsiensis Bgsc 4CC1]Apr. 30, 2009.
GenBank: HM210574.1 Bacillus thuringiensis strain NARC Bt17(C6) Cry8-like protein gene, complete cds Dec. 31, 2013.
GenBank: HM640939.1 Bacillus thuringiensis strain Q52-7 Cry8Ga4 (cry8Ga4) gene, complete cds Jul. 30, 2011.
GenBank: HQ388415.1 Bacillus thuringiensis strain ST8 Cry8-like protein gene, complete cds Dec. 30, 2013.
GenBank: HQ441166.1 Bacillus thuringiensis strain ST8 Cry8-like protein gene, complete cds Dec. 30, 2013.
GenBank: KC152468.1 Bacillus thuringiensis strain INTA Fr7-4 Cry8 gene, complete cds Dec. 24, 2012.
GenBank: AFP87548.1 Cry8-like delta-endotoxin [Bacillus thuringiensis] Aug. 19, 2012.
GenBank: JQ740599.1 Bacillus thuringiensis strain 62 Cry8Sa1 gene, complete cds Feb. 14, 2016.
GenBank: KC156673.1 Bacillus thuringiensis strain ARP110 pesticidal protein gene, complete cds Nov. 14, 2013.
GenBank: FJ770571.1 Bacillus thuringiensis serovar canadensis plasmid cry8b delta-toxin-like gene, complete sequence Sep. 9, 2010.
GenBank: ABS53003.1 crystal protein [Bacillus thuringiensis] Jul. 30, 2007.
GenBank: CAA41122.1 delta-endotoxin CryIG protoxin [Bacillus thuringiensis serovar galleriae] Apr. 18, 2005.
GenBank: CAA41425.1 crystal protein, partial [Bacillus thuringiensis] Jul. 26, 2016.
GenBank: GQ249293.1 Bacillus thuringiensis strain SC5(D2) cry9Aa-like protein gene, complete cds Dec. 31, 2012.
GenBank: GQ249294.1 Bacillus thuringiensis strain T03C001 cry9Aa-like protein gene, complete cds Dec. 31, 2012.
GenBank: JX174110.1 Bacillus sp. enrichment culture clone BGSN1 Cry9Aa5 gene, complete cds Jul. 13, 2013.
GenBank: AAQ52376.1 Sequence 30 from patent U.S. Pat. No. 6,593,293 Aug. 17, 2003.
GenBank: CAA52927.1 delta-endotoxin, partial [Bacillus thuringiensis] Jul. 26, 2016.
GenBank: GU299522.1 Bacillus thuringiensis insecticidal crystal protein Cry9Ba2 gene, complete cds Dec. 1, 2010.
GenBank: AAV28716.1 Cry9Bb delta-endotoxin [Bacillus thuringiensis serovar japonensis] Jul. 7, 2008.
GenBank: CAA85764.1 unnamed protein product [Bacillus thuringiensis] Apr. 18, 2005.
GenBank: AAQ52375.1 Sequence 28 from patent U.S. Pat. No. 6,593,293 Aug. 17, 2003.
GenBank: BAA19948.1 cry9Da1 [Bacillus thuringiensis serovar japonensis] Feb. 6, 1999.
GenBank: AAB97923.1 delta-endotoxin, partial [Bacillus thuringiensis serovar japonensis] Mar. 3, 2017.
GenBank: GQ249297.1 Bacillus thuringiensis strain T03B001 cry9Eb-like protein gene, complete cds Oct. 31, 2013.
GenBank: AAX78439.1 crystal protein Cry9Db1 [Bacillus thuringiensis] Apr. 11, 2005.
GenBank: KC156683.1 Bacillus thuringiensis strain ARP168 pesticidal protein gene, complete cds Nov. 14, 2013.
GenBank: BAA34908.1 Cry9 like protein [Bacillus thuringiensis serovar aizawai] Feb. 5, 1999.
GenBank: AA012908.1 ze27b02.s1 Soares retina N2b4HR Homo sapiens cDNA clone IMAGE:360171 3' similar to GB:M11560 Fructose-Bisphosphate Aldolase a (Human), mRNA sequence Nov. 29, 1996.
GenBank: ABM21765.1 cry9Ea3 insecticidal crystal protein [Bacillus thuringiensis] Jan. 17, 2007.
GenBank: ACE88267.1 pesticidal crystal protein [Bacillus thuringiensis] Jun. 24, 2008.
GenBank: ACF04743.1 Cry9Ea protein (plasmid) [Bacillus thuringiensis] Jul. 26, 2016.
GenBank: ACG63872.1 Cry9Ea [Bacillus thuringiensis] Aug. 17, 2008.
GenBank: FJ380927.1 Bacillus thuringiensis strain Bt4 plasmid Cry9Ea (cry9Ea) gene, complete cds Jul. 24, 2016.
GenBank: GQ249292.1 Bacillus thuringiensis strain SC5(E8) cry9Ea-like protein gene, complete cds Dec. 31, 2012.
GenBank: JN651495.1 Bacillus thuringiensis strain LTS-7 Cry9Ea gene, complete cds Feb. 5, 2015.
GenBank: CAC50780.1 unnamed protein product [Bacillus thuringiensis] Aug. 8, 2001.
GenBank: GQ249298.1 Bacillus thuringiensis strain T23001 cry9Eb-like protein gene, complete cds Oct. 31, 2013.
GenBank: KC156646.1 Bacillus thuringiensis strain ARP057 pesticidal protein gene, complete cds Nov. 14, 2013.
GenBank: AAC63366.2 delta-endotoxin [Bacillus thuringiensis] Dec. 10, 2003.

(56) References Cited

OTHER PUBLICATIONS

GenBank: AAX78440.1 crystal protein Cry9Ed1 [Bacillus thuringiensis] Apr. 11, 2005.
GenBank: GQ249296.1 Bacillus thuringiensis strain T03B001 cry9Ea-like protein gene, complete cds Oct. 31, 2013.
GenBank: KC156664.1 Bacillus thuringiensis strain ARP095 pesticidal protein gene, complete cds Nov. 14, 2013.
GenBank: KC156692.1 Bacillus thuringiensis strain ARP212 pesticidal protein gene, complete cds Nov. 14, 2013.
GenBank: KC156699.1 Bacillus thuringiensis strain ARP188 pesticidal protein gene, complete cds Nov. 14, 2013.
GenBank: AAA22614.1 insecticidal endotoxin (put.); putative [Bacillus thuringiensis] Apr. 26, 1993.
GenBank: E00614.1 DNA encoding a polypeptide having insecticidal activity(BTI endotoxin) Nov. 4, 2005.
GenBank: CAD30098.1 pesticidial crystal protein cry10AA (plasmid) [Bacillus thuringiensis serovar israelensis] Oct. 23, 2008.
GenBank: AFB18318.1 putative cry 10 [Bacillus thuringiensis serovar israelensis] Feb. 21, 2012.
GenBank: DQ167578.1 Bacillus thuringiensis strain LDC-9 pesticidal crystal protein c10Aa-like (cry10Aa) gene, partial sequence Feb. 6, 2006.
GenBank: AAA22611.1 67 kd mosquitocidal protein, partial [Bacillus thuringiensis] Apr. 26, 1993.
GenBank: CAD30081.1 pesticidial crystal protein cry11AA (plasmid) [Bacillus thuringiensis serovar israelensis] Oct. 21, 2008.
GenBank: AFB18319.1 putative cry11A, partial [Bacillus thuringiensis serovar israelensis] Feb. 21, 2012.
GenBank: DQ166531.1 Bacillus thuringiensis strain LDC-9 mosquito toxic crystal protein-like (cry11Aa) gene, partial sequence Feb. 2, 2006.
GenBank: CAA60504.1 mosquitocidal toxin [Bacillus thuringiensis] Mar. 20, 1996.
GenBank: AAC97162.1 d-endotoxin [Bacillus thuringiensis serovar medellin] Dec. 18, 1998.
GenBank: HM068615.1 Bacillus thuringiensis strain K34 delta-endotoxin (cry11Bb2) gene, complete cds Jul. 17, 2012.
GenBank: AAA22355.1 delta-endotoxin, partial [Bacillus thuringiensis] Apr. 26, 1993.
GenBank: AAA22356.1 delta-endotoxin [Bacillus thuringiensis] Apr. 26, 1993.
GenBank: AAA21516.1. delta endotoxin [Bacillus thuringiensis serovar sotto], Sep. 17, 1994.
GenBank: KC156652.1. Bacillus thuringiensis strain ARP001 pesticidal protein gene, complete cds. Nov. 14, 2013.
GenBank: AAA22333.1. crystal protein [Bacillus thuringiensis]. Apr. 26, 1993.
GenBank: CAA63860.1. cbm71 mosquitocidal toxin [[Clostridium] bifermentans]. Jun. 17, 1996.
GenBank: CAA67841.1. cbm72 mosquitocidal toxin [[Clostridium] bifermentans]. Jul. 17, 1998.
GenBank: CAA67506.1. parasporal crystal protein [Paenibacillus popilliae]. Apr. 18, 2005.
GenBank: AAF89667.1. parasporal crystal protein Cry18Ba1 [Paenibacillus popilliae]. Aug. 1, 2000.
GenBank: AAF89668.1. parasporal crystal protein Cry18Ca1 [Paenibacillus popilliae ATCC]. Aug. 1, 2000.
GenBank: CAA68875.1. mosquitocidal toxin [Bacillus thuringiensis serovar jegathesan]. Apr. 18, 2005.
GenBank: BAA32397.1. insecticidal protein [Bacillus thuringiensis serovar higo]. Aug. 19, 1998.
GenBank: AFM37572.1. crystal protein [Bacillus thuringiensis serovar vazensis]. Jun. 19, 2012.
GenBank: AAB93476.1. mosquitocidal toxin [Bacillus thuringiensis]. Dec. 29, 1997.
GenBank: ACS93601.1. Cry20-like delta endotoxin (plasmid) [Bacillus thuringiensis]. Jul. 24, 2016.
GenBank: KC156694.1. Bacillus thuringiensis strain ARP192 pesticidal protein gene, complete cds. Nov. 14, 2013.
GenBank: GQ144333.1. Bacillus thuringiensis strain Y-5 insecticidal crystal protein (cry20) pseudogene, complete sequence. Jun. 17, 2009.
GenBank: 132932.1. Sequence 5 from patent U.S. Pat. No. 5,589,382. Feb. 6, 1997.
GenBank: 166477.1. Sequence 8 from patent U.S. Pat. No. 5,670,365. Dec. 28, 1997.
GenBank: BAC06484.1. Cry21Ba1 [Bacillus thuringiensis serovar roskildiensis]. Jan. 25, 2005.
GenBank: JF521577.1. Bacillus thuringiensis strain Sbt072 Cry21 Ba1-like protein gene, complete cds. Feb. 21, 2013.
GenBank: KC156687.1. Bacillus thuringiensis strain ARP258 pesticidal protein gene, complete cds. 14-Nov. 2013.
GenBank: JF521578.1. Bacillus thuringiensis strain Sbt072 Cry21Ba2-like protein gene, complete cds. Feb. 21, 2013.
GenBank: 134547.1. Sequence 50 from patent U.S. Pat. No. 5,59,6,071. Feb. 6. 1997.
GenBank: CAD43579.1. unnamed protein product [Bacillus thuringiensis]. Aug. 9, 2002.
GenBank: ACD93211.1. delta-endotoxin [Bacillus thuringiensis]. Jun. 9, 2008.
GenBank: AAK50456.1. insecticidal crystal protein CryET70 [Bacillus thuringiensis]. Jun. 15, 2001.
GenBank: CAD43577.1. unnamed protein product, partial [Bacillus thuringiensis]. Aug. 9, 2002.
GenBank: CAD43578.1. unnamed protein product [Bacillus thuringiensis]. Aug. 9, 2002.
GenBank: KC156672.1. Bacillus thuringiensis strain ARP148 pesticidal protein gene, complete cds. Nov. 14, 2013.
GenBank: AAF76375.1. crystal protein [Bacillus thuringiensis]. Jun. 16, 2000.
GenBank: AAC61891.1. insecticidal protein Jeg72, partial [Bacillus thuringiensis serovar jegathesan]. Sep. 30, 1998.
GenBank: BAD32657.1. delta-endotoxin [Bacillus thuringiensis]. Aug. 17, 2005.
GenBank: CAJ43600.1. pesticidal crystal protein cry24-like [Bacillus thuringiensis]. Mar. 17, 2007.
GenBank: AAC61892.1. insecticidal protein Jeg74 [Bacillus thuringiensis serovar jegathesan]. Sep. 30, 1998.
GenBank: AAD25075.1. Cry26Aa1 protein [Bacillus thuringiensis serovar finitimus]. Jan. 14, 2000.
GenBank: BAA82796.1. 94kDa mosquitocidal toxin [Bacillus thuringiensis serovar higo]. Jul. 1, 2009.
GenBank: AAD24189.1. Cry28Aa1 delta-endotoxin [Bacillus thuringiensis serovar finitimus]. Jan. 14, 2000.
GenBank: AAG00235.1. parasporal inclusion protein Cry [Bacillus thuringiensis serovar finitimus]. Aug. 16, 2000.
GenBank: CAC80985.1. Cry29Aa protein [Bacillus thuringiensis serovar medellin]. Jan. 13, 2006.
GenBank: CAC80986.1. Cry30Aa protein [Bacillus thuringiensis serovar medellin]. Jan. 13, 2006.
GenBank: BAD00052.1. putative mosquitocidal toxin [Bacillus thuringiensis serovar entomocidus]. Oct. 5, 2006.
GenBank: BAD67157.1. Cry30-like [Bacillus thuringiensis]. Oct. 28, 2004.
GenBank: ACU24781.1. Cry30Ca [Bacillus thuringiensis serovar jegathesan]. May 10, 2013.
GenBank: EF095955.1. Bacillus thuringiensis strain y41 Cry30-like protein gene, complete cds. Dec. 29, 2009.
GenBank: BAE80088.1. delta-endotoxin [Bacillus thuringiensis serovar aizawai]. Mar. 1, 2006.
GenBank: ACC95445.1. Cry30Ea1 [Bacillus thuringiensis]. Mar. 1, 2009.
GenBank: FJ499389.1. Bacillus thuringiensis strain Ywc2-8 pesticidal crystal protein (cry30) gene, complete cds. Jun. 1, 2011.
GenBank: ACI22625.1. Cry30-like protein [Bacillus thuringiensis]. Jun. 1, 2009.
GenBank: ACG60020.1. Cry30-like protein [Bacillus thuringiensis]. Aug. 13, 2008.
GenBank: HQ638217.1. Bacillus thuringiensis strain S2160-1 Cry30-like protein gene, complete cds. Jun. 25, 2012.
GenBank: BAB11757.1. 81-kDa leukemia toxin [Bacillus thuringiensis]. Aug. 12, 2000.

(56) References Cited

OTHER PUBLICATIONS

GenBank: AAL87458.1. 83-KDa crystal protein [Bacillus thuringiensis]. Jun. 21, 2007.
GenBank: BAE79808.1. Cry31-like 81-kDa protein [Bacillus thuringiensis]. Feb. 23, 2006.
GenBank: BAF32571.1. hypothetical protein [Bacillus thuringiensis]. Sep. 21, 2006.
GenBank: BAF32572.1. hypothetical protein [Bacillus thuringiensis]. Sep. 20, 2006.
GenBank: BAI44026.1. M019CP78A (plasmid) [Bacillus thuringiensis]. Jul. 24, 2016.
GenBank: BAE79809.1. Cry31-like 82-kDa protein [Bacillus thuringiensis]. Feb. 23, 2006.
GenBank: BAF32570.1. hypothetical protein [Bacillus thuringiensis]. Sep. 20, 2006.
GenBank: BAF34368.1. hypothetical protein [Bacillus thuringiensis]. Oct. 7, 2006.
GenBank: AB731600.1. Bacillus thuringiensis gene for parasporin 1 like protein, complete cds. May 24, 2013.
GenBank: BAI44022.1. M019CP78B (plasmid) [Bacillus thuringiensis]. Jul. 24, 2016.
GenBank: AAG36711.1. crystal protein [Bacillus thuringiensis serovar yunnanensis]. Jan. 4, 2002.
GenBank: GU063849.1. Bacillus thuringiensis strain FBG-1 delta-endotoxin (cry32A) gene, complete cds. Dec. 30, 2012.
GenBank: GU063850.1. Bacillus thuringiensis strain FZ-2 delta-endotoxin (cry32A) gene, complete cds. Dec. 30, 2012.
GenBank: BAB78601.1. crystal protein CryE6L [Bacillus thuringiensis]. Dec. 6, 2001.
GenBank: BAB78602.1. crystal protein CryE6Q [Bacillus thuringiensis]. Dec. 6, 2001.
GenBank: KC156708.1. Bacillus thuringiensis strain ARP227 pesticidal protein gene, complete cds. Nov. 14, 2013.
GenBank: BAB78603.1. crystal protein CryE6S [Bacillus thuringiensis]. Dec. 6, 2001.
GenBank: GU324274.1. Bacillus thuringiensis strain HYD-3 Cry32 gene, complete cds. Dec. 31, 2012.
GenBank: KC156686.1. Bacillus thuringiensis strain ARP239 pesticidal protein gene, complete cds. Nov. 14, 2013.
GenBank: KC156663.1. Bacillus thuringiensis strain ARP092 pesticidal protein gene, complete cds. Nov. 14, 2013.
GenBank: KC156656.1. Bacillus thuringiensis strain ARP055 pesticidal protein gene, complete cds. Nov. 14, 2013.
GenBank: KC156657.1. Bacillus thuringiensis strain ARP052 pesticidal protein gene, complete cds. Nov. 14, 2013.
GenBank: KC156661.1. Bacillus thuringiensis strain ARP076 pesticidal protein gene, complete cds. Nov. 14, 2013.
GenBank: KC156666.1. Bacillus thuringiensis strain ARP096 pesticidal protein gene, complete cds. Nov. 14, 2013.
GenBank: KC156667.1. Bacillus thuringiensis strain ARP104 pesticidal protein gene, complete cds. Nov. 14, 2013.
GenBank: KC156685.1. Bacillus thuringiensis strain ARP262 pesticidal protein gene, complete cds. Nov. 14, 2013.
GenBank: KC156688.1. Bacillus thuringiensis strain ARP259 pesticidal protein gene, complete cds. Nov. 14, 2013.
GenBank: KC156689.1. Bacillus thuringiensis strain ARP203 pesticidal protein gene, complete cds. Nov. 14, 2013.
GenBank: KC156690.1. Bacillus thuringiensis strain ARP256 pesticidal protein gene, complete cds. Nov. 14, 2013.
GenBank: KC156704.1. Bacillus thuringiensis strain ARP242 pesticidal protein gene, complete cds. Nov. 14, 2013.
GenBank: KC156691.1 Bacillus thuringiensis strain ARP179 pesticidal protein gene, complete cds. Nov. 14, 2013.
GenBank: KC156703.1 Bacillus thuringiensis strain ARP218 pesticidal protein gene, complete cds. Nov. 14, 2013.
GenBank: KC156705.1 Bacillus thuringiensis strain ARP277 pesticidal protein gene, complete cds. Nov. 14, 2013.
GenBank: KC156706.1 Bacillus thuringiensis strain ARP174 pesticidal protein gene, complete cds. Nov. 14, 2013.
GenBank: KC156707.1 Bacillus thuringiensis strain ARP229 pesticidal protein gene, complete cds. Nov. 14, 2013.
GenBank: KC156709.1 Bacillus thuringiensis strain ARP185 pesticidal protein gene, complete cds. Nov. 14, 2013.
GenBank: KC156710.1 Bacillus thuringiensis strain ARP220 pesticidal protein gene, complete cds. Nov. 14, 2013.
GenBank: KC156655.1 Bacillus thuringiensis strain ARP050 pesticidal protein gene, complete cds. Nov. 14, 2013.
GenBank: AAL26871.1 crystal protein NT40KD [Bacillus thuringiensis serovar dakota]. Apr. 10, 2003.
GenBank: AAG50341.1 13.6 kDa insecticidal crystal protein [Bacillus thuringiensis]. Jan. 11, 2007.
GenBank: AAK64560.1 crystal protein ET74 [Bacillus thuringiensis]Jan. 30, 2006.
GenBank: AAT29032.1 14 kDa component of binary insecticidal crystal protein [Bacillus thuringiensis]. Apr. 6, 2005.
GenBank: AAT29030.1 14 kDa component of binary insecticidal crystal protein [Bacillus thuringiensis]. Apr. 6, 2005.
GenBank: AAG41671.1 13.6 kDa insecticidal crystal protein [Bacillus thuringiensis]. Sep. 26, 2002.
GenBank: AAG50118.113.6 kDa insecticidal crystal protein [Bacillus thuringiensis]. Mar. 4, 2002.
GenBank: AAK64562.1 crystal protein ET79 [Bacillus thuringiensis]. Jan. 30, 2006.
GenBank: AAT29029.114 kDa component of binary insecticidal crystal protein [Bacillus thuringiensis]. Apr. 6, 2005.
GenBank: AAK64565.1 crystal protein ET80 [Bacillus thuringiensis]. Jan. 30, 2006.
GenBank: AAT29033.114 kDa component of binary insecticidal crystal protein [Bacillus thuringiensis]. Apr. 6, 2005.
GenBank: AAT29031.114 kDa component of binary insecticidal crystal protein [Bacillus thuringiensis]. Apr. 6, 2005.
GenBank: AAG50342.1 43.8 kDa insecticidal crystal protein [Bacillus thuringiensis]. Jan. 11, 2007.
GenBank: AAT29028.144 kDa component of binary insecticidal crystal protein [Bacillus thuringiensis]. Apr. 6, 2005.
GenBank: AAT29025.1 44 kDa component of binary insecticidal crystal protein [Bacillus thuringiensis]. Apr. 6, 2005.
GenBank: AAG41672.1 43.8 kDa insecticidal crystal protein [Bacillus thuringiensis]. Sep. 6, 2002.
GenBank: AAK64563.1 crystal protein ET71 [Bacillus thuringiensis]. Jan. 30, 2006.
GenBank: AY536891.1 Bacillus thuringiensis strain KR1369 44 kDa component of binary insecticidal crystal protein (cry35A) gene, complete cds. Apr. 6, 2005.
GenBank: AAG50117.1 43.8 kDa insecticidal crystal protein [Bacillus thuringiensis]. Mar. 4, 2002.
GenBank: AAK64566.1 crystal protein ET76 [Bacillus thuringiensis]. Jan. 30, 2006.
GenBank: AAT29027.1 44 kDa component of binary insecticidal crystal protein [Bacillus thuringiensis]. Apr. 6, 2005.
GenBank: AAT29026.1 44 kDa component of binary insecticidal crystal protein [Bacillus thuringiensis]. Apr. 6, 2005.
GenBank: AAK64558.1 crystal protein ET69 [Bacillus thuringiensis]. Jun. 26, 2001.
GenBank: AAF76376.1 crystal protein [Bacillus thuringiensis]. Jun. 16, 2000.
GenBank: AAK64559.1 crystal protein ET75 [Bacillus thuringiensis]. Jan. 30, 2006.
GenBank: BAB72016.2 mosquitocidal toxin, partial [Bacillus thuringiensis serovar aizawai]. Jul. 26, 2016.
GenBank: BAB72018.1 putative mosquitocidal toxin, partial [Bacillus thuringiensis serovar aizawai]. Jul. 26, 2016.
GenBank: BAC77648.1 putative mosquitocidal toxin [Bacillus thuringiensis serovar aizawai]Jun. 14, 2003.
GenBank: EU381045.1 Bacillus thuringiensis strain BTY41 cry40-like protein gene, complete cds. Dec. 1, 2011.
GenBank: ACF15199.1 toxin protein [Bacillus thuringiensis]. Apr. 1, 2009.
GenBank: BAD35163.1 cancer cell-killing Cry protein [Bacillus thuringiensis]. Jan. 20, 2006.
GenBank: HM461871.1 Bacillus thuringiensis strain Sbt021 parasporin 3-like protein (cry0212) gene, complete cds. Dec. 31, 2013.

(56) References Cited

OTHER PUBLICATIONS

GenBank: BAD35166.1 Cry protein [Bacillus thuringiensis]. Aug. 10, 2004.
GenBank: BAD15301.1 parasporal crystal protein [Paenibacillus lentimorbus]. Jul. 26, 2016.
GenBank: BAD95474.1 Cryhimel [Paenibacillus popilliae]. Apr. 9, 2005.
Genbank: BAD15303.1 parasporal crystal protein [Paenibacillus lentimorbus]. Jul. 26, 2016.
GenBank: KC156676.1 Brevibacillus laterosporus strain ARP132 pesticidal protein gene, complete cds. Nov. 14, 2013.
GenBank: KC156695.1 Brevibacillus laterosporus strain ARP252 pesticidal protein gene, complete cds. Nov. 14, 2013.
GenBank: KC156696.1 Brevibacillus laterosporus strain ARP191 pesticidal protein gene, complete cds. Nov. 14, 2013.
GenBank: BAD15305.1 parasporal crystal protein, partial [Paenibacillus lentimorbus]. Jul. 26, 2016.
GenBank: BAD08532.1 putative mosquitocidal toxin [Bacillus thuringiensis serovar entomocidus]. Feb. 22, 2008.
GenBank: BAD22577.1 parasporin 1470D [Bacillus thuringiensis serovar shandongiensis]. May 26, 2006.
BAC79010 crystal protein [Bacillus thuringiensis serovar dakota]. Oct. 5. 2006.
GenBank: BAG68906.1 parasporin2 [Bacillus thuringiensis serovar shandongiensis]. Oct. 24, 2013.
GenBank: BAD35170.1 crystal protein (plasmid) [Bacillus thuringiensis]. Jul. 26, 2016.
GenBank: AAY24695.1 Cry [Bacillus thuringiensis]. Oct. 24, 2005.
GenBank: CAJ18351.1 Crystal toxin [Lysinibacillus sphaericus]. Jul. 26, 2016.
GenBank: CAJ86545.1 Cry48Aa protein [Lysinibacillus sphaericus]. Aug. 31, 2007.
GenBank: CAJ86546.1 Cry48Aa protein [Lysinibacillus sphaericus]. Aug. 31, 2007.
GenBank: CAJ86548.1 Cry48Aa protein, partial [Lysinibacillus sphaericus]. Jul. 26, 2016.
GenBank: CAJ86549.1 Cry48Aa protein, partial [Lysinibacillus sphaericus] Jul. 26, 2016.
GenBank: CAH56541.1 Crystal toxin [Lysinibacillus sphaericus]. Jul. 26, 2016.
GenBank: CAJ86541.1 Cry49Aa protein [Lysinibacillus sphaericus]. Aug. 31, 2007.
GenBank: CAJ86543.1 Cry49Aa protein [Lysinibacillus sphaericus]. Aug. 31, 2007.
GenBank: CAJ86544.1 Cry49Aa protein [Lysinibacillus sphaericus]. Aug. 31, 2007.
GenBank: CAJ86542.1 Cry49Aa protein [Lysinibacillus sphaericus]. Aug. 31, 2007.
GenBank: BAE86999.1 esticidal crystal protein [Bacillus thuringiensis serovar sotto]. Mar. 16, 2006.
GenBank: GU446675.1 Bacillus thuringiensis strain S2160-1 Cry50-like protein gene, complete cds. Jun. 25, 2012.
GenBank: AB114444.1 Marsupenaeus japonicus ccn mRNA for crustocalcin-a, complete cds. Dec. 4, 2004.
GenBank: GU570697.1 Bacillus thuringiensis strain EG2934 parasporal crystal protein gene, complete cds. May 16, 2012.
GenBank: EF613489.1 Bacillus thuringiensis Cryl9-like protein gene, complete cds. Dec. 31, 2010.
GenBank: FJ361760.1 Bacillus thuringiensis strain Bm59-2 pesticidal crystal protein (cry53Ba) gene, partial cds. Jul. 24, 2016.
GenBank: EF633476.1 Bacillus thuringiensis strain Y41 Cry toxin (cry) gene, complete cds. Dec. 30, 2010.
GenBank: FJ361759.1 Bacillus thuringiensis strain Btmc28 pesticidal crystal protein (cry52Ab) gene, partial cds. Jul. 24, 2016.
GenBank: ACA52194.1 insecticidal crystal protein Cry54Aa [Bacillus thuringiensis]. Jun. 1, 2009.
GenBank: GQ140349.1 Bacillus thuringiensis strain FBG25 Cry54 (cry54) gene, complete cds. Dec. 22, 2012.
GenBank: GU446677.1 Bacillus thuringiensis strain S2160-1 Cry54-like protein gene, complete cds. Jun. 25, 2012.
GenBank: ABW88932.1 Cry1518-45 [Bacillus thuringiensis YBT-1518], Nov. 17, 2008.
GenBank: JQ916908.1 Bacillus thuringiensis strain BtMC28 cry-like protein gene, partial cds; and hypothetical protein gene, complete cds. Jan. 1, 2016.
NCBI Reference Sequence: ZP_04123838.1. Cancer cell-killing Cry protein Bacillus thuringiensis serovar Pakistani str. T13001]. Nov. 27, 2012.
NCBI Reference Sequence: ZP_04099945.1. hypothetical protein bthur0009_56320 [Bacillus thuringiensis serovar andalousiensis BGSC 4AW1]. Nov. 27, 2012.
NCBI Reference Sequence: ZP_04099652.1 Cancer cell-killing Cry protein [Bacillus thuringiensis serovar andalousiensis BGSC 4AW1]. Nov. 27, 2012.
NCBI Reference Sequence: ZP_04148882.1. Pesticidal crystal protein cry4Aa [Bacillus thuringiensis serovar tochigiensis Bgsc 4Y1]. Nov. 27, 2012.
NCBI Reference Sequence: ZP_04123426.1 Pesticidal crystal protein cry5Ba [Bacillus thuringiensis serovar Pakistani str. T13001] Nov. 27, 2012.
NCBI Reference Sequence: ZP_04123980.1 Pesticidal crystal protein cry5Ba [Bacillus thuringiensis serovar Pakistani str. T13001] Nov. 27, 2012.
NCBI Reference Sequence: ZP 04124038.1 Pesticidal crystal protein cry5Aa [Bacillus thuringiensis serovar Pakistani str. T13001] Nov. 27, 2012.

* cited by examiner

Measure Microbiome Composition

Metrics for Success of an N Biofertilizer for Corn

- Release of fixed N from microbe
- Transfer of fixed N to host plant
- Overcome N deficiency
- Robustly colonize corn in the field
- Express nitrogenase (*nifH*) in the presence of fertilizer Decouple nifA Expression From Endogenous Nitrogen Regulation Improve The Assimilation And Excretion Of Fixed Nitrogen FIG. 3A
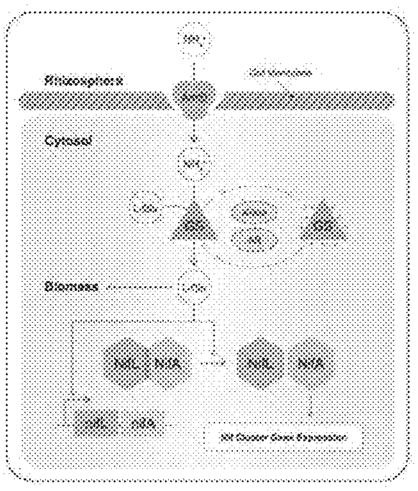
FIG. 3B
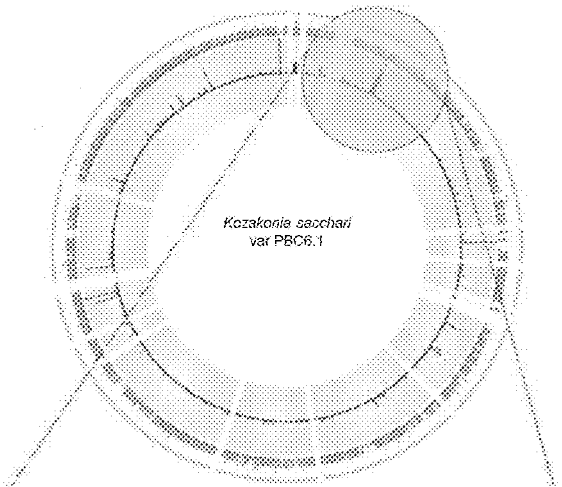
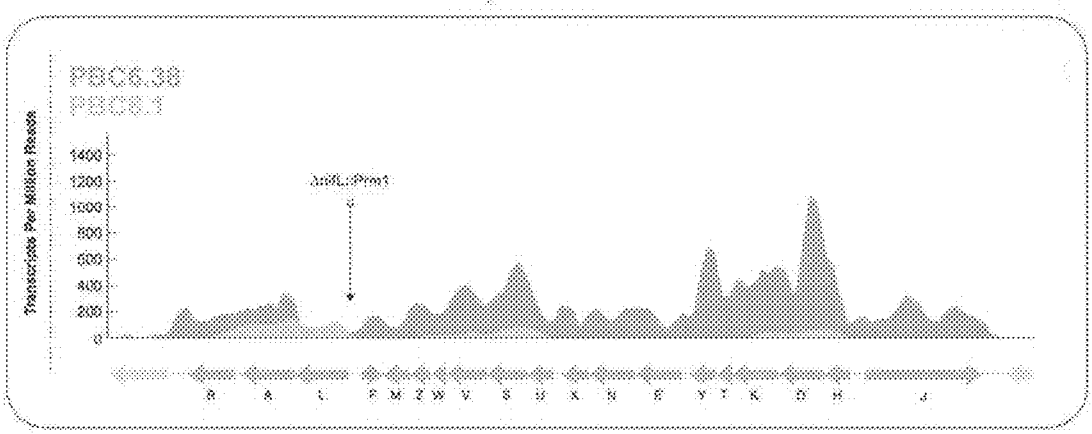
FIG. 3C
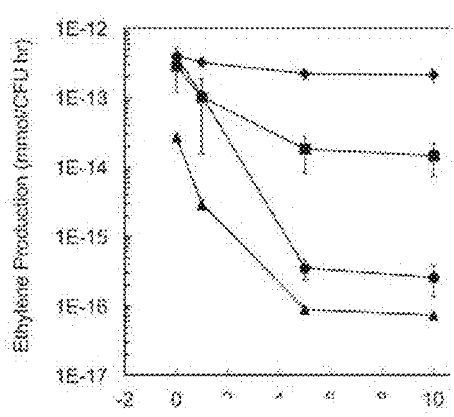
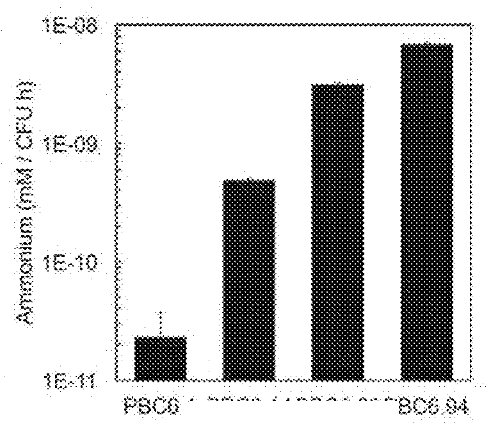
FIG. 3D
FIG. 3E FIG. 5A
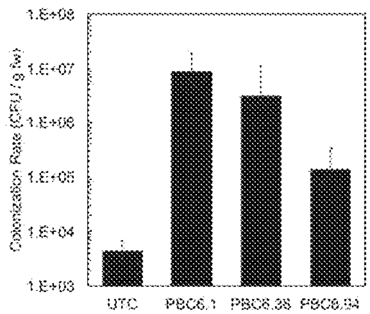
FIG. 5B
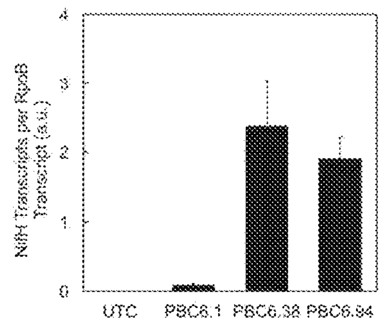
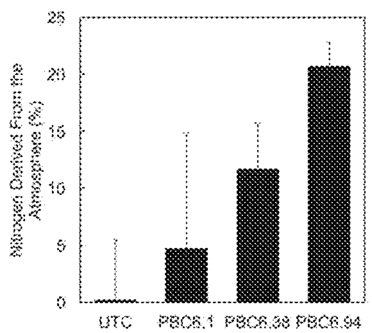
FIG. 5C

| Strain Name | Activity (mmol N / Microbe hr) | Peak Colonization (CFU / g fw) |
|---|---|---|
| CI006 | 4.45E-16 | 2.55E+05 |
| CM038 | 3.26E-13 | 7.39E+05 |
| CM014 | 2.72E-13 | 7.39E+05 |
| CM093 | 4.27E-13 | 7.39E+05 |
| CM094 | 5.49E-13 | 7.39E+05 |
| CM029 | 2.95E-13 | 7.39E+05 |
| CI019 | 4.32E-17 | 2.89E+07 |
| CM011 | 2.95E-15 | 3.49E+07 |
| CM067 | 2.30E-17 | 3.49E+07 |
| CM069 | 3.10E-17 | 3.49E+07 |
| CM081 | 8.63E-16 | 3.49E+07 |
| 19-715 | 1.28E-15 | 3.49E+07 |
| 19-714 | 1.57E-15 | 3.49E+07 |
| 19-594 | 3.31E-15 | 3.49E+07 |
| 19-590 | 1.14E-14 | 3.49E+07 |
| 19-713 | 1.96E-14 | 3.49E+07 |
| 19-724 | 2.41E-14 | 3.49E+07 |
| CI911 | 3.48E-17 | 1.24E+07 |
| CI730 | 5.64E-17 | 2.89E+07 |

AGRICULTURAL COMPOSITIONS COMPRISING REMODELED NITROGEN FIXING MICROBES

CROSS-REFERENCE TO RELATED APPLICATIONS

This application is a Continuation of application Ser. No. 17/254,175, filed Dec. 18, 2020, which claims the benefit of International PCT Application No. PCT/US2019/039217, filed Jun. 26, 2019, which claims priority to U.S. Provisional Application No. 62/690,621, filed on Jun. 27, 2018 and U.S. Provisional Application No. 62/808,693, filed on Feb. 21, 2019. These applications are hereby incorporated by reference in their entirety for all purposes.

STATEMENT REGARDING SEQUENCE LISTING

The contents of the text file submitted electronically herewith are incorporated herein by reference in their entirety: A computer readable format copy of the Sequence Listing filename: PIVO_004_03US_SeqList_ST25.txt, date created, Jan. 13, 2022, file size 582 kilobytes.

BACKGROUND OF THE DISCLOSURE

By 2050 the United Nations' Food and Agriculture Organization projects that total food production must increase by 70% to meet the needs of a growing population, a challenge that is exacerbated by numerous factors, including: diminishing freshwater resources, increasing competition for arable land, rising energy prices, increasing input costs, and the likely need for crops to adapt to the pressures of a drier, hotter, and more extreme global climate.

Current agricultural practices are not well equipped to meet this growing demand for food production, while simultaneously balancing the environmental impacts that result from increased agricultural intensity.

One of the major agricultural inputs needed to satisfy global food demand is nitrogen fertilizer. However, the current industrial standard utilized to produce nitrogen fertilizer, is an artificial nitrogen fixation method called the Haber-Bosch process, which converts atmospheric nitrogen ($N_2$) to ammonia ($NH_3$) by a reaction with hydrogen ($H_2$) using a metal catalyst under high temperatures and pressures. This process is resource intensive and deleterious to the environment.

In contrast to the synthetic Haber-Bosch process, certain biological systems have evolved to fix atmospheric nitrogen. These systems utilize an enzyme called nitrogenase that catalyzes the reaction between $N_2$ and $H_2$, and results in nitrogen fixation. For example, *rhizobia* are diazotrophic bacteria that fix nitrogen after becoming established inside root nodules of legumes. An important goal of nitrogen fixation research is the extension of this phenotype to non-leguminous plants, particularly to important agronomic grasses such as wheat, rice, and corn. However, despite the significant progress made in understanding the development of the nitrogen-fixing symbiosis between *rhizobia* and legumes, the path to use that knowledge to induce nitrogen-fixing nodules on non-leguminous crops is still not clear.

Consequently, the vast majority of modern row crop agriculture utilizes nitrogen fertilizer that is produced via the resource intensive and environmentally deleterious Haber-Bosch process. For instance, the USDA indicates that the average U.S. corn farmer typically applies between 130 and 200 lb. of nitrogen per acre (146 to 224 kg/ha). This nitrogen is not only produced in a resource intensive synthetic process, but is applied by heavy machinery crossing/impacting the field's soil, burning petroleum, and requiring hours of human labor.

Furthermore, the nitrogen fertilizer produced by the industrial Haber-Bosch process is not well utilized by the target crop. Rain, runoff, heat, volatilization, and the soil microbiome degrade the applied chemical fertilizer. This equates to not only wasted money, but also adds to increased pollution instead of harvested yield. To this end, the United Nations has calculated that nearly 80% of fertilizer is lost before a crop can utilize it. Consequently, modern agricultural fertilizer production and delivery is not only deleterious to the environment, but it is extremely inefficient.

In order to meet the world's growing food supply needs—while also balancing resource utilization and providing minimal impacts upon environmental systems—a better approach to nitrogen fixation and delivery to plants is urgently needed.

SUMMARY OF THE DISCLOSURE

In some aspects, the disclosure is generally drawn to a seed treatment composition, comprising: (a) a plurality of non-intergeneric remodeled bacteria that have an average colonization ability per unit of plant root tissue of at least about $1.0\times10^4$ bacterial cells per gram of fresh weight of plant root tissue and produce fixed N of at least about $1\times10^{-17}$ mmol N per bacterial cell per hour; and (b) at least one pesticide.

In some aspects, the pesticide is a fungicide. In some aspects, the pesticide is a fungicide selected from the group consisting of: fludioxonil, metalaxyl, mefenoxam, azoxystrobin, thiabendazole, ipconazole, tebuconazole, prothioconazole, and combinations thereof.

In some aspects, the pesticide is an insecticide. In some aspects, the pesticide is a neonicotinoid insecticide. In some aspects, the pesticide is an insecticide selected from the group consisting of: imidacloprid, clothianidin, thiamethoxam, chlorantraniliprole, and combinations thereof.

In some aspects, the at least one pesticide is a fungicide and an insecticide combination. In some aspects, the pesticide is a nematicide. In some aspects, the pesticide is an herbicide. In some aspects, the pesticide is selected from those in Table 13.

In some aspects, the non-intergeneric remodeled bacteria and pesticide exhibit a synergistic effect.

In some aspects, the seed treatment is disposed onto a seed. In some aspects, the seed treatment is disposed onto a seed from the family Poaceae. In some aspects, the seed treatment is disposed onto a cereal seed. In some aspects, the seed treatment is disposed onto a corn, rice, wheat, barley, *sorghum*, millet, oat, rye, or triticale seed. In some aspects, the seed treatment is disposed onto a corn seed. In some aspects, the seed treatment is disposed onto a genetically modified corn seed.

In some aspects, the seed treatment is disposed onto a genetically modified corn seed, wherein said corn comprises an herbicide tolerant trait. In some aspects, the seed treatment is disposed onto a genetically modified corn seed, wherein said corn comprises an insect resistant trait. In some aspects, the seed treatment is disposed onto a genetically modified corn seed, wherein said corn comprises an herbicide tolerant trait and an insect resistance trait. In some aspects, the seed treatment is disposed onto a genetically modified corn seed, wherein said corn comprises a trait listed in Table 19.

In some aspects, the seed treatment is disposed onto a non-genetically modified corn seed. In some aspects, the seed treatment is disposed onto a sweet corn, flint corn, popcorn, dent corn, pod corn, or flour corn.

In some aspects, the plurality of non-intergeneric remodeled bacteria produce 1% or more of the fixed nitrogen in a plant exposed thereto. In some aspects, the non-intergeneric remodeled bacteria are capable of fixing atmospheric nitrogen in the presence of exogenous nitrogen.

In some aspects, each member of the plurality of non-intergeneric remodeled bacteria comprises at least one genetic variation introduced into at least one gene, or non-coding polynucleotide, of the nitrogen fixation or assimilation genetic regulatory network. In some aspects, each member of the plurality of non-intergeneric remodeled bacteria comprises an introduced control sequence operably linked to at least one gene of the nitrogen fixation or assimilation genetic regulatory network. In some aspects, each member of the plurality of non-intergeneric remodeled bacteria comprises a heterologous promoter operably linked to at least one gene of the nitrogen fixation or assimilation genetic regulatory network.

In some aspects, each member of the plurality of non-intergeneric remodeled bacteria comprises at least one genetic variation introduced into a member selected from the group consisting of: nifA, nifL, ntrB, ntrC, polynucleotide encoding glutamine synthetase, glnA, glnB, glnK, drat, amtB, polynucleotide encoding glutaminase, glnD, glnE, nifJ, nifH, nifD, nifK, nifY, nifE, nifN, nifU, nifS, nifV, nifW, nifZ, nifM, nifF, nifB, nifQ, a gene associated with biosynthesis of a nitrogenase enzyme, or combinations thereof.

In some aspects, each member of the plurality of non-intergeneric remodeled bacteria comprises at least one genetic variation introduced into at least one gene, or non-coding polynucleotide, of the nitrogen fixation or assimilation genetic regulatory network that results in one or more of: increased expression or activity of NifA or glutaminase; decreased expression or activity of NifL, NtrB, glutamine synthetase, GlnB, GlnK, DraT, AmtB; decreased adenylyl-removing activity of GlnE; or decreased uridylyl-removing activity of GlnD.

In some aspects, each member of the plurality of non-intergeneric remodeled bacteria comprises a mutated nifL gene that has been altered to comprise a heterologous promoter inserted into said nifL gene. In some aspects, each member of the plurality of non-intergeneric remodeled bacteria comprises a mutated glnE gene that results in a truncated GlnE protein lacking an adenylyl-removing (AR) domain. In some aspects, each member of the plurality of non-intergeneric remodeled bacteria comprises a mutated amtB gene that results in the lack of expression of said amtB gene.

In some aspects, each member of the plurality of non-intergeneric remodeled bacteria comprises at least one of: a mutated nifL gene that has been altered to comprise a heterologous promoter inserted into said nifL gene; a mutated glnE gene that results in a truncated GlnE protein lacking an adenylyl-removing (AR) domain; a mutated amtB gene that results in the lack of expression of said amtB gene; and combinations thereof. In some aspects, each member of the plurality of non-intergeneric remodeled bacteria comprises a mutated nifL gene that has been altered to comprise a heterologous promoter inserted into said nifL gene and a mutated glnE gene that results in a truncated GlnE protein lacking an adenylyl-removing (AR) domain. In some aspects, each member of the plurality of non-intergeneric remodeled bacteria comprises a mutated nifL gene that has been altered to comprise a heterologous promoter inserted into said nifL gene and a mutated glnE gene that results in a truncated GlnE protein lacking an adenylyl-removing (AR) domain and a mutated amtB gene that results in the lack of expression of said amtB gene.

In some aspects, the plurality of non-intergeneric remodeled bacteria are present at a concentration of about $1\times10^5$ to about $1\times10^7$ cfu per seed. In some aspects, the plurality of non-intergeneric remodeled bacteria comprise at least two different species of bacteria. In some aspects, the plurality of non-intergeneric remodeled bacteria comprise at least two different strains of the same species of bacteria.

In some aspects, the plurality of non-intergeneric remodeled bacteria comprise bacteria selected from: *Rahnella aquatilis, Klebsiella variicola, Achromobacter spiritinus, Achromobacter marplatensis, Microbacterium murale, Kluyvera intermedia, Kosakonia pseudosacchari, Enterobacter* sp., *Azospirillum lipoferum, Kosakonia sacchari*, and combinations thereof.

In some aspects, the plurality of non-intergeneric remodeled bacteria are endophytic, epiphytic, or rhizospheric.

In some aspects, the plurality of non-intergeneric remodeled bacteria comprise bacteria selected from: a bacteria deposited as NCMA 201701002, a bacteria deposited as NCMA 201708004, a bacteria deposited as NCMA 201708003, a bacteria deposited as NCMA 201708002, a bacteria deposited as NCMA 201712001, a bacteria deposited as NCMA 201712002, and combinations thereof.

In some aspects, the plurality of non-intergeneric remodeled bacteria comprise bacteria with a nucleic acid sequence that shares at least about 90% sequence identity to a nucleic acid sequence selected from SEQ ID NOs: 177-260, 296-303. In some aspects, the plurality of non-intergeneric remodeled bacteria comprise bacteria with a nucleic acid sequence that shares at least about 95% sequence identity to a nucleic acid sequence selected from SEQ ID NOs: 177-260, 296-303. In some aspects, the plurality of non-intergeneric remodeled bacteria comprise bacteria with a nucleic acid sequence that shares at least about 99% sequence identity to a nucleic acid sequence selected from SEQ ID NOs: 177-260, 296-303. In some aspects, the plurality of non-intergeneric remodeled bacteria comprise bacteria with a nucleic acid sequence selected from SEQ ID NOs: 177-260, 296-303.

BRIEF DESCRIPTION OF THE DRAWINGS

FIG. 1I depicts the use of field data combined with modeling in aspects of the guided microbial remodeling platform.

FIGS. 3A-3E illustrate derivative microbes that fix and excrete nitrogen in vitro under conditions similar to high nitrate agricultural soils. FIG. 3A illustrates the regulatory network controlling nitrogen fixation and assimilation in PBC6.1 is shown, including the key nodes NifL, NifA, GS, GlnE depicted as the two-domain ATase-AR enzyme, and AmtB. FIG. 3B illustrates the genome of *Kosakonia sacchari* isolate PBC6.1 is shown. The three tracks circumscribing the genome convey transcription data from PBC6.1, PBC6.38, and the differential expression between the strains respectively. FIG. 3C illustrates the nitrogen fixation gene cluster and transcription data is expanded for finer detail. FIG. 3D illustrates nitrogenase activity under varying concentrations of exogenous nitrogen is measured with the acetylene reduction assay. The wild type strain exhibits repression of nitrogenase activity as glutamine concentrations increase, while derivative strains show varying degrees of robustness. In the line graph, triangles represent strain PBC6.22; circles represent strain PBC6.1; squares represent strain PBC6.15; and diamonds represent strain PBC6.14. Error bars represent standard error of the mean of at least three biological replicates. FIG. 3E illustrates temporal excretion of ammonia by derivative strains is observed at mM concentrations. Wild type strains are not observed to excrete fixed nitrogen, and negligible ammonia accumulates in the media. Error bars represent standard error of the mean.

FIGS. 5A-5C illustrate greenhouse experiments that demonstrate microbial nitrogen fixation in corn. FIG. 5A illustrates microbe colonization six weeks after inoculation of corn plants by PBC6.1 derivative strains. Error bars show standard error of the mean of at least eight biological replicates. FIG. 5B illustrates in planta transcription of nifH measured by extraction of total RNA from roots and subsequent Nanostring analysis. Only derivative strains show nifH transcription in the root environment. Error bars show standard error of the mean of at least three biological replicates. FIG. 5C illustrates microbial nitrogen fixation measured by the dilution of isotopic tracer in plant tissues. Derivative microbes exhibit substantial transfer of fixed nitrogen to the plant. Error bars show standard error of the mean of at least ten biological replicates.

DETAILED DESCRIPTION OF THE DISCLOSURE

Figure 1A:
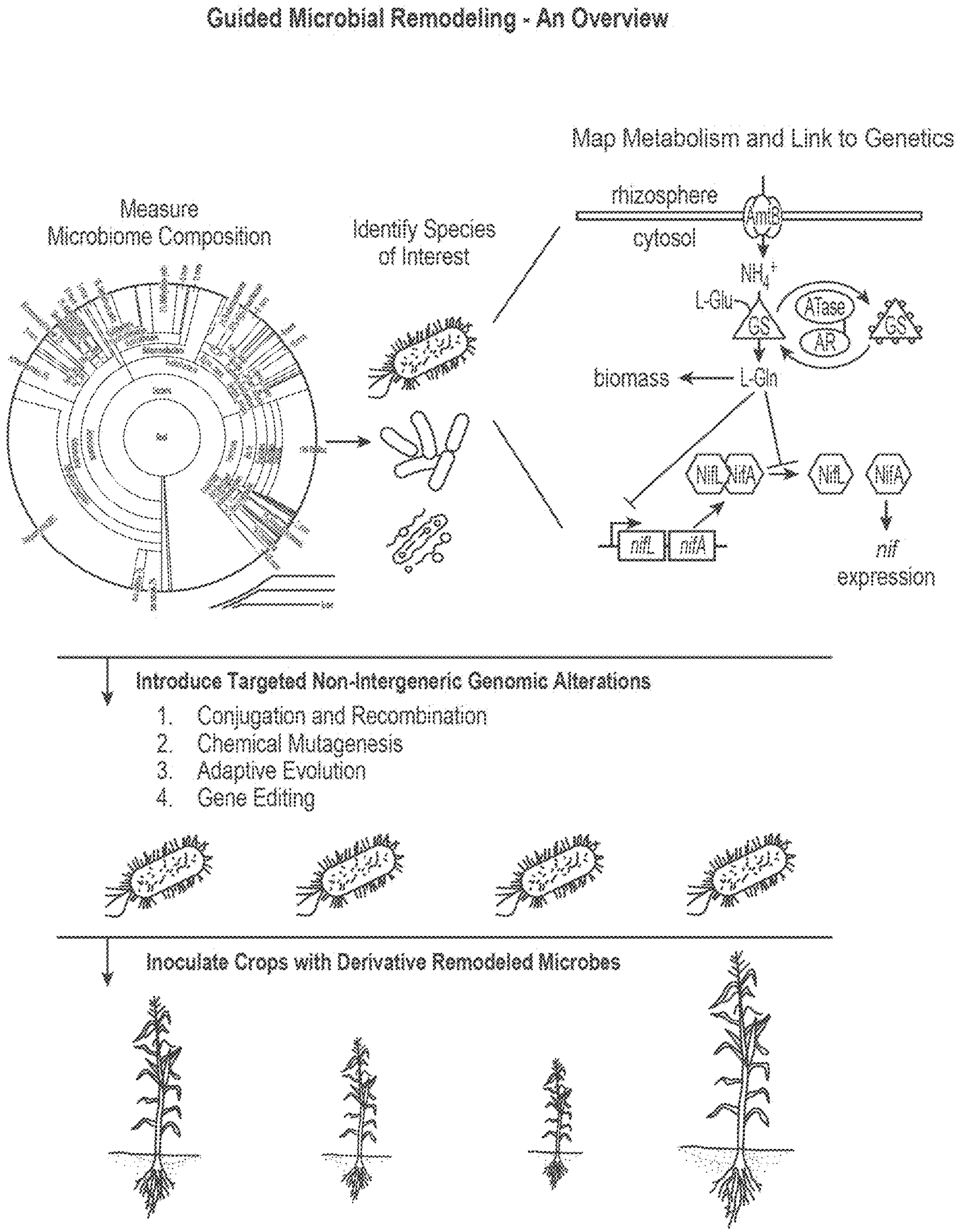
FIG. 1A depicts an overview of the guided microbial remodeling process, in accordance with embodiments.

While various embodiments of the disclosure have been shown and described herein, it will be obvious to those skilled in the art that such embodiments are provided by way of example only. Numerous variations, changes, and substitutions may occur to those skilled in the art without departing from the disclosure. It should be understood that various alternatives to the embodiments of the disclosure described herein may be employed.

Increased fertilizer utilization brings with it environmental concerns and is also likely not possible for many economically stressed regions of the globe. Furthermore, many industry players in the microbial arena are focused on creating intergeneric microbes. However, there is a heavy regulatory burden placed on engineered microbes that are characterized/classified as intergeneric. These intergeneric microbes face not only a higher regulatory burden, which makes widespread adoption and implementation difficult, but they also face a great deal of public perception scrutiny.

Currently, there are no engineered microbes on the market that are non-intergeneric and that are capable of increasing nitrogen fixation in non-leguminous crops. This dearth of such a microbe is a missing element in helping to usher in a truly environmentally friendly and more sustainable $21^{st}$ century agricultural system.

The present disclosure solves the aforementioned problems and provides a non-intergeneric microbe that has been engineered to readily fix nitrogen in crops. These microbes are not characterized/classified as intergeneric microbes and thus will not face the steep regulatory burdens of such. Further, the taught non-intergeneric microbes will serve to help $21^{st}$ century farmers become less dependent upon utilizing ever increasing amounts of exogenous nitrogen fertilizer.

Definitions

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

The terms "polynucleotide", "nucleotide", "nucleotide sequence", "nucleic acid" and "oligonucleotide" are used interchangeably. They refer to a polymeric form of nucleotides of any length, either deoxyribonucleotides or ribonucleotides, or analogs thereof. Polynucleotides may have any three dimensional structure, and may perform any function, known or unknown. The following are non-limiting examples of polynucleotides: coding or non-coding regions of a gene or gene fragment, loci (locus) defined from linkage analysis, exons, introns, messenger RNA (mRNA), transfer RNA (tRNA), ribosomal RNA (rRNA), short interfering RNA (siRNA), short-hairpin RNA (shRNA), micro-RNA (miRNA), ribozymes, cDNA, recombinant polynucleotides, branched polynucleotides, plasmids, vectors, isolated DNA of any sequence, isolated RNA of any sequence, nucleic acid probes, and primers. A polynucleotide may comprise one or more modified nucleotides, such as methylated nucleotides and nucleotide analogs. If present, modifications to the nucleotide structure may be imparted before or after assembly of the polymer. The sequence of nucleotides may be interrupted by non-nucleotide components. A polynucleotide may be further modified after polymerization, such as by conjugation with a labeling component.

"Hybridization" refers to a reaction in which one or more polynucleotides react to form a complex that is stabilized via hydrogen bonding between the bases of the nucleotide residues. The hydrogen bonding may occur by Watson Crick base pairing, Hoogstein binding, or in any other sequence specific manner according to base complementarity. The complex may comprise two strands forming a duplex structure, three or more strands forming a multi stranded complex, a single self-hybridizing strand, or any combination of these. A hybridization reaction may constitute a step in a more extensive process, such as the initiation of PCR, or the enzymatic cleavage of a polynucleotide by an endonuclease. A second sequence that is complementary to a first sequence is referred to as the "complement" of the first sequence. The term "hybridizable" as applied to a polynucleotide refers to the ability of the polynucleotide to form a complex that is stabilized via hydrogen bonding between the bases of the nucleotide residues in a hybridization reaction.

"Complementarity" refers to the ability of a nucleic acid to form hydrogen bond(s) with another nucleic acid sequence by either traditional Watson-Crick or other non-traditional types. A percent complementarity indicates the percentage of residues in a nucleic acid molecule which can form hydrogen bonds (e.g., Watson-Crick base pairing) with a second nucleic acid sequence (e.g., 5, 6, 7, 8, 9, 10 out of 10 being 50%, 60%, 70%, 80%, 90%, and 100% complementary, respectively). "Perfectly complementary" means that all the contiguous residues of a nucleic acid sequence will hydrogen bond with the same number of contiguous residues in a second nucleic acid sequence. "Substantially complementary" as used herein refers to a degree of complementarity that is at least 60%, 65%, 70%, 75%, 80%, 85%, 90%, 95%, 97%, 98%, 99%, or 100% over a region of 8, 9, 10, 11, 12, 13, 14, 15, 16, 17, 18, 19, 20, 21, 22, 23, 24, 25, 30, 35, 40, 45, 50, or more nucleotides, or refers to two nucleic acids that hybridize under stringent conditions. Sequence identity, such as for the purpose of assessing percent complementarity, may be measured by any suitable alignment algorithm, including but not limited to the Needleman-Wunsch algorithm (see e.g. the EMBOSS Needle aligner available at www.ebi.ac.uk/Tools/psa/emboss_needle/nucleotide.html, optionally with default settings), the BLAST algorithm (see e.g. the BLAST alignment tool available at blast.ncbi.nlm.nih.gov/Blast.cgi, optionally with default settings), or the Smith-Waterman algorithm (see e.g. the EMBOSS Water aligner available at www.ebi.ac.uk/Tools/psa/emboss_water/nucleotide.html, optionally with default settings). Optimal alignment may be assessed using any suitable parameters of a chosen algorithm, including default parameters.

In general, "stringent conditions" for hybridization refer to conditions under which a nucleic acid having complementarity to a target sequence predominantly hybridizes with a target sequence, and substantially does not hybridize to non-target sequences. Stringent conditions are generally sequence-dependent and vary depending on a number of factors. In general, the longer the sequence, the higher the temperature at which the sequence specifically hybridizes to its target sequence. Non-limiting examples of stringent conditions are described in detail in Tijssen (1993), Laboratory Techniques In Biochemistry And Molecular Biology-Hybridization With Nucleic Acid Probes Part I, Second Chapter "Overview of principles of hybridization and the strategy of nucleic acid probe assay", Elsevier, N.Y.

As used herein, "expression" refers to the process by which a polynucleotide is transcribed from a DNA template (such as into and mRNA or other RNA transcript) and/or the process by which a transcribed mRNA is subsequently translated into peptides, polypeptides, or proteins. Transcripts and encoded polypeptides may be collectively referred to as "gene product." If the polynucleotide is derived from genomic DNA, expression may include splicing of the mRNA in a eukaryotic cell.

The terms "polypeptide", "peptide" and "protein" are used interchangeably herein to refer to polymers of amino acids of any length. The polymer may be linear or branched, it may comprise modified amino acids, and it may be interrupted by non-amino acids. The terms also encompass an amino acid polymer that has been modified; for example, disulfide bond formation, glycosylation, lipidation, acetylation, phosphorylation, or any other manipulation, such as conjugation with a labeling component. As used herein the term "amino acid" includes natural and/or unnatural or synthetic amino acids, including glycine and both the D or L optical isomers, and amino acid analogs and peptidomimetics.

As used herein, the term "about" is used synonymously with the term "approximately." Illustratively, the use of the term "about" with regard to an amount indicates that values slightly outside the cited values, e.g., plus or minus 0.1% to 10%.

The term "biologically pure culture" or "substantially pure culture" refers to a culture of a bacterial species described herein containing no other bacterial species in quantities sufficient to interfere with the replication of the culture or be detected by normal bacteriological techniques.

"Plant productivity" refers generally to any aspect of growth or development of a plant that is a reason for which the plant is grown. For food crops, such as grains or vegetables, "plant productivity" can refer to the yield of grain or fruit harvested from a particular crop. As used herein, improved plant productivity refers broadly to improvements in yield of grain, fruit, flowers, or other plant parts harvested for various purposes, improvements in growth of plant parts, including stems, leaves and roots, promotion of plant growth, maintenance of high chlorophyll content in leaves, increasing fruit or seed numbers, increasing fruit or seed unit weight, reducing $NO_2$ emission due to reduced nitrogen fertilizer usage and similar improvements of the growth and development of plants.

Microbes in and around food crops can influence the traits of those crops. Plant traits that may be influenced by microbes include: yield (e.g., grain production, biomass generation, fruit development, flower set); nutrition (e.g., nitrogen, phosphorus, potassium, iron, micronutrient acquisition); abiotic stress management (e.g., drought tolerance, salt tolerance, heat tolerance); and biotic stress management (e.g., pest, weeds, insects, fungi, and bacteria). Strategies for altering crop traits include: increasing key metabolite concentrations; changing temporal dynamics of microbe influence on key metabolites; linking microbial metabolite production/degradation to new environmental cues; reducing negative metabolites; and improving the balance of metabolites or underlying proteins.

As used herein, a "control sequence" refers to an operator, promoter, silencer, or terminator.

As used herein, "in planta" may refer to in the plant, on the plant, or intimately associated with the plant, depending upon context of usage (e.g. endophytic, epiphytic, or rhizospheric associations). The plant may comprise plant parts, tissue, leaves, roots, root hairs, rhizomes, stems, seed, ovules, pollen, flowers, fruit, etc.

In some embodiments, native or endogenous control sequences of genes of the present disclosure are replaced with one or more intrageneric control sequences.

As used herein, "introduced" refers to the introduction by means of modern biotechnology, and not a naturally occurring introduction.

In some embodiments, the bacteria of the present disclosure have been modified such that they are not naturally occurring bacteria.

In some embodiments, the bacteria of the present disclosure are present in the plant in an amount of at least $10^3$ cfu, $10^4$ cfu, $10^5$ cfu, $10^6$ cfu, $10^7$ cfu, $10^8$ cfu, $10^9$ cfu, $10^{10}$ cfu, $10^{11}$ cfu, or $10^{12}$ cfu per gram of fresh or dry weight of the plant. In some embodiments, the bacteria of the present disclosure are present in the plant in an amount of at least about $10^3$ cfu, about $10^4$ cfu, about $10^5$ cfu, about $10^6$ cfu, about $10^7$ cfu, about $10^8$ cfu, about $10^9$ cfu, about $10^{10}$ cfu, about $10^{11}$ cfu, or about $10^{12}$ cfu per gram of fresh or dry weight of the plant. In some embodiments, the bacteria of the present disclosure are present in the plant in an amount of at least $10^3$ to $10^9$, $10^3$ to $10^7$, $10^3$ to $10^5$, $10^5$ to $10^9$, $10^5$ to $10^7$, $10^6$ to $10^{10}$, $10^6$ to $10^7$ cfu per gram of fresh or dry weight of the plant.

Fertilizers and exogenous nitrogen of the present disclosure may comprise the following nitrogen-containing molecules: ammonium, nitrate, nitrite, ammonia, glutamine, etc. Nitrogen sources of the present disclosure may include anhydrous ammonia, ammonia sulfate, urea, diammonium phosphate, urea-form, monoammonium phosphate, ammonium nitrate, nitrogen solutions, calcium nitrate, potassium nitrate, sodium nitrate, etc.

As used herein, "exogenous nitrogen" refers to non-atmospheric nitrogen readily available in the soil, field, or growth medium that is present under non-nitrogen limiting conditions, including ammonia, ammonium, nitrate, nitrite, urea, uric acid, ammonium acids, etc.

As used herein, "non-nitrogen limiting conditions" refers to non-atmospheric nitrogen available in the soil, field, media at concentrations greater than about 4 mM nitrogen, as disclosed by Kant et al. (2010. J. Exp. Biol. 62(4):1499-1509), which is incorporated herein by reference.

As used herein, an "intergeneric microorganism" is a microorganism that is formed by the deliberate combination of genetic material originally isolated from organisms of different taxonomic genera. An "intergeneric mutant" can be used interchangeably with "intergeneric microorganism". An exemplary "intergeneric microorganism" includes a microorganism containing a mobile genetic element which was first identified in a microorganism in a genus different from the recipient microorganism. Further explanation can be found, inter alia, in 40 C.F.R. § 725.3.

In aspects, microbes taught herein are "non-intergeneric," which means that the microbes are not intergeneric.

As used herein, an "intrageneric microorganism" is a microorganism that is formed by the deliberate combination of genetic material originally isolated from organisms of the same taxonomic genera. An "intrageneric mutant" can be used interchangeably with "intrageneric microorganism".

As used herein, "introduced genetic material" means genetic material that is added to, and remains as a component of, the genome of the recipient.

As used herein, in the context of non-intergeneric microorganisms, the term "remodeled" is used synonymously with the term "engineered". Consequently, a "non-intergeneric remodeled microorganism" has a synonymous meaning to "non-intergeneric engineered microorganism," and will be utilized interchangeably. Further, the disclosure may refer to an "engineered strain" or "engineered derivative" or "engineered non-intergeneric microbe," these terms are used synonmysoulsy with "remodeled strain" or "remodeled derivative" or "remodeled non-intergeneric microbe."

In some embodiments, the nitrogen fixation and assimilation genetic regulatory network comprises polynucleotides encoding genes and non-coding sequences that direct, modulate, and/or regulate microbial nitrogen fixation and/or assimilation and can comprise polynucleotide sequences of the nif cluster (e.g., nifA, nifB, nifC, . . . nifZ), polynucleotides encoding nitrogen regulatory protein C, polynucleotides encoding nitrogen regulatory protein B, polynucleotide sequences of the gln cluster (e.g. glnA and glnD), draT, and ammonia transporters/permeases. In some cases, the Nif cluster may comprise NifB, NifH, NifD, NifK, NifE, NifN, NifX, hesa, and NifV. In some cases, the Nif cluster may comprise a subset of NifB, NifH, NifD, NifK, NifE, NifN, NifX, hesa, and NifV.

In some embodiments, fertilizer of the present disclosure comprises at least 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% nitrogen by weight.

In some embodiments, fertilizer of the present disclosure comprises at least about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% nitrogen by weight.

In some embodiments, fertilizer of the present disclosure comprises about 5% to 50%, about 5% to 75%, about 10% to 50%, about 10% to 75%, about 15% to 50%, about 15% to 75%, about 20% to 50%, about 20% to 75%, about 25% to 50%, about 25% to 75%, about 30% to 50%, about 30% to 75%, about 35% to 50%, about 35% to 75%, about 40% to 50%, about 40% to 75%, about 45% to 50%, about 45% to 75%, or about 50% to 75% nitrogen by weight.

In some embodiments, the increase of nitrogen fixation and/or the production of 1% or more of the nitrogen in the plant are measured relative to control plants, which have not been exposed to the bacteria of the present disclosure. All increases or decreases in bacteria are measured relative to control bacteria. All increases or decreases in plants are measured relative to control plants.

As used herein, a "constitutive promoter" is a promoter, which is active under most conditions and/or during most development stages. There are several advantages to using constitutive promoters in expression vectors used in biotechnology, such as: high level of production of proteins used to select transgenic cells or organisms; high level of expression of reporter proteins or scorable markers, allowing easy detection and quantification; high level of production of a transcription factor that is part of a regulatory transcription system; production of compounds that requires ubiquitous activity in the organism; and production of compounds that are required during all stages of development. Non-limiting exemplary constitutive promoters include, CaMV 35S promoter, opine promoters, ubiquitin promoter, alcohol dehydrogenase promoter, etc.

As used herein, a "non-constitutive promoter" is a promoter which is active under certain conditions, in certain types of cells, and/or during certain development stages. For example, tissue specific, tissue preferred, cell type specific, cell type preferred, inducible promoters, and promoters under development control are non-constitutive promoters. Examples of promoters under developmental control include promoters that preferentially initiate transcription in certain tissues.

As used herein, "inducible" or "repressible" promoter is a promoter which is under chemical or environmental factors control. Examples of environmental conditions that may affect transcription by inducible promoters include anaerobic conditions, certain chemicals, the presence of light, acidic or basic conditions, etc.

As used herein, a "tissue specific" promoter is a promoter that initiates transcription only in certain tissues. Unlike constitutive expression of genes, tissue-specific expression is the result of several interacting levels of gene regulation. As such, in the art sometimes it is preferable to use promoters from homologous or closely related species to achieve efficient and reliable expression of transgenes in particular tissues. This is one of the main reasons for the large amount of tissue-specific promoters isolated from particular tissues found in both scientific and patent literature.

As used herein, the term "operably linked" refers to the association of nucleic acid sequences on a single nucleic acid fragment so that the function of one is regulated by the other. For example, a promoter is operably linked with a coding sequence when it is capable of regulating the expression of that coding sequence (i.e., that the coding sequence is under the transcriptional control of the promoter). Coding sequences can be operably linked to regulatory sequences in a sense or antisense orientation. In another example, the complementary RNA regions of the disclosure can be operably linked, either directly or indirectly, 5' to the target mRNA, or 3' to the target mRNA, or within the target mRNA, or a first complementary region is 5' and its complement is 3' to the target mRNA.

In aspects, "applying to the plant a plurality of non-intergeneric bacteria," includes any means by which the plant (including plant parts such as a seed, root, stem, tissue, etc.) is made to come into contact (i.e. exposed) with said bacteria at any stage of the plant's life cycle. Consequently, "applying to the plant a plurality of non-intergeneric bacteria," includes any of the following means of exposing the plant (including plant parts such as a seed, root, stem, tissue, etc.) to said bacteria: spraying onto plant, dripping onto plant, applying as a seed coat, applying to a field that will then be planted with seed, applying to a field already planted with seed, applying to a field with adult plants, etc.

As used herein "MRTN" is an acronym for maximum return to nitrogen and is utilized as an experimental treatment in the Examples. MRTN was developed by Iowa State University and information can be found at: http://cnrc.agron.iastate.edu/ The MRTN is the nitrogen rate where the economic net return to nitrogen application is maximized. The approach to calculating the MRTN is a regional approach for developing corn nitrogen rate guidelines in individual states. The nitrogen rate trial data was evaluated for Illinois, Iowa, Michigan, Minnesota, Ohio, and Wisconsin where an adequate number of research trials were available for corn plantings following soybean and corn plantings following corn. The trials were conducted with spring, sidedress, or split preplant/sidedress applied nitrogen, and sites were not irrigated except for those that were indicated for irrigated sands in Wisconsin. MRTN was developed by Iowa State University due to apparent differences in methods for determining suggested nitrogen rates required for corn production, misperceptions pertaining to nitrogen rate guidelines, and concerns about application rates. By calculating the MRTN, practitioners can determine the following: (1) the nitrogen rate where the economic net return to nitrogen application is maximized, (2) the economic optimum nitrogen rate, which is the point where the last increment of nitrogen returns a yield increase large enough to pay for the additional nitrogen, (3) the value of corn grain increase attributed to nitrogen application, and the maximum yield, which is the yield where application of more nitrogen does not result in a corn yield increase. Thus the MRTN calculations provide practitioners with the means to maximize corn crops in different regions while maximizing financial gains from nitrogen applications.

The term mmol is an abbreviation for millimole, which is a thousandth ($10^{-3}$) of a mole, abbreviated herein as mol.

As used herein the terms "microorganism" or "microbe" should be taken broadly. These terms, used interchangeably, include but are not limited to, the two prokaryotic domains, Bacteria and Archaea. The term may also encompass eukaryotic fungi and protists.

The term "microbial consortia" or "microbial consortium" refers to a subset of a microbial community of individual microbial species, or strains of a species, which can be described as carrying out a common function, or can be described as participating in, or leading to, or correlating with, a recognizable parameter, such as a phenotypic trait of interest.

The term "microbial community" means a group of microbes comprising two or more species or strains. Unlike microbial consortia, a microbial community does not have to be carrying out a common function, or does not have to be participating in, or leading to, or correlating with, a recognizable parameter, such as a phenotypic trait of interest.

As used herein, "isolate," "isolated," "isolated microbe," and like terms, are intended to mean that the one or more microorganisms has been separated from at least one of the materials with which it is associated in a particular environment (for example soil, water, plant tissue, etc.). Thus, an "isolated microbe" does not exist in its naturally occurring environment; rather, it is through the various techniques described herein that the microbe has been removed from its natural setting and placed into a non-naturally occurring state of existence. Thus, the isolated strain or isolated microbe may exist as, for example, a biologically pure culture, or as spores (or other forms of the strain). In aspects, the isolated microbe may be in association with an acceptable carrier, which may be an agriculturally acceptable carrier.

In certain aspects of the disclosure, the isolated microbes exist as "isolated and biologically pure cultures." It will be appreciated by one of skill in the art that an isolated and biologically pure culture of a particular microbe, denotes that said culture is substantially free of other living organisms and contains only the individual microbe in question. The culture can contain varying concentrations of said microbe. The present disclosure notes that isolated and biologically pure microbes often "necessarily differ from less pure or impure materials." See, e.g. *In re Bergstrom,* 427 F.2d 1394, (CCPA 1970) (discussing purified prostaglandins), see also, *In re Bergy,* 596 F.2d 952 (CCPA 1979) (discussing purified microbes), see also, *Parke-Davis & Co.* v. *H. K. Mulford & Co.,* 189 F. 95 (S.D.N.Y. 1911) (Learned Hand discussing purified adrenaline), aff'd in part, rev'd in part, 196 F. 496 (2d Cir. 1912), each of which are incorporated herein by reference. Furthermore, in some aspects, the disclosure provides for certain quantitative measures of the concentration, or purity limitations, that must be found within an isolated and biologically pure microbial culture. The presence of these purity values, in certain embodiments, is a further attribute that distinguishes the presently disclosed microbes from those microbes existing in a natural state. See, e.g., *Merck & Co.* v. *Olin Mathieson Chemical Corp.,* 253 F.2d 156 (4th Cir. 1958) (discussing purity limitations for vitamin B12 produced by microbes), incorporated herein by reference.

As used herein, "individual isolates" should be taken to mean a composition, or culture, comprising a predominance of a single genera, species, or strain, of microorganism, following separation from one or more other microorganisms.

Microbes of the present disclosure may include spores and/or vegetative cells. In some embodiments, microbes of the present disclosure include microbes in a viable but non-culturable (VBNC) state. As used herein, "spore" or "spores" refer to structures produced by bacteria and fungi that are adapted for survival and dispersal. Spores are generally characterized as dormant structures; however, spores are capable of differentiation through the process of germination. Germination is the differentiation of spores into vegetative cells that are capable of metabolic activity, growth, and reproduction. The germination of a single spore results in a single fungal or bacterial vegetative cell. Fungal spores are units of asexual reproduction, and in some cases are necessary structures in fungal life cycles. Bacterial spores are structures for surviving conditions that may ordinarily be nonconducive to the survival or growth of vegetative cells.

As used herein, "microbial composition" refers to a composition comprising one or more microbes of the present disclosure. In some embodiments, a microbial composition is administered to plants (including various plant parts) and/or in agricultural fields.

As used herein, "carrier," "acceptable carrier," or "agriculturally acceptable carrier" refers to a diluent, adjuvant, excipient, or vehicle with which the microbe can be administered, which does not detrimentally effect the microbe.

Regulation of Nitrogen Fixation

In some cases, nitrogen fixation pathway may act as a target for genetic engineering and optimization. One trait that may be targeted for regulation by the methods described herein is nitrogen fixation. Nitrogen fertilizer is the largest operational expense on a farm and the biggest driver of higher yields in row crops like corn and wheat. Described herein are microbial products that can deliver renewable forms of nitrogen in non-leguminous crops. While some endophytes have the genetics necessary for fixing nitrogen in pure culture, the fundamental technical challenge is that wild-type endophytes of cereals and grasses stop fixing nitrogen in fertilized fields. The application of chemical fertilizers and residual nitrogen levels in field soils signal the microbe to shut down the biochemical pathway for nitrogen fixation.

Changes to the transcriptional and post-translational levels of components of the nitrogen fixation regulatory network may be beneficial to the development of a microbe capable of fixing and transferring nitrogen to corn in the presence of fertilizer. To that end, described herein is Host-Microbe Evolution (HoME) technology to precisely evolve regulatory networks and elicit novel phenotypes. Also described herein are unique, proprietary libraries of nitrogen-fixing endophytes isolated from corn, paired with extensive omics data surrounding the interaction of microbes and host plant under different environmental conditions like nitrogen stress and excess. In some embodiments, this technology enables precision evolution of the genetic regulatory network of endophytes to produce microbes that actively fix nitrogen even in the presence of fertilizer in the field. Also described herein are evaluations of the technical potential of evolving microbes that colonize corn root tissues and produce nitrogen for fertilized plants and evaluations of the compatibility of endophytes with standard formulation practices and diverse soils to determine feasibility of integrating the microbes into modern nitrogen management strategies.

In order to utilize elemental nitrogen (N) for chemical synthesis, life forms combine nitrogen gas ($N_2$) available in the atmosphere with hydrogen in a process known as nitrogen fixation. Because of the energy-intensive nature of biological nitrogen fixation, diazotrophs (bacteria and archaea that fix atmospheric nitrogen gas) have evolved sophisticated and tight regulation of the nif gene cluster in response to environmental oxygen and available nitrogen. Nif genes encode enzymes involved in nitrogen fixation (such as the nitrogenase complex) and proteins that regulate nitrogen fixation. Shamseldin (2013. Global J. Biotechnol. Biochem. 8(4):84-94) discloses detailed descriptions of nif genes and their products, and is incorporated herein by reference. Described herein are methods of producing a plant with an improved trait comprising isolating bacteria from a first plant, introducing a genetic variation into a gene of the isolated bacteria to increase nitrogen fixation, exposing a second plant to the variant bacteria, isolating bacteria from the second plant having an improved trait relative to the first plant, and repeating the steps with bacteria isolated from the second plant.

In Proteobacteria, regulation of nitrogen fixation centers around the am-dependent enhancer-binding protein NifA, the positive transcriptional regulator of the nif cluster. Intracellular levels of active NifA are controlled by two key factors: transcription of the nifLA operon, and inhibition of NifA activity by protein-protein interaction with NifL. Both of these processes are responsive to intraceullar glutamine levels via the PII protein signaling cascade. This cascade is mediated by GlnD, which directly senses glutamine and catalyzes the uridylylation or deuridylylation of two PII regulatory proteins—GlnB and GlnK—in response the absence or presence, respectively, of bound glutamine. Under conditions of nitrogen excess, unmodified GlnB signals the deactivation of the nifLA promoter. However, under conditions of nitrogen limitation, GlnB is post-translationally modified, which inhibits its activity and leads to transcription of the nifLA operon. In this way, nifLA transcription is tightly controlled in response to environmental nitrogen via the PII protein signaling cascade. On the post-translational level of NifA regulation, GlnK inhibits the NifL/NifA interaction in a matter dependent on the overall level of free GlnK within the cell.

NifA is transcribed from the nifLA operon, whose promoter is activated by phosphorylated NtrC, another $\sigma_{54}$-dependent regulator. The phosphorylation state of NtrC is mediated by the histidine kinase NtrB, which interacts with deuridylylated GlnB but not uridylylated GlnB. Under conditions of nitrogen excess, a high intracellular level of glutamine leads to deuridylylation of GlnB, which then interacts with NtrB to deactivate its phosphorylation activity and activate its phosphatase activity, resulting in dephosphorylation of NtrC and the deactivation of the nifLA promoter. However, under conditions of nitrogen limitation, a low level of intracellular glutamine results in uridylylation of GlnB, which inhibits its interaction with NtrB and allows the phosphorylation of NtrC and transcription of the nifLA operon. In this way, nifLA expression is tightly controlled in response to environmental nitrogen via the PII protein signaling cascade. nifA, ntrB, ntrC, and glnB, are all genes that can be mutated in the methods described herein. These processes may also be responsive to intracellular or extracellular levels of ammonia, urea or nitrates.

The activity of NifA is also regulated post-translationally in response to environmental nitrogen, most typically through NifL-mediated inhibition of NifA activity. In general, the interaction of NifL and NifA is influenced by the PII protein signaling cascade via GlnK, although the nature of the interactions between GlnK and NifL/NifA varies significantly between diazotrophs. In *Klebsiella pneumoniae*, both forms of GlnK inhibit the NifL/NifA interaction, and the interaction between GlnK and NifL/NifA is determined by the overall level of free GlnK within the cell. Under nitrogen-excess conditions, deuridylylated GlnK interacts with the ammonium transporter AmtB, which serves to both block ammonium uptake by AmtB and sequester GlnK to the membrane, allowing inhibition of NifA by NifL. On the other hand, in *Azotobacter vinelandii*, interaction with deuridylylated GlnK is required for the NifL/NifA interaction and NifA inhibition, while uridylylation of GlnK inhibits its interaction with NifL. In diazotrophs lacking the nifL gene, there is evidence that NifA activity is inhibited directly by interaction with the deuridylylated forms of both GlnK and GlnB under nitrogen-excess conditions. In some bacteria the Nif cluster may be regulated by glnR, and further in some cases this may comprise negative regulation. Regardless of the mechanism, post-translational inhibition of NifA is an important regulator of the nif cluster in most known diazotrophs. Additionally, nifL, amtB, glnK, and glnR are genes that can be mutated in the methods described herein.

In addition to regulating the transcription of the nif gene cluster, many diazotrophs have evolved a mechanism for the direct post-translational modification and inhibition of the nitrogenase enzyme itself, known as nitrogenase shutoff. This is mediated by ADP-ribosylation of the Fe protein (NifH) under nitrogen-excess conditions, which disrupts its interaction with the MoFe protein complex (NifDK) and abolishes nitrogenase activity. DraT catalyzes the ADP-ribosylation of the Fe protein and shutoff of nitrogenase, while DraG catalyzes the removal of ADP-ribose and reactivation of nitrogenase. As with nifLA transcription and NifA inhibition, nitrogenase shutoff is also regulated via the PII protein signaling cascade. Under nitrogen-excess conditions, deuridylylated GlnB interacts with and activates DraT, while deuridylylated GlnK interacts with both DraG and AmtB to form a complex, sequestering DraG to the membrane. Under nitrogen-limiting conditions, the uridylylated forms of GlnB and GlnK do not interact with DraT and DraG, respectively, leading to the inactivation of DraT and the diffusion of DraG to the Fe protein, where it removes the ADP-ribose and activates nitrogenase. The methods described herein also contemplate introducing genetic variation into the nifH, nifD, nifK, and draT genes.

Although some endophytes have the ability to fix nitrogen in vitro, often the genetics are silenced in the field by high levels of exogenous chemical fertilizers. One can decouple the sensing of exogenous nitrogen from expression of the nitrogenase enzyme to facilitate field-based nitrogen fixation. Improving the integral of nitrogenase activity across time further serves to augment the production of nitrogen for utilization by the crop. Specific targets for genetic variation to facilitate field-based nitrogen fixation using the methods described herein include one or more genes selected from the group consisting of nifA, nifL, ntrB, ntrC, glnA, glnB, glnK, draT, amtB, glnD, glnE, nifJ, nifH, nifD, nifK, nifY, nifE, nifN, nifU, nifS, nifV, nifW, nifZ, nifM, nifF, nifB, and nifQ.

An additional target for genetic variation to facilitate field-based nitrogen fixation using the methods described herein is the NifA protein. The NifA protein is typically the activator for expression of nitrogen fixation genes. Increasing the production of NifA (either constitutively or during high ammonia condition) circumvents the native ammonia-sensing pathway. In addition, reducing the production of NifL proteins, a known inhibitor of NifA, also leads to an increased level of freely active NifA. In addition, increasing the transcription level of the nifAL operon (either constitutively or during high ammonia condition) also leads to an overall higher level of NifA proteins. Elevated level of nifAL expression is achieved by altering the promoter itself or by reducing the expression of NtrB (part of ntrB and ntrC signaling cascade that originally would result in the shutoff of nifAL operon during high nitrogen condition). High level of NifA achieved by these or any other methods described herein increases the nitrogen fixation activity of the endophytes.

Another target for genetic variation to facilitate field-based nitrogen fixation using the methods described herein is the GlnD/GlnB/GlnK PII signaling cascade. The intracellular glutamine level is sensed through the GlnD/GlnB/GlnK PII signaling cascade. Active site mutations in GlnD that abolish the uridylyl-removing activity of GlnD disrupt the nitrogen-sensing cascade. In addition, reduction of the GlnB concentration short circuits the glutamine-sensing cascade. These mutations "trick" the cells into perceiving a nitrogen-limited state, thereby increasing the nitrogen fixation level activity. These processes may also be responsive to intracellular or extracellular levels of ammonia, urea or nitrates.

The amtB protein is also a target for genetic variation to facilitate field-based nitrogen fixation using the methods described herein. Ammonia uptake from the environment can be reduced by decreasing the expression level of amtB protein. Without intracellular ammonia, the endophyte is not able to sense the high level of ammonia, preventing the down-regulation of nitrogen fixation genes. Any ammonia that manages to get into the intracellular compartment is converted into glutamine. Intracellular glutamine level is the major currency of nitrogen sensing. Decreasing the intracellular glutamine level prevents the cells from sensing high ammonium levels in the environment. This effect can be achieved by increasing the expression level of glutaminase, an enzyme that converts glutamine into glutamate. In addition, intracellular glutamine can also be reduced by decreasing glutamine synthase (an enzyme that converts ammonia into glutamine). In diazotrophs, fixed ammonia is quickly assimilated into glutamine and glutamate to be used for cellular processes. Disruptions to ammonia assimilation may enable diversion of fixed nitrogen to be exported from the cell as ammonia. The fixed ammonia is predominantly assimilated into glutamine by glutamine synthetase (GS), encoded by glnA, and subsequently into glutamine by glutamine oxoglutarate aminotransferase (GOGAT). In some examples, glnS encodes a glutamine synthetase. GS is regulated post-translationally by GS adenylyl transferase (GlnE), a bi-functional enzyme encoded by glnE that catalyzes both the adenylylation and de-adenylylation of GS through activity of its adenylyl-transferase (AT) and adenylyl-removing (AR) domains, respectively. Under nitrogen limiting conditions, glnA is expressed, and GlnE's AR domain de-adynylylates GS, allowing it to be active. Under conditions of nitrogen excess, glnA expression is turned off, and GlnE's AT domain is activated allosterically by glutamine, causing the adenylylation and deactivation of GS.

Furthermore, the draT gene may also be a target for genetic variation to facilitate field-based nitrogen fixation using the methods described herein. Once nitrogen fixing enzymes are produced by the cell, nitrogenase shut-off represents another level in which cell downregulates fixation activity in high nitrogen condition. This shut-off could be removed by decreasing the expression level of DraT.

Methods for imparting new microbial phenotypes can be performed at the transcriptional, translational, and post-translational levels. The transcriptional level includes changes at the promoter (such as changing sigma factor affinity or binding sites for transcription factors, including deletion of all or a portion of the promoter) or changing transcription terminators and attenuators. The translational level includes changes at the ribosome binding sites and changing mRNA degradation signals. The post-translational level includes mutating an enzyme's active site and changing protein-protein interactions. These changes can be achieved in a multitude of ways. Reduction of expression level (or complete abolishment) can be achieved by swapping the native ribosome binding site (RBS) or promoter with another with lower strength/efficiency. ATG start sites can be swapped to a GTG, TTG, or CTG start codon, which results in reduction in translational activity of the coding region. Complete abolishment of expression can be done by knocking out (deleting) the coding region of a gene. Frame-shifting the open reading frame (ORF) likely will result in a premature stop codon along the ORF, thereby creating a non-functional truncated product. Insertion of in-frame stop codons will also similarly create a non-functional truncated product. Addition of a degradation tag at the N or C terminal can also be done to reduce the effective concentration of a particular gene.

Conversely, expression level of the genes described herein can be achieved by using a stronger promoter. To ensure high promoter activity during high nitrogen level condition (or any other condition), a transcription profile of the whole genome in a high nitrogen level condition could be obtained and active promoters with a desired transcription level can be chosen from that dataset to replace the weak promoter. Weak start codons can be swapped out with an ATG start codon for better translation initiation efficiency. Weak ribosomal binding sites (RBS) can also be swapped out with a different RBS with higher translation initiation efficiency. In addition, site specific mutagenesis can also be performed to alter the activity of an enzyme.

Increasing the level of nitrogen fixation that occurs in a plant can lead to a reduction in the amount of chemical fertilizer needed for crop production and reduce greenhouse gas emissions (e.g., nitrous oxide).

Generation of Bacterial Populations

Isolation of Bacteria

Microbes useful in methods and compositions disclosed herein can be obtained by extracting microbes from surfaces or tissues of native plants. Microbes can be obtained by grinding seeds to isolate microbes. Microbes can be obtained by planting seeds in diverse soil samples and recovering microbes from tissues. Additionally, microbes can be obtained by inoculating plants with exogenous microbes and determining which microbes appear in plant tissues. Non-limiting examples of plant tissues may include a seed, seedling, leaf, cutting, plant, bulb, or tuber.

A method of obtaining microbes may be through the isolation of bacteria from soils. Bacteria may be collected from various soil types. In some example, the soil can be characterized by traits such as high or low fertility, levels of moisture, levels of minerals, and various cropping practices.

For example, the soil may be involved in a crop rotation where different crops are planted in the same soil in successive planting seasons. The sequential growth of different crops on the same soil may prevent disproportionate depletion of certain minerals. The bacteria can be isolated from the plants growing in the selected soils. The seedling plants can be harvested at 2-6 weeks of growth. For example, at least 400 isolates can be collected in a round of harvest. Soil and plant types reveal the plant phenotype as well as the conditions, which allow for the downstream enrichment of certain phenotypes.

Microbes can be isolated from plant tissues to assess microbial traits. The parameters for processing tissue samples may be varied to isolate different types of associative microbes, such as rhizopheric bacteria, epiphytes, or endophytes. The isolates can be cultured in nitrogen-free media to enrich for bacteria that perform nitrogen fixation. Alternatively, microbes can be obtained from global strain banks.

In planta analytics are performed to assess microbial traits. In some embodiments, the plant tissue can be processed for screening by high throughput processing for DNA and RNA. Additionally, non-invasive measurements can be used to assess plant characteristics, such as colonization. Measurements on wild microbes can be obtained on a plant-by-plant basis. Measurements on wild microbes can also be obtained in the field using medium throughput methods. Measurements can be done successively over time. Model plant system can be used including, but not limited to, *Setaria.*

Microbes in a plant system can be screened via transcriptional profiling of a microbe in a plant system. Examples of screening through transcriptional profiling are using methods of quantitative polymerase chain reaction (qPCR), molecular barcodes for transcript detection, Next Generation Sequencing, and microbe tagging with fluorescent markers. Impact factors can be measured to assess colonization in the greenhouse including, but not limited to, microbiome, abiotic factors, soil conditions, oxygen, moisture, temperature, inoculum conditions, and root localization. Nitrogen fixation can be assessed in bacteria by measuring 15N gas/fertilizer (dilution) with IRMS or NanoSIMS as described herein NanoSIMS is high-resolution secondary ion mass spectrometry. The NanoSIMS technique is a way to investigate chemical activity from biological samples. The catalysis of reduction of oxidation reactions that drive the metabolism of microorganisms can be investigated at the cellular, subcellular, molecular and elemental level. NanoSIMS can provide high spatial resolution of greater than 0.1 μm. NanoSIMS can detect the use of isotope tracers such as $^{13}C$, $^{15}N$, and $^{18}O$. Therefore, NanoSIMS can be used to the chemical activity nitrogen in the cell.

Automated greenhouses can be used for planta analytics. Plant metrics in response to microbial exposure include, but are not limited to, biomass, chloroplast analysis, CCD camera, volumetric tomography measurements.

One way of enriching a microbe population is according to genotype. For example, a polymerase chain reaction (PCR) assay with a targeted primer or specific primer. Primers designed for the nifH gene can be used to identity diazotrophs because diazotrophs express the nifH gene in the process of nitrogen fixation. A microbial population can also be enriched via single-cell culture-independent approaches and chemotaxis-guided isolation approaches. Alternatively, targeted isolation of microbes can be performed by culturing the microbes on selection media. Premeditated approaches to enriching microbial populations for desired traits can be guided by bioinformatics data and are described herein.

Enriching for Microbes with Nitrogen Fixation Capabilities Using Bioinformatics

Bioinformatic tools can be used to identify and isolate plant growth promoting rhizobacteria (PGPRs), which are selected based on their ability to perform nitrogen fixation. Microbes with high nitrogen fixing ability can promote favorable traits in plants. Bioinformatic modes of analysis for the identification of PGPRs include, but are not limited to, genomics, metagenomics, targeted isolation, gene sequencing, transcriptome sequencing, and modeling.

Genomics analysis can be used to identify PGPRs and confirm the presence of mutations with methods of Next Generation Sequencing as described herein and microbe version control.

Metagenomics can be used to identify and isolate PGPR using a prediction algorithm for colonization. Metadata can also be used to identify the presence of an engineered strain in environmental and greenhouse samples.

Transcriptomic sequencing can be used to predict genotypes leading to PGPR phenotypes. Additionally, transcriptomic data is used to identify promoters for altering gene expression. Transcriptomic data can be analyzed in conjunction with the Whole Genome Sequence (WGS) to generate models of metabolism and gene regulatory networks.

Domestication of Microbes

Microbes isolated from nature can undergo a domestication process wherein the microbes are converted to a form that is genetically trackable and identifiable. One way to domesticate a microbe is to engineer it with antibiotic resistance. The process of engineering antibiotic resistance can begin by determining the antibiotic sensitivity in the wild type microbial strain. If the bacteria are sensitive to the antibiotic, then the antibiotic can be a good candidate for antibiotic resistance engineering. Subsequently, an antibiotic resistant gene or a counterselectable suicide vector can be incorporated into the genome of a microbe using recombineering methods. A counterselectable suicide vector may consist of a deletion of the gene of interest, a selectable marker, and the counterselectable marker sacB. Counterselection can be used to exchange native microbial DNA sequences with antibiotic resistant genes. A medium throughput method can be used to evaluate multiple microbes simultaneously allowing for parallel domestication. Alternative methods of domestication include the use of homing nucleases to prevent the suicide vector sequences from looping out or from obtaining intervening vector sequences.

DNA vectors can be introduced into bacteria via several methods including electroporation and chemical transformations. A standard library of vectors can be used for transformations. An example of a method of gene editing is CRISPR preceded by Cas9 testing to ensure activity of Cas9 in the microbes.

Non-Transgenic Engineering of Microbes

A microbial population with favorable traits can be obtained via directed evolution. Direct evolution is an approach wherein the process of natural selection is mimicked to evolve proteins or nucleic acids towards a user-defined goal. An example of direct evolution is when random mutations are introduced into a microbial population, the microbes with the most favorable traits are selected, and the growth of the selected microbes is continued. The most favorable traits in growth promoting rhizobacteria (PGPRs)

may be in nitrogen fixation. The method of directed evolution may be iterative and adaptive based on the selection process after each iteration.

Plant growth promoting rhizobacteria (PGPRs) with high capability of nitrogen fixation can be generated. The evolution of PGPRs can be carried out via the introduction of genetic variation. Genetic variation can be introduced via polymerase chain reaction mutagenesis, oligonucleotide-directed mutagenesis, saturation mutagenesis, fragment shuffling mutagenesis, homologous recombination, CRISPR/Cas9 systems, chemical mutagenesis, and combinations thereof. These approaches can introduce random mutations into the microbial population. For example, mutants can be generated using synthetic DNA or RNA via oligonucleotide-directed mutagenesis. Mutants can be generated using tools contained on plasmids, which are later cured. Genes of interest can be identified using libraries from other species with improved traits including, but not limited to, improved PGPR properties, improved colonization of cereals, increased oxygen sensitivity, increased nitrogen fixation, and increased ammonia excretion. Intrageneric genes can be designed based on these libraries using software such as Geneious or Platypus design software. Mutations can be designed with the aid of machine learning. Mutations can be designed with the aid of a metabolic model. Automated design of the mutation can be done using a la Platypus and will guide RNAs for Cas-directed mutagenesis.

The intra-generic genes can be transferred into the host microbe. Additionally, reporter systems can also be transferred to the microbe. The reporter systems characterize promoters, determine the transformation success, screen mutants, and act as negative screening tools.

The microbes carrying the mutation can be cultured via serial passaging. A microbial colony contains a single variant of the microbe. Microbial colonies are screened with the aid of an automated colony picker and liquid handler. Mutants with gene duplication and increased copy number express a higher genotype of the desired trait.

Selection of Plant Growth Promoting Microbess Based on Nitrogen Fixation

The microbial colonies can be screened using various assays to assess nitrogen fixation. One way to measure nitrogen fixation is via a single fermentative assay, which measures nitrogen excretion. An alternative method is the acetylene reduction assay (ARA) with in-line sampling over time. ARA can be performed in high throughput plates of microtube arrays. ARA can be performed with live plants and plant tissues. The media formulation and media oxygen concentration can be varied in ARA assays. Another method of screening microbial variants is by using biosensors. The use of NanoSIMS and Raman microspectroscopy can be used to investigate the activity of the microbes. In some cases, bacteria can also be cultured and expanded using methods of fermentation in bioreactors. The bioreactors are designed to improve robustness of bacteria growth and to decrease the sensitivity of bacteria to oxygen. Medium to high TP plate-based microfermentors are used to evaluate oxygen sensitivity, nutritional needs, nitrogen fixation, and nitrogen excretion. The bacteria can also be co-cultured with competitive or beneficial microbes to elucidate cryptic pathways. Flow cytometry can be used to screen for bacteria that produce high levels of nitrogen using chemical, colorimetric, or fluorescent indicators. The bacteria may be cultured in the presence or absence of a nitrogen source. For example, the bacteria may be cultured with glutamine, ammonia, urea or nitrates.

Guided Microbial Remodeling—An Overview

Guided microbial remodeling is a method to systematically identify and improve the role of species within the crop microbiome. In some aspects, and according to a particular methodology of grouping/categorization, the method comprises three steps: 1) selection of candidate species by mapping plant-microbe interactions and predicting regulatory networks linked to a particular phenotype, 2) pragmatic and predictable improvement of microbial phenotypes through intra-species crossing of regulatory networks and gene clusters within a microbe's genome, and 3) screening and selection of new microbial genotypes that produce desired crop phenotypes.

To systematically assess the improvement of strains, a model is created that links colonization dynamics of the microbial community to genetic activity by key species. The model is used to predict genetic targets for non-intergeneric genetic remodeling (i.e. engineering the genetic architecture of the microbe in a non-transgentic fashion). See, FIG. 1A for a graphical representation of an embodiment of the process.

As illustrated in FIG. 1A, rational improvement of the crop microbiome may be used to increase soil biodiversity, tune impact of keystone species, and/or alter timing and expression of important metabolic pathways.

To this end, the inventors have developed a platform to identify and improve the role of strains within the crop microbiome. In some aspects, the inventors call this process microbial breeding.

The aforementioned "Guided Microbial Remodeling" process will be further elaborated upon in the Examples, for instance in Example 1, entitled: "Guided Microbial Remodeling—A Platform for the Rational Improvement of Microbial Species for Agriculture."

Serial Passage

Production of bacteria to improve plant traits (e.g., nitrogen fixation) can be achieved through serial passage. The production of this bacteria can be done by selecting plants, which have a particular improved trait that is influenced by the microbial flora, in addition to identifying bacteria and/or compositions that are capable of imparting one or more improved traits to one or more plants. One method of producing a bacteria to improve a plant trait includes the steps of: (a) isolating bacteria from tissue or soil of a first plant; (b) introducing a genetic variation into one or more of the bacteria to produce one or more variant bacteria; (c) exposing a plurality of plants to the variant bacteria; (d) isolating bacteria from tissue or soil of one of the plurality of plants, wherein the plant from which the bacteria is isolated has an improved trait relative to other plants in the plurality of plants; and (e) repeating steps (b) to (d) with bacteria isolated from the plant with an improved trait (step (d)). Steps (b) to (d) can be repeated any number of times (e.g., once, twice, three times, four times, five times, ten times, or more) until the improved trait in a plant reaches a desired level. Further, the plurality of plants can be more than two plants, such as 10 to 20 plants, or 20 or more, 50 or more, 100 or more, 300 or more, 500 or more, or 1000 or more plants.

In addition to obtaining a plant with an improved trait, a bacterial population comprising bacteria comprising one or more genetic variations introduced into one or more genes (e.g., genes regulating nitrogen fixation) is obtained. By repeating the steps described above, a population of bacteria can be obtained that include the most appropriate members of the population that correlate with a plant trait of interest. The bacteria in this population can be identified and their beneficial properties determined, such as by genetic and/or phenotypic analysis. Genetic analysis may occur of isolated bacteria in step (a). Phenotypic and/or genotypic information may be obtained using techniques including: high through-put screening of chemical components of plant origin, sequencing techniques including high throughput sequencing of genetic material, differential display techniques (including DDRT-PCR, and DD-PCR), nucleic acid microarray techniques, RNA-sequencing (Whole Transcriptome Shotgun Sequencing), and qRT-PCR (quantitative real time PCR). Information gained can be used to obtain community profiling information on the identity and activity of bacteria present, such as phylogenetic analysis or microarray-based screening of nucleic acids coding for components of rRNA operons or other taxonomically informative loci. Examples of taxonomically informative loci include 16S rRNA gene, 23S rRNA gene, 5S rRNA gene, 5.8S rRNA gene, 12S rRNA gene, 18S rRNA gene, 28S rRNA gene, gyrB gene, rpoB gene, fusA gene, recA gene, coxl gene, nifD gene. Example processes of taxonomic profiling to determine taxa present in a population are described in US20140155283. Bacterial identification may comprise characterizing activity of one or more genes or one or more signaling pathways, such as genes associated with the nitrogen fixation pathway. Synergistic interactions (where two components, by virtue of their combination, increase a desired effect by more than an additive amount) between different bacterial species may also be present in the bacterial populations.

Genetic Variation—Locations and Sources of Genomic Alteration

The genetic variation may be a gene selected from the group consisting of: nifA, nifL, ntrB, ntrC, glnA, glnB, glnK, draT, amtB, glnD, glnE, nifJ, nifH, nifD, nifK, nifY, nifE, nifN, nifU, nifS, nifV, nifW, nifZ, nifM, nifF, nifB, and nifQ. The genetic variation may be a variation in a gene encoding a protein with functionality selected from the group consisting of: glutamine synthetase, glutaminase, glutamine synthetase adenylyltransferase, transcriptional activator, anti-transcriptional activator, pyruvate flavodoxin oxidoreductase, flavodoxin, or NAD+-dinitrogen-reductase aDP-D-ribosyltransferase. The genetic variation may be a mutation that results in one or more of: increased expression or activity of NifA or glutaminase; decreased expression or activity of NifL, NtrB, glutamine synthetase, GlnB, GlnK, DraT, AmtB; decreased adenylyl-removing activity of GlnE; or decreased uridylyl-removing activity of GlnD. Introducing a genetic variation may comprise insertion and/or deletion of one or more nucleotides at a target site, such as 1, 2, 3, 4, 5, 10, 25, 50, 100, 250, 500, or more nucleotides. The genetic variation introduced into one or more bacteria of the methods disclosed herein may be a knock-out mutation (e.g. deletion of a promoter, insertion or deletion to produce a premature stop codon, deletion of an entire gene), or it may be elimination or abolishment of activity of a protein domain (e.g. point mutation affecting an active site, or deletion of a portion of a gene encoding the relevant portion of the protein product), or it may alter or abolish a regulatory sequence of a target gene. One or more regulatory sequences may also be inserted, including heterologous regulatory sequences and regulatory sequences found within a genome of a bacterial species or genus corresponding to the bacteria into which the genetic variation is introduced. Moreover, regulatory sequences may be selected based on the expression level of a gene in a bacterial culture or within a plant tissue. The genetic variation may be a pre-determined genetic variation that is specifically introduced to a target site. The genetic variation may be a random mutation within the target site. The genetic variation may be an insertion or deletion of one or more nucleotides. In some cases, a plurality of different genetic variations (e.g. 2, 3, 4, 5, 10, or more) are introduced into one or more of the isolated bacteria before exposing the bacteria to plants for assessing trait improvement. The plurality of genetic variations can be any of the above types, the same or different types, and in any combination. In some cases, a plurality of different genetic variations are introduced serially, introducing a first genetic variation after a first isolation step, a second genetic variation after a second isolation step, and so forth so as to accumulate a plurality of genetic variations in bacteria imparting progressively improved traits on the associated plants.

Genetic Variation—Methods of Introducing Genomic Alteration

In general, the term "genetic variation" refers to any change introduced into a polynucleotide sequence relative to a reference polynucleotide, such as a reference genome or portion thereof, or reference gene or portion thereof. A genetic variation may be referred to as a "mutation," and a sequence or organism comprising a genetic variation may be referred to as a "genetic variant" or "mutant". Genetic variations can have any number of effects, such as the increase or decrease of some biological activity, including gene expression, metabolism, and cell signaling. Genetic variations can be specifically introduced to a target site, or introduced randomly. A variety of molecular tools and methods are available for introducing genetic variation. For example, genetic variation can be introduced via polymerase chain reaction mutagenesis, oligonucleotide-directed mutagenesis, saturation mutagenesis, fragment shuffling mutagenesis, homologous recombination, recombineering, lambda red mediated recombination, CRISPR/Cas9 systems, chemical mutagenesis, and combinations thereof. Chemical methods of introducing genetic variation include exposure of DNA to a chemical mutagen, e.g., ethyl methanesulfonate (EMS), methyl methanesulfonate (MMS), N-nitrosourea (EN U), N-methyl-N-nitro-N'-nitrosoguanidine, 4-nitroquinoline N-oxide, diethylsulfate, benzopyrene, cyclophosphamide, bleomycin, triethylmelamine, acrylamide monomer, nitrogen mustard, vincristine, diepoxyalkanes (for example, diepoxybutane), ICR-170, formaldehyde, procarbazine hydrochloride, ethylene oxide, dimethylnitrosamine, 7,12 dimethylbenz(a)anthracene, chlorambucil, hexamethylphosphoramide, bisulfan, and the like. Radiation mutation-inducing agents include ultraviolet radiation, γ-irradiation, X-rays, and fast neutron bombardment. Genetic variation can also be introduced into a nucleic acid using, e.g., trimethylpsoralen with ultraviolet light. Random or targeted insertion of a mobile DNA element, e.g., a transposable element, is another suitable method for generating genetic variation. Genetic variations can be introduced into a nucleic acid during amplification in a cell-free in vitro system, e.g., using a polymerase chain reaction (PCR) technique such as error-prone PCR. Genetic variations can be introduced into a nucleic acid in vitro using DNA shuffling techniques (e.g., exon shuffling, domain swapping, and the like). Genetic variations can also be introduced into a nucleic acid as a result of a deficiency in a DNA repair enzyme in a cell, e.g., the presence in a cell of a mutant gene encoding a mutant DNA repair enzyme is expected to generate a high frequency of mutations (i.e., about 1 mutation/100 genes-1 mutation/10,000 genes) in the genome of the cell. Examples of genes encoding DNA repair enzymes include but are not limited to Mut H, Mut S, Mut L, and Mut U, and the homologs thereof in other species (e.g., MSH 1

6, PMS 1 2, MLH 1, GTBP, ERCC-1, and the like). Example descriptions of various methods for introducing genetic variations are provided in e.g., Stemple (2004) Nature 5:1-7; Chiang et al. (1993) PCR Methods Appl 2(3): 210-217; Stemmer (1994) Proc. Natl. Acad. Sci. USA 91:10747-10751; and U.S. Pat. Nos. 6,033,861, and 6,773,900.

Genetic variations introduced into microbes may be classified as transgenic, cisgenic, intragenomic, intrageneric, intergeneric, synthetic, evolved, rearranged, or SNPs.

Genetic variation may be introduced into numerous metabolic pathways within microbes to elicit improvements in the traits described above. Representative pathways include sulfur uptake pathways, glycogen biosynthesis, the glutamine regulation pathway, the molybdenum uptake pathway, the nitrogen fixation pathway, ammonia assimilation, ammonia excretion or secretion,nNitrogen uptake, glutamine biosynthesis, annamox, phosphate solubilization, organic acid transport, organic acid production, agglutinins production, reactive oxygen radical scavenging genes, Indole Acetic Acid biosynthesis, trehalose biosynthesis, plant cell wall degrading enzymes or pathways, root attachment genes, exopolysaccharide secretion, glutamate synthase pathway, iron uptake pathways, siderophore pathway, chitinase pathway, ACC deaminase, glutathione biosynthesis, phosphorous signaling genes, quorum quenching pathway, cytochrome pathways, hemoglobin pathway, bacterial hemoglobin-like pathway, small RNA rsmZ, rhizobitoxine biosynthesis, lapA adhesion protein, AHL quorum sensing pathway, phenazine biosynthesis, cyclic lipopeptide biosynthesis, and antibiotic production.

CRISPR/Cas9 (Clustered regularly interspaced short palindromic repeats)/CRISPR-associated (Cas) systems can be used to introduce desired mutations. CRISPR/Cas9 provide bacteria and archaea with adaptive immunity against viruses and plasmids by using CRISPR RNAs (crRNAs) to guide the silencing of invading nucleic acids. The Cas9 protein (or functional equivalent and/or variant thereof, i.e., Cas9-like protein) naturally contains DNA endonuclease activity that depends on the association of the protein with two naturally occurring or synthetic RNA molecules called crRNA and tracrRNA (also called guide RNAs). In some cases, the two molecules are covalently link to form a single molecule (also called a single guide RNA ("sgRNA"). Thus, the Cas9 or Cas9-like protein associates with a DNA-targeting RNA (which term encompasses both the two-molecule guide RNA configuration and the single-molecule guide RNA configuration), which activates the Cas9 or Cas9-like protein and guides the protein to a target nucleic acid sequence. If the Cas9 or Cas9-like protein retains its natural enzymatic function, it will cleave target DNA to create a double-stranded break, which can lead to genome alteration (i.e., editing: deletion, insertion (when a donor polynucleotide is present), replacement, etc.), thereby altering gene expression. Some variants of Cas9 (which variants are encompassed by the term Cas9-like) have been altered such that they have a decreased DNA cleaving activity (in some cases, they cleave a single strand instead of both strands of the target DNA, while in other cases, they have severely reduced to no DNA cleavage activity). Further exemplary descriptions of CRISPR systems for introducing genetic variation can be found in, e.g. U.S. Pat. No. 8,795,965.

As a cyclic amplification technique, polymerase chain reaction (PCR) mutagenesis uses mutagenic primers to introduce desired mutations. PCR is performed by cycles of denaturation, annealing, and extension. After amplification by PCR, selection of mutated DNA and removal of parental plasmid DNA can be accomplished by: 1) replacement of dCTP by hydroxymethylated-dCTP during PCR, followed by digestion with restriction enzymes to remove non-hydroxymethylated parent DNA only; 2) simultaneous mutagenesis of both an antibiotic resistance gene and the studied gene changing the plasmid to a different antibiotic resistance, the new antibiotic resistance facilitating the selection of the desired mutation thereafter; 3) after introducing a desired mutation, digestion of the parent methylated template DNA by restriction enzyme Dpnl which cleaves only methylated DNA, by which the mutagenized unmethylated chains are recovered; or 4) circularization of the mutated PCR products in an additional ligation reaction to increase the transformation efficiency of mutated DNA. Further description of exemplary methods can be found in e.g. U.S. Pat. Nos. 7,132,265, 6,713,285, 6,673,610, 6,391,548, 5,789,166, 5,780,270, 5,354,670, 5,071,743, and US20100267147.

Oligonucleotide-directed mutagenesis, also called site-directed mutagenesis, typically utilizes a synthetic DNA primer. This synthetic primer contains the desired mutation and is complementary to the template DNA around the mutation site so that it can hybridize with the DNA in the gene of interest. The mutation may be a single base change (a point mutation), multiple base changes, deletion, or insertion, or a combination of these. The single-strand primer is then extended using a DNA polymerase, which copies the rest of the gene. The gene thus copied contains the mutated site, and may then be introduced into a host cell as a vector and cloned. Finally, mutants can be selected by DNA sequencing to check that they contain the desired mutation.

Genetic variations can be introduced using error-prone PCR. In this technique the gene of interest is amplified using a DNA polymerase under conditions that are deficient in the fidelity of replication of sequence. The result is that the amplification products contain at least one error in the sequence. When a gene is amplified and the resulting product(s) of the reaction contain one or more alterations in sequence when compared to the template molecule, the resulting products are mutagenized as compared to the template. Another means of introducing random mutations is exposing cells to a chemical mutagen, such as nitrosoguanidine or ethyl methanesulfonate (Nestmann, Mutat Res 1975 June; 28(3):323-30), and the vector containing the gene is then isolated from the host.

Saturation mutagenesis is another form of random mutagenesis, in which one tries to generate all or nearly all possible mutations at a specific site, or narrow region of a gene. In a general sense, saturation mutagenesis is comprised of mutagenizing a complete set of mutagenic cassettes (wherein each cassette is, for example, 1-500 bases in length) in defined polynucleotide sequence to be mutagenized (wherein the sequence to be mutagenized is, for example, from 15 to 100, 000 bases in length). Therefore, a group of mutations (e.g. ranging from 1 to 100 mutations) is introduced into each cassette to be mutagenized. A grouping of mutations to be introduced into one cassette can be different or the same from a second grouping of mutations to be introduced into a second cassette during the application of one round of saturation mutagenesis. Such groupings are exemplified by deletions, additions, groupings of particular codons, and groupings of particular nucleotide cassettes.

Fragment shuffling mutagenesis, also called DNA shuffling, is a way to rapidly propagate beneficial mutations. In an example of a shuffling process, DNAse is used to fragment a set of parent genes into pieces of e.g. about 50-100 bp in length. This is then followed by a polymerase chain reaction (PCR) without primers—DNA fragments with sufficient overlapping homologous sequence will anneal to each other and are then be extended by DNA polymerase. Several rounds of this PCR extension are allowed to occur, after some of the DNA molecules reach the size of the parental genes. These genes can then be amplified with another PCR, this time with the addition of primers that are designed to complement the ends of the strands. The primers may have additional sequences added to their 5' ends, such as sequences for restriction enzyme recognition sites needed for ligation into a cloning vector. Further examples of shuffling techniques are provided in US20050266541.

Homologous recombination mutagenesis involves recombination between an exogenous DNA fragment and the targeted polynucleotide sequence. After a double-stranded break occurs, sections of DNA around the 5' ends of the break are cut away in a process called resection. In the strand invasion step that follows, an overhanging 3' end of the broken DNA molecule then "invades" a similar or identical DNA molecule that is not broken. The method can be used to delete a gene, remove exons, add a gene, and introduce point mutations. Homologous recombination mutagenesis can be permanent or conditional. Typically, a recombination template is also provided. A recombination template may be a component of another vector, contained in a separate vector, or provided as a separate polynucleotide. In some embodiments, a recombination template is designed to serve as a template in homologous recombination, such as within or near a target sequence nicked or cleaved by a site-specific nuclease. A template polynucleotide may be of any suitable length, such as about or more than about 10, 15, 20, 25, 50, 75, 100, 150, 200, 500, 1000, or more nucleotides in length. In some embodiments, the template polynucleotide is complementary to a portion of a polynucleotide comprising the target sequence. When optimally aligned, a template polynucleotide might overlap with one or more nucleotides of a target sequences (e.g. about or more than about 1, 5, 10, 15, 20, 25, 30, 35, 40, 45, 50, 60, 70, 80, 90, 100 or more nucleotides). In some embodiments, when a template sequence and a polynucleotide comprising a target sequence are optimally aligned, the nearest nucleotide of the template polynucleotide is within about 1, 5, 10, 15, 20, 25, 50, 75, 100, 200, 300, 400, 500, 1000, 5000, 10000, or more nucleotides from the target sequence. Non-limiting examples of site-directed nucleases useful in methods of homologous recombination include zinc finger nucleases, CRISPR nucleases, TALE nucleases, and meganuclease. For a further description of the use of such nucleases, see e.g. U.S. Pat. No. 8,795,965 and US20140301990.

Mutagens that create primarily point mutations and short deletions, insertions, transversions, and/or transitions, including chemical mutagens or radiation, may be used to create genetic variations. Mutagens include, but are not limited to, ethyl methanesulfonate, methylmethane sulfonate, N-ethyl-N-nitrosurea, triethylmelamine, N-methyl-N-nitrosourea, procarbazine, chlorambucil, cyclophosphamide, diethyl sulfate, acrylamide monomer, melphalan, nitrogen mustard, vincristine, dimethylnitrosamine, N-methyl-N'-nitro-Nitrosoguanidine, nitrosoguanidine, 2-aminopurine, 7,12 dimethyl-benz(a)anthracene, ethylene oxide, hexamethylphosphoramide, bisulfan, diepoxyalkanes (diepoxyoctane, diepoxybutane, and the like), 2-methoxy-6-chloro-9[3-(ethyl-2-chloro-ethyl)aminopropylamino]acridine dihydrochloride and formaldehyde.

Introducing genetic variation may be an incomplete process, such that some bacteria in a treated population of bacteria carry a desired mutation while others do not. In some cases, it is desirable to apply a selection pressure so as to enrich for bacteria carrying a desired genetic variation. Traditionally, selection for successful genetic variants involved selection for or against some functionality imparted or abolished by the genetic variation, such as in the case of inserting antibiotic resistance gene or abolishing a metabolic activity capable of converting a non-lethal compound into a lethal metabolite. It is also possible to apply a selection pressure based on a polynucleotide sequence itself, such that only a desired genetic variation need be introduced (e.g. without also requiring a selectable marker). In this case, the selection pressure can comprise cleaving genomes lacking the genetic variation introduced to a target site, such that selection is effectively directed against the reference sequence into which the genetic variation is sought to be introduced. Typically, cleavage occurs within 100 nucleotides of the target site (e.g. within 75, 50, 25, 10, or fewer nucleotides from the target site, including cleavage at or within the target site). Cleaving may be directed by a site-specific nuclease selected from the group consisting of a Zinc Finger nuclease, a CRISPR nuclease, a TALE nuclease (TALEN), or a meganuclease. Such a process is similar to processes for enhancing homologous recombination at a target site, except that no template for homologous recombination is provided. As a result, bacteria lacking the desired genetic variation are more likely to undergo cleavage that left unrepaired, results in cell death. Bacteria surviving selection may then be isolated for use in exposing to plants for assessing conferral of an improved trait.

A CRISPR nuclease may be used as the site-specific nuclease to direct cleavage to a target site. An improved selection of mutated microbes can be obtained by using Cas9 to kill non-mutated cells. Plants are then inoculated with the mutated microbes to re-confirm symbiosis and create evolutionary pressure to select for efficient symbionts. Microbes can then be re-isolated from plant tissues. CRISPR nuclease systems employed for selection against non-variants can employ similar elements to those described above with respect to introducing genetic variation, except that no template for homologous recombination is provided. Cleavage directed to the target site thus enhances death of affected cells.

Other options for specifically inducing cleavage at a target site are available, such as zinc finger nucleases, TALE nuclease (TALEN) systems, and meganuclease. Zinc-finger nucleases (ZFNs) are artificial DNA endonucleases generated by fusing a zinc finger DNA binding domain to a DNA cleavage domain. ZFNs can be engineered to target desired DNA sequences and this enables zinc-finger nucleases to cleave unique target sequences. When introduced into a cell, ZFNs can be used to edit target DNA in the cell (e.g., the cell's genome) by inducing double stranded breaks. Transcription activator-like effector nucleases (TALENs) are artificial DNA endonucleases generated by fusing a TAL (Transcription activator-like) effector DNA binding domain to a DNA cleavage domain. TALENS can be quickly engineered to bind practically any desired DNA sequence and when introduced into a cell, TALENs can be used to edit target DNA in the cell (e.g., the cell's genome) by inducing double strand breaks. Meganucleases (homing endonuclease) are endodeoxyribonucleases characterized by a large recognition site (double-stranded DNA sequences of 12 to 40 base pairs. Meganucleases can be used to replace, eliminate or modify sequences in a highly targeted way. By modifying their recognition sequence through protein engineering, the targeted sequence can be changed. Meganucleases can be used to modify all genome types, whether bacterial, plant or animal and are commonly grouped into four families: the LAGLIDADG family (SEQ ID NO: 1), the GIY-YIG family, the His-Cyst box family and the HNH family. Exemplary homing endonucleases include I-SceI, I-CeuI, PI-PspI, PI-Sce, I-SceIV, I-CsmI, I-PanI, I-SceII, I-PpoI, I-SceIII, I-CreI, I-TevI, I-TevII and I-TevIII.

Genetic Variation—Methods of Identification

The microbes of the present disclosure may be identified by one or more genetic modifications or alterations, which have been introduced into said microbe. One method by which said genetic modification or alteration can be identified is via reference to a SEQ ID NO that contains a portion of the microbe's genomic sequence that is sufficient to identify the genetic modification or alteration.

Further, in the case of microbes that have not had a genetic modification or alteration (e.g. a wild type, WT) introduced into their genomes, the disclosure can utilize 16S nucleic acid sequences to identify said microbes. A 16S nucleic acid sequence is an example of a "molecular marker" or "genetic marker," which refers to an indicator that is used in methods for visualizing differences in characteristics of nucleic acid sequences. Examples of other such indicators are restriction fragment length polymorphism (RFLP) markers, amplified fragment length polymorphism (AFLP) markers, single nucleotide polymorphisms (SNPs), insertion mutations, microsatellite markers (SSRs), sequence-characterized amplified regions (SCARs), cleaved amplified polymorphic sequence (CAPS) markers or isozyme markers or combinations of the markers described herein which defines a specific genetic and chromosomal location. Markers further include polynucleotide sequences encoding 16S or 18S rRNA, and internal transcribed spacer (ITS) sequences, which are sequences found between small-subunit and large-subunit rRNA genes that have proven to be especially useful in elucidating relationships or distinctions when compared against one another. Furthermore, the disclosure utilizes unique sequences found in genes of interest (e.g. nif H,D,K,L,A, glnE, amtB, etc.) to identify microbes disclosed herein.

The primary structure of major rRNA subunit 16S comprise a particular combination of conserved, variable, and hypervariable regions that evolve at different rates and enable the resolution of both very ancient lineages such as domains, and more modern lineages such as genera. The secondary structure of the 16S subunit include approximately 50 helices which result in base pairing of about 67% of the residues. These highly conserved secondary structural features are of great functional importance and can be used to ensure positional homology in multiple sequence alignments and phylogenetic analysis. Over the previous few decades, the 16S rRNA gene has become the most sequenced taxonomic marker and is the cornerstone for the current systematic classification of bacteria and archaea (Yarza et al. 2014. *Nature Rev. Micro.* 12:635-45).

Thus, in certain aspects, the disclosure provides for a sequence, which shares at least about 70%, 71%, 72%, 73%, 74%, 75%. 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to any sequence in Tables 23, 24, 30, 31, and 32.

Thus, in certain aspects, the disclosure provides for a microbe that comprises a sequence, which shares at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to SEQ ID NOs: 62-303. These sequences and their associated descriptions can be found in Tables 31 and 32.

In some aspects, the disclosure provides for a microbe that comprises a 16S nucleic acid sequence, which shares at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to SEQ ID NOs: 85, 96, 111, 121, 122, 123, 124, 136, 149, 157, 167, 261, 262, 269, 277-283. These sequences and their associated descriptions can be found in Table 32.

In some aspects, the disclosure provides for a microbe that comprises a nucleic acid sequence, which shares at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to SEQ ID NOs: 86-95, 97-110, 112-120, 125-135, 137-148, 150-156, 158-166, 168-176, 263-268, 270-274, 275, 276, 284-295. These sequences and their associated descriptions can be found in Table 32.

In some aspects, the disclosure provides for a microbe that comprises a nucleic acid sequence, which shares at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to SEQ ID NOs: 177-260, 296-303. These sequences and their associated descriptions can be found in Table 32.

In some aspects, the disclosure provides for a microbe that comprises, or primer that comprises, or probe that comprises, or non-native junction sequence that comprises, a nucleic acid sequence, which shares at least about 70%, 71%, 72%, 73%, 74%, 75%, 76%, 77%, 78%, 79%, 80%, 81%, 82%, 83%, 84%, 85%. 86%, 87%, 88%, 89%, 90%, 91%, 92%, 93%, 94%, 95%, 96%, 97%, 98%, 99%, or 100% sequence identity to SEQ ID NOs: 304-424. These sequences and their associated descriptions can be found in Table 30.

In some aspects, the disclosure provides for a microbe that comprises a non-native junction sequence that shares at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to SEQ ID NOs: 372-405. These sequences and their associated descriptions can be found in Table 30.

In some aspects, the disclosure provides for a microbe that comprises an amino acid sequence, which shares at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% sequence identity to SEQ ID NOs: 77, 78, 81, 82, or 83. These sequences and their associated descriptions can be found in Table 31.

Genetic Variation—Methods of Detection: Primers, Probes, and Assays

The present disclosure teaches primers, probes, and assays that are useful for detecting the microbes taught herein. In some aspects, the disclosure provides for methods of detecting the WT parental strains. In other aspects, the disclosure provides for methods of detecting the non-intergeneric engineered microbes derived from the WT strains. In aspects, the present disclosure provides methods of identifying non-intergeneric genetic alterations in a microbe.

In aspects, the genomic engineering methods of the present disclosure lead to the creation of non-natural nucleotide "junction" sequences in the derived non-intergeneric microbes. These non-naturally occurring nucleotide junctions can be used as a type of diagnostic that is indicative of the presence of a particular genetic alteration in a microbe taught herein.

The present techniques are able to detect these non-naturally occurring nucleotide junctions via the utilization of specialized quantitative PCR methods, including uniquely designed primers and probes. In some aspects, the probes of the disclosure bind to the non-naturally occurring nucleotide junction sequences. In some aspects, traditional PCR is utilized. In other aspects, real-time PCR is utilized. In some aspects, quantitative PCR (qPCR) is utilized.

Thus, the disclosure can cover the utilization of two common methods for the detection of PCR products in real-time: (1) non-specific fluorescent dyes that intercalate with any double-stranded DNA, and (2) sequence-specific DNA probes consisting of oligonucleotides that are labelled with a fluorescent reporter which permits detection only after hybridization of the probe with its complementary sequence. In some aspects, only the non-naturally occurring nucleotide junction will be amplified via the taught primers, and consequently can be detected via either a non-specific dye, or via the utilization of a specific hybridization probe. In other aspects, the primers of the disclosure are chosen such that the primers flank either side of a junction sequence, such that if an amplification reaction occurs, then said junction sequence is present.

Aspects of the disclosure involve non-naturally occurring nucleotide junction sequence molecules per se, along with other nucleotide molecules that are capable of binding to said non-naturally occurring nucleotide junction sequences under mild to stringent hybridization conditions. In some aspects, the nucleotide molecules that are capable of binding to said non-naturally occurring nucleotide junction sequences under mild to stringent hybridization conditions are termed "nucleotide probes."

In aspects, genomic DNA can be extracted from samples and used to quantify the presence of microbes of the disclosure by using qPCR. The primers utilized in the qPCR reaction can be primers designed by Primer Blast (https://www.ncbi.nlm.nih.gov/tools/primer-blast/) to amplify unique regions of the wild-type genome or unique regions of the engineered non-intergeneric mutant strains. The qPCR reaction can be carried out using the SYBR GreenER qPCR SuperMix Universal (Thermo Fisher P/N 11762100) kit, using only forward and reverse amplification primers; alternatively, the Kapa Probe Force kit (Kapa Biosystems P/N KK4301) can be used with amplification primers and a TaqMan probe containing a FAM dye label at the 5' end, an internal ZEN quencher, and a minor groove binder and fluorescent quencher at the 3' end (Integrated DNA Technologies).

Certain primer, probe, and non-native junction sequences are listed in Table 30. qPCR reaction efficiency can be measured using a standard curve generated from a known quantity of gDNA from the target genome. Data can be normalized to genome copies per g fresh weight using the tissue weight and extraction volume.

Quantitative polymerase chain reaction (qPCR) is a method of quantifying, in real time, the amplification of one or more nucleic acid sequences. The real time quantification of the PCR assay permits determination of the quantity of nucleic acids being generated by the PCR amplification steps by comparing the amplifying nucleic acids of interest and an appropriate control nucleic acid sequence, which may act as a calibration standard.

TaqMan probes are often utilized in qPCR assays that require an increased specificity for quantifying target nucleic acid sequences. TaqMan probes comprise a oligonucleotide probe with a fluorophore attached to the 5' end and a quencher attached to the 3' end of the probe. When the TaqMan probes remain as is with the 5' and 3' ends of the probe in close contact with each other, the quencher prevents fluorescent signal transmission from the fluorophore. TaqMan probes are designed to anneal within a nucleic acid region amplified by a specific set of primers. As the Taq polymerase extends the primer and synthesizes the nascent strand, the 5' to 3' exonuclease activity of the Taq polymerase degrades the probe that annealed to the template. This probe degradation releases the fluorophore, thus breaking the close proximity to the quencher and allowing fluorescence of the fluorophore. Fluorescence detected in the qPCR assay is directly proportional to the fluorophore released and the amount of DNA template present in the reaction.

The features of qPCR allow the practitioner to eliminate the labor-intensive post-amplification step of gel electrophoresis preparation, which is generally required for observation of the amplified products of traditional PCR assays. The benefits of qPCR over conventional PCR are considerable, and include increased speed, ease of use, reproducibility, and quantitative ability.

Improvement of Traits

Methods of the present disclosure may be employed to introduce or improve one or more of a variety of desirable traits. Examples of traits that may introduced or improved include: root biomass, root length, height, shoot length, leaf number, water use efficiency, overall biomass, yield, fruit size, grain size, photosynthesis rate, tolerance to drought, heat tolerance, salt tolerance, resistance to nematode stress, resistance to a fungal pathogen, resistance to a bacterial pathogen, resistance to a viral pathogen, level of a metabolite, and proteome expression. The desirable traits, including height, overall biomass. root and/or shoot biomass, seed germination, seedling survival, photosynthetic efficiency, transpiration rate, seed/fruit number or mass, plant grain or fruit yield, leaf chlorophyll content, photosynthetic rate, root length, or any combination thereof, can be used to measure growth, and compared with the growth rate of reference agricultural plants (e.g., plants without the improved traits) grown under identical conditions.

A preferred trait to be introduced or improved is nitrogen fixation, as described herein. In some cases, a plant resulting from the methods described herein exhibits a difference in the trait that is at least about 5% greater, for example at least about 5%, at least about 8%, at least about 10%, at least about 15%, at least about 20%, at least about 25%, at least about 30%, at least about 40%, at least about 50%, at least about 60%, at least about 75%, at least about 80%, at least about 80%, at least about 90%, or at least 100%, at least about 200%, at least about 300%, at least about 400% or greater than a reference agricultural plant grown under the same conditions in the soil. In additional examples, a plant resulting from the methods described herein exhibits a difference in the trait that is at least about 5% greater, for example at least about 5%, at least about 8%, at least about 10%, at least about 15%, at least about 20%, at least about 25%, at least about 30%, at least about 40%, at least about 50%, at least about 60%, at least about 75%, at least about 80%, at least about 80%, at least about 90%, or at least 100%, at least about 200%, at least about 300%, at least about 400% or greater than a reference agricultural plant grown under similar conditions in the soil.

The trait to be improved may be assessed under conditions including the application of one or more biotic or abiotic stressors. Examples of stressors include abiotic stresses (such as heat stress, salt stress, drought stress, cold stress, and low nutrient stress) and biotic stresses (such as nematode stress, insect herbivory stress, fungal pathogen stress, bacterial pathogen stress, and viral pathogen stress).

The trait improved by methods and compositions of the present disclosure may be nitrogen fixation, including in a plant not previously capable of nitrogen fixation. In some cases, bacteria isolated according to a method described herein produce 1% or more (e.g. 2%, 3%, 4%, 5%, 6%, 7%, 8%, 9%, 10%, 15%, 20%, or more) of a plant's nitrogen, which may represent an increase in nitrogen fixation capability of at least 2-fold (e.g. 3-fold, 4-fold, 5-fold, 6-fold, 7-fold, 8-fold, 9-fold, 10-fold, 20-fold, 50-fold, 100-fold, 1000-fold, or more) as compared to bacteria isolated from the first plant before introducing any genetic variation. In some cases, the bacteria produce 5% or more of a plant's nitrogen. The desired level of nitrogen fixation may be achieved after repeating the steps of introducing genetic variation, exposure to a plurality of plants, and isolating bacteria from plants with an improved trait one or more times (e.g. 1, 2, 3, 4, 5, 10, 15, 25, or more times). In some cases, enhanced levels of nitrogen fixation are achieved in the presence of fertilizer supplemented with glutamine, ammonia, or other chemical source of nitrogen. Methods for assessing degree of nitrogen fixation are known, examples of which are described herein.

Microbe breeding is a method to systematically identify and improve the role of species within the crop microbiome. The method comprises three steps: 1) selection of candidate species by mapping plant-microbe interactions and predicting regulatory networks linked to a particular phenotype, 2) pragmatic and predictable improvement of microbial phenotypes through intra-species crossing of regulatory networks and gene clusters, and 3) screening and selection of new microbial genotypes that produce desired crop phenotypes. To systematically assess the improvement of strains, a model is created that links colonization dynamics of the microbial community to genetic activity by key species. The model is used to predict genetic targets for breeding and improve the frequency of selecting improvements in microbiome-encoded traits of agronomic relevance.

Measuring Nitrogen Delivered in an Agriculturally Relevant Field Context

In the field, the amount of nitrogen delivered can be determined by the function of colonization multiplied by the activity.

$$\text{Nitrogen delivered} = \int_{\text{Time \& Space}} \text{Colonization} \times \text{Activity}$$

The above equation requires (1) the average colonization per unit of plant tissue, and (2) the activity as either the amount of nitrogen fixed or the amount of ammonia excreted by each microbial cell. To convert to pounds of nitrogen per acre, corn growth physiology is tracked over time, e.g., size of the plant and associated root system throughout the maturity stages.

The pounds of nitrogen delivered to a crop per acre-season can be calculated by the following equation:

$$\text{Nitrogen delivered} = \int \text{Plant Tissue}(t) \times \text{Colonization}(t) \times \text{Activity}(t)\,dt$$

The Plant Tissue(t) is the fresh weight of corn plant tissue over the growing time (t). Values for reasonably making the calculation are described in detail in the publication entitled Roots, Growth and Nutrient Uptake (Mengel. Dept. of Agronomy Pub. #AGRY-95-08 (Rev. May-95. p. 1-8.).

The Colonization (t) is the amount of the microbes of interest found within the plant tissue, per gram fresh weight of plant tissue, at any particular time, t, during the growing season. In the instance of only a single timepoint available, the single timepoint is normalized as the peak colonization rate over the season, and the colonization rate of the remaining timepoints are adjusted accordingly.

Activity (t) is the rate of which N is fixed by the microbes of interest per unit time, at any particular time, t, during the growing season. In the embodiments disclosed herein, this activity rate is approximated by in vitro acetylene reduction assay (ARA) in ARA media in the presence of 5 mM glutamine or Ammonium excretion assay in ARA media in the presence of 5 mM ammonium ions.

The Nitrogen delivered amount is then calculated by numerically integrating the above function. In cases where the values of the variables described above are discretely measured at set timepoints, the values in between those timepoints are approximated by performing linear interpolation.

Nitrogen Fixation

Described herein are methods of increasing nitrogen fixation in a plant, comprising exposing the plant to bacteria comprising one or more genetic variations introduced into one or more genes regulating nitrogen fixation, wherein the bacteria produce 1% or more of nitrogen in the plant (e.g. 2%, 5%, 10%, or more), which may represent a nitrogen-fixation capability of at least 2-fold as compared to the plant in the absence of the bacteria. The bacteria may produce the nitrogen in the presence of fertilizer supplemented with glutamine, urea, nitrates or ammonia. Genetic variations can be any genetic variation described herein, including examples provided above, in any number and any combination. The genetic variation may be introduced into a gene selected from the group consisting of nifA, nifL, ntrB, ntrC, glutamine synthetase, glnA, glnB, glnK, draT, amtB, glutaminase, glnD, ginE, nifJ, nifH, nifD, nifK, nifY, nifE, nifN, nifU, nifS, nifV, nifW, nifZ, nifM, nifF, nifB, and nifQ. The genetic variation may be a mutation that results in one or more of: increased expression or activity of nifA or glutaminase; decreased expression or activity of nifL, ntrB, glutamine synthetase, glnB, glnK, draT, amtB; decreased adenylyl-removing activity of GlnE; or decreased uridylyl-removing activity of GlnD. The genetic variation introduced into one or more bacteria of the methods disclosed herein may be a knock-out mutation or it may abolish a regulatory sequence of a target gene, or it may comprise insertion of a heterologous regulatory sequence, for example, insertion of a regulatory sequence found within the genome of the same bacterial species or genus. The regulatory sequence can be chosen based on the expression level of a gene in a bacterial culture or within plant tissue. The genetic variation may be produced by chemical mutagenesis. The plants grown in step (c) may be exposed to biotic or abiotic stressors.

The amount of nitrogen fixation that occurs in the plants described herein may be measured in several ways, for example by an acetylene-reduction (AR) assay. An acetylene-reduction assay can be performed in vitro or in vivo. Evidence that a particular bacterium is providing fixed nitrogen to a plant can include: 1) total plant N significantly increases upon inoculation, preferably with a concomitant increase in N concentration in the plant; 2) nitrogen deficiency symptoms are relieved under N-limiting conditions upon inoculation (which should include an increase in dry matter); 3) $N_2$ fixation is documented through the use of an $^{15}N$ approach (which can be isotope dilution experiments, $^{15}N_2$ reduction assays, or $^{15}N$ natural abundance assays); 4) fixed N is incorporated into a plant protein or metabolite; and 5) all of these effects are not be seen in non-inoculated plants or in plants inoculated with a mutant of the inoculum strain.

The wild-type nitrogen fixation regulatory cascade can be represented as a digital logic circuit where the inputs $O_2$ and $NH_4^+$ pass through a NOR gate, the output of which enters an AND gate in addition to ATP. In some embodiments, the methods disclosed herein disrupt the influence of $NH_4^+$ on this circuit, at multiple points in the regulatory cascade, so that microbes can produce nitrogen even in fertilized fields. However, the methods disclosed herein also envision altering the impact of ATP or $O_2$ on the circuitry, or replacing the circuitry with other regulatory cascades in the cell, or altering genetic circuits other than nitrogen fixation. Gene clusters can be re-engineered to generate functional products under the control of a heterologous regulatory system. By eliminating native regulatory elements outside of, and within, coding sequences of gene clusters, and replacing them with alternative regulatory systems, the functional products of complex genetic operons and other gene clusters can be controlled and/or moved to heterologous cells, including cells of different species other than the species from which the native genes were derived. Once re-engineered, the synthetic gene clusters can be controlled by genetic circuits or other inducible regulatory systems, thereby controlling the products' expression as desired. The expression cassettes can be designed to act as logic gates, pulse generators, oscillators, switches, or memory devices. The controlling expression cassette can be linked to a promoter such that the expression cassette functions as an environmental sensor, such as an oxygen, temperature, touch, osmotic stress, membrane stress, or redox sensor.

As an example, the nifL, nifA, nifT, and nifX genes can be eliminated from the nif gene cluster. Synthetic genes can be designed by codon randomizing the DNA encoding each amino acid sequence. Codon selection is performed, specifying that codon usage be as divergent as possible from the codon usage in the native gene. Proposed sequences are scanned for any undesired features, such as restriction enzyme recognition sites, transposon recognition sites, repetitive sequences, sigma 54 and sigma 70 promoters, cryptic ribosome binding sites, and rho independent terminators. Synthetic ribosome binding sites are chosen to match the strength of each corresponding native ribosome binding site, such as by constructing a fluorescent reporter plasmid in which the 150 bp surrounding a gene's start codon (from −60 to +90) is fused to a fluorescent gene. This chimera can be expressed under control of the Ptac promoter, and fluorescence measured via flow cytometry. To generate synthetic ribosome binding sites, a library of reporter plasmids using 150 bp (−60 to +90) of a synthetic expression cassette is generated. Briefly, a synthetic expression cassette can consist of a random DNA spacer, a degenerate sequence encoding an RBS library, and the coding sequence for each synthetic gene. Multiple clones are screened to identify the synthetic ribosome binding site that best matched the native ribosome binding site. Synthetic operons that consist of the same genes as the native operons are thus constructed and tested for functional complementation. A further exemplary description of synthetic operons is provided in US20140329326.

Bacterial Species

Microbes useful in the methods and compositions disclosed herein may be obtained from any source. In some cases, microbes may be bacteria, archaea, protozoa or fungi. The microbes of this disclosure may be nitrogen fixing microbes, for example a nitrogen fixing bacteria, nitrogen fixing archaea, nitrogen fixing fungi, nitrogen fixing yeast, or nitrogen fixing protozoa. Microbes useful in the methods and compositions disclosed herein may be spore forming microbes, for example spore forming bacteria. In some cases, bacteria useful in the methods and compositions disclosed herein may be Gram positive bacteria or Gram negative bacteria. In some cases, the bacteria may be an endospore forming bacteria of the Firmicute phylum. In some cases, the bacteria may be a diazatroph. In some cases, the bacteria may not be a diazotroph.

The methods and compositions of this disclosure may be used with an archaea, such as, for example, *Methanothermobacter thermoautotrophicus*.

In some cases, bacteria which may be useful include, but are not limited to, *Agrobacterium radiobacter, Bacillus acidocaldarius, Bacillus acidoterrestris, Bacillus agri, Bacillus aizawai, Bacillus albolactis, Bacillus alcalophilus, Bacillus alvei, Bacillus aminoglucosidicus, Bacillus aminovorans, Bacillus amylolyticus* (also known as *Paenibacillus amylolyticus*) *Bacillus amyloliquefaciens, Bacillus aneurinolyticus, Bacillus atrophaeus, Bacillus azotoformans, Bacillus badius, Bacillus cereus* (synonyms: *Bacillus endorhythmos, Bacillus medusa*), *Bacillus chitinosporus, Bacillus circulars, Bacillus coagulans, Bacillus endoparasiticus Bacillus fastidiosus, Bacillus firmus, Bacillus kurstaki, Bacillus lacticola, Bacillus lactimorbus, Bacillus lactis, Bacillus laterosporus* (also known as *Brevibacillus laterosporus*), *Bacillus lautus, Bacillus lentimorbus, Bacillus lentus, Bacillus licheniformis, Bacillus maroccanus, Bacillus megaterium, Bacillus metiens, Bacillus mycoides, Bacillus natto, Bacillus nematocida, Bacillus nigrificans, Bacillus nigrum, Bacillus pantothenticus, Bacillus popillae, Bacillus psychrosaccharolyticus, Bacillus pumilus, Bacillus siamensis, Bacillus smithii, Bacillus sphaericus, Bacillus subtilis, Bacillus thuringiensis, Bacillus uniflagellatus, Bradyrhizobium japonicum, Brevibacillus brevis Brevibacillus laterosporus* (formerly *Bacillus laterosporus*), *Chromobacterium subtsugae, Delftia acidovorans, Lactobacillus acidophilus, Lysobacter antibioticus, Lysobacter enzymogenes, Paenibacillus alvei, Paenibacillus polymyxa, Paenibacillus popilliae* (formerly *Bacillus popilliae*), *Pantoea agglomerans, Pasteuria penetrans* (formerly *Bacillus penetrans*), *Pasteuria usgae, Pectobacterium carotovorum* (formerly *Erwinia carotovora*), *Pseudomonas aeruginosa, Pseudomonas aureofaciens, Pseudomonas cepacia* (formerly known as *Burkholderia cepacia*), *Pseudomonas chlororaphis, Pseudomonas fluorescens, Pseudomonas proradix, Pseudomonas putida, Pseudomonas syringae, Serratia entomophila, Serratia marcescens, Streptomyces colombiensis, Streptomyces galbus, Streptomyces goshikiensis, Streptomyces griseoviridis, Streptomyces lavendulae, Streptomyces prasinus, Streptomyces saraceticus, Streptomyces venezuelae, Xanthomonas campestris, Xenorhabdus luminescens, Xenorhabdus nematophila, Rhodococcus globerulus* AQ719 (NRRL Accession No. B-21663), *Bacillus* sp. AQ175 (ATCC Accession No. 55608), *Bacillus* sp. AQ 177 (ATCC Accession No. 55609), *Bacillus* sp. AQ178 (ATCC Accession No. 53522), and *Streptomyces* sp. strain NRRL Accession No. B-30145. In some cases the bacterium may be *Azotobacter chroococcum, Methanosarcina barkeri, Klesiella pneumoniae, Azotobacter vinelandii, Rhodobacter*

*spharoides, Rhodobacter capsulatus, Rhodobcter palustris, Rhodosporillum rubrum, Rhizobium leguminosarum* or *Rhizobium etli.*

In some cases the bacterium may be a species of *Clostridium*, for example *Clostridium pasteurianum, Clostridium beijerinckii, Clostridium perfringens, Clostridium tetani, Clostridium acetobutylicum.*

In some cases, bacteria used with the methods and compositions of the present disclosure may be cyanobacteria. Examples of cyanobacterial genuses include *Anabaena* (for example *Anagaena* sp. PCC7120), *Nostoc* (for example *Nostoc punctiforme*), or *Synechocystis* (for example *Synechocystis* sp. PCC6803).

In some cases, bacteria used with the methods and compositions of the present disclosure may belong to the phylum Chlorobi, for example *Chlorobium tepidum.*

In some cases, microbes used with the methods and compositions of the present disclosure may comprise a gene homologous to a known NifH gene. Sequences of known NifH genes may be found in, for example, the Zehr lab NifH database, (https://wwwzehr.pmc.ucsc.edu/nifH_Database_Public/, Apr. 4, 2014), or the Buckley lab NifH database (http://www.css.cornell.edu/faculty/buckley/nifh.htm, and Gaby, John Christian, and Daniel H. Buckley. "A comprehensive aligned nifH gene database: a multipurpose tool for studies of nitrogen-fixing bacteria." *Database* 2014 (2014): bau001.). In some cases, microbes used with the methods and compositions of the present disclosure may comprise a sequence which encodes a polypeptide with at least 60%, 70%, 80%, 85%, 90%, 95%, 96%, 96%, 98%, 99% or more than 99% sequence identity to a sequence from the Zehr lab NifH database, (https://wwwzehr.pmc.ucsc.edu/nifH_Database_Public/, Apr. 4, 2014). In some cases, microbes used with the methods and compositions of the present disclosure may comprise a sequence which encodes a polypeptide with at least 60%, 70%, 80%, 85%, 90%, 95%, 96%, 96%, 98%, 99% or more than 99% sequence identity to a sequence from the Buckley lab NifH database, (Gaby, John Christian, and Daniel H. Buckley. "A comprehensive aligned nifH gene database: a multipurpose tool for studies of nitrogen-fixing bacteria." *Database* 2014 (2014): bau001.).

Microbes useful in the methods and compositions disclosed herein can be obtained by extracting microbes from surfaces or tissues of native plants; grinding seeds to isolate microbes; planting seeds in diverse soil samples and recovering microbes from tissues; or inoculating plants with exogenous microbes and determining which microbes appear in plant tissues. Non-limiting examples of plant tissues include a seed, seedling, leaf, cutting, plant, bulb, tuber, root, and rhizomes. In some cases, bacteria are isolated from a seed. The parameters for processing samples may be varied to isolate different types of associative microbes, such as rhizospheric, epiphytes, or endophytes. Bacteria may also be sourced from a repository, such as environmental strain collections, instead of initially isolating from a first plant. The microbes can be genotyped and phenotyped, via sequencing the genomes of isolated microbes; profiling the composition of communities in planta; characterizing the transcriptomic functionality of communities or isolated microbes; or screening microbial features using selective or phenotypic media (e.g., nitrogen fixation or phosphate solubilization phenotypes). Selected candidate strains or populations can be obtained via sequence data; phenotype data; plant data (e.g., genome, phenotype, and/or yield data); soil data (e.g., pH, N/P/K content, and/or bulk soil biotic communities); or any combination of these.

The bacteria and methods of producing bacteria described herein may apply to bacteria able to self-propagate efficiently on the leaf surface, root surface, or inside plant tissues without inducing a damaging plant defense reaction, or bacteria that are resistant to plant defense responses. The bacteria described herein may be isolated by culturing a plant tissue extract or leaf surface wash in a medium with no added nitrogen. However, the bacteria may be unculturable, that is, not known to be culturable or difficult to culture using standard methods known in the art. The bacteria described herein may be an endophyte or an epiphyte or a bacterium inhabiting the plant rhizosphere (rhizospheric bacteria). The bacteria obtained after repeating the steps of introducing genetic variation, exposure to a plurality of plants, and isolating bacteria from plants with an improved trait one or more times (e.g. 1, 2, 3, 4, 5, 10, 15, 25, or more times) may be endophytic, epiphytic, or rhizospheric. Endophytes are organisms that enter the interior of plants without causing disease symptoms or eliciting the formation of symbiotic structures, and are of agronomic interest because they can enhance plant growth and improve the nutrition of plants (e.g., through nitrogen fixation). The bacteria can be a seed-borne endophyte. Seed-borne endophytes include bacteria associated with or derived from the seed of a grass or plant, such as a seed-borne bacterial endophyte found in mature, dry, undamaged (e.g., no cracks, visible fungal infection, or prematurely germinated) seeds. The seed-borne bacterial endophyte can be associated with or derived from the surface of the seed; alternatively, or in addition, it can be associated with or derived from the interior seed compartment (e.g., of a surface-sterilized seed). In some cases, a seed-borne bacterial endophyte is capable of replicating within the plant tissue, for example, the interior of the seed. Also, in some cases, the seed-borne bacterial endophyte is capable of surviving desiccation.

The bacterial isolated according to methods of the disclosure, or used in methods or compositions of the disclosure, can comprise a plurality of different bacterial taxa in combination. By way of example, the bacteria may include Proteobacteria (such as *Pseudomonas, Enterobacter, Stenotrophomonas, Burkholderia, Rhizobium, Herbaspirillum, Pantoea, Serratia, Rahnella, Azospirillum, Azorhizobium, Azotobacter, Duganella, Delftia, Bradyrhizobiun, Sinorhizobium* and *Halomonas*), Firmicutes (such as *Bacillus, Paenibacillus, Lactobacillus, Mycoplasma*, and *Acetabacterium*), and Actinobacteria (such as *Streptomyces, Rhodacoccus, Microbacterium*, and *Curtobacterium*). The bacteria used in methods and compositions of this disclosure may include nitrogen fixing bacterial consortia of two or more species. In some cases, one or more bacterial species of the bacterial consortia may be capable of fixing nitrogen. In some cases, one or more species of the bacterial consortia may facilitate or enhance the ability of other bacteria to fix nitrogen. The bacteria which fix nitrogen and the bacteria which enhance the ability of other bacteria to fix nitrogen may be the same or different. In some examples, a bacterial strain may be able to fix nitrogen when in combination with a different bacterial strain, or in a certain bacterial consortia, but may be unable to fix nitrogen in a monoculture. Examples of bacterial genuses which may be found in a nitrogen fixing bacterial consortia include, but are not limited to, *Herbaspirillum, Azospirillum, Enterobacter*, and *Bacillus.*

Bacteria that can be produced by the methods disclosed herein include *Azotobacter* sp., *Bradyrhizobium* sp., *Klebsiella* sp., and *Sinorhizobium* sp. In some cases, the bacteria may be selected from the group consisting of: *Azotobacter*

*vinelandii, Bradyrhizobium japonicum, Klebsiella pneumoniae*, and *Sinorhizobium meliloti*. In some cases, the bacteria may be of the genus *Enterobacter* or *Rahnella*. In some cases, the bacteria may be of the genus *Frankia*, or *Clostridium*. Examples of bacteria of the genus *Clostridium* include, but are not limited to, *Clostridium acetobutilicum, Clostridium pasteurianum, Clostridium beijerinckii, Clostridium perfringens*, and *Clostridium tetani*. In some cases, the bacteria may be of the genus *Paenibacillus*, for example *Paenibacillus azotofixans, Paenibacillus borealis, Paenibacillus durus, Paenibacillus macerans, Paenibacillus polymyxa, Paenibacillus alvei, Paenibacillus amylolyticus, Paenibacillus campinasensis, Paenibacillus chibensis, Paenibacillus glucanolyticus, Paenibacillus illinoisensis, Paenibacillus larvae* subsp. *Larvae, Paenibacillus larvae* subsp. *Pulvifaciens, Paenibacillus lautus, Paenibacillus macerans, Paenibacillus macquariensis, Paenibacillus macquariensis, Paenibacillus pabuli, Paenibacillus peoriae*, or *Paenibacillus polymyxa*.

In some examples, bacteria isolated according to methods of the disclosure can be a member of one or more of the following taxa: *Achromobacter, Acidithiobacillus, Acidovorax, Acidovoraz, Acinetobacter, Actinoplanes, Adlercreutzia, Aerococcus, Aeromonas, Afipia, Agromyces, Ancylobacter, Arthrobacter, Atopostipes, Azospirillum, Bacillus, Bdellovibrio, Beijerinckia, Bosea, Bradyrhizobium, Brevibacillus, Brevundimonas, Burkholderia, Candidatus Haloredivivus, Caulobacter, Cellulomonas, Cellvibrio, Chryseobacterium, Citrobacter, Clostridium, Coraliomargarita, Corynebacterium, Cupriavidus, Curtobacterium, Curvibacter, Deinococcus, Delftia, Desemzia, Devosia, Dokdonella, Dyella, Enhydrobacter, Enterobacter, Enterococcus, Erwinia, Escherichia, Escherichia/Shigella, Exiguobacterium, Ferroglobus, Filimonas, Finegoldia, Flavisolibacter, Flavobacterium, Frigoribacterium, Gluconacetobacter, Hafnia, Halobaculum, Halomonas, Halosimplex, Herbaspirillum, Hymenobacter, Klebsiella, Kocuria, Kosakonia, Lactobacillus, Leclercia, Lentzea, Luteibacter, Luteimonas, Massilia, Mesorhizobium, Methylobacterium, Microbacterium, Micrococcus, Microvirga, Mycobacterium, Neisseria, Nocardia, Oceanibaculum, Ochrobactrum, Okibacterium, Oligotropha, Oryzihumus, Oxalophagus, Paenibacillus, Panteoa, Pantoea, Pelomonas, Perlucidibaca, Plantibacter, Polynucleobacter, Propionibacterium, Propioniciclava, Pseudoclavibacter, Pseudomonas, Pseudonocardia, Pseudoxanthomonas, Psychrobacter, Rahnella, Ralstonia, Rheinheimera, Rhizobium, Rhodococcus, Rhodopseudomonas, Roseateles, Ruminococcus, Sebaldella, Sediminibacillus, Sediminibacterium, Serratia, Shigella, Shinella, Sinorhizobium, Sinosporangium, Sphingobacterium, Sphingomonas, Sphingopyxis, Sphingosinicella, Staphylococcus*, 25 *Stenotrophomonas, Strenotrophomonas, Streptococcus, Streptomyces, Stygiolobus, Sulfurisphaera, Tatumella, Tepidimonas, Thermomonas, Thiobacillus, Variovorax*, WPS-2 genera incertae *sedis, Xanthomonas*, and *Zimmermannella.*

In some cases, a bacterial species selected from at least one of the following genera are utilized: *Enterobacter, Klebsiella, Kosakonia*, and *Rahnella*. In some cases, a combination of bacterial species from the following genera are utilized: *Enterobacter, Klebsiella, Kosakonia*, and *Rahnella*. In some cases, the species utilized can be one or more of: *Enterobacter sacchari, Klebsiella variicola, Kosakonia sacchari*, and *Rahnella* aquatilis.

In some cases, a Gram positive microbe may have a Molybdenum-Iron nitrogenase system comprising: nifH, nifD, nifK, nifB, nifE, nifN, nifX hesA, nifV, nifW, WU, nifS, nifI1, and nifI2. In some cases, a Gram positive microbe may have a vanadium nitrogenase system comprising: vnfDG, vnfK, vnfE, vnfN, vupC, vupB, vupA, vnfV, vnfR1, vnfH, vnfR2, vnfA (transcriptional regulator). In some cases, a Gram positive microbe may have an iron-only nitrogenase system comprising: anfK, anfG, anfD, anfH, anfA (transcriptional regulator). In some cases a Gram positive microbe may have a nitrogenase system comprising glnB, and glnK (nitrogen signaling proteins). Some examples of enzymes involved in nitrogen metabolism in Gram positive microbes include glnA (glutamine synthetase), gdh (glutamate dehydrogenase), bdh (3-hydroxybutyrate dehydrogenase), glutaminase, gltAB/gltB/gltS (glutamate synthase), asnA/asnB (aspartate-ammonia ligase/asparagine synthetase), and ansA/ansZ (asparaginase). Some examples of proteins involved in nitrogen transport in Gram positive microbes include amtB (ammonium transporter), glnK (regulator of ammonium transport), glnPHQ/glnQHMP (ATP-dependent glutamine/glutamate transporters), glnT/alsT/yrbD/yflA (glutamine-like proton symport transporters), and gitP/gltT/yhcl/nqt (glutamate-like proton symport transporters).

Examples of Gram positive microbes which may be of particular interest include *Paenibacillus polymixa, Paenibacillus riograndensis, Paenibacillus* sp., *Frankia* sp., *Heliobacterium* sp., *Heliobacterium chlorum, Heliobacillus* sp., *Heliophilum* sp., *Heliorestis* sp., *Clostridium acetobutylicum, Clostridium* sp., *Mycobacterium flaum, Mycobacterium* sp., *Arthrobacter* sp., *Agromyces* sp., *Corynebacterium autitrophicum, Corynebacterium* sp., *Micromonspora* sp., *Propionibacteria* sp., *Streptomyces* sp., and *Microbacterium* sp.

Some examples of genetic alterations which may be made in Gram positive microbes include: deleting glnR to remove negative regulation of BNF in the presence of environmental nitrogen, inserting different promoters directly upstream of the nif cluster to eliminate regulation by GlnR in response to environmental nitrogen, mutating glnA to reduce the rate of ammonium assimilation by the GS-GOGAT pathway, deleting amtB to reduce uptake of ammonium from the media, mutating glnA so it is constitutively in the feedback-inhibited (FBI-GS) state, to reduce ammonium assimilation by the GS-GOGAT pathway.

In some cases, glnR is the main regulator of N metabolism and fixation in *Paenibacillus* species. In some cases, the genome of a *Paenibacillus* species may not contain a gene to produce glnR. In some cases, the genome of a *Paenibacillus* species may not contain a gene to produce glnE or glnD. In some cases, the genome of a *Paenibacillus* species may contain a gene to produce glnB or glnK. For example, *Paenibacillus* sp. WLY78 doesn't contain a gene for glnB, or its homologs found in the archaeon *Methanococcus maripaludis*, nifI1 and nifI2. In some cases, the genomes of *Paenibacillus* species may be variable. For example, *Paenibacillus polymixa* E681 lacks glnK and gdh, has several nitrogen compound transporters, but only amtB appears to be controlled by GlnR. In another example, *Paenibacillus* sp. JDR2 has glnK, gdh and most other central nitrogen metabolism genes, has many fewer nitrogen compound transporters, but does have glnPHQ controlled by GlnR. *Paenibacillus riograndensis* SBR5 contains a standard ginRA operon, an fdx gene, a main nif operon, a secondary nif operon, and an anf operon (encoding iron-only nitrogenase). Putative glnR/tnrA sites were found upstream of each of these operons. GlnR may regulate all of the above operons, except the anf operon. GlnR may bind to each of these regulatory sequences as a dimer.

*Paenibacillus* N-fixing strains may fall into two subgroups: Subgroup I, which contains only a minimal nif gene cluster and subgroup II, which contains a minimal cluster, plus an uncharacterized gene between nifX and hesA, and often other clusters duplicating some of the nif genes, such as nifH, nifHDK, nifBEN, or clusters encoding vanadaium nitrogenase (vnf) or iron-only nitrogenase (anf) genes.

In some cases, the genome of a *Paenibacillus* species may not contain a gene to produce glnB or glnK. In some cases, the genome of a *Paenibacillus* species may contain a minimal nif cluster with 9 genes transcribed from a sigma-70 promoter. In some cases, a *Paenibacillus* nif cluster may be negatively regulated by nitrogen or oxygen. In some cases, the genome of a *Paenibacillus* species may not contain a gene to produce sigma-54. For example, *Paenibacillus* sp. WLY78 does not contain a gene for sigma-54. In some cases, a nif cluster may be regulated by glnR, and/or TnrA. In some cases, activity of a nif cluster may be altered by altering activity of glnR, and/or TnrA.

In Bacilli, glutamine synthetase (GS) is feedback-inhibited by high concentrations of intracellular glutamine, causing a shift in confirmation (referred to as FBI-GS). Nif clusters contain distinct binding sites for the regulators GlnR and TnrA in several Bacilli species. GlnR binds and represses gene expression in the presence of excess intracellular glutamine and AMP. A role of GlnR may be to prevent the influx and intracellular production of glutamine and ammonium under conditions of high nitrogen availability. TnrA may bind and/or activate (or repress) gene expression in the presence of limiting intracellular glutamine, and/or in the presence of FBI-GS. In some cases the activity of a Bacilli nif cluster may be altered by altering the activity of GlnR.

Feedback-inhibited glutamine synthetase (FBI-GS) may bind GlnR and stabilize binding of GlnR to recognition sequences. Several bacterial species have a GlnR/TnrA binding site upstream of the nif cluster. Altering the binding of FBI-GS and GlnR may alter the activity of the nif pathway.

Sources of Microbes

The bacteria (or any microbe according to the disclosure) may be obtained from any general terrestrial environment, including its soils, plants, fungi, animals (including invertebrates) and other biota, including the sediments, water and biota of lakes and rivers; from the marine environment, its biota and sediments (for example, sea water, marine muds, marine plants, marine invertebrates (for example, sponges), marine vertebrates (for example, fish)); the terrestrial and marine geosphere (regolith and rock, for example, crushed subterranean rocks, sand and clays); the cryosphere and its meltwater; the atmosphere (for example, filtered aerial dusts, cloud and rain droplets); urban, industrial and other man-made environments (for example, accumulated organic and mineral matter on concrete, roadside gutters, roof surfaces, and road surfaces).

The plants from which the bacteria (or any microbe according to the disclosure) are obtained may be a plant having one or more desirable traits, for example a plant which naturally grows in a particular environment or under certain conditions of interest. By way of example, a certain plant may naturally grow in sandy soil or sand of high salinity, or under extreme temperatures, or with little water, or it may be resistant to certain pests or disease present in the environment, and it may be desirable for a commercial crop to be grown in such conditions, particularly if they are, for example, the only conditions available in a particular geographic location. By way of further example, the bacteria may be collected from commercial crops grown in such environments, or more specifically from individual crop plants best displaying a trait of interest amongst a crop grown in any specific environment: for example the fastest-growing plants amongst a crop grown in saline-limiting soils, or the least damaged plants in crops exposed to severe insect damage or disease epidemic, or plants having desired quantities of certain metabolites and other compounds, including fiber content, oil content, and the like, or plants displaying desirable colors, taste or smell. The bacteria may be collected from a plant of interest or any material occurring in the environment of interest, including fungi and other animal and plant biota, soil, water, sediments, and other elements of the environment as referred to previously.

The bacteria (or any microbe according to the disclosure) may be isolated from plant tissue. This isolation can occur from any appropriate tissue in the plant, including for example root, stem and leaves, and plant reproductive tissues. By way of example, conventional methods for isolation from plants typically include the sterile excision of the plant material of interest (e.g. root or stem lengths, leaves), surface sterilization with an appropriate solution (e.g. 2% sodium hypochlorite), after which the plant material is placed on nutrient medium for microbial growth. Alternatively, the surface-sterilized plant material can be crushed in a sterile liquid (usually water) and the liquid suspension, including small pieces of the crushed plant material spread over the surface of a suitable solid agar medium, or media, which may or may not be selective (e.g. contain only phytic acid as a source of phosphorus). This approach is especially useful for bacteria which form isolated colonies and can be picked off individually to separate plates of nutrient medium, and further purified to a single species by well-known methods. Alternatively, the plant root or foliage samples may not be surface sterilized but only washed gently thus including surface-dwelling epiphytic microorganisms in the isolation process, or the epiphytic microbes can be isolated separately, by imprinting and lifting off pieces of plant roots, stem or leaves onto the surface of an agar medium and then isolating individual colonies as above. This approach is especially useful for bacteria, for example. Alternatively, the roots may be processed without washing off small quantities of soil attached to the roots, thus including microbes that colonize the plant rhizosphere. Otherwise, soil adhering to the roots can be removed, diluted and spread out onto agar of suitable selective and non-selective media to isolate individual colonies of rhizospheric bacteria.

Budapest Treaty on the International Recognition of the Deposit of Microorganisms for the Purpose of Patent Procedures The microbial deposits of the present disclosure were made under the provisions of the Budapest Treaty on the International Recognition of the Deposit of Microorganisms for the Purpose of Patent Procedure (Budapest Treaty).

Applicants state that pursuant to 37 C.F.R. § 1.808(a)(2) "all restrictions imposed by the depositor on the availability to the public of the deposited material will be irrevocably removed upon the granting of the patent." This statement is subject to paragraph (b) of this section (i.e. 37 C.F.R. § 1.808(b)).

The *Enterobacter sacchari* has now been reclassified as *Kosakonia sacchari*, the name for the organism may be used interchangeably throughout the manuscript.

Figure 6:
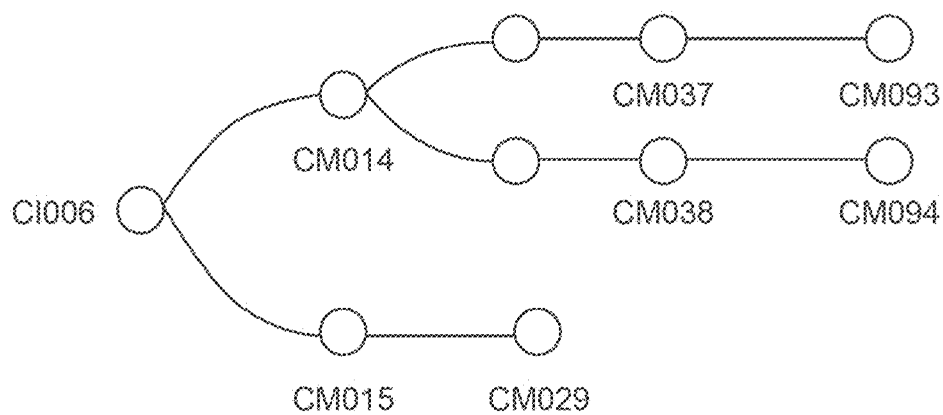
FIG. 6 depicts the lineage of modified strains that were derived from strain CI006.
Figure 7:
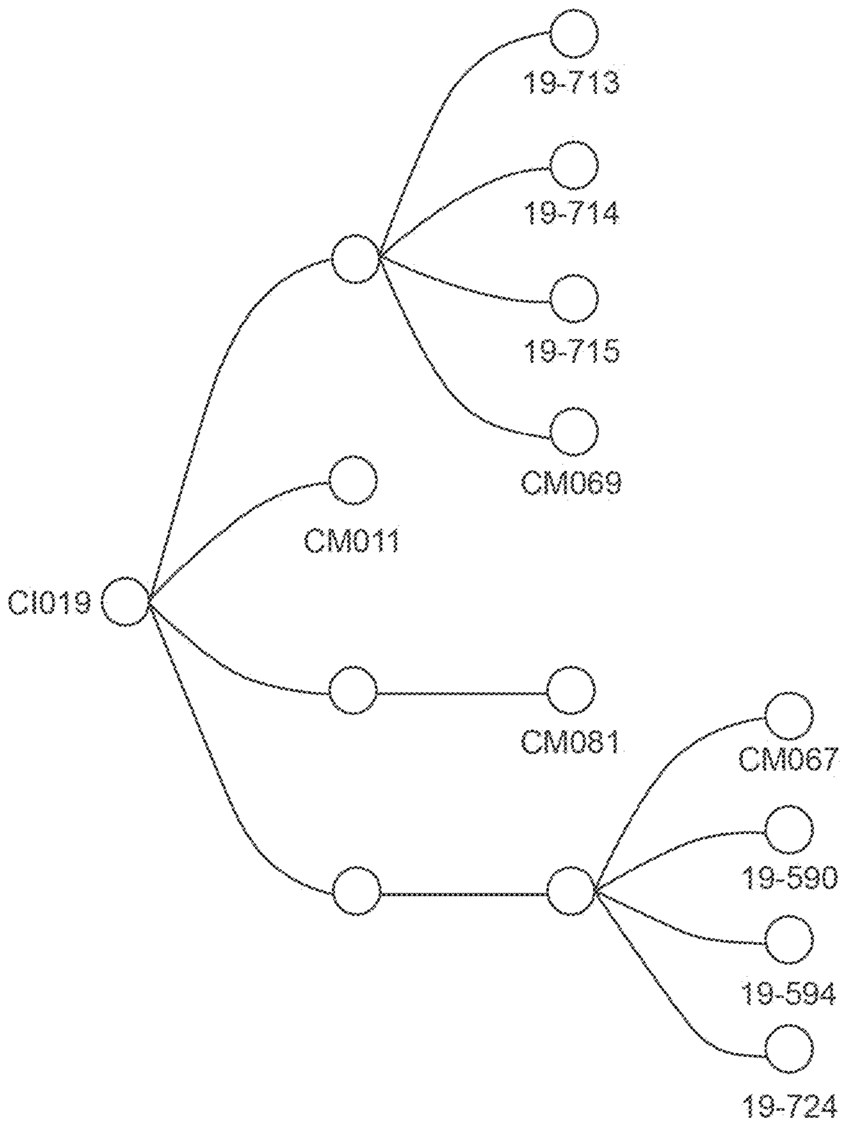
FIG. 7 depicts the lineage of modified strains that were derived from strain CI019.

Many microbes of the present disclosure are derived from two wild-type strains, as depicted in FIG. 6 and FIG. 7. Strain CI006 is a bacterial species previously classified in the genus *Enterobacter* (see aforementioned reclassification into *Kosakonia*), and FIG. 6 identifies the lineage of the mutants that have been derived from CI006. Strain CI019 is a bacterial species classified in the genus *Rahnella*, and FIG. 7 identifies the lineage of the mutants that have been derived from CI019. With regard to FIG. 6 and FIG. 7, it is noted that strains comprising CM in the name are mutants of the strains depicted immediately to the left of said CM strain. The deposit information for the CI006 *Kosakonia* wild type (WT) and CI019 *Rahnella* WT are found in the below Table 1.

Some microorganisms described in this application were deposited on Jan. 6, 2017 or Aug. 11, 2017 with the Bigelow National Center for Marine Algae and Microbiota (NCMA), located at 60 Bigelow Drive, East Boothbay, Me. 04544, USA. As aforementioned, all deposits were made under the terms of the Budapest Treaty on the International Recognition of the Deposit of Microorganisms for the Purposes of Patent Procedure. The Bigelow National Center for Marine Algae and Microbiota accession numbers and dates of deposit for the aforementioned Budapest Treaty deposits are provided in Table 1.

Biologically pure cultures of *Kosakonia sacchari* (WT), *Rahnella aquatilis* (WT), and a variant/remodeled *Kosakonia sacchari* strain were deposited on Jan. 6, 2017 with the Bigelow National Center for Marine Algae and Microbiota (NCMA), located at 60 Bigelow Drive, East Boothbay, Me. 04544, USA, and assigned NCMA Patent Deposit Designation numbers 201701001, 201701003, and 201701002, respectively. The applicable deposit information is found below in Table 1.

Biologically pure cultures of variant/remodeled *Kosakonia sacchari* strains were deposited on Aug. 11, 2017 with the Bigelow National Center for Marine Algae and Microbiota (NCMA), located at 60 Bigelow Drive, East Boothbay, Me. 04544, USA, and assigned NCMA Patent Deposit Designation numbers 201708004, 201708003, and 201708002, respectively. The applicable deposit information is found below in Table 1.

A biologically pure culture of *Klebsiella variicola* (WT) was deposited on Aug. 11, 2017 with the Bigelow National Center for Marine Algae and Microbiota (NCMA), located at 60 Bigelow Drive, East Boothbay, Me. 04544, USA, and assigned NCMA Patent Deposit Designation number 201708001. Biologically pure cultures of two *Klebsiella variicola* variants/remodeled strains were deposited on Dec. 20, 2017 with the Bigelow National Center for Marine Algae and Microbiota (NCMA), located at 60 Bigelow Drive, East Boothbay, Me. 04544, USA, and assigned NCMA Patent Deposit Designation numbers 201712001 and 201712002, respectively. The applicable deposit information is found below in Table 1.

TABLE 1

Microorganisms Deposited under the Budapest Treaty

| Depository | Pivot Strain Designation (some strains have multiple designations) | Taxonomy | Accession Number | Date of Deposit |
|---|---|---|---|---|
| NCMA | CI006, PBC6.1, 6 | *Kosakonia sacchari* (WT) | 201701001 | Jan. 6, 2017 |
| NCMA | CI019, 19 | *Rahnella aquatilis* (WT) | 201701003 | Jan. 6, 2017 |
| NCMA | CM029, 6-412 | *Kosakonia sacchari* | 201701002 | Jan. 6, 2017 |
| NCMA | 6-403 CM037 | *Kosakonia sacchari* | 201708004 | Aug. 11, 2017 |
| NCMA | 6-404, CM38, PBC6.38 | *Kosakonia sacchari* | 201708003 | Aug. 11, 2017 |
| NCMA | CM094, 6-881, PBC6.94 | *Kosakonia sacchari* | 201708002 | Aug. 11, 2017 |
| NCMA | CI137, 137, PB137 | *Klebsiella variicola* (WT) | 201708001 | Aug. 11, 2017 |
| NCMA | 137-1034 | *Klebsiella variicola* | 201712001 | Dec. 20, 2017 |
| NCMA | 137-1036 | *Klebsiella variicola* | 201712002 | Dec. 20, 2017 |

Isolated and Biologically Pure Microorganisms

The present disclosure, in certain embodiments, provides isolated and biologically pure microorganisms that have applications, inter alia, in agriculture. The disclosed microorganisms can be utilized in their isolated and biologically pure states, as well as being formulated into compositions (see below section for exemplary composition descriptions). Furthermore, the disclosure provides microbial compositions containing at least two members of the disclosed isolated and biologically pure microorganisms, as well as methods of utilizing said microbial compositions. Furthermore, the disclosure provides for methods of modulating nitrogen fixation in plants via the utilization of the disclosed isolated and biologically pure microbes.

In some aspects, the isolated and biologically pure microorganisms of the disclosure are those from Table 1. In other aspects, the isolated and biologically pure microorganisms of the disclosure are derived from a microorganism of Table 1. For example, a strain, child, mutant, or derivative, of a microorganism from Table 1 are provided herein. The disclosure contemplates all possible combinations of microbes listed in Table 1, said combinations sometimes forming a microbial consortia. The microbes from Table 1, either individually or in any combination, can be combined with any plant, active molecule (synthetic, organic, etc.), adjuvant, carrier, supplement, or biological, mentioned in the disclosure.

In some aspects, the disclosure provides microbial compositions comprising species as grouped in Tables 2-8. In some aspects, these compositions comprising various microbial species are termed a microbial consortia or consortium.

With respect to Tables 2-8, the letters A through I represent a non-limiting selection of microorganisms of the present disclosure, defined as:

A=Microbe with accession number 201701001 identified in Table 1;

B=Microbe with accession number 201701003 identified in Table 1;

C=Microbe with accession number 201701002 identified in Table 1;

D=Microbe with accession number 201708004 identified in Table 1;

E=Microbe with accession number 201708003 identified in Table 1;

F=Microbe with accession number 201708002 identified in Table 1;

G=Microbe with accession number 201708001 identified in Table 1;

H=Microbe with accession number 201712001 identified in Table 1; and

I=Microbe with accession number 201712002 identified in Table 1.

TABLE 2

| Eight and Nine Strain Compositions | | | | | |
|---|---|---|---|---|---|
| A, B, C, D, E, F, G, H | A, B, C, D, E, F, G, I | A, B, C, D, E, F, H, I | A, B, C, D, E, G, H, I | A, B, C, D, F, G, H, I | A, B, C, E, F, G, H, I |
| A, B, D, E, F, G, H, I | A, C, D, E, F, G, H, I | B, C, D, E, F, G, H, I | A, B, C, D, E, F, G, H, I | | |

TABLE 3

| Seven Strain Compositions | | | | | |
|---|---|---|---|---|---|
| A, B, C, D, E, F, G | A, B, C, D, E, F, H | A, B, C, D, E, F, I | A, B, C, D, E, G, H | A, B, C, D, E, G, I | A, B, C, D, E, H, I |
| A, B, C, D, F, G, H | A, B, C, D, F, G, I | A, B, C, D, F, H, I | A, B, C, D, G, H, I | A, B, C, E, F, G, H | A, B, C, E, F, G, I |
| A, B, C, E, F, H, I | A, B, C, E, G, H, I | A, B, C, F, G, H, I | A, B, D, E, F, G, H | A, B, D, E, F, G, I | A, B, D, E, F, H, I |
| A, B, D, E, G, H, I | A, B, D, F, G, H, I | A, B, E, F, G, H, I | A, C, D, E, F, G, H | A, C, D, E, F, G, I | A, C, D, E, F, H, I |
| A, C, D, E, G, H, I | A, C, D, F, G, H, I | A, C, E, F, G, H, I | A, D, E, F, G, H, I | B, C, D, E, F, G, H | B, C, D, E, F, G, I |
| B, C, D, E, F, H, I | B, C, D, E, G, H, I | B, C, D, F, G, H, I | B, C, E, F, G, H, I | B, D, E, F, G, H, I | C, D, E, F, G, H, I |

TABLE 4

| Six Strain Compositions | | | | | | |
|---|---|---|---|---|---|---|
| A, B, C, D, E, F | A, B, C, D, E, G | A, B, C, D, E, H | A, B, C, D, E, I | A, B, C, D, F, G | A, B, C, D, F, H | A, B, C, D, F, I |
| A, B, C, D, G, H | A, B, C, D, G, I | A, B, C, D, H, I | A, B, C, E, F, G | A, B, C, E, F, H | A, B, C, E, F, I | A, B, C, E, G, H |
| A, B, C, E, G, I | A, B, C, E, H, I | A, B, C, F, G, H | A, B, C, F, G, I | A, B, C, F, H, I | A, B, C, G, H, I | A, B, D, E, F, G |
| A, B, D, E, F, H | A, B, D, E, F, I | A, B, D, E, G, H | A, B, D, E, G, I | A, B, D, E, H, I | A, B, D, F, G, H | A, B, D, F, G, I |
| D, E, F, G, H, I | C, E, F, G, H, I | A, B, D, F, H, I | A, B, D, G, H, I | A, B, E, F, G, H | A, B, E, F, G, I | A, B, E, F, H, I |
| A, B, E, G, H, I | A, B, F, G, H, I | A, C, D, E, F, G | A, C, D, E, F, H | A, C, D, E, F, I | A, C, D, E, G, H | A, C, D, E, G, I |
| A, C, D, E, H, I | A, C, D, F, G, H | A, C, D, F, G, I | A, C, D, F, H, I | A, C, D, G, H, I | A, C, E, F, G, H | A, C, E, F, G, I |
| A, C, E, F, H, I | A, C, E, G, H, I | A, C, F, G, H, I | A, D, E, F, G, H | A, D, E, F, G, I | A, D, E, F, H, I | A, D, E, G, H, I |
| A, D, F, G, H, I | A, E, F, G, H, I | B, C, D, E, F, G | B, C, D, E, F, H | B, C, D, E, F, I | B, C, D, E, G, H | B, C, D, E, G, I |
| B, C, D, E, H, I | B, C, D, F, G, H | B, C, D, F, G, I | B, C, D, F, H, I | B, C, D, G, H, I | B, C, E, F, G, H | B, C, E, F, G, I |
| B, C, E, F, H, I | B, C, E, G, H, I | B, C, F, G, H, I | B, D, E, F, G, H | B, D, E, F, G, I | B, D, E, F, H, I | B, D, E, G, H, I |
| B, D, F, G, H, I | B, E, F, G, H, I | C, D, E, F, G, H | C, D, E, F, G, I | C, D, E, F, H, I | C, D, E, G, H, I | C, D, F, G, H, I |

TABLE 5

| Five Strain Compositions | | | | | | | |
|---|---|---|---|---|---|---|---|
| A, B, C, D, E | A, B, C, D, F | A, B, C, D, G | A, B, C, D, H | A, B, C, D, I | A, B, C, E, F | A, B, C, E, G | A, B, C, E, H |
| A, B, C, F, H | A, B, C, F, G | A, B, C, F, I | A, B, C, G, H | A, B, C, G, I | A, B, C, H, I | A, B, D, E, F | A, B, D, E, G |
| A, B, D, E, I | A, B, D, F, G | A, B, D, F, H | A, B, D, F, I | A, B, D, G, H | A, B, D, G, I | A, B, D, H, I | A, B, E, F, G |
| A, B, E, F, I | A, B, E, G, H | A, B, E, G, I | A, B, E, H, I | A, B, F, G, H | A, B, F, G, I | A, B, F, H, I | A, B, G, H, I |
| A, C, D, E, G | A, C, D, E, H | A, C, D, E, I | A, C, D, F, G | A, C, D, F, H | A, C, D, F, I | A, C, D, G, H | A, C, D, G, I |
| A, C, E, F, G | A, C, E, F, H | A, C, E, F, I | A, C, E, G, H | A, C, E, G, I | A, C, E, H, I | A, C, F, G, H | A, C, F, G, I |
| A, C, G, H, I | A, D, E, F, G | A, D, E, F, H | A, D, E, F, I | A, D, E, G, H | A, D, E, G, I | A, D, E, H, I | A, D, F, G, H |
| A, D, F, H, I | A, D, G, H, I | A, E, F, G, H | A, E, F, G, I | A, E, F, H, I | A, E, G, H, I | A, F, G, H, I | B, C, D, E, F |
| B, C, D, E, H | B, C, D, E, I | B, C, D, F, G | B, C, D, F, H | B, C, D, F, I | B, C, D, G, H | B, C, D, G, I | B, C, D, H, I |
| B, C, E, F, H | B, C, E, F, I | B, C, E, G, H | B, C, E, G, I | B, C, E, H, I | B, C, F, G, H | B, C, F, G, I | B, C, F, H, I |
| B, D, E, F, G | B, D, E, F, H | B, D, E, F, I | B, D, E, G, H | B, D, E, G, I | B, D, E, H, I | B, D, F, G, H | B, D, F, G, I |
| B, D, G, H, I | B, E, F, G, H | B, E, F, G, I | B, E, F, H, I | B, E, G, H, I | B, F, G, H, I | C, D, E, F, G | C, D, E, F, H |
| C, D, E, G, H | C, D, E, G, I | C, D, E, H, I | C, D, F, G, H | C, D, F, G, I | C, D, F, H, I | C, D, G, H, I | C, E, F, G, H |
| C, E, F, H, I | C, E, G, H, I | C, F, G, H, I | D, E, F, G, H | D, E, F, G, I | D, E, F, H, I | D, E, G, H, I | D, F, G, H, I |
| A, B, C, E, I | A, B, D, E, H | A, B, E, F, H | A, C, D, E, F | A, C, D, H, I | A, C, F, H, I | A, D, F, G, I | B, C, D, E, G |
| B, C, E, F, G | B, C, G, H, I | B, D, F, H, I | C, D, E, F, I | C, E, F, G, I | E, F, G, H, I | | |

TABLE 6

| Four Strain Compositions | | | | | | | | |
|---|---|---|---|---|---|---|---|---|
| A, B, C, D | A, B, C, E | A, B, C, F | A, B, C, G | A, B, C, H | A, B, C, I | A, B, D, E | A, B, D, F | D, G, H, I |
| A, B, D, G | A, B, D, H | A, B, D, I | A, B, E, F | A, B, E, G | A, B, E, H | A, B, E, I | A, B, F, G | E, F, G, H |

TABLE 6-continued

| Four Strain Compositions | | | | | | | | |
|---|---|---|---|---|---|---|---|---|
| A, B, F, H | A, D, F, H | A, D, F, I | A, D, G, H | A, D, G, I | A, D, H, I | A, E, F, G | A, E, F, H | E, F, G, I |
| A, B, F, I | A, B, G, H | A, B, G, I | A, B, H, I | A, C, D, E | A, C, D, F | A, C, D, G | A, C, D, H | E, F, H, I |
| A, C, D, I | A, C, E, F | A, C, E, G | A, C, E, H | A, C, E, I | A, C, F, G | A, C, F, H | A, C, F, I | E, G, H, I |
| A, C, G, H | A, C, G, I | A, C, H, I | A, D, E, F | A, D, E, G | A, D, E, H | A, D, E, I | A, D, F, G | F, G, H, I |
| A, E, F, I | A, E, G, H | A, E, G, I | A, E, H, I | A, F, G, H | A, F, G, I | A, F, H, I | A, G, H, I | D, E, F, H |
| B, C, D, E | B, C, D, F | B, C, D, G | B, C, D, H | B, C, D, I | B, C, E, F | B, C, E, G | B, C, E, H | D, E, F, I |
| B, C, E, I | B, C, F, G | B, C, F, H | B, C, F, I | B, C, G, H | B, C, G, I | B, C, H, I | B, D, E, F | D, E, G, H |
| B, D, E, G | B, D, E, H | B, D, E, I | B, D, F, G | B, D, F, H | B, D, F, I | B, D, G, H | B, D, G, I | D, E, G, I |
| B, D, H, I | B, E, F, G | B, E, F, H | B, E, F, I | B, E, G, H | B, E, G, I | B, E, H, I | B, F, G, H | D, E, H, I |
| B, F, G, I | B, F, H, I | B, G, H, I | C, D, E, F | C, D, E, G | C, D, E, H | C, D, E, I | C, D, F, G | D, F, G, H |
| C, D, F, H | C, D, F, I | C, D, G, H | C, D, G, I | C, D, H, I | C, E, F, G | C, E, F, H | C, E, F, I | D, F, G, I |
| C, E, G, H | C, E, G, I | C, E, H, I | C, F, G, H | C, F, G, I | C, F, H, I | C, G, H, I | D, E, F, G | D, F, H, I |

TABLE 7

| Three Strain Compositions | | | | | | | | | | |
|---|---|---|---|---|---|---|---|---|---|---|
| A, B, C | A, B, D | A, B, E | A, B, F | A, B, G | A, B, H | A, B, I | A, C, D | A, C, E | G, H, I | E, F, H |
| A, C, F | A, C, G | A, C, H | A, C, I | A, D, E | A, D, F | A, D, G | A, D, H | A, D, I | F, H, I | E, F, G |
| A, E, F | A, E, G | A, E, H | A, E, I | A, F, G | A, F, H | A, F, I | A, G, H | A, G, I | F, G, I | D, H, I |
| A, H, I | B, C, D | B, C, E | B, C, F | B, C, G | B, C, H | B, C, I | B, D, E | B, D, F | F, G, H | D, G, I |
| B, D, G | B, D, H | B, D, I | B, E, F | B, E, G | B, E, H | B, E, I | B, F, G | B, F, H | E, H, I | E, F, I |
| B, F, I | B, G, H | B, G, I | B, H, I | C, D, E | C, D, F | C, D, G | C, D, H | C, D, I | E, G, I | D, G, H |
| C, E, F | C, E, G | C, E, H | C, E, I | C, F, G | C, F, H | C, F, I | C, G, H | C, G, I | E, G, H | D, F, I |
| C, H, I | D, E, F | D, E, G | D, E, H | D, E, I | D, F, G | D, F, H | | | | |

TABLE 8

| Two Strain Compositions | | | | | | | | | | | | | | | |
|---|---|---|---|---|---|---|---|---|---|---|---|---|---|---|---|
| A, B | A, C | A, D | A, E | A, F | A, G | A, H | A, I | B, C | B, D | B, E | B, F | B, G | B, H | B, I | C, D |
| C, E | C, F | C, G | C, H | C, I | D, E | D, F | D, G | D, H | D, I | E, F | E, G | E, H | E, I | F, G | F, H |
| F, I | G, H | G, I | H, I | | | | | | | | | | | | |

In some embodiments, microbial compositions may be selected from any member group from Tables 2-8.

Agricultural Compositions

Compositions comprising bacteria or bacterial populations produced according to methods described herein and/or having characteristics as described herein can be in the form of a liquid, a foam, or a dry product. Compositions comprising bacteria or bacterial populations produced according to methods described herein and/or having characteristics as described herein may also be used to improve plant traits. In some examples, a composition comprising bacterial populations may be in the form of a dry powder, a slurry of powder and water, or a flowable seed treatment. The compositions comprising bacterial populations may be coated on a surface of a seed, and may be in liquid form.

The composition can be fabricated in bioreactors such as continuous stirred tank reactors, batch reactors, and on the farm. In some examples, compositions can be stored in a container, such as a jug or in mini bulk. In some examples, compositions may be stored within an object selected from the group consisting of a bottle, jar, ampule, package, vessel, bag, box, bin, envelope, carton, container, silo, shipping container, truck bed, and/or case.

Compositions may also be used to improve plant traits. In some examples, one or more compositions may be coated onto a seed. In some examples, one or more compositions may be coated onto a seedling. In some examples, one or more compositions may be coated onto a surface of a seed. In some examples, one or more compositions may be coated as a layer above a surface of a seed. In some examples, a composition that is coated onto a seed may be in liquid form, in dry product form, in foam form, in a form of a slurry of powder and water, or in a flowable seed treatment. In some examples, one or more compositions may be applied to a seed and/or seedling by spraying, immersing, coating, encapsulating, and/or dusting the seed and/or seedling with the one or more compositions. In some examples, multiple bacteria or bacterial populations can be coated onto a seed and/or a seedling of the plant. In some examples, at least two, at least three, at least four, at least five, at least six, at least seven, at least eight, at least nine, at least ten, or more than ten bacteria of a bacterial combination can be selected from one of the following genera: Acidovorax, *Agrobacterium, Bacillus, Burkholderia, Chryseobacterium, Curtobacterium, Enterobacter, Escherichia, Methylobacterium, Paenibacillus, Pantoea, Pseudomonas, Ralstonia, Saccharibacillus, Sphingomonas*, and *Stenotrophomonas.*

In some examples, at least two, at least three, at least four, at least five, at least six, at least seven, at least eight, at least nine, at least ten, or more than ten bacteria and bacterial populations of an endophytic combination are selected from one of the following families: Bacillaceae, Burkholderiaceae, Comamonadaceae, Enterobacteriaceae, Flavobacteriaceae, Methylobacteriaceae, Microbacteriaceae, Paenibacillileae, Pseudomonnaceae, Rhizobiaceae, Sphingomonadaceae, Xanthomonadaceae, Cladosporiaceae, Gnomoniaceae, Incertae *sedis*, Lasiosphaeriaceae, Netriaceae, and Pleosporaceae.

In some examples, at least two, at least three, at least four, at least five, at least six, at least seven, at least eight, at least night, at least ten, or more than ten bacteria and bacterial populations of an endophytic combination are selected from one of the following families: Bacillaceae, Burkholderiaceae, Comamonadaceae, Enterobacteriaceae, Flavobacteriaceae, Methylobacteriaceae, Microbacteriaceae, Paenibacillileae, Pseudomonnaceae, Rhizobiaceae, Sphingomonadaceae, Xanthomonadaceae, Cladosporiaceae, Gnomoniaceae, Incertae sedis, Lasiosphaeriaceae, Netriaceae, Pleosporaceae.

Examples of compositions may include seed coatings for commercially important agricultural crops, for example, *sorghum*, canola, tomato, strawberry, barley, rice, maize, and wheat. Examples of compositions can also include seed coatings for corn, soybean, canola, *sorghum*, potato, rice, vegetables, cereals, and oilseeds. Seeds as provided herein can be genetically modified organisms (GMO), non-GMO, organic, or conventional. In some examples, compositions may be sprayed on the plant aerial parts, or applied to the roots by inserting into furrows in which the plant seeds are planted, watering to the soil, or dipping the roots in a suspension of the composition. In some examples, compositions may be dehydrated in a suitable manner that maintains cell viability and the ability to artificially inoculate and colonize host plants. The bacterial species may be present in compositions at a concentration of between $10^8$ to $10^{10}$ CFU/ml. In some examples, compositions may be supplemented with trace metal ions, such as molybdenum ions, iron ions, manganese ions, or combinations of these ions. The concentration of ions in examples of compositions as described herein may between about 0.1 mM and about 50 mM. Some examples of compositions may also be formulated with a carrier, such as beta-glucan, carboxylmethyl cellulose (CMC), bacterial extracellular polymeric substance (EPS), sugar, animal milk, or other suitable carriers. In some examples, peat or planting materials can be used as a carrier, or biopolymers in which a composition is entrapped in the biopolymer can be used as a carrier. The compositions comprising the bacterial populations described herein can improve plant traits, such as promoting plant growth, maintaining high chlorophyll content in leaves, increasing fruit or seed numbers, and increasing fruit or seed unit weight.

The compositions comprising the bacterial populations described herein may be coated onto the surface of a seed. As such, compositions comprising a seed coated with one or more bacteria described herein are also contemplated. The seed coating can be formed by mixing the bacterial population with a porous, chemically inert granular carrier. Alternatively, the compositions may be inserted directly into the furrows into which the seed is planted or sprayed onto the plant leaves or applied by dipping the roots into a suspension of the composition. An effective amount of the composition can be used to populate the sub-soil region adjacent to the roots of the plant with viable bacterial growth, or populate the leaves of the plant with viable bacterial growth. In general, an effective amount is an amount sufficient to result in plants with improved traits (e.g. a desired level of nitrogen fixation).

Bacterial compositions described herein can be formulated using an agriculturally acceptable carrier. The formulation useful for these embodiments may include at least one member selected from the group consisting of a tackifier, a microbial stabilizer, a fungicide, an antibacterial agent, a preservative, a stabilizer, a surfactant, an anti-complex agent, an herbicide, a nematicide, an insecticide, a plant growth regulator, a fertilizer, a rodenticide, a dessicant, a bactericide, a nutrient, a hormone, or any combination thereof. In some examples, compositions may be shelf-stable. For example, any of the compositions described herein can include an agriculturally acceptable carrier (e.g., one or more of a fertilizer such as a non-naturally occurring fertilizer, an adhesion agent such as a non-naturally occurring adhesion agent, and a pesticide such as a non-naturally occurring pesticide). A non-naturally occurring adhesion agent can be, for example, a polymer, copolymer, or synthetic wax. For example, any of the coated seeds, seedlings, or plants described herein can contain such an agriculturally acceptable carrier in the seed coating. In any of the compositions or methods described herein, an agriculturally acceptable carrier can be or can include a non-naturally occurring compound (e.g., a non-naturally occurring fertilizer, a non-naturally occurring adhesion agent such as a polymer, copolymer, or synthetic wax, or a non-naturally occurring pesticide). Non-limiting examples of agriculturally acceptable carriers are described below. Additional examples of agriculturally acceptable carriers are known in the art.

In some cases, bacteria are mixed with an agriculturally acceptable carrier. The carrier can be a solid carrier or liquid carrier, and in various forms including microspheres, powders, emulsions and the like. The carrier may be any one or more of a number of carriers that confer a variety of properties, such as increased stability, wettability, or dispersability. Wetting agents such as natural or synthetic surfactants, which can be nonionic or ionic surfactants, or a combination thereof can be included in the composition. Water-in-oil emulsions can also be used to formulate a composition that includes the isolated bacteria (see, for example, U.S. Pat. No. 7,485,451). Suitable formulations that may be prepared include wettable powders, granules, gels, agar strips or pellets, thickeners, and the like, microencapsulated particles, and the like, liquids such as aqueous flowables, aqueous suspensions, water-in-oil emulsions, etc. The formulation may include grain or legume products, for example, ground grain or beans, broth or flour derived from grain or beans, starch, sugar, or oil.

In some embodiments, the agricultural carrier may be soil or a plant growth medium. Other agricultural carriers that may be used include water, fertilizers, plant-based oils, humectants, or combinations thereof. Alternatively, the agricultural carrier may be a solid, such as diatomaceous earth, loam, silica, alginate, clay, bentonite, vermiculite, seed cases, other plant and animal products, or combinations, including granules, pellets, or suspensions. Mixtures of any of the aforementioned ingredients are also contemplated as carriers, such as but not limited to, pesta (flour and kaolin clay), agar or flour-based pellets in loam, sand, or clay, etc. Formulations may include food sources for the bacteria, such as barley, rice, or other biological materials such as seed, plant parts, sugar cane bagasse, hulls or stalks from grain processing, ground plant material or wood from building site refuse, sawdust or small fibers from recycling of paper, fabric, or wood.

For example, a fertilizer can be used to help promote the growth or provide nutrients to a seed, seedling, or plant. Non-limiting examples of fertilizers include nitrogen, phosphorous, potassium, calcium, sulfur, magnesium, boron, chloride, manganese, iron, zinc, copper, molybdenum, and selenium (or a salt thereof). Additional examples of fertilizers include one or more amino acids, salts, carbohydrates, vitamins, glucose, NaCl, yeast extract, $NH_4H_2PO_4$, $(NH_4)_2SO_4$, glycerol, valine, L-leucine, lactic acid, propionic acid, succinic acid, malic acid, citric acid, KH tartrate, xylose, lyxose, and lecithin. In one embodiment, the formulation can include a tackifier or adherent (referred to as an adhesive agent) to help bind other active agents to a substance (e.g., a surface of a seed). Such agents are useful for combining bacteria with carriers that can contain other compounds (e.g., control agents that are not biologic), to yield a coating composition. Such compositions help create coatings around the plant or seed to maintain contact between the microbe and other agents with the plant or plant part. In one embodiment, adhesives are selected from the group consisting of: alginate, gums, starches, lecithins, formononetin, polyvinyl alcohol, alkali formononetinate, hesperetin, polyvinyl acetate, cephalins, Gum Arabic, Xanthan Gum, Mineral Oil, Polyethylene Glycol (PEG), Polyvinyl pyrrolidone (PVP), Arabino-galactan, Methyl Cellulose, PEG 400, Chitosan, Polyacrylamide, Polyacrylate, Polyacrylonitrile, Glycerol, Triethylene glycol, Vinyl Acetate, Gellan Gum, Polystyrene, Polyvinyl, Carboxymethyl cellulose, Gum Ghatti, and polyoxyethylene-polyoxybutylene block copolymers.

In some embodiments, the adhesives can be, e.g. a wax such as carnauba wax, beeswax, Chinese wax, shellac wax, spermaceti wax, candelilla wax, castor wax, ouricury wax, and rice bran wax, a polysaccharide (e.g., starch, dextrins, maltodextrins, alginate, and chitosans), a fat, oil, a protein (e.g., gelatin and zeins), gum arables, and shellacs. Adhesive agents can be non-naturally occurring compounds, e.g., polymers, copolymers, and waxes. For example, non-limiting examples of polymers that can be used as an adhesive agent include: polyvinyl acetates, polyvinyl acetate copolymers, ethylene vinyl acetate (EVA) copolymers, polyvinyl alcohols, polyvinyl alcohol copolymers, celluloses (e.g., ethylcelluloses, methylcelluloses, hydroxymethylcelluloses, hydroxypropylcelluloses, and carboxymethylcelluloses), polyvinylpyrolidones, vinyl chloride, vinylidene chloride copolymers, calcium lignosulfonates, acrylic copolymers, polyvinylacrylates, polyethylene oxide, acylamide polymers and copolymers, polyhydroxyethyl acrylate, methylacrylamide monomers, and polychloroprene.

In some examples, one or more of the adhesion agents, anti-fungal agents, growth regulation agents, and pesticides (e.g., insecticide) are non-naturally occurring compounds (e.g., in any combination). Additional examples of agriculturally acceptable carriers include dispersants (e.g., polyvinylpyrrolidone/vinyl acetate PVPIVA S-630), surfactants, binders, and filler agents.

The formulation can also contain a surfactant. Non-limiting examples of surfactants include nitrogen-surfactant blends such as Prefer 28 (Cenex), Surf-N(US), Inhance (Brandt), P-28 (Wilfarm) and Patrol (Helena); esterified seed oils include Sun-It II (AmCy), MSO (UAP), Scoil (Agsco), Hasten (Wilfarm) and Mes-100 (Drexel); and organo-silicone surfactants include Silwet L77 (UAP), Silikin (Terra), Dyne-Amic (Helena), Kinetic (Helena), Sylgard 309 (Wilbur-Ellis) and Century (Precision). In one embodiment, the surfactant is present at a concentration of between 0.01% v/v to 10% v/v. In another embodiment, the surfactant is present at a concentration of between 0.1% v/v to 1% v/v.

In certain cases, the formulation includes a microbial stabilizer. Such an agent can include a desiccant, which can include any compound or mixture of compounds that can be classified as a desiccant regardless of whether the compound or compounds are used in such concentrations that they in fact have a desiccating effect on a liquid inoculant. Such desiccants are ideally compatible with the bacterial population used, and should promote the ability of the microbial population to survive application on the seeds and to survive desiccation. Examples of suitable desiccants include one or more of trehalose, sucrose, glycerol, and Methylene glycol. Other suitable desiccants include, but are not limited to, non reducing sugars and sugar alcohols (e.g., mannitol or sorbitol). The amount of desiccant introduced into the formulation can range from about 5% to about 50% by weight/volume, for example, between about 10% to about 40%, between about 15% to about 35%, or between about 20% to about 30%. In some cases, it is advantageous for the formulation to contain agents such as a fungicide, an antibacterial agent, an herbicide, a nematicide, an insecticide, a plant growth regulator, a rodenticide, bactericide, or a nutrient. In some examples, agents may include protectants that provide protection against seed surface-borne pathogens. In some examples, protectants may provide some level of control of soil-borne pathogens. In some examples, protectants may be effective predominantly on a seed surface.

In some examples, a fungicide may include a compound or agent, whether chemical or biological, that can inhibit the growth of a fungus or kill a fungus. In some examples, a fungicide may include compounds that may be fungistatic or fungicidal. In some examples, fungicide can be a protectant, or agents that are effective predominantly on the seed surface, providing protection against seed surface-borne pathogens and providing some level of control of soil-borne pathogens. Non-limiting examples of protectant fungicides include captan, maneb, thiram, or fludioxonil.

In some examples, fungicide can be a systemic fungicide, which can be absorbed into the emerging seedling and inhibit or kill the fungus inside host plant tissues. Systemic fungicides used for seed treatment include, but are not limited to the following: azoxystrobin, carboxin, mefenoxam, metalaxyl, thiabendazole, trifloxystrobin, and various triazole fungicides, including difenoconazole, ipconazole, tebuconazole, and triticonazole. Mefenoxam and metalaxyl are primarily used to target the water mold fungi *Pythium* and *Phytophthora*. Some fungicides are preferred over others, depending on the plant species, either because of subtle differences in sensitivity of the pathogenic fungal species, or because of the differences in the fungicide distribution or sensitivity of the plants. In some examples, fungicide can be a biological control agent, such as a bacterium or fungus. Such organisms may be parasitic to the pathogenic fungi, or secrete toxins or other substances which can kill or otherwise prevent the growth of fungi. Any type of fungicide, particularly ones that are commonly used on plants, can be used as a control agent in a seed composition.

In some examples, the seed coating composition comprises a control agent which has antibacterial properties. In one embodiment, the control agent with antibacterial properties is selected from the compounds described herein elsewhere. In another embodiment, the compound is Streptomycin, oxytetracycline, oxolinic acid, or gentamicin. Other examples of antibacterial compounds which can be used as part of a seed coating composition include those based on dichlorophene and benzylalcohol hemi formal (Proxel® from ICI or Acticide® RS from Thor Chemie and Kathon® MK 25 from Rohm & Haas) and isothiazolinone derivatives such as alkylisothiazolinones and benzisothiazolinones (Acticide® MBS from Thor Chemie).

In some examples, growth regulator is selected from the group consisting of: Abscisic acid, amidochlor, ancymidol, 6-benzylaminopurine, brassinolide, butralin, chlormequat (chlormequat chloride), choline chloride, cyclanilide, daminozide, dikegulac, dimethipin, 2,6-dimethylpuridine, ethephon, flumetralin, flurprimidol, fluthiacet, forchlorfenuron, gibberellic acid, inabenfide, indole-3-acetic acid, maleic hydrazide, mefluidide, mepiquat (mepiquat chloride), naphthaleneacetic acid, N-6-benzyladenine, paclobutrazol, prohexadione phosphorotrithioate, 2,3,5-tri-iodobenzoic acid, trinexapac-ethyl and uniconazole. Additional non-limiting examples of growth regulators include brassinosteroids, cytokinines (e.g., kinetin and zeatin), auxins (e.g., indolylacetic acid and indolylacetyl aspartate), flavonoids and isoflavanoids (e.g., formononetin and diosmetin), phytoaixins (e.g., glyceolline), and phytoalexin-inducing oligosaccharides (e.g., pectin, chitin, chitosan, polygalacuronic acid, and oligogalacturonic acid), and gibellerins. Such agents are ideally compatible with the agricultural seed or seedling onto which the formulation is applied (e.g., it should not be deleterious to the growth or health of the plant). Furthermore, the agent is ideally one which does not cause safety concerns for human, animal or industrial use (e.g., no safety issues, or the compound is sufficiently labile that the commodity plant product derived from the plant contains negligible amounts of the compound).

Some examples of nematode-antagonistic biocontrol agents include ARF18; 30 *Arthrobotrys* spp.; *Chaetomium* spp.; *Cylindrocarpon* spp.; *Exophilia* spp.; *Fusarium* spp.; *Gliocladium* spp.; *Hirsutella* spp.; *Lecanicillium* spp.; *Monacrosporium* spp.; *Myrothecium* spp.; *Neocosmospora* spp.; *Paecilomyces* spp.; *Pochonia* spp.; *Stagonospora* spp.; *vesicular-arbuscular mycorrhizal fungi, Burkholderia* spp.; *Pasteuria* spp., *Brevibacillus* spp.; *Pseudomonas* spp.; and Rhizobacteria. Particularly preferred nematode-antagonistic biocontrol agents include ARF18*, Arthrobotrys oligospora, Arthrobotrys dactyloides, Chaetomium globosum, Cylindrocarpon heteronema, Exophilia jeanselmei, Exophilia pisciphila, Fusarium aspergilus, Fusarium solani, Gliocladium catenulatum, Gliocladium roseum, Gliocladium vixens, Hirsutella rhossiliensis, Hirsutella minnesotensis, Lecanicillium lecanii, Monacrosporium drechsleri, Monacrosporium gephyropagum, Myrotehcium verrucaria, Neocosmospora vasinfecta, Paecilomyces lilacinus, Pochonia chlamydosporia, Stagonospora heteroderae, Stagonospora phaseoli, vesicular-arbuscular mycorrhizal fungi, Burkholderia cepacia, Pasteuria penetrans, Pasteuria thornei, Pasteuria nishizawae, Pasteuria ramosa, Pastrueia usage, Brevibacillus laterosporus* strain G4, *Pseudomonas fluorescens* and Rhizobacteria.

Some examples of nutrients can be selected from the group consisting of a nitrogen fertilizer including, but not limited to Urea, Ammonium nitrate, Ammonium sulfate, Non-pressure nitrogen solutions, Aqua ammonia, Anhydrous ammonia, Ammonium thiosulfate, Sulfur-coated urea, Urea-formaldehydes, IBDU, Polymer-coated urea, Calcium nitrate, Ureaform, and Methylene urea, phosphorous fertilizers such as Diammonium phosphate, Monoammonium phosphate, Ammonium polyphosphate, Concentrated superphosphate and Triple superphosphate, and potassium fertilizers such as Potassium chloride, Potassium sulfate, Potassium-magnesium sulfate, Potassium nitrate. Such compositions can exist as free salts or ions within the seed coat composition. Alternatively, nutrients/fertilizers can be complexed or chelated to provide sustained release over time.

Some examples of rodenticides may include selected from the group of substances consisting of 2-isovalerylindan-1, 3-dione, 4-(quinoxalin-2-ylamino) benzenesulfonamide, alpha-chlorohydrin, aluminum phosphide, antu, arsenous oxide, barium carbonate, bisthiosemi, brodifacoum, bromadiolone, bromethalin, calcium cyanide, chloralose, chlorophacinone, cholecalciferol, coumachlor, coumafuryl, coumatetralyl, crimidine, difenacoum, difethialone, diphacinone, ergocalciferol, flocoumafen, fluoroacetamide, flupropadine, flupropadine hydrochloride, hydrogen cyanide, iodomethane, lindane, magnesium phosphide, methyl bromide, norbormide, phosacetim, phosphine, phosphorus, pindone, potassium arsenite, pyrinuron, scilliroside, sodium arsenite, sodium cyanide, sodium fluoroacetate, strychnine, thallium sulfate, warfarin and zinc phosphide.

In the liquid form, for example, solutions or suspensions, bacterial populations can be mixed or suspended in water or in aqueous solutions. Suitable liquid diluents or carriers include water, aqueous solutions, petroleum distillates, or other liquid carriers.

Solid compositions can be prepared by dispersing the bacterial populations in and on an appropriately divided solid carrier, such as peat, wheat, bran, vermiculite, clay, talc, bentonite, diatomaceous earth, fuller's earth, pasteurized soil, and the like. When such formulations are used as wettable powders, biologically compatible dispersing agents such as non-ionic, anionic, amphoteric, or cationic dispersing and emulsifying agents can be used.

The solid carriers used upon formulation include, for example, mineral carriers such as kaolin clay, pyrophyllite, bentonite, montmorillonite, diatomaceous earth, acid white soil, vermiculite, and pearlite, and inorganic salts such as ammonium sulfate, ammonium phosphate, ammonium nitrate, urea, ammonium chloride, and calcium carbonate. Also, organic fine powders such as wheat flour, wheat bran, and rice bran may be used. The liquid carriers include vegetable oils such as soybean oil and cottonseed oil, glycerol, ethylene glycol, polyethylene glycol, propylene glycol, polypropylene glycol, etc.

Pests

Agricultural compositions of the disclosure, which may comprise any microbe taught herein, are sometimes combined with one or more pesticides.

The pesticides that are combined with the microbes of the disclosure may target any of the pests mentioned below.

"Pest" includes but is not limited to, insects, fungi, bacteria, nematodes, mites, ticks and the like. Insect pests include insects selected from the orders Coleoptera, Diptera, Hymenoptera, Lepidoptera, Mallophaga, Homoptera, Hemiptera Orthroptera, Thysanoptera, Dermaptera, Isoptera, Anoplura, Siphonaptera, Trichoptera, etc., particularly Lepidoptera and Coleoptera.

Those skilled in the art will recognize that not all compounds are equally effective against all pests. Compounds that may be combined with microbes of the disclosure may display activity against insect pests, which may include economically important agronomic, forest, greenhouse, nursery ornamentals, food and fiber, public and animal health, domestic and commercial structure, household and stored product pests.

As aforementioned, the agricultural compositions of the disclosure (which may comprise any microbe taught herein) are in embodiments combined with one or more pesticides. These pesticides may be active against any of the following pests:

Larvae of the order Lepidoptera include, but are not limited to, armyworms, cutworms, loopers and heliothines in the family Noctuidae *Spodoptera frugiperda* J E Smith (fall armyworm); *S. exigua* Hubner (beet armyworm); *S. litura* Fabricius (tobacco cutworm, cluster caterpillar); *Mamestra* configurata Walker (bertha armyworm); *M. brassicae* Linnaeus (cabbage moth); *Agrotis ipsilon* Hufnagel (black cutworm); *A. orthogonia* Morrison (western cutworm); *A. subterranea* Fabricius (granulate cutworm); *Alabama argillacea* Hubner (cotton leaf worm); *Trichoplusia ni* Hubner (cabbage looper); *Pseudoplusia includens* Walker (soybean looper); *Anticarsia gemmatalis* Hubner (velvet bean caterpillar); *Hypena scabra* Fabricius (green clover worm); *Heliothis virescens* Fabricius (tobacco budworm); *Pseudaletia unipuncta* Haworth (armyworm); *Athetis mindara* Barnes and Mcdunnough (rough skinned cutworm); *Euxoa messoria* Harris (darksided cutworm); *Earias insulana* Boisduval (spiny bollworm); *E. vittella* Fabricius (spotted bollworm); *Helicoverpa armigera* Hubner (American bollworm); *H. zea* Boddie (corn earworm or cotton bollworm); *Melanchra picta* Harris (zebra caterpillar); *Egira* (Xylomyges) *curialis* Grote (citrus cutworm); borers, case bearers, webworms, coneworms, and skeletonizers from the family Pyralidae *Ostrinia nubilalis* Hubner (European corn borer); *Amyelois transitella* Walker (naval orangeworm); *Anagasta kuehniella* Zeller (Mediterranean flour moth); *Cadra cautella* Walker (almond moth); *Chilo suppressalis* Walker (rice stem borer); *C. partellus*, (*sorghum* borer); *Corcyra cephalonica* Stainton (rice moth); *Crambus caliginosellus* Clemens (corn root webworm); *C. teterrellus* Zincken (bluegrass webworm); *Cnaphalocrocis medinalis* Guenee (rice leaf roller); *Desmia funeralis* Hubner (grape leaffolder); *Diaphania hyalinata* Linnaeus (melon worm); *D. nitidalis* Stoll (pickleworm); *Diatraea grandiosella* Dyar (southwestern corn borer), *D. saccharalis* Fabricius (surgarcane borer); *Eoreuma loftini* Dyar (Mexican rice borer); *Ephestia elutella* Hubner (tobacco (cacao) moth); *Galleria mellonella* Linnaeus (greater wax moth); *Herpetogramma licarsisalis* Walker (sod webworm); *Homoeosoma electellum* Hulst (sunflower moth); *Elasmopalpus lignosellus* Zeller (lesser cornstalk borer); *Achroia grisella* Fabricius (lesser wax moth); *Loxostege sticticalis* Linnaeus (beet webworm); *Orthaga thyrisalis* Walker (tea tree web moth); *Maruca testulalis* Geyer (bean pod borer); *Plodia interpunctella* Hubner (Indian meal moth); *Scirpophaga incertulas* Walker (yellow stem borer); *Udea rubigalis* Guenee (celery leaftier); and leafrollers, budworms, seed worms and fruit worms in the family Tortricidae *Acleris gloverana* Walsingham (Western blackheaded budworm); *A. variana* Fernald (Eastern blackheaded budworm); *Archips argyrospila* Walker (fruit tree leaf roller); *A. rosana* Linnaeus (European leaf roller); and other *Archips* species, *Adoxophyes orana* Fischer von Rosslerstamm (summer fruit *tortrix* moth); *Cochylis hospes* Walsingham (banded sunflower moth); *Cydia latiferreana* Walsingham (filbertworm); *C. pomonella* Linnaeus (colding moth); *Platynota flavedana* Clemens (variegated leafroller); *P. stultana* Walsingham (omnivorous leafroller); *Lobesia botrana* Denis & Schiffermuller (European grape vine moth); *Spilonota ocellana* Denis & Schiffermuller (eyespotted bud moth); *Endopiza viteana* Clemens (grape berry moth); *Eupoecilia ambiguella* Hubner (vine moth); *Bonagota salubricola* Meyrick (Brazilian apple leafroller); *Grapholita molesta* Busck (oriental fruit moth); *Suleima helianthana* Riley (sunflower bud moth); *Argyrotaenia* spp.; *Choristoneura* spp.

Selected other agronomic pests in the order Lepidoptera include, but are not limited to, *Alsophila pometaria* Harris (fall cankerworm); *Anarsia lineatella* Zeller (peach twig borer); *Anisota senatoria* J. E. Smith (orange striped oakworm); *Antheraea pernyi* Guerin-Meneville (Chinese Oak Tussah Moth); *Bombyx mori* Linnaeus (Silkworm); *Bucculatrix thurberiella* Busck (cotton leaf perforator); *Colias eurytheme* Boisduval (alfalfa caterpillar); *Datana integerrima* Grote & Robinson (walnut caterpillar); *Dendrolimus sibiricus* Tschetwerikov (Siberian silk moth), *Ennomos subsignaria* Hubner (elm spanworm); *Erannis tiliaria* Harris (linden looper); *Euproctis chrysorrhoea* Linnaeus (browntail moth); *Harrisina americana* Guerin-Meneville (grapeleaf skeletonizer); *Hemileuca oliviae* Cockrell (range caterpillar); *Hyphantria cunea* Drury (fall web-worm); *Keiferia lycopersicella* Walsingham (tomato pinworm); *Lambdina fiscellaria* fiscellaria Hulst (Eastern hemlock looper); *L. fiscellaria* lugubrosa Hulst (Western hemlock looper); *Leucoma salicis* Linnaeus (satin moth); *Lymantria dispar* Linnaeus (gypsy moth); *Manduca quinquemaculata* Haworth (five spotted hawk moth, tomato hornworm); *M. sexta* Haworth (tomato homworm, tobacco hornworm); *Operophtera brumata* Linnaeus (winter moth); *Paleacrita vernata* Peck (spring cankerworm); *Papilio cresphontes* Cramer (giant swallowtail orange dog); *Phryganidia californica* Packard (California oakworm); *Phyllocnistis citrella* Stainton (citrus leafminer); *Phyllonorycter blancardella* Fabricius (spotted tentiform leafminer); *Pieris brassicae* Linnaeus (large white butterfly); *P. rapae* Linnaeus (small white butterfly); *P. napi* Linnaeus (green veined white butterfly); *Platyptilia carduidactyla* Riley (artichoke plume moth); *Plutella xylostella* Linnaeus (diamondback moth); *Pectinophora gossypiella* Saunders (pink bollworm); *Pontia protodice* Boisduval and Leconte (Southern cabbage-worm); *Sabulodes aegrotata* Guenee (onmivorous looper); *Schizura concinna* J. E. Smith (red humped caterpillar); *Sitotroga cerealella* Olivier (Angoumois grain moth); *Thaumetopoea pityocampa* Schiffermuller (pine processionary caterpillar); *Tineola bisselliella* Hummel (webbing clothes moth); *Tuta absoluta* Meyrick (tomato leafminer); *Yponomeuta padella* Linnaeus (ermine moth); *Heliothis subflexa* Guenee; *Malacosoma* spp. and *Orgyia* spp.; *Ostrinia nubilalis* (European corn borer); seed corn maggot; *Agrotis Ipsilon* (black cutworm).

Larvae and adults of the order Coleoptera including weevils from the families Anthribidae, Bruchidae and Curculionidae (including, but not limited to: *Anthonomus grandis* Boheman (boll weevil); *Lissorhoptrus oryzophilus* Kuschel (rice water weevil); *Sitophilus granarius* Linnaeus (granary weevil); *S. oryzae* Linnaeus (rice weevil); *Hypera punctata* Fabricius (clover leaf weevil); *Cylindrocopturus adspersus* LeConte (sunflower stem weevil); *Smicronyx fulvus* LeConte (red sunflower seed weevil); *S. sordidus* LeConte (gray sunflower seed weevil); *Sphenophorus maidis* Chittenden (maize billbug)); flea beetles, cucumber beetles, rootworms, leaf beetles, potato beetles and leafminers in the family Chrysomelidae (including, but not limited to: *Leptinotarsa decemlineata* Say (Colorado potato beetle); *Diabrotica virgifera virgifera* LeConte (western corn rootworm); *D. barberi* Smith and Lawrence (northern corn rootworm); *D. undecimpunctata howardi* Barber (southern corn rootworm); *Chaetocnema pulicaria* Melsheimer (corn flea beetle); *Phyllotreta cruciferae* Goeze (Crucifer flea beetle); *Phyllotreta striolata* (stripped flea beetle); *Colaspis brunnea* Fabricius (grape *colaspis*); *Oulema melanopus* Linnaeus (cereal leaf beetle); *Zygogramma exclamationis* Fabricius (sunflower beetle)); beetles from the family Coccinellidae (including, but not limited to: *Epilachna varivestis* Mulsant (Mexican bean beetle)); chafers and other beetles from the family Scarabaeidae (including, but not limited to: *Popillia japonica* Newman (Japanese beetle); *Cyclocephala borealis* Arrow (northern masked chafer, white grub); *C. immaculata* Olivier (southern masked chafer, white grub); *Rhizotrogus majalis* Razoumowsky (European chafer); *Phyllophaga crinita* Burmeister (white grub); *Ligyrus gibbosus* De Geer (carrot beetle)); carpet beetles from the family Dermestidae; wireworms from the family Elateridae, *Eleodes* spp., *Melanotus* spp.; *Conoderus* spp.; *Limonius* spp.; *Agriotes* spp.; *Ctenicera* spp.; *Aeolus* spp.; *bark beetles from the family Scolytidae and beetles from the family Tenebrionidae; Cerotoma trifurcate* (bean leaf beetle); and wireworm.

Adults and immatures of the order Diptera, including leafminers *Agromyza parvicornis* Loew (corn blotch leafminer); midges (including, but not limited to: *Contarinia sorghicola* Coquillett (*sorghum* midge); *Mayetiola destructor* Say (Hessian fly); *Sitodiplosis mosellana* Gehin (wheat midge); *Neolasioptera murtfeldtiana* Felt, (sunflower seed midge)); fruit flies (Tephritidae), *Oscinella frit* Linnaeus (fruit flies); maggots (including, but not limited to: *Delia platura* Meigen (seedcorn maggot); *D. coarctata* Fallen (wheat bulb fly) and other *Delia* spp., *Meromyza americana* Fitch (wheat stem maggot); *Musca domestica* Linnaeus (house flies); *Fannia canicularis* Linnaeus, *F. femoralis* Stein (lesser house flies); *Stomoxys calcitrans* Linnaeus (stable flies)); face flies, horn flies, blow flies, *Chrysomya* spp.; *Phormia* spp. and other muscoid fly pests, horse flies *Tabanus* spp.; bot flies *Gastrophilus* spp.; *Oestrus* spp.; cattle grubs *Hypoderma* spp.; deer flies *Chrysops* spp.; *Melophagus ovinus* Linnaeus (keds) and other Brachycera, mosquitoes *Aedes* spp.; *Anopheles* spp.; *Culex* spp.; black flies *Prosimulium* spp.; *Simulium* spp.; biting midges, sand flies, sciarids, and other Nematocera.

Adults and nymphs of the orders Hemiptera and Homoptera such as, but not limited to, adelgids from the family Adelgidae, plant bugs from the family Miridae, cicadas from the family Cicadidae, leafhoppers, *Empoasca* spp.; from the family Cicadellidae, planthoppers from the families Cixiidae, Flatidae, Fulgoroidea, Issidae and Delphacidae, treehoppers from the family Membracidae, psyllids from the family Psyllidae, whiteflies from the family Aleyrodidae, aphids from the family Aphididae, *phylloxera* from the family Phylloxeridae, mealybugs from the family Pseudococcidae, scales from the families Asterolecanidae, Coccidae, Dactylopiidae, Diaspididae, Eriococcidae Ortheziidae, Phoenicococcidae and Margarodidae, lace bugs from the family Tingidae, stink bugs from the family Pentatomidae, cinch bugs, *Blissus* spp.; and other seed bugs from the family Lygaeidae, spittlebugs from the family Cercopidae squash bugs from the family Coreidae and red bugs and cotton stainers from the family Pyrrhocoridae.

Agronomically important members from the order Homoptera further include, but are not limited to: *Acyrthisiphon pisum* Harris (pea aphid); *Aphis craccivora* Koch (cowpea aphid); *A. fabae* Scopoli (black bean aphid); *A. gossypii* Glover (cotton aphid, melon aphid); *A. maidiradicis* Forbes (corn root aphid); *A. pomi* De Geer (apple aphid); *A. spiraecola* Patch (spirea aphid); *Aulacorthum solani* Kaltenbach (foxglove aphid); *Chaetosiphon fragaefolii* Cockerell (strawberry aphid); *Diuraphis noxia* Kurdjumov/Mordvilko (Russian wheat aphid); *Dysaphis plantaginea* Paaserini (rosy apple aphid); *Eriosoma lanigerum* Hausmann (woolly apple aphid); *Brevicoryne brassicae* Linnaeus (cabbage aphid); *Hyalopterus pruni* Geoffroy (mealy plum aphid); *Lipaphis erysimi* Kaltenbach (turnip aphid); *Metopolophium dirrhodum* Walker (cereal aphid); *Macrosiphum euphorbiae* Thomas (potato aphid); *Myzus persicae* Sulzer (peach potato aphid, green peach aphid); *Nasonovia ribisnigri* Mosley (lettuce aphid); *Pemphigus* spp. (root aphids and gall aphids); *Rhopalosiphum maidis* Fitch (corn leaf aphid); *R. padi* Linnaeus (bird cherry-oat aphid); *Schizaphis graminum* Rondani (greenbug); *Sipha flava* Forbes (yellow sugarcane aphid); *Sitobion avenae* Fabricius (English grain aphid); *Therioaphis maculata* Buckton (spotted alfalfa aphid); *Toxoptera aurantii* Boyer de Fonscolombe (black citrus aphid) and *T. citricida* Kirkaldy (brown citrus aphid); *Melanaphis sacchari* (sugarcane aphid); *Adelges* spp. (adelgids); *Phylloxera devastatrix* Pergande (pecan *phylloxera*); *Bemisia tabaci* Gennadius (tobacco whitefly, sweetpotato whitefly); *B. argentifolii* Bellows & Perring (silverleaf whitefly); *Dialeurodes citri* Ashmead (citrus whitefly); *Trialeurodes* abutiloneus (bandedwinged whitefly) and *T. vaporariorum* Westwood (greenhouse whitefly); *Empoasca fabae* Harris (potato leafhopper); *Laodelphax striatellus* Fallen (smaller brown planthopper); *Macrolestes quadrilineatus* Forbes (aster leafhopper); *Nephotettix cinticeps* Uhler (green leafhopper); *N. nigropictus* Stal (rice leafhopper); *Nilaparvata lugens* Stal (brown planthopper); *Peregrinus maidis* Ashmead (corn planthopper); *Sogatella furcifera* Horvath (white backed planthopper); *Sogatodes orizicola* Muir (rice delphacid); *Typhlocyba pomaria* McAtee (white apple leafhopper); *Erythroneoura* spp. (grape leafhoppers); *Magicicada septendecim* Linnaeus (periodical cicada); *Icerya purchasi* Maskell (cottony cushion scale); *Quadraspidiotus perniciosus* Comstock (San Jose scale); *Planococcus citri* Risso (citrus mealybug); Pseudococcus spp. (other mealybug complex); *Cacopsylla pyricola* Foerster (pear *psylla*); *Trioza diospyri* Ashmead (persimmon *psylla*).

Species from the order Hemiptera include, but are not limited to: *Acrosternum hilare* Say (green stink bug); *Anasa tristis* De Geer (squash bug); *Blissus leucopterus leucopterus* Say (chinch bug); *Corythuca gossypii* Fabricius (cotton lace bug); *Cyrtopeltis modesta* Distant (tomato bug); *Dysdercus suturellus* Herrich-Schaffer (cotton stainer); *Euschistus servus* Say (brown stink bug); *E. variolarius* Palisot de Beauvais (one spotted stink bug); *Graptostethus* spp. (complex of seed bugs); *Leptoglossus corculus* Say (leaf footed pine seed bug); *Lygus lineolaris* Palisot de Beauvais (tarnished plant bug); *L. Hesperus* Knight (Western tarnished plant bug); *L. pratensis* Linnaeus (common meadow bug); *L. rugulipennis* Poppius (European tarnished plant bug); *Lygocoris pabulinus* Linnaeus (common green capsid); *Nezara viridula* Linnaeus (southern green stink bug); *Oebalus pugnax* Fabricius (rice stink bug); *Oncopeltus fasciatus* Dallas (large milk-weed bug); *Pseudatomoscelis seriatus* Reuter (cotton flea hopper).

Hemiptera such as, *Calocoris norvegicus* Gmelin (strawberry bug); *Orthops campestris* Linnaeus; *Plesiocoris rugicollis* Fallen (apple capsid); *Cyrtopeltis modestus* Distant (tomato bug); *Cyrtopeltis notatus* Distant (suckfly); *Spanagonicus albofasciatus* Reuter (whitemarked fleahopper); *Diaphnocoris chlorionis* Say (honeylocust plant bug); *Labopidicola allii* Knight (onion plant bug); *Pseudatomoscelis seriatus* Reuter (cotton fleahopper); *Adelphocoris rapidus* Say (rapid plant bug); *Poecilocapsus lineatus* Fabricius (four lined plant bug); *Nysius ericae* Schilling (false chinch bug); *Nysius raphanus* Howard (false chinch bug); *Nezara viridula* Linnaeus (Southern green stink bug); *Eurygaster* spp.; Coreidae spp.; Pyrrhocoridae spp.; Tinidae spp.; Blostomatidae spp.; Reduviidae spp. and Cimicidae spp.

Adults and larvae of the order Acari (mites) such as *Aceria tosichella* Keifer (wheat curl mite); *Petrobia latens* Muller (brown wheat mite); spider mites and red mites in the family Tetranychidae, *Panonychus ulmi* Koch (European red mite); *Tetranychus urticae* Koch (two spotted spider mite); (*T. mcdanieli* McGregor (McDaniel mite); *T. cinnabarinus* Boisduval (carmine spider mite); *T. turkestani* Ugarov & Nikolski (strawberry spider mite); flat mites in the family Tenuipalpidae, *Brevipalpus lewisi* McGregor (citrus flat mite); rust and bud mites in the family Eriophyidae and other foliar feeding mites and mites important in human and animal health, i.e., dust mites in the family Epidermoptidae, follicle mites in the family Demodicidae, grain mites in the family Glycyphagidae, ticks in the order Ixodidae. *Ixodes scapularis* Say (deer tick); *I. holocyclus* Neumann (Australian paralysis tick); *Dermacentor variabilis* Say (American dog tick); *Amblyomma americanum* Linnaeus (lone star tick) and scab and itch mites in the families Psoroptidae, Pyemotidae and Sarcoptidae.

Insect pests of the order Thysanura, such as *Lepisma saccharina* Linnaeus (silverfish); *Thermobia domestica* Packard (firebrat).

Additional arthropod pests include: spiders in the order Araneae such as *Loxosceles reclusa* Gertsch and Mulaik (brown recluse spider) and the *Latrodectus mactans* Fabricius (black widow spider) and centipedes in the order Scutigeromorpha such as *Scutigera coleoptrata* Linnaeus (house centipede).

Superfamily of stink bugs and other related insects including but not limited to species belonging to the family Pentatomidae (*Nezara viridula, Halyomorpha halys, Piezodorus guildini, Euschistus servus, Acrosternum hilare, Euschistus heros, Euschistus tristigmus, Acrosternum hilare, Dichelops furcatus, Dichelops melacanthus*, and *Bagrada hilaris* (*Bagrada* Bug)), the family Plataspidae (*Megacopta cribraria*-Bean plataspid) and the family Cydnidae (*Scaptocoris castanea*-Root stink bug) and Lepidoptera species including but not limited to: diamond-back moth, e.g., *Helicoverpa zea* Boddie; soybean looper, e.g., *Pseudoplusia includens* Walker and velvet bean caterpillar e.g., *Anticarsia gemmatalis* Huber.

Nematodes include parasitic nematodes such as root-knot, cyst and lesion nematodes, including *Heterodera* spp., *Meloidogyne* spp. and *Globodera* spp.; particularly members of the cyst nematodes, including, but not limited to, *Heterodera glycines* (soybean cyst nematode); *Heterodera schachtii* (beet cyst nematode); *Heterodera avenae* (cereal cyst nematode) and *Globodera rostochiensis* and *Globodera pailida* (potato cyst nematodes). Lesion nematodes include *Pratylenchus* spp.

Pesticidal Compositions Comprising a Pesticide and Microbe of the Disclosure

As aforementioned, agricultural compositions of the disclosure, which may comprise any microbe taught herein, are sometimes combined with one or more pesticides. Pesticides can include herbicides, insecticides, fungicides, nematicides, etc.

In some embodiments the pesticides/microbial combinations can be applied in the form of compositions and can be applied to the crop area or plant to be treated, simultaneously or in succession, with other compounds. These compounds can be fertilizers, weed killers, cryoprotectants, surfactants, detergents, pesticidal soaps, dormant oils, polymers, and/or time release or biodegradable carrier formulations that permit long term dosing of a target area following a single application of the formulation. They can also be selective herbicides, chemical insecticides, virucides, microbicides, amoebicides, pesticides, fungicides, bacteriocides, nematicides, molluscicides or mixtures of several of these preparations, if desired, together with further agriculturally acceptable carriers, surfactants or application promoting adjuvants customarily employed in the art of formulation. Suitable carriers (i.e. agriculturally acceptable carriers) and adjuvants can be solid or liquid and correspond to the substances ordinarily employed in formulation technology, e.g. natural or regenerated mineral substances, solvents, dispersants, wetting agents, sticking agents, tackifiers, binders or fertilizers. Likewise the formulations may be prepared into edible baits or fashioned into pest traps to permit feeding or ingestion by a target pest of the pesticidal formulation.

Exemplary chemical compositions, which may be combined with the microbes of the disclosure, include:

Fruits/Vegetables Herbicides: Atrazine, Bromacil, Diuron, Glyphosate, Linuron, Metribuzin, Simazine, Trifluralin, Fluazifop, Glufosinate, Halo sulfuron Gowan, Paraquat, Propyzamide, Sethoxydim, Butafenacil, Halosulfuron, Indaziflam; Fruits/Vegetables Insecticides: Aldicarb, *Bacillus thuringiensis*, Carbaryl, Carbofuran, Chlorpyrifos, Cypermethrin, Deltamethrin, Diazinon, Malathion, Abamectin, Cyfluthrin/betacyfluthrin, Esfenvalerate, Lambda-cyhalothrin, Acequinocyl, Bifenazate, Methoxyfenozide, Novaluron, Chromafenozide, Thiacloprid, Dinotefuran, FluaCrypyrim, Tolfenpyrad, Clothianidin, Spirodiclofen, Gamma-cyhalothrin, Spiromesifen, Spinosad, Rynaxypyr, Cyazypyr, Spinoteram, Triflumuron, Spirotetramat, Imidacloprid, Flubendiamide, Thiodicarb, Metaflumizone, Sulfoxaflor, Cyflumetofen, Cyanopyrafen, Imidacloprid, Clothianidin, Thiamethoxam, Spinotoram, Thiodicarb, Flonicamid, Methiocarb, Emamectin benzoate, Indoxacarb, Forthiazate, Fenamiphos, Cadusaphos, Pyriproxifen, Fenbutatin oxide, Hexthiazox, Methomyl, 4-[[(6-Chlorpyridin-3-yl)methyl](2, 2-difluorethyl)amino]furan-2(5H)-on; Fruits Vegetables Fungicides: Carbendazim, Chlorothalonil, EBDCs, Sulphur, Thiophanate-methyl, Azoxystrobin, Cymoxanil, Fluazinam, Fosetyl, Iprodione, Kresoxim-methyl, Metalaxyl/mefenoxam, Trifloxystrobin, Ethaboxam, Iprovalicarb, Trifloxystrobin, Fenhexamid, Oxpoconazole fumarate, Cyazofamid, Fenamidone, Zoxamide, Picoxystrobin, Pyraclostrobin, Cyflufenamid, Boscalid;

Cereals Herbicides: Isoproturon, Bromoxynil, loxynil, Phenoxies, Chlorsulfuron, Clodinafop, Diclofop, Diflufenican, Fenoxaprop, Florasulam, Fluoroxypyr, Metsulfuron, Triasulfuron, Flucarbazone, lodosulfuron, Propoxycarbazone, Picolin-afen, Mesosulfuron, Beflubutamid, Pinoxaden, Amidosulfuron, Thifensulfuron Methyl, Tribenuron, Flupyrsulfuron, Sulfosulfuron, Pyrasulfotole, Pyroxsulam, Flufenacet, Tralkoxydim, Pyroxasulfon; Cereals Fungicides: Carbendazim, Chlorothalonil, Azoxystrobin, Cyproconazole, Cyprodinil, Fenpropimorph, Epoxiconazole, Kresoxim-methyl, Quinoxyfen, Tebuconazole, Trifloxystrobin, Simeconazole, Picoxystrobin, Pyraclostrobin, Dimoxystrobin, Prothioconazole, Fluoxastrobin; Cereals Insecticides: Dimethoate, Lambda-cyhalothrin, Deltamethrin, alpha-Cypermethrin, β-cyfluthrin, Bifenthrin, Imidacloprid, Clothianidin, Thiamethoxam, Thiacloprid, Acetamiprid, Dinetofuran, Clorphyriphos, Metamidophos, Oxidemethon methyl, Pirimicarb, Methiocarb;

Maize Herbicides: Atrazine, Alachlor, Bromoxynil, Acetochlor, Dicamba, Clopyralid, S-Dimethenamid, Glufosinate, Glyphosate, Isoxaflutole, S-Metolachlor, Mesotrione, Nicosulfuron, Primisulfuron, Rimsulfuron, Sulcotrione, Foramsulfuron, Topramezone, Tembotrione, Saflufenacil, Thiencarbazone, Flufenacet, Pyroxasulfon; Maize Insecticides: Carbofuran, Chlorpyrifos, Bifenthrin, Fipronil, Imidacloprid, Lambda-Cyhalothrin, Tefluthrin, Terbufos, Thiamethoxam, Clothianidin, Spiromesifen, Flubendiamide, Triflumuron, Rynaxypyr, Deltamethrin, Thiodicarb, β-Cyfluthrin, Cypermethrin, Bifenthrin, Lufenuron, Triflumoron, Tefluthrin, Tebupirim-phos, Ethiprole, Cyazypyr, Thiacloprid, Acetamiprid, Dinetofuran, Avermectin, Methiocarb, Spirodiclofen, Spirotetramat; Maize Fungicides: Fenitropan, Thiram, Prothioconazole, Tebuconazole, Trifloxystrobin;

Rice Herbicides: Butachlor, Propanil, Azimsulfuron, Bensulfuron, Cyhalo-fop, Daimuron, Fentrazamide, Imazosulfuron, Mefenacet, Oxaziclomefone, Pyrazosulfuron, Pyributicarb, Quinclorac, Thiobencarb, Indanofan, Flufenacet, Fentrazamide, Halosulfuron, Oxaziclomefone, Benzobicyclon, Pyriftalid, Penoxsulam, Bispyribac, Oxadiargyl, Ethoxysulfuron, Pretilachlor, Mesotrione, Tefuryltrione, Oxadiazone, Fenoxaprop, Pyrimisulfan; Rice Insecticides: Diazinon, Fenitro-thion, Fenobucarb, Monocrotophos, Benfuracarb, Buprofezin, Dinotefuran, Fipronil, Imidacloprid, Isoprocarb, Thiacloprid, Chromafenozide, Thiacloprid, Dinotefuran, Clothianidin, Ethiprole, Flubendiamide, Rynaxypyr, Deltamethrin, Acetamiprid, Thiamethoxam, Cyazypyr, Spinosad, Spinotoram, Emamectin-Benzoate, Cypermethrin, Chlorpyriphos, Cartap, Methamidophos, Etofen-prox, Triazophos, 4-[[(6-Chlorpyridin-3-yOmethyl] (2,2-difluorethy)amino]furan-2(5H)-on, Carbofuran, Benfuracarb; Rice Fungicides: Thiophanate-methyl, Azoxystrobin, Carpropamid, Edifenphos, Ferimzone, Iprobenfos, Isoprothiolane, Pencycuron, Probenazole, Pyroquilon, Tricyclazole, Trifloxystrobin, Diclocymet, Fenoxanil, Simeconazole, Tiadinil;

Cotton Herbicides: Diuron, Fluometuron, MSMA, Oxyfluorfen, Prometryn, Trifluralin, Carfentrazone, Clethodim, Fluazifop-butyl, Glyphosate, Norflurazon, Pendimethalin, Pyrithiobac-sodium, Trifloxysulfuron, Tepraloxydim, Glufosinate, Flumioxazin, Thidiazuron; Cotton Insecticides: Acephate, Aldicarb, Chlorpyrifos, Cypermethrin, Deltamethrin, Malathion, Monocrotophos, Abamectin, Acetamiprid, Emamectin Benzoate, Imidacloprid, Indoxacarb, Lambda-Cyhalothrin, Spinosad, Thiodicarb, Gamma-Cyhalothrin, Spiromesifen, Pyridalyl, Flonicamid, Flubendiamide, Triflumuron, Rynaxypyr, Beta-Cyfluthrin, Spirotetramat, Clothianidin, Thiamethoxam, Thiacloprid, Dinetofuran, Flubendiamide, Cyazypyr, Spinosad, Spinotoram, gamma Cyhalothrin, 4-[[(6-Chlorpyridin-3-yl) methyl](2,2-difluorethyl)amino]furan-2(5H)-on, Thiodicarb, Avermectin, Flonicamid, Pyridalyl, Spiromesifen, Sulfoxaflor, Profenophos, Thriazophos, Endosulfan; Cotton Fungicides: Etridiazole, Metalaxyl, Quintozene;

Soybean Herbicides: Alachlor, Bentazone, Trifluralin, Chlorimuron-Ethyl, Cloransulam-Methyl, Fenoxaprop, Fomesafen, Flu-azifop, Glyphosate, Imazamox, Imazaquin, Imazethapyr, (S-) Metolachlor, Metribuzin, Pendimethalin, Tepraloxydim, Glufosinate; Soybean Insecticides: Lambda-cyhalothrin, Methomyl, Parathion, Thiocarb, Imidacloprid, Clothianidin, Thiamethoxam, Thiacloprid, Acetamiprid, Dinetofuran, Flubendiamide, Rynaxypyr, Cyazypyr, Spinosad, Spinotoram, Emamectin-Benzoate, Fipronil, Ethiprole, Deltamethrin, β-Cyfluthrin, gamma and lambda Cyhalothrin, 4-[[(6-Chlorpyridin-3-yl)methyl] (2,2-difluorethyl)amino]furan-2(5H)-on, Spirotetramat, Spinodiclofen, Triflumuron, Flonicamid, Thiodicarb, beta-Cyfluthrin; Soybean Fungicides: Azoxystrobin, Cyproconazole, Epoxiconazole, Flutriafol, Pyraclostrobin, Tebuconazole, Trifloxystrobin, Prothioconazole, Tetraconazole;

Sugarbeet Herbicides: Chloridazon, Desmedipham, Ethofumesate, Phenmedipham, Triallate, Clopyralid, Fluazifop, Lenacil, Metamitron, Quinmerac, Cycloxydim, Triflusulfuron, Tepral-oxydim, Quizalofop; Sugarbeet Insecticides: Imidacloprid, Clothianidin, Thiamethoxam, Thiacloprid, Acetamiprid, Dinetofuran, Deltamethrin, β-Cyfluthrin, gamma/lambda Cyhalothrin, 4-[[(6-Chlorpyridin-3-yl) methyl](2,2-difluor-ethyl)amino]furan-2(5H)-on, Tefluthrin, Rynaxypyr, Cyaxypyr, Fipronil, Carbofuran;

Canola Herbicides: Clopyralid, Diclofop, Fluazifop, Glufosinate, Glyphosate, Metazachlor, Trifluralin Ethametsulfuron, Quinmerac, Quizalofop, Clethodim, Tepraloxydim; Canola Fungicides: Azoxystrobin, Carbendazim, Fludioxonil, Iprodione, Prochloraz, Vinclozolin; Canola Insecticides: Carbofuran organophos-phates, Pyrethroids, Thiacloprid, Deltamethrin, Imidacloprid, Clothianidin, Thiamethoxam, Acetamiprid, Dineto-furan, β-Cyfluthrin, gamma and lambda Cyhalothrin, tau-Fluvaleriate, Ethiprole, Spinosad, Spinotoram, Flubendiamide, Rynaxypyr, Cyazypyr, 4-[[(6-Chlorpyridin-3-yOmethyl] (2,2-difluorethyl) amino] furan-2(5H)-on.

Insecticidal Compositions Comprising an Insecticide and Microbe of the Disclosure As aforementioned, agricultural compositions of the disclosure, which may comprise any microbe taught herein, are sometimes combined with one or more insecticides.

In some embodiments, insecticidal compositions may be included in the compositions set forth herein, and can be applied to a plant(s) or a part(s) thereof simultaneously or in succession, with other compounds. Insecticides include ammonium carbonate, aqueous potassium silicate, boric acid, copper sulfate, elemental sulfur, lime sulfur, sucrose octanoate esters, 4-[[(6-Chlorpyridin-3-yl)methyl](2, 2-difluorethyl)amino]furan-2(5H)-on, abamectin, notenone, fenazaquin, fenpyroximate, pyridaben, pyrimedifen, tebufenpyrad, tolfenpyrad, acephate, emamectin benzoate, lepimectin, milbemectin, hdroprene, kinoprene, methoprene, fenoxycarb, pyriproxyfen, methryl bromide and other alkyl halides, fulfuryl fluoride, chloropicrin, borax, disodium octaborate, sodium borate, sodium metaborate, tartar emetic, dazomet, metam, pymetrozine, pyrifluquinazon, flofentezine, diflovidazin, hexythiazox, bifenazate, thiamethoxam, imidacloprid, fenpyroximate, azadirachtin, permethrin, esfenvalerate, acetamiprid, bifenthrin, indoxacarb, azadirachtin, pyrethrin, imidacloprid, beta-cyfluthrin, sulfotep, tebupirimfos, temephos, terbufos, tetrachlorvinphos, thiometon, triazophos, alanycarb, aldicarb, bendiocarb, benfluracarb, butocarboxim, butoxycarboxim, carbaryl, carbofuran, carbosulfan, ethiofencarb, fenobucarb, formetanate, furathiocarb, isoprocarb, methiocarb, methymyl, metolcarb, oxamyl, primicarb, propoxur, thiodicarb, thiofanox, triazamate, trimethacarb, XMC, xylylcarb, acephate, azamethiphos, azinphos-ethyl, azinphos-methyl, cadusafos, chlorethoxyfox, trichlorfon, vamidothion, chlordane, endosulfan, ethiprole, fipronil, acrinathrin, allethrin, bifenthrin, bioallethrin, bioalletherin X-cyclopentenyl, bioresmethrin, cyclorothrin, cyfluthrin, cyhalothrin, cypermethrin, cyphenothrin [(1R)-trans-isomers], deltamethrin, empenthrin [(EZ)-(1R)-isomers], esfenvalerate, etofenprox, fenpropathrin, fenvalerate, flucythrinate, flumethrin, halfenprox, kadathrin, phenothrin [(1R)-trans-isomer] prallethrin, pyrethrins (pyrethrum), resmethrin, silafluofen, tefluthrin, tetramethrin, tetramethrin [(1R)-isomers], tralomethrin, transfluthrin, alpha-cypermethrin, beta-cyfluthrin, beta-cypermethrin, d-cis-trans allethrin, d-trans allethrin, gamma-cyhalothrin, lamda-cyhalothrin, tau-fluvalinate, theta-cypermethrin, zeta-cypermethrin, methoxychlor, nicotine, sulfoxaflor, acetamiprid, clothianidin, dinotefuran, imidacloprid, nitenpyram, thiacloprid, thiamethoxan, tebuprimphos, beta-cyfluthrin, clothianidin, flonicamid, hydramethylnon, amitraz, flubendiamide, blorantraniliprole, lambda cyhalothrin, spinosad, gamma cyhalothrin, *Beauveria bassiana, capsicum* oleoresin extract, garlic oil, carbaryl, chlorpyrifos, sulfoxaflor, lambda cyhalothrin, Chlorfenvinphos, Chlormephos, Chlorpyrifos, Chlorpyrifos-methyl, Coumaphos, Cyanophos, Demeton-S-methyl, Diazinon, Dichlorvos/DDVP, Dicrotophos, Dimethoate, Dimethylvinphos, Disulfoton, EPN, Ethion, Ethoprophos, Famphur, Fenamiphos, Fenitrothion, Fenthion, Fosthiazate, Heptenophos, Imicyafos, Isofenphos, Isopropyl O-(methoxyaminothio-phosphoryl) salicylate, Isoxathion, Malathion, Mecarbam, Methamidophos, Methidathion, Mevinphos, Monocrotophos, Naled, Omethoate, Oxydemeton-methyl, Parathion, Parathion-methyl, Phenthoate, Phorate, Phosalone, Phosmet, Phosphamidon, Phoxim, Pirimiphos-methyl, Profenofos, Propetamphos, Prothiofos, Pyraclofos, Pyridaphenthion, Quinalphosfluacrypyrim, tebufenozide, chlorantraniliprole, *Bacillus thuringiensis* subs. Kurstaki, terbufos, mineral oil, fenpropathrin, metaldehyde, deltamethrin, diazinon, dimethoate, diflubenzuron, pyriproxyfen, reosemary oil, peppermint oil, geraniol, azadirachtin, piperonyl butoxide, cyantraniliprole, alpha cypermethrin, tefluthrin, pymetrozine, malathion, *Bacillus thuringiensis* subsp. *israelensis*, dicofol, bromopropylate, benzoximate, azadirachtin, flonicamid, soybean oil, *Chromobacterium subtsugae* strain PRAA4-1, zeta cypermethrin, phosmet, methoxyfenozide, paraffinic oil, spirotetramat, methomyl, *Metarhizium anisopliae* strain F52, ethoprop, tetradifon, propargite, fenbutatin oxide, azocyclotin, cyhexatin, diafenthiuron, *Bacillus sphaericus*, etoxazole, flupyradifurone, azadirachtin, *Beauveria bassiana*, cyflumetofen, azadirachtin, chinomethionat, acephate, Isaria fumosorosea Apopka strain 97, sodium tetraborohydrate decahydrate, emamectin benzoate, cryolite, spinetoram, *Chenopodium ambrosioides* extract, novaluron, dinotefuran, carbaryl, acequinocyl, flupyradifurone, iron phosphate, kaolin, buprofezin, cyromazine, chromafenozide, halofenozide, methoxyfenozide, tebufenozide, bistrifluron, chlorfluazuron, diflubenzuron, flucycloxuron, flufenoxuron, hexaflumuron, lufenuron, nocaluron, noviflumuron, teflubenzuron, triflumuron, bensultap, cartap hydrochloride, thiocyclam, thiosultap-sodium, DNOC, chlorfenapyr, sulfuramid, phorate, tolfenpyrad, sulfoxaflor, neem oil, *Bacillus thuringiensis* subsp. tenebrionis strain SA-10, cyromazine, heat-killed *Burkholderia* spp., cyantraniliprole, cyenopyrafen, cyflumetofen, sodium cyanide, potassium cyanide, calcium cyanide, aluminum phosphide, calcium phosphide, phosphine, zinc phosphide, spriodiclofen, spiromesifen, spirotetramat, metaflumizone, flubendiamide, pyflubumide, oxamyl, *Bacillus thuringiensis* subsp. *aizawai*, etoxazole, and esfenvalerate

TABLE 9

Exemplary insecticides associated with various modes of action, which can be combined with microbes of the disclosure

| Mode of Action | Compound class | Exemplary insecticides | Physiological function(s) affected |
|---|---|---|---|
| acetylcholinesterase (AChE) inhibitors | carbamates | Alanycarb, Aldicarb, Bendiocarb, Benfuracarb, Butocarboxim, Butoxycarboxim, Carbaryl, Carbofuran, Carbosulfan, Ethiofencarb, Fenobucarb, Formetanate, Furathiocarb, Isoprocarb, Methiocarb, Methomyl, Metolcarb, Oxamyl, Pirimicarb, Propoxur, Thiodicarb, Thiofanox, Triazamate, Trimethacarb, XMC, Xylylcarb | Nerve and muscle |
| acetylcholinesterase (AChE) inhibitors | organophosphates | Acephate, Azamethiphos, Azinphos-ethyl, Azinphos-methyl, Cadusafos, Chlorethoxyfos, Chlorfenvinphos, Chlormephos, Chlorpyrifos, Chlorpyrifos-methyl, Coumaphos, Cyanophos, Demeton-S-methyl, Diazinon, Dichlorvos/DDVP, Dicrotophos, Dimethoate, Dimethylvinphos, Disulfoton, EPN, Ethion, Ethoprophos, Famphur, Fenamiphos, Fenitrothion, Fenthion, Fosthiazate, Heptenophos, Imicyafos, Isofenphos, Isopropyl O-(methoxyaminothio-phosphoryl) salicylate, Isoxathion, Malathion, Mecarbam, Methamidophos, Methidathion, Mevinphos, | Nerve and muscle |

TABLE 9-continued

| Exemplary insecticides associated with various modes of action, which can be combined with microbes of the disclosure | | | |
|---|---|---|---|
| Mode of Action | Compound class | Exemplary insecticides | Physiological function(s) affected |
| | | Monocrotophos, Naled, Omethoate, Oxydemeton-methyl, Parathion, Parathion-methyl, Phenthoate, Phorate, Phosalone, Phosmet, Phosphamidon, Phoxim, Pirimiphos-methyl, Profenofos, Propetamphos, Prothiofos, Pyraclofos, Pyridaphenthion, Quinalphos, Sulfotep, Tebupirimfos, Temephos, Terbufos, Tetrachlorvinphos, Thiometon, Triazophos, Trichlorfon, Vamidothion | |
| GABA-gated chloride channel blockers | cyclodiene organochlorines | Chlordane, Endosulfan | Nerve and muscle |
| GABA-gated chloride channel blockers | phenylpyrazoles (Fiproles) | Ethiprole, Fipronil | Nerve and muscle |
| sodium channel modulators | pyrethroids, pyrethrins | Acrinathrin, Allethrin, Bifenthrin, Bioallethrin, Bioallethrin S-cyclopentenyl, Bioresmethrin, Cycloprothrin, Cyfluthrin, Cyhalothrin, Cypermethrin, Cyphenothrin [(1R)-trans- isomers], Deltamethrin, Empenthrin [(EZ)-(1R)- isomers], Esfenvalerate, Etofenprox, Fenpropathrin, Fenvalerate, Flucythrinate, Flumethrin, Halfenprox, Kadathrin, Phenothrin [(1R)-trans-isomer], Prallethrin, Pyrethrins (pyrethrum), Resmethrin, Silafluofen, Tefluthrin, Tetramethrin, Tetramethrin [(1R)-isomers], Tralomethrin, Transfluthrin, alpha-Cypermethrin, beta-Cyfluthrin, beta-Cypermethrin, d-cis-trans Allethrin, d-trans Allethrin, gamma-Cyhalothrin, lambda-Cvhalothrin, tau-Fluvalinate, theta-Cypermethrin, zeta-Cypermethrin | Nerve and muscle |

TABLE 9-continued

Exemplary insecticides associated with various modes of action, which can be combined with microbes of the disclosure

| Mode of Action | Compound class | Exemplary insecticides | Physiological function(s) affected |
|---|---|---|---|
| sodium channel modulators | DDT, methoxychlor | DDT, methoxychlor | Nerve and muscle |
| nicotinic acetylcholine receptor (nAChR) competitive modulators | neonicotinoids | Acetamiprid, Clothianidin, Dinotefuran, Imidacloprid, Nitenpyram, Thiacloprid, Thiamethoxam | Nerve and muscle |
| nicotinic acetylcholine receptor (nAChR) competitive modulators | nicotine | nicotine | Nerve and muscle |
| nicotinic acetylcholine receptor (nAChR) competitive modulators | sulfoximines | sulfoxaflor | Nerve and muscle |
| nicotinic acetylcholine receptor (nAChR) competitive modulators | butenolides | Flupyradifurone | Nerve and muscle |
| nicotinic acetylcholine receptor (nAChR) allosteric modulators | spinosyns | Spinetoram, Spinosad | Nerve and muscle |
| Glutamate-gated chloride channel (GluCl) allosteric modulators | avermectins, milbemycins | Abamectin, Emamectin benzoate, Lepimectin, Milbemectin | Nerve and muscle |
| juvenile hormone mimics | juvenile hormone analogues | Hydroprene, Kinoprene, Methoprene | Growth |
| juvenile hormone mimics | Fenoxycarb | Fenoxycarb | Growth |
| juvenile hormone mimics | Pyriproxyfen | Pyriproxyfen | Growth |
| miscellaneous non-specific (multi-site) inhibitors | alkyl halides | Methyl bromide and other alkyl halides | Unknown or non-specific |
| miscellaneous non-specific (multi-site) inhibitors | Chloropicrin | Chloropicrin | Unknown or non-specific |
| miscellaneous non-specific (multi-site) inhibitors | fluorides | Cryolite, sulfuryl fluoride | Unknown or non-specific |
| miscellaneous non-specific (multi-site) inhibitors | borates | Borax, Boric acid, Disodium octaborate, Sodium borate, Sodium metaborate | Unknown or non-specific |
| miscellaneous non-specific (multi-site) inhibitors | tartar emetic | tartar emetic | Unknown or non-specific |
| miscellaneous non-specific (multi-site) inhibitors | methyl isothiocyanate generators | Dazomet, Metam | Unknown or non-specific |
| modulators of chordotonal organs | Pyridine azomethine derivatives | Pymetrozine, Pyrifluquinazon | Nerve and muscle |
| mite growth inhibitors | Clofentezine, Diflovidazin, Hexythiazox | Clofentezine, Diflovidazin, Hexythiazox | Growth |
| mite growth inhibitors | Etoxazole | Etoxazole | Growth |
| microbial disruptors of insect midgut membranes | *Bacillus thuringiensis* and the insecticidal proteins they produce | Bt var. *aizawai*, Bt var. *israelensis*, Bt var. *kurstaki*, Bt var. *tenebrionensis* | Midgut |

TABLE 9-continued

| Exemplary insecticides associated with various modes of action, which can be combined with microbes of the disclosure | | | |
|---|---|---|---|
| Mode of Action | Compound class | Exemplary insecticides | Physiological function(s) affected |
| microbial disruptors of insect midgut membranes | *Bacillus sphaericus* | *Bacillus sphaericus* | Midgut |
| inhibitors of mitochondrial ATP synthase | Diafenthiuron | Diafenthiuron | Respiration |
| inhibitors of mitochondrial ATP synthase | organotin miticides | Azocyclotin, Cyhexatin, Fenbutatin oxide | Respiration |
| inhibitors of mitochondrial ATP synthase | Propargite | Propargite | Respiration |
| inhibitors of mitochondrial ATP synthase | Tetradifon | Tetradifon | Respiration |
| uncouplers of oxidative phosphorylation via disruption of the proton gradient | Chlorfenapyr, DNOC, Sulfuramid | Chlorfenapyr, DNOC, Sulfuramid | Respiration |
| Nicotinic acetylcholine receptor (nAChR) channel blockers | nereistoxin analogues | Bensultap, Cartap hydrochloride, Thiocyclam, Thiosultap-sodium | Nerve and muscle |
| inhibitors of chitin biosynthesis, type 0 | benzoylureas | Bistrifluron, Chlorfluazuron, Diflubenzuron, Flucycloxuron, Flufenoxuron, Hexaflumuron, Lufenuron, Novaluron, Noviflumuron, Teflubenzuron, Triflumuron | Growth |
| inhibitors of chitin biosynthesis, type 1 | Buprofezin | Buprofezin | Growth |
| moulting disruptor, Dipteran | Cyromazine | Cyromazine | Growth |
| ecdysone receptor agonists | diacylhydrazines | Chromafenozide, Halofenozide, Methoxyfenozide, Tebufenozide | Growth |
| octopamine receptor agonists | Amitraz | Amitraz | Nerve and muscle |
| mitochondrial complex III electron transport inhibitors | Hydramethylnon | Hydramethylnon | Respiration |
| mitochondrial complex III electron transport inhibitors | Acequinocyl | Acequinocyl | Respiration |
| mitochondrial complex III electron transport inhibitors | Fluacrypyrim | Fluacrypyrim | Respiration |
| mitochondrial complex III electron transport inhibitors | Bifenazate | Bifenazate | Respiration |
| mitochondrial complex I electron transport inhibitors | Meti acaricides and insecticides | Fenazaquin, Fenpyroximate, Pyridaben, Pyrimidifen, Tebufenpyrad, Tolfenpyrad | Respiration |
| mitochondrial complex I electron transport inhibitors | Rotenone | Rotenone | Respiration |
| voltage-dependent sodium channel blockers | oxadiazines | Indoxacarb | Nerve and muscle |

TABLE 9-continued

Exemplary insecticides associated with various modes of action, which can be combined with microbes of the disclosure

| Mode of Action | Compound class | Exemplary insecticides | Physiological function(s) affected |
|---|---|---|---|
| voltage-dependent sodium channel blockers | semicarbazones | Metaflumizone | Nerve and muscle |
| inhibitors of acetyl CoA carboxylase | tetronic and tetramic acid derivatives | Spirodiclofen, Spiromesifen, Spirotetramat | Growth |
| mitochondrial complex IV electron transport inhibitors | phosphides | Aluminium phosphide, Calcium phosphide, Phosphine, Zinc phosphide | Respiration |
| mitochondrial complex IV electron transport inhibitors | cyanides | Calcium cyanide, Potassium cyanide, Sodium cyanide | Respiration |
| mitochondrial complex II electron transport inhibitors | beta-ketonitrile derivatives | Cyenopyrafen, Cyflumetofen | Respiration |
| mitochondrial complex II electron transport inhibitors | carboxanilides | Pyflubumide | Respiration |
| ryanodine receptor modulators | diamides | Chlorantraniliprole, Cyantraniliprole, Flubendiamide | Nerve and muscle |
| Chordotonal organ modulators - undefined target site | Flonicamid | Flonicamid | Nerve and muscle |
| compounds of unknown or uncertain mode of action | Azadirachtin | Azadirachtin | Unknown |
| compounds of unknown or uncertain mode of action | Benzoximate | Benzoximate | Unknown |
| compounds of unknown or uncertain mode of action | Bromopropylate | Bromopropylate | Unknown |
| compounds of unknown or uncertain mode of action | Chinomethionat | Chinomethionat | Unknown |
| compounds of unknown or uncertain mode of action | Dicofol | Dicofol | Unknown |
| compounds of unknown or uncertain mode of action | lime sulfur | lime sulfur | Unknown |
| compounds of unknown or uncertain mode of action | Pyridalyl | Pyridalyl | Unknown |
| compounds of unknown or uncertain mode of action | sulfur | sulfur | Unknown |

TABLE 10

Exemplary list of pesticides, which can be combined with microbes of the disclosure

| Category | Compounds |
|---|---|
| INSECTICIDES | |
| arsenical insecticides | calcium arsenate |
| | copper acetoarsenite |
| | copper arsenate |
| | lead arsenate |
| | potassium arsenite |
| | sodium arsenite |
| botanical insecticides | allicin |
| | anabasine |
| | azadirachtin |
| | carvacrol |
| | d-limonene |
| | matrine |
| | nicotine |
| | nornicotine |
| | oxymatrine |
| | pyrethrins |
| | cinerins |
| | cinerin I |
| | cinerin II |
| | jasmolin I |
| | jasmolin II |
| | pyrethrin I |
| | pyrethrin II |
| | quassia |
| | rhodojaponin-III |
| | rotenone |
| | ryania |
| | sabadilla |
| | sanguinarine |
| | triptolide |
| carbamate insecticides | bendiocarb |
| | carbaryl |
| benzofuranyl methylcarbamate insecticides | benfuracarb |
| | carbofuran |
| | carbosulfan |
| | decarbofuran |
| | furathiocarb |
| dimethylcarbamate insecticides | dimetan |
| | dimetilan |
| | hyquincarb |
| | isolan |
| | pirimicarb |
| | pyramat |
| | pyrolan |
| oxime carbamate insecticides | alanycarb |
| | aldicarb |
| | aldoxycarb |
| | butocarboxim |
| | butoxycarboxim |
| | methomyl |
| | nitrilacarb |
| | oxamyl |
| | tazimcarb |
| | thiocarboxime |
| | thiodicarb |
| | thiofanox |
| phenyl methylcarbamate insecticides | allyxycarb |
| | aminocarb |
| | bufencarb |
| | butacarb |
| | carbanolate |
| | cloethocarb |
| | CPMC |
| | dicresyl |
| | dimethacarb |
| | dioxacarb |
| | EMPC |
| | ethiofencarb |
| | fenethacarb |
| | fenobucarb |
| | isoprocarb |
| | methiocarb |
| | metolcarb |

TABLE 10-continued

Exemplary list of pesticides, which can be combined with microbes of the disclosure

| Category | Compounds |
|---|---|
| | mexacarbate |
| | promacyl |
| | promecarb |
| | propoxur |
| | trimethacarb |
| | XMC |
| | xylylcarb |
| diamide insecticides | broflanilide |
| | chlorantraniliprole |
| | cyantraniliprole |
| | cyclaniliprole |
| | cyhalodiamide |
| | flubendiamide |
| | tetraniliprole |
| dinitrophenol insecticides | dinex |
| | dinoprop |
| | dinosam |
| | DNOC |
| fluorine insecticides | barium hexafluorosilicate |
| | cryolite |
| | flursulamid |
| | sodium fluoride |
| | sodium hexafluorosilicate |
| | sulfluramid |
| formamidine insecticides | amitraz |
| | chlordimeform |
| | formetanate |
| | formparanate |
| | medimeform |
| | semiamitraz |
| fumigant insecticides | acrylonitrile |
| | carbon disulfide |
| | carbon tetrachloride |
| | carbonyl sulfide |
| | chloroform |
| | chloropicrin |
| | cyanogen |
| | para-dichlorobenzene |
| | 1,2-dichloropropane |
| | dithioether |
| | ethyl formate |
| | ethylene dibromide |
| | ethylene dichloride |
| | ethylene oxide |
| | hydrogen cyanide |
| | methyl bromide |
| | methyl iodide |
| | methylchloroform |
| | methylene chloride |
| | naphthalene |
| | phosphine |
| | sodium tetrathiocarbonate |
| | sulfuryl fluoride |
| | tetrachloroethane |
| inorganic insecticides | borax |
| | boric acid |
| | calcium polysulfide |
| | copper oleate |
| | diatomaceous earth |
| | mercurous chloride |
| | potassium thiocyanate |
| | silica gel |
| | sodium thiocyanate |
| insect growth regulators | |
| chitin synthesis inhibitors | buprofezin |
| | cyromazine |
| benzoylphenylurea chitin synthesis inhibitors | bistrifluron |
| | chlorbenzuron |
| | chlorfluazuron |
| | dichlorbenzuron |
| | diflubenzuron |
| | flucycloxuron |
| | flufenoxuron |
| | hexaflumuron |

TABLE 10-continued

| Exemplary list of pesticides, which can be combined with microbes of the disclosure | |
|---|---|
| Category | Compounds |
| | lufenuron |
| | novaluron |
| | noviflumuron |
| | penfluron |
| | teflubenzuron |
| | triflumuron |
| juvenile hormone mimics | dayoutong |
| | epofenonane |
| | fenoxycarb |
| | hydroprene |
| | kinoprene |
| | methoprene |
| | pyriproxyfen |
| | triprene |
| juvenile hormones | juvenile hormone I |
| | juvenile hormone II |
| | juvenile hormone III |
| moulting hormone agonists | chromafenozide |
| | furan tebufenozide |
| | halofenozide |
| | methoxyfenozide |
| | tebufenozide |
| | yishijing |
| moulting hormones | α-ecdysone |
| | ecdysterone |
| moulting inhibitors | diofenolan |
| precocenes | precocene I |
| | precocene II |
| | precocene III |
| unclassified insect growth regulators | dicyclanil |
| macrocyclic lactone insecticides | |
| avermectin insecticides | abamectin |
| | doramectin |
| | emamectin |
| | eprinomectin |
| | ivermectin |
| | selamectin |
| milbemycin insecticides | lepimectin |
| | milbemectin |
| | milbemycin oxime |
| | moxidectin |
| spinosyn insecticides | spinetoram |
| | spinosad |
| neonicotinoid insecticides | |
| nitroguanidine neonicotinoid insecticides | clothianidin |
| | dinotefuran |
| | imidacloprid |
| | imidaclothiz |
| | thiamethoxam |
| nitromethylene neonicotinoid insecticides | nitenpyram |
| | nithiazine |
| pyridylmethylamine neonicotinoid insecticides | acetamiprid |
| | imidacloprid |
| | nitenpyram |
| | paichongding |
| | thiacloprid |
| nereistoxin analogue insecticides | bensultap |
| | cartap |
| | polythialan |
| | thiocyclam |
| | thiosultap |
| organochlorine insecticides | bromo-DDT |
| | camphechlor |
| | DDT |
| | pp'-DDT |
| | ethyl-DDD |
| | HCH |
| | gamma-HCH |
| | lindane |
| | methoxychlor |
| | pentachlorophenol |
| | TDE |

TABLE 10-continued

| Exemplary list of pesticides, which can be combined with microbes of the disclosure | |
|---|---|
| Category | Compounds |
| cyclodiene insecticides | aldrin |
| | bromocyclen |
| | chlorbicyclen |
| | chlordane |
| | chlordecone |
| | dieldrin |
| | dilor |
| | endosulfan |
| | alpha-endosulfan |
| | endrin |
| | HEOD |
| | heptachlor |
| | HHDN |
| | isobenzan |
| | isodrin |
| | kelevan |
| | mirex |
| organophosphorus insecticides | |
| organophosphate insecticides | bromfenvinfos |
| | calvinphos |
| | chlorfenvinphos |
| | crotoxyphos |
| | dichlorvos |
| | dicrotophos |
| | dimethylvinphos |
| | fospirate |
| | heptenophos |
| | methocrotophos |
| | mevinphos |
| | monocrotophos |
| | naled |
| | naftalofos |
| | phosphamidon |
| | propaphos |
| | TEPP |
| | tetrachlorvinphos |
| organothiophosphate insecticides | dioxabenzofos |
| | fosmethilan |
| | phenthoate |
| aliphatic organothiophosphate insecticides | acethion |
| | acetophos |
| | amiton |
| | cadusafos |
| | chlorethoxyfos |
| | chlormephos |
| | demephion |
| | demephion-O |
| | demephion-S |
| | demeton |
| | demeton-O |
| | demeton-S |
| | demeton-methyl |
| | demeton-O-methyl |
| | demeton-S-methyl |
| | demeton-S-methylsulphon |
| | disulfoton |
| | ethion |
| | ethoprophos |
| | IPSP |
| | isothioate |
| | malathion |
| | methacrifos |
| | methylacetophos |
| | oxydemeton-methyl |
| | oxydeprofos |
| | oxydisulfoton |
| | phorate |
| | sulfotep |
| | terbufos |
| | thiometon |
| aliphatic amide organothiophosphate insecticides | amidithion |
| | cyanthoate |
| | dimethoate |
| | ethoate-methyl |

TABLE 10-continued

| Exemplary list of pesticides, which can be combined with microbes of the disclosure | |
|---|---|
| Category | Compounds |
| | formothion |
| | mecarbam |
| | omethoate |
| | prothoate |
| | sophamide |
| | vamidothion |
| oxime organothiophosphate insecticides | chlorphoxim |
| | phoxim |
| | phoxim-methyl |
| heterocyclic organothiophosphate insecticides | azamethiphos |
| | colophonate |
| | coumaphos |
| | coumithoate |
| | dioxathion |
| | endothion |
| | menazon |
| | morphothion |
| | phosalone |
| | pyraclofos |
| | pyrazothion |
| | pyridaphenthion |
| | quinothion |
| benzothiopyran organothiophosphate insecticides | dithicrofos |
| | thicrofos |
| benzotriazine organothiophosphate insecticides | azinphos-ethyl |
| | azinphos-methyl |
| isoindole organothiophosphate insecticides | dialifos |
| | phosmet |
| isoxazole organothiophosphate insecticides | isoxathion |
| | zolaprofos |
| pyrazolopyrimidine organothiophosphate insecticides | chlorprazophos |
| | pyrazophos |
| pyridine organothiophosphate insecticides | chlorpyrifos |
| | chlorpyrifos-methyl |
| pyrimidine organothiophosphate insecticides | butathiofos |
| | diazinon |
| | etrimfos |
| | lirimfos |
| | pirimioxyphos |
| | pirimiphos-ethyl |
| | pirimiphos-methyl |
| | primidophos |
| | pyrimitate |
| | tebupirimfos |
| quinoxaline organothiophosphate insecticides | quinalphos |
| | quinalphos-methyl |
| thiadiazole organothiophosphate insecticides | athidathion |
| | lythidathion |
| | methidathion |
| | prothidathion |
| triazole organothiophosphate insecticides | isazofos |
| | triazophos |
| phenyl organothinphosphate insecticides | azothoate |
| | bromophos |
| | bromophos-ethyl |
| | carbophenothion |
| | chlorthiophos |
| | cyanophos |
| | cythioate |
| | dicapthon |
| | dichlofenthion |
| | etaphos |
| | famphur |
| | fenchlorphos |
| | fenitrothion |
| | fensulfothion |
| | fenthion |
| | fenthion-ethyl |
| | heterophos |
| | jodfenphos |
| | mesulfenfos |
| | parathion |
| | parathion-methyl |
| | phenkapton |
| | phosnichlor |

TABLE 10-continued

| Exemplary list of pesticides, which can be combined with microbes of the disclosure | |
|---|---|
| Category | Compounds |
| | profenofos |
| | prothiofos |
| | sulprofos |
| | temephos |
| | trichlormetaphos-3 |
| | trifenofos |
| | xiaochongliulin |
| phosphonate insecticides | butonate |
| | trichlorfon |
| phosphonothioate insecticides | mecarphon |
| phenyl ethylphosphonothioate insecticides | fonofos |
| | trichloronat |
| phenyl phenylphosphonothioate insecticides | cyanofenphos |
| | EPN |
| | leptophos |
| phosphoramidate insecticides | crufomate |
| | fenamiphos |
| | fosthietan |
| | mephosfolan |
| | phosfolan |
| | phosfolan-methyl |
| | pirimetaphos |
| phosphoramidothioate insecticides | acephate |
| | chloramine phosphorus |
| | isocarbophos |
| | isofenphos |
| | isofenphos-methyl |
| | methamidophos |
| | phosglycin |
| | propetamphos |
| phosphorodiamide insecticides | dimefox |
| | mazidox |
| | mipafox |
| | schradan |
| oxadiazine insecticides | indoxacarb |
| oxadiazolone insecticides | metoxadiazone |
| phthalimide insecticides | dialifos |
| | phosmet |
| | tetramethrin |
| physical insecticides | maltodextrin |
| desiccant insecticides | boric acid |
| | diatomaceous earth |
| | silica gel |
| pyrazole insecticides | chlorantraniliprole |
| | cyantraniliprole |
| | cyclaniliprole |
| | dimetilan |
| | isolan |
| | tebufenpyrad |
| | tetraniliprole |
| | tolfenpyrad |
| phenylpyrazole insecticides | acetoprole |
| | ethiprole |
| | fipronil |
| | flufiprole |
| | pyraclofos |
| | pyrafluprole |
| | pyriprole |
| | pyrolan |
| | vaniliprole |
| pyrethroid insecticides | |
| pyrethroid ester insecticides | acrinathrin |
| | allethrin |
| | bioallethrin |
| | esdépalléthrine |
| | barthrin |
| | bifenthrin |
| | kappa-bifenthrin |
| | bioethanomethrin |
| | brofenvalerate |
| | brofluthrinate |
| | bromethrin |
| | butethrin |
| | chlorempenthrin |

TABLE 10-continued

Exemplary list of pesticides, which can be combined with microbes of the disclosure

| Category | Compounds |
|---|---|
| | cyclethrin |
| | cycloprothrin |
| | cyfluthrin |
| | beta-cyfluthrin |
| | cyhalothrin |
| | gamma-cyhalothrin |
| | lambda-cyhalothrin |
| | cypermethrin |
| | alpha-cypermethrin |
| | beta-cypermethrin |
| | theta-cypermethrin |
| | zeta-cypermethrin |
| | cyphenothrin |
| | deltamethrin |
| | dimefluthrin |
| | dimethrin |
| | empenthrin |
| | d-fanshiluquebingjuzhi |
| | chloroprallethrin |
| | fenfluthrin |
| | fenpirithrin |
| | fenpropathrin |
| | fenvalerate |
| | esfenvalerate |
| | flucythrinate |
| | fluvalinate |
| | tau-fluvalinate |
| | furamethrin |
| | furethrin |
| | heptafluthrin |
| | imiprothrin |
| | japothrins |
| | kadethrin |
| | methothrin |
| | metofluthrin |
| | epsilon-metofluthrin |
| | momfluorothrin |
| | epsilon-momfluorothrin |
| | pentmethrin |
| | permethrin |
| | biopermethrin |
| | transpermethrin |
| | phenothrin |
| | prallethrin |
| | profluthrin |
| | proparthrin |
| | pyresmethrin |
| | renofluthrin |
| | meperfluthrin |
| | resmethrin |
| | bioresmethrin |
| | cismethrin |
| | tefluthrin |
| | kappa-tefluthrin |
| | terallethrin |
| | tetramethrin |
| | tetramethylfluthrin |
| | tralocythrin |
| | tralomethrin |
| | transfluthrin |
| | valerate |
| pyrethroid ether insecticides | etofenprox |
| | flufenprox |
| | halfenprox |
| | protrifenbute |
| | silafluofen |
| pyrethroid oxime insecticides | sulfoxime |
| | thiofluoximate |
| pyrimidinamine insecticides | flufenerim |
| | pyrimidifen |
| pyrrole insecticides | chlorfenapyr |
| quaternary ammonium insecticides | sanguinarine |
| sulfoximine insecticides | sulfoxaflor |

TABLE 10-continued

Exemplary list of pesticides, which can be combined with microbes of the disclosure

| Category | Compounds |
|---|---|
| tetramic acid insecticides | spirotetramat |
| tetronic acid insecticides | spiromesifen |
| thiazole insecticides | clothianidin |
| | imidaclothiz |
| | thiamethoxam |
| | thiapronil |
| thiazolidine insecticides | tazimcarb |
| | thiacloprid |
| thiourea insecticides | diafenthiuron |
| urea insecticides | flucofuron |
| | sulcofuron |
| zwitterionic insecticides | dicloromezotiaz |
| | triflumezopyrim |
| unclassified insecticides | afidopyropen |
| | afoxolaner |
| | allosamidin |
| | closantel |
| | copper naphthenate |
| | crotamiton |
| | EXD |
| | fenazaflor |
| | fenoxacrim |
| | flometoquin |
| | flonicamid |
| | fluhexafon |
| | flupyradifurone |
| | fluralaner |
| | fluxametamide |
| | hydramethylnon |
| | isoprothiolane |
| | jiahuangchongzong |
| | malonoben |
| | metaflumizone |
| | nifluridide |
| | plifenate |
| | pyridaben |
| | pyridalyl |
| | pyrifluquinazon |
| | rafoxanide |
| | thuringiensin |
| | triarathene |
| | triazamate |
| ACARICIDES | |
| botanical acaricides | carvacrol |
| | sanguinarine |
| bridged diphenyl acaricides | azobenzene |
| | benzoximate |
| | benzyl benzoate |
| | bromopropylate |
| | chlorbenside |
| | chlorfenethol |
| | chlorfenson |
| | chlorfensulphide |
| | chlorobenzilate |
| | chloropropylate |
| | cyflumetofen |
| | DDT |
| | dicofol |
| | diphenyl sulfone |
| | dofenapyn |
| | fenson |
| | fentrifanil |
| | fluorbenside |
| | genit |
| | hexachlorophene |
| | phenproxide |
| | proclonol |
| | tetradifon |
| | tetrasul |
| carbamate acaricides | benomyl |
| | carbanolate |
| | carbaryl |
| | carbofuran |
| | methiocarb |

TABLE 10-continued

| Exemplary list of pesticides, which can be combined with microbes of the disclosure | |
|---|---|
| Category | Compounds |
| | metolcarb |
| | promacyl |
| | propoxur |
| oxime carbamate acaricides | aldicarb |
| | butocarboxim |
| | oxamyl |
| | thiocarboxime |
| | thiofanox |
| carbazate acaricides | bifenazate |
| dinitrophenol acaricides | binapacryl |
| | dinex |
| | dinobuton |
| | dinocap |
| | dinocap-4 |
| | dinocap-6 |
| | dinocton |
| | dinopenton |
| | dinosulfon |
| | dinoterbon |
| | DNOC |
| formamidine acaricides | amitraz |
| | chlordimeform |
| | chloromebuform |
| | formetanate |
| | formparanate |
| | medimeform |
| | semiamitraz |
| macrocyclic lactone acaricides | tetranactin |
| avermectin acaricides | abamectin |
| | doramectin |
| | eprinomectin |
| | ivermectin |
| | selamectin |
| milbemycin acaricides | milbemectin |
| | milbemycin oxime |
| | moxidectin |
| mite growth regulators | clofentezine |
| | cyromazine |
| | diflovidazin |
| | dofenapyn |
| | fluazuron |
| | flubenzimine |
| | flucycloxuron |
| | flufenoxuron |
| | hexythiazox |
| organochlorine acaricides | bromocyclen |
| | camphechlor |
| | DDT |
| | dienochlor |
| | endosulfan |
| | lindane |
| organophosphorus acaricides | |
| organophosphate acaricides | chlorfenvinphos |
| | crotoxyphos |
| | dichlorvos |
| | heptenophos |
| | mevinphos |
| | monocrotophos |
| | naled |
| | TEPP |
| | tetrachlorvinphos |
| organothiophosphate acaricides | amidithion |
| | amiton |
| | azinphos-ethyl |
| | azinphos-methyl |
| | azothoate |
| | benoxafos |
| | bromophos |
| | bromophos-ethyl |
| | carbophenothion |
| | chlorpyrifos |
| | chlorthiophos |
| | coumaphos |
| | cyanthoate |

TABLE 10-continued

| Exemplary list of pesticides, which can be combined with microbes of the disclosure | |
|---|---|
| Category | Compounds |
| | demeton |
| | demeton-O |
| | demeton-S |
| | demeton-methyl |
| | demeton-O-methyl |
| | demeton-S-methyl |
| | demeton-S-methylsulphon |
| | dialifos |
| | diazinon |
| | dimethoate |
| | dioxathion |
| | disulfoton |
| | endothion |
| | ethion |
| | ethoate-methyl |
| | formothion |
| | malathion |
| | mecarbam |
| | methacrifos |
| | omethoate |
| | oxydeprofos |
| | oxydisulfoton |
| | parathion |
| | phenkapton |
| | phorate |
| | phosalone |
| | phosmet |
| | phostin |
| | phoxim |
| | pirimiphos-methyl |
| | prothidathion |
| | prothoate |
| | pyrimitate |
| | quinalphos |
| | quintiofos |
| | sophamide |
| | sulfotep |
| | thiometon |
| | triazophos |
| | trifenofos |
| | vamidothion |
| phosphonate acaricides | trichlorfon |
| phosphoramidothioate acaricides | isocarbophos |
| | methamidophos |
| | propetamphos |
| phosphorodiamide acaricides | dimefox |
| | mipafox |
| | schradan |
| organotin acaricides | azocyclotin |
| | cyhexatin |
| | fenbutatin oxide |
| | phostin |
| phenylsulfamide acaricides | dichlofluanid |
| phthalimide acaricides | dialifos |
| | phosmet |
| pyrazole acaricides | cyenopyrafen |
| | fenpyroximate |
| | pyflubumide |
| | tebufenpyrad |
| phenylpyrazole acaricides | acetoprole |
| | fipronil |
| | vaniliprole |
| pyrethroid acaricides | |
| pyrethroid ester acaricides | acrinathrin |
| | bifenthrin |
| | brofluthrinate |
| | cyhalothrin |
| | cypermethrin |
| | alpha-cypermethrin |
| | fenpropathrin |
| | fenvalerate |
| | flucythrinate |
| | flumethrin |
| | fluvalinate |

TABLE 10-continued

| Exemplary list of pesticides, which can be combined with microbes of the disclosure | |
|---|---|
| Category | Compounds |
| | tau-fluvalinate |
| | permethrin |
| pyrethroid ether acaricides | halfenprox |
| pyrimidinamine acaricides | pyrimidifen |
| pyrrole acaricides | chlorfenapyr |
| quaternary ammonium acaricides | sanguinarine |
| quinoxaline acaricides | chinomethionat |
| | thioquinox |
| strobilurin acaricides | |
| methoxyacrylate strobilurin acaricides | bifujunzhi |
| | fluacrypyrim |
| | flufenoxystrobin |
| | pyriminostrobin |
| sulfite ester acaricides | aramite |
| | propargite |
| tetronic acid acaricides | spirodiclofen |
| tetrazine acaricides | clofentezine |
| | diflovidazin |
| thiazolidine acaricides | flubenzimine |
| | hexythiazox |
| thiocarbamate acaricides | fenothiocarb |
| thiourea acaricides | chloromethiuron |
| | diafenthiuron |
| unclassified acaricides | acequinocyl |
| | afoxolaner |
| | amidoflumet |
| | arsenous oxide |
| | clenpirin |
| | closantel |
| | crotamiton |
| | cycloprate |
| | cymiazole |
| | disulfiram |
| | etoxazole |
| | fenazaflor |
| | fenazaquin |
| | fluenetil |
| | fluralaner |
| | mesulfen |
| | MNAF |
| | nifluridide |
| | nikkomycins |
| | pyridaben |
| | sulfiram |
| | sulfluramid |
| | sulfur |
| | thuringiensin |
| | triarathene |
| CHEMOSTERILANTS | |
| | apholate |
| | bisazir |
| | busulfan |
| | diflubenzuron |
| | dimatif |
| | hemel |
| | hempa |
| | metepa |
| | methiotepa |
| | methyl apholate |
| | morzid |
| | penfluron |
| | tepa |
| | thiohempa |
| | thiotepa |
| | tretamine |
| | uredepa |
| INSECT REPELLENTS | |
| | acrep |
| | butopyronoxyl |
| | camphor |
| | d-camphor |
| | carboxide |
| | dibutyl phthalate |
| | diethyltoluamide |
| | dimethyl carbate |
| | dimethyl phthalate |
| | dibutyl succinate |
| | ethohexadiol |
| | hexamide |
| | icaridin |
| | methoquin-butyl |
| | methylneodecanamide |
| | 2-(octylthio)ethanol |
| | oxamate |
| | quwenzhi |
| | quyingding |
| | rebemide |
| | zengxiaoan |
| NEMATICIDES | |
| avermectin nematicides | abamectin |
| botanical nematicides | carvacrol |
| carbamate nematicides | benomyl |
| | carbofuran |
| | carbosulfan |
| | cloethocarb |
| oxime carbamate nematicides | alanycarb |
| | aldicarb |
| | aldoxycarb |
| | oxamyl |
| | tirpate |
| fumigant nematicides | carbon disulfide |
| | cyanogen |
| | 1,2-dichloropropane |
| | 1,3-dichloropropene |
| | dithioether |
| | methyl bromide |
| | methyl iodide |
| | sodium tetrathiocarbonate |
| organophosphorus nematicides | |
| organophosphate nematicides | diamidafos |
| | fenamiphos |
| | fosthietan |
| | phosphamidon |
| organothiophosphate nematicides | cadusafos |
| | chlorpyrifos |
| | dichlofenthion |
| | dimethoate |
| | ethoprophos |
| | fensulfothion |
| | fosthiazate |
| | heterophos |
| | isamidofos |
| | isazofos |
| | phorate |
| | phosphocarb |
| | terbufos |
| | thionazin |
| | triazophos |
| phosphonothioate nematicides | imicyafos |
| | mecarphon |
| unclassified nematicides | acetoprole |
| | benclothiaz |
| | chloropicrin |
| | dazomet |
| | DBCP |
| | DCIP |
| | fluazaindolizine |
| | fluensulfone |
| | furfural |
| | metam |
| | methyl isothiocyanate |
| | tioxazafen |
| | xylenols |

Insecticides also include synergists or activators that are not in themselves considered toxic or insecticidal, but are materials used with insecticides to synergize or enhance the activity of the insecticides. Syngergists or activators include piperonyl butoxide.

Biorational Pesticides

Insecticides can be biorational, or can also be known as biopesticides or biological pesticides. Biorational refers to any substance of natural origin (or man-made substances resembling those of natural origin) that has a detrimental or lethal effect on specific target pest(s), e.g., insects, weeds, plant diseases (including nematodes), and vertebrate pests, possess a unique mode of action, are non-toxic to man, domestic plants and animals, and have little or no adverse effects on wildlife and the environment.

Biorational insecticides (or biopesticides or biological pesticides) can be grouped as: (1) biochemicals (hormones, enzymes, pheromones and natural agents, such as insect and plant growth regulators), (2) microbial (viruses, bacteria, fungi, protozoa, and nematodes), or (3) Plant-Incorporated protectants (PIPs)—primarily transgenic plants, e.g., Bt corn.

Biopesticides, or biological pesticides, can broadly include agents manufactured from living microorganisms or a natural product and sold for the control of plant pests. Biopesticides can be: microorganisms, biochemicals, and semiochemicals. Biopesticides can also include peptides, proteins and nucleic acids such as double-stranded DNA, single-stranded DNA, double-stranded RNA, single-stranded RNA and hairpin DNA or RNA.

Bacteria, fungi, oomycetes, viruses and protozoa are all used for the biological control of insect pests. The most widely used microbial biopesticide is the insect pathogenic bacteria *Bacillus thuringiensis* (Bt), which produces a protein crystal (the Bt δ-endotoxin) during bacterial spore formation that is capable of causing lysis of gut cells when consumed by susceptible insects. Microbial Bt biopesticides consist of bacterial spores and δ-endotoxin crystals mass-produced in fermentation tanks and formulated as a sprayable product. Bt does not harm vertebrates and is safe to people, beneficial organisms and the environment. Thus, Bt sprays are a growing tactic for pest management on fruit and vegetable crops where their high level of selectivity and safety are considered desirable, and where resistance to synthetic chemical insecticides is a problem. Bt sprays have also been used on commodity crops such as maize, soybean and cotton, but with the advent of genetic modification of plants, farmers are increasingly growing Bt transgenic crop varieties.

Other microbial insecticides include products based on entomopathogenic baculoviruses. Baculoviruses that are pathogenic to arthropods belong to the virus family and possess large circular, covalently closed, and double-stranded DNA genomes that are packaged into nucleocapsids. More than 700 baculoviruses have been identified from insects of the orders Lepidoptera, Hymenoptera, and Diptera. Baculoviruses are usually highly specific to their host insects and thus, are safe to the environment, humans, other plants, and beneficial organisms. Over 50 baculovirus products have been used to control different insect pests worldwide. In the US and Europe, the *Cydia pomonella* granulovirus (CpGV) is used as an inundative biopesticide against codlingmoth on apples. Washington State, as the biggest apple producer in the US, uses CpGV on 13% of the apple crop. In Brazil, the nucleopolyhedrovirus of the soybean caterpillar *Anticarsia gemmatalis* was used on up to 4 million ha (approximately 35%) of the soybean crop in the mid-1990s. Viruses such as Gemstar® (Certis USA) are available to control larvae of *Heliothis* and *Helicoverpa* species.

At least 170 different biopesticide products based on entomopathogenic fungi have been developed for use against at least five insect and acarine orders in glasshouse crops, fruit and field vegetables as well as commodity crops. The majority of products are based on the ascomycetes *Beauveria bassiana* or *Metarhizium anisopliae*. *M. anisopliae* has also been developed for the control of locust and grasshopper pests in Africa and Australia and is recommended by the Food and Agriculture Organization of the United Nations (FAO) for locust management.

A number of microbial pesticides registered in the United States are listed in Table 16 of Kabaluk et al. 2010 (Kabaluk, J. T. et al. (ed.). 2010. The Use and Regulation of Microbial Pesticides in Representative Jurisdictions Worldwide. IOBC Global. 99pp.) and microbial pesticides registered in selected countries are listed in Annex 4 of Hoeschle-Zeledon et al. 2013 (Hoeschle-Zeledon, I., P. Neuenschwander and L. Kumar. (2013). Regulatory Challenges for biological control. SP-IPM Secretariat, International Institute of Tropical Agriculture (IITA), Ibadan, Nigeria. 43 pp.), each of which is incorporated herein in its entirety.

Plants produce a wide variety of secondary metabolites that deter herbivores from feeding on them. Some of these can be used as biopesticides. They include, for example, pyrethrins, which are fast-acting insecticidal compounds produced by *Chrysanthemum cinerariaefolium*. They have low mammalian toxicity but degrade rapidly after application. This short persistence prompted the development of synthetic pyrethrins (pyrethroids). The most widely used botanical compound is neem oil, an insecticidal chemical extracted from seeds of *Azadirachta indica*. Two highly active pesticides are available based on secondary metabolites synthesized by soil actinomycetes, but they have been evaluated by regulatory authorities as if they were synthetic chemical pesticides. Spinosad is a mixture of two macrolide compounds from *Saccharopolyspora spinosa*. It has a very low mammalian toxicity and residues degrade rapidly in the field. Farmers and growers used it widely following its introduction in 1997 but resistance has already developed in some important pests such as western flower *thrips*. Abamectin is a macrocyclic lactone compound produced by *Streptomyces avermitilis*. It is active against a range of pest species but resistance has developed to it also, for example, in tetranychid mites.

Peptides and proteins from a number of organisms have been found to possess pesticidal properties. Perhaps most prominent are peptides from spider venom (King, G. F. and Hardy, M. C. (2013) Spider-venom peptides: structure, pharmacology, and potential for control of insect pests. Annu. Rev. Entomol. 58: 475-496). A unique arrangement of disulfide bonds in spider venom peptides render them extremely resistant to proteases. As a result, these peptides are highly stable in the insect gut and hemolymph and many of them are orally active. The peptides target a wide range of receptors and ion channels in the insect nervous system. Other examples of insecticidal peptides include: sea anemone venom that act on voltage-gated Na+ channels (Bosmans, F. and Tytgat, J. (2007) Sea anemone venom as a source of insecticidal peptides acting on voltage-gated Na+ channels. Toxicon. 49(4): 550-560); the PA1b (Pea Albumin 1, subunit b) peptide from Legume seeds with lethal activity on several insect pests, such as mosquitoes, some aphids and cereal weevils (Eyraud, V. et al. (2013) Expression and Biological Activity of the Cystine Knot Bioinsecticide PA1 b (Pea Albumin 1 Subunit b). PLoS ONE 8(12): e81619); and an internal 10 kDa peptide generated by enzymatic hydrolysis of *Canavalia ensiformis* (jack bean) urease within susceptible insects (Martinelli, A. H. S., et al. (2014) Structure—function studies on jaburetox, a recombinant insecticidal peptide derived from jack bean (*Canavalia ensiformis*) urease. Biochimica et Biophysica Acta 1840: 935-944). Examples of commercially available peptide insecticides include Spear™-T for the treatment of *thrips* in vegetables and ornamentals in greenhouses, Spear™-P to control the Colorado Potato Beetle, and Spear™-C to protect crops from lepidopteran pests (Vestaron Corporation, Kalamazoo, Mich.). A novel insecticidal protein from *Bacillus bombysepticus*, called parasporal crystal toxin (PC), shows oral pathogenic activity and lethality towards silkworms and Cry1Ac-resistant *Helicoverpa armigera* strains (Lin, P. et al. (2015) PC, a novel oral insecticidal toxin from *Bacillus bombysepticus* involved in host lethality via APN and BtR-175. Sci. Rep. 5: 11101).

A semiochemical is a chemical signal produced by one organism that causes a behavioral change in an individual of the same or a different species. The most widely used semiochemicals for crop protection are insect sex pheromones, some of which can now be synthesized and are used for monitoring or pest control by mass trapping, lure-and-kill systems and mating disruption. Worldwide, mating disruption is used on over 660,000 ha and has been particularly useful in orchard crops.

As used herein, "transgenic insecticidal trait" refers to a trait exhibited by a plant that has been genetically engineered to express a nucleic acid or polypeptide that is detrimental to one or more pests. In one embodiment, the plants of the present disclosure are resistant to attach and/or infestation from any one or more of the pests of the present disclosure. In one embodiment, the trait comprises the expression of vegetative insecticidal proteins (VIPs) from *Bacillus thuringiensis*, lectins and proteinase inhibitors from plants, terpenoids, cholesterol oxidases from *Streptomyces* spp., insect chitinases and fungal chitinolytic enzymes, bacterial insecticidal proteins and early recognition resistance genes. In another embodiment, the trait comprises the expression of a *Bacillus thuringiensis* protein that is toxic to a pest. In one embodiment, the Bt protein is a Cry protein (crystal protein). Bt crops include Bt corn, Bt cotton and Bt soy. Bt toxins can be from the Cry family (see, for example, Crickmore et al., 1998, Microbiol. Mol. Biol. Rev. 62: 807-812), which are particularly effective against Lepidoptera, Coleoptera and Diptera.

Bt Cry and Cyt toxins belong to a class of bacterial toxins known as pore-forming toxins (PFT) that are secreted as water-soluble proteins undergoing conformational changes in order to insert into, or to translocate across, cell membranes of their host. There are two main groups of PFT: (i) the α-helical toxins, in which α-helix regions form the trans-membrane pore, and (ii) the β-barrel toxins, that insert into the membrane by forming a β-barrel composed of βsheet hairpins from each monomer. See, Parker M W, Feil S C, "Pore-forming protein toxins: from structure to function," Prog. Biophys. Mol. Biol. 2005 May; 88(1):91-142. The first class of PFT includes toxins such as the colicins, exotoxin A, diphtheria toxin and also the Cry three-domain toxins. On the other hand, aerolysin, α-hemolysin, anthrax protective antigen, cholesterol-dependent toxins as the perfringolysin O and the Cyt toxins belong to the β-barrel toxins. Id. In general, PFT producing-bacteria secrete their toxins and these toxins interact with specific receptors located on the host cell surface. In most cases, PFT are activated by host proteases after receptor binding inducing the formation of an oligomeric structure that is insertion competent. Finally, membrane insertion is triggered, in most cases, by a decrease in pH that induces a molten globule state of the protein. Id.

The development of transgenic crops that produce Bt Cry proteins has allowed the substitution of chemical insecticides by environmentally friendly alternatives. In transgenic plants the Cry toxin is produced continuously, protecting the toxin from degradation and making it reachable to chewing and boring insects. Cry protein production in plants has been improved by engineering cry genes with a plant biased codon usage, by removal of putative splicing signal sequences and deletion of the carboxy-terminal region of the protoxin. See, Schuler T H, et al., "Insect-resistant transgenic plants," Trends Biotechnol. 1998; 16:168-175. The use of insect resistant crops has diminished considerably the use of chemical pesticides in areas where these transgenic crops are planted. See, Qaim M, Zilberman D, "Yield effects of genetically modified crops in developing countries," Science. 2003 Feb. 7; 299(5608):900-2.

Known Cry proteins include: δ-endotoxins including but not limited to: the Cry1, Cry2, Cry3, Cry4, Cry5, Cry6, Cry7, Cry8, Cry9, Cry10, Cry11, Cry12, Cry13, Cry14, Cry15, Cry16, Cry17, Cry18, Cry19, Cry20, Cry21, Cry22, Cry23, Cry24, Cry25, Cry26, Cry27, Cry 28, Cry 29, Cry 30, Cry31, Cry32, Cry33, Cry34, Cry35, Cry36, Cry37, Cry38, Cry39, Cry40, Cry41, Cry42, Cry43, Cry44, Cry45, Cry 46, Cry47, Cry49, Cry 51, Cry52, Cry 53, Cry 54, Cry55, Cry56, Cry57, Cry58, Cry59. Cry60, Cry61, Cry62, Cry63, Cry64, Cry65, Cry66, Cry67, Cry68, Cry69, Cry70 and Cry71 classes of δ-endotoxin genes and the *B. thuringiensis* cytolytic cyt1 and cyt2 genes.

Members of these classes of *B. thuringiensis* insecticidal proteins include, but are not limited to: Cry1Aa1 (Accession #AAA22353); Cry1Aa2 (Accession #Accession #AAA22552); Cry1 Aa3 (Accession #BAAOO257); Cry1Aa4 (Accession #CAA31886); Cry1Aa5 (Accession #BAA04468); Cry1Aa6 (Accession #AAA86265); Cry1Aa7 (Accession #AAD46139); Cry1 Aa8 (Accession #126149); Cry1Aa9 (Accession #BAA77213); Cry1Aa10 (Accession #AAD55382); Cry1Aa11 (Accession #CAA70856); Cry1Aa12 (Accession #AAP80146); Cry1 Aa13 (Accession #AAM44305); Cry1 Aa14 (Accession #AAP40639); Cry1Aa15 (Accession #AAY66993); Cry1Aa16 (Accession #HQ439776); Cry1Aa17 (Accession #HQ439788); Cry1Aa18 (Accession #HQ439790); Cry1Aa19 (Accession #HQ685121); Cry1 Aa20 (Accession #JF340156); Cry1Aa21 (Accession #JN651496); Cry1Aa22 (Accession #KC158223); Cry1Ab1 (Accession #AAA22330); Cry1Ab2 (Accession #AAA22613); Cry1Ab3 (Accession #AAA22561); Cry1Ab4 (Accession #BAAOO071); Cry1Ab5 (Accession #CAA28405); Cry1Ab6 (Accession #AAA22420); Cry1Ab7 (Accession #CAA31620); Cry1Ab8 (Accession #AAA22551); Cry1Ab9 (Accession #CAA38701); Cry1Ab10 (Accession #A29125); Cry1Ab11 (Accession #112419); Cry1Ab12 (Accession #AAC64003); Cry1Ab13 (Accession #AAN76494); Cry1Ab14 (Accession #AAG16877); Cry1Ab15 (Accession #AA013302); Cry1Ab16 (Accession #AAK55546); Cry1Ab17 (Accession #AAT46415); Cry1Ab18 (Accession #AAQ88259); Cry1Ab19 (Accession #AAW31761); Cry1Ab20 (Accession #ABB72460); Cry1Ab21 (Accession #ABS18384); Cry1Ab22 (Accession #ABW87320); Cry1Ab23 (Accession #HQ439777); Cry1Ab24 (Accession #HQ439778); Cry1Ab25 (Accession #HQ685122); Cry1Ab26 (Accession #HQ847729);

Cry1Ab27 (Accession #JN135249); Cry1Ab28 (Accession #JN135250); Cry1Ab29 (Accession #JN135251); Cry1Ab30 (Accession #JN135252); Cry1Ab31 (Accession #JN135253); Cry1Ab32 (Accession #JN135254); Cry1Ab33 (Accession #AAS93798); Cry1Ab34 (Accession #KC156668); Cry1Ab-like (Accession #AAK14336); Cry1Ab-like (Accession #AAK14337); Cry1Ab-like (Accession #AAK14338); Cry1Ab-like (Accession #ABG88858); Cry1Ac1 (Accession #AAA22331); Cry1Ac2 (Accession #AAA22338); Cry1Ac3 (Accession #CAA38098); Cry1 Ac4 (Accession #AAA73077); Cry1Ac5 (Accession #AAA22339); Cry1Ac6 (Accession #AAA86266); Cry1Ac7 (Accession #AAB46989); Cry1Ac8 (Accession #AAC44841); Cry1Ac9 (Accession #AAB49768); Cry1Ac10 (Accession #CAA05505); Cry1Ac11 (Accession #CAA10270); Cry1Ac12 (Accession #112418); Cry1Ac13 (Accession #AAD38701); Cry1Ac14 (Accession #AAQ06607); Cry1Ac15 (Accession #AAN07788); Cry1 Ac16 (Accession #AAU87037); Cry1Ac17 (Accession #AAX18704); Cry1 Ac18 (Accession #AAY88347); Cry1Ac19 (Accession #ABD37053); Cry1Ac20 (Accession #ABB89046); Cry1Ac21 (Accession #AAY66992); Cry1Ac22 (Accession #ABZ01836); Cry1Ac23 (Accession #CAQ30431); Cry1Ac24 (Accession #ABL01535); Cry1Ac25 (Accession #FJ513324); Cry1Ac26 (Accession #FJ617446); Cry1Ac27 (Accession #FJ617447); Cry1Ac28 (Accession #ACM90319); Cry1Ac29 (Accession #DQ438941); Cry1Ac30 (Accession #GQ227507); Cry1Ac31 (Accession #GU446674); Cry1Ac32 (Accession #HM061081); Cry1Ac33 (Accession #GQ866913); Cry1Ac34 (Accession #HQ230364); Cry1Ac35 (Accession #JF340157); Cry1Ac36 (Accession #JN387137); Cry1Ac37 (Accession #JQ317685); Cry1Ad1 (Accession #AAA22340); Cry1Ad2 (Accession #CAA01880); Cry1Ae1 (Accession #AAA22410); Cry1Af1 (Accession #AAB82749); Cry1Ag1 (Accession #AAD46137); Cry1Ah1 (Accession #AAQ14326); Cry1Ah2 (Accession #ABB76664); Cry1Ah3 (Accession #HQ439779); Cry1Ai1 (Accession #AA039719); Cry1Ai2 (Accession #HQ439780); Cry1A-like (Accession #AAK14339); Cry1 Ba1 (Accession #CAA29898); Cry1 Ba2 (Accession #CAA65003); Cry1 Ba3 (Accession #AAK63251); Cry1Ba4 (Accession #AAK51084); Cry1 Ba5 (Accession #AB020894); Cry1Ba6 (Accession #ABL60921); Cry1Ba7 (Accession #HQ439781); Cry1Bb1 (Accession #AAA22344); Cry1Bb2 (Accession #HQ439782); Cry1Bc1 (Accession #CAA86568); Cry1Bd1 (Accession #AAD10292); Cry1 Bd2 (Accession #AAM93496); Cry1Be1 (Accession #AAC32850); Cry1Be2 (Accession #AAQ52387); Cry1Be3 (Accession #ACV96720); Cry1Be4 (Accession #HM070026); Cry1Bf1 (Accession #CAC50778); Cry1Bf2 (Accession #AAQ52380); Cry1Bg1 (Accession #AA039720); Cry1Bh1 (Accession #HQ589331); Cry1Bi1 (Accession #KC156700); Cry1Ca1 (Accession #CAA30396); Cry1 Ca2 (Accession #CAA31951); Cry1 Ca3 (Accession #AAA22343); Cry1Ca4 (Accession #CAA01886); Cry1Ca5 (Accession #CAA65457); Cry1Ca6 [1] (Accession #AAF37224); Cry1Ca7 (Accession #AAG50438); Cry1Ca8 (Accession #AAM00264); Cry1Ca9 (Accession #AAL79362); Cry1Ca10 (Accession #AAN16462); Cry1 Ca11 (Accession #AAX53094); Cry1Ca12 (Accession #HM070027); Cry1Ca13 (Accession #HQ412621); Cry1Ca14 (Accession #JN651493); Cry1Cb1 (Accession #M97880); Cry1Cb2 (Accession #AAG35409); Cry1Cb3 (Accession #ACD50894); Cry1Cb-like (Accession #AAX63901); Cry1Da1 (Accession #CAA38099); Cry1Da2 (Accession #176415); Cry1 Da3 (Accession #HQ439784); Cry1 db1 (Accession #CAA80234); Cry1 db2 (Accession #AAK48937); Cry1 Dc1 (Accession #ABK35074); Cry1Ea1 (Accession #CAA37933); Cry1Ea2 (Accession #CAA39609); Cry1Ea3 (Accession #AAA22345); Cry1Ea4 (Accession #AAD04732); Cry1Ea5 (Accession #A15535); Cry1Ea6 (Accession #AAL50330); Cry1Ea7 (Accession #AAW72936); Cry1Ea8 (Accession #ABX11258); Cry1Ea9 (Accession #HQ439785); Cry1Ea10 (Accession #ADR00398); Cry1Ea11 (Accession #JQ652456); Cry1Eb1 (Accession #AAA22346); Cry1Fa1 (Accession #AAA22348); Cry1Fa2 (Accession #AAA22347); Cry1Fa3 (Accession #HM070028); Cry1Fa4 (Accession #HM439638); Cry1 Fb1 (Accession #CAA80235); Cry1Fb2 (Accession #BAA25298); Cry1Fb3 (Accession #AAF21767); Cry1Fb4 (Accession #AAC10641); Cry1 Fb5 (Accession #AA013295); Cry1Fb6 (Accession #ACD50892); Cry1Fb7 (Accession #ACD50893); Cry1Ga1 (Accession #CAA80233); Cry1 Ga2 (Accession #CAA70506); Cry1Gb1 (Accession #AAD10291); Cry1 Gb2 (Accession #AA013756); Cry1Gc1 (Accession #AAQ52381); Cry1Ha1 (Accession #CAA80236); Cry1Hb1 (Accession #AAA79694); Cry1 Hb2 (Accession #HQ439786); Cry1H-like (Accession #AAF01213); Cry1Ia1 (Accession #CAA44633); Cry1Ia2 (Accession #AAA22354); Cry1Ia3 (Accession #AAC36999); Cry1Ia4 (Accession #AAB00958); Cry11a5 (Accession #CAA70124); Cry1 Ia6 (Accession #AAC26910); Cry1Ia7 (Accession #AAM73516); Cry1 Ia8 (Accession #AAK66742); Cry1Ia9 (Accession #AAQ08616); Cry1Ia10 (Accession #AAP86782); Cry1Ia11 (Accession #CAC85964); Cry1Ia12 (Accession #AAV53390); Cry1Ia13 (Accession #ABF83202); Cry1Ia14 (Accession #ACG63871); Cry1Ia15 (Accession #FJ617445); Cry1Ia16 (Accession #FJ617448); Cry1Ia17 (Accession #GU989199); Cry1Ia18 (Accession #ADK23801); Cry1Ia19 (Accession #HQ439787); Cry1 Ia20 (Accession #JQ228426); Cry1Ia2l (Accession #JQ228424); Cry1Ia22 (Accession #JQ228427); Cry1Ia23 (Accession #JQ228428); Cry1Ia24 (Accession #JQ228429); Cry1Ia25 (Accession #JQ228430); Cry1Ia26 (Accession #JQ228431); Cry1Ia27 (Accession #JQ228432); Cry1Ia28 (Accession #JQ228433); Cry1Ia29 (Accession #JQ228434); Cry1Ia30 (Accession #JQ317686); Cry1Ia3l (Accession #JX944038); Cry1Ia32 (Accession #JX944039); Cry1Ia33 (Accession #JX944040); Cry1Ib1 (Accession #AAA82114); Cry1Ib2 (Accession #ABW88019); Cry1Ib3 (Accession #ACD75515); Cry1Ib4 (Accession #HM051227); Cry1Ib5 (Accession #HM070028); Cry1Ib6 (Accession #ADK38579); Cry1Ib7 (Accession #JN571740); Cry1Ib8 (Accession #JN675714); Cry1 Ib9 (Accession #JN675715); Cry1Ib10 (Accession #JN675716); Cry1Ib11 (Accession #JQ228423); Cry1Ic1 (Accession #AAC62933); Cry1Ic2 (Accession #AAE71691); Cry1Id1 (Accession #AAD44366); Cry1Id2 (Accession #JQ228422); Cry1Ie1 (Accession #AAG43526); Cry1Ie2 (Accession #HM439636); Cry1Ie3 (Accession #KC156647); Cry1Ie4 (Accession #KC156681); Cry1If1 (Accession #AAQ52382); Cry1Ig1 (Accession #KC156701); Cry1I-like (Accession #AAC31094); Cry1I-like (Accession #ABG88859); Cry1Ja1 (Accession #AAA22341); Cry1Ja2 (Accession #HM070030); Cry1Ja3 (Accession #JQ228425); Cry1Jb1 (Accession #AAA98959); Cry1Jc1 (Accession #AAC31092); Cry1Jc2 (Accession #AAQ52372); Cry1Jc11 (Accession #CAC50779); Cry1Ka1 (Accession #AAB00376); Cry1Ka2 (Accession #HQ439783); Cry1La1 (Accession #AAS60191); Cry1La2 (Accession

#HM070031); Cry1Ma1 (Accession #FJ884067); Cry1Ma2 (Accession #KC156659); Cry1Na1 (Accession #KC156648); Cry1Nb1 (Accession #KC156678); Cry1-like (Accession #AAC31091); Cry2Aa1 (Accession #AAA22335); Cry2Aa2 (Accession #AAA83516); Cry2Aa3 (Accession #D86064); Cry2Aa4 (Accession #AAC04867); Cry2Aa5 (Accession #CAA10671); Cry2Aa6 (Accession #CAA10672); Cry2Aa7 (Accession #CAA10670); Cry2Aa8 (Accession #AA013734); Cry2Aa9 (Accession #AA013750); Cry2Aa1 O (Accession #AAQ04263); Cry2Aa1 1 (Accession #AAQ52384); Cry2Aa12 (Accession #AB183671); Cry2Aa13 (Accession #ABL01536); Cry2Aa14 (Accession #ACF04939); Cry2Aa15 (Accession #JN426947); Cry2Ab1 (Accession #AAA22342); Cry2Ab2 (Accession #CAA39075); Cry2Ab3 (Accession #AAG36762); Cry2Ab4 (Accession #AA013296); Cry2Ab5 (Accession #AAQ04609); Cry2Ab6 (Accession #AAP59457); Cry2Ab7 (Accession #AAZ66347); Cry2Ab8 (Accession #ABC95996); Cry2Ab9 (Accession #ABC74968); Cry2Ab10 (Accession #EF157306); Cry2Ab11 (Accession #CAM84575); Cry2Ab12 (Accession #ABM21764); Cry2Ab13 (Accession #ACG76120); Cry2Ab14 (Accession #ACG76121); Cry2Ab15 (Accession #HM037126); Cry2Ab16 (Accession #GQ866914); Cry2Ab17 (Accession #HQ439789); Cry2Ab18 (Accession #JN135255); Cry2Ab19 (Accession #JN135256); Cry2Ab20 (Accession #JN135257); Cry2Ab21 (Accession #JN135258); Cry2Ab22 (Accession #JN135259); Cry2Ab23 (Accession #JN135260); Cry2Ab24 (Accession #JN135261); Cry2Ab25 (Accession #JN415485); Cry2Ab26 (Accession #JN426946); Cry2Ab27 (Accession #JN415764); Cry2Ab28 (Accession #JN651494); Cry2Ac1 (Accession #CAA40536); Cry2Ac2 (Accession #AAG35410); Cry2Ac3 (Accession #AAQ52385); Cry2Ac4 (Accession #ABC95997); Cry2Ac5 (Accession #ABC74969); Cry2Ac6 (Accession #ABC74793); Cry2Ac7 (Accession #CAL18690); Cry2Ac8 (Accession #CAM09325); Cry2Ac9 (Accession #CAM09326); Cry2Ac10 (Accession #ABN15104); Cry2Ac11 (Accession #CAM83895); Cry2Ac12 (Accession #CAM83896); Cry2Ad1 (Accession #AAF09583); Cry2Ad2 (Accession #ABC86927); Cry2Ad3 (Accession #CAK29504); Cry2Ad4 (Accession #CAM32331); Cry2Ad5 (Accession #CA078739); Cry2Ae1 (Accession #AAQ52362); Cry2Af1 (Accession #AB030519); Cry2Af2 (Accession #GQ866915); Cry2Ag1 (Accession #ACH91610); Cry2Ah1 (Accession #EU939453); Cry2Ah2 (Accession #ACL80665); Cry2Ah3 (Accession #GU073380); Cry2Ah4 (Accession #KC156702); Cry2Ai1 (Accession #FJ788388); Cry2Aj (Accession #); Cry2Ak1 (Accession #KC156660); Cry2Ba1 (Accession #KC156658); Cry3Aa1 (Accession #AAA22336); Cry3Aa2 (Accession #AAA22541); Cry3Aa3 (Accession #CAA68482); Cry3Aa4 (Accession #AAA22542); Cry3Aa5 (Accession #AAA50255); Cry3Aa6 (Accession #AAC43266); Cry3Aa7 (Accession #CAB41411); Cry3Aa8 (Accession #AAS79487); Cry3Aa9 (Accession #AAW05659); Cry3Aa10 (Accession #AAU29411); Cry3Aa11 (Accession #AAW82872); Cry3Aa12 (Accession #ABY49136); Cry3Ba1 (Accession #CAA34983); Cry3Ba2 (Accession #CAA00645); Cry3Ba3 (Accession #JQ397327); Cry3Bb1 (Accession #AAA22334); Cry3Bb2 (Accession #AAA74198); Cry3Bb3 (Accession #115475); Cry3Ca1 (Accession #CAA42469); Cry4Aa1 (Accession #CAA68485); Cry4Aa2 (Accession #BAAOO1 79); Cry4Aa3 (Accession #CAD30148); Cry4Aa4 (Accession #AFB18317); Cry4A-like (Accession #AAY96321); Cry4Ba1 (Accession #CAA30312); Cry4Ba2 (Accession #CAA30114); Cry4Ba3 (Accession #AAA22337); Cry4Ba4 (Accession #BAAOO1 78); Cry4Ba5 (Accession #CAD30095); Cry4Ba-like (Accession #ABC47686); Cry4Ca1 (Accession #EU646202); Cry4Cb1 (Accession #FJ403208); Cry4Cb2 (Accession #FJ597622); Cry4Cc1 (Accession #FJ403207); Cry5Aa1 (Accession #AAA67694); Cry5Ab1 (Accession #AAA67693); Cry5Ac1 (Accession #134543); Cry5Ad1 (Accession #ABQ82087); Cry5Ba1 (Accession #AAA68598); Cry5Ba2 (Accession #ABW88931); Cry5Ba3 (Accession #AFJ04417); Cry5Ca1 (Accession #HM461869); Cry5Ca2 (Accession #ZP_04123426); Cry5Da1 (Accession #HM461870); Cry5Da2 (Accession #ZP_04123980); Cry5Ea1 (Accession #HM485580); Cry5Ea2 (Accession #ZP 04124038); Cry6Aa1 (Accession #AAA22357); Cry6Aa2 (Accession #AAM46849); Cry6Aa3 (Accession #ABH03377); Cry6Ba1 (Accession #AAA22358); Cry7Aa1 (Accession #AAA22351); Cry7Ab1 (Accession #AAA21120); Cry7Ab2 (Accession #AAA21121); Cry7Ab3 (Accession #ABX24522); Cry7 Ab4 (Accession #EU380678); Cry7 Ab5 (Accession #ABX79555); Cry7 Ab6 (Accession #AC144005); Cry7 Ab7 (Accession #ADB89216); Cry7 Ab8 (Accession #GU145299); Cry7Ab9 (Accession #ADD92572); Cry7Ba1 (Accession #ABB70817); Cry7Bb1 (Accession #KC156653); Cry7Ca1 (Accession #ABR67863); Cry7Cb1 (Accession #KC156698); Cry7Da1 (Accession #ACQ99547); Cry7Da2 (Accession #HM572236); Cry7Da3 (Accession #KC156679); Cry7Ea1 (Accession #HM035086); Cry7Ea2 (Accession #HM132124); Cry7Ea3 (Accession #EEM19403); Cry7Fa1 (Accession #HM035088); Cry7Fa2 (Accession #EEM19090); Cry7Fb1 (Accession #HM572235); Cry7Fb2 (Accession #KC156682); Cry7Ga1 (Accession #HM572237); Cry7Ga2 (Accession #KC156669); Cry7Gb1 (Accession #KC156650); Cry7Gc1 (Accession #KC156654); Cry7Gd1 (Accession #KC156697); Cry7Ha1 (Accession #KC156651); Cry7Ia1 (Accession #KC156665); Cry7Ja1 (Accession #KC156671); Cry7Ka1 (Accession #KC156680); Cry7Kb1 (Accession #BAM99306); Cry7La1 (Accession #BAM99307); Cry8Aa1 (Accession #AAA21117); Cry8Ab1 (Accession #EU044830); Cry8Ac1 (Accession #KC156662); Cry8Ad1 (Accession #KC156684); Cry8Ba1 (Accession #AAA21118); Cry8Bb1 (Accession #CAD57542); Cry8Bc1 (Accession #CAD57543); Cry8Ca1 (Accession #AAA21119); Cry8Ca2 (Accession #AAR98783); Cry8Ca3 (Accession #EU625349); Cry8Ca4 (Accession #ADB54826); Cry8Da1 (Accession #BAC07226); Cry8Da2 (Accession #BD133574); Cry8Da3 (Accession #BD133575); Cry8db1 (Accession #BAF93483); Cry8Ea1 (Accession #AAQ73470); Cry8Ea2 (Accession #EU047597); Cry8Ea3 (Accession #KC855216); Cry8Fa1 (Accession #AAT48690); Cry8Fa2 (Accession #HQ1 74208); Cry8Fa3 (Accession #AFH78109); Cry8Ga1 (Accession #AAT46073); Cry8Ga2 (Accession #ABC42043); Cry8Ga3 (Accession #FJ198072); Cry8Ha1 (Accession #AAW81032); Cry8Ia1 (Accession #EU381044); Cry81a2 (Accession #GU073381); Cry8Ia3 (Accession #HM044664); Cry8Ia4 (Accession #KC156674); Cry8Ib1 (Accession #GU325772); Cry8Ib2 (Accession #KC156677); Cry8Ja1 (Accession #EU625348); Cry8Ka1 (Accession #FJ422558); Cry8Ka2 (Accession #ACN87262); Cry8Kb1 (Accession #HM123758); Cry8Kb2 (Accession #KC156675); Cry8La1 (Accession #GU325771); Cry8Ma1 (Accession #HM044665); Cry8Ma2 (Accession #EEM86551);

Cry8Ma3 (Accession #HM210574); Cry8Na1 (Accession #HM640939); Cry8Pa1 (Accession #HQ388415); Cry8Qa1 (Accession #HQ441166); Cry8Qa2 (Accession #KC152468); Cry8Ra1 (Accession #AFP87548); Cry8Sa1 (Accession #JQ740599); Cry8Ta1 (Accession #KC156673); Cry8-like (Accession #FJ770571); Cry8-like (Accession #ABS53003); Cry9Aa1 (Accession #CAA41122); Cry9Aa2 (Accession #CAA41425); Cry9Aa3 (Accession #GQ249293); Cry9Aa4 (Accession #GQ249294); Cry9Aa5 (Accession #JX174110); Cry9Aa like (Accession #AAQ52376); Cry9Ba1 (Accession #CAA52927); Cry9Ba2 (Accession #GU299522); Cry9Bb1 (Accession #AAV28716); Cry9Ca1 (Accession #CAA85764); Cry9Ca2 (Accession #AAQ52375); Cry9Da1 (Accession #BAA1 9948); Cry9Da2 (Accession #AAB97923); Cry9Da3 (Accession #GQ249293); Cry9Da4 (Accession #GQ249297); Cry9db1 (Accession #AAX78439); Cry9Dc1 (Accession #KC156683); Cry9Ea1 (Accession #BAA34908); Cry9Ea2 (Accession #AA012908); Cry9Ea3 (Accession #ABM21765); Cry9Ea4 (Accession #ACE88267); Cry9Ea5 (Accession #ACF04743); Cry9Ea6 (Accession #ACG63872); Cry9Ea7 (Accession #FJ380927); Cry9Ea8 (Accession #GQ249292); Cry9Ea9 (Accession #JN651495); Cry9Eb1 (Accession #CAC50780); Cry9Eb2 (Accession #GQ249298); Cry9Eb3 (Accession #KC156646); Cry9Ec1 (Accession #AAC63366); Cry9Ed1 (Accession #AAX78440); Cry9Ee1 (Accession #GQ249296); Cry9Ee2 (Accession #KC156664); Cry9Fa1 (Accession #KC156692); Cry9Ga1 (Accession #KC156699); Cry9-like (Accession #AAC63366); Cry10Aa1 (Accession #AAA22614); Cry10Aa2 (Accession #E00614); Cry10Aa3 (Accession #CAD30098); Cry10Aa4 (Accession #AFB18318); Cry10A-like (Accession #DQ167578); Cry11Aa1 (Accession #AAA22352); Cry11 Aa2 (Accession #AAA22611); Cry11 Aa3 (Accession #CAD30081); Cry11Aa4 (Accession #AFB18319); Cry11Aa-like (Accession #DQ166531); Cry11Ba1 (Accession #CAA60504); Cry11Bb1 (Accession #AAC97162); Cry11 Bb2 (Accession #HM068615); Cry12Aa1 (Accession #AAA22355); Cry13Aa1 (Accession #AAA22356); Cry14Aa1 (Accession #AAA21516); Cry14Ab1 (Accession #KC156652); Cry15Aa1 (Accession #AAA22333); Cry16Aa1 (Accession #CAA63860); Cry17Aa1 (Accession #CAA67841); Cry18Aa1 (Accession #CAA67506); Cry18Ba1 (Accession #AAF89667); Cry18Ca1 (Accession #AAF89668); Cry19Aa1 (Accession #CAA68875); Cry19Ba1 (Accession #BAA32397); Cry19Ca1 (Accession #AFM37572); Cry20Aa1 (Accession #AAB93476); Cry20Ba1 (Accession #ACS93601); Cry20Ba2 (Accession #KC156694); Cry20-like (Accession #GQ144333); Cry21Aa1 (Accession #132932); Cry21Aa2 (Accession #166477); Cry21Ba1 (Accession #BAC06484); Cry21Ca1 (Accession #JF521577); Cry21Ca2 (Accession #KC156687); Cry21Da1 (Accession #JF521578); Cry22Aa1 (Accession #134547); Cry22Aa2 (Accession #CAD43579); Cry22Aa3 (Accession #ACD93211); Cry22Ab1 (Accession #AAK50456); Cry22Ab2 (Accession #CAD43577); Cry22Ba1 (Accession #CAD43578); Cry22Bb1 (Accession #KC156672); Cry23Aa1 (Accession #AAF76375); Cry24Aa1 (Accession #AAC61891); Cry24Ba1 (Accession #BAD32657); Cry24Ca1 (Accession #CAJ43600); Cry25Aa1 (Accession #AAC61892); Cry26Aa1 (Accession #AAD25075); Cry27Aa1 (Accession #BAA82796); Cry28Aa1 (Accession #AAD24189); Cry28Aa2 (Accession #AAG00235); Cry29Aa1 (Accession #CAC80985); Cry30Aa1 (Accession #CAC80986); Cry30Ba1 (Accession #BAD00052); Cry30Ca1 (Accession #BAD67157); Cry30Ca2 (Accession #ACU24781); Cry30Da1 (Accession #EF095955); Cry30db1 (Accession #BAE80088); Cry30Ea1 (Accession #ACC95445); Cry30Ea2 (Accession #FJ499389); Cry30Fa1 (Accession #ACI22625); Cry30Ga1 (Accession #ACG60020); Cry30Ga2 (Accession #HQ638217); Cry31 Aa1 (Accession #BAB11 757); Cry31 Aa2 (Accession #AAL87458); Cry31Aa3 (Accession #BAE79808); Cry31Aa4 (Accession #BAF32571); Cry31Aa5 (Accession #BAF32572); Cry31Aa6 (Accession #BA144026); Cry31 Ab1 (Accession #BAE79809); Cry31Ab2 (Accession #BAF32570); Cry31Ac1 (Accession #BAF34368); Cry31Ac2 (Accession #AB731600); Cry31Ad1 (Accession #BA144022); Cry32Aa1 (Accession #AAG36711); Cry32Aa2 (Accession #GU063849); Cry32Ab1 (Accession #GU063850); Cry32Ba1 (Accession #BAB78601); Cry32Ca1 (Accession #BAB78602); Cry32Cb1 (Accession #KC156708); Cry32Da1 (Accession #BAB78603); Cry32Ea1 (Accession #GU324274); Cry32Ea2 (Accession #KC156686); Cry32Eb1 (Accession #KC156663); Cry32Fa1 (Accession #KC156656); Cry32Ga1 (Accession #KC156657); Cry32Ha1 (Accession #KC156661); Cry32Hb1 (Accession #KC156666); Cry321a1 (Accession #KC156667); Cry32Ja1 (Accession #KC156685); Cry32Ka1 (Accession #KC156688); Cry32La1 (Accession #KC156689); Cry32Ma1 (Accession #KC156690); Cry32 Mb1 (Accession #KC156704); Cry32Na1 (Accession #KC156691); Cry32Oa1 (Accession #KC156703); Cry32 Pa1 (Accession #KC156705); Cry32Qa1 (Accession #KC156706); Cry32Ra1 (Accession #KC156707); Cry32Sa1 (Accession #KC156709); Cry32Ta1 (Accession #KC156710); Cry32Ua1 (Accession #KC156655); Cry33Aa1 (Accession #AAL26871); Cry34Aa1 (Accession #AAG50341); Cry34Aa2 (Accession #AAK64560); Cry34Aa3 (Accession #AAT29032); Cry34Aa4 (Accession #AAT29030); Cry34Ab1 (Accession #AAG41671); Cry34Ac1 (Accession #AAG50118); Cry34Ac2 (Accession #AAK64562); Cry34Ac3 (Accession #AAT29029); Cry34Ba1 (Accession #AAK64565); Cry34Ba2 (Accession #AAT29033); Cry34Ba3 (Accession #AAT29031); Cry35Aa1 (Accession #AAG50342); Cry35Aa2 (Accession #AAK64561); Cry35Aa3 (Accession #AAT29028); Cry35Aa4 (Accession #AAT29025); Cry35Ab1 (Accession #AAG41672); Cry35Ab2 (Accession #AAK64563); Cry35Ab3 (Accession #AY536891); Cry35Ac1 (Accession #AAG50117); Cry35Ba1 (Accession #AAK64566); Cry35Ba2 (Accession #AAT29027); Cry35Ba3 (Accession #AAT29026); Cry36Aa1 (Accession #AAK64558); Cry37 Aa1 (Accession #AAF76376); Cry38Aa1 (Accession #AAK64559); Cry39Aa1 (Accession #BAB72016); Cry40Aa1 (Accession #BAB72018); Cry40Ba1 (Accession #BAC77648); Cry40Ca1 (Accession #EU381045); Cry40 Da1 (Accession #ACF15199); Cry41Aa1 (Accession #BAD35157); Cry41Ab1 (Accession #BAD35163); Cry41Ba1 (Accession #HM461871); Cry41 Ba2 (Accession #ZP_04099652); Cry42Aa1 (Accession #BAD35166); Cry43Aa1 (Accession #BAD15301); Cry43Aa2 (Accession #BAD95474); Cry43Ba1 (Accession #BAD15303); Cry43Ca1 (Accession #KC156676); Cry43Cb1 (Accession #KC156695); Cry43Cc1 (Accession #KC156696); Cry43-like (Accession #BAD15305); Cry44Aa (Accession #BAD08532); Cry45Aa (Accession #BAD22577); Cry46Aa (Accession #BAC79010); Cry46Aa2 (Accession #BAG68906); Cry46Ab (Accession #BAD35170); Cry47 Aa (Accession #AAY24695); Cry48Aa (Accession #CAJ18351); Cry48Aa2 (Accession #CAJ86545); Cry48Aa3 (Accession #CAJ86546); Cry48Ab (Accession #CAJ86548); Cry48Ab2

(Accession #CAJ86549); Cry49Aa (Accession #CAH56541); Cry49Aa2 (Accession #CAJ86541); Cry49Aa3 (Accession #CAJ86543); Cry49Aa4 (Accession #CAJ86544); Cry49Ab1 (Accession #CAJ86542); Cry50Aa1 (Accession #BAE86999); Cry50Ba1 (Accession #GU446675); Cry50Ba2 (Accession #GU446676); Cry51Aa1 (Accession #AB114444); Cry51Aa2 (Accession #GU570697); Cry52Aa1 (Accession #EF613489); Cry52Ba1 (Accession #FJ361760); Cry53Aa1 (Accession #EF633476); Cry53Ab1 (Accession #FJ361759); Cry54Aa1 (Accession #ACA52194); Cry54Aa2 (Accession #GQ140349); Cry54Ba1 (Accession #GU446677); Cry55Aa1 (Accession #ABW88932); Cry54Ab1 (Accession #JQ916908); Cry55Aa2 (Accession #AAE33526); Cry56Aa1 (Accession #ACU57499); Cry56Aa2 (Accession #GQ483512); Cry56Aa3 (Accession #JX025567); Cry57Aa1 (Accession #ANC87261); Cry58Aa1 (Accession #ANC87260); Cry59Ba1 (Accession #JN790647); Cry59Aa1 (Accession #ACR43758); Cry60Aa1 (Accession #ACU24782); Cry60Aa2 (Accession #EA057254); Cry60Aa3 (Accession #EEM99278); Cry60Ba1 (Accession #GU810818); Cry60Ba2 (Accession #EA057253); Cry60Ba3 (Accession #EEM99279); Cry61Aa1 (Accession #HM035087); Cry61Aa2 (Accession #HM132125); Cry61Aa3 (Accession #EEM19308); Cry62Aa1 (Accession #HM054509); Cry63Aa1 (Accession #BA144028); Cry64Aa1 (Accession #BAJ05397); Cry65Aa1 (Accession #HM461868); Cry65Aa2 (Accession #ZP_04123838); Cry66Aa1 (Accession #HM485581); Cry66Aa2 (Accession #ZP_04099945); Cry67Aa1 (Accession #HM485582); Cry67Aa2 (Accession #ZP_04148882); Cry68Aa1 (Accession #HQ113114); Cry69Aa1 (Accession #HQ401006); Cry69Aa2 (Accession #JQ821388); Cry69Ab1 (Accession #JN209957); Cry70Aa1 (Accession #JN646781); Cry70Ba1 (Accession #AD051070); Cry70Bb1 (Accession #EEL67276); Cry71Aa1 (Accession #JX025568); Cry72Aa1 (Accession #JX025569); Cyt1Aa (GenBank Accession Number X03182); Cyt1Ab (GenBank Accession Number X98793); Cyt1B (GenBank Accession Number U37196); Cyt2A (GenBank Accession Number Z14147); and Cyt2B (GenBank Accession Number U52043).

Examples of δ-endotoxins also include but are not limited to Cry1A proteins of U.S. Pat. Nos. 5,880,275, 7,858,849 8,530,411, 8,575,433, and 8,686,233; a DIG-3 or DIG-11 toxin (N-terminal deletion of α-helix 1 and/or a-helix 2 variants of cry proteins such as Cry1A, Cry3A) of U.S. Pat. Nos. 8,304,604, 8,304,605 and 8,476,226; Cry1B of U.S. patent application Ser. No. 10/525,318; Cry1 C of U.S. Pat. No. 6,033,874; Cry1F of U.S. Pat. Nos. 5,188,960 and 6,218,188; Cry1A/F chimeras of U.S. Pat. Nos. 7,070,982; 6,962,705 and 6,713,063); a Cry2 protein such as Cry2Ab protein of U.S. Pat. No. 7,064,249); a Cry3A protein including but not limited to an engineered hybrid insecticidal protein (eHIP) created by fusing unique combinations of variable regions and conserved blocks of at least two different Cry proteins (US Patent Application Publication Number 2010/0017914); a Cry4 protein; a Cry5 protein; a Cry6 protein; Cry8 proteins of U.S. Pat. Nos. 7,329,736, 7,449,552, 7,803,943, 7,476,781, 7,105,332, 7,378,499 and 7,462,760; a Cry9 protein such as such as members of the Cry9A, Cry9B, Cry9C, Cry9D, Cry9E and Cry9F families, including but not limited to the Cry9D protein of U.S. Pat. No. 8,802,933 and the Cry9B protein of U.S. Pat. No. 8,802,934; a Cry15 protein of Naimov, et al., (2008), "Applied and Environmental Microbiology," 74:7145-7151; a Cry22, a Cry34Ab1 protein of U.S. Pat. Nos. 6,127,180, 6,624,145 and 6,340,593; a CryET33 and cryET34 protein of U.S. Pat. Nos. 6,248,535, 6,326,351, 6,399,330, 6,949,626, 7,385,107 and 7,504,229; a CryET33 and CryET34 homologs of US Patent Publication Number 2006/0191034, 2012/0278954, and PCT Publication Number WO 2012/139004; a Cry35Ab1 protein of U.S. Pat. Nos. 6,083,499, 6,548,291 and 6,340,593; a Cry46 protein, a Cry 51 protein, a Cry binary toxin; a TIC901 or related toxin; TIC807 of US Patent Application Publication Number 2008/0295207; ET29, ET37, TIC809, TIC810, TIC812, TIC127, TIC128 of PCT US 2006/033867; TIC853 toxins of U.S. Pat. No. 8,513,494, AXMI-027, AXMI-036, and AXMI-038 of U.S. Pat. No. 8,236,757; AXMI-031, AXMI-039, AXMI-040, AXMI-049 of U.S. Pat. No. 7,923,602; AXMI-018, AXMI-020 and AXMI-021 of WO 2006/083891; AXMI-010 of WO 2005/038032; AXMI-003 of WO 2005/021585; AXMI-008 of US Patent Application Publication Number 2004/0250311; AXMI-006 of US Patent Application Publication Number 2004/0216186; AXMI-007 of US Patent Application Publication Number 2004/0210965; AXMI-009 of US Patent Application Number 2004/0210964; AXMI-014 of US Patent Application Publication Number 2004/0197917; AXMI-004 of US Patent Application Publication Number 2004/0197916; AXMI-028 and AXMI-029 of WO 2006/119457; AXMI-007, AXMI-008, AXMI-0080rf2, AXMI-009, AXMI-014 and AXMI-004 of WO 2004/074462; AXMI-150 of U.S. Pat. No. 8,084,416; AXMI-205 of US Patent Application Publication Number 2011/0023184; AXMI-011, AXMI-012, AXMI-013, AXMI-015, AXMI-019, AXMI-044, AXMI-037, AXMI-043, AXMI-033, AXMI-034, AXMI-022, AXMI-023, AXMI-041, AXMI-063 and AXMI-064 of US Patent Application Publication Number 2011/0263488; AXMI-R1 and related proteins of US Patent Application Publication Number 2010/0197592; AXMI221Z, AXMI222z, AXMI223z, AXMI224z and AXMI225z of WO 2011/103248; AXMI218, AXMI219, AXMI220, AXMI226, AXMI227, AXMI228, AXMI229, AXMI230 and AXMI231 of WO 2011/103247 and U.S. Pat. No. 8,759,619; AXMI-115, AXMI-113, AXMI-005, AXMI-163 and AXMI-184 of U.S. Pat. No. 8,334,431; AXMI-001, AXMI-002, AXMI-030, AXMI-035 and AXMI-045 of US Patent Application Publication Number 2010/0298211; AXMI-066 and AXMI-076 of US Patent Application Publication Number 2009/0144852; AXMI128, AXMI130, AXMI131, AXMI133, AXMI140, AXMI141, AXMI142, AXMI143, AXMI144, AXMI146, AXMI148, AXMI149, AXMI152, AXMI153, AXMI154, AXMI155, AXMI156, AXMI157, AXMI158, AXMI162, AXMI165, AXMI166, AXMI167, AXMI168, AXMI169, AXMI170, AXMI171, AXMI172, AXMI173, AXMI174, AXMI175, AXMI176, AXMI177, AXMI178, AXMI179, AXMI180, AXMI181, AXMI182, AXMI185, AXMI186, AXMI187, AXMI188, AXMI189 of U.S. Pat. No. 8,318,900; AXMI079, AXMI080, AXMI081, AXMI082, AXMI091, AXMI092, AXMI096, AXMI097, AXMI098, AXMI099, AXMI100, AXMI101, AXMI102, AXMI103, AXMI104, AXMI107, AXMI108, AXMI109, AXMI110, AXMI111, AXMI112, AXMI114, AXMI116, AXMI117, AXMI118, AXMI119, AXMI120, AXMI121, AXMI122, AXMI123, AXMI124, AXMI1257, AXMI1268, AXMI127, AXMI129, AXMI164, AXMI151, AXMI161, AXMI183, AXMI132, AXMI138, AXMI137 of US Patent Application Publication Number 2010/0005543, AXMI270 of US Patent Application Publication US20140223598, AXMI279 of US Patent Application Publication US20140223599, cry proteins such as Cry1A and Cry3A having modified proteolytic sites of U.S. Pat. No. 8,319,019; a Cry1Ac, Cry2Aa and Cry1 Ca toxin protein from *Bacillus thuringiensis* strain VBTS 2528 of US Patent Application Publication Number 2011/0064710. Other Cry proteins are well known to one skilled in the art. See, N. Crickmore, et al., "Revision of the Nomenclature for the *Bacillus thuringiensis* Pesticidal Crystal Proteins," Microbiology and Molecular Biology Reviews," (1998) Vol 62: 807-813; see also, N. Crickmore, et al., "*Bacillus thuringiensis* toxin nomenclature" (2016), at http://www.btnomenclature.info/.

The use of Cry proteins as transgenic plant traits is well known to one skilled in the art and Cry-transgenic plants including but not limited to plants expressing Cry1Ac, Cry1Ac+Cry2Ab, Cry1Ab, Cry1A.105, Cry1F, Cry1 Fa2, Cry1F+Cry1Ac, Cry2Ab, Cry3A, mCry3A, Cry3Bb1, Cry34Ab1, Cry35Ab1, Vip3A, mCry3A, Cry9c and CBI-Bt have received regulatory approval. See, Sanahuja et al., "*Bacillus thuringiensis*: a century of research, development and commercial applications," (2011) Plant Biotech Journal, April 9(3):283-300 and the CERA (2010) GM Crop Database Center for Environmental Risk Assessment (CERA), ILSI Research Foundation, Washington D.C. at cera-gmc.org/index.php?action=gm_crop_database, which can be accessed on the world-wide web using the "www" prefix). More than one pesticidal proteins well known to one skilled in the art can also be expressed in plants such as Vip3Ab & Cry1Fa (US2012/0317682); Cry1BE & CryIF (US2012/0311746); Cry1CA & Cry1AB (US2012/0311745); Cry1F & CryCa (US2012/0317681); Cry1DA& Cry1BE (US2012/0331590); Cry1DA & Cry1Fa (US2012/0331589); Cry1AB & Cry1BE (US2012/0324606); Cry1Fa & Cry2Aa and Cry1I & Cry1E (US2012/0324605); Cry34Ab/35Ab and Cry6Aa (US20130167269); Cry34Ab/VCry35Ab & Cry3Aa (US20130167268); Cry1Ab & Cry1F (US20140182018); and Cry3A and Cry1Ab or Vip3Aa (US20130116170). Pesticidal proteins also include insecticidal lipases including lipid acyl hydrolases of U.S. Pat. No. 7,491,869, and cholesterol oxidases such as from *Streptomyces* (Purcell et al. (1993) Biochem Biophys Res Commun 15:1406-1413).

Pesticidal proteins also include VIP (vegetative insecticidal proteins) toxins. Entomopathogenic bacteria produce insecticidal proteins that accumulate in inclusion bodies or parasporal crystals (such as the aforementioned Cry and Cyt proteins), as well as insecticidal proteins that are secreted into the culture medium. Among the latter are the Vip proteins, which are divided into four families according to their amino acid identity. The Vip1 and Vip2 proteins act as binary toxins and are toxic to some members of the Coleoptera and Hemiptera. The Vip1 component is thought to bind to receptors in the membrane of the insect midgut, and the Vip2 component enters the cell, where it displays its ADP-ribosyltransferase activity against actin, preventing microfilament formation. Vip3 has no sequence similarity to Vip1 or Vip2 and is toxic to a wide variety of members of the Lepidoptera. Its mode of action has been shown to resemble that of the Cry proteins in terms of proteolytic activation, binding to the midgut epithelial membrane, and pore formation, although Vip3A proteins do not share binding sites with Cry proteins. The latter property makes them good candidates to be combined with Cry proteins in transgenic plants (*Bacillus thuringiensis*-treated crops [Bt crops]) to prevent or delay insect resistance and to broaden the insecticidal spectrum. There are commercially grown varieties of Bt cotton and Bt maize that express the Vip3Aa protein in combination with Cry proteins. For the most recently reported Vip4 family, no target insects have been found yet. See, Chakroun et al., "Bacterial Vegetative Insecticidal Proteins (Vip) from Entomopathogenic Bacteria," Microbiol Mol Biol Rev. 2016 Mar. 2; 80(2):329-50. VIPs can be found in U.S. Pat. Nos. 5,877,012, 6,107,279 6,137,033, 7,244,820, 7,615,686, and 8,237,020 and the like. Other VIP proteins are well known to one skilled in the art (see, lifesci.sussex.ac.uldhome/Neil_Crickmore/Bt/vip.html, which can be accessed on the world-wide web using the "www" prefix).

Pesticidal proteins also include toxin complex (TC) proteins, obtainable from organisms such as *Xenorhabdus, Photorhabdus* and *Paenibacillus* (see, U.S. Pat. Nos. 7,491,698 and 8,084,418). Some TC proteins have "stand alone" insecticidal activity and other TC proteins enhance the activity of the stand-alone toxins produced by the same given organism. The toxicity of a "stand-alone" TC protein (from *Photorhabdus, Xenorhabdus* or *Paenibacillus*, for example) can be enhanced by one or more TC protein "potentiators" derived from a source organism of a different genus. There are three main types of TC proteins. As referred to herein, Class A proteins ("Protein A") are stand-alone toxins. Class B proteins ("Protein B") and Class C proteins ("Protein C") enhance the toxicity of Class A proteins. Examples of Class A proteins are TcbA, TcdA, XptA1 and XptA2. Examples of Class B proteins are TcaC, TcdB, XptB1Xb and XptC1 Wi. Examples of Class C proteins are TccC, XptC1Xb and XptB1 Wi. Pesticidal proteins also include spider, snake and scorpion venom proteins. Examples of spider venom peptides include, but are not limited to lycotoxin-1 peptides and mutants thereof (U.S. Pat. No. 8,334,366).

Some currently registered PIPs are listed in Table 11. Transgenic plants have also been engineered to express dsRNA directed against insect genes (Baum, J. A. et al. (2007) Control of coleopteran insect pests through RNA interference. Nature Biotechnology 25: 1322-1326; Mao, Y. B. et al. (2007) Silencing a cotton bollworm P450 monooxygenase gene by plant-mediated RNAi impairs larval tolerance of gossypol. Nature Biotechnology 25: 1307-1313). RNA interference can be triggered in the pest by feeding of the pest on the transgenic plant. Pest feeding thus causes injury or death to the pest.

TABLE 11

List of exemplary Plant-incorporated Protectants, which can be combined with microbes of the disclosure

| Plant-Incorporated Protectants (PIPs) | Company and Trade Names | Pesticide Registration Numbers |
|---|---|---|
| Potato | Potato | |
| Cry3A Potato PC Code 006432 | Naturemark New Leaf Monsanto | 524-474 |

TABLE 11-continued

List of exemplary Plant-incorporated Protectants, which can be combined with microbes of the disclosure

| Plant-Incorporated Protectants (PIPs) | Company and Trade Names | Pesticide Registration Numbers |
|---|---|---|
| Cry3A & PLRV Potato PC Codes 006432, 006469 | Monsanto New Leaf Plus | 524-498 |
| Corn | | |
| Cry1Ab Corn Event 176 PC Code 006458 | Mycogen Seeds/Dow Agro Syngenta Seeds | 68467-1 66736-1 |
| Cry1Ab Corn Event Bt11 EPA PC Code 006444 OECD Unique Identifier SYN-BTØ11-1, | Agrisure CB (with Yieldgard) Attribute Insect Protected Sweet Corn Syngenta Seeds | 67979-1 65268-1 |
| Cry1Ab Corn Event MON 801 | Monsanto | 524-492 |
| Cry1Ab corn Event MON 810 PC Code 006430 OECD Unique Identifier MON-ØØ81Ø-6 | Monsanto | 524-489 |
| Cry1Ac Corn PC Code 006463 | Dekalb Genetics c/o Monsanto BT-XTRA | 69575-2 |
| Cry1F corn Event TC1507 PC Code 006481 OECD Unique Identifier DAS-Ø15Ø7-1 | Mycogen Seeds/Dow Agro Pioneer Hi-Bred/Dupont | 68467-2 29964-3 |
| moCry1F corn Event DAS-Ø6275-8 PC Code 006491 OECD Unique Identifier DAS-Ø6275-8 | Mycogen Seeds/Dow Agro | 68467-4 |
| Cry9C Corn | Aventis StarLink | 264-669 |
| Cry3Bb1 corn Event MON863 PC Code 006484 OECD Unique Identifier MON-ØØ863-5 | Monsanto YielGard RW | 524-528 |
| Cry3Bb1 corn Event MON 88017 PC Code 006498 OECD Unique Identifier MON-88Ø17-3 | Monsanto YieldGrad VT Rootworm | 524-551 |
| Cry34Ab1/Cry35Ab1 corn Event DAS-591227-7 PC Code 006490 OECD Unique Identifier DAS-59122-7 | Mycogen Seeds/Dow Agro Pioneer Hi-Bred/Dupont Herculex Rootworm | 68467-5 29964-4 |
| Cry34Ab1/Cry35Ab1 and Cry1F corn Event 4114 PC Codes 006555, 006556 | Pioneer Hi-Bred/Dupont | 29964-17 |
| mCry3A corn Event MIR 604 PC Code 006509 OECD Unique Identifier SYN-IR604-8 | Syngenta Seeds Agrisure RW | 67979-5 |
| Cry1A.105 and Cry2Ab2 corn Event MON 89034 PC Codes 006515 and 006514 | Monsanto Genuity VT Double Pro | 524-575 |
| Vip3Aa20 corn Event MIR 162 PC Code 006599 OECD Unique Identifier SYN-IR162-4 | Syngenta Seeds Agrisure Viptera | 67979-14 |
| eCry3.1Ab corn in Event 5307 PC Code 016483 OECD Unique Identifier SYN-Æ53Æ7-1 | Syngenta | 67979-22 |
| Stacked Events and Seed Blend Corn | | |
| MON863 × MON810 with Cry3Bb1 + Cry1Ab | Monsanto YieldGard Plus | 524-545 |
| DAS-59122-7 × TC1507 with Cry34Ab1/Cry35Ab1 + Cry1F | Mycogen Seeds/Dow Agro Pioneer Hi-Bred/Dupont Herculex Xtra | 68467-6 29964-5 |
| MON 88017 × MON 810 with Cry1AB + Cry3Bb | Monsanto YieldGard VT Triple YieldGard VT Plus | 524-552 |
| MIR 604 × Bt11 with mCry3A + Cry1Ab | Syngenta Agrisure CB/RW Agrisure 3000GT | 67979-8 |
| Mon 89034 × Mon 88017 with Cry1A.105 + Cry2Ab2 + Cry3Bb1 | Monsanto Genuity VT Triple PRO | 524-576 |
| Bt11 × MIR 162 with Cry1Ab + Vip3Aa 20 | Syngenta Seeds Agrisure 2100 | 67979-12 |
| Bt11 × MIR 162 × MIR 604 with Cry1Ab + Vip3Aa20 + mCry3A | Syngenta Seeds Agrisure 3100 | 67979-13 |

TABLE 11-continued

List of exemplary Plant-incorporated Protectants, which can be combined with microbes of the disclosure

| Plant-Incorporated Protectants (PIPs) | Company and Trade Names | Pesticide Registration Numbers |
|---|---|---|
| MON 89034 × TC1507 × MON 88017 × DAS-59122-7 with Cry1A.105 + Cry2Ab2 + Cry1F + Cry3Bb1 + Cry34Ab1/Cry35Ab1 | Monsanto Company Mycogen Seeds/Dow Agro Genuity SmartStax SmartStax | 524-581 68467-7 |
| MON 89034 × TC1507 × MON 88017 × DAS-59122-7 Seed Blend | Monsanto Company Mycogen Seeds/Dow Agro Genuity SmartStax RIB Complete SmartStax Refuge Advanced; Refuge Advanced Powered by SmartStax | 524-595 68467-16 |
| Seed Blend of Herculex Xtra + Herculex I | Pioneer Hi-Bred/Dupont Optimum AcreMax1 Insect Protection | 29964-6 |
| Seed Blend of Herculex RW + Non-Bt corn | Pioneer Hi-Bred/Dupont Optimum AcreMax RW | 29964-10 |
| (Cry1F × Cry34/35 × Cry1Ab) – seed blend | Pioneer Hi-Bred/Dupont Optimum AcreMax Xtra | 29964-11 |
| (Cry1F × Cry1Ab) – seed blend | Pioneer Hi-Bred/Dupont Optimum AcreMax Insect Protection | 29964-12 |
| (Cry1F × mCry3A) | Pioneer Hi-Bred/Dupont Optimum Trisect | 29964-13 |
| (Cry1F × Cry34/35 × Cry1Ab × mCry3A) | Pioneer Hi-Bred/Dupont Optimum Intrasect Xtreme | 29964-14 |
| 59122 × MON 810 × MIR 604 (Cry34/35 × Cry1Ab × mCry3A) | Pioneer Hi-Bred/Dupont | 29964-15 |
| Optimum AcreMax Xtreme (Cry1F × Cry34/35 × Cry1Ab × mCry3A) – seed blend | Pioneer Hi-Bred/Dupont Optimum AcreMax Xtreme (seed blend) | 29964-16 |
| MON 810 × MIR 604 (Cry1Ab × mCry3A) | Pioneer Hi-Bred/Dupont | 29964-18 |
| 1507 × MON810 × MIR 162 (Cry1F × Cry1Ab × Vip 3Aa20) | Pioneer Hi-Bred/Dupont Optimum Intrasect Leptra | 29964-19 |
| 1507 × MIR 162 (Cry1F × Vip30Aa20) | Pioneer Hi-Bred/Dupont | 29964-20 |
| 4114 × MON 810 × MIR 604 (Cry34/35 × Cry1F × Cry1Ab × mCry3A) – seed blend | Pioneer Hi-Bred/Dupont | 29964-21 |
| 4114 × MON 810 × MIR 604 (Cry34/35 × Cry1F × Cry1Ab × mCry3A) | Pioneer Hi-Bred/Dupont | 29964-22 |
| 1507 × MON810 × MIR 604 (Cry1F × Cry1Ab × mCry3A) – seed blend | Pioneer Hi-Bred/Dupont Optimum AcreMax Trisect | 29964-23 |
| 1507 × MON810 × MIR 604 (Cry1F × Cry1Ab × mCry3A) | Pioneer Hi-Bred/Dupont Optimum Intrasect Trisect | 29964-24 |
| 4114 × MON 810 (Cry34/35 × Cry1F × Cry1Ab) | Pioneer Hi-Bred/Dupont | 29964-25 |
| 1507 × MON810 × MIR 162 (Cry1F × Cry1Ab × Vip 3Aa20) – seed blend | Pioneer Hi-Bred/Dupont Optimum AcreMax Leptra | 29964-26 |
| SmartStax Intermediates (8 products) | Monsanto | 524-583, 524-584, 524-586, 524-587, 524-588, 524-589, 524-590 |
| MON 89034 × 1507 (Cry1A.105 × Cry2Ab2 × Cry1F) | Monsanto Genuity PowerCore | 524-585 |

TABLE 11-continued

List of exemplary Plant-incorporated Protectants, which can be combined with microbes of the disclosure

| Plant-Incorporated Protectants (PIPs) | Company and Trade Names | Pesticide Registration Numbers |
|---|---|---|
| MON 89034 (Cry1A.105 × Cry2Ab2) − seed blend | Monsanto Genuity VT Double PRO RIB Complete | 524-597 |
| MON 89034 × 88017 RIB Complete (Cry1A.105 × Cry2Ab2 × Cry3Bb1) − seed blend | Monsanto Genuity VT Triple PRO RIB Complete | 524-606 |
| MON 89034 × 1507 (Cry1A.105 × Cry2Ab2 × Cry1F) − seed blend | Monsanto Genuity PowerCore RIB Complete | 524-612 |
| Bt11 × MIR162 × 1507 (Cry1Ab × Vip3Aa20 × Cry1F) | Syngenta Seeds Agrisure Viptera 3220 Refuge Renew | 67979-15 |
| Bt11 × 59122-7 × MIR 604 × 1507 (Cry1Ab × Cry34/35 × mCry3A × Cry1F) | Syngenta Seeds Agrisure 3122 | 67979-17 |
| Bt11 × MIR162 × TC1507 (Cry1Ab × Vip3Aa20 × Cry1F) − seed blend | Syngenta Seeds Agisure Viptera 3220 (E-Z Refuge) (Refuge Advanced) | 67979-19 |
| Bt11 × DAS 59122-7 × MIR604 × TC1507 (Cry1Ab × Cry34/35 × mCry3A × Cry1F) − seed blend | Syngenta Seeds Agisure Viptera 3122 (E-Z Refuge) (Refuge Advanced) | 67979-20 |
| Bt11 × MIR 162 × MIR 604 × TC1507 × 5307 (Cry1Ab × Vip3Aa20 × mCry3A × Cry1F × eCry3.1Ab) | Syngenta Seeds Agrisure Duracade (Refuge Renew) 5222 | 67979-23 |
| Bt11 × MIR 604 × TC1507 × 5307 (Cry1Ab × mCry3A × Cry1F × eCry3.1Ab) | Syngenta Seeds Agrisure Duracade (Refuge Renew) 5122 | 67979-24 |
| Bt11 × MIR 604 × TC1507 × 5307 (Cry1Ab × mCry3A × Cry1F × eCry3.1Ab) − seed blend | Syngenta Seeds Agisure Duracade 5122 E-Z Refuge | 67979-25 |
| Bt11 × MIR 162 × MIR 604 × TC1507 × 5307 (Cry1Ab × Vip3Aa20 × mCry3A × Cry1F × eCry3.1Ab) − seed blend | Syngenta Seeds Agisure Duracade 5222 E-Z Refuge | 67979-26 |
| Bt11 × MIR 162 × MIR 604 × TC1507 × 5307 (Cry1Ab × Vip3Aa20 × mCry3A × Cry1F × eCry3.1Ab) | Syngenta Seeds Agrisure Duracade (Refuge Renew) 5022 | 67979-27 |
| MIR604 × DAS-59122-7 × TC1507 (mCry3A × Cry34/35 × Cry1F) | Syngenta Seeds | 67979-29 |
| SmartStax Intermediates (8 products) | Mycogen Seeds/Dow Agro | 68467-8, 68467-9, 68467-10, 68467-11, 68467-13, 68467-14, 68467-15 |
| MON 89034 × 1507 (Cry1A.105 × Cry2Ab2 × Cry1F) | Mycogen Seeds/Dow Agro PowerCore; PowerCore Enlist | 68467-12 |
| MON 89034 × 1507 (Cry1A.105 × Cry2Ab2 × Cry1F) − seed blend | Mycogen Seeds/Dow Agro PowerCore Refuge Advanced; Refuge Advanced Powered by PowerCore | 68467-21 |
| 1507 × MON 810 | Pioneer Hi-Bred/Dupont Optimum Intrasect | 29964-7 |
| 59122 × 1507 × MON 810 | Pioneer Hi-Bred/Dupont | 29964-8 |
| 59122 × MON 810 | Pioneer Hi-Bred/Dupont | 29964-9 |
| **Cotton** | | |
| Cry1Ac Cotton | Monsanto BollGard | 524-478 |
| Cry1Ac and Cry2Ab2 in Event 15985 Cotton PC Codes 006445, 006487 | Monsanto BollGard II | 524-522 |
| Bt cotton Event MON531 with Cry1Ac (breeding nursery use only) | Monsanto | 524-555 |
| Bt cotton Event MON15947 with Cry2Ab2 (breeding nursery use only) | Monsanto | 524-556 |

TABLE 11-continued

List of exemplary Plant-incorporated Protectants, which can be combined with microbes of the disclosure

| Plant-Incorporated Protectants (PIPs) | Company and Trade Names | Pesticide Registration Numbers |
|---|---|---|
| COT102 × MON 15985 (Vip3Aa19 × Cry1Ac × Cry2Ab2) | Monsanto Bollgard III | 524-613 |
| Cry1F and Cry1Ac (Events DAS-21023-5 × DAS-24236-5) Cotton PC Codes 006512, 006513 | Mycogen Seeds/Dow Agro Widestrike | 68467-3 |
| Event 3006-210-23 (Cry1Ac) | Mycogen Seeds/Dow Agro | 68467-17 |
| Event 281-24-236 (Cry1F) | Mycogen Seeds/Dow Agro | 68467-18 |
| WideStrike × COT102 (Cry1F × Cry1Ac × Vip3Aa19) | Mycogen Seeds/Dow Agro WideStrike 3 | 68467-19 |
| Vip3Aa19 and FLCry1Ab (Events Cot102 × Cot67B) Cotton PC Codes 016484, 016486 OECD Unique Identifier SYN-IR102-7 × SYN-IR67B-1 | Syngenta Seeds (Formally VipCot) | 67979-9 |
| COT102 (Vip3Aa19) | Syngenta Seeds | 67979-18 |
| COT67B (FLCry1Ab) | Syngenta Seeds | 67979-21 |
| T304-40 (Cry1Ab) | Bayer CropScience | 264-1094 |
| GHB119 (Cry2Ae) | Bayer CropScience | 264-1095 |
| T304-40 × GHB119 (Cry1Ab × Cry2Ae) OECD Unique Identifier: BCS-GHØØ4-7 × BCS-GHØØ5-8 | Bayer CropScience TwinLink | 264-1096 |
| Soybean | | |
| Cry1Ac in Event 87701 Soybean PC Code 006532 OECD Unique Identifier | Monsanto Inacta | 524-594 |
| Cry1A.105 and Cry2Ab2 in Event 87751 Soybean PC Codes 006614, 006615 OECD Unique Identifier MON-87751-7 | Monsanto | 524-619 |
| Cry1Ac × Cry1F in Event DAS 81419 Soybean PC Codes 006527, 006528 OECD Unique Identifier DAS 81419 (Cry1Ac × Cry1F) | Mycogen Seeds/Dow Agro | 68467-20 |

In some embodiments, any one or more of the pesticides set forth herein may be utilized with any one or more of the microbes of the disclosure and can be applied to plants or parts thereof, including seeds.

Herbicides

As aforementioned, agricultural compositions of the disclosure, which may comprise any microbe taught herein, are sometimes combined with one or more herbicides.

Compositions comprising bacteria or bacterial populations produced according to methods described herein and/or having characteristics as described herein may further include one or more herbicides. In some embodiments, herbicidal compositions are applied to the plants and/or plant parts. In some embodiments, herbicidal compositions may be included in the compositions set forth herein, and can be applied to a plant(s) or a part(s) thereof simultaneously or in succession, with other compounds.

Herbicides include 2,4-D, 2,4-DB, acetochlor, acifluorfen, alachlor, ametryn, atrazine, aminopyralid, benefin, bensulfuron, bensulide, bentazon, bicyclopyrone, bromacil, bromoxynil, butylate, carfentrazone, chlorimuron, chlorsulfuron, clethodim, clomazone, clopyralid, cloransulam, cycloate, DCPA, desmedipham, dicamba, dichlobenil, diclofop, diclosulam, diflufenzopyr, dimethenamid, diquat, diuron, DSMA, endothall, EPTC, ethalfluralin, ethofumesate, fenoxaprop, fluazifop-P, flucarbzone, flufenacet, flumetsulam, flumiclorac, flumioxazin, fluometuron, fluroxypyr, fomesafen, foramsulfuron, glufosinate, glyphosate, halosulfuron, hexazinone, imazamethabenz, imazamox, imazapic, imazaquin, imazethapyr, isoxaflutole, lactofen, linuron, MCPA, MCPB, mesotrione, metolachlor-s, metribuzin, indaziflam, metsulfuron, molinate, MSMA, napropamide, naptalam, nicosulfuron, norflurazon, oryzalin, oxadiazon, oxyfluorfen, paraquat, pelargonic acid, pendimethalin, phenmedipham, picloram, primisulfuron, prodiamine, prometryn, pronamide, propanil, prosulfuron, pyrazon, pyrithioac, quinclorac, quizalofop, rimsulfuron, S-metolachlor, sethoxydim, siduron, simazine, sulfentrazone, sulfometuron, sulfosulfuron, tebuthiuron, tembotrione, terbacil, thiazopyr, thifensulfuron, thiobencarb, topramezone, tralkoxydim, triallate, triasulfuron, tribenuron, triclopyr, trifluralin, and triflusulfuron.

In some embodiments, any one or more of the herbicides set forth herein may be utilized with any one or more of the plants or parts thereof set forth herein.

Herbicidal products may include CORVUS, BALANCE FLEXX, CAPRENO, DIFLEXX, LIBERTY, LAUDIS, AUTUMN SUPER, and DIFLEXX DUO.

In some embodiments, any one or more of the herbicides set forth in the below Table 12 may be utilized with any one or more of the microbes taught herein, and can be applied to any one or more of the plants or parts thereof set forth herein.

TABLE 12

| List of exemplary herbicides, which can be combined with microbes of the disclosure | | | |
|---|---|---|---|
| Site of Action | Herbicide Group Number | Chemical Family | Herbicide |
| ACCase inhibitors | 1 | Cyclohexanediones | Sethoxydim (Poast, Poast Plus) |
| | | | Clethodim (Select, Select Max, Arrow) |
| | | Aryloxyphenoxypropionates | Fluazifop (Fusilade DX, component in Fusion) |
| | | | Fenoxaprop (Puma, component in Fusion) |
| | | | Quizalofop (Assure II, Targa) |
| | | Phenylpyrazolins | Pinoxaden (Axial XL) |
| ALS inhibitors | 2 | Imidazolinones | Imazethapyr (Pursuit) |
| | | | Imazamox (Raptor) |
| | | Sulfonylureas | Chlorimuron (Classic) |
| | | | Halosulfuron (Permit, Sandea) |
| | | | Iodosulfuron (component in Autumn Super) |
| | | | Mesosulfuron (Osprey) |
| | | | Nicosulfuron (Accent Q) |
| | | | Primisulfuron (Beacon) |
| | | | Prosulfuron (Peak) |
| | | | Rimsulfuron (Matrix, Resolve) |
| | | | Thifensulfuron (Harmony) |
| | | | Tribenuron (Express) |
| | | | Triflusulfuron (UpBeet) |
| | | Triazolopyrimidine | Flumetsulam (Python) |
| | | | Cloransulam-methyl (FirstRate) |
| | | | Pyroxsulam (PowerFlex HL) |
| | | | Florasulam (component in Quelex) |
| | | Sulfonylaminocarbonyltriazolinones | Propoxycarbazone (Olympus) |
| | | | Thiencarbazone-methyl (component in Capreno) |
| Microtubule inhibitors (root inhibitors) | 3 | Dinitroanilines | Trifluralin (many names) |
| | | | Ethalfluralin (Sonalan) |
| | | | Pendimethalin (Prowl/Prowl $H_2O$) |
| | | Benzamide | Pronamide (Kerb) |
| Synthetic auxins | 4 | Arylpicolinate | Halauxifen (Elevore, component in Quelex) |
| | | Phenoxy acetic acids | 2,4-D (Enlist One, others) |
| | | | 2,4-DB (Butyrac 200, Butoxone 200) |
| | | | MCPA |
| | | Benzoic acids | Dicamba (Banvel, Clarity, DiFlexx, Eugenia, XtendiMax; component in Status) |
| | | Pyridines | Clopyralid (Stinger) |
| | | | Fluroxypyr (Starane Ultra) |
| Photosystem II inhibitors | 5 | Triazines | Atrazine |
| | | | Simazine (Princep, Sim-Trol) |
| | | Triazinone | Metribuzin (Metribuzin, others) |
| | | | Hexazinone (Velpar) |
| | | Phenyl-carbamates | Desmedipham (Betenex) |
| | | | Phenmedipham (component in Betamix) |
| | | Uracils | Terbacil (Sinbar) |

TABLE 12-continued

List of exemplary herbicides, which can be combined with microbes of the disclosure

| Site of Action | Herbicide Group Number | Chemical Family | Herbicide |
|---|---|---|---|
| | 6 | Benzothiadiazoles | Bentazon (Basagran, others) |
| | | Nitriles | Bromoxynil (Buctril, Moxy, others) |
| | 7 | Phenylureas | Linuron (Lorox, Linex) |
| Lipid synthesis inhibitor | 8 | Thiocarbamates | EPTC (Eptam) |
| EPSPS inhibitor | 9 | Organophosphorus | Glyphosate |
| Glutamine synthetase inhibitor | 10 | Organophosphorus | Glufosinate (Liberty, Rely) |
| Diterpene biosynthesis inhibitor (bleaching) | 13 | Isoxazolidinone | Clomazone (Command) |
| Protoporphyrinogen oxidase inhibitors (PPO) | 14 | Diphenylether | Acifluorfen (Ultra Blazer) |
| | | | Fomesafen (Flexstar, Reflex) |
| | | | Lactofen (Cobra, Phoenix) |
| | | N-phenylphthalimide | Flumiclorac (Resource) |
| | | | Flumioxazin (Valor, Valor EZ, Rowel) |
| | | Aryl triazolinone | Sulfentrazone (Authority, Spartan) |
| | | | Carfentrazone (Aim) |
| | | | Fluthiacet-methyl (Cadet) |
| | | Pyrazoles | Pyraflufen-ethyl (Vida) |
| | | Pyrimidinedione | Saflufenacil (Sharpen) |
| Long-chain fatty acid inhibitors | 15 | Acetamides | Acetochlor (Harness, Surpass NXT, Breakfree NXT, Warrant) |
| | | | Dimethenamid-P (Outlook) |
| | | | Metolachlor (Parallel) |
| | | | Pyroxasulfone (Zidua, Zidua SC) |
| | | | s-metolachlor (Dual Magnum, Dual II Magnum, Cinch) |
| | | | Flufenacet (Define) |
| Specific site unknown | 16 | Benzofuranes | Ethofumesate (Nortron) |
| Auxin transport inhibitor | 19 | Semicarbazone | diflufenzopyr (component in Status) |
| Photosystem I inhibitors | 22 | Bipyridiliums | Paraquat (Gramoxone, Parazone) |
| | | | Diquat (Reglone) |
| 4-HPPD inhibitors (bleaching) | 27 | Isoxazole | Isoxaflutole (Balance Flexx) |
| | | Pyrazole | Pyrasulfotole (component in Huskie) |
| | | Pyrazolone | Topramezone (Armezon/Impact) |
| | | Triketone | Bicyclopyrone (component in Acuron) |
| | | | Mesotrione (Callisto) |
| | | | Tembotrione (Laudis) |

Fungicides

As aforementioned, agricultural compositions of the disclosure, which may comprise any microbe taught herein, are sometimes combined with one or more fungicides.

Compositions comprising bacteria or bacterial populations produced according to methods described herein and/or having characteristics as described herein may further include one or more fungicides. In some embodiments, fungicidal compositions may be included in the compositions set forth herein, and can be applied to a plant(s) or a part(s) thereof simultaneously or in succession, with other compounds. The fungicides include azoxystrobin, captan, carboxin, ethaboxam, fludioxonil, mefenoxam, fludioxonil, thiabendazole, thiabendaz, ipconazole, mancozeb, cyazofamid, zoxamide, metalaxyl, PCNB, metaconazole, pyraclostrobin, *Bacillus subtilis* strain QST 713, sedaxane, thiamethoxam, fludioxonil, thiram, tolclofos-methyl, trifloxystrobin, *Bacillus subtilis* strain MBI 600, pyraclostrobin, fluoxastrobin, *Bacillus pumilus* strain QST 2808, chlorothalonil, copper, flutriafol, fluxapyroxad, mancozeb, gludioxonil, penthiopyrad, triazole, propiconaozole, prothioconazole, tebuconazole, fluoxastrobin, pyraclostrobin, picoxystrobin, gols, tetraconazole, trifloxystrobin, cyproconazole, flutriafol, SDHI, EBDCs, sedaxane, MAXIM QUATTRO (gludioxonil, mefenoxam, azoxystrobin, and thiabendaz), RAXIL (tebuconazole, prothioconazole, metalaxyl, and ethoxylated tallow alkyl amines), and benzovindiflupyr.

In some embodiments, any one or more of the fungicides set forth herein may be utilized with any one or more of the plants or parts thereof set forth herein.

Hormones

As aforementioned, agricultural compositions of the disclosure, which may comprise any microbe taught herein, are sometimes combined with one or more hormones.

Compositions comprising bacteria or bacterial populations produced according to methods described herein and/or having characteristics as described herein may further include one or more hormones. In some embodiments, hormone compositions are applied to the plants and/or plant parts. In some embodiments, hormone compositions may be included in the compositions set forth herein, and can be applied to a plant(s) or a part(s) thereof simultaneously or in succession, with other compounds.

Hormones include, but are not limited to, auxins, cytokinins, gibberellins, abscisic acid, ethylene, brassinosteroids, jasmonic acid, strigolactones, and chemical mimics of strigolactone.

In some embodiments, any one or more of the hormones set forth herein may be utilized with any one or more of the plants or parts thereof set forth herein.

Strigolactones

As aforementioned, agricultural compositions of the disclosure, which may comprise any microbe taught herein, are sometimes combined with one or more strigolactone or chemical mimics of strigolactone. Such compounds are described in PCT/US2016/029080, filed Apr. 23, 2016, and entitled: Methods for Hydraulic Enhancement of Crops, which is hereby incorporated by reference. They are further described in U.S. Pat. No. 9,994,557, issued on Jun. 12, 2018, and entitled: Strigolactone Formulations and Uses Thereof, which is hereby incorporated by reference.

In some embodiments, the strigolactone is a compound of Formula (I), a salt, solvate, polymorph, stereoisomer, or isomer thereof: wherein: a, b, and c are one of the following:

Formula (I)

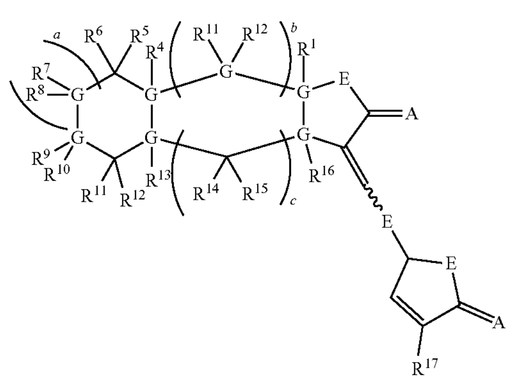

i. a is 0 or 2, and b and c are each independently 0, 1, or 2;
ii. a is 1, b is 0, and c is 0 or 2;
iii. a is 1, b is 1, and c is 1 or 2; or
iv. a is 1, b is 2, and c is 0, 1, or 2;
each A is independently O, or S;
each E is independently O, S, or —$NR^{18}$;
each G is independently C;
$R^5$, $R^6$, $R^{11}$, $R^{21}$, $R^{14}$, $R^{15}$, and $R^{17}$ are each independently H, alkyl, haloalkyl, amino, halo, or —$OR^{18}$ or a lone electron pair;
$R^1$ and $R^{16}$ are each independently H, alkyl, haloalkyl, amino, halo, or —$OR^{18}$; or
$R^4$ and $R^{13}$ together form a direct bond to provide a double bond;
Each $R^{18}$ is independently H, alkyl, haloalkyl, aryl, heteroaryl, —$C(O)R^{19}$ or

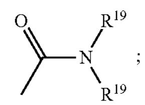

and
each $R^{19}$ is independently H, alkyl, haloalkyl, aryl, or heteroaryl.

In some embodiments, the strigolactone is a compound of Formula (I), a salt, solvate, or Formula (1)

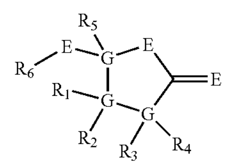

isomer, thereof, wherein:
each E is independently O, S, or —$NR_7$;
each G is independently C or N;
$R_1$, $R_4$, $R_5$, and $R_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, —$OR_8$, —$C(O)R_8$,

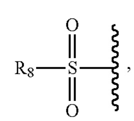

or a lone electron pair, wherein

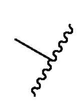

indicates a single bond;
$R_2$ and $R_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl, or a lone electron pair; or R2 and R3 together form a bond, or form a substituted or unsubstituted aryl; and.

$R_7$ and $R_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubsttitued cycloalkyl, or substituted or unsubstituted heterocycloalkyl.

In some embodiments, any one or more of the strigolactones or mimics of strigolactone set forth herein may be utilized with any one or more of the plants or parts thereof set forth herein.

In some embodiments of the method, the combination of agricultural compositions of the disclosure, which may comprise any microbe taught herein, with one or more strigolactone or chemical mimics of strigolactone, a yield of the contacted plant is extended as compared to an uncontacted plant, a wilting of the contacted plant is reduced or delayed as compared to an uncontacted plant, a turgidity of the contacted plant is prolonged or maintained as compared to an uncontacted plant, a loss of one or more petals of the contacted plant is reduced or delayed as compared to an uncontacted plant, a chlorophyll content of the contacted plant is maintained as compared to an uncontacted plant, a loss of the chlorophyll content of the contacted plant is reduced or delayed as compared to an uncontacted plant, a chlorophyll content of the contacted plant is increased as compared to an uncontacted plant, a salinity tolerance of the contacted plant is increased as compared to an uncontacted plant, a water consumption of the contacted plant is reduced as compared to an uncontacted plant, a drought tolerance of the contacted plant is increased as compared to an uncontacted plant, a pest resistance of the contacted plant is increased as compared to an uncontacted plant, a pesticides consumption of the contacted plant is reduced as compared to an uncontacted plant, or any combination thereof.

In one embodiment of the method, a yield of the contacted plant is increased as compared to an uncontacted plant.

In another embodiment of the method, a life of the contacted plant is extended as compared to an uncontacted plant.

In another embodiment of the method, a wilting of the contacted plant is reduced or delayed as compared to an uncontacted plant.

In another embodiment of the method, a wilting of the contacted plant is reduced or delayed as compared to an uncontacted plant.

In another embodiment of the method, a turgidity of the contacted plant is prolonged or maintained as compared to an uncontacted plant.

In another embodiment of the method, a loss of one or more petals of the contacted plant is reduced or delayed as compared to an uncontacted plant.

In another embodiment of the method, a chlorophyll content of the contacted plant is maintained as compared to an uncontacted plant.

In another embodiment of the method, a loss of the chlorophyll content of the contacted plant is reduced or delayed as compared to an uncontacted plant.

In another embodiment of the method, a chlorophyll content of the contacted plant is increased as compared to an uncon-tacted plant.

In another embodiment of the method, a salinity tolerance of the contacted plant is increased as compared to an uncontacted plant.

In another embodiment of the method, a water consumption of the contacted plant is reduced as compared to an uncontacted plant.

In another embodiment of the method, a drought tolerance of the contacted plant is increased as compared to an uncontacted plant.

In another embodiment of the method, a pest resistance of the contacted plant is increased as compared to an uncontacted plant.

In another embodiment of the method, a pesticides consumption of the contacted plant is reduced as compared to an uncontacted plant.

In another embodiment, when an agricultural composition of the disclosure, which may comprise any microbe taught herein, is combined with one or more strigolactone or chemical mimics of strigolactone, transpiration of the plant is increased as compared to an uncontacted plant.

In another embodiment, when an agricultural composition of the disclosure, which may comprise any microbe taught herein, is combined with one or more strigolactone or chemical mimics of strigolactone, canopy temperature of the contacted plant plant is decreased by at least about 0.1, 0.2, 0.3, 0.4, 0.5, 0.6, 0.7, 0.8, 0.9, 1.0° C. as compared to a substantially identical but uncontacted plant.

In another embodiment, when an agricultural composition of the disclosure, which may comprise any microbe taught herein, is combined with one or more strigolactone or chemical mimics of strigolactone, hydraulic enhancement of a plant is elicited upon contact with a plant wherein a permanent wilting point of the contacted plant is decreased as compared to a substantially identical but otherwise uncontacted plant.

In another embodiment, when an agricultural composition of the disclosure, which may comprise any microbe taught herein, is combined with one or more strigolactone or chemical mimics of strigolactone, transpiration of the plant is increased as compared to an uncontacted plant.

Nematicides

As aforementioned, agricultural compositions of the disclosure, which may comprise any microbe taught herein, are sometimes combined with one or more nematicides.

Compositions comprising bacteria or bacterial populations produced according to methods described herein and/or having characteristics as described herein may further include one or more nematicide. In some embodiments, nematicidal compositions may be included in the compositions set forth herein, and can be applied to a plant(s) or a part(s) thereof simultaneously or in succession, with other compounds. The nematicides may be selected from D-D, 1,3-dichloropropene, ethylene dibromide, 1,2-dibromo-3-chloropropane, methyl bromide, chloropicrin, metam sodium, dazomet, methyl isothiocyanate, sodium tetrathiocarbonate, aldicarb, aldoxycarb, carbofuran, oxamyl, ethoprop, fenamiphos, cadusafos, fosthiazate, terbufos, fensulfothion, phorate, DiTera, clandosan, sincocin, methyl iodide, propargyl bromide, 2,5-dihydroxymethyl-3,4-dihydroxypyrrolidine (DMDP), any one or more of the avermectins, sodium azide, furfural, *Bacillus firmus*, abamectrin, thiamethoxam, fludioxonil, clothiandin, salicylic acid, and benzo-(1,2,3)-thiadiazole-7-carbothioic acid S-methyl ester.

In some embodiments, any one or more of the nematicides set forth herein may be utilized with any one or more of the plants or parts thereof set forth herein.

In some embodiments, any one or more of the nematicides, fungicides, herbicides, insecticides, and/or pesticides set forth herein may be utilized with any one or more of the plants or parts thereof set forth herein.

Fertilizers, Nitrogen Stabilizers, and Urease Inhibitors

As aforementioned, agricultural compositions of the disclosure, which may comprise any microbe taught herein, are sometimes combined with one or more of a: fertilizer, nitrogen stabilizer, or urease inhibitor.

In some embodiments, fertilizers are used in combination with the methods and bacteria of the present disclosure. Fertilizers include anhydrous ammonia, urea, ammonium nitrate, and urea-ammonium nitrate (UAN) compositions, among many others. In some embodiments, pop-up fertilization and/or starter fertilization is used in combination with the methods and bacteria of the present disclosure.

In some embodiments, nitrogen stabilizers are used in combination with the methods and bacteria of the present disclosure. Nitrogen stabilizers include nitrapyrin, 2-chloro-6-(trichloromethyl) pyridine, N-SERVE 24, INSTINCT, dicyandiamide (DCD).

In some embodiments, urease inhibitors are used in combination with the methods and bacteria of the present disclosure. Urease inhibitors include N-(n-butyl)-thiophosphoric triamide (NBPT), AGROTAIN, AGROTAIN PLUS, and AGROTAIN PLUS SC. Further, the disclosure contemplates utilization of AGROTAIN ADVANCED 1.0, AGROTAIN DRI-MAXX, and AGROTAIN ULTRA.

Further, stabilized forms of fertilizer can be used. For example, a stabilized form of fertilizer is SUPER U, containing 46% nitrogen in a stabilized, urea-based granule, SUPERU contains urease and nitrification inhibitors to guard from dentrification, leaching, and volatilization. Stabilized and targeted foliar fertilizer such as NITAMIN may also be used herein.

Pop-up fertilizers are commonly used in corn fields. Pop-up fertilization comprises applying a few pounds of nutrients with the seed at planting. Pop-up fertilization is used to increase seedling vigor.

Slow- or controlled-release fertilizer that may be used herein entails: A fertilizer containing a plant nutrient in a form which delays its availability for plant uptake and use after application, or which extends its availability to the plant significantly longer than a reference 'rapidly available nutrient fertilizer' such as ammonium nitrate or urea, ammonium phosphate or potassium chloride. Such delay of initial availability or extended time of continued availability may occur by a variety of mechanisms. These include controlled water solubility of the material by semi-permeable coatings, occlusion, protein materials, or other chemical forms, by slow hydrolysis of water-soluble low molecular weight compounds, or by other unknown means.

Stabilized nitrogen fertilizer that may be used herein entails: A fertilizer to which a nitrogen stabilizer has been added. A nitrogen stabilizer is a substance added to a fertilizer which extends the time the nitrogen component of the fertilizer remains in the soil in the urea-N or ammoniacal-N form.

Nitrification inhibitor that may be used herein entails: A substance that inhibits the biological oxidation of ammoniacal-N to nitrate-N. Some examples include: (1) 2-chloro-6-(trichloromethyl-pyridine), common name Nitrapyrin, manufactured by Dow Chemical; (2) 4-amino-1,2,4-6-triazole-HCl, common name ATC, manufactured by Ishihada Industries; (3) 2,4-diamino-6-trichloro-methyltriazine, common name CI-1580, manufactured by American Cyanamid; (4) Dicyandiamide, common name DCD, manufactured by Showa Denko; (5) Thiourea, common name TU, manufactured by Nitto Ryuso; (6) 1-mercapto-1,2,4-triazole, common name MT, manufactured by Nippon; (7) 2-amino-4-chloro-6-methyl-pyramidine, common name AM, manufactured by Mitsui Toatsu; (8) 3,4-dimethylpyrazole phosphate (DMPP), from BASF; (9) 1-amide-2-thiourea (ASU), from Nitto Chemical Ind.; (10) Ammoniumthiosulphate (ATS); (11) 1H-1,2,4-triazole (HPLC); (12) 5-ethylene oxide-3-trichloro-methly1,2,4-thiodiazole (Terrazole), from *Olin Mathieson*; (13) 3-methylpyrazole (3-MP); (14) 1-carbamoyle-3-methyl-pyrazole (CMP); (15) Neem; and (16) DMPP.

Urease inhibitor that may be used herein entails: A substance that inhibits hydrolytic action on urea by the enzyme urease. Thousands of chemicals have been evaluated as soil urease inhibitors (Kiss and Simihaian, 2002). However, only a few of the many compounds tested meet the necessary requirements of being non toxic, effective at low concentration, stable, and compatible with urea (solid and solutions), degradable in the soil and inexpensive. They can be classified according to their structures and their assumed interaction with the enzyme urease (Watson, 2000, 2005). Four main classes of urease inhibitors have been proposed: (a) reagents which interact with the sulphydryl groups (sulphydryl reagents), (b) hydroxamates, (c) agricultural crop protection chemicals, and (d) structural analogues of urea and related compounds. N-(n-Butyl) thiophosphoric triamide (NBPT), phenylphosphorodiamidate (PPD/PPDA), and hydroquinone are probably the most thoroughly studied urease inhibitors (Kiss and Simihaian, 2002). Research and practical testing has also been carried out with N-(2-nitrophenyl) phosphoric acid triamide (2-NPT) and ammonium thiosulphate (ATS). The organo-phosphorus compounds are structural analogues of urea and are some of the most effective inhibitors of urease activity, blocking the active site of the enzyme (Watson, 2005).

Insecticidal Seed Treatments (ISTs) for Corn

Corn seed treatments normally target three spectrums of pests: nematodes, fungal seedling diseases, and insects.

Insecticide seed treatments are usually the main component of a seed treatment package. Most corn seed available today comes with a base package that includes a fungicide and insecticide. In some aspects, the insecticide options for seed treatments include PONCHO (clothianidin), CRUISER/CRUISER EXTREME (thiamethoxam) and GAUCHO (Imidacloprid). All three of these products are neonicotinoid chemistries. CRUISER and PONCHO at the 250 (0.25 mg Al/seed) rate are some of the most common base options available for corn. In some aspects, the insecticide options for treatments include CRUISER 250 thiamethoxam, CRUISER 250 (thiamethoxam) plus LUMIVIA (chlorantraniliprole), CRUISER 500 (thiamethoxam), and PONCHO VOTIVO 1250 (Clothianidin & *Bacillus firmus* 1-1582).

Pioneer's base insecticide seed treatment package consists of CRUISER 250 with PONCHO/VOTIVO 1250 also available. VOTIVO is a biological agent that protects against nematodes.

Monsanto's products including corn, soybeans, and cotton fall under the ACCELERON treatment umbrella. Dekalb corn seed comes standard with PONCHO 250. Producers also have the option to upgrade to PONCHO/VOTIVO, with PONCHO applied at the 500 rate.

Agrisure, Golden Harvest and Garst have a base package with a fungicide and CRUISER 250. AVICTA complete corn is also available; this includes CRUISER 500, fungicide, and nematode protection. CRUISER EXTREME is another option available as a seed treatment package, however; the amounts of CRUISER are the same as the conventional CRUISER seed treatment, i.e. 250, 500, or 1250.

Another option is to buy the minimum insecticide treatment available, and have a dealer treat the seed downstream.

Commercially available ISTs for corn are listed in the below Table 13 and can be combined with one or more of the microbes taught herein.

TABLE 13

List of exemplary seed treatments, including ISTs, which can be combined with microbes of the disclosure

| Treatment Type | Active Ingredient(s) | Product Trade Name | Crop |
|---|---|---|---|
| F | azoxystrobin | DYNASTY | Corn, Soybean |
| | | PROTÉGÉ FL | Corn |
| F | *Bacillus pumilus* | YIELD SHIELD | Corn, Soybean |
| F | *Bacillus subtilis* | HISTICK N/T | Soybean |
| | | VAULT HP | Corn, Soybean |
| F | Captan | CAPTAN 400 | Corn, Soybean |
| | | CAPTAN 400-C | Corny Soybean |
| F | Fludioxonil | MAXIM 4FS | Corn, Soybean |
| F | Hydrogen peroxide | OXIDATE | Soybean |
| | | STOROX | Soybean |
| F | ipconazole | ACCELERON DC-509 | Corn |
| | | RANCONA 3.8 FS | Corn, Soybean |
| | | VORTEX | Corn |
| F | mancozeb | BONIDE MANCOZEB w/Zinc Concentrate | Corn |
| | | DITHANE 75DF RAINSHIELD | Corn |
| | | DITHANE DF RAINSHIELD | Corn |
| | | DITHANE F45 RAINSHIELD | Corn |
| | | DITHANE M45 | Corn |
| | | LESCO 4 FLOWABLE MANCOZEB | Corn |
| | | PENNCOZEB 4FL FLOWABLE | |
| | | PENNCOZEB 75DF DRY | Corn |
| | | FLOWABLE | Corn |
| | | PENNCOZEB 80WP | Corn |
| F | mefenoxam | APRON XL | Corn, Soybean |
| F | metalaxyl | ACCELERON DC-309 | Corn |
| | | ACCELERON DX-309 | Corn, Soybean |
| | | ACQUIRE | Corn, Soybean |
| | | AGRI STAR METALAXYL 265 ST | Corn, Soybean |
| | | ALLEGIANCE DRY | Corn, Soybean |
| | | ALLEGIANCE FL | Corn, Soybean |
| | | BELMONT 2.7 FS | Corn, Soybean |
| | | DYNA-SHIELD METALAXYL | Corn, Soybean |
| | | SEBRING 2.65 ST | Corn, Soybean |
| | | SEBRING 318 FS | Corn, Soybean |
| | | SEBRING 480 FS | Corn, Soybean |
| | | VIREO MEC | Soybean |
| F | pyraclostrobin | ACCELERON DX-109 | Soybean |
| | | STAMINA | Corn |
| F | Streptomyces griseoviridis | MYCOSTOP | Corn, Soybean |
| F | Streptomyces lydicus | ACTINOGROW ST | Corn, Soybean |
| F | tebuconazole | AMTIDE TEBU 3.6F | Corn |
| | | SATIVA 309 FS | Corn |
| | | SATIVA 318 FS | Corn |
| | | TEBUSHA 3.6FL | Corn |
| | | TEBUZOL 3.6F | Corn |
| F | thiabendazole | MERTECT 340-F | Soybean |
| F | thiram | 42-S THIRAM | Corn, Soybean |
| | | FLOWSAN | Corn, Soybean |
| | | SIGNET 480 FS | Corn, Soybean |
| F | *Trichoderma harzianum Rifai* | T-22 HC | Corn, Soybean |
| F | trifloxystrobin | ACCELERON DX-709 | Corn |
| | | TRILEX FLOWABLE | Corn, soybean |
| I | chlorpyrifos | LORSBAN 50W in water soluble packets | Corn |
| I | clothianidin | ACCELERON IC-609 | Corn |
| | | NIPSIT INSIDE | Corn, Soybean |
| | | PONCHO 600 | Corn |

TABLE 13-continued

List of exemplary seed treatments, including ISTs, which can be combined with microbes of the disclosure

| Treatment Type | Active Ingredient(s) | Product Trade Name | Crop |
|---|---|---|---|
| I | imidacloprid | ACCELERON IX-409 | Corn |
| | | AGRI STAR MACHO 600 ST | Corn, Soybean |
| | | AGRISOLUTIONS NITRO SHIELD | Corn, Soybean |
| | | ATTENDANT 600 | Corn, Soybean |
| | | AXCESS | Corn, Soybean |
| | | COURAZE 2F | Soybean |
| | | DYNA-SHIELD | Corn, Soybean |
| | | IMIDACLOPRID 5 | |
| | | GAUCHO 480 FLOWABLE | Corn, Soybean |
| | | GAUCHO 600 FLOWABLE | Corn, Soybean |
| | | GAUCHO SB FLOWABLE | Corn, Soybean |
| | | NUPRID 4.6F PRO | Soybean |
| | | SENATOR 600 FS | Corn, Soybean |
| I | thiamethoxam | CRUISER 5FS | Corn, Soybean |
| N | abamectin | AVICTA 500 FS | Corn, Soybean |
| N | *Bacillus firmus* | VOTIVO FS | Soybean |
| P | cytokinin | SOIL X-CYTO | Soybean |
| | | X-CYTE | Soybean |
| P | harpin alpha beta protein | ACCELERON HX-209 | Corn, Soybean |
| | | N-HIBIT GOLD CST | Corn, Soybean |
| | | N-HIBIT HX-209 | Corn, Soybean |
| P | indole butyric acid | KICKSTAND PGR | Corn, Soybean |
| I, N | thiamethoxam, abamectin | AVICTA DUO CORN | Corn |
| | | AVICTA DUO 250 | |
| I, F | clothianidin, *Bacillus firmus* | PONCHO VOTIVO | Corn, Soybean |
| F, F | carboxin, captan | ENHANCE | Soybean |
| I, F | permethrin, carboxin | KERNEL GUARD SUPREME | Corn, Soybean |
| F, F | carboxin, thiram | VITAFLO 280 | Corn, Soybean |
| F, F | mefenoxam, fludioxonil | MAXIM XL | Corn, Soybean |
| | | WARDEN RTA | Soybean |
| | | APRON MAXX RFC | |
| | | APRON MAXX RTA + MOLY | |
| | | APRON MANX RTA | |
| I, F | imidacloprid, metalaxyl | AGRISOLUTIONS CONCUR | Corn |
| F, F | metalaxyl, ipconazole | RANCONA SUMMIT | Soybean |
| | | RANCONA XXTRA | |
| F, F | thiram, metalaxyl | PROTECTOR-L-ALLEGIANCE | Soybean |
| F, F | trifloxystrobin, metalaxyl | TRILEX AL | Soybean |
| | | TRILEX 2000 | |
| P, P, P | cytokinin, gibberellic acid, indole butyric acid | STIMULATE YIELD | Corn, Soybean |
| | | ENHANCER ASCEND | |
| F, F, I | mefenoxam, fludioxonil, thiamethoxam | CRUISERMAXX PLUS | Soybean |
| F, F, F | captan, carboxin, metalaxyl | BEAN GUARD/ALLEGIANCE | Soybean |
| F, F, I | captan, carboxin, imidacloprid | ENHANCE AW | Soybean |
| F, F, I | carboxin, metalaxyl, imidacloprid | LATITUDE | Corn, Soybean |
| F, F, F | metalaxyl, pyraclostrobin, triticonazole | STAMINA F3 HL | Corn |
| F, F, F, I | azoxystrobin, fludioxonil, mefenoxam, thiamethoxam | CRUISER EXTREME | Corn |
| F, F, F, F, F | azoxystrobin, fludioxonil, mefenoxam, thiabendazole | MAXIM QUATTRO | Corn |
| I | Chlorantraniliprole | LUMIVIA | Corn |

F = Fungicide;
I = Insecticide;
N = Nematicide;
P = Plant Growth Regulator

Application of Bacterial Populations on Crops

The composition of the bacteria or bacterial population described herein can be applied in furrow, in talc, or as seed treatment. The composition can be applied to a seed package in bulk, mini bulk, in a bag, or in talc.

The planter can plant the treated seed and grows the crop according to conventional ways, twin row, or ways that do not require tilling. The seeds can be distributed using a control hopper or an individual hopper. Seeds can also be distributed using pressurized air or manually. Seed placement can be performed using variable rate technologies. Additionally, application of the bacteria or bacterial population described herein may be applied using variable rate technologies. In some examples, the bacteria can be applied to seeds of corn, soybean, canola, *sorghum*, potato, rice, vegetables, cereals, pseudocereals, and oilseeds. Examples of cereals may include barley, fonio, oats, palmer's grass, rye, pearl millet, *sorghum*, spelt, teff, triticale, and wheat. Examples of pseudocereals may include breadnut, buckwheat, cattail, chia, flax, grain amaranth, hanza, *quinoa*, and sesame. In some examples, seeds can be genetically modified organisms (GMO), non-GMO, organic or conventional.

Additives such as micro-fertilizer, PGR, herbicide, insecticide, and fungicide can be used additionally to treat the crops. Examples of additives include crop protectants such as insecticides, nematicides, fungicide, enhancement agents such as colorants, polymers, pelleting, priming, and disinfectants, and other agents such as inoculant, PGR, softener, and micronutrients. PGRs can be natural or synthetic plant hormones that affect root growth, flowering, or stem elongation. PGRs can include auxins, gibberellins, cytokinins, ethylene, and abscisic acid (ABA).

The composition can be applied in furrow in combination with liquid fertilizer. In some examples, the liquid fertilizer may be held in tanks. NPK fertilizers contain macronutrients of sodium, phosphorous, and potassium.

The composition may improve plant traits, such as promoting plant growth, maintaining high chlorophyll content in leaves, increasing fruit or seed numbers, and increasing fruit or seed unit weight. Methods of the present disclosure may be employed to introduce or improve one or more of a variety of desirable traits. Examples of traits that may introduced or improved include: root biomass, root length, height, shoot length, leaf number, water use efficiency, overall biomass, yield, fruit size, grain size, photosynthesis rate, tolerance to drought, heat tolerance, salt tolerance, tolerance to low nitrogen stress, nitrogen use efficiency, resistance to nematode stress, resistance to a fungal pathogen, resistance to a bacterial pathogen, resistance to a viral pathogen, level of a metabolite, modulation in level of a metabolite, proteome expression. The desirable traits, including height, overall biomass, root and/or shoot biomass, seed germination, seedling survival, photosynthetic efficiency, transpiration rate, seed/fruit number or mass, plant grain or fruit yield, leaf chlorophyll content, photosynthetic rate, root length, or any combination thereof, can be used to measure growth, and compared with the growth rate of reference agricultural plants (e.g., plants without the introduced and/or improved traits) grown under identical conditions. In some examples, the desirable traits, including height, overall biomass, root and/or shoot biomass, seed germination, seedling survival, photosynthetic efficiency, transpiration rate, seed/fruit number or mass, plant grain or fruit yield, leaf chlorophyll content, photosynthetic rate, root length, or any combination thereof, can be used to measure growth, and compared with the growth rate of reference agricultural plants (e.g., plants without the introduced and/or improved traits) grown under similar conditions.

An agronomic trait to a host plant may include, but is not limited to, the following: altered oil content, altered protein content, altered seed carbohydrate composition, altered seed oil composition, and altered seed protein composition, chemical tolerance, cold tolerance, delayed senescence, disease resistance, drought tolerance, ear weight, growth improvement, health enhancement, heat tolerance, herbicide tolerance, herbivore resistance improved nitrogen fixation, improved nitrogen utilization, improved root architecture, improved water use efficiency, increased biomass, increased root length, increased seed weight, increased shoot length, increased yield, increased yield under water-limited conditions, kernel mass, kernel moisture content, metal tolerance, number of ears, number of kernels per ear, number of pods, nutrition enhancement, pathogen resistance, pest resistance, photosynthetic capability improvement, salinity tolerance, stay-green, vigor improvement, increased dry weight of mature seeds, increased fresh weight of mature seeds, increased number of mature seeds per plant, increased chlorophyll content, increased number of pods per plant, increased length of pods per plant, reduced number of wilted leaves per plant, reduced number of severely wilted leaves per plant, and increased number of non-wilted leaves per plant, a detectable modulation in the level of a metabolite, a detectable modulation in the level of a transcript, and a detectable modulation in the proteome, compared to an isoline plant grown from a seed without said seed treatment formulation.

In some cases, plants are inoculated with bacteria or bacterial populations that are isolated from the same species of plant as the plant element of the inoculated plant. For example, an bacteria or bacterial population that is normally found in one variety of *Zea mays* (corn) is associated with a plant element of a plant of another variety of *Zea mays* that in its natural state lacks said bacteria and bacterial populations. In one embodiment, the bacteria and bacterial populations is derived from a plant of a related species of plant as the plant element of the inoculated plant. For example, an bacteria and bacterial populations that is normally found in *Zea diploperennis* Iltis et al., (diploperennial teosinte) is applied to a *Zea mays* (corn), or vice versa. In some cases, plants are inoculated with bacteria and bacterial populations that are heterologous to the plant element of the inoculated plant. In one embodiment, the bacteria and bacterial populations is derived from a plant of another species. For example, an bacteria and bacterial populations that is normally found in dicots is applied to a monocot plant (e.g., inoculating corn with a soybean-derived bacteria and bacterial populations), or vice versa. In other cases, the bacteria and bacterial populations to be inoculated onto a plant is derived from a related species of the plant that is being inoculated. In one embodiment, the bacteria and bacterial populations is derived from a related taxon, for example, from a related species. The plant of another species can be an agricultural plant. In another embodiment, the bacteria and bacterial populations is part of a designed composition inoculated into any host plant element.

In some examples, the bacteria or bacterial population is exogenous wherein the bacteria and bacterial population is isolated from a different plant than the inoculated plant. For example, in one embodiment, the bacteria or bacterial population can be isolated from a different plant of the same species as the inoculated plant. In some cases, the bacteria or bacterial population can be isolated from a species related to the inoculated plant.

In some examples, the bacteria and bacterial populations described herein are capable of moving from one tissue type to another. For example, the present disclosure's detection and isolation of bacteria and bacterial populations within the mature tissues of plants after coating on the exterior of a seed demonstrates their ability to move from seed exterior into the vegetative tissues of a maturing plant. Therefore, in one embodiment, the population of bacteria and bacterial populations is capable of moving from the seed exterior into the vegetative tissues of a plant. In one embodiment, the bacteria and bacterial populations that is coated onto the seed of a plant is capable, upon germination of the seed into a vegetative state, of localizing to a different tissue of the plant. For example, bacteria and bacterial populations can be capable of localizing to any one of the tissues in the plant, including: the root, adventitious root, seminal 5 root, root hair, shoot, leaf, flower, bud, tassel, meristem, pollen, pistil, ovaries, stamen, fruit, stolon, rhizome, nodule, tuber, trichome, guard cells, hydathode, petal, sepal, glume, rachis, vascular cambium, phloem, and xylem. In one embodiment, the bacteria and bacterial populations is capable of localizing to the root and/or the root hair of the plant. In another embodiment, the bacteria and bacterial populations is capable of localizing to the photosynthetic tissues, for example, leaves and shoots of the plant. In other cases, the bacteria and bacterial populations is localized to the vascular tissues of the plant, for example, in the xylem and phloem. In still another embodiment, the bacteria and bacterial populations is capable of localizing to the reproductive tissues (flower, pollen, pistil, ovaries, stamen, fruit) of the plant. In another embodiment, the bacteria and bacterial populations is capable of localizing to the root, shoots, leaves and reproductive tissues of the plant. In still another embodiment, the bacteria and bacterial populations colonizes a fruit or seed tissue of the plant. In still another embodiment, the bacteria and bacterial populations is able to colonize the plant such that it is present in the surface of the plant (i.e., its presence is detectably present on the plant exterior, or the episphere of the plant). In still other embodiments, the bacteria and bacterial populations is capable of localizing to substantially all, or all, tissues of the plant. In certain embodiments, the bacteria and bacterial populations is not localized to the root of a plant. In other cases, the bacteria and bacterial populations is not localized to the photosynthetic tissues of the plant.

The effectiveness of the compositions can also be assessed by measuring the relative maturity of the crop or the crop heating unit (CHU). For example, the bacterial population can be applied to corn, and corn growth can be assessed according to the relative maturity of the corn kernel or the time at which the corn kernel is at maximum weight. The crop heating unit (CHU) can also be used to predict the maturation of the corn crop. The CHU determines the amount of heat accumulation by measuring the daily maximum temperatures on crop growth.

In examples, bacterial may localize to any one of the tissues in the plant, including: the root, adventitious root, seminal root, root hair, shoot, leaf, flower, bud tassel, meristem, pollen, pistil, ovaries, stamen, fruit, stolon, rhizome, nodule, tuber, trichome, guard cells, hydathode, petal, sepal, glume, rachis, vascular cambium, phloem, and xylem. In another embodiment, the bacteria or bacterial population is capable of localizing to the photosynthetic tissues, for example, leaves and shoots of the plant. In other cases, the bacteria and bacterial populations is localized to the vascular tissues of the plant, for example, in the xylem and phloem. In another embodiment, the bacteria or bacterial population is capable of localizing to reproductive tissues (flower, pollen, pistil, ovaries, stamen, or fruit) of the plant. In another embodiment, the bacteria and bacterial populations is capable of localizing to the root, shoots, leaves and reproductive tissues of the plant. In another embodiment, the bacteria or bacterial population colonizes a fruit or seed tissue of the plant. In still another embodiment, the bacteria or bacterial population is able to colonize the plant such that it is present in the surface of the plant. In another embodiment, the bacteria or bacterial population is capable of localizing to substantially all, or all, tissues of the plant. In certain embodiments, the bacteria or bacterial population is not localized to the root of a plant. In other cases, the bacteria and bacterial populations is not localized to the photosynthetic tissues of the plant.

The effectiveness of the bacterial compositions applied to crops can be assessed by measuring various features of crop growth including, but not limited to, planting rate, seeding vigor, root strength, drought tolerance, plant height, dry down, and test weight.

Plant Species

The methods and bacteria described herein are suitable for any of a variety of plants, such as plants in the genera *Hordeum, Oryza, Zea*, and Triticeae. Other non-limiting examples of suitable plants include mosses, lichens, and algae. In some cases, the plants have economic, social and/or environmental value, such as food crops, fiber crops, oil crops, plants in the forestry or pulp and paper industries, feedstock for biofuel production and/or ornamental plants. In some examples, plants may be used to produce economically valuable products such as a grain, a flour, a starch, a syrup, a meal, an oil, a film, a packaging, a nutraceutical product, a pulp, an animal feed, a fish fodder, a bulk material for industrial chemicals, a cereal product, a processed human-food product, a sugar, an alcohol, and/or a protein. Non-limiting examples of crop plants include maize, rice, wheat, barley, *sorghum*, millet, oats, rye triticale, buckwheat, sweet corn, sugar cane, onions, tomatoes, strawberries, and asparagus. In some embodiments, the methods and bacteria described herein are suitable for any of a variety of transgenic plants, non-transgenic plants, and hybrid plants thereof.

In some examples, plants that may be obtained or improved using the methods and composition disclosed herein may include plants that are important or interesting for agriculture, horticulture, biomass for the production of biofuel molecules and other chemicals, and/or forestry. Some examples of these plants may include pineapple, banana, coconut, lily, grasspeas and grass; and dicotyledonous plants, such as, for example, peas, alfalfa, tomatillo, melon, chickpea, chicory, clover, kale, lentil, soybean, tobacco, potato, sweet potato, radish, cabbage, rape, apple trees, grape, cotton, sunflower, thale cress, canola, citrus (including orange, mandarin, kumquat, lemon, lime, grapefruit, tangerine, tangelo, citron, and pomelo), pepper, bean, lettuce, *Panicum virgatum* (switch), *Sorghum bicolor* (*sorghum*, sudan), *Miscanthus giganteus* (*miscanthus*), *Saccharum* sp. (energycane), *Populus balsamifera* (poplar), *Zea mays* (corn), *Glycine max* (soybean), *Brassica napus* (canola), *Triticum aestivum* (wheat), *Gossypium hirsutum* (cotton), *Oryza sativa* (rice), *Helianthus annuus* (sunflower), *Medicago sativa* (alfalfa), *Beta vulgaris* (sugarbeet), *Pennisetum glaucum* (pearl millet), *Panicum* spp. *Sorghum* spp., *Miscanthus* spp., *Saccharum* spp., *Erianthus* spp., *Populus* spp., *Secale cereale* (rye), *Salix* spp. (willow), *Eucalyptus* spp. (*eucalyptus*), *Triticosecale* spp. (*triticum*-25 wheat X rye), Bamboo, *Carthamus tinctorius* (safflower), Jatropha curcas (Jatropha), *Ricinus communis* (castor), *Elaeis guineensis* (oil palm), *Phoenix dactylifera* (date palm), *Archontophoenix cunninghamiana* (king palm), *Syagrus romanzoffiana* (queen palm), *Linum usitatissimum* (flax), *Brassica juncea, Manihot esculenta* (cassaya), *Lycopersicon esculentum* (tomato), *Lactuca* saliva (lettuce), *Musa paradisiaca* (banana), *Solanum tuberosum* (potato), *Brassica oleracea* (broccoli, cauliflower, brussel sprouts), *Camellia*

*sinensis* (tea), *Fragaria ananassa* (strawberry), *Theobroma cacao* (cocoa), *Coffea arabica* (coffee), *Vitis vinifera* (grape), *Ananas comosus* (pineapple), *Capsicum annum* (hot & sweet pepper), *Allium cepa* (onion), *Cucumis melo* (melon), *Cucumis sativus* (cucumber), *Cucurbita maxima* (squash), *Cucurbita moschata* (squash), *Spinacea oleracea* (spinach), *Citrullus lanatus* (watermelon), *Abelmoschus esculentus* (okra), *Solanum melongena* (eggplant), *Papaver somniferum* (opium poppy), *Papaver orientale, Taxus baccata, Taxus brevifolia, Artemisia annua, Cannabis saliva, Camptotheca acuminate, Catharanthus roseus, Vinca rosea, Cinchona officinalis, Coichicum autumnale, Veratrum californica, Digitalis lanata, Digitalis purpurea, Dioscorea* 5 spp., *Andrographis paniculata, Atropa belladonna, Datura stomonium, Berberis* spp., *Cephalotaxus* spp., *Ephedra sinica, Ephedra* spp., *Erythroxylum coca, Galanthus wornorii, Scopolia* spp., *Lycopodium serratum* (*Huperzia serrata*), *Lycopodium* spp., *Rauwolfia serpentina, Rauwolfia* spp., *Sanguinaria canadensis, Hyoscyamus* spp., *Calendula officinalis, Chrysanthemum parthenium, Coleus forskohlii, Tanacetum parthenium, Parthenium argentatum* (guayule), *Hevea* spp. (rubber), *Mentha spicata* (mint), *Mentha piperita* (mint), *Bixa orellana, Alstroemeria* spp., *Rosa* spp. (rose), *Dianthus caryophyllus* (carnation), *Petunia* spp. (*petunia*), Poinsettia *pulcherrima* (poinsettia), *Nicotiana tabacum* (tobacco), *Lupinus albus* (lupin), *Uniola paniculata* (oats), *Hordeum vulgare* (barley), and *Lolium* spp. (rye).

In some examples, a monocotyledonous plant may be used. Monocotyledonous plants belong to the orders of the Alismatales, Arales, Arecales, Bromeliales, Commelinales, Cyclanthales, Cyperales, Eriocaulales, Hydrocharitales, Juncales, Lilliales, Najadales, Orchidales, Pandanales, Poales, Restionales, Triuridales, Typhales, and Zingiberales. Plants belonging to the class of the Gymnospermae are Cycadales, Ginkgoales, Gnetales, and Pinales. In some examples, the monocotyledonous plant can be selected from the group consisting of a maize, rice, wheat, barley, and sugarcane.

In some examples, a dicotyledonous plant may be used, including those belonging to the orders of the Aristochiales, Asterales, Batales, Campanulales, Capparales, Caryophyllales, Casuarinales, Celastrales, Cornales, Diapensales, Dilleniales, Dipsacales, Ebenales, Ericales, Eucomiales, Euphorbiales, Fabales, Fagales, Gentianales, Geraniales, Haloragales, Hamamelidales, Middles, Juglandales, Lamiales, Laurales, Lecythidales, Leitneriales, Magniolales, Malvales, Myricales, Myrtales, Nymphaeales, Papeverales, Piperales, Plantaginales, Plumb aginales, Podostemales, Polemoniales, Polygalales, Polygonales, Primulales, Proteales, Rafflesiales, Ranunculales, Rhamnales, Rosales, Rubiales, Salicales, Santales, Sapindales, Sarraceniaceae, Scrophulariales, Theales, Trochodendrales, Umbellales, Urticales, and Violates. In some examples, the dicotyledonous plant can be selected from the group consisting of cotton, soybean, pepper, and tomato.

In some cases, the plant to be improved is not readily amenable to experimental conditions. For example, a crop plant may take too long to grow enough to practically assess an improved trait serially over multiple iterations. Accordingly, a first plant from which bacteria are initially isolated, and/or the plurality of plants to which genetically manipulated bacteria are applied may be a model plant, such as a plant more amenable to evaluation under desired conditions. Non-limiting examples of model plants include *Setaria*, Brachypodium, and *Arabidopsis*. Ability of bacteria isolated according to a method of the disclosure using a model plant may then be applied to a plant of another type (e.g. a crop plant) to confirm conferral of the improved trait.

Traits that may be improved by the methods disclosed herein include any observable characteristic of the plant, including, for example, growth rate, height, weight, color, taste, smell, changes in the production of one or more compounds by the plant (including for example, metabolites, proteins, drugs, carbohydrates, oils, and any other compounds). Selecting plants based on genotypic information is also envisaged (for example, including the pattern of plant gene expression in response to the bacteria, or identifying the presence of genetic markers, such as those associated with increased nitrogen fixation). Plants may also be selected based on the absence, suppression or inhibition of a certain feature or trait (such as an undesirable feature or trait) as opposed to the presence of a certain feature or trait (such as a desirable feature or trait).

Non-Genetically Modified Maize

The methods and bacteria described herein are suitable for any of a variety of non-genetically modified maize plants or part thereof. And in some aspects the corn is organic. Furthermore, the methods and bacteria described herein are suitable for any of the following non-genetically modified hybrids, varities, lineages, etc. In some embodiments, corn varieties generally fall under six categories: sweet corn, flint corn, popcorn, dent corn, pod corn, and flour corn.

Sweet Corn

Yellow su varieties include Earlivee, Early Sunglow, Sundance, Early Golden Bantam, lochief, Merit, Jubilee, and Golden Cross Bantam. White su varieties include True Platinum, Country Gentleman, Silver Queen, and Stowell's Evergreen. Bicolor su varieties include Sugar & Gold, Quickie, Double Standard, Butter & Sugar, Sugar Dots, Honey & Cream. Multicolor su varieties include Hookers, Triple Play, Painted Hill, Black Mexican/Aztec.

Yellow se varieties include Buttergold, Precocious, Spring Treat, Sugar Buns, Colorow, Kandy King, Bodacious R/M, Tuxedo, Incredible, Merlin, Miracle, and Kandy Korn EH. White se varieties include Spring Snow, Sugar Pearl, Whiteout, Cloud Nine, Alpine, Silver King, and Argent. Bicolor se varieties include Sugar Baby, Fleet, Bon Jour, Trinity, Bi-Licious, Temptation, Luscious, *Ambrosia*, Accord, Brocade, Lancelot, Precious Gem, Peaches and Cream Mid EH, and Delectable R/M. Multicolor se varieties include Ruby Queen.

Yellow sh2 varieties include Extra Early Super Sweet, Takeoff, Early Xtra Sweet, Raveline, Summer Sweet Yellow. Krispy King, Garrison, Illini Gold, Challenger, Passion, Excel, Jubilee SuperSweet, Illini Xtra Sweet, and Crisp 'N Sweet. White sh2 varieties include Summer Sweet White, Tahoe, Aspen, Treasure, How Sweet It Is, and Camelot. Bicolor sh2 varieties include Summer Sweet Bicolor, Radiance, Honey 'N Pearl, Aloha, Dazzle, Hudson, and Phenomenal.

Yellow sy varieties include Applause, Inferno, Honeytreat, and Honey Select. White sy varieties include Silver Duchess, *Cinderella*, Mattapoisett, Avalon, and Captivate. Bicolor sy varieties include Pay Dirt, Revelation, Renaissance, *Charisma*, Synergy, Montauk, Kristine, Serendipity/Providence, and Cameo.

Yellow augmented supersweet varieties include Xtra-Tender 1 ddA, Xtra-Tender 11dd, Mirai 131Y, Mirai 130Y, Vision, and Mirai 002. White augmented supersweet varieties include Xtra-Tender 3dda, Xtra-Tender 31 dd, Mirai 421W, XTH 3673, and Devotion. Bicolor augmented supersweet varieties include Xtra-Tender 2dda, Xtra-Tender 21dd, Kickoff XR, Mirai 308BC, Anthem XR, Mirai 336BC, Fantastic XR, Triumph, Mirai 301BC, Stellar, American Dream, Mirai 350BC, and Obsession.

Flint Corn

Flint corn varieties include Bronze-Orange, Candy Red Flint, Floriani Red Flint, Glass Gem, Indian Ornamental (Rainbow), Mandan Red Flour, Painted Mountain, Petmecky, Cherokee White Flour, PopCorn Pop corn varieties include Monarch Butterfly, Yellow Butterfly, Midnight Blue, Ruby Red, Mixed Baby Rice, Queen Mauve, Mushroom Flake, Japanese Hull-less, Strawberry, Blue Shaman, Miniature Colored, Miniature Pink, Pennsylvania Dutch Butter Flavor, and Red Strawberry.

Dent Corn

Dent corn varieties include Bloody Butcher, Blue Clarage, Ohio Blue Clarage, Cherokee White Eagle, Hickory Cane, Hickory King, Jellicorse Twin, Kentucky Rainbow, Daymon Morgan's Knt. Butcher, Learning, Learning's Yellow, McCormack's Blue Giant, Neal Paymaster, Pungo Creek Butcher, Reid's Yellow Dent, Rotten Clarage, and Tennessee Red Cob.

In some embodiments, corn varieties include P1618W, P1306W, P1345, P1151, P1197, P0574, P0589, and P0157. W=white corn.

In some embodiments, the methods and bacteria described herein are suitable for any hybrid of the maize varieties setforth herein.

Genetically Modified Maize

The methods and bacteria described herein are suitable for any of a hybrid, variety, lineage, etc. of genetically modified maize plants or part thereof.

Furthermore, the methods and bacteria described herein are suitable for any of the following genetically modified maize events, which have been approved in one or more countries: 32138 (32138 SPT Maintainer), 3272 (ENOGEN), 3272 x Bt11, 3272 x bt11 x GA21, 3272 x Bt11 x MIR604, 3272 x Bt11 x MIR604 x GA21, 3272 x Bt11 x MIR604 x TC1507 x 5307 x GA21, 3272 x GA21, 3272 x MIR604, 3272 x MIR604 x GA21, 4114, 5307 (AGRISURE Duracade), 5307 x GA21, 5307 x MIR604 x Bt11 x TC1507 x GA21 (AGRISURE Duracade 5122), 5307 x MIR604 x Bt11 x TC1507 x GA21 x MIR162 (AGRISURE Duracade 5222), 59122 (HERCULEX RW), 59122 x DAS40278, 59122 x GA21, 59122 x MIR604, 59122 x MIR604 x GA21, 59122 x MIR604 x TC1507, 59122 x MIR604 x TC1507 x GA21, 59122 x MON810, 59122 x MON810 x MIR604, 59122 x MON810 x NK603, 59122 x MON810 x NK603 x MIR604, 59122 x MON88017, 59122 x MON88017 x DAS40278, 59122 x NK603 (Herculex RW ROUNDUP READY 2), 59122 x NK603 x MIR604, 59122 x TC1507 x GA21, 676, 678, 680, 3751 IR, 98140, 98140 x 59122, 98140 x TC1507, 98140 x TC1507 x 59122, Bt10 (Bt10), Bt11 [X4334CBR, X4734CBR] (AGRISURE CB/LL), Bt11 x 5307, Bt11 x 5307 x GA21, Bt11 x 59122 x MIR604, Br11 x 59122 x MIR604 x GA21, Bt11 x 59122 x MIR604 x TC1507, M53, M56, DAS-59122-7, Bt11 x 59122 x MIR604 x TC1507 x GA21, Bt11 x 59122 x TC1507, TC1507 x DAS-59122-7, Bt11 x 59122 x TC1507 x GA21, Bt11 x GA21 (AGRISURE GT/CB/LL), Bt11 x MIR162 (AGRISURE Viptera 2100), Bill x MIR162 x 5307, Bt11 x MIR162 x 5307 x GA21, Bt11 x MIR162 x GA21 (AGRISURE Viptera 3110), Bt11 x MIR162 x MIR604 (AGRISURE Viptera 3100), Bt11 x MIR162 x MIR604 x 5307, Bt11 x MIR162 x MIR604 x 5307 x GA21, Bt11 x MIR162 x MIR604 x GA21 (AGRISURE Viptera 3111/AGRISURE Viptera 4), Bt11, MIR162 x MIR604 x MON89034 x 5307 x GA21, Bt11 x MIR162 x MIR604 x TC1507, Bt11 x MIR162 x MIR604 x TC1507 x 5307, Bt11 x MIR162 x MIR604 x TC1507 x GA21, Bt11 x MIR162 x MON89034, Bt11 x MIR162 x MON89034 x GA21, Bt11 x MIR162 x TC1507, Bt11 x MIR162 x TC1507 x 5307, Bt11 x MIR162 x TC1507 x 5307 x GA21, Bt11 x MR162 x TC1507 x GA21 (AGRISURE Viptera 3220), BTI 1 x MIR604 (Agrisure BC/LL/RW), Bt11 x MIR604 x 5307, Bt11 x MIR604 x 5307 x GA21, Bt11 x MIR604 x GA21, Bt11 x MIR604 x TC1507, Bt11 x MIR604 x TC1507 x 5307, Bt11 x MIR604 x TC1507 x GA21, Bt11 x MON89034 x GA21, Bt11 x TC1507, Bt11 x TC1507 x 5307, Bt11 x TC1507 x GA21, Bt176 [176] (NaturGard KnockOut/Maximizer), BVLA430101, CBH-351 (STARLINK Maize), DAS40278 (ENLIST Maize), DAS40278 x NK603, DBT418 (Bt Xtra Maize), DLL25 [B16], GA21 (ROUNDUP READY Maize/AGRISURE GT), GA21 x MON810 (ROUNDUP READY Yieldgard Maize), GA21 x T25, HCEM485, LY038 (MAVERA Maize), LY038 x MON810 (MAVERA Yieldgard Maize), MIR162 (AGRISURE Viptera), MIR162 x 5307, MIR162 x 5307 x GA21, MIR162 x GA21, MIR162 x MIR604, MIR162 x MIR604 x 5307, MIR162 x MIR604 x 5307 x GA21, MIR162 x MIR604 x GA21, MIR162 x MIR604 x TC1507 x 5307, MIR162 x MIR604 x TC1507 x 5307 x GA21, MIR162 x MIR604 x TC1507 x GA21, MIR162 x MON89034, MIR162 x NK603, MIR162 x TC1507, MIR162 x TC1507 x 5307, MIR162 x TC1507 x 5307 x GA21, MIR162 x TC1507 x GA21, MIR604 (AGRISURE RW), MIR604 x 5307, MIR604 x 5307 x GA21, MIR604 x GA21 (AGRISURE GT/RW), MIR604 x NK603, MIR604 x TC1507, MIR604 x TC1507 x 5307, MIR604 x TC1507 x 5307 xGA21, MIR604 x TC1507 x GA21, MON801 [MON80100], MON802, MON809, MON810 (YIELDGARD, MAIZEGARD), MON810 x MIR162, MON810 x MIR162 x NK603, MON810 x MIR604, MON810 x MON88017 (YIELDGARD VT Triple), MON810 x NK603 x MIR604, MON832 (ROUNDUP READY Maize), MON863 (YIELDGARD Rootworm RW, MAXGARD), MON863 x MON810 (YIELDGARD Plus), MON863 x MON810 x NK603 (YIELDGARD Plus with RR), MON863 x NK603 (YIELDGARD RW+RR), MON87403, MON87411, MON87419, MON87427 (ROUNDUP READY Maize), MON87427 x 59122, MON87427 x MON88017, MON87427 x MON88017 x 59122, MON87427 x MON89034, MON87427 x MON89034 x 59122, MON87427 x MON89034 x MIR162 x MON87411, MON87427 x MON89034 x MON88017, MON87427 x MON89034 x MON88017 x 59122, MON87427 x MON89034 x NK603, MON87427 x MON89034 x TC1507, MON87427 x MON89034 x TC1507 x 59122, MON87427 x MON89034 x TC1507 x MON87411 x 59122, MON87427 x MON89034 x TC1507 x MON87411 x 59122 x DAS40278, MON87427 x MON89034 x TC1507 x MON88017, MON87427 x MON89034 x MIR162 x NK603, MON87427 x MON89034 x TC1507 x MON88017 x 59122, MON87427 x TC1507, MON87427 x TC1507 x 59122, MON87427 x TC1507 x MON88017, MON87427 x TC1507 x MON88017 x 59122, MON87460 (GENUITY DROUGHTGARD), MON87460 x MON88017, MON87460 x MON89034 x MON88017, MON87460 x MON89034 x NK603, MON87460 x NK603, MON88017, MON88017 x DAS40278, MON89034, MON89034 x 59122, MON89034 x 59122 x DAS40278, MON89034 x 59122 x MON88017, MON89034 x 59122 x MON88017 x DAS40278, MON89034 x DAS40278, MON89034 x MON87460, MON89034 x MON88017 (GENUITY VT Triple Pro), MON89034 x MON88017 x DAS40278, MON89034 x NK603 (GENUITY VT Double Pro), MON89034 x NK603 x DAS40278, MON89034 x TC1507, MON89034 x TC1507 x 59122, MON89034 x TC1507 x 59122 x DAS40278, MON89034 x TC1507 x DAS40278, MON89034 x TC1507 x MON88017, MON89034 x TC1507 x MON88017 x 59122 (GENUITY SMARTSTAX), MON89034 x TC1507 x MON88017 x 59122 x DAS40278, MON89034 x TC1507 x MON88017 x DAS40278, MON89034 x TC1507 x NK603 (POWER CORE), MON89034 x TC1507 x NK603 x DAS40278, MON89034 x TC1507 x NK603 x MIR162, MON89034 x TC1507 x NK603 x MIR162 x DAS40278, MON89034 x GA21, MS3 (INVIGOR Maize), MS6 (INVIGOR Maize), MZHGOJG, MZIR098, NK603 (ROUNDUP READY 2 Maize), NK603 x MON810 x 4114 x MIR604, NK603 x MON810 (YIELDGARD CB+RR), NK603 x T25 (ROUNDUP READY LIBERTY LINK Maize), T14 (LIBERTY LINK Maize), T25 (LIBERTY LINK Maize), T25 x MON810 (LIBERTY LINK YIELDGARD Maize), TC1507 (HERCULEX I, HERCULEX CB), TC1507 x 59122 x MON810 x MIR604 x NK603 (OPTIMUM INTRASECT XTREME), TC1507 x MON810 x MIR604 x NK603, TC1507 x 5307, TC1507 x 5307 x GA21, TC1507 x 59122 (HERCULEX XTRA), TC1507 x 59122 x DAS40278, TC1507 x 59122 x MON810, TC1507 x 59122 x MON810 x MIR604, TC1507 x 59122 x MON810 x NK603 (OPTIMUM INTRASECT XTRA), TC1507 x 59122 x MON88017, TC1507 x 59122 x MON88017 x DAS40278, TC1507 x 59122 x NK603 (HERCULEX XTRA RR), TC1507 x 59122 x NK603 x MIR604, TC1507 x DAS40278, TC1507 x GA21, TC1507 x MIR162 x NK603, TC1507 x MIR604 x NK603 (OPTIMUM TRISECT), TC1507 x MON810, TC1507 x MON810 x MIR162, TC1507 x MON810 x MIR162 x NK603, TC1507 x MON810 x MIR604, TC1507 x MON810 x NK603 (OPTIMUM INTRASECT), TC1507 x MON810 x NK603 x MIR604, TC1507 x MON88017, TC1507 x MON88017 x DAS40278, TC1507 x NK603 (HERCULEX I RR), TC1507 x NK603 x DAS40278, TC6275, and VCO-01981-5.

Additional Genetically Modified Plants

The methods and bacteria described herein are suitable for any of a variety of genetically modified plants or part thereof.

Furthermore, the methods and bacteria described herein are suitable for any of the following genetically modified plant events which have been approved in one or more countries.

TABLE 14

Rice Traits, which can be combined with microbes of the disclosure
*Oryza sativa* Rice

| Event | Company | Description |
|---|---|---|
| CL121, CL141, CFX51 | BASF Inc. | Tolerance to the imidazolinone herbicide, imazethapyr, induced by chemical mutagenesis of the acetolactate synthase (ALS) enzyme using ethyl methanesulfonate (EMS). |
| IMINTA-1, IMINTA-4 | BASF Inc. | Tolerance to imidazolinone herbicides induced by chemical mutagenesis of the acetolactate synthase (ALS) enzyme using sodium azide. |
| LLRICE06, LLRICE62 | Aventis CropScience | Glufosinate ammonium herbicide tolerant rice produced by inserting a modified phosphinothricin acetyltransferase (PAT) encoding gene from the soil bacterium *Streptomyces hygroscopicus*). |
| LLRICE601 | Bayer CropScience (Aventis CropScience(AgrEvo)) | Glufosinate ammonium herbicide tolerant rice produced by inserting a modified phosphinothricin acetyltransferase (PAT) encoding gene from the soil bacterium *Streptomyces hygroscopicus*). |
| PWC16 | BASF Inc. | Tolerance to the imidazolinone herbicide, imazethapyr, induced by chemical mutagenesis of the acetolactate synthase (ALS) enzyme using ethyl methanesulfonate (EMS). |

TABLE 15

Alfalfa Traits, which can be combined with microbes of the disclosure
*Medicago sativa* Alfalfa

| Event | Company | Description |
|---|---|---|
| J101, J163 | Monsanto Company and Forage Genetics International | Glyphosate herbicide tolerant alfalfa (lucerne) produced by inserting a gene encoding the enzyme 5-enolypyruvylshikimate-3-phosphate synthase (EPSPS) from the CP4 strain of *Agrobacterium tumefaciens*. |

TABLE 16

| Wheat Traits, which can be combined with microbes of the disclosure *Triticum aestivum* Wheat | | |
|---|---|---|
| Event | Company | Description |
| AP205CL | BASF Inc. | Selection for a mutagenized version of the enzyme acetohydroxyacid synthase (AHAS), also known as acetolactate synthase (ALS) or acetolactate pyruvate-lyase. |
| AP602CL | BASF Inc. | Selection for a mutagenized version of the enzyme acetohydroxyacid synthase (AHAS), also known as acetolactate synthase (ALS) or acetolactate pyruvate-lyase. |
| BW255-2, BW238-3 | BASF Inc. | Selection for a mutagenized version of the enzyme acetohydroxyacid synthase (AHAS), also known as acetolactate synthase (ALS) or acetolactate pyruvate-lyase. |
| BW7 | BASF Inc. | Tolerance to imidazolinone herbicides induced by chemical mutagenesis of the acetohydroxyacid synthase (AHAS) gene using sodium azide. |
| MON71800 | Monsanto Company | Glyphosate tolerant wheat variety produced by inserting a modified 5-enolpyruvylshikimate-3-phosphate synthase (EPSPS) encoding gene from the soil bacterium *Agrobacterium tumefaciens*, strain CP4. |
| SWP965001 | Cyanamid Crop Protection | Selection for a mutagenized version of the enzyme acetohydroxyacid synthase (AHAS), also known as acetolactate synthase (ALS) or acetolactate pyruvate-lyase. |
| Teal 11A | BASF Inc. | Selection for a mutagenized version of the enzyme acetohydroxyacid synthase (AHAS), also known as acetolactate synthase (ALS) or acetolactate pyruvate-lyase. |

TABLE 17

| Sunflower Traits, which can be combined with microbes of the disclosure *Helianthus annuus* Sunflower | | |
|---|---|---|
| Event | Company | Description |
| X81359 | BASF Inc. | Tolerance to imidazolinone herbicides by selection of a naturally occurring mutant. |

TABLE 18

| Soybean Traits, which can be combined with microbes of the disclosure *Glycine max* L. Soybean | | |
|---|---|---|
| Event | Company | Description |
| A2704-12, A2704-21, A5547-35 | Bayer CropScience (Aventis CropScience (AgrEvo)) | Glufosinate ammonium herbicide tolerant soybean produced by inserting a modified phosphinothricin acetyltransferase (PAT) encoding gene from the soil bacterium *Streptomyces viridochromogenes*. |
| A5547-127 | Bayer CropScience (Aventis CropScience (AgrEvo)) | Glufosinate ammonium herbicide tolerant soybean produced by inserting a modified phosphinothricin acetyltransferase (PAT) encoding gene from the soil bacterium *Streptomyces viridochromogenes*. |

TABLE 18-continued

| Event | Company | Description |
|---|---|---|
| Soybean Traits, which can be combined with microbes of the disclosure *Glycine max* L. Soybean | | |
| BPS-CV127-9 | BASF Inc. | The introduced csr1-2 gene from *Arabidopsis thaliana* encodes an acetohydroxyacid synthase protein that confers tolerance to imidazolinone herbicides due to a point mutation that results in a single amino acid substitution in which the serine residue at position 653 is replaced by asparagine (S653N). |
| DP-305423 | Pioneer Hi-Bred International Inc. | High oleic acid soybean produced by inserting additional copies of a portion of the omega 6 desaturase encoding gene, gm-fad2-1 resulting in silencing of the endogenous omega-6 desaturase gene (FAD2-1). |
| DP356043 | Pioneer Hi-Bred International Inc. | Soybean event with two herbicide tolerance genes: glyphosate N-acetlytransferase, which detoxifies glyphosate, and a modified acetolactate synthase (ALS) gene which is tolerant to ALS-inhibiting herbicides. |
| G94-1, G94-19, G168 | DuPont Canada Agricultural Products | High oleic acid soybean produced by inserting a second copy of the fatty acid desaturase (Gm Fad2-1) encoding gene from soybean, which resulted in "silencing" of the endogenous host gene. |
| GTS 40-3-2 | Monsanto Company | Glyphosate tolerant soybean variety produced by inserting a modified 5-enolpyruvylshikimate-3-phosphate synthase (EPSPS) encoding gene from the soil bacterium *Agrobacterium tumefaciens*. |
| GU262 | Bayer CropScience (Aventis CropScience(AgrEvo)) | Glufosinate ammonium herbicide tolerant soybean produced by inserting a modified phosphinothricin acetyltransferase (PAT) encoding gene from the soil bacterium *Streptomyces viridochromogenes*. |
| MON87701 | Monsanto Company | Resistance to Lepidopteran pests of soybean including velvetbean caterpillar (*Anticarsia gemmatalis*) and soybean looper (*Pseudoplusia includens*). |
| MON87701 × MON89788 | Monsanto Company | Glyphosate herbicide tolerance through expression of the EPSPS encoding gene from *A. tumefaciens* strain CP4, and resistance to Lepidopteran pests of soybean including velvetbean caterpillar (*Anticarsia gemmatalis*) and soybean looper (*Pseudoplusia includens*) via expression of the Cry1Ac encoding gene from *B. thuringiensis*. |
| MON89788 | Monsanto Company | Glyphosate-tolerant soybean produced by inserting a modified 5-enolpyruvylshikimate-3-phosphate synthase (EPSPS) encoding aroA (epsps) gene from *Agrobacterium tumefaciens* CP4. |
| OT96-15 | Agriculture & Agri-Food Canada | Low linolenic acid soybean produced through traditional cross-breeding to incorporate the novel trait from a naturally occurring fan1 gene mutant that was selected for low linolenic acid. |

TABLE 18-continued

| Soybean Traits, which can be combined with microbes of the disclosure<br>*Glycine max* L. Soybean | | |
|---|---|---|
| Event | Company | Description |
| W62, W98 | Bayer CropScience (Aventis CropScience(AgrEvo)) | Glufosinate ammonium herbicide tolerant soybean produced by inserting a modified phosphinothricin acetyltransferase (PAT) encoding gene from the soil bacterium *Streptomyces hygroscopicus*. |

TABLE 19

| Corn Traits, which can be combined with microbes of the disclosure<br>*Zea mays* L. Maize | | |
|---|---|---|
| Event | Company | Description |
| 176 | Syngenta Seeds, Inc. | Insect-resistant maize produced by inserting the Cry1Ab gene from *Bacillus thuringiensis* subsp. *kurstaki*. The genetic modification affords resistance to attack by the European corn borer (ECB). |
| 3751 IR | Pioneer Hi-Bred International Inc. | Selection of somaclonal variants by culture of embryos on imidazolinone containing media. |
| 676, 678, 680 | Pioneer Hi-Bred International Inc. | Male-sterile and glufosinate ammonium herbicide tolerant maize produced by inserting genes encoding DNA adenine methylase and phosphinothricin acetyltransferase (PAT) from *Escherichia coli* and *Streptomyces viridochromogenes*, respectively. |
| B16 (DLL25) | Dekalb Genetics Corporation | Glufosinate ammonium herbicide tolerant maize produced by inserting the gene encoding phosphinothricin acetyltransferase (PAT) from *Streptomyces hygroscopicus*. |
| BT11 (X4334CBR, X4734CBR) | Syngenta Seeds, Inc. | Insect-resistant and herbicide tolerant maize produced by inserting the Cry1Ab gene from *Bacillus thuringiensis* subsp. *kurstaki*, and the phosphinothricin N-acetyltransferase (PAT) encoding gene from *S. viridochromogenes*. |
| BT11 × GA21 | Syngenta Seeds, Inc. | Stacked insect resistant and herbicide tolerant maize produced by conventional cross breeding of parental lines BT11 (OECD unique identifier: SYN-BTO11-1) and GA21 (OECD unique identifier: MON-OOO21-9). |
| BT11 × MIR162 × MIR604 × GA21 | Syngenta Seeds, Inc. | Resistance to Coleopteran pests, particularly corn rootworm pests (*Diabrotica* spp.) and several Lepidopteran pests of corn, including European corn borer (ECB, *Ostrinia nubilalis*), corn earworm (CEW, *Helicoverpa zea*), fall army worm (FAW, *Spodoptera frugiperda*), and black cutworm (BCW, Agrotis ipsilon); tolerance to glyphosate and glufosinate-ammonium containing herbicides. |
| BT11 × MIR162 | Syngenta Seeds, Inc. | Stacked insect resistant and herbicide tolerant maize produced by conventional cross breeding of parental lines BT11 (OECD unique identifier: SYN-BTO11-1) and MIR162 (OECD unique identifier: SYN-1R162-4). Resistance to the |

TABLE 19-continued

| Corn Traits, which can be combined with microbes of the disclosure *Zea mays* L. Maize | | |
|---|---|---|
| | | European Corn Borer and tolerance to the herbicide glufosinate ammonium (Liberty) is derived from BT11, which contains the Cry1Ab gene from *Bacillus thuringiensis* subsp. *kurstaki*, and the phosphinothricin N-acetyltransferase (PAT) encoding gene from *S. viridochromogenes*. Resistance to other Lepidopteran pests, including *H. zea*, *S. frugiperda*, *A. ipsilon*, and *S. albicosta*, is derived from MIR162, which contains the vip3Aa gene from *Bacillus thuringiensis* strain AB88. |
| BT11 × MIR162 × MIR604 | Syngenta Seeds, Inc. | *Bacillus thuringiensis* Cry1Ab delta-endotoxin protein and the genetic material necessary for its production (via elements of vector pZO1502) in Event Bt11 corn (OECD Unique Identifier: SYNBTO11-1) × *Bacillus thuringiensis* Vip3Aa20 insecticidal protein and the genetic material necessary for its production (via elements of vector pNOV1300) in Event MIR162 maize (OECD Unique Identifier: SYN-IR162-4) × modified Cry3A protein and the genetic material necessary for its production (via elements of vector pZM26) in Event MIR604 corn (OECD Unique Identifier: SYN-1R604-5). |
| CBH-351 | Aventis CropScience | Insect-resistant and glufosinate ammonium herbicide tolerant maize developed by inserting genes encoding Cry9C protein from *Bacillus thuringiensis* subsp *tolworthi* and phosphinothricin acetyltransferase (PAT) from *Streptomyces hygroscopicus*. |
| DAS-06275-8 | DOW AgroSciences LLC | Lepidopteran insect resistant and glufosinate ammonium herbicide-tolerant maize variety produced by inserting the Cry1F gene from *Bacillus thuringiensis* var *aizawai* and the phosphinothricin acetyltransferase (PAT) from *Streptomyces hygroscopicus*. |
| BT11 × MIR604 | Syngenta Seeds, Inc. | Stacked insect resistant and herbicide tolerant maize produced by conventional cross breeding of parental lines BT11 (OECD unique identifier: SYN-BTO11-1) and MIR604 (OECD unique identifier: SYN-1R6O5-5). Resistance to the European Corn Borer and tolerance to the herbicide glufosinate ammonium (Liberty) is derived from BT11, which contains the Cry1Ab gene from *Bacillus thuringiensis* subsp. *kurstaki*, and the phosphinothricin N-acetyltransferase (PAT) encoding gene from *S. viridochromogenes*. Corn rootworm -resistance is derived from MIR604 which contains the mCry3A gene from *Bacillus thuringiensis*. |
| BT11 × MIR604 × GA21 | Syngenta Seeds, Inc. | Stacked insect resistant and herbicide tolerant maize produced by conventional cross breeding of parental lines BT11 (OECD unique identifier: SYN-BTO11-1), |

TABLE 19-continued

| Corn Traits, which can be combined with microbes of the disclosure<br>*Zea mays* L. Maize | | |
|---|---|---|
| | | MIR604 (OECD unique identifier: SYN-1R6O5-5) and GA21 (OECD unique identifier: MON-OOO21-9). Resistance to the European Corn Borer and tolerance to the herbicide glufosinate ammonium (Liberty) is derived from BT11, which contains the Cry1Ab gene from *Bacillus thuringiensis* subsp. *kurstaki*, and the phosphinothricin N-acetyltransferase (PAT) encoding gene from *S. viridochromogenes*. Corn rootworm-resistance is derived from MIR604 which contains the mCry3A gene from *Bacillus thuringiensis*. Tolerance to glyphosate herbicide is derived from GA21 which contains a a modified EPSPS gene from maize. |
| DAS-59122-7 | DOW AgroSciences LLC and Pioneer Hi-Bred International Inc. | Corn rootworm-resistant maize produced by inserting the Cry34Ab1 and Cry35Ab1 genes from *Bacillus thuringiensis* strain PS149B1. The PAT encoding gene from *Streptomyces viridochromogenes* was introduced as a selectable marker. |
| DAS-59122-7 × TC1507 × NK603 | DOW AgroSciences LLC and Pioneer Hi-Bred International Inc. | Stacked insect resistant and herbicide tolerant maize produced by conventional cross breeding of parental lines DAS-59122-7 (OECD unique identifier: DAS-59122-7) and TC1507 (OECD unique identifier: DAS-01507-1) with NK603 (OECD unique identifier: MON-00603-6). Corn rootworm-resistance is derived from DAS-59122- 7 which contains the Cry34Ab1 and Cry35Ab1 genes from *Bacillus thuringiensis* strain P5149B1. Lepidopteran resistance and tolerance to glufosinate ammonium herbicide is derived from TC1507. Tolerance to glyphosate herbicide is derived from NK603. |
| DBT418 | Dekalb Genetics Corporation | Insect-resistant and glufosinate ammonium herbicide tolerant maize developed by inserting genes encoding Cry1AC protein from *Bacillus thuringiensis* subsp *kurstaki* and phosphinothricin acetyltransferase (PAT) from *Streptomyces hygroscopicus*. |
| MIR604 × GA21 | Syngenta Seeds, Inc. | Stacked insect resistant and herbicide tolerant maize produced by conventional cross breeding of parental lines MIR604 (OECD unique identifier: SYN-1R605-5) and GA21 (OECD unique identifier: MON-00021-9). Corn rootworm-resistance is derived from MIR604 which contains the mCry3A gene from *Bacillus thuringiensis*. Tolerance to glyphosate herbicide is derived from GA21. |
| MON80100 | Monsanto Company | Insect-resistant maize produced by inserting the Cry1Ab gene from *Bacillus thuringiensis* subsp. *kurstaki*. The genetic modification affords resistance to attack by the European corn borer (ECB). |

TABLE 19-continued

| Corn Traits, which can be combined with microbes of the disclosure *Zea mays* L. Maize | | |
|---|---|---|
| MON802 | Monsanto Company | Insect-resistant and glyphosate herbicide tolerant maize produced by inserting the genes encoding the Cry1Ab protein from *Bacillus thuringiensis* and the 5-enolpyruvylshikimate-3-phosphate synthase (EPSPS) from *A. tumefaciens* strain CP4. |
| MON809 | Pioneer Hi-Bred International Inc. | Resistance to European corn borer (*Ostrinia nubilalis*) by introduction of a synthetic Cry1Ab gene. Glyphosate resistance via introduction of the bacterial version of a plant enzyme, 5-enolpynivyl shikimate-3-phosphate synthase (EPSPS). |
| MON810 | Monsanto Company | Insect-resistant maize produced by inserting a truncated form of the Cry1Ab gene from *Bacillus thuringiensis* subsp. *kurstaki* HD-1. The genetic modification affords resistance to attack by the European corn borer (ECB). |
| MON810 × LY038 | Monsanto Company | Stacked insect resistant and enhanced lysine content maize derived from conventional crossbreeding of the parental lines MON810 (OECD identifier: MON-OO81O-6) and LY038 (OECD identifier: REN-OOO38-3). |
| MON810 × MON88017 | Monsanto Company | Stacked insect resistant and glyphosate tolerant maize derived from conventional cross-breeding of the parental lines MON810 (OECD identifier: MON-OO81O-6) and MON88017 (OECD identifier: MON-88017-3). European corn borer (ECB) resistance is derived from a truncated form of the Cry1Ab gene from *Bacillus thuringiensis* subsp. *kurstaki* HD-1 present in MON810. Corn rootworm resistance is derived from the Cry3Bb1 gene from *Bacillus thuringiensis* subspecies *kumamotoensis* strain EG4691 present in MON88017. Glyphosate tolerance is derived from a 5-enolpyruvylshikimate-3-phosphate synthase (EPSPS) encoding gene from *Agrobacterium tumefaciens* strain CP4 present in MON88017. |
| MON832 | Monsanto Company | Introduction, by particle bombardment, of glyphosate oxidase (GOX) and a modified 5-enolpyruvyl shikimate-3-phosphate synthase (EPSPS), an enzyme involved in the shikimate biochemical pathway for the production of the aromatic amino acids. |
| MON863 | Monsanto Company | Corn rootworm resistant maize produced by inserting the Cry3Bb1 gene from *Bacillus thuringiensis* subsp. *kumamotoensis*. |
| MON863 × MON810 | Monsanto Company | Stacked insect resistant corn hybrid derived from conventional cross-breeding of the parental lines MON863 (OECD identifier: MON-00863-5) and MON810 (OECD identifier: MON-00810-6) |
| MON863 × MON810 × Monsanto NK603 | Monsanto Company | Stacked insect resistant and herbicide tolerant corn hybrid derived from conventional crossbreeding of the stacked |

TABLE 19-continued

| Corn Traits, which can be combined with microbes of the disclosure<br>*Zea mays* L. Maize | | |
|---|---|---|
| | | hybrid MON-00863-5 × MON-00810-6 and NK603 (OECD identifier: MON-00603-6). |
| MON863 × NK603 | Monsanto Company | Stacked insect resistant and herbicide tolerant corn hybrid derived from conventional crossbreeding of the parental lines MON863 (OECD identifier: MON-OO863-5) and NK603 (OECD identifier: MON-OO6O3-6). |
| MON87460 | Monsanto Company | MON 87460 was developed to provide reduced yield loss under water-limited conditions compared to conventional maize. Efficacy in MON 87460 is derived by expression of the inserted *Bacillus subtilis* cold shock protein B (CspB). |
| MON88017 | Monsanto Company | Corn rootworm-resistant maize produced by inserting the Cry3Bb1 gene from *Bacillus thuringiensis* subspecies *kumamotoensis* strain EG4691. Glyphosate tolerance derived by inserting a 5-enolpyruvylshikimate-3-phosphate synthase (EPSPS) encoding gene from *Agrobacierium tumefaciens* strain CP4. |
| MON89034 | Monsanto Company | Maize event expressing two different insecticidal proteins from *Bacillus thuringiensis* providing resistance to number of Lepidopteran pests. |
| MON89034 × MON88017 | Monsanto Company | Stacked insect resistant and glyphosate tolerant maize derived from conventional cross-breeding of the parental lines MON89034 (OECD identifier: MON-89O34-3) and MON88017 (OECD identifier: MON-88O17-3). Resistance to Lepidopteran insects is derived from two Cry genes present in MON89043. Corn rootworm resistance is derived from a single Cry genes and glyphosate tolerance is derived from the 5-enolpyruvylshikimate-3-phosphate synthase (EPSPS) encoding gene from *Agrobacterium tumefaciens* present in MON88017. |
| MON89034 × NK603 | Monsanto Company | Stacked insect resistant and herbicide tolerant maize produced by conventional cross breeding of parental lines MON89034 (OECD identifier: MON-89034-3) with NK603 (OECD unique identifier: MON-00603-6). Resistance to Lepidopteran insects is derived from two Cry genes present in MON89043. Tolerance to glyphosate herbicide is derived from NK603. |
| NK603 × MON810 | Monsanto Company | Stacked insect resistant and herbicide tolerant corn hybrid derived from conventional crossbreeding of the parental lines NK603 (OECD identifier: MON-00603-6) and MON810 (OECD identifier: MON-00810-6). |
| MON89034 × TC1507 × MON88017 × DAS-59122-7 | Monsanto Company and Mycogen Seeds c/o Dow AgroSciences LLC | Stacked insect resistant and herbicide tolerant maize produced by conventional cross breeding of parental lines: MON89034, TC1507, MON88017, and DAS-59 122. Resistance to the above- |

TABLE 19-continued

| Corn Traits, which can be combined with microbes of the disclosure *Zea mays* L. Maize | | |
|---|---|---|
| | | ground and below-ground insect pests and tolerance to glyphosate and glufosinate-ammonium containing herbicides. |
| M53 | Bayer CropScience (Aventis CropScience(AgrEvo)) | Male sterility caused by expression of the barnase ribonuclease gene from *Bacillus amyloliquefaciens*; PPT resistance was via PPT-acetyltransferase (PAT). |
| M56 | Bayer CropScience (Aventis CropScience(AgrEvo) | Male sterility caused by expression of the barnase ribonuclease gene from *Bacillus amyloliquefaciens*; PPT resistance was via PPT-acetyltransferase (PAT). |
| NK603 | Monsanto Company | Introduction, by particle bombardment, of a modified 5-enolpyruvyl shikimate-3-phosphate synthase (EPSPS), an enzyme involved in the shikimate biochemical pathway for the production of the aromatic amino acids. |
| NK603 × T25 | Monsanto Company | Stacked glufosinate ammonium and glyphosate herbicide tolerant maize hybrid derived from conventional cross-breeding of the parental lines NK603 (OECD identifier: MON-00603-6) and T25 (OECD identifier: ACS-ZM003-2). |
| T25 × MON810 | Bayer CropScience (Aventis CropScience(AgrEvo)) | Stacked insect resistant and herbicide tolerant corn hybrid derived from conventional crossbreeding of the parental lines T25 (OECD identifier: ACS-ZMOO3-2) and MON810 (OECD identifier: MON-OO81O-6). |
| TC1507 | Mycogen (c/o Dow AgroSciences); Pioneer (c/o DuPont) | Insect-resistant and glufosinate ammonium herbicide tolerant maize produced by inserting the Cry1F gene from *Bacillus thuringiensis* var. *aizawai* and the phosphinothricin N-acetyltransferase encoding gene from *Streptomyces viridochromogenes*. |
| TC1507 × NK603 | DOW AgroSciences LLC | Stacked insect resistant and herbicide tolerant corn hybrid derived from conventional crossbreeding of the parental lines 1507 (OECD identifier: DAS-O1507-1) and NK603 (OECD identifier: MON-OO6O3-6). |
| TC1507 × DAS-59122-7 | DOW AgroSciences LLC and Pioneer Hi-Bred International Inc. | Stacked insect resistant and herbicide tolerant maize produced by conventional cross breeding of parental lines TC1507 (OECD unique identifier: DAS-O15O7-1) with DAS-59122-7 (OECD unique identifier: DAS-59122-7). Resistance to Lepidopteran insects is derived from TC1507 due the presence of the Cry1F gene from *Bacillus thuringiensis* var. *aizawai*. Corn rootworm-resistance is derived from DAS-59122-7 which contains the Cry34Ab1 and Cry35Ab1 genes from *Bacillus thuringiensis* strain P5149B1. Tolerance to glufosinate ammonium herbicide is derived from TC1507 from the phosphinothricin N-acetyltransferase encoding gene from *Streptomyces viridochromogenes*. |

TABLE 19-continued

| Corn Traits, which can be combined with microbes of the disclosure *Zea mays* L. Maize | | | |
|---|---|---|---|
| Event | Company | Description | Hybrid Family |
| P0157 | Dupont Pioneer | | P0157 |
| P0157AM | Dupont Pioneer | AM LL RR2 | P0157 |
| P0157AMXT | Dupont Pioneer | AMXT LL RR2 | P0157 |
| P0157R | Dupont Pioneer | RR2 | P0157 |
| P0339AM | Dupont Pioneer | AM LL RR2 | P0339 |
| P0339AMXT | Dupont Pioneer | AMXT LL RR2 | P0339 |
| P0306AM | Dupont Pioneer | AM LL RR2 | P0306 |
| P0589 | Dupont Pioneer | | P0589 |
| P0589AM | Dupont Pioneer | AM LL RR2 | P0589 |
| P0589AMXT | Dupont Pioneer | AMXT LL RR2 | P0589 |
| P0589R | Dupont Pioneer | RR2 | P0589 |
| P0574 | Dupont Pioneer | | P0574 |
| P0574AM | Dupont Pioneer | AM LL RR2 | P0574 |
| P0574AMXT | Dupont Pioneer | AMXT LL RR2 | P0574 |
| P0533EXR | Dupont Pioneer | HXX LL RR2 | P0533 |
| P0506AM | Dupont Pioneer | AM LL RR2 | P0566 |
| P0760AMXT | Dupont Pioneer | AMXT LL RR2 | P0760 |
| P0707AM | Dupont Pioneer | AM LL RR2 | P0707 |
| P0707AMXT | Dupont Pioneer | AMXT LL RR2 | P0707 |
| P0825AM | Dupont Pioneer | AM LL RR2 | P0825 |
| P0825AMXT | Dupont Pioneer | AMXT LL RR2 | P0825 |
| P0969AM | Dupont Pioneer | AM LL RR2 | P0969 |
| P0969AMXT | Dupont Pioneer | AMXT LL RR2 | P0969 |
| P0937AM | Dupont Pioneer | AM LL RR2 | P0937 |
| P0919AM | Dupont Pioneer | AM LL RR2 | P0919 |
| P0905EXR | Dupont Pioneer | HXX LL RR2 | P0905 |
| P1197 | Dupont Pioneer | | P1197 |
| P1197AM | Dupont Pioneer | AM LL RR2 | P1197 |
| P1197AMXT | Dupont Pioneer | AMXT LL RR2 | P1197 |
| P1197R | Dupont Pioneer | RR2 | P1197 |
| P1151 | Dupont Pioneer | | P1151 |
| P1151AM | Dupont Pioneer | AM LL RR2 | P1151 |
| P1151R | Dupont Pioneer | RR2 | P1151 |
| P1138AM | Dupont Pioneer | AM LL RR2 | P1138 |
| P1366AM | Dupont Pioneer | AM LL RR2 | P1366 |
| P1366AMXT | Dupont Pioneer | AMXT LL RR2 | P1366 |
| P1365AMX | Dupont Pioneer | AMX LL RR2 | P1365 |
| P1353AM | Dupont Pioneer | AM LL RR2 | P1353 |
| P1345 | Dupont Pioneer | | P1345 |
| P1311AMXT | Dupont Pioneer | AMXT LL RR2 | P1311 |
| P1498EHR | Dupont Pioneer | HX1 LL RR2 | P1498 |
| P1498R | Dupont Pioneer | RR2 | P1498 |
| P1443AM | Dupont Pioneer | AM LL RR2 | P1443 |
| P1555CHR | Dupont Pioneer | RW HX1 LL RR2 | P1555 |
| P1751AMT | Dupont Pioneer | AMT LL RR2 | P1751 |
| P2089AM | Dupont Pioneer | AM LL RR2 | P2089 |
| QROME | Dupont Pioneer | Q LL RR2 | |

The following are the definitions for the shorthand occurring in Table 19. AM—OPTIMUM ACREMAX Insect Protection system with YGCB, HX1, LL, RR2. AMT—OPTIMUM ACREMAX TRISECT Insect Protection System with RW,YGCB,HX1,LL,RR2. AMXT—(OPTIMUM ACREMAX XTreme). HXX—HERCULEX XTRA contains the Herculex I and Herculex RW genes. HX1—Contains the HERCULEX I Insect Protection gene which provides protection against European corn borer, southwestern corn borer, black cutworm, fall armyworm, western bean cutworm, lesser corn stalk borer, southern corn stalk borer, and sugarcane borer; and suppresses corn earworm. LL—Contains the LIBERTYLINK gene for resistance to LIBERTY herbicide. RR2—Contains the ROUNDUP READY Corn 2 trait that provides crop safety for over-the-top applications of labeled glyphosate herbicides when applied according to label directions. YGCB—contains the YIELDGARD Corn Borer gene offers a high level of resistance to European corn borer, southwestern corn borer, and southern cornstalk borer; moderate resistance to corn earworm and common stalk borer; and above average resistance to fall armyworm. RW—contains the AGRISURE root worm resistance trait. Q—provides protection or suppression against susceptible European corn borer, southwestern corn borer, black cutworm, fall armyworm, lesser corn stalk borer, southern corn stalk borer, stalk borer, sugarcane borer, and corn earworm; and also provides protection from larval injury caused by susceptible western corn rootworm, northern corn rootworm, and Mexican corn rootworm; contains (1) HERCULEX XTRA Insect Protection genes that produce Cry1F and Cry34ab1 and Cry35ab1 proteins, (2) AGRISURE RW trait that includes a gene that produces mCry3A protein, and (3) YIELDGARD Corn Borer gene which produces Cry1Ab protein.

Concentrations and Rates of Application of Agricultural Compositions

As aforementioned, the agricultural compositions of the present disclosure, which comprise a taught microbe, can be applied to plants in a multitude of ways. In two particular aspects, the disclosure contemplates an in-furrow treatment or a seed treatment For seed treatment embodiments, the microbes of the disclosure can be present on the seed in a variety of concentrations. For example, the microbes can be found in a seed treatment at a cfu concentration, per seed of: $1\times10^1$, $1\times10^2$, $1\times10^3$, $1\times10^4$, $1\times10^5$, $1\times10^6$, $1\times10^7$, $1\times10^8$, $1\times10^9$, $1\times10^{10}$, or more. In particular aspects, the seed treatment compositions comprise about $1\times10^4$ to about $1\times10^8$ cfu per seed. In other particular aspects, the seed treatment compositions comprise about $1\times10^5$ to about $1\times10^7$ cfu per seed. In other aspects, the seed treatment compositions comprise about $1\times10^6$ cfu per seed.

In the United States, about 10% of corn acreage is planted at a seed density of above about 36,000 seeds per acre; ⅓ of the corn acreage is planted at a seed density of between about 33,000 to 36,000 seeds per acre; ⅓ of the corn acreage is planted at a seed density of between about 30,000 to 33,000 seeds per acre, and the remainder of the acreage is variable. See, "Corn Seeding Rate Considerations," written by Steve Butzen, available at: https://www.pioneer.com/home/site/us/agronomy/library/corn-seeding-rate-considerations/

Table 20 below utilizes various cfu concentrations per seed in a contemplated seed treatment embodiment (rows across) and various seed acreage planting densities (1st column: 15K-41K) to calculate the total amount of cfu per acre, which would be utilized in various agricultural scenarios (i.e. seed treatment concentration per seed×seed density planted per acre). Thus, if one were to utilize a seed treatment with $1\times10^6$ cfu per seed and plant 30,000 seeds per acre, then the total cfu content per acre would be $3\times10^{10}$ (i.e. 30K*$1\times10^6$).

TABLE 20

Total CFU Per Acre Calculation for Seed Treatment Embodiments

| Corn Population (i.e. seeds per acre) | 1.00E+02 | 1.00E+03 | 1.00E+04 | 1.00E+05 | 1.00E+06 | 1.00E+07 | 1.00E+08 | 1.00E+09 |
|---|---|---|---|---|---|---|---|---|
| 15,000 | 1.50E+06 | 1.50E+07 | 1.50E+08 | 1.50E+09 | 1.50E+10 | 1.50E+11 | 1.50E+12 | 1.50E+13 |
| 16,000 | 1.60E+06 | 1.60E+07 | 1.60E+08 | 1.60E+09 | 1.60E+10 | 1.60E+11 | 1.60E+12 | 1.60E+13 |
| 17,000 | 1.70E+06 | 1.70E+07 | 1.70E+08 | 1.70E+09 | 1.70E+10 | 1.70E+11 | 1.70E+12 | 1.70E+13 |
| 18,000 | 1.80E+06 | 1.80E+07 | 1.80E+08 | 1.80E+09 | 1.80E+10 | 1.80E+11 | 1.80E+12 | 1.80E+13 |
| 19,000 | 1.90E+06 | 1.90E+07 | 1.90E+08 | 1.90E+09 | 1.90E+10 | 1.90E+11 | 1.90E+12 | 1.90E+13 |
| 20,000 | 2.00E+06 | 2.00E+07 | 2.00E+08 | 2.00E+09 | 2.00E+10 | 2.00E+11 | 2.00E+12 | 2.00E+13 |
| 21,000 | 2.10E+06 | 2.10E+07 | 2.10E+08 | 2.10E+09 | 2.10E+10 | 2.10E+11 | 2.10E+12 | 2.10E+13 |
| 22,000 | 2.20E+06 | 2.20E+07 | 2.20E+08 | 2.20E+09 | 2.20E+10 | 2.20E+11 | 2.20E+12 | 2.20E+13 |
| 23,000 | 2.30E+06 | 2.30E+07 | 2.30E+08 | 2.30E+09 | 2.30E+10 | 2.30E+11 | 2.30E+12 | 2.30E+13 |
| 24,000 | 2.40E+06 | 2.40E+07 | 2.40E+08 | 2.40E+09 | 2.40E+10 | 2.40E+11 | 2.40E+12 | 2.40E+13 |
| 25,000 | 2.50E+06 | 2.50E+07 | 2.50E+08 | 2.50E+09 | 2.50E+10 | 2.50E+11 | 2.50E+12 | 2.50E+13 |
| 26,000 | 2.60E+06 | 2.60E+07 | 2.60E+08 | 2.60E+09 | 2.60E+10 | 2.60E+11 | 2.60E+12 | 2.60E+13 |
| 27,000 | 2.70E+06 | 2.70E+07 | 2.70E+08 | 2.70E+09 | 2.70E+10 | 2.70E+11 | 2.70E+12 | 2.70E+13 |
| 28,000 | 2.80E+06 | 2.80E+07 | 2.80E+08 | 2.80E+09 | 2.80E+10 | 2.80E+11 | 2.80E+12 | 2.80E+13 |
| 29,000 | 2.90E+06 | 2.90E+07 | 2.90E+08 | 2.90E+09 | 2.90E+10 | 2.90E+11 | 2.90E+12 | 2.90E+13 |
| 30,000 | 3.00E+06 | 3.00E+07 | 3.00E+08 | 3.00E+09 | 3.00E+10 | 3.00E+11 | 3.00E+12 | 3.00E+13 |
| 31,000 | 3.10E+06 | 3.10E+07 | 3.10E+08 | 3.10E+09 | 3.10E+10 | 3.10E+11 | 3.10E+12 | 3.10E+13 |
| 32,000 | 3.20E+06 | 3.20E+07 | 3.20E+08 | 3.20E+09 | 3.20E+10 | 3.20E+11 | 3.20E+12 | 3.20E+13 |
| 33,000 | 3.30E+06 | 3.30E+07 | 3.30E+08 | 3.30E+09 | 3.30E+10 | 3.30E+11 | 3.30E+12 | 3.30E+13 |
| 34,000 | 3.40E+06 | 3.40E+07 | 3.40E+08 | 3.40E+09 | 3.40E+10 | 3.40E+11 | 3.40E+12 | 3.40E+13 |
| 35,000 | 3.50E+06 | 3.50E+07 | 3.50E+08 | 3.50E+09 | 3.50E+10 | 3.50E+11 | 3.50E+12 | 3.50E+13 |
| 36,000 | 3.60E+06 | 3.60E+07 | 3.60E+08 | 3.60E+09 | 3.60E+10 | 3.60E+11 | 3.60E+12 | 3.60E+13 |
| 37,000 | 3.70E+06 | 3.70E+07 | 3.70E+08 | 3.70E+09 | 3.70E+10 | 3.70E+11 | 3.70E+12 | 3.70E+13 |
| 38,000 | 3.80E+06 | 3.80E+07 | 3.80E+08 | 3.80E+09 | 3.80E+10 | 3.80E+11 | 3.80E+12 | 3.80E+13 |
| 39,000 | 3.90E+06 | 3.90E+07 | 3.90E+08 | 3.90E+09 | 3.90E+10 | 3.90E+11 | 3.90E+12 | 3.90E+13 |
| 40,000 | 4.00E+06 | 4.00E+07 | 4.00E+08 | 4.00E+09 | 4.00E+10 | 4.00E+11 | 4.00E+12 | 4.00E+13 |
| 41,000 | 4.10E+06 | 4.10E+07 | 4.10E+08 | 4.10E+09 | 4.10E+10 | 4.10E+11 | 4.10E+12 | 4.10E+13 |

For in-furrow embodiments, the microbes of the disclosure can be applied at a cfu concentration per acre of: $1\times10^6$, $3.20\times10^{10}$, $1.60\times10^{11}$, $3.20\times10^{11}$, $8.0\times10^{11}$, $1.6\times10^{12}$, $3.20\times10^{12}$, or more. Therefore, in aspects, the liquid in-furrow compositions can be applied at a concentration of between about $1\times10^6$ to about $3\times10^{12}$ cfu per acre.

In some aspects, the in-furrow compositions are contained in a liquid formulation. In the liquid in-furrow embodiments, the microbes can be present at a cfu concentration per milliliter of: $1\times10^1$, $1\times10^2$, $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, or more. In certain aspects, the liquid in-furrow compositions comprise microbes at a concentration of about $1\times10^6$ to about $1\times10^{11}$ cfu per milliliter. In other aspects, the liquid in-furrow compositions comprise microbes at a concentration of about $1\times10^7$ to about $1\times10^{10}$ cfu per milliliter. In other aspects, the liquid in-furrow compositions comprise microbes at a concentration of about $1\times10^8$ to about $1\times10^9$ cfu per milliliter. In other aspects, the liquid in-furrow compositions comprise microbes at a concentration of up to about $1\times10^{13}$ cfu per milliliter.

Transcriptomic Profiling of Candidate Microbes

Previous work by the inventors entailed transcriptomic profiling of strain CI010 to identify promoters that are active in the presence of environmental nitrogen. Strain CI010 was cultured in a defined, nitrogen-free media supplemented with 10 mM glutamine. Total RNA was extracted from these cultures (QIAGEN RNeasy kit) and subjected to RNAseq sequencing via Illumina HiSeq (SeqMatic, Fremont Calif.). Sequencing reads were mapped to the CI010 genome data using Geneious, and highly expressed genes under control of proximal transcriptional promoters were identified.

Tables 21-23 lists genes and their relative expression level as measured through RNASeq sequencing of total RNA. Sequences of the proximal promoters were recorded for use in mutagenesis of nif pathways, nitrogen utilization related pathways, or other genes with a desired expression level.

TABLE 21

| Name | Minimum | Maximum | Length | Direction |
|---|---|---|---|---|
| murein lipoprotein CDS | 2,929,898 | 2,930,134 | 237 | forward |
| membrane protein CDS | 5,217,517 | 5,217,843 | 327 | forward |
| zinc/cadmium-binding protein CDS | 3,479,979 | 3,480,626 | 648 | forward |
| acyl carrier protein CDS | 4,563,344 | 4,563,580 | 237 | reverse |
| ompX CDS | 4,251,002 | 4,251,514 | 513 | forward |
| DNA-binding protein HU-beta CDS | 375,156 | 375,428 | 273 | forward |
| sspA CDS | 629,998 | 630,636 | 639 | reverse |
| tatE CDS | 3,199,435 | 3,199,638 | 204 | reverse |
| LexA repressor CDS | 1,850,457 | 1,851,065 | 609 | forward |
| hisS CDS | <3999979 | 4,001,223 | >1245 | forward |

TABLE 22

| Name | Differential Expression Absolute Confidence | Differential Expression Ratio | RNASeq_nifL - Raw Read Count | RNASeq_nifL - Raw Transcript Count | RNASeq_WT - Raw Read Count | RNASeq_WT - Raw Transcript Count |
|---|---|---|---|---|---|---|
| murein lipoprotein CDS | 1000 | −1.8 | 12950.5 | 10078.9 | 5151.5 | 4106.8 |
| membrane protein CDS | 1000 | −1.3 | 9522.5 | 5371.3 | 5400 | 3120 |
| zinc/cadmium-binding protein CDS | 3.3 | 1.1 | 6461 | 1839.1 | 5318 | 1550.6 |
| acyl carrier protein CDS | 25.6 | 1.6 | 1230.5 | 957.6 | 1473.5 | 1174.7 |
| ompX CDS | 1.7 | 1.1 | 2042 | 734.2 | 1687.5 | 621.5 |
| DNA-binding protein HU-beta CDS | 6.9 | −1.3 | 1305 | 881.7 | 725 | 501.8 |
| sspA CDS | 0.2 | 1 | 654 | 188.8 | 504.5 | 149.2 |
| tatE CDS | 1.4 | 1.3 | 131 | 118.4 | 125 | 115.8 |
| LexA repressor CDS | 0.1 | −1.1 | 248 | 75.1 | 164 | 50.9 |
| hisS CDS | 0 | −1.1 | 467 | 69.2 | 325 | 49.3 |

TABLE 23

| Name | Prm (In Forward direction, −250 to +10 region) SEQ ID NO: | Expressed Sequence SEQ ID NO: | Neighbor Sequence SEQ ID NO: |
|---|---|---|---|
| murein lipoprotein CDS | SEQ ID NO: 3 | SEQ ID NO: 13 | SEQ ID NO: 23 |
| membrane protein CDS | SEQ ID NO: 4 | SEQ ID NO: 14 | SEQ ID NO: 24 |
| zinc/cadmium-binding protein CDS | SEQ ID NO: 5 | SEQ ID NO: 15 | SEQ ID NO: 25 |
| acyl carrier protein CDS | SEQ ID NO: 6 | SEQ ID NO: 16 | SEQ ID NO: 26 |
| ompX CDS | SEQ ID NO: 7 | SEQ ID NO: 17 | SEQ ID NO: 27 |
| DNA-binding protein HU-beta CDS | SEQ ID NO: 8 | SEQ ID NO: 18 | SEQ ID NO: 28 |
| sspA CDS | SEQ ID NO: 9 | SEQ ID NO: 19 | SEQ ID NO: 29 |
| tatE CDS | SEQ ID NO: 10 | SEQ ID NO: 20 | SEQ ID NO: 30 |
| LexA repressor CDS | SEQ ID NO: 11 | SEQ ID NO: 21 | SEQ ID NO: 31 |
| hisS CDS | SEQ ID NO: 12 | SEQ ID NO: 22 | SEQ ID NO: 32 |

TABLE 24

Table of Strains

| Name | Lineage | Mutagenic DNA Description | Genotype | Gene 1 mutation | Gene 2 mutation |
|---|---|---|---|---|---|
| CI006 | Isolated strain from *Enterobacter* (now *Kosakonia*) genera | None | WT | | |
| CI008 | Isolated strain from *Burkholderia* genera | None | WT | | |
| CI010 | Isolated strain from *Klebsiella* genera | None | WT | | |
| CI019 | Isolated strain from *Rahnella* genera | None | WT | | |
| CI028 | Isolated strain from *Enterobacter* genera | None | WT | | |
| CI050 | Isolated strain from *Klebsiella* genera | None | WT | | |
| CM002 | Mutant of CI050 | Disruption of nifL gene with a kanamycin resistance expression cassette (KanR) encoding the aminoglycoside O-phosphotransferase gene aph1 inserted. | ΔnifL::KanR | SEQ ID NO: 33 | |

TABLE 24-continued

Table of Strains

| Name | Lineage | Mutagenic DNA Description | Genotype | Gene 1 mutation | Gene 2 mutation |
|---|---|---|---|---|---|
| CM011 | Mutant of CI019 | Disruption of nifL gene with a spectinomycin resistance expression cassette (SpecR) encoding the streptomycin 3"-O-adenylyltransferase gene aadA inserted. | ΔnifL::SpecR | SEQ ID NO: 34 | |
| CM013 | Mutant of CI006 | Disruption of nifL gene with a kanamycin resistance expression cassette (KanR) encoding the aminoglycoside O-phosphotransferase gene aph1 inserted. | ΔnifL::KanR | SEQ ID NO: 35 | |
| CM004 | Mutant of CI010 | Disruption of amtB gene with a kanamycin resistance expression cassette (KanR) encoding the aminoglycoside O-phosphotransferase gene aph1 inserted. | ΔamtB::KanR | SEQ ID NO: 36 | |
| CM005 | Mutant of CI010 | Disruption of nifL gene with a kanamycin resistance expression cassette (KanR) encoding the aminoglycoside O-phosphotransferase gene aph1 inserted. | ΔnifL::KanR | SEQ ID NO: 37 | |
| CM015 | Mutant of CI006 | Disruption of nifL gene with a fragment of the region upstream of the ompX gene inserted (Prm5). | ΔnifL::Prm5 | SEQ ID NO: 38 | |
| CM021 | Mutant of CI006 | Disruption of nifL gene with a fragment of the region upstream of an unanotated gene and the first 73 bp of that gene inserted (Prm2). | ΔnifL::Prm2 | SEQ ID NO: 39 | |
| CM023 | Mutant of CI006 | Disruption of nifL gene with a fragment of the region upstream of the acpP gene and the first 121 bp of the acpP gene inserted (Prm4). | ΔnifL::Prm4 | SEQ ID NO: 40 | |
| CM014 | Mutant of CI006 | Disruption of nifL gene with a fragment of the region upstream of the lpp gene and the first 29 bp of the lpp gene inserted (Prm1). | ΔnifL::Prm1 | SEQ ID NO: 41 | |
| CM016 | Mutant of CI006 | Disruption of nifL gene with a fragment of the region upstream of the lexA 3 gene and the first 21 bp of the lexA 3 gene inserted (Prm9). | ΔnifL::Prm9 | SEQ ID NO: 42 | |
| CM022 | Mutant of CI006 | Disruption of nifL gene with a fragment of the region upstream of the mntP 1 gene and the first 53 bp of the mntP 1 gene inserted (Prm3). | ΔnifL::Prm3 | SEQ ID NO: 43 | |
| CM024 | Mutant of CI006 | Disruption of nifL gene with a fragment of the region upstream of the sspA gene inserted (Prm7). | ΔnifL::Prm7 | SEQ ID NO: 44 | |
| CM025 | Mutant of CI006 | Disruption of nifL gene with a fragment of the region upstream of the hisS gene and the first 52 bp of the hisS gene inserted (Prm10). | ΔnifL::Prm10 | SEQ ID NO: 45 | |

TABLE 24-continued

Table of Strains

| Name | Lineage | Mutagenic DNA Description | Genotype | Gene 1 mutation | Gene 2 mutation |
|---|---|---|---|---|---|
| CM006 | Mutant of CI010 | Disruption of glnB gene with a kanamycin resistance expression cassette (KanR) encoding the aminoglycoside O-phosphotransferase gene aph1 inserted. | ΔglnB::KanR | SEQ ID NO: 46 | |
| CM017 | Mutant of CI028 | Disruption of nifL gene with a kanamycin resistance expression cassette (KanR) encoding the aminoglycoside O-phosphotransferase gene aph1 inserted. | ΔnifL::KanR | SEQ ID NO: 47 | |
| CM011 | Mutant of CI019 | Disruption of nifL gene with a spectinomycin resistance expression cassette (SpecR) encoding the streptomycin 3"-O-adenylyltransferase gene aadA inserted. | ΔnifL::SpecR | SEQ ID NO: 48 | |
| CM013 | Mutant of CI006 | Disruption of nifL gene with a kanamycin resistance expression cassette (KanR) encoding the aminoglycoside O-phosphotransferase gene aph1 inserted. | ΔnifL:: KanR | SEQ ID NO: 49 | |
| CM005 | Mutant of CI010 | Disruption of nifL gene with a kanamycin resistance expression cassette (KanR) encoding the aminoglycoside O-phosphotransferase gene aph1 inserted. | ΔnifL::KanR | SEQ ID NO: 50 | |
| CM014 | Mutant of CI006 | Disruption of nifL gene with a fragment of the region upstream of the lpp gene and the first 29 bp of the lpp gene inserted (Prm1). | ΔnifL::Prm1 | SEQ ID NO: 51 | |
| CM015 | Mutant of CI006 | Disruption of nifL gene with a fragment of the region upstream of the ompX gene inserted (Prm5). | ΔnifL::Prm5 | SEQ ID NO: 52 | |
| CM023 | Mutant of CI006 | Disruption of nifL gene with a fragment of the region upstream of the acpP gene and the first 121 bp of the acpP gene inserted (Prm4). | ΔnifL::Prm4 | SEQ ID NO: 53 | |
| CM029 | Mutant of CI006 | Disruption of nifL gene with a fragment of the region upstream of the ompX gene inserted (Prm5) and deletion of the 1287 bp after the start codon of the glnE gene containing the adenylyl-removing domain of glutamate-ammonia-ligase adenylyltransferase (ΔglnE-AR_KO1). | ΔnifL::Prm5 ΔglnE-AR_KO1 | SEQ ID NO: 54 | SEQ ID NO: 61 |
| CM014 | Mutant of CI006 | Disruption of nifL gene with a fragment of the region upstream of the lpp gene and the first 29 bp of the lpp gene inserted (Prm1). | ΔnifL::Prm1 | SEQ ID NO: 55 | |
| CM011 | Mutant of CI019 | Disruption of nifL gene with a spectinomycin resistance expression cassette (SpecR) encoding the streptomycin 3"-O-adenylyltransferase gene aadA inserted. | ΔnifL::SpecR | SEQ ID NO: 56 | |

TABLE 24-continued

| Table of Strains | | | | | |
|---|---|---|---|---|---|
| Name | Lineage | Mutagenic DNA Description | Genotype | Gene 1 mutation | Gene 2 mutation |
| CM011 | Mutant of CI019 | Disruption of nifL gene with a spectinomycin resistance expression cassette (SpecR) encoding the streptomycin 3''-O-adenylyltransferase gene aadA inserted. | ΔnifL::SpecR | SEQ ID NO: 57 | |
| CM013 | Mutant of CI006 | Disruption of nifL gene with a kanamycin resistance expression cassette (KanR) encoding the aminoglycoside O-phosphotransferase gene aph1 inserted. | ΔnifL::KanR | SEQ ID NO: 58 | |
| CM011 | Mutant of CI019 | Disruption of nifL gene with a spectinomycin resistance expression cassette (SpecR) encoding the streptomycin 3''-O-adenylyltransferase gene aadA inserted. | ΔnifL::SpecR | SEQ ID NO: 59 | |
| CM011 | Mutant of CI019 | Disruption of nifL gene with a spectinomycin resistance expression cassette (SpecR) encoding the streptomycin 3''-O-adenylyltransferase gene aadA inserted. | ΔnifL::SpecR | SEQ ID NO: 60 | |

EXAMPLES

The following examples are given for the purpose of illustrating various embodiments of the disclosure and are not meant to limit the present disclosure in any fashion. Changes therein and other uses which are encompassed within the spirit of the disclosure, as defined by the scope of the claims, will be recognized by those skilled in the art.

Example 1: Guided Microbial Remodeling—A Platform for the Rational Improvement of Microbial Species for Agriculture An example overview of an embodiment of the Guided Microbial Remodeling (GMR) platform can be summarized in the schematic of FIG. 1A.

FIG. 1A illustrates that the composition of the microbiome can first be characterized and a species of interest is identified (e.g. to find a microbe with the appropriate colonization characteristics).

The metabolism of the species of interest can be mapped and linked to genetics. For example, the nitrogen fixation pathway of the microbe can be characterized. The pathway that is being characterized can be examined under a range of environmental conditions. For example, the microbe's ability to fix atmospheric nitrogen in the presence of various levels of exogenous nitrogen in its environment can be examined. The metabolism of nitrogen can involve the entrance of ammonia ($NH_4^+$) from the rhizosphere into the cytosol of the bacteria via the AmtB transporter. Ammonia and L-glutamate (L-Glu) are catalyzed by glutamine synthetase and ATP into glutamine. Glutamine can lead to the formation of bacterial biomass and it can also inhibit expression of the nif operon, i.e. it can be a competing force when one desires the microbe to fix atmostpheric nitrogen and excrete ammonia. The nitrogen fixation pathway is characterized in great detail in earlier sections of the specification.

Afterwards, a targeted non-intergeneric genomic alteration can be introduced to the microbe's genome, using methods including, but not limited to: conjugation and recombination, chemical mutagenesis, adaptive evolution, and gene editing. The targeted non-intergeneric genomic alteration can include an insertion, disruption, deletion, alteration, perturbation, modification, etc. of the genome.

Derivative remodeled microbes, which comprise the desired phenotype resulting from the remodeled underlying genotype, are then used to inoculate crops.

The present disclosure provides, in certain embodiments, non-intergeneric remodeled microbes that are able to fix atmospheric nitrogen and supply such nitrogen to a plant. In aspects, these non-intergeneric remodeled microbes are able to fix atmospheric nitrogen, even in the presence of exogenous nitrogen.

Figure 1B:
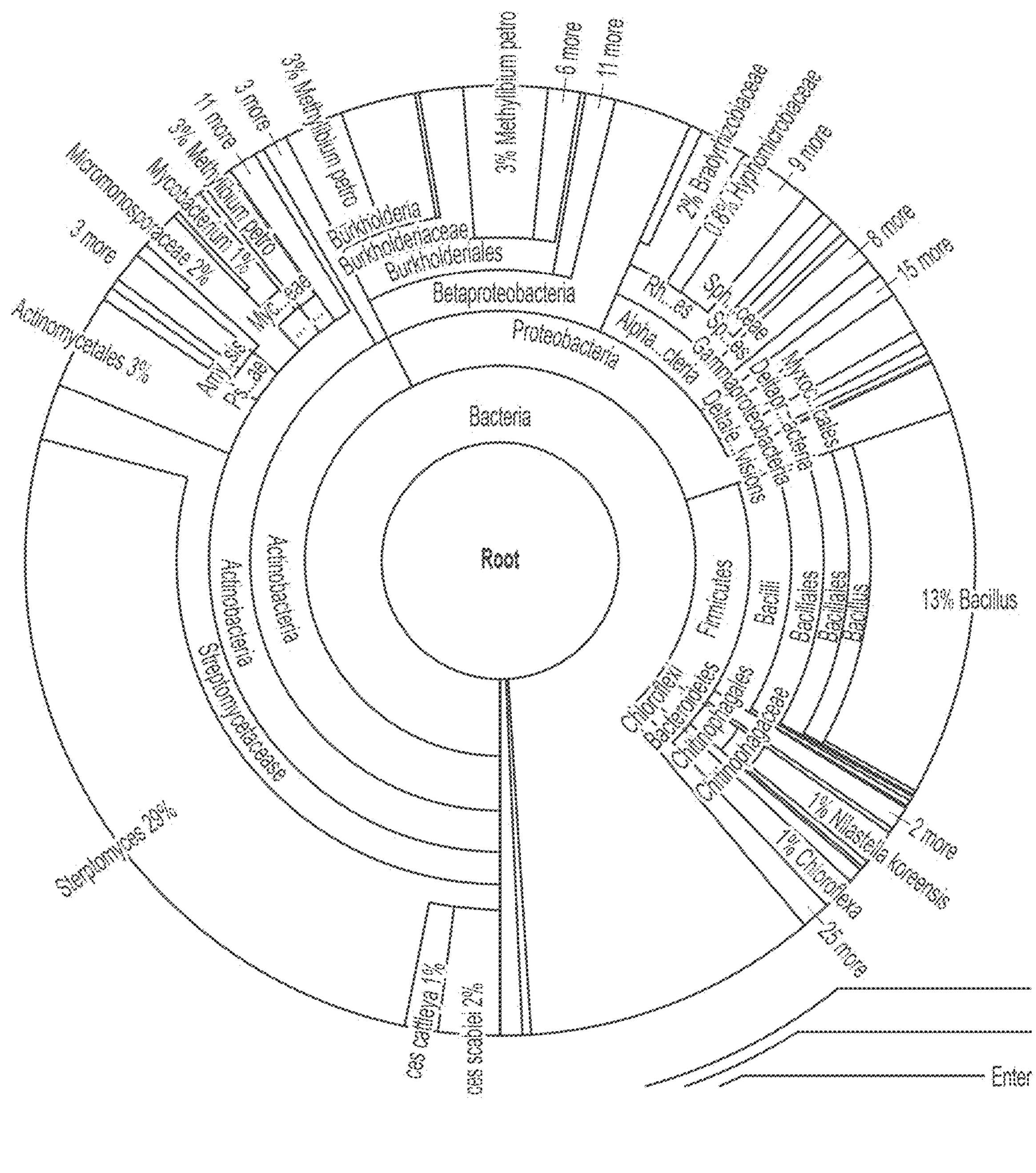
FIG. 1B depicts an expanded view of the measurement of microbiome composition as shown in FIG. 1A.

FIG. 1B depicts an expanded view of the measurement of the microbiome step. In some embodiments, the present disclosure finds microbial species that have desired colonization characteristics, and then utilizes those species in the subsequent remodeling process.

The aforementioned Guided Microbial Remodeling (GMR) platform will now be described with more specificity.

In aspects, the GMR platform comprises the following steps:

A. Isolation—Obtain microbes from the soil, rhizosphere, surface, etc. of a crop plant of interest;

B. Characterization—Involves characterizing the isolated microbes for genotype/phenotypes of interest (e.g. genome sequence, colonization ability, nitrogen fixation activity, solubilization of P ability, excretion of a metabolite of interest, exretion of a plant promoting compound, etc.)

C. Domestication—Development of a molecular protocol for non-intergeneric genetic modification of the microbe;

D. Non-Intergeneric Engineering Campaign and Optimization—Generation of derivative non-intergeneric microbial strains with genetic modifications in key pathways (e.g. colonization associated genes, nitrogen fixation/assimilation genes, P solubilization genes);

E. Analytics—Evaluation of derived non-intergeneric strains for phenotypes of interest both in vitro (e.g. ARA assays) and in planta (e.g. colonization assays).

F. Iterate Engeneering Campaign/Analytics—Iteration of steps D and E for further improvement of microbial strain.

Each of the GMR platform process steps will now be elaborated upon below.

A. Isolation of Microbes

1. Obtain a Soil Sample

Microbes will be isolated from soil and/or roots of a plant. In one example, plants will be grown in a laboratory or a greenhouse in small pots. Soil samples will be obtained from various agricultural areas. For example, soils with diverse texture characteristics can be collected, including loam (e.g. peaty clay loam, sandy loam), clay soil (e.g. heavy clay, silty clay), sandy soil, silty soil, peaty soil, chalky soil, and the like.

2. Grow Bait Plants

Seeds of a bait plant (a plant of interest) (e.g. corn, wheat, rice, *sorghum*, millet, soybean, vegetables, fruits, etc.) will be planted into each soil type. In one example, different varieties of a bait plant will be planted in various soil types. For example, if the plant of interest is corn, seeds of different varieties of corn such as field corn, sweet corn, heritage corn, etc. will be planted in various soil types described above.

3. Harvest Soil and/or Root Samples and Plate on Appropriate Medium

Plants will be harvested by uprooting them after a few weeks (e.g. 2-4 weeks) of growth. Alternative to growing plants in a laboratory/greenhouse, soil and/or roots of the plant of interest can be collected directly from the fields with different soil types.

To isolate rhizosphere microbes and epiphytes, plants will be removed gently by saturating the soil with distilled water or gently loosening the soil by hand to avoid damage to the roots. If larger soil particles are present, these particles will be removed by submerging the roots in a still pool of distilled water and/or by gently shaking the roots. The root will be cut and a slurry of the soil sticking to the root will be prepared by placing the root in a plate or tube with small amount of distilled water and gently shaking the plate/tube on a shaker or centrifuging the tube at low speed. This slurry will be processed as described below.

To isolate endophytes, excess soil on root surfaces will be removed with deionized water. Following soil removal, plants will be surface sterilized and rinsed vigorously in sterile water. A cleaned, 1 cm section of root will be excised from the plant and placed in a phosphate buffered saline solution containing 3 mm steel beads. A slurry will be generated by vigorous shaking of the solution with a Qiagen TissueLyser II.

The soil and/or root slurry can be processed in various ways depending on the desired plant-beneficial trait of microbes to be isolated. For example, the soil and root slurry can be diluted and inoculated onto various types of screening media to isolate rhizospheric, endophytic, epiphytic, and other plant-associated microbes. For example, if the desired plant-beneficial trait is nitrogen fixation, then the soil/root slurry will be plated on a nitrogen free media (e.g. Nfb agar media) to isolate nitrogen fixing microbes. Similarly, to isolate phosphate solubilizing bacteria (PSB), media containing calcium phosphate as the sole source of phosphorus can be used. PSB can solubilize calcium phosphate and assimilate and release phosphorus in higher amounts. This reaction is manifested as a halo or a clear zone on the plate and can be used as an initial step for isolating PSB.

4. Pick Colonies, Purify Cultures, and Screen for the Presence of Genes of Interest Populations of microbes obtained in step A3 are streaked to obtain single colonies (pure cultures). A part of the pure culture is resuspended in a suitable medium (e.g. a mixture of R2A and glycerol) and subjected to PCR analysis to screen for the presence of one or more genes of interest. For example, to identify nitrogen fixing bacteria (diazotrophs), purified cultures of isolated microbes can be subjected to a PCR analysis to detect the presence of nif genes that encode enzymes involved in the fixation of atmospheric nitrogen into a form of nitrogen available to living organisms.

5. Bank a Purified Culture

Purified cultures of isolated strains will be stored, for example at −80° C., for future reference and analysis.

B. Characterization of Isolated Microbes

1. Phylogenetic Characterization and Whole Genome Sequencing

Isolated microbes will be analyzed for phylogenetic characterization (assignment of genus and species) and the whole genome of the microbes will be sequenced.

For phylogenetic characterization, 16S rDNA of the isolated microbe will be sequenced using degenerate 16S rDNA primers to generate phylogenetic identity. The 16S rDNA sequence reads will be mapped to a database to initially assign the genus, species and strain name for isolated microbes. Whole genome sequencing is used as the final step to assign phylogentic genus/species to the microbes.

The whole genome of the isolated microbes will be sequenced to identify key pathways. For the whole genome sequencing, the genomic DNA will be isolated using a genomic DNA isolation kit (e.g. QIAmp DNA mini kit from QIAGEN) and a total DNA library will be prepared using the methods known in the art. The whole genome will be sequenced using high throughput sequencing (also called Next Generation Sequencing) methods known in the art. For example, Illumina, Inc., Roche, and Pacific Biosciences provide whole genome sequencing tools that can be used to prepare total DNA libraries and perform whole genome sequencing.

The whole genome sequence for each isolated strain will be assembled; genes of interest will be identified; annotated; and noted as potential targets for remodeling. The whole genome sequences will be stored in a database.

2. Assay the Microbe for Colonization of a Host Plant in a Greenhouse

Isolated microbes will be characterized for the colonization of host plants in a greenhouse. For this, seeds of the desired host plant (e.g., corn, wheat, rice, *sorghum*, soybean) will be inoculated with cultures of isolated microbes individually or in combination and planted into soil. Alternatively, cultures of isolated microbes, individually or in combination, can be applied to the roots of the host plant by inoculating the soil directly over the roots. The colonization potential of the microbes will be assayed, for example, using a quantitative PCR (qPCR) method described in a greater detail below.

3. Assay the Microbe for Colonization of the Host Plant in Small-Scale Field Trials and Isolate RNA from Colonized Root Samples (CAT Trials)

Isolated microbes will be assessed for colonization of the desired host plant in small-scale field trials. Additionally, RNA will be isolated from colonized root samples to obtain transcriptome data for the strain in a field environment. These small-scale field trials are referred to herein as CAT (Colonization and Transcript) trials, as these trials provide Colonization and Transcript data for the strain in a field environment.

For these trials, seeds of the host plant (e.g., corn, wheat, rice, *sorghum*, soybean) will be inoculated using cultures of isolated microbes individually or in combination and planted into soil. Alternatively, cultures of isolated microbes, individually or in combination, can be applied to the roots of the host plant by inoculating the soil directly over the roots. The CAT trials can be conducted in a variety of soils and/or under various temperature and/or moisture conditions to assess the colonization potential and obtain transcriptome profile of the microbe in various soil types and environmental conditions.

Colonization of roots of the host plant by the inoculated microbe(s) will be assessed, for example, using a qPCR method as described below.

In one protocol, the colonization potential of isolated microbes was assessed as follows. One day after planting of corn seeds, 1 ml of microbial overnight culture (SOB media) was drenched right at the spot of where the seed was located. 1 mL of this overnight culture was roughly equivalent to about 10^9 cfu, varying within 3-fold of each other, depending on which strain is being used. Each seedling was fertilized 3× weekly with 50 mL modified Hoagland's solution supplemented with either 2.5 mM or 0.25 mM ammonium nitrate. At four weeks after planting, root samples were collected for DNA extraction. Soil debris were washed away using pressurized water spray. These tissue samples were then homogenized using QIAGEN Tissuelyzer and the DNA was then extracted using QIAmp DNA Mini Kit (QIAGEN) according to the recommended protocol. qPCR assay was performed using Stratagene Mx3005P RT-PCR on these DNA extracts using primers that were designed (using NCBI's Primer BLAST) to be specific to a loci in each of the microbe's genome.

The presence of the genome copies of the microbe was quantified, which reflected the colonization potential of the microbe. Identity of the microbial species was confirmed by sequencing the PCR amplification products.

Additionally, RNA will be isolated from colonized root and/or soil samples and sequenced.

Unlike the DNA profile, an RNA profile varies depending on the environmental conditions. Therefore, sequencing of RNA isolated from colonized roots and/or soil will reflect the transcriptional activity of genes in planta in the rhizosphere.

RNA can be isolated from colonized root and/or soil samples at different time points to analyze the changes in the RNA profile of the colonized microbe at these time points.

For example, RNA can be isolated from colonized root and/or soil samples right after fertilization of the field and a few weeks after fertilization of the field and sequenced to generate corresponding transcriptional profile.

Similarly, RNA sequencing can be carried out under high phosphate and low phosphate conditions to understand which genes are transcriptionally active or repressed under these conditions.

Methods for transcriptomic/RNA sequencing are known in the art. Briefly, total RNA will be isolated from the purified culture of the isolated microbe; cDNA will be prepared using reverse transcriptase; and the cDNA will be sequenced using high throughput sequencing tools described above.

Sequencing reads from the transcriptome analysis can be mapped to the genomic sequence and transcriptional promoters for the genes of interest can be identified.

4. Assay the Plant-Beneficial Activity of Isolated Microbes

The plant-beneficial activity of isolated microbes will be assessed.

For example, nitrogen fixing microbes will be assayed for nitrogen fixation activity using an acetylene reduction assay (ARA) or phosphate solubilizing microbes will be assayed for phosphate solubilization. Any paramater of interest can be utilized and an appropriate assay developed for such. For instance, assays could include growth curves for colonization metrics and assays for production of phytohormones like indole acetic acid (IAA) or gibberellins. An assay for any plant-beneficial activity that is of interest can be developed.

This step will confirm the phenotype of interest and eliminate any false positives.

5. Selection of Potential Candidates from Isolated Microbes

The data generated in the above steps will be used to select microbes for further development. For example, microbes showing a desired combination of colonization potential, plant-beneficial activity, and/or relevant DNA and RNA profile will be selected for domestication and remodeling.

C. Domestication of Selected Microbes

The selected microbes will be domesticated; wherein, the microbes will be converted to a form that is genetically tractable and identifiable.

1. Test for Antibiotic Sensitivity

One way to domesticate the microbes is to engineer them with antibiotic resistance. For this, the wild type microbial strain will be tested for sensitivity to various antibiotics. If the strain is sensitive to the antibiotic, then the antibiotic can be a good candidate for use in genetic tools/vectors for remodeling the strain.

2. Design and Build a Vector

Vectors that are conditional for their replication (e.g. a suicide plasmid) will be constructed to domesticate the selected microbes (host microbes). For example, a suicide plasmid containing an appropriate antibiotic resistance marker, a counter selectable marker, an origin of replication for maintenance in a donor microbe (e.g. *E. coli*), a gene encoding a fluorescent protein (GFP, RFP, YFP, CFP, and the like) to screen for insertion through fluorescence, an origin of transfer for conjugation into the host microbe, and a polynucleotide sequence comprising homology arms to the host genome with a desired genetic variation will be constructed. The vector may comprise a SceI site and other additional elements.

Exemplary antibiotic resistance markers include ampicillin resistance marker, kanamycin resistance marker, tetracycline resistance marker, chloramphenicol resistance marker, erythromycin resistance marker, streptomycin resistance marker, spectinomycin resistance marker, etc. Exemplary counter selectable markers include sacB, rpsL, tetAR, pheS, thyA, lacY, gata-1, ccdB, etc.

3. Generation of Donor Microbes

In one protocol, a suicide plasmid containing an appropriate antibiotic resistance marker, a counter selectable marker, the λpir origin of replication for maintenance in *E.*

*coli* ST18 containing the pir replication initiator gene, a gene encoding green fluorescent protein (GFP) to screen for insertion through fluorescence, an origin of transfer for conjugation into the host microbe, and a polynucleotide sequence comprising homology arms to the host genome with a desired genetic variation (e.g. a promoter from within the microbe's own genome for insertion into a heterologous location) will be transformed into *E. coli* ST18 (an auxotroph for aminolevulinic acid, ALA) to generate donor microbes.

4. Mix Donor Microbes with Host Microbes

Donor microbes will be mixed with host microbes (selected candidate microbes from step B5) to allow conjugative integration of the plasmid into the host genome. The mixture of donor and host microbes will be plated on a medium containing the antibiotic and not containing ALA. The suicide plasmid is able to replicate in donor microbes (*E. coli* ST18), but not in the host. Therefore, when the mixture containing donor and host microbes is plated on a medium containing the antibiotic and not containing ALA, only host cells that integrated the plasmid into its genome will be able to grow and form colonies on the medium. The donor microbes will not grow due to the absence of ALA.

5. Confirm Integration of the Vector

A proper integration of the suicide plasmid containing the fluorescent protein marker, the antibiotic resistance marker, the counter selectable marker, etc. at the intended locus of the host microbe will be confirmed through fluorescence of colonies on the plate and using colony PCR.

6. Streak Confirm Integration Colony

A second round of homologous recombination in the host microbes will loop out (remove) the plasmid backbone leaving the desired genetic variation (e.g. a promoter from within the microbe's own genome for insertion into a heterologous location) integrated into the host genome of a certain percentage of host microbes, while reverting a certain percentage back to wild type.

Colonies of host microbes that have looped out the plasmid backbone (and therefore, looped out the counter selectable marker) can be selected by growing them on an appropriate medium.

For example, if sacB is used as a counter selectable marker, loss of this marker due to the loss of the plasmid backbone will be tested by growing the colonies on a medium containing sucrose (sacB confers sensitivity to sucrose). Colonies that grow on this medium would have lost the sacB marker and the plasmid backbone and would either contain the desired genetic variation or be reverted to wild type. Also, these colonies will not fluoresce on the plate due to the loss of the fluorescent protein marker.

In some isolates, the sacB or other counterselectable markers do not confer full sensitivity to sucrose or other counterselection mechanisms, which necessitates screening large numbers of colonies to isolate a successful loop-out. In those cases, loop-out may be aided by use of a "helper plasmid" that replicates independently in the host cell and expresses a restriction endonuclease, e.g. SceI, which recognizes a site in the integrated suicide plasmid backbone. The strain with the integrated suicide plasmid is transformed with the helper plasmid containing an antibiotic resistance marker, an origin of replication compatible with the host strain, and a gene encoding a restriction endonuclease controlled by a constitutive or inducible promoter. The double-strand break induced in the integrated plasmid backbone by the restriction endonuclease promotes homologous recombination to loop-out the suicide plasmid. This increases the number of looped-out colonies on the counterselection plate and decreases the number of colonies that need to be screened to find a colony containing the desired mutation. The helper plasmid is then removed from the strain by culture and serial passaging in the absence of antibiotic selection for the plasmid. The passaged cultures are streaked for single colonies, colonies are picked and screened for sensitivity to the antibiotic used for selection of the helper plasmid, as well as absence of the plasmid confirmed by colony PCR. Finally, the genome is sequenced and the absence of helper plasmid DNA is confirmed as described in D6.

7. Confirm Integration of the Genetic Variation Through Colony PCR

The colonies that grew better on the sucrose-containing medium (or other appropriate media depending on the counter selectable marked used) will be picked and the presence of the genetic variation at the intended locus will be confirmed by screening the colonies using colony PCR.

Although this example describes one protocol for domesticating the microbe and introducing genetic variation into the microbe, one of ordinary skill in the art would understand that the genetic variation can be introduced into the selected microbes using a variety of other techniques known in the art such as: polymerase chain reaction mutagenesis, oligonucleotide-directed mutagenesis, saturation mutagenesis, fragment shuffling mutagenesis, homologous recombination, ZFN, TALENS, CRISPR systems (Cas9, Cpf1, etc.), chemical mutagenesis, and combinations thereof.

8. Iterate Upon Steps C2-C7

If any of the steps C2-C7 fail to provide the intended outcome, the steps will be repeated to design an alternative vector that may comprise different elements for facilitating incorporation of desired genetic variations and markers into the host microbe.

9. Develop a Standard Operating Procedure (SOP)

Once the steps C2-C7 can be reproduced consistently for a given strain, the steps will be used to develop a standard operating procedure (SOP) for that strain and vector. This SOP can be used to improve other plant-beneficial traits of the microbe.

D. Non-Intergeneric Engineering Campaign and Optimization

1. Identify Gene Targets for Optimization

Selected microbes will be engineered/remodeled to improve performance of the plant-beneficial activity. For this, gene targets for improving the plant-beneficial activity will be identified.

Gene targets can be identified in various ways. For example, genes of interest can be identified while annotating the genes from the whole genome sequencing of isolated microbes. They can be identified through a literature search. For example, genes involved in nitrogen fixation are known in the literature. These known genes can be used as targets for introducing genetic variations. Gene targets can also be identified based on the RNA sequencing data obtained in the step B3 (small-scale field trials for colonization) or by performing RNA sequencing described in the step below.

2. Select Promoters for Promoter Swaps

A desired genetic variation for improving the plant-beneficial activity can comprise promoter swapping, in which the native promoter for a target gene is replaced with a stronger or weaker promoter (when compared to the native promoter) from within the microbe's genome, or differently regulated promoter (e.g. a N-independent). If the expression of a target gene increases the plant-beneficial activity (e.g., nifA, the expression of which enhances nitrogen fixation in microbes), the desired promoter for promoter swapping is a stronger promoter (compared to the native promoter of the target gene) that would further increase the expression level of the target gene compared to the native promoter. If the expression of a target gene decreases the plant-beneficial activity (e.g., nifL that downregulates nitrogen fixation), the desired promoter for promoter swapping is a weak promoter (compared to the native promoter of the target gene) that would substantially decrease the expression level of the target gene compared to the native promoter. Promoters can be inserted into genes to "knock-out" a gene's expression, while at the same time upregulating the expression of a downstream gene.

Promoters for promoter swapping can be selected based on the RNA sequencing data. For example, the RNA sequencing data can be used to identify strong and weak promoters, or constitutively active vs. inducible promoters.

For example, to identify strong and weak promoters, or constitutively active vs. inducible promoters, in the nitrogen fixation pathway, selected microbes will be cultured in vitro under nitrogen-depleted and nitrogen-replete conditions; RNA of the microbe will be isolated from these cultures; and sequenced.

In one protocol, the RNA profile of the microbe under nitrogen-depleted and nitrogen-replete conditions will be compared and active promoters with a desired transcription level will be identified. These promoters can be selected to swap a weak promoter.

Promoters can also be selected using the RNA sequencing data obtained in the step B3 that reflects the RNA profile of the microbe in planta in the host plant rhizosphere.

RNA sequencing under various conditions allows for selection of promoters that: a) are active in the rhizosphere during the host plant growth cycle in fertilized field conditions, and b) are also active in relevant in vitro conditions so they can be rapidly screened.

In an exemplary protocol, in planta RNA sequencing data from colonization assays (e.g. step B3) is used to measure the expression levels of genes in isolated microbes. In one embodiment, the level of gene expression is calculated as reads per kilobase per million mapped reads (RPKM). The expression level of various genes is compared to the expression level of a target gene and at least the top 10, 20, 30, 40, 50, 60, or 70 promoters, associated with the various genes, that show the highest or lowest level of expression compared to the target gene are selected as possible candidates for promoter swapping. Thus, one looks at expression levels of various genes relative to a target gene and then selects genes that demonstrate increased expression relative to a target (or standard) gene and then find the promoters associated with said genes.

For example, if the target gene is upregulation of nifA, the first 10, 20, 30, 40, 50, or 60 promoters for genes that show the highest level of expression compared to nifA are selected as possible candidates for promoter swapping.

These candidates can be further short-listed based on in vitro RNA sequencing data. For example, for nifA as the target gene, possible promoter candidates selected based on the in planta RNA sequencing data are further selected by choosing promoters with similar or increased gene expression levels compared to nifA under in vitro nitrogen-deplete vs. nitrogen-replete conditions.

The set of promoters selected in this step are used to swap the native promoter of the target gene (e.g. nifA). Remodeled strains with swapped promoters are tested in in vitro assays; strains with lower than expected activity are eliminated; and strains with expected or higher than expected activity are tested in field. The cycle of promoter selection may be repeated on remodeled strains to further improve their plant-beneficial activity.

Described here is an exemplary promoter swap experiment that was carried out based on in planta and in vitro RNA sequencing data from *Klebsiella variicola* strain, CI137 to improve the nitrogen fixation trait. CI137 was analyzed in ARA assays at 0 mM and 5 mM glutamine concentration and RNA was extracted from these ARA samples. The RNA was sequenced via NextSeq and a subset of reads from one sample was mapped to the CI137 genome (in vitro RNA sequencing data). RNA was extracted from the roots of corn plants at V5 stage in the colonization and activity assay (e.g. step B3) for CI137. Samples from six plants were pooled; the RNA from the pooled sample was sequenced using NextSeq, and reads were mapped to the CI137 genome (in planta RNA sequencing data). Out of $2\times10^8$ total reads, $7\times10^4$ reads mapped to CI137. In planta RNA sequencing data was used to rank genes in order of in planta expression levels and the expression levels were compared to the native nifA expression level. The first 40 promoters that showed the highest expression level (based on gene expression) compared to the native nifA expression level were selected. These 40 promoters were further short-listed based on the in vitro RNA sequencing data, where promoters with increased or similar in vitro expression levels compared to nifA were selected. The final list of promoters included 17 promoters and two versions of most promoters were used to generate promoter swap mutants; thus a total of 30 promoters were tested. Generation of a suite of CI137 mutants where nifL was deleted partially or completely and the 30 promoters inserted (ΔnifL:Prm) was attempted. 28 out of 30 mutants were generated successfully. The ΔnifL:Prm mutants were analyzed in ARA assays at 0 mM and 5 mM glutamine concentration and RNA was extracted from these ARA samples. Several mutants showed lower than expected or decreased ARA activity compared to the WT CI137 strain. A few mutants showed higher than expected ARA activity.

A person of ordinary skill in the art would appreciate from the above example that while in planta and/or in vitro RNA sequencing data can be used to select promoters for promoter swapping, the step of promoter selection is highly unpredictable and involves many challenges.

For example, in planta RNA sequencing mainly reveals the genes that are highly expressed; however, it is difficult to detect fine differences in gene expression and/or genes with low expression levels. For instance, in some in planta RNA sequencing experiments, only about 40 out of about 5000 genes from a microbial genome were detected. Thus, in planta RNA sequencing technique is useful to identify abundantly expressed genes and their corresponding promoters; however, the technique has difficulty in identifying low expression genes and corresponding promoters and small differences between gene expression.

Furthermore, in planta RNA profile reflects the status of the genes at the time the microbes were isolated; however, a slight change in the field conditions can substantially change the RNA profile of rhizosphere/epiphytic/endophytic microbes. Therefore, it is difficult to predict in advance whether the promoters selected based on one field trial RNA sequencing data would provide desirable expression levels of the target gene when remodeled strains are tested in vitro and in field.

Additionally, in planta evaluation is time and resource-consuming; therefore, in planta experiments cannot be conducted often and/or repeated quickly or easily. On the other hand, while in vitro RNA sequencing can be conducted relatively quickly and easily, the in vitro conditions do not mimic the field conditions and promoters that may show high activity in vitro may not show comparable activity in planta.

Moreover, promoters often don't behave as predicted in a new context. Therefore, in planta and in vitro RNA sequencing data can at best serve as a starting point in the step of promoter selection; however, arriving at any particular promoter that would provide desirable expression levels of the target gene in the field is, in some instances, unpredictable.

Another limitation in the step of promoter selection is the number of available promoters. Because one of the goals of the present invention is to provide non-transgenic microbes; promoters for promoter swapping need to be selected from within the microbe's genome, or genus. Thus, unlike a transgenic approach, the present process can not merely go out into the literature and find/use a well characterized transgenic promoter from a different host organism.

Another constraint is that the promoter must be active in planta during a desired growth phase. For example, the highest requirement for nitrogen in plants is generally late in the growing season, e.g. late vegetative and early reproductive phases. For example, in corn, nitrogen uptake is the highest during V6 (six leaves) through R1 (reproductive stage 1) stages. Therefore, to increase the availability of nitrogen during V6 through R1 stages of corn, remodeled microbes must show highest nitrogen fixation activity during these stages of the corn lifecycle. Accordingly, promoters that are active in planta during the late vegetative and early reproductive stages of corn need to be selected. This constraint not only reduces the number of promoters that may be tested in promoter swapping, but also make the step of promoter selection unpredictable. As discussed above, unpredictability arises, in part, because although the RNA sequencing data from small scale field trials (e.g. step B3) may be used to identify promoters that are active in planta during a desired growth stage, the RNA data is based on the field conditions (e.g., type of soil, level of water in the soil, level of available nitrogen, etc.) at the time of sample collection. As one of ordinary skill in the art would understand, the field conditions may change over the period of time within the same field and also change substantially across various fields. Thus, the promoters selected under one field condition may not behave as expected under other field conditions. Similarly, selected promoters may not behave as expected after swapping. Therefore, it is difficult to anticipate in advance whether the selected promoters would be active in planta during a desired growth phase of a plant of interest.

3. Design Non-Intergeneric Genetic Variations

Based on steps D1 (identification of gene targets) and D2 (identification of promoters for promoter swaps), non-intergeneric genetic variations will be designed.

The term "non-intergeneric" indicates that the genetic variation to be introduced into the host does not contain a nucleic acid sequence from outside the host genus (i.e., no transgenic DNA). Although vectors and/or other genetic tools will be used to introduce the genetic variation into the host microbe, the methods of the present disclosure include steps to loop-out (remove) the backbone vector sequences or other genetic tools introduced into the host microbe leaving only the desired genetic variation into the host genome. Thus, the resulting microbe is non-transgenic.

Exemplary non-intergeneric genetic variations include a mutation in the gene of interest that may improve the function of the protein encoded by the gene; a constitutionally active promoter that can replace the endogenous promoter of the gene of interest to increase the expression of the gene; a mutation that will inactivate the gene of interest; the insertion of a promoter from within the host's genome into a heterologous location, e.g. insertion of the promoter into a gene that results in inactivation of said gene and upregulation of a downstream gene; and the like. The mutations can be point mutations, insertions, and/or deletions (full or partial deletion of the gene). For example, in one protocol, to improve the nitrogen fixation activity of the host microbe, a desired genetic variation may comprise an inactivating mutation of the nifL gene (negative regulator of nitrogen fixation pathway) and/or comprise replacing the endogenous promoter of the nifH gene (nitrogenase iron protein that catalyzes a key reaction to fix atmospheric nitrogen) with a constitutionally active promoter that will drive the expression of the nifH gene constitutively.

4. Generate Non-Intergeneric Derivative Strains

After designing the non-intergeneric genetic variations, steps C2-C7 will be carried out to generate non-intergeneric derivative strains (i.e. remodeled microbes).

5. Bank a Purified Culture of the Remodeled Microbe

A purified culture of the remodeled microbe will be preserved in a bank, so that gDNA can be extracted for whole genome sequencing described below.

6. Confirm Presence of the Desired Genetic Variation

The genomic DNA of the remodeled microbe will be extracted and the whole genome sequencing will be performed on the genomic DNA using methods described previously. The resulting reads will be mapped to the reads previously stored in LIMS to confirm: a) presence of the desired genetic variation, and b) complete absence of reads mapping to vector sequences (e.g. plasmid backbone or helper plasmid sequence) that were used to generate the remodeled microbe.

This step allows sensitive detection of non-host genus DNA (transgenic DNA) that may remain in the strain after looping out of the vector backbone (e.g. suicide plasmid) method and could provide a control for accidental off-target insertion of the genetic variation, etc.

E. Analytics Upon Remodeled Microbes

1. Analysis of the Plant-Beneficial Activity

The plant-beneficial activity and growth kinetics of the remodeled microbes will be assessed in vitro.

For example, strains remodeled for improving nitrogen fixation function will be assessed for nitrogen fixation activity and fitness through acetylene reduction assays, ammonium excretion assays, etc.

Strains remodeled for improved phosphate solubilization will be assessed for the phosphate solubilization activity.

This step allows rapid, medium to high throughput screening of remodeled strains for the phenotypes of interest.

2. Analysis of Colonization and Transcription of the Altered Genes

Remodeled strains will be assessed for colonization of the host plant either in the greenhouse or in the field using the steps described in B3. Additionally, RNA will be isolated from colonized root and/or soil samples and sequenced to analyze the transcriptional activity of target genes. Target genes comprise the genes containing the genetic variation introduced and may also comprise other genes that play a role in the plant-beneficial trait of the microbe.

For example, a cluster of genes, the nif genes, controls the nitrogen fixation activity of microbes. Using the protocol described above, a genetic variation may be introduced into one of the nif genes (e.g. a promoter insertion), whereas the other genes in the nif cluster are in their endogenous form (i.e. their gene sequence and/or the promoter region is not altered). The RNA sequencing data will be analyzed for the transcriptional activity of the nif gene containing the genetic variation and may also be analyzed for other nif genes that are not altered directly, by the inserted genetic change, but nonetheless may be influenced by the introduced genetic change.

This step allows determination of the fitness of top in vitro performing strains in the rhizosphere and allows measurement of the transcriptional activity of altered genes in planta.

F. Iterate Engineering Campaign/Analytics

The data from in vitro and in planta analytics (steps E1 and E2) will be used to iteratively stack beneficial mutations.

Furthermore, steps A-E described above may be repeated to finetune the plant-beneficial traits of the microbes. For example, plants will be inoculated using microbial strains remodeled in the first round; harvested after a few weeks of growth; and microbes from the soil and/or roots of the plants will be isolated. The functional activity (plant-beneficial trait and colonization potential) and the DNA and RNA profile of isolated microbes will be characterized, in order to select microbes with improved plant-beneficial activity and colonization potential. The selected microbes will be remodeled to further improve the plant-beneficial activity. Remodeled microbes will be screened for the functional activity (plant-beneficial trait and colonization potential) and RNA profile in vitro and in planta and the top performing strains will be selected. If desired, steps A-E can be repeated to further improve the plant-beneficial activity of the remodeled microbes from the second round. The process can be repeated for 1, 2, 3, 4, 5, 6, 7, 8, 9, 10, or more rounds.

The exemplary steps described above are summarized in Table A below.

TABLE A

An Overview of an Embodiment of the Guided Microbial Remodeling Platform

| | Steps | Contribution | Alternate Forms |
|---|---|---|---|
| A | Isolation | | |
| 1 | Obtain a soil sample | Provides WT soil microbes to be isolated | |
| 2 | Grow corn "bait plants" in soil sample | Allows selection of plant-beneficial microbes by rhizosphere | Wheat, sorghum, rice, millet, soybean, etc. |
| 3 | Harvest, clean and extract root sample and plate on nitrogen-free (specifically NfB) media | Down-select soil microbes to those that a) colonize the root and b) fix atmospheric nitrogen | Other nitrogen-free media, other selective or screening media (e.g. for phosphate solubilization) |
| 4 | Pick colonies, purify cultures and screen for presence of nifH using degenerate primers | Down-select microbes to those containing the nifH gene (eliminate false-positive from media screen) | Degenerate primers for other genes of interest, e.g. ipdC (phytohormone biosynthesis) |
| 5 | Bank a purified culture of the strain | | |
| B | Characterization | | |
| 1 | Sequence and assemble the genome of the strain using Illumina and/or PacBio platform | Characterize genome for key pathways | |
| 2 | Assay the microbe for colonization of corn roots in the greenhouse (qPCR-based method) | Down-select for microbes that colonize the plant well | Wheat, sorghum, rice, millet, soybean, etc., other methods for assaying colonization (e.g. plating) |
| 3 | Assay the microbe for colonization of corn roots in a small-scale field trials (qPCR-based method) and isolate RNA from colonized root samples | Known internally as "CAT" trials, these provide Colonization And Transcript data for the strain in a field environment | Larger field trials, other crops, other methods for assaying colonization (e.g. plating) |
| 4 | Assay the microbe for nitrogen fixation activity in an acetylene reduction assay (ARA) | Confirm N-fixation phenotype of strain | |
| 5 | Use the above data to select candidate microbe for further domestication and optimization | Allows selection of greatest-potential candidates | |
| C | Domestication | | |
| 1 | Test microbes for sensitivity to various antibiotics | Determine which antibiotic selection markers can be used to transform genetic tools | |

TABLE A-continued

An Overview of an Embodiment of the Guided Microbial Remodeling Platform

| | Steps | Contribution | Alternate Forms |
|---|---|---|---|
| 2 | Design and build a suicide plasmid containing an appropriate antibiotic resistance marker, sacB counter-selectable marker, origin of replication for maintenance in *E. coli*, GFP to screen for insertion through fluorescence, origin of transfer for conjugation into the host, homology arms to the host genome, and the desired mutation. | These are the "parts" necessary to maintain the plasmid and carry out conjugation, insertion and "loop-out" of the hose genome | Plasmid could contain a SceI site or other counter-selectable marker, alternate fluorescent reporters, additional elements |
| 3 | Transform suicide plasmid into *E. coli* ST18 (an auxotroph for aminolevulinic acid, ALA) to generate donor cells | Preparation for conjugation into host; plasmid maintenance | Could use a different donor strain of *E. coli* or other microbe; different auxotrophic marker |
| 4 | Mix donor cells with recipient host cells to conjugate, and plate on media selecting for the antibiotic resistance marker and NOT containing ALA | The suicide plasmid is able to replicate in *E. coli* but not in the host. Therefore plating of the mixture on such plates means that only host cells that received the plasmid and experience plasmid integration into the chromosome will be able to grow and form colonies. The *E coli* ST18 is unable to grow due to the absence of ALA. | Could use a different donor strain of *E. coli* or other microbe; different auxotrophic marker |
| 5 | Confirm integration of the plasmid through GFP fluorescence, and integration at the intended locus through colony PCR | Confirms proper integration of the suicide plasmid backbone containing GFP, the antibiotic resistance cassette, the sacB marker, etc. | |
| 6 | Streak confirmed integration colony on a plate containing sucrose and screen for non-fluorescent colonies | The sacB marker confers sensitivity to sucrose; colonies which have undergone a second round of homologous recombination and "looped-out" the plasmid will grow better and not fluoresce on the plate. | Different counter selectable marker, SceI-mediated loop-out, etc. |
| 7 | Screen looped-out colonies for the intended mutation using colony PCR | Upon the second homologous recombination event only 50% of looped out colonies should contain the mutation, the other 50% will be WT | |
| 8 | If any of the steps 2-7 fail, go back to step 2 and re-design with alternate plasmid parts | Allows iterative troubleshooting of suicide plasmid to develop a working protocol | |
| 9 | Once steps 2-7 can be reliably performed, develop an SOP for that strain/plasmid to be used for Optimization | | |
| D | Non-Intergeneric Engineering Campaign and Optimization | | |

TABLE A-continued

An Overview of an Embodiment of the Guided Microbial Remodeling Platform

| | Steps | Contribution | Alternate Forms |
|---|---|---|---|
| 1 | Identify gene targets for optimizing a pathway, e.g. nif genes through literature search | | |
| 2 | Select promoters for promoter swaps using RNAseq data collected both in vitro in N-depleted and N-replete conditions, and in planta from the corn rhizosphere (Collected in step B3) | Allows for selection of promoters that a) are active in the rhizosphere during the corn growth cycle in fertilized field conditions b) are also active in in vitro N-replete conditions so they can be rapidly screened. | Alternate crops; alternate RNAseq data conditions (greenhouse, field, in vitro, whatever's relevant for the phenotype targeted) |
| 3 | Design non-intergeneric mutations in key genes: deletions (full or partial gene), promoter swaps, or single base pair changes; store these designs in our LIMS | No DNA from outside the host chromosome is added, therefore the resulting microbe is non-transgenic | Alter regulatory sequences (e.g. RBS), non-coding RNAs, etc. |
| 4 | Using the established protocol, carry out steps C2-7 to generate non-intergeneric derivative strains (mutants) | We perform this in higher throughput than the domestication step - up to 20 or so strains at once per person. | |
| 5 | Bank a purified culture of the strain, extract gDNA and conduct WGS via Illumina | | |
| 6 | Map the resulting reads to the designs stored in LIMS to confirm a) presence of the desire mutation and b) complete absence of reads mapping to any suicide plasmid or other plasmid sequences used to generate the strains | Allows very sensitive detection of non-intergeneric DNA that may remain in the strain after the suicide plasmid method; confirm absence of transgenic DNA, controls for accidental off-target insertion of the suicide plasmid, etc. | Suicide plasmid removal is fairly reliable; however use of other stable plasmids in alternate methods necessitates this extra step to ensure with complete confidence that no transgenic DNA that was previously transformed in remains in the strain. |
| E | Analytics | | |
| 1 | Analyze the strains for in vitro nitrogen fixation activity and fitness through ARA, ammonium excretion assays, and growth curves | Allow rapid, med- to high-throughput screening of mutants for phenotypes of interest | Any other in vitro assay, e.g. phosphate solubilization, qPCR for transcription of specific genes, etc. |
| 2 | Analyze the strains for colonization (qPCR) and transcription of target and promoter-swapped genes (Nanostring) in the plant (greenhouse or field) | Measure fitness of top in vitro performing strains in the rhizosphere; measure transcription of promoter-swapped genes in planta | |
| F | Iterate Engineering Campaign/Analytics | | |
| 1 | Use data from in vitro and in planta analytics to iteratively stack beneficial mutations. | | |

Figure 1C:
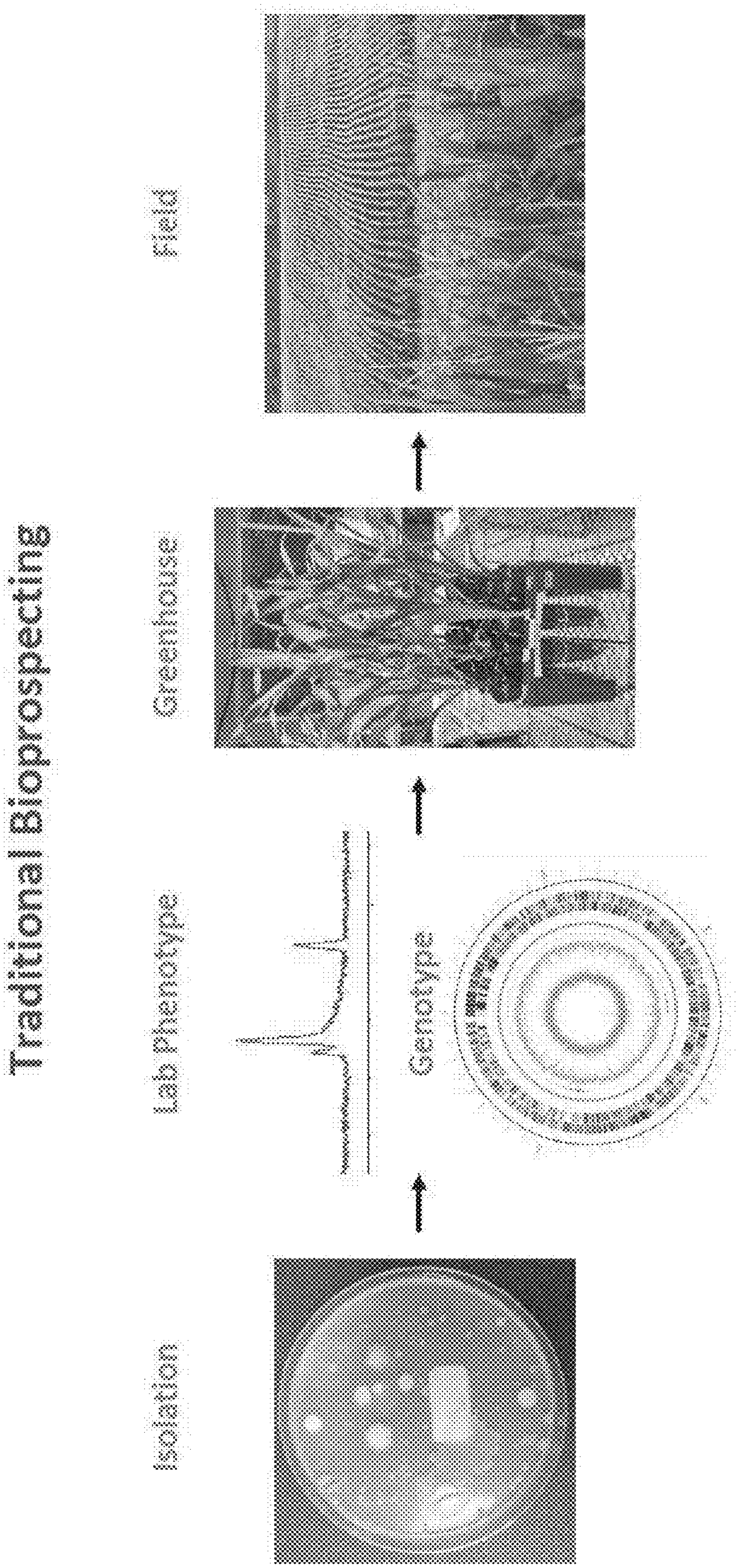
FIG. 1C depicts a problematic "traditional bioprospecting" approach, which has several drawbacks compared to the taught guided microbial remodeling (GMR) platform.

Traditional Approaches to Creating Biologicals for Agriculture Suffer From Drawbacks Inherent in their Methodology Unlike pure bioprospecting of wild-type (WT) microbes or transgenic approaches, GMR allows for non-intergeneric genetic optimization of key regulatory networks within the microbe, which improves plant-beneficial phenotypes over WT microbes, but doesn't have the risks associated with transgenic approaches (e.g. unpredictable gene function, public and regulatory concerns). See, FIG. 1C for a depiction of a problematic "traditional bioprospecting" approach, which has several drawbacks compared to the taught GMR platform.

Figure 1D:
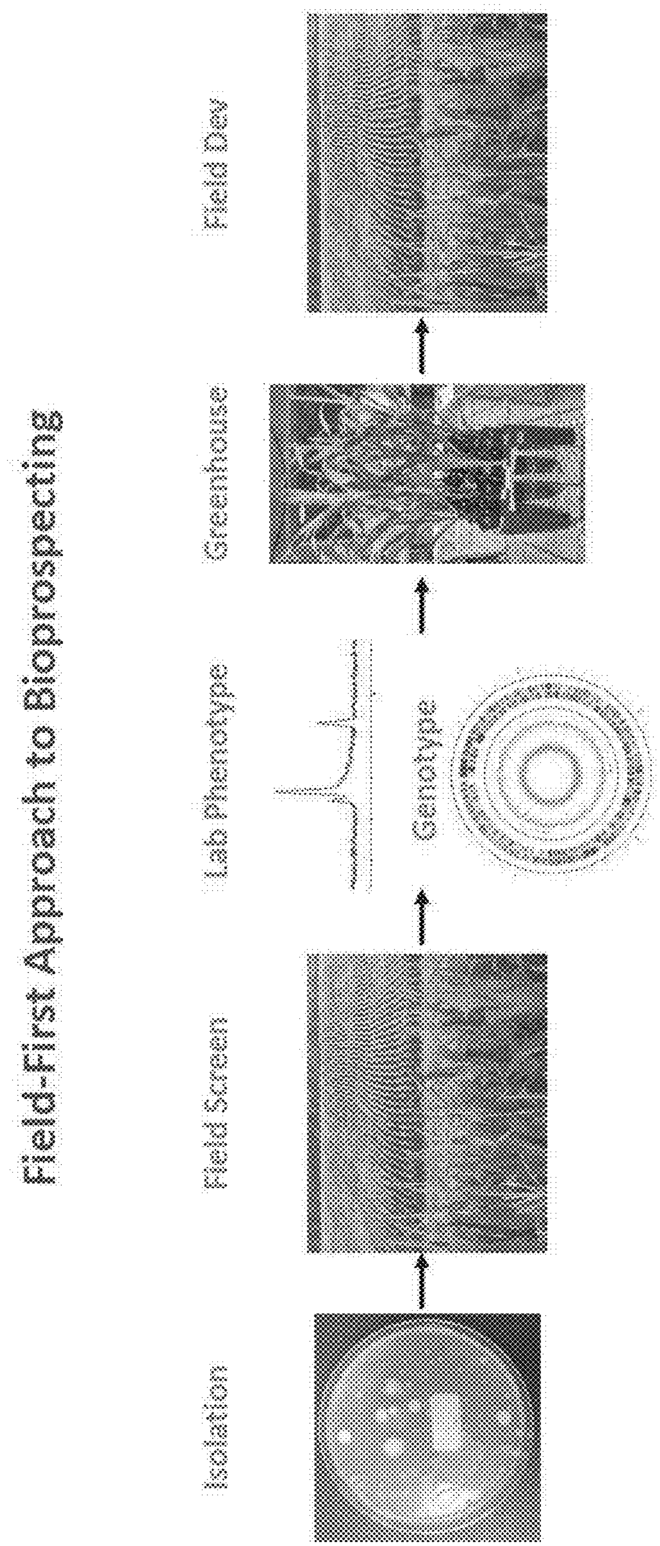
FIG. 1D depicts a problematic "field-first approach to bioprospecting" system, which has several drawbacks compared to the taught guided microbial remodeling (GMR) platform.

Other methods for developing microbials for agriculture are focused on either extensive lab development, which often fails at the field scale, or extensive greenhouse or "field-first" testing without an understanding of the underlying mechanisms/plant-microbe interactions. See, FIG. 1D for a depiction of a problematic "field-first approach to bioprospecting" system, which has several drawbacks compared to the taught GMR platform.

The GMR Platform Solves These Problems in Numerous Ways

One strength of the GMR platform is the identification of active promoters, which are active at key physiologically important times for a target crop, and which are also active under particular, agriculturally relevant, environmental conditions.

Figure 1E:
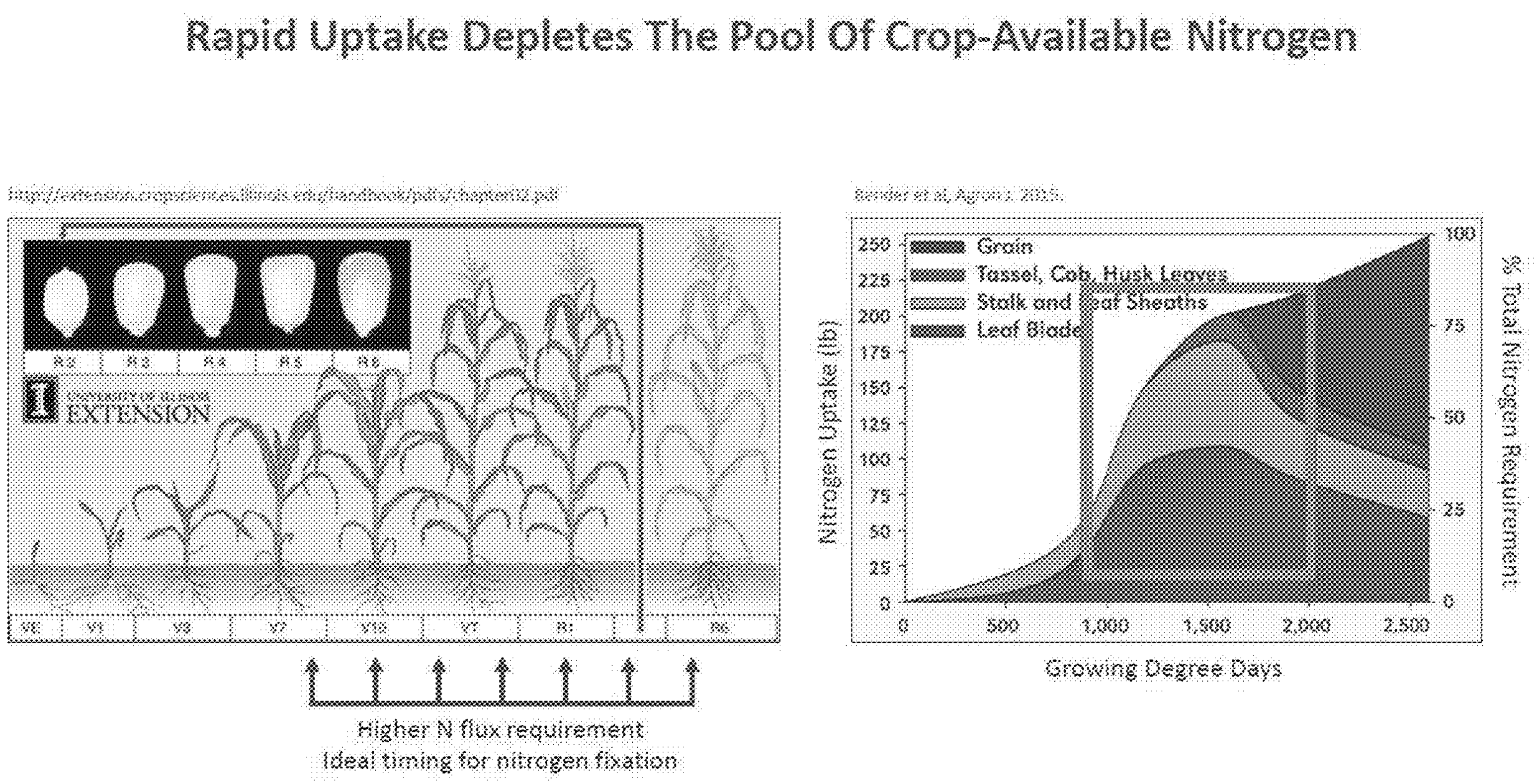
FIG. 1E depicts the time period in the corn growth cycle, at which nitrogen is needed most by the plant.
Figure 1F:
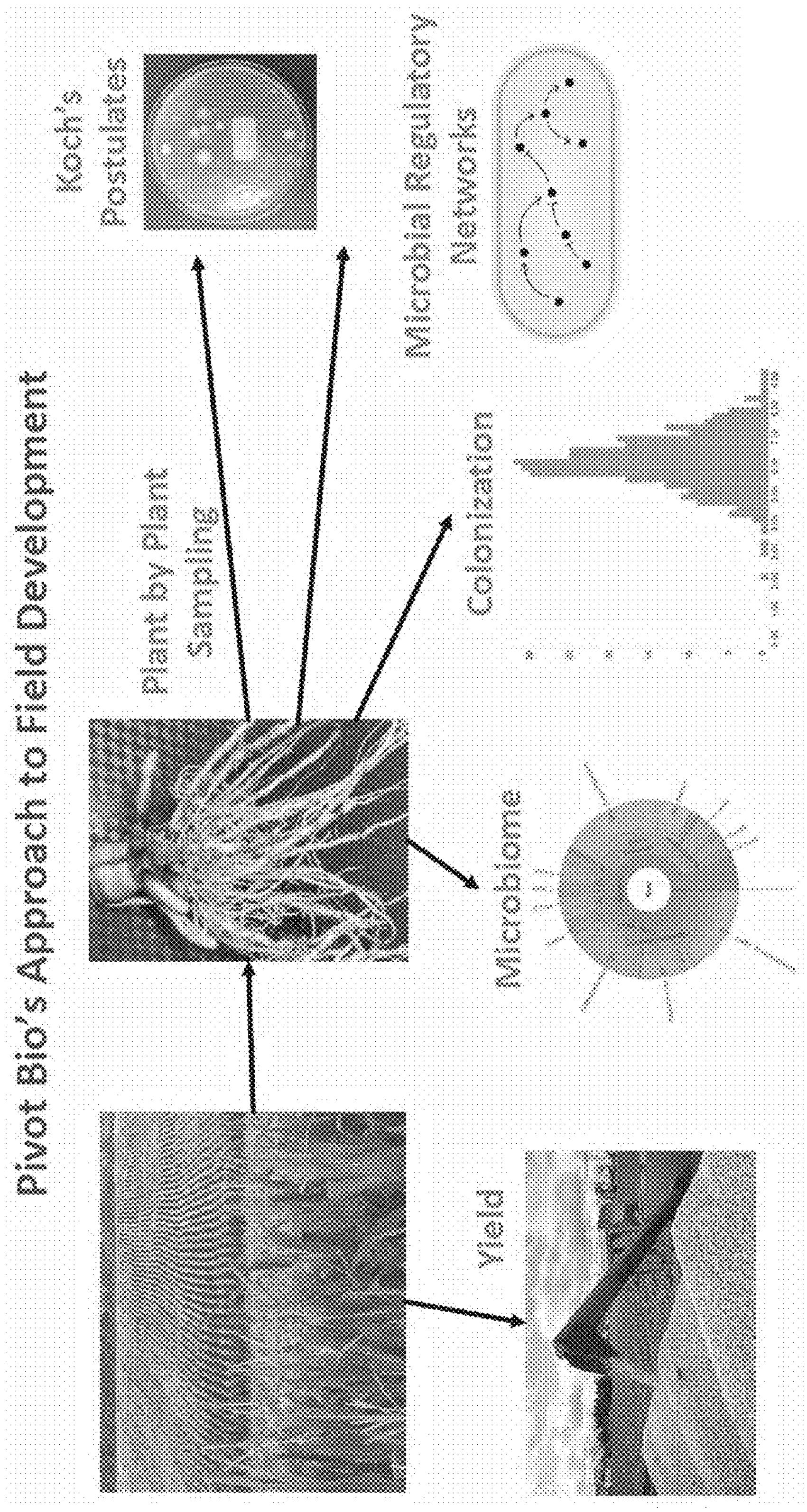
FIG. 1F depicts an overview of a field development process for a remodeled microbe.
Figure 1G:
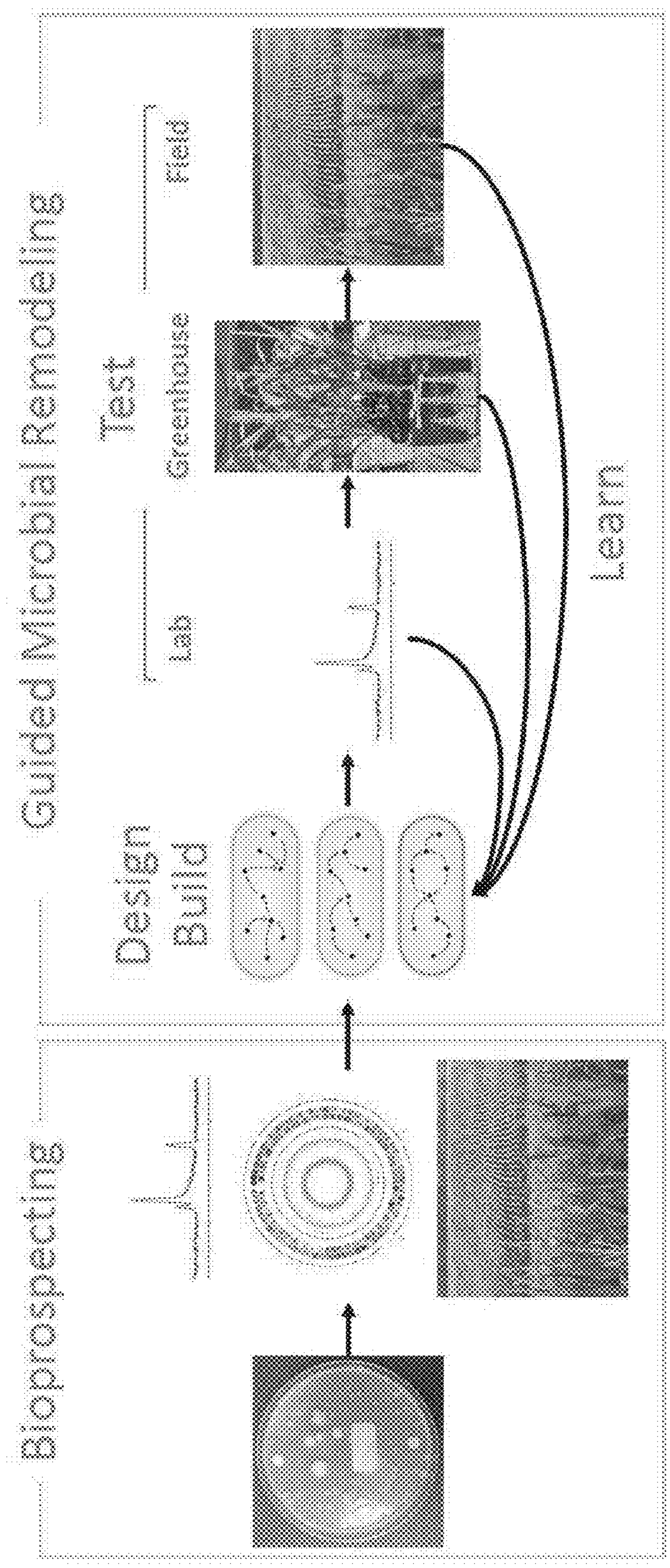
FIG. 1G depicts an overview of a guided microbial remodeling platform embodiment.
Figure 1H:
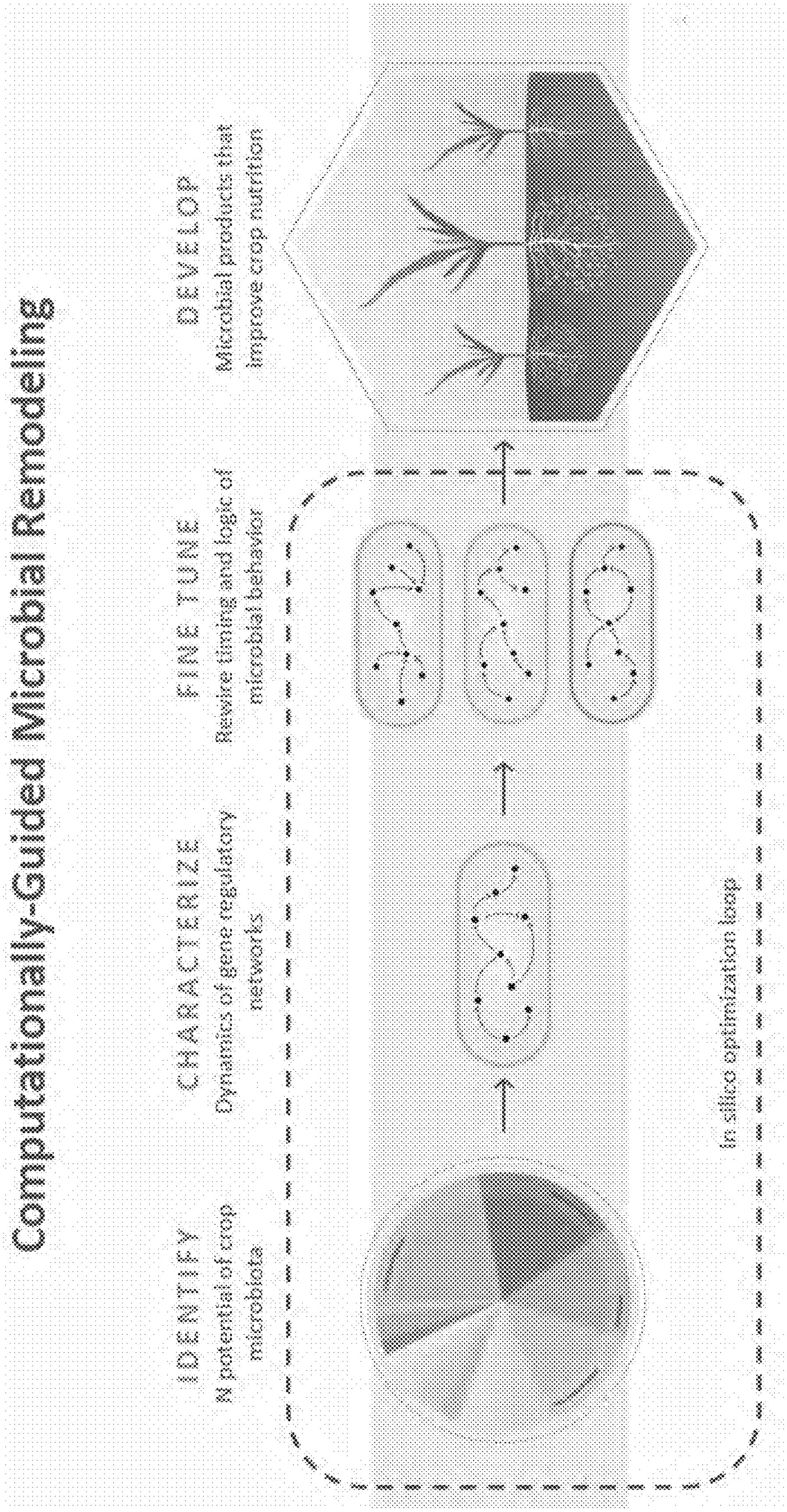
FIG. 1H depicts an overview of a computationally-guided microbial remodeling platform.
Figure 11:
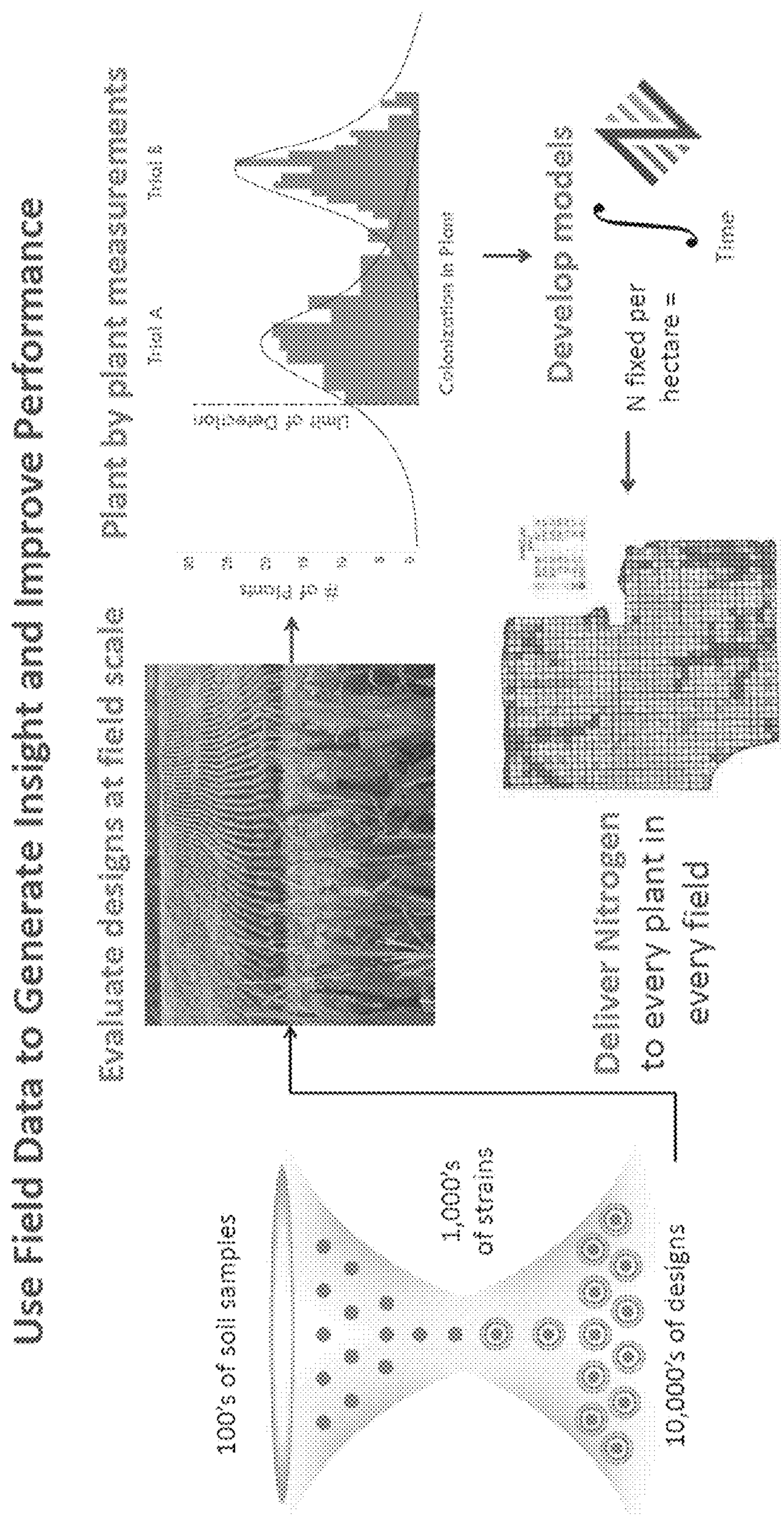
FIG. 11 depicts the plant yield of plants having been exposed to strain CM038. The area of the circles corresponds to the relative yield, while the shading corresponds to the particular MRTN treatment. The x-axis is the p value and the y-axis is the win rate.

As has been explained, within the context of nitrogen fixation, the GMR platform is able to identify microbial promoter sequences, which are active under environmental conditions of elevated exogenous nitrogen, which thereby allows the remodeled microbe to fix atmospheric nitrogen and deliver it to a target crop plant, under modern agricultural row crop conditions, and at a time when a plant needs the fixed nitrogen the most. See, FIG. 1E for a depiction of the time period in the corn growth cycle, at which nitrogen is needed most by the plant. The taught GMR platform is able to create remodeled microbes that supply nitrogen to a corn plant at the time period in which the nitrogen is needed, and also deliver such nitrogen even in the presence of exogenous nitrogen in the soil environment.

These promoters can be identified by rhizosphere RNA sequencing and read mapping to the microbe's genome sequence, and key pathways can be "reprogrammed" to be turned on or off during key stages of the plant growth cycle. Additionally, through whole genome sequencing of optimized microbes and mapping to previously-transformed sequences, the method has the ability to ensure that no transgenic sequences are accidentally released into the field through off-target insertion of plasmid DNA, low-level retention of plasmids not detected through PCR or antibiotic resistance, etc.

The GMR platform combines these approaches by evaluating microbes iteratively in the lab and plant environment, leading to microbes that are robust in greenhouse and field conditions rather than just in lab conditions.

Various aspects and embodiments of the taught GMR platform can be found in FIGS. 1F-1I. The GMR platform culminates in the derivation/creation/production of remodeled microbes that possess a plant-beneficial property, e.g. nitrogen fixation.

The traditional bioprospecting methods are not able to produce microbes having the aforementioned properties.

Properties of a Microbe Remodeled for Nitrogen Fixation

Figure 1J:
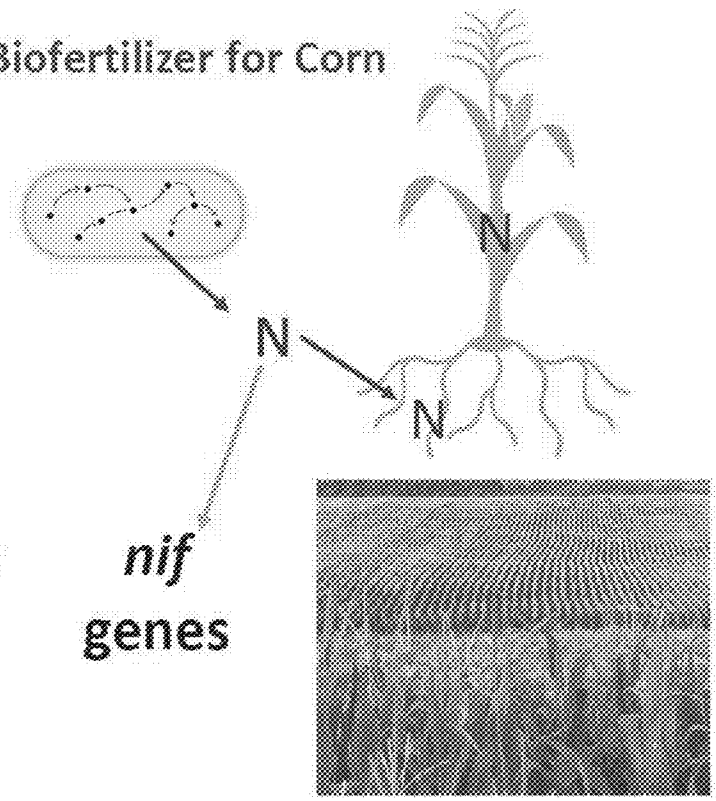
FIG. 1J depicts five properties that can be possessed by remodeled microbes of the present disclosure.

In the context of remodeling microbes for nitrogen fixation, there are several properties that the remodeled microbe may possess. For instance, FIG. 1J depicts five properties that can be possessed by remodeled microbes of the present disclosure.

Figure 1K:
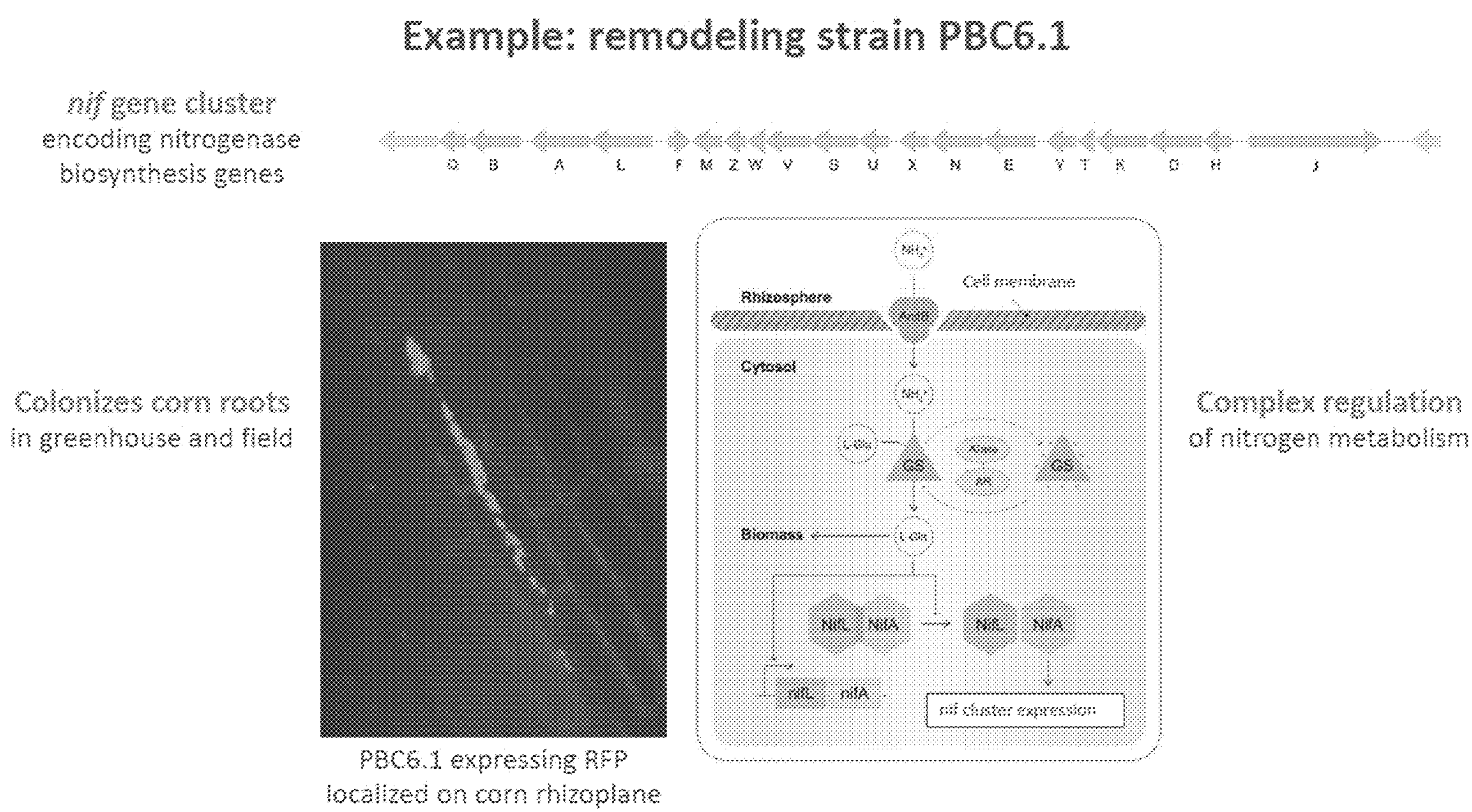
FIG. 1K depicts a schematic of a remodeling approach for a microbe, PBC6.1.
Figure 1L:
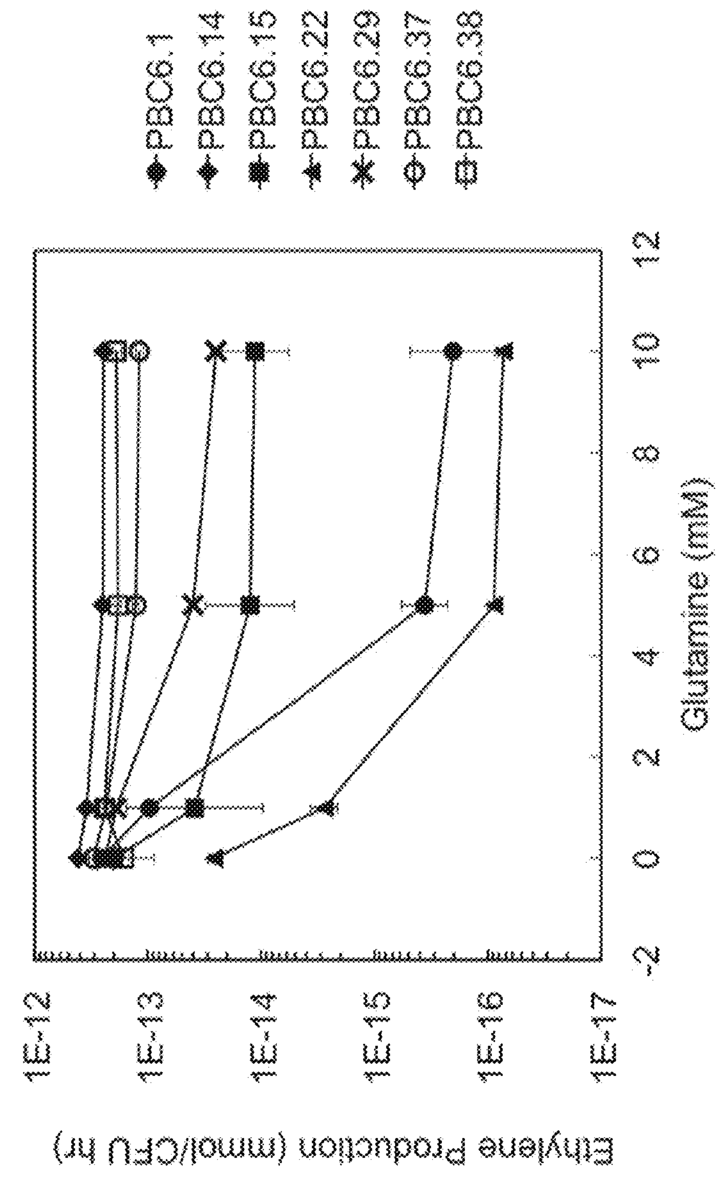
FIG. 1L depicts decoupled nifA expression from endogenous nitrogen regulation in remodeled microbes.
Figure 1M:
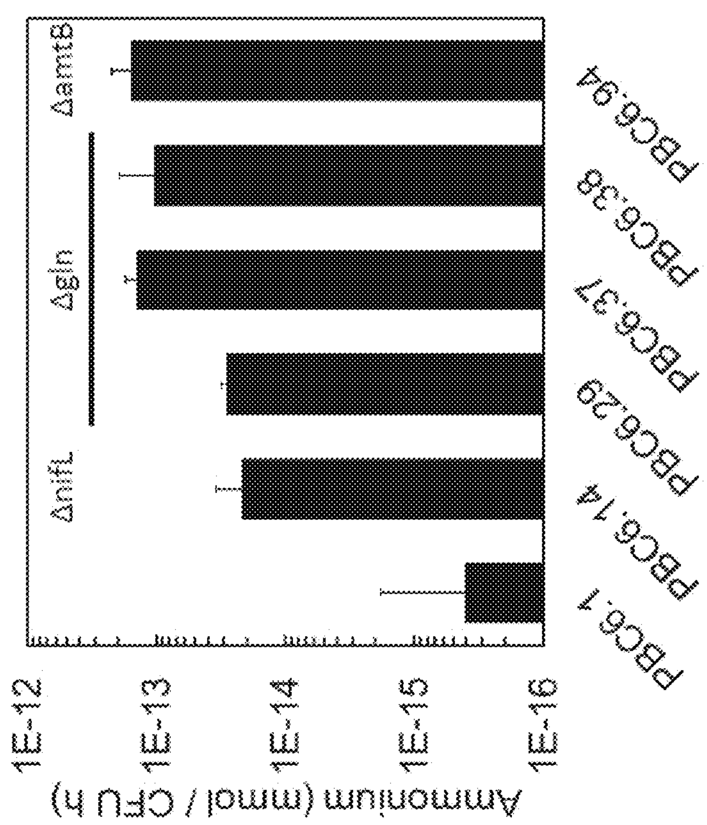
FIG. 1M depicts improved assimilation and excretion of fixed nitrogen by remodeled microbes.

Furthermore, as can be seen in Example 2, the present inventors have utilized the GMR platform to produce remodeled non-intergeneric bacteria (i.e. *Kosakonia sacchari*) capable of fixing atmostpheric nitrogen and delivering said nitrogen to a corn plant, even under conditions in which exogenous nitrogen is present in the environment. See, FIG. 1K-M, which illustrate that the remodeling process successfully: (1) decoupled nifA expression from endogenous nitrogen regulation; and (2) improved the assimilation and excretion of fixed nitrogen.

Figure 1N:
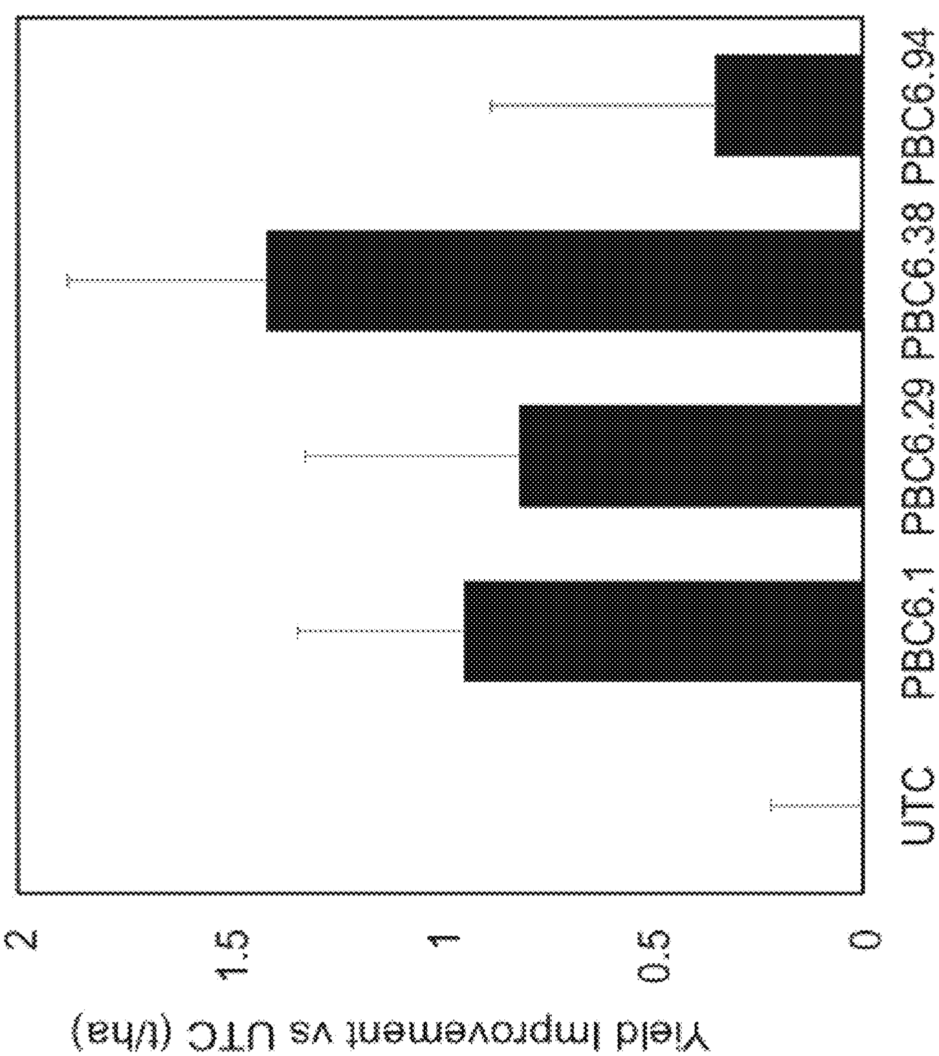
FIG. 1N depicts corn yield improvement attributable to remodeled microbes.

These remodeled microbes ultimately result in corn yield improvement, when applied to corn crops. See, FIG. 1N.

Figure 1O:
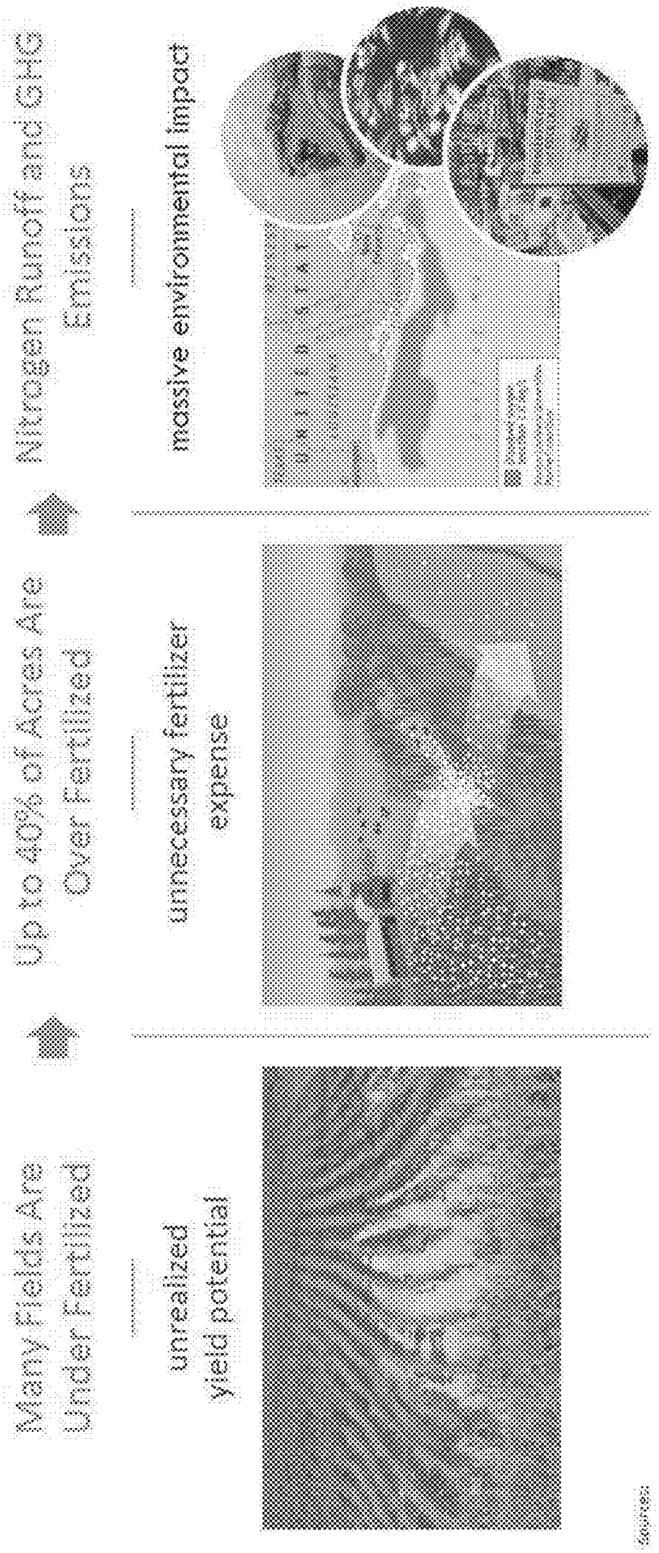
FIG. 1O illustrates the inefficiency of current nitrogen delivery systems, which result in underfertilized fields, over fertilized fields, and environmentally deleterious nitrogen runoff

The GMR Platform Provides an Approach to Nitrogen Fixation and Delivery That Solves Pressing Environmental Concerns As explained previously, the nitrogen fertilizer produced by the industrial Haber-Bosch process is not well utilized by the target crop. Rain, runoff, heat, volatilization, and the soil microbiome degrade the applied chemical fertilizer. This equates to not only wasted money, but also adds to increased pollution instead of harvested yield. To this end, the United Nations has calculated that nearly 80% of fertilizer is lost before a crop can utilize it. Consequently, modern agricultural fertilizer production and delivery is not only deleterious to the environment, but it is extremely inefficient. See, FIG. 1O, illustrating the inefficiency of current nitrogen delivery systems, which result in underfertilized fields, over fertilized fields, and environmentally deleterious nitrogen runoff.

The current GMR platform, and resulting remodeled microbes, provide a better approach to nitrogen fixation and delivery to plants. As will be seen in the below Examples, the non-intergeneric remodeled microbes of the disclosure are able to colonize the roots of a corn plant and spoon feed said corn plants with fixed atmospheric nitrogen, even in the presence of exogenous nitrogen. This system of nitrogen fixation and delivery—enabled by the taught GMR platform—will help transform modern agricultural to a more environmentally sustainable system.

Example 2: Guided Microbial Remodeling—An Example Embodiment for the Rational Improvement of Nitrogen Fixation A diversity of nitrogen fixing bacteria can be found in nature, including in agricultural soils. However, the potential of a microbe to provide sufficient nitrogen to crops to allow decreased fertilizer use may be limited by repression of nitrogenase genes in fertilized soils as well as low abundance in close association with crop roots. Identification, isolation and breeding of microbes that closely associate with key commercial crops might disrupt and improve the regulatory networks linking nitrogen sensing and nitrogen fixation and unlock significant nitrogen contributions by crop-associated microbes. To this end, nitrogen fixing microbes that associate with and colonize the root system of corn were identified. This step corresponds to the "Measure the Microbiome Composition" depicted in FIG. 1A and FIG. 1B.

Root samples from corn plants grown in agronomically relevant soils were collected, and microbial populations extracted from the rhizosphere and endosphere. Genomic DNA from these samples was extracted, followed by 16S amplicon sequencing to profile the community composition.

Figure 2:
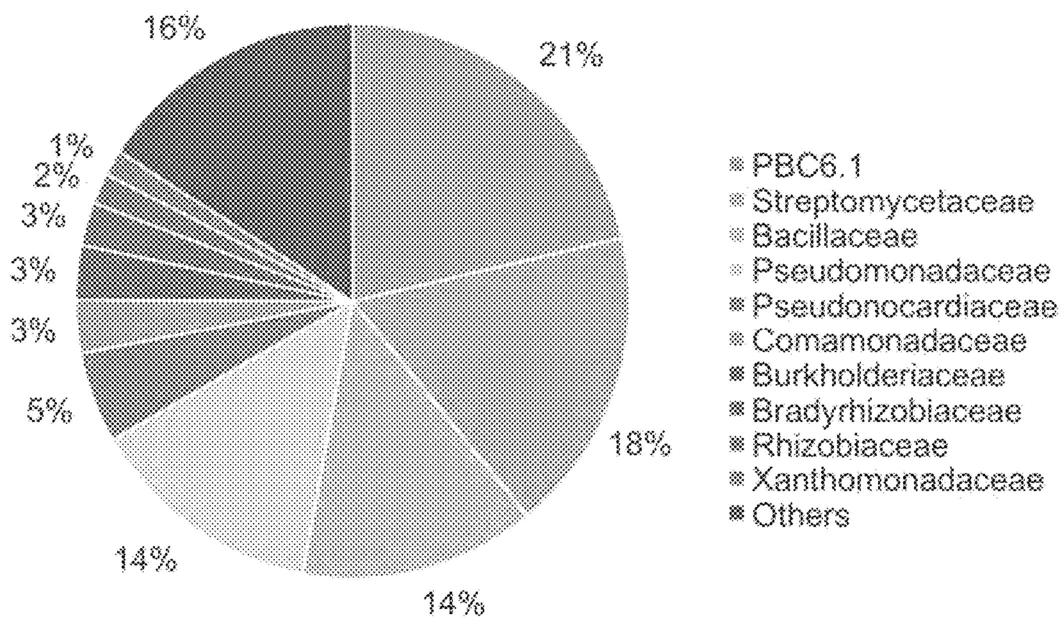
FIG. 2 illustrates PBC6.1 colonization to nearly 21% abundance of the root-associated microbiota in corn roots. Abundance data is based on 16S amplicon sequencing of the rhizosphere and endosphere of corn plants inoculated with PBC6.1 and grown in greenhouse conditions.

A *Kosakonia sacchari* microbe (strain PBC6.1) was isolated and classified through 16S rRNA and whole genome sequencing. This is a particularly interesting nitrogen fixer capable of colonizing to nearly 21% abundance of the root-associated microbiota (FIG. 2). To assess strain sensitivity to exogenous nitrogen, nitrogen fixation rates in pure culture were measured with the classical acetylene reduction assay (ARA) and varying levels of glutamine supplementation. The species exhibited a high level of nitrogen fixing activity in nitrogen-free media, yet exogenous fixed nitrogen repressed nif gene expression and nitrogenase activity (Strain PBC6.1, FIG. 3C, FIG. 3D). Additionally, when released ammonia was measured in the supernatant of PBC6.1 grown in nitrogen-fixing conditions, very little release of fixed nitrogen could be detected (FIG. 3E).

We hypothesized that PBC6.1 could be a significant contributor of fixed nitrogen in fertilized fields if regulatory networks controlling nitrogen metabolism were remodeled to allow optimal nitrogenase expression and ammonia release in the presence of fixed nitrogen.

Sufficient genetic diversity should exist within the PBC6.1 genome to enable broad phenotypic remodeling (as a result of remodeling the underlying genetic architecture in a non-intergeneric manner) without the insertion of transgenes or synthetic regulatory elements. The isolated strain has a genome of at least 5.4 Mbp and a canonical nitrogen fixation gene cluster. Related nitrogen metabolism pathways in PBC6.1 are similar to those of the model organism for nitrogen fixation, *Klebsiella oxytoca* m5al.

Several gene regulatory network nodes were identified which may augment nitrogen fixation and subsequent transfer to a host plant, particularly in high exogenous concentrations of fixed nitrogen (FIG. 3A). The nifLA operon directly regulates the rest of the nif cluster through transcriptional activation by NifA and nitrogen- and oxygen-dependent repression of NifA by NifL. Disruption of nifL can abolish inhibition of NifA and improve nif expression in the presence of both oxygen and exogenous fixed nitrogen. Furthermore, expressing nifA under the control of a nitrogen-independent promoter may decouple nitrogenase biosynthesis from regulation by the NtrB/NtrC nitrogen sensing complex.

The assimilation of fixed nitrogen by the microbe to glutamine by glutamine synthetase (GS) is reversibly regulated by the two-domain adenylyltransferase (ATase) enzyme GlnE through the adenylylation and deadenylylation of GS to attenuate and restore activity, respectively. Truncation of the GlnE protein to delete its adenylyl-removing (AR) domain may lead to constitutively adenylylated glutamine synthetase, limiting ammonia assimilation by the microbe and increasing intra- and extracellular ammonia.

Finally, reducing expression of AmtB, the transporter responsible for uptake of ammonia, could lead to greater extracellular ammonia.

To generate rationally designed microbial phenotypes without the use of transgenes, two approaches were employed to remodel the underlying genetic architecture of the microbe: (1) creating markerless deletions of genomic sequences encoding protein domains or whole genes, and (2) rewiring regulatory networks by intragenomic promoter rearrangement.

Through an iterative remodeling process, several non-transgenic derivative strains of PBC6.1 were generated (Table 25).

TABLE 25

List of isolated and derivative *K. sacchari* strains used in this work. Prm, promoter sequence derived from the PBC6.1 genome; $\Delta glnE_{AR}1$ and $\Delta glnE_{AR}2$, different truncated versions of glnE gene removing the adenylyl-removing domain sequence.

| Strain ID | Genotype |
|---|---|
| PBC6.1 | WT |
| PBC6.14 | ΔnifL::Prm1 |
| PBC6.15 | ΔnifL::Prm5 |
| PBC6.22 | ΔnifL::Prm3 |
| PBC6.37 | ΔnifL::Prm1 $\Delta glnE_{AR}2$ |
| PBC6.38 | ΔnifL::Prm1 $\Delta glnE_{AR}1$ |
| PBC6.93 | ΔnifL::Prm1 $\Delta glnE_{AR}2$ ΔamtB |
| PBC6.94 | ΔnifL::Prm1 $\Delta glnE_{AR}1$ ΔamtB |

Figure 4:
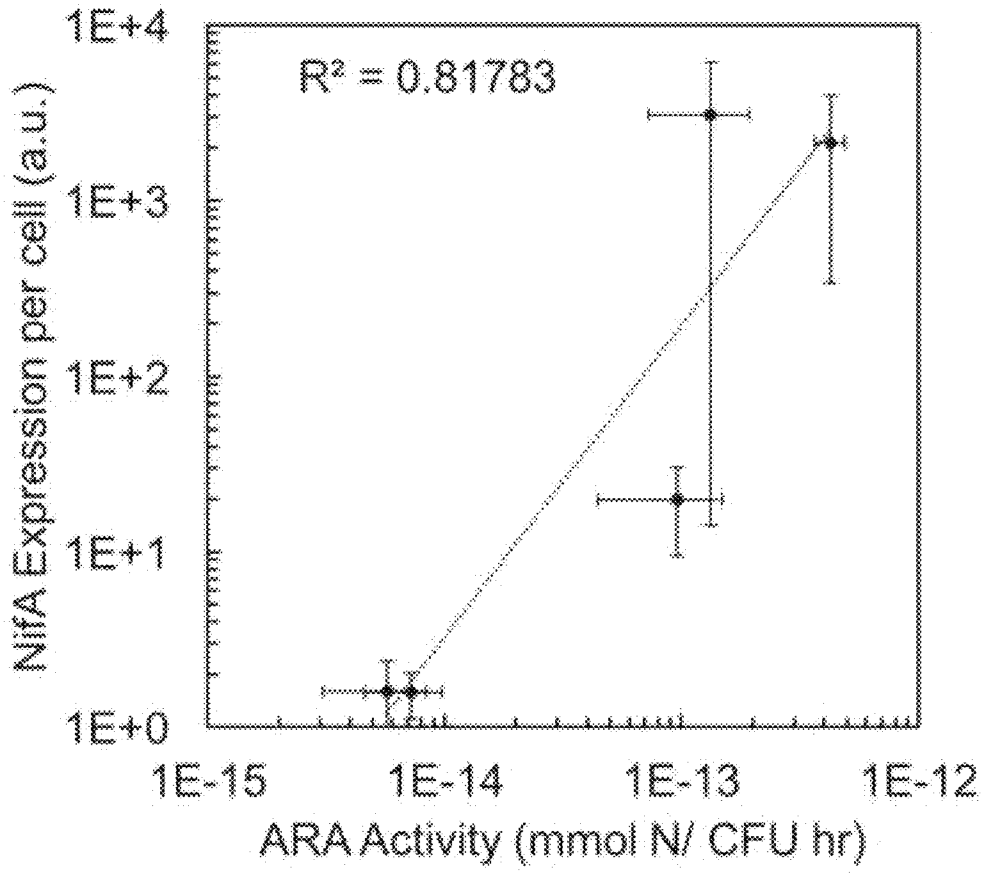
FIG. 4 illustrates transcriptional rates of nifA in derivative strains of PBC6.1 correlated with acetylene reduction rates. An ARA assay was performed as described in the Methods, after which cultures were sampled and subjected to qPCR analysis to determine nifA transcript levels. Error bars show standard error of the mean of at least three biological replicates in each measure.

Several in vitro assays were performed to characterize specific phenotypes of the derivative strains. The ARA was used to assess strain sensitivity to exogenous nitrogen, in which PBC6.1 exhibited repression of nitrogenase activity at high glutamine concentrations (FIG. 3D). In contrast, most derivative strains showed a derepressed phenotype with varying levels of acetylene reduction observed at high glutamine concentrations. Transcriptional rates of nifA in samples analyzed by qPCR correlated well with acetylene reduction rates (FIG. 4), supporting the hypothesis that nifL disruption and insertion of a nitrogen-independent promoter to drive nifA can lead to nif cluster derepression.

Strains with altered GlnE or AmtB activity showed markedly increased ammonium excretion rates compared to wild type or derivative strains without these mutations (FIG. 3E), illustrating the effect of these genotypes on ammonia assimilation and reuptake.

Two experiments were performed to study the interaction of PBC6.1 derivatives (remodeled microbes) with corn plants and quantify incorporation of fixed nitrogen into plant tissues. First, rates of microbial nitrogen fixation were quantified in a greenhouse study using isotopic tracers. Briefly, plants are grown with 15N labeled fertilizer, and diluted concentrations of 15N in plant tissues indicate contributions of fixed nitrogen from microbes. Corn seedlings were inoculated with selected microbial strains, and plants were grown to the V6 growth stage. Plants were subsequently deconstructed to enable measurement of microbial colonization and gene expression as well as measurement of 15N/14N ratios in plant tissues by isotope ratio mass spectrometry (IRMS). Analysis of the aerial tissue showed a small, nonsignificant contribution by PBC6.38 to plant nitrogen levels, and a significant contribution by PBC6.94 ($p=0.011$). Approximately 20% of the nitrogen found in above-ground corn leaves was produced by PBC6.94, with the remainder coming from the seed, potting mix, or "background" fixation by other soilborne microbes (FIG. 5C). This illustrates that our microbial breeding and remodeling pipeline can generate remodeled strains capable of making significant nitrogen contributions to plants in the presence of nitrogen fertilizer. Microbial transcription within plant tissues was measured, and expression of the nif gene cluster was observed in derivative remodeled strains, but not the wild type strain (FIG. 5B), showing the importance of nif derepression for contribution of BNF to crops in fertilized conditions. Root colonization measured by qPCR demonstrated that colonization density is different for each of the strains tested (FIG. 5A). A 50 fold difference in colonization was observed between PBC6.38 and PBC6.94. This difference could be an indication that PBC6.94 has reduced fitness in the rhizosphere relative to PBC6.38 as a result of high levels of fixation and excretion.

Methods

Media

Minimal medium contains (per liter) 25 g $Na_2HPO_4$, 0.1 g $CaCL_2$-$2H_2O$, 3 g $KH_2PO_4$, 0.25 g $MgSO_4 \cdot 7H_2O$, 1 g NaCl, 2.9 mg $FeCl_3$, 0.25 mg $Na_2MoO_4 \cdot 2H_2O$, and 20 g sucrose. Growth medium is defined as minimal medium supplemented with 50 ml of 200 mM glutamine per liter.

Isolation of Diazotrophs

Corn seedlings were grown from seed (DKC 66-40, DeKalb, Ill.) for two weeks in a greenhouse environment controlled from 22° C. (night) to 26° C. (day) and exposed to 16 hour light cycles in soil collected from San Joaquin County, Calif. Roots were harvested and washed with sterile deionized water to remove bulk soil. Root tissues were homogenized with 2 mm stainless steel beads in a tissue lyser (TissueLyser II, Qiagen P/N 85300) for three minutes at setting 30, and the samples were centrifuged for 1 minute at 13,000 rpm to separate tissue from root-associated bacteria. Supernatants were split into two fractions, and one was used to characterize the microbiome through 16S rRNA amplicon sequencing and the remaining fraction was diluted and plated on Nitrogen-free Broth (NfB) media supplemented with 1.5% agar. Plates were incubated at 30° C. for 5-7 days. Colonies that emerged were tested for the presence of the nifH gene by colony PCR with primers Ueda19f and Ueda406r. Genomic DNA from strains with a positive nifH colony PCR was isolated (QIAamp DNA Mini Kit, Cat No. 51306, QIAGEN, Germany) and sequenced (Illumina MiSeq v3, SeqMatic, Fremont, Calif.). Following sequence assembly and annotation, the isolates containing nitrogen fixation gene clusters were utilized in downstream research.

Microbiome Profiling of Isolation Seedlings

Genomic DNA was isolated from root-associated bacteria using the ZR-96 Genomic DNA I Kit (Zymo Research P/N D3011), and 16S rRNA amplicons were generated using nextera-barcoded primers targeting 799f and 1114r. The amplicon libraries were purified and sequenced with the Illumina MiSeq v3 platform (SeqMatic, Fremont, Calif.). Reads were taxonomically classified using Kraken using the minikraken database (FIG. 2).

Acetylene Reduction Assay (ARA)

A modified version of the Acetylene Reduction Assay was used to measure nitrogenase activity in pure culture conditions. Strains were propagated from single colony in SOB (RPI, P/N S25040-1000) at 30° C. with shaking at 200 RPM for 24 hours and then subcultured 1:25 into growth medium and grown aerobically for 24 hours (30° C., 200 RPM). 1 ml of the minimal media culture was then added to 4 ml of minimal media supplemented with 0 to 10 mM glutamine in air-tight Hungate tubes and grown anaerobically for 4 hours (30° C., 200 RPM). 10% headspace was removed then replaced by an equal volume of acetylene by injection, and incubation continued for 1 hr. Subsequently, 2 ml of headspace was removed via gas tight syringe for quantification of ethylene production using an Agilent 6850 gas chromatograph equipped with a flame ionization detector (FID).

Ammonium Excretion Assay

Excretion of fixed nitrogen in the form of ammonia was measured using batch fermentation in anaerobic bioreactors. Strains were propagated from single colony in 1 ml/well of SOB in a 96 well DeepWell plate. The plate was incubated at 30° C. with shaking at 200 RPM for 24 hours and then diluted 1:25 into a fresh plate containing 1 ml/well of growth medium. Cells were incubated for 24 hours (30° C., 200 RPM) and then diluted 1:10 into a fresh plate containing minimal medium. The plate was transferred to an anaerobic chamber with a gas mixture of >98.5% nitrogen, 1.2-1.5% hydrogen and <30 ppM oxygen and incubated at 1350 RPM, room temperature for 66-70 hrs. Initial culture biomass was compared to ending biomass by measuring optical density at 590 nm. Cells were then separated by centrifugation, and supernatant from the reactor broth was assayed for free ammonia using the Megazyme Ammonia Assay kit (P/N K-AMIAR) normalized to biomass at each timepoint.

Extraction of Root-Associated Microbiome

Roots were shaken gently to remove loose particles, and root systems were separated and soaked in a RNA stabilization solution (Thermo Fisher P/N AM7021) for 30 minutes. The roots were then briefly rinsed with sterile deionized water. Samples were homogenized using bead beating with ½-inch stainless steel ball bearings in a tissue lyser (TissueLyser II, Qiagen P/N 85300) in 2 ml of lysis buffer (Qiagen P/N 79216). Genomic DNA extraction was performed with ZR-96 Quick-gDNA kit (Zymo Research P/N D3010), and RNA extraction using the RNeasy kit (Qiagen P/N 74104).

Root Colonization Assay

Four days after planting, 1 ml of a bacterial overnight culture (approximately $10^9$ cfu) was applied to the soil above the planted seed. Seedlings were fertilized three times weekly with 25 ml modified Hoagland's solution supplemented with 0.5 mM ammonium nitrate. Four weeks after planting, root samples were collected and the total genomic DNA (gDNA) was extracted. Root colonization was quantified using qPCR with primers designed to amplify unique regions of either the wild type or derivative strain genome. QPCR reaction efficiency was measured using a standard curve generated from a known quantity of gDNA from the target genome. Data was normalized to genome copies per g fresh weight using the tissue weight and extraction volume. For each experiment, the colonization numbers were compared to untreated control seedlings.

In Planta Transcriptomics

Transcriptional profiling of root-associated microbes was measured in seedlings grown and processed as described in the Root Colonization Assay. Purified RNA was sequenced using the Illumina NextSeq platform (SeqMatic, Fremont, Calif.). Reads were mapped to the genome of the inoculated strain using bowtie2 using '—very-sensitive-local' parameters and a minimum alignment score of 30. Coverage across the genome was calculated using samtools. Differential coverage was normalized to housekeeping gene expression and visualized across the genome using Circos and across the nif gene cluster using DNA plotlib. Additionally, the in planta transcriptional profile was quantified via targeted Nanostring analysis. Purified RNA was processed on an nCounter Sprint (Core Diagnostics, Hayward, Calif.).

15N Dilution Greenhouse Study

A 15N fertilizer dilution experiment was performed to assess optimized strain activity in planta. A planting medium containing minimal background N was prepared using a mixture of vermiculite and washed sand (5 rinses in DI $H_2O$). The sand mixture was autoclaved for 1 hour at 122° C. and approximately 600 g measured out into 40 cubic inch (656 mL) pots, which were saturated with sterile DI $H_2O$ and allowed to drain 24 hours before planting. Corn seeds (DKC 66-40) were surface sterilized in 0.625% sodium hypochlorite for 10 minutes, then rinsed five times in sterile distilled water and planted 1 cm deep. The plants were maintained under fluorescent lamps for four weeks with 16-hour day length at room temperatures averaging 22° C. (night) to 26° C. (day).

Five days after planting, seedlings were inoculated with a 1 ml suspension of cells drenched directly over the emerging coleoptile. Inoculum was prepared from 5 ml overnight cultures in SOB, which were spun down and resuspended twice in 5 ml PBS to remove residual SOB before final dilution to OD of 1.0 (approximately $10^9$ CFU/ml). Control plants were treated with sterile PBS, and each treatment was applied to ten replicate plants.

Plants were fertilized with 25 ml fertilizer solution containing 2% 15N-enriched 2 mM $KNO_3$ on 5, 9, 14, and 19 days after planting, and the same solution without $KNO_3$ on 7, 12, 16, and 18 days after planting. The fertilizer solution contained (per liter) 3 mmol $CaCl_2$, 0.5 mmol $KH_2PO_4$, 2 mmol $MgSO_4$, 17.9 μmol $FeSO_4$, 2.86 mg $H_3BO_3$, 1.81 mg $MnCl_2 \cdot 4H_2O$, 0.22 mg $ZnSO_4 \cdot 7H_2O$, 51 μg $CuSO_4 \cdot 5H_2O$, 0.12 mg $Na_2MoO_4 \cdot 2H_2O$, and 0.14 nmol $NiCl_2$. All pots were watered with sterile DI $H_2O$ as needed to maintain consistent soil moisture without runoff.

At four weeks, plants were harvested and separated at the lowest node into samples for root gDNA and RNA extraction and aerial tissue for IRMS. Aerial tissues were wiped as needed to remove sand, placed whole into paper bags and dried for at least 72 hours at 60° C. Once completely dry, total aerial tissue was homogenized by bead beating and 5-7 mg samples were analyzed by isotope ratio mass spectrometry (IRMS) for δ15N by the MBL Stable Isotope Laboratory (The Ecosystems Center, Woods Hole, Mass.). Percent NDFA was calculated using the following formula: % NDFA=(δ15N of UTC average−δ15N of sample)/(δ15N of UTC average)×100.

Example 3: Field Trials with Remodeled Microbes of the Disclosure—Summer 2016

In order to evaluate the efficacy of remodeled strains of the present disclosure on corn growth and productivity under varying nitrogen regimes, field trials were conducted.

Trials were conducted with (1) seven subplot treatments of six strains plus the control—four main plots comprised 0, 15, 85, and 100% of maximum return to nitrogen (MRTN) with local verification. The control (UTC only) was conducted with 10 100% MRTN plus, 5, 10, or 15 pounds. Treatments had four replications.

Plots of corn (minimum) were 4 rows of 30 feet in length, with 124 plots per location. All observations were taken from the center two rows of the plots, and all destructive sampling was taken from the outside rows. Seed samples were refrigerated until 1.5 to 2 hours prior to use.

Local Agricultural Practice: The seed was a commercial corn without conventional fungicide and insecticide treatment. All seed treatments were applied by a single seed treatment specialist to assure uniformity. Planting date, seeding rate, weed/insect management, etc. were left to local agricultural practices. With the exception of fungicide applications, standard management practices were followed.

Soil Characterization: Soil texture and soil fertility were evaluated. Soil samples were pre-planted for each replicate to insure residual nitrate levels lower than 50 lbs/Ac. Soil cores were taken from 0 cm to 30 cm. The soil was further characterized for pH, CEC, total K and P.

Assessments: The initial plant population was assessed 14 days after planting (DAP)/acre, and were further assessed for: (1) vigor (1 to 10 scale, w/10=excellent) 14 DAP & V10; (2) recordation of disease ratings any time symptoms are evident in the plots; (3) record any differences in lodging if lodging occurs in the plots; (4) yield (Bu/acre), adjusted to standard moisture pct; (5) test weight; and (6) grain moisture percentage.

Sampling Requirements: The soil was sampled at three timepoints (prior to trial initiation, V10-VT, 1 week post-harvest). All six locations and all plots were sampled at 10 grams per sample (124 plots×3 timepoints×6 locations).

Colonization Sampling: Colonization samples were collected at two timepoints (V10 and VT) for five locations and six timepoints (V4, V8, V10, VT, R5, and Post-Harvest). Samples were collected as follows: (1) from 0% and 100% MRTN, 60 plots per location; (2) 4 plants per plot randomly selected from the outside rows; (3) 5 grams of root, 8 inches of stalk, and top three leaves—bagged and IDed each separately—12/bags per plot; (4) five locations (60 plots×2 timepoints×12 bags/plot); and one location (60 plots×6 timepoints×12 bags/plot.

Normalized difference vegetation index (NDVI) determination was made using a Greenseeker instrument at two timepoints (V4-V6 and VT). Assessed each plot at all six locations (124 plots×2 timepoints×6 locations).

Root analysis was performed with Win Rhizo from one location that best illustrated treatment differentiation. Ten plants per plot were randomly sampled (5 adjacent from each outside row; V3-V4 stage plants were preferred) and gently washed to remove as much dirt as reasonable. Ten roots were placed in a plastic bag and labelled. Analyzed with WinRhizo Root Analysis.

Stalk Characteristics were measured at all six locations between R2 and R5. The stalk diamerter of ten plants per plot at the 6" height were recorded, as was the length of the first internode above the 6" mark. Ten plants were monitored; five consecutive plants from the center of the two inside rows. Six locations were evaluated (124 plots×2 measures×6 locations).

The tissue nitrates were analyzed from all plots and all locations. An 8" segment of stalk beginning 6" above the soil when the corn is between one and three weeks after black layer formation; leaf sheaths were removed. All locations and plots were evaluated (6 locations×124 plots).

The following weather data was recorded for all locations from planting to harvest: daily maximum and minimum temperatures, soil temperature at seeding, daily rainfall plus irrigation (if applied), and any unusual weather events such as excessive rain, wind, cold, or heat.

Yield data across all six locations is presented in Table 26. Nitrogen rate had a significant impact on yield, but strains across nitrogen rates did not. However, at the lowest nitrogen rate, strains CI006, CM029, and CI019 numerically out-yielded the UTC by 4 to 6 bu/acre. Yield was also numerically increased 2 to 4 bu/acre by strains CM029, CI019, and CM081 at 15% MRTN.

TABLE 26

| Yield data across all six locations | | | | | | | | |
|---|---|---|---|---|---|---|---|---|
| | | YLD (bu) | Vigor_E | Vigor_L | Stalk Diameter (mm) | Internode Length (in) | NDVI_Veg | NDVI_Rep |
| MRTN % | | | | | | | | |
| 0 | | 143.9 | 7.0 | 5.7 | 18.87 | 7.18 | 64.0 | 70.6 |
| 15 | | 165.9 | 7.2 | 6.3 | 19.27 | 7.28 | 65.8 | 72.5 |
| 85 | | 196.6 | 7.1 | 7.1 | 20.00 | 7.31 | 67.1 | 74.3 |
| 100 | | 197.3 | 7.2 | 7.2 | 20.23 | 7.37 | 66.3 | 72.4 |
| Strain | | | | | | | | |
| CI006 (1) | | 176.6 | 7.2 | 6.6 | 19.56 | 18.78 | 66.1 | 72.3 |
| CM029 (2) | | 176.5 | 7.1 | 6.5 | 19.54 | 18.61 | 65.4 | 71.9 |
| CM038 (3) | | 175.5 | 7.2 | 6.5 | 19.58 | 18.69 | 65.7 | 72.8 |
| CI019 (4) | | 176.0 | 7.1 | 6.6 | 19.51 | 18.69 | 65.5 | 72.9 |
| CM081 (5) | | 176.2 | 7.1 | 6.6 | 19.57 | 18.69 | 65.8 | 73.1 |
| CM029/CM081 (6) | | 174.3 | 7.1 | 6.6 | 19.83 | 18.79 | 66.2 | 72.5 |
| UTC (7) | | 176.4 | 7.1 | 6.6 | 19.54 | 18.71 | 65.9 | 71.7 |
| MRTN/Strain | | | | | | | | |
| 0 | 1 | 145.6 | 7.0 | 5.6 | 19.07 | 7.12 | 63.5 | 70.3 |
| 0 | 2 | 147.0 | 7.0 | 5.5 | 18.74 | 7.16 | 64.4 | 70.4 |
| 0 | 3 | 143.9 | 7.0 | 5.5 | 18.83 | 7.37 | 64.6 | 70.5 |
| 0 | 4 | 146.0 | 6.9 | 5.7 | 18.86 | 7.15 | 63.4 | 70.7 |
| 0 | 5 | 141.7 | 7.0 | 5.8 | 18.82 | 7.05 | 63.6 | 70.9 |
| 0 | 6 | 142.2 | 7.2 | 5.8 | 19.12 | 7.09 | 64.7 | 69.9 |
| 0 | 7 | 141.2 | 7.0 | 5.8 | 18.64 | 7.32 | 64.0 | 71.4 |
| 15 | 1 | 164.2 | 7.3 | 6.1 | 19.09 | 7.21 | 66.1 | 71.5 |
| 15 | 2 | 167.3 | 7.2 | 6.3 | 19.32 | 7.29 | 65.5 | 72.7 |
| 15 | 3 | 165.6 | 7.3 | 6.3 | 19.36 | 7.23 | 64.8 | 72.5 |
| 15 | 4 | 167.9 | 7.3 | 6.4 | 19.31 | 7.51 | 66.1 | 72.3 |
| 15 | 5 | 169.3 | 7.2 | 6.2 | 19.05 | 7.32 | 66.0 | 72.8 |
| 15 | 6 | 161.9 | 7.1 | 6.3 | 19.45 | 7.20 | 66.2 | 72.2 |
| 15 | 7 | 165.1 | 7.3 | 6.4 | 19.30 | 7.18 | 66.0 | 73.3 |
| 85 | 1 | 199.4 | 7.3 | 7.2 | 19.70 | 7.32 | 67.2 | 74.0 |
| 85 | 2 | 195.1 | 7.1 | 7.2 | 19.99 | 7.09 | 66.5 | 74.4 |
| 85 | 3 | 195.0 | 7.0 | 7.0 | 20.05 | 7.26 | 67.3 | 74.6 |
| 85 | 4 | 195.6 | 7.2 | 7.1 | 20.04 | 7.29 | 66.4 | 74.4 |
| 85 | 5 | 196.4 | 7.2 | 7.0 | 19.87 | 7.39 | 67.3 | 74.5 |
| 85 | 6 | 195.1 | 7.0 | 6.9 | 20.35 | 7.34 | 67.4 | 74.4 |
| 85 | 7 | 199.5 | 6.9 | 7.2 | 19.97 | 7.48 | 67.4 | 74.1 |
| 100 | 1 | 197.1 | 7.2 | 7.3 | 20.38 | 7.68 | 67.5 | 73.4 |
| 100 | 2 | 196.5 | 7.0 | 7.1 | 20.11 | 7.21 | 65.3 | 70.2 |
| 100 | 3 | 197.6 | 7.5 | 7.3 | 20.08 | 7.42 | 66.3 | 73.4 |
| 100 | 4 | 194.6 | 7.1 | 7.1 | 19.83 | 7.40 | 66.1 | 74.1 |
| 100 | 5 | 197.4 | 7.2 | 7.3 | 20.53 | 7.36 | 66.2 | 74.3 |
| 100 | 6 | 198.1 | 7.2 | 7.4 | 20.40 | 7.16 | 66.6 | 73.6 |
| 100 | 7 | 199.9 | 7.2 | 7.2 | 20.26 | 7.32 | 66.2 | 68.1 |

Another analysis approach is presented in Table 27. The table comprises the four locations where the response to nitrogen was the greatest which suggests that available residual nitrogen was lowest. This approach does not alter the assessment that the nitrogen rate significantly impacted yield, which strains did not when averaged across all nitrogen rates. However, the numerical yield advantage at the lowest N rate is more pronounced for all strains, particularly C1006, CM029, and CM029/CM081 where yields were increased from 8 to 10 bu/acre. At 15% MRTN, strain CM081 outyielded UTC by 5 bu.

TABLE 27

| Yield data across four locations<br>4 Location Average - SGS, AgIdea, Bennett, RFR | | | | | |
|---|---|---|---|---|---|
| | YLD (bu) | Vigor_E | Vigor_L | Stalk Diameter (mm) | Internode Length (in) |
| MRTN % | | | | | |
| 0 | 137.8 | 7.3 | 5.84 | 18.10 | 5.36 |
| 15 | 162.1 | 7.5 | 6.63 | 18.75 | 5.40 |
| 85 | 199.2 | 7.4 | 7.93 | 19.58 | 5.62 |
| 100 | 203.5 | 7.5 | 8.14 | 19.83 | 5.65 |

TABLE 27-continued

| Yield data across four locations 4 Location Average - SGS, AgIdea, Bennett, RFR | | | | | | |
|---|---|---|---|---|---|---|
| | | YLD (bu) | Vigor_E | Vigor_L | Stalk Diameter (mm) | Internode Length (in) |
| Strain | | | | | | |
| CI006 (1) | | 175.4 | 7.5 | 7.08 | 19.03 | 5.59 |
| CM029 (2) | | 176.1 | 7.4 | 7.08 | 19.09 | 5.39 |
| CM038 (3) | | 175.3 | 7.5 | 7.05 | 19.01 | 5.59 |
| CI019 (4) | | 174.8 | 7.5 | 7.16 | 19.02 | 5.45 |
| CM081 (5) | | 176.7 | 7.4 | 7.16 | 19.00 | 5.53 |
| CM029/CM081 (6) | | 175.1 | 7.4 | 7.17 | 19.33 | 5.46 |
| UTC (7) | | 176.0 | 7.3 | 7.27 | 18.98 | 5.55 |
| MRTN/Strain | | | | | | |
| 0 | 1 | 140.0 | 7.3 | 5.69 | 18.32 | 5.28 |
| 0 | 2 | 140.7 | 7.4 | 5.69 | 18.19 | 5.23 |
| 0 | 3 | 135.5 | 7.3 | 5.63 | 17.95 | 5.50 |
| 0 | 4 | 138.8 | 7.3 | 5.81 | 17.99 | 5.36 |
| 0 | 5 | 136.3 | 7.3 | 6.06 | 18.05 | 5.34 |
| 0 | 6 | 141.4 | 7.5 | 6.00 | 18.43 | 5.30 |
| 0 | 7 | 131.9 | 7.3 | 6.00 | 17.75 | 5.48 |
| 15 | 1 | 158.0 | 7.6 | 6.44 | 18.53 | 5.34 |
| 15 | 2 | 164.1 | 7.5 | 6.56 | 19.13 | 5.42 |
| 15 | 3 | 164.3 | 7.6 | 6.63 | 18.68 | 5.51 |
| 15 | 4 | 163.5 | 7.6 | 6.81 | 18.84 | 5.34 |
| 15 | 5 | 166.8 | 7.5 | 6.63 | 18.60 | 5.39 |
| 15 | 6 | 156.6 | 7.4 | 6.56 | 18.86 | 5.41 |
| 15 | 7 | 161.3 | 7.5 | 6.81 | 18.62 | 5.42 |
| 85 | 1 | 199.4 | 7.6 | 8.00 | 19.15 | 5.63 |
| 85 | 2 | 199.0 | 7.4 | 8.09 | 19.49 | 5.46 |
| 85 | 3 | 198.2 | 7.4 | 7.75 | 19.88 | 5.69 |
| 85 | 4 | 196.8 | 7.4 | 8.00 | 19.65 | 5.60 |
| 85 | 5 | 199.5 | 7.4 | 7.75 | 19.26 | 5.70 |
| 85 | 6 | 198.7 | 7.3 | 7.81 | 19.99 | 5.61 |
| 85 | 7 | 202.8 | 7.2 | 8.13 | 19.66 | 5.65 |
| 100 | 1 | 204.3 | 7.4 | 8.19 | 20.11 | 6.10 |
| 100 | 2 | 200.6 | 7.3 | 8.00 | 19.53 | 5.46 |
| 100 | 3 | 203.3 | 7.7 | 8.19 | 19.55 | 5.67 |
| 100 | 4 | 200.2 | 7.6 | 8.00 | 19.59 | 5.49 |
| 100 | 5 | 203.9 | 7.4 | 8.19 | 20.08 | 5.68 |
| 100 | 6 | 203.8 | 7.5 | 8.31 | 20.05 | 5.52 |
| 100 | 7 | 208.1 | 7.4 | 8.13 | 19.90 | 5.63 |

The results from the field trial are also illustrated in FIGS. 9-15. The results indicate that the microbes of the disclosure are able to increase plant yield, which points to the ability of the taught microbes to increase nitrogen fixation in an important agricultural crop, i.e. corn.

The field based results further validate the disclosed methods of non-intergenerially modifiying the genome of selected microbial strains, in order to bring about agriculturally relevant results in a field setting when applying said engineered strains to a crop.

FIG. 6 depicts the lineage of modified remodeled strains that were derived from strain CI006 (WT *Kosakonia sacchari*). The field data demonstrates that an engineered derivative of the CI006 WT strain, i.e. CM029, is able to bring about numerically relevant results in a field setting. For example, Table 26 illustrates that at 0% MRTN CM029 yielded 147.0 bu/acre compared to untreated control at 141.2 bu/acre (an increase of 5.8 bu/acre). Table 26 also illustrates that at 15% MRTN CM029 yielded 167.3 bu/acre compared to untreated control at 165.1 bu/acre (an increase of 2.2 bu/acre). Table 27 is supportive of these conclusions and illustrates that at 0% MRTN CM029 yielded 140.7 bu/acre compared to untreated control at 131.9 bu/acre (an increase of 8.8 bu/acre). Table 27 also illustrates that at 15% MRTN CM029 yielded 164.1 bu/acre compared to untreated control at 161.3 bu/acre (an increase of 2.8 bu/acre).

FIG. 7 depicts the lineage of modified remodeled strains that were derived from strain CI019 (WT *Rahnella aquatilis*). The field data demonstrates that an engineered derivative of the CI019 WT strain, i.e. CM081, is able to bring about numerically relevant results in a field setting. For example, Table 26 illustrates that at 15% MRTN CM081 yielded 169.3 bu/acre compared to untreated control at 165.1 bu/acre (an increase of 4.2 bu/acre). Table 27 is supportive of these conclusions and illustrates that at 0% MRTN CM081 yielded 136.3 bu/acre compared to untreated control at 131.9 bu/acre (an increase of 4.4 bu/acre). Table 27 also illustrates that at 15% MRTN CM081 yielded 166.8 bu/acre compared to untreated control at 161.3 bu/acre (an increase of 5.5 bu/acre).

Further, one can see in Table 27 that the combination of CM029/CM081 at 0% MRTN yielded 141.4 bu/acre compared to untreated control at 131.9 bu/acre (an increase of 9.5 bu/acre).

Example 4: Field Trials with Remodeled Microbes of the Disclosure—Summer 2017

In order to evaluate the efficacy of remodeled strains of the present disclosure on corn growth and productivity under varying nitrogen regimes, field trials were conducted. The below field data demonstrates that the non-intergeneric microbes of the disclosure are able to fix atmospheric nitrogen and deliver said nitrogen to a plant—resulting in increased yields—in both a nitrogen limiting environment, as well as a non-nitrogen limiting environment.

Trials were conducted at seven locations across the United states with six geographically diverse Midwestern locations. Five nitrogen regimes were used for fertilizer treatments: 100% of standard agricultural practice of the site/region, 100% minus 25 pounds, 100% minus 50 pounds, 100% minus 75 pounds, and 0%; all per acre. The pounds of nitrogen per acre for the 100% regime depended upon the standard agricultural practices of the site/region. The aforementioned nitrogen regimes ranged from about 153 pounds per acre to about 180 pounds per acre, with an average of about 164 pounds of nitrogen per acre.

Within each fertilizer regime there were 14 treatments. Each regime had six replications, and a split plot design was utilized. The 14 treatments included: 12 different microbes, 1 UTC with the same fertilizer rate as the main plot, and 1 UTC with 100% nitrogen. In the 100% nitrogen regime the 2$^{nd}$ UTC is 100 plus 25 pounds.

Plots of corn, at a minimum, were 4 rows of 30 feet in length (30 inches between rows) with 420 plots per location. All observations, unless otherwise noted, were taken from the center two rows of the plants, and all destructive sampling was taken from the outside rows. Seed samples were refrigerated until 1.5 to 2 hours prior to use.

Local Agricultural Practice: The seed was a commercial corn applied with a commercial seed treatment with no biological co-application. The seeding rate, planting date, weed/insect management, harvest times, and other standard management practices were left to the norms of local agricultural practices for the regions, with the exception of fungicide application (if required).

Microbe Application: The microbes were applied to the seed in a seed treatment over seeds that had already received a normal chemical treatment. The seed were coated with fermentation broth comprising the microbes.

Soil Characterization: Soil texture and soil fertility were evaluated. Standard soil sampling procedures were utilized, which included soil cores of depths from 0-30 cm and 30-60 cm. The standard soil sampling included a determination of nitrate nitrogen, ammonium nitrogen, total nitrogen, organic matter, and CEC. Standard soil sampling further included a determination of pH, total potassium, and total phosphorous. To determine the nitrogen fertilizer levels, preplant soil samples from each location were taken to ensure that the 0-12" and potentially the 12" to 24" soil regions for nitrate nitrogen.

Prior to planting and fertilization, 2 ml soil samples were collected from 0 to 6-12" from the UTC. One sample per replicate per nitrogen region was collected using the middle of the row. (5 fertilizer regimes×6 replicates=thirty soil samples).

Post-planting (V4-V6), 2 ml soil samples were collected from 0 to 6-12" from the UTC. One sample per replicate per nitrogen region was collected using the middle of the row. (5 fertilizer regimes×6 replicates=thirty soil samples).

Post-harvest (V4-V6), 2 ml soil samples were collected from 0 to 6-12" from the UTC. One sample per replicate per nitrogen region was collected using the middle of the row. Additional post-harvest soil sample collected at 0-12" from the UTC and potentially 12-24" from the UTC (5 fertilizer regimes×6 replicates=thirty soil samples).

A V6-V10 soil sample from each fertilizer regime (excluding the treatment of 100% and 100%+25 lbs [in the 100% block] for all fertilizer regimes at 0-12" and 12-24". (5 fertilizer regimes×2 depths=10 samples per location).

Post-harvest soil sample from each fertilizer regime (excluding the treatment of 100% and 100%+25 lbs [in the 100% block] for all fertilizer regimes at 0-12" and 12-24". (5 fertilizer regimes×2 depths=10 samples per location).

Assessments: The initial plant population was assessed at ~50% UTC and the final plant population was assessed prior to harvest. Assessment included (1) potentially temperature (temperature probe); (2) vigor (1-10 scale with 10=excellent) at V4 and V8-V10; (3) plant height at V8-V10 and V14; (4) yield (bushels/acre) adjusted to standard moisture percentage; (5) test weight; (6) grain moisture percentage; (7) stalk nitrate tests at black layer (420 plots×7 locations); (8) colonization with 1 plant per plot in zip lock bag at 0% and 100% fertilizer at V4-V6 (1 plant×14 treatments×6 replicates×2 fertilizer regimes=168 plants); (9) transcriptomics with 1 plant per plot in zip lock bag at 0% and 100% fertilizer at V4-V6 (1 plant×14 treatments×6 replicates×2 fertilizer regimes=168 plants); (10) Normalized difference vegetative index (NDVI) or normalized difference red edge (NDRE) determination using a Greenseeker instrument at two time points (V4-V6 and VT) to assess each plot at all 7 locations (420 plots×2 time points×7 locations=5,880 data points); (11) stalk characteristics measured at all 7 locations between R2 and R5 by recording the stalk diameter of 10 plants/plot at 6" height, record length of first internode above the 6" mark, 10 plants monitored (5 consecutive plants from center of two inside rows) (420 plots×10 plants×7 locations=29,400 data points).

Monitoring Schedule: Practitioners visited all trials at V3-V4 stage to assess early-season response to treatments and during reproductive growth stage to monitor maturity. Local cooperator visited research trial on an on-going basis.

Weather Information: Weather data spanning from planting to harvest was collected and consisted of daily minimum and maximum temperatures, soil temperature at seeding, daily rainfall plus irrigation (if applied), and unusual weather events such as excessive wind, rain, cold, heat.

Data Reporting: Including the data indicated above, the field trials generated data points including soil textures; row spacing; plot sizes; irrigation; tillage; previous crop; seeding rate; plant population; seasonal fertilizer inputs including source, rate, timing, and placement; harvest area dimensions, method of harvest, such as by hand or machine and measurement tools used (scales, yield monitor, etc.)

Results: Select results from the aforementioned field trial are reported in FIG. 16 and FIG. 17.

Figure 16:
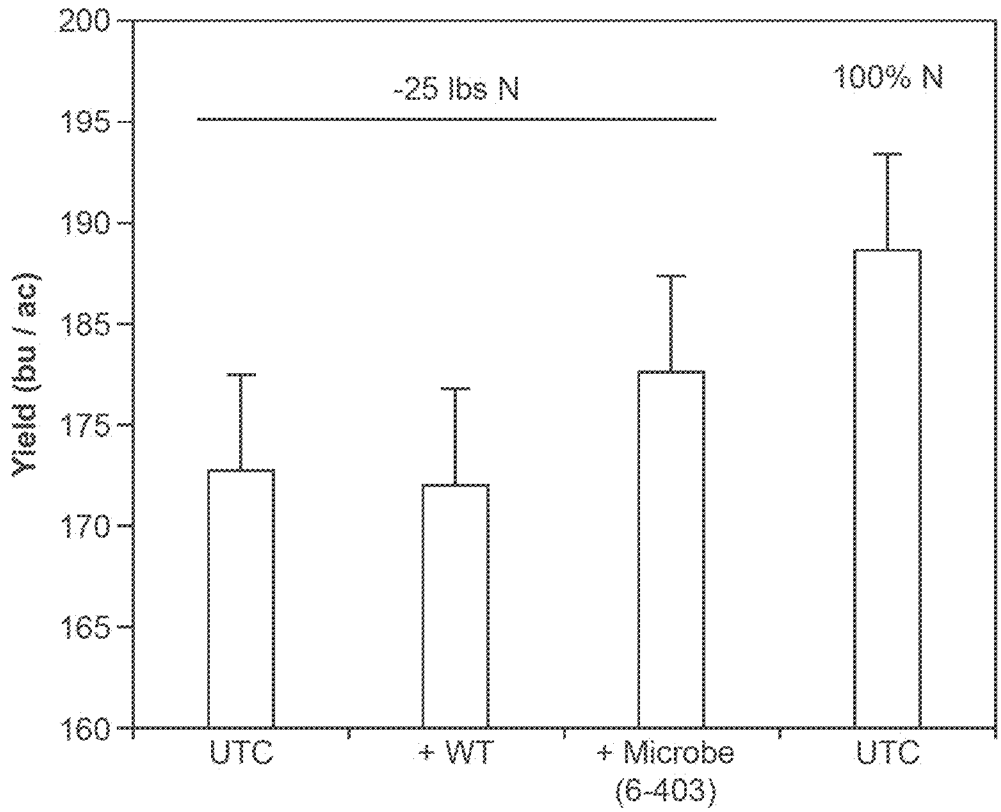
FIG. 16 illustrates results from a summer 2017 field testing experiment. The yield results obtained demonstrate that the microbes of the disclosure can serve as a potential fertilizer replacement. For instance, the utilization of a microbe of the disclosure (i.e. 6-403) resulted in a higher yield than the wild type strain (WT) and a higher yield than the untreated control (UTC). The "−25 lbs N" treatment utilizes 25 lbs less N per acre than standard agricultural practices of the region. The "100% N" UTC treatment is meant to depict standard agricultural practices of the region, in which 100% of the standard utilization of N is deployed by the farmer. The microbe "6-403" was deposited as NCMA 201708004 and can be found in Table 1. This is a mutant *Kosakonia sacchari* (also called CM037) and is a progeny mutant strain from CI006 WT.

In FIG. 16, it can be seen that a remodeled microbe of the disclosure (i.e. 6-403) resulted in a higher yield than the wild type strain (WT) and a higher yield than the untreated control (UTC). The "−25 lbs N" treatment utilizes 25 lbs less N per acre than standard agricultural practices of the region. The "100% N" UTC treatment is meant to depict standard agricultural practices of the region, in which 100% of the standard utilization of N is deployed by the farmer. The microbe "6-403" was deposited as NCMA 201708004 and can be found in Table 1. This is a mutant *Kosakonia sacchari* (also called CM037) and is a progeny mutant strain from CI006 WT.

Figure 17:
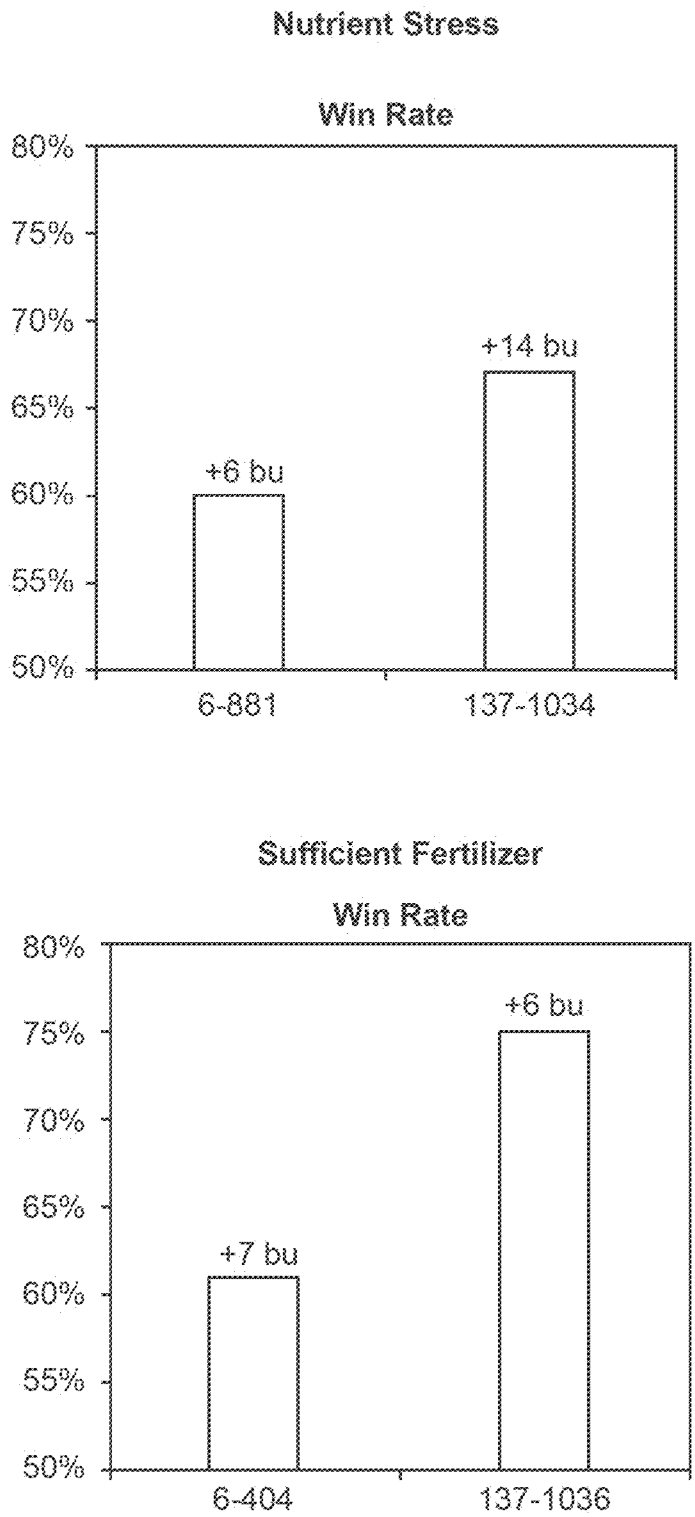
FIG. 17 illustrates results from a summer 2017 field testing experiment. The yield results obtained demonstrate that the microbes of the disclosure perform consistently across locations. Furthermore, the yield results demonstrate that the microbes of the disclosure perform well in both a nitrogen stressed environment, as well as an environment that has sufficient supplies of nitrogen. The microbe "6-881" (also known as CM094, PBC6.94), and which is a progeny mutant *Kosakonia sacchari* strain from CI006 WT, was deposited as NCMA 201708002 and can be found in Table 1. The microbe "137-1034," which is a progeny mutant *Klebsiella variicola* strain from CI137 WT, was deposited as NCMA 201712001 and can be found in Table 1. The microbe "137-1036," which is a progeny mutant *Klebsiella variicola* strain from CI137 WT, was deposited as NCMA 201712002 and can be found in Table 1. The microbe "6-404" (also known as CM38, PBC6.38), and which is a progeny mutant *Kosakonia sacchari* strain from CI006 WT, was deposited as NCMA 201708003 and can be found in Table 1. The "Nutrient Stress" condition corresponds to the 0% nitrogen regime. The "Sufficient Fertilizer" condition corresponds to the 100% nitrogen regime.
Figure 18:
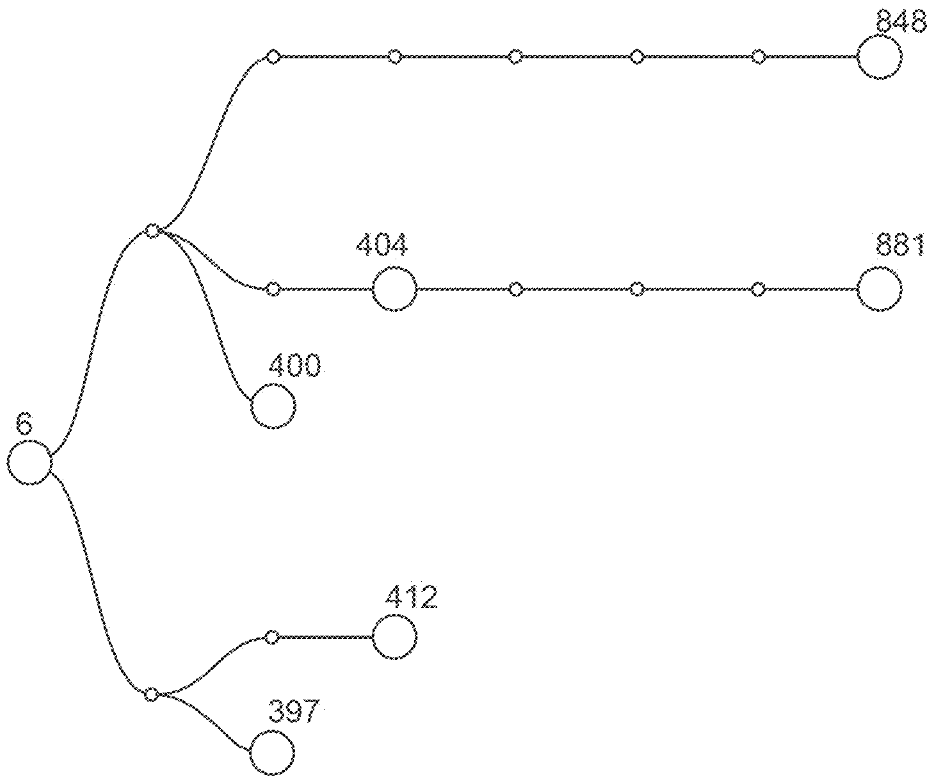
FIG. 18 depicts the lineage of modified strains that were derived from strain CI006 (also termed "6", *Kosakonia sacchari* WT).
Figure 19:
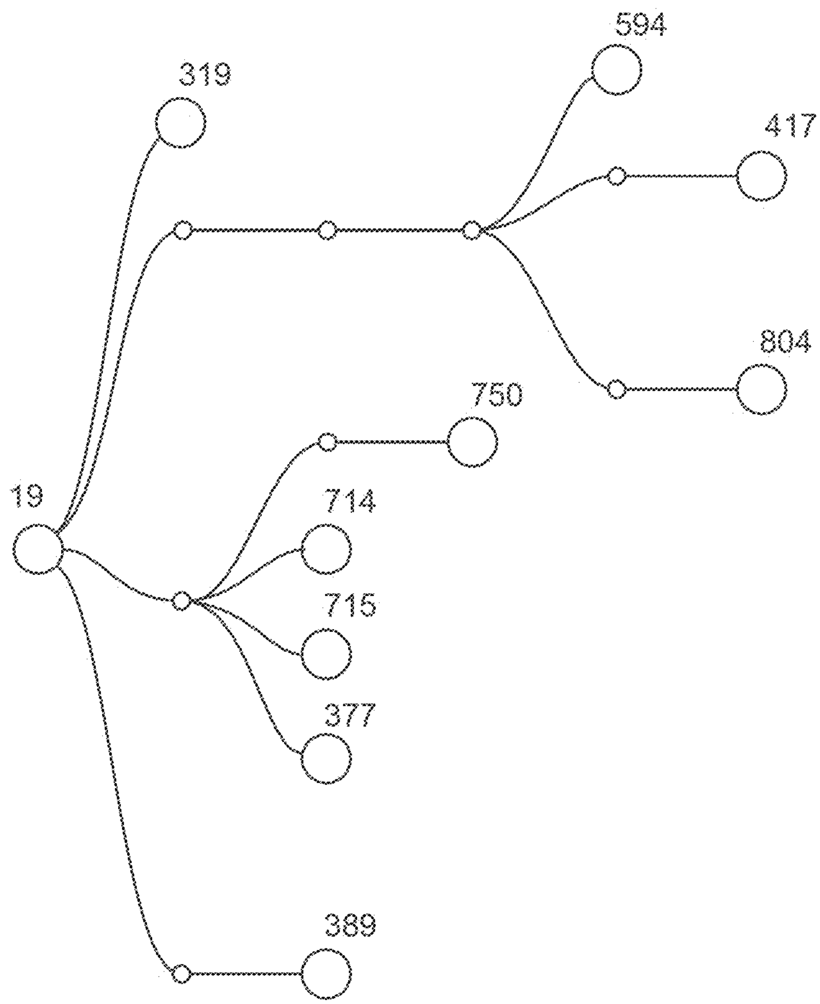
FIG. 19 depicts the lineage of modified strains that were derived from strain CI019 (also termed "19", *Rahnella aquatilis* WT).
Figure 20:
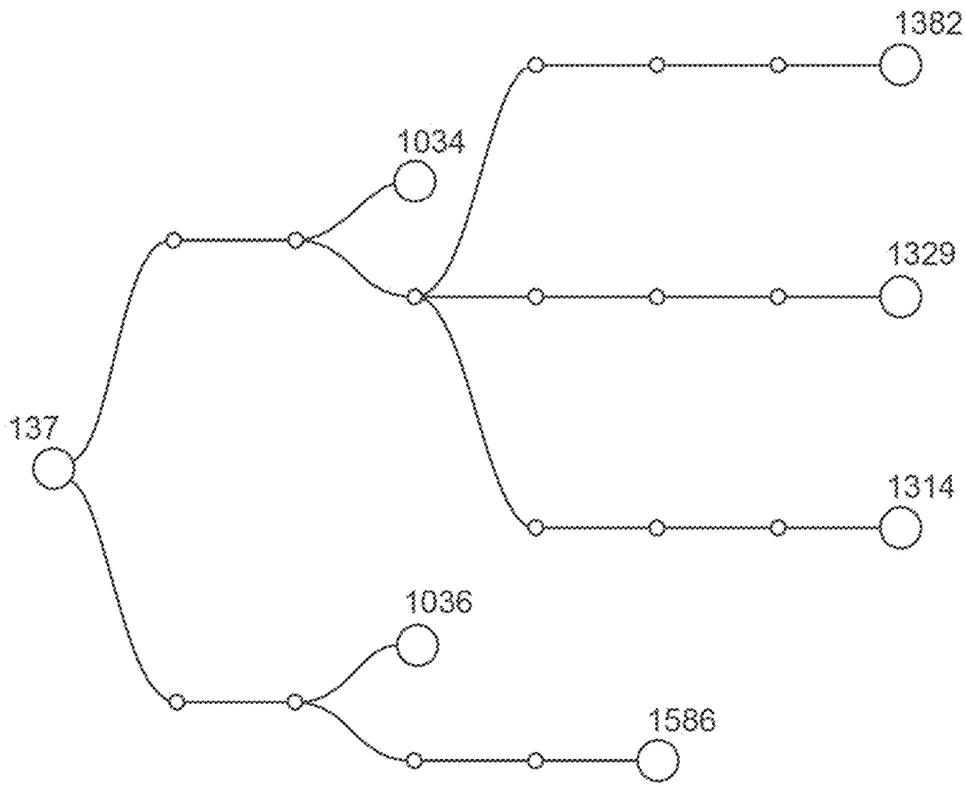
FIG. 20 depicts the lineage of modified strains that were derived from strain CI137 (also termed ("137", *Klebsiella variicola* WT).
Figure 21:
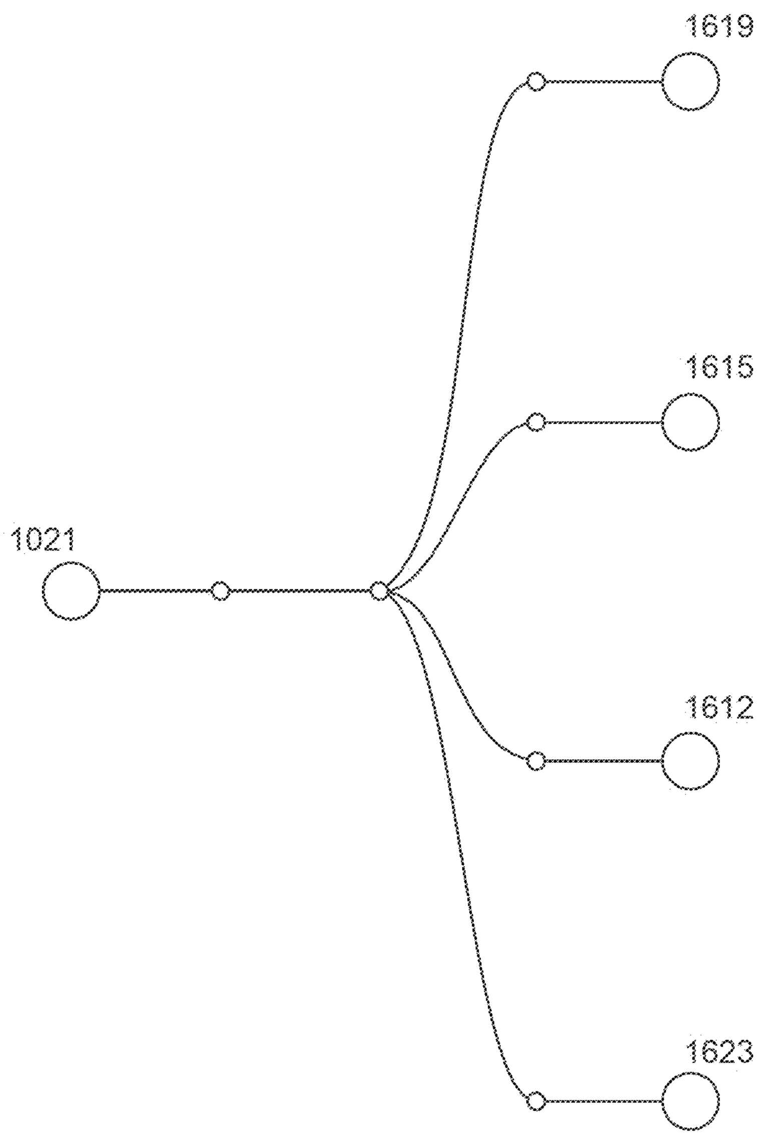
FIG. 21 depicts the lineage of modified strains that were derived from strain 1021 (*Kosakonia pseudosacchari* WT).
Figure 22:
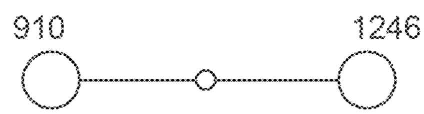
FIG. 22 depicts the lineage of modified strains that were derived from strain 910 (*Kluyvera intermedia* WT).
Figure 23:
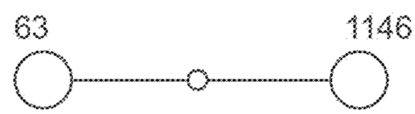
FIG. 23 depicts the lineage of modified strains that were derived from strain 63 (*Rahnella aquatilis* WT).

In FIG. 17, the yield results obtained demonstrate that the remodeled microbes of the disclosure perform consistently across locations. Furthermore, the yield results demonstrate that the microbes of the disclosure perform well in both a nitrogen stressed environment (i.e. a nitrogen limiting environment), as well as an environment that has sufficient supplies of nitrogen (i.e. a non-nitrogen-limiting condition).

The microbe "6-881" (also known as CM094, PBC6.94), and which is a progeny mutant *Kosakonia sacchari* strain from CI006 WT, was deposited as NCMA 201708002 and can be found in Table 1. The microbe "137-1034," which is a progeny mutant *Klebsiella variicola* strain from CI137 WT, was deposited as NCMA 201712001 and can be found in Table 1. The microbe "137-1036," which is a progeny mutant *Klebsiella variicola* strain from CI137 WT, was deposited as NCMA 201712002 and can be found in Table 1. The microbe "6-404" (also known as CM38, PBC6.38), and which is a progeny mutant *Kosakonia sacchari* strain from CI006 WT, was deposited as NCMA 201708003 and can be found in Table 1.

Example 5: Genus of Non-Intergeneric Remodeled Microbes Beneficial for Agricultural Systems The remodeled microbes of the present disclosure were evaluated and compared against one another for the production of nitrogen produced in an acre across a season. See FIG. 8, FIG. 24, and FIG. 25.

It is hypothesized by the inventors that in order for a population of engineered non-intergeneric microbes to be beneficial in a modern row crop agricultural system, then the population of microbes needs to produce at least one pound or more of nitrogen per acre per season.

Figure 8:
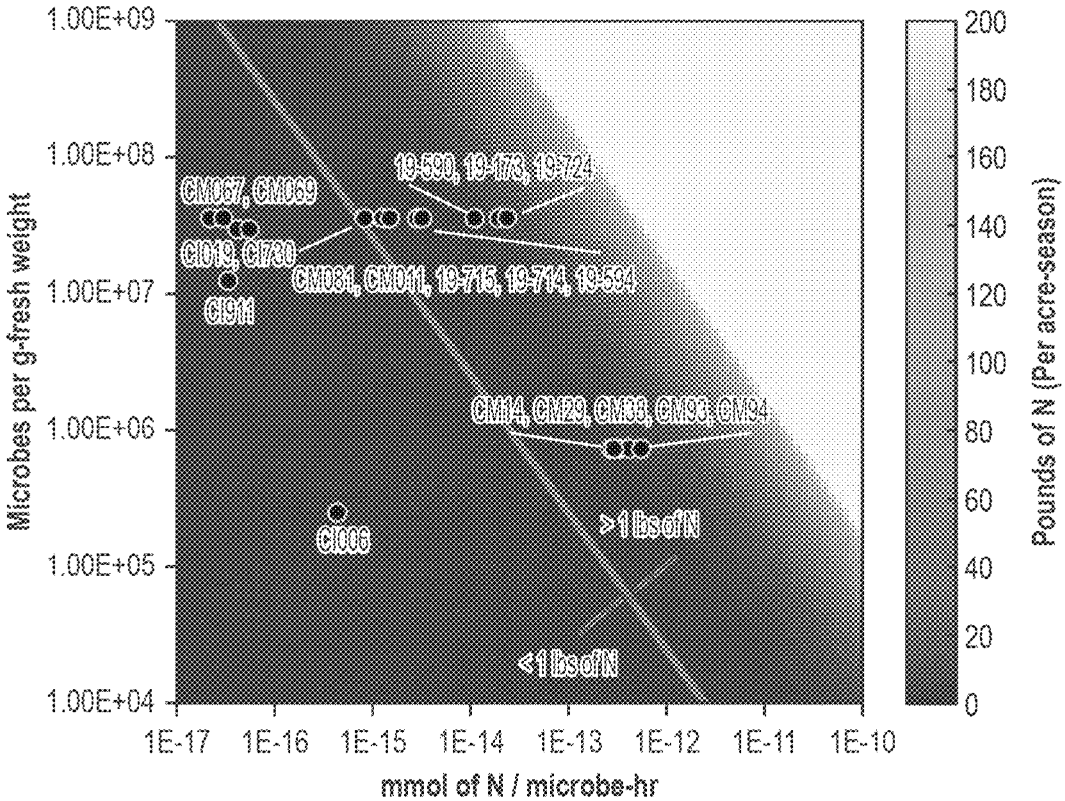
FIG. 8 depicts a heatmap of the pounds of nitrogen delivered per acre-season by microbes of the present disclosure recorded as a function of microbes per g-fresh weight by mmol of nitrogen/microbe-hr. Below the thin line that transects the larger image are the microbes that deliver less than one pound of nitrogen per acre-season, and above the line are the microbes that deliver greater than one pound of nitrogen per acre-season. The table below the heatmap gives the precise value of mmol N produced per microbe per hour (mmol N/Microbe hr) along with the precise CFU per gram of fresh weight (CFU/g fw) for each microbe shown in the heatmap. The microbes utilized in the heatmap were assayed for N production in corn. For the WT strains CI006 and CI019, corn root colonization data was taken from a single field site. For the remaining strains, colonization was assumed to be the same as the WT field level. N-fixation activity was determined using an in vitro ARA assay at 5 mM glutamine.
Figure 9:
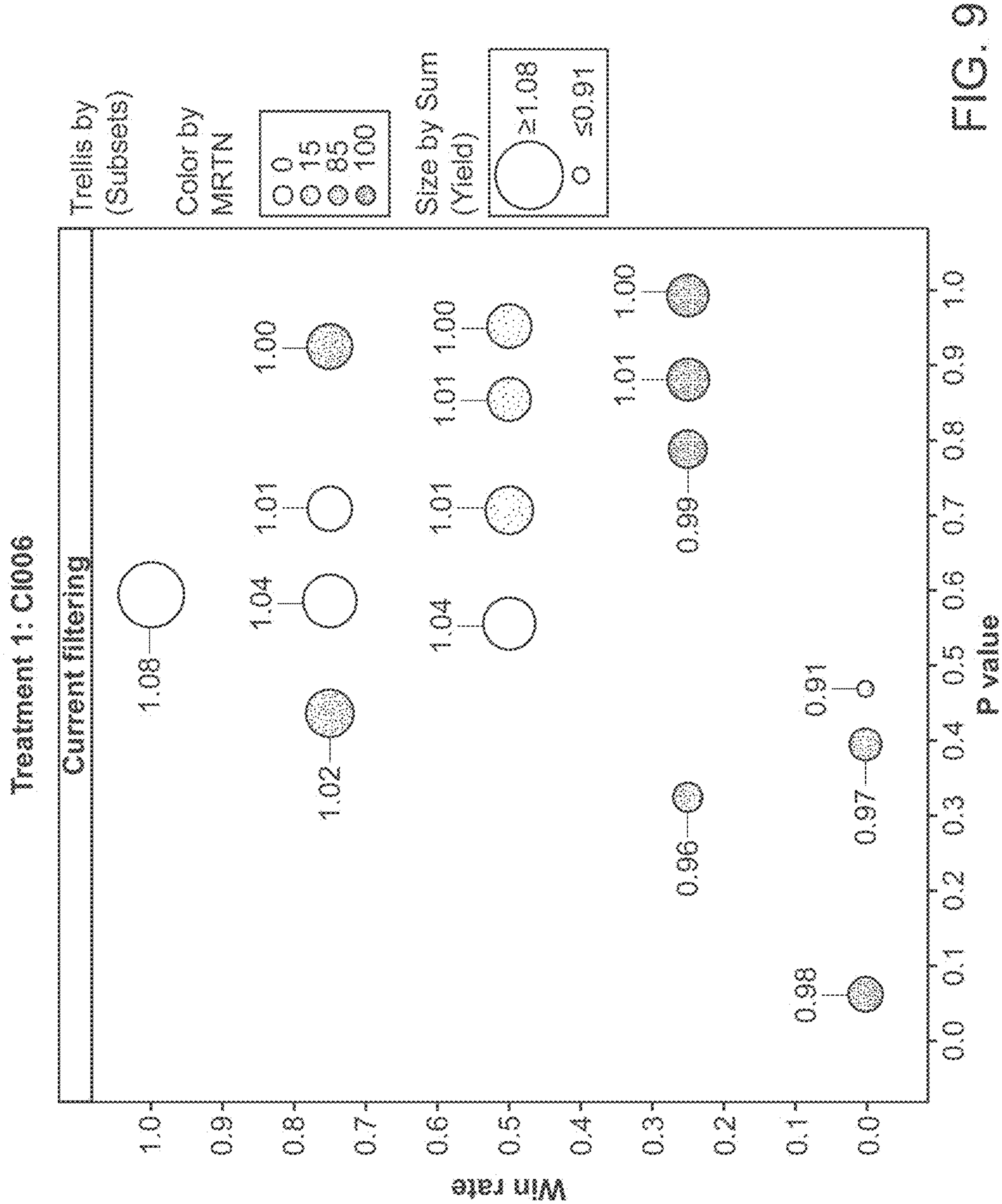
FIG. 9 depicts the plant yield of plants having been exposed to strain CI006. The area of the circles corresponds to the relative yield, while the shading corresponds to the particular MRTN treatment. The x-axis is the p value and the y-axis is the win rate.
Figure 10:
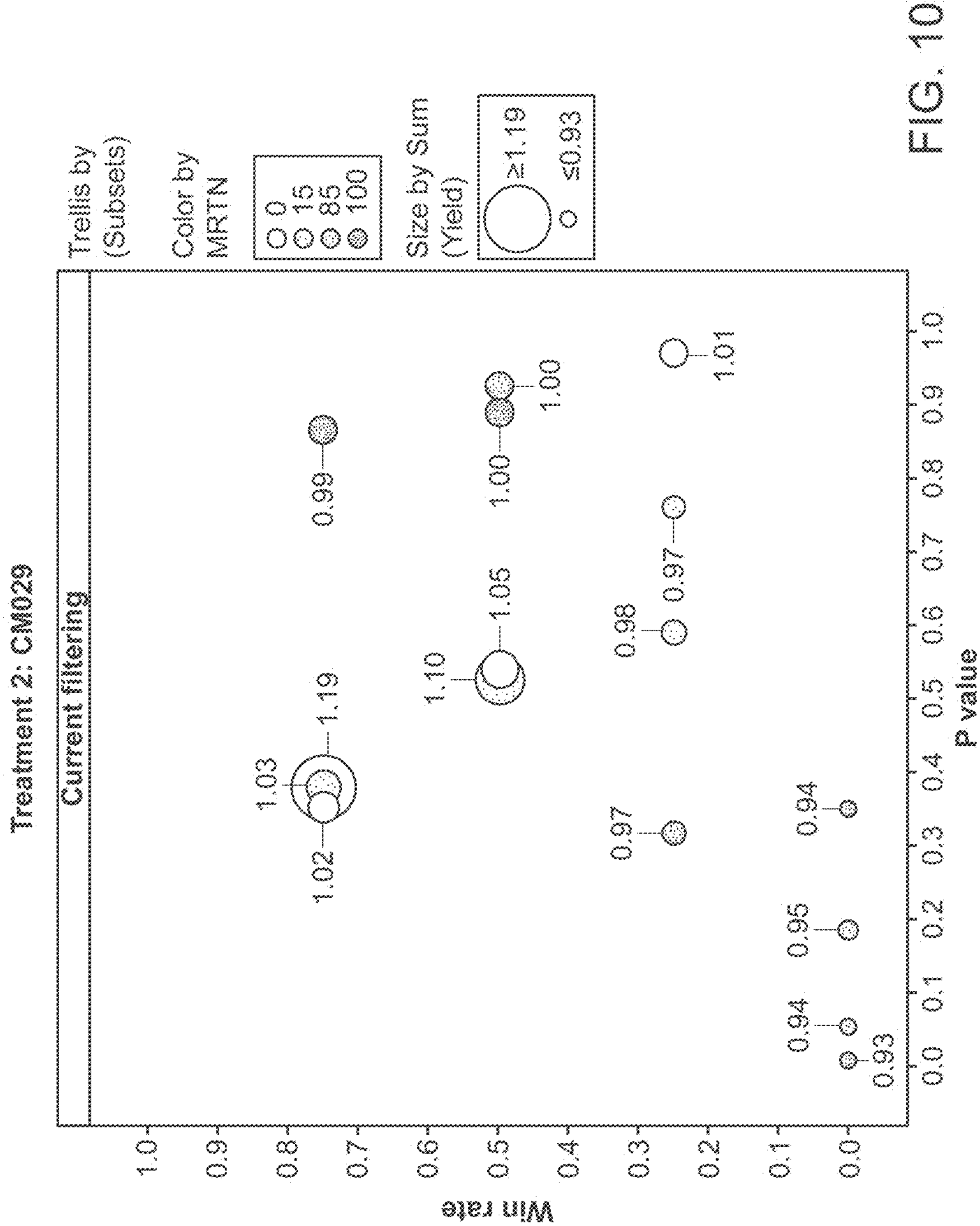
FIG. 10 depicts the plant yield of plants having been exposed to strain CM029. The area of the circles corresponds to the relative yield, while the shading corresponds to the particular MRTN treatment. The x-axis is the p value and the y-axis is the win rate.
Figure 11:
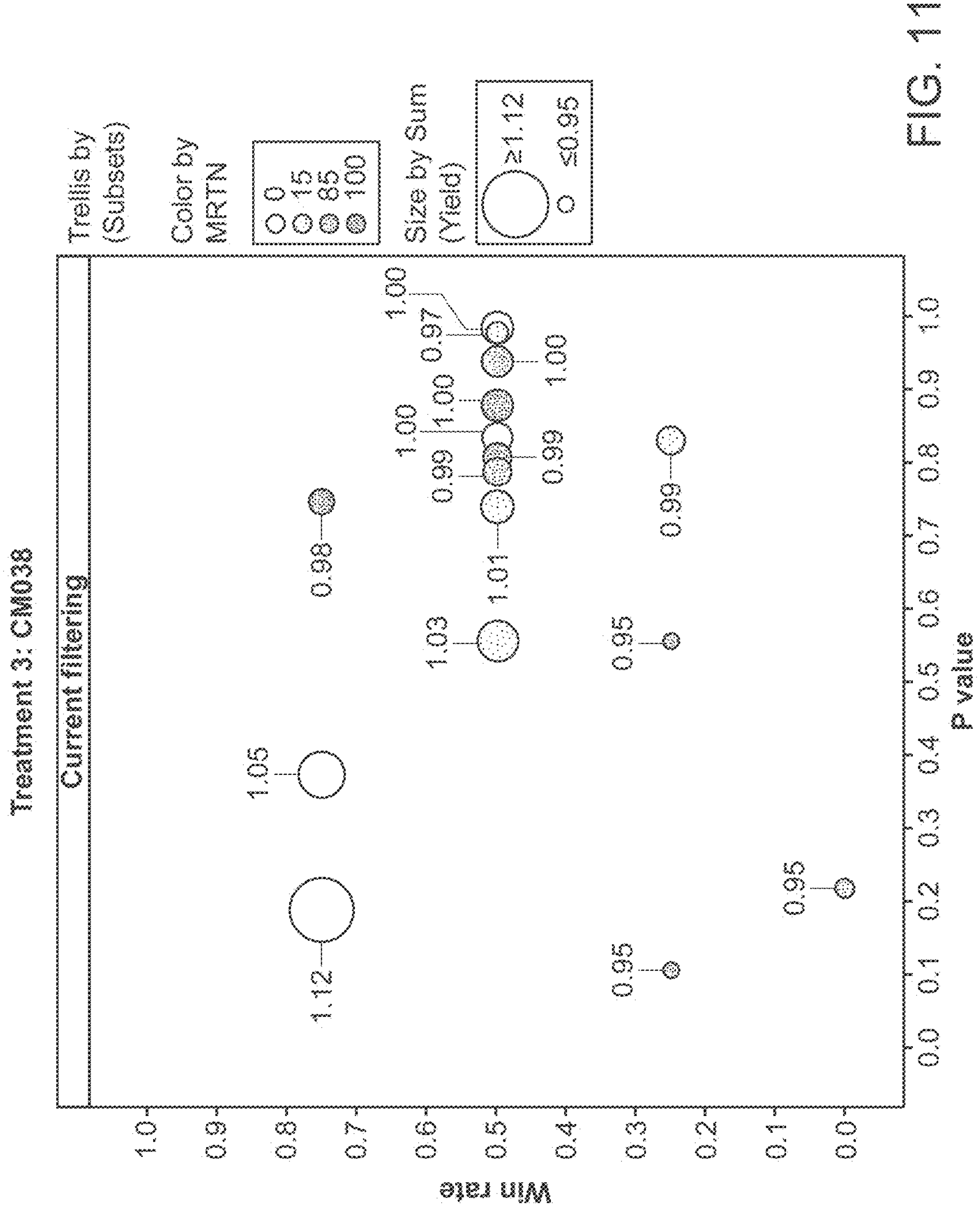
Figure 12:
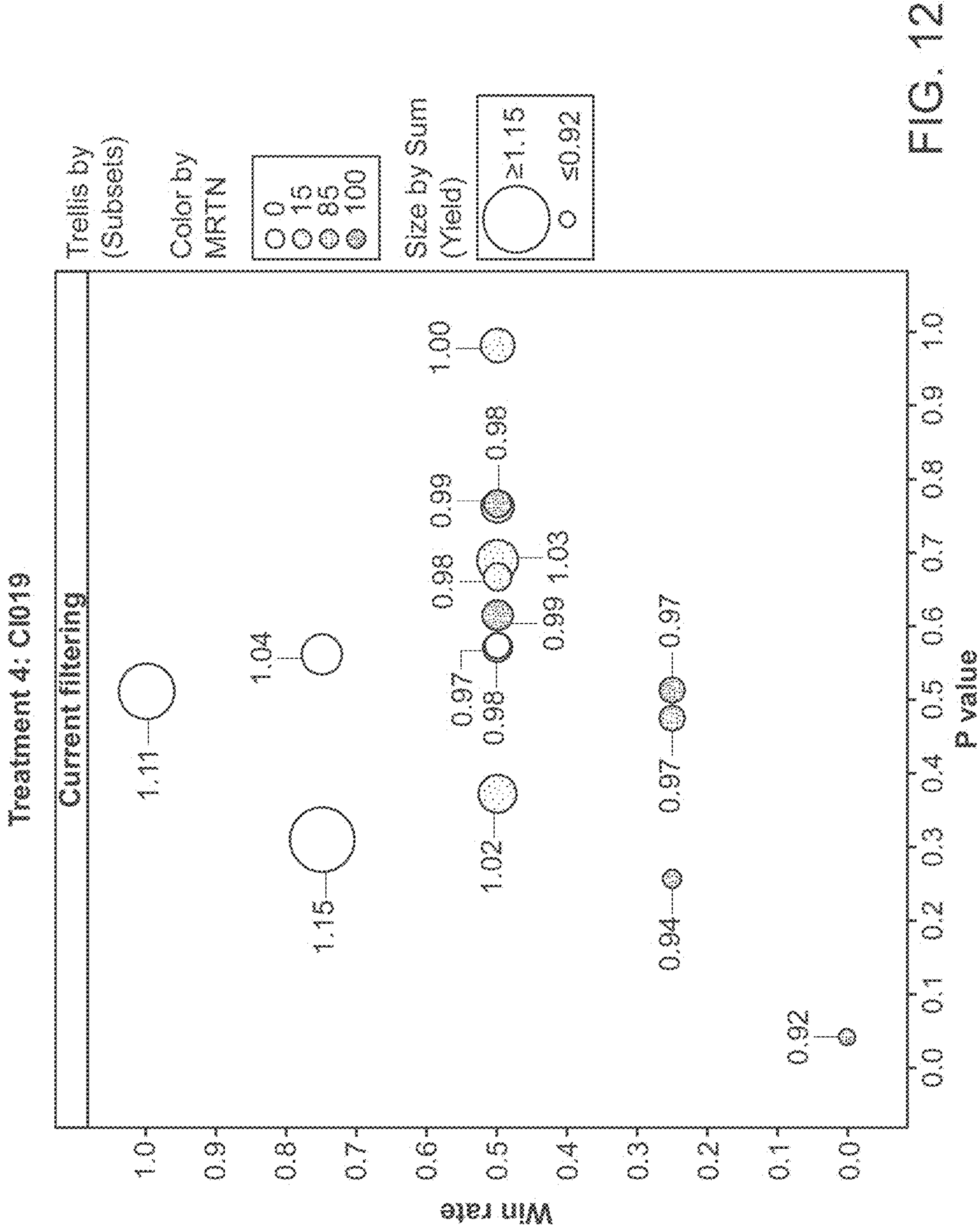
FIG. 12 depicts the plant yield of plants having been exposed to strain CI019. The area of the circles corresponds to the relative yield, while the shading corresponds to the particular MRTN treatment. The x-axis is the p value and the y-axis is the win rate.
Figure 13:
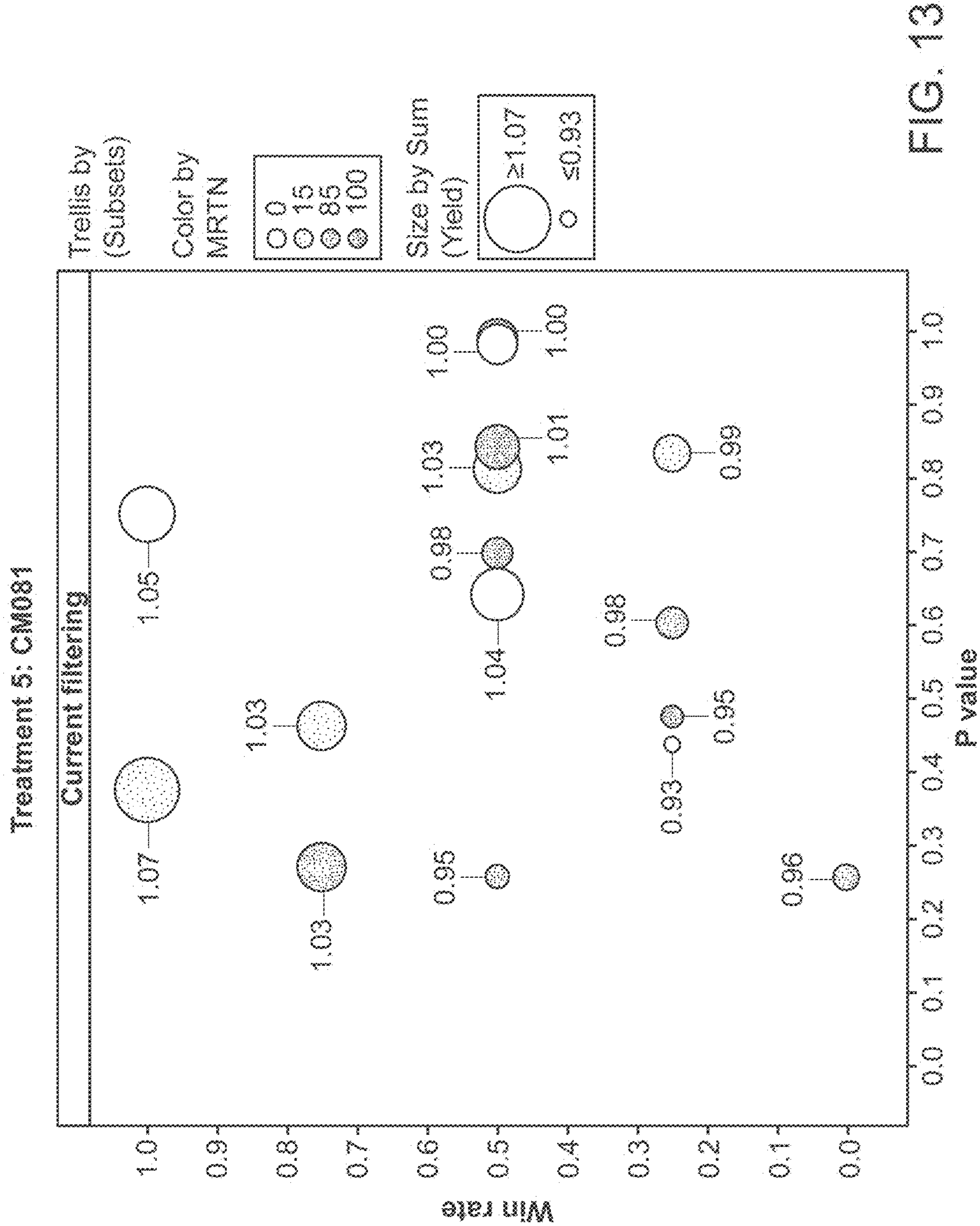
FIG. 13 depicts the plant yield of plants having been exposed to strain CM081. The area of the circles corresponds to the relative yield, while the shading corresponds to the particular MRTN treatment. The x-axis is the p value and the y-axis is the win rate.
Figure 14:
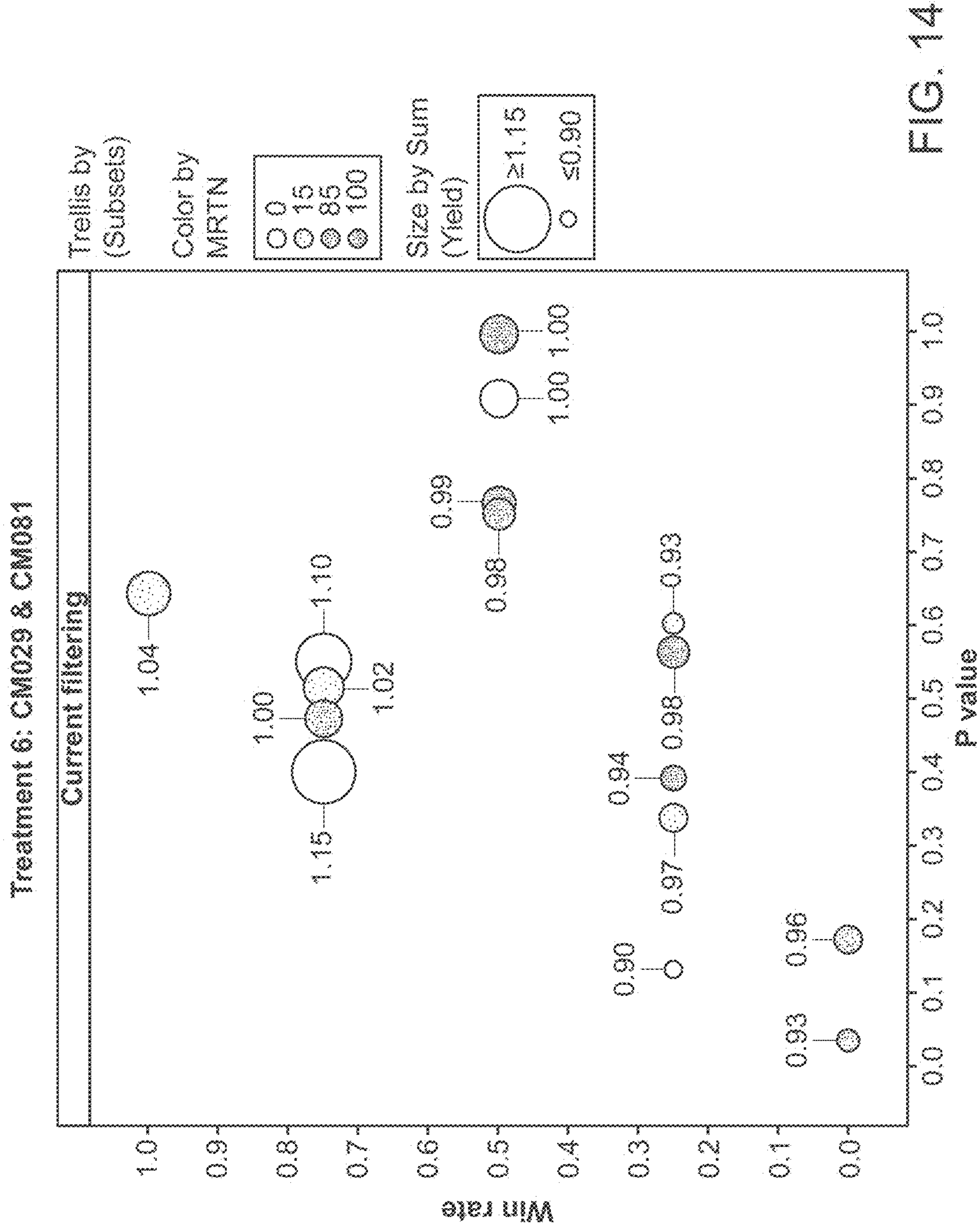
FIG. 14 depicts the plant yield of plants having been exposed to strains CM029 and CM081. The area of the circles corresponds to the relative yield, while the shading corresponds to the particular MRTN treatment. The x-axis is the p value and the y-axis is the win rate.
Figure 15:
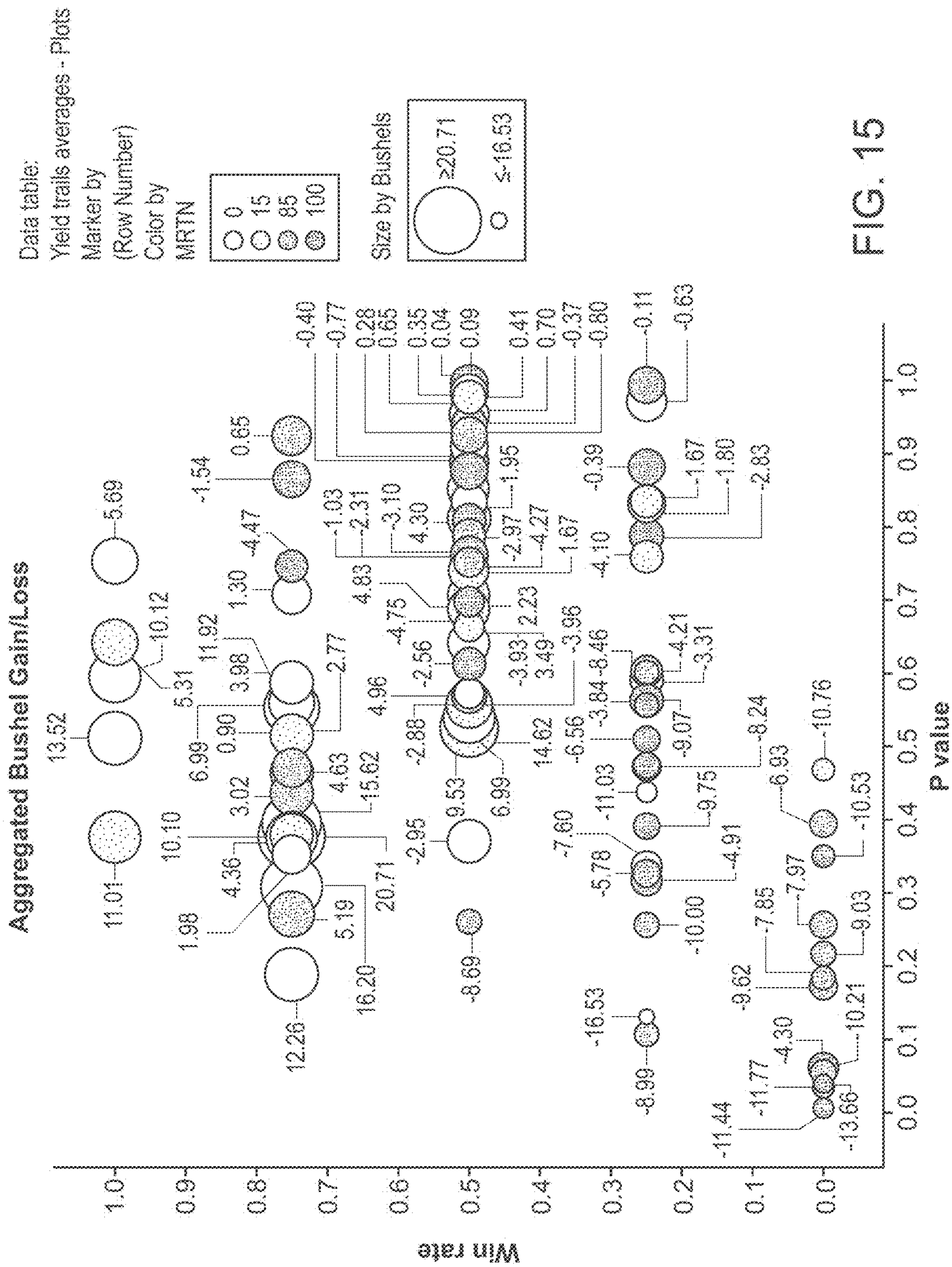
FIG. 15 depicts the plant yield of plants as the aggregated bushel gain/loss. The area of the circles corresponds to the relative yield, while the shading corresponds to the particular MRTN treatment. The x-axis is the p value and the y-axis is the win rate.
Figure 24:
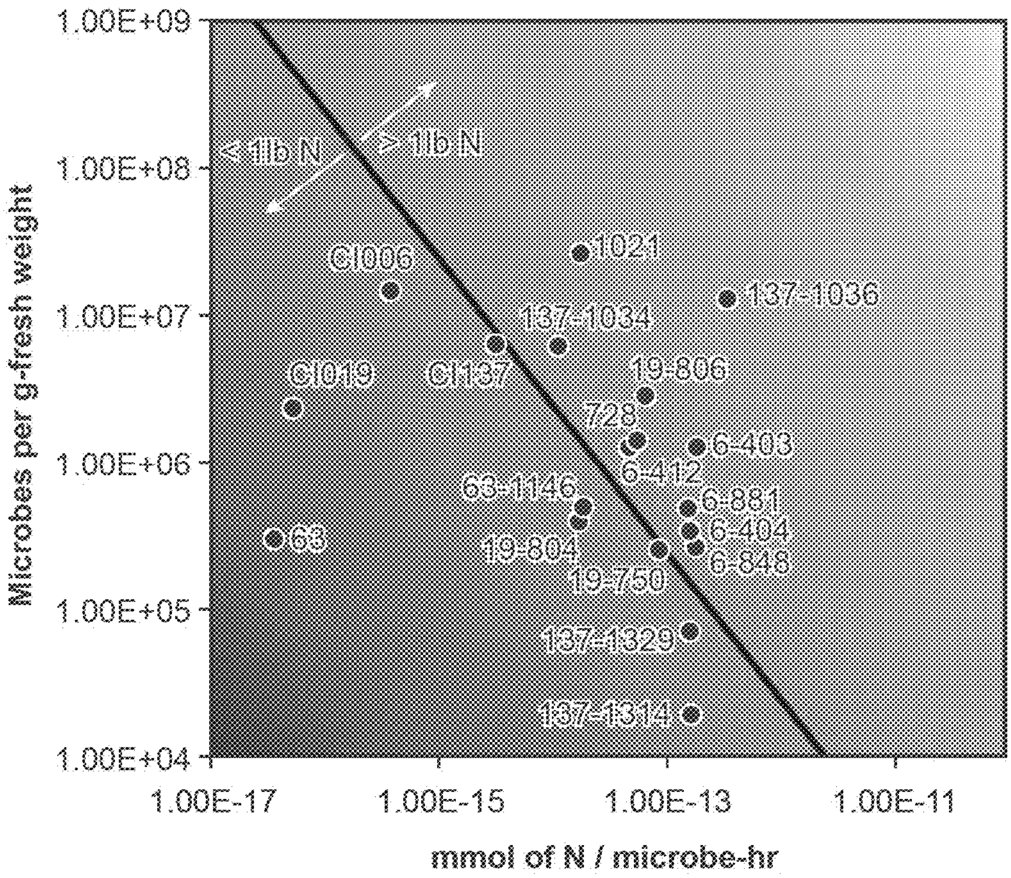
FIG. 24 depicts a heatmap of the pounds of nitrogen delivered per acre-season by microbes of the present disclosure recorded as a function of microbes per g-fresh weight by mmol of nitrogen/microbe-hr. Below the thin line that transects the larger image are the microbes that deliver less than one pound of nitrogen per acre-season, and above the line are the microbes that deliver greater than one pound of nitrogen per acre-season. The Table 28 in Example 5 gives the precise value of mmol N produced per microbe per hour (mmol N/Microbe hr) along with the precise CFU per gram of fresh weight (CFU/g fw) for each microbe shown in the heatmap. The data in FIG. 24 is derived from microbial strains assayed for N production in corn in field conditions. Each point represents lb N/acre produced by a microbe using corn root colonization data from a single field site. N-fixation activity was determined using in vitro ARA assay at 5 mM N in the form of glutamine or ammonium phosphate.
Figure 25:
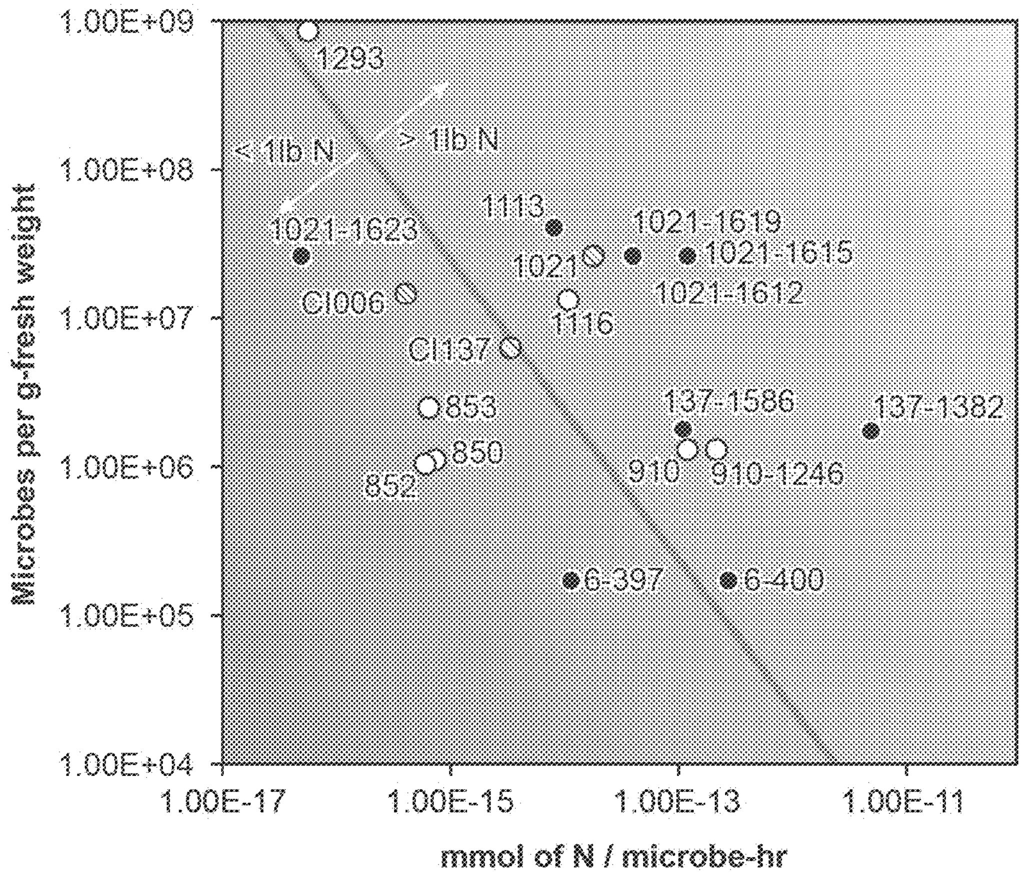
FIG. 25 depicts a heatmap of the pounds of nitrogen delivered per acre-season by microbes of the present disclosure recorded as a function of microbes per g-fresh weight by mmol of nitrogen/microbe-hr. Below the thin line that transects the larger image are the microbes that deliver less than one pound of nitrogen per acre-season, and above the line are the microbes that deliver greater than one pound of nitrogen per acre-season. The Table 29 in Example 5 gives the precise value of mmol N produced per microbe per hour (mmol N/Microbe hr) along with the precise CFU per gram of fresh weight (CFU/g fw) for each microbe shown in the heatmap. The data in FIG. 25 is derived from microbial strains assayed for N production in corn in laboratory and greenhouse conditions. Each point represents lb N/acre produced by a single strain. White points represent strains in which corn root colonization data was gathered in greenhouse conditions. Black points represent mutant strains for which corn root colonization levels are derived from average field corn root colonization levels of the wild-type parent strain. Hatched points represent the wild type parent strains at their average field corn root colonization levels. In all cases, N-fixation activity was determined by in vitro ARA assay at 5 mM N in the form of glutamine or ammonium phosphate.

To that end, the inventors have surprisingly discovered a functional genus of microbes that are able to contribute, inter alia, to: increasing yields in non-leguminous crops; and/or lessening a farmer's dependence upon exogenous nitrogen application; and/or the ability to produce at least one pound of nitrogen per acre per season, even in non-nitrogen-limiting environments, said genus being defined by the product of colonization ability×mmol of N produced per microbe per hour (i.e. the line partitioning FIGS. 8, 24, and 25).

With respect to FIGS. 8, 24, and 25, certain data utilizing microbes of the disclosure was aggregated, in order to depict a heatmap of the pounds of nitrogen delivered per acre-season by microbes of the disclosure, which are recorded as a function of microbes per g-fresh weight by mmol of nitrogen/microbe-hr. Below the thin line that transects the larger images are the microbes that deliver less than one pound of nitrogen per acre-season, and above the line are the microbes that deliver greater than one pound of nitrogen per acre-season.

Field Data & Wild Type Colonization Heatmap: The microbes utilized in the FIG. 8 heatmap were assayed for N production in corn. For the WT strains CI006 and CI019, corn root colonization data was taken from a single field site. For the remaining strains, colonization was assumed to be the same as the WT field level. N-fixation activity was determined using an in vitro ARA assay at 5 mM glutamine. The table below the heatmap in FIG. 8 gives the precise value of mmol N produced per microbe per hour (mmol N/Microbe hr) along with the precise CFU per gram of fresh weight (CFU/g fw) for each microbe shown in the heatmap.

Field Data Heatmap: The data utilized in the FIG. 24 heatmap is derived from microbial strains assayed for N production in corn in field conditions. Each point represents lb N/acre produced by a microbe using corn root colonization data from a single field site. N-fixation activity was determined using in vitro ARA assay at 5 mM N in the form of glutamine or ammonium phosphate. The below Table 28 gives the precise value of mmol N produced per microbe per hour (mmol N/Microbe hr) along with the precise CFU per gram of fresh weight (CFU/g fw) for each microbe shown in the heatmap of FIG. 24.

Greenhouse & Laboratory Data Heatmap: The data utilized in the FIG. 25 heatmap is derived from microbial strains assayed for N production in corn in laboratory and greenhouse conditions. Each point represents lb N/acre produced by a single strain. White points represent strains in which corn root colonization data was gathered in greenhouse conditions. Black points represent mutant strains for which corn root colonization levels are derived from average field corn root colonization levels of the wild-type parent strain. Hatched points represent the wild type parent strains at their average field corn root colonization levels. In all cases, N-fixation activity was determined by in vitro ARA assay at 5 mM N in the form of glutamine or ammonium phosphate. The below Table 29 gives the precise value of mmol N produced per microbe per hour (mmol N/Microbe hr) along with the precise CFU per gram of fresh weight (CFU/g fw) for each microbe shown in the heatmap of FIG. 25.

TABLE 28

FIG. 24 - Field Data Heatmap

| Strain Name | Activity (mmol N/ Microbe hr) | Peak Colonization (CFU/g fw) | N Produced/ acre season | Taxonomic Designation |
|---|---|---|---|---|
| CI006 | 3.88E−16 | 1.50E+07 | 0.24 | *Kosakonia sacchari* |
| 6-404 | 1.61E−13 | 3.50E+05 | 2.28 | *Kosakonia sacchari* |
| 6-848 | 1.80E−13 | 2.70E+05 | 1.97 | *Kosakonia sacchari* |
| 6-881 | 1.58E−13 | 5.00E+05 | 3.20 | *Kosakonia sacchari* |
| 6-412 | 4.80E−14 | 1.30E+06 | 2.53 | *Kosakonia sacchari* |
| 6-403 | 1.90E−13 | 1.30E+06 | 10.00 | *Kosakonia sacchari* |
| CI019 | 5.33E−17 | 2.40E+06 | 0.01 | *Rahnella aquatilis* |
| 19-806 | 6.65E−14 | 2.90E+06 | 7.80 | *Rahnella aquatilis* |
| 19-750 | 8.90E−14 | 2.60E+05 | 0.94 | *Rahnella aquatilis* |
| 19-804 | 1.72E−14 | 4.10E+05 | 0.29 | *Rahnella aquatilis* |
| CI137 | 3.24E−15 | 6.50E+06 | 0.85 | *Klebsiella variicola* |
| 137-1034 | 1.16E−14 | 6.30E+06 | 2.96 | *Klebsiella variicola* |
| 137-1036 | 3.47E−13 | 1.30E+07 | 182.56 | *Klebsiella variicola* |
| 137-1314 | 1.70E−13 | 1.99E+04 | 0.14 | *Klebsiella variicola* |
| 137-1329 | 1.65E−13 | 7.25E+04 | 0.48 | *Klebsiella variicola* |
| 63 | 3.60E−17 | 3.11E+05 | 0.00 | *Rahnella aquatilis* |
| 63-1146 | 1.90E−14 | 5.10E+05 | 0.39 | *Rahnella aquatilis* |

TABLE 28-continued

| FIG. 24 - Field Data Heatmap | | | | |
|---|---|---|---|---|
| Strain Name | Activity (mmol N/ Microbe hr) | Peak Colonization (CFU/g fw) | N Produced/ acre season | Taxonomic Designation |
| 1021 | 1.77E−14 | 2.69E+07 | 19.25 | *Kosakonia pseudosacchari* |
| 728 | 5.56E−14 | 1445240.09 | 3.25 | *Klebsiella variicola* |

TABLE 29

| FIG. 25 - Greenhouse & Laboratory Data Heatmap | | | | |
|---|---|---|---|---|
| Strain Name | Activity (mmol N/ Microbe hr) | Peak Colonization (CFU/g fw) | N Produced/ acre season | Taxonomic Designation |
| CI006 | 3.88E−16 | 1.50E+07 | 0.24 | *Kosakonia sacchari* |
| 6-400 | 2.72E−13 | 1.79E+05 | 1.97 | *Kosakonia sacchari* |
| 6-397 | 1.14E−14 | 1.79E+05 | 0.08 | *Kosakonia sacchari* |
| CI137 | 3.24E−15 | 6.50E+06 | 0.85 | *Klebsiella variicola* |
| 137-1586 | 1.10E−13 | 1.82E+06 | 8.10 | *Klebsiella variicola* |
| 137-1382 | 4.81E−12 | 1.82E+06 | 354.60 | *Klebsiella variicola* |
| 1021 | 1.77E−14 | 2.69E+07 | 19.25 | *Kosakonia pseudosacchari* |
| 1021-1615 | 1.20E−13 | 2.69E+07 | 130.75 | *Kosakonia pseudosacchari* |
| 1021-1619 | 3.93E−14 | 2.69E+07 | 42.86 | *Kosakonia pseudosacchari* |
| 1021-1612 | 1.20E−13 | 2.69E+07 | 130.75 | *Kosakonia pseudosacchari* |
| 1021-1623 | 4.73E−17 | 2.69E+07 | 0.05 | *Kosakonia pseudosacchari* |
| 1293 | 5.44E−17 | 8.70E+08 | 1.92 | *Azospirillum lipoferum* |
| 1116 | 1.05E−14 | 1.37E+07 | 5.79 | *Enterobacter* sp. |
| 1113 | 8.05E−15 | 4.13E+07 | 13.45 | *Enterobacter* sp. |
| 910 | 1.19E−13 | 1.34E+06 | 6.46 | *Kluyvera intermedia* |
| 910-1246 | 2.16E−13 | 1.34E+06 | 11.69 | *Kluyvera intermedia* |
| 850 | 7.2301E−16 | 1.17E+06 | 0.03 | *Achromobacter spiritinus* |
| 852 | 5.96E−16 | 1.07E+06 | 0.03 | *Achromobacter marplatensis* |
| 853 | 6.42E−16 | 2.55E+06 | 0.07 | *Microbacterium murale* |

Conclusions: The data in FIGS. 8, 24, 25, and Tables 28 and 29, illustrates more than a dozen representative members of the described genus (i.e. microbes to the right of the line in the figures). Further, these numerous representative members come from a diverse array of taxonomic genera, which can be found in the above Tables 28 and 29. Further still, the inventors have discovered numerous genetic attributes that depict a structure/function relationship that is found in many of the microbes. These genetic relationships can be found in the numerous tables of the disclosure setting forth the genetic modifications introduced by the inventors, which include introducing at least one genetic variation into at least one gene, or non-coding polynucleotide, of the nitrogen fixation or assimilation genetic regulatory network.

Consequently, the newly discovered genus is supported by: (1) a robust dataset, (2) over a dozen representative members, (3) members from diverse taxonomic genera, and (4) classes of genetic modifications that define a structure/function relationship, in the underlying genetic architecture of the genus members.

Example 6: Growth Chamber Assays for Combined Clothianidin and Non-Intergenic Remodeled Microbes in Corn An experiment will be conducted utilizing one or more of the deposited nine microbes described in Table 1 (6 non-intergenic remodeled microbes and 3 WT microbes), in combination with an insecticide, clothianidin. The microbe and clothianidin combination are used to treat corn seed in growth chamber experiments.

Growth chamber experiments are conducted in which corn seed is allowed to germinate under controlled standard growth conditions. The experiment includes: (a) untreated corn seed, (b) corn seed treated with clothianidin, (c) corn seed treated with one or more of the microbes described in Table 1, and (d) corn seed treated with a combination of clothianidin and one or more of the microbes described in Table 1. There will be approximately 100 seeds per treatment.

The corn seed treated with the combination of one or more of the 6 non-intergenic remodeled microbes from Table 1 and clothianidin is expected to exhibit (1) greater numbers of seed that germinate, (2) faster germination times, and (3) reaching the third leaf collar vegetative stage faster; as compared to all of the other treatment groups.

The corn seed treated with the combination of one or more of the 6 non-intergenic remodeled microbes from Table 1 and clothianidin is expected to reveal a synergistic effect as compared to the other treatment groups.

Example 7: Growth Chamber Assays for Combined Thiamethoxam and Non-Intergenic Remodeled Microbes in Corn An experiment will be conducted utilizing one or more of the deposited nine microbes described in Table 1 (6 non-intergenic remodeled microbes and 3 WT microbes), in combination with an insecticide, thiamethoxam. The microbe and thiamethoxam combination are used to treat corn seed in growth chamber experiments.

Growth chamber experiments are conducted in which corn seed is allowed to germinate under controlled standard growth conditions. The experiment includes: (a) untreated corn seed, (b) corn seed treated with thiamethoxam, (c) corn seed treated with one or more of the microbes described in Table 1, and (d) corn seed treated with a combination of thiamethoxam and one or more of the microbes described in Table 1. There will be approximately 100 seeds per treatment.

The corn seed treated with the combination of one or more of the 6 non-intergenic remodeled microbes from Table 1 and thiamethoxam is expected to exhibit (1) greater numbers of seed that germinate, (2) faster germination times, and (3) reaching the third leaf collar vegetative stage faster; as compared to all of the other treatment groups.

The corn seed treated with the combination of one or more of the 6 non-intergenic remodeled microbes from Table 1 and thiamethoxam is expected to reveal a synergistic effect as compared to the other treatment groups.

Example 8: Growth Chamber Assays for Combined Chlorantraniliprole and Non-Intergenic Remodeled Microbes in Corn An experiment will be conducted utilizing one or more of the deposited nine microbes described in Table 1 (6 non-intergenic remodeled microbes and 3 WT microbes), in combination with an insecticide, chlorantraniliprole. The microbe and chlorantraniliprole combination are used to treat corn seed in growth chamber experiments.

Growth chamber experiments are conducted in which corn seed is allowed to germinate under controlled standard growth conditions. The experiment includes: (a) untreated corn seed, (b) corn seed treated with chlorantraniliprole, (c) corn seed treated with one or more of the microbes described in Table 1, and (d) corn seed treated with a combination of chlorantraniliprole and one or more of the microbes described in Table 1. There will be approximately 100 seeds per treatment.

The corn seed treated with the combination of one or more of the 6 non-intergenic remodeled microbes from Table 1 and chlorantraniliprole is expected to exhibit (1) greater numbers of seed that germinate, (2) faster germination times, and (3) reaching the third leaf collar vegetative stage faster; as compared to all of the other treatment groups.

The corn seed treated with the combination of one or more of the 6 non-intergenic remodeled microbes from Table 1 and chlorantraniliprole is expected to reveal a synergistic effect as compared to the other treatment groups.

Example 9: Growth Chamber Assays for Combined Imidacloprid and Non-Intergenic Remodeled Microbes in Corn An experiment will be conducted utilizing one or more of the deposited nine microbes described in Table 1 (6 non-intergenic remodeled microbes and 3 WT microbes), in combination with an insecticide, imidacloprid. The microbe and imidacloprid combination are used to treat corn seed in growth chamber experiments.

Growth chamber experiments are conducted in which corn seed is allowed to germinate under controlled standard growth conditions. The experiment includes: (a) untreated corn seed, (b) corn seed treated with imidacloprid, (c) corn seed treated with one or more of the microbes described in Table 1, and (d) corn seed treated with a combination of imidacloprid and one or more of the microbes described in Table 1. There will be approximately 100 seeds per treatment.

The corn seed treated with the combination of one or more of the 6 non-intergenic remodeled microbes from Table 1 and imidacloprid is expected to exhibit (1) greater numbers of seed that germinate, (2) faster germination times, and (3) reaching the third leaf collar vegetative stage faster; as compared to all of the other treatment groups.

The corn seed treated with the combination of one or more of the 6 non-intergenic remodeled microbes from Table 1 and imidacloprid is expected to reveal a synergistic effect as compared to the other treatment groups.

Example 10: Growth Chamber Assays for Combined MAXIM QUATTRO and Non-Intergenic Remodeled Microbes in Corn An experiment will be conducted utilizing one or more of the deposited nine microbes described in Table 1 (6 non-intergenic remodeled microbes and 3 WT microbes), in combination with a fungicide, MAXIM QUATTRO (4 actives—fludioxonil+mefenoxam (also called metalaxyl)+azoxystrobin+thiabendazole). The microbe and MAXIM QUATTRO combination are used to treat corn seed in growth chamber experiments.

Growth chamber experiments are conducted in which corn seed is allowed to germinate under controlled standard growth conditions. The experiment includes: (a) untreated corn seed, (b) corn seed treated with MAXIM QUATTRO, (c) corn seed treated with one or more of the microbes described in Table 1, and (d) corn seed treated with a combination of MAXIM QUATTRO and one or more of the microbes described in Table 1. There will be approximately 100 seeds per treatment.

The corn seed treated with the combination of one or more of the 6 non-intergenic remodeled microbes from Table 1 and MAXIM QUATTRO is expected to exhibit (1) greater numbers of seed that germinate, (2) faster germination times, and (3) reaching the third leaf collar vegetative stage faster; as compared to all of the other treatment groups.

The corn seed treated with the combination of one or more of the 6 non-intergenic remodeled microbes from Table 1 and MAXIM QUATTRO is expected to reveal a synergistic effect as compared to the other treatment groups.

Example 11: Growth Chamber Assays for Combined Metalaxyl and Non-Intergenic Remodeled Microbes in Corn An experiment will be conducted utilizing one or more of the deposited nine microbes described in Table 1 (6 non-intergenic remodeled microbes and 3 WT microbes), in combination with a fungicide, metalaxyl. The microbe and metalaxyl combination are used to treat corn seed in growth chamber experiments.

Growth chamber experiments are conducted in which corn seed is allowed to germinate under controlled standard growth conditions. The experiment includes: (a) untreated corn seed, (b) corn seed treated with metalaxyl, (c) corn seed treated with one or more of the microbes described in Table 1, and (d) corn seed treated with a combination of metalaxyl and one or more of the microbes described in Table 1. There will be approximately 100 seeds per treatment.

The corn seed treated with the combination of one or more of the 6 non-intergenic remodeled microbes from Table 1 and metalaxyl is expected to exhibit (1) greater numbers of seed that germinate, (2) faster germination times, and (3) reaching the third leaf collar vegetative stage faster; as compared to all of the other treatment groups.

The corn seed treated with the combination of one or more of the 6 non-intergenic remodeled microbes from Table 1 and metalaxyl is expected to reveal a synergistic effect as compared to the other treatment groups.

Example 12: Growth Chamber Assays for Combined Ipconazole and Non-Intergenic Remodeled Microbes in Corn An experiment will be conducted utilizing one or more of the deposited nine microbes described in Table 1 (6 non-intergenic remodeled microbes and 3 WT microbes), in combination with a fungicide, ipconazole. The microbe and ipconazole combination are used to treat corn seed in growth chamber experiments.

Growth chamber experiments are conducted in which corn seed is allowed to germinate under controlled standard growth conditions. The experiment includes: (a) untreated corn seed, (b) corn seed treated with ipconazole, (c) corn seed treated with one or more of the microbes described in Table 1, and (d) corn seed treated with a combination of ipconazole and one or more of the microbes described in Table 1. There will be approximately 100 seeds per treatment.

The corn seed treated with the combination of one or more of the 6 non-intergenic remodeled microbes from Table 1 and ipconazole is expected to exhibit (1) greater numbers of seed that germinate, (2) faster germination times, and (3) reaching the third leaf collar vegetative stage faster; as compared to all of the other treatment groups.

The corn seed treated with the combination of one or more of the 6 non-intergenic remodeled microbes from Table 1 and ipconazole is expected to reveal a synergistic effect as compared to the other treatment groups.

Example 13: Growth Chamber Assays for Combined RAXIL PRO MD and Non-Intergenic Remodeled Microbes in Corn An experiment will be conducted utilizing one or more of the deposited nine microbes described in Table 1 (6 non-intergenic remodeled microbes and 3 WT microbes), in combination with a fungicide, RAXIL PRO MD (3 actives—tebuconazole+prothioconazole+Metalaxyl, and ethoxylated tallow alkyl amines as surfactant). The microbe and RAXIL PRO MD combination are used to treat corn seed in growth chamber experiments.

Growth chamber experiments are conducted in which corn seed is allowed to germinate under controlled standard growth conditions. The experiment includes: (a) untreated corn seed, (b) corn seed treated with RAXIL PRO MD, (c) corn seed treated with one or more of the microbes described in Table 1, and (d) corn seed treated with a combination of RAXIL PRO MD and one or more of the microbes described in Table 1. There will be approximately 100 seeds per treatment.

The corn seed treated with the combination of one or more of the 6 non-intergenic remodeled microbes from Table 1 and RAXIL PRO MD is expected to exhibit (1) greater numbers of seed that germinate, (2) faster germination times, and (3) reaching the third leaf collar vegetative stage faster; as compared to all of the other treatment groups.

The corn seed treated with the combination of one or more of the 6 non-intergenic remodeled microbes from Table 1 and RAXIL PRO MD is expected to reveal a synergistic effect as compared to the other treatment groups.

Example 14: Methods and Assays for Detection of Non-Intergeneric Remodeled Microbes The present disclosure teaches primers, probes, and assays that are useful for detecting the microbes utilized in the various aforementioned Examples. The assays are able to detect the non-natural nucleotide "junction" sequences in the derived/mutant non-intergeneric remodeled microbes. These non-naturally occurring nucleotide junctions can be used as a type of diagnostic that is indicative of the presence of a particular genetic alteration in a microbe.

The present techniques are able to detect these non-naturally occurring nucleotide junctions via the utilization of specialized quantitative PCR methods, including uniquely designed primers and probes. The probes can bind to the non-naturally occurring nucleotide junction sequences. That is, sequence-specific DNA probes consisting of oligonucleotides that are labelled with a fluorescent reporter, which permits detection only after hybridization of the probe with its complementary sequence can be used. The quantitative methods can ensure that only the non-naturally occurring nucleotide junction will be amplified via the taught primers, and consequently can be detected via either a non-specific dye, or via the utilization of a specific hybridization probe. Another aspect of the method is to choose primers such that the primers flank either side of a junction sequence, such that if an amplification reaction occurs, then said junction sequence is present.

Consequently, genomic DNA can be extracted from samples and used to quantify the presence of microbes of the disclosure by using qPCR. The primers utilized in the qPCR reaction can be primers designed by Primer Blast (https://www.ncbi.nlm.nih.gov/tools/primer-blast/) to amplify unique regions of the wild-type genome or unique regions of the engineered non-intergeneric mutant strains. The qPCR reaction can be carried out using the SYBR GreenER qPCR SuperMix Universal (Thermo Fisher P/N 11762100) kit, using only forward and reverse amplification primers; alternatively, the Kapa Probe Force kit (Kapa Biosystems P/N KK4301) can be used with amplification primers and a TaqMan probe containing a FAM dye label at the 5' end, an internal ZEN quencher, and a minor groove binder and fluorescent quencher at the 3' end (Integrated DNA Technologies).

Certain primer, probe, and non-native junction sequences—which can be used in the qPCR methods—are listed in the below Table 30. Specifically, the non-native junction sequences can be found in SEQ ID NOs: 372-405.

TABLE 30

| Microbial Detection | | | | | | | | | | | | |
|---|---|---|---|---|---|---|---|---|---|---|---|---|
| base CI | Junc-tion Name | up/down stream junction | SEQ ID NO | 100 bp upstream of junction | SEQ ID NO | 100 bp downstream of junction | SEQ ID NO | Junction SEQ "/" indicating junction | Junction des. | F primer SEQ | R primer SEQ | Probe SEQ |
| 1021 | ds1131 | up | 304 | TGGTGTCCGGGCGAACGTCGCCAGGTGGCACAAATTGTCAGAACTACGACACGACTAACCGACCGCAGGAGTGTGCGATGACCCTGAATATGATGATGGA | 338 | TTCTTGGTTCTCTGGAGCGCTTTATCGGCATCCTGACTGAAGAATTTGCAGGCTTCTTCCCAACCTGGCTTGCACCCGTGCAGGTAGTTGTGATGAACAT | 372 | 5'-TGGTGTCCGGGCGAACGTCGCCAGGTGGCACAAATTGTCAGAACTACGACACGACTAACCGACCGCAGGAGTGTGCGATGACCCTGAATATGATGATGGA/TTCTTGGTTCTCTGGAGCGCTTTATCGGCATCCTGACTGAAGAATTTGCAGGCTTCTTCCCAACCTGGCTTGCACCCGTGCAGGTAGTTGTGATGAACAT-3' | disrupted nifL gene/PinfC | N/A | N/A | N/A |
| 1021 | ds1131 | down | 305 | CGGAAAACGAGTTCAAACGGCGCGTCCCAATCGTATTAATGGCGAGATTCGCGCCACGGAAGTTCGCTTAACAGGTCTGGAAGGCGAGCAGCTTGGTATT | 339 | GCGATAGAACTCACTTCACGCCCCGAAGGGGGAAGCTGCCTGACCCTACGATTCCCGCTATTTCATTCACTGACCGGAGGTTCAAAATGACCCAGCGAAC | 373 | 5'-CGGAAAACGAGTTCAAACGGCGCGTCCCAATCGTATTAATGGCGAGATTCGCGCCACGGAAGTTCGCTTAACAGGTCTGGAAGGCGAGCAGCTTGGTATT/GCGATAGAACTCACTTCACGCCCCGAAGGGGGAAGCTGCCTGACCCTACGATTCCCGCTATTTCATTCACTGACCGGAGGTTCAAAATGACCCAGCGAAC-3' | PinfC/disrupted nifL gene | N/A | N/A | N/A |
| 1021 | ds1133 | N/A | 306 | CGCCAGAGAGTTGAAATCGAACATTTCCGTAATACCGCCATTACCCAGGAGCCGTTCTGGTTGCACAGCGGAAAACGTTAACGAAAGGATATTTCGCATG | 340 | TCCCTGTGCGCCGCGTCGCCGATGGTGGCCAGCCAACTGGCGCGCTACCCGATCCTGCTCGATGAACTGCTCGACCCGAACACGCTCTATCAACCGACGG | 374 | 5'-CGCCAGAGAGTTGAAATCGAACATTTCCGTAATACCGCCATTACCCAGGAGCCGTTCTGGTTGCACAGCGGAAAACGTTAACGAAAGGATATTTCGCATG/TCCCTGTGCGCCGCGTCGCCGATGGTGGCCAGCCAACTGGCGCGCTACCCGATCCTGCTCGATGAACTGCTCGACCCGAACACGCTCTATCAACCGACGG-3' | 5' UTR and ATG/truncated glnE gene | N/A | N/A | N/A |
| 1021 | ds1145 | up | 307 | CGGGCGAACGTCGCCAGGTGGCACAAATTGTCAGAACTACGACACGACTAACCGACCGCAGGAGTGTGCGATGACCCTGAATATGATGATGGATGCCAGC | 341 | CGTTCTGTAATAATAACCGGACAATTCGGACTGATTAAAAAAGCGCCCTCGCGGCGCTTTTTTTATATTCTCGACTCCATTTAAAATAAAAAATCCAATC | 375 | 5'-CGGGCGAACGTCGCCAGGTGGCACAAATTGTCAGAACTACGACACGACTAACCGACCGCAGGAGTGTGCGATGACCCTGAATATGATGATGGATGCCAGC/CGTTCTGTAATAATAACCGGACAATTCGGACTGATTAAAAAAGCGCCC | disrupted nifL gene/Prm1 | N/A | N/A | N/A |

TABLE 30-continued

| Microbial Detection | | | | | | | | | | | | |
|---|---|---|---|---|---|---|---|---|---|---|---|---|
| base CI | Junction Name | up/down stream junction | SEQ ID NO | 100 bp upstream of junction | SEQ ID NO | 100 bp downstream of junction | SEQ ID NO | Junction SEQ "/" indicating junction | Junction des. | F primer SEQ | R primer SEQ | Probe SEQ |
| | | | | | | | | TCGCGGCGCTTTTTTTATATTCTCGACTCCATTTAAAATAAAAAATCCAATC-3' | | | | |
| 1021 | ds1145 | down | 308 | TCAACCTAAAAAAGTTTGTGTAATACTTGTAACGCTACATGGAGATTAACTCAATCTAGAGGGTATTAATAATGAATCGTACTAAACTGGTACTGGGCGC | 342 | AACTCACTTCACGCCCCGAAGGGGGAAGCTGCCTGACCCTACGATTCCCGCTATTTCATTCACTGACCGGAGGTTCAAAATGACCCAGCGAACCGAGTCG | 376 | 5'-TCAACCTAAAAAAGTTTGTGTAATACTTGTAACGCTACATGGAGATTAACTCAATCTAGAGGGTATTAATAATGAATCGTACTAAACTGGTACTGGGCGC/AACTCACTTCACGCCCCGAAGGGGGAAGCTGCCTGACCCTACGATTCCCGCTATTTCATTCACTGACCGGAGGTTCAAAATGACCCAGCGAACCGAGTCG-3' | Prm1/disrupted nifL gene | N/A | N/A | N/A |
| 1021 | ds1148 | up | 309 | CGGGCGAACGTCGCCAGGTGGCACAAATTGTCAGAACTACGACACGACTAACCGACCGCAGGAGTGTGCGATGACCCTGAATATGATGATGGATGCCAGC | 343 | CGCGTCAGGTTGAACGTAAAAAAGTCGGTCTGCGCAAAGCACGTCGTCGTCCGCAGTTCTCCAAACGTTAATTGGTTTCTGCTTCGGCAGAACGATTGGC | 377 | 5'-CGGGCGAACGTCGCCAGGTGGCACAAATTGTCAGAACTACGACACGACTAACCGACCGCAGGAGTGTGCGATGACCCTGAATATGATGATGGATGCCAGC/CGCGTCAGGTTGAACGTAAAAAAGTCGGTCTGCGCAAAGCACGTCGTCGTCCGCAGTTCTCCAAACGTTAATTGGTTTCTGCTTCGGCAGAACGATTGGC-3' | disrupted nifL gene/Prm7 | N/A | N/A | N/A |
| 1021 | ds1148 | down | 310 | AATTTTCTGCCCAAATGGCTGGGATTGTTCATTTTTTGTTTGCCTTACAACGAGAGTGACAGTACGCGCGGGTAGTTAACTCAACATCTGACCGGTCGAT | 344 | AACTCACTTCACGCCCCGAAGGGGGAAGCTGCCTGACCCTACGATTCCCGCTATTTCATTCACTGACCGGAGGTTCAAAATGACCCAGCGAACCGAGTCG | 378 | 5'-AATTTTCTGCCCAAATGGCTGGGATTGTTCATTTTTTGTTTGCCTTACAACGAGAGTGACAGTACGCGCGGGTAGTTAACTCAACATCTGACCGGTCGAT/AACTCACTTCACGCCCCGAAGGGGGAAGCTGCCTGACCCTACGATTCCCGCTATTTCATTCACTGACCGGAGGTTCAAAATGACCCAGCGAACCGAGTCG-3' | Prm4/disrupted nifL gene | N/A | N/A | N/A |

TABLE 30-continued

| Microbial Detection | | | | | | | | | | | | |
|---|---|---|---|---|---|---|---|---|---|---|---|---|
| base CI | Junc-tion Name | up/down stream junction | SEQ ID NO | 100 bp upstream of junction | SEQ ID NO | 100 bp downstream of junction | SEQ ID NO | Junction SEQ "/" indicating junction | Junction des. | F primer SEQ | R primer SEQ | Probe SEQ |
| CI006 | ds126 | N/A | 311 | GTAACCAATAAAGGCCACCACGCCAGACCACACGATAGTGATGGCAACACTTTCCAGCTGCACCAGCACCTGATGGCCCATGGTCACACCTTCAGCGAAA | 345 | CCGATCCCCATCACTGTGTGTCTTGTATTACAGTGCCGCTTCGTCGGCTTCGCCGGTACGAATACGAATGACGCGTTGCAGCTCAGCAACGAAAATTTTG | 379 | 5'-GTAACCAATAAAGGCCACCACGCCAGACCACACGATAGTGATGGCAACACTTTCCAGCTGCACCAGCACCTGATGGCCCATGGTCACACCTTCAGCGAAA/CCGATCCCCATCACTGTGTGTCTTGTATTACAGTGCCGCTTCGTCGGCTTCGCCGGTACGAATACGAATGACGCGTTGCAGCTCAGCAACGAAAATTTTG-3' | 5' UTR up to ATG-4 bp of amtB gene/disrupted amtB gene | N/A | N/A | N/A |
| CI019 | ds172 | down | 312 | TGGTATTGTCAGTCTGAATGAAGCTCTTGAAAAAGCTGAGGAAGCGGGCGTCGATTTAGTAGAAATCAGTCCGAATGCCGAGCCGCCAGTTTGTCGAATC | 346 | CCGTCTCTGAAGCTCTCGGTGAACATTGTTGCGAGGCAGGATGCGAGCTGGTTGTGTTTTGACATTACCGATAATGTGCCGCGTGAACGGGTGCGTTATG | 380 | 5'-TGGTATTGTCAGTCTGAATGAAGCTCTTGAAAAAGCTGAGGAAGCGGGCGTCGATTTAGTAGAAATCAGTCCGAATGCCGAGCCGCCAGTTTGTCGAATC/CCGTCTCTGAAGCTCTCGGTGAACATTGTTGCGAGGCAGGATGCGAGCTGGTTGTGTTTTGACATTACCGATAATGTGCCGCGTGAACGGGTGCGTTATG-3' | Prm1.2/disrupted nifL gene | SEQ ID NO: 406 CAAGAAGTTCGCCTCACAGG | SEQ ID NO: 407 TGCCTCGCAACAATGTTCAC | N/A |
| CI019 | ds172 | up | 313 | ACCGATCCGCAGGCGCGCATTTGTTATGCCAATCCGGCATTCTGCCGCCAGACGGGTTTTGCACTTGAGACACTTTTGGGCGAGAACCACCGTCTGCTGG | 347 | TGAACATCACTGATGCACAAGCTACCTATGTCGAAGAATTAACTAAAAAACTGCAAGATGCAGGCATTCGCGTTAAAGCCGACTTGAGAAATGAGAAGAT | 381 | 5'-ACCGATCCGCAGGCGCGCATTTGTTATGCCAATCCGGCATTCTGCCGCCAGACGGGTTTTGCACTTGAGACACTTTTGGGCGAGAACCACCGTCTGCTGG/TGAACATCACTGATGCACAAGCTACCTATGTCGAAGAATTAACTAAAAAACTGCAAGATGCAGGCATTCGCGTTAAAGCCGACTTGAGAAATGAGAAGAT-3' | disrupted nifL gene/Prm1.2 | N/A | N/A | N/A |
| CI019 | ds175 | down | 314 | CGGGAACCGGTGTTATAATGCCGCGCCCTCATATTGTGGGGATTTCTTAATGACCTATCCTGGGTCCTAAAGTTGTAGTTGACATTAGCGGAGCACTAAC | 348 | CCGTCTCTGAAGCTCTCGGTGAACATTGTTGCGAGGCAGGATGCGAGCTGGTTGTGTTTTGACATTACCGATAATGTGCCGCGTGAACGGGTGCGTTATG | 382 | 5'-CGGGAACCGGTGTTATAATGCCGCGCCCTCATATTGTGGGGATTTCTTAATGACCTATCCTGGGTCCTAAAGTTGTAGTTGACATTAGCGGAGCACTAAC/CCGTCTCTGAAGCTCTCGGTGAACATTGTTGCGAGG | Prm3.1/disrupted nifL gene | SEQ ID NO: 408 CGCCCTCATATTGTGGGGAT | SEQ ID NO: 409 GGCATAACGCACCCGTTCA | SEQ ID NO: 410 /56-FAM/TAACCCGTC/ZEN/TCTGAAG |

TABLE 30-continued

| Microbial Detection | | | | | | | | | | | | | |
|---|---|---|---|---|---|---|---|---|---|---|---|---|---|
| base CI | Junction Name | up/down stream junction | SEQ ID NO | 100 bp upstream of junction | SEQ ID NO | 100 bp downstream of junction | SEQ ID NO | Junction SEQ "/" indicating junction | Junction des. | F primer SEQ | R primer SEQ | Probe SEQ |
| | | | | | | | | CAGGATGCGAGCTGGTTGTGTTTTGACATTACCGATAATGTGCCGCGTGAACGGGTGCGTTATG-3' | | | | CTCTCGGT/3IABkFQ/ |
| CI019 | ds175 | up | 315 | ACCGATCCGCAGGCGCGCATTTGTTATGCCAATCCGGCATTCTGCCGCCAGACGGGTTTTGCACTTGAGACACTTTTGGGCGAGAACCACCGTCTGCTGG | 349 | TACAGTAGCGCCTCTCAAAAATAGATAAACGGCTCATGTACGTGGGCCGTTTATTTTTTCTACCCATAATCGGGAACCGGTGTTATAATGCCGCGCCCTC | 383 | 5'-ACCGATCCGCAGGCGCGCATTTGTTATGCCAATCCGGCATTCTGCCGCCAGACGGGTTTTGCACTTGAGACACTTTTGGGCGAGAACCACCGTCTGCTGG/TACAGTAGCGCCTCTCAAAAATAGATAAACGGCTCATGTACGTGGGCCGTTTATTTTTTCTACCCATAATCGGGAACCGGTGTTATAATGCCGCGCCCTC-3' | disrupted nifL gene/Prm3.1 | N/A | N/A | N/A |
| CI006 | ds20 | down | 316 | TCAACCTAAAAAAGTTTGTGTAATACTTGTAACGCTACATGGAGATTAACTCAATCTAGAGGGTATTAATAATGAATCGTACTAAACTGGTACTGGGCGC | 350 | AACTCACTTCACACCCCGAAGGGGGAAGTTGCCTGACCCTACGATTCCCGCTATTTCATTCACTGACCGGAGGTTCAAAATGACCCAGCGAACCGAGTCG | 384 | 5'-TCAACCTAAAAAAGTTTGTGTAATACTTGTAACGCTACATGGAGATTAACTCAATCTAGAGGGTATTAATAATGAATCGTACTAAACTGGTACTGGGCGC/AACTCACTTCACACCCCGAAGGGGGAAGTTGCCTGACCCTACGATTCCCGCTATTTCATTCACTGACCGGAGGTTCAAAATGACCCAGCGAACCGAGTCG-3' | Prm1/disrupted nifL gene | SEQ ID NO: 411 TAAACTGGTACTGGGCGCAACT | SEQ ID NO: 412 CAAATCGAAGCGCCAGACGGTAT | SEQ ID NO: 413 /56-FAM/AAGTTGCCT/ZEN/GACCCTACGATTCCC/3IABkFQ/ |
| CI006 | ds20 | up | 317 | GGGCGACAAACGGCCTGGTGGCACAAATTGTCAGAACTACGACACGACTAACTGACCGCAGGAGTGTGCGATGACCCTGAATATGATGATGGATGCCGGC | 351 | CGTCCTGTAATAATAACCGGACAATTCGGACTGATTAAAAAAGCGCCCTTGTGGCGCTTTTTTTATATTCCCGCCTCCATTTAAAATAAAAAATCCAATC | 385 | 5'-GGGCGACAAACGGCCTGGTGGCACAAATTGTCAGAACTACGACACGACTAACTGACCGCAGGAGTGTGCGATGACCCTGAATATGATGATGGATGCCGGC/CGTCCTGTAATAATAACCGGACAATTCGGACTGATTAAAAAAGCGCCCTTGTGGCGCTTTTTTTATATTCCCGCCTCCATTTAAAATAAAAAATCCAATC-3' | disrupted nifL gene/Prm1 | N/A | N/A | N/A |

TABLE 30-continued

| Microbial Detection | | | | | | | | | | | | |
|---|---|---|---|---|---|---|---|---|---|---|---|---|
| base CI | Junc-tion Name | up/down stream junction | SEQ ID NO | 100 bp upstream of junction | SEQ ID NO | 100 bp downstream of junction | SEQ ID NO | Junction SEQ "/" indicating junction | Junction des. | F primer SEQ | R primer SEQ | Probe SEQ |
| CI006 | ds24 | up | 318 | GGGCGACAAACGGCCTGGTGGCACAAATTGTCAGAACTACGACACGACTAACTGACCGCAGGAGTGTGCGATGACCCTGAATATGATGATGGATGCCGGC | 352 | GGACATCATCGCGACAAACAATATTAATACCGGCAACCACACCGGCAATTTACGAGACTGCGCAGGCATCCTTTCTCCCGTCAATTTCTGTCAAATAAAG | 386 | 5'-GGGCGACAAACGGCCTGGTGGCACAAATTGTCAGAACTACGACACGACTAACTGACCGCAGGAGTGTGCGATGACCCTGAATATGATGATGGATGCCGGC/GGACATCATCGCGACAAACAATATTAATACCGGCAACCACACCGGCAATTTACGAGACTGCGCAGGCATCCTTTCTCCCGTCAATTTCTGTCAAATAAAG-3' | disrupted nifL gene/Prm5 | SEQ ID NO: 414 GGTGCACTCTTTGCATGGTT | SEQ ID NO: 415 GCGCAGTCTCGTAAATTGCC | SEQ ID NO: 416 /56-FAM/CAGGAGTGT/ZEN/GCGATGACCCTGAAT/3IABkFQ |
| CI006 | ds24 | down | 319 | TAAGAATTATCTGGATGAATGTGCCATTAAATGCGCAGCATAATGGTGCGTTGTGCGGGAAAACTGCTTTTTTTGAAAGGGTTGGTCAGTAGCGGAAAC | 353 | AACTCACTTCACACCCCGAAGGGGGAAGTTGCCTGACCCTACGATTCCCGCTATTTCATTCACTGACCGGAGGTTCAAAATGACCCAGCGAACCGAGTCG | 387 | 5'-TAAGAATTATCTGGATGAATGTGCCATTAAATGCGCAGCATAATGGTGCGTTGTGCGGGAAAACTGCTTTTTTTGAAAGGGTTGGTCAGTAGCGGAAAC/AACTCACTTCACACCCCGAAGGGGGAAGTTGCCTGACCCTACGATTCCCGCTATTTCATTCACTGACCGGAGGTTCAAAATGACCCAGCGAACCGAGTCG-3' | Prm5/disrupted nifL gene | N/A | N/A | N/A |
| CI006 | ds30 | N/A | 320 | CGCCAGAGAGTCGAAATCGAACATTTCCGTAATACCGCGATTACCCAGGAGCCGTTCTGGTTGCACAGCGGAAAACGTTAACGAAAGGATATTTCGCATG | 354 | TTTAACGATCTGATTGGCGATGATGAAACGGATTCGCCGGAAGATGCGCTTTCTGAGAGCTGGCGCGAATTGTGGCAGGATGCGTTGCAGGAGGAGGATT | 388 | 5'-CGCCAGAGAGTCGAAATCGAACATTTCCGTAATACCGCGATTACCCAGGAGCCGTTCTGGTTGCACAGCGGAAAACGTTAACGAAAGGATATTTCGCATG/TTTAACGATCTGATTGGCGATGATGAAACGGATTCGCCGGAAGATGCGCTTTCTGAGAGCTGGCGCGAATTGTGGCAGGATGCGTTGCAGGAGGAGGATT-3' | 5' UTR and ATG/truncated glnE gene | N/A | N/A | N/A |
| CI006 | ds31 | N/A | 321 | CGCCAGAGAGTCGAAATCGAACATTTCCGTAATACCGCGATTACCCAGGAGCCGTTCTGGTTGCACAGCGGAAAACGTTAACGAAAGGATATTTCGCATG | 355 | GCACTGAAACACCTCATTTCCCTGTGTGCCGCGTCGCCGATGGTTGCCAGTCAGCTGGCGCGCTACCCGATCCTGCTTGATGAATTGCTCGACCCGAATA | 389 | 5'-CGCCAGAGAGTCGAAATCGAACATTTCCGTAATACCGCGATTACCCAGGAGCCGTTCTGGTTGCACAGCGGAAAACGTTAACGAAAGGATATTTCGCATG/GCACTGAAACACCTCATTTCCCTGTGTGCCGCGTCGC | 5' UTR and ATG/truncated glnE gene | N/A | N/A | N/A |

TABLE 30-continued

| Microbial Detection | | | | | | | | | | | | |
|---|---|---|---|---|---|---|---|---|---|---|---|---|
| base CI | Junction Name | up/down stream junction | SEQ ID NO | 100 bp upstream of junction | SEQ ID NO | 100 bp downstream of junction | SEQ ID NO | Junction SEQ "/" indicating junction | Junction des. | F primer SEQ | R primer SEQ | Probe SEQ |
| | | | | | | | | CGATGGTTGCCA GTCAGCTGGCGC GCTACCCGATCC TGCTTGATGAATT GCTCGACCCGAA TA-3' | | | | |
| CI019 | ds34 | N/A | 322 | GATGATGGATGC TTTCTGGTTAAAC GGGCAACCTCGT TAACTGACTGACT AGCCTGGGCAAA CTGCCCGGGCTTT TTTTTGCAAGGAA TCTGATTTCATG | 356 | GCGCTCAAACAG TTAATCCGTCTGT GTGCCGCCTCGC CGATGGTCGCGA CACAACTTGCAC GTCATCCTTTATT GCTCGATGAACT GCTCGACCCGCG CA | 390 | 5'- GATGATGGATGC TTTCTGGTTAAAC GGGCAACCTCGT TAACTGACTGAC TAGCCTGGGCAA ACTGCCCGGGCT TTTTTTTGCAAGG AATCTGATTTCAT G/ GCGCTCAAACAG TTAATCCGTCTGT GTGCCGCCTCGC CGATGGTCGCGA CACAACTTGCAC GTCATCCTTTATT GCTCGATGAACT GCTCGACCCGCG CA-3' | 5' UTR and ATG/ truncated glnE gene | N/A | N/A | N/A |
| CI019 | ds70 | up | 323 | ACCGATCCGCAG GCGCGCATTTGTT ATGCCAATCCGG CATTCTGCCGCCA GACGGGTTTTGC ACTTGAGACACTT TTGGGCGAGAAC CACCGTCTGCTGG | 357 | AGTCTGAACTCA TCCTGCGGCAGT CGGTGAGACGTA TTTTTGACCAAAG AGTGATCTACAT CACGGAATTTTGT GGTTGTTGCTGCT TAAAAGGGCAAA T | 391 | 5'- ACCGATCCGCAG GCGCGCATTTGTT ATGCCAATCCGG CATTCTGCCGCC AGACGGGTTTTG CACTTGAGACAC TTTTGGGCGAGA ACCACCGTCTGC TGG/ AGTCTGAACTCA TCCTGCGGCAGT CGGTGAGACGTA TTTTTGACCAAA GAGTGATCTACA TCACGGAATTTT GTGGTTGTTGCTG CTTAAAAGGGCA AAT-3' | disrupted nifL gene/ Prm4 | N/A | N/A | N/A |
| CI019 | ds70 | down | 324 | CATCGGACACCA CCAGCTTACAAA TTGCCTGATTGCG GCCCCGATGGCC GGTATCACTGAC CGACCATTTCGTG CCTTATGTCATGC GATGGGGGCTGG G | 358 | CCGTCTCTGAAG CTCTCGGTGAAC ATTGTTGCGAGG CAGGATGCGAGC TGGTTGTGTTTTG ACATTACCGATA ATGTGCCGCGTG AACGGGTGCGTT ATG | 392 | 5'- CATCGGACACCA CCAGCTTACAAA TTGCCTGATTGCG GCCCCGATGGCC GGTATCACTGAC CGACCATTTCGT GCCTTATGTCATG CGATGGGGGCTG GG/ CCGTCTCTGAAG CTCTCGGTGAAC ATTGTTGCGAGG CAGGATGCGAGC TGGTTGTGTTTTG ACATTACCGATA ATGTGCCGCGTG AACGGGTGCGTT ATG-3' | Prm4/ disrupted nifL gene | N/A | N/A | N/A |

TABLE 30-continued

| Microbial Detection | | | | | | | | | | | | |
|---|---|---|---|---|---|---|---|---|---|---|---|---|
| base CI | Junc-tion Name | up/down stream junction | SEQ ID NO | 100 bp upstream of junction | SEQ ID NO | 100 bp downstream of junction | SEQ ID NO | Junction SEQ "/" indicating junction | Junction des. | F primer SEQ | R primer SEQ | Probe SEQ |
| 137 | ds799 | down | 325 | TCTTCAACAACTGGAGGAATAAGGTATTAAAGGCGGAAAACGAGTTCAAACGGCACGTCCGAATCGTATCAATGGCGAGATTCGCGCCCTGGAAGTTCGC | 359 | GCCATTGAGCTGGCTTCCCGACCGCAGGGCGGCACCTGCCTGACCCTGCGTTTCCCGCTGTTTAACACCCTGACCGGAGGTGAAGCATGATCCCTGAATC | 393 | 5'-TCTTCAACAACTGGAGGAATAAGGTATTAAAGGCGGAAAACGAGTTCAAACGGCACGTCCGAATCGTATCAATGGCGAGATTCGCGCCCTGGAAGTTCGC/GCCATTGAGCTGGCTTCCCGACCGCAGGGCGGCACCTGCCTGACCCTGCGTTTCCCGCTGTTTAACACCCTGACCGGAGGTGAAGCATGATCCCTGAATC-3' | PinfC/ disrupted nifL gene | SEQ ID NO: 417 CTCGGCAGCATGGACGTAA | SEQ ID NO: 418 AGGGTGTTAAACAGCGGGAAA | SEQ ID NO: 419 /56-FAM/AACGGCACG/ZEN/TCCGAATCGTATCAA/3IABkFQ/ |
| 137 | ds799 | up | 326 | TCCGGGTTCGGCTTACCCCGCCGCGTTTTGCGCACGGTGTCGGACAATTTGTCATAACTGCGACACAGGAGTTTGCGATGACCCTGAATATGATGCTCGA | 360 | AGCGTCAGGTACCGGTCATGATTCACCGTGCGATTCTCGGTTCCCTGGAGCGCTTCATTGGCATCCTGACCGAAGAGTTCGCTGGCTTCTTCCCAACCTG | 394 | 5'-TCCGGGTTCGGCTTACCCCGCCGCGTTTTGCGCACGGTGTCGGACAATTTGTCATAACTGCGACACAGGAGTTTGCGATGACCCTGAATATGATGCTCGA/AGCGTCAGGTACCGGTCATGATTCACCGTGCGATTCTCGGTTCCCTGGAGCGCTTCATTGGCATCCTGACCGAAGAGTTCGCTGGCTTCTTCCCAACCTG-3' | disrupted nifL gene/ PinfC | N/A | N/A | N/A |
| 137 | ds809 | N/A | 327 | ATCGCAGCGTCTTTGAATATTTCCGTCGCCAGGCGCTGGCTGCCGAGCCGTTCTGGCTGCATAGTGGAAAACGATAATTTCAGGCCAGGGAGCCCTTATG | 361 | GCGCTGAAGCACCTGATCACGCTCTGCGCGGCGTCGCCGATGGTCGCCAGCCAGCTGGCGCGCCACCCGCTGCTGCTGGATGAGCTGCTGGATCCCAACA | 395 | 5'-ATCGCAGCGTCTTTGAATATTTCCGTCGCCAGGCGCTGGCTGCCGAGCCGTTCTGGCTGCATAGTGGAAAACGATAATTTCAGGCCAGGGAGCCCTTATG/GCGCTGAAGCACCTGATCACGCTCTGCGCGGCGTCGCCGATGGTCGCCAGCCAGCTGGCGCGCCACCCGCTGCTGCTGGATGAGCTGCTGGATCCCAACA-3' | 5' UTR and ATG/ truncated glnE gene | SEQ ID NO: 420 GAGCCGTTCTGGCTGCATAG | SEQ ID NO: 421 GCCGTCGGCTGATAGAGG | SEQ ID NO: 422 /56-FAM/TTATGGCGC/ZEN/TGAAGCACCTGATCA/3IABkFQ/ |
| 137 | ds843 | up | 328 | TCCGGGTTCGGCTTACCCCGCCGCGTTTTGCGCACGGTGTCGGACAATTTGTCATAACTGCGACACAGGAGTTTGCGATGACCCTGAATATGATGCTCGA | 362 | GCCCGCTGACCGACCAGAACTTCCACCTTGGACTCGGCTATACCCTTGGCGTGACGGCGCGCGATAACTGGGACTACATCCCCATTCCGGTGATCTTACC | 396 | 5'-TCCGGGTTCGGCTTACCCCGCCGCGTTTTGCGCACGGTGTCGGACAATTTGTCATAACTGCGACACAGGAGTTTGCGATGACCCTGAATATGATGCTCGA/GCCCGCTGACCGACCAGAACTTCCACCTTGGACTCG | disrupted nifL gene/ Prm1.2 | N/A | N/A | N/A |

TABLE 30-continued

| Microbial Detection | | | | | | | | | | | | | |
|---|---|---|---|---|---|---|---|---|---|---|---|---|---|
| base CI | Junction Name | up/down stream junction | SEQ ID NO | 100 bp upstream of junction | SEQ ID NO | 100 bp downstream of junction | SEQ ID NO | Junction SEQ "/" indicating junction | Junction des. | F primer SEQ | R primer SEQ | Probe SEQ |
| | | | | | | | | GCTATACCCTTGGCGTGACGGCGCGCGATAACTGGGACTACATCCCCATTCCGGTGATCTTACC-3' | | | | |
| 137 | ds843 | down | 329 | TCACTTTTTAGCAAAGTTGCACTGGACAAAAGGTACCACAATTGGTGTACTGATACTCGACACAGCATTAGTGTCGATTTTTCATATAAAGGTAATTTTG | 363 | GCCATTGAGCTGGCTTCCCGACCGCAGGGCGGCACCTGCCTGACCCTGCGTTTCCCGCTGTTTAACACCCTGACCGGAGGTGAAGCATGATCCCTGAATC | 397 | 5'-TCACTTTTTAGCAAAGTTGCACTGGACAAAAGGTACCACAATTGGTGTACTGATACTCGACACAGCATTAGTGTCGATTTTTCATATAAAGGTAATTTTG/GCCATTGAGCTGGCTTCCCGACCGCAGGGCGGCACCTGCCTGACCCTGCGTTTCCCGCTGTTTAACACCCTGACCGGAGGTGAAGCATGATCCCTGAATC-3' | Prm1.2/ disrupted nifL gene | N/A | N/A | N/A |
| 137 | ds853 | up | 330 | TCCGGGTTCGGCTTACCCCGCCGCGTTTTGCGCACGGTGTCGGACAATTTGTCATAACTGCGACACAGGAGTTTGCGATGACCCTGAATATGATGCTCGA | 364 | GCTAAAGTTCTCGGCTAATCGCTGATAACATTTGACGCAATGCGCAATAAAAGGGCATCATTTGATGCCCTTTTTGCACGCTTTCATACCAGAACCTGGC | 398 | 5'-TCCGGGTTCGGCTTACCCCGCCGCGTTTTGCGCACGGTGTCGGACAATTTGTCATAACTGCGACACAGGAGTTTGCGATGACCCTGAATATGATGCTCGA/GCTAAAGTTCTCGGCTAATCGCTGATAACATTTGACGCAATGCGCAATAAAAGGGCATCATTTGATGCCCTTTTTGCACGCTTTCATACCAGAACCTGGC-3' | disrupted nifL gene/ Prm6.2 | N/A | N/A | N/A |
| 137 | ds853 | down | 331 | GTTCTCCTTTGCAATAGCAGGGAAGAGGCGCCAGAACCGCCAGCGTTGAAGCAGTTTGAACGCGTTCAGTGTATAATCCGAAACTTAATTTCGGTTTGGA | 365 | GCCATTGAGCTGGCTTCCCGACCGCAGGGCGGCACCTGCCTGACCCTGCGTTTCCCGCTGTTTAACACCCTGACCGGAGGTGAAGCATGATCCCTGAATC | 399 | 5'-GTTCTCCTTTGCAATAGCAGGGAAGAGGCGCCAGAACCGCCAGCGTTGAAGCAGTTTGAACGCGTTCAGTGTATAATCCGAAACTTAATTTCGGTTTGGA/GCCATTGAGCTGGCTTCCCGACCGCAGGGCGGCACCTGCCTGACCCTGCGTTTCCCGCTGTTTAACACCCTGACCGGAGGTGAAGCATGATCCCTGAATC-3' | Prm6.2/ disrupted nifL gene | N/A | N/A | N/A |

TABLE 30-continued

| Microbial Detection | | | | | | | | | | | | |
|---|---|---|---|---|---|---|---|---|---|---|---|---|
| base CI | Junction Name | up/down stream junction | SEQ ID NO | 100 bp upstream of junction | SEQ ID NO | 100 bp downstream of junction | SEQ ID NO | Junction SEQ "/" indicating junction | Junction des. | F primer SEQ | R primer SEQ | Probe SEQ |
| 137 | ds857 | up | 332 | TCCGGGTTCGGCTTACCCCGCCGCGTTTTGCGCACGGTGTCGGACAATTTGTCATAACTGCGACACAGGAGTTTGCGATGACCCTGAATATGATGCTCGA | 366 | CGCCGTCCTCGCAGTACCATTGCAACCGACTTTACAGCAAGAAGTGATTCTGGCACGCATGGAACAAATTCTTGCCAGTCGGGCTTTATCCGATGACGAA | 400 | 5'-TCCGGGTTCGGCTTACCCCGCCGCGTTTTGCGCACGGTGTCGGACAATTTGTCATAACTGCGACACAGGAGTTTGCGATGACCCTGAATATGATGCTCGA/CGCCGTCCTCGCAGTACCATTGCAACCGACTTTACAGCAAGAAGTGATTCTGGCACGCATGGAACAAATTCTTGCCAGTCGGGCTTTATCCGATGACGAA-3' | disrupted nifL gene/Prm8.2 | N/A | N/A | N/A |
| 137 | ds857 | down | 333 | GATATGCCTGAAGTATTCAATTACTTAGGCATTTACTTAACGCAGGCAGGCAATTTTGATGCTGCCTATGAAGCGTTTGATTCTGTACTTGAGCTTGATC | 367 | GCCATTGAGCTGGCTTCCCGACCGCAGGGCGGCACCTGCCTGACCCTGCGTTTCCCGCTGTTTAACACCCTGACCGGAGGTGAAGCATGATCCCTGAATC | 401 | 5'-GATATGCCTGAAGTATTCAATTACTTAGGCATTTACTTAACGCAGGCAGGCAATTTTGATGCTGCCTATGAAGCGTTTGATTCTGTACTTGAGCTTGATC/GCCATTGAGCTGGCTTCCCGACCGCAGGGCGGCACCTGCCTGACCCTGCGTTTCCCGCTGTTTAACACCCTGACCGGAGGTGAAGCATGATCCCTGAATC-3' | Prm8.2/disrupted nifL gene | N/A | N/A | N/A |
| 63 | ds908 | down | 334 | TGGTATTGTCAGTCTGAATGAAGCTCTTGAAAAAGCTGAGGAAGCGGGCGTCGATTTAGTAGAAATCAGTCCGAATGCCGAGCCGCCAGTTTGTCGAATC | 368 | TCTTTAGATCTCTCGGTCCGCCCTGATGGCGGCACCTTGCTGACGTTACGCCTGCCGGTACAGCAGGTTATCACCGGAGGCTTAAAATGACCCAGTTACC | 402 | 5'-TGGTATTGTCAGTCTGAATGAAGCTCTTGAAAAAGCTGAGGAAGCGGGCGTCGATTTAGTAGAAATCAGTCCGAATGCCGAGCCGCCAGTTTGTCGAATC/TCTTTAGATCTCTCGGTCCGCCCTGATGGCGGCACCTTGCTGACGTTACGCCTGCCGGTACAGCAGGTTATCACCGGAGGCTTAAAATGACCCAGTTACC-3' | PinfC/disrupted nifL gene | SEQ ID NO: 423 GGAAAACGAGTTCAACCGGC | SEQ ID NO: 424 GGGCGGACCGAGAGATCTAA | N/A |
| 63 | ds908 | up | 335 | TGCAAATTGCACGGTTATTCCGGGTGAGTATATGTGTGATTTGGGTTCCGGCATTGCGCAATAAAGGGGAGAAAGACATGAGCATCACGGCGTTATCAGC | 369 | TGAATATCACTGACTCACAAGCTACCTATGTCGAAGAATTAACTAAAAAACTGCAAGATGCAGGCATTCGCGTTAAAGCCGACTTGAGAAATGAGAAGAT | 403 | 5'-TGCAAATTGCACGGTTATTCCGGGTGAGTATATGTGTGATTTGGGTTCCGGCATTGCGCAATAAAGGGGAGAAAGACATGAGCATCACGGCGTTATCAGC/TGAATATCACTGACTCACAAGCTACCTATGTCGAAGAATTAACTAAAA | disrupted nifL gene/PinfC | N/A | N/A | N/A |

TABLE 30-continued

| Microbial Detection | | | | | | | | | | | | |
|---|---|---|---|---|---|---|---|---|---|---|---|---|
| base CI | Junc-tion Name | up/down stream junction | SEQ ID NO | 100 bp upstream of junction | SEQ ID NO | 100 bp downstream of junction | SEQ ID NO | Junction SEQ "/" indicating junction | Junction des. | F primer SEQ | R primer SEQ | Probe SEQ |
| | | | | | | | | AACTGCAAGATGCAGGCATTCGCGTTAAAGCCGACTTGAGAAATGAGAAGAT-3' | | | | |
| 910 | ds960 | up | 336 | TCAGGGCTGCGGATGTCGGGCGTTTCACAACACAAAATGTTGTAAATGCGACACAGCCGGGCCTGAAACCAGGAGCGTGTGATGACCTTTAATATGATGC | 370 | CTGGGGTCACTGGAGCGCTTTATCGGCATCCTGACCGAAGAATTTGCCGGTTTCTTCCCGACCTGGCTGGCCCCTGTTCAGGTTGTGGTGATGAATATCA | 404 | 5'-TCAGGGCTGCGGATGTCGGGCGTTTCACAACACAAAATGTTGTAAATGCGACACAGCCGGGCCTGAAACCAGGAGCGTGTGATGACCTTTAATATGATGC/CTGGGGTCACTGGAGCGCTTTATCGGCATCCTGACCGAAGAATTTGCCGGTTTCTTCCCGACCTGGCTGGCCCCTGTTCAGGTTGTGGTGATGAATATCA-3' | disrupted nifL gene/PinfC | N/A | N/A | N/A |
| 910 | ds960 | down | 337 | CGGAAAACGAGTTCAAACGGCACGTCCGAATCGTATCAATGGCGAGATTCGCGCCCAGGAAGTTCGCTTAACTGGTCTGGAAGGTGAGCAGCTGGGTATT | 371 | GCAATAGAACTAACTACCCGCCCTGAAGGCGGTACCTGCCTGACCCTGCGATTCCCGTTATTTCATTCACTGACCGGAGGCCCACGATGACCCAGCGACC | 405 | 5'-CGGAAAACGAGTTCAAACGGCACGTCCGAATCGTATCAATGGCGAGATTCGCGCCCAGGAAGTTCGCTTAACTGGTCTGGAAGGTGAGCAGCTGGGTATT/GCAATAGAACTAACTACCCGCCCTGAAGGCGGTACCTGCCTGACCCTGCGATTCCCGTTATTTCATTCACTGACCGGAGGCCCACGATGACCCAGCGACC-3' | PinfC/disrupted nifL gene | N/A | N/A | N/A |

TABLE 31

| Remodeled Non-intergeneric Microbes | | |
|---|---|---|
| Strain Name | Genotype | SEQ ID NO |
| CI006 | 16S rDNA - contig 5 | 62 |
| CI006 | 16S rDNA - contig 8 | 63 |
| CI019 | 16S rDNA | 64 |
| CI006 | nifH | 65 |
| CI006 | nifD | 66 |
| CI006 | nifK | 67 |
| CI006 | nifL | 68 |
| CI006 | nifA | 69 |
| CI019 | nifH | 70 |
| CI019 | nifD | 71 |
| CI019 | nifK | 72 |
| CI019 | nifL | 73 |
| CI019 | nifA | 74 |
| CI006 | Prm5 with 500 bp flanking regions | 75 |
| CI006 | nifLA operon - upstream intergenic region plus nifL and nifA CDSs | 76 |

TABLE 31-continued

| Remodeled Non-intergeneric Microbes | | |
|---|---|---|
| Strain Name | Genotype | SEQ ID NO |
| CI006 | nifL (Amino Acid) | 77 |
| CI006 | nifA (Amino Acid) | 78 |
| CI006 | glnE | 79 |
| CI006 | glnE_KO1 | 80 |
| CI006 | glnE (Amino Acid) | 81 |
| CI006 | glnE_KO1 (Amino Acid) | 82 |
| CI006 | GlnE ATase domain (Amino Acid) | 83 |
| CM029 | Prm5 inserted into nifL region | 84 |

TABLE 32

| Remodeled Non-intergeneric Microbes | | | | | |
|---|---|---|---|---|---|
| Strain | Strain ID | SEQ ID NO | Genotype | Description | Associated Novel Junction If Applicable |
| CI63; CI063 | 63 | SEQ ID NO 85 | 16S | N/A | N/A |
| CI63; CI063 | 63 | SEQ ID NO 86 | nifH | N/A | N/A |
| CI63; CI063 | 63 | SEQ ID NO 87 | nifD1 | 1 of 2 unique genes annotated as nifD in 63 genome | N/A |
| CI63; CI063 | 63 | SEQ ID NO 88 | nifD2 | 2 of 2 unique genes annotated as nifD in 63 genome | N/A |
| CI63; CI063 | 63 | SEQ ID NO 89 | nifK1 | 1 of 2 unique genes annotated as nifK in 63 genome | N/A |
| CI63; CI063 | 63 | SEQ ID NO 90 | nifK2 | 2 of 2 unique genes annotated as nifK in 63 genome | N/A |
| CI63; CI063 | 63 | SEQ ID NO 91 | nifL | N/A | N/A |
| CI63; CI063 | 63 | SEQ ID NO 92 | nifA | N/A | N/A |
| CI63; CI063 | 63 | SEQ ID NO 93 | glnE | N/A | N/A |
| CI63; CI063 | 63 | SEQ ID NO 94 | amt13 | N/A | N/A |
| CI63; CI063 | 63 | SEQ ID NO 95 | PinfC | 500 bp immediately upstrea of the ATG start codon of the infC gene | N/A |
| CI137 | 137 | SEQ ID NO 96 | 16S | N/A | N/A |
| CI137 | 137 | SEQ ID NO 97 | nifH1 | 1 of 2 unique genes annotated as nifH in 137 genome | N/A |
| CI137 | 137 | SEQ ID NO 98 | nifH2 | 2 of 2 unique genes annotated as nifH in 137 genome | N/A |
| CI137 | 137 | SEQ ID NO 99 | nifD1 | 1 of 2 unique genes annotated as nifD in 137 genome | N/A |
| CI137 | 137 | SEQ ID NO 100 | nifD2 | 2 of 2 unique genes annotated as nifD in 137 genome | N/A |
| CI137 | 137 | SEQ ID NO 101 | nifK1 | 1 of 2 unique genes annotated as nifK in 137 genome | N/A |
| CI137 | 137 | SEQ ID NO 102 | nifK2 | 2 of 2 unique genes annotated as nifK in 137 genome | N/A |
| CI137 | 137 | SEQ ID NO 103 | nifL | N/A | N/A |
| CI137 | 137 | SEQ ID NO 104 | nifA | N/A | N/A |
| CI137 | 137 | SEQ ID NO 105 | glnE | N/A | N/A |
| CI137 | 137 | SEQ ID NO 106 | PinfC | 500 bp immediately upstream of the TTG start codon of infC | N/A |
| CI137 | 137 | SEQ ID NO 107 | amtB | N/A | N/A |
| CI137 | 137 | SEQ ID NO 108 | Prm8.2 | internal promoter located in nlpI gene; 299 bp starting at 81 bp after the A of the ATG of the nlpI gene | N/A |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| CI137 | 137 | SEQ ID NO 109 | Prm6.2 | 300 bp upstream of the secE gene starting at 57 bp upstream of the A of the ATG of secE | N/A |
| CI137 | 137 | SEQ ID NO 110 | Prm1.2 | 400 bp immediately upstream of the ATG of cspE gene | N/A |
| none | 728 | SEQ ID NO 111 | 16S | N/A | N/A |
| none | 728 | SEQ ID NO 112 | nifH | N/A | N/A |
| none | 728 | SEQ ID NO 113 | nifD1 | 1 of 2 unique genes annotated as nifD in 728 genome | N/A |
| none | 728 | SEQ ID NO 114 | nifD2 | 2 of 2 unique genes annotated as nifD in 728 genome | N/A |
| none | 728 | SEQ ID NO 115 | nifK1 | 1 of 2 unique genes annotated as nifK in 728 genome | N/A |
| none | 728 | SEQ ID NO 116 | nifK2 | 2 of 2 unique genes annotated as nifK in 728 genome | N/A |
| none | 728 | SEQ ID NO 117 | nifL | N/A | N/A |
| none | 728 | SEQ ID NO 118 | nifA | N/A | N/A |
| none | 728 | SEQ ID NO 119 | glnE | N/A | N/A |
| none | 728 | SEQ ID NO 120 | amt13 | N/A | N/A |
| none | 850 | SEQ ID NO 121 | 16S | N/A | N/A |
| none | 852 | SEQ ID NO 122 | 16S | N/A | N/A |
| none | 853 | SEQ ID NO 123 | 16S | N/A | N/A |
| none | 910 | SEQ ID NO 124 | 16S | N/A | N/A |
| none | 910 | SEQ ID NO 125 | nifH | N/A | N/A |
| none | 910 | SEQ ID NO 126 | Dinitrogenase iron-molybdenum cofactor CDS | N/A | N/A |
| none | 910 | SEQ ID NO 127 | nifD1 | N/A | N/A |
| none | 910 | SEQ ID NO 128 | nifD2 | N/A | N/A |
| none | 910 | SEQ ID NO 129 | nifK1 | N/A | N/A |
| none | 910 | SEQ ID NO 130 | nifK2 | N/A | N/A |
| none | 910 | SEQ ID NO 131 | nifL | N/A | N/A |
| none | 910 | SEQ ID NO 132 | nifA | N/A | N/A |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| none | 910 | SEQ ID NO 133 | glnE | N/A | N/A |
| none | 910 | SEQ ID NO 134 | amt13 | N/A | N/A |
| none | 910 | SEQ ID NO 135 | PinfC | 498 bp immediately upstream of the ATG of the infC gene | N/A |
| none | 1021 | SEQ ID NO 136 | 16S | N/A | N/A |
| none | 1021 | SEQ ID NO 137 | nifH | N/A | N/A |
| none | 1021 | SEQ ID NO 138 | nifD1 | 1 of 2 unique genes annotated as nifD in 910 genome | N/A |
| none | 1021 | SEQ ID NO 139 | nifD2 | 2 of 2 unique genes annotated as nifD in 910 genome | N/A |
| none | 1021 | SEQ ID NO 140 | nifK1 | 1 of 2 unique genes annotated as nifK in 910 genome | N/A |
| none | 1021 | SEQ ID NO 141 | nifK2 | 2 of 2 unique genes annotated as nifK in 910 genome | N/A |
| none | 1021 | SEQ ID NO 142 | nifL | N/A | N/A |
| none | 1021 | SEQ ID NO 143 | nifA | N/A | N/A |
| none | 1021 | SEQ ID NO 144 | glnE | N/A | N/A |
| none | 1021 | SEQ ID NO 145 | amt13 | N/A | N/A |
| none | 1021 | SEQ ID NO 146 | PinfC | 500 bp immediately upstream of the ATG start codon of the infC gene | N/A |
| none | 1021 | SEQ ID NO 147 | Prm1 | 348 bp includes the 319 bp immediately upstream of the ATG start codon of the 1pp gene and the first 29 bp of the 1pp gene | N/A |
| none | 1021 | SEQ ID NO 148 | Prm7 | 339 bp upstream of the sspA gene, ending at 46 bp upstream of the ATG of the sspA gene | N/A |
| none | 1113 | SEQ ID NO 149 | 16S | N/A | N/A |
| none | 1113 | SEQ ID NO 150 | nifH | N/A | N/A |
| none | 1113 | SEQ ID NO 151 | nifD1 | 1 of 2 unique genes annotated as nifD in 1113 genome | N/A |
| none | 1113 | SEQ ID NO 152 | nifD2 | 2 of 2 unique genes annotated as nifD in 1113 genome | N/A |
| none | 1113 | SEQ ID NO 153 | nifK | N/A | N/A |
| none | 1113 | SEQ ID NO 154 | nifL | N/A | N/A |
| none | 1113 | SEQ ID NO 155 | nifA partial gene | due to a gap in the sequence assembly, we can only identify a partial gene from the 1113 genome | N/A |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| none | 1113 | SEQ ID NO 156 | glnE | N/A | N/A |
| none | 1116 | SEQ ID NO 157 | 16S | | N/A |
| none | 1116 | SEQ ID NO 158 | nifH | | N/A |
| none | 1116 | SEQ ID NO 159 | nifD1 | 1 of 2 unique genes annotated as nifD in 1116 genome | N/A |
| none | 1116 | SEQ ID NO 160 | nifD2 | 2 of 2 unique genes annotated as nifD in 1116 genome | N/A |
| none | 1116 | SEQ ID NO 161 | nifK1 | 1 of 2 unique genes annotated as nifK in 1116 genome | N/A |
| none | 1116 | SEQ ID NO 162 | nifK2 | 2 of 2 unique genes annotated as nifK in 1116 genome | N/A |
| none | 1116 | SEQ ID NO 163 | nifL | N/A | N/A |
| none | 1116 | SEQ ID NO 164 | nifA | N/A | N/A |
| none | 1116 | SEQ ID NO 165 | glnE | N/A | N/A |
| none | 1116 | SEQ ID NO 166 | amtB | N/A | N/A |
| none | 1293 | SEQ ID NO 167 | 16S | N/A | N/A |
| none | 1293 | SEQ ID NO 168 | nifH | N/A | N/A |
| none | 1293 | SEQ ID NO 169 | nifD1 | 1 of 2 unique genes annotated as nifD in 1293 genome | N/A |
| none | 1293 | SEQ ID NO 170 | nifD2 | 2 of 2 unique genes annotated as nifD in 1293 genome | N/A |
| none | 1293 | SEQ ID NO 171 | nifK | 1 of 2 unique genes annotated as nifK in 1293 genome | N/A |
| none | 1293 | SEQ ID NO 172 | nifK1 | 2 of 2 unique genes annotated as nifK in 1293 genome | N/A |
| none | 1293 | SEQ ID NO 173 | nifA | N/A | N/A |
| none | 1293 | SEQ ID NO 174 | glnE | N/A | N/A |
| none | 1293 | SEQ ID NO 175 | amtB1 | 1 of 2 unique genes annotated as amtB in 1293 genome | N/A |
| none | 1293 | SEQ ID NO 176 | amtB2 | 2 of 2 unique genes annotated as amtB in 1293 genome | N/A |
| none | 1021-1612 | SEQ ID NO 177 | ΔnifL::PinfC | starting at 24 bp after the A of the ATG start codon, 1375 bp of nifL have been deleted and replaced with the 1021 PinfC promoter sequence | ds1131 |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| none | 1021-1612 | SEQ ID NO 178 | ΔnifL::PinfC with 500 bp flank | starting at 24 bp after the A of the ATG start codon, 1375 bp of nifL have been deleted and replaced with the 1021 PinfC promoter sequence; 500 bp flanking the nifL gene upstream and downstream are included | ds1131 |
| none | 1021-1612 | SEQ ID NO 179 | glnEΔAR-2 | glnE gene with 1673 bp immediately downstream of the ATG start codon deleted, resulting in a truncated glnE protein lacking the adenylyl-removing (AR) domain | ds1133 |
| none | 1021-1612 | SEQ ID NO 180 | glnEΔAR-2 with 500 bp flank | glnE gene with 1673 bp immediately downstream of the ATG start codon deleted, resulting in a truncated glnE protein lacking the adenylyl-removing (AR) domain; 500 bp flanking the glnE gene upstream and downstream are included | ds1133 |
| none | 1021-1615 | SEQ ID NO 181 | ΔnifL::Prm1 | starting at 24 bp after the A of the ATG start codon, 1375 bp of nifL have been deleted and replaced with the 1021 Prm1 promoter sequence | ds1145 |
| none | 1021-1615 | SEQ ID NO 182 | ΔnifL::Prm1 with 500 bp flank | starting at 24 bp after the A of the ATG start codon, 1375 bp of nifL have been deleted and replaced with the 1021 rm1 promoter sequence; 500 bp flanking the nifL gene upstream and downstream are included | ds1145 |
| none | 1021-1615 | SEQ ID NO 183 | glnEΔAR-2 | glnE gene with 1673 bp immediately downstream of the ATG start codon deleted, resulting in a truncated glnE protein lacking the adenylyl-removing (AR) domain | ds1133 |
| none | 1021-1615 | SEQ ID NO 184 | glnEΔAR-2 with 500 bp flank | glnE gene with 1673 bp immediately downstream of the ATG start codon deleted, resulting in a truncated glnE protein lacking the adenylyl-removing (AR) domain; 500 bp flanking the glnE gene upstream and downstream are included | ds1133 |
| none | 1021-1619 | SEQ ID NO 185 | ΔnifL::Prm1 | starting at 24 bp after the A of the ATG start codon, 1375 bp of nifL have been deleted and replaced with the 1021 Prm1 promoter sequence | ds1145 |
| none | 1021-1619 | SEQ ID NO 186 | ΔnifL::Prm1 with 500 bp flank | starting at 24 bp after the A of the ATG start codon, 1375 bp of nifL have been deleted and replaced with the 1021 rm1 promoter sequence; 500 bp flanking the nifL gene upstream and downstream are included | ds1145 |
| none | 1021-1623 | SEQ ID NO 187 | glnEΔAR-2 | glnE gene with 1673 bp immediately downstream of the ATG start codon deleted, resulting in a truncated glnE protein lacking the adenylyl-removing (AR) domain | ds1133 |
| none | 1021-1623 | SEQ ID NO 188 | glnEΔAR-2 with 500 bp flank | glnE gene with 1673 bp immediately downstream of the ATG start codon deleted, resulting in a truncated glnE protein lacking the adenylyl-removing (AR) domain; 500 bp flanking the glnE gene upstream and downstream are included | ds1133 |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| none | 1021-1623 | SEQ ID NO 189 | ΔnifL::Prm7 | starting at 24 bp after the A of the ATG start codon, 1375 bp of nifL have been deleted and replaced with the 1021 Prm7 promoter sequence | ds1148 |
| none | 1021-1623 | SEQ ID NO 190 | ΔnifL::Prm7 with 500 bp flank | starting at 24 bp after the A of the ATG start codon, 1375 bp of nifL have been deleted and replaced with the 1021 rm7 promoter sequence; 500 bp flanking the nifL gene upstream and downstream are included | ds1148 |
| none | 137-1034 | SEQ ID NO 191 | glnEΔAR-2 | glnE gene with 1290 bp immediately downstream of the ATG start codon deleted, resulting in a truncated glnE protein lacking the adenylyl-removing (AR) domain | ds809 |
| none | 137-1034 | SEQ ID NO 192 | glnEΔAR-2 with 500 bp flank | glnE gene with 1290 bp immediately downstream of the ATG start codon deleted, resulting in a truncated glnE protein lacking the adenylyl-removing (AR) domain; 500 bp flanking the glnE gene upstream and downstream are included | ds809 |
| none | 137-1036 | SEQ ID NO 193 | ΔnifL::PinfC | starting at 24 bp after the A of the ATG start codon, 1372 bp of nifL have been deleted and replaced with the 137 PinfC promoter sequence | ds799 |
| none | 137-1036 | SEQ ID NO 194 | ΔnifL::PinfC with 500 bp flank | starting at 24 bp after the A of the ATG start codon, 1372 bp of nifL have been deleted and replaced with the 137 PinfC promoter sequence; 500 bp flanking the nifL gene upstream and downstream are included | ds799 |
| none | 137-1314 | SEQ ID NO 195 | glnEΔAR-2 36 bp deletion | glnE gene with 1290 bp immediately downstream of the ATG start codon deleted AND 36 bp deleted beginning at 1472 bp downstream of the start codon, resulting in a truncated glnE protein lacking the adenylyl-removing (AR) domain | none |
| none | 137-1314 | SEQ ID NO 196 | glnEΔAR-2 36 bp deletion | glnE gene with 1290 bp immediately downstream of the ATG start codon deleted AND 36 bp deleted beginning at 1472 bp downstream of the start codon, resulting in a truncated glnE protein lacking the adenylyl-removing (AR) domain; 500 bp flanking the nifL gene upstream and downstream are included | none |
| none | 137-1314 | SEQ ID NO 197 | ΔnifL::Prm8.2 | starting at 24 bp after the A of the ATG start codon, 1372 bp of nifL have been deleted and replaced with the 137 Prm8.2 promoter sequence | ds857 |
| none | 137-1314 | SEQ ID NO 198 | ΔnifL::Prm8.2 with 500 bp flank | starting at 24 bp after the A of the ATG start codon, 1372 bp of nifL have been deleted and replaced with the 137 Prm8.2 promoter sequence; 500 bp flanking the nifL gene upstream and downstream are included | ds857 |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| none | 137-1329 | SEQ ID NO 199 | glnEΔAR-2 deletion | glnE gene with 1290 bp immediately downstream of the ATG start codon 36 bp deleted AND 36 bp deleted beginning at 1472 bp downstream of the start codon, resulting in a truncated glnE protein lacking the adenylyl-removing (AR) domain | none |
| none | 137-1329 | SEQ ID NO 200 | glnEΔAR-2 36 bp deletion | glnE gene with 1290 bp immediately downstream of the ATG start codon deleted AND 36 bp deleted beginning at 1472 bp downstream of the start codon, resulting in a truncated glnE protein lacking the adenylyl-removing (AR) domain; 500 bp flanking the nifL gene upstream and downstream are included | none |
| none | 137-1329 | SEQ ID NO 201 | ΔnifL::Prm6.2 | starting at 24 bp after the A of the ATG start codon, 1372 bp of nifL have been deleted and replaced with the 137 Prm6.2 promoter sequence | ds853 |
| none | 137-1329 | SEQ ID NO 202 | ΔnifL::Prm6.2 with 500 bp flank | starting at 24 bp after the A of the ATG start codon, 1372 bp of nifL have been deleted and replaced with the 137 Prm6.2 promoter sequence; 500 bp flanking the nifL gene upstream and downstream are included | ds853 |
| none | 137-1382 | SEQ ID NO 203 | ΔnifL::P 1.2 | starting at 24 bp after the A of the ATG start codon, 1372 bp of nifL have been deleted and replaced with the 137 Prm1.2 promoter sequence | ds843 |
| none | 137-1382 | SEQ ID NO 204 | ΔnifL::Prm1.2 with 500 bp flank | starting at 24 bp after the A of the ATG start codon, 1372 bp of nifL have been deleted and replaced with the 137 Prm1.2 promoter sequence; 500 bp flanking the nifL gene upstream and downstream are included | ds843 |
| none | 137-1382 | SEQ ID NO 205 | glnEΔAR-2 36 bp deletion | glnE gene with 1290 bp immediately downstream of the ATG start codon deleted AND 36 bp deleted beginning at 1472 bp downstream of the start codon, resulting in a truncated glnE protein lacking the adenylyl-removing (AR) domain | none |
| none | 137-1382 | SEQ ID NO 206 | glnEΔAR-2 36 bp deletion | glnE gene with 1290 bp immediately downstream of the ATG start codon deleted AND 36 bp deleted beginning at 1472 bp downstream of the start codon, resulting in a truncated glnE protein lacking the adenylyl-removing (AR) domain; 500 bp flanking the nifL gene upstream and downstream are included | none |
| none | 137-1586 | SEQ ID NO 207 | ΔnifL::PinfC | starting at 24 bp after the A of the ATG start codon, 1372 bp of nifL have been deleted and replaced with the 137 PinfC promoter sequence | ds799 |
| none | 137-1586 | SEQ ID NO 208 | ΔnifL::PinfC with 500 bp flank | starting at 24 bp after the A of the ATG start codon, 1372 bp of nifL have been deleted and replaced with the 137 PinfC promoter sequence; 500 bp flanking the nifL gene upstream and downstream are included | ds799 |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| none | 137-1586 | SEQ ID NO 209 | glnEΔAR-2 | glnE gene with 1290 bp immediately downstream of the ATG start codon deleted, resulting in a truncated glnE protein lacking the adenylyl-removing (AR) domain | ds809 |
| none | 137-1586 | SEQ ID NO 210 | glnEΔAR-2 with 500 bp flank | glnE gene with 1290 bp immediately downstream of the ATG start codon deleted, resulting in a truncated glnE protein lacking the adenylyl-removing (AR) domain; 500 bp flanking the glnE gene upstream and downstream are included | ds809 |
| none | 19-594 | SEQ ID NO 211 | glnEΔAR-2 | glnE gene with 1650 bp immediately downstream of the ATG start codon deleted, resulting in a truncated glnE protein lacking the adenylyl-removing (AR) domain | ds34 |
| none | 19-594 | SEQ ID NO 212 | glnEΔAR-2 with 500 bp flank | glnE gene with 1650 bp immediately downstream of the ATG start codon deleted, resulting in a truncated glnE protein lacking the adenylyl-removing (AR) domain; 500 bp flanking the glnE gene upstream and downstream are included | ds34 |
| none | 19-594 | SEQ ID NO 213 | ΔnifL::Prm6.1 | starting at 221 bp after the A of the ATG start codon, 845 bp of nifL have been deleted and replaced with the CI019 Prm6.1 promoter sequence | ds180 |
| none | 19-594 | SEQ ID NO 214 | ΔnifL::Prm6.1 with 500 bp flank | starting at 221 bp after the A of the ATG start codon, 845 bp of nifL have been deleted and replaced with the CI019 Prm6.1 promoter sequence; 500 bp flanking the nifL gene upstream and downstream are included | ds180 |
| none | 19-714 | SEQ ID NO 215 | ΔnifL::Prm6.1 | starting at 221 bp after the A of the ATG start codon, 845 bp of nifL have been deleted and replaced with the CI019 Prm6.1 promoter sequence | ds180 |
| none | 19-714 | SEQ ID NO 216 | ΔnifL::Prm6.1 with 500 bp flank | starting at 221 bp after the A of the ATG start codon, 845 bp of nifL have been deleted and replaced with the CI019 Prm6.1 promoter sequence; 500 bp flanking the nifL gene upstream and downstream are included | ds180 |
| none | 19-715 | SEQ ID NO 217 | ΔnifL::Prm7.1 | starting at 221 bp after the A of the ATG start codon, 845 bp of nifL have been deleted and replaced with the CI019 Prm7.1 promoter sequence | ds181 |
| none | 19-715 | SEQ ID NO 218 | ΔnifL::Prm7.1 with 500 bp flank | starting at 221 bp after the A of the ATG start codon, 845 bp of nifL have been deleted and replaced with the CI019 Prm76.1promoter sequence; 500 bp flanking the nifL gene upstream and downstream are included | ds181 |
| 19-713 | 19-750 | SEQ ID NO 219 | ΔnifL::Prm1.2 | starting at 221 bp after the A of the ATG start codon, 845 bp of nifL have been deleted and replaced with the CI019 Prm1.2 promoter sequence | ds172 |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| 19-713 | 19-750 | SEQ ID NO 220 | ΔnifL::Prm1.2 with 500 bp flank | starting at 221 bp after the A of the ATG start codon, 845 bp of nifL have been deleted and replaced with the CI019 Prm1.2 promoter sequence; 500 bp flanking the nifL gene upstream and downstream are included | ds172 |
| 17-724 | 19-804 | SEQ ID NO 221 | ΔnifL::Prm1.2 | starting at 221 bp after the A of the ATG start codon, 845 bp of nifL have been deleted and replaced with the CI019 Prm1.2 promoter sequence | ds172 |
| 17-724 | 19-804 | SEQ ID NO 222 | ΔnifL-Prm1.2 with 500 bp flank | starting at 221 bp after the A of the ATG start codon, 845 bp of nifL have been deleted and replaced with the CI019 Prm1.2 promoter sequence; 500 bp flanking the nifL gene upstream and downstream are included | ds172 |
| 17-724 | 19-804 | SEQ ID NO 223 | glnEΔAR-2 | glnE gene with 1650 bp immediately downstream of the ATG start codon deleted, resulting in a truncated glnE protein lacking the adenylyl-removing (AR) domain | ds34 |
| 17-724 | 19-804 | SEQ ID NO 224 | glnEΔAR-2 with 500 bp flank | glnE gene with 1650 bp immediately downstream of the ATG start codon deleted, resulting in a truncated glnE protein lacking the adenylyl-removing (AR) domain; 500 bp flanking the glnE gene upstream and downstream are included | ds34 |
| 19-590 | 19-806 | SEQ ID NO 225 | ΔnifL::Prm3.1 | starting at 221 bp after the A of the ATG start codon, 845 bp of nifL have been deleted and replaced with the CI019 Prm3.1 promoter sequence | ds175 |
| 19-590 | 19-806 | SEQ ID NO 226 | ΔnifL::Prm3.1 with 500 bp flank | starting at 221 bp after the A of the ATG start codon, 845 bp of nifL have been deleted and replaced with the CI019 Prm3.1 promoter sequence; 500 bp flanking the nifL gene upstream and downstream are included | ds175 |
| 19-590 | 19-806 | SEQ ID NO 227 | glnEΔAR-2 | glnE gene with 1650 bp immediately downstream of the ATG start codon deleted, resulting in a truncated glnE protein lacking the adenylyl-removing (AR) domain | ds34 |
| 19-590 | 19-806 | SEQ ID NO 228 | glnEΔAR-2 with 500 bp flank | glnE gene with 1650 bp immediately downstream of the ATG start codon deleted, resulting in a truncated glnE protein lacking the adenylyl-removing (AR) domain; 500 bp flanking the glnE gene upstream and downstream are included | ds34 |
| none | 63-1146 | SEQ ID NO 229 | ΔnifL::PinfC | starting at 24 bp after the A of the ATG start codon, 1375 bp of nifL have been deleted and replaced with the 63 PinfC promoter sequence | ds908 |
| none | 63-1146 | SEQ ID NO 230 | ΔnifL::PinfC with 500 bp flank | starting at 24 bp after the A of the ATG start codon, 1375 bp of nifL have been deleted and replaced with the 63 PinfC promoter sequence; 500 bp flanking the nifL gene upstream and downstream are included | ds908 |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| CM015; PBC6.15 | 6-397 | SEQ ID NO 231 | ΔnifL::Prm5 | starting at 31 bp after the A of the ATG start codon, 1375 bp of nifL have been deleted and replaced with the CI006 Prm5 promoter sequence | ds24 |
| CM015; PBC6.15 | 6-397 | SEQ ID NO 232 | ΔnifL::Prm5 with 500 bp flank | starting at 31 bp after the A of the ATG start codon, 1375 bp of nifL have been deleted and replaced with the CI006 Prm5 promoter sequence; 500 bp flanking the nifL gene upstream and downstream are included | ds24 |
| CM014 | 6-400 | SEQ ID NO 233 | ΔnifL::Prm1 | starting at 31 bp after the A of the ATG start codon, 1375 bp of nifL have been deleted and replaced with the CI006 Prm1 promoter sequence | ds20 |
| CM014 | 6-400 | SEQ ID NO 234 | ΔnifL::Prm1 with 500 bp flank | starting at 31 bp after the A of the ATG start codon, 1375 bp of nifL have been deleted and replaced with the CI006 Prm1 promoter sequence; 500 bp flanking the nifL gene upstream and downstream are included | ds20 |
| CM037; PBC6.37 | 6-403 | SEQ ID NO 235 | ΔnifL::Prm1 | starting at 31 bp after the A of the ATG start codon, 1375 bp of nifL have been deleted and replaced with the CI006 Prm1 promoter sequence | ds20 |
| CM037; PBC6.38 | 6-403 | SEQ ID NO 236 | ΔnifL::Prm1 with 500 bp flank | starting at 31 bp after the A of the ATG start codon, 1375 bp of nifL have been deleted and replaced with the CI006 Prm1 promoter sequence; 500 bp flanking the nifL gene upstream and downstream are included | ds20 |
| CM037; PBC6.39 | 6-403 | SEQ ID NO 237 | glnEΔAR-2 | glnE gene with 1644 bp immediately downstream of the ATG start codon deleted, resulting in a truncated glnE protein lacking the adenylyl-removing (AR) domain | ds31 |
| CM037; PBC6.40 | 6-403 | SEQ ID NO 238 | glnEΔAR-2 with 500 bp flank | glnE gene with 1644 bp immediately downstream of the ATG start codon deleted, resulting in a truncated glnE protein lacking the adenylyl-removing (AR) domain; 500 bp flanking the glnE gene upstream and downstream are included | ds31 |
| CM038; PBC6.38 | 6-404 | SEQ ID NO 239 | glnEΔAR-1 | glnE gene with 1287 bp immediately downstream of the ATG start codon deleted, resulting in a truncated glnE protein lacking the adenylyl-removing (AR) domain | ds30 |
| CM038; PBC6.38 | 6-404 | SEQ ID NO 240 | ΔnifL::Prm1 | starting at 31 bp after the A of the ATG start codon, 1375 bp of nifL have been deleted and replaced with the CI006 Prm1 promoter sequence | ds20 |
| CM038; PBC6.38 | 6-404 | SEQ ID NO 241 | ΔnifL::Prm1 with 500 bp flank | starting at 31 bp after the A of the ATG start codon, 1375 bp of nifL have been deleted and replaced with the CI006 Prm1 promoter sequence; 500 bp flanking the nifL gene upstream and downstream are included | ds20 |
| CM038; PBC6.38 | 6-404 | SEQ ID NO 242 | glnEΔAR-1 with 500 bp flank | glnE gene with 1287 bp immediately downstream of the ATG start codon deleted, resulting in a truncated glnE protein lacking the adenylyl-removing | ds30 |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| | | | | (AR) domain; 500 bp flanking the glnE gene upstream and downstream are included | |
| CM029; PBC6.29 | 6-412 | SEQ ID NO 243 | glnEΔAR-1 | glnE gene with 1287 bp immediately downstream of the ATG start codon deleted, resulting in a truncated glnE protein lacking the adenylyl-removing (AR) domain | ds30 |
| CM029; PBC6.29 | 6-412 | SEQ ID NO 244 | glnEΔAR-1 with 500 bp flank | glnE gene with 1287 bp immediately downstream of the ATG start codon deleted, resulting in a truncated glnE protein lacking the adenylyl-removing (AR) domain; 500 bp flanking the glnE gene upstream and downstream are included | ds30 |
| CM029; PBC6.29 | 6-412 | SEQ ID NO 245 | ΔnifL::Prm5 | starting at 31 bp after the A of the ATG start codon, 1375 bp of nifL have been deleted and replaced with the CI006 Prm5 promoter sequence | ds24 |
| CM029; PBC6.29 | 6-412 | SEQ ID NO 246 | ΔnifL::Prm5 with 500 bp flank | starting at 31 bp after the A of the ATG start codon, 1375 bp of nifL have been deleted and replaced with the CI006 Prm5 promoter sequence; 500 bp flanking the nifL gene upstream and downstream are included | ds24 |
| CM093; PBC6.93 | 6-848 | SEQ ID NO 247 | ΔnifL::Prm1 | starting at 31 bp after the A of the ATG start codon, 1375 bp of nifL have been deleted and replaced with the CI006 Prm1 promoter sequence | ds20 |
| CM093; PBC6.93 | 6-848 | SEQ ID NO 248 | ΔnifL::Prm1 with 500 bp flank | starting at 31 bp after the A of the ATG start codon, 1375 bp of nifL have been deleted and replaced with the CI006 Prm1 promoter sequence; 500 bp flanking the nifL gene upstream and downstream are included | ds20 |
| CM093; PBC6.93 | 6-848 | SEQ ID NO 249 | glnEΔAR-2 | glnE gene with 1644 bp immediately downstream of the ATG start codon deleted, resulting in a truncated glnE protein lacking the adenylyl-removing (AR) domain | ds31 |
| CM093; PBC6.93 | 6-848 | SEQ ID NO 250 | glnEΔAR-2 with 500 bp flank | glnE gene with 1644 bp immediately downstream of the ATG start codon deleted, resulting in a truncated glnE protein lacking the adenylyl-removing (AR) domain; 500 bp flanking the glnE gene upstream and downstream are included | ds31 |
| CM093; PBC6.93 | 6-848 | SEQ ID NO 251 | ΔamtB | First 1088 bp of amtB gene and 4 bp upstream of start codon deleted; 199 bp of gene remaining lacks a start codon; no amtB protein is translated | ds126 |
| CM093; PBC6.93 | 6-848 | SEQ ID NO 252 | ΔamtB with 500 bp flank | First 1088 bp of amtB gene and 4 bp upstream of start codon deleted; 199 bp of gene remaining lacks a start codon; no amtB protein is translated | ds126 |
| CM094; PBC6.94 | 6-881 | SEQ ID NO 253 | glnEΔAR-1 | glnE gene with 1287 bp immediately downstream of the ATG start codon deleted, resulting in a truncated glnE protein lacking the adenylyl-removing (AR) domain | ds30 |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| CM094; PBC6.94 | 6-881 | SEQ ID NO 254 | glnEΔAR-1 with 500 bp flank | glnE gene with 1287 bp immediately downstream of the ATG start codon deleted, resulting in a truncated glnE protein lacking the adenylyl-removing (AR) domain; 500 bp flanking the glnE gene upstream and downstream are included | ds30 |
| CM094; PBC6.94 | 6-881 | SEQ ID NO 255 | ΔnifL::Prm1 | starting at 31 bp after the A of the ATG start codon, 1375 bp of nifL have been deleted and replaced with the CI006 Prm1 promoter sequence | ds20 |
| CM094; PBC6.94 | 6-881 | SEQ ID NO 256 | ΔnifL::Prm1 with 500 bp flank | starting at 31 bp after the A of the ATG start codon, 1375 bp of nifL have been deleted and replaced with the CI006 Prm1 promoter sequence; 500 bp flanking the nifL gene upstream and downstream are included | ds20 |
| CM094; PBC6.94 | 6-881 | SEQ ID NO 257 | ΔamtB | First 1088 bp of amtB gene and 4 bp upstream of start codon deleted; 199 bp of gene remaining lacks a start codon; no amtB protein is translated | ds126 |
| CM094; PBC6.94 | 6-881 | SEQ ID NO 258 | ΔamtB with 500 bp flank | First 1088 bp of amtB gene and 4 bp upstream of start codon deleted; 199 bp of gene remaining lacks a start codon; no amtB protein is translated | ds126 |
| none | 910-1246 | SEQ ID NO 259 | ΔnifL::PinfC | starting at 20 bp after the A of the ATG start codon, 1379 bp of nifL have been deleted and replaced with the 910 PinfC promoter sequence | ds960 |
| none | 910-1246 | SEQ ID NO 260 | ΔnifL::PinfC with 500 bp flank | starting at 20 bp after the A of the ATG start codon, 1379 bp of nifL have been deleted and replaced with the 910 PinfC promoter sequence; 500 bp flanking the nifL gene upstream and downstream are included | ds960 |
| PBC6.1, 6, CI6 | CI006 | SEQ ID NO 261 | 16S-1 | 1 of 3 unique 16S rDNA genes in the CI006 genome | N/A |
| PBC6.1, 6, CI6 | CI006 | SEQ ID NO 262 | 16S-2 | 2 of 3 unique 16S rDNA genes in the CI006 genome | N/A |
| PBC6.1, 6, CI6 | CI006 | SEQ ID NO 263 | nifH | N/A | N/A |
| PBC6.1, 6, CI6 | CI006 | SEQ ID NO 264 | nifD2 | 2 of 2 unique genes annotated as nifD in CI006 genome | N/A |
| PBC6.1, 6, CI6 | CI006 | SEQ ID NO 265 | nifK2 | 2 of 2 unique genes annotated as nifK in CI006 genome | N/A |
| PBC6.1, 6, CI6 | CI006 | SEQ ID NO 266 | nifL | N/A | N/A |
| PBC6.1, 6, CI6 | CI006 | SEQ ID NO 267 | nifA | N/A | N/A |
| PBC6.1, 6, CI6 | CI006 | SEQ ID NO 268 | glnE | N/A | N/A |
| PBC6.1, 6, CI6 | CI006 | SEQ ID NO 269 | 16S-3 | 3 of 3 unique 16S rDNA genes in the CI006 genome | N/A |
| PBC6.1, 6, CI6 | CI006 | SEQ ID NO 270 | nifD1 | 1 of 2 unique genes annotated as nifD in CI006 genome | N/A |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| PBC6.1, 6, CI6 | CI006 | SEQ ID NO 271 | nifK1 | 1 of 2 unique genes annotated as nifK in CI006 genome | N/A |
| PBC6.1, 6, CI6 | CI006 | SEQ ID NO 272 | amt13 | N/A | N/A |
| PBC6.1, 6, CI6 | CI006 | SEQ ID NO 273 | Prm1 | 348 bp includes the 319 bp immediately upstream of the ATG start codon of the lpp gene and the first 29 bp of the lpp gene | N/A |
| PBC6.1, 6, CI6 | CI006 | SEQ ID NO 274 | Prm5 | 313 bp start-ing at 432 bp upstream of the ATG start codon of the ompX gene and ending 119 bp upstream of the ATG start codon of the ompX gene | N/A |
| 19,C119 | CI019 | SEQ ID NO 275 | nifL | N/A | N/A |
| 19,C119 | CI019 | SEQ ID NO 276 | nifA | N/A | N/A |
| 19, CI19 | CI019 | SEQ ID NO 277 | 16S-1 | 1 of 7 unique 16S rDNA genes in the CI019 genome | N/A |
| 19, CI19 | CI019 | SEQ ID NO 278 | 16S-2 | 2 of 7 unique 16S rDNA genes in the CI019 genome | N/A |
| 19, CI19 | CI019 | SEQ ID NO 279 | 16S-3 | 3 of 7 unique 16S rDNA genes in the CI019 genome | N/A |
| 19, CI19 | CI019 | SEQ ID NO 280 | 16S-4 | 4 of 7 unique 16S rDNA genes in the CI019 genome | N/A |
| 19, CI19 | CI019 | SEQ ID NO 281 | 16S-5 | 5 of 7 unique 16S rDNA genes in the CI019 genome | N/A |
| 19, CI19 | CI019 | SEQ ID NO 282 | 16S-6 | 6 of 7 unique 16S rDNA genes in the CI019 genome | N/A |
| 19, CI19 | CI019 | SEQ ID NO 283 | 16S-7 | 7 of 7 unique 16S rDNA genes in the CI019 genome | N/A |
| 19, CI19 | CI019 | SEQ ID NO 284 | nifH1 | 1 of 2 unique genes annotated as nifH in CI019 genome | N/A |
| 19, CI19 | CI019 | SEQ ID NO 285 | nifH2 | 2 of 2 unique genes annotated as nifH in CI019 genome | N/A |
| 19, CI19 | CI019 | SEQ ID NO 286 | nifD1 | 1 of 2 unique genes annotated as nifD in CI019 genome | N/A |
| 19, CI19 | CI019 | SEQ ID NO 287 | nifD2 | 2 of 2 unique genes annotated as nifD in CI019 genome | N/A |
| 19, CI19 | CI019 | SEQ ID NO 288 | nifK1 | 1 of 2 unique genes annotated as nifK in CI019 genome | N/A |
| 19, CI19 | CI019 | SEQ ID NO 289 | nifK2 | 2 of 2 unique genes annotated as nifK in CI019 genome | N/A |
| 19,C119 | CI019 | SEQ ID NO 290 | glnE | N/A | N/A |
| 19, CI19 | CI019 | SEQ ID NO 291 | Prm4 | 449 bp immediately upstream of the ATG of the dscC 2 gene | N/A |
| 19, CI19 | CI019 | SEQ ID NO 292 | Prm1.2 | 500 bp immediately upstream of the TTG start codon of the infC gene | N/A |
| 19, CI19 | CI019 | SEQ ID NO 293 | Prm3.1 | 170 bp immediately upstream of the ATG start codon of the iplN gene | N/A |

TABLE 32-continued

| Remodeled Non-intergeneric Microbes | | | | | |
|---|---|---|---|---|---|
| Strain | Strain ID | SEQ ID NO | Genotype | Description | Associated Novel Junction If Applicable |
| 19, CI20 | CI020 | SEQ ID NO 294 | Prm6.1 | 142 bp immediately upstream of the ATG of a highly-expressed hypothetical protein (annotated as PROKKA_00662 in CI019 assembly 82) | N/A |
| 19, CI21 | CI021 | SEQ ID NO 295 | Prm7.1 | 293 bp immediately upstream of the ATG of the 1pp gene | N/A |
| 19-375, 19-417, CM067 | CM67 | SEQ ID NO 296 | glnEΔAR-2 | glnE gene with 1650 bp immediately downstream of the ATG start codon deleted, resulting in a truncated glnE protein lacking the adenylyl-removing (AR) domain | ds34 |
| 19-375, 19-417, CM067 | CM67 | SEQ ID NO 297 | glnEΔAR-2 with 500 bp flank | glnE gene with 1650 bp immediately downstream of the ATG start codon deleted, resulting in a truncated glnE protein lacking the adenylyl-removing (AR) domain; 500 bp flanking the glnE gene upstream and downstream are included | ds34 |
| 19-375, 19-417, CM067 | CM67 | SEQ ID NO 298 | ΔnifL::null-v1 | starting at 221 bp after the A of the ATG start codon, 845 bp of nifL have been deleted and replaced with the 31 bp sequence "GGAGTCTGAACTCATCCTGCGA TGGGGGCTG" | none |
| 19-375, 19-417, CM067 | CM67 | SEQ ID NO 299 | ΔnifL::null-v1 with 500 bp flank | starting at 221 bp after the A of the ATG start codon, 845 bp of nifL have been deleted and replaced with the 3 1 bp sequence "GGAGTCTGAACTCATCCTGCGA TGGGGGCTG"; 500 bp flanking the nifL gene upstream and downstream are included | none |
| 19-377, CM069 | CM69 | SEQ ID NO 300 | ΔnifL::null-v2 | starting at 221 bp after the A of the ATG start codon, 845 bp of nifL have been deleted and replaced with the 5 bp sequence "TTAAA" | none |
| 19-377, CM069 | CM69 | SEQ ID NO 301 | ΔnifL::null-v2 with 500 bp flank | starting at 221 bp after the A of the ATG start codon, 845 bp of nifL have been deleted and replaced with the 5 bp sequence "TTAAA"; 500 bp flanking the nifL gene upstream and downstream are included | none |
| 19-389, 19-418, CM081 | CM81 | SEQ ID NO 302 | ΔnifL::Prm4 | starting at 221 bp after the A of the ATG start codon, 845 bp of nifL have been deleted and replaced with the CI19 Prm4 sequence | ds70 |
| 19-389, 19-418, CM081 | CM81 | SEQ ID NO 303 | ΔnifL::Prm4 with 500 bp flank | starting at 221 bp after the A of the ATG start codon, 845 bp of nifL have been deleted and replaced with the CI19 Prm4 sequence; 500 bp flanking the nifL gene upstream and downstream are included | ds70 |

NUMBERED EMBODIMENTS OF THE DISCLOSURE

Notwithstanding the appended claims, the disclosure sets forth the following numbered embodiments:

1. A seed treatment composition, comprising:
   a. a plurality of non-intergeneric remodeled bacteria that have an average colonization ability per unit of plant root tissue of at least about $1.0\times10^4$ bacterial cells per gram of fresh weight of plant root tissue and produce fixed N of at least about $1\times10^{-17}$ mmol N per bacterial cell per hour; and
   b. at least one pesticide.
2. The seed treatment composition, according to embodiment 1, wherein said pesticide is a fungicide.
3. The seed treatment composition, according to embodiment 1 or 2, wherein said pesticide is a fungicide selected from the group consisting of: fludioxonil, metalaxyl, mefenoxam, azoxystrobin, thiabendazole, ipconazole, tebuconazole, prothioconazole, and combinations thereof.
4. The seed treatment composition, according to embodiment 1, wherein said pesticide is an insecticide.
5. The seed treatment composition, according to embodiment 1 or 4, wherein said pesticide is a neonicotinoid insecticide.
6. The seed treatment composition, according to embodiment 1 or 4, wherein said pesticide is an insecticide selected from the group consisting of: imidacloprid, clothianidin, thiamethoxam, chlorantraniliprole, and combinations thereof.
7. The seed treatment composition, according to any one of embodiments 1-6, wherein said at least one pesticide is a fungicide and an insecticide combination.
8. The seed treatment composition, according to embodiment 1, wherein said pesticide is a nematicide.
9. The seed treatment composition, according to embodiment 1, wherein said pesticide is an herbicide.
10. The seed treatment composition, according to any one of embodiments 1-9, wherein said pesticide is selected from those in Table 13.
11. The seed treatment composition, according to any one of embodiments 1-10, wherein the non-intergeneric remodeled bacteria and pesticide exhibit a synergistic effect.
12. The seed treatment composition, according to any one of embodiments 1-11, wherein said seed treatment is disposed onto a seed.
13. The seed treatment composition, according to any one of embodiments 1-12, wherein said seed treatment is disposed onto a seed from the family Poaceae.
14. The seed treatment composition, according to any one of embodiments 1-13, wherein said seed treatment is disposed onto a cereal seed.
15. The seed treatment composition, according to any one of embodiments 1-14, wherein said seed treatment is disposed onto a corn, rice, wheat, barley, *sorghum*, millet, oat, rye, or triticale seed.
16. The seed treatment composition, according to any one of embodiments 1-15, wherein said seed treatment is disposed onto a corn seed.
17. The seed treatment composition, according to any one of embodiments 1-16, wherein said seed treatment is disposed onto a genetically modified corn seed.
18. The seed treatment composition, according to any one of embodiments 1-17, wherein said seed treatment is disposed onto a genetically modified corn seed, wherein said corn comprises an herbicide tolerant trait.
19. The seed treatment composition, according to any one of embodiments 1-18, wherein said seed treatment is disposed onto a genetically modified corn seed, wherein said corn comprises an insect resistance trait.
20. The seed treatment composition, according to any one of embodiments 1-19, wherein said seed treatment is disposed onto a genetically modified corn seed, wherein said corn comprises an herbicide tolerant trait and also an insect resistance trait.
21. The seed treatment composition, according to any one of embodiments 1-20, wherein said seed treatment is disposed onto a genetically modified corn seed, wherein said corn comprises a trait listed in Table 19.
22. The seed treatment composition, according to any one of embodiments 1-16, wherein said seed treatment is disposed onto a non-genetically modified corn seed.
23. The seed treatment composition, according to any one of embodiments 1-23, wherein said seed treatment is disposed onto sweet corn, flint corn, popcorn, dent corn, pod corn, or flour corn.
24. The seed treatment composition, according to any one of embodiments 1-23, wherein the plurality of non-intergeneric remodeled bacteria produce 1% or more of the fixed nitrogen in a plant exposed thereto.
25. The seed treatment composition, according to any one of embodiments 1-24, wherein the non-intergeneric remodeled bacteria are capable of fixing atmospheric nitrogen in the presence of exogenous nitrogen.
26. The seed treatment composition, according to any one of embodiments 1-25, wherein each member of the plurality of non-intergeneric remodeled bacteria comprises at least one genetic variation introduced into at least one gene, or non-coding polynucleotide, of the nitrogen fixation or assimilation genetic regulatory network.
27. The seed treatment composition, according to any one of embodiments 1-26, wherein each member of the plurality of non-intergeneric remodeled bacteria comprises an introduced control sequence operably linked to at least one gene of the nitrogen fixation or assimilation genetic regulatory network.
28. The seed treatment composition, according to any one of embodiments 1-27, wherein each member of the plurality of non-intergeneric remodeled bacteria comprises a heterologous promoter operably linked to at least one gene of the nitrogen fixation or assimilation genetic regulatory network.
29. The seed treatment composition, according to any one of embodiments 1-28, wherein each member of the plurality of non-intergeneric remodeled bacteria comprises at least one genetic variation introduced into a member selected from the group consisting of: nifA, nifL, ntrB, ntrC, polynucleotide encoding glutamine synthetase, glnA, glnB, glnK, drat, amtB, polynucleotide encoding glutaminase, glnD, glnE, niff, nifH, nifD, nifK, nifY, nifE, nifty, nifU, nifS, nifV, nifW, nifZ, nifM, nifF, nifB, nifQ, a gene associated with biosynthesis of a nitrogenase enzyme, or combinations thereof.
30. The seed treatment composition, according to any one of embodiments 1-29, wherein each member of the plurality of non-intergeneric remodeled bacteria comprises at least one genetic variation introduced into at least one gene, or non-coding polynucleotide, of the nitrogen fixation or assimilation genetic regulatory network that results in one or more of: increased expression or activity of NifA or glutaminase; decreased expression or activity of NifL, NtrB, glutamine synthetase, GlnB, GlnK, DraT, AmtB; decreased adenylyl-removing activity of GlnE; or decreased uridylyl-removing activity of GlnD.

31. The seed treatment composition, according to any one of embodiments 1-30, wherein each member of the plurality of non-intergeneric remodeled bacteria comprises a mutated nifL gene that has been altered to comprise a heterologous promoter inserted into said nifL gene.
32. The seed treatment composition, according to any one of embodiments 1-31, wherein each member of the plurality of non-intergeneric remodeled bacteria comprises a mutated glnE gene that results in a truncated GlnE protein lacking an adenylyl-removing (AR) domain.
33. The seed treatment composition, according to any one of embodiments 1-32, wherein each member of the plurality of non-intergeneric remodeled bacteria comprises a mutated amtB gene that results in the lack of expression of said amtB gene.
34. The seed treatment composition, according to any one of embodiments 1-33, wherein each member of the plurality of non-intergeneric remodeled bacteria comprises at least one of: a mutated nifL gene that has been altered to comprise a heterologous promoter inserted into said nifL gene; a mutated glnE gene that results in a truncated GlnE protein lacking an adenylyl-removing (AR) domain; a mutated amtB gene that results in the lack of expression of said amtB gene; and combinations thereof.
35. The seed treatment composition, according to any one of embodiments 1-34, wherein each member of the plurality of non-intergeneric remodeled bacteria comprises a mutated nifL gene that has been altered to comprise a heterologous promoter inserted into said nifL gene and a mutated glnE gene that results in a truncated GlnE protein lacking an adenylyl-removing (AR) domain.
36. The seed treatment composition, according to any one of embodiments 1-35, wherein each member of the plurality of non-intergeneric remodeled bacteria comprises a mutated nifL gene that has been altered to comprise a heterologous promoter inserted into said nifL gene and a mutated glnE gene that results in a truncated GlnE protein lacking an adenylyl-removing (AR) domain and a mutated amtB gene that results in the lack of expression of said amtB gene.
37. The seed treatment composition, according to any one of embodiments 1-36, wherein the plurality of non-intergeneric remodeled bacteria are present at a concentration of about $1\times10^5$ to about $1\times10^7$ cfu per seed.
38. The seed treatment composition, according to any one of embodiments 1-37, wherein the plurality of non-intergeneric remodeled bacteria comprise at least two different species of bacteria.
39. The seed treatment composition, according to any one of embodiments 1-38, wherein the plurality of non-intergeneric remodeled bacteria comprise at least two different strains of the same species of bacteria.
40. The seed treatment composition, according to any one of embodiments 1-39, wherein the plurality of non-intergeneric remodeled bacteria comprise bacteria selected from: *Rahnella aquatilis, Klebsiella variicola, Achromobacter spiritinus, Achromobacter marplatensis, Microbacterium murale, Kluyvera intermedia, Kosakonia pseudosacchari, Enterobacter* sp., *Azospirillum lipoferum, Kosakonia sacchari*, and combinations thereof.
41. The seed treatment composition, according to any one of embodiments 1-40, wherein the plurality of non-intergeneric remodeled bacteria are endophytic, epiphytic, or rhizospheric.
42. The seed treatment composition, according to any one of embodiments 1-41, wherein the plurality of non-intergeneric remodeled bacteria comprise bacteria selected from: a bacteria deposited as NCMA 201701002, a bacteria deposited as NCMA 201708004, a bacteria deposited as NCMA 201708003, a bacteria deposited as NCMA 201708002, a bacteria deposited as NCMA 201712001, a bacteria deposited as NCMA 201712002, and combinations thereof.
43. The seed treatment composition, according to any one of embodiments 1-42, wherein the plurality of non-intergeneric remodeled bacteria comprise bacteria with a nucleic acid sequence that shares at least about 90% sequence identity to a nucleic acid sequence selected from SEQ ID NOs: 177-260, 296-303.
44. The seed treatment composition, according to any one of embodiments 1-43, wherein the plurality of non-intergeneric remodeled bacteria comprise bacteria with a nucleic acid sequence that shares at least about 95% sequence identity to a nucleic acid sequence selected from SEQ ID NOs: 177-260, 296-303.
45. The seed treatment composition, according to any one of embodiments 1-44, wherein the plurality of non-intergeneric remodeled bacteria comprise bacteria with a nucleic acid sequence that shares at least about 99% sequence identity to a nucleic acid sequence selected from SEQ ID NOs: 177-260, 296-303.
46. The seed treatment composition, according to any one of embodiments 1-45, wherein the plurality of non-intergeneric remodeled bacteria comprise bacteria with a nucleic acid sequence selected from SEQ ID NOs: 177-260, 296-303.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following Claims define the scope of the disclosure and that methods and structures within the scope of these claims and their equivalents be covered thereby.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as, an acknowledgment or any form of suggestion that they constitute valid prior art or form part of the common general knowledge in any country in the world. Further, U.S. Pat. No. 9,975,817, issued on May 22, 2018, and entitled: Methods and Compositions for Improving Plant Traits, is hereby incorporated by reference. Further, PCT/US2018/013671, filed Jan. 12, 2018, and entitled: Methods and Compositions for Improving Plant Traits, is hereby incorporated by reference.

What is claimed is:

1. A seed treatment composition, comprising:

a) a plurality of non-intergeneric remodeled bacteria; and b) at least one compound of Formula (1) or a salt, solvate, or isomer thereof, wherein Formula (1) comprises:

Formula (1)

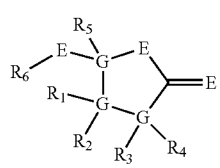

each E is independently O, S, or —$NR_7$;

each G is independently C or N;

$R_1$, $R_4$, $R_5$, and $R_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, —$OR_8$, —$C(O)R_8$,

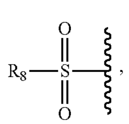

or a lone electron pair, wherein

indicates a single bond;

$R_2$ and $R_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl, or a lone electron pair; or $R_2$ and $R_3$ together form a bond, or form a substituted or unsubstituted aryl; and $R_7$ and $R_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl.

2. The seed treatment composition of claim 1, wherein
each E is independently O,
each G is independently C,
$R_1$ and $R_5$, are each independently H,
$R_2$ and $R_3$ together form a bond,
$R_4$ is substituted or unsubstituted alkyl, and
$R_6$ is substituted or unsubstituted heterocycloalkyl.

3. The seed treatment composition of claim 1, wherein the non-intergeneric remodeled bacteria have an average colonization ability per unit of plant root tissue of at least about $1.0\times10^4$ bacterial cells per gram of fresh weight of plant root tissue.

4. The seed treatment composition of claim 1, wherein the non-intergeneric remodeled bacteria produce fixed N of at least about $1\times10^{-17}$ mmol N per bacterial cell per hour.

5. The seed treatment composition of claim 1, in combination with a corn seed.

6. The seed treatment composition of claim 1, in combination with a genetically modified corn seed, wherein said genetically modified corn seed comprises a herbicide tolerance trait and/or an insect resistance trait.

7. The seed treatment composition of claim 1, wherein the non-intergeneric remodeled bacteria are capable of fixing atmospheric nitrogen in the presence of exogenous nitrogen.

8. The seed treatment composition of claim 1, wherein a member of the plurality of non-intergeneric remodeled bacteria comprises at least one genetic variation introduced into at least one gene, or non-coding polynucleotide, of a nitrogen fixation or assimilation genetic regulatory network.

9. The seed treatment composition of claim 1, wherein a member of the plurality of non-intergeneric remodeled bacteria comprises an introduced control sequence operably linked to at least one gene of a nitrogen fixation or assimilation genetic regulatory network.

10. The seed treatment composition of claim 1, wherein a member of the plurality of non-intergeneric remodeled bacteria comprises a heterologous promoter operably linked to at least one gene of a nitrogen fixation or assimilation genetic regulatory network.

11. The seed treatment composition of claim 1, wherein a member of the plurality of non-intergeneric remodeled bacteria comprises at least one genetic variation introduced into a gene selected from the group consisting of: nifA, nifL, ntrB, ntrC, polynucleotide encoding glutamine synthetase, glnA, glnB, glnK, drat, amtB, polynucleotide encoding glutaminase, glnD, glnE, nifJ, nifH, nifD, nifK, nifY, nifE, nifty, nifU, nifS, nifV, nifW, nifZ, nifM, nifF, nifB, nifQ, a gene associated with biosynthesis of a nitrogenase enzyme, and combinations thereof.

12. The seed treatment composition of claim 1, wherein a member of the plurality of non-intergeneric remodeled bacteria comprises at least one genetic variation introduced into at least one gene, or non-coding polynucleotide, of a nitrogen fixation or assimilation genetic regulatory network that results in one or more of: increased expression or activity of NifA or glutaminase; decreased expression or activity of NifL, NtrB, glutamine synthetase, GlnB, GlnK, DraT, AmtB; decreased adenylyl-removing activity of GlnE; or decreased uridylyl-removing activity of GlnD.

13. The seed treatment composition of claim 1, wherein a member of the plurality of non-intergeneric remodeled bacteria comprises at least one genetic modification to a nifL gene, glnE gene, or glnD gene.

14. The seed treatment composition of claim 1, wherein the plurality of non-intergeneric remodeled bacteria comprises at least two different species of bacteria.

15. The seed treatment composition of claim 1, wherein the plurality of non-intergeneric remodeled bacteria comprises at least two different strains of the same species of bacteria.

16. The seed treatment composition of claim 1, wherein the plurality of non-intergeneric remodeled bacteria comprise bacteria selected from the genera of: *Rahnella, Klebsiella, Achromobacter, Achromobacter, Microbacterium, Kluyvera, Kosakonia, Enterobacter, Azospirillum*, and combinations thereof.

17. The seed treatment composition of claim 1, wherein the plurality of non-intergeneric remodeled bacteria comprises bacteria from the genera of *Klebsiella* and *Kosakonia*.

18. The seed treatment composition of claim 1, wherein the plurality of non-intergeneric remodeled bacteria comprises *Klebsiella variicola* and *Kosakonia sacchari.*

19. A method, comprising:

applying the seed treatment composition of claim 1 to a plant or a field that will comprise a plant.

20. A method of making the seed treatment composition of claim 1, comprising: combining the a) plurality of non-intergeneric remodeled bacteria and the b) at least one compound of Formula (1) or a salt, solvate, or isomer thereof.

21. A seed treatment composition, comprising:

a) a plurality of non-intergeneric remodeled bacteria, which produce fixed N of at least about $1\times10^{-17}$ mmol N per bacterial cell per hour and have an average colonization ability per unit of plant root tissue of at least about $1.0\times10^{4}$ bacterial cells per gram of fresh weight of plant root tissue; and wherein a member of the plurality of non-intergeneric remodeled bacteria comprises at least one genetic variation introduced into a gene selected from the group consisting of: nifA, nifL, ntrB, ntrC, polynucleotide encoding glutamine synthetase, glnA, glnB, glnK, drat, amtB, polynucleotide encoding glutaminase, glnD, glnE, nifJ, nifH, nifD, nifK, nifY, nifE, nifty, nifU, nifS, nifV, nifW, nifZ, nifM, nifF, nifB, nifQ, a gene associated with biosynthesis of a nitrogenase enzyme, and combinations thereof; and b) at least one agricultural compound selected from the group consisting of:

i) a strigolactone compound or mimic thereof; and ii) a compound of Formula (1) or a salt, solvate, or isomer thereof, wherein Formula (1) comprises:

Formula (1)

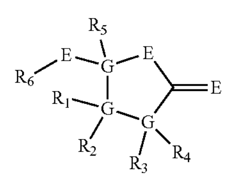

each E is independently O, S, or —$NR_7$;

each G is independently C or N;

$R_1$, $R_4$, $R_5$, and $R_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, —$OR_8$, —$C(O)R_8$,

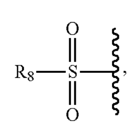

or a lone electron pair, wherein

indicates a single bond;

$R_2$ and $R_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl, or a lone electron pair; or $R_2$ and $R_3$ together form a bond, or form a substituted or unsubstituted aryl; and $R_7$ and $R_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl.

22. The seed treatment composition of claim 21, wherein the strigolactone compound or mimic thereof is present.

23. The seed treatment composition of claim 21, wherein the compound of Formula (1) is present.

24. The seed treatment composition of claim 21, wherein the compound of Formula (1) is present, and each E is independently O, each G is independently C, $R_1$ and $R_5$, are each independently H, $R_2$ and $R_3$ together form a bond, $R_4$ is substituted or unsubstituted alkyl, and $R_6$ is substituted or unsubstituted heterocycloalkyl.

25. The seed treatment composition of claim 21, in combination with a corn seed.

26. The seed treatment composition of claim 21, in combination with a genetically modified corn seed, wherein said genetically modified corn seed comprises a herbicide tolerance trait and/or an insect resistance trait.

27. The seed treatment composition of claim 21, wherein the non-intergeneric remodeled bacteria are capable of fixing atmospheric nitrogen in the presence of exogenous nitrogen.

28. The seed treatment composition of claim 21, wherein a member of the plurality of non-intergeneric remodeled bacteria comprises at least one genetic variation introduced into at least one gene, or non-coding polynucleotide, of a nitrogen fixation or assimilation genetic regulatory network.

29. The seed treatment composition of claim 21, wherein a member of the plurality of non-intergeneric remodeled bacteria comprises an introduced control sequence operably linked to at least one gene of a nitrogen fixation or assimilation genetic regulatory network.

30. The seed treatment composition of claim 21, wherein a member of the plurality of non-intergeneric remodeled bacteria comprises a heterologous promoter operably linked to at least one gene of a nitrogen fixation or assimilation genetic regulatory network.

31. The seed treatment composition of claim 21, wherein a member of the plurality of non-intergeneric remodeled bacteria comprises at least one genetic variation introduced into at least one gene, or non-coding polynucleotide, of a nitrogen fixation or assimilation genetic regulatory network that results in one or more of: increased expression or activity of NifA or glutaminase; decreased expression or activity of NifL, NtrB, glutamine synthetase, GlnB, GlnK, DraT, AmtB; decreased adenylyl-removing activity of GlnE; or decreased uridylyl-removing activity of GlnD.

32. The seed treatment composition of claim 21, wherein a member of the plurality of non-intergeneric remodeled bacteria comprises at least one genetic modification to a nifL gene, glnE gene, or glnD gene.

33. The seed treatment composition of claim 21, wherein the plurality of non-intergeneric remodeled bacteria comprises at least two different species of bacteria.

34. The seed treatment composition of claim 21, wherein the plurality of non-intergeneric remodeled bacteria comprises at least two different strains of the same species of bacteria.

35. The seed treatment composition of claim 21, wherein the plurality of non-intergeneric remodeled bacteria comprises bacteria selected from the genera of: *Rahnella, Klebsiella, Achromobacter, Achromobacter, Microbacterium, Kluyvera, Kosakonia, Enterobacter, Azospirillum*, and combinations thereof.

36. The seed treatment composition of claim 21, wherein the plurality of non-intergeneric remodeled bacteria comprises bacteria from the genera of *Klebsiella* and *Kosakonia*.

37. The seed treatment composition of claim 21, wherein the plurality of non-intergeneric remodeled bacteria comprises *Klebsiella variicola* and *Kosakonia sacchari*.

38. A method, comprising: applying the seed treatment composition of claim 21 to a plant or a field that will comprise a plant.

39. A method of making the seed treatment composition of claim 21, comprising: combining the a) plurality of non-intergeneric remodeled bacteria and the b) at least one compound of Formula (1) or a salt, solvate, or isomer thereof.

40. A method of making the seed treatment composition of claim 21, comprising: combining the a) plurality of non-intergeneric remodeled bacteria and the b) at least one strigolactone compound or mimic thereof.

41. A composition, comprising:

a) a corn seed, wherein the corn seed is a genetically modified corn seed, wherein said genetically modified corn seed comprises a herbicide tolerance trait and/or an insect resistance trait;

b) a plurality of non-intergeneric remodeled bacteria; and c) at least one agricultural compound selected from the group consisting of:

i) a strigolactone compound or mimic thereof; and ii) a compound of Formula (1) or a salt, solvate, or isomer thereof, wherein Formula (1) comprises:

Formula (1)

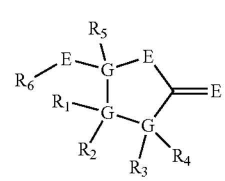

each E is independently O, S, or —$NR_7$;

each G is independently C or N;

$R_1$, $R_4$, $R_5$, and $R_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, —$OR_8$, —$C(O)R_8$,

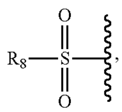

or a lone electron pair, wherein

indicates a single bond;

$R_2$ and $R_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl, or a lone electron pair; or $R_2$ and $R_3$ together form a bond, or form a substituted or unsubstituted aryl; and $R_7$ and $R_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl.

42. The composition of claim 41, wherein the strigolactone compound or mimic thereof is present.

43. The composition of claim 41, wherein the compound of Formula (1) is present.

44. The composition of claim 41, wherein the compound of Formula (1) is present, and each E is independently O, each G is independently C, $R_1$ and $R_5$, are each independently H, $R_2$ and $R_3$ together form a bond $R_4$ is substituted or unsubstituted alkyl, and $R_6$ is substituted or unsubstituted heterocycloalkyl.

45. The composition of claim 41, wherein the non-intergeneric remodeled bacteria have an average colonization ability per unit of plant root tissue of at least about $1.0\times10^4$ bacterial cells per gram of fresh weight of plant root tissue.

46. The composition of claim 41, wherein the non-intergeneric remodeled bacteria produce fixed N of at least about $1\times10^{-17}$ mmol N per bacterial cell per hour.

47. The composition of claim 41, wherein the non-intergeneric remodeled bacteria are capable of fixing atmospheric nitrogen in the presence of exogenous nitrogen.

48. The composition of claim 41, wherein a member of the plurality of non-intergeneric remodeled bacteria comprises at least one genetic variation introduced into at least one gene, or non-coding polynucleotide, of a nitrogen fixation or assimilation genetic regulatory network.

49. The composition of claim 41, wherein a member of the plurality of non-intergeneric remodeled bacteria comprises an introduced control sequence operably linked to at least one gene of a nitrogen fixation or assimilation genetic regulatory network.

50. The composition of claim 41, wherein a member of the plurality of non-intergeneric remodeled bacteria comprises a heterologous promoter operably linked to at least one gene of a nitrogen fixation or assimilation genetic regulatory network.

51. The composition of claim 41, wherein a member of the plurality of non-intergeneric remodeled bacteria comprises at least one genetic variation introduced into a gene selected from the group consisting of: nifA, nifL, ntrB, ntrC, polynucleotide encoding glutamine synthetase, glnA, glnB, glnK, drat, amtB, polynucleotide encoding glutaminase, glnD, glnE, nifJ, nifH, nifD, nifK, nifY, nifE, nifty, nifU, nifS, nifV, nifW, nifZ, nifM, nifF, nifB, nifQ, a gene associated with biosynthesis of a nitrogenase enzyme, and combinations thereof.

52. The composition of claim 41, wherein a member of the plurality of non-intergeneric remodeled bacteria comprises at least one genetic variation introduced into at least one gene, or non-coding polynucleotide, of a nitrogen fixation or assimilation genetic regulatory network that results in one or more of: increased expression or activity of NifA or glutaminase; decreased expression or activity of NifL, NtrB, glutamine synthetase, GlnB, GlnK, DraT, AmtB; decreased adenylyl-removing activity of GlnE; or decreased uridylyl-removing activity of GlnD.

53. The composition of claim 41, wherein a member of the plurality of non-intergeneric remodeled bacteria comprises at least one genetic modification to a nifL gene, glnE gene, or glnD gene.

54. The composition of claim 41, wherein the plurality of non-intergeneric remodeled bacteria comprises at least two different species of bacteria.

55. The composition of claim 41, wherein the plurality of non-intergeneric remodeled bacteria comprises at least two different strains of the same species of bacteria.

56. The composition of claim 41, wherein the plurality of non-intergeneric remodeled bacteria comprises bacteria selected from the genera of: *Rahnella, Klebsiella, Achromobacter, Achromobacter, Microbacterium, Kluyvera, Kosakonia, Enterobacter, Azospirillum*, and combinations thereof.

57. The composition of claim 41, wherein the plurality of non-intergeneric remodeled bacteria comprises bacteria from the genera of *Klebsiella* and *Kosakonia*.

58. The composition of claim 41, wherein the plurality of non-intergeneric remodeled bacteria comprises *Klebsiella variicola* and *Kosakonia sacchari*.

59. A method, comprising: applying the composition of claim 41 to a field.

60. A method of making the composition of claim 41, comprising: combining the a) corn seed and the b) plurality of non-intergeneric remodeled bacteria and the c) at least one compound of Formula (1) or a salt, solvate, or isomer thereof.

61. A method of making the composition of claim 41, comprising: combining the a) corn seed and the b) plurality of non-intergeneric remodeled bacteria and the c) at least one strigolactone compound or mimic thereof.

62. A composition, comprising:

a) a plurality of non-intergeneric remodeled bacteria, wherein a member of the plurality of non-intergeneric remodeled bacteria comprises at least one genetic variation introduced into a gene selected from the group consisting of: nifA, nifL, ntrB, ntrC, polynucleotide encoding glutamine synthetase, glnA, glnB, glnK, drat, amtB, polynucleotide encoding glutaminase, glnD, glnE, nifJ, nifH, nifD, nifK, nifY, nifE, nifty, nifU, nifS, nifV, nifW, nifZ, nifM, nifF, nifB, nifQ, a gene associated with biosynthesis of a nitrogenase enzyme, and combinations thereof; and b) at least one agricultural compound selected from the group consisting of:

i) a strigolactone compound or mimic thereof; and ii) a compound of Formula (1) or a salt, solvate, or isomer thereof, wherein Formula (1) comprises:

Formula (1)

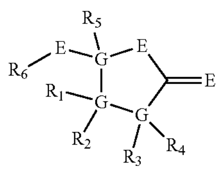

each E is independently O, S, or —$NR_7$;

each G is independently C or N;

$R_1$, $R_4$, $R_5$, and $R_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, —$OR_8$, —$C(O)R_8$,

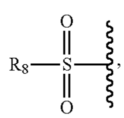

or a lone electron pair, wherein

indicates a single bond;

$R_2$ and $R_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl, or a lone electron pair; or $R_2$ and $R_3$ together form a bond, or form a substituted or unsubstituted aryl; and $R_7$ and $R_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl.

63. The composition of claim 62, wherein the strigolactone compound or mimic thereof is present.

64. The composition of claim 62, wherein the compound of Formula (1) is present.

65. The composition of claim 62, wherein the compound of Formula (1) is present, and each E is independently O, each G is independently C, $R_1$ and $R_5$, are each independently H, $R_2$ and $R_3$ together form a bond $R_4$ is substituted or unsubstituted alkyl, and $R_6$ is substituted or unsubstituted heterocycloalkyl.

66. The composition of claim 62, wherein the non-intergeneric remodeled bacteria have an average colonization ability per unit of plant root tissue of at least about $1.0\times10^4$ bacterial cells per gram of fresh weight of plant root tissue.

67. The composition of claim 62, wherein the non-intergeneric remodeled bacteria produce fixed N of at least about $1\times10^{-17}$ mmol N per bacterial cell per hour.

68. The composition of claim 62, formulated as a seed treatment.

69. The composition of claim 62, formulated as an in-furrow treatment.

70. The composition of claim 62, in combination with a corn seed.

71. The composition of claim 62, in combination with a genetically modified corn seed, wherein said genetically modified corn seed comprises a herbicide tolerance trait and/or an insect resistance trait.

72. The composition of claim 62, wherein the non-intergeneric remodeled bacteria are capable of fixing atmospheric nitrogen in the presence of exogenous nitrogen.

73. The composition of claim 62, wherein a member of the plurality of non-intergeneric remodeled bacteria comprises an introduced control sequence operably linked to at least one gene of a nitrogen fixation or assimilation genetic regulatory network.

74. The composition of claim 62, wherein a member of the plurality of non-intergeneric remodeled bacteria comprises a heterologous promoter operably linked to at least one gene of a nitrogen fixation or assimilation genetic regulatory network.

75. The composition of claim 62, wherein a member of the plurality of non-intergeneric remodeled bacteria comprises at least one genetic variation introduced into at least one gene, or non-coding polynucleotide, of a nitrogen fixation or assimilation genetic regulatory network that results in one or more of: increased expression or activity of NifA or glutaminase; decreased expression or activity of NifL, NtrB, glutamine synthetase, GlnB, GlnK, DraT, AmtB; decreased adenylyl-removing activity of GlnE; or decreased uridylyl-removing activity of GlnD.

76. The composition of claim 62, wherein a member of the plurality of non-intergeneric remodeled bacteria comprises at least one genetic modification to a nifL gene, glnE gene, or glnD gene.

77. The composition of claim 62, wherein the plurality of non-intergeneric remodeled bacteria comprises at least two different species of bacteria.

78. The composition of claim 62, wherein the plurality of non-intergeneric remodeled bacteria comprises at least two different strains of the same species of bacteria.

79. The composition of claim 62, wherein the plurality of non-intergeneric remodeled bacteria comprises bacteria selected from the genera of: *Rahnella, Klebsiella, Achromo-*

*bacter, Achromobacter, Microbacterium, Kluyvera, Kosakonia, Enterobacter, Azospirillum*, and combinations thereof.

80. The composition of claim 62, wherein the plurality of non-intergeneric remodeled bacteria comprises bacteria from the genera of *Klebsiella* and *Kosakonia.*

81. The composition of claim 62, wherein the plurality of non-intergeneric remodeled bacteria comprises *Klebsiella variicola* and *Kosakonia sacchari.*

82. A method, comprising: applying the composition of claim 62 to a plant or a field that will comprise a plant.

83. A method of making the composition of claim 62, comprising: combining the a) plurality of non-intergeneric remodeled bacteria and the b) at least one compound of Formula (1) or a salt, solvate, or isomer thereof.

84. A method of making the composition of claim 62, comprising: combining the a) plurality of non-intergeneric remodeled bacteria and the b) at least one strigolactone compound or mimic thereof.

85. A seed treatment composition, comprising:

a) a plurality of non-intergeneric remodeled *Kosakonia*; and b) at least one agricultural compound selected from the group consisting of:

i) a strigolactone compound or mimic thereof; and ii) compound of Formula (1) or a salt, solvate, or isomer thereof, wherein Formula (1) comprises:

Formula (1)

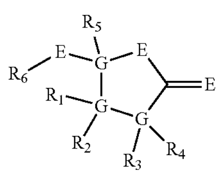

each E is independently O, S, or —$NR_7$;

each G is independently C or N;

$R_1$, $R_4$, $R_5$, and $R_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, —$OR_8$, —$C(O)R_8$,

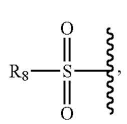

or a lone electron pair, wherein

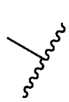

indicates a single bond;

$R_2$ and $R_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl, or a lone electron pair; or $R_2$ and $R_3$ together form a bond, or form a substituted or unsubstituted aryl; and $R_7$ and $R_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl.

86. The seed treatment composition of claim 85, wherein the strigolactone compound or mimic thereof is present.

87. The seed treatment composition of claim 85, wherein the compound of Formula (1) is present.

88. The seed treatment composition of claim 85, wherein the compound of Formula (1) is present, and each E is independently O, each G is independently C, $R_1$ and $R_5$, are each independently H, $R_2$ and $R_3$ together form a bond $R_4$ is substituted or unsubstituted alkyl, and $R_6$ is substituted or unsubstituted heterocycloalkyl.

89. The seed treatment composition of claim 85, wherein the non-intergeneric remodeled *Kosakonia* have an average colonization ability per unit of plant root tissue of at least about $1.0\times10^4$ bacterial cells per gram of fresh weight of plant root tissue.

90. The seed treatment composition of claim 85, wherein the non-intergeneric remodeled *Kosakonia* produce fixed N of at least about $1\times10^{-17}$ mmol N per bacterial cell per hour.

91. The seed treatment composition of claim 85, in combination with a corn seed.

92. The seed treatment composition of claim 85, in combination with a genetically modified corn seed, wherein said genetically modified corn seed comprises a herbicide tolerance trait and/or an insect resistance trait.

93. The seed treatment composition of claim 85, wherein the non-intergeneric remodeled *Kosakonia* are capable of fixing atmospheric nitrogen in the presence of exogenous nitrogen.

94. The seed treatment composition of claim 85, wherein a member of the plurality of non-intergeneric remodeled *Kosakonia* comprises at least one genetic variation introduced into at least one gene, or non-coding polynucleotide, of a nitrogen fixation or assimilation genetic regulatory network.

95. The seed treatment composition of claim 85, wherein a member of the plurality of non-intergeneric remodeled *Kosakonia* comprises an introduced control sequence operably linked to at least one gene of a nitrogen fixation or assimilation genetic regulatory network.

96. The seed treatment composition of claim 85, wherein a member of the plurality of non-intergeneric remodeled *Kosakonia* comprises a heterologous promoter operably linked to at least one gene of a nitrogen fixation or assimilation genetic regulatory network.

97. The seed treatment composition of claim 85, wherein a member of the plurality of non-intergeneric remodeled *Kosakonia* comprises at least one genetic variation introduced into a gene selected from the group consisting of: nifA, nifL, ntrB, ntrC, polynucleotide encoding glutamine synthetase, glnA, glnB, glnK, drat, amtB, polynucleotide encoding glutaminase, glnD, glnE, nifJ, nifH, nifD, nifK, nifY, nifE, nifty, nifU, nifS, nif nifW, nifZ, nifM, nifF, nifB, nifQ, a gene associated with biosynthesis of a nitrogenase enzyme, and combinations thereof.

98. The seed treatment composition of claim 85, wherein a member of the plurality of non-intergeneric remodeled *Kosakonia* comprises at least one genetic variation introduced into at least one gene, or non-coding polynucleotide, of a nitrogen fixation or assimilation genetic regulatory network that results in one or more of: increased expression or activity of NifA or glutaminase; decreased expression or activity of NifL, NtrB, glutamine synthetase, GlnB, GlnK, DraT, AmtB; decreased adenylyl-removing activity of GlnE; or decreased uridylyl-removing activity of GlnD.

99. The seed treatment composition of claim 85, wherein a member of the plurality of non-intergeneric remodeled *Kosakonia* comprises at least one genetic modification to a nifL gene, glnE gene, or glnD gene.

100. The seed treatment composition of claim 85, wherein the *Kosakonia* are *Kosakonia sacchari*.

101. The seed treatment composition of claim 85, further comprising *Klebsiella*.

102. The seed treatment composition of claim 101, wherein the *Klebsiella* are *Klebsiella variicola*.

103. A method, comprising: applying the seed treatment composition of claim 85 to a plant or a field that will comprise a plant.

104. A method of making the seed treatment composition of claim 85, comprising: combining the a) plurality of non-intergeneric remodeled *Kosakonia* and the b) at least one compound of Formula (1) or a salt, solvate, or isomer thereof.

105. A method of making the seed treatment composition of claim 85, comprising: combining the a) plurality of non-intergeneric remodeled *Kosakonia* and the b) at least one strigolactone compound or mimic thereof.

106. A composition, comprising:

a) a corn seed;

b) a plurality of non-intergeneric remodeled bacteria; wherein a member of the plurality of non-intergeneric remodeled bacteria comprises at least one genetic variation introduced into a gene selected from the group consisting of: nifA, nifL, ntrB, ntrC, polynucleotide encoding glutamine synthetase, glnA, glnB, glnK, drat, amtB, polynucleotide encoding glutaminase, glnD, glnE, nifJ, nifH, nifD, nifK, nifY, nifE, nifty, nifU, nifS, nifV, nifW, nifZ, nifM, nifF, nifB, nifQ, a gene associated with biosynthesis of a nitrogenase enzyme, and combinations thereof; and c) at least one agricultural compound selected from the group consisting of:

i) a strigolactone compound or mimic thereof; and ii) a compound of Formula (1) or a salt, solvate, or isomer thereof, wherein Formula (1) comprises:

Formula (1)

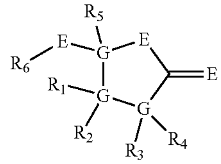

each E is independently O, S, or —$NR_7$;

each G is independently C or N;

$R_1$, $R_4$, $R_5$, and $R_6$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, substituted or unsubstituted heterocycloalkyl, —$OR_8$, —$C(O)R_8$,

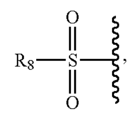

or a lone electron pair, wherein

indicates a single bond;

$R_2$ and $R_3$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl, or a lone electron pair; or $R_2$ and $R_3$ together form a bond, or form a substituted or unsubstituted aryl; and $R_7$ and $R_8$ are each independently H, amino, halo, substituted or unsubstituted alkyl, substituted or unsubstituted aryl, substituted or unsubstituted heteroalkyl, substituted or unsubstituted arylalkyl, substituted or unsubstituted heteroaryl, substituted or unsubstituted heteroarylalkyl, substituted or unsubstituted cycloalkyl, or substituted or unsubstituted heterocycloalkyl.

107. The composition of claim 106, wherein the strigolactone compound or mimic thereof is present.

108. The composition of claim 106, wherein the compound of Formula (1) is present.

109. The composition of claim 106, wherein the compound of Formula (1) is present, and each E is independently O, each G is independently C, $R_1$ and $R_5$, are each independently H, $R_2$ and $R_3$ together form a bond $R_4$ is substituted or unsubstituted alkyl, and $R_6$ is substituted or unsubstituted heterocycloalkyl.

110. The composition of claim 106, wherein the non-intergeneric remodeled bacteria have an average colonization ability per unit of plant root tissue of at least about $1.0\times10^4$ bacterial cells per gram of fresh weight of plant root tissue.

111. The composition of claim 106, wherein the non-intergeneric remodeled bacteria produce fixed N of at least about $1\times10^{-17}$ mmol N per bacterial cell per hour.

112. The composition of claim 106, wherein the corn seed is a genetically modified corn seed, wherein said genetically modified corn seed comprises a herbicide tolerance trait and/or an insect resistance trait.

113. The composition of claim 106, wherein the non-intergeneric remodeled bacteria are capable of fixing atmospheric nitrogen in the presence of exogenous nitrogen.

114. The composition of claim 106, wherein a member of the plurality of non-intergeneric remodeled bacteria comprises at least one genetic variation introduced into at least one gene, or non-coding polynucleotide, of a nitrogen fixation or assimilation genetic regulatory network.

115. The composition of claim 106, wherein a member of the plurality of non-intergeneric remodeled bacteria comprises an introduced control sequence operably linked to at least one gene of a nitrogen fixation or assimilation genetic regulatory network.

116. The composition of claim 106, wherein a member of the plurality of non-intergeneric remodeled bacteria comprises a heterologous promoter operably linked to at least one gene of a nitrogen fixation or assimilation genetic regulatory network.

117. The composition of claim 106, wherein a member of the plurality of non-intergeneric remodeled bacteria comprises at least one genetic variation introduced into at least one gene, or non-coding polynucleotide, of a nitrogen fixation or assimilation genetic regulatory network that results in one or more of: increased expression or activity of NifA or glutaminase; decreased expression or activity of NifL, NtrB, glutamine synthetase, GlnB, GlnK, DraT, AmtB; decreased adenylyl-removing activity of GlnE; or decreased uridylyl-removing activity of GlnD.

118. The composition of claim 106, wherein a member of the plurality of non-intergeneric remodeled bacteria comprises at least one genetic modification to a nifL gene, glnE gene, or glnD gene.

119. The composition of claim 106, wherein the plurality of non-intergeneric remodeled bacteria comprises at least two different species of bacteria.

120. The composition of claim 106, wherein the plurality of non-intergeneric remodeled bacteria comprises at least two different strains of the same species of bacteria.

121. The composition of claim 106, wherein the plurality of non-intergeneric remodeled bacteria comprises bacteria selected from the genera of: *Rahnella, Klebsiella, Achromobacter, Achromobacter, Microbacterium, Kluyvera, Kosakonia, Enterobacter, Azospirillum*, and combinations thereof.

122. The composition of claim 106, wherein the plurality of non-intergeneric remodeled bacteria comprises bacteria from the genera of *Klebsiella* and *Kosakonia*.

123. The composition of claim 106, wherein the plurality of non-intergeneric remodeled bacteria comprises *Klebsiella variicola* and *Kosakonia sacchari*.

124. A method, comprising: applying the composition of claim 106 to a field.

125. A method of making the composition of claim 106, comprising: combining the a) corn seed and the b) plurality of non-intergeneric remodeled bacteria and the c) at least one compound of Formula (1) or a salt, solvate, or isomer thereof.

126. A method of making the composition of claim 106, comprising: combining the a) corn seed and the b) plurality of non-intergeneric remodeled bacteria and the c) at least one strigolactone compound or mimic thereof.

* * * * *

UNITED STATES PATENT AND TRADEMARK OFFICE

CERTIFICATE OF CORRECTION

PATENT NO. : 11,678,667 B2
APPLICATION NO. : 17/576106
DATED : June 20, 2023
INVENTOR(S) : Reisinger et al.

It is certified that error appears in the above-identified patent and that said Letters Patent is hereby corrected as shown below:

In the Claims

At Claim 11, Column 717, Line 35, please replace “nifty,” with --nifN,--.

At Claim 21, Column 718, Line 28, please replace “nifty,” with --nifN,--.

At Claim 51, Column 722, Line 17, please replace “nifty,” with --nifN,--.

At Claim 62, Column 723, Line 5, please replace “nifty,” with --nifN,--.

At Claim 97, Column 726, Line 67, please replace “nifty,” with --nifN,--.

At Claim 97, Column 726, Line 67, please replace “nif nifW,” with --nifV, nifW,--.

At Claim 106, Column 727, Line 46, please replace “nifty,” with --nifN,--.

Signed and Sealed this
Twenty-sixth Day of December, 2023

Katherine Kelly Vidal

Katherine Kelly Vidal
*Director of the United States Patent and Trademark Office*

SEQUENCE LISTING

<160> NUMBER OF SEQ ID NOS: 424

<210> SEQ ID NO 1
<211> LENGTH: 9
<212> TYPE: PRT
<213> ORGANISM: Unknown
<220> FEATURE:
<223> OTHER INFORMATION: “LAGLIDADG” family peptide motif sequence

<400> SEQUENCE: 1

Leu Ala Gly Leu Ile Asp Ala Asp Gly
1 5

<210> SEQ ID NO 2
<211> LENGTH: 90
<212> TYPE: DNA
<213> ORGANISM: Artificial Sequence
<220> FEATURE:
<223> OTHER INFORMATION: Synthetic oligonucleotide

<400> SEQUENCE: 2
gttgatcaga ccgatgttcg gaccttccaa ggtttcgatc ggacatacgc gaccgtagtg 60
ggtcgggtgt acgtctcgaa cttcaaagcc 90

<210> SEQ ID NO 3
<211> LENGTH: 257
<212> TYPE: DNA
<213> ORGANISM: Artificial Sequence
<220> FEATURE:
<223> OTHER INFORMATION: Synthetic polynucleotide

<400> SEQUENCE: 3
gcctctcggg gcgctttttt ttattccggc actagccgct attaataaaa atgcaaatcg 60
gaatttacta tttaacgcga gattatctaa gatgaatccg atggaagcgc gctgttttca 120
ctcgcctttt taaagttacg tgatgatttc gatgcttctt tgagcgaacg atcaaaaata 180
agcgtattca ggtaaaaaaa tattctcatc acaaaaaagt ttgtgtaata cttgtaacgc 240
tacatggaga ttaactc 257

<210> SEQ ID NO 4
<211> LENGTH: 260
<212> TYPE: DNA
<213> ORGANISM: Artificial Sequence
<220> FEATURE:
<223> OTHER INFORMATION: Synthetic polynucleotide

<400> SEQUENCE: 4
ggttcacata aacataatta tcgccacggc gatagccgta cgctttttgc gtcacaacat 60
ccatggtgaa gccggctttt tcaagaacac gcgccacctc atcgggtctt aaatacatac 120
tcattcctca ttatctttta ccgcacgtta accttacctt attcattaaa ggcaacgctt 180
tcggaatatt ccataaaggg ctatttacag cataattcaa aatcttgtcc tacacttata 240
gactcaatgg aattaaggga 260

<210> SEQ ID NO 5
<211> LENGTH: 260
<212> TYPE: DNA
<213> ORGANISM: Artificial Sequence
<220> FEATURE:
<223> OTHER INFORMATION: Synthetic polynucleotide

<400> SEQUENCE: 5
gcgcggaaaa tcgacgcata gcgcattctc agaagccggc ctggtctcgg tggaaaagcg 60
aatctttccc acgaccgccg ggcctttaac aaaagaatca atgacctgat taatgtcgct 120
atccattctc tctccgcgta atgcgatctt ttttcatcat acctaacaaa ctggcagagg 180
gaaaagccgc gcggtttttc tgcgaagtgt attgtaagat ttgtttgata tgttatatcg 240
taacatatta ttgcaaacat 260

<210> SEQ ID NO 6
<211> LENGTH: 259
<212> TYPE: DNA
<213> ORGANISM: Artificial Sequence
<220> FEATURE:
<223> OTHER INFORMATION: Synthetic polynucleotide

<400> SEQUENCE: 6
ctgacgaagc gagttacatc accggtgaaa ctctgcacgt caacggcgga atgtatatgg 60
tctgaccgag atttgcgcaa aacgctcagg aaccgcgcag tctgtgcggt tcactgtaat 120
gttttgtaca aaatgatttg cgttatgagg gcaaacagcc gcaaaatagc gtaaaatcgt 180
ggtaagacct gccgggattt agttgcaaat ttttcaacat tttatacact acgaaaacca 240
tcgcgaaagc gagttttga 259

<210> SEQ ID NO 7
<211> LENGTH: 260
<212> TYPE: DNA
<213> ORGANISM: Artificial Sequence
<220> FEATURE:
<223> OTHER INFORMATION: Synthetic polynucleotide

<400> SEQUENCE: 7
acgcctgggg cgccgaccag cgggaagagt gatttggcca acgaggcgcc gctctgaatg 60
gaaatcatgg cgattaaaat aaccagtatc ggcaaccatg ccggtacctt acgagacgag 120
ccgggcatcc tttctcctgt caattttgtc aaatgcggta aaggttccag tgtaattgaa 180
ttaccccgcg ccggttgagc taatgttgaa aaaaagggtc ttaaaagcag tacaataggg 240
cgggtctgaa gataatttca 260

<210> SEQ ID NO 8
<211> LENGTH: 260
<212> TYPE: DNA
<213> ORGANISM: Artificial Sequence
<220> FEATURE:
<223> OTHER INFORMATION: Synthetic polynucleotide

<400> SEQUENCE: 8
tctgattcct gatgaaaata aacgcgacct tgaagaaatt ccggataacg ttatcgccga 60
tttagatatc catccggtga aacgaatcga ggaagttctg gcacttgcgc tacagaacga 120
accgtttgga atggaagtcg tcacggcaaa atagtgattt cgcgcaaata gcgctaagaa 180
aaatagggct ggtaagtaaa ttcgtacttg ccagcctttt tttgtgtagc taacttagat 240
cgctggcagg ggggtcaatt 260

<210> SEQ ID NO 9
<211> LENGTH: 259
<212> TYPE: DNA
<213> ORGANISM: Artificial Sequence
<220> FEATURE:
<223> OTHER INFORMATION: Synthetic polynucleotide

<400> SEQUENCE: 9
gtaagaaagt cggcctgcgt aaagcacgtc gtcgtcctca gttctccaaa cgttaattgt 60
tttctgctca cgcagaacaa tttgcgaaaa aacccgcttc ggcgggtttt tttatggata 120
aatttgccat tttccctcta caaacgcccc attgttacca ctttttcagc atttccagaa 180
tcccctcacc acaacgtctt caaaatctgg taaactatca tccaattttc tgcccaaatg 240
caggtgattg ttcatttttt 259

<210> SEQ ID NO 10
<211> LENGTH: 260
<212> TYPE: DNA
<213> ORGANISM: Artificial Sequence
<220> FEATURE:
<223> OTHER INFORMATION: Synthetic polynucleotide

<400> SEQUENCE: 10
gtcaaagccg tattatcgac cccttaggga caacgcttgc cggggcggga gagcggccgc 60
agttgatttt tgccgaactt tcagctgatt atattcagca ggtacgcgag cgcctgccgg 120
tgttgcgcaa tcgccgcttt gcgccaccgc aattattatg acgttttttt aaacaaggct 180
tgattcacct tgttacagat tgctattgtg tccgcgcgtc aaatagccgt taattgtatg 240
cgtgtatgat ggcgtattcg 260

<210> SEQ ID NO 11
<211> LENGTH: 260
<212> TYPE: DNA
<213> ORGANISM: Artificial Sequence
<220> FEATURE:
<223> OTHER INFORMATION: Synthetic polynucleotide

<400> SEQUENCE: 11
gaggcggtgg ttgaccgtat cggtcccgag catcatgagc tttcggggcg agcgaaagat 60
atgggatcgg cggcggtact gctggcgatt atcatcgcgc tgatcgcgtg gggaacgctg 120
ctgtgggcga actaccgcta agtcttgtcg tagctgctcg caaaacggaa agaaactcct 180
gatttttgtg tgaaatgtgg ttccaaaatc accgttagct gtatatactc acagcataac 240
tgtatataca cccagggggc 260

<210> SEQ ID NO 12
<211> LENGTH: 260
<212> TYPE: DNA
<213> ORGANISM: Artificial Sequence
<220> FEATURE:
<223> OTHER INFORMATION: Synthetic polynucleotide

<400> SEQUENCE: 12
taagaaaagc ggcctgtacg aagacggcgt acgtaaagac aggctggata acgacgatat 60
gatcgatcag ctggaagcgc gtattcgcgc taaagcatcg atgctggatg aggcgcgtcg 120
tatcgatatc cagcaggttg aagcgaaata acgtgttggg aagcgatacg cttcccgtgt 180
atgattgaac ctgcgggcgc gaggcgccgg ggttcatttt tgtatatata aagagaataa 240
acgtggcaaa gaacattcaa 260

<210> SEQ ID NO 13
<211> LENGTH: 237
<212> TYPE: DNA
<213> ORGANISM: Artificial Sequence
<220> FEATURE:
<223> OTHER INFORMATION: Synthetic polynucleotide

<400> SEQUENCE: 13
atgaatcgta ctaaactggt actgggcgcg gtaatcctgg gttctactct gctggctggt 60
tgctccagca atgctaaaat cgatcagctg tcttctgacg ttcagactct gaacgctaaa 120
gttgaccagc tgagcaacga cgtgaacgca atgcgttccg acgttcaggc tgctaaagat 180
gacgcagctc gcgctaacca gcgtctggac aacgcagcta ctaaataccg taagtaa 237

<210> SEQ ID NO 14
<211> LENGTH: 327
<212> TYPE: DNA
<213> ORGANISM: Artificial Sequence
<220> FEATURE:
<223> OTHER INFORMATION: Synthetic polynucleotide

<400> SEQUENCE: 14
atggccaacc gagcaaaccg caacaacgta gaagagagcg ctgaagatat ccataacgat 60
gtcagccaat tagcggatac gctggaagag gtgctgaaat cgtggggcag cgacgccaaa 120
gacgaagcgg aggccgcgcg caaaaaagcg caggcgctgc tgaaagagac ccgcgcccgg 180
cttaacggca acaaccgcgt ccagcaggcg gcgtgcgacg ccatgggctg cgctgacagc 240
tacgtgcgcg acaaaccgtg gcaaagcgtc ggcgccgcag cagccgttgg ggtatttatt 300
ggcgtattac tgaatttacg tcgataa 327

<210> SEQ ID NO 15
<211> LENGTH: 648
<212> TYPE: DNA
<213> ORGANISM: Artificial Sequence
<220> FEATURE:
<223> OTHER INFORMATION: Synthetic polynucleotide

<400> SEQUENCE: 15
atgaccaaaa agatttccgc cctagcgttt ggcattggca tggtaatggc gagcagccag 60
gcttttgccc acggtcacca tagtcatggc ccggcgctga ccgaagcgga acaaaaggcg 120
agtgaaggca tttttgctga ccaggacgta aaggacaggg cgctgagcga ctgggagggg 180
atctggcagt cggttaaccc ctatctgctg aacggggatt tagatccggt tctggagcag 240
aaggccaaaa aggccggtaa aagcgtggcg gaatatcggg aatattataa gaagggctac 300
gctaccgatg tcgaccagat tggtatcgag gataacgtca tggagtttca cgtcgggaaa 360
accgtcaacg cctgtaagta cagctattcc ggttacaaaa ttctgaccta cgcatccggt 420
aaaaaaggcg tgcgctacct gttcgaatgc cagcaggcgg attcaaaagc gccgaagttt 480
gttcagttta gcgatcacac catcgcgcca cgcaagtccc agcatttcca catctttatg 540
ggcaatgagt cccaggaagc gctgctgaaa gagatggata actggccaac ctactatcct 600
tatgcgctgc ataaagagca gattgtcgac gaaatgctgc accactaa 648

<210> SEQ ID NO 16
<211> LENGTH: 237
<212> TYPE: DNA
<213> ORGANISM: Artificial Sequence
<220> FEATURE:
<223> OTHER INFORMATION: Synthetic polynucleotide

<400> SEQUENCE: 16
atgagcacta tcgaagaacg cgttaagaaa attatcggcg aacagctggg cgttaagcag 60
gaagaagtta ccaacaatgc ttccttcgtt gaagacctgg gcgctgattc tcttgacacc 120
gttgagctgg taatggctct ggaagaagag tttgatactg agattccgga cgaagaagct 180
gagaaaatca ctactgttca ggctgccatt gattacatca acggccacca ggcgtaa 237

<210> SEQ ID NO 17
<211> LENGTH: 513
<212> TYPE: DNA
<213> ORGANISM: Artificial Sequence
<220> FEATURE:
<223> OTHER INFORMATION: Synthetic polynucleotide

<400> SEQUENCE: 17
atgaataaaa ttgcacgttt ttcagcactg gccgttgttc tggctgcatc cgtaggtacc 60
actgctttcg ctgcgacttc taccgttacc ggtggctacg cgcagagcga catgcagggt 120
gaagcgaaca aagctggcgg tttcaacctg aagtaccgct acgagcaaga caacaacccg 180
ctgggtgtta tcggttcttt cacctacacc gaaaaagatc gttctgaatc tggcgtttac 240
aaaaaaggcc agtactacgg catcaccgca ggtccggctt accgtctgaa cgactgggct 300
agcatctacg gcgtagtggg tgttggttac ggtaaattcc aggacaacag ctacccgaac 360
aaatctgata tgagcgacta cggtttctct tacggcgctg gtctgcagtt caacccgatc 420
gaaaacgttg ccctggactt ctcctacgag cagtctcgca ttcgtaacgt tgacgttggc 480
acctggattg ctggcgtagg ttaccgcttc taa 513

<210> SEQ ID NO 18
<211> LENGTH: 273
<212> TYPE: DNA
<213> ORGANISM: Artificial Sequence
<220> FEATURE:
<223> OTHER INFORMATION: Synthetic polynucleotide

<400> SEQUENCE: 18
gtgaataaat ctcaactgat tgacaaaatt gctgccggtg cggacatttc taaagccgca 60
gctggacgtg cgttagatgc tttaatcgct tctgttactg aatctctgca ggctggagat 120
gacgttgcgc tggtagggtt tggtactttt gctgttaaag agcgcgctgc ccgtactggt 180
cgcaatccgc aaacaggcaa agaaatcacc attgctgctg ctaaagttcc gggtttccgc 240
gcaggtaaag cgctgaaaga cgcggtaaac tga 273

<210> SEQ ID NO 19
<211> LENGTH: 639
<212> TYPE: DNA
<213> ORGANISM: Artificial Sequence
<220> FEATURE:
<223> OTHER INFORMATION: Synthetic polynucleotide

<400> SEQUENCE: 19
atggctgtcg ctgccaacaa acgttcggta atgacgctgt tttctggtcc tactgacatc 60
tatagccatc aggtccgcat cgtgctggcc gaaaaaggtg ttagttttga gatagagcac 120
gtggagaagg acaacccgcc tcaggatctg attgacctca acccgaatca aagcgtaccg 180
acgcttgtgg atcgtgagct cactctgtgg gaatctcgca tcattatgga atatctggat 240
gagcgtttcc cgcatccgcc gctcatgccg gtttacccgg tggcgcgtgg ggaaagccgt 300
ctgtatatgc agcgtatcga aaaggactgg tattcgttga tgaataccat tcagaccggt 360
accgctgcgc aggctgatac tgcgcgtaag cagctgcgtg aagaactaca ggcgattgcg 420
ccagttttca cccagaagcc ctacttcctg agcgatgagt tcagcctggt ggactgctac 480
ctggcaccac tgctgtggcg tctgccggtt ctcggcgtag agctggtcgg cgctggcgcg 540
aaagagctta aaggctatat gactcgcgta tttgagcgcg actctttcct cgcttcttta 600
actgaagccg aacgtgaaat gcgtctcggt cggggctaa 639

<210> SEQ ID NO 20
<211> LENGTH: 204
<212> TYPE: DNA
<213> ORGANISM: Artificial Sequence
<220> FEATURE:
<223> OTHER INFORMATION: Synthetic polynucleotide

<400> SEQUENCE: 20
atgggtgaga ttagtattac caaactgctg gtagtcgcag cgctgattat cctggtgttt 60
ggtaccaaaa agttacgcac gctgggtgga gacctgggct cggctatcaa aggctttaaa 120
aaagccatga gcgatgacga tgacagtgcg aagaagacca gtgctgaaga agcgccggca 180
cagaagctct ctcataaaga gtaa 204

<210> SEQ ID NO 21
<211> LENGTH: 609
<212> TYPE: DNA
<213> ORGANISM: Artificial Sequence
<220> FEATURE:
<223> OTHER INFORMATION: Synthetic polynucleotide

<400> SEQUENCE: 21
atgaaagcgt taacgaccag gcagcaagag gtgtttgatc tcattcggga tcatatcagc 60
cagacgggca tgccgccgac gcgtgcggag attgctcagc gcttggggtt tcgctcccca 120
aacgcggcgg aagagcatct gaaagcgctg gcgcgtaaag gcgcaatcga gatcgtttcc 180
ggcgcctccc gcggtattcg tctgctgacg gaagaagaaa ccggtctgcc gcttattggc 240
cgcgtcgcgg caggtgagcc gctgctagcg cagcagcaca ttgaaggcca ctaccaggtg 300
gacccggcca tgtttaagcc gaacgccgat tttctgctgc gtgttagcgg tatgtcgatg 360
aaggatatcg gtattctcga tggcgacctg ctggctgtcc ataaaacgca ggatgtgcgc 420
aatggtcagg tggttgtggc gcgtatcgac gaagaagtga ccgtgaagcg tctgaaaaaa 480
cagggtaacg tcgtggaatt gctgccggaa aacagcgaat tctcgccgat cgtggtcgac 540
cttcgcgaac aaagctttac tattgaaggc ctggccgtcg gcgttatccg caacggcaac 600
tggcaataa 609

<210> SEQ ID NO 22
<211> LENGTH: 1245
<212> TYPE: DNA
<213> ORGANISM: Artificial Sequence
<220> FEATURE:
<223> OTHER INFORMATION: Synthetic polynucleotide

<400> SEQUENCE: 22
atgaacgatt atctgccggg cgaaaccgct ctctggcagc gcattgaagg ctcactgaag 60
caggtgcttg gtagctacgg ttacagcgaa atccgtttgc cgattgtaga gcagaccccg 120
ttattcaaac gcgctatcgg cgaagtgacc gacgtggttg aaaaagagat gtacaccttt 180
gaggaccgta acggcgatag cctgactcta cgtccggaag gcacggctgg ctgcgtacgc 240
gccggtatcg aacatggtct cctgtacaat caagaacagc gcctgtggta cattgggccg 300
atgttccgcc acgaacgtcc gcaaaaaggc cgctaccgtc agttccacca gattggcgcc 360
gaagcgtttg gcctgcaggg gccggatatc gatgccgagc tgattatgct gaccgcccgc 420
tggtggcgcg agctgggcat ctccggccac gttgcgctgg agctgaactc tatcggttcg 480
ctggaggctc gcgctaacta tcgcgacgcg ctggtggcct atcttgagca gtttaaagat 540
aagctggacg aagactgcaa acgccgcatg tacaccaacc cgctgcgcgt gctggattct 600
aaaaacccgg acgtccaggc gctgctgaac gacgccccga cgctgggcga ctatcttgat 660
gaagagtcca aaacgcattt tgccgggctg tgcgcgctgc tggatgatgc cggtattcgc 720
tataccgtga atcagcgtct ggtacgcggt ctcgactact acaaccgcac cgtgtttgag 780
tgggtcacca ccagcctcgg ttcccagggc accgtctgcg ccggaggccg ttacgatggt 840
ctggttgagc agcttggcgg tcgcgctacc cctggcgtcg gctttgcgat ggggctggaa 900
cgtcttgttt tactggttca ggcagtgaat ccggaattta aagccgatcc tgttgtcgat 960
atatacctgg tagcctccgg aactgacacc cagtccgcag caatgcgtct ggctgaacag 1020
gtacgcgatg cgttacccgg cgttaagctg atgaccaacc atggcggcgg caactttaag 1080
aagcagtttg cgcgcgctga taaatggggc gctcgcgttg cgctggtgct gggcgaatca 1140
gaaatcgccg acggaaacgt ggtagtgaaa gatttacgct caggtgagca aactaccgta 1200
acgcaggata gcgttgctgc gcatttgcgc acacttctgg gttaa 1245

<210> SEQ ID NO 23
<211> LENGTH: 1413
<212> TYPE: DNA
<213> ORGANISM: Artificial Sequence
<220> FEATURE:
<223> OTHER INFORMATION: Synthetic polynucleotide

<400> SEQUENCE: 23
atgaaaaaga ccaaaattgt ttgcaccatc ggtccgaaaa ccgaatccga agagatgttg 60
accaaaatgc tggacgcggg catgaacgtt atgcgtctga acttctctca cggtgactat 120
gcggaacacg gtcagcgcat ccagaatctg cgcaatgtga tgagtaaaac cggtaagaaa 180
gcggcaatcc tgctggacac caaaggtccg gaaatccgta ccattaagct ggaaggcggc 240
aacgacgtct ccctgaaagc gggccagacc ttcaccttca ccaccgataa atccgttgtc 300
ggtaataacg aaatcgttgc ggtgacctat gaaggcttca ccagcgacct gagcgttggc 360
aacacggtac tggttgacga tggtctgatc ggtatggaag tgaccgctat cgaaggcaac 420
aaagttgttt gtaaagtgct gaacaacggc gacctcggcg agaacaaagg cgttaacctg 480
ccgggcgtat ctatcgcgct gccggcgctg gctgaaaaag acaaacagga tctgatcttc 540
ggttgcgaac agggcgttga ctttgttgcg gcatccttta tccgtaagcg ttctgacgtt 600
gttgaaatcc gtgagcacct gaaagcccac ggcggcgaga agatccagat catctccaaa 660
atcgaaaacc aggaaggcct gaacaacttc gacgaaatcc tcgaagcctc tgacggcatc 720
atggtagccc gtggcgacct gggcgttgaa atcccggttg aagaagttat cttcgcgcag 780
aagatgatga tcgagaaatg tatccgcgcg cgtaaagtcg ttatcaccgc gacccagatg 840
ctggattcca tgatcaaaaa cccgcgtccg acccgtgcgg aagcaggcga cgtggccaac 900
gccatcctcg acggcaccga cgcagttatg ctgtccggcg aatccgcgaa aggtaaatac 960
ccgctggaag cggtcaccat catggcgacc atctgcgaac gtaccgaccg cgtcatgacc 1020
agccgtcttg agtacaacaa cgacaaccgt aagctgcgca tcaccgaagc ggtgtgccgc 1080
ggtgcggtag aaacggctga aaaactggaa gcgccgctga tcgttgtggc aacccagggc 1140
ggtaaatccg cgcgcgccgt acgtaaatac ttcccggatg ccactatcct ggcgctgacc 1200
accaacgaaa ccaccgcgcg tcagctggtg ctgagcaaag gcgttgtggc acagctggtt 1260
gaagatatct cctctaccga tgcgttctac atccagggta aagaactggc gctgcagagc 1320
ggtctggcgc gtaaaggcga cgtggttgtt atggtttccg gcgcgttagt cccgagcgga 1380
accaccaata ccgcttccgt gcacgtgctg taa 1413

<210> SEQ ID NO 24
<211> LENGTH: 351
<212> TYPE: DNA
<213> ORGANISM: Artificial Sequence
<220> FEATURE:
<223> OTHER INFORMATION: Synthetic polynucleotide

<400> SEQUENCE: 24
atgtatttaa gacccgatga ggtggcgcgt gttcttgaaa aagccggctt caccatggat 60
gttgtgacgc aaaaagcgta cggctatcgc cgtggcgata attatgttta tgtgaaccgt 120
gaagctcgta tggggcgtac cgcgttaatt attcatccgg ctttaaaaga gcgcagcaca 180
acgcttgcgg agcccgcgtc ggatatcaaa acctgcgatc attatgagca gttcccgctc 240
tatttagcgg gggatgctca acagcattat ggtattccac acgggttcag ttcgcgaatg 300
gcgcttgagc gttttctgag tggcctgttt ggcgaaacgc agtatagctg a 351

<210> SEQ ID NO 25
<211> LENGTH: 864
<212> TYPE: DNA
<213> ORGANISM: Artificial Sequence
<220> FEATURE:
<223> OTHER INFORMATION: Synthetic polynucleotide

<400> SEQUENCE: 25
atggatagcg acattaatca ggtcattgat tcttttgtta aaggcccggc ggtcgtggga 60
aagattcgct tttccaccga gaccaggccg gcttctgaga atgcgctatg cgtcgatttt 120
ccgcgcctcg aaatcatgct tgcgggtcag cttcacgatc cggcgattaa agccgatcgc 180
gcccagctca tgccgcacga tgtgctgtat attcccgctg gcggatggaa tgacccgcaa 240
tggctggcgc cctccactct gctcactatc ttatttggta aacagcagct ggaattcgtc 300
ctgcgccact gggacggcag cgcgcttaac gtgctggata aacagcaggt tccgcgccgc 360
ggtccccggg tcggctcttt tctgctgcag gcgctgaatg aaatgcagat gcagccgcgg 420
gagcagcaca cggcccgctt tattgtcacc agcctgctca gccactgtgc cgatctgctg 480
ggcagccagg tacaaacctc atcgcgcagc caggcgcttt ttgaagcgat tcgtaagcat 540
attgacgccc actttgccga cccgttaacc cgggagtcgg tggcgcaggc gttttacctc 600
tcgccaaact atctatccca cctgttccag aaatgcgggc caatgggctt taacgagtat 660
ctgaatcaca tccgcctgga gcaggccaga atgctgttaa aaggccacga tatgaaagtg 720
aaagatatcg cccacgcctg cggtttcgcc gacagcaact acttctgccg cctgtttcgc 780
aaaaacaccg aacgctcgcc gtcggagtat cgccgtcaat atcacagcca gctgacggaa 840
aaaacagccc cggcaaaaaa ctag 864

<210> SEQ ID NO 26
<211> LENGTH: 735
<212> TYPE: DNA
<213> ORGANISM: Artificial Sequence
<220> FEATURE:
<223> OTHER INFORMATION: Synthetic polynucleotide

<400> SEQUENCE: 26
atgagttttg aaggaaaaat cgcgctggtt accggtgcaa gtcgcgggat tggccgcgca 60
atcgctgaaa cgctcgttgc ccgtggcgcg aaagttatcg ggactgcgac cagcgaaagc 120
ggcgcgcagg cgatcagcga ttatttaggt gctaacggta aaggtctgct gctgaatgtg 180
accgatcctg catctattga atctgttctg ggaaatattc gcgcagaatt tggtgaagtt 240
gatatcctgg tgaacaatgc cgggatcact cgtgataacc tgttaatgcg catgaaagat 300
gatgagtgga acgatattat cgaaaccaac ctgtcatctg ttttccgtct gtcaaaagcg 360
gtaatgcgcg ctatgatgaa aaagcgtcat ggacgtatta tcactatcgg ttctgtggtt 420
ggtaccatgg gaaatgcggg tcaggccaac tacgctgcgg cgaaagcggg tctgattggc 480
ttcagtaaat cactggctcg cgaagttgcg tcccgcggta ttactgtaaa cgttgttgct 540
ccgggcttta ttgaaacgga catgacgcgt gcgctgaccg atgagcagcg tgcgggtacg 600
ctggcggcag ttcctgcggg gcgcctcggc tctccaaatg aaatcgccag tgcggtggca 660
tttttagcct ctgacgaagc gagttacatc accggtgaaa ctctgcacgt caacggcgga 720
atgtatatgg tctga 735

<210> SEQ ID NO 27
<211> LENGTH: 71
<212> TYPE: DNA
<213> ORGANISM: Artificial Sequence
<220> FEATURE:
<223> OTHER INFORMATION: Synthetic oligonucleotide

<400> SEQUENCE: 27
atgcccggct cgtctcgtaa ggtaccggca tggttgccga tactggttat tttaatcgcc 60
atgatttcca t 71

<210> SEQ ID NO 28
<211> LENGTH: 2355
<212> TYPE: DNA
<213> ORGANISM: Artificial Sequence
<220> FEATURE:
<223> OTHER INFORMATION: Synthetic polynucleotide

<400> SEQUENCE: 28
atgaatcctg agcgttctga acgcattgaa atccccgtat tgccgttgcg cgatgtggtg 60
gtttatccgc acatggtcat acccctgttt gtagggcggg aaaaaatctat ccgttgtctc 120 gaagcagcca tggaccatga taaaaaaatc atgctggttg cgcagaaaga agcctcgacg 180
gatgagccgg gtgtaaacga tcttttcacc gtcgggaccg tggcgtctat tttgcaaatg 240
ctgaagctac cggacggtac tgttaaagtg ctggtcgaag gtttgcagcg cgcgcgcatc 300
tctgcgctgt ctgataatgg cgaacatttt tcggcgaagg cggaatacct tgaatcgccg 360
gcgattgacg aacgcgagca ggaagtgctg gttcgtaccg ctatcagcca gtttgaaggc 420
tacatcaagc tgaacaaaaa aatccctccg gaagtgctga cgtcgctgaa tagcatcgac 480
gatccggcgc gtctggcgga taccatcgct gcgcatatgc cgctgaagct ggcggacaaa 540
cagtccgtgc tggagatgtc cgacgttaac gagcgtctgg aatatctgat ggcgatgatg 600
gagtcggaaa tcgatctgct gcaggtggag aagcgtattc gcaaccgcgt gaaaaagcag 660
atggagaaat ctcagcgcga gtactatctg aatgagcaaa tgaaagccat tcaaaaagag 720
ctcggcgaga tggacgacgc cccggacgag aacgaagcgc tgaagcgtaa gatcgacgcg 780
gcgaaaatgc cgaaagaggc aaaagagaaa accgaagcgg aactgcaaaa actgaaaatg 840
atgtccccga tgtcggcgga agcgaccgtc gttcgcggct acatcgactg gatggtgcag 900

```
gtaccgtgga acgctcgcag caaggttaaa aaagacctgc gtcaggctca ggagatcctc    960

gataccgatc actacggcct tgagcgcgtg aaggatcgca ttcttgagta cctcgcggtg   1020

cagagccgtg ttaacaagct caaagggccg atcctgtgcc tggttgggcc tccgggggta   1080

ggtaaaacct ctctcggcca atccatcgcc aaagcaactg gacgcaaata tgtgcgtatg   1140

gcgctgggcg gcgtgcgtga tgaagcggaa atccgcggtc accgccgtac ctatattggc   1200

tcaatgccgg gcaaactgat ccagaaaatg gctaaagtgg gcgttaaaaa cccgctgttc   1260

ttgctggatg agatcgacaa gatgtcttct gacatgcgcg gcgatccggc ctcggcgctg   1320

ctggaggtgt tggatccgga acagaacgtg gcctttaacg accactatct ggaagtggat   1380

tacgatctca gcgacgtgat gttcgttgcg acctctaact ccatgaacat cccggcgccg   1440

ctgctggatc gtatggaagt gatccgcctc tccggctata ccgaagatga gaagctaaac   1500

atcgccaaac gccatctgct gtcaaaacag attgagcgta acgcgctcaa gaaaggcgag   1560

ctgacggtgg atgacagcgc gattatcggc atcattcgct actacacccg tgaagcaggc   1620

gtgcgtggtc tggagcgtga aatctcgaaa ctgtgccgca aagcggtgaa acagctgctg   1680

ctggataagt cgctgaaaca catcgagatt aacggcgaca acctgcacga tttccttggc   1740

gtgcagcgct acgactatgg tcgtgcggat agcgaaaacc gcgtaggtca ggtgaccgga   1800

ctggcgtgga cggaagtggg cggcgatctg ctgaccattg aaaccgcctg cgttccgggt   1860

aaaggcaaac tgacctacac cggttcactg ggtgaagtca tgcaggaatc catccaggcg   1920

gcgctgacgg tggttcgttc acgtgcggat aagctgggta ttaactcaga cttttacgaa   1980

aaacgtgata ttcacgttca cgtgccggaa ggcgcgacgc cgaaggatgg tccaagcgcc   2040

ggtatcgcga tgtgcaccgc gctggtttcc tgtctgacgg gtaatccggt acgcgccgac   2100

gtggcgatga ccggtgagat taccctccgt ggccaggtat tgccgattgg tggtctgaag   2160

gaaaaactgt tggccgcgca tcgcggcggc attaagactg ttctgattcc tgatgaaaat   2220

aaacgcgacc ttgaagaaat tccggataac gttatcgccg atttagatat ccatccggtg   2280

aaacgaatcg aggaagttct ggcacttgcg ctacagaacg aaccgtttgg aatggaagtc   2340

gtcacggcaa aatag                                                    2355
```

<210> SEQ ID NO 29
<211> LENGTH: 393
<212> TYPE: DNA
<213> ORGANISM: Artificial Sequence
<220> FEATURE:
<223> OTHER INFORMATION: Synthetic polynucleotide

<400> SEQUENCE: 29

```
atggctgaaa atcaatacta cggcaccggt cgccgcaaaa gttccgcagc tcgcgttttc     60

atcaaaccgg gcaacggtaa aatcgttatc aaccagcgtt ctctggaaca gtacttcggt    120

cgtgaaactg cccgcatggt agttcgtcag ccgctggaac tggtcgacat ggttgagaaa    180

ttagatctgt acatcaccgt taaaggtggt ggtatctctg gtcaggctgg tgcgatccgt    240

cacggtatca cccgcgctct gatggagtac gacgagtccc tgcgtggcga actgcgtaaa    300

gctggtttcg ttactcgtga tgctcgtcag gttgaacgta agaaagtcgg cctgcgtaaa    360

gcacgtcgtc gtcctcagtt ctccaaacgt taa                                 393
```

<210> SEQ ID NO 30
<211> LENGTH: 789
<212> TYPE: DNA
<213> ORGANISM: Artificial Sequence
<220> FEATURE:
<223> OTHER INFORMATION: Synthetic polynucleotide

<400> SEQUENCE: 30
atgtttgttg ctgccggaca atttgccgta acgccggact ggacgggaaa cgcgcagacc 60
tgcgtcagca tgatgcgcca ggccgcggag cgggggggcgt cgcttctggt tctgcctgag 120
gcgttgctgg cgcgagacga taacgatgcg gatttatcgg ttaaatccgc ccagcagctg 180
gatggcggct tcttacagct cttgctggcg gagagcgaaa acagcgcttt gacgacggtg 240
ctgaccctgc atatcccttc cggcgaaggt cgagcgacga atacgctggt ggccctgcgt 300
caggggaaga ttgtggcgca atatcagaaa ctgcatctct atgatgcgtt caatatccag 360
gaatccaggc tggtcgatgc cgggcggcaa attccgccgc tgatcgaagt cgacgggatg 420
cgcgtcgggc tgatgacctg ctacgattta cgtttccctg agctggcgct gtcgttagcg 480
ctcagcggcg cgcagctcat agtgttgcct gccgcgtggg taaaagggcc gctgaaggaa 540
catcactggg cgacgctgct ggcggcgcgg gcgctggata caacctgcta tattgtcgcc 600
gcaggagagt gcgggacgcg taatatcggt caaagccgta ttatcgaccc cttagggaca 660
acgcttgccg ggcgggaga gcggccgcag ttgatttttg ccgaactttc agctgattat 720
attcagcagg tacgcgagcg cctgccggtg ttgcgcaatc gccgctttgc gccaccgcaa 780
ttattatga 789

<210> SEQ ID NO 31
<211> LENGTH: 369
<212> TYPE: DNA
<213> ORGANISM: Artificial Sequence
<220> FEATURE:
<223> OTHER INFORMATION: Synthetic polynucleotide

<400> SEQUENCE: 31
atggccaata ataccactgg gttaacccga attattaaag cggccgggta ttcctggaaa 60
ggattccgtg cggcgtgggt caatgaggcc gcatttcgtc aggaaggcat cgcggccgtt 120
attgccgtgg cgatcgcctg ctggttggac gtcgatgcca tcacgcgggt gctgctcatt 180
agctcggtcc tgttagtgat gatagttgaa attatcaata gcgcgattga ggcggtggtt 240
gaccgtatcg gtcccgagca tcatgagctt tcggggcgag cgaaagatat gggatcggcg 300
gcggtactgc tggcgattat catcgcgctg atcgcgtggg gaacgctgct gtgggcgaac 360
taccgctaa 369

<210> SEQ ID NO 32
<211> LENGTH: 1122
<212> TYPE: DNA
<213> ORGANISM: Artificial Sequence
<220> FEATURE:
<223> OTHER INFORMATION: Synthetic polynucleotide

<400> SEQUENCE: 32
atgcataacc aggctccgat tcaacgtaga aaatcaaaac gaatttacgt tgggaatgtg 60
ccgattggcg atggcgcccc catcgccgta cagtcgatga caaacacgcg caccaccgat 120
gtggcggcga cggtaaatca aattaaagcc ctcgagcgcg ttggcgcgga tatcgtgcgc 180
gtttcggtgc cgacgatgga tgcggcggaa gcgttcaaac ttatcaaaca gcaggttaac 240
gtcccgctgg ttgccgatat ccacttcgat taccgcattg cgctgaaggt agcggaatac 300
ggcgttgatt gcctgcgtat taacccgggc aatatcggca acgaagagcg tatccgcatg 360
gtggtggact gcgctcgcga taaaaatatt cctatccgta tcggggtaaa cgccggttct 420
ctggaaaaag atctccagga aaaatacggc gaaccgactc cgcaggcgct gctggaatcg 480
gcaatgcgcc atgttgatca tctcgatcgt ctcaacttcg atcagtttaa agtcagcgta 540
aaagcctccg atgtgttcct cgcggttgaa tcctatcgcc tgttggcgaa acagatcgat 600
cagcctctgc acctcgggat caccgaagcg ggcggcgcgc gcagcggcgc ggtgaagtcc 660
gcgatcggcc tcggcctgct gctgtctgaa gggattggcg atacgctgcg cgtctctctg 720
gcggcggatc ccgttgaaga gatcaaagtg ggcttcgata ttctcaagtc gctgcgtatt 780
cgctctcgcg ggatcaactt tattgcctgc ccgacctgtt cacgtcagga gtttgacgtt 840
atcggtaccg ttaacgcgct ggagcagcgc ctggaagata tcattacgcc gatggatatt 900
tcgatcattg gctgcgtggt aaacggtccc ggcgaggcgc tggtttccac cctcggcgta 960
accggcggca ataagaaaag cggcctgtac gaagacggcg tacgtaaaga caggctggat 1020
aacgacgata tgatcgatca gctggaagcg cgtattcgcg ctaaagcatc gatgctggat 1080
gaggcgcgtc gtatcgatat ccagcaggtt gaagcgaaat aa 1122

<210> SEQ ID NO 33
<211> LENGTH: 876
<212> TYPE: DNA
<213> ORGANISM: Artificial Sequence
<220> FEATURE:
<223> OTHER INFORMATION: Synthetic polynucleotide

<400> SEQUENCE: 33
atgagccata ttcaacggga aacgtcttgc tccaggccgc gattaaattc caacatggat 60
gctgatttat atgggtataa atgggctcgc gataatgtcg ggcaatcagg tgcgacaatc 120
tatcgattgt atgggaagcc cgatgcgcca gagttgtttc tgaaacatgg caaaggtagc 180
gttgccaatg atgttacaga tgagatggtc agactaaact ggctgacgga atttatgcct 240
cttccgacca tcaagcattt tatccgtact cctgatgatg catggttact caccactgcg 300
atccccggga aaacagcatt ccaggtatta gaagaatatc ctgattcagg tgaaaatatt 360
gttgatgcgc tggcagtgtt cctgcgccgg ttgcattcga ttcctgtttg taattgtcct 420
tttaacagcg atcgcgtatt tcgtctcgct caggcgcaat cacgaatgaa taacggtttg 480
gttgatgcga gtgattttga tgacgagcgt aatggctggc ctgttgaaca agtctggaaa 540
gaaatgcata agcttttgcc attctcaccg gattcagtcg tcactcatgg tgatttctca 600
cttgataacc ttatttttga cgaggggaaa ttaataggtt gtattgatgt tggacgagtc 660
ggaatcgcag accgatacca ggatcttgcc atcctatgga actgcctcgg tgagttttct 720
ccttcattac agaaacggct ttttcaaaaa tatggtattg ataatcctga tatgaataaa 780
ttgcagtttc atttgatgct cgatgagttt ttctaataag cctgcctggt tctgcgtttc 840
ccgctcttta ataccctgac cggaggtgag caatga 876

<210> SEQ ID NO 34
<211> LENGTH: 1491
<212> TYPE: DNA
<213> ORGANISM: Artificial Sequence
<220> FEATURE:
<223> OTHER INFORMATION: Synthetic polynucleotide

<400> SEQUENCE: 34
atgagcatca cggcgttatc agcatcattt cctgagggga atatcgccag ccgcttgtcg 60
ctgcaacatc cttcactgtt ttataccgtg gttgaacaat cttcggtggc gagcgtgttg 120

```
agtcatcctg actagctgag atgagggctc gccccctcgt cccgacactt ccagatcgcc    180

atagcgcaca gcgcctcgag cggtggtaac ggcgcagtgg cggttttcat ggcttgttat    240

gactgttttt ttggggtaca gtctatgcct cgggcatcca agcagcaagc gcgttacgcc    300

gtgggtcgat gtttgatgtt atggagcagc aacgatgtta cgcagcaggg cagtcgccct    360

aaaacaaagt taaacatcat gagggaagcg gtgatcgccg aagtatcgac tcaactatca    420

gaggtagttg gcgtcatcga gcgccatctc gaaccgacgt tgctggccgt acatttgtac    480

ggctccgcag tggatggcgg cctgaagcca cacagtgata ttgatttgct ggttacggtg    540

accgtaaggc ttgatgaaac aacgcggcga gctttgatca acgacctttt ggaaacttcg    600

gcttcccctg gagagagcga gattctccgc gctgtagaag tcaccattgt tgtgcacgac    660

gacatcattc cgtggcgtta tccagctaag cgcgaactgc aatttggaga atggcagcgc    720

aatgacattc ttgcaggtat cttcgagcca gccacgatcg acattgatct ggctatcttg    780

ctgacaaaag caagagaaca tagcgttgcc ttggtaggtc cagcggcgga ggaactcttt    840

gatccggttc ctgaacagga tctatttgag gcgctaaatg aaaccttaac gctatggaac    900

tcgccgcccg actgggctgg cgatgagcga aatgtagtgc ttacgttgtc ccgcatttgg    960

tacagcgcag taaccggcaa aatcgcgccg aaggatgtcg ctgccgactg ggcaatggag   1020

cgcctgccgg cccagtatca gcccgtcata cttgaagcta gacaggctta tcttggacaa   1080

gaagaagatc gcttggcctc gcgcgcagat cagttggaag aatttgtcca ctacgtgaaa   1140

ggcgagatca ccaaggtagt cggcaaataa tgtctaacaa ttcgttcaag ccgacgccgc   1200

ttcgcggcgc ggcttaactc aagcgttaga tgcactaagc acataattgc tcacagccaa   1260

actatcaggt caagtctgct tttattattt ttaagcgtgc ataataagcc ctacacaaat   1320

ggtacccgac cggtggtgaa tttaatctcg ctgacgtgta gacattccct tatccagacg   1380

ctgatcgccc atcatcgcgg ttctttagat ctctcggtcc gccctgatgg cggcaccttg   1440

ctgacgttac gcctgccggt acagcaggtt atcaccggag gcttaaaatg a            1491
```

<210> SEQ ID NO 35
<211> LENGTH: 1021
<212> TYPE: DNA
<213> ORGANISM: Artificial Sequence
<220> FEATURE:
<223> OTHER INFORMATION: Synthetic polynucleotide

<400> SEQUENCE: 35

```
ctgatccttc aactcagcaa aagttcgatt tattcaacaa agccacgttg tgtctcaaaa     60

tctctgatgt tacattgcac aagataaaaa tatatcatca tgaacaataa aactgtctgc    120

ttacataaac agtaatacaa ggggtgttat gagccatatt caacgggaaa cgtcttgctc    180

caggccgcga ttaaattcca acatggatgc tgatttatat gggtataaat gggctcgcga    240

taatgtcggg caatcaggtg cgacaatcta tcgattgtat gggaagcccg atgcgccaga    300

gttgtttctg aaacatggca aaggtagcgt tgccaatgat gttacagatg agatggtcag    360

actaaactgg ctgacggaat ttatgcctct tccgaccatc aagcatttta tccgtactcc    420

tgatgatgca tggttactca ccactgcgat ccccgggaaa acagcattcc aggtattaga    480

agaatatcct gattcaggtg aaaatattgt tgatgcgctg gcagtgttcc tgcgccggtt    540

gcattcgatt cctgtttgta attgtccttt taacagcgat cgcgtatttc gtctcgctca    600

ggcgcaatca cgaatgaata acggtttggt tgatgcgagt gattttgatg acgagcgtaa    660
```

tggctggcct gttgaacaag tctggaaaga aatgcataag cttttgccat tctcaccgga 720
ttcagtcgtc actcatggtg atttctcact tgataacctt atttttgacg aggggaaatt 780
aataggttgt attgatgttg gacgagtcgg aatcgcagac cgataccagg atcttgccat 840
cctatggaac tgcctcggtg agttttctcc ttcattacag aaacggcttt ttcaaaaata 900
tggtattgat aatcctgata tgaataaatt gcagtttcat ttgatgctcg atgagttttt 960
ctaataagcc ttgaccctac gattcccgct atttcattca ctgaccggag gttcaaaatg 1020
a 1021

<210> SEQ ID NO 36
<211> LENGTH: 1071
<212> TYPE: DNA
<213> ORGANISM: Artificial Sequence
<220> FEATURE:
<223> OTHER INFORMATION: Synthetic polynucleotide

<400> SEQUENCE: 36
atgaagatag caacaatgaa aacaggtctg ggagcgttgg ctcttcttcc ctgatccttc 60
aactcagcaa aagttcgatt tattcaacaa agccacgttg tgtctcaaaa tctctgatgt 120
tacattgcac aagataaaaa tatatcatca tgaacaataa aactgtctgc ttacataaac 180
agtaatacaa ggggtgttat gagccatatt caacgggaaa cgtcttgctc ccgtccgcgc 240
ttaaactcca acatggacgc tgatttatat gggtataaat gggctcgcga taatgtcggg 300
caatcaggtg cgacaatcta tcgcttgtat gggaagcccg atgcgccaga gttgtttctg 360
aaacatggca aaggtagcgt tgccaatgat gttacagatg agatggtccg tctcaactgg 420
ctgacggagt ttatgcctct cccgaccatc aagcatttta tccgtactcc tgatgatgcg 480
tggttactca ccaccgcgat tcctgggaaa acagccttcc aggtattaga agaatatcct 540
gattcaggtg aaaatattgt tgatgcgctg gccgtgttcc tgcgccggtt acattcgatt 600
cctgtttgta attgtccttt taacagcgat cgtgtatttc gtcttgctca ggcgcaatca 660
cgcatgaata acggtttggt tgatgcgagt gattttgatg acgagcgtaa tggctggcct 720
gttgaacaag tctggaaaga aatgcacaag ctcttgccat tctcaccgga ttcagtcgtc 780
actcatggtg atttctcact tgataacctt atttttgacg aggggaaatt aataggttgt 840
attgatgttg gacgggtcgg aatcgcagac cgttaccagg accttgccat tctttggaac 900
tgcctcggtg agttttctcc ttcattacag aaacggcttt ttcaaaaata tggtattgat 960
aatcctgata tgaataaatt gcagtttcat ttgatgctcg atgagttttt ctaataagcc 1020
tgtgaagggc tggacgtaaa cagccacggc gaaaacgcct acaacgcctg a 1071

<210> SEQ ID NO 37
<211> LENGTH: 1071
<212> TYPE: DNA
<213> ORGANISM: Artificial Sequence
<220> FEATURE:
<223> OTHER INFORMATION: Synthetic polynucleotide

<400> SEQUENCE: 37
atgaccctga atatgatgct cgataacgcc gtacccgagg cgattgccgg ctgatccttc 60
aactcagcaa aagttcgatt tattcaacaa agccacgttg tgtctcaaaa tctctgatgt 120
tacattgcac aagataaaaa tatatcatca tgaacaataa aactgtctgc ttacataaac 180
agtaatacaa ggggtgttat gagccatatt caacgggaaa cgtcttgctc ccgtccgcgc 240
ttaaactcca acatggacgc tgatttatat gggtataaat gggctcgcga taatgtcggg 300
caatcaggtg cgacaatcta tcgcttgtat gggaagcccg atgcgccaga gttgtttctg 360
aaacatggca aaggtagcgt tgccaatgat gttacagatg agatggtccg tctcaactgg 420
ctgacggagt ttatgcctct cccgaccatc aagcatttta tccgtactcc tgatgatgcg 480
tggttactca ccaccgcgat tcctgggaaa acagccttcc aggtattaga agaatatcct 540
gattcaggtg aaaatattgt tgatgcgctg gccgtgttcc tgcgccggtt acattcgatt 600
cctgtttgta attgtccttt taacagcgat cgtgtatttc gtcttgctca ggcgcaatca 660
cgcatgaata acggtttggt tgatgcgagt gattttgatg acgagcgtaa tggctggcct 720
gttgaacaag tctggaaaga aatgcacaag ctcttgccat tctcaccgga ttcagtcgtc 780
actcatggtg atttctcact tgataacctt atttttgacg aggggaaatt aataggttgt 840
attgatgttg gacgggtcgg aatcgcagac cgttaccagg accttgccat tctttggaac 900
tgcctcggtg agttttctcc ttcattacag aaacggcttt ttcaaaaata tggtattgat 960
aatcctgata tgaataaatt gcagtttcat ttgatgctcg atgagttttt ctaataagcc 1020
ttggttctgc gtttcccgct ctttaatacc ctgaccggag gtgagcaatg a 1071

<210> SEQ ID NO 38
<211> LENGTH: 426
<212> TYPE: DNA
<213> ORGANISM: Artificial Sequence
<220> FEATURE:
<223> OTHER INFORMATION: Synthetic polynucleotide

<400> SEQUENCE: 38
atgaccctga atatgatgat ggatgccggc ggacatcatc gcgacaaaca atattaatac 60
cggcaaccac accggcaatt tacgagactg cgcaggcatc ctttctcccg tcaatttctg 120
tcaaataaag taaaagaggc agtctacttg aattaccccc ggctggttga gcgtttgttg 180
aaaaaaagta actgaaaaat ccgtagaata gcgccactct gatggttaat taacctattc 240
aattaagaat tatctggatg aatgtgccat taaatgcgca gcataatggt gcgttgtgcg 300
ggaaaactgc tttttttttga aagggttggt cagtagcgga aacaactcac ttcacacccc 360
gaagggggaa gttgcctgac cctacgattc ccgctatttc attcactgac cggaggttca 420
aaatga 426

<210> SEQ ID NO 39
<211> LENGTH: 446
<212> TYPE: DNA
<213> ORGANISM: Artificial Sequence
<220> FEATURE:
<223> OTHER INFORMATION: Synthetic polynucleotide

<400> SEQUENCE: 39
atgaccctga atatgatgat ggatgccggc tcaccacggc gataaccata ggttttcggc 60
gtggccacat ccatggtgaa tcccactttt tccagcacgc gcgccacttc atcgggtctt 120
aaatacatag attttcctcg tcatctttcc aaagcctcgc caccttacat gactgagcat 180
ggaccgtgac tcagaaaatt ccacaaacga acctgaaagg cgtgattgcc gtctggcctt 240
aaaaattatg gtctaaacta aaatttacat cgaaaacgag ggaggatcct atgtttaaca 300
aaccgaatcg ccgtgacgta gatgaaggtg ttgaggatat taaccacgat gttaaccagc 360
tcgaactcac ttcacacccc gaagggggaa gttgcctgac cctacgattc ccgctatttc 420
attcactgac cggaggttca aaatga 446

<210> SEQ ID NO 40
<211> LENGTH: 452
<212> TYPE: DNA
<213> ORGANISM: Artificial Sequence
<220> FEATURE:
<223> OTHER INFORMATION: Synthetic polynucleotide

<400> SEQUENCE: 40
atgaccctga atatgatgat ggatgccggc tgacgaggca ggttacatca ctggtgaaac 60
cctgcacgtc aatggcggaa tgtatatggt ttaaccacga tgaaaattat ttgcgttatt 120
agggcgaaag gcctcaaaat agcgtaaaat cgtggtaaga actgccggga tttagttgca 180
aatttttcaa cattttatac actacgaaaa ccatcgcgaa agcgagtttt gataggaaat 240
ttaagagtat gagcactatc gaagaacgcg ttaagaaaat tatcggcgaa cagctgggcg 300
ttaagcagga agaagttacc aacaatgctt ccttcgttga agacctgggc gctgattctc 360
ttgacaccga actcacttca caccccgaag gggaagttg cctgacccta cgattcccgc 420
tatttcattc actgaccgga ggttcaaaat ga 452

<210> SEQ ID NO 41
<211> LENGTH: 461
<212> TYPE: DNA
<213> ORGANISM: Artificial Sequence
<220> FEATURE:
<223> OTHER INFORMATION: Synthetic polynucleotide

<400> SEQUENCE: 41
atgaccctga atatgatgat ggatgccggc cgtcctgtaa taataaccgg acaattcgga 60
ctgattaaaa aagcgccctt gtggcgcttt ttttatattc ccgcctccat ttaaaataaa 120
aaatccaatc ggatttcact atttaaactg gccattatct aagatgaatc cgatggaagc 180
tcgctgtttt aacacgcgtt ttttaacctt ttattgaaag tcggtgcttc tttgagcgaa 240
cgatcaaatt taagtggatt cccatcaaaa aaatattctc aacctaaaaa agtttgtgta 300
atacttgtaa cgctacatgg agattaactc aatctagagg gtattaataa tgaatcgtac 360
taaactggta ctgggcgcaa ctcacttcac accccgaagg gggaagttgc ctgaccctac 420
gattcccgct atttcattca ctgaccggag gttcaaaatg a 461

<210> SEQ ID NO 42
<211> LENGTH: 463
<212> TYPE: DNA
<213> ORGANISM: Artificial Sequence
<220> FEATURE:
<223> OTHER INFORMATION: Synthetic polynucleotide

<400> SEQUENCE: 42
atgaccctga atatgatgat ggatgccggc atattgacac catgacgcgc gtaatgctga 60
ttggttctgt gacgctggta atgattgtcg aaattctgaa cagtgccatc gaagccgtag 120
tagaccgtat tggtgcagaa ttccatgaac tttccgggcg ggcgaaggat atggggtcgg 180
cggcggtgct gatgtccatc ctgctggcga tgtttacctg gatcgcatta ctctggtcac 240
attttcgata acgcttccag aattcgataa cgccctggtt ttttgcttaa atttggttcc 300
aaaatcgcct ttagctgtat atactcacag cataactgta tatacaccca gggggcggga 360
tgaaagcatt aacggccagg aactcacttc acaccccgaa gggggaagtt gcctgaccct 420
acgattcccg ctatttcatt cactgaccgg aggttcaaaa tga 463

<210> SEQ ID NO 43
<211> LENGTH: 428
<212> TYPE: DNA
<213> ORGANISM: Artificial Sequence
<220> FEATURE:
<223> OTHER INFORMATION: Synthetic polynucleotide

<400> SEQUENCE: 43
atgaccctga atatgatgat ggatgccggc atcatattgc gctccctggt tatcatttgt 60
tactaaatga aatgttataa tataacaatt ataaatacca catcgctttc aattcaccag 120
ccaaatgaga ggagcgccgt ctgacatagc cagcgctata aaacatagca ttatctatat 180
gtttatgatt aataactgat ttttgcgttt tggatttggc tgtggcatcc ttgccgctct 240
tttcgcagcg tctgcgtttt tgccctccgg tcagggcatt taagggtcag caatgagttt 300
ttacgcaatt acgattcttg ccttcggcat gtcgatggat gctttaactc acttcacacc 360
ccgaaggggg aagttgcctg accctacgat tcccgctatt tcattcactg accggaggtt 420
caaaatga 428

<210> SEQ ID NO 44
<211> LENGTH: 452
<212> TYPE: DNA
<213> ORGANISM: Artificial Sequence
<220> FEATURE:
<223> OTHER INFORMATION: Synthetic polynucleotide

<400> SEQUENCE: 44
atgaccctga atatgatgat ggatgccggc cgcgtcaggt tgaacgtaaa aaagtcggtc 60
tgcgcaaagc acgtcgtcgt ccgcagttct ccaaacgtta attggtttct gcttcggcag 120
aacgattggc gaaaaaaccc ggtgcgaacc gggttttttt atggataaag atcgtgttat 180
ccacagcaat ccattgatta tctcttcttt ttcagcattt ccagaatccc ctcaccacaa 240
agcccgcaaa atctggtaaa ctatcatcca attttctgcc caaatggctg ggattgttca 300
ttttttgttt gccttacaac gagagtgaca gtacgcgcgg gtagttaact caacatctga 360
ccggtcgata actcacttca caccccgaag gggaagttg cctgacccta cgattcccgc 420
tatttcattc actgaccgga ggttcaaaat ga 452

<210> SEQ ID NO 45
<211> LENGTH: 410
<212> TYPE: DNA
<213> ORGANISM: Artificial Sequence
<220> FEATURE:
<223> OTHER INFORMATION: Synthetic polynucleotide

<400> SEQUENCE: 45
atgaccctga atatgatgat ggatgccggc cctgtatgaa gatggcgtgc gcaaagatcg 60
cctggataac agcgatatga ttagccagct tgaagcccgc attcgcgcga aagcgtcaat 120
gctggacgaa gcgcgtcgta tcgatgtgca acaggtagaa aaataaggtt gctgggaagc 180
ggcaggcttc ccgtgtatga tgaacccgcc cggcgcgacc cgttgttcgt cgcggccccg 240
agggttcatt ttttgtatta ataaagagaa taaacgtggc aaaaaatatt caagccattc 300
gcggcatgaa cgattatctg cctggcgaac tcacttcaca ccccgaaggg ggaagttgcc 360
tgaccctacg attcccgcta tttcattcac tgaccggagg ttcaaaatga 410

<210> SEQ ID NO 46
<211> LENGTH: 1071
<212> TYPE: DNA

<213> ORGANISM: Artificial Sequence
<220> FEATURE:
<223> OTHER INFORMATION: Synthetic polynucleotide

<400> SEQUENCE: 46
atgaaaaaga ttgatgcgat tattaaacct ttcaaactgg atgacgtgcg ctgatccttc 60
aactcagcaa aagttcgatt tattcaacaa agccacgttg tgtctcaaaa tctctgatgt 120
tacattgcac aagataaaaa tatatcatca tgaacaataa aactgtctgc ttacataaac 180
agtaatacaa ggggtgttat gagccatatt caacgggaaa cgtcttgctc ccgtccgcgc 240
ttaaactcca acatggacgc tgatttatat gggtataaat gggctcgcga taatgtcggg 300
caatcaggtg cgacaatcta tcgcttgtat gggaagcccg atgcgccaga gttgtttctg 360
aaacatggca aaggtagcgt tgccaatgat gttacagatg agatggtccg tctcaactgg 420
ctgacggagt ttatgcctct cccgaccatc aagcatttta tccgtactcc tgatgatgcg 480
tggttactca ccaccgcgat tcctgggaaa acagccttcc aggtattaga agaatatcct 540
gattcaggtg aaaatattgt tgatgcgctg gccgtgttcc tgcgccggtt acattcgatt 600
cctgtttgta attgtccttt taacagcgat cgtgtatttc gtcttgctca ggcgcaatca 660
cgcatgaata acggtttggt tgatgcgagt gattttgatg acgagcgtaa tggctggcct 720
gttgaacaag tctggaaaga aatgcacaag ctcttgccat tctcaccgga ttcagtcgtc 780
actcatggtg atttctcact tgataacctt atttttgacg aggggaaatt aataggttgt 840
attgatgttg gacgggtcgg aatcgcagac cgttaccagg accttgccat tctttggaac 900
tgcctcggtg agttttctcc ttcattacag aaacggcttt ttcaaaaata tggtattgat 960
aatcctgata tgaataaatt gcagtttcat ttgatgctcg atgagttttt ctaataagcc 1020
tcgcgcgtga ttcgtatccg caccggcgaa gaagacgacg cggcgattta a 1071

<210> SEQ ID NO 47
<211> LENGTH: 1295
<212> TYPE: DNA
<213> ORGANISM: Artificial Sequence
<220> FEATURE:
<223> OTHER INFORMATION: Synthetic polynucleotide

<400> SEQUENCE: 47
atgaccatga acctgatgac ggatgtcgtc tcagccaccg ggatcgccgg gttgctttca 60
cgacaacacc cgacgctgtt ttttacacta attgaacagg cccccgtggc gatcacgctg 120
acggataccg ctgcccgcat tgtctatgcc aacccgggcg tgttgagtca tcctgactag 180
ctgagatgag ggctcgcctg atccttcaac tcagcaaaag ttcgatttat tcaacaaagc 240
cacgttgtgt ctcaaaatct ctgatgttac attgcacaag ataaaaatat atcatcatga 300
acaataaaac tgtctgctta cataaacagt aatacaaggg gtgttatgag ccatattcaa 360
cgggaaacgt cttgctccag gccgcgatta aattccaaca tggatgctga tttatatggg 420
tataaatggg ctcgcgataa tgtcgggcaa tcaggtgcga caatctatcg attgtatggg 480
aagcccgatg cgccagagtt gtttctgaaa catggcaaag gtagcgttgc caatgatgtt 540
acagatgaga tggtcagact aaactggctg acggaattta tgcctcttcc gaccatcaag 600
cattttatcc gtactcctga tgatgcatgg ttactcacca ctgcgatccc cgggaaaaca 660
gcattccagg tattagaaga atatcctgat tcaggtgaaa atattgttga tgcgctggca 720
gtgttcctgc gccggttgca ttcgattcct gtttgtaatt gtccttttaa cagcgatcgc 780
gtatttcgtc tcgctcaggc gcaatcacga atgaataacg gtttggttga tgcgagtgat 840
tttgatgacg agcgtaatgg ctggcctgtt gaacaagtct ggaaagaaat gcataagctt 900
ttgccattct caccggattc agtcgtcact catggtgatt tctcacttga taaccttatt 960
tttgacgagg ggaaattaat aggttgtatt gatgttggac gagtcggaat cgcagaccga 1020
taccaggatc ttgccatcct atggaactgc ctcggtgagt tttctccttc attacagaaa 1080
cggctttttc aaaaatatgg tattgataat cctgatatga ataaattgca gtttcatttg 1140
atgctcgatg agtttttcta ataagcctga ccggtggtga atttaatctc gctgacgtgt 1200
agacattcat cgatctgcat ccacggtccg gcggcggtac ctgcctgacg ctacgtttac 1260
cgctctttta tgaactgacc ggaggcccaa gatga 1295

<210> SEQ ID NO 48
<211> LENGTH: 1491
<212> TYPE: DNA
<213> ORGANISM: Artificial Sequence
<220> FEATURE:
<223> OTHER INFORMATION: Synthetic polynucleotide

<400> SEQUENCE: 48
atgagcatca cggcgttatc agcatcattt cctgagggga atatcgccag ccgcttgtcg 60
ctgcaacatc cttcactgtt ttataccgtg gttgaacaat cttcggtggc gagcgtgttg 120
agtcatcctg actagctgag atgagggctc gccccctcgt cccgacactt ccagatcgcc 180
atagcgcaca gcgcctcgag cggtggtaac ggcgcagtgg cggttttcat ggcttgttat 240
gactgttttt ttggggtaca gtctatgcct cgggcatcca agcagcaagc gcgttacgcc 300
gtgggtcgat gtttgatgtt atggagcagc aacgatgtta cgcagcaggg cagtcgccct 360
aaaacaaagt taaacatcat gagggaagcg gtgatcgccg aagtatcgac tcaactatca 420
gaggtagttg gcgtcatcga gcgccatctc gaaccgacgt tgctggccgt acatttgtac 480
ggctccgcag tggatggcgg cctgaagcca cacagtgata ttgatttgct ggttacggtg 540
accgtaaggc ttgatgaaac aacgcggcga gctttgatca acgacctttt ggaaacttcg 600
gcttcccctg gagagagcga gattctccgc gctgtagaag tcaccattgt tgtgcacgac 660
gacatcattc cgtggcgtta tccagctaag cgcgaactgc aatttggaga atggcagcgc 720
aatgacattc ttgcaggtat cttcgagcca gccacgatcg acattgatct ggctatcttg 780
ctgacaaaag caagagaaca tagcgttgcc ttggtaggtc cagcggcgga ggaactcttt 840
gatccggttc ctgaacagga tctatttgag gcgctaaatg aaaccttaac gctatggaac 900
tcgccgcccg actgggctgg cgatgagcga aatgtagtgc ttacgttgtc ccgcatttgg 960
tacagcgcag taaccggcaa aatcgcgccg aaggatgtcg ctgccgactg ggcaatggag 1020
cgcctgccgg cccagtatca gcccgtcata cttgaagcta gacaggctta tcttggacaa 1080
gaagaagatc gcttggcctc gcgcgcagat cagttggaag aatttgtcca ctacgtgaaa 1140
ggcgagatca ccaaggtagt cggcaaataa tgtctaacaa ttcgttcaag ccgacgccgc 1200
ttcgcggcgc ggcttaactc aagcgttaga tgcactaagc acataattgc tcacagccaa 1260
actatcaggt caagtctgct tttattattt ttaagcgtgc ataataagcc ctacacaaat 1320
ggtacccgac cggtggtgaa tttaatctcg ctgacgtgta gacattccct tatccagacg 1380
ctgatcgccc atcatcgcgg ttctttagat ctctcggtcc gccctgatgg cggcaccttg 1440
ctgacgttac gcctgccggt acagcaggtt atcaccggag gcttaaaatg a 1491

<210> SEQ ID NO 49

<211> LENGTH: 1021
<212> TYPE: DNA
<213> ORGANISM: Artificial Sequence
<220> FEATURE:
<223> OTHER INFORMATION: Synthetic polynucleotide

<400> SEQUENCE: 49
ctgatccttc aactcagcaa aagttcgatt tattcaacaa agccacgttg tgtctcaaaa 60
tctctgatgt tacattgcac aagataaaaa tatatcatca tgaacaataa aactgtctgc 120
ttacataaac agtaatacaa ggggtgttat gagccatatt caacgggaaa cgtcttgctc 180
caggccgcga ttaaattcca acatggatgc tgatttatat gggtataaat gggctcgcga 240
taatgtcggg caatcaggtg cgacaatcta tcgattgtat gggaagcccg atgcgccaga 300
gttgtttctg aaacatggca aaggtagcgt tgccaatgat gttacagatg agatggtcag 360
actaaactgg ctgacggaat ttatgcctct tccgaccatc aagcatttta tccgtactcc 420
tgatgatgca tggttactca ccactgcgat ccccgggaaa acagcattcc aggtattaga 480
agaatatcct gattcaggtg aaaatattgt tgatgcgctg gcagtgttcc tgcgccggtt 540
gcattcgatt cctgtttgta attgtccttt taacagcgat cgcgtatttc gtctcgctca 600
ggcgcaatca cgaatgaata acggtttggt tgatgcgagt gattttgatg acgagcgtaa 660
tggctggcct gttgaacaag tctggaaaga aatgcataag cttttgccat tctcaccgga 720
ttcagtcgtc actcatggtg atttctcact tgataacctt atttttgacg aggggaaatt 780
aataggttgt attgatgttg gacgagtcgg aatcgcagac cgataccagg atcttgccat 840
cctatggaac tgcctcggtg agttttctcc ttcattacag aaacggcttt ttcaaaaata 900
tggtattgat aatcctgata tgaataaatt gcagtttcat ttgatgctcg atgagttttt 960
ctaataagcc ttgaccctac gattcccgct atttcattca ctgaccggag gttcaaaatg 1020
a 1021

<210> SEQ ID NO 50
<211> LENGTH: 1071
<212> TYPE: DNA
<213> ORGANISM: Artificial Sequence
<220> FEATURE:
<223> OTHER INFORMATION: Synthetic polynucleotide

<400> SEQUENCE: 50
atgaccctga atatgatgct cgataacgcc gtacccgagg cgattgccgg ctgatccttc 60
aactcagcaa aagttcgatt tattcaacaa agccacgttg tgtctcaaaa tctctgatgt 120
tacattgcac aagataaaaa tatatcatca tgaacaataa aactgtctgc ttacataaac 180
agtaatacaa ggggtgttat gagccatatt caacgggaaa cgtcttgctc ccgtccgcgc 240
ttaaactcca acatggacgc tgatttatat gggtataaat gggctcgcga taatgtcggg 300
caatcaggtg cgacaatcta tcgcttgtat gggaagcccg atgcgccaga gttgtttctg 360
aaacatggca aaggtagcgt tgccaatgat gttacagatg agatggtccg tctcaactgg 420
ctgacggagt ttatgcctct cccgaccatc aagcatttta tccgtactcc tgatgatgcg 480
tggttactca ccaccgcgat tcctgggaaa acagccttcc aggtattaga agaatatcct 540
gattcaggtg aaaatattgt tgatgcgctg gccgtgttcc tgcgccggtt acattcgatt 600
cctgtttgta attgtccttt taacagcgat cgtgtatttc gtcttgctca ggcgcaatca 660
cgcatgaata acggtttggt tgatgcgagt gattttgatg acgagcgtaa tggctggcct 720
gttgaacaag tctggaaaga aatgcacaag ctcttgccat tctcaccgga ttcagtcgtc 780

```
actcatggtg atttctcact tgataacctt atttttgacg aggggaaatt aataggttgt    840

attgatgttg gacgggtcgg aatcgcagac cgttaccagg accttgccat tctttggaac    900

tgcctcggtg agttttctcc ttcattacag aaacggcttt ttcaaaaata tggtattgat    960

aatcctgata tgaataaatt gcagtttcat ttgatgctcg atgagttttt ctaataagcc   1020

ttggttctgc gtttcccgct ctttaatacc ctgaccggag gtgagcaatg a            1071
```

<210> SEQ ID NO 51
<211> LENGTH: 461
<212> TYPE: DNA
<213> ORGANISM: Artificial Sequence
<220> FEATURE:
<223> OTHER INFORMATION: Synthetic polynucleotide

<400> SEQUENCE: 51

```
atgaccctga atatgatgat ggatgccggc cgtcctgtaa taataaccgg acaattcgga     60

ctgattaaaa aagcgccctt gtggcgcttt ttttatattc ccgcctccat ttaaaataaa    120

aaatccaatc ggatttcact atttaaactg gccattatct aagatgaatc cgatggaagc    180

tcgctgtttt aacacgcgtt ttttaacctt ttattgaaag tcggtgcttc tttgagcgaa    240

cgatcaaatt taagtggatt cccatcaaaa aaatattctc aacctaaaaa agtttgtgta    300

atacttgtaa cgctacatgg agattaactc aatctagagg gtattaataa tgaatcgtac    360

taaactggta ctgggcgcaa ctcacttcac accccgaagg gggaagttgc ctgaccctac    420

gattcccgct atttcattca ctgaccggag gttcaaaatg a                        461
```

<210> SEQ ID NO 52
<211> LENGTH: 426
<212> TYPE: DNA
<213> ORGANISM: Artificial Sequence
<220> FEATURE:
<223> OTHER INFORMATION: Synthetic polynucleotide

<400> SEQUENCE: 52

```
atgaccctga atatgatgat ggatgccggc ggacatcatc gcgacaaaca atattaatac     60

cggcaaccac accggcaatt tacgagactg cgcaggcatc ctttctcccg tcaatttctg    120

tcaaataaag taaaagaggc agtctacttg aattaccccc ggctggttga gcgtttgttg    180

aaaaaaagta actgaaaaat ccgtagaata gcgccactct gatggttaat taacctattc    240

aattaagaat tatctggatg aatgtgccat taaatgcgca gcataatggt gcgttgtgcg    300

ggaaaactgc tttttttga aagggttggt cagtagcgga aacaactcac ttcacacccc    360

gaagggggaa gttgcctgac cctacgattc ccgctatttc attcactgac cggaggttca    420

aaatga                                                               426
```

<210> SEQ ID NO 53
<211> LENGTH: 452
<212> TYPE: DNA
<213> ORGANISM: Artificial Sequence
<220> FEATURE:
<223> OTHER INFORMATION: Synthetic polynucleotide

<400> SEQUENCE: 53

```
atgaccctga atatgatgat ggatgccggc tgacgaggca ggttacatca ctggtgaaac     60

cctgcacgtc aatggcggaa tgtatatggt ttaaccacga tgaaaattat ttgcgttatt    120

agggcgaaag gcctcaaaat agcgtaaaat cgtggtaaga actgccggga tttagttgca    180
```

```
aatttttcaa cattttatac actacgaaaa ccatcgcgaa agcgagtttt gataggaaat    240

ttaagagtat gagcactatc gaagaacgcg ttaagaaaat tatcggcgaa cagctgggcg    300

ttaagcagga agaagttacc aacaatgctt ccttcgttga agacctgggc gctgattctc    360

ttgacaccga actcacttca caccccgaag gggaagttgg cctgacccta cgattcccgc    420

tatttcattc actgaccgga ggttcaaaat ga                                  452
```

<210> SEQ ID NO 54
<211> LENGTH: 426
<212> TYPE: DNA
<213> ORGANISM: Artificial Sequence
<220> FEATURE:
<223> OTHER INFORMATION: Synthetic polynucleotide

<400> SEQUENCE: 54

```
atgaccctga atatgatgat ggatgccggc ggacatcatc gcgacaaaca atattaatac     60

cggcaaccac accggcaatt tacgagactg cgcaggcatc ctttctcccg tcaatttctg    120

tcaaataaag taaaagaggc agtctacttg aattaccccc ggctggttga gcgtttgttg    180

aaaaaaagta actgaaaaat ccgtagaata gcgccactct gatggttaat taacctattc    240

aattaagaat tatctggatg aatgtgccat taaatgcgca gcataatggt gcgttgtgcg    300

ggaaaactgc ttttttttga aagggttggt cagtagcgga aacaactcac ttcacacccc    360

gaagggggaa gttgcctgac cctacgattc ccgctatttc attcactgac cggaggttca    420

aaatga                                                               426
```

<210> SEQ ID NO 55
<211> LENGTH: 461
<212> TYPE: DNA
<213> ORGANISM: Artificial Sequence
<220> FEATURE:
<223> OTHER INFORMATION: Synthetic polynucleotide

<400> SEQUENCE: 55

```
atgaccctga atatgatgat ggatgccggc cgtcctgtaa taataaccgg acaattcgga     60

ctgattaaaa aagcgccctt gtggcgcttt ttttatattc ccgcctccat ttaaaataaa    120

aaatccaatc ggatttcact atttaaactg gccattatct aagatgaatc cgatggaagc    180

tcgctgtttt aacacgcgtt ttttaacctt ttattgaaag tcggtgcttc tttgagcgaa    240

cgatcaaatt taagtggatt cccatcaaaa aaatattctc aacctaaaaa agtttgtgta    300

atacttgtaa cgctacatgg agattaactc aatctagagg gtattaataa tgaatcgtac    360

taaactggta ctgggcgcaa ctcacttcac accccgaagg gggaagttgc ctgaccctac    420

gattcccgct atttcattca ctgaccggag gttcaaaatg a                        461
```

<210> SEQ ID NO 56
<211> LENGTH: 1491
<212> TYPE: DNA
<213> ORGANISM: Artificial Sequence
<220> FEATURE:
<223> OTHER INFORMATION: Synthetic polynucleotide

<400> SEQUENCE: 56

```
atgagcatca cggcgttatc agcatcattt cctgagggga atatcgccag ccgcttgtcg     60

ctgcaacatc cttcactgtt ttataccgtg gttgaacaat cttcggtggc gagcgtgttg    120

agtcatcctg actagctgag atgagggctc gccccctcgt cccgacactt ccagatcgcc    180

atagcgcaca gcgcctcgag cggtggtaac ggcgcagtgg cggttttcat ggcttgttat    240
```

gactgttttt ttggggtaca gtctatgcct cgggcatcca agcagcaagc gcgttacgcc 300
gtgggtcgat gtttgatgtt atggagcagc aacgatgtta cgcagcaggg cagtcgccct 360
aaaacaaagt taaacatcat gagggaagcg gtgatcgccg aagtatcgac tcaactatca 420
gaggtagttg gcgtcatcga gcgccatctc gaaccgacgt tgctggccgt acatttgtac 480
ggctccgcag tggatggcgg cctgaagcca cacagtgata ttgatttgct ggttacggtg 540
accgtaaggc ttgatgaaac aacgcggcga gctttgatca acgacctttt ggaaacttcg 600
gcttcccctg gagagagcga gattctccgc gctgtagaag tcaccattgt tgtgcacgac 660
gacatcattc cgtggcgtta tccagctaag cgcgaactgc aatttggaga atggcagcgc 720
aatgacattc ttgcaggtat cttcgagcca gccacgatcg acattgatct ggctatcttg 780
ctgacaaaag caagagaaca tagcgttgcc ttggtaggtc cagcggcgga ggaactcttt 840
gatccggttc ctgaacagga tctatttgag gcgctaaatg aaaccttaac gctatggaac 900
tcgccgcccg actgggctgg cgatgagcga aatgtagtgc ttacgttgtc ccgcatttgg 960
tacagcgcag taaccggcaa aatcgcgccg aaggatgtcg ctgccgactg ggcaatggag 1020
cgcctgccgg cccagtatca gcccgtcata cttgaagcta gacaggctta tcttggacaa 1080
gaagaagatc gcttggcctc gcgcgcagat cagttggaag aatttgtcca ctacgtgaaa 1140
ggcgagatca ccaaggtagt cggcaaataa tgtctaacaa ttcgttcaag ccgacgccgc 1200
ttcgcggcgc ggcttaactc aagcgttaga tgcactaagc acataattgc tcacagccaa 1260
actatcaggt caagtctgct tttattattt ttaagcgtgc ataataagcc ctacacaaat 1320
ggtacccgac cggtggtgaa tttaatctcg ctgacgtgta gacattccct tatccagacg 1380
ctgatcgccc atcatcgcgg ttctttagat ctctcggtcc gccctgatgg cggcaccttg 1440
ctgacgttac gcctgccggt acagcaggtt atcaccggag gcttaaaatg a 1491

<210> SEQ ID NO 57
<211> LENGTH: 1491
<212> TYPE: DNA
<213> ORGANISM: Artificial Sequence
<220> FEATURE:
<223> OTHER INFORMATION: Synthetic polynucleotide

<400> SEQUENCE: 57
atgagcatca cggcgttatc agcatcattt cctgagggga atatcgccag ccgcttgtcg 60
ctgcaacatc cttcactgtt ttataccgtg gttgaacaat cttcggtggc gagcgtgttg 120
agtcatcctg actagctgag atgagggctc gccccctcgt cccgacactt ccagatcgcc 180
atagcgcaca gcgcctcgag cggtggtaac ggcgcagtgg cggttttcat ggcttgttat 240
gactgttttt ttggggtaca gtctatgcct cgggcatcca agcagcaagc gcgttacgcc 300
gtgggtcgat gtttgatgtt atggagcagc aacgatgtta cgcagcaggg cagtcgccct 360
aaaacaaagt taaacatcat gagggaagcg gtgatcgccg aagtatcgac tcaactatca 420
gaggtagttg gcgtcatcga gcgccatctc gaaccgacgt tgctggccgt acatttgtac 480
ggctccgcag tggatggcgg cctgaagcca cacagtgata ttgatttgct ggttacggtg 540
accgtaaggc ttgatgaaac aacgcggcga gctttgatca acgacctttt ggaaacttcg 600
gcttcccctg gagagagcga gattctccgc gctgtagaag tcaccattgt tgtgcacgac 660
gacatcattc cgtggcgtta tccagctaag cgcgaactgc aatttggaga atggcagcgc 720
aatgacattc ttgcaggtat cttcgagcca gccacgatcg acattgatct ggctatcttg 780

```
ctgacaaaag caagagaaca tagcgttgcc ttggtaggtc cagcggcgga ggaactcttt    840

gatccggttc ctgaacagga tctatttgag gcgctaaatg aaaccttaac gctatggaac    900

tcgccgcccg actgggctgg cgatgagcga aatgtagtgc ttacgttgtc ccgcatttgg    960

tacagcgcag taaccggcaa aatcgcgccg aaggatgtcg ctgccgactg ggcaatggag   1020

cgcctgccgg cccagtatca gcccgtcata cttgaagcta gacaggctta tcttggacaa   1080

gaagaagatc gcttggcctc gcgcgcagat cagttggaag aatttgtcca ctacgtgaaa   1140

ggcgagatca ccaaggtagt cggcaaataa tgtctaacaa ttcgttcaag ccgacgccgc   1200

ttcgcggcgc ggcttaactc aagcgttaga tgcactaagc acataattgc tcacagccaa   1260

actatcaggt caagtctgct tttattattt ttaagcgtgc ataataagcc ctacacaaat   1320

ggtacccgac cggtggtgaa tttaatctcg ctgacgtgta gacattccct tatccagacg   1380

ctgatcgccc atcatcgcgg ttctttagat ctctcggtcc gccctgatgg cggcaccttg   1440

ctgacgttac gcctgccggt acagcaggtt atcaccggag gcttaaaatg a            1491
```

<210> SEQ ID NO 58
<211> LENGTH: 1021
<212> TYPE: DNA
<213> ORGANISM: Artificial Sequence
<220> FEATURE:
<223> OTHER INFORMATION: Synthetic polynucleotide

<400> SEQUENCE: 58

```
ctgatccttc aactcagcaa aagttcgatt tattcaacaa agccacgttg tgtctcaaaa     60

tctctgatgt tacattgcac aagataaaaa tatatcatca tgaacaataa aactgtctgc    120

ttacataaac agtaatacaa ggggtgttat gagccatatt caacgggaaa cgtcttgctc    180

caggccgcga ttaaattcca acatggatgc tgatttatat gggtataaat gggctcgcga    240

taatgtcggg caatcaggtg cgacaatcta tcgattgtat gggaagcccg atgcgccaga    300

gttgtttctg aaacatggca aaggtagcgt tgccaatgat gttacagatg agatggtcag    360

actaaactgg ctgacggaat ttatgcctct tccgaccatc aagcatttta tccgtactcc    420

tgatgatgca tggttactca ccactgcgat ccccgggaaa acagcattcc aggtattaga    480

agaatatcct gattcaggtg aaaatattgt tgatgcgctg gcagtgttcc tgcgccggtt    540

gcattcgatt cctgtttgta attgtccttt taacagcgat cgcgtatttc gtctcgctca    600

ggcgcaatca cgaatgaata acggtttggt tgatgcgagt gattttgatg acgagcgtaa    660

tggctggcct gttgaacaag tctggaaaga aatgcataag cttttgccat tctcaccgga    720

ttcagtcgtc actcatggtg atttctcact tgataacctt atttttgacg aggggaaatt    780

aataggttgt attgatgttg gacgagtcgg aatcgcagac cgataccagg atcttgccat    840

cctatggaac tgcctcggtg agttttctcc ttcattacag aaacggcttt ttcaaaaata    900

tggtattgat aatcctgata tgaataaatt gcagtttcat ttgatgctcg atgagttttt    960

ctaataagcc ttgaccctac gattcccgct atttcattca ctgaccggag gttcaaaatg   1020

a                                                                   1021
```

<210> SEQ ID NO 59
<211> LENGTH: 1491
<212> TYPE: DNA
<213> ORGANISM: Artificial Sequence
<220> FEATURE:
<223> OTHER INFORMATION: Synthetic polynucleotide

<400> SEQUENCE: 59
atgagcatca cggcgttatc agcatcattt cctgagggga atatcgccag ccgcttgtcg 60
ctgcaacatc cttcactgtt ttataccgtg gttgaacaat cttcggtggc gagcgtgttg 120
agtcatcctg actagctgag atgagggctc gcccccctcgt cccgacactt ccagatcgcc 180
atagcgcaca gcgcctcgag cggtggtaac ggcgcagtgg cggttttcat ggcttgttat 240
gactgttttt ttggggtaca gtctatgcct cgggcatcca agcagcaagc gcgttacgcc 300
gtgggtcgat gtttgatgtt atggagcagc aacgatgtta cgcagcaggg cagtcgccct 360
aaaacaaagt taaacatcat gagggaagcg gtgatcgccg aagtatcgac tcaactatca 420
gaggtagttg gcgtcatcga gcgccatctc gaaccgacgt tgctggccgt acatttgtac 480
ggctccgcag tggatggcgg cctgaagcca cacagtgata ttgatttgct ggttacggtg 540
accgtaaggc ttgatgaaac aacgcggcga gctttgatca acgacctttt ggaaacttcg 600
gcttcccctg gagagagcga gattctccgc gctgtagaag tcaccattgt tgtgcacgac 660
gacatcattc cgtggcgtta tccagctaag cgcgaactgc aatttggaga atggcagcgc 720
aatgacattc ttgcaggtat cttcgagcca gccacgatcg acattgatct ggctatcttg 780
ctgacaaaag caagagaaca tagcgttgcc ttggtaggtc cagcggcgga ggaactcttt 840
gatccggttc ctgaacagga tctatttgag gcgctaaatg aaaccttaac gctatggaac 900
tcgccgcccg actgggctgg cgatgagcga aatgtagtgc ttacgttgtc ccgcatttgg 960
tacagcgcag taaccggcaa aatcgcgccg aaggatgtcg ctgccgactg ggcaatggag 1020
cgcctgccgg cccagtatca gcccgtcata cttgaagcta gacaggctta tcttggacaa 1080
gaagaagatc gcttggcctc gcgcgcagat cagttggaag aatttgtcca ctacgtgaaa 1140
ggcgagatca ccaaggtagt cggcaaataa tgtctaacaa ttcgttcaag ccgacgccgc 1200
ttcgcggcgc ggcttaactc aagcgttaga tgcactaagc acataattgc tcacagccaa 1260
actatcaggt caagtctgct tttattattt ttaagcgtgc ataataagcc ctacacaaat 1320
ggtacccgac cggtggtgaa tttaatctcg ctgacgtgta gacattccct tatccagacg 1380
ctgatcgccc atcatcgcgg ttctttagat ctctcggtcc gccctgatgg cggcaccttg 1440
ctgacgttac gcctgccggt acagcaggtt atcaccggag gcttaaaatg a 1491

<210> SEQ ID NO 60
<211> LENGTH: 1491
<212> TYPE: DNA
<213> ORGANISM: Artificial Sequence
<220> FEATURE:
<223> OTHER INFORMATION: Synthetic polynucleotide

<400> SEQUENCE: 60
atgagcatca cggcgttatc agcatcattt cctgagggga atatcgccag ccgcttgtcg 60
ctgcaacatc cttcactgtt ttataccgtg gttgaacaat cttcggtggc gagcgtgttg 120
agtcatcctg actagctgag atgagggctc gcccccctcgt cccgacactt ccagatcgcc 180
atagcgcaca gcgcctcgag cggtggtaac ggcgcagtgg cggttttcat ggcttgttat 240
gactgttttt ttggggtaca gtctatgcct cgggcatcca agcagcaagc gcgttacgcc 300
gtgggtcgat gtttgatgtt atggagcagc aacgatgtta cgcagcaggg cagtcgccct 360
aaaacaaagt taaacatcat gagggaagcg gtgatcgccg aagtatcgac tcaactatca 420
gaggtagttg gcgtcatcga gcgccatctc gaaccgacgt tgctggccgt acatttgtac 480
ggctccgcag tggatggcgg cctgaagcca cacagtgata ttgatttgct ggttacggtg 540

```
accgtaaggc ttgatgaaac aacgcggcga gctttgatca acgacctttt ggaaacttcg    600

gcttcccctg gagagagcga gattctccgc gctgtagaag tcaccattgt tgtgcacgac    660

gacatcattc cgtggcgtta tccagctaag cgcgaactgc aatttggaga atggcagcgc    720

aatgacattc ttgcaggtat cttcgagcca gccacgatcg acattgatct ggctatcttg    780

ctgacaaaag caagagaaca tagcgttgcc ttggtaggtc cagcggcgga ggaactcttt    840

gatccggttc ctgaacagga tctatttgag gcgctaaatg aaaccttaac gctatggaac    900

tcgccgcccg actgggctgg cgatgagcga aatgtagtgc ttacgttgtc ccgcatttgg    960

tacagcgcag taaccggcaa aatcgcgccg aaggatgtcg ctgccgactg ggcaatggag   1020

cgcctgccgg cccagtatca gcccgtcata cttgaagcta gacaggctta tcttggacaa   1080

gaagaagatc gcttggcctc gcgcgcagat cagttggaag aatttgtcca ctacgtgaaa   1140

ggcgagatca ccaaggtagt cggcaaataa tgtctaacaa ttcgttcaag ccgacgccgc   1200

ttcgcggcgc ggcttaactc aagcgttaga tgcactaagc acataattgc tcacagccaa   1260

actatcaggt caagtctgct tttattattt ttaagcgtgc ataataagcc ctacacaaat   1320

ggtacccgac cggtggtgaa tttaatctcg ctgacgtgta gacattccct tatccagacg   1380

ctgatcgccc atcatcgcgg ttctttagat ctctcggtcc gccctgatgg cggcaccttg   1440

ctgacgttac gcctgccggt acagcaggtt atcaccggag gcttaaaatg a             1491
```

```
<210> SEQ ID NO 61
<211> LENGTH: 1563
<212> TYPE: DNA
<213> ORGANISM: Artificial Sequence
<220> FEATURE:
<223> OTHER INFORMATION: Synthetic polynucleotide

<400> SEQUENCE: 61

atgtttaacg atctgattgg cgatgatgaa acggattcgc cggaagatgc gctttctgag     60

agctggcgcg aattgtggca ggatgcgttg caggaggagg attccacgcc cgtgctggcg    120

catctctcag aggacgatcg ccgccgcgtg gtggcgctga ttgccgattt tcgcaaagag    180

ttggataaac gcaccattgg cccgcgaggg cggcaggtac tcgatcactt aatgccgcat    240

ctgctcagcg atgtatgctc gcgcgacgat gcgccagtac cgctgtcacg cctgacgccg    300

ctgctcaccg gaattattac ccgcaccact taccttgagc tgctaagtga atttcccggc    360

gcactgaaac acctcatttc cctgtgtgcc gcgtcgccga tggttgccag tcagctggcg    420

cgctacccga tcctgcttga tgaattgctc gacccgaata cgctctatca accgacggcg    480

atgaatgcct atcgcgatga gctgcgccaa tacctgctgc gcgtgccgga agatgatgaa    540

gagcaacagc ttgaggcgct gcggcagttt aagcaggcgc agttgctgcg cgtggcggcg    600

gcggatattg ccggtacgtt gccagtaatg aaagtgagcg atcacttaac ctggctggcg    660

gaagcgatta ttgatgcggt ggtgcagcaa gcctgggggc agatggtggc gcgttatggc    720

cagccaacgc atctgcacga tcgcgaaggg cgcggttttg cggtggtcgg ttatggcaag    780

ctgggcggct gggagctggg ttacagctcc gatctggatc tggtattcct gcacgactgc    840

ccgatggatg tgatgaccga tggcgagcgt gaaatcgatg gtcgccagtt ctatttgcgt    900

ctcgcgcagc gcgtgatgca cctgtttagc acgcgcacgt cgtccggcat cctttatgaa    960

gttgatgcgc gtctgcgtcc atctggcgct gcggggatgc tggtcactac tacggaatcg   1020

ttcgccgatt accagcaaaa cgaagcctgg acgtgggaac atcaggcgct ggcccgtgcg   1080

cgcgtggtgt acggcgatcc gcaactgacc gccgaatttg acgccattcg ccgcgatatt   1140
```

ctgatgacgc ctcgcgacgg cgcaacgctg caaaccgacg tgcgagaaat gcgcgagaaa 1200
atgcgtgccc atcttggcaa caagcataaa gaccgcttcg atctgaaagc cgatgaaggc 1260
ggtatcaccg acatcgagtt tatcgcccaa tatctggtgc tgcgctttgc ccatgacaag 1320
ccgaaactga cgcgctggtc ggataatgtg cgcattctcg aagggctggc gcaaaacggc 1380
atcatggagg agcaggaagc gcaggcattg acgctggcgt acaccacatt gcgtgatgag 1440
ctgcaccacc tggcgctgca agagttgccg ggacatgtgg cgctctcctg ttttgtcgcc 1500
gagcgtgcgc ttattaaaac cagctgggac aagtggctgg tggaaccgtg cgccccggcg 1560
taa 1563

<210> SEQ ID NO 62
<211> LENGTH: 1536
<212> TYPE: DNA
<213> ORGANISM: Kosakonia sacchari
<220> FEATURE:
<223> OTHER INFORMATION: 16S rDNA - contig 5, strain CI006

<400> SEQUENCE: 62
ttgaagagtt tgatcatggc tcagattgaa cgctggcggc aggcctaaca catgcaagtc 60
gaacggtagc acagagagct tgctctcggg tgacgagtgg cggacgggtg agtaatgtct 120
gggaaactgc ctgatggagg gggataacta ctggaaacgg tagctaatac cgcataacgt 180
cgcaagacca aagagggga ccttcgggcc tcttgccatc agatgtgccc agatgggatt 240
agctagtagg tggggtaacg gctcacctag gcgacgatcc ctagctggtc tgagaggatg 300
accagccaca ctggaactga gacacggtcc agactcctac gggaggcagc agtggggaat 360
attgcacaat gggcgcaagc ctgatgcagc catgccgcgt gtgtgaagaa ggccttcggg 420
ttgtaaagca ctttcagcgg ggaggaaggg agtaaggtta ataaccttat tcattgacgt 480
tacccgcaga agaagcaccg gctaactccg tgccagcagc cgcggtaata cggagggtgc 540
aagcgttaat cggaattact gggcgtaaag cgcacgcagg cggtctgtca agtcggatgt 600
gaaatccccg ggctcaacct gggaactgca tccgaaactg gcaggcttga gtctcgtaga 660
gggaggtaga attccaggtg tagcggtgaa atgcgtagag atctggagga ataccggtgg 720
cgaaggcggc ctcctggacg aagactgacg ctcaggtgcg aaagcgtggg gagcaaacag 780
gattagatac cctggtagtc cacgccgtaa acgatgtcta tttggaggtt gtgcccttga 840
ggcgtggctt ccggagctaa cgcgttaaat agaccgcctg gggagtacgg ccgcaaggtt 900
aaaactcaaa tgaattgacg ggggcccgca caagcggtgg agcatgtggt ttaattcgat 960
gcaacgcgaa gaaccttacc tggtcttgac atccacagaa ctttccagag atggattggt 1020
gccttcggga actgtgagac aggtgctgca tggctgtcgt cagctcgtgt tgtgaaatgt 1080
tgggttaagt cccgcaacga gcgcaaccct tatcctttgt tgccagcggt ccggccggga 1140
actcaaagga gactgccagt gataaactgg aggaaggtgg ggatgacgtc aagtcatcat 1200
ggcccttacg accagggcta cacacgtgct acaatggcgc atacaaagag aagcgacctc 1260
gcgagagtaa gcggacctca taaagtgcgt cgtagtccgg attggagtct gcaactcgac 1320
tccatgaagt cggaatcgct agtaatcgtg gatcagaatg ccacggtgaa tacgttcccg 1380
ggccttgtac acaccgcccg tcacaccatg ggagtgggtt gcaaaagaag taggtagctt 1440
aaccttcggg agggcgctta ccactttgtg attcatgact ggggtgaagt cgtaacaagg 1500
taaccgtagg ggaacctgcg gttggatcac ctcctt 1536

<210> SEQ ID NO 63
<211> LENGTH: 1537
<212> TYPE: DNA
<213> ORGANISM: Kosakonia sacchari
<220> FEATURE:
<223> OTHER INFORMATION: 16S rDNA - contig 8, strain CI006
<220> FEATURE:
<221> NAME/KEY: misc_feature
<222> LOCATION: (450)..(450)
<223> OTHER INFORMATION: n is a, c, g, or t
<220> FEATURE:
<221> NAME/KEY: misc_feature
<222> LOCATION: (452)..(452)
<223> OTHER INFORMATION: n is a, c, g, or t
<220> FEATURE:
<221> NAME/KEY: misc_feature
<222> LOCATION: (455)..(455)
<223> OTHER INFORMATION: n is a, c, g, or t
<220> FEATURE:
<221> NAME/KEY: misc_feature
<222> LOCATION: (473)..(473)
<223> OTHER INFORMATION: n is a, c, g, or t

<400> SEQUENCE: 63
ttgaagagtt tgatcatggc tcagattgaa cgctggcggc aggcctaaca catgcaagtc 60
gaacggtagc acagagagct tgctctcggg tgacgagtgg cggacgggtg agtaatgtct 120
gggaaactgc ctgatggagg gggataacta ctggaaacgg tagctaatac cgcataacgt 180
cgcaagacca aagaggggga ccttcgggcc tcttgccatc agatgtgccc agatgggatt 240
agctagtagg tggggtaacg gctcacctag gcgacgatcc ctagctggtc tgagaggatg 300
accagccaca ctggaactga gacacggtcc agactcctac gggaggcagc agtggggaat 360
attgcacaat gggcgcaagc ctgatgcagc catgccgcgt gtgtgaagaa ggccttcggg 420
ttgtaaagca ctttcagcgg ggaggaaggn antanggtta ataacctgtg ttnattgacg 480
ttacccgcag aagaagcacc ggctaactcc gtgccagcag ccgcggtaat acggagggtg 540
caagcgttaa tcggaattac tgggcgtaaa gcgcacgcag gcggtctgtc aagtcggatg 600
tgaaatcccc gggctcaacc tgggaactgc atccgaaact ggcaggcttg agtctcgtag 660
agggaggtag aattccaggt gtagcggtga aatgcgtaga gatctggagg aataccggtg 720
gcgaaggcgg cctcctggac gaagactgac gctcaggtgc gaaagcgtgg ggagcaaaca 780
ggattagata ccctggtagt ccacgccgta aacgatgtct atttggaggt tgtgcccttg 840
aggcgtggct tccggagcta acgcgttaaa tagaccgcct ggggagtacg gccgcaaggt 900
taaaactcaa atgaattgac gggggcccgc acaagcggtg gagcatgtgg tttaattcga 960
tgcaacgcga agaaccttac ctggtcttga catccacaga acttagcaga gatgctttgg 1020
tgccttcggg aactgtgaga caggtgctgc atggctgtcg tcagctcgtg ttgtgaaatg 1080
ttgggttaag tcccgcaacg agcgcaaccc ttatcctttg ttgccagcgg ttaggccggg 1140
aactcaaagg agactgccag tgataaactg gaggaaggtg gggatgacgt caagtcatca 1200
tggcccttac gaccagggct acacacgtgc tacaatggcg catacaaaga gaagcgacct 1260
cgcgagagta agcggacctc ataaagtgcg tcgtagtccg gattggagtc tgcaactcga 1320
ctccatgaag tcggaatcgc tagtaatcgt ggatcagaat gccacggtga atacgttccc 1380
gggccttgta cacaccgccc gtcacaccat gggagtgggt tgcaaaagaa gtaggtagct 1440
taaccttcgg gagggcgctt accactttgt gattcatgac tggggtgaag tcgtaacaag 1500
gtaaccgtag ggaacctgc ggttggatca cctcctt 1537

```
<210> SEQ ID NO 64
<211> LENGTH: 1540
<212> TYPE: DNA
<213> ORGANISM: Rahnella sp.
<220> FEATURE:
<223> OTHER INFORMATION: 16S rDNA, strain CI019
<220> FEATURE:
<221> NAME/KEY: misc_feature
<222> LOCATION: (70)..(70)
<223> OTHER INFORMATION: n is a, c, g, or t
<220> FEATURE:
<221> NAME/KEY: misc_feature
<222> LOCATION: (267)..(267)
<223> OTHER INFORMATION: n is a, c, g, or t
<220> FEATURE:
<221> NAME/KEY: misc_feature
<222> LOCATION: (455)..(455)
<223> OTHER INFORMATION: n is a, c, g, or t
<220> FEATURE:
<221> NAME/KEY: misc_feature
<222> LOCATION: (458)..(458)
<223> OTHER INFORMATION: n is a, c, g, or t
<220> FEATURE:
<221> NAME/KEY: misc_feature
<222> LOCATION: (473)..(473)
<223> OTHER INFORMATION: n is a, c, g, or t
<220> FEATURE:
<221> NAME/KEY: misc_feature
<222> LOCATION: (1135)..(1135)
<223> OTHER INFORMATION: n is a, c, g, or t

<400> SEQUENCE: 64

attgaagagt ttgatcatgg ctcagattga acgctggcgg caggcctaac acatgcaagt     60

cgagcggcan cgggaagtag cttgctactt tgccggcgag cggcggacgg gtgagtaatg    120

tctgggaaac tgcctgatgg agggggataa ctactggaaa cggtagctaa taccgcatga    180

cctcgaaaga gcaaagtggg ggatcttcgg acctcacgcc atcggatgtg cccagatggg    240

attagctagt aggtgaggta atggctnacc taggcgacga tccctagctg gtctgagagg    300

atgaccagcc acactggaac tgagacacgg tccagactcc tacgggaggc agcagtgggg    360

aatattgcac aatgggcgca agcctgatgc agccatgccg cgtgtgtgaa gaaggcctta    420

gggttgtaaa gcactttcag cgaggaggaa ggcancanac ttaatacgtg tgntgattga    480

cgttactcgc agaagaagca ccggctaact ccgtgccagc agccgcggta atacggaggg    540

tgcaagcgtt aatcggaatt actgggcgta aagcgcacgc aggcggtttg ttaagtcaga    600

tgtgaaatcc ccgagcttaa cttgggaact gcatttgaaa ctggcaagct agagtcttgt    660

agaggggggt agaattccag gtgtagcggt gaaatgcgta gagatctgga ggaataccgg    720

tggcgaaggc ggcccccctgg acaaagactg acgctcaggt gcgaaagcgt ggggagcaaa    780

caggattaga taccctggta gtccacgctg taaacgatgt cgacttggag gttgtgccct    840

tgaggcgtgg cttccggagc taacgcgtta agtcgaccgc ctggggagta cggccgcaag    900

gttaaaactc aaatgaattg acgggggccc gcacaagcgg tggagcatgt ggtttaattc    960

gatgcaacgc gaagaacctt acctactctt gacatccaga gaatttgcca gagatggcga   1020

agtgccttcg ggaactctga gacaggtgct gcatggctgt cgtcagctcg tgttgtgaaa   1080

tgttgggtta agtcccgcaa cgagcgcaac ccttatcctt tgttgccagc acgtnatggt   1140

gggaactcaa aggagactgc cggtgataaa ccggaggaag gtggggatga cgtcaagtca   1200

tcatggccct tacgagtagg gctacacacg tgctacaatg gcatatacaa agagaagcga   1260

actcgcgaga gcaagcggac ctcataaagt atgtcgtagt ccggattgga gtctgcaact   1320

cgactccatg aagtcggaat cgctagtaat cgtagatcag aatgctacgg tgaatacgtt   1380
```

cccgggcctt gtacacaccg cccgtcacac catgggagtg ggttgcaaaa gaagtaggta 1440
gcttaacctt cgggagggcg cttaccactt tgtgattcat gactggggtg aagtcgtaac 1500
aaggtaaccg taggggaacc tgcggttgga tcacctcctt 1540

<210> SEQ ID NO 65
<211> LENGTH: 882
<212> TYPE: DNA
<213> ORGANISM: Kosakonia sacchari
<220> FEATURE:
<223> OTHER INFORMATION: nifH, strain CI006

<400> SEQUENCE: 65
atgaccatgc gtcaatgcgc catttacggc aaaggtggga tcggcaaatc gaccaccaca 60
cagaacctgg tcgccgcgct ggcggagatg ggtaaaaaag tcatgattgt cggctgtgac 120
ccgaaagccg attccacgcg tttgatcctg catgcgaaag cgcagaacac cattatggag 180
atggctgctg aagtcggctc cgtggaagac ctggagttag aagacgtgct gcaaatcggt 240
tacggcggcg tgcgctgcgc agagtccggc ggcccggagc caggcgtggg ctgtgccggt 300
cgcggggtga tcaccgcgat taacttcctc gaagaagaag gcgcttacgt gccggatctc 360
gattttgttt tctacgacgt gctgggcgac gtggtatgcg gtggtttcgc catgccgatt 420
cgtgaaaaca aagcgcagga gatctacatc gtttgctctg gcgaaatgat ggcgatgtac 480
gccgccaaca acatctccaa aggcatcgtg aaatacgcca aatccggtaa agtgcgcctc 540
ggcgggctga tttgtaactc gcgccagacc gaccgtgaag atgaactgat cattgcgctg 600
gcagaaaaac tcggcacgca gatgatccac tttgttcccc gcgacaacat tgtgcagcgt 660
gcggaaatcc gccgtatgac ggttatcgaa tatgacccga cctgcaatca ggcgaacgaa 720
tatcgcagcc ttgccagcaa aatcgtcaac aacaccaaaa tggtggtgcc cacccccctgc 780 accatggatg aactggaaga actgctgatg gagttcggca ttatggatgt ggaagacacc 840
agcatcattg gtaaaaccgc cgccgaagaa aacgccgtct ga 882

<210> SEQ ID NO 66
<211> LENGTH: 1449
<212> TYPE: DNA
<213> ORGANISM: Kosakonia sacchari
<220> FEATURE:
<223> OTHER INFORMATION: NifD, strain CI006

<400> SEQUENCE: 66
atgagcaatg caacaggcga acgcaacctg gagataatcg agcaggtgct cgaggttttc 60
ccggagaaga cgcgcaaaga acgcagaaaa cacatgatgg tgacggaccc ggagcaggaa 120
agcgtcggta agtgcatcat ctctaaccgc aaatcgcagc caggcgtgat gaccgtgcgc 180
ggctgctcgt atgccggttc gaaaggggtg gtatttgggc caatcaagga tatggcgcat 240
atctcgcatg gcccaatcgg ctgcggccaa tactcccgcg ccgggcggcg gaactactac 300
accggcgtca gcggcgtgga cagcttcggc acgctcaact tcacctccga ttttcaggag 360
cgcgacatcg tgtttggcgg cgataaaaag ctcgccaaac tgattgaaga gctggaagag 420
ctgttcccgc tgaccaaagg catttcgatt cagtcggaat gcccggtcgg cctgattggc 480
gatgacattg aggccgtcgc gaacgccagc cgcaaagcca tcaacaaacc ggttattccg 540
gtgcgttgcg aaggctttcg cggcgtgtcg caatccctcg gtcaccatat tgccaacgat 600
gtgatccgcg actgggtgct ggataaccgc gaaggcaaac cgttcgaatc caccccttac 660
gatgtggcga tcatcggcga ttacaacatc ggcggcgatg cctgggcttc gcgcattttg 720
ctcgaagaga tgggcttgcg ggtggtggca cagtggtctg gcgacggtac gctggtggag 780
atggaaaaca cgccgttcgt caaactgaac ctggtgcatt gttaccgctc aatgaactac 840
atctcgcgcc atatggagga gaagcacggt attccgtgga tggaatacaa cttctttggt 900
ccgacgaaaa tcgcggaatc gctgcgcaaa atcgccgacc agtttgacga caccattcgc 960
gccaacgccg aagcggtgat cgccagatac caggcgcaaa acgacgccat tatcgccaaa 1020
tatcgcccgc gtctggaggg gcgcaaagtg ctgctttata tgggcgggct gcgtccgcgc 1080
catgtgattg gcgcctatga agacctggga atggagatca tcgctgccgg ttatgagttc 1140
ggtcataacg atgattacga ccgcaccttg ccggatctga aagagggcac gctgctgttt 1200
gatgatgcca gcagttatga gctggaggcg ttcgtcaacg cgctgaaacc ggatctcatc 1260
ggttccggca tcaaagagaa gtacatcttt cagaaaatgg gcgtgccgtt tcgccagatg 1320
cactcctggg attactccgg cccgtaccac ggctatgacg gcttcgccat cttcgcccgc 1380
gatatggata tgacgctcaa caaccccgcg tggggccagt tgaccgcgcc gtggctgaaa 1440
tccgcctga 1449

<210> SEQ ID NO 67
<211> LENGTH: 1563
<212> TYPE: DNA
<213> ORGANISM: Kosakonia sacchari
<220> FEATURE:
<223> OTHER INFORMATION: nifK, strain CI006

<400> SEQUENCE: 67
atgagccaga ctgctgagaa aatacagaat tgccatcccc tgtttgaaca ggatgcttac 60
cagacgctgt ttgccggtaa acgggcactc gaagaggcgc actcgccgga gcgggtgcag 120
gaagtgtttc aatggaccac taccccggaa tatgaagcgc tgaactttaa acgcgaagcg 180
ctgactatcg acccggcaaa agcctgccag ccgctgggcg cggtgctctg ttcgctgggg 240
tttgccaata ccctaccgta tgtgcacggt tcacagggtt gcgtggccta tttccgcacg 300
tactttaacc gccactttaa agaaccggtg gcctgcgtgt cggattcaat gacggaagac 360
gcggcggtgt tcggcgggaa taacaacctc aacaccggct tacaaaacgc cagcgcgctg 420
tataaaccgg agattatcgc cgtctctacc acctgtatgg cggaagtgat cggtgatgat 480
ttgcaggcct ttatcgccaa cgccaaaaaa gatggttttc tcgatgccgc catccccgtg 540
ccctacgcgc acacccccag ttttatcggc agccatatca ccggctggga taacatgttt 600
gaaggttttg cccggacctt tacggcagac catgaagctc agcccggcaa actttcacgc 660
atcaacctgg tgaccgggtt tgaaacctat ctcggcaatt tccgcgtgct gaaacgcatg 720
atggaacaaa tggaggtgcc ggcgagtgtg ctctccgatc cgtcggaagt gctggatact 780
cccgccaacg ggcattacca gatgtacgcg ggcgggacga cgcagcaaga gatgcgcgag 840
gcgccggatg ctatcgacac cctgttgctg cagccctggc aactggtgaa aagcaaaaaa 900
gtggtgcagg agatgtggaa tcagcccgcc accgaggttt ctgttcccgt tgggctggca 960
ggaacagacg aactgttgat ggcgattagc cagttaaccg gcaaggccat tcccgattca 1020
ctggcgctgg agcgcgggcg gctggtcgat atgatgctcg attcccacac ctggttgcac 1080
ggtaaaaaat tcggcctgtt tggcgatccg gattttgtca tgggattgac ccgtttcctg 1140
ctggagctgg gctgcgaacc gaccgttatc ctctgccaca acggtaacaa acgctggcag 1200
aaagcaatga agaaaatgct tgacgcctcg ccgtacggcc aggagagcga agtgtttatc 1260

```
aactgcgatt tgtggcattt ccgctcgctg atgtttaccc gccagccgga ttttatgatt   1320

ggcaactcgt acggcaagtt cattcagcgc gacaccttag ccaaaggcga gcagtttgaa   1380

gttccgctga tccgcctcgg ttttcccctg ttcgaccgcc accatctgca ccgccagacc   1440

acctggggct acgagggcgc catgagcatt ctcactaccc ttgtgaatgc ggtactggag   1500

aaagtggaca aagagaccat caagctcggc aaaaccgact acagcttcga tcttatccgt   1560

taa                                                                 1563
```

<210> SEQ ID NO 68
<211> LENGTH: 1488
<212> TYPE: DNA
<213> ORGANISM: Kosakonia sacchari
<220> FEATURE:
<223> OTHER INFORMATION: nifL, strain CI006

<400> SEQUENCE: 68

```
atgaccctga atatgatgat ggatgccggc gcgcccgagg caatcgccgg tgcgctttcg     60

cgacaccatc ctgggctgtt ttttaccatc gttgaagaag cgcccgtcgc catttcgctg    120

actgatgccg acgcacgcat tgtctatgcc aacccggctt tctgccgcca gaccggctat    180

gaactagaag cgttgttgca gcaaaatccc cgcctgcttg caagtcgcca aaccccacgg    240

gaaatctatc aggatatgtg gcacaccttg ttacaacgcc gaccgtggcg cgggcaattg    300

attaaccgcc accgcgacgg cagcctgtat ctggtcgaga tcgatatcac cccggtgatt    360

aacccgtttg gcgaactgga acactacctg gcaatgcagc gcgatatcag cgccagttat    420

gcgctggagc agcggttgcg caatcacatg acgctgaccg aagcggtgct gaataacatt    480

ccggcggcgg tggttgtagt ggatgaacgc gatcatgtgg ttatggataa ccttgcctac    540

aaaacgttct gtgccgactg cggcggaaaa gagctcctga gcgaactcaa tttttcagcc    600

cgaaaagcgg agctggcaaa cggccaggtc ttaccggtgg tgctgcgcgg tgaggtgcgc    660

tggttgtcgg tgacctgctg ggcgctgccg ggcgtcagcg aagaagccag tcgctacttt    720

attgataaca ggctgacgcg cacgctggtg gtgatcaccg acgacaccca acaacgccag    780

cagcaggaac agggccgact tgaccgcctt aaacagcaga tgaccaacgg caaactactg    840

gcagcgatcc gcgaagcgct tgacgccgcg ctgatccagc ttaactgccc catcaatatg    900

ctggcggcgg cgcgacgttt aaacggcagt gataacaaca atgtggcgct cgacgccgcg    960

tggcgcgaag gtgaagaggc gatggcgcgg ctgaaacgtt gccgcccgtc gctggaactg   1020

gaaagtgcgg ccgtctggcc gctgcaaccc ttttttgacg atctgcgcgc gctttatcac   1080

acccgctacg agcaggggaa aaatttgcag gtcacgctgg attcccatca tctggtggga   1140

tttggtcagc gtacgcaact gttagcctgc ctgagtctgt ggctcgatcg cacgctggat   1200

attgccgccg ggctgggtga tttcaccgcg caaacgcaga tttacgcccg cgaagaagag   1260

ggctggctct ctttgtatat cactgacaat gtgccgctga tcccgctgcg ccacacccac   1320

tcgccggatg cgcttaacgc tccgggaaaa ggcatggagc tgcgcctgat ccagacgctg   1380

gtggcacacc accacggcgc aatagaactc acttcacacc ccgaaggggg aagttgcctg   1440

accctacgat tcccgctatt tcattcactg accggaggtt caaaatga                1488
```

<210> SEQ ID NO 69
<211> LENGTH: 1575
<212> TYPE: DNA
<213> ORGANISM: Kosakonia sacchari
<220> FEATURE:
<223> OTHER INFORMATION: nifA, strain CI006

<400> SEQUENCE: 69
atgacccagc gaaccgagtc gggtaatacc gtctggcgct tcgatttgtc ccagcagttc 60
actgcgatgc agcgcataag cgtggtactc agccgggcga ccgaggtcga tcagacgctc 120
cagcaagtgc tgtgcgtatt gcacaatgac gcctttttgc agcacggcat gatctgtctg 180
tacgacagcc agcaggcgat tttgaatatt gaagcgttgc aggaagccga tcagcagtta 240
atccccggca gctcgcaaat ccgctatcgt ccgggcgaag ggctggtcgg gacggtgctt 300
tcgcagggcc aatcattagt gctggcgcgc gttgctgacg atcagcgctt tcttgaccgg 360
ctcgggttgt atgattacaa cctgccgttt atcgccgtgc cgctgatagg gccagatgcg 420
cagactttcg gtgtgctgac ggcacaaccc atggcgcgtt acgaagagcg attacccgcc 480
tgcacccgct ttctggaaac ggtcgctaac ctggtcgcgc aaaccgtgcg tttgatggca 540
ccaccggcag tgcgcccttc cccgcgcgcc gccataacac aggccgccag cccgaaatcc 600
tgcacggcct cacgcgcatt tggttttgaa aatatggtcg gtaacagtcc ggcgatgcgc 660
cagaccatgg agattatccg tcaggtttcg cgctgggaca ccaccgttct ggtacgcggc 720
gagagtggca ccggcaagga gctgattgcc aacgccatcc accaccattc gccgcgtgcc 780
ggtgcgccat ttgtgaaatt caactgtgcg gcgctgccgg acacactgct ggaaagcgaa 840
ttgttcggtc acgagaaagg ggcatttacc ggcgcggtac gccagcgtaa aggccgtttt 900
gagctggccg atggcggcac gctgtttctt gacgagatcg gcgagagtag cgcctcgttt 960
caggctaagc tgctgcgcat tttgcaggaa ggcgaaatgg aacgcgtcgg cggcgacgag 1020
acattgcaag tgaatgtgcg cattattgcc gcgacgaacc gcaatcttga agatgaagtc 1080
cggctggggc actttcgcga agatctctat tatcgcctga atgtgatgcc catcgccctg 1140
ccgccactac gcgaacgcca ggaggacatt gccgagctgg cgcactttct ggtgcgtaaa 1200
atcgcccata accagagccg tacgctgcgc attagcgagg gcgctatccg cctgctgatg 1260
agctacaact ggcccggtaa tgtgcgcgaa ctggaaaact gccttgagcg ctcagcggtg 1320
atgtcggaga acggtctgat cgatcgggat gtgattttgt ttaatcatcg cgaccagcca 1380
gccaaaccgc cagttatcag cgtctcgcat gatgataact ggctcgataa caaccttgac 1440
gagcgccagc ggctgattgc ggcgctggaa aaagcgggat gggtacaagc caaagccgcg 1500
cgcttgctgg ggatgacgcc gcgccaggtc gcctatcgta ttcagacgat ggatataacc 1560
ctgccaaggc tataa 1575

<210> SEQ ID NO 70
<211> LENGTH: 876
<212> TYPE: DNA
<213> ORGANISM: Rahnella sp.
<220> FEATURE:
<223> OTHER INFORMATION: nifH, strain CI019

<400> SEQUENCE: 70
atggcaatgc gtcaatgtgc aatctacggg aaagggggta ttggtaaatc caccactacc 60
caaaaccttg tagcggctct ggccgaaatg aataagaagg tcatgatcgt cggctgtgac 120
cctaaggctg attcaacccg cctcattctg catgcgaaag cacagaacac catcatggaa 180
atggccgctg aagtgggctc cgtggaagat ctggagctgg aagatgtgat gcaaatcggc 240
tatggcggcg tgcgctgtgc ggaatcaggc ggccctgagc ctggtgtggg ttgtgccgga 300
cgcggggtga tcaccgccat caacttcctc gaagaagaag gcgcgtatgt gccggatctg 360

```
gatttcgtgt tttacgacgt attgggcgat gtggtctgtg gcggtttcgc gatgccaatt    420

cgcgaaaaca aagcgcagga aatctacatc gtatgctccg gtgaaatgat ggcgatgtat    480

gccgccaaca acatttccaa aggcatcgtg aaatacgcga aatcgggcaa agttcgcctg    540

gccgggctga tctgtaactc ccgccagacg gatcgcgaag atgaactgat catcgcgctg    600

gctgaaaaac ttggcacgca aatgatccac ttcgtgccgc gtgacaacat tgtgcaacgc    660

gctgaaatcc gccgcatgac ggtcatcgaa tacgacccga cttgtgcgca ggcagatcag    720

tatcgtgcac tggcgaacaa aatcgtcaac aacaccaaaa tggtggtgcc gacaccggtc    780

accatggatg agctggaagc cctgttaatg gaatttggca ttatggaaga agaagacctg    840

accatcgtcg gtcgtaccgc cgccgaagag gcgtga                              876
```

<210> SEQ ID NO 71
<211> LENGTH: 1449
<212> TYPE: DNA
<213> ORGANISM: Rahnella sp.
<220> FEATURE:
<223> OTHER INFORMATION: nifD, strain CI019

<400> SEQUENCE: 71

```
atgaccagtg aaacacgcga acgtaacgag gcattgatcc aggaagtgct ggagatcttc     60

cccgagaagg cgcttaaaga tcgtaagaaa cacatgatga ccaccgaccc ggcgatggaa    120

tctgtcggca agtgtattgt ctcaaaccgc aaatcacagc cgggcgtgat gaccgtgcga    180

ggctgcgctt acgccggttc caaaggcgtg gtctttggcc cgatcaaaga catggcgcat    240

atctcccacg gcccggttgg ttgcggccag tattctcgtg ccggacgccg taactattac    300

accggctgga gcggcgtgaa cagctttggc accctcaact tcaccagtga ttttcaggaa    360

cgggacatcg tatttggcgg cgataaaaag ctcgacaaac tgatcgacga actggagatg    420

ttgttcccgc tgaccaaagg catttcggta cagtcggaat gtccggtcgg tctgatcggc    480

gatgacattt ctgccgtcgc caaagccagc agcgccaaaa tcggtaagcc ggtcgtgccg    540

gtacgctgcg aggggttccg cggtgtgtcg caatcgctcg gccatcacat tgctaacgat    600

gtcatccgcg actgggtgct ggataaccgc gaaggcaatg aatttgaaac cacgccttac    660

gacgtggcga ttatcggcga ctacaacatc ggcggtgacg cctgggcctc acgtattctg    720

ctcgaagaaa tggggctgcg tgtggtggcg cagtggtccg gcgacggcac gctggtggag    780

atggaaaaca ccccgaaagt cgcactcaat ctggtgcact gctaccgctc gatgaactac    840

atctcccgtc atatggaaga aaaacacggc attccgtgga tggaatacaa cttctttggc    900

ccgaccaaaa ttgcggaatc tctgcgcgaa atcgcggcgc gttttgacga taccatccgg    960

aaaaacgccg aagcggtgat tgaaaaatat caggcgcaaa cgcaggcggt gatcgacaaa   1020

taccgtccgc gtctggaagg caaaaaggtg ctgttgtatc tcggcggttt acgtccgcgc   1080

cacatcatcg gggcgtatga agatctggga atggaaatca tcggtaccgg ctatgaattc   1140

ggtcataacg atgattacga ccgcacctta ccgatgctca aagaaggcac gttgctgttc   1200

gatgacctga gcagttatga gctggaagcg ttcgttaaag cgctgaaacc ggatcttgtc   1260

gggtcaggca tcaaagaaaa atacattttc cagaaaatgg gcgtgccgtt ccgccagatg   1320

cactcctggg attattccgg cccttatcac ggctacgacg gtttcggcat tttgcccgt    1380

gacatggaca tgacgctgaa caatccgggc tggagtcagc tgaccgcccc ctggttgaaa   1440

tcggcctga                                                           1449
```

<210> SEQ ID NO 72
<211> LENGTH: 1569
<212> TYPE: DNA
<213> ORGANISM: Rahnella sp.
<220> FEATURE:
<223> OTHER INFORMATION: nifK, strain CI019

<400> SEQUENCE: 72
atgagtcaag atcttggcac cccaaaatcc tgtttcccgc tgttcgagca ggatgaatac 60
cagagtatgt ttacccacaa acgcgcgctg gaagaagcac acggcgaggc gaaagtgcgg 120
gaagtgtttg aatggaccac cacgcaggaa tatcaggatc tgaacttctc gcgtgaagcg 180
ctgaccgtcg acccggcgaa agcctgccag ccgttaggcg cggtactttg cgcgctgggt 240
tttgccaaca cgttgccgta tgtccacggt tcacaaggct gtgtggcgta tttccgtacc 300
tattttaatc gtcatttcaa agagccggtg gcctgtgttt ccgactcaat gaccgaagat 360
gccgccgttt ttggcggaaa taacaacatg aatgtcggtc tggaaaacgc cagcgcgctg 420
tacaagccgg aaattattgc tgtctccacc acctgtatgg cggaagtgat cggtgatgac 480
ctgcaggctt ttatcgccaa cgccaaaaaa gacggatttg tggatgccgg tatgccaatc 540
ccgtatgccc atacaccgag ttttctgggc agtcatgtca ccggctggga caacatgttt 600
gaaggcttcg cccgtacctt taccaccgac gccacgcggg aatatcagcc gggcaaactt 660
gccaaactga acgtggtgac cggttttgaa acttatctcg gcaactaccg ggttattcac 720
cgcatgatga gccagatggg ggtcgaatgc agcgtcttgt ccgatccgtc tgaagtgctc 780
gacaccccgg ctgacggcca ataccgcatg tatgccggcg gcaccacgca aaccgaaatg 840
cgtgatgcac cggatgccat cgacaccttg ctgctgcaac cgtggcaatt gcagaaaacc 900
aaaaaagtgg tgcagggcga ctggaatcag ccgggcaccg aagtcagtgt accgattggc 960
ctggcggcga ccgatgcctt gctgatgacg gtaagcgaac tgaccggcaa accgatagct 1020
gacacgctgg cgactgaacg tggccgtctg gtggacatga tgctcgattc ccacacctgg 1080
ctgcatggca agcgtttcgg tctctacggt gacccggatt ttgtgatggg catgaccgca 1140
ttcctgctgg aactgggctg tgaaccgacc accattctca gccataacgg caacaaacgc 1200
tggcagaaag ccatgaagaa aatgctggct gattcgcctt acgggcagga cagcgaagtg 1260
tatgtgaact gcgatctgtg gcatttccgc tcgctgatgt ttacccgtaa accggacttt 1320
atgatcggca actcttacgg aaaattcatt cagcgtgaca cgctggccaa aggcgaacag 1380
ttcgaagtgc cgctgatccg catcggtttt ccgatttttg accggcacca tttgcaccgt 1440
cagaccacct ggggatacga aggggcgatg agcatactga cgcaactggt gaatgcggta 1500
cttgaacaac tggatcgcga aaccatgaag ctcggcaaaa ccgactacaa cttcgacctg 1560
atccgctaa 1569

<210> SEQ ID NO 73
<211> LENGTH: 1488
<212> TYPE: DNA
<213> ORGANISM: Rahnella sp.
<220> FEATURE:
<223> OTHER INFORMATION: nifL, strain CI019

<400> SEQUENCE: 73
atgagcatca cggcgttatc agcatcattt cctgagggga atatcgccag ccgcttgtcg 60
ctgcaacatc cttcactgtt ttataccgtg gttgaacaat cttcggtggc gatttcgctg 120
accgatccgc aggcgcgcat ttgttatgcc aatccggcat tctgccgcca gacgggtttt 180

```
gcacttgaga cacttttggg cgagaaccac cgtctgctgg ccagccagca gacgccgaaa    240

catatctatg acgaaatgtg gcgcactttg ttgcagggca aatcctggaa cggccaactg    300

atcaaccggc gtaataaccg ttcgctttat ctggcggatg tcactatcac gcctgtttta    360

ggcgcggacg ggcaggtgga gcattacctc ggcatgcaca aagatatcag cgagaaatac    420

gcgctggaac agcggttgcg caaccacatc accttgttca cggaggtgct gaacaatatt    480

cccgccgccg tggtggtggt ggatgagcag gacaatgtgg tgatggacaa tctggcctac    540

aaaacccttt gcgcggactg cggcggcaaa gagctgctgg ctgaaatggg ctatccgcaa    600

ctcaaagaga tgctcaacag tggcgaaccg gtgccggttt ccatgcgcgg caacgtacgc    660

tggttttctt tcggtcaatg gttattgcag ggcgttaatg aagaggccag ccgcttttttt    720

accggcatta ccgcgccggg aaaactgatt gttctgaccg actgcaccga tcagcatcac    780

cggcagcagc agggttatct tgaccggctt aagcaaaaac tcaccaacgg caaattattg    840

gcggccatcc gtgagtcgct cgatgccgcg cttatccagc tcaacgggcc aatcaatatg    900

ctggcggctg cgcgtcgtct taacggcgaa gaaggcaaca acatggcgct ggaattcgcc    960

tggcgcgaag gcgagcaggc ggtgagtcgc ttacaggcct gccgtccgtc gctggatttt   1020

gagccgcagg cagaatggcc ggtcagtgaa ttctttgacg atctgagcgc gctgtacgac   1080

agccattttc tcagtgacgg tgaattgcgt tacgtggtca tgccatctga tctgcacgct   1140

gtcgggcaac gaacgcaaat ccttaccgcg ctgagcttat ggattgatca cacgctgtca   1200

caggcgcagg ccatgccgtc tctgaagctc tcggtgaaca ttgttgcgag gcaggatgcg   1260

agctggttgt gttttgacat taccgataat gtgccgcgtg aacgggtgcg ttatgcccgc   1320

ccggaagcgg cgttttcccg tccggggaat ggcatggagc tgcgccttat ccagacgctg   1380

atcgcccatc atcgcggttc tttagatctc tcggtccgcc ctgatggcgg caccttgctg   1440

acgttacgcc tgccggtaca gcaggttatc accggaggct taaaatga                1488
```

<210> SEQ ID NO 74
<211> LENGTH: 1557
<212> TYPE: DNA
<213> ORGANISM: Rahnella sp.
<220> FEATURE:
<223> OTHER INFORMATION: nifA, strain CI019

<400> SEQUENCE: 74

```
atgacccagt tacctaccgc gggcccggtt atccggcgct ttgatatgtc tgcccagttt     60

acggcgcttt atcgcatcag cgtggcgctg agtcaggaaa gcaacaccgg gcgcgcactg    120

gcggcgatcc tcgaagtgct tcacgatcat gcatttatgc aatacggcat ggtgtgtctg    180

tttgataaag aacgcaatgc actctttgtg gaatccctgc atggcatcga cggcgaaagg    240

aaaaaagaga cccgccatgt ccgttaccgc atgggggaag gcgtgatcgg cgcggtgatg    300

agccagcgtc aggcgctggt gttaccgcgc atttcagacg atcagcgttt tctcgaccgc    360

ctgaatattt acgattacag cctgccgttg attggcgtgc cgatccccgg tgcggataat    420

cagccatcgg gcgtgctggt ggcacagccg atggcgttgc acgaagaccg gctgactgcc    480

agtacgcggt ttttagaaat ggtcgccaat ctcatcagcc agccactgcg ttctgccacg    540

cccccggaat cattgcctgc tcaaacgccg gtccggtgca gtgttccgcg ccagtttggt    600

ttcgagcaga tggtcgggaa aagtcaggcg atgcgccaga cgatggacat tttacggcag    660

gtttccaaat gggataccac ggttctggtg cgtggtgaaa gcggcaccgg caaggaactt    720

atcgccaatg ccattcatta caactcaccc cgtgcggccg cgccatttgt gaaattcaac    780
```

tgcgccgcgc tgccggataa cctgctggaa agcgaactgt tcggtcatga aaaaggggcc 840
ttcaccggcg ctatccgtac ccgtaaaggc cgctttgaac tggcggacgg gggcacgtta 900
ttcctcgatg aaatcggcga atcgagcgcg tcgtttcagg ccaaattgct gcgcattttg 960
caggaaggtg aaatggaacg ggtcggcggc gataccacgc tgaaagttga tgtgcgcatt 1020
attgctgcca ccaaccgtaa tcttgaagag gaagtgcgtg ccgggaattt tcgcgaagac 1080
ctgtattatc gcctgaacgt gatgccggtt tcgctgcctg cactgcgtga aaggctggat 1140
gatatcgccg atctggcgcc gtttctggtc aaaaagattg cgctgcgtca ggggcgggaa 1200
ctgcgcatca gcgacggtgc ggtgcgtctg ctgatgacct acagctggcc aggcaacgtg 1260
cgtgaactgg aaaactgtct cgaacgggcg tcggtaatga ccgatgaagg gctgatcgac 1320
cgcgacgtga tcctgttcaa tcaccatgaa tccccggcgc tgtccgtcaa acccggcctg 1380
ccgctcgcga cagatgaaag ctggctggat caggaactcg acgaacgcca gcgggtgatt 1440
gccgcactgg agaaaaccgg ctgggtgcag gccaaagcgg cccgactgct gggcatgaca 1500
ccgcgccaga ttgcctaccg tatccagatt atggacatca acatgcaccg tatctga 1557

<210> SEQ ID NO 75
<211> LENGTH: 1314
<212> TYPE: DNA
<213> ORGANISM: Kosakonia sacchari
<220> FEATURE:
<223> OTHER INFORMATION: Prm5 with 500bp flanking regions, strain CI006

<400> SEQUENCE: 75
aaaactaccg ccgcaattaa tgaacccaac gctactgttg ccgggccatg ctcttccccg 60
gcgcgctgcc cggaaaggat atagattgcc cagcacgcgc cagcaccaag cgcgaacgcc 120
gcgccagtga gatcaacatg tgaaacattt tcgcccagcg gcagcagata caagaggcca 180
agtaccgcca ggatcaccca gatgaaatcc accgggcggc gtgaggcaaa aagcgccacc 240
gccagcgggc cggtaaattc cagcgccacc gcaacgccga gcggtatcgt ctggatcgat 300
aaatagaaca tatagttcat ggcgccgagc gacaggccat aaaacagcag tggcaggcgt 360
tgttcacggg taaaatgtaa acgccagggc ttgaacacta cgaccaaaat aagggtgcca 420
agtgcgagac gcagcgcggt gacgccgggt gcgccaacaa tcggaaacag tgatttcgcc 480
agcgacgcgc ctccctgaat ggacatcatc gcgacaaaca atattaatac cggcaaccac 540
accggcaatt tacgagactg cgcaggcatc ctttctcccg tcaatttctg tcaaataaag 600
taaaagaggc agtctacttg aattaccccc ggctggttga gcgtttgttg aaaaaaagta 660
actgaaaaat ccgtagaata gcgccactct gatggttaat taacctattc aattaagaat 720
tatctggatg aatgtgccat taaatgcgca gcataatggt gcgttgtgcg ggaaaactgc 780 tttttttga aagggttggt cagtagcgga aactttctgt tacatcaaat ggcgctttag 840
accccaattc ccgcaaagag tttcttaact aattttgata tatttaaacg cgtaggacgt 900
aggatttact tgaagcacat ttgaggtgga ttatgaaaaa aattgcatgt ctttcagcac 960
tggccgcact tctggcggtt tctgcaggtt ccgcagtagc agcaacttca accgtaactg 1020
gcggctacgc tcagagcgac gctcagggta ttgctaacaa aactaacggt ttcaacctga 1080
aatatcgcta cgagcaggac aacaacccgc tgggtgttat cggttccttt acttacactg 1140
aaaaagatcg caccgaaagc agcgtttata acaaagcgca gtactacggc atcaccgcag 1200
gcccggctta ccgcatcaac gactgggcga gcatctacgg tgttgtgggt gtaggttacg 1260
gtaaattcca gcagactgta gacaccgcta aagtgtctga caccagcgac tacg 1314

<210> SEQ ID NO 76
<211> LENGTH: 3413
<212> TYPE: DNA
<213> ORGANISM: Kosakonia sacchari
<220> FEATURE:
<223> OTHER INFORMATION: nifLA operon - upstream intergenic region plus
nifL and nifA CDSs, strain CI006

<400> SEQUENCE: 76
aacacacgct cctgttgaaa aagagatccc gccgggaaat gcggtgaacg tgtctgatat 60
tgcgaagagt gtgccagttt tggtcgcggg caaaacctgc accagtttgg ttattaatgc 120
accagtctgg cgcttttttt cgccgagttt ctcctcgcta atgcccgcca ggcgcggctt 180
tggcgctgat agcgcgctga ataccgatct ggatcaaggt tttgtcgggt tatcagccaa 240
aaggtgcact ctttgcatgg ttatacgtgc ctgacatgtt gtccgggcga caaacggcct 300
ggtggcacaa attgtcagaa ctacgacacg actaactgac cgcaggagtg tgcgatgacc 360
ctgaatatga tgatggatgc cggcgcgccc gaggcaatcg ccggtgcgct ttcgcgacac 420
catcctgggc tgtttttac catcgttgaa gaagcgcccg tcgccatttc gctgactgat 480
gccgacgcac gcattgtcta tgccaacccg gctttctgcc gccagaccgg ctatgaacta 540
gaagcgttgt tgcagcaaaa tccccgcctg cttgcaagtc gccaaacccc acgggaaatc 600
tatcaggata tgtggcacac cttgttacaa cgccgaccgt ggcgcgggca attgattaac 660
cgccaccgcg acggcagcct gtatctggtc gagatcgata tcaccccggt gattaacccg 720
tttggcgaac tggaacacta cctggcaatg cagcgcgata tcagcgccag ttatgcgctg 780
gagcagcggt tgcgcaatca catgacgctg accgaagcgg tgctgaataa cattccggcg 840
gcggtggttg tagtggatga acgcgatcat gtggttatgg ataaccttgc ctacaaaacg 900
ttctgtgccg actgcggcgg aaaagagctc ctgagcgaac tcaatttttc agcccgaaaa 960
gcggagctgg caaacggcca ggtcttaccg gtggtgctgc gcggtgaggt gcgctggttg 1020
tcggtgacct gctgggcgct gccgggcgtc agcgaagaag ccagtcgcta ctttattgat 1080
aacaggctga cgcgcacgct ggtggtgatc accgacgaca cccaacaacg ccagcagcag 1140
gaacagggcc gacttgaccg ccttaaacag cagatgacca acggcaaact actggcagcg 1200
atccgcgaag cgcttgacgc cgcgctgatc cagcttaact gccccatcaa tatgctggcg 1260
gcggcgcgac gtttaaacgg cagtgataac aacaatgtgg cgctcgacgc cgcgtggcgc 1320
gaaggtgaag aggcgatggc gcggctgaaa cgttgccgcc cgtcgctgga actggaaagt 1380
gcggccgtct ggccgctgca accctttttt gacgatctgc gcgcgcttta tcacacccgc 1440
tacgagcagg ggaaaaattt gcaggtcacg ctggattccc atcatctggt gggatttggt 1500
cagcgtacgc aactgttagc ctgcctgagt ctgtggctcg atcgcacgct ggatattgcc 1560
gccgggctgg gtgatttcac cgcgcaaacg cagatttacg cccgcgaaga agagggctgg 1620
ctctctttgt atatcactga caatgtgccg ctgatcccgc tgcgccacac ccactcgccg 1680
gatgcgctta acgctccggg aaaaggcatg gagctgcgcc tgatccagac gctggtggca 1740
caccaccacg gcgcaataga actcacttca caccccgaag gggaagttg cctgacccta 1800 cgattcccgc tatttcattc actgaccgga ggttcaaaat gacccagcga accgagtcgg 1860
gtaataccgt ctggcgcttc gatttgtccc agcagttcac tgcgatgcag cgcataagcg 1920
tggtactcag ccgggcgacc gaggtcgatc agacgctcca gcaagtgctg tgcgtattgc 1980

```
acaatgacgc ctttttgcag cacggcatga tctgtctgta cgacagccag caggcgattt   2040
tgaatattga agcgttgcag gaagccgatc agcagttaat ccccggcagc tcgcaaatcc   2100
gctatcgtcc gggcgaaggg ctggtcggga cggtgctttc gcagggccaa tcattagtgc   2160
tggcgcgcgt tgctgacgat cagcgctttc ttgaccggct cgggttgtat gattacaacc   2220
tgccgtttat cgccgtgccg ctgatagggc cagatgcgca gactttcggt gtgctgacgg   2280
cacaacccat ggcgcgttac gaagagcgat tacccgcctg cacccgcttt ctggaaacgg   2340
tcgctaacct ggtcgcgcaa accgtgcgtt tgatggcacc accggcagtg cgcccttccc   2400
cgcgcgccgc cataacacag gccgccagcc cgaaatcctg cacggcctca cgcgcatttg   2460
gttttgaaaa tatggtcggt aacagtccgg cgatgcgcca gaccatggag attatccgtc   2520
aggtttcgcg ctgggacacc accgttctgg tacgcggcga gagtggcacc ggcaaggagc   2580
tgattgccaa cgccatccac caccattcgc cgcgtgccgg tgcgccattt gtgaaattca   2640
actgtgcggc gctgccggac acactgctgg aaagcgaatt gttcggtcac gagaaagggg   2700
catttaccgg cgcggtacgc cagcgtaaag gccgttttga gctggccgat ggcggcacgc   2760
tgtttcttga cgagatcggc gagagtagcg cctcgtttca ggctaagctg ctgcgcattt   2820
tgcaggaagg cgaaatggaa cgcgtcggcg gcgacgagac attgcaagtg aatgtgcgca   2880
ttattgccgc gacgaaccgc aatcttgaag atgaagtccg gctggggcac tttcgcgaag   2940
atctctatta tcgcctgaat gtgatgccca tcgccctgcc gccactacgc gaacgccagg   3000
aggacattgc cgagctggcg cactttctgg tgcgtaaaat cgcccataac cagagccgta   3060
cgctgcgcat tagcgagggc gctatccgcc tgctgatgag ctacaactgg cccggtaatg   3120
tgcgcgaact ggaaaactgc cttgagcgct cagcggtgat gtcggagaac ggtctgatcg   3180
atcgggatgt gattttgttt aatcatcgcg accagccagc caaaccgcca gttatcagcg   3240
tctcgcatga tgataactgg ctcgataaca accttgacga gcgccagcgg ctgattgcgg   3300
cgctggaaaa agcgggatgg gtacaagcca aagccgcgcg cttgctgggg atgacgccgc   3360
gccaggtcgc ctatcgtatt cagacgatgg atataaccct gccaaggcta taa          3413
```

<210> SEQ ID NO 77
<211> LENGTH: 495
<212> TYPE: PRT
<213> ORGANISM: Kosakonia sacchari
<220> FEATURE:
<223> OTHER INFORMATION: NifL, strain CI006

<400> SEQUENCE: 77

```
Met Thr Leu Asn Met Met Met Asp Ala Gly Ala Pro Glu Ala Ile Ala
1               5                   10                  15

Gly Ala Leu Ser Arg His His Pro Gly Leu Phe Phe Thr Ile Val Glu
            20                  25                  30

Glu Ala Pro Val Ala Ile Ser Leu Thr Asp Ala Asp Ala Arg Ile Val
        35                  40                  45

Tyr Ala Asn Pro Ala Phe Cys Arg Gln Thr Gly Tyr Glu Leu Glu Ala
    50                  55                  60

Leu Leu Gln Gln Asn Pro Arg Leu Leu Ala Ser Arg Gln Thr Pro Arg
65                  70                  75                  80

Glu Ile Tyr Gln Asp Met Trp His Thr Leu Leu Gln Arg Arg Pro Trp
                85                  90                  95

Arg Gly Gln Leu Ile Asn Arg His Arg Asp Gly Ser Leu Tyr Leu Val
            100                 105                 110
```

```
Glu Ile Asp Ile Thr Pro Val Ile Asn Pro Phe Gly Glu Leu Glu His
        115                 120                 125

Tyr Leu Ala Met Gln Arg Asp Ile Ser Ala Ser Tyr Ala Leu Glu Gln
    130                 135                 140

Arg Leu Arg Asn His Met Thr Leu Thr Glu Ala Val Leu Asn Asn Ile
145                 150                 155                 160

Pro Ala Ala Val Val Val Val Asp Glu Arg Asp His Val Val Met Asp
                165                 170                 175

Asn Leu Ala Tyr Lys Thr Phe Cys Ala Asp Cys Gly Gly Lys Glu Leu
            180                 185                 190

Leu Ser Glu Leu Asn Phe Ser Ala Arg Lys Ala Glu Leu Ala Asn Gly
        195                 200                 205

Gln Val Leu Pro Val Val Leu Arg Gly Glu Val Arg Trp Leu Ser Val
    210                 215                 220

Thr Cys Trp Ala Leu Pro Gly Val Ser Glu Glu Ala Ser Arg Tyr Phe
225                 230                 235                 240

Ile Asp Asn Arg Leu Thr Arg Thr Leu Val Val Ile Thr Asp Asp Thr
                245                 250                 255

Gln Gln Arg Gln Gln Gln Glu Gln Gly Arg Leu Asp Arg Leu Lys Gln
            260                 265                 270

Gln Met Thr Asn Gly Lys Leu Leu Ala Ala Ile Arg Glu Ala Leu Asp
        275                 280                 285

Ala Ala Leu Ile Gln Leu Asn Cys Pro Ile Asn Met Leu Ala Ala Ala
    290                 295                 300

Arg Arg Leu Asn Gly Ser Asp Asn Asn Asn Val Ala Leu Asp Ala Ala
305                 310                 315                 320

Trp Arg Glu Gly Glu Glu Ala Met Ala Arg Leu Lys Arg Cys Arg Pro
                325                 330                 335

Ser Leu Glu Leu Glu Ser Ala Ala Val Trp Pro Leu Gln Pro Phe Phe
            340                 345                 350

Asp Asp Leu Arg Ala Leu Tyr His Thr Arg Tyr Glu Gln Gly Lys Asn
        355                 360                 365

Leu Gln Val Thr Leu Asp Ser His His Leu Val Gly Phe Gly Gln Arg
    370                 375                 380

Thr Gln Leu Leu Ala Cys Leu Ser Leu Trp Leu Asp Arg Thr Leu Asp
385                 390                 395                 400

Ile Ala Ala Gly Leu Gly Asp Phe Thr Ala Gln Thr Gln Ile Tyr Ala
                405                 410                 415

Arg Glu Glu Glu Gly Trp Leu Ser Leu Tyr Ile Thr Asp Asn Val Pro
            420                 425                 430

Leu Ile Pro Leu Arg His Thr His Ser Pro Asp Ala Leu Asn Ala Pro
        435                 440                 445

Gly Lys Gly Met Glu Leu Arg Leu Ile Gln Thr Leu Val Ala His His
    450                 455                 460

His Gly Ala Ile Glu Leu Thr Ser His Pro Glu Gly Gly Ser Cys Leu
465                 470                 475                 480

Thr Leu Arg Phe Pro Leu Phe His Ser Leu Thr Gly Gly Ser Lys
                485                 490                 495
```

<210> SEQ ID NO 78
<211> LENGTH: 524
<212> TYPE: PRT
<213> ORGANISM: Kosakonia sacchari
<220> FEATURE:
<223> OTHER INFORMATION: NifA, strain CI006

<400> SEQUENCE: 78

Met Thr Gln Arg Thr Glu Ser Gly Asn Thr Val Trp Arg Phe Asp Leu
1 5 10 15

Ser Gln Gln Phe Thr Ala Met Gln Arg Ile Ser Val Val Leu Ser Arg
20 25 30

Ala Thr Glu Val Asp Gln Thr Leu Gln Gln Val Leu Cys Val Leu His
35 40 45

Asn Asp Ala Phe Leu Gln His Gly Met Ile Cys Leu Tyr Asp Ser Gln
50 55 60

Gln Ala Ile Leu Asn Ile Glu Ala Leu Gln Glu Ala Asp Gln Gln Leu
65 70 75 80

Ile Pro Gly Ser Ser Gln Ile Arg Tyr Arg Pro Gly Glu Gly Leu Val
85 90 95

Gly Thr Val Leu Ser Gln Gly Gln Ser Leu Val Leu Ala Arg Val Ala
100 105 110

Asp Asp Gln Arg Phe Leu Asp Arg Leu Gly Leu Tyr Asp Tyr Asn Leu
115 120 125

Pro Phe Ile Ala Val Pro Leu Ile Gly Pro Asp Ala Gln Thr Phe Gly
130 135 140

Val Leu Thr Ala Gln Pro Met Ala Arg Tyr Glu Glu Arg Leu Pro Ala
145 150 155 160

Cys Thr Arg Phe Leu Glu Thr Val Ala Asn Leu Val Ala Gln Thr Val
165 170 175

Arg Leu Met Ala Pro Pro Ala Val Arg Pro Ser Pro Arg Ala Ala Ile
180 185 190

Thr Gln Ala Ala Ser Pro Lys Ser Cys Thr Ala Ser Arg Ala Phe Gly
195 200 205

Phe Glu Asn Met Val Gly Asn Ser Pro Ala Met Arg Gln Thr Met Glu
210 215 220

Ile Ile Arg Gln Val Ser Arg Trp Asp Thr Thr Val Leu Val Arg Gly
225 230 235 240

Glu Ser Gly Thr Gly Lys Glu Leu Ile Ala Asn Ala Ile His His His
245 250 255

Ser Pro Arg Ala Gly Ala Pro Phe Val Lys Phe Asn Cys Ala Ala Leu
260 265 270

Pro Asp Thr Leu Leu Glu Ser Glu Leu Phe Gly His Glu Lys Gly Ala
275 280 285

Phe Thr Gly Ala Val Arg Gln Arg Lys Gly Arg Phe Glu Leu Ala Asp
290 295 300

Gly Gly Thr Leu Phe Leu Asp Glu Ile Gly Glu Ser Ser Ala Ser Phe
305 310 315 320

Gln Ala Lys Leu Leu Arg Ile Leu Gln Glu Gly Glu Met Glu Arg Val
325 330 335

Gly Gly Asp Glu Thr Leu Gln Val Asn Val Arg Ile Ile Ala Ala Thr
340 345 350

Asn Arg Asn Leu Glu Asp Glu Val Arg Leu Gly His Phe Arg Glu Asp
355 360 365

Leu Tyr Tyr Arg Leu Asn Val Met Pro Ile Ala Leu Pro Pro Leu Arg
370 375 380

Glu Arg Gln Glu Asp Ile Ala Glu Leu Ala His Phe Leu Val Arg Lys
385 390 395 400

Ile Ala His Asn Gln Ser Arg Thr Leu Arg Ile Ser Glu Gly Ala Ile

```
                405                 410                 415

Arg Leu Leu Met Ser Tyr Asn Trp Pro Gly Asn Val Arg Glu Leu Glu
            420                 425                 430

Asn Cys Leu Glu Arg Ser Ala Val Met Ser Glu Asn Gly Leu Ile Asp
        435                 440                 445

Arg Asp Val Ile Leu Phe Asn His Arg Asp Gln Pro Ala Lys Pro Pro
    450                 455                 460

Val Ile Ser Val Ser His Asp Asp Asn Trp Leu Asp Asn Asn Leu Asp
465                 470                 475                 480

Glu Arg Gln Arg Leu Ile Ala Ala Leu Glu Lys Ala Gly Trp Val Gln
                485                 490                 495

Ala Lys Ala Ala Arg Leu Leu Gly Met Thr Pro Arg Gln Val Ala Tyr
            500                 505                 510

Arg Ile Gln Thr Met Asp Ile Thr Leu Pro Arg Leu
        515                 520


<210> SEQ ID NO 79
<211> LENGTH: 2850
<212> TYPE: DNA
<213> ORGANISM: Kosakonia sacchari
<220> FEATURE:
<223> OTHER INFORMATION: glnE, strain CI006

<400> SEQUENCE: 79

atgccgcacc acgcaggatt gtcgcagcac tggcaaacgg tattttctcg tctgccggaa     60

tcgctcaccg cgcagccatt gagcgcgcag gcgcagtcag tgctcacttt tagtgatttt    120

gttcaggaca gcatcatcgc gcatcctgag tggctggcag agcttgaaag cgcgccgccg    180

cctgcgaacg aatggcaaca ctatgcgcaa tggctgcaag cggcgctgga tggcgtcacc    240

gatgaagcct cgctgatgcg cgcgctgcgg ctgtttcgcc gtcgcatcat ggtgcgcatc    300

gcctggagcc aggcgttaca gttggtggcg gaagaagata tcctgcaaca gcttagcgtg    360

ctggcggaaa ccctgatcgt cgccgcgcgc gactggcttt atgaggcctg ctgccgtgag    420

tggggaacgc cgagcaatcc acaaggcgtg gcgcagccga tgctggtact cggcatgggc    480

aaactgggtg gcggcgaact caatttctca tccgatatcg atttgatttt cgcctggccg    540

gaaaatggcg caacgcgcgg tggacgccgt gagctggata acgcgcaatt tttcactcgc    600

cttggtcaac ggctgattaa agtcctcgac cagccaacgc aggatggctt tgtctaccgc    660

gtcgatatgc gcttgcgccc gtttggcgac agcggcccgc tggtgctgag ctttgccgcg    720

ctggaagatt actaccagga gcaggggcgc gattgggaac gctacgcgat ggtgaaagcg    780

cgcattatgg gcgataacga cggcgaccat gcgcgggagt tgcgcgcaat gctgcgcccg    840

tttgttttcc gccgttatat cgacttcagc gtgattcagt ccctgcgtaa catgaaaggc    900

atgattgccc gcgaagtgcg tcgccgtggc ctgaaggaca acattaagct cggcgcgggc    960

gggatccgcg aaatagaatt tatcgtccag gttttccagc tgattcgcgg cggtcgcgag   1020

cctgcactgc aatcgcgttc actgttgccg acgcttgctg ccatagatca actgcatctg   1080

ctgccggatg gcgacgcaac ccggctgcgc gaggcgtatt tgtggctgcg acggctggag   1140

aacctgctgc aaagcatcaa tgacgaacag acacagacgc tgccgggcga tgaactgaat   1200

cgcgcgcgcc tcgcctgggg aatgggcaaa gatagctggg aagcgctctg cgaaacgctg   1260

gaagcgcata tgtcggcggt gcgtcagata tttaacgatc tgattggcga tgatgaaacg   1320

gattcgccgg aagatgcgct ttctgagagc tggcgcgaat tgtggcagga tgcgttgcag   1380
```

```
gaggaggatt ccacgcccgt gctggcgcat ctctcagagg acgatcgccg ccgcgtggtg   1440
gcgctgattg ccgattttcg caaagagttg gataaacgca ccattggccc gcgagggcgg   1500
caggtactcg atcacttaat gccgcatctg ctcagcgatg tatgctcgcg cgacgatgcg   1560
ccagtaccgc tgtcacgcct gacgccgctg ctcaccggaa ttattacccg caccacttac   1620
cttgagctgc taagtgaatt tcccggcgca ctgaaacacc tcatttccct gtgtgccgcg   1680
tcgccgatgg ttgccagtca gctggcgcgc tacccgatcc tgcttgatga attgctcgac   1740
ccgaatacgc tctatcaacc gacggcgatg aatgcctatc gcgatgagct gcgccaatac   1800
ctgctgcgcg tgccggaaga tgatgaagag caacagcttg aggcgctgcg gcagtttaag   1860
caggcgcagt tgctgcgcgt ggcggcggcg gatattgccg gtacgttgcc agtaatgaaa   1920
gtgagcgatc acttaacctg gctggcggaa gcgattattg atgcggtggt gcagcaagcc   1980
tgggggcaga tggtggcgcg ttatggccag ccaacgcatc tgcacgatcg cgaagggcgc   2040
ggttttgcgg tggtcggtta tggcaagctg ggcggctggg agctgggtta cagctccgat   2100
ctggatctgg tattcctgca cgactgcccg atggatgtga tgaccgatgg cgagcgtgaa   2160
atcgatggtc gccagttcta tttgcgtctc gcgcagcgcg tgatgcacct gtttagcacg   2220
cgcacgtcgt ccggcatcct ttatgaagtt gatgcgcgtc tgcgtccatc tggcgctgcg   2280
gggatgctgg tcactactac ggaatcgttc gccgattacc agcaaaacga agcctggacg   2340
tgggaacatc aggcgctggc ccgtgcgcgc gtggtgtacg gcgatccgca actgaccgcc   2400
gaatttgacg ccattcgccg cgatattctg atgacgcctc gcgacggcgc aacgctgcaa   2460
accgacgtgc gagaaatgcg cgagaaaatg cgtgcccatc ttggcaacaa gcataaagac   2520
cgcttcgatc tgaaagccga tgaaggcggt atcaccgaca tcgagtttat cgcccaatat   2580
ctggtgctgc gctttgccca tgacaagccg aaactgacgc gctggtcgga taatgtgcgc   2640
attctcgaag ggctggcgca aaacggcatc atggaggagc aggaagcgca ggcattgacg   2700
ctggcgtaca ccacattgcg tgatgagctg caccacctgg cgctgcaaga gttgccggga   2760
catgtggcgc tctcctgttt tgtcgccgag cgtgcgctta ttaaaaccag ctgggacaag   2820
tggctggtgg aaccgtgcgc cccggcgtaa                                    2850
```

```
<210> SEQ ID NO 80
<211> LENGTH: 1563
<212> TYPE: DNA
<213> ORGANISM: Kosakonia sacchari
<220> FEATURE:
<223> OTHER INFORMATION: glnE_KO1, strain CI006

<400> SEQUENCE: 80
```

```
atgtttaacg atctgattgg cgatgatgaa acggattcgc cggaagatgc gctttctgag     60
agctggcgcg aattgtggca ggatgcgttg caggaggagg attccacgcc cgtgctggcg    120
catctctcag aggacgatcg ccgccgcgtg gtggcgctga ttgccgattt tcgcaaagag    180
ttggataaac gcaccattgg cccgcgaggg cggcaggtac tcgatcactt aatgccgcat    240
ctgctcagcg atgtatgctc gcgcgacgat gcgccagtac cgctgtcacg cctgacgccg    300
ctgctcaccg gaattattac ccgcaccact taccttgagc tgctaagtga atttcccggc    360
gcactgaaac acctcatttc cctgtgtgcc gcgtcgccga tggttgccag tcagctggcg    420
cgctacccga tcctgcttga tgaattgctc gacccgaata cgctctatca accgacggcg    480
atgaatgcct atcgcgatga gctgcgccaa tacctgctgc gcgtgccgga agatgatgaa    540
gagcaacagc ttgaggcgct gcggcagttt aagcaggcgc agttgctgcg cgtggcggcg    600
```

```
gcggatattg ccggtacgtt gccagtaatg aaagtgagcg atcacttaac ctggctggcg    660

gaagcgatta ttgatgcggt ggtgcagcaa gcctgggggc agatggtggc gcgttatggc    720

cagccaacgc atctgcacga tcgcgaaggg cgcggttttg cggtggtcgg ttatggcaag    780

ctgggcggct gggagctggg ttacagctcc gatctggatc tggtattcct gcacgactgc    840

ccgatggatg tgatgaccga tggcgagcgt gaaatcgatg gtcgccagtt ctatttgcgt    900

ctcgcgcagc gcgtgatgca cctgtttagc acgcgcacgt cgtccggcat cctttatgaa    960

gttgatgcgc gtctgcgtcc atctggcgct gcggggatgc tggtcactac tacggaatcg   1020

ttcgccgatt accagcaaaa cgaagcctgg acgtgggaac atcaggcgct ggcccgtgcg   1080

cgcgtggtgt acggcgatcc gcaactgacc gccgaatttg acgccattcg ccgcgatatt   1140

ctgatgacgc ctcgcgacgg cgcaacgctg caaaccgacg tgcgagaaat gcgcgagaaa   1200

atgcgtgccc atcttggcaa caagcataaa gaccgcttcg atctgaaagc cgatgaaggc   1260

ggtatcaccg acatcgagtt tatcgcccaa tatctggtgc tgcgctttgc ccatgacaag   1320

ccgaaactga cgcgctggtc ggataatgtg cgcattctcg aagggctggc gcaaaacggc   1380

atcatggagg agcaggaagc gcaggcattg acgctggcgt acaccacatt gcgtgatgag   1440

ctgcaccacc tggcgctgca agagttgccg ggacatgtgg cgctctcctg ttttgtcgcc   1500

gagcgtgcgc ttattaaaac cagctgggac aagtggctgg tggaaccgtg cgccccggcg   1560

taa                                                                 1563
```

```
<210> SEQ ID NO 81
<211> LENGTH: 949
<212> TYPE: PRT
<213> ORGANISM: Kosakonia sacchari
<220> FEATURE:
<223> OTHER INFORMATION: glnE, strain CI006

<400> SEQUENCE: 81

Met Pro His His Ala Gly Leu Ser Gln His Trp Gln Thr Val Phe Ser
1               5                   10                  15

Arg Leu Pro Glu Ser Leu Thr Ala Gln Pro Leu Ser Ala Gln Ala Gln
            20                  25                  30

Ser Val Leu Thr Phe Ser Asp Phe Val Gln Asp Ser Ile Ile Ala His
        35                  40                  45

Pro Glu Trp Leu Ala Glu Leu Glu Ser Ala Pro Pro Pro Ala Asn Glu
    50                  55                  60

Trp Gln His Tyr Ala Gln Trp Leu Gln Ala Ala Leu Asp Gly Val Thr
65                  70                  75                  80

Asp Glu Ala Ser Leu Met Arg Ala Leu Arg Leu Phe Arg Arg Arg Ile
                85                  90                  95

Met Val Arg Ile Ala Trp Ser Gln Ala Leu Gln Leu Val Ala Glu Glu
            100                 105                 110

Asp Ile Leu Gln Gln Leu Ser Val Leu Ala Glu Thr Leu Ile Val Ala
        115                 120                 125

Ala Arg Asp Trp Leu Tyr Glu Ala Cys Cys Arg Glu Trp Gly Thr Pro
    130                 135                 140

Ser Asn Pro Gln Gly Val Ala Gln Pro Met Leu Val Leu Gly Met Gly
145                 150                 155                 160

Lys Leu Gly Gly Gly Glu Leu Asn Phe Ser Ser Asp Ile Asp Leu Ile
                165                 170                 175

Phe Ala Trp Pro Glu Asn Gly Ala Thr Arg Gly Gly Arg Arg Glu Leu
```

```
            180                 185                 190

Asp Asn Ala Gln Phe Phe Thr Arg Leu Gly Gln Arg Leu Ile Lys Val
        195                 200                 205

Leu Asp Gln Pro Thr Gln Asp Gly Phe Val Tyr Arg Val Asp Met Arg
    210                 215                 220

Leu Arg Pro Phe Gly Asp Ser Gly Pro Leu Val Leu Ser Phe Ala Ala
225                 230                 235                 240

Leu Glu Asp Tyr Tyr Gln Glu Gln Gly Arg Asp Trp Glu Arg Tyr Ala
                245                 250                 255

Met Val Lys Ala Arg Ile Met Gly Asp Asn Asp Gly Asp His Ala Arg
            260                 265                 270

Glu Leu Arg Ala Met Leu Arg Pro Phe Val Phe Arg Arg Tyr Ile Asp
        275                 280                 285

Phe Ser Val Ile Gln Ser Leu Arg Asn Met Lys Gly Met Ile Ala Arg
    290                 295                 300

Glu Val Arg Arg Arg Gly Leu Lys Asp Asn Ile Lys Leu Gly Ala Gly
305                 310                 315                 320

Gly Ile Arg Glu Ile Glu Phe Ile Val Gln Val Phe Gln Leu Ile Arg
                325                 330                 335

Gly Gly Arg Glu Pro Ala Leu Gln Ser Arg Ser Leu Leu Pro Thr Leu
            340                 345                 350

Ala Ala Ile Asp Gln Leu His Leu Leu Pro Asp Gly Asp Ala Thr Arg
        355                 360                 365

Leu Arg Glu Ala Tyr Leu Trp Leu Arg Arg Leu Glu Asn Leu Leu Gln
    370                 375                 380

Ser Ile Asn Asp Glu Gln Thr Gln Thr Leu Pro Gly Asp Glu Leu Asn
385                 390                 395                 400

Arg Ala Arg Leu Ala Trp Gly Met Gly Lys Asp Ser Trp Glu Ala Leu
                405                 410                 415

Cys Glu Thr Leu Glu Ala His Met Ser Ala Val Arg Gln Ile Phe Asn
            420                 425                 430

Asp Leu Ile Gly Asp Asp Glu Thr Asp Ser Pro Glu Asp Ala Leu Ser
        435                 440                 445

Glu Ser Trp Arg Glu Leu Trp Gln Asp Ala Leu Gln Glu Glu Asp Ser
    450                 455                 460

Thr Pro Val Leu Ala His Leu Ser Glu Asp Asp Arg Arg Arg Val Val
465                 470                 475                 480

Ala Leu Ile Ala Asp Phe Arg Lys Glu Leu Asp Lys Arg Thr Ile Gly
                485                 490                 495

Pro Arg Gly Arg Gln Val Leu Asp His Leu Met Pro His Leu Leu Ser
            500                 505                 510

Asp Val Cys Ser Arg Asp Asp Ala Pro Val Pro Leu Ser Arg Leu Thr
        515                 520                 525

Pro Leu Leu Thr Gly Ile Ile Thr Arg Thr Thr Tyr Leu Glu Leu Leu
    530                 535                 540

Ser Glu Phe Pro Gly Ala Leu Lys His Leu Ile Ser Leu Cys Ala Ala
545                 550                 555                 560

Ser Pro Met Val Ala Ser Gln Leu Ala Arg Tyr Pro Ile Leu Leu Asp
                565                 570                 575

Glu Leu Leu Asp Pro Asn Thr Leu Tyr Gln Pro Thr Ala Met Asn Ala
            580                 585                 590

Tyr Arg Asp Glu Leu Arg Gln Tyr Leu Leu Arg Val Pro Glu Asp Asp
        595                 600                 605
```

```
Glu Glu Gln Gln Leu Glu Ala Leu Arg Gln Phe Lys Gln Ala Gln Leu
    610                 615                 620

Leu Arg Val Ala Ala Ala Asp Ile Ala Gly Thr Leu Pro Val Met Lys
625                 630                 635                 640

Val Ser Asp His Leu Thr Trp Leu Ala Glu Ala Ile Ile Asp Ala Val
                645                 650                 655

Val Gln Gln Ala Trp Gly Gln Met Val Ala Arg Tyr Gly Gln Pro Thr
            660                 665                 670

His Leu His Asp Arg Glu Gly Arg Gly Phe Ala Val Val Gly Tyr Gly
        675                 680                 685

Lys Leu Gly Gly Trp Glu Leu Gly Tyr Ser Ser Asp Leu Asp Leu Val
    690                 695                 700

Phe Leu His Asp Cys Pro Met Asp Val Met Thr Asp Gly Glu Arg Glu
705                 710                 715                 720

Ile Asp Gly Arg Gln Phe Tyr Leu Arg Leu Ala Gln Arg Val Met His
                725                 730                 735

Leu Phe Ser Thr Arg Thr Ser Ser Gly Ile Leu Tyr Glu Val Asp Ala
            740                 745                 750

Arg Leu Arg Pro Ser Gly Ala Ala Gly Met Leu Val Thr Thr Thr Glu
        755                 760                 765

Ser Phe Ala Asp Tyr Gln Gln Asn Glu Ala Trp Thr Trp Glu His Gln
    770                 775                 780

Ala Leu Ala Arg Ala Arg Val Val Tyr Gly Asp Pro Gln Leu Thr Ala
785                 790                 795                 800

Glu Phe Asp Ala Ile Arg Arg Asp Ile Leu Met Thr Pro Arg Asp Gly
                805                 810                 815

Ala Thr Leu Gln Thr Asp Val Arg Glu Met Arg Glu Lys Met Arg Ala
            820                 825                 830

His Leu Gly Asn Lys His Lys Asp Arg Phe Asp Leu Lys Ala Asp Glu
        835                 840                 845

Gly Gly Ile Thr Asp Ile Glu Phe Ile Ala Gln Tyr Leu Val Leu Arg
    850                 855                 860

Phe Ala His Asp Lys Pro Lys Leu Thr Arg Trp Ser Asp Asn Val Arg
865                 870                 875                 880

Ile Leu Glu Gly Leu Ala Gln Asn Gly Ile Met Glu Glu Gln Glu Ala
                885                 890                 895

Gln Ala Leu Thr Leu Ala Tyr Thr Thr Leu Arg Asp Glu Leu His His
            900                 905                 910

Leu Ala Leu Gln Glu Leu Pro Gly His Val Ala Leu Ser Cys Phe Val
        915                 920                 925

Ala Glu Arg Ala Leu Ile Lys Thr Ser Trp Asp Lys Trp Leu Val Glu
    930                 935                 940

Pro Cys Ala Pro Ala
945


<210> SEQ ID NO 82
<211> LENGTH: 520
<212> TYPE: PRT
<213> ORGANISM: Kosakonia sacchari
<220> FEATURE:
<223> OTHER INFORMATION: GlnE_KO1, strain CI006

<400> SEQUENCE: 82

Met Phe Asn Asp Leu Ile Gly Asp Asp Glu Thr Asp Ser Pro Glu Asp
1               5                   10                  15
```

```
Ala Leu Ser Glu Ser Trp Arg Glu Leu Trp Gln Asp Ala Leu Gln Glu
            20                  25                  30

Glu Asp Ser Thr Pro Val Leu Ala His Leu Ser Glu Asp Asp Arg Arg
        35                  40                  45

Arg Val Val Ala Leu Ile Ala Asp Phe Arg Lys Glu Leu Asp Lys Arg
    50                  55                  60

Thr Ile Gly Pro Arg Gly Arg Gln Val Leu Asp His Leu Met Pro His
65                  70                  75                  80

Leu Leu Ser Asp Val Cys Ser Arg Asp Asp Ala Pro Val Pro Leu Ser
                85                  90                  95

Arg Leu Thr Pro Leu Leu Thr Gly Ile Ile Thr Arg Thr Thr Tyr Leu
            100                 105                 110

Glu Leu Leu Ser Glu Phe Pro Gly Ala Leu Lys His Leu Ile Ser Leu
        115                 120                 125

Cys Ala Ala Ser Pro Met Val Ala Ser Gln Leu Ala Arg Tyr Pro Ile
    130                 135                 140

Leu Leu Asp Glu Leu Leu Asp Pro Asn Thr Leu Tyr Gln Pro Thr Ala
145                 150                 155                 160

Met Asn Ala Tyr Arg Asp Glu Leu Arg Gln Tyr Leu Leu Arg Val Pro
                165                 170                 175

Glu Asp Asp Glu Glu Gln Gln Leu Glu Ala Leu Arg Gln Phe Lys Gln
            180                 185                 190

Ala Gln Leu Leu Arg Val Ala Ala Ala Asp Ile Ala Gly Thr Leu Pro
        195                 200                 205

Val Met Lys Val Ser Asp His Leu Thr Trp Leu Ala Glu Ala Ile Ile
    210                 215                 220

Asp Ala Val Val Gln Gln Ala Trp Gly Gln Met Val Ala Arg Tyr Gly
225                 230                 235                 240

Gln Pro Thr His Leu His Asp Arg Glu Gly Arg Gly Phe Ala Val Val
                245                 250                 255

Gly Tyr Gly Lys Leu Gly Gly Trp Glu Leu Gly Tyr Ser Ser Asp Leu
            260                 265                 270

Asp Leu Val Phe Leu His Asp Cys Pro Met Asp Val Met Thr Asp Gly
        275                 280                 285

Glu Arg Glu Ile Asp Gly Arg Gln Phe Tyr Leu Arg Leu Ala Gln Arg
    290                 295                 300

Val Met His Leu Phe Ser Thr Arg Thr Ser Ser Gly Ile Leu Tyr Glu
305                 310                 315                 320

Val Asp Ala Arg Leu Arg Pro Ser Gly Ala Ala Gly Met Leu Val Thr
                325                 330                 335

Thr Thr Glu Ser Phe Ala Asp Tyr Gln Gln Asn Glu Ala Trp Thr Trp
            340                 345                 350

Glu His Gln Ala Leu Ala Arg Ala Arg Val Val Tyr Gly Asp Pro Gln
        355                 360                 365

Leu Thr Ala Glu Phe Asp Ala Ile Arg Arg Asp Ile Leu Met Thr Pro
    370                 375                 380

Arg Asp Gly Ala Thr Leu Gln Thr Asp Val Arg Glu Met Arg Glu Lys
385                 390                 395                 400

Met Arg Ala His Leu Gly Asn Lys His Lys Asp Arg Phe Asp Leu Lys
                405                 410                 415

Ala Asp Glu Gly Gly Ile Thr Asp Ile Glu Phe Ile Ala Gln Tyr Leu
            420                 425                 430
```

```
Val Leu Arg Phe Ala His Asp Lys Pro Lys Leu Thr Arg Trp Ser Asp
        435                 440                 445

Asn Val Arg Ile Leu Glu Gly Leu Ala Gln Asn Gly Ile Met Glu Glu
    450                 455                 460

Gln Glu Ala Gln Ala Leu Thr Leu Ala Tyr Thr Thr Leu Arg Asp Glu
465                 470                 475                 480

Leu His His Leu Ala Leu Gln Glu Leu Pro Gly His Val Ala Leu Ser
                485                 490                 495

Cys Phe Val Ala Glu Arg Ala Leu Ile Lys Thr Ser Trp Asp Lys Trp
            500                 505                 510

Leu Val Glu Pro Cys Ala Pro Ala
        515                 520


<210> SEQ ID NO 83
<211> LENGTH: 341
<212> TYPE: PRT
<213> ORGANISM: Kosakonia sacchari
<220> FEATURE:
<223> OTHER INFORMATION: GlnE ATase domain, strain CI006

<400> SEQUENCE: 83

Glu Glu Gln Gln Leu Glu Ala Leu Arg Gln Phe Lys Gln Ala Gln Leu
1               5                   10                  15

Leu Arg Val Ala Ala Ala Asp Ile Ala Gly Thr Leu Pro Val Met Lys
            20                  25                  30

Val Ser Asp His Leu Thr Trp Leu Ala Glu Ala Ile Ile Asp Ala Val
        35                  40                  45

Val Gln Gln Ala Trp Gly Gln Met Val Ala Arg Tyr Gly Gln Pro Thr
    50                  55                  60

His Leu His Asp Arg Glu Gly Arg Gly Phe Ala Val Val Gly Tyr Gly
65                  70                  75                  80

Lys Leu Gly Gly Trp Glu Leu Gly Tyr Ser Ser Asp Leu Asp Leu Val
                85                  90                  95

Phe Leu His Asp Cys Pro Met Asp Val Met Thr Asp Gly Glu Arg Glu
            100                 105                 110

Ile Asp Gly Arg Gln Phe Tyr Leu Arg Leu Ala Gln Arg Val Met His
        115                 120                 125

Leu Phe Ser Thr Arg Thr Ser Ser Gly Ile Leu Tyr Glu Val Asp Ala
    130                 135                 140

Arg Leu Arg Pro Ser Gly Ala Ala Gly Met Leu Val Thr Thr Thr Glu
145                 150                 155                 160

Ser Phe Ala Asp Tyr Gln Gln Asn Glu Ala Trp Thr Trp Glu His Gln
                165                 170                 175

Ala Leu Ala Arg Ala Arg Val Val Tyr Gly Asp Pro Gln Leu Thr Ala
            180                 185                 190

Glu Phe Asp Ala Ile Arg Arg Asp Ile Leu Met Thr Pro Arg Asp Gly
        195                 200                 205

Ala Thr Leu Gln Thr Asp Val Arg Glu Met Arg Glu Lys Met Arg Ala
    210                 215                 220

His Leu Gly Asn Lys His Lys Asp Arg Phe Asp Leu Lys Ala Asp Glu
225                 230                 235                 240

Gly Gly Ile Thr Asp Ile Glu Phe Ile Ala Gln Tyr Leu Val Leu Arg
                245                 250                 255

Phe Ala His Asp Lys Pro Lys Leu Thr Arg Trp Ser Asp Asn Val Arg
            260                 265                 270
```

```
Ile Leu Glu Gly Leu Ala Gln Asn Gly Ile Met Glu Glu Gln Glu Ala
        275                 280                 285

Gln Ala Leu Thr Leu Ala Tyr Thr Thr Leu Arg Asp Glu Leu His His
    290                 295                 300

Leu Ala Leu Gln Glu Leu Pro Gly His Val Ala Leu Ser Cys Phe Val
305                 310                 315                 320

Ala Glu Arg Ala Leu Ile Lys Thr Ser Trp Asp Lys Trp Leu Val Glu
                325                 330                 335

Pro Cys Ala Pro Ala
            340
```

<210> SEQ ID NO 84
<211> LENGTH: 1342
<212> TYPE: DNA
<213> ORGANISM: Kosakonia sacchari
<220> FEATURE:
<223> OTHER INFORMATION: Prm5 inserted into nifL region, strain CI006, now strain CM029

<400> SEQUENCE: 84

```
ccgagcgtcg gggtgcctaa tatcagcacc ggatacgaga gaaaagtgtc tacatcggtt     60

cggttgatat tgaccggcgc atccgccagc ccgcccagtt tctggtggat ctgtttggcg    120

attttgcggg tcttgccggt gtcggtgccg aaaaaaatac caatatttgc cataacacac    180

gctcctgttg aaaaagagat cccgccggga aatgcggtga acgtgtctga tattgcgaag    240

agtgtgccag ttttggtcgc gggcaaaacc tgcaccagtt tggttattaa tgcaccagtc    300

tggcgctttt tttcgccgag tttctcctcg ctaatgcccg ccaggcgcgg ctttggcgct    360

gatagcgcgc tgaataccga tctggatcaa ggttttgtcg ggttatcagc caaaaggtgc    420

actctttgca tggttatacg tgcctgacat gttgtccggg cgacaaacgg cctggtggca    480

caaattgtca gaactacgac acgactaact gaccgcagga gtgtgcgatg accctgaata    540

tgatgatgga tgccggcgga catcatcgcg acaaacaata ttaataccgg caaccacacc    600

ggcaatttac gagactgcgc aggcatcctt tctcccgtca atttctgtca aataaagtaa    660

aagaggcagt ctacttgaat tacccccggc tggttgagcg tttgttgaaa aaaagtaact    720

gaaaaatccg tagaatagcg ccactctgat ggttaattaa cctattcaat taagaattat    780

ctggatgaat gtgccattaa atgcgcagca taatggtgcg ttgtgcggga aaactgcttt    840

tttttgaaag ggttggtcag tagcggaaac aactcacttc acaccccgaa gggggaagtt    900

gcctgaccct acgattcccg ctatttcatt cactgaccgg aggttcaaaa tgacccagcg    960

aaccgagtcg ggtaataccg tctggcgctt cgatttgtcc cagcagttca ctgcgatgca   1020

gcgcataagc gtggtactca gccgggcgac cgaggtcgat cagacgctcc agcaagtgct   1080

gtgcgtattg cacaatgacg cctttttgca gcacggcatg atctgtctgt acgacagcca   1140

gcaggcgatt ttgaatattg aagcgttgca ggaagccgat cagcagttaa tccccggcag   1200

ctcgcaaatc cgctatcgtc cgggcgaagg gctggtcggg acggtgcttt cgcagggcca   1260

atcattagtg ctggcgcgcg ttgctgacga tcagcgcttt cttgaccggc tcgggttgta   1320

tgattacaac ctgccgttta tc                                            1342
```

<210> SEQ ID NO 85
<211> LENGTH: 1270
<212> TYPE: DNA
<213> ORGANISM: Rahnella aquatilis
<220> FEATURE:
<223> OTHER INFORMATION: 16S
<220> FEATURE:
<221> NAME/KEY: misc_feature
<222> LOCATION: (186)..(186)
<223> OTHER INFORMATION: n is a, c, t, g, unknown or other
<220> FEATURE:
<221> NAME/KEY: misc_feature
<222> LOCATION: (458)..(458)
<223> OTHER INFORMATION: n is a, c, t, g, unknown or other
<220> FEATURE:
<221> NAME/KEY: misc_feature
<222> LOCATION: (1041)..(1041)
<223> OTHER INFORMATION: n is a, c, t, g, unknown or other
<220> FEATURE:
<221> NAME/KEY: misc_feature
<222> LOCATION: (1131)..(1132)
<223> OTHER INFORMATION: n is a, c, t, g, unknown or other
<220> FEATURE:
<221> NAME/KEY: misc_feature
<222> LOCATION: (1135)..(1135)
<223> OTHER INFORMATION: n is a, c, t, g, unknown or other
<220> FEATURE:
<221> NAME/KEY: misc_feature
<222> LOCATION: (1139)..(1140)
<223> OTHER INFORMATION: n is a, c, t, g, unknown or other

<400> SEQUENCE: 85
attgaagagt ttgatcatgg ctcagattga acgctggcgg caggcctaac acatgcaagt 60
cgagcggcag cgggaagtag cttgctactt tgccggcgag cggcggacgg gtgagtaatg 120
tctgggaaac tgcctgatgg agggggataa ctactggaaa cggtagctaa taccgcatga 180
cctcgnaaga gcaaagtggg ggatcttcgg acctcacgcc atcggatgtg cccagatggg 240
attagctagt aggtgaggta atggctcacc taggcgacga tccctagctg gtctgagagg 300
atgaccagcc acactggaac tgagacacgg tccagactcc tacgggaggc agcagtgggg 360
aatattgcac aatgggcgca agcctgatgc agccatgccg cgtgtgtgaa gaaggcctta 420
gggttgtaaa gcactttcag cgaggaggaa ggcatcanac ttaatacgtg tggtgattga 480
cgttactcgc agaagaagca ccggctaact ccgtgccagc agccgcggta atacggaggg 540
tgcaagcgtt aatcggaatt actgggcgta aagcgcacgc aggcggtttg ttaagtcaga 600
tgtgaaatcc ccgcgcttaa cgtgggaact gcatttgaaa ctggcaagct agagtcttgt 660
agaggggggt agaattccag gtgtagcggt gaaatgcgta gagatctgga ggaataccgg 720
tggcgaaggc ggccccctgg acaaagactg acgctcaggt gcgaaagcgt ggggagcaaa 780
caggattaga taccctggta gtccacgctg taaacgatgt cgacttggag gttgtgccct 840
tgaggcgtgg cttccggagc taacgcgtta agtcgaccgc ctggggagta cggccgcaag 900
gttaaaactc aaatgaattg acgggggccc gcacaagcgg tggagcatgt ggtttaattc 960
gatgcaacgc gaagaacctt acctactctt gacatccacg gaattcgcca gagatggctt 1020
agtgccttcg ggaaccgtga nacaggtgct gcatggctgt cgtcagctcg tgttgtgaaa 1080
tgttgggtta agtcccgcaa cgagcgcaac ccttatcctt tgttgccagc nngtnatgnn 1140
gggaactcaa aggagactgc cggtgataaa ccggaggaag gtggggatga cgtcaagtca 1200
tcatggccct tacgagtagg gctacacacg tgctacaatg gcatatacaa agagaagcga 1260
actcgcgagg 1270

<210> SEQ ID NO 86
<211> LENGTH: 876
<212> TYPE: DNA
<213> ORGANISM: Rahnella aquatilis
<220> FEATURE:
<223> OTHER INFORMATION: nifH

<400> SEQUENCE: 86
atggcaatgc gtcaatgcgc aatctacggg aaagggggta ttgggaaatc caccactacc 60
caaaaccttg tagcggctct ggccgaaatg aataagaagg tcatgatcgt cggctgtgac 120
cctaaggctg attcaacccg cctcattctg catgcgaaag cacagaacac catcatggaa 180
atggccgctg aagtgggctc cgtggaagat ctggagctgg aagatgtgat gcaaatcggc 240
tatggcggcg tgcgctgtgc ggaatcaggc ggccctgagc ctggtgtggg ttgtgccgga 300
cgcggggtga tcaccgccat caacttcctc gaagaagaag gcgcgtatgt gccggatctg 360
gattttgtgt tttacgacgt attgggcgat gtggtctgtg gcggtttcgc gatgccaatt 420
cgcgaaaaca aagcgcagga aatctacatc gtgtgctccg gtgaaatgat ggcgatgtat 480
gccgccaaca acatttccaa aggcatcgtg aaatacgcga aatcgggcaa agttcgcctg 540
gccgggctga tctgtaactc ccgccagacg gatcgcgaag atgaactgat catcgcgctg 600
gctgaaaaac ttggcacgca aatgatccac ttcgtgccgc gtgacaacat tgtgcaacgc 660
gctgaaatcc gccgcatgac ggtcatcgaa tacgacccga cttgtgcgca ggcagatcag 720
tatcgtgcac tggcgaacaa aatcgtcaac aacaccaaaa tggtggtgcc gacaccggtc 780
accatggatg agctggaagc cctgttaatg gaatttggca ttatggaaga agaagacctg 840
gccatcgtcg gtcgtaccgc cgccgaagag gcgtga 876

<210> SEQ ID NO 87
<211> LENGTH: 1374
<212> TYPE: DNA
<213> ORGANISM: Rahnella aquatilis
<220> FEATURE:
<223> OTHER INFORMATION: nifD1

<400> SEQUENCE: 87
atgaaggcaa aagagattct ggcgctgatt gatgagccag cctgtgagca taaccacaag 60
cagaagtcgg gttgcagcct gccgaaaccg ggcgcgacgg caggcggttg tgcgtttgat 120
ggcgcgcaga ttgcgctgct gccggtcgcg gacgtcgcgc atctggtgca cggcccgatt 180
ggctgtaccg gcagttcatg ggacaaccgt ggcagccgca gttccgggcc ttccatcaac 240
cgcatgggct tcaccaccga catgagcgag caggatgtga ttatggggcg cggcgagcga 300
cgcttatttc acgccgtgca gcacatcgtc agccattacc atccggtggc ggtctttatt 360
tacaacacct gcgtacccgc gatggaaggg gatgacgttg aagccgtgtg tcgcgccgca 420
tcggccgctg ccggtgtgcc ggttatttca gtcgatgccg ccggtttcta cggcagcaaa 480
aatctcggta accgcattgc cggggacgtg atggtcaaaa aggtgatcgg ccagcgcgaa 540
cccgcgccgt ggccggaaaa ctcaccgatc cccgccggac accgccacag catcagcctg 600
attggcgaat tcaatattgc cggcgagttc tggcacgttc tgccgctgct cgatgagctc 660
gggatccgcg tgctgtgcag cctttccggg gattccccgtt ttgctgaaat ccagactatg 720
caccgtggcg aagccaacat gctggtgtgc tcgcgggcgc tgatcaacgt cgcccgaaaa 780
atggaagagc gttaccagat cccatggttt gaaggcagtt tttatggcct gcgttccatg 840
gctgattccc tgcgcacgat cgccgtgctg ctcaaagacc cggatttaca ggcgcgcaca 900
gaacgtctga ttgagcgcga ggaggcggcg acacatcttg cgcttgcgcc ttaccgtgcg 960
cggctcagcg ggcgcaaggc gctgctgtat accggtggcg tgaaatcctg gtcggtggtc 1020
tcggcgttac aggatttagg catcacggtg gtggcgaccg gcacccgaaa atcaaccgaa 1080
gaagacaagc agcgtattcg cgaactgatg ggtgaagacg tgctgatgct cgacgaaggc 1140
aatgccagaa ccttgctcga caccctctat cgtttcggcg gcgacatcat gatcgccggg 1200
ggccgcaaca tgtataccgc gtacaaagcc cgcctgccgt tcctggatat caatcaggag 1260
cgcgagcatg cgtttgccgg atatcacggg ctggtaaatc tggccgaaca gttgtgtatc 1320
accctggaaa gcccggtctg ggcgcaggtc aaccgtctgg cgccgtggcg ctaa 1374

<210> SEQ ID NO 88
<211> LENGTH: 1449
<212> TYPE: DNA
<213> ORGANISM: Rahnella aquatilis
<220> FEATURE:
<223> OTHER INFORMATION: nifD2

<400> SEQUENCE: 88
atgaccagtg aaacacgcga acgtaacgag gcattgatcc aggaagtgct ggagatcttc 60
cccgagaagg cgcttaaaga tcgtaagaaa cacatgatga ccaccgaccc ggcgatggaa 120
tctgtcggca agtgtattgt ctcaaaccgc aaatcacagc cgggcgtgat gaccgtgcga 180
ggctgcgctt acgccggttc caaaggcgtg gtctttggcc cgatcaaaga catggcgcat 240
atctcccacg gcccggttgg ttgcggccag tattcccgtg ccggacgccg taactattac 300
accggctgga gcggcgtgaa cagctttggc accctcaact tcaccagtga ttttcaggaa 360
cgggacatcg tatttggcgg cgataaaaag ctcgacaaat tgatcgatga actggagatg 420
ttgttcccgc tgagcaaagg catttcggtg cagtcggaat gtccggtcgg tctgatcggc 480
gatgacattt ctgccgtcgc caaagccagc agcgccaaaa tcggtaagcc ggtcgtgccg 540
gtacgctgcg aggggttccg cggtgtgtcg caatcgctcg gccatcacat tgctaacgat 600
gtcatccgcg actgggtgct ggataaccgc gaaggcaatg aatttgaaac cacgccttac 660
gacgtggcga ttatcggcga ctacaacatc ggcggtgacg cctgggcctc acgtattctg 720
ctcgaagaaa tggggctgcg cgtggtggcg cagtggtccg gcgacggcac gctggtggag 780
atggaaaaca ccccgaaagt cgcgctcaat ctggtgcact gctaccgctc gatgaactac 840
atctcccgtc atatggaaga aaaacacggc attccgtgga tggaatacaa cttctttggc 900
ccgaccaaaa ttgcggaatc tctgcgcgaa atcgcggcgc gttttgacga taccatccgg 960
aaaaacgccg aagcggtgat tgaaaaatat caggcgcaaa cgcaggcggt gatcgacaaa 1020
taccgtccgc gtctggaagg caaaaaggtg ctgttgtatc tcggcggttt acgtccgcgc 1080
cacatcatcg gggcgtatga agatctggga atggaaatca tcggtaccgg ctatgaattc 1140
ggtcataacg atgattacga ccgcacctta ccgatgctca aagaaggcac gttgctgttc 1200
gatgacctga gcagttatga gctggaagcg ttcgttaaag cgctgaaacc ggatcttgtc 1260
gggtcaggta tcaaagaaaa atacattttc cagaaaatgg gcgtgccgtt ccgccagatg 1320
cactcctggg attattccgg cccttatcac ggctacgacg gtttcggcat ttttgcccgt 1380
gacatggaca tgacgctgaa caatccgggc tggagtcagc tgaccgcccc ctggttgaaa 1440
acggcctga 1449

<210> SEQ ID NO 89
<211> LENGTH: 1386
<212> TYPE: DNA
<213> ORGANISM: Rahnella aquatilis
<220> FEATURE:
<223> OTHER INFORMATION: nifK1

<400> SEQUENCE: 89

```
atggctcaaa ttctgcgtaa tgccaagccg cttgccacca cgcctgtcaa aagcgggcaa      60

ccgctcgggg cgatcctggc cagtcagggg ctggaaaatt gcatcccgct ggttcacggc     120

gcgcaaggtt gtagcgcgtt cgccaaagtt ttcttcatcc agcattttca cgatccgatc     180

ccgttgcagt ccacggcgat ggaatcgacc acgactatca tgggctcgga tggcaacgtc     240

agtactgcgt tgaccacgtt gtgtcagcgc agtaatccaa aagccattgt gattttgagc     300

accggactgt cagaagcgca gggcagtgat ttgtcgatgg cgctgcgtga gtttcgcgac     360

aaagaaccgc gctttaatgc catcgctatt ctgaccgtta acacgccgga tttttacggc     420

tcgctggaaa acggctacag cgcgctgatg gaaagcgtga tcactcagtg ggtgccggaa     480

aagccgccga ccggcatgcg taacaagcgc gtgaacctgc tggtgagcca tctgctgacg     540

ccgggggatc tggaattact gcgcagctat gtcgaagcct ttggcctgca accggtgatc     600

ctgccggatt tatcacagtc gctggacgga catctggcga atggcgattt caatccggtc     660

acgcagggcg gcacgtcgca acgccagatt gaacaaatgg ggcagagcct gaccaccatt     720

accattggca gttcgctcaa ctgcgccgcc agtctgatgg cgatgcgcag ccgtggcatg     780

gcgctgaacc tgccgcacct gatgacgctg gaaaacatgg acagtctgat ccgccatctg     840

catcaggtgt caggccgcga ggtaccggca tggattgagc gccagcgcgg gcaactgctg     900

gacgccatga tcgactgcca tacctggctg cagtcacagc gtattgcgct ggcggcagaa     960

gcggatttgc tggtggcgtg gtgcgatttc gctcagagcc agggaatgcg cgtcgggccg    1020

gtgattgcgc cggttaatca gcagtcactg gccgggctgc cggtcgaaca ggtggtgatc    1080

ggcgatctgg aagatttaca aacccggctc gacagctacc cggtttcact gctggtggcg    1140

aactcccacg ctgcaccact ggcggaaaaa aacggtatcg cgctggtacg tgccggtttc    1200

ccgctttacg accgtctcgg ggaatttcgc cgcgtgcggc agggctatgc gggtattcgc    1260

gacaccttgt tcgaactcgc gaacctgatg caggcgcgcc atcacatgct gacggcgtat    1320

cactcaccgc ttaggcaggt gttcggcctg agcccggtac cggaggccag tcatgaggcg    1380

cgctaa                                                               1386
```

<210> SEQ ID NO 90
<211> LENGTH: 1569
<212> TYPE: DNA
<213> ORGANISM: Rahnella aquatilis
<220> FEATURE:
<223> OTHER INFORMATION: nifK2

<400> SEQUENCE: 90

```
atgagtcaag atcttggcac cccaaaatcc tgtttcccgc tgttcgagca ggatgaatac      60

cagaatatgt ttacccacaa acgcgcgctg gaagaagcac acggcgaggc gaaagtgcgg     120

gaagtgtttg aatggaccac cacgcaggaa tatcaggatc tgaacttctc gcgtgaagcg     180

ctgaccgtcg acccggcgaa agcctgccag ccgttaggcg cggtactttg cgcgctgggt     240

tttaccaaca cgttgccgta tgtccatggt tcacaaggct gtgtggcgta tttccgtacc     300

tattttaatc gtcatttcaa agagccggtg gcctgtgttt ccgactcaat gaccgaagat     360

gccgccgttt ttggcggaaa taacaacatg aatgtcggtc tggaaaacgc cagcgcgctg     420

tacaagccgg aaattattgc ggtctccacc acctgtatgg cggaagtgat cggtgatgac     480

ctgcaggctt ttatcgccaa cgccaaaaaa gacggatttg tggatgccgg tatgccaatc     540

ccgtatgccc atacaccgag ttttctgggc agtcatgtca ccggctggga caacatgttt     600

gaaggcttcg cccgtacctt taccaccgac gccacgcggg aatatcagcc gggcaaactt     660
```

gccaaactga acgtggtgac cggttttgaa acttatctcg gcaactaccg ggttattcac 720
cgcatgatga gccagatggg ggtcgaatgc agcgtcttgt ccgatccgtc tgaagtgctc 780
gacaccccgg ctgacggcca ataccgcatg tatgccggcg gcaccacgca aaccgaaatg 840
cgtgatgcac cggatgccat cgacaccttg ctgctgcaac cgtggcaatt acagaaaacc 900
aaaaaggtgg tgcagggcga ctggaatcag ccgggcaccg aagtcagtgt accgattggc 960
ctggcggcga ccgatgcctt gctgatgacg gtaagcgaac tgaccggcaa accgatagct 1020
gacgcgctgg cgactgaacg tggccgtctg gtggacatga tgctcgattc tcacacctgg 1080
ctgcacggca agcgtttcgg tctctacggt gacccggatt ttgtgatggg catgaccgca 1140
ttcctgctgg aactgggctg tgaaccgacc accattctca gccataacgg caacaaacgc 1200
tggcagaaag ccatgaagaa aatgctggct gattcgcctt acggacagga cagcgaagtg 1260
tatgtgaact gcgatctgtg gcatttccgc tcgctgatgt ttacccgtaa accggacttt 1320
atgatcggca actcttacgg aaaattcatt cagcgtgaca cgctggccaa aggcgaacag 1380
ttcgaagtgc cgctgatccg tatcggattc ccgatttttg accggcacca tttgcaccgt 1440
cagaccacct ggggatacga gggcgcgatg agcatcctga cgcaactggt gaatgcggtg 1500
ctcgaacagc tggatcgcga aaccatgaag ctcggcaaaa ccgactacaa cttcgatctg 1560
atccgctaa 1569

<210> SEQ ID NO 91
<211> LENGTH: 1488
<212> TYPE: DNA
<213> ORGANISM: Rahnella aquatilis
<220> FEATURE:
<223> OTHER INFORMATION: nifL

<400> SEQUENCE: 91
atgagcatca cggcgttatc agcatcattt cctgagggga atatcgccag ccgcttgtcg 60
ctgcaacatc cttcactgtt ttataccgtg gttgaacaat catcggtggc gatttcgctg 120
accgatccgc aggcgcgcat ttgttatgcc aatccggcat tctgccgcca gacgggtttt 180
gcacttgaga cacttttggg cgagaaccac cgtctgctgg ccagccagca gacgccgaaa 240
catatctatg acgaaatgtg gcgcactttg ttgcagggca aatcctggaa cggccaactg 300
atcaaccggc gtaataaccg ttcgctttat ctggcggatg tcactatcac gcctgtttta 360
ggcgcggacg ggcaggtgga gcattacctc ggcatgcaca aagatatcag cgagaaatac 420
gcgctggagc agcggttgcg caaccacatc accttgttca cggaggtgct gaacaatatt 480
cccgccgccg tggtggtggt ggatgagcag gacaatgtgg tgatggacaa tctggcctac 540
aaaaccctgt gcgctgactg cggcggaaaa gagctgttgg ccgaaatggg ctatccgcaa 600
ctcaaagaga tgctcaacag tggcgaaccg gtgccggttt ccatgcgcgg caacgtacgc 660
tggttttctt tcggtcagtg gtcattgcag ggcgttaatg aagaggccag ccgctttttt 720
accggcatta ccgcgccggg aaaactgatt gttctcaccg actgcaccga tcagcatcac 780
cggcagcagc agggttatct tgaccggctc aagcaaaaac ttaccaacgg caaattgctg 840
gcagccatcc gcgagtcgct tgatgccgcg ctgattcagc tcaacgggcc aattaatatg 900
ctggcggctg cgcgtcgtct taacggcgaa gaaggcaaca acatggcgct ggaattcgcc 960
tggcgcgaag gcgagcaggc ggtgagtcgc ttacaggcct gccgtccgtc gctggatttt 1020
gagccgcagg cagaatggcc ggtcagtgaa ttcttcgacg atctgagcgc gctgtacgac 1080
agccattttc tcagtgacgg tgaattgcgt tacgtggtca tgccatctga tctgcacgct 1140
gtcgggcaac gaacgcaaat ccttaccgcg ctgagcttat ggattgatca cacgctgtca 1200
caggcgcagg ccatgccgtc tctgaagctc tcggtgaaca ttgttgcgaa gcaggatgcg 1260
agctggttgt gttttgacat taccgataat gtgccgcgtg aacgggtgcg ttatgcccgc 1320
ccggaagcgg cgttttcccg tccggggaat ggcatggagc tgcgccttat ccagacgctg 1380
atcgcccatc atcgcggttc tttagatctc tcggtccgcc ctgatggcgg caccttgctg 1440
acgttacgcc tgccggtaca gcaggttatc accggaggct taaaatga 1488

<210> SEQ ID NO 92
<211> LENGTH: 1557
<212> TYPE: DNA
<213> ORGANISM: Rahnella aquatilis
<220> FEATURE:
<223> OTHER INFORMATION: nifA

<400> SEQUENCE: 92
atgacccagt tacctaccgc gggcccggtt atccggcgct ttgatatgtc tgcccagttt 60
acggcgcttt atcgcatcag cgtggcgctg agtcaggaaa gcaataccgc gcgcgcactg 120
gcggcgatcc tcgaagtgct tcacgatcat gcatttatgc aatacggcat ggtgtgtctg 180
ttcgataaag aacgcaatgc actgtttgtg gaatccctgc atggcatcga cggcgaaagg 240
aaaaaagaga cccgccatgt ccgttaccgc atgggggaag gcgtgatcgg cgcggtgatg 300
agccagcgtc aggcgctggt gttaccgcgc atttcagacg atcagcgttt tctcgaccgc 360
ctgaatattt acgattacag cctgccgctg attggtgtgc cgatccccgg tgcggataat 420
cagcctgcgg gtgtgctggt ggcacagccg atggcgttgc acgaagaccg gctggctgcc 480
agtacgcggt ttttagaaat ggtcgccaat ctcatcagcc agccactgcg ttctgccacg 540
cccccggaat cattgcctgc tcaaacgccg gtccggtgca gtgttccgcg ccagtttggt 600
tttgagcaga tggtcgggaa aagtcaggcg atgcgccaga cgatggacat tttacggcag 660
gtttccaaat gggataccac ggttctggtg cgtggtgaaa gcggcaccgg caaggaactt 720
atcgccaatg ccattcatta caactcaccc cgtgcggccg cgccatttgt gaaattcaac 780
tgcgccgcgc tgccggataa cctgctggaa agcgaactgt tcggtcatga aaaaggggcc 840
ttcaccggcg ctatacgcac ccgaaaaggc cgctttgaac tggcggacgg gggcacgtta 900
ttcctcgatg aaatcggcga atcgagcgcg tcgtttcagg ccaaattgct gcgcattttg 960
caggaaggtg aaatggaacg ggtcggcggc gataccacgc tgaaagttga tgtgcgcatt 1020
attgctgcca ccaaccgtaa tcttgaggag gaagtgcgtg ccgggaattt tcgcgaagac 1080
ctgtattatc gcctgaacgt gatgccggtt tcgctgcctg cactgcgtga aaggctggat 1140
gatatcgccg atctggcgcc gtttctggtc aaaaagattg cgctgcgtca ggggcgggaa 1200
ctgcgcatca gtgatggtgc ggtgcgtctg ctgatgacct acagctggcc aggcaacgtg 1260
cgtgaactgg aaaactgcct cgaacgggcg tcggtaatga ccgatgaagg gctgatcgac 1320
cgcgacgtga tcctgttcaa tcaccatgag tccccggcgc tgtccgtcaa acccggtctg 1380
ccgctggcga cagatgaaag ctggctggat caggaactcg acgaacgcca gcgggtgatt 1440
gctgcactgg agaaaaccgg ctgggtgcag gccaaagcgg cccgactgct gggcatgaca 1500
ccgcgccaga ttgcctaccg tatccagatt atggacatca acatgcaccg tatctga 1557

<210> SEQ ID NO 93
<211> LENGTH: 2838

<212> TYPE: DNA
<213> ORGANISM: Rahnella aquatilis
<220> FEATURE:
<223> OTHER INFORMATION: glnE

<400> SEQUENCE: 93
atgttgccac tttcttctgt tttgcaaagc cacgcgcaga gtttgcctga acgctggcat 60
gaacatcctg aaaacctgcc cctccccgat gatgaacagc tggctgtgct gagcagcagt 120
gaattcatga cggacagttt gctggctttt ccgcagtggt ggcatgaaat tgtccaaaat 180
ccccctcagg cgcaggagtg gcaactttac cgtcagtggc tggatgaatc gctgacgcag 240
gtgactgacg aagccgggtt aatgaaagct ttgcgtctgt tccgccgccg tattctgacc 300
cgcattgcgt ggtcacagtc cgcgcaaacc agcgaagcaa aagatacgct tcaccagctg 360
agtgaactgg cggaattatt gattgtcagc gcccgtgact ggctgtatgc cgcttgctgt 420
cgcgagttcg gtacgccggt caatgccgca ggggaaccgc agagaatgct gatcctcggg 480
atgggcaaac tcggcggtgg cgagctgaat ttctcatcgg acatcgacct gatttttgct 540
tatccggaaa atggccagac acgcggcggt cggcgtgaac tggataacgc acaatttttc 600
acccggctcg gccagcgtct gatcaaagcg ctggatcagc ccactatcga cggttttgtc 660
tatcgcgtgg acatgcgttt gcgtccgttc ggcgacagtg gcccgctggt gatgagcttc 720
ccggcactgg aagattatta tcaggaacag gggcgcgact gggaacgcta cgcaatggtg 780
aaagcgcgtc tgatgggcgg cgcggaggac atcagcagtc aggaattgcg taaaatgctg 840
atgccttttg tcttccgccg ttatatcgat ttcagtgtga tccagtccct gcgtaacatg 900
aaaggcatga tcgcccgcga agtacgccgc cgtggtctga aagacaacat caaactcggc 960
gcaggcggta ttcgtgaaat tgaatttatc gtgcaggtat ttcagctgat ccgtggcggt 1020
cgtgaaccgg cattgcagca gcgtgcgttg ttgccaacgc ttcaggcgct ggaaaatctg 1080
gggctgctgc cggtagagca ggtgttgcag ttgcgtaaca gctatctgtt cctgcgacgt 1140
ctggaaaacc tgttgcaggc cattgctgac gagcaaacgc aaaccttacc gtccgatgag 1200
ctgaatcagg cgcgtctggc gtgggggatg aattacgctg gctggccgca gcttctggat 1260
gcagtgaatg ctcacatgca ggccgtacgc gcggtattta acgatctgat tggcgatgac 1320
acgccagatg ccgaagatga cgtgcaactc tcccggttca gcagtttatg gattgatacg 1380
cttgagcctg acgagctggc tccgctggtg ccgcaacttg acgaaaatgc gcaacggcat 1440
gttttacatc agattgctga ttttcgccgt gacgtggata aacgcacgat agggccacgt 1500
gggcgtgatc agttggattt gctgatgccg cgtttactgg cccaggtctg cacctataaa 1560
aatgcggatg tgacgttaca gcgcctgatg cagttgctgc tcaatatcgt cacgcgcacg 1620
acgtatatcg agctgctggt ggaatatccc ggtgcgctca aacagttaat acgtctgtgc 1680
gctgcctcgc cgatggtggc gacgcaactt gcgcgtcatc ctttattgct cgacgaactg 1740
ctcgacccgc gcacgcttta ccagccgatt gagccgggcg cgtaccgtga tgaactgcgg 1800
caatatctga tgcgggtgcc aaccgaagac gaagaacaac agcttgaagc cgtgcgccag 1860
ttcaaacagg cacagcattt acgtattgcg gccggggata tttccggtgc gttgccggtg 1920
atgaaagtca gtgaccattt aacctacctt gcggaggcca ttctcgacgt tgtggtgcaa 1980
caggcgtggg aacaaatggt cgtaaaatac ggtcagccaa cccatcttca gcaccgtaaa 2040
gggcgcggtt ttgccgtggt gggttacgga aaactcggtg gctgggagct gggttacagc 2100
tcggatctgg atctggtctt cctgctcgat tgcgcgccgg aagtcatgac cgacggcgaa 2160
cgcagcattg acgggcgtca gttttatctg cggctggcgc agcgcatcat gcatttattc 2220
agcacccgta cgtcgtcagg cattctttat gaggttgacc cgcgtctgcg gccttccggt 2280
gcttccggca tgctggtcag caccatcgaa gcttttgcgg attatcaggc caacgaagcc 2340
tggacatggg agcatcaggc gctggttcgc gcgcgtgtgg tttatggtga tccgcaactg 2400
acgcagcaat ttaatgccac gcgtcgcgac attctttgcc gccagcgcga tgccgacggc 2460
ttgcgtaagg aagtccgtga aatgcgcgag aaaatgtatg cccatctggg cagcaaaaga 2520
gccgacgagt ttgatctgaa agccgatccg ggtggcataa cggatattga attcatcgca 2580
caatatctgg ttctgcgttt cgcgcatgat gagccgaagc tgacccgctg gtctgataac 2640
gtgcggattt tcgaactgat ggcgcgacat gacatcatgc cggaagagga agcacgccat 2700
ctgacgcagg cttacgtgac attgcgcgat gaaattcatc atctggcgtt gcaggaacac 2760
agcgggaaag tggccgcaga cagctttgcc actgagcgcg cgcaaatccg cgccagctgg 2820
gcaaactggc ttggctga 2838

<210> SEQ ID NO 94
<211> LENGTH: 1290
<212> TYPE: DNA
<213> ORGANISM: Rahnella aquatilis
<220> FEATURE:
<223> OTHER INFORMATION: amtB

<400> SEQUENCE: 94
atgaaaaaac ttttatccat gatggggctt ggtgcagtgg ctttgctacc ttcgcttgcc 60
atggcagcag caccagcagc ggcaaacggt gctgataacg cctttatgat gatttgtacc 120
gcgctggtat tgttcatgac cgtacccggt gtggcgttgt tctacggcgg cttactgcgt 180
tctaaaaacg ttttgtccat gctgactcag gttattgtta cctttgctct ggtctgcgtc 240
ctgtggatcc tctacggtta cagccttgcc ttcagtgaag gtaacgcgtt cttcggtggt 300
ttcagcaacg taatgatgaa aggcattggc ctggattctg tgactggcac cttctcgcag 360
atgatccacg ttgcattcca gtgttcattt gcctgcatca ctgtagcgct gatcgtaggt 420
ggtattgctg aacgtgtgcg tttctcagca gttctgattt tcactgtgat ctggctgact 480
ttctcttata ttccgatggc tcacatggta tgggcaggcg gtttcctggc tgctgacggt 540
gcgctggact ttgccggtgg taccgttgtt catatcaatg ccgcaattgc tggcctggta 600
ggggcttatc tgctgggtaa acgcgccggt tttggcaaag aagctttcaa accacacaac 660
ctgccaatgg tcttcactgg cgcctcaatc ctgtatgtgg gctggttcgg cttcaatgcg 720
ggttcagcaa gtgccgcaag ctctgttgcc gcgctggctt tcctgaacac tgtcattgct 780
actgctggcg caatcctgtc ctggacgctg gttgagtgga tggtgcgcgg taagccctca 840
ctgctgggcg caagctccgg tgctatcgca ggtctggtgg ctatcacgcc tgcatgtggt 900
acggtcggcg taggtggtgc tctgattatc ggtctggtag gcggtatcac tggtctgtgg 960
ggggttgtta ccctgaaaaa atggctgcgt gttgatgaca cctgtgatgt gttcggtgtt 1020
catggcgtgt gcggtatcgt aggttgtctg ctgacgggtg tattcacgtc cagttcactt 1080
ggcggcgtgg gctacgcaga aggcgtgacc atgggccatc aggtttgggt gcagttcttc 1140
agcgtgtgcg taacattggt ctggtcaggc gttgttgcct tcatcggtta caaagtggct 1200
gacatgatcg taggtctgcg tgttcctgaa gaacaagaac gcgaaggtct ggacgttaac 1260
agccacggcg aaaacgctta caaccaataa 1290

<210> SEQ ID NO 95
<211> LENGTH: 500
<212> TYPE: DNA
<213> ORGANISM: Rahnella aquatilis
<220> FEATURE:
<223> OTHER INFORMATION: PinfC

<400> SEQUENCE: 95
tgaatatcac tgactcacaa gctacctatg tcgaagaatt aactaaaaaa ctgcaagatg 60
caggcattcg cgttaaagcc gacttgagaa atgagaagat tggctttaaa attcgcgaac 120
acacgctacg ccgtgttcct tatatgttag tttgtggcga taaagaggtc gaagcaggca 180
aagttgctgt tcgtactcgt cgcggcaaag acttaggaag catggatgtt agcgaagtcg 240
ttgacaaact gctggcggaa atccgcagca gaagtcatca tcaactggag gaataaagta 300
ttaaaggcgg aaaacgagtt caaccggcgc gtcctaatcg cattaacaaa gagattcgcg 360
cgcaagaagt tcgcctcacc ggcgtcgatg gcgagcagat tggtattgtc agtctgaatg 420
aagctcttga aaaagctgag gaagcgggcg tcgatttagt agaaatcagt ccgaatgccg 480
agccgccagt ttgtcgaatc 500

<210> SEQ ID NO 96
<211> LENGTH: 1085
<212> TYPE: DNA
<213> ORGANISM: Klebsiella variicola
<220> FEATURE:
<223> OTHER INFORMATION: 16S

<400> SEQUENCE: 96
attgaagagt ttgatcatgg ctcagattga acgctggcgg caggcctaac acatgcaagt 60
cgagcggtag cacagagagc ttgctctcgg gtgacgagcg gcggacgggt gagtaatgtc 120
tgggaaactg cctgatggag ggggataact actggaaacg gtagctaata ccgcataacg 180
tcgcaagacc aaagtggggg accttcgggc ctcatgccat cagatgtgcc cagatgggat 240
tagctagtag gtggggtaac ggctcaccta ggcgacgatc cctagctggt ctgagaggat 300
gaccagccac actggaactg agacacggtc cagactccta cgggaggcag cagtggggaa 360
tattgcacaa tgggcgcaag cctgatgcag ccatgccgcg tgtgtgaaga aggccttcgg 420
gttgtaaagc actttcagcg gggaggaagg cggtgaggtt aataacctca ccgattgacg 480
ttacccgcag aagaagcacc ggctaactcc gtgccagcag ccgcggtaat acggagggtg 540
caagcgttaa tcggaattac tgggcgtaaa gcgcacgcag gcggtctgtc aagtcggatg 600
tgaaatcccc gggctcaacc tgggaactgc attcgaaact ggcaggctag agtcttgtag 660 agggggggtag aattccaggt gtagcggtga aatgcgtaga gatctggagg aataccggtg 720
gcgaaggcgg ccccctggac aaagactgac gctcaggtgc gaaagcgtgg ggagcaaaca 780
ggattagata ccctggtagt ccacgctgta aacgatgtcg atttggaggt tgtgcccttg 840
aggcgtggct tccggagcta acgcgttaaa tcgaccgcct ggggagtacg gccgcaaggt 900
taaaactcaa atgaattgac gggggcccgc acaagcggtg gagcatgtgg tttaattcga 960
tgcaacgcga agaaccttac ctggtcttga catccacaga actttccaga gatggattgg 1020
tgccttcggg aactgtgaga caggtgctgc atggctgtcg tcagctcgtg ttgtgaaatg 1080
ttggg 1085

<210> SEQ ID NO 97
<211> LENGTH: 882
<212> TYPE: DNA

<213> ORGANISM: Klebsiella variicola
<220> FEATURE:
<223> OTHER INFORMATION: nifH1

<400> SEQUENCE: 97
atgaccatgc gtcaatgcgc tatctacggt aaaggcggta tcggtaaatc caccaccacc 60
cagaatctcg tcgcggccct cgccgagatg ggtaagaaag tgatgatcgt cggctgcgat 120
ccgaaagcgg attccacccg tctgatcctc cacgctaaag cccagaacac catcatggag 180
atggcggcgg aagtgggctc ggtcgaggat ctggagctcg aagacgttct gcaaatcggc 240
tatggcgatg tccgttgcgc cgaatccggc ggcccggagc caggcgtcgg ctgcgccgga 300
cgcggggtga tcaccgccat caacttcctc gaggaagaag gcgcctatga agaagatttg 360
gatttcgtct tctatgacgt cctcggcgac gtggtctgcg gcggcttcgc tatgccgatc 420
cgcgaaaaca aagcccagga gatctacatc gtctgctccg gcgagatgat ggcgatgtat 480
gccgccaaca atatctccaa agggatcgtg aagtacgcca aatccggcaa ggtgcgcctc 540
ggcggcctga tctgtaactc gcgcaaaacc gaccgggaag acgaactgat catcgccctg 600
gcggagaagc ttggcacgca gatgatccac ttcgttcccc gcgacaacat tgtgcagcgc 660
gcggagatcc gccggatgac ggtgatcgag tacgacccga cctgtcagca ggcgaatgaa 720
tatcgtcaac tggcgcagaa gatcgtcaat aacaccaaaa aagtggtgcc gacgccgtgc 780
accatggacg agctggaatc gctgctgatg gagttcggca tcatggaaga agaagacacc 840
agcatcattg gtaaaaccgc cgctgaagaa aacgcggcct ga 882

<210> SEQ ID NO 98
<211> LENGTH: 1113
<212> TYPE: DNA
<213> ORGANISM: Klebsiella variicola
<220> FEATURE:
<223> OTHER INFORMATION: nifH2

<400> SEQUENCE: 98
atggttagga aaagtagaag taaaaataca aatatagaac taactgaaca tgaccattta 60
ttaataagtc aaataaaaaa gcttaaaaca caaaccactt gctttttttaa taataaagga 120 ggggttggga agactacatt agtagcaaat ttaggagcag agctatcaat aaactttagt 180
gcaaaagttc ttattgtgga tgccgaccct caatgtaatc tcacgcagta tgtattaagt 240
gatgaagaaa ctcaggactt atatgggcaa gaaaatccag atagtattta tacagtaata 300
agaccactat cctttggtaa aggatatgaa agtgacctcc ctataaggca tgtagagaat 360
ttcggttttg acataattgt cggtgaccct agacttgctt tacaggaaga ccttttagct 420
ggagactggc gagatgccaa aggcggtggg atgcgaggaa ttaggacaac ttttgtattt 480
gcagagttaa ttaagaaagc tcgtgagcta aattatgatt ttgttttctt tgacatggga 540
ccatcattag gcgcaatcaa cagggcagta ttactggcaa tggaattctt tgtcgtccca 600
atgtcaatcg atgtattttc actatgggct attaaaaata ttggctccac ggtttcaata 660
tggaaaaaag aattagacac agggattcgg ctctcagagg aacctagcga attatcacaa 720
ttatcacctc aaggaaaact aaagtttctc ggttacgtca cccaacaaca taaagaacgc 780
tctggatacg atacaattca gcttgagaat actgaggaag aaataaaatc gaaacgtcgg 840
gtaaaggcgt atgaagacat tggagaggtg tttccttcta aaattactga gcatctttct 900
aaactttatg catcaaaaga tatgaaccca caccttggag atatacgtca tttaggtagt 960
ttagctccga aatcacaatc acaacacgtt ccgatgatat cagtgtctgg tacaggaaat 1020
tacaccagac ttagaaaaag cgcgcgtgaa ctttatcgag atattgcaag aagatactta 1080
gagaacattc agactgctaa tggcgagaaa tag 1113

<210> SEQ ID NO 99
<211> LENGTH: 1374
<212> TYPE: DNA
<213> ORGANISM: Klebsiella variicola
<220> FEATURE:
<223> OTHER INFORMATION: nifD1

<400> SEQUENCE: 99
atgaagggaa aggaaattct ggcgctgctg gacgaacccg cctgcgagca caaccagaag 60
caaaaatccg gctgcagcgc ccctaagccc ggcgctaccg ccggcggttg cgccttcgac 120
ggcgcgcaga taacgctcct gcccatcgcc gacgtcgcgc acctggtgca cggccccatc 180
ggctgcgcgg gcagctcgtg ggataaccgc ggcagcgtca gcgccggccc ggccctcaac 240
cggctcggct ttaccaccga tcttaacgaa caggatgtga ttatgggccg cggcgaacgc 300
cgcctgttcc acgccgtgcg tcacatcgtc gaccgctatc atccggcggc ggtctttatc 360
tacaacacct gcgtaccggc gatggagggc gatgacatcg aggcggtctg ccaggccgca 420
cagaccgcca ccggcgtccc ggtcatcgct attgacgccg ccggtttcta cggcagtaaa 480
aatcttggca accgaatggc gggcgacgtg atgctcaggc aggtgattgg ccagcgcgaa 540
ccggccccgt ggccagacaa cacgcccttt gccccggccc agcgccacga tatcggcctg 600
attggcgaat tcaatatcgc cggcgagttc tggcaggtcc agccgctgct cgacgagctg 660
gggatccgcg tcctcggcag cctctccggc gacggccgct ttgccgagat ccagaccctg 720
caccgggcgc aggccaatat gctggtgtgc tcgcgcgcgc tgatcaacgt cgcccggggg 780
ctggagctgc gctacggcac gccgtggttt gaaggcagct tctacgggat ccgcgccacc 840
tccgacgcct tgcgccagct ggcgacgctg ctgggggatg acgacctgcg ccgccgcacc 900
gaggcgctga tcgcccgcga agagcaggcg gcggagcagg ctcttgcgcc gtggcgtgag 960
cagctccgcg ggcgcaaagt gctgctctat accggcggcg tgaaatcctg gtcggtggta 1020
tcggccctgc aggatctcgg catgaccgtg gtggccaccg gcacgcgcaa atccaccgag 1080
gaggacaaac agcggatccg tgagctgatg ggcgacgagg cggtgatgct tgaggagggc 1140
aatgcccgca ccctgctcga cgtggtgtac cgctatcagg ccgacctgat gatcgccggc 1200
ggacgcaata tgtacaccgc ctggaaagcc cggctgccgt ttctcgatat caatcaggag 1260
cgcgagcacg cctacgccgg ctatcagggc atcatcaccc tcgcccgcca gctctgtctg 1320
accctcgcca gccccgtctg gccgcaaacg catacccgcg ccccgtggcg ctag 1374

<210> SEQ ID NO 100
<211> LENGTH: 1449
<212> TYPE: DNA
<213> ORGANISM: Klebsiella variicola
<220> FEATURE:
<223> OTHER INFORMATION: nifD2

<400> SEQUENCE: 100
atgaccaacg caacaggcga acgtaacctt gcgctcatcc aggaagtcct ggaggtgttt 60
cccgaaaccg cgcgcaaaga gcgcagaaag cacatgatga tcagcgatcc gcagatggag 120
agcgtcggca agtgcattat ctcgaaccgt aaatcgcagc ccggggtgat gaccgtgcgc 180
ggctgcgcct atgcgggctc gaaaggggtg gtgtttgggc caatcaaaga catggcccat 240
atctcgcacg gccccatcgg ctgcggccag tattcccgcg ccggacggcg caactactat 300
accggcgtca gcggtgtcga cagcttcggc accctgaact tcacctctga ttttcaggag 360
cgcgatattg ttttcggcgg cgataaaaag ctgaccaaac tgatcgaaga gatggagctg 420
ctgttcccgc tgaccaaagg gatcaccatc cagtcggagt gcccggtggg cctgatcggc 480
gatgacatca gcgccgtagc caacgccagc agcaaggcgc tggataaacc ggtgatcccg 540
gtgcgctgcg aaggctttcg cggcgtatcg caatcgctgg gccaccatat cgccaacgac 600
gtggtgcgcg actgggtgct gaacaatcgc gaagggcagc cgtttgccag caccccgtac 660
gatgttgcca tcattggcga ttacaacatc ggcggcgacg cctgggcctc gcgcattctg 720
ctggaagaga tggggctgcg cgtagtggcg cagtggtccg gcgacggcac cctggtggag 780
atggagaaca ccccattcgt taagcttaac ctcgtccact gctaccgttc gatgaactat 840
atcgcccgcc atatggagga gaaacatcag atcccatgga tggaatataa cttcttcggc 900
ccgaccaaaa tcgccgaatc gctgcgcaag atcgccgatc aatttgatga caccattcgc 960
gccaatgcgg aagcggtgat cgccaaatat gaggggcaga tggcggccat catcgccaaa 1020
tatcgcccgc ggctggaggg gcgcaaagtg ctgctgtaca tgggggggct gcggccgcgc 1080
cacgtcatcg gcgcctatga ggatctcggg atggagatca tcgccgccgg ctacgagttt 1140
gcccataacg atgattacga ccgcaccctg ccggacctga aagagggcac cctgctgttt 1200
gacgatgcca gcagctatga gctggaggcc ttcgtcaaag cgctgaaacc tgacctcatc 1260
ggctccggga tcaaagagaa atatatcttc cagaaaatgg gggtgccgtt ccgccagatg 1320
cactcctggg actattccgg cccctatcac ggctatgacg gcttcgccat ctttgcccgc 1380
gatatggata tgaccctgaa caatccggcg tggaacgaac tgactgcccc gtggctgaag 1440
tctgcgtga 1449

<210> SEQ ID NO 101
<211> LENGTH: 1386
<212> TYPE: DNA
<213> ORGANISM: Klebsiella variicola
<220> FEATURE:
<223> OTHER INFORMATION: nifK1

<400> SEQUENCE: 101
atggcagata ttatccgcag tgaaaaaccg ctggcggtga gcccgattaa aaccgggcaa 60
ccgctcgggg cgatcctcgc cagcctcggg ctggcccagg ccatcccgct ggtccacggc 120
gcccagggct gcagcgcctt cgccaaagtt ttctttattc agcatttcca tgacccggtg 180
ccgctgcagt cgacggccat ggatccgacc gccacgatca tgggggccga cggcaatatc 240
ttcaccgcgc tcgacaccct ctgccagcgc cacagcccgc aggccatcgt gctgctcagc 300
accggtctgg cggaagcgca gggcagcgat atcgcccggg tggtgcgcca gtttcgcgag 360
gcgcatccgc gccataacgg cgtggcgatc ctcaccgtca ataccccgga ttttttggc 420 tctatggaaa acggctacag cgcggtgatc gagagcgtga tcgagcagtg ggtcgcgccg 480
acgccgcgtc cggggcagcg gccccggcgg gtcaacctgc tggtcagcca cctctgttcg 540
ccaggggata tcgaatggct gggccgctgc gtggaggcct ttggcctgca gccggtgatc 600
ctgccggacc tctcgcagtc aatggatggc cacctcggtg aaggggattt tacgcccctg 660
acccagggcg gcgcctcgct gcgccagatt gcccagatgg gccagagtct gggcagcttc 720
gccattggcg tgtcgctcca gcgggcggca tcgctcctga cccaacgcag ccgcggcgac 780
gtgatcgccc tgccgcatct gatgaccctc gaccattgcg ataccttat ccatcagctg 840

```
gcgaagatgt ccggacgccg cgtaccggcc tggattgagc gccagcgtgg ccagctgcag    900

gatgcgatga tcgactgcca tatgtggctt cagggccagc gcatggcgat ggcggcggag    960

ggcgacctgc tggcggcgtg gtgtgatttc gcccgcagcc aggggatgca gcccggcccg   1020

ctggtcgccc ccaccagcca ccccagcctg cgccagctgc cggtcgagca agtcgtgccg   1080

ggggatcttg aggatctgca gcagctgctg agccaccaac ccgccgatct gctggtggct   1140

aactctcacg cccgcgatct ggcggagcag tttgccctgc cgctgatccg cgtcggtttt   1200

cccctcttcg accggctcgg tgagtttcgt cgcgtccgcc aggggtacgc cggtatgcga   1260

gatacgctgt ttgaactggc caatctgctg cgcgaccgcc atcaccacac cgccctctac   1320

cgctcgccgc ttcgccaggg cgccgacccc cagccggctt caggagacgc ttatgccgcc   1380

cattaa                                                              1386
```

<210> SEQ ID NO 102
<211> LENGTH: 1563
<212> TYPE: DNA
<213> ORGANISM: Klebsiella variicola
<220> FEATURE:
<223> OTHER INFORMATION: nifK2

<400> SEQUENCE: 102

```
atgagccaaa cgatcgataa aattcacagc tgttatccgc tgtttgaaca ggatgaatac     60

cagaccctgt tccagaataa aaagaccctt gaagaggcgc acgacgcgca gcgtgtgcag    120

gaggtttttg cctggaccac caccgccgag tatgaagcgc tgaacttcca gcgcgaggcg    180

ctgaccgtcg acccggccaa agcctgccag ccgctcggcg ccgtactctg cgcgctgggg    240

ttcgccggca ccctgcccta cgtgcacggc tcccagggct gcgtcgccta ttttcgcacc    300

tactttaacc gccattttaa agagccggtc gcctgcgtct ccgactccat gaccgaggac    360

gcggcggtgt tcggcggcaa caacaacatg aatctgggcc tgcagaatgc cagcgcgctg    420

tataaacccg agattatcgc cgtctccacc acctgtatgg ccgaggtgat cggcgacgat    480

ctgcaggcgt ttatcgccaa cgccaaaaaa gagggatttg ttgacgaccg catcgccatt    540

ccttacgccc ataccccccag ctttatcggc agccatgtca ccggctggga caatatgttc    600

gaagggttcg cgaagacctt taccgctgac tacgccgggc agccgggcaa acagcaaaag    660

ctcaatctgg tgaccggatt tgagacctat ctcggcaact tccgcgtgct gaagcggatg    720

atggcgcaga tggatgtccc gtgcagcctg ctctccgacc catcagaggt gctcgacacc    780

cccgccgacg gccattaccg gatgtacgcc ggcggcacca gccagcagga gatcaaaacc    840

gcgccggacg ccattgacac cctgctgctg cagccgtggc agctggtgaa aagcaaaaag    900

gtggttcagg agatgtggaa ccagcccgcc accgaggtgg ccgttccgct gggcctggcc    960

gccaccgacg cgctgctgat gaccgtcagt cagctgaccg gcaaaccgat cgccgacgct   1020

ctgaccctgg agcgcggccg gctggtcgac atgatgctgg attcccacac ctggctgcat   1080

ggcaaaaaat tcggcctcta cggcgatccg gatttcgtga tggggctgac gcgcttcctg   1140

ctggagctgg gctgcgagcc gacggtgatc ctcagtcata acgccaataa acgctggcaa   1200

aaagcgatga agaaaatgct cgatgcctcg ccgtacggtc aggaaagcga agtgttcatc   1260

aactgcgacc tgtggcactt ccggtcgctg atgttcaccc gtcagccgga ctttatgatc   1320

ggtaactcct acggcaagtt tatccagcgc gataccctgg caaagggcaa agccttcgaa   1380

gtgccgctga tccgtctggg ctttccgctg ttcgaccgcc atcatctgca ccgccagacc   1440
```

acctggggct atgaaggcgc aatgaacatc gtcacgacgc tggtgaacgc cgtgctggaa 1500
aaactggacc acgacaccag ccagttgggc aaaaccgatt acagcttcga cctcgttcgt 1560
taa 1563

<210> SEQ ID NO 103
<211> LENGTH: 1485
<212> TYPE: DNA
<213> ORGANISM: Klebsiella variicola
<220> FEATURE:
<223> OTHER INFORMATION: nifL

<400> SEQUENCE: 103
atgaccctga atatgatgct cgataacgcc gcgccggagg ccatcgccgg cgcgctgact 60
caacaacatc cggggctgtt ttttaccatg gtggaacagg cctcggtggc catctccctc 120
accgatgcca gcgccaggat catttacgcc aacccggcgt tttgccgcca gaccggctat 180
tcgctggcgc aattgttaaa ccagaacccg cgcctgctgg ccagcagcca gacgccgcgc 240
gagatctatc aggagatgtg gcataccctg ctccagcgtc agccctggcg cggtcagctg 300
attaatcagc gtcgggacgg cggcctgtac ctggtggaga ttgacatcac cccggtgctt 360
agcccgcaag gggaactgga gcattatctg gcgatgcagc gggatatcag cgtcagctac 420
accctcgaac agcggctgcg caaccatatg accctgatgg aggcggtgct gaataatatc 480
cccgccgccg tggtagtggt ggacgagcag gatcgggtgg tgatggacaa cctcgcctac 540
aaaaccttct gcgctgactg cggcggccgg gagctgctca ccgagctgca ggtctcccct 600
ggccggatga cgcccggcgt ggaggcgatc ctgccggtgg cgctgcgcgg ggccgcgcgc 660
tggctgtcgg taacctgctg gccgttgccc ggcgtcagtg aagaggccag ccgctacttt 720
atcgacagcg cgctggcgcg gaccctggtg gtgatcgccg actgtaccca gcagcgtcag 780
cagcaggagc aagggcgcct tgaccggctg aagcagcaaa tgaccgccgg caagctgctg 840
gcggcgatcc gcgagtcgct ggacgccgcg ctgatccagc tgaactgccc gattaatatg 900
ctggcggcag cccgtcggct gaacggcgag ggaagcggga atgtggcgct ggaggccgcc 960
tggcgtgaag gggaagaggc gatggcgcgg ctccagcgct gtcgcccatc gctggaactc 1020
gaaaaccccg ccgtctggcc gctgcagccc tttttcgacg atctgtgcgc cctctaccgt 1080
acacgcttcg atcccgacgg gctgcaggtc gacatggcct caccgcatct gatcggcttt 1140
ggccagcgca ccccactgct ggcgtgctta agcctgtggc tcgatcgcac cctggccctc 1200
gccgccgaac tcccctccgt gccgctggcg atgcagctct acgccgagga gaacgacggc 1260
tggctgtcgc tgtatctgac tgacaacgta ccgctgctgc aggtgcgcta cgctcactcc 1320
cccgacgcgc tgaactcgcc gggcaaaggc atggagctgc ggctgatcca gaccctggtg 1380
gcgcaccatc gcggggccat tgagctggct tcccgaccgc agggcggcac ctgcctgacc 1440
ctgcgtttcc cgctgtttaa caccctgacc ggaggtgaag catga 1485

<210> SEQ ID NO 104
<211> LENGTH: 1575
<212> TYPE: DNA
<213> ORGANISM: Klebsiella variicola
<220> FEATURE:
<223> OTHER INFORMATION: nifA

<400> SEQUENCE: 104
atgatccctg aatccgaccc ggacaccacc gtcagacgct tcgacctctc tcagcagttc 60
accgccatgc agcggataag cgtggtgctg agccgggcca ccgaggccag caaaacgctg 120

```
caggaggtgc tcagcgtatt acacaacgat gcctttatgc agcacgggat gatctgcctg    180
tacgacagcg agcaggagat cctcagtatc gaagcgctgc agcaaaccgg ccagcagccc    240
ctccccggca gcacgcagat ccgctatcgc cccggcgagg gactggtggg gaccgtgctg    300
gcccaggggc agtcgctggt gctgccccgg gtcgccgacg atcagcgttt tctcgaccgc    360
ctgagcctct acgattacga tctgccgttt atcgccgtac cgttgatggg gcccaacgcc    420
cggccaatag gggtgctggc ggcccagccg atggcgcgcc aggaagagcg gctgccggcc    480
tgcacccgtt ttctcgaaac cgtcgccaac ctcgtcgccc agaccatccg gctgatgatc    540
cttccggcct cacccgccct gtcgagccgc cagccgccga aggtggaacg gccgccggcc    600
tgctcgtcgt cgcgcggcgt gggccttgac aatatggtcg gcaagagccc ggcgatgcgc    660
cagatcgtgg aggtgatccg tcaggtttcg cgctgggaca ccaccgtgct ggtacgcggc    720
gaaagcggca ccgggaaaga gctgatcgcc aacgccatcc atcaccattc gccacgggct    780
ggcgccgcct tcgtcaaatt taactgcgcg gcgctgccgg acaccctgct ggaaagcgaa    840
ctgttcggcc atgagaaagg cgcctttacc ggggcggtgc gtcagcgtaa aggacgtttt    900
gagctggcgg atggcggcac cctgttcctc gatgagattg gtgaaagcag cgcctcgttc    960
caggccaagc tgctgcgtat cctccaggag ggggagatgg agcgggtcgg cggcgatgag   1020
accctgcggg tgaatgtccg catcatcgcc gccaccaacc gtcacctgga ggaggaggtc   1080
cggctgggcc atttccgcga ggatctctac tatcgtctga acgtgatgcc catcgccctg   1140
cccccgctgc gcgagcgtca ggaggacatc gccgagctgg cgcacttcct ggtgcgcaaa   1200
atcggccagc atcaggggcg cacgctgcgg atcagcgagg gcgcgatccg cctgctgatg   1260
gagtacagct ggccgggtaa cgttcgcgaa ctggagaact gcctcgaacg atcggcggtg   1320
atgtcggaga gtggcctgat cgatcgcgac gtgatcctct tcactcacca ggatcgtccc   1380
gccaaagccc tgcctgccag cgggccagcg gaagacagct ggctggacaa cagcctggac   1440
gaacgtcagc gactgatcgc cgcgctggaa aaagccggct gggtgcaggc caaggcggca   1500
cggctgctgg ggatgacgcc gcgccaggtc gcttatcgga tccagatcat ggatatcacc   1560
ctgccgcgtc tgtag                                                    1575
```

```
<210> SEQ ID NO 105
<211> LENGTH: 2838
<212> TYPE: DNA
<213> ORGANISM: Klebsiella variicola
<220> FEATURE:
<223> OTHER INFORMATION: glnE

<400> SEQUENCE: 105
```

```
atgatgccgc tttctccgca attacagcag cactggcaga cggtcgctga ccgtctgcca     60
gcggattttc ccattgccga actgagccca caggccaggt cggtcatggc gttcagcgat    120
tttgtcgaac agagtgtgat cgcccagccg ggctggctga atgagcttgc ggactcctcg    180
ccggaggcgg aagagtggcg gcattacgag gcctggctgc aggatcgcct gcaggccgtc    240
actgacgaag cggggttgat gcgagagctg cgtctcttcc gccgccagat gatggtccgc    300
atcgcctggg cgcaggcgct gtcgctggtg agcgaagaag agactctgca gcagctgagc    360
gtcctggcgg agaccctgat tgtcgccgcc cgcgactggc tgtacgccgc ctgctgtaag    420
gagtggggaa cgccatgcaa tgccgagggc cagccgcagc cgctgctgat cctcgggatg    480
ggaaagctgg gcggcggcga gctgaacttc tcttccgata tcgatctgat ctttgcctgg    540
```

-continued

```
cctgagcatg gcgccacccg cggcggccgc cgcgagctgg ataacgccca gttctttacc    600
cgtctggggc agcggctgat caaggccctt gaccagccga cgcaggacgg ctttgtctat    660
cgggttgaca tgcgcctgcg gccgtttggc gacagtgggc cgctggtact cagttttgcg    720
gcgctggaag attattacca ggagcagggt cgggactggg aacgctatgc gatggtgaaa    780
gcgcggatca tgggcgataa cgacggcgtg tacgccagcg agttgcgcgc gatgctccgt    840
cctttcgtct tccgccgtta tatcgacttc agcgtgatcc agtcgctgcg taacatgaaa    900
ggcatgatcg cccgcgaagt gcggcgtcgc gggctgaaag acaacatcaa gctcggcgcc    960
ggcgggatcc gtgaaattga gtttatcgtt caggtctttc aactgatccg cggtggtcgc   1020
gaacctgcac tgcagcagcg cgccctgctg ccgacgctgg cggcgattga tgagctacat   1080
ctgctgccgg aaggcgacgc ggcgctgctg cgcgaggcct atctgttcct gcgccggctg   1140
gaaaacctgc tgcaaagcat caacgatgag cagacccaga ccctgccgca ggatgaactt   1200
aaccgcgcca ggctggcgtg gggatgcat accgaagact gggagacgct gagcgcgcag   1260
ctggcgagcc agatggccaa cgtgcggcga gtgtttaatg aactgatcgg cgatgatgag   1320
gatcagtccc cggatgagca actggccgag tactggcgcg agctgtggca ggatgcgctg   1380
gaagaagatg acgccagccc ggcgctggcg catttaaacg ataccgaccg ccgtagcgtg   1440
ctggcgctga ttgccgattt tcgtaaagag ctggatcggc gcaccatcgg cccgcgcggc   1500
cgccaggtgc tggatcagct gatgccgcat ctgctgagcg aaatctgctc gcgcgccgat   1560
gcgccgctgc ctctggcgcg gatcacgccg ctgttgaccg ggatcgtcac ccgtaccacc   1620
tatcttgagc tgctgagcga attccccggc gcgctgaagc acctgatcac gctctgcgcg   1680
gcgtcgccga tggtcgccag ccagctggcg cgccacccgc tgctgctgga tgagctgctg   1740
gatcccaaca ccctctatca gccgacggcg accgatgcct atcgcgacga gctgcgccag   1800
tacctgctgc gcgtgccgga agaggatgaa gagcagcagc tggaggcgtt gcgccagttt   1860
aagcaggcgc agcagctgca tatcgcggcg gcggatatcg ctggtaccct gccggtgatg   1920
aaggtcagcg atcacttaac ctggcttgcc gaagcgatcc tcgacgcggt ggtgcagcag   1980
gcatgggggc agatggtcgc tcgctacggc cagccgaccc acctgcacga tcgccagggt   2040
cgcggcttcg ccgtcgtcgg ctacggtaag cttggcggct gggagctggg ctacagctcc   2100
gatctcgatc tggtgttcct ccatgactgc ccggcggagg tgatgaccga cggcgagcgg   2160
gagattgacg gccgtcagtt ctacctgcgg ctggcccagc ggatcatgca cctgttcagc   2220
acccgcacct cgtccggtat tctctacgaa gtggacgccc ggctgcgtcc ttctggcgcg   2280
gcggggatgc tggtcaccac cgccgacgcg tttgctgact atcagcagaa cgaagcctgg   2340
acgtgggaac atcaggcgct ggtgcgcgcc cgcgtggtct atggcgaccc ggcgctgcag   2400
gcgcgctttg acgccattcg tcgcgatatc ctgaccaccc cgcgggaggg gatgaccctg   2460
cagaccgagg ttcgcgagat gcgcgagaag atgcgcgccc accttggcaa caaacatccc   2520
gatcgttttg atatcaaagc cgatgccggc gggatcaccg atattgaatt tattactcag   2580
tatctggtcc tacgctatgc cagtgacaag ccgaagctga cccgctggtc tgacaacgtg   2640
cgtattcttg agctgctggc gcagaacgac atcatggacg aggaggaggc gcgcgcctta   2700
acgcatgcgt acaccacctt gcgtgatgcg ctccatcacc tggccctgca ggagcagccg   2760
ggacacgtgg cgccagaggc cttcagccgg gagcgtcagc aggtcagcgc cagctggcag   2820
aagtggctga tggcttaa                                                 2838
```

<210> SEQ ID NO 106
<211> LENGTH: 500
<212> TYPE: DNA
<213> ORGANISM: Klebsiella variicola
<220> FEATURE:
<223> OTHER INFORMATION: PinfC

<400> SEQUENCE: 106
agcgtcaggt accggtcatg attcaccgtg cgattctcgg ttccctggag cgcttcattg 60
gcatcctgac cgaagagttc gctggcttct tcccaacctg gattgcacca gtgcaggtag 120
tggtcatgaa tattaccgat tctcaggctg aatacgttaa cgaattgacg cgtaaactac 180
aaaatgcggg cattcgtgta aaagcagact tgagaaatga gaagattggc tttaaaatcc 240
gcgagcacac tttacgtcgt gtcccgtata tgttggtctg tggcgacaaa gaagtcgaag 300
ccggcaaagt ggccgtgcgc acccgtcgcg ggaaagacct cggcagcatg gacgtaagtg 360
aagtgattga gaagctgcaa caagagattc gcagccgcag tcttcaacaa ctggaggaat 420
aaggtattaa aggcggaaaa cgagttcaaa cggcacgtcc gaatcgtatc aatggcgaga 480
ttcgcgccct ggaagttcgc 500

<210> SEQ ID NO 107
<211> LENGTH: 1287
<212> TYPE: DNA
<213> ORGANISM: Klebsiella variicola
<220> FEATURE:
<223> OTHER INFORMATION: amtB

<400> SEQUENCE: 107
atgaaaatgg caacaatgaa atcgggtctg gggggcattag cccttcttcc gggactggca 60
atggccgcgc ccgcagtggc ggacaaagcc gataacgcgt ttatgatgat ttgcaccgcg 120
ctggttctgt ttatgaccat cccggggatc gcgctgtttt acggcggcct gatccgcggc 180
aaaaacgtcc tttccatgct gactcaggtg attgtgacct ttggcctggt ctgcgtactg 240
tgggtgattt atggctatac cctggccttc ggcaccggcg gcagcttctt cggtagtttt 300
gactgggtga tgctgaaaaa tattgaactg aaagcgctga tgggcacctt ctatcagtac 360
atccacgtgg ccttccaggg ctcgttcgcc tgtatcaccg tcgggctgat cgtgggggcg 420
ctggctgagc gtattcgttt ctccgccgtg ctgatttttg tggtggtgtg gatgacgctc 480
tcttatgttc cgattgcgca catggtctgg ggcggcggtc tgctggcgac ccacggcgcg 540
ctggacttcg cgggcggcac cgttgtacac atcaacgccg cggttgccgg gctggtgggt 600
gcgtacatga tgggcaaacg tgtgggcttc ggcaaagaag cgttcaaacc gcacaatctg 660
ccgatggtgt tcaccggaac cgccatcctc tacgtgggct ggttcggctt caacgccggc 720
tccgccagcg cagcgaacga aattgccgca ttggctttcg tcaacaccgt cgtcgccaca 780
gcggctgcca tcctggcgtg gacctttggc gaatgggccc tgcgcggtaa accttcactg 840
ctgggcgcct gctccggggc gattgccggt ctggttggcg tcacaccagc ctgtgggtat 900
atcggtgtcg gtggggcgtt gattgtgggt atcgcatctg gtctggcggg catctggggc 960
gtaacggcgc tgaaacgctg gctgcgggtt gatgaccctt gcgacgtctt cggcgtccac 1020
ggcgtctgcg gcatcgtcgg ctgtatcctg accggtatct tcgcggccac ctctctgggc 1080
ggcgtgggtt atgcagaagg cgtcaccatg ggccatcagc tgctggtgca actcgagagt 1140
atcgcgatta ccatcgtctg gtcgggcgtt gtcgctttca ttggctacaa agtggcggac 1200
atgaccgtgg ggctgcgcgt accagaagag caggagcgcg aaggactgga cgtcaacagc 1260 catgggcgaaa acgcctacaa cgcctga 1287

<210> SEQ ID NO 108
<211> LENGTH: 299
<212> TYPE: DNA
<213> ORGANISM: Klebsiella variicola
<220> FEATURE:
<223> OTHER INFORMATION: Prm8.2

<400> SEQUENCE: 108
cgccgtcctc gcagtaccat tgcaaccgac tttacagcaa gaagtgattc tggcacgcat 60
ggaacaaatt cttgccagtc gggctttatc cgatgacgaa cgcgcacagc ttttatatga 120
gcgcggagtg ttgtatgata gtctcggtct gagggcatta gcgcgaaatg atttttcaca 180
agcgctggca atccgacccg atatgcctga agtattcaat tacttaggca tttacttaac 240
gcaggcaggc aattttgatg ctgcctatga agcgtttgat tctgtacttg agcttgatc 299

<210> SEQ ID NO 109
<211> LENGTH: 300
<212> TYPE: DNA
<213> ORGANISM: Klebsiella variicola
<220> FEATURE:
<223> OTHER INFORMATION: Prm6.2

<400> SEQUENCE: 109
gctaaagttc tcggctaatc gctgataaca tttgacgcaa tgcgcaataa aagggcatca 60
tttgatgccc tttttgcacg ctttcatacc agaacctggc tcatcagtga ttttttttgt 120
cataatcatt gctgagacag gctctgaaga gggcgtttat acaccaaacc attcgagcgg 180
tagcgcgacg gcaagtcagc gttctccttt gcaatagcag ggaagaggcg ccagaaccgc 240
cagcgttgaa gcagtttgaa cgcgttcagt gtataatccg aaacttaatt tcggtttgga 300

<210> SEQ ID NO 110
<211> LENGTH: 400
<212> TYPE: DNA
<213> ORGANISM: Klebsiella variicola
<220> FEATURE:
<223> OTHER INFORMATION: Prm1.2

<400> SEQUENCE: 110
gcccgctgac cgaccagaac ttccaccttg gactcggcta tacccttggc gtgacggcgc 60
gcgataactg ggactacatc cccattccgg tgatcttacc attggcgtca ataggttacg 120
gtccggcgac tttccagatg acctatattc ccggcaccta caataacggt aacgtttact 180
tcgcctgggc tcgtatacag ttttaattcg ctaagtctta gcaataaatg agataagcgg 240
tgtgtcttgt ggaaaaacaa ggactaaagc gttacccact aaaaaagata gcgactttta 300
tcacttttta gcaaagttgc actggacaaa aggtaccaca attggtgtac tgatactcga 360
cacagcatta gtgtcgattt ttcatataaa ggtaattttg 400

<210> SEQ ID NO 111
<211> LENGTH: 1536
<212> TYPE: DNA
<213> ORGANISM: Klebsiella variicola
<220> FEATURE:
<223> OTHER INFORMATION: 16S
<220> FEATURE:
<221> NAME/KEY: misc_feature
<222> LOCATION: (245)..(245)
<223> OTHER INFORMATION: n is a, c, t, g, unknown or other
<220> FEATURE:
<221> NAME/KEY: misc_feature
<222> LOCATION: (452)..(452)
<223> OTHER INFORMATION: n is a, c, t, g, unknown or other
<220> FEATURE:
<221> NAME/KEY: misc_feature
<222> LOCATION: (454)..(454)
<223> OTHER INFORMATION: n is a, c, t, g, unknown or other
<220> FEATURE:
<221> NAME/KEY: misc_feature
<222> LOCATION: (1131)..(1132)
<223> OTHER INFORMATION: n is a, c, t, g, unknown or other

<400> SEQUENCE: 111

```
ttgaagagtt tgatcatggc tcagattgaa cgctggcggc aggcctaaca catgcaagtc     60

gagcggtagc acagagagct tgctctcggg tgacgagcgg cggacgggtg agtaatgtct    120

gggaaactgc ctgatggagg gggataacta ctggaaacgg tagctaatac cgcataacgt    180

cgcaagacca aagtgggggg ccttcgggcc tcatgccatc agatgtgccc agatgggatt    240

agctngtagg tggggtaacg gctcacctag gcgacgatcc ctagctggtc tgagaggatg    300

accagccaca ctggaactga gacacggtcc agactcctac gggaggcagc agtggggaat    360

attgcacaat gggcgcaagc ctgatgcagc catgccgcgt gtgtgaagaa ggccttcggg    420

ttgtaaagca ctttcagcgg ggaggaaggc gntnaggtta ataaccttgt cgattgacgt    480

tacccgcaga agaagcaccg gctaactccg tgccagcagc cgcggtaata cggagggtgc    540

aagcgttaat cggaattact gggcgtaaag cgcacgcagg cggtctgtca agtcggatgt    600

gaaatccccg ggctcaacct gggaactgca ttcgaaactg gcaggctaga gtcttgtaga    660

gggggtaga attccaggtg tagcggtgaa atgcgtagag atctggagga ataccggtgg    720

cgaaggcggc cccctggaca aagactgacg ctcaggtgcg aaagcgtggg gagcaaacag    780

gattagatac cctggtagtc cacgctgtaa acgatgtcga tttggaggtt gtgcccttga    840

ggcgtggctt ccggagctaa cgcgttaaat cgaccgcctg gggagtacgg ccgcaaggtt    900

aaaactcaaa tgaattgacg ggggcccgca caagcggtgg agcatgtggt ttaattcgat    960

gcaacgcgaa gaaccttacc tggtcttgac atccacagaa ctttccagag atggattggt   1020

gccttcggga actgtgagac aggtgctgca tggctgtcgt cagctcgtgt tgtgaaatgt   1080

tgggttaagt cccgcaacga gcgcaaccct tatcctttgt tgccagcggt nnggccggga   1140

actcaaagga gactgccagt gataaactgg aggaaggtgg ggatgacgtc aagtcatcat   1200

ggcccttacg accagggcta cacacgtgct acaatggcat atacaaagag aagcgacctc   1260

gcgagagcaa gcggacctca taaagtatgt cgtagtccgg attggagtct gcaactcgac   1320

tccatgaagt cggaatcgct agtaatcgta gatcagaatg ctacggtgaa tacgttcccg   1380

ggccttgtac acaccgcccg tcacaccatg ggagtgggtt gcaaaagaag taggtagctt   1440

aaccttcggg agggcgctta ccactttgtg attcatgact ggggtgaagt cgtaacaagg   1500

taaccgtagg ggaacctgcg gttggatcac ctcctt                              1536
```

<210> SEQ ID NO 112
<211> LENGTH: 882
<212> TYPE: DNA
<213> ORGANISM: Klebsiella variicola
<220> FEATURE:
<223> OTHER INFORMATION: nifH

<400> SEQUENCE: 112

```
atgaccatgc gtcaatgcgc tatctacggt aaaggcggta tcggtaaatc caccaccacc     60

cagaatctcg tcgcggccct cgccgagatg ggtaagaaag tgatgatcgt cggctgcgat    120
```

```
ccgaaagcgg actccacccg tctgatcctt cacgctaaag cccagaacac catcatggag    180

atggcggcgg aagtgggctc ggtcgaggat ctggagctcg aagacgttct gcaaatcggc    240

tatggcgatg tccgttgcgc cgaatccggc ggcccggagc caggcgtcgg ctgcgccgga    300

cgcggggtga tcaccgccat caacttcctc gaggaagaag gcgcctatga ggaagatttg    360

gatttcgtct tctatgacgt cctcggcgac gtagtctgcg gcggcttcgc catgccgatc    420

cgcgaaaaca aagcccagga gatctacatc gtctgctccg gcgagatgat ggcgatgtat    480

gccgccaaca atatctccaa ggggatcgtg aagtacgcga aatctggcaa ggtgcgcctc    540

ggcggcctga tctgtaactc gcgcaaaacc gaccgggaag acgaactgat catcgccctg    600

gcggagaagc ttggcacgca gatgatccac ttcgttcccc gcgacaacat tgtgcagcgc    660

gcggagatcc gccggatgac ggtgatcgag tacgacccga cctgtcagca ggcgaatgaa    720

tatcgtcaac tggcgcagaa gatcgtcaat aacaccaaaa aagtggtgcc aacgccgtgc    780

accatggacg agctggaatc gctgctgatg gagttcggca tcatggaaga agaagacacc    840

agcatcattg gtaaaaccgc cgctgaagaa aacgcggcct ga                      882
```

<210> SEQ ID NO 113
<211> LENGTH: 1449
<212> TYPE: DNA
<213> ORGANISM: Klebsiella variicola
<220> FEATURE:
<223> OTHER INFORMATION: nifD1

<400> SEQUENCE: 113

```
atgaccaacg caacaggcga acgtaacctt gcgctcatcc aggaagtcct ggaggtgttt     60

cccgaaaccg cgcgcaaaga gcgcagaaag cacatgatga tcagcgatcc gcagatggag    120

agcgtcggca agtgcattat ctcgaaccgt aaatcgcagc ccggggtgat gaccgtgcgt    180

ggctgcgcct atgcgggctc gaaaggggtg gtgtttgggc caatcaaaga catggcccat    240

atctcgcacg gccccatcgg ctgcggccag tactcgcgcg ccggacggcg caactactat    300

accggcgtca gcggtgtcga cagcttcggc accctgaact tcacctctga ttttcaggag    360

cgcgatattg ttttcggcgg cgataaaaag ctgaccaaac tgatcgaaga gatggagctg    420

ctgttcccgc tgaccaaagg gatcaccatc cagtcggagt gcccggtggg cctgatcggc    480

gatgacatca gcgccgtggc caacgccagc agcaaggcgc tggataaacc ggtgatcccg    540

gtgcgctgcg aaggctttcg cggcgtatcg caatcgctgg gccaccatat cgccaacgac    600

gtggtgcgcg actgggtgct gaacaatcgc gaagggcagc cgtttgccag caccccgtat    660

gatgttgcca tcattggcga ttacaacatc ggcggcgacg cctgggcctc gcgcattctg    720

ctggaagaga tggggctgcg cgtagtggcg cagtggtccg gcgacggcac cctggtggag    780

atggagaaca ccccattcgt taagcttaac ctcgtccact gctaccgttc gatgaactat    840

atcgcccgcc atatggagga gaaacatcag atcccgtgga tggaatataa cttcttcggc    900

ccgaccaaaa tcgccgaatc gctgcgcaag atcgccgatc aatttgatga caccattcgc    960

gccaatgcgg aagcggtgat cgccaaatat gaggggcaga tggcggccat catcgccaaa   1020

tatcgcccgc ggctggaggg gcgcaaagtg ctgctgtaca tgggggggct gcggccgcgc   1080

cacgtcatcg gcgcctatga ggatctcggg atggagatca tcgccgccgg ctacgagttt   1140

gcccataacg atgattacga ccgcaccctg ccggacctga aagagggcac cctgctgttt   1200

gacgatgcca gcagctatga gctggaggcc ttcgtcaaag cgctgaaacc tgacctcatc   1260

ggctccggga tcaaagagaa atatatcttc cagaaaatgg gggtgccgtt ccgccagatg   1320
```

cactcctggg actattccgg cccctatcac ggctatgacg gcttcgccat ctttgcccgc 1380
gatatggata tgaccctgaa caatccggcg tggaacgaac tgactgcccc gtggctgaag 1440
tctgcgtga 1449

<210> SEQ ID NO 114
<211> LENGTH: 1374
<212> TYPE: DNA
<213> ORGANISM: Klebsiella variicola
<220> FEATURE:
<223> OTHER INFORMATION: nifD2

<400> SEQUENCE: 114
atgaagggaa aggaaattct ggcgctgctg gacgaacccg cctgcgagca caaccagaag 60
caaaaatccg gctgcagcgc tcctaagccc ggcgcaaccg ccggcggctg cgccttcgac 120
ggcgcgcaga taacgctcct gcccatcgcc gacgtcgcgc acctggtgca cggccccatc 180
ggctgcgcgg gcagctcgtg ggataaccgc ggcagcgtca gcgccggccc ggccctcaac 240
cggctcggct ttaccaccga tcttaacgaa caggatgtga ttatgggccg cggcgaacgc 300
cgcctgttcc acgccgtccg tcacatcgtc gaccgctatc atccggcggc ggtctttatc 360
tacaacacct gcgtaccggc gatggagggg gatgacctgg aggccgtctg ccaggccgca 420
cagaccgcca ccggcgtccc ggtcatcgcc attgacgccg ccggtttcta cggcagtaaa 480
aatcttggca accgaatggc gggcgacgtg atgctcaggc aggtgattgg ccagcgcgaa 540
ccggccccgt ggccagacaa cacgcccttt gccccggccc agcgccacga tatcggcctg 600
attggcgaat tcaatatcgc cggcgagttc tggcaggtcc agccgctgct cgacgagctg 660
gggatccgcg tcctcggcag cctctccggc gacggccgct ttgccgagat ccagaccctg 720
caccgggcgc aggccaatat gctggtgtgc tcgcgcgcgc tgatcaacgt cgcccggggg 780
ctggagctgc gctacggcac gccgtggttt gaaggcagct tctacgggat ccgcgccacc 840
tccgacgcct tgcgccagct ggcggcgctg ctgggggatg acgacctgtg ccgccgcacc 900
gaggcgctga tcgcccgcga agagcaggcg gcggagcagg cgctggcgcc gtggcgcgag 960
cagctccgtg ggcgcaaagt gttgctctac accggcggcg tgaaatcctg gtcggtggta 1020
tcagccctgc aggatctcgg catgaccgtg gtggccaccg gcacgcggaa atccaccgag 1080
gaggacaaac agcggatccg tgagctgatg ggcgacgagg cggtgatgct tgaggagggc 1140
aatgcccgca ccctgctcga cgtggtgtac cgctatcagg ccgacctgat gatcgccggc 1200
ggacgcaata tgtacaccgc ctggaaagcc cggctgccgt ttctcgatat caatcaggag 1260
cgcgagcacg cctacgccgg ctatcagggc atcatcaccc tcgcccgcca gctctgtctg 1320
accctcgcca gtcccgtctg gccgcaaacg catacccgcg ccccgtggcg ctag 1374

<210> SEQ ID NO 115
<211> LENGTH: 1386
<212> TYPE: DNA
<213> ORGANISM: Klebsiella variicola
<220> FEATURE:
<223> OTHER INFORMATION: nifK1

<400> SEQUENCE: 115
atggcagaca ttatccgcag tgaaaaaccg ctggcggtga gcccgattaa aaccgggcaa 60
ccgctcgggg cgatcctcgc cagcctcggg ctggcccagg ccatcccgct ggtccacggc 120
gcccagggct gcagcgcctt cgccaaagtt ttctttattc agcatttcca tgacccggtg 180

```
ccgctgcagt cgacggccat ggatccgacc gccacgatca tgggggccga cggcaatatc    240

ttcaccgcgc tcgacaccct ctgccagcgc cacagcccgc aggccatcgt gctgctcagc    300

accggtctgg cggaagcgca gggcagcgat atcgcccggg tggtgcgcca gtttcgtgag    360

gcgcatccgc gccataacgg cgtggcgatc ctcaccgtca ataccccgga tttttttggc    420

tcgatggaaa acggctacag cgcggtgatc gagagcgtga tcgagcagtg ggtcgcgccg    480

acgccgcgtc cggggcagcg gccccggcgg gtcaacctgc tggtcagcca cctctgttcg    540

ccaggggata tcgaatggct gggccgctgc gtggaggcct ttggcctgca gccggtgatc    600

ctgccggacc tctcgcagtc aatggatggc cacctcggtg aaggggattt tacgcccctg    660

acccagggcg gcgcctcgct gcgccagatt gcccagatgg gccagagtct gggcagcttc    720

gccattggcg tgtcgctcca gcgggcggca tcgctcctga cccaacgcag ccgcggcgac    780

gtgatcgccc tgccgcatct gatgaccctc gaccattgcg atacctttat ccatcagctg    840

gcgaagatgt ccggacgccg cgtaccggcc tggattgagc gccagcgcgg ccagctgcag    900

gatgcgatga tcgactgcca tatgtggctt cagggccagc gcatggcgat ggcggcggag    960

ggcgacctgc tggcggcgtg gtgtgatttc gcccgcagcc aggggatgca gcccggcccg   1020

ctggtcgccc ccaccagcca ccccagcctg cgccagctgc cggtcgatca ggtcgtgccg   1080

ggggatcttg aggatctgca gcagctgctg agccaccaac ccgccgatct gctggtggct   1140

aactctcacg cccgcgatct ggcggagcag tttgccctgc cgctgatccg cgtcggtttt   1200

cccctcttcg accggctcgg tgagtttcgt cgcgtccgcc aggggtacgc cggtatgcga   1260

gatacgctgt ttgagctggc caatctgctg cgcgaccgcc atcaccacac cgccctctac   1320

cgctcgccgc ttcgccaggg cgccgacccc ctgccggctt caggagacgc ttatgccgcc   1380

cattaa                                                               1386
```

<210> SEQ ID NO 116
<211> LENGTH: 183
<212> TYPE: DNA
<213> ORGANISM: Klebsiella variicola
<220> FEATURE:
<223> OTHER INFORMATION: nifK2

<400> SEQUENCE: 116

```
gtgccgctga tccgtctggg ctttccgctg ttcgaccgcc atcatctgca ccgccagacc     60

acctggggct atgaaggcgc aatgaacatc gtcacgacgc tggtgaacgc cgtgctggaa    120

aaactggacc acgacaccag ccagttgggc aaaaccgatt acagcttcga cctcgttcgt    180

taa                                                                  183
```

<210> SEQ ID NO 117
<211> LENGTH: 1485
<212> TYPE: DNA
<213> ORGANISM: Klebsiella variicola
<220> FEATURE:
<223> OTHER INFORMATION: nifL

<400> SEQUENCE: 117

```
atgaccctga atatgatgct cgataacgcc gcaccggagg ccatcgccgg cgcgctgact     60

caacaacatc cggggctgtt ttttaccatg gtggaacagg cctcggtggc catatccctc    120

accgatgcca gcgccaggat catttacgcc aacccagcgt tttgccgcca gaccggctat    180

tcgctggcgc aattgttaaa ccagaacccg cgcctgctgg ccagcagcca gacgccgcgc    240

gcgatctatc aggagatgtg gcataccctg ctccagcgtc agccctggcg cggtcagctg    300
```

```
attaatcagc gtcgggacgg cggcctgtgc ctggtggaga ttgacatcac cccggtgctt    360

agcccgcaag ggaactgga gcattatctg gcgatgcagc gggatatcag cgtcagctac    420

accctcgaac aacggctgcg caaccatatg accctgatgg aggcggtgct gaataatatc    480

cccgccgccg tggtggtggt ggacgagcag gatcgggtgg tgatggacaa cctcgcctac    540

aaaaccttct gcgctgactg cggcggccgg gagctgctca ccgagctgca ggtctcccct    600

ggccggatga cgcccggcgt ggaggcgatc ctgccggtag cgctgcgcgg ggccgcgcgc    660

tggctgtcgg taacctgctg gccgttgccc ggcgtcagtg aagaggccag ccgctacttt    720

atcgacagcg cgctggcgcg gaccctggtg gtgatcgccg actgtaccca gcagcgtcag    780

cagcaggagc aaggacgcct tgaccggctg aagcagcaaa tgaccgccgg caagctgctg    840

gcggcgatcc gcgagtcgct ggacgccgcg ctgatccagc tgaactgccc gattaatatg    900

ctggcggcag cccgtcggct gaacggcgag ggaagcggga atgtggcgct ggaggccgcc    960

tggcgtgaag ggaagaggc gatggcgcgg ctccagcgct gtcgcccatc gctggaactc    1020

gaaaaccccg ccgtctggcc gctgcagccc tttttcgacg atctgtgcgc cctctaccgt    1080

acccgcttcg atcccgacgg gctgcaggtc gacatggcct caccgcatct gatcggcttt    1140

ggccagcgca ccccgctgct ggcgtgctta agcctgtggc tcgaccgcac cctggccctc    1200

gccgccgaat tgccctccgt gccgctggcg atgcagctct atgccgagga gaacgacggc    1260

tggctgtcgc tgtacctgac tgataacgta ccgctgttgc aggtgcgcta cgcccactcc    1320

cccgacgcgc tgaactcgcc gggtaaaggc atggagctgc ggctgatcca gaccctggtg    1380

gcgcaccatc gcggggccat tgagctggct tcccgaccgc agggcggcac ctgcctgacc    1440

ctgcgtttcc cgctgtttaa caccctgacc ggaggtgaag catga                   1485
```

<210> SEQ ID NO 118
<211> LENGTH: 1575
<212> TYPE: DNA
<213> ORGANISM: Klebsiella variicola
<220> FEATURE:
<223> OTHER INFORMATION: nifA

<400> SEQUENCE: 118

```
atgatccctg aatccgaccc ggacaccacc gtcagacgct tcgacctctc tcagcagttc     60

accgccatgc agcggataag cgtggtgctg agccgggcca ccgaggccag caaaacgctg    120

caggaggtac tcactgtatt gcacaacgat gcctttatgc agcacgggat gatctgcctg    180

tacgacagcg agcaggagat cctcagtatc gaagcgctgc agcaaaccgg ccagcagccc    240

ctccccggca gcacgcagat ccgctatcgc cccggcgagg gactggtggg gaccgtgctg    300

gcccaggggc agtcgctggt gctgccccgg gtcgccgacg atcagcgttt tctcgaccgc    360

ctgagcctct acgattacga tctgccgttt atcgccgtac cgttgatggg gcccaacgcc    420

cggccaatag gggtgctggc ggcccagccg atggcgcgcc aggaagagcg gctgccggcc    480

tgcacccgtt ttctcgaaac cgtcgccaac ctcgtcgccc agaccatccg gctgatgatc    540

cttccggcct cacccgccct gtcgagccgc cagccgccga aggtggaacg gccgccggcc    600

tgctcgtcgt cgcgcggcgt gggccttgac aatatggtcg gcaagagccc ggcgatgcgc    660

cagatcgtgg aggtgatccg tcaggtttcg cgctgggaca ccaccgtgct ggtgcgcggt    720

gaaagcggca ccgggaaaga gctgatcgcc aacgccatcc atcaccattc gccacgggct    780

ggcgccgcct tcgtcaaatt taactgcgcg gcgctgccgg acaccctgct ggaaagcgaa    840
```

ctgttcggcc atgagaaagg cgcctttacc ggggcggtgc gtcagcgtaa aggacgtttt 900
gagctggcgg atggcggcac cctgttcctc gatgagattg gtgaaagcag cgcctcgttc 960
caggccaagc tgctgcgtat cctccaggag ggggagatgg agcgggtcgg cggcgatgag 1020
accctgcggg tgaatgtccg catcatcgcc gccaccaacc gtcacctgga ggaggaggtc 1080
cggctgggcc atttccgcga ggatctctat tatcgtctga acgtgatgcc catcgccctg 1140
cccccgctgc gcgagcgtca ggaggacatc gccgagctgg cgcacttcct ggtgcgcaaa 1200
atcggccagc atcaggggcg cacgctgcgg atcagcgagg gcgcgatccg cctgctgatg 1260
gagtacagct ggccgggtaa cgttcgcgaa ctggagaact gcctcgaacg atcggcggtg 1320
atgtcggaga gtggcctgat cgatcgcgac gtgatcctct tcactcacca ggatcgtccc 1380
gccaaagccc tgcctgccag cgggccagcg gaagacagct ggctggacaa cagcctggac 1440
gaacgtcagc gactgatcgc cgcgctggaa aaagccggct gggtgcaggc caaggcggca 1500
cggctgctgg ggatgacgcc gcgccaggtc gcttaccgga tccagatcat ggatatcacc 1560
ctgccgcgtc tgtag 1575

<210> SEQ ID NO 119
<211> LENGTH: 2838
<212> TYPE: DNA
<213> ORGANISM: Klebsiella variicola
<220> FEATURE:
<223> OTHER INFORMATION: glnE

<400> SEQUENCE: 119
atgatgccgc tttctccgca attacagcag cactggcaga cggtcgctga ccgtctgcca 60
gcggattttc ccattgcaga actgagccca caggccaggt cggtcatggc gttcagcgat 120
tttgtcgaac agagtgtgat cgcccagccg ggctggctga atgagcttgc ggactcctcg 180
ccggaggcgg aagagtggcg gcattacgag gcctggctgc aggatcgcct gcaggccgtc 240
actgacgaag cggggttgat gcgagagctg cgtctcttcc gccgccagat gatggtccgc 300
atcgcctggg cgcaggcgct gtcgctggtg agcgaagaag agaccctgca gcagctgagc 360
gccctggcgg agaccctgat tgtcgccgcc cgcgactggc tctacgccgc ctgctgtaag 420
gagtggggaa cgccatgcaa tgccgagggc cagccgcagc cgctgctgat cctcgggatg 480
ggaaagctgg gcggcggcga gctgaacttc tcttccgata tcgatctgat ctttgcctgg 540
cctgagcatg gcgccacccg cggcggccgc cgcgagctgg ataacgccca gttctttacc 600
cgtctggggc agcggctgat caaggccctt gaccagccga cgcaggacgg ctttgtctat 660
cgggttgaca tgcgcctgcg gccgtttggc gacagtgggc cgctggtact cagctttgcg 720
gcactggaag attattacca ggagcagggt cgggactggg aacgctatgc gatggtgaaa 780
gcgcggatca tgggcgataa cgacggcgtg tacgccagcg agttgcgcgc gatgctccgt 840
cctttcgtct tccgccgtta tatcgacttc agcgtgatcc agtcgctgcg taacatgaaa 900
ggcatgatcg cccgcgaagt gcggcgtcgc gggctgaaag acaacatcaa gctcggcgcc 960
ggcgggatcc gtgaaattga gtttatcgtt caggtctttc agctgatccg cggtggtcgc 1020
gaacctgcac tgcagcagcg cgccctgctg ccgacgctgg cggcgattga tgagctacat 1080
ctgctgccgg aaggcgacgc ggcgctgctg cgcgaggcct atctgttcct gcgccggctg 1140
gaaaacctgc tgcaaagcat caacgatgaa cagacccaga ccctgccgca ggatgaactt 1200
aaccgcgcca ggctggcgtg gggatgcat accgaagact gggagacgct gagcgcgcag 1260
ctggcgagcc agatggccaa cgtgcggcga gtgtttaatg aactgatcgg cgatgatgag 1320
gatcagtccc cggatgagca actggccgag tactggcgcg agctgtggca ggatgcgctg 1380
gaagaagatg acgccagccc ggcgctggcg catttaaacg ataccgaccg ccgtagcgtg 1440
ctggcgctga ttgccgattt tcgtaaagag ctggatcggc gcaccatcgg cccgcgcggc 1500
cgccaggtgc tggatcagct gatgccgcat ctgctgagcg aaatctgctc gcgtgccgat 1560
gcgccgctgc ctctggcgcg gatcacgccg ctgttgaccg ggatcgtcac ccgtaccacc 1620
tatcttgagc tgctgagcga attccccggc gcgctgaagc acctgatcac gctctgcgcg 1680
gcgtcgccga tggtcgccag ccagctggcg cgccacccgc tgctgctgga tgagctgctg 1740
gatcccaaca ccctctatca gccgacggcg accgatgcct atcgcgacga gctgcgccag 1800
tacctgctgc gcgtgccgga agaggatgaa gagcagcagc tggaggcgtt gcgccagttt 1860
aagcaggcgc agcagctgca tatcgcggcg gcggatatcg ctggtaccct gccggtgatg 1920
aaggtcagcg atcacttaac ctggcttgcc gaagcgatcc tcgacgcggt ggtgcagcag 1980
gcatgggggc agatggtcgc tcgctacggt cagccgaccc acctgcacga tcgccagggt 2040
cgcggcttcg ccgttgtcgg ctacggtaag ctcggcggct gggagctggg ctacagctcc 2100
gatctcgatc tggtgttcct ccatgactgc ccggcggagg tgatgaccga cggcgagcgg 2160
gagattgacg gccgtcagtt ctacctgcgg ctggcccagc ggatcatgca cctgttcagc 2220
acccgcacct cgtccggtat tctctacgaa gtggacgccc ggctgcgtcc ttctggcgcg 2280
gcggggatgc tggtcaccac cgccgacgcg tttgctgact atcagcagaa cgaagcctgg 2340
acgtgggaac atcaggcgct ggtgcgcgcc cgcgtggtct atggcgaccc ggcgctgcag 2400
gcgcgctttg acgccattcg tcgcgatatc ctgaccaccc cgcgggaggg gacgaccctg 2460
cagaccgagg ttcgcgagat gcgcgagaag atgcgcgccc accttggcaa caaacatccc 2520
gatcgttttg atatcaaagc cgatgccggc gggatcaccg atattgaatt tattactcag 2580
tatctggtcc tacgctatgc cagtgacaag ccgaagctga cccgctggtc tgacaacgtg 2640
cgtattcttg agctgctggc gcagaacgac atcatggacg aggaggaggc gcgcgcctta 2700
acgcatgcat acaccacctt gcgtgatgcg ctccatcacc tggccctgca ggagcagccg 2760
ggacacgtgg cgccagaggc cttcagccgg gagcgtcagc aggtcagcgc cagctggcag 2820
aagtggctga tggcttaa 2838

<210> SEQ ID NO 120
<211> LENGTH: 1287
<212> TYPE: DNA
<213> ORGANISM: Klebsiella variicola
<220> FEATURE:
<223> OTHER INFORMATION: amtB

<400> SEQUENCE: 120
atgaaaatgg caacaatgaa atcgggtctg ggggcattag cccttcttcc gggactggca 60
atggccgcgc ccgcagtggc ggacaaagcc gataacgcgt ttatgatgat ttgcaccgcg 120
ctggttctgt ttatgaccat cccggggatc gcgctgtttt acggcggcct gatccgcggc 180
aaaaacgtcc tttccatgct gactcaggtg attgtgacct ttggcctggt ctgcgtactg 240
tgggtgattt atggctatac cctggccttc ggcaccggcg gcagcttctt cggtagcttt 300
gactgggtga tgctgaaaaa tattgaactg aaagcgctga tgggcacctt ctatcagtac 360
atccacgtgg ccttccaggg ctcgttcgcc tgtatcaccg tcgggctgat cgtgggggcg 420
ctggctgagc gtattcgttt ctccgccgtg ctgattttcg tggtggtgtg gatgacgctc 480
tcttatgttc cgattgcgca catggtctgg ggcggcggtc tgctggcgac ccacggcgcg 540
ctggacttcg cgggcggcac cgttgtacac atcaacgccg cggttgccgg gctggtgggt 600
gcgtatatga tgggcaaacg tgtgggcttc ggcaaagaag cgttcaaacc gcacaatctg 660
ccgatggtgt tcaccggaac cgccatcctc tacgtgggct ggttcggctt caacgccggc 720
tccgccagcg cagcgaacga aattgccgca ctggctttcg tcaacaccgt cgtcgccaca 780
gcggcagcca tcctggcctg gacctttggc gaatgggctc tgcgcggcaa accttcactg 840
ctgggcgcct gctccggggc gattgccggt ctggttggcg tcacaccagc ctgtgggtat 900
atcggtgtcg gtggggcgtt gattgtgggt atcgcatctg gtctggcggg catctggggc 960
gtaacggcgc tgaaacgctg gctgcgggtt gatgaccctt gcgacgtctt cggcgtccac 1020
ggcgtctgcg gcatcgtcgg ctgtatcctg accggtatct tcgcggccac ctctctgggc 1080
ggcgtgggtt atgcagaagg cgtcaccatg ggccatcagc tgctggtgca actcgagagt 1140
atcgcgatta ccatcgtctg gtcgggcgtt gtcgctttca ttggctacaa agtggcggac 1200
atgaccgtgg ggctgcgcgt accagaagag caggagcgcg aaggactgga cgtcaacagc 1260
catggcgaaa acgcctacaa cgcctga 1287

<210> SEQ ID NO 121
<211> LENGTH: 1435
<212> TYPE: DNA
<213> ORGANISM: Achromobacter spiritinus
<220> FEATURE:
<223> OTHER INFORMATION: 16S
<220> FEATURE:
<221> NAME/KEY: misc_feature
<222> LOCATION: (255)..(255)
<223> OTHER INFORMATION: n is a, c, t, g, unknown or other
<220> FEATURE:
<221> NAME/KEY: misc_feature
<222> LOCATION: (454)..(454)
<223> OTHER INFORMATION: n is a, c, t, g, unknown or other

<400> SEQUENCE: 121
ctgaagagtt tgatcctggc tcagattgaa cgctagcggg atgccttaca catgcaagtc 60
gaacggcagc acggacttcg gtctggtggc gagtggcgaa cgggtgagta atgtatcgga 120
acgtgcctag tagcggggga taactacgcg aaagcgtagc taataccgca tacgccctac 180
gggggaaagc aggggatcgc aagaccttgc actattagag cggccgatat cggattagct 240
agttggtggg gtaanggctc accaaggcga cgatccgtag ctggtttgag aggacgacca 300
gccacactgg gactgagaca cggcccagac tcctacggga ggcagcagtg gggaattttg 360
gacaatgggg gaaaccctga tccagccatc ccgcgtgtgc gatgaaggcc ttcgggttgt 420
aaagcacttt tggcaggaaa gaaacgtcat gggntaatac cccgtgaaac tgacggtacc 480
tgcagaataa gcaccggcta actacgtgcc agcagccgcg gtaatacgta gggtgcaagc 540
gttaatcgga attactgggc gtaaagcgtg cgcaggcggt tcggaaagaa agatgtgaaa 600
tcccagagct taactttgga actgcatttt taactaccgg gctagagtgt gtcagaggga 660
ggtggaattc cgcgtgtagc agtgaaatgc gtagatatgc ggaggaacac cgatggcgaa 720
ggcagcctcc tgggataaca ctgacgctca tgcacgaaag cgtggggagc aaacaggatt 780
agataccctg gtagtccacg ccctaaacga tgtcaactag ctgttggggc cttcgggcct 840
tagtagcgca gctaacgcgt gaagttgacc gcctggggag tacggtcgca agattaaaac 900
tcaaaggaat tgacggggac ccgcacaagc ggtggatgat gtggattaat tcgatgcaac 960
gcgaaaaacc ttacctaccc ttgacatgtc tggaattctg aagagattcg gaagtgctcg 1020
caagagaacc ggaacacagg tgctgcatgg ctgtcgtcag ctcgtgtcgt gagatgttgg 1080
gttaagtccc gcaacgagcg caacccttgt cattagttgc tacgaaaggg cactctaatg 1140
agactgccgg tgacaaaccg gaggaaggtg gggatgacgt caagtcctca tggcccttat 1200
gggtagggct tcacacgtca tacaatggtc gggacagagg gtcgccaacc cgcgaggggg 1260
agccaatccc agaaacccga tcgtagtccg gatcgcagtc tgcaactcga ctgcgtgaag 1320
tcggaatcgc tagtaatcgc ggatcagcat gtcgcggtga atacgttccc gggtcttgta 1380
cacaccgccc gtcacaccat gggagtgggt tttaccagaa gtagttagcc taacc 1435

<210> SEQ ID NO 122
<211> LENGTH: 1528
<212> TYPE: DNA
<213> ORGANISM: Achromobacter marplatensis
<220> FEATURE:
<223> OTHER INFORMATION: 16S
<220> FEATURE:
<221> NAME/KEY: misc_feature
<222> LOCATION: (255)..(255)
<223> OTHER INFORMATION: n is a, c, t, g, unknown or other
<220> FEATURE:
<221> NAME/KEY: misc_feature
<222> LOCATION: (999)..(999)
<223> OTHER INFORMATION: n is a, c, t, g, unknown or other
<220> FEATURE:
<221> NAME/KEY: misc_feature
<222> LOCATION: (1009)..(1009)
<223> OTHER INFORMATION: n is a, c, t, g, unknown or other
<220> FEATURE:
<221> NAME/KEY: misc_feature
<222> LOCATION: (1437)..(1437)
<223> OTHER INFORMATION: n is a, c, t, g, unknown or other

<400> SEQUENCE: 122
ctgaagagtt tgatcctggc tcagattgaa cgctagcggg atgccttaca catgcaagtc 60
gaacggcagc acggacttcg gtctggtggc gagtggcgaa cgggtgagta atgtatcgga 120
acgtgcctag tagcggggga taactacgcg aaagcgtagc taataccgca tacgccctac 180
gggggaaagc aggggatcgc aagaccttgc actattagag cggccgatat cggattagct 240
agttggtggg gtaanggctc accaaggcga cgatccgtag ctggtttgag aggacgacca 300
gccacactgg gactgagaca cggcccagac tcctacggga ggcagcagtg gggaattttg 360
gacaatgggg gaaaccctga tccagccatc ccgcgtgtgc gatgaaggcc ttcgggttgt 420
aaagcacttt tggcaggaaa gaaacgtcat gggttaatac cccgtgaaac tgacggtacc 480
tgcagaataa gcaccggcta actacgtgcc agcagccgcg gtaatacgta gggtgcaagc 540
gttaatcgga attactgggc gtaaagcgtg cgcaggcggt tcggaaagaa agatgtgaaa 600
tcccagagct taactttgga actgcatttt taactaccgg gctagagtgt gtcagaggga 660
ggtggaattc cgcgtgtagc agtgaaatgc gtagatatgc ggaggaacac cgatggcgaa 720
ggcagcctcc tgggataaca ctgacgctca tgcacgaaag cgtggggagc aaacaggatt 780
agataccctg gtagtccacg ccctaaacga tgtcaactag ctgttggggc cttcgggcct 840
tagtagcgca gctaacgcgt gaagttgacc gcctggggag tacggtcgca agattaaaac 900
tcaaaggaat tgacggggac ccgcacaagc ggtggatgat gtggattaat tcgatgcaac 960
gcgaaaaacc ttacctaccc ttgacatgtc tggaattcng aagagattng gaagtgctcg 1020
caagagaacc ggaacacagg tgctgcatgg ctgtcgtcag ctcgtgtcgt gagatgttgg 1080
gttaagtccc gcaacgagcg caacccttgt cattagttgc tacgaaaggg cactctaatg 1140
agactgccgg tgacaaaccg gaggaaggtg gggatgacgt caagtcctca tggcccttat 1200
gggtagggct tcacacgtca tacaatggtc gggacagagg gtcgccaacc cgcgaggggg 1260
agccaatccc agaaacccga tcgtagtccg gatcgcagtc tgcaactcga ctgcgtgaag 1320
tcggaatcgc tagtaatcgc ggatcagcat gtcgcggtga atacgttccc gggtcttgta 1380
cacaccgccc gtcacaccat gggagtgggt tttaccagaa gtagttagcc taaccgnaag 1440
gggggcgatt accacggtag gattcatgac tggggtgaag tcgtaacaag gtagccgtat 1500
cggaaggtgc ggctggatca cctccttt 1528

<210> SEQ ID NO 123
<211> LENGTH: 1522
<212> TYPE: DNA
<213> ORGANISM: Microbacterium murale
<220> FEATURE:
<223> OTHER INFORMATION: 16S

<400> SEQUENCE: 123
tacggagagt ttgatcctgg ctcaggatga acgctggcgg cgtgcttaac acatgcaagt 60
cgaacggtga acacggagct tgctctgtgg gatcagtggc gaacgggtga gtaacacgtg 120
agcaacctgc ccctgactct gggataagcg ctggaaacgg cgtctaatac tggatatgtg 180
acgtggccgc atggtctgcg tctggaaaga atttcggttg gggatgggct cgcggcctat 240
cagcttgttg gtgaggtaat ggctcaccaa ggcgtcgacg ggtagccggc ctgagagggt 300
gaccggccac actgggactg agacacggcc cagactccta cgggaggcag cagtggggaa 360
tattgcacaa tgggcgcaag cctgatgcag caacgccgcg tgagggatga cggccttcgg 420
gttgtaaacc tcttttagca gggaagaagc gaaagtgacg gtacctgcag aaaaagcgcc 480
ggctaactac gtgccagcag ccgcggtaat acgtagggcg caagcgttat ccggaattat 540
tgggcgtaaa gagctcgtag gcggtttgtc gcgtctgctg tgaaatccgg aggctcaacc 600
tccggcctgc agtgggtacg ggcagactag agtgcggtag gggagattgg aattcctggt 660
gtagcggtgg aatgcgcaga tatcaggagg aacaccgatg gcgaaggcag atctctgggc 720
cgtaactgac gctgaggagc gaaagggtgg ggagcaaaca ggcttagata ccctggtagt 780
ccaccccgta aacgttggga actagttgtg gggtccattc cacggattcc gtgacgcagc 840
taacgcatta agttccccgc ctggggagta cggccgcaag gctaaaactc aaaggaattg 900
acggggaccc gcacaagcgg cggagcatgc ggattaattc gatgcaacgc gaagaacctt 960
accaaggctt gacatatacg agaacgggcc agaaatggtc aactctttgg acactcgtaa 1020
acaggtggtg catggttgtc gtcagctcgt gtcgtgagat gttgggttaa gtcccgcaac 1080
gagcgcaacc ctcgttctat gttgccagca cgtaatggtg ggaactcatg ggatactgcc 1140
ggggtcaact cggaggaagg tggggatgac gtcaaatcat catgcccctt atgtcttggg 1200
cttcacgcat gctacaatgg ccggtacaaa gggctgcaat accgcgaggt ggagcgaatc 1260
ccaaaaagcc ggtcccagtt cggattgagg tctgcaactc gacctcatga agtcggagtc 1320
gctagtaatc gcagatcagc aacgctgcgg tgaatacgtt cccgggtctt gtacacaccg 1380
cccgtcaagt catgaaagtc ggtaacacct gaagccggtg gcctaaccct tgtggaggga 1440
gccgtcgaag gtgggatcgg taattaggac taagtcgtaa caaggtagcc gtaccggaag 1500
gtgcggctgg atcacctcct tt 1522

<210> SEQ ID NO 124
<211> LENGTH: 1537

<212> TYPE: DNA
<213> ORGANISM: Kluyvera intermedia
<220> FEATURE:
<223> OTHER INFORMATION: 16S
<220> FEATURE:
<221> NAME/KEY: misc_feature
<222> LOCATION: (455)..(455)
<223> OTHER INFORMATION: n is a, c, t, g, unknown or other
<220> FEATURE:
<221> NAME/KEY: misc_feature
<222> LOCATION: (1004)..(1004)
<223> OTHER INFORMATION: n is a, c, t, g, unknown or other

<400> SEQUENCE: 124
attgaagagt ttgatcatgg ctcagattga acgctggcgg caggcctaac acatgcaagt 60
cgaacggtag cacagagagc ttgctctcgg gtgacgagtg gcggacgggt gagtaatgtc 120
tgggaaactg cccgatggag gggataact actggaaacg gtagctaata ccgcataatg 180
tcgcaagacc aaagaggggg accttcgggc ctcttgccat cggatgtgcc cagatgggat 240
tagcttgttg gtgaggtaat ggctcaccaa ggcgacgatc cctagctggt ctgagaggat 300
gaccagccac actggaactg agacacggtc cagactccta cgggaggcag cagtggggaa 360
tattgcacaa tgggcgcaag cctgatgcag ccatgccgcg tgtgtgaaga aggccttcgg 420
gttgtaaagc actttcagcg gggaggaagg cgatncggtt aataaccgtg ttgattgacg 480
ttacccgcag aagaagcacc ggctaactcc gtgccagcag ccgcggtaat acggagggtg 540
caagcgttaa tcggaattac tgggcgtaaa gcgcacgcag gcggtctgtc aagtcggatg 600
tgaaatcccc gggctcaacc tgggaactgc attcgaaact ggcaggcttg agtcttgtag 660
aggggggtag aattccaggt gtagcggtga aatgcgtaga gatctggagg aataccggtg 720
gcgaaggcgg cccccctggac aaagactgac gctcaggtgc gaaagcgtgg ggagcaaaca 780
ggattagata ccctggtagt ccacgccgta aacgatgtcg acttggaggt tgtgcccttg 840
aggcgtggct tccggagcta acgcgttaag tcgaccgcct ggggagtacg gccgcaaggt 900
taaaactcaa atgaattgac gggggcccgc acaagcggtg gagcatgtgg tttaattcga 960
tgcaacgcga agaaccttac ctggtcttga catccacgga attnggcaga gatgccttag 1020
tgccttcggg aaccgtgaga caggtgctgc atggctgtcg tcagctcgtg ttgtgaaatg 1080
ttgggttaag tcccgcaacg agcgcaaccc ttatcctttg ttgccagcgg tccggccggg 1140
aactcaaagg agactgccag tgataaactg gaggaaggtg gggatgacgt caagtcatca 1200
tggcccttac gaccagggct acacacgtgc tacaatggca tatacaaaga gaagcgacct 1260
cgcgagagca agcggacctc ataaagtatg tcgtagtccg gattggagtc tgcaactcga 1320
ctccatgaag tcggaatcgc tagtaatcgt ggatcagaat gccacggtga atacgttccc 1380
gggccttgta cacaccgccc gtcacaccat gggagtgggt tgcaaaagaa gtaggtagct 1440
taaccttcgg gagggcgctt accactttgt gattcatgac tggggtgaag tcgtaacaag 1500
gtaaccgtag ggaacctgc ggttggatca cctcctt 1537

<210> SEQ ID NO 125
<211> LENGTH: 882
<212> TYPE: DNA
<213> ORGANISM: Kluyvera intermedia
<220> FEATURE:
<223> OTHER INFORMATION: nifH

<400> SEQUENCE: 125
atgaccatgc gtcaatgcgc catttatggc aaaggtggga tcggcaaatc caccaccacg 60
caaaacctcg tcgccgctct cgcggaaatg ggtaaaaaag tgatgatcgt cggctgcgac 120
ccgaaagcgg actccacccg tctgatcctg catgcgaaag cacagaacac cattatggag 180
atggccgccg aagtgggttc agtggaagac cttgaactgg aagatgtgct gcaaatcggt 240
tacggcggcg tgcgttgtgc agaatccggc ggcccggagc caggcgtggg ttgtgcaggc 300
cgcggcgtta ttaccgccat taacttcctt gaagaagaag gcgcctatgt cagcgacctc 360
gactttgtct tctatgacgt cctcggtgac gtggtctgcg gcgggttcgc catgccgatt 420
cgtgaaaaca aagcgcaaga gatctatatc gtctgctccg ggaaatgat ggcgatgtat 480 gccgctaaca acatctccaa aggcatcgtg aaatacgcta aatccggcaa ggtgcgcctg 540
ggcgggctga tttgtaactc ccgtcagacc gaccgcgaag atgaactgat catcgcgctg 600
gcagaaaaac tgggcaccca gatgattcac tttgtgccac gcgacaacat cgtccagcgc 660
gcggaaattc gccgtatgac ggttatcgaa tatgacccga aatgcaacca ggccgacgaa 720
taccgcgcgc tggcgaacaa gatcgtcaac aacaccctga tggtcgtccc gacccccttgc 780 accatggatg aactggaaga gctgctgatg gaattcggca ttatggatgt ggaagacgcc 840
agcatcatcg gtaaaaccgc cgccgaagaa aacgcggcct ga 882

<210> SEQ ID NO 126
<211> LENGTH: 660
<212> TYPE: DNA
<213> ORGANISM: Kluyvera intermedia
<220> FEATURE:
<223> OTHER INFORMATION: Dinitrogenase iron-molybdenum cofactor CDS

<400> SEQUENCE: 126
atgaacgata acgatgtcct tttctggcgc atgctggcgc tatttcagtg tctgccggaa 60
ctgcaacccg cgcagatcct ggcctggctg acaggagaac gcgacgacgc cttaaccccg 120
gcgtacctcg ataagcttaa cgtccgcgaa ctggaagcga ccttcccgtc tgaaacggcg 180
atgatgtcgc ccgcacgctg gagccgcgtt aacgcgtgcc ttcacggtac gctgcccgca 240
cacctgcagg taaaaagcac cactcgtcag ggcaattac gggtagcctt ttgttcacag 300
gatggattgc tgatcaatgg tcattttggt caggggcggc tgttttttat ctacgccttt 360
gatgaacagg gcggatggct acacgcgtta cgccgtcttc cctcggcccc gcaaacccag 420
gagccgaatg aagttcgcgc gcagctcctg agtgattgcc acctgctgtt ttgtgaagcc 480
attggcggcc ctgcggcggc ccggctgatt cgtcacaata tccacccgat gaaagtgtcg 540
ccagggatgt ccattgccgc ccagtgtgat gccattaccg cactgctgag cggacgtctg 600
ccaccgtggc tggcaaaacg tcttgagaaa gccaacccgc tggaagagcg ggtgttttaa 660

<210> SEQ ID NO 127
<211> LENGTH: 1374
<212> TYPE: DNA
<213> ORGANISM: Kluyvera intermedia
<220> FEATURE:
<223> OTHER INFORMATION: nifD1

<400> SEQUENCE: 127
atgaagggaa atgacattct cgcgctgctg gatgaacccg cctgcgaaca caatcacaaa 60
cagaaatccg gctgtagcgc ccctaaaccc ggtgccacgg cgggcggttg cgcgttcgac 120
ggcgcgcaaa tcaccctgtt gccgctgtcg gatgtggcgc acctggtcca cggaccgatt 180
ggctgcacgg gaagctcctg ggataaccgg ggcagtatga gctccggccc cagtctcaac 240
cggctcggct ttaccaccga cctgaacgag caggatgtca ttatggggcg cggcgaacgg 300
cggcttttcc acgcggtgcg tcatatcgtc aaccgttatc accctgccgc cgtgtttatc 360
tataacacct gcgttccggc gatggagggt gatgatattg acgccgtctg tcaggcggcg 420
gaaaccgcca ccggcgtgcc agtgattgcc gttgatgccg ccgggttcta tggcagcaaa 480
aaccttggca accgtctcgc gggtgaagtg atggttaaca aggtcattgg acggcgcccg 540 cccgcccct ggccggacga taccccttc gcgccggaac accgccacga tatcggcctg 600
attggcgaat ttaatatcgc cggggagttc tggcacgttc agccgctgct cgatgagctg 660
ggtattcgcg tgctgggcag cctttccggg gatggccgtt ttagtgaaat ccagaccctg 720
caccacgcgc aggtcaatat gctggtctgc tcaagagcgc tgatcaatgt tgcccgcacc 780
ctggaacagc gctatggcac cccctggttt gagggcagtt tttacggcgt gcgcgctacc 840
tccgatgccc tgcgtcaact ggcatccctg cttggcgaca gcgatctgat tgcccgcacc 900
gaagccgtta ttgcccgcga agaagccacg gcaaatcagg cgctcgcccc gtggcgcgaa 960
cggctacagg gtcgcaaagt gctgctctat accggtgggg tgaaatcctg gtcggtggtc 1020
tccgcattgc aggatttagg gatgaccgtc gtggcgactg gcacccgcaa atctaccgaa 1080
gaagataagc agcgtattcg cgaattaatg ggcgatgacg cgctaatgct ggaagaaggc 1140
aacgcccgca ccctgctgga tgtggtgtac cgctatcagg cggatttgat gatcgctggg 1200
gggcgtaaca tgtataccgc gtacaaagcg cggctgccgt ttctggatat caaccaggag 1260
cgtgaacacg cctttgcggg ttatcgcggc atcgtcaccc tcgcccaaca gctttgccag 1320
actattgaaa gccccgtctg gccgcaaaca cacgcccgcg cgccgtggca ataa 1374

<210> SEQ ID NO 128
<211> LENGTH: 1449
<212> TYPE: DNA
<213> ORGANISM: Kluyvera intermedia
<220> FEATURE:
<223> OTHER INFORMATION: nifD2

<400> SEQUENCE: 128
atgagcaatg caacaggcga acgtaatctg gaaattatcc aggaagtgct ggagatcttt 60
cccgaaaaaa cgcgcaaaga acgcagaaag cacatgatgg tgaccgaccc ggagatggaa 120
agcgtcggga aatgcatcat ctctaaccgc aaatcgcagc cgggtgtgat gactgtccgc 180
ggctgctcct acgccgggtc gaaaggcgtg gtttttgggc cgattaaaga tatggcccac 240
atctcccacg gcccgatcgg ctgtgggcag tactcccgtg ccgggcggcg caactactac 300
accggggtca gcggcgttga ttccttcggg acgctgaact ttacctctga ttttcaggag 360
cgcgatatcg tcttcggcgg cgataaaaag ctcaccaaac tgattgagga gatggaggaa 420
ctgttcccgc tgaccaaagg catctccatt cagtcggagt gcccggtagg tttaatcggt 480
gacgatatcg aagcggtggc gaatgccagt aaaaaagcgc tcaacaagcc ggtgatcccg 540
gtgcgttgcg aaggctttcg cggcgtgtcg cagtcgctcg gtcaccatat cgccaacgac 600
gttatccgcg actgggtgct ggataaccgc gaagggaagc ccttcgaatc taccccctat 660
gacgtggcca tcatcggcga ttacaacatc ggggggggatg cctgggcgtc gcgcattctg 720
cttgaagaga tggggttacg cgtggtggcg cagtggtccg gtgacggcac gctggtagag 780
atggaaaaca ccccgttcgt caagctgaac ctggtgcact gctaccgctc tatgaactac 840
atctctcgcc atatggaaga gaaacacggt atcccgtgga tggagtacaa cttcttcggc 900
ccgaccaaaa tcgccgaatc gctgcgtaag atcgccgatc aatttgacga caccatccgc 960
gccaatgcgg aagcggtgat cgccaaatat caggcgcaaa acgatgcgat tatcgccaaa 1020
taccgcccgc gtctcgaagg ccgcaaggtg ctgctctata tgggtggcct gcgtcctcgc 1080
cacgtgattg gcgcgtatga ggatttgggc atggagattg tcgccgccgg gtatgaattt 1140
gcccataacg acgattacga ccgcaccctg ccggacctca aagagggcac gctgttgttc 1200
gacgatgcca gcagttatga actggaagcc ttcgtgaagg cgattaagcc ggacctcatt 1260
ggctcaggca tcaaggaaaa atacattttc cagaaaatgg gggtaccgtt tcgccagatg 1320
cactcctggg attactccgg cccgtatcac ggctatgacg gctttgccat ctttgcccgc 1380
gatatggaca tgacgctcaa caatcccgcc tggggcgagt tgaccgcacc ctggctgaaa 1440
tcagcctga 1449

<210> SEQ ID NO 129
<211> LENGTH: 1383
<212> TYPE: DNA
<213> ORGANISM: Kluyvera intermedia
<220> FEATURE:
<223> OTHER INFORMATION: nifK1

<400> SEQUENCE: 129
atggcagata tcatccgtaa tcagaaaccg ctggcggtaa gcccggtaaa aagcggccag 60
ccgttaggcg ccattctggc gagcctcggc tttgagcaca gtattccact ggtgcacggt 120
gcgcagggat gcagcgcgtt cgccaaagtg ttttttatcc aacattttca tgaccctatt 180
ccgctgcaat ccacggcgat ggaccccacc tcaacggtca tgggggcgga cggcaatatc 240
cttgccgcgc tcaatacgct gtgccagcgc aacaccccga aagctatcgt cctgttgagt 300
accggcctgt ctgaggcgca gggcagcgat atcagccgcg tggtacgtca gtttcgtgag 360
gattttcccc gccacaaaaa tatcgccctc ctgacggtca acaccccgga tttttacggc 420
acgctggaga acggctttag tgcggtggtg gaaagcgtca tcgaacagtg ggtgccggaa 480
aagcctcagc atggcctgcg taaccggcgg gtcaacttgt tgttaagtca cctgctgacg 540
cccggtgatg ttgagttgct gcgcagctac gtggaggctt ttggcctgca accggtgatc 600
gtgccggatc tttcacagtc gctggatggt cacctggcaa gcggtgattt ttcgccggtc 660
actcaggggg gaacgcccct gcgcattatc gaacagatgg gacagagcct gtgcacgttt 720
gctattggcg tgtcgctgtc ccgtgcggca tcgctgctgg cacagcgtag ccgtggcgag 780
gtgatcgtgc ttccccatct gatgaccatg gaacattgcg accgttttat tcatcaactg 840
aagatcattt ccgggcgcga ggttcccgcc tggattgagc gccagcgcgg acaattgcag 900
gatgcgatga tcgattgtca tatgtggttg caggataccc ggctcgcgct ggccgccgag 960
ggcgatctgc tggcgggctg gtgtgatttc gcccgtagcc agggcatgct ccccggcccc 1020
gttgtggcgc cggtcagcca gccgggcctg caacagcttc ccgtggagaa agtggtcatt 1080
ggcgatctgg aagatatgca ggatttactc tgcgctatgc ctgctgacct gctggtcgcc 1140
aactcccatg ccgcagacct ggccgaacaa ttctccatcc cgctgatccg cgccgggttc 1200
cctatcttcg acaggcttgg cgaatttcgt cgcgtgcgtc agggataccc cggcattcgc 1260
gacacgctgt ttgagctggc gaacctgatg cgcgaacgtc atcaccacct gcccgtctac 1320
cgctcccccc tgcgccagca atttgcccag gacgctgacg gaggccgcta tgcaacatgt 1380
taa 1383

<210> SEQ ID NO 130
<211> LENGTH: 1563

<212> TYPE: DNA
<213> ORGANISM: Kluyvera intermedia
<220> FEATURE:
<223> OTHER INFORMATION: nifK2

<400> SEQUENCE: 130

```
atgagccaaa ctgctgagaa aattgtcacc tgtcatccgc tgtttgaaca ggacgaatac     60

cagacgctgt ttcgcaataa gcgcggtctg gaagaggcgc acgacccgca gcgcgtgcaa    120

gaggtttttg aatggaccac cacggcggag tatgaagcgc tgaactttaa gcgtgaagcg    180

ttaaccgtcg atccggcaaa ggcctgccag cctttaggat cggtactctg ctcgctgggt    240

tttgccaata cgctgcctta tgtgcacggt tcccagggct gtgtggccta tttccgcacc    300

tattttaacc gtcatttcaa agagccgatc gcttgcgttt ccgactctat gacagaggat    360

gcggcggtct tcggcggcaa caacaacctt aacaccgggt tgcaaaatgc cagcgccctg    420

tacaaaccgg aaattgtcgc tgtctccact acctgtatgg cggaggtcat cggcgatgac    480

ctgcaggcct ttatcgccaa cgccaaaaag gacgggttta ttgatgccgc cattccggtg    540

ccctacgccc atacgccaag ttttatcggt agccacatca ccggctggga caacatgttt    600

gaaggtttcg cccgggcatt taccgccgat cacgtggcgc aaccgggcaa actggcgaag    660

ctaaacctgg tgaccggttt tgaaacctat cttggcaatt accgcgtgct caaacgcatg    720

atggcccaga tggaggtgcc ctgtagcctg ctgtctgacc cgtctgaggt gttagatacg    780

ccagccgacg gccactatcg catgtatgcg ggcggcacaa cgcaacaaga gatgcgcgac    840

gcccccgatg ctatcgacac cctgctgctg caaccctggc atctggtgaa gagtaaaaaa    900

gtggtgcagg agtcctgggg ccagcccgcc acagaagtgt ccatcccaat gggactgacc    960

gggaccgacg aactgctgat ggcagtcagt cagttaaccg gcaaaccggt ggccgatgaa   1020

ctgacgctgg agcgtgggcg cctggtggat atgattctcg attcacacac ctggctgcac   1080

ggtaagaaat tcggtctcta cggcgatccg gattttgtga tggggctgac gcgtttcctg   1140

ctggaactgg gctgcgagcc gacggttatc ctctgtcata acggtagcaa gcgctggcag   1200

aaagcgatga agaaaatgct tgaggcatcg ccctacggtc aggagagcga agtgttcatc   1260

aactgcgatc tgtggcattt ccgctcgctg atgtttaccc gcaaaccgga ctttatgatc   1320

ggcaactcgt acgccaaatt catccagcgt gacacgctgg cgaaaggcga acagtttgaa   1380

gttccgctga tccgtcttgg cttcccgttg ttcgaccgcc accacctgca tcgccagacc   1440

acatggggtt atgaaggggc gatgaatatc gtcaccaccc tggtcaacgc cgtgctggaa   1500

aaagtcgacc gcgataccat caaactgggc aaaacggact acagcttcga ccttgtccgc   1560

taa                                                                 1563
```

<210> SEQ ID NO 131
<211> LENGTH: 1488
<212> TYPE: DNA
<213> ORGANISM: Kluyvera intermedia
<220> FEATURE:
<223> OTHER INFORMATION: nifL

<400> SEQUENCE: 131

```
atgaccttta atatgatgct ggagaccagc gcaccgcagc acattgcggg caacctctca     60

cttcaacatc ccggactgtt ttccacgatg gttgaacagg ctccgatcgc gatttcgctg    120

accgacccgg acgcgaggat tctgtacgct aatccggcct tttgtcgcca gaccggttat    180

agcctggaag agctgctcaa ccagaaccat cgcatactgg caagccaaca gacgccgcgc    240
```

```
agcatttatc aggaactgtg gcaaacgctg ctgcaacaga tgccctggcg cggtcagctc    300
atcaatcgcc gtcgggatgg cagcctttat ctggctgagg tcgatatcac cccggtcgtc    360
aacaaacagg gcgaactgga acactacctc gccatgcaac gtgatatcag cgccagctat    420
gcgctcgaac agcgattgcg caatcacacc accatgagcg aggcggtgct gaacaacatt    480
cctgccgccg tggtggtggt caacgagcag gaccaggtag tcatggacaa cctcgcctac    540
aaaaccttct gtgccgactg cggtggcaag gagctgctca ccgaactgga tttctcccgg    600
cgcaaaagcg atctctatgc cgggcaaata ctgcctgtgg tgctgcgcgg cgccgtgcgc    660
tggctctctg tcacctgctg gaccttgccg gggggtgagcg aagaagccag ccgctacttt    720
attgataccg cgctgccccg caccctggtg gtgatcaccg actgcaccca gcaacaacaa    780
caggccgaac agggccgtct cgatcgtctc aaacaggaga tgaccaccgg gaagctgctg    840
gccgcgatcc gtgaatcgtt ggatgccgcg ctggttcagc taaactgccc catcaatatg    900
ctggcggcgg cgcgacgtct caacggtgaa gataaccata acgtggcgct ggatgccgcg    960
tggcgcgagg gggaagaggc gctggcccgc ctgcaacgct gccgcccttc tctcgatctg   1020
gaagagagcg cgctgtggcc tctgcaaccg ctgtttgacg acctgcgcgc cctttaccat   1080
acccgctata acaatggcga aaatctgcac gttgaaatgg cctctccgca tctggcgggg   1140
tttggtcagc gcacgcagat ccttgcctgt ctcagtttgt ggctcgaccg tacgctggcc   1200
ctcgccgccg cgctaccgga cagaacgctg catacccagc tttacgcccg tgaagaagat   1260
ggctggctgt ccatttggct gacagataat gtgccgctca tccatgtgcg atacgcccac   1320
tcccccgatg ccctgaacgc cccccggcaaa gggatggagc tgcgattgat tcaaaccctg   1380
gttgcccatc atcgcggcgc aatagaacta actacccgcc ctgaaggcgg tacctgcctg   1440
accctgcgat tcccgttatt tcattcactg accggaggcc cacgatga                 1488
```

<210> SEQ ID NO 132
<211> LENGTH: 1572
<212> TYPE: DNA
<213> ORGANISM: Kluyvera intermedia
<220> FEATURE:
<223> OTHER INFORMATION: nifA

<400> SEQUENCE: 132

```
atgacccagc gacccgagtc gggcaccacc gtctggcgtt ttgatctctc acagcaattt     60
accgccatgc agcgcatcag cgtggtgttg agtcgcgcaa ccgagataag ccagacgctg    120
caggaggtgc tgtgtgttct gcataatgac gcatttatgc aacacggcat gctgtgtctg    180
tatgacaacc agcaggaaat tctgagtatt gaagccttgc aggaggcaga ccaacatctg    240
atccccggca gctcgcaaat tcgctatcgc cctggcgaag ggctggtagg agccgtactg    300
tcccagggac aatctcttgt gctgccgcgt gtcgccgacg atcaacgctt tctcgacagg    360
cttggcatct atgattacaa cctgccgttt atcgccgtcc ccttaatggg gccaggcgcg    420
cagacgattg gcgtgctcgc cgcgcagccg atggcgcgtc tggaggagcg gcttccttcc    480
tgtacgcgct ttctggaaac cgtcgccaat ctggtcgcac agacagtccg gctgatgacc    540
ccgcctgccg ccgccacacc gcgcgccgcg attgcccaga ccgaacgcca gcgcaactgt    600
ggcactcctc gccccttcgg ctttgagaat atggtgggca aaagcccggc catgcagcag    660
acaatggaca ttatccgcca ggtttcgcgc tgggatacca cggtactggt gcgcggcgaa    720
agcggcaccg gtaaagaact tatcgccaat gctattcatc acaactcccc tcgcgccgcc    780
gcgccctttg tgaaatttaa ctgcgcggcg ctaccggata cgctactgga gagcgaattg    840
```

```
ttcggccatg aaaaaggggc gttcaccggc gcggttcgcc agcgtaaagg acgttttgaa     900
ctggccgatg gcggcacact gtttcttgat gaaattggcg aaagcagcgc ctcgttccag     960
gccaaactgc tgcgtatttt gcaggagggt gaaatggagc gcgttggcgg cgacgaaacc    1020
ctgcgcgtca atgtgcgtat catcgccgcc accaaccgga atctggaaga agaggtgcgg    1080
atgggcaatt tccgcgagga tctctattat cgcctcaacg taatgcccat ctccctgccc    1140
ccgctgcgtg aacgtcagga ggacattgcc gagctggcgc actttctggt gcgcaaaatc    1200
gcccataacc aggggcgtac gctgcgcatc agtgatggcg ccatccgtct gctgatgggt    1260
tacaactggc ccggtaacgt gcgtgagctg gaaaattgcc tggaacgttc ggcagtgatg    1320
tcagaaaacg gcctgatcga ccgcgatgtg gtgctcttta accaccgtga gaacacgcca    1380
aaactcgcta tcgccgccgc gccaaaagag gatagctggc ttgatcaaac gctggatgaa    1440
cgtcaacggc tgattgccgc gctggaaaaa gccgggtggg tgcaggccaa agcggcgcgt    1500
ctgctgggta tgacgccccg tcaggtcgcc tatcggatac aaattatgga tatcagcatg    1560
cccaggatgt ga                                                        1572
```

```
<210> SEQ ID NO 133
<211> LENGTH: 2853
<212> TYPE: DNA
<213> ORGANISM: Kluyvera intermedia
<220> FEATURE:
<223> OTHER INFORMATION: glnE

<400> SEQUENCE: 133
```

```
atgatgccgc actctccaca gctacagcag cactggcaaa ctgtactggc ccgcttgcct      60
gagtcattca gtgaaacacc gcttagtgaa caagcgcagt tagtgcttac tttcagtgat     120
tttgtgcagg atagccttgc cgcgcatcct gactggctgg ctgagctgga aagcgcaccg     180
ccacaggcgg acgagtggaa gcagtatgcg caaacccttc gcgaatcgct ggaaggtgtg     240
ggagatgagg catcattaat gcgtgcgctg cgcctgttcc gtcgccatat gatggtgcgc     300
attgcctggg cgcagtcgct ggcgctggtg gcagaagatg agacgttgca gcagttgagc     360
gtactggcgg agaccctgat cgtcgctgca cgcgactggc tttacgatgc ctgctgtcgc     420
gagtggggaa cgccgtgcaa tcagcagggg gaaccgcagc cgttgctgat cctgggcatg     480
ggcaagctgg gtggcgggga gcttaacttt tcgtccgata tcgatctgat tttgcctggg     540
ccggaaaacg gttcaacgcg cggtgggcga cgcgaacttg ataacgccca gtttttttact     600
cgcttgggac agcgcctgat caaagtgctc gaccagccga cgcaggatgg ctttgtctat     660
cgcgtggata tgcggctgcg cccgtttggc gacagcggtc cgctggtgct gagttttgcc     720
gcgctggaag attattatca ggagcagggg cgcgactggg aacgttatgc gatggtgaaa     780
gcccgcatta tgggcgataa ggacgatgtt tacgctggcg aattacgggc catgctgcgg     840
ccgttcgtct tccgtcgcta tatcgatttc agcgttattc agtctctgcg taacatgaaa     900
gggatgattg cccgcgaagt gcgccgccgt ggtctgaaag ataacattaa gctgggcgcg     960
ggcggcatcc gtgagattga gtttatcgtt caggtgttcc agttgatacg cggtgggcgc    1020
gagccgtcgt tgcagtcccg ttcactgtta ccgacgctgg acgctatcga taagctgggt    1080
ttgctgccgc ctggcgatgc accggcgtta cgccaggcct atttgtatct gcgccgtctg    1140
gaaaacctgc tgcaaagcat taacgacgaa caaacgcaga cgctgccgac agatgaactc    1200
aatcgcgcgc gtctggcctg gggatgcgg gtcgcagact gggaaaccct gaccgctgag     1260
```

```
cttgaaaagc agatgtctgc cgtacgaggg atattcaaca ccctgattgg cgatgacgaa   1320

gccgaagagc agggggatgc gctctgcggg caatggagtg agttgtggca ggatgcgttt   1380

caggaagatg acagcacgcc tgtgctggcg cacctttctg acgatgatcg ccgccgcgtg   1440

gtcgcgatga ttgctgattt tcgcaaagag ctggataaac gcaccattgg cccacgcggc   1500

cgccaggtgc tcgaccatct gatgccgcat ctgttgagtg atgtctgctc ccgtgaggat   1560

gcccctgtac cgttgtctcg cgtgacgccg ctgttaacgg gaattgtcac gcgtacgacg   1620

tatcttgagc tgctcagcga gtttcctggt gcgcgtaagc atctgatttc actctgtgcc   1680

gcctcgccga tggtggccag taagctggcg cgctatccgt tattgctgga tgagttgctc   1740

gatccgaata ccctttatca gcccacggcg atgaatgcct accgggatga gctacgtcag   1800

tatctgctgc gtgtgccgga tgacgatgaa gagcagcaac tggaggcgtt acgccagttt   1860

aaacaggctc aattgttgcg tgtggcggca gcagatctgg caggcacact ccccgtgatg   1920

aaagtgagcg atcacttaac atggcttgcc gaagccatca ttgaagccgt ggtacaacag   1980

gcgtggagcc tgatggtatc gcgttatggg cagccgaaac acttacgcga ccgtgaaggc   2040

cgtgggtttg cagtggtcgg ttacggcaaa ctgggcggtt gggagctggg ctatagttcc   2100

gatctggatt tgattttcct tcatgactgt ccggtggacg tgatgactga cggcgagcgg   2160

gaaatcgatg gccgccaatt ttatctgcgc cttgcccagc gcgtgatgca cctgttcagt   2220

acgcgcacct catccgggat cctgtatgag gtagacgcgc gcttgcgccc gtccggtgcg   2280

gcgggaatgc tggtgacctc aaccgaatcc tttgccgact accagcgcac cgaagcctgg   2340

acctgggaac atcaggcgct ggttcgcgcc cgcgttgtct atggcgatcc acaattaaac   2400

gcgcaatttg atgccatccg ccgcgatatc accatgaccg tgcgtaatgg tgcaacgtta   2460

caaaccgagg tgcgcgagat gcgcgaaaaa atgcgcgccc acttgagcaa taagcacaag   2520

gatcgctttg atattaaagc cgatgagggt ggaattaccg atatcgaatt tatcacccag   2580

tatctggtgc tgcgttatgc ccatgccaaa ccgaaactga cgcgctggtc ggacaatgtc   2640

cgcattctgg aagggctggc gcaaaacggc attatggaag agcaggaagc gcaggcactt   2700

accaccgcct atacaacgtt gcgtgatgag ctgcatcacc tggcgctaca ggagctgcca   2760

ggacatgttc cggaggcatg ttttgtcgct gaacgcgcga tggtgcgagc ctgctggaac   2820

aagtggttgg tggagccgtg cgaggacgcg taa                                2853
```

```
<210> SEQ ID NO 134
<211> LENGTH: 1290
<212> TYPE: DNA
<213> ORGANISM: Kluyvera intermedia
<220> FEATURE:
<223> OTHER INFORMATION: amtB

<400> SEQUENCE: 134

atgaagaaag cactattaaa agcgggtctg gcctcgctgg cattactgcc gtgtctggct     60

atggcagccg atccggttgt cgtcgataaa gccgacaatg cctttatgat gatttgcacc    120

gcgctggtgc tgtttatgtc aattccgggc atcgccctgt tctatggtgg tttaatccgc    180

ggtaaaaacg tcctttctat gctgacacag gttgcggtta cgttcgcact ggtgtgcgtg    240

ctgtgggtgg tttacggcta ctctctggcc tttggcactg gcggcagctt cttcggtagc    300

ttcgactggg tgatgctgaa aaatattgag ctgaaagcgc tgatgggcac catctatcag    360

tacattcacg ttgcgttcca gggctcgttt gcctgtatta ccgtcggcct gattgtcggt    420

gcgctggcag aacgtatccg tttctccgca gtactgattt tcgtcgtggt atggctgacg    480
```

```
ctgtcctacg tgccgatcgc acacatggtc tggggcggcg gtctgctggc aacccatggc    540

gccatggatt ttgcgggcgg tacagtcgtt cacatcaacg cagccgttgc aggcctggtg    600

ggtgcttacc tgattggcaa acgtgtcggt ttcggtaaag aagcgtttaa accgcacaac    660

ctgccgatgg tgtttaccgg tacggcaatc ctctactttg gctggttcgg attcaacgcg    720

ggttctgcaa gcgcggcgaa cgaaattgcg ggtctggctt ttgttaacac cgtcgtggca    780

acagcgggtg caatcctctc ctgggtcttc ggtgagtggg cgctgcgcgg caaaccgtct    840

ctgttgggtg cctgttctgg tgcgattgct ggcctcgtgg gtatcacccc ggcgtgtggt    900

tacgttggtg tgggtggcgc gctgatcgtg ggcatcgttg caggcctggc gggtctgtgg    960

ggcgttaccg cgctgaaacg ctggctgcgt gttgacgacc cgtgtgatgt cttcggtgtt   1020

cacggcgtgt gcggtatcgt aggttgtatc atgacaggta tcttcgcagc cacttcactg   1080

ggcggcgtgg gttatgccga aggcgtgacc atgggccatc aggttctggt acaactggaa   1140

agtatcgcca ttactatcgt atggtctggt atcgtcgcct ttatcggtta caaactggct   1200

gatatgacag tgggtctgcg tgttccggaa gatcaggaac gcgaagggct ggacgtcaac   1260

agccacggcg agaacgccta caacgcctga                                     1290
```

<210> SEQ ID NO 135
<211> LENGTH: 498
<212> TYPE: DNA
<213> ORGANISM: Kluyvera intermedia
<220> FEATURE:
<223> OTHER INFORMATION: PinfC

<400> SEQUENCE: 135

```
ctggggtcac tggagcgctt tatcggcatc ctgaccgaag aatttgccgg tttcttcccg     60

acctggctgg cccctgttca ggttgtggtg atgaatatca ctgattctca agctgaatat    120

gtcaacgaat tgacccgtaa attgcaaaat gcgggcattc gtgtaaaagc ggacttgaga    180

aacgagaaga ttggctttaa aatccgcgag cacactttac gtcgtgtccc ttatatgttg    240

gtctgtggtg ataaagaggt ggaagcaggc aaagtggccg ttcgcacccg ccgcggtaaa    300

gacctgggca gcctggacgt aagtgaagtg attgagaagc tgcaacaaga gattcgcagc    360

cgcagtcttc aacaactgga ggaataaggt attaaaggcg gaaaacgagt tcaaacggca    420

cgtccgaatc gtatcaatgg cgagattcgc gcccaggaag ttcgcttaac tggtctggaa    480

ggtgagcagc tgggtatt                                                   498
```

<210> SEQ ID NO 136
<211> LENGTH: 1537
<212> TYPE: DNA
<213> ORGANISM: Kosakonia pseudosacchari
<220> FEATURE:
<223> OTHER INFORMATION: 16S
<220> FEATURE:
<221> NAME/KEY: misc_feature
<222> LOCATION: (454)..(454)
<223> OTHER INFORMATION: n is a, c, t, g, unknown or other

<400> SEQUENCE: 136

```
attgaagagt ttgatcatgg ctcagattga acgctggcgg caggcctaac acatgcaagt     60

cgaacggtag cacagagagc ttgctctcgg gtgacgagtg gcggacgggt gagtaatgtc    120

tgggaaactg cctgatggag ggggataact actggaaacg gtagctaata ccgcataacg    180

tcgcaagacc aaagaggggg accttcgggc ctcttgccat cagatgtgcc cagatgggat    240
```

tagctagtag gtggggtaac ggctcaccta ggcgacgatc cctagctggt ctgagaggat 300
gaccagccac actggaactg agacacggtc cagactccta cgggaggcag cagtggggaa 360
tattgcacaa tgggcgcaag cctgatgcag ccatgccgcg tgtatgaaga aggccttcgg 420
gttgtaaagt actttcagcg gggaggaagg cganacggtt aataaccgtg ttgattgacg 480
ttacccgcag aagaagcacc ggctaactcc gtgccagcag ccgcggtaat acggagggtg 540
caagcgttaa tcggaattac tgggcgtaaa gcgcacgcag gcggtctgtc aagtcggatg 600
tgaaatcccc gggctcaacc tgggaactgc atccgaaact ggcaggcttg agtctcgtag 660
agggaggtag aattccaggt gtagcggtga aatgcgtaga gatctggagg aataccggtg 720
gcgaaggcgg cctcctggac gaagactgac gctcaggtgc gaaagcgtgg ggagcaaaca 780
ggattagata ccctggtagt ccacgccgta aacgatgtct atttggaggt tgtgcccttg 840
aggcgtggct tccggagcta acgcgttaaa tagaccgcct ggggagtacg gccgcaaggt 900
taaaactcaa atgaattgac gggggcccgc acaagcggtg gagcatgtgg tttaattcga 960
tgcaacgcga agaaccttac ctggtcttga catccacaga acttgccaga gatggcttgg 1020
tgccttcggg aactgtgaga caggtgctgc atggctgtcg tcagctcgtg ttgtgaaatg 1080
ttgggttaag tcccgcaacg agcgcaaccc ttatcctttg ttgccagcgg tccggccggg 1140
aactcaaagg agactgccag tgataaactg gaggaaggtg gggatgacgt caagtcatca 1200
tggcccttac gaccagggct acacacgtgc tacaatggcg catacaaaga gaagcgacct 1260
cgcgagagca agcggacctc ataaagtgcg tcgtagtccg gattggagtc tgcaactcga 1320
ctccatgaag tcggaatcgc tagtaatcgt ggatcagaat gccacggtga atacgttccc 1380
gggccttgta cacaccgccc gtcacaccat gggagtgggt tgcaaaagaa gtaggtagct 1440
taaccttcgg gagggcgctt accactttgt gattcatgac tggggtgaag tcgtaacaag 1500
gtaaccgtag gggaacctgc ggttggatca cctcctt 1537

<210> SEQ ID NO 137
<211> LENGTH: 882
<212> TYPE: DNA
<213> ORGANISM: Kosakonia pseudosacchari
<220> FEATURE:
<223> OTHER INFORMATION: nifH

<400> SEQUENCE: 137
atgaccatgc gtcaatgcgc catttacggc aaaggtggga tcggtaaatc gaccaccaca 60
cagaacctgg tcgccgcgct ggcggagatg ggtaagaaag tcatgatcgt cggctgcgat 120
ccgaaagccg actccacgcg tttgatcctg catgcgaaag cgcagaacac cattatggag 180
atggccgccg aagtcggctc cgtcgaagac ctggaattag aagacgtgct gcaaatcggt 240
tacggcggcg tgcgctgcgc ggaatccggt ggcccggagc caggtgtggg ttgtgccggt 300
cgtggcgtga tcaccgcgat taacttcctc gaagaagaag gcgcttacgt gccggatctg 360
gattttgttt tctacgacgt gctgggcgac gtggtatgcg gtggtttcgc catgccgatt 420
cgtgaaaaca aagcgcagga gatctacatc gtttgctctg gcgaaatgat ggcgatgtac 480
gccgccaata acatctccaa aggcatcgtg aaatatgcca aatccggtaa agtgcgcctc 540
ggcgggctga tttgtaactc gcgccagacc gaccgcgaag atgaactcat cattgcgctg 600
gcggaaaaac tcggcacgca aatgatccac tttgttcccc gcgacaacat tgtgcagcgt 660
gcggaaatcc gccgtatgac ggttatcgaa tatgacccga cctgcaatca ggccaacgaa 720
tatcgcagcc ttgccagcaa aatcgtcaac aacaccaaaa tggtggtacc aaccccctgc 780
accatggatg aactggaaga actgctgatg gagttcggca ttatggatgt ggaagacgcc 840
agcatcattg gtaaaaccgc cgccgaagaa aacgccgtct ga 882

<210> SEQ ID NO 138
<211> LENGTH: 1449
<212> TYPE: DNA
<213> ORGANISM: Kosakonia pseudosacchari
<220> FEATURE:
<223> OTHER INFORMATION: nifD1

<400> SEQUENCE: 138
atgagcaatg caacaggcga acgtaacctg gaaatcatcg agcaggtgct ggaggttttc 60
ccggaaaaga cgcgcaaaga gcgcagaaaa cacatgatgg tgacggaccc ggagcaggag 120
agcgtcggca agtgcatcat ctctaaccgc aaatcgcagc cgggcgtgat gaccgtgcgt 180
ggctgctcgt atgccggatc aaaaggggtg gtatttgggc caatcaaaga tatggcgcat 240
atctcccacg gcccgatcgg ctgcgggcag tactcccgcg ccgggcggcg taactactat 300
accggcgtca gcggcgtgga cagtttcggc acgctcaact tcacctccga tttccaggag 360
cgcgacatcg tgtttggcgg cgacaaaaag ctcgccaaac tgattgaaga gctggaagaa 420
ctgtttccgc tgaccaaagg catttcgatt cagtcggaat gcccggtcgg cctgattggc 480
gatgatattg aagccgtggc gaacgccagc cgcaaagcga tcaacaaacc ggttattccg 540
gtgcgttgcg aaggctttcg cggcgtgtcg caatccctcg gtcaccatat tgccaacgat 600
gtgatccgcg actgggtact ggataaccgc gaaggcaaac cgtttgaatc caccccttac 660
gatgtggcga tcatcggcga ttacaacatc ggtggcgacg cctgggcctc gcgcattttg 720
ctcgaagaga tggggttgcg ggtggtcgcg cagtggtccg gcgacggtac gctggtggag 780
atggaaaaca cgccgttcgt caaactgaac ctggtgcact gctaccgctc gatgaactac 840
atctcgcgcc atatggagga gaagcacggt attccgtgga tggaatacaa cttctttggc 900
ccgacgaaaa tcgcggaatc gctgcgcaaa atcgccgacc tgttcgacga caccattcgc 960
gccaacgccg aagcggtgat cgcccgatac caggcgcaga acgacgccat tatcgccaaa 1020
tatcgcccac gtctggaggg tcgcaaagtg ttgctctata tgggcgggct gcgtccgcgc 1080
catgtgattg gcgcctatga agatctggga atggagatca tcgccgccgg ttatgagttt 1140
ggtcataacg acgattacga ccgcaccctg ccggatctga aagagggcac gctgctgttt 1200
gatgacgcca gcagctatga gctggaggcg tttgtcaacg cgctgaaacc ggatctcatc 1260
ggttccggca tcaaagagaa gtacatcttt cagaaaatgg gcgtgccgtt tcgccagatg 1320
cactcctggg attactccgg cccgtaccac ggctatgacg gcttcgccat cttcgcccgc 1380
gatatggata tgacgctcaa caaccccgcc tggggtcagt tgaccgcgcc gtggcttaaa 1440
tccgcctga 1449

<210> SEQ ID NO 139
<211> LENGTH: 1374
<212> TYPE: DNA
<213> ORGANISM: Kosakonia pseudosacchari
<220> FEATURE:
<223> OTHER INFORMATION: nifD2

<400> SEQUENCE: 139
atgaagggga acgacatcct ggctctgctc gatgaaccag cctgcgagca taaccataaa 60
cagaaaaccg gctgtagcgc gccaaaaccc ggcgccaccg ccggaggctg cgccttcgac 120

```
ggcgcacaga tcaccctgct gccactttcc gatgtggcgc atctggtaca tggcccgatt    180
ggctgcgccg gcagctcatg ggataaccgt ggcagcctga gttctggccc gctgattaac    240
cgactcggat tcaccactga tttgaacgaa caggatgtca tcatggggcg cggcgagcgg    300
cggttgtttc acgcggtgcg ccatattgtc gagcgctatc acccggcggc ggtatttatt    360
tacaacacct gcgttccggc tatggaaggc gatgacattg acgcggtctg ccaggccgcc    420
gcgaccgcca ccggtgtgcc cgtgattgcc gtagatgtgg ccggtttttta cggtagcaaa    480
aacctgggta accgcctcgc gggcgaggtg atggtgaaaa aagttatcgg cgggcgcgaa    540
cccgcgccgt ggccggacaa tacacctttt gccccggcgc accgccatga cataggcctg    600
attggcgaat ttaacatcgc cggcgagttc tggcatatcc agccgctgct tgatgagctg    660
ggtattcgcg tccttggctc cctttccggc gacgggcgct ttgccgagat ccagacgttg    720
caccgcgcgc aggtcaatat gctggtgtgc tccagggcgc tgattaatgt cgccagatcg    780
cttgaacaac gttatggcac accctggttt gaaggcagtt tttatggcgt tcgcgccacc    840
tccgatgccc tgcgccagct ggcaacactc accggcgata gcgatttaat ggcgcgaacc    900
gaacggctga tcgcacgtga agagcaagcc acagaacagg cgctagcacc gctgcgtgaa    960
cggttacacg gccggaaagt gctgctctat accggtggcg tgaaatcctg gtcggtggtt   1020
tcggcgctgc aggatctcgg catgacggtc gttgctaccg gaacgcgcaa atccaccgaa   1080
gaggataaac aacgcatccg tgaactgatg ggcgatgacg ccatcatgct ggatgaaggc   1140
aatgcccgcg ccttgctgga tgtggtctat cgctacaaag ccgacatgat gatcgcgggc   1200
gggcgcaaca tgtacaccgc ctataaagcg cgtctgccct ttctggatat caaccaggag   1260
cgtgaacacg cgtttgccgg ttatcgcggc atcatcacgc ttgccgaaca actttgtcag   1320
acgctggaaa gcccggtctg gccgcaaaca catgcccgcg ccccgtggca ataa         1374
```

```
<210> SEQ ID NO 140
<211> LENGTH: 1563
<212> TYPE: DNA
<213> ORGANISM: Kosakonia pseudosacchari
<220> FEATURE:
<223> OTHER INFORMATION: nifK1

<400> SEQUENCE: 140

atgagccaga ctgctgagaa aatacagaat tgccatcccc tgtttgaaca ggacgcctac     60
cagacactat ttgccggtaa acgggcactc gaagaggctc actcgccgga gcgggtgcag    120
gaagtgtttc aatggaccac caccccggaa tacgaagcgc tgaacttcaa acgcgaagcg    180
ctgactatcg acccggcaaa agcctgccag ccgctggggg cggtgctctg ttcgctgggg    240
tttgccaaca ccctgccgta tgtgcacggt tcacagggtt gtgtggccta tttccgtacg    300
tactttaacc gccacttcaa agaaccggtg gcctgcgtgt cggattcgat gacggaagac    360
gcggccgtgt tcggcgggaa taacaacctc aacaccgggt tacaaaacgc cagcgcactg    420
tataaaccgg agattatcgc cgtctctacc acctgtatgg cggaagtgat cggtgatgat    480
ttacaggcgt ttatcgccaa cgccaaaaaa gatggttttc tcgatgccgc catccccgtg    540
ccctacgccc acacccccag ttttatcggt agccatatca ccggctggga caacatgttt    600
gaaggttttg cccgtacctt taccgcaaac catcagccac agcccggtaa actttcacgc    660
ctgaacctgg tgaccgggtt tgaaacctat ctcggcaatt tccgcgtgct gaaacgcatg    720
atggaacaaa tggaggtgca ggcgagtgtg ctctccgatc cgtcggaggt gctggacacc    780
cccgccaatg gccattacca gatgtacgcg ggcggtacga cgcagcaaga gatgcgcgag    840
```

gcaccggatg ccatcgacac cctgctgctg caaccgtggc agctggtgaa aagcaaaaaa 900
gtggtgcagg agatgtggaa tcagcccgcc accgaggttg ccattcccgt cgggctggca 960
ggcacagacg aactgttgat ggcgattagc cagttaaccg gcaaagccat tcccgattcg 1020
ctggcgctgg agcgcgggcg gctggtcgat atgatgctcg actcccacac ctggttacac 1080
ggtaaaaaat tcggtctgtt tggcgatccg gattttgtca tgggattgac ccgcttcctg 1140
ctggaactgg gctgtgaacc tgccgtcatc ctctgccata acggtaacaa acgctggcaa 1200
aaagcgatga agaaaatgct cgatgcttca ccgtacggcc aggagagcga agtgtttatc 1260
aactgcgact tgtggcattt ccgctcgctg atgttcaccc gccagccgga ttttatgatt 1320
ggcaactcgt acgccaagtt tattcagcgc gacaccttag ccaagggcga acagtttgaa 1380
gtcccgctga tccgcctcgg ttttccgctg ttcgaccgtc accatctgca ccgccagacc 1440
acctggggct acgagggcgc gatgagcatt ctcacgacgc tggtgaatgc ggtactggag 1500
aaagtggaca aagagaccat caagctcggc aaaaccgact acagcttcga tcttatccgt 1560
taa 1563

<210> SEQ ID NO 141
<211> LENGTH: 1386
<212> TYPE: DNA
<213> ORGANISM: Kosakonia pseudosacchari
<220> FEATURE:
<223> OTHER INFORMATION: nifK2

<400> SEQUENCE: 141
atggctgata ttgttcgtag taaaaaaccg ctggcggtga gcccgataaa aagcggccag 60
ccgctggggg cgatcctggc aagcctgggt ttcgaacagt gcataccgct ggtacacggc 120
gctcaggggt gcagcgcgtt cgcgaaagtg ttctttattc aacattttca cgacccgatc 180
ccgctgcaat cgacggcgat ggacccgact tccaccatta tgggcgccga tgaaaacatt 240
tttaccgcgc tcaatgttct ctgccagcgc aacgccgcga aagccatcgt gctgctcagc 300
accgggctgt cagaagccca gggcagcgat atttcacgag tggtgcgcca gtttcgtgat 360
gactttccgc ggcataaaaa cgtggcgctg ctcaccgtca acaccccgga tttctacggc 420
tcgctggaaa acggctacag cgccgtgctg gaaagcatga ttgaacagtg ggtgcccgcg 480
cagcccgccg ccagcctgcg caaccgtcgc gtcaacctgc tggtcagcca tttactgacg 540
ccgggcgata tcgaactgtt acgcagttat gtggaagcat tcggtctgca accggtgatt 600
gtgccggatc tatcgcagtc gctggacgga catctggcca acggtgattt ttcgcccgtc 660
acccaggggg gaacaccgct gcgcatgatt gaacagatgg ggcaaaacct ggccactttt 720
gtgattggcc actcgctggg gcgggcggcg gcgttactgg cgcagcgcag ccgtggcgag 780
gtgatcgccc tgccgcatct gatgacgctt gatgcgtgcg acacctttat ccatcgcctg 840
aaaaccctct ccgggcgcga cgtgcccgcg tggattgagc gccagcgcgg gcaagtgcag 900
gatgcgatga tcgattgcca tatgtggttg cagggcgcgg ctatcgccat ggccgcagaa 960
ggcgatcacc tggcggcatg gtgcgatttc gcccgcagcc agggcatgat ccccggcccg 1020
gttgtcgcgc cggtcagcca gccggggttg caaaatctgc cggttgaaat ggtggtcatc 1080
ggcgatctgg aagatatgca ggatcggctt tgcgcgacgc ccgccgcgtt actggtggcc 1140
aattctcatg ccgccgatct cgccacgcag tttgatatgt cgcttatccg cgccgggttt 1200
ccggtgtatg accggctggg ggaatttcgt cggctgcgcc aggggtatag cggcattcgt 1260
gacacgctgt ttgagctggc gaatgtgatg cgcgaacgcc attgcccgct tgcaacctac 1320
cgctcgccgc tgcgtcagcg cttcggcgac aacgttacgc caggagatcg gtatgccgca 1380
tgttaa 1386

<210> SEQ ID NO 142
<211> LENGTH: 1488
<212> TYPE: DNA
<213> ORGANISM: Kosakonia pseudosacchari
<220> FEATURE:
<223> OTHER INFORMATION: nifL

<400> SEQUENCE: 142
atgaccctga atatgatgat ggatgccagc gcgcccgagg ccatcgccgg tgcgctttcg 60
caacaacatc ctgggctgtt ttttaccatc gttgaagaag cccccgtcgc tatttcacta 120
accgatgccg aggcacgtat tgtctatgcc aacccggcat tctgccgcca gaccggctat 180
gagcttgagg agttgttgca gcaaaatccc cgcctgcttg ccagtcagca gaccccacgg 240
gaaatctacc aggatatgtg gcacaccctg ttacaacgtc gaccatggcg cgggcaattg 300
atcaaccgcc accgtgacgg cagccttttt ctggttgaga tcgatatcac cccggtgatt 360
aacccgtttg gcgaactgga acactacctg gccatgcagc gcgatatcag cgccggttat 420
gcgctggagc agcggttgcg taatcacatg gcgctgaccg aagcggtgct gaataacatt 480
ccggcggcgg tggtcgtggt cgatgaacgc gatcgtgtgg ttatggataa cctcgcctat 540
aaaactttct gtgctgattg cggcggaaaa gagctactga gcgaactcca tttttcagcc 600
cgtaaagcgg agctggcaaa cggccaggtc ttaccggtgg tgctgcgcgg cgcggtgcgc 660
tggttgtcgg tcacctgctg ggcgctgcca ggcgtcagcg aagaagccag tcgctacttt 720
attgataata ccttgacgcg cacgctggtg gtcatcaccg acgacaccca gcagcgccag 780
cagcaagagc aaggacggct tgaccgcctt aaacagcaga tgaccagcgg caaactgctg 840
gcggcgatcc gcgaagcgct tgacgccgcg ctgatccagc ttaactgccc catcaatatg 900
ctggcggcgg cgcggcgttt aaacggcagt gataacagca acgtagcgct ggacgccgcg 960
tggcgcgaag gtgaagaagc gatggcgcgg ctgaaacggt gccgcccgtc gctggagctg 1020
gaaagtgccg ccgtctggcc gctgcaaccc ttttttgacg acttgcgcgc gctttatcac 1080
acccgctacg agcagggtaa aaatttgcag gtcacgctgg attcgacgca tctggtggga 1140
tttggtcagc gaacccaact gctggcctgc ctgagtctgt ggctcgatcg cacgctggat 1200
attgccgtcg ggctgcgtga tttcaccgcc caaacgcaga tttacgcccg ggaagaagcg 1260
ggctggctct cgttgtatat cactgacaat gtgccgttga ttccgctgcg ccatacccat 1320
tcgccggatg cgcttaacgc accgggaaaa ggtatggagt tgcggctgat ccagacgctg 1380
gtagcgcatc acaacggcgc gatagaactc acttcacgcc ccgaaggggg aagctgcctg 1440
accctacgat tcccgctatt tcattcactg accggaggtt caaaatga 1488

<210> SEQ ID NO 143
<211> LENGTH: 1575
<212> TYPE: DNA
<213> ORGANISM: Kosakonia pseudosacchari
<220> FEATURE:
<223> OTHER INFORMATION: nifA

<400> SEQUENCE: 143
atgacccagc gaaccgagtc gggtaatacc gtctggcgct tcgatttatc ccagcagttc 60
accgcgatgc agcggataag cgtggttctc agccgggcga ccgaggttga acagacactc 120

```
cagcaggtgc tgtgcgtatt gcacaatgac gcctttttgc agcacggcat gatctgtctg    180
tacgacagcc agcaggcgat tttgactatt gaagcgttgc aggaagccga tcagcagttg    240
atccccggca gctcgcaaat tcgctaccgt ccgggtgaag ggctggtcgg gacggtgctt    300
tcgcaggggc aatcgttagt gctggcgcgt gtggctgacg atcagcgctt tcttgaccgc    360
ctgggactgt atgattacaa cctgccgttt atcgccgtgc cgctgatagg gccggatgcg    420
cagacttttg gcgtgctgac ggcgcaaccg atggcgcgtt acgaagagcg gttacccgcc    480
tgcacccgct ttctggaaac ggtcgcgaat ctggtggcgc agaccgtgcg tttgatgacg    540
ccgccggctg cacgcccttc cccacgcgct gccatcacgc caaccgccag cccgaaatcg    600
tgcagtactt cacgcgcgtt cggcttcgaa aatatggtcg gcaacagccc ggcaatgcgc    660
cagaccatgg agattatccg tcaggtttcg cgctgggata ccaccgttct ggtgcgcggc    720
gagagcggca ccggcaagga actgattgcc aacgccatcc atcacaattc gccgcgcgcc    780
agtgcgccat ttgtgaaatt caactgtgcg gcgctgccgg acacattgct tgaaagcgaa    840
ttatttggtc atgaaaaagg cgcctttacc ggcgcggtac gccagcgtaa aggccgtttt    900
gagctggccg atggcggcac gctgtttctt gacgaaattg gggaaagcag cgcctcgttt    960
caggctaagc tgctgcgtat tttgcaggag ggcgaaatgg aacgcgtcgg tggtgacgag   1020
acattgcaag tgaatgtgcg catcattgcc gcgacgaacc gcaaccttga agatgaagta   1080
cgcctgggac attttcgcga agatctctat taccgcctga atgtgatgcc catcgccctg   1140
ccgccgctgc gcgaacgcca ggacgacatc gccgaactgg cacattttct ggtgcgtaaa   1200
atcgcccaca accagaaccg cacgctgcgc attagcgagg gcgctatccg cctgctgatg   1260
agctacagct ggcccggcaa tgtgcgcgaa ctggaaaact gccttgagcg ctctgcggtg   1320
atgtcggaaa acggtctgat cgatcgggac gtgattttat ttaatcatcg cgaccagcca   1380
gccaaaccgc cggttatcag cgtcacgccc gacgataact ggctcgataa cacccttgac   1440
gagcgccagc ggctgattgc cgcgctggaa aaagcgggat gggtacaagc caaagccgcc   1500
cgcttgctgg ggatgacgcc gcgccaggtc gcttatcgta ttcagaccat ggatatcacc   1560
ctgccaaggc tataa                                                    1575
```

<210> SEQ ID NO 144
<211> LENGTH: 2850
<212> TYPE: DNA
<213> ORGANISM: Kosakonia pseudosacchari
<220> FEATURE:
<223> OTHER INFORMATION: glnE

<400> SEQUENCE: 144

```
atgccgcacc acgcaggatt gtcgcagcac tggcaaacgg tttttctcg tctgccggaa      60
gcgctcaccg cgcaaccatt gagcgcgcag gcgcagtcag tgctcacttt tagtgatttt    120
gttcaggaca gcatcatcgt gcatcctgag tggctggcag agcttgaaag cgcaccgccg    180
ccagcgaacg agtggcaaca ctacgcgcaa tggctgcaag cggcgctgga gggcgtcacc    240
gatgaaacct cgctgatgcg cacgctgcgg ctgtttcgcc gtcgcattat ggtgcgcatc    300
gcctggagtc aggcgctaca gttggtggcg gaagaggata tcctgcaaca gctcagcgtg    360
ctggcggaaa ctctgatcgt cgccgcgcgc gactggctct atgacgcctg ctgccgtgag    420
tggggaacgc cgtgcaatcc gcaaggcgtc gcgcagccga tgctggtgct cggcatgggc    480
aaacttggcg gcggcgaact caatttctca tccgatatcg atttgatttt tgcctggccg    540
```

```
gaaaatggca ccacgcgcgg cggacgccgt gaactggata acgcgcagtt ttttacccgc    600
cttggtcaac ggctaattaa agtcctcgac cagcccacgc aggatggctt tgtctaccgc    660
gtcgatatgc gcttgcgtcc ctttggcgac agcggcccgc tggtgctgag ttttgccgcg    720
ctggaagatt actaccagga gcaggggcgc gactgggaac gatacgcgat ggtgaaagcg    780
cgcattatgg gggacaacga cggcgaccat gcgcgagagt tgcgcgccat gctgcgcccg    840
ttcgttttcc gccgctatat cgacttcagc gtgatccagt ctctgcgcaa catgaaaggc    900
atgattgccc gcgaagtgcg gcgtcgcggc ctgaaggaca acataaaact cggcgcgggc    960
ggtattcgcg aaatagagtt tatcgtgcag gttttccagt tgattcgcgg cggtcgcgag   1020
cctgcgctgc aatcgcgttc gctgttgccg acgcttgctg ccattgatca actacatctg   1080
ctgccggatg gtgatgcacc ccggctgcgc gaggcgtatt tgtggctgcg acggctggaa   1140
aacttgctgc aaagcattaa tgacgaacag acacagacgc tgccggccga tgatttgaat   1200
cgcgcgcgcc tcgcctgggg aatgggcaaa gagagctggg aagcgctctg cgaaacgctg   1260
gaagcgcata tgtcggcggt gcggcagatt ttcaacgatc tgattggcga tgatgaaacg   1320
gattcgccgg aagatgcgct ttctgagggc tggcgcgaat tgtggcagga tgcgttgcag   1380
gaagaggact ctacgcccgt gctggcgcat ctttccgagg acgatcgccg ccgcgtggtg   1440
gcgctgattg ctgattttcg caaagagctg gataaacgca ccattggccc gcgcgggcga   1500
caggtactcg atcacttaat gccgcatctg ctcagcgatg tatgctcgcg tgacgatgcg   1560
ccagtgccgc tgtcgcgtct gacgccgctg ctcaccggta ttattacgcg caccacttac   1620
cttgagctgc tgagtgaatt ccccggtgcg ctgaaacacc tcatttccct gtgcgccgcg   1680
tcgccgatgg tggccagcca actggcgcgc tacccgatcc tgctcgatga actgctcgac   1740
ccgaacacgc tctatcaacc gacggcgatg aacgcctatc gcgatgaact gcgacaatac   1800
ctgttgcgcg tgccggaaga ggatgaagag cagcaactgg aggcgctacg gcagtttaag   1860
caggcgcagt tgttgcgcgt agcggcggcg gatatcgccg gtacgttacc cgtcatgaaa   1920
gtgagcgatc acttaacctg gctggcggaa gcgattatcg atgcggtggt gcagcaagcc   1980
tggaaccaga tggtggcgcg ttacggccag ccgacgcatc tgcacgatcg cgaagggcgc   2040
ggtttcgccg tggtcggtta cggcaaactt ggcggctggg aattaggtta cagctccgat   2100
ctggatctgg tgttcctgca cgactgcccc atggatgtga tgaccgatgg cgagcgtgaa   2160
atcgatggcc gccagttcta tttgcgcctc gcgcagcgcg tgatgcacct gttcagcacg   2220
cgcacgtcgt ccggcattct ttatgaagtc gatgcgcgtt tgcgcccgtc cggcgcggcc   2280
ggaatgctgg tgaccactgc ggaagcgttc gccgattatc aaaaaaatga agcctggaca   2340
tgggagcatc aggcgctggc gcgtgcgcgc gtggtgtacg gcgatccgca actgaccgcc   2400
gaatttgacg ccattcgccg cgatatcctg atgacctccc gcgatgccgc taccctgcaa   2460
accgaagtgc gggaaatgcg tgagaaaatg cgcgcccatc ttggtaacaa gcacaaagac   2520
cgtttcgatc tgaaagccga tgaaggcggt atcaccgata ttgagtttat cgctcagtat   2580
ctggtgctgc gctttgccca tgagaagccg aaactgacgc gctggtcgga taatgtgcgc   2640
atcctcgaag ggctggcgca aaacggcatc atggatgagc aggaagcgca ggcattgacg   2700
ctggcgtaca ccacgttgcg tgatgagctg caccacctgg cgctgcaaga gctgccagga   2760
catgtggcgc tctcctgttt tgtcgccgag cgtgcgctta tcaaaaccag ctgggacaag   2820
tggctggtgg aaccgtgcgc cccggcgtaa                                    2850
```

<210> SEQ ID NO 145
<211> LENGTH: 1287
<212> TYPE: DNA
<213> ORGANISM: Kosakonia pseudosacchari
<220> FEATURE:
<223> OTHER INFORMATION: amtB

<400> SEQUENCE: 145
atgaaaaaca caacattaaa aacggctctt gcttcgctgg cgttgctgcc aggcctggcg 60
atggcggctc ccgctgtggc ggataaagcc gacaacggct ttatgatgat ttgcaccgcg 120
ctggtgctgt ttatgaccat tccgggcatt gcgctgttct acggcggttt gatccgcggt 180
aaaaacgtgc tgtcgatgct gacgcaggtt gccgtcacct tcgctctggt gtgcatcctg 240
tgggtggttt acggctactc tctggcattt ggcgagggca acagcttctt cggcagtttc 300
aactgggcga tgttgaaaaa catcgaattg aaagccgtga tgggcagcat ttatcagtac 360
atccacgtgg cgttccaggg ctcctttgct tgtatcaccg ttggcctgat tgtcggtgcg 420
ctggctgagc gtattcgctt ctctgcggtg ctgatttttg tggtggtatg gctgacgctt 480
tcttatgtgc cgattgcgca catggtctgg ggtggcggtc tgctggcaac ccacggcgcg 540
ctggatttcg cgggcggtac ggttgttcac atcaacgccg cgatcgcagg tctggtgggg 600
gcttacctga ttggcaaacg cgtgggcttt ggcaaagaag cgttcaaacc gcataacctg 660
ccgatggtct tcaccggcac cgcgatcctc tatgttggct ggtttggctt caacgccggc 720
tctgcaagct cggcgaacga aatcgctgcg ctggctttcg tgaacacggt tgttgccact 780
gcggccgcta ttctggcgtg ggtatttggc gagtgggcaa tgcgcggtaa gccgtctctg 840
ctcggtgcct gttctggtgc catcgcgggt ctggttggta tcaccccggc gtgcggttat 900
gtgggtgtcg gcggcgcgct gattgtgggt ctgattgccg gtctggcagg gctgtggggc 960
gttactgcac tgaaacgtat gttgcgtgtt gatgacccat gcgatgtctt cggtgtgcac 1020
ggcgtgtgcg gcatcgtggg ttgtatcctg accggtatct tcgcgtctac gtcgctgggc 1080
ggtgtcggtt tcgctgaagg ggtgaccatg ggccatcagg tactggtaca gctggaaagc 1140
gttgccatca ctatcgtgtg gtctggcgtg gtggccttta tcggttacaa actggcggat 1200
atgacggtag gcctgcgcgt accggaagag caagagcgtg aagggctgga tgtgaacagc 1260
cacggcgaaa atgcgtataa cgcctga 1287

<210> SEQ ID NO 146
<211> LENGTH: 500
<212> TYPE: DNA
<213> ORGANISM: Kosakonia pseudosacchari
<220> FEATURE:
<223> OTHER INFORMATION: PinfC

<400> SEQUENCE: 146
ttcttggttc tctggagcgc tttatcggca tcctgactga agaatttgca ggcttcttcc 60
caacctggct tgcacccgtg caggtagttg tgatgaacat cactgattcg caggctgaat 120
acgttaacga attgacccgt aaactgcaaa atgcgggcat tcgtgtaaaa gcagacttga 180
gaaacgagaa gattggcttt aaaatccgcg agcacacttt acgtcgtgtc ccttatatgc 240
tggtttgtgg tgacaaagag gtcgaagccg gcaaagttgc tgtgcgtacc cgtcgcggta 300
aagacctggg tagcctggac gtaaatgatg ttatcgagaa gctgcaacaa gagattcgca 360
gccgcagtct tcaacaactg gaggaataag gtattaaagg cggaaaacga gttcaaacgg 420
cgcgtcccaa tcgtattaat ggcgagattc gcgccacgga agttcgctta acaggtctgg 480
aaggcgagca gcttggtatt 500

<210> SEQ ID NO 147
<211> LENGTH: 348
<212> TYPE: DNA
<213> ORGANISM: Kosakonia pseudosacchari
<220> FEATURE:
<223> OTHER INFORMATION: Prm1

<400> SEQUENCE: 147
cgttctgtaa taataaccgg acaattcgga ctgattaaaa aagcgccctc gcggcgcttt 60
ttttatattc tcgactccat ttaaaataaa aaatccaatc ggatttcact atttaaactg 120
gccattatct aagatgaatc cgatggaagc tcgctgtttt aacacgcgtt ttttaacctt 180
ttattgaaag tcggtgcttc tttgagcgaa cgatcaaatt taagtggatt cccatcaaaa 240
aaatattctc aacctaaaaa agtttgtgta atacttgtaa cgctacatgg agattaactc 300
aatctagagg gtattaataa tgaatcgtac taaactggta ctgggcgc 348

<210> SEQ ID NO 148
<211> LENGTH: 339
<212> TYPE: DNA
<213> ORGANISM: Kosakonia pseudosacchari
<220> FEATURE:
<223> OTHER INFORMATION: Prm7

<400> SEQUENCE: 148
cgcgtcaggt tgaacgtaaa aaagtcggtc tgcgcaaagc acgtcgtcgt ccgcagttct 60
ccaaacgtta attggtttct gcttcggcag aacgattggc gaaaaaaccc ggtgcgaacc 120
gggttttttt atggataaag atcgtgttat ccacagcaat ccattgatta tctcttcttt 180
ttcagcattt ccagaatccc ctcaccacaa agcccgcaaa atctggtaaa ctatcatcca 240
attttctgcc caaatggctg ggattgttca ttttttgttt gccttacaac gagagtgaca 300
gtacgcgcgg gtagttaact caacatctga ccggtcgat 339

<210> SEQ ID NO 149
<211> LENGTH: 1538
<212> TYPE: DNA
<213> ORGANISM: Enterobacter sp.
<220> FEATURE:
<223> OTHER INFORMATION: 16S
<220> FEATURE:
<221> NAME/KEY: misc_feature
<222> LOCATION: (62)..(62)
<223> OTHER INFORMATION: n is a, c, t, g, unknown or other
<220> FEATURE:
<221> NAME/KEY: misc_feature
<222> LOCATION: (265)..(265)
<223> OTHER INFORMATION: n is a, c, t, g, unknown or other
<220> FEATURE:
<221> NAME/KEY: misc_feature
<222> LOCATION: (457)..(457)
<223> OTHER INFORMATION: n is a, c, t, g, unknown or other
<220> FEATURE:
<221> NAME/KEY: misc_feature
<222> LOCATION: (469)..(469)
<223> OTHER INFORMATION: n is a, c, t, g, unknown or other
<220> FEATURE:
<221> NAME/KEY: misc_feature
<222> LOCATION: (539)..(539)
<223> OTHER INFORMATION: n is a, c, t, g, unknown or other
<220> FEATURE:
<221> NAME/KEY: misc_feature
<222> LOCATION: (551)..(552)
<223> OTHER INFORMATION: n is a, c, t, g, unknown or other
<220> FEATURE:
<221> NAME/KEY: misc_feature
<222> LOCATION: (559)..(559)
<223> OTHER INFORMATION: n is a, c, t, g, unknown or other
<220> FEATURE:
<221> NAME/KEY: misc_feature
<222> LOCATION: (561)..(561)
<223> OTHER INFORMATION: n is a, c, t, g, unknown or other
<220> FEATURE:
<221> NAME/KEY: misc_feature
<222> LOCATION: (576)..(576)
<223> OTHER INFORMATION: n is a, c, t, g, unknown or other
<220> FEATURE:
<221> NAME/KEY: misc_feature
<222> LOCATION: (587)..(587)
<223> OTHER INFORMATION: n is a, c, t, g, unknown or other
<220> FEATURE:
<221> NAME/KEY: misc_feature
<222> LOCATION: (591)..(591)
<223> OTHER INFORMATION: n is a, c, t, g, unknown or other
<220> FEATURE:
<221> NAME/KEY: misc_feature
<222> LOCATION: (655)..(657)
<223> OTHER INFORMATION: n is a, c, t, g, unknown or other
<220> FEATURE:
<221> NAME/KEY: misc_feature
<222> LOCATION: (665)..(665)
<223> OTHER INFORMATION: n is a, c, t, g, unknown or other
<220> FEATURE:
<221> NAME/KEY: misc_feature
<222> LOCATION: (678)..(678)
<223> OTHER INFORMATION: n is a, c, t, g, unknown or other
<220> FEATURE:
<221> NAME/KEY: misc_feature
<222> LOCATION: (706)..(706)
<223> OTHER INFORMATION: n is a, c, t, g, unknown or other
<220> FEATURE:
<221> NAME/KEY: misc_feature
<222> LOCATION: (710)..(710)
<223> OTHER INFORMATION: n is a, c, t, g, unknown or other
<220> FEATURE:
<221> NAME/KEY: misc_feature
<222> LOCATION: (714)..(714)
<223> OTHER INFORMATION: n is a, c, t, g, unknown or other
<220> FEATURE:
<221> NAME/KEY: misc_feature
<222> LOCATION: (718)..(718)
<223> OTHER INFORMATION: n is a, c, t, g, unknown or other
<220> FEATURE:
<221> NAME/KEY: misc_feature
<222> LOCATION: (735)..(735)
<223> OTHER INFORMATION: n is a, c, t, g, unknown or other
<220> FEATURE:
<221> NAME/KEY: misc_feature
<222> LOCATION: (755)..(755)
<223> OTHER INFORMATION: n is a, c, t, g, unknown or other
<220> FEATURE:
<221> NAME/KEY: misc_feature
<222> LOCATION: (759)..(759)
<223> OTHER INFORMATION: n is a, c, t, g, unknown or other
<220> FEATURE:
<221> NAME/KEY: misc_feature
<222> LOCATION: (796)..(796)
<223> OTHER INFORMATION: n is a, c, t, g, unknown or other
<220> FEATURE:
<221> NAME/KEY: misc_feature
<222> LOCATION: (1006)..(1007)
<223> OTHER INFORMATION: n is a, c, t, g, unknown or other
<220> FEATURE:
<221> NAME/KEY: misc_feature
<222> LOCATION: (1016)..(1017)
<223> OTHER INFORMATION: n is a, c, t, g, unknown or other
<220> FEATURE:
<221> NAME/KEY: misc_feature
<222> LOCATION: (1133)..(1133)
<223> OTHER INFORMATION: n is a, c, t, g, unknown or other

<400> SEQUENCE: 149
ttgaagagtt tgatcatggc tcagattgaa cgctggcggc aggcctaaca catgcaagtc 60

```
gngcggaagc acaggagagc ttgctctctg ggtgacgagc ggcggacggg tgagtaatgt    120
ctgggaaact gcctgatgga gggggataac tactggaaac ggtagctaat accgcataac    180
gtcgcaagac caaagagggg gaccttcggg cctcttgcca tcagatgtgc ccagatggga    240
ttagctagta ggtggggtaa cggcncacct aggcgacgat ccctagctgg tctgagagga    300
tgaccagcca cactggaact gagacacggt ccagactcct acgggaggca gcagtgggga    360
atattgcaca atgggcgcaa gcctgatgca gccatgccgc gtgtatgaag aaggccttcg    420
ggttgtaaag tactttcagc ggggaggaag gtgttgnggt taataaccnc agcaattgac    480
gttacccgca gaagaagcac cggctaactc cgtgccagca gccgcggtaa tacggaggnt    540
gcaagcgtta nncggaatna ntgggcgtaa agcgtncgca ggcggtntgt naagtcggat    600
gtgaaatccc cgggctcaac ctgggaactg cattcgaaac tggcaggcta gagtnnngta    660
gaggngggta gaattccngg tgtagcggtg aaatgcgtag agatcnggan gaanaccngt    720
ggcgaaggcg gcccnctgga caaagactga cgctnaggng cgaaagcgtg gggagcaaac    780
aggattagat accctngtag tccacgccgt aaacgatgtc gacttggagg ttgtgccctt    840
gaggcgtggc ttccggagct aacgcgttaa gtcgaccgcc tggggagtac ggccgcaagg    900
ttaaaactca aatgaattga cgggggcccg cacaagcggt ggagcatgtg gtttaattcg    960
atgcaacgcg aagaacctta cctactcttg acatccagag aacttnncag agatgnnttg   1020
gtgccttcgg gaactctgag acaggtgctg catggctgtc gtcagctcgt gttgtgaaat   1080
gttgggttaa gtcccgcaac gagcgcaacc cttatccttt gttgccagcg gtncggccgg   1140
gaactcaaag gagactgcca gtgataaact ggaggaaggt ggggatgacg tcaagtcatc   1200
atggccctta cgagtagggc tacacacgtg ctacaatggc gcatacaaag agaagcgacc   1260
tcgcgagagc aagcggacct cataaagtgc gtcgtagtcc ggattggagt ctgcaactcg   1320
actccatgaa gtcggaatcg ctagtaatcg tagatcagaa tgctacggtg aatacgttcc   1380
cgggccttgt acacaccgcc cgtcacacca tgggagtggg ttgcaaaaga agtaggtagc   1440
ttaaccttcg ggagggcgct taccactttg tgattcatga ctggggtgaa gtcgtaacaa   1500
ggtaaccgta ggggaacctg cggttggatc acctcctt                            1538
```

<210> SEQ ID NO 150
<211> LENGTH: 882
<212> TYPE: DNA
<213> ORGANISM: Enterobacter sp.
<220> FEATURE:
<223> OTHER INFORMATION: nifH

<400> SEQUENCE: 150

```
atgaccatgc gtcaatgtgc catttacggc aaaggtggta tcggtaaatc cactaccacg     60
caaaacctgg tcgccgcgct ggcggagatg ggcaagaaag taatgatcgt cggctgcgac    120
ccgaaagcag actccactcg tctgatcctg catgcgaaag cgcagaacac cattatggag    180
atggcggctg aagtcggctc cgtggaagac cttgaactgg aagatgtgct gcaaatcggt    240
tacggcgacg tacgctgcgc agaatccggc ggcccggaac caggcgttgg ctgtgctggt    300
cgcggggtaa ttaccgccat caacttcctg gaagaagaag gcgcctatgt tcccgacctc    360
gatttcgtct tttacgacgt gttgggcgac gtggtgtgcg gggggttcgc catgccgatt    420
cgcgaaaaca aagcgcagga gatctacatc gtctgctccg gcgaaatgat ggcgatgtac    480
gccgccaaca acatctctaa aggcatcgtg aaatacgcca aatccggcaa agtgcgcctt    540
ggcgggctga tctgtaactc ccgtcagacc gaccgcgaag atgagctgat catagcgctg    600
```

gcggaaaaac tcggcaccca gatgatccac ttcgtgccgc gcgacaacat cgtgcaacgc 660
gctgaaatcc gccgtatgac ggtgattgag tacgatccga aatgcaacca ggccaatgaa 720
taccgcacgc tggcgaacaa gatcgtcaac aacaccaaaa tggtcgtgcc aacgcccatc 780
accatggacg aactggaaga gctgttgatg gaattcggca ttatggatgt ggaagacacc 840
agcattatcg gtaaaaccgc cgcagaagaa aacgcggttt ga 882

<210> SEQ ID NO 151
<211> LENGTH: 1449
<212> TYPE: DNA
<213> ORGANISM: Enterobacter sp.
<220> FEATURE:
<223> OTHER INFORMATION: nifD1

<400> SEQUENCE: 151
atgagcaatg caacaggcga acgtaatctg gagatcatcc aggaagtgct ggagatcttt 60
ccggaaaaaa cgcgcaaaga acgcagaaag cacatgatgg tgagcgaccc ggagatggaa 120
agcgtcggga aatgcatcat ctccaaccgt aagtcgcagc ccggcgtaat gaccgtgcgc 180
ggttgctctt acgccggttc taaaggggtg gtattcgggc cgatcaaaga tatggcccat 240
atttcccacg gcccggtcgg ctgcggtcag tactcccgcg ccgggcggcg taactactac 300
accggcgtca gcggtgtgga tagcttcggt acgctcaact ttacctccga ttttcaggag 360
cgcgatatcg tgtttggcgg cgataaaaag ctgaccaaac tgattgaaga gatggagacg 420
ctgttcccgc tgaccaaagg gatctccatt cagtccgaat gcccggtcgg cctgattggc 480
gacgacattg aagccgttgc caacgccagc cgcaaagcca tcaataaacc ggtcattccg 540
gtgcgctgcg aaggttttcg cggcgtttcc cagtcactcg gtcaccacat tgccaacgac 600
gtgatccgcg actgggtact ggataaccgc gaaggcaagc cgtttgaggc cggtccttat 660
gacgtggcga tcatcggcga ttacaacatc ggcggcgatg cctgggcgtc gcgcattttg 720
ctcgaagaga tgggcctgcg cgtggtggcg cagtggtccg gcgacggcac gctggttgag 780
atggagaaca cgccgttcgt caaactcaac cttgtgcact gctaccgctc aatgaactat 840
atctcccgcc atatggagga gaaacacggt attccgtgga tggagtacaa cttcttcggt 900
ccgaccaaag tcgccgaatc gttgcgcaaa atcgccgata tgtttgatga caccattcgc 960
gccaacgccg aagcggtgat cgccaaatat caggcgcaga acgacgccat catcgccaaa 1020
taccgtccgc gtctggaagg ccgcaaagtg ctgctgtata tgggcggttt acgtcctcgc 1080
catgtgattg gcgcttatga agatctgggg atggaaatta tcgctgcggg ttatgaattc 1140
gcccacaacg atgactacga ccgcaccctg ccggatctga aagaaggcac cttgctgttc 1200
gacgatgcca gcagttatga actggaagcc tttgtcaaag cgctgaagcc ggatctgatc 1260
ggctccggca ttaaagagaa gtacatcttc cagaaaatgg gcgtgccgtt tcgccagatg 1320
cactcctggg attactccgg cccctatcac ggttatgacg gctttgccat cttcgcccgc 1380
gatatggata tgacgatcaa caaccccgcg tggggccagt tgaccgcgcc gtggctgaaa 1440
tccgcctga 1449

<210> SEQ ID NO 152
<211> LENGTH: 1092
<212> TYPE: DNA
<213> ORGANISM: Enterobacter sp.
<220> FEATURE:
<223> OTHER INFORMATION: nifD2
<220> FEATURE:

<221> NAME/KEY: misc_feature
<222> LOCATION: (709)..(709)
<223> OTHER INFORMATION: n is a, c, t, g, unknown or other

<400> SEQUENCE: 152
atgggacgcg gcgagcgccg cctgttccat gccgtgcgcc acatcgtcaa ccgctaccac 60
ccggccgccg tctttatcta taacacctgc gttcccgcga tggagggcga cgatatcgaa 120
gccgtctgcc aggcggcaga aaccgccatc ggcgtaccgg tgattgccgt tgatgtcgcc 180
gggttttacg gcagcaaaaa tctcggcaac cggttggccg gtgaagtgat ggtgaaaaag 240
gtgattggcg ggcgtgaacc cgcgccgtgg ccggaagata cccctttttgc cccggcgcac 300 cgccacgata tcgggctgat tggcgaattc aatattgccg gagagttctg gcatattcag 360
ccgctgctcg atgagctggg tattcgcgtg ctcggcagcc tctccggcga cgggcgcttc 420
agtgaaatcc agacgctgca ccgggcgcag gtcaatatgc tggtctgctc cagggcgctg 480
atcaacgtcg cccgctcgct ggagcagcgc tacggcacgc cgtggtttga aggcagtttt 540
tatggtgttc gcgccacctc tgacgccctg cgccaactgg cggcgctgac cggagaccgc 600
gatctgatgc agcgcaccga acagctcatt gcccgcgaag agcagcaaac agagcaggcg 660
ctggccccgc tgcgcgagcg cctgcgcggg cgcaaagcgc tgctctatnc cggcggcgtg 720
aaatcctggt cggtggtttc ggcgcttcag gatctgggca tggaagtggt ggcgaccggc 780
acgcgcaaat ccaccgaaga ggataaacag cgcatccgcg aactgatggg cgccgacgcg 840
ctgatgcttg atgaaggtaa cgcccgctcg ctgctggacg tggtttaccg ctacaaggcg 900
gacatgatga tcgccggggg acgcaatatg tacaccgcct acaaagcgcg gctgccgttc 960
ctcgatatca atcaggagcg cgagcacgcc tttgccggct accgcggcat tgtcaccctg 1020
gccgaacagc tctgcctgac catggaaagc ccggtctggc cgcaaaccca ttcccgcgca 1080
ccgtggcaat aa 1092

<210> SEQ ID NO 153
<211> LENGTH: 846
<212> TYPE: DNA
<213> ORGANISM: Enterobacter sp.
<220> FEATURE:
<223> OTHER INFORMATION: nifK

<400> SEQUENCE: 153
atgatggagc aaatggacgt gccgtgcagc ctgctttccg atccctccga agtgctggat 60
accccggctg acgggcatta ccacatgtat gcgggcggta cgacccagca ggagatgcgc 120
gaagcgcctg acgctatcga caccctgctg ctgcaaccct ggcaactggt gaaaaccaaa 180
aaagtggtgc aggaaagctg gaaccagccc gctaccgagg tgcaaatccc aatggggctg 240
gccggaaccg acgagctgct gatgacggta agccagttaa ccggcaaagc cattccggat 300
agcttagcgc tggaacgcgg tcggctggtg gatatgatgc tcgactccca cacctggctg 360
cacggcaaga aattcggcct gttcggtgac ccggattttg tcatggggct gacccgcttc 420
ctgctggaac tgggctgcga accgacggtg attctgtgcc ataacggcag caagcgctgg 480
cagaaagcga tgaagaaaat gcttgaagcc tcgccgtacg ggaaagagag cgaagtcttt 540
atcaactgcg atttgtggca tttccgctcg ctgatgttta cccgtcagcc ggactttatg 600
atcggcaact cctacgccaa gtttatccag cgcgatacgc tggcgaaggg tgagcagttt 660
gaagtgccgc tgatccgcct ggggttcccg ctgttcgatc gccaccatct gcaccgccag 720
accacctggg gttacgaagg ggccatgagt atcctcacca cgctggttaa tgcggtgctg 780
gagaaagtcg acagagagac catcaagctc ggcaaaaccg actacagctt cgatcttatc 840
cgttaa 846

<210> SEQ ID NO 154
<211> LENGTH: 1095
<212> TYPE: DNA
<213> ORGANISM: Enterobacter sp.
<220> FEATURE:
<223> OTHER INFORMATION: nifL
<220> FEATURE:
<221> NAME/KEY: misc_feature
<222> LOCATION: (942)..(942)
<223> OTHER INFORMATION: n is a, c, t, g, unknown or other

<400> SEQUENCE: 154
atgcagcgcg acatcagcac cagctacgcg ctggaacaac ggctgcgcaa tcatatgacg 60
ctgaccgaag ccgtcttgaa taacattccg gcggcggttg tagtggtgga tgaacgcgat 120
cgggtggtga tggataacct cgcctacaaa accttttgcg ccgattgcgg cggtaaagaa 180
ctactcaccg aaatcaactt ttccgcccat aaggcggagc tggcgcaggg cctggtactg 240
ccggtagtgc tgcgcggcac cgtgcgctgg ttgtccgtta cctgttgggc gctgccgggc 300
gtcagcgaag aagcaggccg ctactttatt gatagcgccg tgccgcgcac gctggtggtg 360
atcaccgata atactcagca gcagcaacaa caggagcagg ggcgtcttga tcgtctgaag 420
cagcagataa ccagcggtaa attgctggcg gcgatccgcg aatcgctgga cgccgcgctg 480
gtacaactca attgcccaat taatatgctg gccgccgcac gccgcttaaa tggcgacgag 540
catagcaatc tggcgctgga tgccgcatgg cgtgaaggcg aagaagcgat ggcgcggttg 600
cagcgctgcc gcccgtcgct ggaactggaa agcccggcag tctggccgct ccagccgttc 660
cttgacgatc tgcgtgccct gtatcacacc cgatataacc agggcgaaaa cctgcaaatt 720
gagctggaat cccccgacct ggtgggcttt ggccagcgaa cacaactgct tgcctgcctg 780
agcctgtggc tcgacagaac cctggatatt gccgcggagc tacgtgattt cacggtacag 840
actcaacttt acgcccgcga agagagcggc tggctgtcgt tctatttaaa cgacaatgtg 900
ccgctgattc aggtgcgcta cacccattca cccgatgcac tnaatgcgcc cggtaaaggc 960
atggagctgc ggctgatcca gacgctggtc gcccaccatc gaggcgcaat agaactgacc 1020
tcacgccctc agggaggcac ctgtctgatc ctgcgtttcc cattatttta ctcgctgaca 1080
ggaggctcac tatga 1095

<210> SEQ ID NO 155
<211> LENGTH: 219
<212> TYPE: DNA
<213> ORGANISM: Enterobacter sp.
<220> FEATURE:
<223> OTHER INFORMATION: nifA partial gene

<400> SEQUENCE: 155
atgactcagc gaaccgagtc gggtacaacc gtctggcgct ttgacctctc ccaacagttt 60
acagccatgc agcgtatcag tgtggtgtta agccgcgcga cggagatcgg gcagacgcta 120
caggaagtgc tgtgcgtgct gcacaacgat gcctttatgc agcacgggat gatctgtccg 180
tacgcgcggg tgcgcgtctt cgcgagcgta tggctttga 219

<210> SEQ ID NO 156
<211> LENGTH: 1635
<212> TYPE: DNA

<213> ORGANISM: Enterobacter sp.
<220> FEATURE:
<223> OTHER INFORMATION: glnE
<220> FEATURE:
<221> NAME/KEY: misc_feature
<222> LOCATION: (234)..(234)
<223> OTHER INFORMATION: n is a, c, t, g, unknown or other
<220> FEATURE:
<221> NAME/KEY: misc_feature
<222> LOCATION: (274)..(274)
<223> OTHER INFORMATION: n is a, c, t, g, unknown or other
<220> FEATURE:
<221> NAME/KEY: misc_feature
<222> LOCATION: (1535)..(1535)
<223> OTHER INFORMATION: n is a, c, t, g, unknown or other

<400> SEQUENCE: 156
atgcgcgtgg aagactggtc aacgctgacc gaacggctcg atgcccatat ggcaggcgtg 60
cgccgaatct ttaacgaact gatcggtgat gacgaaagtg agtcgcagga cgatgcgctc 120
tccgagcact ggcgcgagct gtggcaggac gcgcttcagg aagatgacac cacgccggtg 180
ctgacgcact taaccgacga cgcgcgccat cgcgtggtgg cgctgatcgc tganttccgt 240
cttgagctga acaaacgcgc catcggcccg cgtngtcgcc aggtgctgga tcacctgatg 300
ccgcacctgc tgagcgaagt ctgctcgcgt gccgatgcgc cggtgccgct gtcgcggatg 360
atgcccctgc tgagcgggat tatcacccgt actacctacc ttgaactcct gagcgagttc 420
cctggcgcgc ttaagcacct gatttcactc tgcgccgcgt cgccgatggt ggccaacaag 480
ctggcgcgtt acccgctgct gctggatgag ctgctcgatc cgaataccct ttatcaaccg 540
acggcgaccg acgcctaccg ggacgaactg cgtcagtatc tgctgcgcgt gccggaagaa 600
gacgaagagc aacagctgga ggcgctgcgt cagtttaagc aggcccagat gctgcgcgtg 660
gcggccgcag atattgccgg aacgctgccg gtgatgaaag tgagcgatca cttaacctgg 720
cttgcggaag cgattatcga cgcggtggtg catcaggcct gggtgcagat ggtggcgcgc 780
tatggccagc cgaaacatct ggctgaccgt gatggtcgcg gcttcgcggt ggtgggttac 840
ggtaagctcg gcggttggga gctgggctat agctccgatc tggatttaat cttcctccac 900
gactgcccgg ttgatgtgat gaccgacggc gagcgcgaga ttgacgggcg tcagttctac 960
ctgcgcctgg cgcagcgcat catgcacctg ttcagcaccc gcacctcgtc gggcattttg 1020
tatgaagtgg atgcccgtct gcgcccgtcc ggcgcggcgg gcatgctggt cacctcgacg 1080
gagtccttcg ctgattacca gaagaatgaa gcctggacgt gggagcatca ggcgctggtg 1140
cgcgcccgtg tggtgtatgg cgatccgctg ctgaaaacgc agtttgacgt gattcgtaag 1200
gaagtcatga ccaccgtgcg cgatggcagc acgctgcaaa cggaagtgcg cgaaatgcgc 1260
gagaaaatgc gcgcgcactt aggcaataaa catcgcgatc gctttgatat taaagccgat 1320
gagggcggta ttaccgatat tgagtttatt acccagtatc tggtgttgct gcacgcgcat 1380
gacaagccga agctgacgcg ctggtcggat aacgtgcgca ttctggaact gctggcgcaa 1440
aacgacatta tggacgagca ggaggcgcag gccttaaccc gtgcctatac aacgcttcgc 1500
gatgagctcc atcatctggc gttgcaggag cagcngggac acgtggcgct ggactgtttc 1560
accgctgaac gcgctcaggt aacggccagc tggcagaagt ggctggtgga accgtgcgta 1620
acaaatcaag tgtga 1635

<210> SEQ ID NO 157
<211> LENGTH: 1316
<212> TYPE: DNA
<213> ORGANISM: Enterobacter sp.

<220> FEATURE:
<223> OTHER INFORMATION: 16S
<220> FEATURE:
<221> NAME/KEY: misc_feature
<222> LOCATION: (43)..(43)
<223> OTHER INFORMATION: n is a, c, t, g, unknown or other
<220> FEATURE:
<221> NAME/KEY: misc_feature
<222> LOCATION: (247)..(247)
<223> OTHER INFORMATION: n is a, c, t, g, unknown or other
<220> FEATURE:
<221> NAME/KEY: misc_feature
<222> LOCATION: (784)..(785)
<223> OTHER INFORMATION: n is a, c, t, g, unknown or other
<220> FEATURE:
<221> NAME/KEY: misc_feature
<222> LOCATION: (794)..(795)
<223> OTHER INFORMATION: n is a, c, t, g, unknown or other

<400> SEQUENCE: 157
agatgtgccc agatgggatt agctagtagg tggggtaacg gcncacctag gcgacgatcc 60
ctagctggtc tgagaggatg accagccaca ctggaactga gacacggtcc agactcctac 120
gggaggcagc agtggggaat attgcacaat gggcgcaagc ctgatgcagc catgccgcgt 180
gtatgaagaa ggccttcggg ttgtaaagta ctttcagcgg ggaggaaggt gttgtggtta 240
ataaccncag caattgacgt tacccgcaga agaagcaccg gctaactccg tgccagcagc 300
cgcggtaata cggagggtgc aagcgttaat cggaattact gggcgtaaag cgcacgcagg 360
cggtctgtca agtcggatgt gaaatccccg ggctcaacct gggaactgca ttcgaaactg 420
gcaggctaga gtcttgtaga ggggggtaga attccaggtg tagcggtgaa atgcgtagag 480
atctggagga ataccggtgg cgaaggcggc cccctggaca aagactgacg ctcaggtgcg 540
aaagcgtggg gagcaaacag gattagatac cctggtagtc cacgccgtaa acgatgtcga 600
cttggaggtt gtgcccttga ggcgtggctt ccggagctaa cgcgttaagt cgaccgcctg 660
gggagtacgg ccgcaaggtt aaaactcaaa tgaattgacg ggggcccgca caagcggtgg 720
agcatgtggt ttaattcgat gcaacgcgaa gaaccttacc tactcttgac atccagagaa 780
cttnncagag atgnnttggt gccttcggga actctgagac aggtgctgca tggctgtcgt 840
cagctcgtgt tgtgaaatgt tgggttaagt cccgcaacga gcgcaaccct tatcctttgt 900
tgccagcggt ccggccggga actcaaagga gactgccagt gataaactgg aggaaggtgg 960
ggatgacgtc aagtcatcat ggcccttacg agtagggcta cacacgtgct acaatggcgc 1020
atacaaagag aagcgacctc gcgagagcaa gcggacctca taaagtgcgt cgtagtccgg 1080
attggagtct gcaactcgac tccatgaagt cggaatcgct agtaatcgta gatcagaatg 1140
ctacggtgaa tacgttcccg ggccttgtac acaccgcccg tcacaccatg ggagtgggtt 1200
gcaaaagaag taggtagctt aaccttcggg agggcgctta ccactttgtg attcatgact 1260
ggggtgaagt cgtaacaagg taaccgtagg ggaacctgcg gttggatcac ctcctt 1316

<210> SEQ ID NO 158
<211> LENGTH: 882
<212> TYPE: DNA
<213> ORGANISM: Enterobacter sp.
<220> FEATURE:
<223> OTHER INFORMATION: nifH

<400> SEQUENCE: 158
atgaccatgc gtcaatgtgc catttacggc aaaggtggta tcggtaaatc cactaccacg 60
caaaacctgg tcgccgcgct ggcggagatg ggcaagaaag taatgatcgt cggctgcgac 120

```
ccgaaagcag actccactcg tctgatcctg catgcgaaag cgcagaacac cattatggag    180

atggcggctg aagtcggctc cgtggaagac cttgaactgg aagatgtgct gcaaatcggt    240

tacggcgacg tacgctgcgc agaatccggc ggcccggaac caggcgttgg ctgtgctggt    300

cgcggggtaa ttaccgccat caacttcctg gaagaagaag gcgcctatgt tcccgacctc    360

gatttcgtct tttacgacgt gttgggcgac gtggtgtgcg gggggttcgc catgccgatt    420

cgcgaaaaca aagcgcagga gatctacatc gtctgctccg gcgaaatgat ggcgatgtac    480

gccgccaaca acatctctaa aggcatcgtg aaatacgcca aatccggcaa agtgcgcctt    540

ggcgggctga tctgtaactc ccgtcagacc gaccgcgaag atgagctgat catagcgctg    600

gcggaaaaac tcggcaccca gatgatccac ttcgtgccgc gcgacaacat cgtgcaacgc    660

gctgaaatcc gccgtatgac ggtgattgag tacgatccga aatgcaacca ggccaatgaa    720

taccgcacgc tggcgaacaa gatcgtcaac aacaccaaaa tggtcgtgcc aacgcccatc    780

accatggacg aactggaaga gctgttgatg gaattcggca ttatggatgt ggaagacacc    840

agcattatcg gtaaaaccgc cgcagaagaa aacgcggttt ga                       882
```

```
<210> SEQ ID NO 159
<211> LENGTH: 1449
<212> TYPE: DNA
<213> ORGANISM: Enterobacter sp.
<220> FEATURE:
<223> OTHER INFORMATION: nifD1

<400> SEQUENCE: 159

atgagcaatg caacaggcga acgtaatctg gagatcatcc aggaagtgct ggagatcttt     60

ccggaaaaaa cgcgcaaaga acgcagaaag cacatgatgg tgagcgaccc ggagatggaa    120

agcgtcggga aatgcatcat ctccaaccgt aagtcgcagc ccggcgtaat gaccgtgcgc    180

ggttgctctt acgccggttc taaaggggtg gtattcgggc cgatcaaaga tatggcccat    240

atttcccacg gcccggtcgg ctgcggtcag tactcccgcg ccgggcggcg taactactac    300

accggcgtca gcggtgtgga tagcttcggt acgctcaact ttacctccga ttttcaggag    360

cgcgatatcg tgtttggcgg cgataaaaag ctgaccaaac tgattgaaga gatggagacg    420

ctgttcccgc tgaccaaagg gatctccatt cagtccgaat gcccggtcgg cctgattggc    480

gacgacattg aagccgttgc caacgccagc cgcaaagcca tcaataaacc ggtcattccg    540

gtgcgctgcg aaggttttcg cggcgtttcc cagtcactcg gtcaccacat tgccaacgac    600

gtgatccgcg actgggtact ggataaccgc gaaggcaagc cgtttgaggc cggtccttat    660

gacgtggcga tcatcggcga ttacaacatc ggcggcgatg cctgggcgtc gcgcattttg    720

ctcgaagaga tgggcctgcg cgtggtggcg cagtggtccg gcgacggcac gctggttgag    780

atggagaaca cgccgttcgt caaactcaac cttgtgcact gctaccgctc aatgaactat    840

atctcccgcc atatggagga gaaacacggt attccgtgga tggagtacaa cttcttcggt    900

ccgaccaaag tcgccgaatc gttgcgcaaa atcgccgata tgtttgatga caccattcgc    960

gccaacgccg aagcggtgat cgccaaatat caggcgcaga acgacgccat catcgccaaa   1020

taccgtccgc gtctggaagg ccgcaaagtg ctgctgtata tgggcggttt acgtcctcgc   1080

catgtgattg gcgcttatga agatctgggg atggaaatta tcgctgcggg ttatgaattc   1140

gcccacaacg atgactacga ccgcaccctg ccggatctga aagaaggcac cttgctgttc   1200

gacgatgcca gcagttatga actggaagcc tttgtcaaag cgctgaagcc ggatctgatc   1260

ggctccggca ttaaagagaa gtacatcttc cagaaaatgg gcgtgccgtt tcgccagatg   1320
```

cactcctggg attactccgg cccctatcac ggttatgacg gctttgccat cttcgcccgc 1380
gatatggata tgacgatcaa caaccccgcg tggggccagt tgaccgcgcc gtggctgaaa 1440
tccgcctga 1449

<210> SEQ ID NO 160
<211> LENGTH: 1374
<212> TYPE: DNA
<213> ORGANISM: Enterobacter sp.
<220> FEATURE:
<223> OTHER INFORMATION: nifD2

<400> SEQUENCE: 160
atgaagggga acgagatcct ggctttgctc gatgaacctg cctgcgagca caaccataaa 60
cagaaatccg gctgcagcgc gccgaaaccc ggcgcgacag cgggcggctg cgcctttgac 120
ggtgcgcaga tcaccctgct gccactctcc gatgttgccc acctggtaca cggccccatt 180
ggttgtaccg gtagctcatg ggataaccgt ggcagcttca gttccggccc gacgatcaac 240
cggctgggtt ttaccaccga tctgagcgaa caggatgtga tcatgggacg cggcgagcgc 300
cgcctgttcc atgccgtgcg ccacatcgtc aaccgctacc acccggccgc cgtctttatc 360
tataacacct gcgttcccgc gatggagggc gacgatatcg aagccgtctg ccaggcggca 420
gaaaccgcca tcggcgtacc ggtgattgcc gttgatgtcg ccgggtttta cggcagcaaa 480
aatctcggca accggttggc cggtgaagtg atggtgaaaa aggtgattgg cgggcgtgaa 540
cccgcgccgt ggccggaaga tacccctttt gccccggcgc accgccacga tatcgggctg 600
attggcgaat tcaatattgc cggagagttc tggcatattc agccgctgct cgatgagctg 660
ggtattcgcg tgctcggcag cctctccggc gacgggcgct tcagtgaaat ccagacgctg 720
caccgggcgc aggtcaatat gctggtctgc tccagggcgc tgatcaacgt cgcccgctcg 780
ctggagcagc gctacggcac gccgtggttt gaaggcagtt tttatggtgt tcgcgccacc 840
tctgacgccc tgcgccaact ggcggcgctg accggagacc gcgatctgat gcagcgcacc 900
gaacagctca ttgcccgcga agagcagcaa acagagcagg cgctggcccc gctgcgcgag 960
cgcctgcgcg ggcgcaaagc gctgctctat accggcggcg tgaaatcctg gtcggtggtt 1020
tcggcgcttc aggatctggg catggaagtg gtggcgaccg gcacgcgcaa atccaccgaa 1080
gaggataaac agcgcatccg cgaactgatg ggcgccgacg cgctgatgct tgatgaaggt 1140
aacgcccgct cgctgctgga cgtggtttac cgctacaagg cggacatgat gatcgccggg 1200
ggacgcaata tgtacaccgc ctacaaagcg cggctgccgt tcctcgatat caatcaggag 1260
cgcgagcacg cctttgccgg ctaccgcggc attgtcaccc tggccgaaca gctctgcctg 1320
accatggaaa gcccggtctg gccgcaaacc cattcccgcg caccgtggca ataa 1374

<210> SEQ ID NO 161
<211> LENGTH: 1563
<212> TYPE: DNA
<213> ORGANISM: Enterobacter sp.
<220> FEATURE:
<223> OTHER INFORMATION: nifK1

<400> SEQUENCE: 161
atgagccaaa gtgctgagaa aattcaaaac tgtcatccgc tgtttgaaca ggatgcgtac 60
cagatgctgt ttaaagataa acggcaactg gaagaggccc acgatccggc gcgcgtgcag 120
gaggtctttc aatggaccac caccgccgag tatgaagcgc ttaactttca acgcgaagcg 180
ctgactatcg atccggccaa agcctgccag ccgctgggtg cggtactgtg ctcgctgggc 240
tttgccaata ccctgcccta tgttcacggc tcccaggggt gcgtggccta tttccgcacc 300
tattttaacc gtcactttaa agagccgatt gcctgtgttt ctgactcgat gacggaagat 360
gcggcagtat tcggcggcaa caacaacctg aacaccgggt tgcagaacgc cagcgccctc 420
tacaagccgg aaatcattgc cgtctccacc acctgtatgg cggaggtcat cggcgacgac 480
ctgcaggcgt ttattgctaa cgccaaaaaa gacggcttta tcgacgcggc gatcccggtg 540
ccttacgcgc acacgccaag ctttatcggc agccatatca ccggctggga caatatgttt 600
gagggcttcg cccgtacctt taccgccgat tacagcggac aaccgggcaa attaccgcgt 660
atcaatctgg tcagcggatt tgaaacctat ctcggtaatt tccgcgtgct gaaacgcatg 720
atggagcaaa tggacgtgcc gtgcagcctg ctttccgatc cctccgaagt gctggatacc 780
ccggctgacg ggcattacca catgtatgcg ggcggtacga cccagcagga gatgcgcgaa 840
gcgcctgacg ctatcgacac cctgctgctg caaccctggc aactggtgaa aaccaaaaaa 900
gtggtgcagg aaagctggaa ccagcccgct accgaggtgc aaatcccaat ggggctggcc 960
ggaaccgacg agctgctgat gacggtaagc cagttaaccg gcaaagccat tccggatagc 1020
ttagcgctgg aacgcggtcg gctggtggat atgatgctcg actcccacac ctggctgcac 1080
ggcaagaaat tcggcctgtt cggtgacccg gattttgtca tggggctgac ccgcttcctg 1140
ctggaactgg gctgcgaacc gacggtgatt ctgtgccata acggcagcaa gcgctggcag 1200
aaagcgatga agaaaatgct tgaagcctcg ccgtacggga aagagagcga agtctttatc 1260
aactgcgatt tgtggcattt ccgctcgctg atgtttaccc gtcagccgga ctttatgatc 1320
ggcaactcct acgccaagtt tatccagcgc gatacgctgg cgaagggtga gcagtttgaa 1380
gtgccgctga tccgcctggg gttcccgctg ttcgatcgcc accatctgca ccgccagacc 1440
acctggggtt acgaaggggc catgagtatc ctcaccacgc tggttaatgc ggtgctggag 1500
aaagtcgaca gagagaccat caagctcggc aaaaccgact acagcttcga tcttatccgt 1560
taa 1563

<210> SEQ ID NO 162
<211> LENGTH: 1386
<212> TYPE: DNA
<213> ORGANISM: Enterobacter sp.
<220> FEATURE:
<223> OTHER INFORMATION: nifK2

<400> SEQUENCE: 162
atggcagaaa ttatccgtag taaaaagccg ctggccgtca gcccggtaaa aagtggccag 60
ccgctgggcg cgattctggc gagcatgggc tttgaacaga gcattccgct ggttcatggc 120
gctcaggggt gcagcgcctt cgcgaaggtc tttttttatcc agcattttca cgatccgatc 180
ccgctgcaat cgacggcaat ggacccgaca tcgaccatta tgggtgccga tgagaacatc 240
tttaccgcgc tgaatgtgct gtgttcacgc aacaacccga aagcgattgt tctgctgagc 300
actggccttt ccgaggcgca gggcagcgat atttcgcgcg tggtgcgcca gttccgcgat 360
gaatatccgc gccataaagg ggtggcgctg ctgaccgtca acacgccgga tttttacggc 420
agcctggaaa acggctacag cgcggtgctg gagagcatgg ttgaacagtg ggtgccggaa 480
aaaccgcagc cgggcgtgcg caatcgccgc gtgaacctgc tgctcagcca tttgcttacg 540
ccgggcgaca ttgagctgct gcgaagttat gtcgaggcat ttggcctgca gccggtgatg 600
gtgccggatc tttcccagtc gctggatggc catctcgcca gcggggattt ctcgccaatt 660
acccagggcg gcagcagcct gcggctgatt gaacagatgg gacagagtct tggcacgttc 720
gccattggcg tatccctctc ccgcgccgcg caattgctgg cgcagcgcag ccatgcggaa 780
gtggtcaccc tgccgcatct gatgaccatg agccagtgcg atacgtttat tcatcaactg 840
aagcgcctct ccgggcgcga tgttccggcg tggatcgaac gccagcgcgg gcaactgcag 900
gatgcgatga tcgattgtca tatgtggttg cagggcgcgc ctgtcgcgct ggccgccgag 960
ggcgatctgc tcgccgcctg gtgcgatttc gcctgcgata tgggcatggt gcccggcccg 1020
gtggtggcgc cggtgagcca gaaagggttg caggatctgc cggtcgaaaa agtcattatc 1080
ggcgatctgg aggatatgca ggatctgttg tgtgaaacgc ctgcatcgct gctcgtctct 1140
aattctcacg ccgctgattt ggccgggcag ttcgacattc cgctggtgcg cgccggtttc 1200
cccctgttcg accgtctggg cgagtttcgc cgcgtgcgcc agggttacgc cgggatgcgc 1260
gacaccttgt ttgagctggc gaatgcgctg cgcgatcgcc atcatcatct tgccgcttat 1320
cactcgccgc tgcgccagcg tttttacgaa cccgcatctt cgggaggtga ctatgcaaca 1380
tgttaa 1386

<210> SEQ ID NO 163
<211> LENGTH: 1488
<212> TYPE: DNA
<213> ORGANISM: Enterobacter sp.
<220> FEATURE:
<223> OTHER INFORMATION: nifL

<400> SEQUENCE: 163
atgaccctga atatgatgat ggacgccacc gcgcccgccg agatcgccgg agcgctctca 60
caacagcatc ccgggttgtt tttcaccatg gttgaacagg cgcccgtcgc gatttcactg 120
accgatgccg atgcccacat tctctacgcc aaccccgcgt tttgtcgcca gtcggggtat 180
gaactggaag agttgttgca gcaaaacccg cgcctgcttg ccagtaagca gacgccgcgt 240
gaaatctacc aggaaatgtg gcacaccctg ctgcaacacc gtccgtggcg cggacaactg 300
atcaaccgtc gccgcgacgg cagcctgttt ctggtggaaa tcgacatcac cccactgttt 360
gatgcgttcg gcaaactcga acattacctg gccatgcagc gcgacatcag caccagctac 420
gcgctggaac aacggctgcg caatcatatg acgctgaccg aagccgtctt gaataacatt 480
ccggcggcgg ttgtagtggt ggatgaacgc gatcgggtgg tgatggataa cctcgcctac 540
aaaacctttt gcgccgattg cggcggtaaa gaactactca ccgaaatcaa cttttccgcc 600
cataaggcgg agctggcgca gggcctggta ctgccggtag tgctgcgcgg caccgtgcgc 660
tggttgtccg ttacctgttg ggcgctgccg ggcgtcagcg aagaagcagg ccgctacttt 720
attgatagcg ccgtgccgcg cacgctggtg gtgatcaccg ataatactca gcagcagcaa 780
caacaggagc aggggcgtct tgatcgtctg aagcagcaga taaccagcgg taaattgctg 840
gcggcgatcc gcgaatcgct ggacgccgcg ctggtacaac tcaattgccc aattaatatg 900
ctggccgccg cacgccgctt aaatggcgac gagcatagca atctggcgct ggatgccgca 960
tggcgtgaag gcgaagaagc gatggcgcgg ttgcagcgct gccgcccgtc gctggaactg 1020
gaaagcccgg cagtctggcc gctccagccg ttccttgacg atctgcgtgc cctgtatcac 1080
acccgatata accagggcga aaacctgcaa attgagctgg aatcccccga cctggtgggc 1140
tttggccagc gaacacaact gcttgcctgc ctgagcctgt ggctcgacag aaccctggat 1200
attgccgcgg agctacgtga tttcacggta cagactcaac tttacgcccg cgaagagagc 1260

```
ggctggctgt cgttctattt aaacgacaat gtgccgctga ttcaggtgcg ctacacccat   1320

tcacccgatg cactcaatgc gcccggtaaa ggcatggagc tgcggctgat ccagacgctg   1380

gtcgcccacc atcgaggcgc aatagaactg acctcacgcc ctcagggagg cacctgtctg   1440

atcctgcgtt tcccattatt ttactcgctg acaggaggct cactatga                1488
```

<210> SEQ ID NO 164
<211> LENGTH: 1575
<212> TYPE: DNA
<213> ORGANISM: Enterobacter sp.
<220> FEATURE:
<223> OTHER INFORMATION: nifA

<400> SEQUENCE: 164

```
atgactcagc gaaccgagtc gggtacaacc gtctggcgct ttgacctctc ccaacagttt     60

acagccatgc agcgtatcag tgtggtgtta agccgcgcga cggagatcgg gcagacgcta    120

caggaagtgc tgtgcgtgct gcacaacgat gcctttatgc agcacgggat gatctgtctg    180

tacgacagta agcaagcgat cctttccatt gaagccttgc atgaggccga tcagcagtta    240

attcccggca gttcacagat tcgctaccgt ccgggcgaag ggctggtagg cacggtgctt    300

tcacagggac agtcgctggt actgccctgt gtctccgacg atcggcgttt tctcgatcgc    360

ctgggattgt atgattacag cttgccgttt atcgccgtgc cgctgatggg gccaaactcg    420

cagcctatcg gcgtgctggc cgcccagcct atggcgcgtt acgaggagcg gctgcccgcc    480

tgcacgcgtt ttcttgaaac cgtcgccaat ctggtggcgc aaaccgttcg cctgatgaca    540

ccgcccagcg tcgcgtctcc accccgtgct gctgccgcgc agattgccag ccagcgcggg    600

tgcgcgtctt cgcgagcgta tggctttgaa aacatggtcg gtaaaagcgc ggctatgcgt    660

cagacgctgg aaattattcg ccaggtatca cgctgggaca ccaccgtgct ggtgcgtggc    720

gaaagcggaa ccggtaaaga gttgatagcc aacgctatcc accacaattc accgcgcgcc    780

gccgcgccgt ttgtcaaatt caactgcgcg gcgctgcccg atacgctgct ggagagtgaa    840

ctcttcggtc atgaaaaagg cgcgtttacc ggcgcggtgc gccagcgcaa aggccgtttc    900

gaactggcgg atggcggtac gctgtttctt gatgagatcg gcgaaagtag cgcctcgttt    960

caggcgaaat tgctgcgtat cttgcaggaa ggcgaaatgg aacgcgtcgg cggcgacgaa   1020

acgctgcggg tgaatgtacg gatcattgcc gccaccaacc gcaatctgga agaggaagtg   1080

cggctgggta attttcgcga agatctctac tatcgcctta atgtgatgcc gatctccctg   1140

cccccgctcc gcgagcgtca ggaggacatc gtcgagctgg cgcattttct ggtgcgcaaa   1200

atcgcgcaaa accagaaccg cacgctgcgc atcagcgatg gcgcgatccg tttgttgatg   1260

agctatagct ggcctggaaa cgtgcgtgag ctggaaaact gccttgagcg atcggcggtg   1320

atgtcggaaa acgggctgat cgatcgcgac gtgattttgt ttcaccacag ggaaaatctg   1380

ccaaaaacgc cacagaccag tgcgccgcgc gaagagagct ggctcgatca gaacctcgat   1440

gagcgacaaa gattgatcgc cgcgctggag aaagccggtt gggtacaggc aaaagccgcg   1500

cgcctgctgg gaatgacccc gcgccaggtg gcctatcgta ttcagacgat ggacattgcc   1560

atgccgagat tgtag                                                    1575
```

<210> SEQ ID NO 165
<211> LENGTH: 2856
<212> TYPE: DNA
<213> ORGANISM: Enterobacter sp.
<220> FEATURE:
<223> OTHER INFORMATION: glnE

<400> SEQUENCE: 165

```
atgccgcttt cttcgcagtt acagcagcag tggcagaccg tttgcgaacg tctgcctgag     60
tcattaccgg cgtcatcgtt aagcgagcag gcaaagagcg tgctcgtctt cagtgatttt    120
gtgcaggaaa gtatcaccgc caacccgaac tggctggcgg aacttgagaa cgcaccaccg    180
caggcagaag agtggcggca ctatgctggc tggctgcaaa ctgtactcga agacgttacg    240
gatgaggcca cgctgatgcg cgtcctgcgc cagttccgtc gtcgggtgat ggtgcgcatt    300
gcctgggctc aggcgctgga actggtgagc gaagagagta cgctgcagca gttaagcgag    360
ctggcgcaaa cgttgattgt cgccgcgcga gactggctct atgccgcctg ctgtaaagag    420
tggggcacgc cgtgcagcga ggaaggggtt cctcagccgc tgttgattct ggggatggga    480
aagctgggcg gctgcgagct gaacttctcc tctgatatcg acctgatttt tgcctggccg    540
gagaacggct ccacgcgcgg aggccgccgc gagctggaca acgcgcagtt ctttacccgt    600
ctcggccagc gcctgattaa agcgctggat cagcccacgc aggacggttt tgtttaccgc    660
gtggacatgc gcctgcgtcc gtttggcgac agcgggccgc tggtgctgag ctttgcggcg    720
ctggaagatt attaccagga gcaaggtcgc gactgggagc gttacgcgat ggtcaaagcg    780
cggatcatgg gcgacagcga cgacgcttat gccaacgagc tgcgcgccat gctgcgtccg    840
ttcgtgttcc gtcgctatat cgacttcagc gtcatccagt ccctgcgaaa tatgaaaggg    900
atgattgccc gcgaggtgcg ccgccgtggg ctgaaagaca atatcaagct cggtgcgggc    960
ggcatccgcg aaatcgaatt tatcgtccag gtcttccagc ttattcgcgg cggacgcgag   1020
ccgtcgctgc agtcccgttc cttattaccg acgctgagcg ccattgcgca gctgcatctc   1080
ctgccggacg gcgacgcgca aaccctgcgc gaggcctatc ttttcctgcg tcgtctggaa   1140
aacctgctgc aaagcattaa tgacgaacag acccaaaccc tgccgggcga cgaccttaac   1200
cgggcgcgtc tggcctgggg aatgcgcgtg gaagactggt caacgctgac cgaacggctc   1260
gatgcccata tggcaggcgt gcgccgaatc tttaacgaac tgatcggtga tgacgaaagt   1320
gagtcgcagg acgatgcgct ctccgagcac tggcgcgagc tgtggcagga cgcgcttcag   1380
gaagatgaca ccacgccggt gctgacgcac ttaaccgacg acgcgcgcca tcgcgtggtg   1440
gcgctgatcg ctgatttccg tcttgagctg aacaaacgcg ccatcggccc gcgtggtcgc   1500
caggtgctgg atcacctgat gccgcacctg ctgagcgaag tctgctcgcg tgccgatgcg   1560
ccggtgccgc tgtcgcggat gatgcccctg ctgagcggga ttatcacccg tactacctac   1620
cttgaactcc tgagcgagtt ccctggcgcg cttaagcacc tgatttcact ctgcgccgcg   1680
tcgccgatgg tggccaacaa gctggcgcgt tacccgctgc tgctggatga gctgctcgat   1740
ccgaataccc tttatcaacc gacggcgacc gacgcctacc gggacgaact gcgtcagtat   1800
ctgctgcgcg tgccggaaga agacgaagag caacagctgg aggcgctgcg tcagtttaag   1860
caggcccaga tgctgcgcgt ggcggccgca gatattgccg gaacgctgcc ggtgatgaaa   1920
gtgagcgatc acttaacctg gcttgcggaa gcgattatcg acgcggtggt gcatcaggcc   1980
tgggtgcaga tggtggcgcg ctatggccag ccgaaacatc tggctgaccg tgatggtcgc   2040
ggcttcgcgg tggtgggtta cggtaagctc ggcggttggg agctgggcta tagctccgat   2100
ctggatttaa tcttcctcca cgactgcccg gttgatgtga tgaccgacgg cgagcgcgag   2160
attgacgggc gtcagttcta cctgcgcctg gcgcagcgca tcatgcacct gttcagcacc   2220
cgcacctcgt cgggcatttt gtatgaagtg gatgcccgtc tgcgcccgtc cggcgcggcg   2280
```

```
ggcatgctgg tcacctcgac ggagtccttc gctgattacc agaagaatga agcctggacg   2340

tgggagcatc aggcgctggt gcgcgcccgt gtggtgtatg gcgatccgct gctgaaaacg   2400

cagtttgacg tgattcgtaa ggaagtcatg accaccgtgc gcgatggcag cacgctgcaa   2460

acggaagtgc gcgaaatgcg cgagaaaatg cgcgcgcact taggcaataa acatcgcgat   2520

cgctttgata ttaaagccga tgagggcggt attaccgata ttgagtttat tacccagtat   2580

ctggtgttgc tgcacgcgca tgacaagccg aagctgacgc gctggtcgga taacgtgcgc   2640

attctggaac tgctggcgca aaacgacatt atggacgagc aggaggcgca ggccttaacc   2700

cgtgcctata caacgcttcg cgatgagctc catcatctgg cgttgcagga gcagccggga   2760

cacgtggcgc tggactgttt caccgctgaa cgcgctcagg taacggccag ctggcagaag   2820

tggctggtgg aaccgtgcgt aacaaatcaa gtgtga                              2856
```

<210> SEQ ID NO 166
<211> LENGTH: 1290
<212> TYPE: DNA
<213> ORGANISM: Enterobacter sp.
<220> FEATURE:
<223> OTHER INFORMATION: amtB

<400> SEQUENCE: 166

```
atgaagatag caacacttaa aacgggtctg ggttcgctgg cactgctgcc gggcctggcg     60

ctggctgctg cacctgcggt ggcagacaaa gccgataacg cctttatgat gatcagcacc    120

gcgctggtgc tgttcatgtc cattccgggc attgcgctgt tctatggcgg cctgatccgt    180

ggcaaaaacg ttctctccat gctgacgcag gttgccgtaa cgttcgcgct ggtctgcgta    240

ctgtgggtgg tttacggtta ctcgctggct ttcggcacgg gcaacgcgtt ctttggtaac    300

ttcgactggg tgatgctgaa aaatattgaa ctgaccgcgc tgatgggcag tttctaccag    360

tatattcacg ttgctttcca gggctcgttc gcctgcatta ccgtcgggct gattgtaggc    420

gcgcttgccg agcgtattcg tttctctgcg gtcctgatct tcgtggtggt ctggctgacg    480

ctctcctatg tgccgattgc gcacatggtc tggggtggcg gtctgctggc gacgcatggc    540

gcgctggact tcgcgggcgg taccgttgtg cacattaacg ccgcggtagc gggtctggtt    600

ggcgcatacc tgattggcaa acgcgtgggc ttcggtaaag aagcgttcaa accgcacaac    660

ctgccgatgg tcttcaccgg taccgcgatc ctctactttg gctggtttgg tttcaacgcc    720

ggctcagcaa gtgccgcgaa cgaaatcgcc gcgctggcct tcgtgaatac cgttgtggcc    780

acggcaggtg caatcctctc ctgggtcttt ggcgagtggg ctgtgcgcgg taaaccttct    840

ctgctgggtg cctgttcggg ggcgattgct ggtctggtcg gtatcacccc agcatgtggt    900

tatgtcggtg tgggtggcgc gctgctggtc ggcctggtgt caggtctggc gggtctgtgg    960

ggcgtgacgg cgctgaaacg tattctgcgc gttgatgacc cttgcgatgt gtttggcgtg   1020

cacggcgtgt gcggcatcgt cggctgtatc atgaccggta tctttgcagc gaaatcgctg   1080

ggtggcgtgg gctacgcaga aggcgtcacc atggcccatc aggtgctggt gcagctggaa   1140

agtattgctg tcaccgtggt gtggtctgcc gttgtcgctt tcattggcta caaactggcg   1200

gacatgacgg ttggtctgcg cgtgccggaa gagcaggaac gcgaaggtct ggacgtcaac   1260

agccacggcg agaatgcgta taacgcatga                                    1290
```

<210> SEQ ID NO 167
<211> LENGTH: 1299
<212> TYPE: DNA
<213> ORGANISM: Azospirillum lipoferum
<220> FEATURE:
<223> OTHER INFORMATION: 16S
<220> FEATURE:
<221> NAME/KEY: misc_feature
<222> LOCATION: (294)..(294)
<223> OTHER INFORMATION: n is a, c, t, g, unknown or other
<220> FEATURE:
<221> NAME/KEY: misc_feature
<222> LOCATION: (299)..(299)
<223> OTHER INFORMATION: n is a, c, t, g, unknown or other
<220> FEATURE:
<221> NAME/KEY: misc_feature
<222> LOCATION: (302)..(302)
<223> OTHER INFORMATION: n is a, c, t, g, unknown or other
<220> FEATURE:
<221> NAME/KEY: misc_feature
<222> LOCATION: (309)..(310)
<223> OTHER INFORMATION: n is a, c, t, g, unknown or other
<220> FEATURE:
<221> NAME/KEY: misc_feature
<222> LOCATION: (332)..(332)
<223> OTHER INFORMATION: n is a, c, t, g, unknown or other
<220> FEATURE:
<221> NAME/KEY: misc_feature
<222> LOCATION: (346)..(346)
<223> OTHER INFORMATION: n is a, c, t, g, unknown or other
<220> FEATURE:
<221> NAME/KEY: misc_feature
<222> LOCATION: (351)..(351)
<223> OTHER INFORMATION: n is a, c, t, g, unknown or other
<220> FEATURE:
<221> NAME/KEY: misc_feature
<222> LOCATION: (438)..(438)
<223> OTHER INFORMATION: n is a, c, t, g, unknown or other
<220> FEATURE:
<221> NAME/KEY: misc_feature
<222> LOCATION: (445)..(445)
<223> OTHER INFORMATION: n is a, c, t, g, unknown or other
<220> FEATURE:
<221> NAME/KEY: misc_feature
<222> LOCATION: (454)..(454)
<223> OTHER INFORMATION: n is a, c, t, g, unknown or other
<220> FEATURE:
<221> NAME/KEY: misc_feature
<222> LOCATION: (469)..(469)
<223> OTHER INFORMATION: n is a, c, t, g, unknown or other
<220> FEATURE:
<221> NAME/KEY: misc_feature
<222> LOCATION: (477)..(477)
<223> OTHER INFORMATION: n is a, c, t, g, unknown or other
<220> FEATURE:
<221> NAME/KEY: misc_feature
<222> LOCATION: (492)..(492)
<223> OTHER INFORMATION: n is a, c, t, g, unknown or other
<220> FEATURE:
<221> NAME/KEY: misc_feature
<222> LOCATION: (504)..(504)
<223> OTHER INFORMATION: n is a, c, t, g, unknown or other
<220> FEATURE:
<221> NAME/KEY: misc_feature
<222> LOCATION: (555)..(555)
<223> OTHER INFORMATION: n is a, c, t, g, unknown or other
<220> FEATURE:
<221> NAME/KEY: misc_feature
<222> LOCATION: (775)..(775)
<223> OTHER INFORMATION: n is a, c, t, g, unknown or other

<400> SEQUENCE: 167
gccgagagag gggcccgcgt cggattaggt agttggtgag gtaatggctc accaagcctt 60
cgatccgtag ctggtctgag aggatgatca gccacactgg gactgagaca cggcccagac 120
tcctacggga ggcagcagtg gggaatattg gacaatgggc gcaagcctga tccagcaatg 180
ccgcgtgagt gatgaaggcc ttagggttgt aaagctcttt cgcacgcgac gatgatgacg 240
gtagcgtgag aagaagcccc ggctaacttc gtgccagcag ccgcggtaat acgnagggng 300

```
cnagcgttnn tcggaattac tgggcgtaaa gngcgcgtag gcggcntgtt nagtcagaag    360
tgaaagcccc gggctcaacc tgggaatagc ttttgatact ggcaggcttg agttccggag    420
aggatggtgg aattcccngt gtagnggtga aatncgtaga tattgggang aacaccngtg    480
gcgaaggcgg cnatctggac gganactgac gctgaggcgc gaaagcgtgg ggagcaaaca    540
ggattagata ccctngtagt ccacgccgta aacgatgaat gctagacgtc ggggtgcatg    600
cacttcggtg tcgccgctaa cgcattaagc attccgcctg gggagtacgg ccgcaaggtt    660
aaaactcaaa ggaattgacg gggcccgca caagcggtgg agcatgtggt ttaattcgaa     720
gcaacgcgca gaaccttacc aacccttgac atgtccactt tgggctcgag agatngggtc    780
cttcagttcg gctgggtgga acacaggtgc tgcatggctg tcgtcagctc gtgtcgtgag    840
atgttgggtt aagtcccgca acgagcgcaa cccctaccgt cagttgccat cattcagttg    900
ggcactctgg tggaaccgcc ggtgacaagc cggaggaagg cggggatgac gtcaagtcct    960
catggccctt atgggttggg ctacacacgt gctacaatgg cggtgacagt gggaagcgaa   1020
gtcgcgagat ggagcaaatc cccaaaagcc gtctcagttc ggatcgcact ctgcaactcg   1080
agtgcgtgaa gttggaatcg ctagtaatcg cggatcagca cgccgcggtg aatacgttcc   1140
cgggccttgt acacaccgcc cgtcacacca tgggagttgg ttttacccga aggtggtgcg   1200
ctaaccgcaa ggaggcagcc aaccacggta aggtcagcga ctggggtgaa gtcgtaacaa   1260
ggtagccgta ggggaacctg cggctggatc acctccttt                          1299
```

<210> SEQ ID NO 168
<211> LENGTH: 897
<212> TYPE: DNA
<213> ORGANISM: Azospirillum lipoferum
<220> FEATURE:
<223> OTHER INFORMATION: nifH

<400> SEQUENCE: 168

```
atggccaaag cgcctctgcg tcagatcgcc ttttacggca agggcggtat cggcaagtcc     60
accacctctc agaacacgct ggccgcgctg gtcgagctgg atcagaggat cctgatcgtc    120
ggctgcgacc cgaaggccga ctcgacccgc ctgatcctgc acgcaaaggc ccaggacacc    180
gtcctgcatc tggccgccga ggccggctcg gtcgaggatc tggagctcga ggacgttctc    240
aagatcggct acaagaacat caagtgcgtc gagtccggcg gtccggagcc gggggtcggc    300
tgcgccggcc gcggcgtcat cacctcgatc aacttcctgg aagagaacgg cgcctacgac    360
gacgtggact atgtgtccta cgacgtgctg ggcgacgtgg tctgcggcgg cttcgccatg    420
ccgatccgcg agaacaaggc ccaggaaatc tacatcgtca tgtccggcga gatgatggcg    480
ctgtacgccg ccaacaacat cgccaagggc atcctgaagt acgcgcacag cggcggcgtc    540
cgtctcggcg gcctgatctg caacgagcgc cagaccgaca aggaatggga tctggccgac    600
gcgctggcca agcgcctggg ctccaagctg atccacttcg tgccgcgcga caacatcgtc    660
cagcacgccg agctgcgccg catgacggtc atcgagtacg ccccggacag caagcaggcc    720
ggcgaatacc gcgcgctcgc caacaagatc catgcgaact ccggccaggg ttgcatcccg    780
accccgatca ccatggaaga gctggaagag atgctgatgg acttcggcat catgaagacc    840
gaggagcagc agctcgccga gctcgccgcc aaggaagcgg cgaaggccgg cgcctga       897
```

<210> SEQ ID NO 169
<211> LENGTH: 1440
<212> TYPE: DNA
<213> ORGANISM: Azospirillum lipoferum
<220> FEATURE:
<223> OTHER INFORMATION: nifD1

<400> SEQUENCE: 169
atgagcctgt ccgagaacac cacggtcgac gtcaagaacc tcgtcaacga agtcctcgaa 60
gcctatcccg aaaaatcccg caagcgccgc gccaagcacc tgaacgtgct ggaggccgag 120
gccaaggact gcggcgtcaa gtcgaacgtc aagtccatcc ccggcgtcat gaccatccgc 180
ggctgcgcct atgccggctc caagggcgtg gtgtggggtc cgatcaagga catgatccac 240
atctcccacg gtccggtcgg ctgcggctac tactcctggt ccggccgccg caactactac 300
atcggcgaca ccggtgtgga cagctggggc acgatgcact tcacctccga cttccaggag 360
aaggacatcg tcttcggcgg cgacaagaag ctgcacaagg tcatcgagga aatcaacgag 420
ctgttcccgc tggtgaacgg catctcgatc cagtcggaat gcccgatcgg cctgatcggc 480
gacgacatcg aggctgtcgc ccgcgccaag tcggcggaaa tcggcaagcc ggtcatcccc 540
gtgcgctgcg aaggcttccg cggcgtgtcc cagtcgctgg gccaccacat cgccaacgac 600
gccatccgag actgggtgtt cgagaagacg gaacccaagg ccggcttcgt ctccaccccc 660
tatgacgtca ccatcatcgg cgactacaac atcggcggcg acgcctggtc gtcccgcatc 720
ctgctggagg agatcggcct gcgcgtgatc gcccagtggt cgggcgacgg cacgctcgcc 780
gaactggaga acacgccgaa ggccaaggtc aacctgatcc actgctaccg ctcgatgaac 840
tacatcgcgc gccacatgga agagaagttc aacattcctt ggatggaata caacttcttc 900
ggcccgagcc agatcgccga atccctgcgc aagatcgccg ctctcttcga cgacaagatc 960
aaggagaacg ccgagaaggt catcgcccgc taccagccga tggtcgatgc ggtcatcgcc 1020
aagtacaagc cgcggctcga aggcaagaag gtcatgatct acgtcggcgg cctgcgtccc 1080
cgccacgtcg tcgatgccta ccatgacctc ggcatggaga tcaccggcac cggctacgag 1140
ttcgcccaca acgacgacta tcagcgcacg cagcactacg tgaaggaagg cacgctgatc 1200
tacgacgacg tcaccgcgtt cgaactggag aagttcgtcg aggcgatgcg tcccgacctc 1260
gtcgcgtcgg gcatcaagga aaagtacgtg ttccagaaga tgggcctgcc gttccgccag 1320
atgcacagct gggactactc cggcccgtac cacggctatg acggcttcgc gatcttcgcc 1380
cgcgacatgg acctggccat caacaacccc gtctggggcg tgatgaaggc cccgttctga 1440

<210> SEQ ID NO 170
<211> LENGTH: 1419
<212> TYPE: DNA
<213> ORGANISM: Azospirillum lipoferum
<220> FEATURE:
<223> OTHER INFORMATION: nifD2

<400> SEQUENCE: 170
atgctccagg acaagatcca ggatgtcttc aacgaaccgg gctgcgcgac caaccaagcc 60
aaatcggcca aggagaagaa gaagggctgc accaagtcgc tgaaaccggg ggcggcagcc 120
ggcggctgcg cctatgacgg ggcgatgatc gtgctccagc cgatcgccga cgccgcccat 180
ctggtccatg gccccatcgc ctgcctcgga aacagttggg acaaccgcgg ctccaaatcc 240
tccggctcgc agctctaccg caccggcttc accaccgatc tgtcggaact ggacgtcatc 300
ggcggcggcg agaagaagct ctaccgcgcc atcaaggaga tcgttcagca atacgacccg 360
ccggccgtct tcgtctatca gacctgcgtg cccgccatga ccggcgacga catcgccgcg 420
gtctgcaagt tcgccacgca gaagctgggc aagccggtga tcccggtgga ctcgccgggc 480

```
ttcgtcgggt cgaagaatct cggcaacaag ctggccggcg aagccctgct ggagcatgtc    540

atcggcacgg tcgaaccgga ctacaccacc ccgaccgacg tctgcatcat cggcgaatac    600

aaccttgccg gcgagctgtg gctggtcaag ccgctgctgg acgagatcgg catccgcctc    660

ctgtcctgca tttccggcga cggccgctac cgggaggtgg cgcaggccca ccgcgcccgc    720

gtcaccatga tggtgtgcag ccaggcgctg gtgaatgtcg ggcgcaagat ggaggagcgc    780

tacggcatcc cctatttcga ggggtccttc tacggcgtgt ccgacatgtc ggacaccctg    840

cgcaccatga cccgcatgct ggtggagcgc ggcgccgaca agggcctgat cgaccgggcg    900

gagggcgtga tcgcgcggga ggaaagccgg gtctggcgcc ggctggaacc ctacaagccg    960

cgcttcgacg gcaagcgcgt ccttctcttc accggcggcg tcaagagctg gtcgatggtc   1020

agcgcgctgg agggtgcggg gctgaccatc ctcggcacct ccaccaagaa atcgaccagg   1080

gaggacaagg agcgcatcaa gaagatgaag ggcgaagagt tccaccagtg ggacgatttg   1140

aagccgcgcg acatctacag gatgctggcc gacgatcagg ccgacatcat gatgtccggc   1200

ggccgctcgc agttcatctc gctgaaggcc aaggttccct ggctcgacat caaccaggag   1260

cgccaccacg cctatgccgg ctatgacggc atcgtcaatc tctgcgagga gatcgacaaa   1320

acgctgtcga atccgatctg gcgtcaggtg cgtcagccgg caccgtggga gtccggcgcg   1380

tcctccaccc ttctggcttc ctcgatggcg gcggagtga                          1419
```

<210> SEQ ID NO 171
<211> LENGTH: 1383
<212> TYPE: DNA
<213> ORGANISM: Azospirillum lipoferum
<220> FEATURE:
<223> OTHER INFORMATION: nifK

<400> SEQUENCE: 171

```
atgtcccaca tccagcgctt cccctccgcc gccaaggccg cctccaccaa cccgctgaag     60

atgagccagc cgctgggtgc ggctctggcc tatctcggcg tcgaccgctg cctgccgctg    120

ttccatggct cgcagggctg caccgccttc gggctggtcc tgctggtgcg ccatttccgc    180

gaggcgatcc cgctccagac cacggcgatg gatcaggtcg ccaccatcct cggcggctac    240

gacaatctgg agcaggcgat ccgcaccatc gtcgagcgca accagcccgc catgatcggc    300

gtcgccacca ccggcgtcac cgagaccaag ggcgaggata tggccggaca gtacacgctg    360

ttccgccagc gcaaccccga cttggccgac acggccctgg tcttcgccaa cacccccgac    420

ttcgccggcg gcttcgagga cggcttcgcc gccgcggtca ccgcgatggt cgagcggttg    480

gtcgaaccgt cgccggtgcg catcccgacc caggtcaacg tgctggccgg ctgccatctg    540

tcccccggcg acgtggagga actgcgcgac atcatcgaag gcttcggcct gtcgccgatc    600

ttcctgcccg acctgtcgct gtcgatggcg ggccgccagc cggccgactt caccgccacc    660

tcgctgggcg gcgtgaccgt cgatcagatc cgcgccatgg gcgcttcggc cctcaccatc    720

gtggtcggtg agcatatgcg ggtggccggt aacgcgctgg agctgaagac cgacgtgccc    780

agccatttct tcaaccgcct gaccgggctg gaggcgacgg acaagctggt ccggctgctg    840

atggagttgt cgggcaagcc ggcgcccgcc cggctgcggc gccagcgcga aagcctggtc    900

gatgccatgc tcgacgggca tttcttctac agccgcaagc gcatcgccgt cgcgctggag    960

cccgacctgc tctatgccgt caccggcttc ctcgccgaca tgggggccga ggtgatcgcc   1020

gcggtgtccc cgacgcagag cccggtgctg gagcggttga aggccgccac catcatggtc   1080

ggcgatcatt ccgacgtgga gacgctggcc cgcgacgccg acctgatcgt ctccaactcg   1140
```

cacgggcggc agggagccgc gcggatcggc gtggctctgc accgcatggg cctgccgctg 1200
ttcgaccggc tgggggccgg cctgcgcgtc caggtcggct accgcggcac gcgggaactg 1260
ctgtgcgaca tcggcaacct gttcctcgcc cgcgagatgg accacgagca cgggcacgag 1320
agccacgacc acggggaatc ccacggctgc ggaggcggat catgcggatg caacgccgtc 1380
tga 1383

<210> SEQ ID NO 172
<211> LENGTH: 1560
<212> TYPE: DNA
<213> ORGANISM: Azospirillum lipoferum
<220> FEATURE:
<223> OTHER INFORMATION: nifK1

<400> SEQUENCE: 172
atgaccgaca agctttcgca gagcgccgac aaggtcctcg accactacac cctcttccgg 60
cagcccgaat acgcggcgat gttcgagaag aagaagaccg agttcgagta cggccattcg 120
gacgaggaag tcgcccgcgt gtccgaatgg accaagtccg aggactacaa ggcgaagaac 180
ttcgcccgtg aagcggtcgt catcaacccg accaaggcct gccagccgat cggcgcaatg 240
ttcgccgccc agggcttcga aggcaccctg cccttcgtcc acggctccca gggctgcgtc 300
gcctattacc gcacccacct gacccgtcac ttcaaggagc cgaacagcgc ggtctcctcg 360
tcgatgacgg aggacgcggc ggtgttcggc ggcctgaaca acatgatcga cggcctggcg 420
aacgcctatg cgctctacaa gccgaagatg atcgcggtga tgaccacctg catggccgaa 480
gtcatcggcg acgatttgca gggcttcatc gccaatgcga agaccaagga cagcgtcccg 540
gccgacttcc cggtccccta cgcccacacc ccggccttcg tcggcagcca catcgtcggc 600
tacgacaaca tgatcaaggg gatcctgacc aacttctggg gtacgtcgga gaatttcgac 660
acacccaaga ccgagcagat caacctgatc ccgggcttcg acggcttcgc cgtcggcaac 720
aaccgcgaac tgaagcgcat cgccggcgaa ttcggcgtga agctgcaaat cctgtccgac 780
gtgtccgaca atttcgacac gccgatggat ggcgagtacc gcatgtatga cggcggcacc 840
accatcgagg agaccaagga ggccctgcac gccaaggcca ccatctccat gcaggagtac 900
aacacgaccc agaccctgca attctgcaag gagaagggtc aggaagtcgc caagttcaac 960
tacccgatgg gcgtcaccgg caccgacgag ctgctgctga agctcgccga actgtcgggc 1020
aagccggtcc cggccagcct gaagctggag cgcggccgtc tggtcgacgc catcgccgac 1080
agccacaccc acatgcacgg caagcgcttc gccgtctatg gcgacccgga cttctgcctg 1140
ggcatgtcca agttcctgct ggagctgggt gcggagccgg tgcacatcct gtcgacgtcg 1200
ggctccaaga agtgggagaa gcaggtccag aaggtgctgg acggctcgcc cttcggcgcc 1260
tcgggcaagg cccatggcgg caaggatctg tggcacctgc gttcgctgat cttcaccgac 1320
aaggtggact acatcatcgg caacagctac ggcaagtatc tggagcgcga caccaaggtt 1380
ccgctgatcc gcctgaccta cccgatcttc gaccgccacc accaccaccg ctacccgacc 1440
tggggctacc agggcgcgct gaacgtgctg gtacggatcc tggaccggat cttcgaggac 1500
atcgacgcca acaccaacat cgtcggccag accgactact cgttcgacct gatccgctga 1560

<210> SEQ ID NO 173
<211> LENGTH: 1530
<212> TYPE: DNA
<213> ORGANISM: Azospirillum lipoferum
<220> FEATURE:

<223> OTHER INFORMATION: nifA

<400> SEQUENCE: 173
atgttgacct ctgatattgt tggcaaattg cgctgcatcg cagcagaccc caaagcgggc 60
atcgcaaggg gcctcgacac cgggacgacg aagatcggtc ccgtttggga gggtgacgtg 120
ggcgacaccg tggatttcga agcgctgcgc cagcgggcgg tccactccct gttcgaacat 180
ctggaatcca tgtgcgtcgg cgccgtcgcc gtcgaccaca ccggccgcat cgcctggatg 240
gacgagaagt acaaggctct gctgggcgtt cccgacgacc cgcgcggccg gcaggtggag 300
gacgtcatcc ccaacagcca gctgcgccgg gtgatcgaca gcggccagcc gcagccgctg 360
gacatcatgg agttcgacga ccggtccttc gtggtgacgc ggatgccgct gttcggcacc 420
gacggttcga tcatcggcgc catcggcttc gtgctgttcg accgcgccga atatctccgc 480
ccgctggtcc gcaaatacga gaagatgcag gaggagctgg cccgcaccca gcaggagctg 540
gcgcatgagc gccgcgccaa atactccttc tcgcagttcc tgggcgccag cgaatcgatc 600
cgcgagatca agcggctggg gcgccgcgcc gcccagatgg attcgaccgt cctgctgctg 660
ggcgaaaccg ggaccggcaa ggagctgctg gcccaggcca tccattccgc cagcccgcgg 720
gcgtccaagc ccttcgtcgg cgtcaatgtc gccgccattc cggaaaccct gctggaggcg 780
gagttcttcg gcgtcgcccc cggcgccttc accggcgccg accgccgcca ccgcgacggc 840
aagttccagc tcgccaacgg cggcaccctg ttcctcgacg agatcggcga catgccgctg 900
ccggtgcagg ccaagcttct gcgcgtgctg caggagcggg agatcgagcc gctcggctcc 960
aacaaggtgg tgcgggtcga tgtccgcatc atcgccgcca ccagccgtga cctgcacgcc 1020
ctggtgcgtg agaagcagtt ccgcgccgac ctctattacc ggctgaatgt ggtgccgatc 1080
accctgccgc cgctgcgcga ccggccggag gacatcgaga gcatcgccga ccgcatcctg 1140
gaacagctgg cgatccagca gggcacgccg ccgcgcgagc tgctggaatc ggcggtgcag 1200
gtgctgcgcg actatgactg gcccggcaat gtgcgcgagc tttacaacac gctggaacgg 1260
gtggtggcgc tgaccgatgc gccgatcctg accgcgccgc acatccgcag cgtgctgccc 1320
ggccagcatc cggccggcgc gtcggccctg ccgctggcgg ccggcgcgcg gccgttgcag 1380
gaggtgctgc acgccgccga gcgccacgcc atcgccgcgg cgcttgagga ggcgaacggc 1440
gtcaaggcgc gggcggcgaa gctgctgggc atttcgcgcg cgtcgctgta cgaacgcatg 1500
gtgacgctgg ggttgggggc gacgcagtag 1530

<210> SEQ ID NO 174
<211> LENGTH: 3030
<212> TYPE: DNA
<213> ORGANISM: Azospirillum lipoferum
<220> FEATURE:
<223> OTHER INFORMATION: glnE

<400> SEQUENCE: 174
atgccgagtc ccatcgcgtt ctcaagcccc ttgccgaagc ctttcgacag cgcgcaggcg 60
gcgctgggga tggagcgctg gcgccagcag gccgccgcgg cggagccgga gacccgcgcc 120
tgggcggaag ccttcgccga ttcggagacc ggccgggcgc tgatcggggc ggtgtgcggc 180
aacagcccgt atctcggcca cagcctgacg cgggagttgc ccttcgtcgc ccgtacagtg 240
caggacggct tcgacgacac cttcgccgcg ctgatcgccg ctctccatgc cgagcatggc 300
gaggagaaat cgatggaccg gctgatggcc ggcctgcggg tggcgaagcg gcgggcggcg 360
ctgctgatcg cgctggccga catcgccggc gcgtggccgc tgttccgcgt caccggcgcc 420

```
ctgtcggagc tggcggagac gggggtgcag ctggccgcga atttcctgct gcgccgcgcc    480
agggaggcgg ggacgctgac gctgccggat ccgcagcgac cgtgggtcgg ttcgggcctg    540
atcgttttgg gcatgggtaa gcttggcggg cgcgaactca actattccag cgacatcgac    600
ctgatcgtcc tgtatgacga cgctgttgtg cagacgcccc agccggacaa cctcgcgcga    660
accttcatca ggctcgcacg cgatcttgtc cgcattatgg atgaacggac caaggacggc    720
tacgtcttcc gcaccgacct tcggcttagg cccgatcccg gcgccacgcc gctggcggtt    780
tccgtctccg cagccgaaat ttattacggc agcgtcggtc agaactggga acgcgcggcg    840
atgatcaagg cccgtcccat cgccggcgat ctggaggcgg gcgcctcctt tgtccgcttc    900
ctggagccct tcgtctggcg ccgcaacctg gatttcgccg ccatccagga catccattcg    960
atcaaacgcc agatcaacgc ccacaagggc caccgcgagg tgacggtcaa cggccacgac   1020
atcaaggtcg gccgcggcgg catccgcgag atcgagttct tcgcccagac ccagcagctg   1080
atcttcggcg ggcgcgaccc gcgcgtgcga atcgctccga ccctgatggc gaacgaggcg   1140
ctgcgcgacg tcggccgcgt gccgccgcag acggtggaag agcttgccgg ggcctatcat   1200
ttcctgcgcc gtgtcgaaca tcgcatccag atgatcgacg accagcagac ccatcgtatt   1260
cccgccgacg atgccggggt ggcgcatttg gccaccttcc tcggctatga cgaccccgcc   1320
gccttccggg cggaactgct ggcgacgctg gggcaggtgg aggaccgcta tgccgagctg   1380
ttcgaggagg cgccgtcgct ttccggcccc ggcaatctgg tcttcaccgg caccgacccc   1440
gatccgggca cgatggagac gctgaagggc atgggcttcg ccgatccggc ccgcgtcatc   1500
agcgtggtgt cggcctggca tcgcggccgc taccgcgcca cccggtcggg ccgggcgcgg   1560
gagctgctga cggagctgac gccggccctg ctgagtgcgc tgaccaagac cccggccccc   1620
gattcggcgc tgatgaactt cgacgatttc ctcggcaagc tgccggccgg cgtcggtctg   1680
ttctcgctgt tcgtcgccaa tccctggctc ctggagctgg tggcggagat catgggcatc   1740
gcgccgcaga tggcgcagac gctgtcgcgc aacccgtcgc tgctcgacgc cgtgctgtcg   1800
ccggacttct tcgacccgct gccgggcaag gaggacgggc tggccgacga ccacgcccgc   1860
gtgatggcgc cggcccgcga tttcgaggat gcgctgaccc tgtcgcggcg ctggaccaac   1920
gaccagcgct tccgcgccgg ggtgcatatc ctgcgcggca tcaccgatgg cgaccgctgc   1980
ggcgccttcc tggccgatct ggccgacatc gtcgtccccg accttgcccg ccgggtggag   2040
gaggagttcg cccagcgcca cggccatatt cccggcggcg cctgggtggt ggtggcgatg   2100
ggcaagctcg gcagccggca gctgaccatc acgtccgaca tcgacctgat cgtcatctac   2160
gatgtggcgc cgggccaagg gggcgggggc ggtccccgct tgtcggatgg tgccaagccg   2220
ctgtcgccca acgagtatta catcaagctg actcagcgtc tgaccaacgc cattaccgcg   2280
ccgatgggcg acggccggct ctacgaggtc gacatgcggc tgcgcccgtc gggcaacgcc   2340
gggccgctcg ccacctcgct ggacgctttc ctgaaatatc aggcgaccga tgcctggacc   2400
tgggagcata tggccctgac ccgcgcccgg gtgatcggcg gtgatgcgga gctggccggg   2460
cgggtgtcgg cagcgatccg ctcggtgctg acggcgccgc gcgatgccga ccggctgctg   2520
tgggacgtgg ccgacatgcg gcggcggatc gagaaggagt tcgggacgac caatgtctgg   2580
aacgtcaaat acgcccgcgg cggcctgatc gacatcgagt tcatcgccca gtacctgcaa   2640
ctgcgccatg gtcacgagcg gccggacatc ctgcacatcg gcaccgccaa ggcgctgggc   2700
tgcgccgccc ggacgggcgc gctggcgccg gaggtggcgg aggatctgga gacgacgctg   2760
```

cggctgtggc ggcgggtgca gggctttctg cggttgacca ccgccggggt gctcgatccc 2820
aatcaggtgt cgcccagcct gctggccggg ctggtccgcg ccgcctttcc tgctgacttt 2880
cagggcgagc gtgagcctgg cactgttgac ttccccgaac tggaccacaa aatccgtgcc 2940
gtcgccgccc gcgcccatgg tcatttcaag accctggtcg aggaaccggc gggccgtctg 3000
gccccacccg ccaccacgcc tccagcctga 3030

<210> SEQ ID NO 175
<211> LENGTH: 1440
<212> TYPE: DNA
<213> ORGANISM: Azospirillum lipoferum
<220> FEATURE:
<223> OTHER INFORMATION: amtB1

<400> SEQUENCE: 175
atgaaccgtc tgttccttat ggccgcaccg atgatggcgg ttgctctggg cgcggtcggc 60
atgccggccg cagcccttgc ccaggatccg gcggctgccg ccgctgccgc ggctgcggct 120
gcggctgccg ccgctgctgc cgcaccggcg gctccggcgc tgaatggcgg cgacaccgcc 180
tggatgctca tctccaccgc gctggtgctg atgatgacca tccccggcct ggcgctgttc 240
tacggcggca tggtccgcaa gatgaacgtg ctgtcgacgg tgatgcagag cttcgccatc 300
acctgcctga tcagcgtcct gtggtacgtc atcggctaca gcctggcctt caccggcacc 360
ggtgcctatg tcggcggtct cgaccggctg ttcctcaacg ggctcgactt cacgaaggcc 420
ttcgtgctgg gcgaggcgac cgggtcgggc gtcccgacga ccatccccga gccggtcttc 480
atgatgttcc agatgacctt tgcgatcatc accccggccc tgatcaccgg cgccttcgcc 540
gaccgcatga agttctcctc cctgctggtc ttcaccgcgc tgtggtcgat cgtggtctat 600
gcgccgatcg cccactgggt ctggtacccg tcgggcttcc tgttcggcct gggcgtgctg 660
gacttcgccg gcggcacggt cgtgcacatc aacgccggcg tcgccggcct ggtcgccgcg 720
ctggtgatcg gcaagcgcaa gggctacccg aaggaagcct tcatgccgca caacctggtg 780
ctgtcgctga tcggcgcctc gctgctgtgg gtcggctggt tcggcttcaa cgccggttcg 840
gccctgaccg ccggtccgcg tgccggcatg gcgctggccg ccacgcacat cgccaccgcc 900
ggtgccgcca tgggctggct gttcgcggag tggatcgtca agggcaagcc gtcgatcctc 960
ggcatcatct ccggcgccgt cgccggcctg gtcgcggtga ccccggccgc cggcttcgtc 1020
gacccgacgg gcgccatcgt catcggcatc gtcgccggcg tggtctgctt ctggtcggcc 1080
accagcctca agcacatgct gggctatgac gacagcctgg acgccttcgg cgtgcacggc 1140
gtcggcggcc tgatcggcgc catcctgacc ggcgtcttcg ccaagatgtc ggtgtccaac 1200
agcgaaggcg gcttcgcctc cgtcctgcag gccgacccga aggccacgct gggcctgctg 1260
gaaggcaacg ccgccgccgt ctggatccag gtccagggcg tcctctacac catggtctgg 1320
tgcgccatcg ccaccttcgt cctgctgaag atcgtcgatg tggtcatggg cctgcgcgtc 1380
gaagaggatg tggagcgcga cggtctcgac ctcgccctgc atggcgagag catccactaa 1440

<210> SEQ ID NO 176
<211> LENGTH: 1227
<212> TYPE: DNA
<213> ORGANISM: Azospirillum lipoferum
<220> FEATURE:
<223> OTHER INFORMATION: amtB2

<400> SEQUENCE: 176
atggatgcgg caaagacggg tggcgacgtc cttttcgtgc tgatgggcgc ggtgatggtg 60

```
ctggcgatgc attgcggctt cgccctgctg gaggtcggga cggtccggcg caagaatcag    120

gtcaacgcgc tggtgaagat cctgtcggac ttcgccatgt cgaccatcgc ctattttttc    180

gtcggttatg ccgtggccta cggcatcgac ttcttcgccg acgcccacac gctggtcggc    240

aagggaagcg gcgggttcgc ggcctatggc tacgatctgg tgaagttctt cttcctggcg    300

accttcgccg ccgcggtgcc ggccatcgtc tcgggcggca tcgccgagcg tgctaggttc    360

tggccgcagg ccgccgccac gctggcgctg atcgcgctgt tctatccatt gctggaaggc    420

acggtctggg gcacccgctt cggcctgcaa agctggatgg ccgcgacctt cggccagcct    480

ttccacgact tcgccggatc tgtggtggtg catgccttcg gcggctgggt ggcgctgggt    540

gccgtgctga acctcggcaa ccgccgcggc cgctaccgtc cgaacggctc gctgatcgcc    600

attccgccgt cgaacatccc cttcctggcg ctgggcgcct gggtgctgtg cgtggggtgg    660

ttcggcttca acgtgatgag cgcccaggtg ctggatggcg tgacgggtct ggtggcgctg    720

aactcgctga tggcgatggt cggcggcatc gtcacctcgc tggtgatcag ccgcaccgat    780

cccggcttcg tccacaacgg cgcgctggcc ggtctggtgg cggtctgcgc cgggtccgac    840

gtgatgcacc cgctgggcgc gctggtcacc ggcggcatcg ccgggctgct gttcgtctgg    900

gccttcaaca aatgccagat cgactggaag atcgacgacg tgctgggcgt ctggccgctg    960

cacggtctgt gcggcctgac cggcggcctg ctggccggcg tcttcgggca ggaggcactg   1020

ggcggccttg gcggcgtgtc gatcctcagc cagatcgtcg gcacggcaag cggcgccagc   1080

ttcggattcg tctcgggtct ggcggtctac ggcctgctgc gcgtcaccgt cggcatccgc   1140

ctcgatcccg agcaggagta caagggcgcc gacttgtcgt tgcaccatat caccgcgtac   1200

ccggaagagg acgcgccgac cctgtaa                                       1227
```

<210> SEQ ID NO 177
<211> LENGTH: 613
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::PinfC

<400> SEQUENCE: 177

```
atgaccctga atatgatgat ggattcttgg ttctctggag cgctttatcg gcatcctgac     60

tgaagaattt gcaggcttct tcccaacctg gcttgcaccc gtgcaggtag ttgtgatgaa    120

catcactgat tcgcaggctg aatacgttaa cgaattgacc cgtaaactgc aaaatgcggg    180

cattcgtgta aaagcagact tgagaaacga gaagattggc tttaaaatcc gcgagcacac    240

tttacgtcgt gtcccttata tgctggtttg tggtgacaaa gaggtcgaag ccggcaaagt    300

tgctgtgcgt acccgtcgcg gtaaagacct gggtagcctg gacgtaaatg atgttatcga    360

gaagctgcaa caagagattc gcagccgcag tcttcaacaa ctggaggaat aaggtattaa    420

aggcggaaaa cgagttcaaa cggcgcgtcc caatcgtatt aatggcgaga ttcgcgccac    480

ggaagttcgc ttaacaggtc tggaaggcga gcagcttggt attgcgatag aactcacttc    540

acgccccgaa gggggaagct gcctgaccct acgattcccg ctatttcatt cactgaccgg    600

aggttcaaaa tga                                                      613
```

<210> SEQ ID NO 178
<211> LENGTH: 1613
<212> TYPE: DNA

<213> ORGANISM: Artificial Sequence
<220> FEATURE:
<223> OTHER INFORMATION: Synthetic polynucleotide
<220> FEATURE:
<223> OTHER INFORMATION: delta-nifL::PinfC with 500bp flank

<400> SEQUENCE: 178
accggataag agagaaaagt gtcgacgtcg gtccggttga tattgaccgg cgcatccgcc 60
agctcgccca gtttttggtg gatctgtttg gcgattttgc gggtcttgcc ggtgtcggtg 120
ccgaaaaaaa taccaatatt tgccataaca cacgctcctg ttgaaaaaga gatcccgcgg 180
ggaaaatgcg gtgaacatgt cagctattgc gaagagtgtg ccagttttgc tcacgggcaa 240
aagctgcacc agaatgggta ttaatgcacc agcctggcgc ttttttcgc ggcacgtccc 300 ctcgctaatg cccgtctggc gcggctttga cgctgataag gcgctgaata ccgatctgga 360
tcaaggtttt gtcgggttat cgtccaaaag gtgcactctt tgcatggtta taagtgcctg 420
acatggtgtc cgggcgaacg tcgccaggtg gcacaaattg tcagaactac gacacgacta 480
accgaccgca ggagtgtgcg atgaccctga atatgatgat ggattcttgg ttctctggag 540
cgctttatcg gcatcctgac tgaagaattt gcaggcttct tcccaacctg gcttgcaccc 600
gtgcaggtag ttgtgatgaa catcactgat tcgcaggctg aatacgttaa cgaattgacc 660
cgtaaactgc aaaatgcggg cattcgtgta aaagcagact tgagaaacga gaagattggc 720
tttaaaatcc gcgagcacac tttacgtcgt gtcccttata tgctggtttg tggtgacaaa 780
gaggtcgaag ccggcaaagt tgctgtgcgt acccgtcgcg gtaaagacct gggtagcctg 840
gacgtaaatg atgttatcga gaagctgcaa caagagattc gcagccgcag tcttcaacaa 900
ctggaggaat aaggtattaa aggcggaaaa cgagttcaaa cggcgcgtcc caatcgtatt 960
aatggcgaga ttcgcgccac ggaagttcgc ttaacaggtc tggaaggcga gcagcttggt 1020
attgcgatag aactcacttc acgccccgaa gggggaagct gcctgaccct acgattcccg 1080
ctatttcatt cactgaccgg aggttcaaaa tgacccagcg aaccgagtcg ggtaataccg 1140
tctggcgctt cgatttatcc cagcagttca ccgcgatgca gcggataagc gtggttctca 1200
gccgggcgac cgaggttgaa cagacactcc agcaggtgct gtgcgtattg cacaatgacg 1260 ccttttgca gcacggcatg atctgtctgt acgacagcca gcaggcgatt ttgactattg 1320
aagcgttgca ggaagccgat cagcagttga tccccggcag ctcgcaaatt cgctaccgtc 1380
cgggtgaagg gctggtcggg acggtgcttt cgcaggggca atcgttagtg ctggcgcgtg 1440
tggctgacga tcagcgcttt cttgaccgcc tgggactgta tgattacaac ctgccgttta 1500
tcgccgtgcc gctgataggg ccggatgcgc agacttttgg cgtgctgacg gcgcaaccga 1560
tggcgcgtta cgaagagcgg ttacccgcct gcacccgctt tctggaaacg gtc 1613

<210> SEQ ID NO 179
<211> LENGTH: 1185
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2

<400> SEQUENCE: 179
tccctgtgcg ccgcgtcgcc gatggtggcc agccaactgg cgcgctaccc gatcctgctc 60
gatgaactgc tcgacccgaa cacgctctat caaccgacgg cgatgaacgc ctatcgcgat 120
gaactgcgac aatacctgtt gcgcgtgccg gaagaggatg aagagcagca actggaggcg 180
ctacggcagt ttaagcaggc gcagttgttg cgcgtagcgg cggcggatat cgccggtacg 240
ttacccgtca tgaaagtgag cgatcactta acctggctgg cggaagcgat tatcgatgcg 300
gtggtgcagc aagcctggaa ccagatggtg gcgcgttacg gccagccgac gcatctgcac 360
gatcgcgaag ggcgcggttt cgccgtggtc ggttacggca aacttggcgg ctgggaatta 420
ggttacagct ccgatctgga tctggtgttc ctgcacgact gccccatgga tgtgatgacc 480
gatggcgagc gtgaaatcga tggccgccag ttctatttgc gcctcgcgca gcgcgtgatg 540
cacctgttca gcacgcgcac gtcgtccggc attctttatg aagtcgatgc gcgtttgcgc 600
ccgtccggcg cggccggaat gctggtgacc actgcggaag cgttcgccga ttatcaaaaa 660
aatgaagcct ggacatggga gcatcaggcg ctggcgcgtg cgcgcgtggt gtacggcgat 720
ccgcaactga ccgccgaatt tgacgccatt cgccgcgata tcctgatgac ctcccgcgat 780
gccgctaccc tgcaaaccga agtgcgggaa atgcgtgaga aaatgcgcgc ccatcttggt 840
aacaagcaca aagaccgttt cgatctgaaa gccgatgaag gcggtatcac cgatattgag 900
tttatcgctc agtatctggt gctgcgcttt gcccatgaga agccgaaact gacgcgctgg 960
tcggataatg tgcgcatcct cgaagggctg gcgcaaaacg gcatcatgga tgagcaggaa 1020
gcgcaggcat tgacgctggc gtacaccacg ttgcgtgatg agctgcacca cctggcgctg 1080
caagagctgc caggacatgt ggcgctctcc tgttttgtcg ccgagcgtgc gcttatcaaa 1140
accagctggg acaagtggct ggtggaaccg tgcgccccgg cgtaa 1185

<210> SEQ ID NO 180
<211> LENGTH: 2085
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 with 500bp flank

<400> SEQUENCE: 180
taaagcgagc gctcacttac gtgatctgtt gacgcagtcc gaagcgacca ttacttcagc 60
cgtttcagca gatacggcgg tgtggagtgc gcaatcagcc ctggcgaaac tggtgctcac 120
cgagtggtta gtgacgcagg gctggcgaac cttccttgat gaaaaagcgc aggctaagtt 180
tgccgactcc tttaaacgct ttgctgacgt tcatctgtca cgcagcgccg ccgagctgaa 240
aaaagccttt gcccagccgc tgggcgacag ctatcgcgac cagttaccgc ggctggcgcg 300
tgatatcgac agcgcgttat tgctggccgg acattacgat cgcgcgcgcg ccgtggagtg 360
gctggaaaac tggcaggggc ttcagcacgc tattgaaacg cgccagagag ttgaaatcga 420
acatttccgt aataccgcca ttacccagga gccgttctgg ttgcacagcg gaaaacgtta 480
acgaaaggat atttcgcatg tccctgtgcg ccgcgtcgcc gatggtggcc agccaactgg 540
cgcgctaccc gatcctgctc gatgaactgc tcgacccgaa cacgctctat caaccgacgg 600
cgatgaacgc ctatcgcgat gaactgcgac aatacctgtt gcgcgtgccg gaagaggatg 660
aagagcagca actggaggcg ctacggcagt ttaagcaggc gcagttgttg cgcgtagcgg 720
cggcggatat cgccggtacg ttacccgtca tgaaagtgag cgatcactta acctggctgg 780
cggaagcgat tatcgatgcg gtggtgcagc aagcctggaa ccagatggtg gcgcgttacg 840
gccagccgac gcatctgcac gatcgcgaag ggcgcggttt cgccgtggtc ggttacggca 900
aacttggcgg ctgggaatta ggttacagct ccgatctgga tctggtgttc ctgcacgact 960
gccccatgga tgtgatgacc gatggcgagc gtgaaatcga tggccgccag ttctatttgc 1020
gcctcgcgca gcgcgtgatg cacctgttca gcacgcgcac gtcgtccggc attctttatg 1080
aagtcgatgc gcgtttgcgc ccgtccggcg cggccggaat gctggtgacc actgcggaag 1140
cgttcgccga ttatcaaaaa aatgaagcct ggacatggga gcatcaggcg ctggcgcgtg 1200
cgcgcgtggt gtacggcgat ccgcaactga ccgccgaatt tgacgccatt cgccgcgata 1260
tcctgatgac ctcccgcgat gccgctaccc tgcaaaccga agtgcgggaa atgcgtgaga 1320
aaatgcgcgc ccatcttggt aacaagcaca aagaccgttt cgatctgaaa gccgatgaag 1380
gcggtatcac cgatattgag tttatcgctc agtatctggt gctgcgcttt gcccatgaga 1440
agccgaaact gacgcgctgg tcggataatg tgcgcatcct cgaagggctg gcgcaaaacg 1500
gcatcatgga tgagcaggaa gcgcaggcat tgacgctggc gtacaccacg ttgcgtgatg 1560
agctgcacca cctggcgctg caagagctgc caggacatgt ggcgctctcc tgttttgtcg 1620
ccgagcgtgc gcttatcaaa accagctggg acaagtggct ggtggaaccg tgcgccccgg 1680
cgtaagtgtg gtatcatcgc gcgcaaattt tgtatctctc aggagacagg aatgaaagtt 1740
acgctgccag agttcaatca agccggtgtc atggtggtgg gtgatgtgat gctggatcgc 1800
tactggtacg gcccaaccag ccgcatttct ccggaagcgc cagttccggt tgttaaagtc 1860
gatactattg aagagcgacc gggcggtgcg gcaaacgtgg cgatgaacat tgcctcgctg 1920
ggcgcaacgg cgcgtctggt tggcctgact ggcattgatg atgcggcgcg cgcgctgagc 1980
aaagcgctgg cggatgttaa tgttaaatgt gacttcgttt ctgttccgac tcaccccacc 2040
atcactaagc tgcgcgtgct gtcgcgtaac cagcaactga ttcgc 2085

<210> SEQ ID NO 181
<211> LENGTH: 461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1

<400> SEQUENCE: 181
atgaccctga atatgatgat ggatgccagc cgttctgtaa taataaccgg acaattcgga 60
ctgattaaaa aagcgccctc gcggcgcttt ttttatattc tcgactccat ttaaaataaa 120
aaatccaatc ggatttcact atttaaactg gccattatct aagatgaatc cgatggaagc 180
tcgctgtttt aacacgcgtt ttttaacctt ttattgaaag tcggtgcttc tttgagcgaa 240
cgatcaaatt taagtggatt cccatcaaaa aaatattctc aacctaaaaa agtttgtgta 300
atacttgtaa cgctacatgg agattaactc aatctagagg gtattaataa tgaatcgtac 360
taaactggta ctgggcgcaa ctcacttcac gccccgaagg gggaagctgc ctgaccctac 420
gattcccgct atttcattca ctgaccggag gttcaaaatg a 461

<210> SEQ ID NO 182
<211> LENGTH: 1461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1 with 500bp flank

<400> SEQUENCE: 182
accggataag agagaaaagt gtcgacgtcg gtccggttga tattgaccgg cgcatccgcc 60

```
agctcgccca gtttttggtg gatctgtttg gcgattttgc gggtcttgcc ggtgtcggtg    120
ccgaaaaaaa taccaatatt tgccataaca cacgctcctg ttgaaaaaga gatcccgcgg    180
ggaaaatgcg gtgaacatgt cagctattgc gaagagtgtg ccagttttgc tcacgggcaa    240
aagctgcacc agaatgggta ttaatgcacc agcctggcgc tttttttcgc ggcacgtccc    300
ctcgctaatg cccgtctggc gcggctttga cgctgataag gcgctgaata ccgatctgga    360
tcaaggtttt gtcgggttat cgtccaaaag gtgcactctt tgcatggtta taagtgcctg    420
acatggtgtc cgggcgaacg tcgccaggtg gcacaaattg tcagaactac gacacgacta    480
accgaccgca ggagtgtgcg atgaccctga atatgatgat ggatgccagc cgttctgtaa    540
taataaccgg acaattcgga ctgattaaaa aagcgccctc gcggcgcttt ttttatattc    600
tcgactccat ttaaaataaa aaatccaatc ggatttcact atttaaactg gccattatct    660
aagatgaatc cgatggaagc tcgctgtttt aacacgcgtt ttttaacctt ttattgaaag    720
tcggtgcttc tttgagcgaa cgatcaaatt taagtggatt cccatcaaaa aaatattctc    780
aacctaaaaa agtttgtgta atacttgtaa cgctacatgg agattaactc aatctagagg    840
gtattaataa tgaatcgtac taaactggta ctgggcgcaa ctcacttcac gccccgaagg    900
gggaagctgc ctgaccctac gattcccgct atttcattca ctgaccggag gttcaaaatg    960
acccagcgaa ccgagtcggg taataccgtc tggcgcttcg atttatccca gcagttcacc   1020
gcgatgcagc ggataagcgt ggttctcagc cgggcgaccg aggttgaaca gacactccag   1080
caggtgctgt gcgtattgca caatgacgcc tttttgcagc acggcatgat ctgtctgtac   1140
gacagccagc aggcgatttt gactattgaa gcgttgcagg aagccgatca gcagttgatc   1200
cccggcagct cgcaaattcg ctaccgtccg ggtgaagggc tggtcgggac ggtgctttcg   1260
caggggcaat cgttagtgct ggcgcgtgtg gctgacgatc agcgctttct tgaccgcctg   1320
ggactgtatg attacaacct gccgtttatc gccgtgccgc tgatagggcc ggatgcgcag   1380
acttttggcg tgctgacggc gcaaccgatg gcgcgttacg aagagcggtt acccgcctgc   1440
acccgctttc tggaaacggt c                                             1461
```

<210> SEQ ID NO 183
<211> LENGTH: 1185
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2

<400> SEQUENCE: 183

```
tccctgtgcg ccgcgtcgcc gatggtggcc agccaactgg cgcgctaccc gatcctgctc     60
gatgaactgc tcgacccgaa cacgctctat caaccgacgg cgatgaacgc ctatcgcgat    120
gaactgcgac aatacctgtt gcgcgtgccg gaagaggatg aagagcagca actggaggcg    180
ctacggcagt ttaagcaggc gcagttgttg cgcgtagcgg cggcggatat cgccggtacg    240
ttacccgtca tgaaagtgag cgatcactta acctggctgg cggaagcgat tatcgatgcg    300
gtggtgcagc aagcctggaa ccagatggtg gcgcgttacg gccagccgac gcatctgcac    360
gatcgcgaag ggcgcggttt cgccgtggtc ggttacggca aacttggcgg ctgggaatta    420
ggttacagct ccgatctgga tctggtgttc ctgcacgact gccccatgga tgtgatgacc    480
gatggcgagc gtgaaatcga tggccgccag ttctatttgc gcctcgcgca gcgcgtgatg    540
```

cacctgttca gcacgcgcac gtcgtccggc attctttatg aagtcgatgc gcgtttgcgc 600
ccgtccggcg cggccggaat gctggtgacc actgcggaag cgttcgccga ttatcaaaaa 660
aatgaagcct ggacatggga gcatcaggcg ctggcgcgtg cgcgcgtggt gtacggcgat 720
ccgcaactga ccgccgaatt tgacgccatt cgccgcgata tcctgatgac ctcccgcgat 780
gccgctaccc tgcaaaccga agtgcgggaa atgcgtgaga aaatgcgcgc ccatcttggt 840
aacaagcaca aagaccgttt cgatctgaaa gccgatgaag gcggtatcac cgatattgag 900
tttatcgctc agtatctggt gctgcgcttt gcccatgaga agccgaaact gacgcgctgg 960
tcggataatg tgcgcatcct cgaagggctg gcgcaaaacg gcatcatgga tgagcaggaa 1020
gcgcaggcat tgacgctggc gtacaccacg ttgcgtgatg agctgcacca cctggcgctg 1080
caagagctgc caggacatgt ggcgctctcc tgttttgtcg ccgagcgtgc gcttatcaaa 1140
accagctggg acaagtggct ggtggaaccg tgcgccccgg cgtaa 1185

<210> SEQ ID NO 184
<211> LENGTH: 2085
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 with 500bp flank

<400> SEQUENCE: 184
taaagcgagc gctcacttac gtgatctgtt gacgcagtcc gaagcgacca ttacttcagc 60
cgtttcagca gatacggcgg tgtggagtgc gcaatcagcc ctggcgaaac tggtgctcac 120
cgagtggtta gtgacgcagg gctggcgaac cttccttgat gaaaaagcgc aggctaagtt 180
tgccgactcc tttaaacgct ttgctgacgt tcatctgtca cgcagcgccg ccgagctgaa 240
aaaagccttt gcccagccgc tgggcgacag ctatcgcgac cagttaccgc ggctggcgcg 300
tgatatcgac agcgcgttat tgctggccgg acattacgat cgcgcgcgcg ccgtggagtg 360
gctggaaaac tggcaggggc ttcagcacgc tattgaaacg cgccagagag ttgaaatcga 420
acatttccgt aataccgcca ttacccagga gccgttctgg ttgcacagcg gaaaacgtta 480
acgaaaggat atttcgcatg tccctgtgcg ccgcgtcgcc gatggtggcc agccaactgg 540
cgcgctaccc gatcctgctc gatgaactgc tcgacccgaa cacgctctat caaccgacgg 600
cgatgaacgc ctatcgcgat gaactgcgac aatacctgtt gcgcgtgccg gaagaggatg 660
aagagcagca actggaggcg ctacggcagt ttaagcaggc gcagttgttg cgcgtagcgg 720
cggcggatat cgccggtacg ttacccgtca tgaaagtgag cgatcactta acctggctgg 780
cggaagcgat tatcgatgcg gtggtgcagc aagcctggaa ccagatggtg gcgcgttacg 840
gccagccgac gcatctgcac gatcgcgaag ggcgcggttt cgccgtggtc ggttacggca 900
aacttggcgg ctgggaatta ggttacagct ccgatctgga tctggtgttc ctgcacgact 960
gccccatgga tgtgatgacc gatggcgagc gtgaaatcga tggccgccag ttctatttgc 1020
gcctcgcgca gcgcgtgatg cacctgttca gcacgcgcac gtcgtccggc attctttatg 1080
aagtcgatgc gcgtttgcgc ccgtccggcg cggccggaat gctggtgacc actgcggaag 1140
cgttcgccga ttatcaaaaa aatgaagcct ggacatggga gcatcaggcg ctggcgcgtg 1200
cgcgcgtggt gtacggcgat ccgcaactga ccgccgaatt tgacgccatt cgccgcgata 1260
tcctgatgac ctcccgcgat gccgctaccc tgcaaaccga agtgcgggaa atgcgtgaga 1320
aaatgcgcgc ccatcttggt aacaagcaca aagaccgttt cgatctgaaa gccgatgaag 1380
gcggtatcac cgatattgag tttatcgctc agtatctggt gctgcgcttt gcccatgaga 1440
agccgaaact gacgcgctgg tcggataatg tgcgcatcct cgaagggctg gcgcaaaacg 1500
gcatcatgga tgagcaggaa gcgcaggcat tgacgctggc gtacaccacg ttgcgtgatg 1560
agctgcacca cctggcgctg caagagctgc caggacatgt ggcgctctcc tgttttgtcg 1620
ccgagcgtgc gcttatcaaa accagctggg acaagtggct ggtggaaccg tgcgccccgg 1680
cgtaagtgtg gtatcatcgc gcgcaaattt tgtatctctc aggagacagg aatgaaagtt 1740
acgctgccag agttcaatca agccggtgtc atggtggtgg gtgatgtgat gctggatcgc 1800
tactggtacg gcccaaccag ccgcatttct ccggaagcgc cagttccggt tgttaaagtc 1860
gatactattg aagagcgacc gggcggtgcg gcaaacgtgg cgatgaacat tgcctcgctg 1920
ggcgcaacgg cgcgtctggt tggcctgact ggcattgatg atgcggcgcg cgcgctgagc 1980
aaagcgctgg cggatgttaa tgttaaatgt gacttcgttt ctgttccgac tcaccccacc 2040
atcactaagc tgcgcgtgct gtcgcgtaac cagcaactga ttcgc 2085

<210> SEQ ID NO 185
<211> LENGTH: 461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1

<400> SEQUENCE: 185
atgaccctga atatgatgat ggatgccagc cgttctgtaa taataaccgg acaattcgga 60
ctgattaaaa aagcgccctc gcggcgcttt ttttatattc tcgactccat ttaaaataaa 120
aaatccaatc ggatttcact atttaaactg gccattatct aagatgaatc cgatggaagc 180
tcgctgtttt aacacgcgtt ttttaacctt ttattgaaag tcggtgcttc tttgagcgaa 240
cgatcaaatt taagtggatt cccatcaaaa aaatattctc aacctaaaaa agtttgtgta 300
atacttgtaa cgctacatgg agattaactc aatctagagg gtattaataa tgaatcgtac 360
taaactggta ctgggcgcaa ctcacttcac gccccgaagg gggaagctgc ctgaccctac 420
gattcccgct atttcattca ctgaccggag gttcaaaatg a 461

<210> SEQ ID NO 186
<211> LENGTH: 1461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1 with 500bp flank

<400> SEQUENCE: 186
accggataag agagaaaagt gtcgacgtcg gtccggttga tattgaccgg cgcatccgcc 60
agctcgccca gtttttggtg gatctgtttg gcgattttgc gggtcttgcc ggtgtcggtg 120
ccgaaaaaaa taccaatatt tgccataaca cacgctcctg ttgaaaaaga gatcccgcgg 180
ggaaaatgcg gtgaacatgt cagctattgc gaagagtgtg ccagttttgc tcacgggcaa 240
aagctgcacc agaatgggta ttaatgcacc agcctggcgc tttttttcgc ggcacgtccc 300
ctcgctaatg cccgtctggc gcggctttga cgctgataag gcgctgaata ccgatctgga 360
tcaaggtttt gtcgggttat cgtccaaaag gtgcactctt tgcatggtta taagtgcctg 420
acatggtgtc cgggcgaacg tcgccaggtg gcacaaattg tcagaactac gacacgacta 480
accgaccgca ggagtgtgcg atgaccctga atatgatgat ggatgccagc cgttctgtaa 540
taataaccgg acaattcgga ctgattaaaa aagcgccctc gcggcgcttt ttttatattc 600
tcgactccat ttaaaataaa aaatccaatc ggatttcact atttaaactg gccattatct 660
aagatgaatc cgatggaagc tcgctgtttt aacacgcgtt ttttaacctt ttattgaaag 720
tcggtgcttc tttgagcgaa cgatcaaatt taagtggatt cccatcaaaa aaatattctc 780
aacctaaaaa agtttgtgta atacttgtaa cgctacatgg agattaactc aatctagagg 840
gtattaataa tgaatcgtac taaactggta ctgggcgcaa ctcacttcac gccccgaagg 900
gggaagctgc ctgaccctac gattcccgct atttcattca ctgaccggag gttcaaaatg 960
acccagcgaa ccgagtcggg taataccgtc tggcgcttcg atttatccca gcagttcacc 1020
gcgatgcagc ggataagcgt ggttctcagc cgggcgaccg aggttgaaca gacactccag 1080
caggtgctgt gcgtattgca caatgacgcc tttttgcagc acggcatgat ctgtctgtac 1140
gacagccagc aggcgatttt gactattgaa gcgttgcagg aagccgatca gcagttgatc 1200
cccggcagct cgcaaattcg ctaccgtccg ggtgaagggc tggtcgggac ggtgctttcg 1260
caggggcaat cgttagtgct ggcgcgtgtg gctgacgatc agcgctttct tgaccgcctg 1320
ggactgtatg attacaacct gccgtttatc gccgtgccgc tgatagggcc ggatgcgcag 1380
acttttggcg tgctgacggc gcaaccgatg gcgcgttacg aagagcggtt acccgcctgc 1440
acccgctttc tggaaacggt c 1461

<210> SEQ ID NO 187
<211> LENGTH: 1185
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2

<400> SEQUENCE: 187
tccctgtgcg ccgcgtcgcc gatggtggcc agccaactgg cgcgctaccc gatcctgctc 60
gatgaactgc tcgacccgaa cacgctctat caaccgacgg cgatgaacgc ctatcgcgat 120
gaactgcgac aatacctgtt gcgcgtgccg gaagaggatg aagagcagca actggaggcg 180
ctacggcagt ttaagcaggc gcagttgttg cgcgtagcgg cggcggatat cgccggtacg 240
ttacccgtca tgaaagtgag cgatcactta acctggctgg cggaagcgat tatcgatgcg 300
gtggtgcagc aagcctggaa ccagatggtg gcgcgttacg gccagccgac gcatctgcac 360
gatcgcgaag ggcgcggttt cgccgtggtc ggttacggca aacttggcgg ctgggaatta 420
ggttacagct ccgatctgga tctggtgttc ctgcacgact gccccatgga tgtgatgacc 480
gatggcgagc gtgaaatcga tggccgccag ttctatttgc gcctcgcgca gcgcgtgatg 540
cacctgttca gcacgcgcac gtcgtccggc attctttatg aagtcgatgc gcgtttgcgc 600
ccgtccggcg cggccggaat gctggtgacc actgcggaag cgttcgccga ttatcaaaaa 660
aatgaagcct ggacatggga gcatcaggcg ctggcgcgtg cgcgcgtggt gtacggcgat 720
ccgcaactga ccgccgaatt tgacgccatt cgccgcgata tcctgatgac ctcccgcgat 780
gccgctaccc tgcaaaccga agtgcgggaa atgcgtgaga aaatgcgcgc ccatcttggt 840
aacaagcaca aagaccgttt cgatctgaaa gccgatgaag gcggtatcac cgatattgag 900
tttatcgctc agtatctggt gctgcgcttt gcccatgaga agccgaaact gacgcgctgg 960
tcggataatg tgcgcatcct cgaagggctg gcgcaaaacg gcatcatgga tgagcaggaa 1020
gcgcaggcat tgacgctggc gtacaccacg ttgcgtgatg agctgcacca cctggcgctg 1080
caagagctgc caggacatgt ggcgctctcc tgttttgtcg ccgagcgtgc gcttatcaaa 1140
accagctggg acaagtggct ggtggaaccg tgcgccccgg cgtaa 1185

<210> SEQ ID NO 188
<211> LENGTH: 2085
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 with 500bp flank

<400> SEQUENCE: 188
taaagcgagc gctcacttac gtgatctgtt gacgcagtcc gaagcgacca ttacttcagc 60
cgtttcagca gatacggcgg tgtggagtgc gcaatcagcc ctggcgaaac tggtgctcac 120
cgagtggtta gtgacgcagg gctggcgaac cttccttgat gaaaaagcgc aggctaagtt 180
tgccgactcc tttaaacgct ttgctgacgt tcatctgtca cgcagcgccg ccgagctgaa 240
aaaagccttt gcccagccgc tgggcgacag ctatcgcgac cagttaccgc ggctggcgcg 300
tgatatcgac agcgcgttat tgctggccgg acattacgat cgcgcgcgcg ccgtggagtg 360
gctggaaaac tggcaggggc ttcagcacgc tattgaaacg cgccagagag ttgaaatcga 420
acatttccgt aataccgcca ttacccagga gccgttctgg ttgcacagcg gaaaacgtta 480
acgaaaggat atttcgcatg tccctgtgcg ccgcgtcgcc gatggtggcc agccaactgg 540
cgcgctaccc gatcctgctc gatgaactgc tcgacccgaa cacgctctat caaccgacgg 600
cgatgaacgc ctatcgcgat gaactgcgac aatacctgtt gcgcgtgccg gaagaggatg 660
aagagcagca actggaggcg ctacggcagt ttaagcaggc gcagttgttg cgcgtagcgg 720
cggcggatat cgccggtacg ttacccgtca tgaaagtgag cgatcactta acctggctgg 780
cggaagcgat tatcgatgcg gtggtgcagc aagcctggaa ccagatggtg gcgcgttacg 840
gccagccgac gcatctgcac gatcgcgaag ggcgcggttt cgccgtggtc ggttacggca 900
aacttggcgg ctgggaatta ggttacagct ccgatctgga tctggtgttc ctgcacgact 960
gccccatgga tgtgatgacc gatggcgagc gtgaaatcga tggccgccag ttctatttgc 1020
gcctcgcgca gcgcgtgatg cacctgttca gcacgcgcac gtcgtccggc attctttatg 1080
aagtcgatgc gcgtttgcgc ccgtccggcg cggccggaat gctggtgacc actgcggaag 1140
cgttcgccga ttatcaaaaa aatgaagcct ggacatggga gcatcaggcg ctggcgcgtg 1200
cgcgcgtggt gtacggcgat ccgcaactga ccgccgaatt tgacgccatt cgccgcgata 1260
tcctgatgac ctcccgcgat gccgctaccc tgcaaaccga agtgcgggaa atgcgtgaga 1320
aaatgcgcgc ccatcttggt aacaagcaca aagaccgttt cgatctgaaa gccgatgaag 1380
gcggtatcac cgatattgag tttatcgctc agtatctggt gctgcgcttt gcccatgaga 1440
agccgaaact gacgcgctgg tcggataatg tgcgcatcct cgaagggctg gcgcaaaacg 1500
gcatcatgga tgagcaggaa gcgcaggcat tgacgctggc gtacaccacg ttgcgtgatg 1560
agctgcacca cctggcgctg caagagctgc caggacatgt ggcgctctcc tgttttgtcg 1620
ccgagcgtgc gcttatcaaa accagctggg acaagtggct ggtggaaccg tgcgccccgg 1680
cgtaagtgtg gtatcatcgc gcgcaaattt tgtatctctc aggagacagg aatgaaagtt 1740

```
acgctgccag agttcaatca agccggtgtc atggtggtgg gtgatgtgat gctggatcgc   1800

tactggtacg gcccaaccag ccgcatttct ccggaagcgc cagttccggt tgttaaagtc   1860

gatactattg aagagcgacc gggcggtgcg gcaaacgtgg cgatgaacat tgcctcgctg   1920

ggcgcaacgg cgcgtctggt tggcctgact ggcattgatg atgcggcgcg cgcgctgagc   1980

aaagcgctgg cggatgttaa tgttaaatgt gacttcgttt ctgttccgac tcaccccacc   2040

atcactaagc tgcgcgtgct gtcgcgtaac cagcaactga ttcgc                   2085
```

<210> SEQ ID NO 189
<211> LENGTH: 452
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm7

<400> SEQUENCE: 189

```
atgaccctga atatgatgat ggatgccagc cgcgtcaggt tgaacgtaaa aaagtcggtc     60

tgcgcaaagc acgtcgtcgt ccgcagttct ccaaacgtta attggtttct gcttcggcag    120

aacgattggc gaaaaaaccc ggtgcgaacc gggttttttt atggataaag atcgtgttat    180

ccacagcaat ccattgatta tctcttcttt ttcagcattt ccagaatccc ctcaccacaa    240

agcccgcaaa atctggtaaa ctatcatcca attttctgcc caaatggctg ggattgttca    300

tttttgttt gccttacaac gagagtgaca gtacgcgcgg gtagttaact caacatctga     360

ccggtcgata actcacttca cgccccgaag gggaagctg cctgacccta cgattcccgc     420

tatttcattc actgaccgga ggttcaaaat ga                                  452
```

<210> SEQ ID NO 190
<211> LENGTH: 1451
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm7 with 500bp flank

<400> SEQUENCE: 190

```
accggataag agagaaaagt gtcgacgtcg gtccggttga tattgaccgg cgcatccgcc     60

agctcgccca gtttttggtg gatctgtttg gcgattttgc gggtcttgcc ggtgtcggtg    120

ccgaaaaaaa taccaatatt tgccataaca cacgctcctg ttgaaaaaga gatcccgcgg    180

ggaaaatgcg gtgaacatgt cagctattgc gaagagtgtg ccagttttgc tcacgggcaa    240

aagctgcacc agaatgggta ttaatgcacc agcctggcgc tttttttcgc ggcacgtccc    300

ctcgctaatg cccgtctggc gcggctttga cgctgataag gcgctgaata ccgatctgga    360

tcaaggtttt gtcgggttat cgtccaaaag gtgcactctt tgcatggtta taagtgcctg    420

acatggtgtc cgggcgaacg tcgccaggtg gcacaaattg tcagaactac gacacgacta    480

accgaccgca ggagtgtgcg atgaccctga atatgatgat ggatgccagc cgcgtcaggt    540

tgaacgtaaa aaagtcggtc tgcgcaaagc acgtcgtcgt ccgcagttct ccaaacgtta    600

attggtttct gcttcggcag aacgattggc gaaaaaaccc ggtgcgaacc gggttttttt    660

atggataaag atcgtgttat ccacagcaat ccattgatta tctcttcttt ttcagcattt    720

ccagaatccc ctcaccacaa agcccgcaaa atctggtaaa ctatcatcca attttctgcc    780

caaatggctg ggattgttca tttttgttt gccttacaac gagagtgaca gtacgcgcgg     840
```

gtagttaact caacatctga ccggtcgata actcacttca cgccccgaag ggggaagctg 900
cctgacccta cgattcccgc tatttcattc actgaccgga ggttcaaaat gacccagcga 960
accgagtcgg gtaataccgt ctggcgcttc gatttatccc agcagttcac cgcgatgcag 1020
cggataagcg tggttctcag ccgggcgacc gaggttgaac agacactcca gcaggtgctg 1080
tgcgtattgc acaatgacgc ctttttgcag cacggcatga tctgtctgta cgacagccag 1140
caggcgattt tgactattga agcgttgcag gaagccgatc agcagttgat ccccggcagc 1200
tcgcaaattc gctaccgtcc gggtgaaggg ctggtcggga cggtgctttc gcaggggcaa 1260
tcgttagtgc tggcgcgtgt ggctgacgat cagcgctttc ttgaccgcct gggactgtat 1320
gattacaacc tgccgtttat cgccgtgccg ctgatagggc cggatgcgca gacttttggc 1380
gtgctgacgg cgcaaccgat ggcgcgttac gaagagcggt tacccgcctg cacccgcttt 1440
ctggaaacgg t 1451

<210> SEQ ID NO 191
<211> LENGTH: 1191
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2

<400> SEQUENCE: 191
atggcgctga agcacctgat cacgctctgc gcggcgtcgc cgatggtcgc cagccagctg 60
gcgcgccacc cgctgctgct ggatgagctg ctggatccca acaccctcta tcagccgacg 120
gcgaccgatg cctatcgcga cgagctgcgc cagtacctgc tgcgcgtgcc ggaagaggat 180
gaagagcagc agctggaggc gttgcgccag tttaagcagg cgcagcagct gcatatcgcg 240
gcggcggata tcgctggtac cctgccggtg atgaaggtca gcgatcactt aacctggctt 300
gccgaagcga tcctcgacgc ggtggtgcag caggcatggg ggcagatggt cgctcgctac 360
ggccagccga cccacctgca cgatcgccag ggtcgcggct tcgccgtcgt cggctacggt 420
aagcttggcg gctgggagct gggctacagc tccgatctcg atctggtgtt cctccatgac 480
tgcccggcgg aggtgatgac cgacggcgag cgggagattg acggccgtca gttctacctg 540
cggctggccc agcggatcat gcacctgttc agcacccgca cctcgtccgg tattctctac 600
gaagtggacg cccggctgcg tccttctggc gcggcgggga tgctggtcac caccgccgac 660
gcgtttgctg actatcagca gaacgaagcc tggacgtggg aacatcaggc gctggtgcgc 720
gcccgcgtgg tctatggcga cccggcgctg caggcgcgct ttgacgccat tcgtcgcgat 780
atcctgacca ccccgcggga ggggatgacc ctgcagaccg aggttcgcga gatgcgcgag 840
aagatgcgcg cccaccttgg caacaaacat cccgatcgtt ttgatatcaa agccgatgcc 900
ggcgggatca ccgatattga atttattact cagtatctgg tcctacgcta tgccagtgac 960
aagccgaagc tgacccgctg gtctgacaac gtgcgtattc ttgagctgct ggcgcagaac 1020
gacatcatgg acgaggagga ggcgcgcgcc ttaacgcatg cgtacaccac cttgcgtgat 1080
gcgctccatc acctggccct gcaggagcag ccgggacacg tggcgccaga ggccttcagc 1140
cgggagcgtc agcaggtcag cgccagctgg cagaagtggc tgatggctta a 1191

<210> SEQ ID NO 192
<211> LENGTH: 2191
<212> TYPE: DNA

<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 with 500bp flank

<400> SEQUENCE: 192
cgtaaggcga ccacccagct ccgcgcgttg ctgaacgacg ctgaagccgt tctgctggcc 60
gcggacaccg ccgacgaggc gttattccgc accgaggtcg tcggcgccaa actggccctg 120
actgaatggc tggtccagcg cggctggcgt ccgttcctca acgaggcagg agagaaaaaa 180
atagccggat cgttcaaacg gtttgccgat attaacctct cgcgggtggc ggccgagctg 240
cgcagcgccg tgcagcatct ggcggttgaa gatgccgccg accagttgcc gaagctgtcc 300
cgcgacatcg acagcgtcca gctgctggcg ggcgcctatg gcgacgccgt cgcgccgtgg 360
ctggagaact ggcaggagct tcaccgtgca atagcacatg acgatcgcag cgtctttgaa 420
tatttccgtc gccaggcgct ggctgccgag ccgttctggc tgcatagtgg aaaacgataa 480
tttcaggcca gggagccctt atggcgctga agcacctgat cacgctctgc gcggcgtcgc 540
cgatggtcgc cagccagctg gcgcgccacc cgctgctgct ggatgagctg ctggatccca 600
acaccctcta tcagccgacg gcgaccgatg cctatcgcga cgagctgcgc cagtacctgc 660
tgcgcgtgcc ggaagaggat gaagagcagc agctggaggc gttgcgccag tttaagcagg 720
cgcagcagct gcatatcgcg gcggcggata tcgctggtac cctgccggtg atgaaggtca 780
gcgatcactt aacctggctt gccgaagcga tcctcgacgc ggtggtgcag caggcatggg 840
ggcagatggt cgctcgctac ggccagccga cccacctgca cgatcgccag ggtcgcggct 900
tcgccgtcgt cggctacggt aagcttggcg gctgggagct gggctacagc tccgatctcg 960
atctggtgtt cctccatgac tgcccggcgg aggtgatgac cgacggcgag cgggagattg 1020
acggccgtca gttctacctg cggctggccc agcggatcat gcacctgttc agcacccgca 1080
cctcgtccgg tattctctac gaagtggacg cccggctgcg tccttctggc gcggcgggga 1140
tgctggtcac caccgccgac gcgtttgctg actatcagca gaacgaagcc tggacgtggg 1200
aacatcaggc gctggtgcgc gcccgcgtgg tctatggcga cccggcgctg caggcgcgct 1260
ttgacgccat tcgtcgcgat atcctgacca ccccgcggga ggggatgacc ctgcagaccg 1320
aggttcgcga gatgcgcgag aagatgcgcg cccaccttgg caacaaacat cccgatcgtt 1380
ttgatatcaa agccgatgcc ggcgggatca ccgatattga atttattact cagtatctgg 1440
tcctacgcta tgccagtgac aagccgaagc tgacccgctg gtctgacaac gtgcgtattc 1500
ttgagctgct ggcgcagaac gacatcatgg acgaggagga ggcgcgcgcc ttaacgcatg 1560
cgtacaccac cttgcgtgat gcgctccatc acctggccct gcaggagcag ccgggacacg 1620
tggcgccaga ggccttcagc cgggagcgtc agcaggtcag cgccagctgg cagaagtggc 1680
tgatggctta actataaaat cgggtgtgct attatcgcgc gcaaagtttg cgtctcgcag 1740
gagagagtca tgaaagtaac gctgccggag tttgaacgtg caggagtgtt ggtggtgggt 1800
gatgtgatgc tggaccgcta ctggtacggc ccaccagtc gtatttcccc ggaagccccg 1860
gtgccggtgg tgaaggtgga aaatatcgaa gaacgtcctg gcggcgcggc aaacgtagcg 1920
atgaacatcg cctccctggg ggcaacgtcg cgcctggtgg gattgaccgg gattgatgac 1980
gctgcccgcg cgctgagcca ggcgctggcc aatgtgaatg tgaagtgcga cttcgtctcc 2040
gtcccgactc acccgaccat caccaagctg cgggtgctgt cgcgcaatca gcagctgatc 2100
cgcctcgact ttgaagaggg cttctccggc gtggatccgc agccgatgca tgagcgcatt 2160
cagcaggcgc tgggagccat tggcgcactg g 2191

<210> SEQ ID NO 193
<211> LENGTH: 613
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::PinfC

<400> SEQUENCE: 193
atgaccctga atatgatgct agaagcgtca ggtaccggtc atgattcacc gtgcgattct 60
cggttccctg gagcgcttca ttggcatcct gaccgaagag ttcgctggct tcttcccaac 120
ctggattgca ccagtgcagg tagtggtcat gaatattacc gattctcagg ctgaatacgt 180
taacgaattg acgcgtaaac tacaaaatgc gggcattcgt gtaaaagcag acttgagaaa 240
tgagaagatt ggctttaaaa tccgcgagca cactttacgt cgtgtcccgt atatgttggt 300
ctgtggcgac aaagaagtcg aagccggcaa agtggccgtg cgcacccgtc gcgggaaaga 360
cctcggcagc atggacgtaa gtgaagtgat tgagaagctg caacaagaga ttcgcagccg 420
cagtcttcaa caactggagg aataaggtat taaaggcgga aaacgagttc aaacggcacg 480
tccgaatcgt atcaatggcg agattcgcgc cctggaagtt cgcgccattg agctggcttc 540
ccgaccgcag ggcggcacct gcctgaccct gcgtttcccg ctgtttaaca ccctgaccgg 600
aggtgaagca tga 613

<210> SEQ ID NO 194
<211> LENGTH: 1613
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::PinfC with 500bp flank

<400> SEQUENCE: 194
ggccgtcgcc cagcgtcggc gtccccaaca gcagggccgg gtaggccagc aggtccgcca 60
gcgtggcgcg gttaatattg accggggcgg cggcggcctc ccccagctgc ttgtggatca 120
ttttcgcgat cttgcgggtt ttaccggtat cggtaccaaa gaaaatgcca atgttcgcca 180
tagtacgctc ctgtcggaat ggtgttgaaa aaaggaatga cgacagaggt attgcgaagg 240
ctgtgccagg ttgccctgca ccgcgacggc ccatccctgc cccatcagga tcgcttcgca 300
tcacgatgcc gcgcgccaaa ggcgcacccg gcggggcgaa aggtaaaaat ccgtgaattt 360
tccccctgtc ggatcaatgt ttcgcgtggt cgttccgata agggcgcaca ctttgcatgg 420
ttatccgggt tcggcttacc ccgccgcgtt ttgcgcacgg tgtcggacaa tttgtcataa 480
ctgcgacaca ggagtttgcg atgaccctga atatgatgct agaagcgtca ggtaccggtc 540
atgattcacc gtgcgattct cggttccctg gagcgcttca ttggcatcct gaccgaagag 600
ttcgctggct tcttcccaac ctggattgca ccagtgcagg tagtggtcat gaatattacc 660
gattctcagg ctgaatacgt taacgaattg acgcgtaaac tacaaaatgc gggcattcgt 720
gtaaaagcag acttgagaaa tgagaagatt ggctttaaaa tccgcgagca cactttacgt 780
cgtgtcccgt atatgttggt ctgtggcgac aaagaagtcg aagccggcaa agtggccgtg 840
cgcacccgtc gcgggaaaga cctcggcagc atggacgtaa gtgaagtgat tgagaagctg 900
caacaagaga ttcgcagccg cagtcttcaa caactggagg aataaggtat taaaggcgga 960
aaacgagttc aaacggcacg tccgaatcgt atcaatggcg agattcgcgc cctggaagtt 1020
cgcgccattg agctggcttc ccgaccgcag ggcggcacct gcctgaccct gcgtttcccg 1080
ctgtttaaca ccctgaccgg aggtgaagca tgatccctga atccgacccg gacaccaccg 1140
tcagacgctt cgacctctct cagcagttca ccgccatgca gcggataagc gtggtgctga 1200
gccgggccac cgaggccagc aaaacgctgc aggaggtgct cagcgtatta cacaacgatg 1260
cctttatgca gcacgggatg atctgcctgt acgacagcga gcaggagatc ctcagtatcg 1320
aagcgctgca gcaaaccggc cagcagcccc tccccggcag cacgcagatc cgctatcgcc 1380
ccggcgaggg actggtgggg accgtgctgg cccaggggca gtcgctggtg ctgccccggg 1440
tcgccgacga tcagcgtttt ctcgaccgcc tgagcctcta cgattacgat ctgccgttta 1500
tcgccgtacc gttgatgggg cccaacgccc ggccaatagg ggtgctggcg gcccagccga 1560
tggcgcgcca ggaagagcgg ctgccggcct gcacccgttt tctcgaaacc gtc 1613

<210> SEQ ID NO 195
<211> LENGTH: 1155
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 36bp deletion

<400> SEQUENCE: 195
atggcgctga agcacctgat cacgctctgc gcggcgtcgc cgatggtcgc cagccagctg 60
gcgcgccacc cgctgctgct ggatgagctg ctggatccca acaccctcta tcagccgacg 120
gcgaccgatg cctatcgcga cgagctgcgc cagtacctgc tgcgcgtgcc ggaagaggat 180
gaagagcagc agctgcatat cgcggcggcg gatatcgctg gtaccctgcc ggtgatgaag 240
gtcagcgatc acttaacctg gcttgccgaa gcgatcctcg acgcggtggt gcagcaggca 300
tgggggcaga tggtcgctcg ctacggccag ccgacccacc tgcacgatcg ccagggtcgc 360
ggcttcgccg tcgtcggcta cggtaagctt ggcggctggg agctgggcta cagctccgat 420
ctcgatctgg tgttcctcca tgactgcccg gcggaggtga tgaccgacgg cgagcgggag 480
attgacggcc gtcagttcta cctgcggctg gcccagcgga tcatgcacct gttcagcacc 540
cgcacctcgt ccggtattct ctacgaagtg gacgcccggc tgcgtccttc tggcgcggcg 600
gggatgctgg tcaccaccgc cgacgcgttt gctgactatc agcagaacga agcctggacg 660
tgggaacatc aggcgctggt gcgcgcccgc gtggtctatg gcgacccggc gctgcaggcg 720
cgctttgacg ccattcgtcg cgatatcctg accaccccgc gggaggggat gaccctgcag 780
accgaggttc gcgagatgcg cgagaagatg cgcgcccacc ttggcaacaa acatcccgat 840
cgttttgata tcaaagccga tgccggcggg atcaccgata ttgaatttat tactcagtat 900
ctggtcctac gctatgccag tgacaagccg aagctgaccc gctggtctga caacgtgcgt 960
attcttgagc tgctggcgca gaacgacatc atggacgagg aggaggcgcg cgccttaacg 1020
catgcgtaca ccaccttgcg tgatgcgctc catcacctgg ccctgcagga gcagccggga 1080
cacgtggcgc cagaggcctt cagccgggag cgtcagcagg tcagcgccag ctggcagaag 1140
tggctgatgg cttaa 1155

<210> SEQ ID NO 196
<211> LENGTH: 2155

<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 36bp deletion

<400> SEQUENCE: 196
cgtaaggcga ccacccagct ccgcgcgttg ctgaacgacg ctgaagccgt tctgctggcc 60
gcggacaccg ccgacgaggc gttattccgc accgaggtcg tcggcgccaa actggccctg 120
actgaatggc tggtccagcg cggctggcgt ccgttcctca acgaggcagg agagaaaaaa 180
atagccggat cgttcaaacg gtttgccgat attaacctct cgcgggtggc ggccgagctg 240
cgcagcgccg tgcagcatct ggcggttgaa gatgccgccg accagttgcc gaagctgtcc 300
cgcgacatcg acagcgtcca gctgctggcg ggcgcctatg gcgacgccgt cgcgccgtgg 360
ctggagaact ggcaggagct tcaccgtgca atagcacatg acgatcgcag cgtctttgaa 420
tatttccgtc gccaggcgct ggctgccgag ccgttctggc tgcatagtgg aaaacgataa 480
tttcaggcca gggagccctt atggcgctga agcacctgat cacgctctgc gcggcgtcgc 540
cgatggtcgc cagccagctg gcgcgccacc cgctgctgct ggatgagctg ctggatccca 600
acaccctcta tcagccgacg gcgaccgatg cctatcgcga cgagctgcgc cagtacctgc 660
tgcgcgtgcc ggaagaggat gaagagcagc agctgcatat cgcggcggcg gatatcgctg 720
gtaccctgcc ggtgatgaag gtcagcgatc acttaacctg gcttgccgaa gcgatcctcg 780
acgcggtggt gcagcaggca tgggggcaga tggtcgctcg ctacggccag ccgacccacc 840
tgcacgatcg ccagggtcgc ggcttcgccg tcgtcggcta cggtaagctt ggcggctggg 900
agctgggcta cagctccgat ctcgatctgg tgttcctcca tgactgcccg gcggaggtga 960
tgaccgacgg cgagcgggag attgacggcc gtcagttcta cctgcggctg gcccagcgga 1020
tcatgcacct gttcagcacc cgcacctcgt ccggtattct ctacgaagtg gacgcccggc 1080
tgcgtccttc tggcgcggcg gggatgctgg tcaccaccgc cgacgcgttt gctgactatc 1140
agcagaacga agcctggacg tgggaacatc aggcgctggt gcgcgcccgc gtggtctatg 1200
gcgacccggc gctgcaggcg cgctttgacg ccattcgtcg cgatatcctg accaccccgc 1260
gggaggggat gaccctgcag accgaggttc gcgagatgcg cgagaagatg cgcgcccacc 1320
ttggcaacaa acatcccgat cgttttgata tcaaagccga tgccggcggg atcaccgata 1380
ttgaatttat tactcagtat ctggtcctac gctatgccag tgacaagccg aagctgaccc 1440
gctggtctga caacgtgcgt attcttgagc tgctggcgca gaacgacatc atggacgagg 1500
aggaggcgcg cgccttaacg catgcgtaca cccaccttgcg tgatgcgctc catcacctgg 1560
ccctgcagga gcagccggga cacgtggcgc cagaggcctt cagccgggag cgtcagcagg 1620
tcagcgccag ctggcagaag tggctgatgg cttaactata aaatcgggtg tgctattatc 1680
gcgcgcaaag tttgcgtctc gcaggagaga gtcatgaaag taacgctgcc ggagtttgaa 1740
cgtgcaggag tgttggtggt gggtgatgtg atgctggacc gctactggta cggccccacc 1800
agtcgtattt ccccggaagc cccggtgccg gtggtgaagg tggaaaatat cgaagaacgt 1860
cctggcggcg cggcaaacgt agcgatgaac atcgcctccc tgggggcaac gtcgcgcctg 1920
gtgggattga ccgggattga tgacgctgcc cgcgcgctga gccaggcgct ggccaatgtg 1980
aatgtgaagt gcgacttcgt ctccgtcccg actcacccga ccatcaccaa gctgcgggtg 2040
ctgtcgcgca atcagcagct gatccgcctc gactttgaag agggcttctc cggcgtggat 2100
ccgcagccga tgcatgagcg cattcagcag gcgctgggag ccattggcgc actgg 2155

<210> SEQ ID NO 197
<211> LENGTH: 412
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm8.2

<400> SEQUENCE: 197
atgaccctga atatgatgct cgacgccgtc ctcgcagtac cattgcaacc gactttacag 60
caagaagtga ttctggcacg catggaacaa attcttgcca gtcgggcttt atccgatgac 120
gaacgcgcac agcttttata tgagcgcgga gtgttgtatg atagtctcgg tctgagggca 180
ttagcgcgaa atgatttttc acaagcgctg gcaatccgac ccgatatgcc tgaagtattc 240
aattacttag gcatttactt aacgcaggca ggcaattttg atgctgccta tgaagcgttt 300
gattctgtac ttgagcttga tcgccattga gctggcttcc cgaccgcagg gcggcacctg 360
cctgaccctg cgtttcccgc tgtttaacac cctgaccgga ggtgaagcat ga 412

<210> SEQ ID NO 198
<211> LENGTH: 1389
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm8.2 with 500bp flank

<400> SEQUENCE: 198
cccaacagca gggccgggta ggccagcagg tccgccagcg tggcgcggtt aatattgacc 60
ggggcggcgg cggcctcccc cagctgcttg tggatcattt tcgcgatctt gcgggtttta 120
ccggtatcgg taccaaagaa aatgccaatg ttcgccatag tacgctcctg tcggaatggt 180
gttgaaaaaa ggaatgacga cagaggtatt gcgaaggctg tgccaggttg ccctgcaccg 240
cgacggccca tccctgcccc atcaggatcg cttcgcatca cgatgccgcg cgccaaaggc 300
gcacccggcg gggcgaaagg taaaaatccg tgaattttcc ccctgtcgga tcaatgtttc 360
gcgtggtcgt tccgataagg gcgcacactt tgcatggtta tccgggttcg gcttaccccg 420
ccgcgttttg cgcacggtgt cggacaattt gtcataactg cgacacagga gtttgcgatg 480
accctgaata tgatgctcga cgccgtcctc gcagtaccat tgcaaccgac tttacagcaa 540
gaagtgattc tggcacgcat ggaacaaatt cttgccagtc gggctttatc cgatgacgaa 600
cgcgcacagc ttttatatga gcgcggagtg ttgtatgata gtctcggtct gagggcatta 660
gcgcgaaatg atttttcaca agcgctggca atccgacccg atatgcctga agtattcaat 720
tacttaggca tttacttaac gcaggcaggc aattttgatg ctgcctatga agcgtttgat 780
tctgtacttg agcttgatcg ccattgagct ggcttcccga ccgcagggcg gcacctgcct 840
gaccctgcgt ttcccgctgt ttaacaccct gaccggaggt gaagcatgat ccctgaatcc 900
gacccggaca ccaccgtcag acgcttcgac ctctctcagc agttcaccgc catgcagcgg 960
ataagcgtgg tgctgagccg ggccaccgag gccagcaaaa cgctgcagga ggtgctcagc 1020
gtattacaca acgatgcctt tatgcagcac gggatgatct gcctgtacga cagcgagcag 1080
gagatcctca gtatcgaagc gctgcagcaa accggccagc agcccctccc cggcagcacg 1140
cagatccgct atcgccccgg cgagggactg gtggggaccg tgctggccca ggggcagtcg 1200
ctggtgctgc cccgggtcgc cgacgatcag cgttttctcg accgcctgag cctctacgat 1260
tacgatctgc cgtttatcgc cgtaccgttg atggggccca acgcccggcc aataggggtg 1320
ctggcggccc agccgatggc gcgccaggaa gagcggctgc cggcctgcac ccgttttctc 1380
gaaaccgtc 1389

<210> SEQ ID NO 199
<211> LENGTH: 1155
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 36bp deletion

<400> SEQUENCE: 199
atggcgctga agcacctgat cacgctctgc gcggcgtcgc cgatggtcgc cagccagctg 60
gcgcgccacc cgctgctgct ggatgagctg ctggatccca acaccctcta tcagccgacg 120
gcgaccgatg cctatcgcga cgagctgcgc cagtacctgc tgcgcgtgcc ggaagaggat 180
gaagagcagc agctgcatat cgcggcggcg gatatcgctg gtaccctgcc ggtgatgaag 240
gtcagcgatc acttaacctg gcttgccgaa gcgatcctcg acgcggtggt gcagcaggca 300
tgggggcaga tggtcgctcg ctacggccag ccgacccacc tgcacgatcg ccagggtcgc 360
ggcttcgccg tcgtcggcta cggtaagctt ggcggctggg agctgggcta cagctccgat 420
ctcgatctgg tgttcctcca tgactgcccg gcggaggtga tgaccgacgg cgagcgggag 480
attgacggcc gtcagttcta cctgcggctg gcccagcgga tcatgcacct gttcagcacc 540
cgcacctcgt ccggtattct ctacgaagtg gacgcccggc tgcgtccttc tggcgcggcg 600
gggatgctgg tcaccaccgc cgacgcgttt gctgactatc agcagaacga agcctggacg 660
tgggaacatc aggcgctggt gcgcgcccgc gtggtctatg gcgacccggc gctgcaggcg 720
cgctttgacg ccattcgtcg cgatatcctg accaccccgc gggaggggat gaccctgcag 780
accgaggttc gcgagatgcg cgagaagatg cgcgcccacc ttggcaacaa acatcccgat 840
cgttttgata tcaaagccga tgccggcggg atcaccgata ttgaatttat tactcagtat 900
ctggtcctac gctatgccag tgacaagccg aagctgaccc gctggtctga caacgtgcgt 960
attcttgagc tgctggcgca gaacgacatc atggacgagg aggaggcgcg cgccttaacg 1020
catgcgtaca ccaccttgcg tgatgcgctc catcacctgg ccctgcagga gcagccggga 1080
cacgtggcgc cagaggcctt cagccgggag cgtcagcagg tcagcgccag ctggcagaag 1140
tggctgatgg cttaa 1155

<210> SEQ ID NO 200
<211> LENGTH: 2155
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 36bp deletion

<400> SEQUENCE: 200
cgtaaggcga ccacccagct ccgcgcgttg ctgaacgacg ctgaagccgt tctgctggcc 60
gcggacaccg ccgacgaggc gttattccgc accgaggtcg tcggcgccaa actggccctg 120
actgaatggc tggtccagcg cggctggcgt ccgttcctca acgaggcagg agagaaaaaa 180
atagccggat cgttcaaacg gtttgccgat attaacctct cgcgggtggc ggccgagctg 240
cgcagcgccg tgcagcatct ggcggttgaa gatgccgccg accagttgcc gaagctgtcc 300
cgcgacatcg acagcgtcca gctgctggcg ggcgcctatg gcgacgccgt cgcgccgtgg 360
ctggagaact ggcaggagct tcaccgtgca atagcacatg acgatcgcag cgtctttgaa 420
tatttccgtc gccaggcgct ggctgccgag ccgttctggc tgcatagtgg aaaacgataa 480
tttcaggcca gggagccctt atggcgctga agcacctgat cacgctctgc gcggcgtcgc 540
cgatggtcgc cagccagctg gcgcgccacc cgctgctgct ggatgagctg ctggatccca 600
acaccctcta tcagccgacg gcgaccgatg cctatcgcga cgagctgcgc cagtacctgc 660
tgcgcgtgcc ggaagaggat gaagagcagc agctgcatat cgcggcggcg gatatcgctg 720
gtaccctgcc ggtgatgaag gtcagcgatc acttaacctg gcttgccgaa gcgatcctcg 780
acgcggtggt gcagcaggca tgggggcaga tggtcgctcg ctacggccag ccgacccacc 840
tgcacgatcg ccagggtcgc ggcttcgccg tcgtcggcta cggtaagctt ggcggctggg 900
agctgggcta cagctccgat ctcgatctgg tgttcctcca tgactgcccg gcggaggtga 960
tgaccgacgg cgagcgggag attgacggcc gtcagttcta cctgcggctg gcccagcgga 1020
tcatgcacct gttcagcacc cgcacctcgt ccggtattct ctacgaagtg gacgcccggc 1080
tgcgtccttc tggcgcggcg gggatgctgg tcaccaccgc cgacgcgttt gctgactatc 1140
agcagaacga agcctggacg tgggaacatc aggcgctggt gcgcgcccgc gtggtctatg 1200
gcgacccggc gctgcaggcg cgctttgacg ccattcgtcg cgatatcctg accaccccgc 1260
gggaggggat gaccctgcag accgaggttc gcgagatgcg cgagaagatg cgcgcccacc 1320
ttggcaacaa acatcccgat cgttttgata tcaaagccga tgccggcggg atcaccgata 1380
ttgaatttat tactcagtat ctggtcctac gctatgccag tgacaagccg aagctgaccc 1440
gctggtctga caacgtgcgt attcttgagc tgctggcgca gaacgacatc atggacgagg 1500
aggaggcgcg cgccttaacg catgcgtaca ccaccttgcg tgatgcgctc catcacctgg 1560
ccctgcagga gcagccggga cacgtggcgc cagaggcctt cagccgggag cgtcagcagg 1620
tcagcgccag ctggcagaag tggctgatgg cttaactata aaatcgggtg tgctattatc 1680
gcgcgcaaag tttgcgtctc gcaggagaga gtcatgaaag taacgctgcc ggagtttgaa 1740
cgtgcaggag tgttggtggt gggtgatgtg atgctggacc gctactggta cggcccccacc 1800
agtcgtattt ccccggaagc cccggtgccg gtggtgaagg tggaaaatat cgaagaacgt 1860
cctggcggcg cggcaaacgt agcgatgaac atcgcctccc tgggggcaac gtcgcgcctg 1920
gtgggattga ccgggattga tgacgctgcc cgcgcgctga gccaggcgct ggccaatgtg 1980
aatgtgaagt gcgacttcgt ctccgtcccg actcacccga ccatcaccaa gctgcgggtg 2040
ctgtcgcgca atcagcagct gatccgcctc gactttgaag agggcttctc cggcgtggat 2100
ccgcagccga tgcatgagcg cattcagcag gcgctgggag ccattggcgc actgg 2155

<210> SEQ ID NO 201
<211> LENGTH: 413
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm6.2

<400> SEQUENCE: 201
atgaccctga atatgatgct cgagctaaag ttctcggcta atcgctgata acatttgacg 60
caatgcgcaa taaaagggca tcatttgatg cccttttttgc acgctttcat accagaacct 120
ggctcatcag tgattttttt tgtcataatc attgctgaga caggctctga agagggcgtt 180
tatacaccaa accattcgag cggtagcgcg acggcaagtc agcgttctcc tttgcaatag 240
cagggaagag gcgccagaac cgccagcgtt gaagcagttt gaacgcgttc agtgtataat 300
ccgaaactta atttcggttt ggagccattg agctggcttc ccgaccgcag ggcggcacct 360
gcctgaccct gcgtttcccg ctgtttaaca ccctgaccgg aggtgaagca tga 413

<210> SEQ ID NO 202
<211> LENGTH: 1413
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm6.2 with 500bp flank

<400> SEQUENCE: 202
ggccgtcgcc cagcgtcggc gtccccaaca gcagggccgg gtaggccagc aggtccgcca 60
gcgtggcgcg gttaatattg accggggcgg cggcggcctc ccccagctgc ttgtggatca 120
ttttcgcgat cttgcgggtt ttaccggtat cggtaccaaa gaaaatgcca atgttcgcca 180
tagtacgctc ctgtcggaat ggtgttgaaa aaaggaatga cgacagaggt attgcgaagg 240
ctgtgccagg ttgccctgca ccgcgacggc ccatccctgc cccatcagga tcgcttcgca 300
tcacgatgcc gcgcgccaaa ggcgcacccg gcggggcgaa aggtaaaaat ccgtgaattt 360
tccccctgtc ggatcaatgt ttcgcgtggt cgttccgata agggcgcaca ctttgcatgg 420
ttatccgggt tcggcttacc ccgccgcgtt ttgcgcacgg tgtcggacaa tttgtcataa 480
ctgcgacaca ggagtttgcg atgaccctga atatgatgct cgagctaaag ttctcggcta 540
atcgctgata acatttgacg caatgcgcaa taaaagggca tcatttgatg ccctttttgc 600
acgctttcat accagaacct ggctcatcag tgattttttt tgtcataatc attgctgaga 660
caggctctga agagggcgtt tatacaccaa accattcgag cggtagcgcg acggcaagtc 720
agcgttctcc tttgcaatag cagggaagag gcgccagaac cgccagcgtt gaagcagttt 780
gaacgcgttc agtgtataat ccgaaactta atttcggttt ggagccattg agctggcttc 840
ccgaccgcag ggcggcacct gcctgaccct gcgtttcccg ctgtttaaca ccctgaccgg 900
aggtgaagca tgatccctga atccgacccg gacaccaccg tcagacgctt cgacctctct 960
cagcagttca ccgccatgca gcggataagc gtggtgctga gccgggccac cgaggccagc 1020
aaaacgctgc aggaggtgct cagcgtatta cacaacgatg cctttatgca gcacgggatg 1080
atctgcctgt acgacagcga gcaggagatc ctcagtatcg aagcgctgca gcaaaccggc 1140
cagcagcccc tccccggcag cacgcagatc cgctatcgcc ccggcgaggg actggtgggg 1200
accgtgctgg cccaggggca gtcgctggtg ctgccccggg tcgccgacga tcagcgtttt 1260
ctcgaccgcc tgagcctcta cgattacgat ctgccgttta tcgccgtacc gttgatgggg 1320
cccaacgccc ggccaatagg ggtgctggcg gcccagccga tggcgcgcca ggaagagcgg 1380
ctgccggcct gcacccgttt tctcgaaacc gtc 1413

<210> SEQ ID NO 203
<211> LENGTH: 513
<212> TYPE: DNA
<213> ORGANISM: Artificial Sequence
<220> FEATURE:

```
<223> OTHER INFORMATION: Synthetic polynucleotide
<220> FEATURE:
<223> OTHER INFORMATION: delta-nifL::Prm1.2

<400> SEQUENCE: 203

atgaccctga atatgatgct cgagcccgct gaccgaccag aacttccacc ttggactcgg      60

ctataccctt ggcgtgacgg cgcgcgataa ctgggactac atccccattc cggtgatctt     120

accattggcg tcaataggtt acggtccggc gactttccag atgacctata ttcccggcac     180

ctacaataac ggtaacgttt acttcgcctg ggctcgtata cagttttaat tcgctaagtc     240

ttagcaataa atgagataag cggtgtgtct tgtggaaaaa caaggactaa agcgttaccc     300

actaaaaaag atagcgactt ttatcacttt ttagcaaagt tgcactggac aaaaggtacc     360

acaattggtg tactgatact cgacacagca ttagtgtcga tttttcatat aaaggtaatt     420

ttggccattg agctggcttc ccgaccgcag ggcggcacct gcctgaccct gcgtttcccg     480

ctgtttaaca ccctgaccgg aggtgaagca tga                                  513


<210> SEQ ID NO 204
<211> LENGTH: 1513
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1.2 with 500bp flank

<400> SEQUENCE: 204

ggccgtcgcc cagcgtcggc gtccccaaca gcagggccgg gtaggccagc aggtccgcca      60

gcgtggcgcg gttaatattg accggggcgg cggcggcctc cccagctgc ttgtggatca      120

ttttcgcgat cttgcgggtt ttaccggtat cggtaccaaa gaaaatgcca atgttcgcca     180

tagtacgctc ctgtcggaat ggtgttgaaa aaaggaatga cgacagaggt attgcgaagg     240

ctgtgccagg ttgccctgca ccgcgacggc ccatccctgc cccatcagga tcgcttcgca     300

tcacgatgcc gcgcgccaaa ggcgcacccg gcggggcgaa aggtaaaaat ccgtgaattt     360

tcccccctgtc ggatcaatgt ttcgcgtggt cgttccgata agggcgcaca ctttgcatgg    420

ttatccgggt tcggcttacc ccgccgcgtt ttgcgcacgg tgtcggacaa tttgtcataa     480

ctgcgacaca ggagtttgcg atgaccctga atatgatgct cgagcccgct gaccgaccag     540

aacttccacc ttggactcgg ctataccctt ggcgtgacgg cgcgcgataa ctgggactac     600

atccccattc cggtgatctt accattggcg tcaataggtt acggtccggc gactttccag     660

atgacctata ttcccggcac ctacaataac ggtaacgttt acttcgcctg ggctcgtata     720

cagttttaat tcgctaagtc ttagcaataa atgagataag cggtgtgtct tgtggaaaaa     780

caaggactaa agcgttaccc actaaaaaag atagcgactt ttatcacttt ttagcaaagt     840

tgcactggac aaaaggtacc acaattggtg tactgatact cgacacagca ttagtgtcga     900

tttttcatat aaaggtaatt ttggccattg agctggcttc ccgaccgcag ggcggcacct     960

gcctgaccct gcgtttcccg ctgtttaaca ccctgaccgg aggtgaagca tgatccctga    1020

atccgacccg gacaccaccg tcagacgctt cgacctctct cagcagttca ccgccatgca    1080

gcggataagc gtggtgctga gccgggccac cgaggccagc aaaacgctgc aggaggtgct    1140

cagcgtatta cacaacgatg cctttatgca gcacgggatg atctgcctgt acgacagcga    1200

gcaggagatc ctcagtatcg aagcgctgca gcaaaccggc cagcagcccc tccccggcag    1260

cacgcagatc cgctatcgcc ccggcgaggg actggtgggg accgtgctgg cccaggggca    1320
```

gtcgctggtg ctgccccggg tcgccgacga tcagcgtttt ctcgaccgcc tgagcctcta 1380
cgattacgat ctgccgttta tcgccgtacc gttgatgggg cccaacgccc ggccaatagg 1440
ggtgctggcg gcccagccga tggcgcgcca ggaagagcgg ctgccggcct gcacccgttt 1500
tctcgaaacc gtc 1513

<210> SEQ ID NO 205
<211> LENGTH: 1155
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 36bp deletion

<400> SEQUENCE: 205
atggcgctga agcacctgat cacgctctgc gcggcgtcgc cgatggtcgc cagccagctg 60
gcgcgccacc cgctgctgct ggatgagctg ctggatccca acaccctcta tcagccgacg 120
gcgaccgatg cctatcgcga cgagctgcgc cagtacctgc tgcgcgtgcc ggaagaggat 180
gaagagcagc agctgcatat cgcggcggcg gatatcgctg gtaccctgcc ggtgatgaag 240
gtcagcgatc acttaacctg gcttgccgaa gcgatcctcg acgcggtggt gcagcaggca 300
tgggggcaga tggtcgctcg ctacggccag ccgacccacc tgcacgatcg ccagggtcgc 360
ggcttcgccg tcgtcggcta cggtaagctt ggcggctggg agctgggcta cagctccgat 420
ctcgatctgg tgttcctcca tgactgcccg gcggaggtga tgaccgacgg cgagcgggag 480
attgacggcc gtcagttcta cctgcggctg gcccagcgga tcatgcacct gttcagcacc 540
cgcacctcgt ccggtattct ctacgaagtg gacgcccggc tgcgtccttc tggcgcggcg 600
gggatgctgg tcaccaccgc cgacgcgttt gctgactatc agcagaacga agcctggacg 660
tgggaacatc aggcgctggt gcgcgcccgc gtggtctatg gcgacccggc gctgcaggcg 720
cgctttgacg ccattcgtcg cgatatcctg accaccccgc gggaggggat gaccctgcag 780
accgaggttc gcgagatgcg cgagaagatg cgcgcccacc ttggcaacaa acatcccgat 840
cgttttgata tcaaagccga tgccggcggg atcaccgata ttgaatttat tactcagtat 900
ctggtcctac gctatgccag tgacaagccg aagctgaccc gctggtctga caacgtgcgt 960
attcttgagc tgctggcgca gaacgacatc atggacgagg aggaggcgcg cgccttaacg 1020
catgcgtaca ccaccttgcg tgatgcgctc catcacctgg ccctgcagga gcagccggga 1080
cacgtggcgc cagaggcctt cagccgggag cgtcagcagg tcagcgccag ctggcagaag 1140
tggctgatgg cttaa 1155

<210> SEQ ID NO 206
<211> LENGTH: 2155
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 36bp deletion

<400> SEQUENCE: 206
cgtaaggcga ccacccagct ccgcgcgttg ctgaacgacg ctgaagccgt tctgctggcc 60
gcggacaccg ccgacgaggc gttattccgc accgaggtcg tcggcgccaa actggccctg 120
actgaatggc tggtccagcg cggctggcgt ccgttcctca acgaggcagg agagaaaaaa 180

```
atagccggat cgttcaaacg gtttgccgat attaacctct cgcgggtggc ggccgagctg    240
cgcagcgccg tgcagcatct ggcggttgaa gatgccgccg accagttgcc gaagctgtcc    300
cgcgacatcg acagcgtcca gctgctggcg ggcgcctatg gcgacgccgt cgcgccgtgg    360
ctggagaact ggcaggagct tcaccgtgca atagcacatg acgatcgcag cgtctttgaa    420
tatttccgtc gccaggcgct ggctgccgag ccgttctggc tgcatagtgg aaaacgataa    480
tttcaggcca gggagccctt atggcgctga agcacctgat cacgctctgc gcggcgtcgc    540
cgatggtcgc cagccagctg gcgcgccacc cgctgctgct ggatgagctg ctggatccca    600
acaccctcta tcagccgacg gcgaccgatg cctatcgcga cgagctgcgc cagtacctgc    660
tgcgcgtgcc ggaagaggat gaagagcagc agctgcatat cgcggcggcg gatatcgctg    720
gtaccctgcc ggtgatgaag gtcagcgatc acttaacctg gcttgccgaa gcgatcctcg    780
acgcggtggt gcagcaggca tgggggcaga tggtcgctcg ctacggccag ccgacccacc    840
tgcacgatcg ccagggtcgc ggcttcgccg tcgtcggcta cggtaagctt ggcggctggg    900
agctgggcta cagctccgat ctcgatctgg tgttcctcca tgactgcccg gcggaggtga    960
tgaccgacgg cgagcgggag attgacggcc gtcagttcta cctgcggctg gcccagcgga   1020
tcatgcacct gttcagcacc cgcacctcgt ccggtattct ctacgaagtg gacgcccggc   1080
tgcgtccttc tggcgcggcg gggatgctgg tcaccaccgc cgacgcgttt gctgactatc   1140
agcagaacga agcctggacg tgggaacatc aggcgctggt gcgcgcccgc gtggtctatg   1200
gcgacccggc gctgcaggcg cgctttgacg ccattcgtcg cgatatcctg accaccccgc   1260
gggaggggat gaccctgcag accgaggttc gcgagatgcg cgagaagatg cgcgcccacc   1320
ttggcaacaa acatcccgat cgttttgata tcaaagccga tgccggcggg atcaccgata   1380
ttgaatttat tactcagtat ctggtcctac gctatgccag tgacaagccg aagctgaccc   1440
gctggtctga caacgtgcgt attcttgagc tgctggcgca gaacgacatc atggacgagg   1500
aggaggcgcg cgccttaacg catgcgtaca ccaccttgcg tgatgcgctc catcacctgg   1560
ccctgcagga gcagccggga cacgtggcgc cagaggcctt cagccgggag cgtcagcagg   1620
tcagcgccag ctggcagaag tggctgatgg cttaactata aaatcgggtg tgctattatc   1680
gcgcgcaaag tttgcgtctc gcaggagaga gtcatgaaag taacgctgcc ggagtttgaa   1740
cgtgcaggag tgttggtggt gggtgatgtg atgctggacc gctactggta cggcccccacc   1800
agtcgtattt ccccggaagc cccggtgccg gtggtgaagg tggaaaatat cgaagaacgt   1860
cctggcggcg cggcaaacgt agcgatgaac atcgcctccc tgggggcaac gtcgcgcctg   1920
gtgggattga ccgggattga tgacgctgcc cgcgcgctga gccaggcgct ggccaatgtg   1980
aatgtgaagt gcgacttcgt ctccgtcccg actcacccga ccatcaccaa gctgcgggtg   2040
ctgtcgcgca atcagcagct gatccgcctc gactttgaag agggcttctc cggcgtggat   2100
ccgcagccga tgcatgagcg cattcagcag gcgctgggag ccattggcgc actgg        2155
```

```
<210> SEQ ID NO 207
<211> LENGTH: 613
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::PinfC

<400> SEQUENCE: 207

atgaccctga atatgatgct agaagcgtca ggtaccggtc atgattcacc gtgcgattct     60
```

```
cggttccctg gagcgcttca ttggcatcct gaccgaagag ttcgctggct tcttcccaac    120

ctggattgca ccagtgcagg tagtggtcat gaatattacc gattctcagg ctgaatacgt    180

taacgaattg acgcgtaaac tacaaaatgc gggcattcgt gtaaaagcag acttgagaaa    240

tgagaagatt ggctttaaaa tccgcgagca cactttacgt cgtgtcccgt atatgttggt    300

ctgtggcgac aaagaagtcg aagccggcaa agtggccgtg cgcacccgtc gcgggaaaga    360

cctcggcagc atggacgtaa gtgaagtgat tgagaagctg caacaagaga ttcgcagccg    420

cagtcttcaa caactggagg aataaggtat taaaggcgga aaacgagttc aaacggcacg    480

tccgaatcgt atcaatggcg agattcgcgc cctggaagtt cgcgccattg agctggcttc    540

ccgaccgcag ggcggcacct gcctgaccct gcgtttcccg ctgtttaaca ccctgaccgg    600

aggtgaagca tga                                                       613
```

<210> SEQ ID NO 208
<211> LENGTH: 1613
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::PinfC with 500bp flank

<400> SEQUENCE: 208

```
ggccgtcgcc cagcgtcggc gtccccaaca gcagggccgg gtaggccagc aggtccgcca     60

gcgtggcgcg gttaatattg accggggcgg cggcggcctc ccccagctgc ttgtggatca    120

ttttcgcgat cttgcgggtt ttaccggtat cggtaccaaa gaaaatgcca atgttcgcca    180

tagtacgctc ctgtcggaat ggtgttgaaa aaaggaatga cgacagaggt attgcgaagg    240

ctgtgccagg ttgccctgca ccgcgacggc ccatccctgc cccatcagga tcgcttcgca    300

tcacgatgcc gcgcgccaaa ggcgcacccg gcggggcgaa aggtaaaaat ccgtgaattt    360

tccccctgtc ggatcaatgt ttcgcgtggt cgttccgata agggcgcaca ctttgcatgg    420

ttatccgggt tcggcttacc ccgccgcgtt ttgcgcacgg tgtcggacaa tttgtcataa    480

ctgcgacaca ggagtttgcg atgaccctga atatgatgct agaagcgtca ggtaccggtc    540

atgattcacc gtgcgattct cggttccctg gagcgcttca ttggcatcct gaccgaagag    600

ttcgctggct tcttcccaac ctggattgca ccagtgcagg tagtggtcat gaatattacc    660

gattctcagg ctgaatacgt taacgaattg acgcgtaaac tacaaaatgc gggcattcgt    720

gtaaaagcag acttgagaaa tgagaagatt ggctttaaaa tccgcgagca cactttacgt    780

cgtgtcccgt atatgttggt ctgtggcgac aaagaagtcg aagccggcaa agtggccgtg    840

cgcacccgtc gcgggaaaga cctcggcagc atggacgtaa gtgaagtgat tgagaagctg    900

caacaagaga ttcgcagccg cagtcttcaa caactggagg aataaggtat taaaggcgga    960

aaacgagttc aaacggcacg tccgaatcgt atcaatggcg agattcgcgc cctggaagtt   1020

cgcgccattg agctggcttc ccgaccgcag ggcggcacct gcctgaccct gcgtttcccg   1080

ctgtttaaca ccctgaccgg aggtgaagca tgatccctga atccgacccg gacaccaccg   1140

tcagacgctt cgacctctct cagcagttca ccgccatgca gcggataagc gtggtgctga   1200

gccgggccac cgaggccagc aaaacgctgc aggaggtgct cagcgtatta cacaacgatg   1260

cctttatgca gcacgggatg atctgcctgt acgacagcga gcaggagatc ctcagtatcg   1320

aagcgctgca gcaaaccggc cagcagcccc tccccggcag cacgcagatc cgctatcgcc   1380
```

ccggcgaggg actggtgggg accgtgctgg cccaggggca gtcgctggtg ctgccccggg 1440
tcgccgacga tcagcgtttt ctcgaccgcc tgagcctcta cgattacgat ctgccgttta 1500
tcgccgtacc gttgatgggg cccaacgccc ggccaatagg ggtgctggcg gcccagccga 1560
tggcgcgcca ggaagagcgg ctgccggcct gcacccgttt tctcgaaacc gtc 1613

<210> SEQ ID NO 209
<211> LENGTH: 1191
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2

<400> SEQUENCE: 209
atggcgctga agcacctgat cacgctctgc gcggcgtcgc cgatggtcgc cagccagctg 60
gcgcgccacc cgctgctgct ggatgagctg ctggatccca acaccctcta tcagccgacg 120
gcgaccgatg cctatcgcga cgagctgcgc cagtacctgc tgcgcgtgcc ggaagaggat 180
gaagagcagc agctggaggc gttgcgccag tttaagcagg cgcagcagct gcatatcgcg 240
gcggcggata tcgctggtac cctgccggtg atgaaggtca gcgatcactt aacctggctt 300
gccgaagcga tcctcgacgc ggtggtgcag caggcatggg ggcagatggt cgctcgctac 360
ggccagccga cccacctgca cgatcgccag ggtcgcggct tcgccgtcgt cggctacggt 420
aagcttggcg gctgggagct gggctacagc tccgatctcg atctggtgtt cctccatgac 480
tgcccggcgg aggtgatgac cgacggcgag cgggagattg acggccgtca gttctacctg 540
cggctggccc agcggatcat gcacctgttc agcacccgca cctcgtccgg tattctctac 600
gaagtggacg cccggctgcg tccttctggc gcggcgggga tgctggtcac caccgccgac 660
gcgtttgctg actatcagca gaacgaagcc tggacgtggg aacatcaggc gctggtgcgc 720
gcccgcgtgg tctatggcga cccggcgctg caggcgcgct ttgacgccat tcgtcgcgat 780
atcctgacca ccccgcggga ggggatgacc ctgcagaccg aggttcgcga gatgcgcgag 840
aagatgcgcg cccaccttgg caacaaacat cccgatcgtt ttgatatcaa agccgatgcc 900
ggcgggatca ccgatattga atttattact cagtatctgg tcctacgcta tgccagtgac 960
aagccgaagc tgacccgctg gtctgacaac gtgcgtattc ttgagctgct ggcgcagaac 1020
gacatcatgg acgaggagga ggcgcgcgcc ttaacgcatg cgtacaccac cttgcgtgat 1080
gcgctccatc acctggccct gcaggagcag ccgggacacg tggcgccaga ggccttcagc 1140
cgggagcgtc agcaggtcag cgccagctgg cagaagtggc tgatggctta a 1191

<210> SEQ ID NO 210
<211> LENGTH: 2191
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 with 500bp flank

<400> SEQUENCE: 210
cgtaaggcga ccacccagct ccgcgcgttg ctgaacgacg ctgaagccgt tctgctggcc 60
gcggacaccg ccgacgaggc gttattccgc accgaggtcg tcggcgccaa actggccctg 120
actgaatggc tggtccagcg cggctggcgt ccgttcctca acgaggcagg agagaaaaaa 180
atagccggat cgttcaaacg gtttgccgat attaacctct cgcgggtggc ggccgagctg 240

```
cgcagcgccg tgcagcatct ggcggttgaa gatgccgccg accagttgcc gaagctgtcc    300
cgcgacatcg acagcgtcca gctgctggcg ggcgcctatg gcgacgccgt cgcgccgtgg    360
ctggagaact ggcaggagct tcaccgtgca atagcacatg acgatcgcag cgtctttgaa    420
tatttccgtc gccaggcgct ggctgccgag ccgttctggc tgcatagtgg aaaacgataa    480
tttcaggcca gggagccctt atggcgctga agcacctgat cacgctctgc gcggcgtcgc    540
cgatggtcgc cagccagctg gcgcgccacc cgctgctgct ggatgagctg ctggatccca    600
acaccctcta tcagccgacg gcgaccgatg cctatcgcga cgagctgcgc cagtacctgc    660
tgcgcgtgcc ggaagaggat gaagagcagc agctggaggc gttgcgccag tttaagcagg    720
cgcagcagct gcatatcgcg gcggcggata tcgctggtac cctgccggtg atgaaggtca    780
gcgatcactt aacctggctt gccgaagcga tcctcgacgc ggtggtgcag caggcatggg    840
ggcagatggt cgctcgctac ggccagccga cccacctgca cgatcgccag ggtcgcggct    900
tcgccgtcgt cggctacggt aagcttggcg gctgggagct gggctacagc tccgatctcg    960
atctggtgtt cctccatgac tgcccggcgg aggtgatgac cgacggcgag cgggagattg   1020
acggccgtca gttctacctg cggctggccc agcggatcat gcacctgttc agcacccgca   1080
cctcgtccgg tattctctac gaagtggacg cccggctgcg tccttctggc gcggcgggga   1140
tgctggtcac caccgccgac gcgtttgctg actatcagca gaacgaagcc tggacgtggg   1200
aacatcaggc gctggtgcgc gcccgcgtgg tctatggcga cccggcgctg caggcgcgct   1260
ttgacgccat tcgtcgcgat atcctgacca ccccgcggga ggggatgacc ctgcagaccg   1320
aggttcgcga gatgcgcgag aagatgcgcg cccaccttgg caacaaacat cccgatcgtt   1380
ttgatatcaa agccgatgcc ggcgggatca ccgatattga atttattact cagtatctgg   1440
tcctacgcta tgccagtgac aagccgaagc tgacccgctg gtctgacaac gtgcgtattc   1500
ttgagctgct ggcgcagaac gacatcatgg acgaggagga ggcgcgcgcc ttaacgcatg   1560
cgtacaccac cttgcgtgat gcgctccatc acctggccct gcaggagcag ccgggacacg   1620
tggcgccaga ggccttcagc cgggagcgtc agcaggtcag cgccagctgg cagaagtggc   1680
tgatggctta actataaaat cgggtgtgct attatcgcgc gcaaagtttg cgtctcgcag   1740
gagagagtca tgaaagtaac gctgccggag tttgaacgtg caggagtgtt ggtggtgggt   1800
gatgtgatgc tggaccgcta ctggtacggc ccaccagtc gtatttcccc ggaagccccg   1860
gtgccggtgg tgaaggtgga aaatatcgaa gaacgtcctg gcggcgcggc aaacgtagcg   1920
atgaacatcg cctccctggg ggcaacgtcg cgcctggtgg gattgaccgg gattgatgac   1980
gctgcccgcg cgctgagcca ggcgctggcc aatgtgaatg tgaagtgcga cttcgtctcc   2040
gtcccgactc acccgaccat caccaagctg cgggtgctgt cgcgcaatca gcagctgatc   2100
cgcctcgact ttgaagaggg cttctccggc gtggatccgc agccgatgca tgagcgcatt   2160
cagcaggcgc tgggagccat tggcgcactg g                                  2191
```

<210> SEQ ID NO 211
<211> LENGTH: 1188
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2

<400> SEQUENCE: 211

```
atggcgctca aacagttaat ccgtctgtgt gccgcctcgc cgatggtcgc gacacaactt      60
gcacgtcatc ctttattgct cgatgaactg ctcgacccgc gcacgcttta ccagccgatt     120
gagccgggcg cttaccgcga cgaactgcgt cagtatctga tgcgggtgcc aacagaagac     180
gaagaacagc agcttgaagc cgtgcgccag ttcaaacagg cccagcattt gcgtatcgca     240
gccggggata tttccggggc attgccggtg atgaaagtca gtgaccattt aacctacctt     300
gccgaggcca ttctcgatgt cgtggtgcag catgcgtggg aacaaatggt cgtaaaatac     360
gggcagcccg cgcatcttca gcaccgtgag ggcgcggttt ttgccgtggt cggttacggg     420
aaactcggtg gctgggagct gggttatagc tcagatctgg atctggtctt cctgctcgat     480
tgcgcgccgg aggtgatgac ggacggcgaa cgcagcatcg acggacgtca gttttatctt     540
cggctggcgc agcgcattat gcacttattc agcacccgga catcgtcagg cattctttac     600
gaggttgatc cgcgtctgcg accttccggc gcatccggca tgctggtcag taccattgaa     660
gcgtttgcag attatcaggc caatgaagcc tggacgtggg agcatcaggc gctggttcgc     720
gcgcgcgtgg tttacgggga tccgcaactg acacagcaat ttaacgccac gcgtcgcgac     780
attctttgcc gccagcgcga tggcgacggc ctgcgtaagg aggtccgtga aatgcgcgag     840
aaaatgtatg cccatctggg gagtaaaaaa gcccacgagt ttgatctgaa agccgatccg     900
ggtggcatca cggatattga attcattgca caatacctgg ttctgcgttt cgcgcatgat     960
gagccgaagc tgacgcgctg gtctgataac gtgcggattt ttgaactgat ggcacgatat    1020
gacatcatgc cggaagagga agcgcgccat ctgacgcagg cttatgtgac gctgcgcgat    1080
gaaattcatc atctggcgtt gcaggaacac agcgggaaag tggccgcgga cagctttgct    1140
actgagcgcg cgcagatccg tgccagctgg gcaaagtggc tcggctga                 1188
```

<210> SEQ ID NO 212
<211> LENGTH: 2188
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 with 500bp flank

<400> SEQUENCE: 212

```
cggtactgga acagaaatcg gcggatgcgc aggaaatttg ttatgacacg gcctgtctga      60
agtgcaagtt agtgcttact tcctggctgg caacctcagg ctggacgccg tttattgatg     120
ataaatctgc gaagaaactg gacgcttcct tcaaacgttt tgctgacatc atgctcggtc     180
gtaccgcagc ggatctgaaa gaagcctttg cgcagccact gacggaagaa ggttatcgcg     240
atcagctggc gcgcctgaaa cgccagatca ttaccttcca tttgcttgcc ggtgcttacc     300
ctgaaaaaga cgtcgatgcg tatattgccg gctgggtgga cctgcaacag gccatcgttc     360
agcagcaaca cgcctgggag gattcggccc gttctcacgc ggtgatgatg gatgctttct     420
ggttaaacgg gcaacctcgt taactgactg actagcctgg gcaaactgcc cgggcttttt     480
tttgcaagga atctgatttc atggcgctca aacagttaat ccgtctgtgt gccgcctcgc     540
cgatggtcgc gacacaactt gcacgtcatc ctttattgct cgatgaactg ctcgacccgc     600
gcacgcttta ccagccgatt gagccgggcg cttaccgcga cgaactgcgt cagtatctga     660
tgcgggtgcc aacagaagac gaagaacagc agcttgaagc cgtgcgccag ttcaaacagg     720
cccagcattt gcgtatcgca gccggggata tttccggggc attgccggtg atgaaagtca     780
gtgaccattt aacctacctt gccgaggcca ttctcgatgt cgtggtgcag catgcgtggg     840
```

```
aacaaatggt cgtaaaatac gggcagcccg cgcatcttca gcaccgtgag gggcgcggtt    900

ttgccgtggt cggttacggg aaactcggtg gctgggagct gggttatagc tcagatctgg    960

atctggtctt cctgctcgat tgcgcgccgg aggtgatgac ggacggcgaa cgcagcatcg   1020

acggacgtca gttttatctt cggctggcgc agcgcattat gcacttattc agcacccgga   1080

catcgtcagg cattctttac gaggttgatc cgcgtctgcg accttccggc gcatccggca   1140

tgctggtcag taccattgaa gcgtttgcag attatcaggc caatgaagcc tggacgtggg   1200

agcatcaggc gctggttcgc gcgcgcgtgg tttacgggga tccgcaactg acacagcaat   1260

ttaacgccac gcgtcgcgac attctttgcc gccagcgcga tggcgacggc ctgcgtaagg   1320

aggtccgtga aatgcgcgag aaaatgtatg cccatctggg gagtaaaaaa gcccacgagt   1380

ttgatctgaa agccgatccg ggtggcatca cggatattga attcattgca caatacctgg   1440

ttctgcgttt cgcgcatgat gagccgaagc tgacgcgctg gtctgataac gtgcggattt   1500

ttgaactgat ggcacgatat gacatcatgc cggaagagga agcgcgccat ctgacgcagg   1560

cttatgtgac gctgcgcgat gaaattcatc atctggcgtt gcaggaacac agcgggaaag   1620

tggccgcgga cagctttgct actgagcgcg cgcagatccg tgccagctgg gcaaagtggc   1680

tcggctgagg gtttttattc ggctaacagg cgcttgtgat attatccggc gcattgtatt   1740

tacccgattt gatttatctg ttttggagtc ttgggatgaa agtgactttg cctgattttc   1800

accgcgcagg tgtgctggtt gtcggtgacg taatgttaga ccgttactgg tatggcccga   1860

ccaatcgtat ttctccggaa gctccggtgc cggtggtgaa ggtcagtacc attgaagagc   1920

ggcctggcgg tgcagctaac gtggcgatga acatttcatc tctgggcgcc tcttcctgtc   1980

tgatcggcct gaccggcgta gacgacgctg cgcgtgccct cagtgagcgt ctggcagaag   2040

tgaaagttaa ctgcgatttc gtcgcactat ccacacatcc taccatcacc aaactgcgaa   2100

ttttgtcccg taaccagcaa ctgatccgcc tcgactttga ggaaggtttt gaaggcgttg   2160

atctcgagcc gatgctgacc aaaataga                                      2188
```

<210> SEQ ID NO 213
<211> LENGTH: 635
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm6.1

<400> SEQUENCE: 213

```
atgagcatca cggcgttatc agcatcattt cctgagggga atatcgccag ccgcttgtcg     60

ctgcaacatc cttcactgtt ttataccgtg gttgaacaat cttcggtggc gatttcgctg    120

accgatccgc aggcgcgcat ttgttatgcc aatccggcat tctgccgcca gacgggtttt    180

gcacttgaga cacttttggg cgagaaccac cgtctgctgg aatttttttt cacaaagcgt    240

agcgttattg aatcgcacat tttaaactgt tggccgctgt ggaagcgaat attggtgaaa    300

ggtgcggttt taaggccttt ttctttgact ctctgtcgtt acaaagttaa tatgcgcgcc    360

ctccgtctct gaagctctcg gtgaacattg ttgcgaggca ggatgcgagc tggttgtgtt    420

ttgacattac cgataatgtg ccgcgtgaac gggtgcgtta tgcccgcccg gaagcggcgt    480

tttcccgtcc ggggaatggc atggagctgc gccttatcca gacgctgatc gcccatcatc    540

gcggttcttt agatctctcg gtccgccctg atggcggcac cttgctgacg ttacgcctgc    600
```

cggtacagca ggttatcacc ggaggcttaa aatga 635

<210> SEQ ID NO 214
<211> LENGTH: 1635
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm6.1 with 500bp flank

<400> SEQUENCE: 214
tgtttcgtct cgaggccggg caactgagcg gccccgttga aaccgacctg ggctggcatc 60
tgttgttgtg cgaacaaatt cgcctgccgc aacccttgcc gaaagccgaa gccttaacgc 120
gggtgcgtca gcaactgatt gcccggcaac agaaacatta tcagcgccag tggctgcaac 180
aactgatcaa cgcctgagcc tgttctcctt cttgttgatg cagacgggtt aatgcccgtt 240
ttgcacgaaa aatgcacata aattgcctgc gttgccttat aacagcgcag ggaaatcctg 300
cctccggcct tgtgccacac cgcgctttgc ctggtttgtg gtaaaaactg gcccgctttg 360
catcctgatg cttaaaacac cccgttcaga tcaacctttg ggcagataag cccgcgaaag 420
gcctgcaaat tgcacggtta ttccgggtga gtatatgtgt gatttgggtt ccggcattgc 480
gcaataaagg ggagaaagac atgagcatca cggcgttatc agcatcattt cctgagggga 540
atatcgccag ccgcttgtcg ctgcaacatc cttcactgtt ttataccgtg gttgaacaat 600
cttcggtggc gatttcgctg accgatccgc aggcgcgcat ttgttatgcc aatccggcat 660
tctgccgcca gacgggtttt gcacttgaga cacttttggg cgagaaccac cgtctgctgg 720
aatttttttt cacaaagcgt agcgttattg aatcgcacat tttaaactgt tggccgctgt 780
ggaagcgaat attggtgaaa ggtgcggttt taaggccttt ttctttgact ctctgtcgtt 840
acaaagttaa tatgcgcgcc ctccgtctct gaagctctcg gtgaacattg ttgcgaggca 900
ggatgcgagc tggttgtgtt ttgacattac cgataatgtg ccgcgtgaac gggtgcgtta 960
tgcccgcccg gaagcggcgt ttccccgtcc ggggaatggc atggagctgc gccttatcca 1020
gacgctgatc gcccatcatc gcggttcttt agatctctcg gtccgccctg atggcggcac 1080
cttgctgacg ttacgcctgc cggtacagca ggttatcacc ggaggcttaa aatgacccag 1140
ttacctaccg cgggcccggt tatccggcgc tttgatatgt ctgcccagtt tacggcgctt 1200
tatcgcatca gcgtggcgct gagtcaggaa agcaacaccg ggcgcgcact ggcggcgatc 1260
ctcgaagtgc ttcacgatca tgcatttatg caatacggca tggtgtgtct gtttgataaa 1320
gaacgcaatg cactctttgt ggaatccctg catggcatcg acggcgaaag gaaaaaagag 1380
acccgccatg tccgttaccg catgggggaa ggcgtgatcg gcgcggtgat gagccagcgt 1440
caggcgctgg tgttaccgcg catttcagac gatcagcgtt ttctcgaccg cctgaatatt 1500
tacgattaca gcctgccgtt gattggcgtg ccgatccccg gtgcggataa tcagccatcg 1560
ggcgtgctgg tggcacagcc gatggcgttg cacgaagacc ggctgactgc cagtacgcgg 1620
tttttagaaa tggtc 1635

<210> SEQ ID NO 215
<211> LENGTH: 635
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm6.1

<400> SEQUENCE: 215

```
atgagcatca cggcgttatc agcatcattt cctgagggga atatcgccag ccgcttgtcg      60
ctgcaacatc cttcactgtt ttataccgtg gttgaacaat cttcggtggc gatttcgctg     120
accgatccgc aggcgcgcat ttgttatgcc aatccggcat tctgccgcca gacgggtttt     180
gcacttgaga cacttttggg cgagaaccac cgtctgctgg aatttttttt cacaaagcgt     240
agcgttattg aatcgcacat tttaaactgt tggccgctgt ggaagcgaat attggtgaaa     300
ggtgcggttt taaggccttt ttctttgact ctctgtcgtt acaaagttaa tatgcgcgcc     360
ctccgtctct gaagctctcg gtgaacattg ttgcgaggca ggatgcgagc tggttgtgtt     420
ttgacattac cgataatgtg ccgcgtgaac gggtgcgtta tgcccgcccg gaagcggcgt     480
tttcccgtcc ggggaatggc atggagctgc gccttatcca gacgctgatc gcccatcatc     540
gcggttcttt agatctctcg gtccgccctg atggcggcac cttgctgacg ttacgcctgc     600
cggtacagca ggttatcacc ggaggcttaa aatga                                635
```

<210> SEQ ID NO 216
<211> LENGTH: 1635
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm6.1 with 500bp flank

<400> SEQUENCE: 216

```
tgtttcgtct cgaggccggg caactgagcg gccccgttga aaccgacctg ggctggcatc      60
tgttgttgtg cgaacaaatt cgcctgccgc aacccttgcc gaaagccgaa gccttaacgc     120
gggtgcgtca gcaactgatt gcccggcaac agaaacatta tcagcgccag tggctgcaac     180
aactgatcaa cgcctgagcc tgttctcctt cttgttgatg cagacgggtt aatgcccgtt     240
ttgcacgaaa aatgcacata aattgcctgc gttgccttat aacagcgcag ggaaatcctg     300
cctccggcct tgtgccacac cgcgctttgc ctggtttgtg gtaaaaactg gcccgctttg     360
catcctgatg cttaaaacac cccgttcaga tcaacctttg ggcagataag cccgcgaaag     420
gcctgcaaat tgcacggtta ttccgggtga gtatatgtgt gatttgggtt ccggcattgc     480
gcaataaagg ggagaaagac atgagcatca cggcgttatc agcatcattt cctgagggga     540
atatcgccag ccgcttgtcg ctgcaacatc cttcactgtt ttataccgtg gttgaacaat     600
cttcggtggc gatttcgctg accgatccgc aggcgcgcat ttgttatgcc aatccggcat     660
tctgccgcca gacgggtttt gcacttgaga cacttttggg cgagaaccac cgtctgctgg     720
aatttttttt cacaaagcgt agcgttattg aatcgcacat tttaaactgt tggccgctgt     780
ggaagcgaat attggtgaaa ggtgcggttt taaggccttt ttctttgact ctctgtcgtt     840
acaaagttaa tatgcgcgcc ctccgtctct gaagctctcg gtgaacattg ttgcgaggca     900
ggatgcgagc tggttgtgtt ttgacattac cgataatgtg ccgcgtgaac gggtgcgtta     960
tgcccgcccg gaagcggcgt tttcccgtcc ggggaatggc atggagctgc gccttatcca    1020
gacgctgatc gcccatcatc gcggttcttt agatctctcg gtccgccctg atggcggcac    1080
cttgctgacg ttacgcctgc cggtacagca ggttatcacc ggaggcttaa aatgacccag    1140
ttacctaccg cgggcccggt tatccggcgc tttgatatgt ctgcccagtt tacggcgctt    1200
tatcgcatca gcgtggcgct gagtcaggaa agcaacaccg ggcgcgcact ggcggcgatc    1260
```

ctcgaagtgc ttcacgatca tgcatttatg caatacggca tggtgtgtct gtttgataaa 1320
gaacgcaatg cactctttgt ggaatccctg catggcatcg acggcgaaag gaaaaaagag 1380
acccgccatg tccgttaccg catgggggaa ggcgtgatcg gcgcggtgat gagccagcgt 1440
caggcgctgg tgttaccgcg catttcagac gatcagcgtt ttctcgaccg cctgaatatt 1500
tacgattaca gcctgccgtt gattggcgtg ccgatccccg gtgcggataa tcagccatcg 1560
ggcgtgctgg tggcacagcc gatggcgttg cacgaagacc ggctgactgc cagtacgcgg 1620
tttttagaaa tggtc 1635

<210> SEQ ID NO 217
<211> LENGTH: 786
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm7.1

<400> SEQUENCE: 217
atgagcatca cggcgttatc agcatcattt cctgagggga atatcgccag ccgcttgtcg 60
ctgcaacatc cttcactgtt ttataccgtg gttgaacaat cttcggtggc gatttcgctg 120
accgatccgc aggcgcgcat ttgttatgcc aatccggcat tctgccgcca gacgggtttt 180
gcacttgaga cacttttggg cgagaaccac cgtctgctgg ttaaaaacgt gaccacgagc 240
attaataaac gccacgaaat gtggcgttta tttattcaaa aagtatcttc tttcataaaa 300
agtgctaaat gcagtagcag caaaattggg ataagtccca tggaatacgg ctgttttcgc 360
tgcaattttt aactttttcg taaaaaaaga tgtttctttg agcgaacgat caaaatatag 420
cgttaaccgg caaaaaatta ttctcattag aaaatagttt gtgtaatact tgtaacgcta 480
catggagatt aacttaatct agagggtttt ataccgtctc tgaagctctc ggtgaacatt 540
gttgcgaggc aggatgcgag ctggttgtgt tttgacatta ccgataatgt gccgcgtgaa 600
cgggtgcgtt atgcccgccc ggaagcggcg ttttcccgtc cggggaatgg catggagctg 660
cgccttatcc agacgctgat cgcccatcat cgcggttctt tagatctctc ggtccgccct 720
gatggcggca ccttgctgac gttacgcctg ccggtacagc aggttatcac cggaggctta 780
aaatga 786

<210> SEQ ID NO 218
<211> LENGTH: 1786
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm7.1 with 500bp flank

<400> SEQUENCE: 218
gtttcgtctc gaggccgggc aactgagcgg ccccgttgaa accgacctgg gctggcatct 60
gttgttgtgc gaacaaattc gcctgccgca acccttgccg aaagccgaag ccttaacgcg 120
ggtgcgtcag caactgattg cccggcaaca gaaacattat cagcgccagt ggctgcaaca 180
actgatcaac gcctgagcct gttctccttc ttgttgatgc agacgggtta atgcccgttt 240
tgcacgaaaa atgcacataa attgcctgcg ttgccttata acagcgcagg gaaatcctgc 300
ctccggcctt gtgccacacc gcgctttgcc tggtttgtgg taaaaactgg cccgctttgc 360
atcctgatgc ttaaaacacc ccgttcagat caacctttgg gcagataagc ccgcgaaagg 420

```
cctgcaaatt gcacggttat tccgggtgag tatatgtgtg atttgggttc cggcattgcg    480

caataaaggg gagaaagaca tgagcatcac ggcgttatca gcatcatttc ctgaggggaa    540

tatcgccagc cgcttgtcgc tgcaacatcc ttcactgttt tataccgtgg ttgaacaatc    600

ttcggtggcg atttcgctga ccgatccgca ggcgcgcatt tgttatgcca atccggcatt    660

ctgccgccag acgggttttg cacttgagac acttttgggc gagaaccacc gtctgctggt    720

taaaaacgtg accacgagca ttaataaacg ccacgaaatg tggcgtttat ttattcaaaa    780

agtatcttct ttcataaaaa gtgctaaatg cagtagcagc aaaattggga taagtcccat    840

ggaatacggc tgttttcgct gcaattttta actttttcgt aaaaaaagat gtttctttga    900

gcgaacgatc aaaatatagc gttaaccggc aaaaaattat tctcattaga aaatagtttg    960

tgtaatactt gtaacgctac atggagatta acttaatcta gagggtttta taccgtctct   1020

gaagctctcg gtgaacattg ttgcgaggca ggatgcgagc tggttgtgtt ttgacattac   1080

cgataatgtg ccgcgtgaac gggtgcgtta tgcccgcccg gaagcggcgt tttcccgtcc   1140

ggggaatggc atggagctgc gccttatcca gacgctgatc gcccatcatc gcggttcttt   1200

agatctctcg gtccgccctg atggcggcac cttgctgacg ttacgcctgc cggtacagca   1260

ggttatcacc ggaggcttaa aatgacccag ttacctaccg cgggcccggt tatccggcgc   1320

tttgatatgt ctgcccagtt tacggcgctt tatcgcatca gcgtggcgct gagtcaggaa   1380

agcaacaccg ggcgcgcact ggcggcgatc ctcgaagtgc ttcacgatca tgcatttatg   1440

caatacggca tggtgtgtct gtttgataaa gaacgcaatg cactctttgt ggaatccctg   1500

catggcatcg acggcgaaag gaaaaaagag acccgccatg tccgttaccg catgggggaa   1560

ggcgtgatcg gcgcggtgat gagccagcgt caggcgctgg tgttaccgcg catttcagac   1620

gatcagcgtt ttctcgaccg cctgaatatt tacgattaca gcctgccgtt gattggcgtg   1680

ccgatccccg gtgcggataa tcagccatcg ggcgtgctgg tggcacagcc gatggcgttg   1740

cacgaagacc ggctgactgc cagtacgcgg tttttagaaa tggtcg                  1786
```

<210> SEQ ID NO 219
<211> LENGTH: 993
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1.2

<400> SEQUENCE: 219

```
atgagcatca cggcgttatc agcatcattt cctgagggga atatcgccag ccgcttgtcg     60

ctgcaacatc cttcactgtt ttataccgtg gttgaacaat cttcggtggc gatttcgctg    120

accgatccgc aggcgcgcat ttgttatgcc aatccggcat tctgccgcca gacgggtttt    180

gcacttgaga cacttttggg cgagaaccac cgtctgctgg tgaacatcac tgatgcacaa    240

gctacctatg tcgaagaatt aactaaaaaa ctgcaagatg caggcattcg cgttaaagcc    300

gacttgagaa atgagaagat tggctttaaa attcgcgaac acacgctacg ccgtgttcct    360

tatatgttag tttgtggcga taaagaggtc gaagcaggca aagttgctgt tcgtacccgc    420

cgcggcaaag acttaggaag catggatgtt agcgaagtcg ttgacaaact gctggcggaa    480

atccgcagca gaagtcttca tcaactggag gaataaagta ttaaaggcgg aaaacgagtt    540

caaccggcgc gtcctaatcg cattaacaaa gagattcgcg cgcaagaagt tcgcctcaca    600
```

```
ggcgtcgatg gcgagcagat tggtattgtc agtctgaatg aagctcttga aaaagctgag    660

gaagcgggcg tcgatttagt agaaatcagt ccgaatgccg agccgccagt ttgtcgaatc    720

ccgtctctga agctctcggt gaacattgtt gcgaggcagg atgcgagctg gttgtgtttt    780

gacattaccg ataatgtgcc gcgtgaacgg gtgcgttatg cccgcccgga agcggcgttt    840

tcccgtccgg ggaatggcat ggagctgcgc cttatccaga cgctgatcgc ccatcatcgc    900

ggttctttag atctctcggt ccgccctgat ggcggcacct tgctgacgtt acgcctgccg    960

gtacagcagg ttatcaccgg aggcttaaaa tga                                 993
```

```
<210> SEQ ID NO 220
<211> LENGTH: 1993
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1.2 with 500bp flank

<400> SEQUENCE: 220

tgtttcgtct cgaggccggg caactgagcg gccccgttga aaccgacctg ggctggcatc     60

tgttgttgtg cgaacaaatt cgcctgccgc aacccttgcc gaaagccgaa gccttaacgc    120

gggtgcgtca gcaactgatt gcccggcaac agaaacatta tcagcgccag tggctgcaac    180

aactgatcaa cgcctgagcc tgttctcctt cttgttgatg cagacgggtt aatgcccgtt    240

ttgcacgaaa aatgcacata aattgcctgc gttgccttat aacagcgcag ggaaatcctg    300

cctccggcct tgtgccacac cgcgctttgc ctggtttgtg gtaaaaactg gcccgctttg    360

catcctgatg cttaaaacac cccgttcaga tcaacctttg ggcagataag cccgcgaaag    420

gcctgcaaat tgcacggtta ttccgggtga gtatatgtgt gatttgggtt ccggcattgc    480

gcaataaagg ggagaaagac atgagcatca cggcgttatc agcatcattt cctgagggga    540

atatcgccag ccgcttgtcg ctgcaacatc cttcactgtt ttataccgtg gttgaacaat    600

cttcggtggc gatttcgctg accgatccgc aggcgcgcat ttgttatgcc aatccggcat    660

tctgccgcca gacgggtttt gcacttgaga cacttttggg cgagaaccac cgtctgctgg    720

tgaacatcac tgatgcacaa gctacctatg tcgaagaatt aactaaaaaa ctgcaagatg    780

caggcattcg cgttaaagcc gacttgagaa atgagaagat tggctttaaa attcgcgaac    840

acacgctacg ccgtgttcct tatatgttag tttgtggcga taaagaggtc gaagcaggca    900

aagttgctgt tcgtacccgc cgcggcaaag acttaggaag catggatgtt agcgaagtcg    960

ttgacaaact gctggcggaa atccgcagca gaagtcttca tcaactggag gaataaagta   1020

ttaaaggcgg aaaacgagtt caaccggcgc gtcctaatcg cattaacaaa gagattcgcg   1080

cgcaagaagt tcgcctcaca ggcgtcgatg gcgagcagat tggtattgtc agtctgaatg   1140

aagctcttga aaaagctgag gaagcgggcg tcgatttagt agaaatcagt ccgaatgccg   1200

agccgccagt ttgtcgaatc ccgtctctga agctctcggt gaacattgtt gcgaggcagg   1260

atgcgagctg gttgtgtttt gacattaccg ataatgtgcc gcgtgaacgg gtgcgttatg   1320

cccgcccgga agcggcgttt tcccgtccgg ggaatggcat ggagctgcgc cttatccaga   1380

cgctgatcgc ccatcatcgc ggttctttag atctctcggt ccgccctgat ggcggcacct   1440

tgctgacgtt acgcctgccg gtacagcagg ttatcaccgg aggcttaaaa tgacccagtt   1500

acctaccgcg ggcccggtta tccggcgctt tgatatgtct gcccagttta cggcgcttta   1560

tcgcatcagc gtggcgctga gtcaggaaag caacaccggg cgcgcactgg cggcgatcct   1620
```

```
cgaagtgctt cacgatcatg catttatgca atacggcatg gtgtgtctgt ttgataaaga   1680

acgcaatgca ctctttgtgg aatccctgca tggcatcgac ggcgaaagga aaaaagagac   1740

ccgccatgtc cgttaccgca tgggggaagg cgtgatcggc gcggtgatga gccagcgtca   1800

ggcgctggtg ttaccgcgca tttcagacga tcagcgtttt ctcgaccgcc tgaatattta   1860

cgattacagc ctgccgttga ttggcgtgcc gatccccggt gcggataatc agccatcggg   1920

cgtgctggtg gcacagccga tggcgttgca cgaagaccgg ctgactgcca gtacgcggtt   1980

tttagaaatg gtc                                                      1993
```

<210> SEQ ID NO 221
<211> LENGTH: 993
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1.2

<400> SEQUENCE: 221

```
atgagcatca cggcgttatc agcatcattt cctgagggga atatcgccag ccgcttgtcg     60

ctgcaacatc cttcactgtt ttataccgtg gttgaacaat cttcggtggc gatttcgctg    120

accgatccgc aggcgcgcat ttgttatgcc aatccggcat tctgccgcca gacgggtttt    180

gcacttgaga cacttttggg cgagaaccac cgtctgctgg tgaacatcac tgatgcacaa    240

gctacctatg tcgaagaatt aactaaaaaa ctgcaagatg caggcattcg cgttaaagcc    300

gacttgagaa atgagaagat tggctttaaa attcgcgaac acacgctacg ccgtgttcct    360

tatatgttag tttgtggcga taaagaggtc gaagcaggca aagttgctgt tcgtacccgc    420

cgcggcaaag acttaggaag catggatgtt agcgaagtcg ttgacaaact gctggcggaa    480

atccgcagca gaagtcttca tcaactggag gaataaagta ttaaaggcgg aaaacgagtt    540

caaccggcgc gtcctaatcg cattaacaaa gagattcgcg cgcaagaagt tcgcctcaca    600

ggcgtcgatg gcgagcagat tggtattgtc agtctgaatg aagctcttga aaaagctgag    660

gaagcgggcg tcgatttagt agaaatcagt ccgaatgccg agccgccagt ttgtcgaatc    720

ccgtctctga agctctcggt gaacattgtt gcgaggcagg atgcgagctg gttgtgtttt    780

gacattaccg ataatgtgcc gcgtgaacgg gtgcgttatg cccgcccgga agcggcgttt    840

tcccgtccgg ggaatggcat ggagctgcgc cttatccaga cgctgatcgc ccatcatcgc    900

ggttctttag atctctcggt ccgccctgat ggcggcacct tgctgacgtt acgcctgccg    960

gtacagcagg ttatcaccgg aggcttaaaa tga                                993
```

<210> SEQ ID NO 222
<211> LENGTH: 1993
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1.2 with 500bp flank

<400> SEQUENCE: 222

```
tgtttcgtct cgaggccggg caactgagcg gccccgttga aaccgacctg ggctggcatc     60

tgttgttgtg cgaacaaatt cgcctgccgc aacccttgcc gaaagccgaa gccttaacgc    120

gggtgcgtca gcaactgatt gcccggcaac agaaacatta tcagcgccag tggctgcaac    180
```

aactgatcaa cgcctgagcc tgttctcctt cttgttgatg cagacgggtt aatgcccgtt 240
ttgcacgaaa aatgcacata aattgcctgc gttgccttat aacagcgcag ggaaatcctg 300
cctccggcct tgtgccacac cgcgctttgc ctggtttgtg gtaaaaactg gcccgctttg 360
catcctgatg cttaaaacac cccgttcaga tcaacctttg ggcagataag cccgcgaaag 420
gcctgcaaat tgcacggtta ttccgggtga gtatatgtgt gatttgggtt ccggcattgc 480
gcaataaagg ggagaaagac atgagcatca cggcgttatc agcatcattt cctgagggga 540
atatcgccag ccgcttgtcg ctgcaacatc cttcactgtt ttataccgtg gttgaacaat 600
cttcggtggc gatttcgctg accgatccgc aggcgcgcat ttgttatgcc aatccggcat 660
tctgccgcca gacgggtttt gcacttgaga cacttttggg cgagaaccac cgtctgctgg 720
tgaacatcac tgatgcacaa gctacctatg tcgaagaatt aactaaaaaa ctgcaagatg 780
caggcattcg cgttaaagcc gacttgagaa atgagaagat tggctttaaa attcgcgaac 840
acacgctacg ccgtgttcct tatatgttag tttgtggcga taaagaggtc gaagcaggca 900
aagttgctgt tcgtacccgc cgcggcaaag acttaggaag catggatgtt agcgaagtcg 960
ttgacaaact gctggcggaa atccgcagca gaagtcttca tcaactggag gaataaagta 1020
ttaaaggcgg aaaacgagtt caaccggcgc gtcctaatcg cattaacaaa gagattcgcg 1080
cgcaagaagt tcgcctcaca ggcgtcgatg gcgagcagat tggtattgtc agtctgaatg 1140
aagctcttga aaaagctgag gaagcgggcg tcgatttagt agaaatcagt ccgaatgccg 1200
agccgccagt ttgtcgaatc ccgtctctga agctctcggt gaacattgtt gcgaggcagg 1260
atgcgagctg gttgtgtttt gacattaccg ataatgtgcc gcgtgaacgg gtgcgttatg 1320
cccgcccgga agcggcgttt tcccgtccgg ggaatggcat ggagctgcgc cttatccaga 1380
cgctgatcgc ccatcatcgc ggttctttag atctctcggt ccgccctgat ggcggcacct 1440
tgctgacgtt acgcctgccg gtacagcagg ttatcaccgg aggcttaaaa tgacccagtt 1500
acctaccgcg ggcccggtta tccggcgctt tgatatgtct gcccagttta cggcgcttta 1560
tcgcatcagc gtggcgctga gtcaggaaag caacaccggg cgcgcactgg cggcgatcct 1620
cgaagtgctt cacgatcatg catttatgca atacggcatg gtgtgtctgt ttgataaaga 1680
acgcaatgca ctctttgtgg aatccctgca tggcatcgac ggcgaaagga aaaaagagac 1740
ccgccatgtc cgttaccgca tgggggaagg cgtgatcggc gcggtgatga gccagcgtca 1800
ggcgctggtg ttaccgcgca tttcagacga tcagcgtttt ctcgaccgcc tgaatattta 1860
cgattacagc ctgccgttga ttggcgtgcc gatccccggt gcggataatc agccatcggg 1920
cgtgctggtg gcacagccga tggcgttgca cgaagaccgg ctgactgcca gtacgcggtt 1980
tttagaaatg gtc 1993

<210> SEQ ID NO 223
<211> LENGTH: 1188
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2

<400> SEQUENCE: 223
atggcgctca aacagttaat ccgtctgtgt gccgcctcgc cgatggtcgc gacacaactt 60
gcacgtcatc ctttattgct cgatgaactg ctcgacccgc gcacgcttta ccagccgatt 120
gagccgggcg cttaccgcga cgaactgcgt cagtatctga tgcgggtgcc aacagaagac 180

```
gaagaacagc agcttgaagc cgtgcgccag ttcaaacagg cccagcattt gcgtatcgca    240

gccggggata tttccggggc attgccggtg atgaaagtca gtgaccattt aacctacctt    300

gccgaggcca ttctcgatgt cgtggtgcag catgcgtggg aacaaatggt cgtaaaatac    360

gggcagcccg cgcatcttca gcaccgtgag ggcgcggttt ttgccgtggt cggttacggg    420

aaactcggtg gctgggagct gggttatagc tcagatctgg atctggtctt cctgctcgat    480

tgcgcgccgg aggtgatgac ggacggcgaa cgcagcatcg acggacgtca gttttatctt    540

cggctggcgc agcgcattat gcacttattc agcacccgga catcgtcagg cattctttac    600

gaggttgatc cgcgtctgcg accttccggc gcatccggca tgctggtcag taccattgaa    660

gcgtttgcag attatcaggc caatgaagcc tggacgtggg agcatcaggc gctggttcgc    720

gcgcgcgtgg tttacgggga tccgcaactg acacagcaat ttaacgccac gcgtcgcgac    780

attctttgcc gccagcgcga tggcgacggc ctgcgtaagg aggtccgtga aatgcgcgag    840

aaaatgtatg cccatctggg gagtaaaaaa gcccacgagt ttgatctgaa agccgatccg    900

ggtggcatca cggatattga attcattgca caatacctgg ttctgcgttt cgcgcatgat    960

gagccgaagc tgacgcgctg gtctgataac gtgcggattt ttgaactgat ggcacgatat   1020

gacatcatgc cggaagagga agcgcgccat ctgacgcagg cttatgtgac gctgcgcgat   1080

gaaattcatc atctggcgtt gcaggaacac agcgggaaag tggccgcgga cagctttgct   1140

actgagcgcg cgcagatccg tgccagctgg gcaaagtggc tcggctga                1188
```

<210> SEQ ID NO 224
<211> LENGTH: 2188
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 with 500bp flank

<400> SEQUENCE: 224

```
cggtactgga acagaaatcg gcggatgcgc aggaaatttg ttatgacacg gcctgtctga     60

agtgcaagtt agtgcttact tcctggctgg caacctcagg ctggacgccg tttattgatg    120

ataaatctgc gaagaaactg gacgcttcct tcaaacgttt tgctgacatc atgctcggtc    180

gtaccgcagc ggatctgaaa gaagcctttg cgcagccact gacggaagaa ggttatcgcg    240

atcagctggc gcgcctgaaa cgccagatca ttaccttcca tttgcttgcc ggtgcttacc    300

ctgaaaaaga cgtcgatgcg tatattgccg gctgggtgga cctgcaacag gccatcgttc    360

agcagcaaca cgcctgggag gattcggccc gttctcacgc ggtgatgatg gatgctttct    420

ggttaaacgg gcaacctcgt taactgactg actagcctgg gcaaactgcc cgggcttttt    480

tttgcaagga atctgatttc atggcgctca aacagttaat ccgtctgtgt gccgcctcgc    540

cgatggtcgc gacacaactt gcacgtcatc ctttattgct cgatgaactg ctcgacccgc    600

gcacgcttta ccagccgatt gagccgggcg cttaccgcga cgaactgcgt cagtatctga    660

tgcgggtgcc aacagaagac gaagaacagc agcttgaagc cgtgcgccag ttcaaacagg    720

cccagcattt gcgtatcgca gccggggata tttccggggc attgccggtg atgaaagtca    780

gtgaccattt aacctacctt gccgaggcca ttctcgatgt cgtggtgcag catgcgtggg    840

aacaaatggt cgtaaaatac gggcagcccg cgcatcttca gcaccgtgag ggcgcggttt    900

ttgccgtggt cggttacggg aaactcggtg gctgggagct gggttatagc tcagatctgg    960
```

```
atctggtctt cctgctcgat tgcgcgccgg aggtgatgac ggacggcgaa cgcagcatcg   1020
acggacgtca gttttatctt cggctggcgc agcgcattat gcacttattc agcacccgga   1080
catcgtcagg cattctttac gaggttgatc cgcgtctgcg accttccggc gcatccggca   1140
tgctggtcag taccattgaa gcgtttgcag attatcaggc caatgaagcc tggacgtggg   1200
agcatcaggc gctggttcgc gcgcgcgtgg tttacgggga tccgcaactg acacagcaat   1260
ttaacgccac gcgtcgcgac attctttgcc gccagcgcga tggcgacggc ctgcgtaagg   1320
aggtccgtga aatgcgcgag aaaatgtatg cccatctggg gagtaaaaaa gcccacgagt   1380
ttgatctgaa agccgatccg ggtggcatca cggatattga attcattgca caatacctgg   1440
ttctgcgttt cgcgcatgat gagccgaagc tgacgcgctg gtctgataac gtgcggattt   1500
ttgaactgat ggcacgatat gacatcatgc cggaagagga agcgcgccat ctgacgcagg   1560
cttatgtgac gctgcgcgat gaaattcatc atctggcgtt gcaggaacac agcgggaaag   1620
tggccgcgga cagctttgct actgagcgcg cgcagatccg tgccagctgg gcaaagtggc   1680
tcggctgagg gtttttattc ggctaacagg cgcttgtgat attatccggc gcattgtatt   1740
tacccgattt gatttatctg ttttggagtc ttgggatgaa agtgactttg cctgattttc   1800
accgcgcagg tgtgctggtt gtcggtgacg taatgttaga ccgttactgg tatggcccga   1860
ccaatcgtat ttctccggaa gctccggtgc cggtggtgaa ggtcagtacc attgaagagc   1920
ggcctggcgg tgcagctaac gtggcgatga acatttcatc tctgggcgcc tcttcctgtc   1980
tgatcggcct gaccggcgta gacgacgctg cgcgtgccct cagtgagcgt ctggcagaag   2040
tgaaagttaa ctgcgatttc gtcgcactat ccacacatcc taccatcacc aaactgcgaa   2100
ttttgtcccg taaccagcaa ctgatccgcc tcgactttga ggaaggtttt gaaggcgttg   2160
atctcgagcc gatgctgacc aaaataga                                      2188
```

```
<210> SEQ ID NO 225
<211> LENGTH: 663
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm3.1

<400> SEQUENCE: 225
```

```
atgagcatca cggcgttatc agcatcattt cctgagggga atatcgccag ccgcttgtcg     60
ctgcaacatc cttcactgtt ttataccgtg gttgaacaat cttcggtggc gatttcgctg    120
accgatccgc aggcgcgcat ttgttatgcc aatccggcat tctgccgcca gacgggtttt    180
gcacttgaga cacttttggg cgagaaccac cgtctgctgg tacagtagcg cctctcaaaa    240
atagataaac ggctcatgta cgtgggccgt ttattttttc tacccataat cgggaaccgg    300
tgttataatg ccgcgccctc atattgtggg gatttcttaa tgacctatcc tgggtcctaa    360
agttgtagtt gacattagcg gagcactaac ccgtctctga agctctcggt gaacattgtt    420
gcgaggcagg atgcgagctg gttgtgtttt gacattaccg ataatgtgcc gcgtgaacgg    480
gtgcgttatg cccgcccgga agcggcgttt tcccgtccgg ggaatggcat ggagctgcgc    540
cttatccaga cgctgatcgc ccatcatcgc ggttctttag atctctcggt ccgccctgat    600
ggcggcacct tgctgacgtt acgcctgccg gtacagcagg ttatcaccgg aggcttaaaa    660
tga                                                                  663
```

<210> SEQ ID NO 226
<211> LENGTH: 1663
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm3.1 with 500bp flank

<400> SEQUENCE: 226

```
tgtttcgtct cgaggccggg caactgagcg gccccgttga aaccgacctg ggctggcatc     60
tgttgttgtg cgaacaaatt cgcctgccgc aacccttgcc gaaagccgaa gccttaacgc    120
gggtgcgtca gcaactgatt gcccggcaac agaaacatta tcagcgccag tggctgcaac    180
aactgatcaa cgcctgagcc tgttctcctt cttgttgatg cagacgggtt aatgcccgtt    240
ttgcacgaaa aatgcacata aattgcctgc gttgccttat aacagcgcag ggaaatcctg    300
cctccggcct tgtgccacac cgcgctttgc ctggtttgtg gtaaaaactg gcccgctttg    360
catcctgatg cttaaaacac cccgttcaga tcaacctttg ggcagataag cccgcgaaag    420
gcctgcaaat tgcacggtta ttccgggtga gtatatgtgt gatttgggtt ccggcattgc    480
gcaataaagg ggagaaagac atgagcatca cggcgttatc agcatcattt cctgagggga    540
atatcgccag ccgcttgtcg ctgcaacatc cttcactgtt ttataccgtg gttgaacaat    600
cttcggtggc gatttcgctg accgatccgc aggcgcgcat ttgttatgcc aatccggcat    660
tctgccgcca gacgggtttt gcacttgaga cacttttggg cgagaaccac cgtctgctgg    720
tacagtagcg cctctcaaaa atagataaac ggctcatgta cgtgggccgt ttattttttc    780
tacccataat cgggaaccgg tgttataatg ccgcgccctc atattgtggg gatttcttaa    840
tgacctatcc tgggtcctaa agttgtagtt gacattagcg gagcactaac ccgtctctga    900
agctctcggt gaacattgtt gcgaggcagg atgcgagctg gttgtgtttt gacattaccg    960
ataatgtgcc gcgtgaacgg gtgcgttatg cccgcccgga agcggcgttt tcccgtccgg   1020
ggaatggcat ggagctgcgc cttatccaga cgctgatcgc ccatcatcgc ggttctttag   1080
atctctcggt ccgccctgat ggcggcacct tgctgacgtt acgcctgccg gtacagcagg   1140
ttatcaccgg aggcttaaaa tgacccagtt acctaccgcg ggcccggtta tccggcgctt   1200
tgatatgtct gcccagttta cggcgcttta tcgcatcagc gtggcgctga gtcaggaaag   1260
caacaccggg cgcgcactgg cggcgatcct cgaagtgctt cacgatcatg catttatgca   1320
atacggcatg gtgtgtctgt ttgataaaga acgcaatgca ctctttgtgg aatccctgca   1380
tggcatcgac ggcgaaagga aaaaagagac ccgccatgtc cgttaccgca tgggggaagg   1440
cgtgatcggc gcggtgatga gccagcgtca ggcgctggtg ttaccgcgca tttcagacga   1500
tcagcgtttt ctcgaccgcc tgaatattta cgattacagc ctgccgttga ttggcgtgcc   1560
gatccccggt gcggataatc agccatcggg cgtgctggtg gcacagccga tggcgttgca   1620
cgaagaccgg ctgactgcca gtacgcggtt tttagaaatg gtc                     1663
```

<210> SEQ ID NO 227
<211> LENGTH: 1188
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2

<400> SEQUENCE: 227

```
atggcgctca aacagttaat ccgtctgtgt gccgcctcgc cgatggtcgc gacacaactt     60
gcacgtcatc ctttattgct cgatgaactg ctcgacccgc gcacgcttta ccagccgatt    120
gagccgggcg cttaccgcga cgaactgcgt cagtatctga tgcgggtgcc aacagaagac    180
gaagaacagc agcttgaagc cgtgcgccag ttcaaacagg cccagcattt gcgtatcgca    240
gccggggata tttccggggc attgccggtg atgaaagtca gtgaccattt aacctacctt    300
gccgaggcca ttctcgatgt cgtggtgcag catgcgtggg aacaaatggt cgtaaaatac    360
gggcagcccg cgcatcttca gcaccgtgag ggcgcggtt ttgccgtggt cggttacggg     420
aaactcggtg gctgggagct gggttatagc tcagatctgg atctggtctt cctgctcgat    480
tgcgcgccgg aggtgatgac ggacggcgaa cgcagcatcg acggacgtca gttttatctt    540
cggctggcgc agcgcattat gcacttattc agcacccgga catcgtcagg cattctttac    600
gaggttgatc cgcgtctgcg accttccggc gcatccggca tgctggtcag taccattgaa    660
gcgtttgcag attatcaggc caatgaagcc tggacgtggg agcatcaggc gctggttcgc    720
gcgcgcgtgg tttacgggga tccgcaactg acacagcaat ttaacgccac gcgtcgcgac    780
attctttgcc gccagcgcga tggcgacggc ctgcgtaagg aggtccgtga aatgcgcgag    840
aaaatgtatg cccatctggg gagtaaaaaa gcccacgagt ttgatctgaa agccgatccg    900
ggtggcatca cggatattga attcattgca caatacctgg ttctgcgttt cgcgcatgat    960
gagccgaagc tgacgcgctg gtctgataac gtgcggattt ttgaactgat ggcacgatat   1020
gacatcatgc cggaagagga agcgcgccat ctgacgcagg cttatgtgac gctgcgcgat   1080
gaaattcatc atctggcgtt gcaggaacac agcgggaaag tggccgcgga cagctttgct   1140
actgagcgcg cgcagatccg tgccagctgg gcaaagtggc tcggctga                1188
```

<210> SEQ ID NO 228
<211> LENGTH: 2188
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 with 500bp flank

<400> SEQUENCE: 228

```
cggtactgga acagaaatcg gcggatgcgc aggaaatttg ttatgacacg gcctgtctga     60
agtgcaagtt agtgcttact tcctggctgg caacctcagg ctggacgccg tttattgatg    120
ataaatctgc gaagaaactg gacgcttcct tcaaacgttt tgctgacatc atgctcggtc    180
gtaccgcagc ggatctgaaa gaagcctttg cgcagccact gacggaagaa ggttatcgcg    240
atcagctggc gcgcctgaaa cgccagatca ttaccttcca tttgcttgcc ggtgcttacc    300
ctgaaaaaga cgtcgatgcg tatattgccg gctgggtgga cctgcaacag gccatcgttc    360
agcagcaaca cgcctgggag gattcggccc gttctcacgc ggtgatgatg gatgctttct    420
ggttaaacgg gcaacctcgt taactgactg actagcctgg gcaaactgcc cgggcttttt    480
tttgcaagga atctgatttc atggcgctca aacagttaat ccgtctgtgt gccgcctcgc    540
cgatggtcgc gacacaactt gcacgtcatc ctttattgct cgatgaactg ctcgacccgc    600
gcacgcttta ccagccgatt gagccgggcg cttaccgcga cgaactgcgt cagtatctga    660
tgcgggtgcc aacagaagac gaagaacagc agcttgaagc cgtgcgccag ttcaaacagg    720
cccagcattt gcgtatcgca gccggggata tttccggggc attgccggtg atgaaagtca    780
gtgaccattt aacctacctt gccgaggcca ttctcgatgt cgtggtgcag catgcgtggg    840
```

aacaaatggt cgtaaaatac gggcagcccg cgcatcttca gcaccgtgag gggcgcggtt 900
ttgccgtggt cggttacggg aaactcggtg gctgggagct gggttatagc tcagatctgg 960
atctggtctt cctgctcgat tgcgcgccgg aggtgatgac ggacggcgaa cgcagcatcg 1020
acggacgtca gttttatctt cggctggcgc agcgcattat gcacttattc agcacccgga 1080
catcgtcagg cattctttac gaggttgatc cgcgtctgcg accttccggc gcatccggca 1140
tgctggtcag taccattgaa gcgtttgcag attatcaggc caatgaagcc tggacgtggg 1200
agcatcaggc gctggttcgc gcgcgcgtgg tttacgggga tccgcaactg acacagcaat 1260
ttaacgccac gcgtcgcgac attctttgcc gccagcgcga tggcgacggc ctgcgtaagg 1320
aggtccgtga aatgcgcgag aaaatgtatg cccatctggg gagtaaaaaa gcccacgagt 1380
ttgatctgaa agccgatccg ggtggcatca cggatattga attcattgca caatacctgg 1440
ttctgcgttt cgcgcatgat gagccgaagc tgacgcgctg gtctgataac gtgcggattt 1500
ttgaactgat ggcacgatat gacatcatgc cggaagagga agcgcgccat ctgacgcagg 1560
cttatgtgac gctgcgcgat gaaattcatc atctggcgtt gcaggaacac agcgggaaag 1620
tggccgcgga cagctttgct actgagcgcg cgcagatccg tgccagctgg gcaaagtggc 1680
tcggctgagg gtttttattc ggctaacagg cgcttgtgat attatccggc gcattgtatt 1740
tacccgattt gatttatctg ttttggagtc ttgggatgaa agtgactttg cctgattttc 1800
accgcgcagg tgtgctggtt gtcggtgacg taatgttaga ccgttactgg tatggcccga 1860
ccaatcgtat ttctccggaa gctccggtgc cggtggtgaa ggtcagtacc attgaagagc 1920
ggcctggcgg tgcagctaac gtggcgatga acatttcatc tctgggcgcc tcttcctgtc 1980
tgatcggcct gaccggcgta gacgacgctg cgcgtgccct cagtgagcgt ctggcagaag 2040
tgaaagttaa ctgcgatttc gtcgcactat ccacacatcc taccatcacc aaactgcgaa 2100
ttttgtcccg taaccagcaa ctgatccgcc tcgactttga ggaaggtttt gaaggcgttg 2160
atctcgagcc gatgctgacc aaaataga 2188

<210> SEQ ID NO 229
<211> LENGTH: 613
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::PinfC

<400> SEQUENCE: 229
atgagcatca cggcgttatc agctgaatat cactgactca caagctacct atgtcgaaga 60
attaactaaa aaactgcaag atgcaggcat tcgcgttaaa gccgacttga gaaatgagaa 120
gattggcttt aaaattcgcg aacacacgct acgccgtgtt ccttatatgt tagtttgtgg 180
cgataaagag gtcgaagcag gcaaagttgc tgttcgtact cgtcgcggca aagacttagg 240
aagcatggat gttagcgaag tcgttgacaa actgctggcg gaaatccgca gcagaagtca 300
tcatcaactg gaggaataaa gtattaaagg cggaaaacga gttcaaccgg cgcgtcctaa 360
tcgcattaac aaagagattc gcgcgcaaga agttcgcctc accggcgtcg atggcgagca 420
gattggtatt gtcagtctga atgaagctct tgaaaaagct gaggaagcgg gcgtcgattt 480
agtagaaatc agtccgaatg ccgagccgcc agtttgtcga atctctttag atctctcggt 540
ccgccctgat ggcggcacct tgctgacgtt acgcctgccg gtacagcagg ttatcaccgg 600
aggcttaaaa tga 613

<210> SEQ ID NO 230
<211> LENGTH: 1613
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::PinfC with 500bp flank

<400> SEQUENCE: 230
tgtttcgtct cgaagccggg caactgagca gccccgttga aaccgaactg ggctggcatc 60
tgttgttgtg cgaacaaatt cgcctgccgc aacccttgcc gaaagccgag gccttaacgc 120
gggtgcgtca gcaactgatt gcccggcaac agaatcatta tcagcgccag tggctgcaac 180
aactgatcaa cgcctgagcc tgttctcctt cttgttggtg cagacgggtt aatgcccgtt 240
ttgcacgaaa aatgcacata aactgccttc gctgccttat aacagcgcat ggaaatcctg 300
cctcctgcct tgtgccacgc cgcgctttgc ctggtttgtg gtaaaaactg gcccgctttg 360
catcctgatg tttaaaacac cccgttcaga tcaacctttg ggcagataag cccgcgaaag 420
gcctgcaaat tgcacggtta ttccgggtga gtatatgtgt gatttgggtt ccggcattgc 480
gcaataaagg ggagaaagac atgagcatca cggcgttatc agctgaatat cactgactca 540
caagctacct atgtcgaaga attaactaaa aaactgcaag atgcaggcat tcgcgttaaa 600
gccgacttga gaaatgagaa gattggcttt aaaattcgcg aacacacgct acgccgtgtt 660
ccttatatgt tagtttgtgg cgataaagag gtcgaagcag gcaaagttgc tgttcgtact 720
cgtcgcggca aagacttagg aagcatggat gttagcgaag tcgttgacaa actgctggcg 780
gaaatccgca gcagaagtca tcatcaactg gaggaataaa gtattaaagg cggaaaacga 840
gttcaaccgg cgcgtcctaa tcgcattaac aaagagattc gcgcgcaaga agttcgcctc 900
accggcgtcg atggcgagca gattggtatt gtcagtctga atgaagctct tgaaaaagct 960
gaggaagcgg gcgtcgattt agtagaaatc agtccgaatg ccgagccgcc agtttgtcga 1020
atctctttag atctctcggt ccgccctgat ggcggcacct tgctgacgtt acgcctgccg 1080
gtacagcagg ttatcaccgg aggcttaaaa tgacccagtt acctaccgcg ggcccggtta 1140
tccggcgctt tgatatgtct gcccagttta cggcgcttta tcgcatcagc gtggcgctga 1200
gtcaggaaag caataccgcg cgcgcactgg cggcgatcct cgaagtgctt cacgatcatg 1260
catttatgca atacggcatg gtgtgtctgt tcgataaaga acgcaatgca ctgtttgtgg 1320
aatccctgca tggcatcgac ggcgaaagga aaaaagaaac ccgccatgtc cgttaccgca 1380
tgggggaagg cgtgatcggc gcggtgatga gccagcgtca ggcgctggtg ttaccgcgca 1440
tttcagacga tcagcgtttt ctcgaccgcc tgaatattta cgattacagc ctgccgctga 1500
ttggtgtgcc gatccccggt gcggataatc agcctgcggg tgtgctggtg gcacagccga 1560
tggcgttgca cgaagaccgg ctggctgcca gtacgcggtt tttagaaatg gtc 1613

<210> SEQ ID NO 231
<211> LENGTH: 426
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm5

<400> SEQUENCE: 231

```
atgaccctga atatgatgat ggatgccggc ggacatcatc gcgacaaaca atattaatac     60

cggcaaccac accggcaatt tacgagactg cgcaggcatc ctttctcccg tcaatttctg    120

tcaaataaag taaaagaggc agtctacttg aattaccccc ggctggttga gcgtttgttg    180

aaaaaaagta actgaaaaat ccgtagaata gcgccactct gatggttaat taacctattc    240

aattaagaat tatctggatg aatgtgccat taaatgcgca gcataatggt gcgttgtgcg    300

ggaaaactgc tttttttga aagggttggt cagtagcgga aacaactcac ttcacacccc     360

gaagggggaa gttgcctgac cctacgattc ccgctatttc attcactgac cggaggttca    420

aaatga                                                               426
```

```
<210> SEQ ID NO 232
<211> LENGTH: 1426
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm5 with 500bp flank

<400> SEQUENCE: 232
```

```
accggatacg agagaaaagt gtctacatcg gttcggttga tattgaccgg cgcatccgcc     60

agcccgccca gtttctggtg gatctgtttg gcgattttgc gggtcttgcc ggtgtcggtg    120

ccgaaaaaaa taccaatatt tgccataaca cacgctcctg ttgaaaaaga gatcccgccg    180

ggaaatgcgg tgaacgtgtc tgatattgcg aagagtgtgc cagttttggt cgcgggcaaa    240

acctgcacca gtttggttat taatgcacca gtctggcgct tttttcgcc gagtttctcc     300

tcgctaatgc ccgccaggcg cggctttggc gctgatagcg cgctgaatac cgatctggat    360

caaggttttg tcgggttatc agccaaaagg tgcactcttt gcatggttat acgtgcctga    420

catgttgtcc gggcgacaaa cggcctggtg gcacaaattg tcagaactac gacacgacta    480

actgaccgca ggagtgtgcg atgaccctga atatgatgat ggatgccggc ggacatcatc    540

gcgacaaaca atattaatac cggcaaccac accggcaatt tacgagactg cgcaggcatc    600

ctttctcccg tcaatttctg tcaaataaag taaaagaggc agtctacttg aattaccccc    660

ggctggttga gcgtttgttg aaaaaaagta actgaaaaat ccgtagaata gcgccactct    720

gatggttaat taacctattc aattaagaat tatctggatg aatgtgccat taaatgcgca    780

gcataatggt gcgttgtgcg ggaaaactgc tttttttga aagggttggt cagtagcgga     840

aacaactcac ttcacacccc gaagggggaa gttgcctgac cctacgattc ccgctatttc    900

attcactgac cggaggttca aaatgaccca gcgaaccgag tcgggtaata ccgtctggcg    960

cttcgatttg tcccagcagt tcactgcgat gcagcgcata agcgtggtac tcagccgggc   1020

gaccgaggtc gatcagacgc tccagcaagt gctgtgcgta ttgcacaatg acgccttttt   1080

gcagcacggc atgatctgtc tgtacgacag ccagcaggcg attttgaata ttgaagcgtt   1140

gcaggaagcc gatcagcagt taatccccgg cagctcgcaa atccgctatc gtccgggcga   1200

agggctggtc gggacggtgc tttcgcaggg ccaatcatta gtgctggcgc gcgttgctga   1260

cgatcagcgc tttcttgacc ggctcgggtt gtatgattac aacctgccgt ttatcgccgt   1320

gccgctgata gggccagatg cgcagacttt cggtgtgctg acggcacaac ccatggcgcg   1380

ttacgaagag cgattacccg cctgcacccg ctttctggaa acggtc                  1426
```

```
<210> SEQ ID NO 233
```

<211> LENGTH: 461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1

<400> SEQUENCE: 233
atgaccctga atatgatgat ggatgccggc cgtcctgtaa taataaccgg acaattcgga 60
ctgattaaaa aagcgccctt gtggcgcttt ttttatattc ccgcctccat ttaaaataaa 120
aaatccaatc ggatttcact atttaaactg gccattatct aagatgaatc cgatggaagc 180
tcgctgtttt aacacgcgtt ttttaacctt ttattgaaag tcggtgcttc tttgagcgaa 240
cgatcaaatt taagtggatt cccatcaaaa aaatattctc aacctaaaaa agtttgtgta 300
atacttgtaa cgctacatgg agattaactc aatctagagg gtattaataa tgaatcgtac 360
taaactggta ctgggcgcaa ctcacttcac accccgaagg gggaagttgc ctgaccctac 420
gattcccgct atttcattca ctgaccggag gttcaaaatg a 461

<210> SEQ ID NO 234
<211> LENGTH: 1461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1 with 500bp flank

<400> SEQUENCE: 234
accggatacg agagaaaagt gtctacatcg gttcggttga tattgaccgg cgcatccgcc 60
agcccgccca gtttctggtg gatctgtttg gcgattttgc gggtcttgcc ggtgtcggtg 120
ccgaaaaaaa taccaatatt tgccataaca cacgctcctg ttgaaaaaga gatcccgccg 180
ggaaatgcgg tgaacgtgtc tgatattgcg aagagtgtgc cagttttggt cgcgggcaaa 240
acctgcacca gtttggttat taatgcacca gtctggcgct ttttttcgcc gagtttctcc 300
tcgctaatgc ccgccaggcg cggctttggc gctgatagcg cgctgaatac cgatctggat 360
caaggttttg tcgggttatc agccaaaagg tgcactcttt gcatggttat acgtgcctga 420
catgttgtcc gggcgacaaa cggcctggtg gcacaaattg tcagaactac gacacgacta 480
actgaccgca ggagtgtgcg atgaccctga atatgatgat ggatgccggc cgtcctgtaa 540
taataaccgg acaattcgga ctgattaaaa aagcgccctt gtggcgcttt ttttatattc 600
ccgcctccat ttaaaataaa aaatccaatc ggatttcact atttaaactg gccattatct 660
aagatgaatc cgatggaagc tcgctgtttt aacacgcgtt ttttaacctt ttattgaaag 720
tcggtgcttc tttgagcgaa cgatcaaatt taagtggatt cccatcaaaa aaatattctc 780
aacctaaaaa agtttgtgta atacttgtaa cgctacatgg agattaactc aatctagagg 840
gtattaataa tgaatcgtac taaactggta ctgggcgcaa ctcacttcac accccgaagg 900
gggaagttgc ctgaccctac gattcccgct atttcattca ctgaccggag gttcaaaatg 960
acccagcgaa ccgagtcggg taataccgtc tggcgcttcg atttgtccca gcagttcact 1020
gcgatgcagc gcataagcgt ggtactcagc cgggcgaccg aggtcgatca gacgctccag 1080
caagtgctgt gcgtattgca caatgacgcc tttttgcagc acggcatgat ctgtctgtac 1140
gacagccagc aggcgatttt gaatattgaa gcgttgcagg aagccgatca gcagttaatc 1200
cccggcagct cgcaaatccg ctatcgtccg ggcgaagggc tggtcgggac ggtgctttcg 1260

```
cagggccaat cattagtgct ggcgcgcgtt gctgacgatc agcgctttct tgaccggctc   1320

gggttgtatg attacaacct gccgtttatc gccgtgccgc tgatagggcc agatgcgcag   1380

actttcggtg tgctgacggc acaacccatg gcgcgttacg aagagcgatt acccgcctgc   1440

acccgctttc tggaaacggt c                                             1461
```

<210> SEQ ID NO 235
<211> LENGTH: 461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1

<400> SEQUENCE: 235

```
atgaccctga atatgatgat ggatgccggc cgtcctgtaa taataaccgg acaattcgga     60

ctgattaaaa aagcgccctt gtggcgcttt ttttatattc ccgcctccat ttaaaataaa    120

aaatccaatc ggatttcact atttaaactg gccattatct aagatgaatc cgatggaagc    180

tcgctgtttt aacacgcgtt ttttaacctt ttattgaaag tcggtgcttc tttgagcgaa    240

cgatcaaatt taagtggatt cccatcaaaa aaatattctc aacctaaaaa agtttgtgta    300

atacttgtaa cgctacatgg agattaactc aatctagagg gtattaataa tgaatcgtac    360

taaactggta ctgggcgcaa ctcacttcac accccgaagg gggaagttgc ctgaccctac    420

gattcccgct atttcattca ctgaccggag gttcaaaatg a                        461
```

<210> SEQ ID NO 236
<211> LENGTH: 1461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1 with 500bp flank

<400> SEQUENCE: 236

```
accggatacg agagaaaagt gtctacatcg gttcggttga tattgaccgg cgcatccgcc     60

agcccgccca gtttctggtg gatctgtttg gcgattttgc gggtcttgcc ggtgtcggtg    120

ccgaaaaaaa taccaatatt tgccataaca cacgctcctg ttgaaaaaga gatcccgccg    180

ggaaatgcgg tgaacgtgtc tgatattgcg aagagtgtgc cagttttggt cgcgggcaaa    240

acctgcacca gtttggttat taatgcacca gtctggcgct ttttttcgcc gagtttctcc    300

tcgctaatgc ccgccaggcg cggctttggc gctgatagcg cgctgaatac cgatctggat    360

caaggttttg tcgggttatc agccaaaagg tgcactcttt gcatggttat acgtgcctga    420

catgttgtcc gggcgacaaa cggcctggtg gcacaaattg tcagaactac gacacgacta    480

actgaccgca ggagtgtgcg atgaccctga atatgatgat ggatgccggc cgtcctgtaa    540

taataaccgg acaattcgga ctgattaaaa aagcgccctt gtggcgcttt ttttatattc    600

ccgcctccat ttaaaataaa aaatccaatc ggatttcact atttaaactg gccattatct    660

aagatgaatc cgatggaagc tcgctgtttt aacacgcgtt ttttaacctt ttattgaaag    720

tcggtgcttc tttgagcgaa cgatcaaatt taagtggatt cccatcaaaa aaatattctc    780

aacctaaaaa agtttgtgta atacttgtaa cgctacatgg agattaactc aatctagagg    840

gtattaataa tgaatcgtac taaactggta ctgggcgcaa ctcacttcac accccgaagg    900
```

gggaagttgc ctgaccctac gattcccgct atttcattca ctgaccggag gttcaaaatg 960
acccagcgaa ccgagtcggg taataccgtc tggcgcttcg atttgtccca gcagttcact 1020
gcgatgcagc gcataagcgt ggtactcagc cgggcgaccg aggtcgatca gacgctccag 1080
caagtgctgt gcgtattgca caatgacgcc tttttgcagc acggcatgat ctgtctgtac 1140
gacagccagc aggcgatttt gaatattgaa gcgttgcagg aagccgatca gcagttaatc 1200
cccggcagct cgcaaatccg ctatcgtccg ggcgaagggc tggtcgggac ggtgctttcg 1260
cagggccaat cattagtgct ggcgcgcgtt gctgacgatc agcgctttct tgaccggctc 1320
gggttgtatg attacaacct gccgtttatc gccgtgccgc tgatagggcc agatgcgcag 1380
actttcggtg tgctgacggc acaacccatg gcgcgttacg aagagcgatt acccgcctgc 1440
acccgctttc tggaaacggt c 1461

<210> SEQ ID NO 237
<211> LENGTH: 1188
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2

<400> SEQUENCE: 237
atggcactga aacacctcat ttccctgtgt gccgcgtcgc cgatggttgc cagtcagctg 60
gcgcgctacc cgatcctgct tgatgaattg ctcgacccga atacgctcta tcaaccgacg 120
gcgatgaatg cctatcgcga tgagctgcgc caatacctgc tgcgcgtgcc ggaagatgat 180
gaagagcaac agcttgaggc gctgcggcag tttaagcagg cgcagttgct gcgcgtggcg 240
gcggcggata ttgccggtac gttgccagta atgaaagtga gcgatcactt aacctggctg 300
gcggaagcga ttattgatgc ggtggtgcag caagcctggg ggcagatggt ggcgcgttat 360
ggccagccaa cgcatctgca cgatcgcgaa gggcgcggtt ttgcggtggt cggttatggc 420
aagctgggcg gctgggagct gggttacagc tccgatctgg atctggtatt cctgcacgac 480
tgcccgatgg atgtgatgac cgatggcgag cgtgaaatcg atggtcgcca gttctatttg 540
cgtctcgcgc agcgcgtgat gcacctgttt agcacgcgca cgtcgtccgg catcctttat 600
gaagttgatg cgcgtctgcg tccatctggc gctgcgggga tgctggtcac tactacggaa 660
tcgttcgccg attaccagca aaacgaagcc tggacgtggg aacatcaggc gctggcccgt 720
gcgcgcgtgg tgtacggcga tccgcaactg accgccgaat ttgacgccat tcgccgcgat 780
attctgatga cgcctcgcga cggcgcaacg ctgcaaaccg acgtgcgaga aatgcgcgag 840
aaaatgcgtg cccatcttgg caacaagcat aaagaccgct tcgatctgaa agccgatgaa 900
ggcggtatca ccgacatcga gtttatcgcc caatatctgg tgctgcgctt tgcccatgac 960
aagccgaaac tgacgcgctg gtcggataat gtgcgcattc tcgaagggct ggcgcaaaac 1020
ggcatcatgg aggagcagga agcgcaggca ttgacgctgg cgtacaccac attgcgtgat 1080
gagctgcacc acctggcgct gcaagagttg ccgggacatg tggcgctctc ctgttttgtc 1140
gccgagcgtg cgcttattaa aaccagctgg gacaagtggc tggtggaa 1188

<210> SEQ ID NO 238
<211> LENGTH: 2206
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 with 500bp flank

<400> SEQUENCE: 238

```
gcgcaaagcg agtgctcact tacgtgatct gttgacacaa tctgaagcga ccataacttc     60
tgccgtttca gcgaatacgg cggtgtggag cgcacaatca gccctggcga agctggtgct    120
caccgagtgg ctagtgacgc agggctggcg aaccttcctt gatgaaaaag cgcaggccaa    180
attcgccgac tcctttaaac gctttgctga catccatctg tcacgcagcg ccgccgagct    240
gaaaaaagcc tttgcccaac cgctgggcga cagctatcgc gaccagttgc cgcgcctggc    300
gcgtgatatc gactgcgcgt tactgctggc cgggcattac gatcgcgcgc gcgccgtgga    360
atggctggaa aactggcagg ggcttcagca cgccattgaa acgcgccaga gagtcgaaat    420
cgaacatttc cgtaataccg cgattaccca ggagccgttc tggttgcaca gcggaaaacg    480
ttaacgaaag gatatttcgc atggcactga aacacctcat ttccctgtgt gccgcgtcgc    540
cgatggttgc cagtcagctg gcgcgctacc cgatcctgct tgatgaattg ctcgacccga    600
atacgctcta tcaaccgacg gcgatgaatg cctatcgcga tgagctgcgc caatacctgc    660
tgcgcgtgcc ggaagatgat gaagagcaac agcttgaggc gctgcggcag tttaagcagg    720
cgcagttgct gcgcgtggcg gcggcggata ttgccggtac gttgccagta atgaaagtga    780
gcgatcactt aacctggctg gcggaagcga ttattgatgc ggtggtgcag caagcctggg    840
ggcagatggt ggcgcgttat ggccagccaa cgcatctgca cgatcgcgaa gggcgcggtt    900
ttgcggtggt cggttatggc aagctgggcg gctgggagct gggttacagc tccgatctgg    960
atctggtatt cctgcacgac tgcccgatgg atgtgatgac cgatggcgag cgtgaaatcg   1020
atggtcgcca gttctatttg cgtctcgcgc agcgcgtgat gcacctgttt agcacgcgca   1080
cgtcgtccgg catcctttat gaagttgatg cgcgtctgcg tccatctggc gctgcgggga   1140
tgctggtcac tactacggaa tcgttcgccg attaccagca aaacgaagcc tggacgtggg   1200
aacatcaggc gctggcccgt gcgcgcgtgg tgtacggcga tccgcaactg accgccgaat   1260
ttgacgccat tcgccgcgat attctgatga cgcctcgcga cggcgcaacg ctgcaaaccg   1320
acgtgcgaga aatgcgcgag aaaatgcgtg cccatcttgg caacaagcat aaagaccgct   1380
tcgatctgaa agccgatgaa ggcggtatca ccgacatcga gtttatcgcc caatatctgg   1440
tgctgcgctt tgcccatgac aagccgaaac tgacgcgctg gtcggataat gtgcgcattc   1500
tcgaagggct ggcgcaaaac ggcatcatgg aggagcagga agcgcaggca ttgacgctgg   1560
cgtacaccac attgcgtgat gagctgcacc acctggcgct gcaagagttg ccgggacatg   1620
tggcgctctc ctgttttgtc gccgagcgtg cgcttattaa aaccagctgg gacaagtggc   1680
tggtggaacc gtgcgccccg gcgtaagtgt ggtatcatcg cgcgcaaatt ttgtatctct   1740
caggagacag gaatgaaagt gacgctgcca gagtttaagc aagccggtgt aatggtggtg   1800
ggtgatgtga tgctggatcg ttactggtat ggcccaacca gccgtatctc tccggaagcg   1860
ccagtcccgg ttgttaaagt cgataccatt gaagagcgtc ctggcggcgc ggcaaacgtg   1920
gcgatgaata tcgcctcact gggcgccacg gcgcgtctgg ttggcctgac tggcattgac   1980
gatgcggcgc gcgcgctgag caaagcgctg gccgatgtta acgttaaatg tgacttcgtt   2040
tctgttccga cgcatcccac catcactaag ctgcgcgtgc tgtcgcgtaa ccagcagctg   2100
attcgcctgg actttgaaga gggttttgaa ggagtcgatc cgcaaccgat gcatgaacgc   2160
atcagccagg cgcttggtaa tattggcgcg ctggtgctgt cggatt                 2206
```

<210> SEQ ID NO 239
<211> LENGTH: 1563
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-1

<400> SEQUENCE: 239

```
atgtttaacg atctgattgg cgatgatgaa acggattcgc cggaagatgc gctttctgag     60

agctggcgcg aattgtggca ggatgcgttg caggaggagg attccacgcc cgtgctggcg    120

catctctcag aggacgatcg ccgccgcgtg gtggcgctga ttgccgattt tcgcaaagag    180

ttggataaac gcaccattgg cccgcgaggg cggcaggtac tcgatcactt aatgccgcat    240

ctgctcagcg atgtatgctc gcgcgacgat gcgccagtac cgctgtcacg cctgacgccg    300

ctgctcaccg gaattattac ccgcaccact taccttgagc tgctaagtga atttcccggc    360

gcactgaaac acctcatttc cctgtgtgcc gcgtcgccga tggttgccag tcagctggcg    420

cgctacccga tcctgcttga tgaattgctc gacccgaata cgctctatca accgacggcg    480

atgaatgcct atcgcgatga gctgcgccaa tacctgctgc gcgtgccgga agatgatgaa    540

gagcaacagc ttgaggcgct gcggcagttt aagcaggcgc agttgctgcg cgtggcggcg    600

gcggatattg ccggtacgtt gccagtaatg aaagtgagcg atcacttaac ctggctggcg    660

gaagcgatta ttgatgcggt ggtgcagcaa gcctgggggc agatggtggc gcgttatggc    720

cagccaacgc atctgcacga tcgcgaaggg cgcggttttg cggtggtcgg ttatggcaag    780

ctgggcggct gggagctggg ttacagctcc gatctggatc tggtattcct gcacgactgc    840

ccgatggatg tgatgaccga tggcgagcgt gaaatcgatg gtcgccagtt ctatttgcgt    900

ctcgcgcagc gcgtgatgca cctgtttagc acgcgcacgt cgtccggcat cctttatgaa    960

gttgatgcgc gtctgcgtcc atctggcgct gcggggatgc tggtcactac tacggaatcg   1020

ttcgccgatt accagcaaaa cgaagcctgg acgtgggaac atcaggcgct ggcccgtgcg   1080

cgcgtggtgt acggcgatcc gcaactgacc gccgaatttg acgccattcg ccgcgatatt   1140

ctgatgacgc ctcgcgacgg cgcaacgctg caaaccgacg tgcgagaaat gcgcgagaaa   1200

atgcgtgccc atcttggcaa caagcataaa gaccgcttcg atctgaaagc cgatgaaggc   1260

ggtatcaccg acatcgagtt tatcgcccaa tatctggtgc tgcgctttgc ccatgacaag   1320

ccgaaactga cgcgctggtc ggataatgtg cgcattctcg aagggctggc gcaaaacggc   1380

atcatggagg agcaggaagc gcaggcattg acgctggcgt acaccacatt gcgtgatgag   1440

ctgcaccacc tggcgctgca agagttgccg ggacatgtgg cgctctcctg ttttgtcgcc   1500

gagcgtgcgc ttattaaaac cagctgggac aagtggctgg tggaaccgtg cgccccggcg   1560

taa                                                                 1563
```

<210> SEQ ID NO 240
<211> LENGTH: 461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1

<400> SEQUENCE: 240

```
atgaccctga atatgatgat ggatgccggc cgtcctgtaa taataaccgg acaattcgga     60
```

ctgattaaaa aagcgccctt gtggcgcttt ttttatattc ccgcctccat ttaaaataaa 120
aaatccaatc ggatttcact atttaaactg gccattatct aagatgaatc cgatggaagc 180
tcgctgtttt aacacgcgtt ttttaacctt ttattgaaag tcggtgcttc tttgagcgaa 240
cgatcaaatt taagtggatt cccatcaaaa aaatattctc aacctaaaaa agtttgtgta 300
atacttgtaa cgctacatgg agattaactc aatctagagg gtattaataa tgaatcgtac 360
taaactggta ctgggcgcaa ctcacttcac accccgaagg gggaagttgc ctgaccctac 420
gattcccgct atttcattca ctgaccggag gttcaaaatg a 461

<210> SEQ ID NO 241
<211> LENGTH: 1461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1 with 500bp flank

<400> SEQUENCE: 241
accggatacg agagaaaagt gtctacatcg gttcggttga tattgaccgg cgcatccgcc 60
agcccgccca gtttctggtg gatctgtttg gcgattttgc gggtcttgcc ggtgtcggtg 120
ccgaaaaaaa taccaatatt tgccataaca cacgctcctg ttgaaaaaga gatcccgccg 180
ggaaatgcgg tgaacgtgtc tgatattgcg aagagtgtgc cagttttggt cgcgggcaaa 240
acctgcacca gtttggttat taatgcacca gtctggcgct ttttttcgcc gagtttctcc 300
tcgctaatgc ccgccaggcg cggctttggc gctgatagcg cgctgaatac cgatctggat 360
caaggttttg tcgggttatc agccaaaagg tgcactcttt gcatggttat acgtgcctga 420
catgttgtcc gggcgacaaa cggcctggtg gcacaaattg tcagaactac gacacgacta 480
actgaccgca ggagtgtgcg atgaccctga atatgatgat ggatgccggc cgtcctgtaa 540
taataaccgg acaattcgga ctgattaaaa aagcgccctt gtggcgcttt ttttatattc 600
ccgcctccat ttaaaataaa aaatccaatc ggatttcact atttaaactg gccattatct 660
aagatgaatc cgatggaagc tcgctgtttt aacacgcgtt ttttaacctt ttattgaaag 720
tcggtgcttc tttgagcgaa cgatcaaatt taagtggatt cccatcaaaa aaatattctc 780
aacctaaaaa agtttgtgta atacttgtaa cgctacatgg agattaactc aatctagagg 840
gtattaataa tgaatcgtac taaactggta ctgggcgcaa ctcacttcac accccgaagg 900
gggaagttgc ctgaccctac gattcccgct atttcattca ctgaccggag gttcaaaatg 960
acccagcgaa ccgagtcggg taataccgtc tggcgcttcg atttgtccca gcagttcact 1020
gcgatgcagc gcataagcgt ggtactcagc cgggcgaccg aggtcgatca gacgctccag 1080
caagtgctgt gcgtattgca caatgacgcc tttttgcagc acggcatgat ctgtctgtac 1140
gacagccagc aggcgatttt gaatattgaa gcgttgcagg aagccgatca gcagttaatc 1200
cccggcagct cgcaaatccg ctatcgtccg ggcgaagggc tggtcgggac ggtgctttcg 1260
cagggccaat cattagtgct ggcgcgcgtt gctgacgatc agcgctttct tgaccggctc 1320
gggttgtatg attacaacct gccgtttatc gccgtgccgc tgatagggcc agatgcgcag 1380
actttcggtg tgctgacggc acaacccatg gcgcgttacg aagagcgatt acccgcctgc 1440
acccgctttc tggaaacggt c 1461

<210> SEQ ID NO 242

<211> LENGTH: 2563
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-1 with 500bp flank

<400> SEQUENCE: 242
gcgcaaagcg agtgctcact tacgtgatct gttgacacaa tctgaagcga ccataacttc 60
tgccgtttca gcgaatacgg cggtgtggag cgcacaatca gccctggcga agctggtgct 120
caccgagtgg ctagtgacgc agggctggcg aaccttcctt gatgaaaaag cgcaggccaa 180
attcgccgac tcctttaaac gctttgctga catccatctg tcacgcagcg ccgccgagct 240
gaaaaaagcc tttgcccaac cgctgggcga cagctatcgc gaccagttgc cgcgcctggc 300
gcgtgatatc gactgcgcgt tactgctggc cgggcattac gatcgcgcgc gcgccgtgga 360
atggctggaa aactggcagg ggcttcagca cgccattgaa acgcgccaga gagtcgaaat 420
cgaacatttc cgtaataccg cgattaccca ggagccgttc tggttgcaca gcggaaaacg 480
ttaacgaaag gatatttcgc atgtttaacg atctgattgg cgatgatgaa acggattcgc 540
cggaagatgc gctttctgag agctggcgcg aattgtggca ggatgcgttg caggaggagg 600
attccacgcc cgtgctggcg catctctcag aggacgatcg ccgccgcgtg gtggcgctga 660
ttgccgattt tcgcaaagag ttggataaac gcaccattgg cccgcgaggg cggcaggtac 720
tcgatcactt aatgccgcat ctgctcagcg atgtatgctc gcgcgacgat gcgccagtac 780
cgctgtcacg cctgacgccg ctgctcaccg gaattattac ccgcaccact taccttgagc 840
tgctaagtga atttcccggc gcactgaaac acctcatttc cctgtgtgcc gcgtcgccga 900
tggttgccag tcagctggcg cgctacccga tcctgcttga tgaattgctc gacccgaata 960
cgctctatca accgacggcg atgaatgcct atcgcgatga gctgcgccaa tacctgctgc 1020
gcgtgccgga agatgatgaa gagcaacagc ttgaggcgct gcggcagttt aagcaggcgc 1080
agttgctgcg cgtggcggcg gcggatattg ccggtacgtt gccagtaatg aaagtgagcg 1140
atcacttaac ctggctggcg gaagcgatta ttgatgcggt ggtgcagcaa gcctgggggc 1200
agatggtggc gcgttatggc cagccaacgc atctgcacga tcgcgaaggg cgcggttttg 1260
cggtggtcgg ttatggcaag ctgggcggct gggagctggg ttacagctcc gatctggatc 1320
tggtattcct gcacgactgc ccgatggatg tgatgaccga tggcgagcgt gaaatcgatg 1380
gtcgccagtt ctatttgcgt ctcgcgcagc gcgtgatgca cctgtttagc acgcgcacgt 1440
cgtccggcat cctttatgaa gttgatgcgc gtctgcgtcc atctggcgct gcggggatgc 1500
tggtcactac tacggaatcg ttcgccgatt accagcaaaa cgaagcctgg acgtgggaac 1560
atcaggcgct ggcccgtgcg cgcgtggtgt acggcgatcc gcaactgacc gccgaatttg 1620
acgccattcg ccgcgatatt ctgatgacgc ctcgcgacgg cgcaacgctg caaaccgacg 1680
tgcgagaaat gcgcgagaaa atgcgtgccc atcttggcaa caagcataaa gaccgcttcg 1740
atctgaaagc cgatgaaggc ggtatcaccg acatcgagtt tatcgcccaa tatctggtgc 1800
tgcgctttgc ccatgacaag ccgaaactga cgcgctggtc ggataatgtg cgcattctcg 1860
aagggctggc gcaaaacggc atcatggagg agcaggaagc gcaggcattg acgctggcgt 1920
acaccacatt gcgtgatgag ctgcaccacc tggcgctgca agagttgccg ggacatgtgg 1980
cgctctcctg ttttgtcgcc gagcgtgcgc ttattaaaac cagctgggac aagtggctgg 2040
tggaaccgtg cgccccggcg taagtgtggt atcatcgcgc gcaaattttg tatctctcag 2100
gagacaggaa tgaaagtgac gctgccagag tttaagcaag ccggtgtaat ggtggtgggt 2160
gatgtgatgc tggatcgtta ctggtatggc ccaaccagcc gtatctctcc ggaagcgcca 2220
gtcccggttg ttaaagtcga taccattgaa gagcgtcctg gcggcgcggc aaacgtggcg 2280
atgaatatcg cctcactggg cgccacggcg cgtctggttg gcctgactgg cattgacgat 2340
gcggcgcgcg cgctgagcaa agcgctggcc gatgttaacg ttaaatgtga cttcgtttct 2400
gttccgacgc atcccaccat cactaagctg cgcgtgctgt cgcgtaacca gcagctgatt 2460
cgcctggact ttgaagaggg ttttgaagga gtcgatccgc aaccgatgca tgaacgcatc 2520
agccaggcgc ttggtaatat tggcgcgctg gtgctgtcgg att 2563

<210> SEQ ID NO 243
<211> LENGTH: 1563
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-1

<400> SEQUENCE: 243
atgtttaacg atctgattgg cgatgatgaa acggattcgc cggaagatgc gctttctgag 60
agctggcgcg aattgtggca ggatgcgttg caggaggagg attccacgcc cgtgctggcg 120
catctctcag aggacgatcg ccgccgcgtg gtggcgctga ttgccgattt tcgcaaagag 180
ttggataaac gcaccattgg cccgcgaggg cggcaggtac tcgatcactt aatgccgcat 240
ctgctcagcg atgtatgctc gcgcgacgat gcgccagtac cgctgtcacg cctgacgccg 300
ctgctcaccg gaattattac ccgcaccact taccttgagc tgctaagtga atttcccggc 360
gcactgaaac acctcatttc cctgtgtgcc gcgtcgccga tggttgccag tcagctggcg 420
cgctacccga tcctgcttga tgaattgctc gacccgaata cgctctatca accgacggcg 480
atgaatgcct atcgcgatga gctgcgccaa tacctgctgc gcgtgccgga agatgatgaa 540
gagcaacagc ttgaggcgct gcggcagttt aagcaggcgc agttgctgcg cgtggcggcg 600
gcggatattg ccggtacgtt gccagtaatg aaagtgagcg atcacttaac ctggctggcg 660
gaagcgatta ttgatgcggt ggtgcagcaa gcctgggggc agatggtggc gcgttatggc 720
cagccaacgc atctgcacga tcgcgaaggg cgcggttttg cggtggtcgg ttatggcaag 780
ctgggcggct gggagctggg ttacagctcc gatctggatc tggtattcct gcacgactgc 840
ccgatggatg tgatgaccga tggcgagcgt gaaatcgatg gtcgccagtt ctatttgcgt 900
ctcgcgcagc gcgtgatgca cctgtttagc acgcgcacgt cgtccggcat cctttatgaa 960
gttgatgcgc gtctgcgtcc atctggcgct gcggggatgc tggtcactac tacggaatcg 1020
ttcgccgatt accagcaaaa cgaagcctgg acgtgggaac atcaggcgct ggcccgtgcg 1080
cgcgtggtgt acggcgatcc gcaactgacc gccgaatttg acgccattcg ccgcgatatt 1140
ctgatgacgc ctcgcgacgg cgcaacgctg caaaccgacg tgcgagaaat gcgcgagaaa 1200
atgcgtgccc atcttggcaa caagcataaa gaccgcttcg atctgaaagc cgatgaaggc 1260
ggtatcaccg acatcgagtt tatcgcccaa tatctggtgc tgcgctttgc ccatgacaag 1320
ccgaaactga cgcgctggtc ggataatgtg cgcattctcg aagggctggc gcaaaacggc 1380
atcatggagg agcaggaagc gcaggcattg acgctggcgt acaccacatt gcgtgatgag 1440
ctgcaccacc tggcgctgca agagttgccg ggacatgtgg cgctctcctg ttttgtcgcc 1500
gagcgtgcgc ttattaaaac cagctgggac aagtggctgg tggaaccgtg cgccccggcg 1560
taa 1563

<210> SEQ ID NO 244
<211> LENGTH: 2563
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-1 with 500bp flank

<400> SEQUENCE: 244
gcgcaaagcg agtgctcact tacgtgatct gttgacacaa tctgaagcga ccataacttc 60
tgccgtttca gcgaatacgg cggtgtggag cgcacaatca gccctggcga agctggtgct 120
caccgagtgg ctagtgacgc agggctggcg aaccttcctt gatgaaaaag cgcaggccaa 180
attcgccgac tcctttaaac gctttgctga catccatctg tcacgcagcg ccgccgagct 240
gaaaaaagcc tttgcccaac cgctgggcga cagctatcgc gaccagttgc cgcgcctggc 300
gcgtgatatc gactgcgcgt tactgctggc cgggcattac gatcgcgcgc gcgccgtgga 360
atggctggaa aactggcagg ggcttcagca cgccattgaa acgcgccaga gagtcgaaat 420
cgaacatttc cgtaataccg cgattaccca ggagccgttc tggttgcaca gcggaaaacg 480
ttaacgaaag gatatttcgc atgtttaacg atctgattgg cgatgatgaa acggattcgc 540
cggaagatgc gctttctgag agctggcgcg aattgtggca ggatgcgttg caggaggagg 600
attccacgcc cgtgctggcg catctctcag aggacgatcg ccgccgcgtg gtggcgctga 660
ttgccgattt tcgcaaagag ttggataaac gcaccattgg cccgcgaggg cggcaggtac 720
tcgatcactt aatgccgcat ctgctcagcg atgtatgctc gcgcgacgat gcgccagtac 780
cgctgtcacg cctgacgccg ctgctcaccg gaattattac ccgcaccact taccttgagc 840
tgctaagtga atttcccggc gcactgaaac acctcatttc cctgtgtgcc gcgtcgccga 900
tggttgccag tcagctggcg cgctacccga tcctgcttga tgaattgctc gacccgaata 960
cgctctatca accgacggcg atgaatgcct atcgcgatga gctgcgccaa tacctgctgc 1020
gcgtgccgga agatgatgaa gagcaacagc ttgaggcgct gcggcagttt aagcaggcgc 1080
agttgctgcg cgtggcggcg gcggatattg ccggtacgtt gccagtaatg aaagtgagcg 1140
atcacttaac ctggctggcg gaagcgatta ttgatgcggt ggtgcagcaa gcctgggggc 1200
agatggtggc gcgttatggc cagccaacgc atctgcacga tcgcgaaggg cgcggttttg 1260
cggtggtcgg ttatggcaag ctgggcggct gggagctggg ttacagctcc gatctggatc 1320
tggtattcct gcacgactgc ccgatggatg tgatgaccga tggcgagcgt gaaatcgatg 1380
gtcgccagtt ctatttgcgt ctcgcgcagc gcgtgatgca cctgtttagc acgcgcacgt 1440
cgtccggcat cctttatgaa gttgatgcgc gtctgcgtcc atctggcgct gcggggatgc 1500
tggtcactac tacggaatcg ttcgccgatt accagcaaaa cgaagcctgg acgtgggaac 1560
atcaggcgct ggcccgtgcg cgcgtggtgt acggcgatcc gcaactgacc gccgaatttg 1620
acgccattcg ccgcgatatt ctgatgacgc ctcgcgacgg cgcaacgctg caaaccgacg 1680
tgcgagaaat gcgcgagaaa atgcgtgccc atcttggcaa caagcataaa gaccgcttcg 1740
atctgaaagc cgatgaaggc ggtatcaccg acatcgagtt tatcgcccaa tatctggtgc 1800
tgcgctttgc ccatgacaag ccgaaactga cgcgctggtc ggataatgtg cgcattctcg 1860
aagggctggc gcaaaacggc atcatggagg agcaggaagc gcaggcattg acgctggcgt 1920

```
acaccacatt gcgtgatgag ctgcaccacc tggcgctgca agagttgccg ggacatgtgg   1980

cgctctcctg ttttgtcgcc gagcgtgcgc ttattaaaac cagctgggac aagtggctgg   2040

tggaaccgtg cgccccggcg taagtgtggt atcatcgcgc gcaaattttg tatctctcag   2100

gagacaggaa tgaaagtgac gctgccagag tttaagcaag ccggtgtaat ggtggtgggt   2160

gatgtgatgc tggatcgtta ctggtatggc ccaaccagcc gtatctctcc ggaagcgcca   2220

gtcccggttg ttaaagtcga taccattgaa gagcgtcctg gcggcgcggc aaacgtggcg   2280

atgaatatcg cctcactggg cgccacggcg cgtctggttg gcctgactgg cattgacgat   2340

gcggcgcgcg cgctgagcaa agcgctggcc gatgttaacg ttaaatgtga cttcgtttct   2400

gttccgacgc atcccaccat cactaagctg cgcgtgctgt cgcgtaacca gcagctgatt   2460

cgcctggact ttgaagaggg ttttgaagga gtcgatccgc aaccgatgca tgaacgcatc   2520

agccaggcgc ttggtaatat tggcgcgctg gtgctgtcgg att                      2563
```

<210> SEQ ID NO 245
<211> LENGTH: 426
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm5

<400> SEQUENCE: 245

```
atgaccctga atatgatgat ggatgccggc ggacatcatc gcgacaaaca atattaatac     60

cggcaaccac accggcaatt tacgagactg cgcaggcatc ctttctcccg tcaatttctg    120

tcaaataaag taaaagaggc agtctacttg aattaccccc ggctggttga gcgtttgttg    180

aaaaaaagta actgaaaaat ccgtagaata gcgccactct gatggttaat taacctattc    240

aattaagaat tatctggatg aatgtgccat taaatgcgca gcataatggt gcgttgtgcg    300

ggaaaactgc ttttttttga aagggttggt cagtagcgga aacaactcac ttcacacccc    360

gaagggggaa gttgcctgac cctacgattc ccgctatttc attcactgac cggaggttca    420

aaatga                                                               426
```

<210> SEQ ID NO 246
<211> LENGTH: 1426
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm5 with 500bp flank

<400> SEQUENCE: 246

```
accggatacg agagaaaagt gtctacatcg gttcggttga tattgaccgg cgcatccgcc     60

agcccgccca gtttctggtg gatctgtttg gcgattttgc gggtcttgcc ggtgtcggtg    120

ccgaaaaaaa taccaatatt tgccataaca cacgctcctg ttgaaaaaga gatcccgccg    180

ggaaatgcgg tgaacgtgtc tgatattgcg aagagtgtgc cagttttggt cgcgggcaaa    240

acctgcacca gtttggttat taatgcacca gtctggcgct ttttttcgcc gagtttctcc    300

tcgctaatgc ccgccaggcg cggctttggc gctgatagcg cgctgaatac cgatctggat    360

caaggttttg tcgggttatc agccaaaagg tgcactcttt gcatggttat acgtgcctga    420

catgttgtcc gggcgacaaa cggcctggtg gcacaaattg tcagaactac gacacgacta    480
```

```
actgaccgca ggagtgtgcg atgaccctga atatgatgat ggatgccggc ggacatcatc    540

gcgacaaaca atattaatac cggcaaccac accggcaatt tacgagactg cgcaggcatc    600

ctttctcccg tcaatttctg tcaaataaag taaaagaggc agtctacttg aattaccccc    660

ggctggttga gcgtttgttg aaaaaaagta actgaaaaat ccgtagaata gcgccactct    720

gatggttaat taacctattc aattaagaat tatctggatg aatgtgccat taaatgcgca    780

gcataatggt gcgttgtgcg ggaaaactgc ttttttttga aagggttggt cagtagcgga    840

aacaactcac ttcacacccc gaagggggaa gttgcctgac cctacgattc ccgctatttc    900

attcactgac cggaggttca aaatgaccca gcgaaccgag tcgggtaata ccgtctggcg    960

cttcgatttg tcccagcagt tcactgcgat gcagcgcata agcgtggtac tcagccgggc   1020

gaccgaggtc gatcagacgc tccagcaagt gctgtgcgta ttgcacaatg acgccttttt   1080

gcagcacggc atgatctgtc tgtacgacag ccagcaggcg attttgaata ttgaagcgtt   1140

gcaggaagcc gatcagcagt taatccccgg cagctcgcaa atccgctatc gtccgggcga   1200

agggctggtc gggacggtgc tttcgcaggg ccaatcatta gtgctggcgc gcgttgctga   1260

cgatcagcgc tttcttgacc ggctcgggtt gtatgattac aacctgccgt ttatcgccgt   1320

gccgctgata gggccagatg cgcagacttt cggtgtgctg acggcacaac ccatggcgcg   1380

ttacgaagag cgattacccg cctgcacccg ctttctggaa acggtc                  1426
```

<210> SEQ ID NO 247
<211> LENGTH: 461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1

<400> SEQUENCE: 247

```
atgaccctga atatgatgat ggatgccggc cgtcctgtaa taataaccgg acaattcgga     60

ctgattaaaa aagcgccctt gtggcgcttt ttttatattc ccgcctccat ttaaaataaa    120

aaatccaatc ggatttcact atttaaactg gccattatct aagatgaatc cgatggaagc    180

tcgctgtttt aacacgcgtt ttttaacctt ttattgaaag tcggtgcttc tttgagcgaa    240

cgatcaaatt taagtggatt cccatcaaaa aaatattctc aacctaaaaa agtttgtgta    300

atacttgtaa cgctacatgg agattaactc aatctagagg gtattaataa tgaatcgtac    360

taaactggta ctgggcgcaa ctcacttcac accccgaagg gggaagttgc ctgaccctac    420

gattcccgct atttcattca ctgaccggag gttcaaaatg a                        461
```

<210> SEQ ID NO 248
<211> LENGTH: 1461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1 with 500bp flank

<400> SEQUENCE: 248

```
accggatacg agagaaaagt gtctacatcg gttcggttga tattgaccgg cgcatccgcc     60

agcccgccca gtttctggtg gatctgtttg gcgattttgc gggtcttgcc ggtgtcggtg    120

ccgaaaaaaa taccaatatt tgccataaca cacgctcctg ttgaaaaaga gatcccgccg    180

ggaaatgcgg tgaacgtgtc tgatattgcg aagagtgtgc cagttttggt cgcgggcaaa    240
```

```
acctgcacca gtttggttat taatgcacca gtctggcgct tttttcgcc gagtttctcc    300

tcgctaatgc ccgccaggcg cggctttggc gctgatagcg cgctgaatac cgatctggat   360

caaggttttg tcgggttatc agccaaaagg tgcactcttt gcatggttat acgtgcctga   420

catgttgtcc gggcgacaaa cggcctggtg gcacaaattg tcagaactac gacacgacta   480

actgaccgca ggagtgtgcg atgaccctga atatgatgat ggatgccggc cgtcctgtaa   540

taataaccgg acaattcgga ctgattaaaa aagcgccctt gtggcgcttt ttttatattc   600

ccgcctccat ttaaaataaa aaatccaatc ggatttcact atttaaactg gccattatct   660

aagatgaatc cgatggaagc tcgctgtttt aacacgcgtt ttttaacctt ttattgaaag   720

tcggtgcttc tttgagcgaa cgatcaaatt taagtggatt cccatcaaaa aaatattctc   780

aacctaaaaa agtttgtgta atacttgtaa cgctacatgg agattaactc aatctagagg   840

gtattaataa tgaatcgtac taaactggta ctgggcgcaa ctcacttcac accccgaagg   900

gggaagttgc ctgaccctac gattcccgct atttcattca ctgaccggag gttcaaaatg   960

acccagcgaa ccgagtcggg taataccgtc tggcgcttcg atttgtccca gcagttcact  1020

gcgatgcagc gcataagcgt ggtactcagc cgggcgaccg aggtcgatca gacgctccag  1080

caagtgctgt gcgtattgca caatgacgcc tttttgcagc acggcatgat ctgtctgtac  1140

gacagccagc aggcgatttt gaatattgaa gcgttgcagg aagccgatca gcagttaatc  1200

cccggcagct cgcaaatccg ctatcgtccg ggcgaagggc tggtcgggac ggtgctttcg  1260

cagggccaat cattagtgct ggcgcgcgtt gctgacgatc agcgctttct tgaccggctc  1320

gggttgtatg attacaacct gccgtttatc gccgtgccgc tgatagggcc agatgcgcag  1380

actttcggtg tgctgacggc acaacccatg gcgcgttacg aagagcgatt acccgcctgc  1440

acccgctttc tggaaacggt c                                            1461
```

<210> SEQ ID NO 249
<211> LENGTH: 1188
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2

<400> SEQUENCE: 249

```
atggcactga aacacctcat ttccctgtgt gccgcgtcgc cgatggttgc cagtcagctg     60

gcgcgctacc cgatcctgct tgatgaattg ctcgacccga atacgctcta tcaaccgacg    120

gcgatgaatg cctatcgcga tgagctgcgc caatacctgc tgcgcgtgcc ggaagatgat    180

gaagagcaac agcttgaggc gctgcggcag tttaagcagg cgcagttgct gcgcgtggcg    240

gcggcggata ttgccggtac gttgccagta atgaaagtga gcgatcactt aacctggctg    300

gcggaagcga ttattgatgc ggtggtgcag caagcctggg ggcagatggt ggcgcgttat    360

ggccagccaa cgcatctgca cgatcgcgaa gggcgcggtt ttgcggtggt cggttatggc    420

aagctgggcg gctgggagct gggttacagc tccgatctgg atctggtatt cctgcacgac    480

tgcccgatgg atgtgatgac cgatggcgag cgtgaaatcg atggtcgcca gttctatttg    540

cgtctcgcgc agcgcgtgat gcacctgttt agcacgcgca cgtcgtccgg catcctttat    600

gaagttgatg cgcgtctgcg tccatctggc gctgcgggga tgctggtcac tactacggaa    660

tcgttcgccg attaccagca aaacgaagcc tggacgtggg aacatcaggc gctggcccgt    720
```

gcgcgcgtgg tgtacggcga tccgcaactg accgccgaat ttgacgccat tcgccgcgat 780
attctgatga cgcctcgcga cggcgcaacg ctgcaaaccg acgtgcgaga aatgcgcgag 840
aaaatgcgtg cccatcttgg caacaagcat aaagaccgct tcgatctgaa agccgatgaa 900
ggcggtatca ccgacatcga gtttatcgcc caatatctgg tgctgcgctt tgcccatgac 960
aagccgaaac tgacgcgctg gtcggataat gtgcgcattc tcgaagggct ggcgcaaaac 1020
ggcatcatgg aggagcagga agcgcaggca ttgacgctgg cgtacaccac attgcgtgat 1080
gagctgcacc acctggcgct gcaagagttg ccgggacatg tggcgctctc ctgttttgtc 1140
gccgagcgtg cgcttattaa aaccagctgg gacaagtggc tggtggaa 1188

<210> SEQ ID NO 250
<211> LENGTH: 2206
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 with 500bp flank

<400> SEQUENCE: 250
gcgcaaagcg agtgctcact tacgtgatct gttgacacaa tctgaagcga ccataacttc 60
tgccgtttca gcgaatacgg cggtgtggag cgcacaatca gccctggcga agctggtgct 120
caccgagtgg ctagtgacgc agggctggcg aaccttcctt gatgaaaaag cgcaggccaa 180
attcgccgac tcctttaaac gctttgctga catccatctg tcacgcagcg ccgccgagct 240
gaaaaaagcc tttgcccaac cgctgggcga cagctatcgc gaccagttgc cgcgcctggc 300
gcgtgatatc gactgcgcgt tactgctggc cgggcattac gatcgcgcgc gcgccgtgga 360
atggctggaa aactggcagg ggcttcagca cgccattgaa acgcgccaga gagtcgaaat 420
cgaacatttc cgtaataccg cgattaccca ggagccgttc tggttgcaca gcggaaaacg 480
ttaacgaaag gatatttcgc atggcactga aacacctcat ttccctgtgt gccgcgtcgc 540
cgatggttgc cagtcagctg gcgcgctacc cgatcctgct tgatgaattg ctcgacccga 600
atacgctcta tcaaccgacg gcgatgaatg cctatcgcga tgagctgcgc caatacctgc 660
tgcgcgtgcc ggaagatgat gaagagcaac agcttgaggc gctgcggcag tttaagcagg 720
cgcagttgct gcgcgtggcg gcggcggata ttgccggtac gttgccagta atgaaagtga 780
gcgatcactt aacctggctg gcggaagcga ttattgatgc ggtggtgcag caagcctggg 840
ggcagatggt ggcgcgttat ggccagccaa cgcatctgca cgatcgcgaa gggcgcggtt 900
ttgcggtggt cggttatggc aagctgggcg gctgggagct gggttacagc tccgatctgg 960
atctggtatt cctgcacgac tgcccgatgg atgtgatgac cgatggcgag cgtgaaatcg 1020
atggtcgcca gttctatttg cgtctcgcgc agcgcgtgat gcacctgttt agcacgcgca 1080
cgtcgtccgg catcctttat gaagttgatg cgcgtctgcg tccatctggc gctgcgggga 1140
tgctggtcac tactacggaa tcgttcgccg attaccagca aaacgaagcc tggacgtggg 1200
aacatcaggc gctggcccgt gcgcgcgtgg tgtacggcga tccgcaactg accgccgaat 1260
ttgacgccat tcgccgcgat attctgatga cgcctcgcga cggcgcaacg ctgcaaaccg 1320
acgtgcgaga aatgcgcgag aaaatgcgtg cccatcttgg caacaagcat aaagaccgct 1380
tcgatctgaa agccgatgaa ggcggtatca ccgacatcga gtttatcgcc caatatctgg 1440
tgctgcgctt tgcccatgac aagccgaaac tgacgcgctg gtcggataat gtgcgcattc 1500
tcgaagggct ggcgcaaaac ggcatcatgg aggagcagga agcgcaggca ttgacgctgg 1560

```
cgtacaccac attgcgtgat gagctgcacc acctggcgct gcaagagttg ccgggacatg   1620
tggcgctctc ctgttttgtc gccgagcgtg cgcttattaa aaccagctgg gacaagtggc   1680
tggtggaacc gtgcgccccg gcgtaagtgt ggtatcatcg cgcgcaaatt ttgtatctct   1740
caggagacag gaatgaaagt gacgctgcca gagtttaagc aagccggtgt aatggtggtg   1800
ggtgatgtga tgctggatcg ttactggtat ggcccaacca gccgtatctc tccggaagcg   1860
ccagtcccgg ttgttaaagt cgataccatt gaagagcgtc ctggcggcgc ggcaaacgtg   1920
gcgatgaata tcgcctcact gggcgccacg gcgcgtctgg ttggcctgac tggcattgac   1980
gatgcggcgc gcgcgctgag caaagcgctg gccgatgtta acgttaaatg tgacttcgtt   2040
tctgttccga cgcatcccac catcactaag ctgcgcgtgc tgtcgcgtaa ccagcagctg   2100
attcgcctgg actttgaaga gggttttgaa ggagtcgatc cgcaaccgat gcatgaacgc   2160
atcagccagg cgcttggtaa tattggcgcg ctggtgctgt cggatt                  2206
```

<210> SEQ ID NO 251
<211> LENGTH: 199
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-amtB

<400> SEQUENCE: 251

```
tttcgctgaa ggtgtgacca tgggccatca ggtgctggtg cagctggaaa gtgttgccat     60
cactatcgtg tggtctggcg tggtggcctt tattggttac aaactggcgg acatgacggt    120
aggcctgcgc gtaccggaag aacaagaacg tgaagggctg gatgtaaaca gccacggcga    180
aaacgcctat aacgcctga                                                 199
```

<210> SEQ ID NO 252
<211> LENGTH: 1199
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-amtB with 500bp flank

<400> SEQUENCE: 252

```
tttcctttct gactctgccc gtccgggcgc actaacggcc tgaaatactc cctcttttca     60
ttcctggcac aacgattgca atgtctgttg cgtgttagct gcggccatta tcgaattcga    120
ctggaggggg atctatgaag ctggttaccg tggtgattaa gccattcaaa cttgaagacg    180
tgcgtgaagc gctttcttct attggtattc aagggttgac cgtaactgaa gtgaaaggct    240
ttggccgtca gaagggtcac gctgagctgt accgcggtgc ggaatatagc gttaatttcc    300
tgccgaaagt gaaaattgat gtggcgatcg ctgacgatca actcgatgaa gtaatcgatg    360
tgatcagcaa agcggcctac accggaaaaa ttggcgacgg caaaattttc gttgctgagc    420
tgcaacgcgt cattcgtatt cgtaccggcg aagccgacga agcggcactg taatacaaga    480
cacacagtga tggggatcgg tttcgctgaa ggtgtgacca tgggccatca ggtgctggtg    540
cagctggaaa gtgttgccat cactatcgtg tggtctggcg tggtggcctt tattggttac    600
aaactggcgg acatgacggt aggcctgcgc gtaccggaag aacaagaacg tgaagggctg    660
gatgtaaaca gccacggcga aaacgcctat aacgcctgat tgcgttgagt tatctcctga    720
```

gcataaaaaa gcctccattc ggaggctttt cttttttttaa gtttaaagcg cggttagttg 780
cgattgcgca tgacgccttc ctgcacgctg gacgcgacca gcacaccctc ttgcgtatag 840
aactcgccgc gcacaaaacc gcgagcgctg gaggctgacg tgctttccac actgtagagc 900
agccattcgt tcatattaaa cgggcgatgg aaccacatgg agtggtcaat ggtggcaacc 960
tgcataccgc gctcaaggaa gcccacgccg tgcggctgaa gtgcaaccgg caggaagtta 1020
aagtctgagg catatccaag cagatattga tgtacgcgaa aatcgtccgg caccgtgccg 1080
tttgcgcgga tccatacctg gcgggtggga tcggcaacgt ggcctttcag cgggttatga 1140
aactcaaccg ggcggatctc cagtggttta tcactaagaa acttctcttt ggcctgcgg 1199

<210> SEQ ID NO 253
<211> LENGTH: 1563
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-1

<400> SEQUENCE: 253
atgtttaacg atctgattgg cgatgatgaa acggattcgc cggaagatgc gctttctgag 60
agctggcgcg aattgtggca ggatgcgttg caggaggagg attccacgcc cgtgctggcg 120
catctctcag aggacgatcg ccgccgcgtg gtggcgctga ttgccgattt tcgcaaagag 180
ttggataaac gcaccattgg cccgcgaggg cggcaggtac tcgatcactt aatgccgcat 240
ctgctcagcg atgtatgctc gcgcgacgat gcgccagtac cgctgtcacg cctgacgccg 300
ctgctcaccg gaattattac ccgcaccact taccttgagc tgctaagtga atttcccggc 360
gcactgaaac acctcatttc cctgtgtgcc gcgtcgccga tggttgccag tcagctggcg 420
cgctacccga tcctgcttga tgaattgctc gacccgaata cgctctatca accgacggcg 480
atgaatgcct atcgcgatga gctgcgccaa tacctgctgc gcgtgccgga agatgatgaa 540
gagcaacagc ttgaggcgct gcggcagttt aagcaggcgc agttgctgcg cgtggcggcg 600
gcggatattg ccggtacgtt gccagtaatg aaagtgagcg atcacttaac ctggctggcg 660
gaagcgatta ttgatgcggt ggtgcagcaa gcctgggggc agatggtggc gcgttatggc 720
cagccaacgc atctgcacga tcgcgaaggg cgcggttttg cggtggtcgg ttatggcaag 780
ctgggcggct gggagctggg ttacagctcc gatctggatc tggtattcct gcacgactgc 840
ccgatggatg tgatgaccga tggcgagcgt gaaatcgatg gtcgccagtt ctatttgcgt 900
ctcgcgcagc gcgtgatgca cctgtttagc acgcgcacgt cgtccggcat cctttatgaa 960
gttgatgcgc gtctgcgtcc atctggcgct gcggggatgc tggtcactac tacggaatcg 1020
ttcgccgatt accagcaaaa cgaagcctgg acgtgggaac atcaggcgct ggcccgtgcg 1080
cgcgtggtgt acggcgatcc gcaactgacc gccgaatttg acgccattcg ccgcgatatt 1140
ctgatgacgc ctcgcgacgg cgcaacgctg caaaccgacg tgcgagaaat gcgcgagaaa 1200
atgcgtgccc atcttggcaa caagcataaa gaccgcttcg atctgaaagc cgatgaaggc 1260
ggtatcaccg acatcgagtt tatcgcccaa tatctggtgc tgcgctttgc ccatgacaag 1320
ccgaaactga cgcgctggtc ggataatgtg cgcattctcg aagggctggc gcaaaacggc 1380
atcatggagg agcaggaagc gcaggcattg acgctggcgt acaccacatt gcgtgatgag 1440
ctgcaccacc tggcgctgca agagttgccg ggacatgtgg cgctctcctg ttttgtcgcc 1500
gagcgtgcgc ttattaaaac cagctgggac aagtggctgg tggaaccgtg cgccccggcg 1560
taa 1563

<210> SEQ ID NO 254
<211> LENGTH: 2563
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-1 with 500bp flank

<400> SEQUENCE: 254
gcgcaaagcg agtgctcact tacgtgatct gttgacacaa tctgaagcga ccataacttc 60
tgccgtttca gcgaatacgg cggtgtggag cgcacaatca gccctggcga agctggtgct 120
caccgagtgg ctagtgacgc agggctggcg aaccttcctt gatgaaaaag cgcaggccaa 180
attcgccgac tcctttaaac gctttgctga catccatctg tcacgcagcg ccgccgagct 240
gaaaaaagcc tttgcccaac cgctgggcga cagctatcgc gaccagttgc cgcgcctggc 300
gcgtgatatc gactgcgcgt tactgctggc cgggcattac gatcgcgcgc gcgccgtgga 360
atggctggaa aactggcagg ggcttcagca cgccattgaa acgcgccaga gagtcgaaat 420
cgaacatttc cgtaataccg cgattaccca ggagccgttc tggttgcaca gcggaaaacg 480
ttaacgaaag gatatttcgc atgtttaacg atctgattgg cgatgatgaa acggattcgc 540
cggaagatgc gctttctgag agctggcgcg aattgtggca ggatgcgttg caggaggagg 600
attccacgcc cgtgctggcg catctctcag aggacgatcg ccgccgcgtg gtggcgctga 660
ttgccgattt tcgcaaagag ttggataaac gcaccattgg cccgcgaggg cggcaggtac 720
tcgatcactt aatgccgcat ctgctcagcg atgtatgctc gcgcgacgat gcgccagtac 780
cgctgtcacg cctgacgccg ctgctcaccg gaattattac ccgcaccact taccttgagc 840
tgctaagtga atttcccggc gcactgaaac acctcatttc cctgtgtgcc gcgtcgccga 900
tggttgccag tcagctggcg cgctacccga tcctgcttga tgaattgctc gacccgaata 960
cgctctatca accgacggcg atgaatgcct atcgcgatga gctgcgccaa tacctgctgc 1020
gcgtgccgga agatgatgaa gagcaacagc ttgaggcgct gcggcagttt aagcaggcgc 1080
agttgctgcg cgtggcggcg gcggatattg ccggtacgtt gccagtaatg aaagtgagcg 1140
atcacttaac ctggctggcg gaagcgatta ttgatgcggt ggtgcagcaa gcctgggggc 1200
agatggtggc gcgttatggc cagccaacgc atctgcacga tcgcgaaggg cgcggttttg 1260
cggtggtcgg ttatggcaag ctgggcggct gggagctggg ttacagctcc gatctggatc 1320
tggtattcct gcacgactgc ccgatggatg tgatgaccga tggcgagcgt gaaatcgatg 1380
gtcgccagtt ctatttgcgt ctcgcgcagc gcgtgatgca cctgtttagc acgcgcacgt 1440
cgtccggcat cctttatgaa gttgatgcgc gtctgcgtcc atctggcgct gcggggatgc 1500
tggtcactac tacggaatcg ttcgccgatt accagcaaaa cgaagcctgg acgtgggaac 1560
atcaggcgct ggcccgtgcg cgcgtggtgt acggcgatcc gcaactgacc gccgaatttg 1620
acgccattcg ccgcgatatt ctgatgacgc ctcgcgacgg cgcaacgctg caaaccgacg 1680
tgcgagaaat gcgcgagaaa atgcgtgccc atcttggcaa caagcataaa gaccgcttcg 1740
atctgaaagc cgatgaaggc ggtatcaccg acatcgagtt tatcgcccaa tatctggtgc 1800
tgcgctttgc ccatgacaag ccgaaactga cgcgctggtc ggataatgtg cgcattctcg 1860
aagggctggc gcaaaacggc atcatggagg agcaggaagc gcaggcattg acgctggcgt 1920

```
acaccacatt gcgtgatgag ctgcaccacc tggcgctgca agagttgccg ggacatgtgg   1980

cgctctcctg ttttgtcgcc gagcgtgcgc ttattaaaac cagctgggac aagtggctgg   2040

tggaaccgtg cgccccggcg taagtgtggt atcatcgcgc gcaaattttg tatctctcag   2100

gagacaggaa tgaaagtgac gctgccagag tttaagcaag ccggtgtaat ggtggtgggt   2160

gatgtgatgc tggatcgtta ctggtatggc ccaaccagcc gtatctctcc ggaagcgcca   2220

gtcccggttg ttaaagtcga taccattgaa gagcgtcctg gcggcgcggc aaacgtggcg   2280

atgaatatcg cctcactggg cgccacggcg cgtctggttg gcctgactgg cattgacgat   2340

gcggcgcgcg cgctgagcaa agcgctggcc gatgttaacg ttaaatgtga cttcgtttct   2400

gttccgacgc atcccaccat cactaagctg cgcgtgctgt cgcgtaacca gcagctgatt   2460

cgcctggact ttgaagaggg ttttgaagga gtcgatccgc aaccgatgca tgaacgcatc   2520

agccaggcgc ttggtaatat tggcgcgctg gtgctgtcgg att                     2563
```

<210> SEQ ID NO 255
<211> LENGTH: 461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1

<400> SEQUENCE: 255

```
atgaccctga atatgatgat ggatgccggc cgtcctgtaa taataaccgg acaattcgga     60

ctgattaaaa aagcgccctt gtggcgcttt ttttatattc ccgcctccat ttaaaataaa    120

aaatccaatc ggatttcact atttaaactg gccattatct aagatgaatc cgatggaagc    180

tcgctgtttt aacacgcgtt ttttaacctt ttattgaaag tcggtgcttc tttgagcgaa    240

cgatcaaatt taagtggatt cccatcaaaa aaatattctc aacctaaaaa agtttgtgta    300

atacttgtaa cgctacatgg agattaactc aatctagagg gtattaataa tgaatcgtac    360

taaactggta ctgggcgcaa ctcacttcac accccgaagg gggaagttgc ctgaccctac    420

gattcccgct atttcattca ctgaccggag gttcaaaatg a                        461
```

<210> SEQ ID NO 256
<211> LENGTH: 1461
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm1 with 500bp flank

<400> SEQUENCE: 256

```
accggatacg agagaaaagt gtctacatcg gttcggttga tattgaccgg cgcatccgcc     60

agcccgccca gtttctggtg gatctgtttg gcgattttgc gggtcttgcc ggtgtcggtg    120

ccgaaaaaaa taccaatatt tgccataaca cacgctcctg ttgaaaaaga gatcccgccg    180

ggaaatgcgg tgaacgtgtc tgatattgcg aagagtgtgc cagttttggt cgcgggcaaa    240

acctgcacca gtttggttat taatgcacca gtctggcgct ttttttcgcc gagtttctcc    300

tcgctaatgc ccgccaggcg cggctttggc gctgatagcg cgctgaatac cgatctggat    360

caaggttttg tcgggttatc agccaaaagg tgcactcttt gcatggttat acgtgcctga    420

catgttgtcc gggcgacaaa cggcctggtg gcacaaattg tcagaactac gacacgacta    480

actgaccgca ggagtgtgcg atgaccctga atatgatgat ggatgccggc cgtcctgtaa    540
```

taataaccgg acaattcgga ctgattaaaa aagcgccctt gtggcgcttt ttttatattc 600
ccgcctccat ttaaaataaa aaatccaatc ggatttcact atttaaactg gccattatct 660
aagatgaatc cgatggaagc tcgctgtttt aacacgcgtt ttttaacctt ttattgaaag 720
tcggtgcttc tttgagcgaa cgatcaaatt taagtggatt cccatcaaaa aaatattctc 780
aacctaaaaa agtttgtgta atacttgtaa cgctacatgg agattaactc aatctagagg 840
gtattaataa tgaatcgtac taaactggta ctgggcgcaa ctcacttcac accccgaagg 900
gggaagttgc ctgaccctac gattcccgct atttcattca ctgaccggag gttcaaaatg 960
acccagcgaa ccgagtcggg taataccgtc tggcgcttcg atttgtccca gcagttcact 1020
gcgatgcagc gcataagcgt ggtactcagc cgggcgaccg aggtcgatca gacgctccag 1080
caagtgctgt gcgtattgca caatgacgcc tttttgcagc acggcatgat ctgtctgtac 1140
gacagccagc aggcgatttt gaatattgaa gcgttgcagg aagccgatca gcagttaatc 1200
cccggcagct cgcaaatccg ctatcgtccg ggcgaagggc tggtcgggac ggtgctttcg 1260
cagggccaat cattagtgct ggcgcgcgtt gctgacgatc agcgctttct tgaccggctc 1320
gggttgtatg attacaacct gccgtttatc gccgtgccgc tgatagggcc agatgcgcag 1380
actttcggtg tgctgacggc acaacccatg gcgcgttacg aagagcgatt acccgcctgc 1440
acccgctttc tggaaacggt c 1461

<210> SEQ ID NO 257
<211> LENGTH: 199
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-amtB

<400> SEQUENCE: 257
tttcgctgaa ggtgtgacca tgggccatca ggtgctggtg cagctggaaa gtgttgccat 60
cactatcgtg tggtctggcg tggtggcctt tattggttac aaactggcgg acatgacggt 120
aggcctgcgc gtaccggaag aacaagaacg tgaagggctg gatgtaaaca gccacggcga 180
aaacgcctat aacgcctga 199

<210> SEQ ID NO 258
<211> LENGTH: 1199
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-amtB with 500bp flank

<400> SEQUENCE: 258
tttcctttct gactctgccc gtccgggcgc actaacggcc tgaaatactc cctcttttca 60
ttcctggcac aacgattgca atgtctgttg cgtgttagct gcggccatta tcgaattcga 120
ctggaggggg atctatgaag ctggttaccg tggtgattaa gccattcaaa cttgaagacg 180
tgcgtgaagc gctttcttct attggtattc aagggttgac cgtaactgaa gtgaaaggct 240
ttggccgtca gaagggtcac gctgagctgt accgcggtgc ggaatatagc gttaatttcc 300
tgccgaaagt gaaaattgat gtggcgatcg ctgacgatca actcgatgaa gtaatcgatg 360
tgatcagcaa agcggcctac accggaaaaa ttggcgacgg caaaattttc gttgctgagc 420
tgcaacgcgt cattcgtatt cgtaccggcg aagccgacga agcggcactg taatacaaga 480
cacacagtga tggggatcgg tttcgctgaa ggtgtgacca tgggccatca ggtgctggtg 540
cagctggaaa gtgttgccat cactatcgtg tggtctggcg tggtggcctt tattggttac 600
aaactggcgg acatgacggt aggcctgcgc gtaccggaag aacaagaacg tgaagggctg 660
gatgtaaaca gccacggcga aaacgcctat aacgcctgat tgcgttgagt tatctcctga 720
gcataaaaaa gcctccattc ggaggctttt cttttttaa gtttaaagcg cggttagttg 780
cgattgcgca tgacgccttc ctgcacgctg gacgcgacca gcacaccctc ttgcgtatag 840
aactcgccgc gcacaaaacc gcgagcgctg gaggctgacg tgctttccac actgtagagc 900
agccattcgt tcatattaaa cgggcgatgg aaccacatgg agtggtcaat ggtggcaacc 960
tgcataccgc gctcaaggaa gcccacgccg tgcggctgaa gtgcaaccgg caggaagtta 1020
aagtctgagg catatccaag cagatattga tgtacgcgaa aatcgtccgg caccgtgccg 1080
tttgcgcgga tccatacctg gcgggtggga tcggcaacgt ggcctttcag cgggttatga 1140
aactcaaccg ggcggatctc cagtggttta tcactaagaa acttctcttt ggcctgcgg 1199

<210> SEQ ID NO 259
<211> LENGTH: 607
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::PinfC

<400> SEQUENCE: 259
atgaccttta atatgatgcc tggggtcact ggagcgcttt atcggcatcc tgaccgaaga 60
atttgccggt ttcttcccga cctggctggc ccctgttcag gttgtggtga tgaatatcac 120
tgattctcaa gctgaatatg tcaacgaatt gacccgtaaa ttgcaaaatg cgggcattcg 180
tgtaaaagcg gacttgagaa acgagaagat tggctttaaa atccgcgagc acactttacg 240
tcgtgtccct tatatgttgg tctgtggtga taaagaggtg gaagcaggca aagtggccgt 300
tcgcacccgc cgcggtaaag acctgggcag cctggacgta agtgaagtga ttgagaagct 360
gcaacaagag attcgcagcc gcagtcttca acaactggag gaataaggta ttaaaggcgg 420
aaaacgagtt caaacggcac gtccgaatcg tatcaatggc gagattcgcg cccaggaagt 480
tcgcttaact ggtctggaag gtgagcagct gggtattgca atagaactaa ctacccgccc 540
tgaaggcggt acctgcctga ccctgcgatt cccgttattt cattcactga ccggaggccc 600
acgatga 607

<210> SEQ ID NO 260
<211> LENGTH: 1607
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::PinfC with 500bp flank

<400> SEQUENCE: 260
ggtacgacaa aaacgtctcc agcgacgtgc ggttaatatt gactggcgca tccgccacat 60
cccccagttt ttgctggatc agtttggcga ttttgcgggt ttttcccgtg tcactgccaa 120
aaaaaatacc aatgttagcc atgtcgcgct cctgttgaga aagaataagg ccgcctgcaa 180
acggcggata tcccttctcc tgttgcgaag gctgtgccag gtttttttaa ggccttctgt 240

```
gcactgaaat gggtgaaaaa atgactcttt tttgtgcagg caccgtcctc tctccgctat    300

ccagacctgc tttgaaggcc tctgagggcc aaatcagggc caaaacacga atcaggatca    360

atgtttcggc gcgttacctg ttcgaaaggt gcactctttg catggttaat cacacccaat    420

cagggctgcg gatgtcgggc gtttcacaac acaaaatgtt gtaaatgcga cacagccggg    480

cctgaaacca ggagcgtgtg atgaccttta atatgatgcc tggggtcact ggagcgcttt    540

atcggcatcc tgaccgaaga atttgccggt ttcttcccga cctggctggc ccctgttcag    600

gttgtggtga tgaatatcac tgattctcaa gctgaatatg tcaacgaatt gacccgtaaa    660

ttgcaaaatg cgggcattcg tgtaaaagcg gacttgagaa acgagaagat tggctttaaa    720

atccgcgagc acactttacg tcgtgtccct tatatgttgg tctgtggtga taaagaggtg    780

gaagcaggca aagtggccgt tcgcacccgc cgcggtaaag acctgggcag cctggacgta    840

agtgaagtga ttgagaagct gcaacaagag attcgcagcc gcagtcttca acaactggag    900

gaataaggta ttaaaggcgg aaaacgagtt caaacggcac gtccgaatcg tatcaatggc    960

gagattcgcg cccaggaagt tcgcttaact ggtctggaag gtgagcagct gggtattgca   1020

atagaactaa ctacccgccc tgaaggcggt acctgcctga ccctgcgatt cccgttattt   1080

cattcactga ccggaggccc acgatgaccc agcgacccga gtcgggcacc accgtctggc   1140

gttttgatct ctcacagcaa tttaccgcca tgcagcgcat cagcgtggtg ttgagtcgcg   1200

caaccgagat aagccagacg ctgcaggagg tgctgtgtgt tctgcataat gacgcattta   1260

tgcaacacgg catgctgtgt ctgtatgaca accagcagga aattctgagt attgaagcct   1320

tgcaggaggc agaccaacat ctgatccccg gcagctcgca aattcgctat cgccctggcg   1380

aagggctggt aggagccgta ctgtcccagg gacaatctct tgtgctgccg cgtgtcgccg   1440

acgatcaacg ctttctcgac aggcttggca tctatgatta caacctgccg tttatcgccg   1500

tcccccttaat ggggccaggc gcgcagacga ttggcgtgct cgccgcgcag ccgatggcgc   1560

gtctggagga gcggcttcct tcctgtacgc gctttctgga aaccgtc                 1607
```

```
<210> SEQ ID NO 261
<211> LENGTH: 1536
<212> TYPE: DNA
<213> ORGANISM: Kosakonia sacchari
<220> FEATURE:
<223> OTHER INFORMATION: 16S-1

<400> SEQUENCE: 261

ttgaagagtt tgatcatggc tcagattgaa cgctggcggc aggcctaaca catgcaagtc     60

gaacggtagc acagagagct tgctctcggg tgacgagtgg cggacgggtg agtaatgtct    120

gggaaactgc ctgatggagg gggataacta ctggaaacgg tagctaatac cgcataacgt    180

cgcaagacca aagaggggga ccttcgggcc tcttgccatc agatgtgccc agatgggatt    240

agctagtagg tggggtaacg gctcacctag gcgacgatcc ctagctggtc tgagaggatg    300

accagccaca ctggaactga gacacggtcc agactcctac gggaggcagc agtggggaat    360

attgcacaat gggcgcaagc ctgatgcagc catgccgcgt gtgtgaagaa ggccttcggg    420

ttgtaaagca ctttcagcgg ggaggaaggg agtaaggtta ataaccttat tcattgacgt    480

tacccgcaga agaagcaccg gctaactccg tgccagcagc cgcggtaata cggagggtgc    540

aagcgttaat cggaattact gggcgtaaag cgcacgcagg cggtctgtca agtcggatgt    600

gaaatccccg ggctcaacct gggaactgca tccgaaactg gcaggcttga gtctcgtaga    660
```

```
gggaggtaga attccaggtg tagcggtgaa atgcgtagag atctggagga ataccggtgg    720

cgaaggcggc ctcctggacg aagactgacg ctcaggtgcg aaagcgtggg gagcaaacag    780

gattagatac cctggtagtc cacgccgtaa acgatgtcta tttggaggtt gtgcccttga    840

ggcgtggctt ccggagctaa cgcgttaaat agaccgcctg gggagtacgg ccgcaaggtt    900

aaaactcaaa tgaattgacg ggggcccgca caagcggtgg agcatgtggt ttaattcgat    960

gcaacgcgaa gaaccttacc tggtcttgac atccacagaa ctttccagag atggattggt   1020

gccttcggga actgtgagac aggtgctgca tggctgtcgt cagctcgtgt tgtgaaatgt   1080

tgggttaagt cccgcaacga gcgcaaccct tatcctttgt tgccagcggt ccggccggga   1140

actcaaagga gactgccagt gataaactgg aggaaggtgg ggatgacgtc aagtcatcat   1200

ggcccttacg accagggcta cacacgtgct acaatggcgc atacaaagag aagcgacctc   1260

gcgagagtaa gcggacctca taaagtgcgt cgtagtccgg attggagtct gcaactcgac   1320

tccatgaagt cggaatcgct agtaatcgtg gatcagaatg ccacggtgaa tacgttcccg   1380

ggccttgtac acaccgcccg tcacaccatg ggagtgggtt gcaaaagaag taggtagctt   1440

aaccttcggg agggcgctta ccactttgtg attcatgact ggggtgaagt cgtaacaagg   1500

taaccgtagg ggaacctgcg gttggatcac ctcctt                             1536
```

<210> SEQ ID NO 262
<211> LENGTH: 1537
<212> TYPE: DNA
<213> ORGANISM: Kosakonia sacchari
<220> FEATURE:
<223> OTHER INFORMATION: 16S-2
<220> FEATURE:
<221> NAME/KEY: misc_feature
<222> LOCATION: (450)..(450)
<223> OTHER INFORMATION: n is a, c, t, g, unknown or other
<220> FEATURE:
<221> NAME/KEY: misc_feature
<222> LOCATION: (452)..(452)
<223> OTHER INFORMATION: n is a, c, t, g, unknown or other
<220> FEATURE:
<221> NAME/KEY: misc_feature
<222> LOCATION: (455)..(455)
<223> OTHER INFORMATION: n is a, c, t, g, unknown or other
<220> FEATURE:
<221> NAME/KEY: misc_feature
<222> LOCATION: (473)..(473)
<223> OTHER INFORMATION: n is a, c, t, g, unknown or other

<400> SEQUENCE: 262

```
ttgaagagtt tgatcatggc tcagattgaa cgctggcggc aggcctaaca catgcaagtc     60

gaacggtagc acagagagct tgctctcggg tgacgagtgg cggacgggtg agtaatgtct    120

gggaaactgc ctgatggagg gggataacta ctggaaacgg tagctaatac cgcataacgt    180

cgcaagacca aagaggggga ccttcgggcc tcttgccatc agatgtgccc agatgggatt    240

agctagtagg tggggtaacg gctcacctag gcgacgatcc ctagctggtc tgagaggatg    300

accagccaca ctggaactga gacacggtcc agactcctac gggaggcagc agtggggaat    360

attgcacaat gggcgcaagc ctgatgcagc catgccgcgt gtgtgaagaa ggccttcggg    420

ttgtaaagca ctttcagcgg ggaggaaggn antanggtta ataacctgtg ttnattgacg    480

ttacccgcag aagaagcacc ggctaactcc gtgccagcag ccgcggtaat acggagggtg    540

caagcgttaa tcggaattac tgggcgtaaa gcgcacgcag gcggtctgtc aagtcggatg    600

tgaaatcccc gggctcaacc tgggaactgc atccgaaact ggcaggcttg agtctcgtag    660

agggaggtag aattccaggt gtagcggtga aatgcgtaga gatctggagg aataccggtg    720
```

gcgaaggcgg cctcctggac gaagactgac gctcaggtgc gaaagcgtgg ggagcaaaca 780
ggattagata ccctggtagt ccacgccgta aacgatgtct atttggaggt tgtgcccttg 840
aggcgtggct tccggagcta acgcgttaaa tagaccgcct ggggagtacg gccgcaaggt 900
taaaactcaa atgaattgac gggggcccgc acaagcggtg gagcatgtgg tttaattcga 960
tgcaacgcga agaaccttac ctggtcttga catccacaga acttagcaga gatgctttgg 1020
tgccttcggg aactgtgaga caggtgctgc atggctgtcg tcagctcgtg ttgtgaaatg 1080
ttgggttaag tcccgcaacg agcgcaaccc ttatcctttg ttgccagcgg ttaggccggg 1140
aactcaaagg agactgccag tgataaactg gaggaaggtg gggatgacgt caagtcatca 1200
tggcccttac gaccagggct acacacgtgc tacaatggcg catacaaaga gaagcgacct 1260
cgcgagagta agcggacctc ataaagtgcg tcgtagtccg gattggagtc tgcaactcga 1320
ctccatgaag tcggaatcgc tagtaatcgt ggatcagaat gccacggtga atacgttccc 1380
gggccttgta cacaccgccc gtcacaccat gggagtgggt tgcaaaagaa gtaggtagct 1440
taaccttcgg gagggcgctt accactttgt gattcatgac tggggtgaag tcgtaacaag 1500
gtaaccgtag gggaacctgc ggttggatca cctcctt 1537

<210> SEQ ID NO 263
<211> LENGTH: 882
<212> TYPE: DNA
<213> ORGANISM: Kosakonia sacchari
<220> FEATURE:
<223> OTHER INFORMATION: nifH

<400> SEQUENCE: 263
atgaccatgc gtcaatgcgc catttacggc aaaggtggga tcggcaaatc gaccaccaca 60
cagaacctgg tcgccgcgct ggcggagatg ggtaaaaaag tcatgattgt cggctgtgac 120
ccgaaagccg attccacgcg tttgatcctg catgcgaaag cgcagaacac cattatggag 180
atggctgctg aagtcggctc cgtggaagac ctggagttag aagacgtgct gcaaatcggt 240
tacggcggcg tgcgctgcgc agagtccggc ggcccggagc caggcgtggg ctgtgccggt 300
cgcggggtga tcaccgcgat taacttcctc gaagaagaag gcgcttacgt gccggatctc 360
gattttgttt tctacgacgt gctgggcgac gtggtatgcg gtggtttcgc catgccgatt 420
cgtgaaaaca aagcgcagga gatctacatc gtttgctctg gcgaaatgat ggcgatgtac 480
gccgccaaca acatctccaa aggcatcgtg aaatacgcca aatccggtaa agtgcgcctc 540
ggcgggctga tttgtaactc gcgccagacc gaccgtgaag atgaactgat cattgcgctg 600
gcagaaaaac tcggcacgca gatgatccac tttgttcccc gcgacaacat tgtgcagcgt 660
gcggaaatcc gccgtatgac ggttatcgaa tatgacccga cctgcaatca ggcgaacgaa 720
tatcgcagcc ttgccagcaa aatcgtcaac aacaccaaaa tggtggtgcc cacccccctgc 780 accatggatg aactggaaga actgctgatg gagttcggca ttatggatgt ggaagacacc 840
agcatcattg gtaaaaccgc cgccgaagaa aacgccgtct ga 882

<210> SEQ ID NO 264
<211> LENGTH: 1449
<212> TYPE: DNA
<213> ORGANISM: Kosakonia sacchari
<220> FEATURE:
<223> OTHER INFORMATION: nifD2

<400> SEQUENCE: 264

```
atgagcaatg caacaggcga acgcaacctg gagataatcg agcaggtgct cgaggttttc     60
ccggagaaga cgcgcaaaga acgcagaaaa cacatgatgg tgacggaccc ggagcaggaa    120
agcgtcggta agtgcatcat ctctaaccgc aaatcgcagc caggcgtgat gaccgtgcgc    180
ggctgctcgt atgccggttc gaaaggggtg gtatttgggc caatcaagga tatggcgcat    240
atctcgcatg gcccaatcgg ctgcggccaa tactcccgcg ccgggcggcg gaactactac    300
accggcgtca gcggcgtgga cagcttcggc acgctcaact tcacctccga ttttcaggag    360
cgcgacatcg tgtttggcgg cgataaaaag ctcgccaaac tgattgaaga gctggaagag    420
ctgttcccgc tgaccaaagg catttcgatt cagtcggaat gcccggtcgg cctgattggc    480
gatgacattg aggccgtcgc gaacgccagc cgcaaagcca tcaacaaacc ggttattccg    540
gtgcgttgcg aaggctttcg cggcgtgtcg caatccctcg gtcaccatat tgccaacgat    600
gtgatccgcg actgggtgct ggataaccgc gaaggcaaac cgttcgaatc cacccccttac   660
gatgtggcga tcatcggcga ttacaacatc ggcggcgatg cctgggcttc gcgcattttg    720
ctcgaagaga tgggcttgcg ggtggtggca cagtggtctg gcgacggtac gctggtggag    780
atggaaaaca cgccgttcgt caaactgaac ctggtgcatt gttaccgctc aatgaactac    840
atctcgcgcc atatggagga gaagcacggt attccgtgga tggaatacaa cttctttggt    900
ccgacgaaaa tcgcggaatc gctgcgcaaa atcgccgacc agtttgacga caccattcgc    960
gccaacgccg aagcggtgat cgccagatac caggcgcaaa acgacgccat tatcgccaaa   1020
tatcgcccgc gtctggaggg gcgcaaagtg ctgctttata tgggcgggct gcgtccgcgc   1080
catgtgattg gcgcctatga agacctggga atggagatca tcgctgccgg ttatgagttc   1140
ggtcataacg atgattacga ccgcaccttg ccggatctga aagagggcac gctgctgttt   1200
gatgatgcca gcagttatga gctggaggcg ttcgtcaacg cgctgaaacc ggatctcatc   1260
ggttccggca tcaaagagaa gtacatcttt cagaaaatgg gcgtgccgtt tcgccagatg   1320
cactcctggg attactccgg cccgtaccac ggctatgacg gcttcgccat cttcgcccgc   1380
gatatggata tgacgctcaa caaccccgcg tggggccagt tgaccgcgcc gtggctgaaa   1440
tccgcctga                                                            1449
```

<210> SEQ ID NO 265
<211> LENGTH: 1563
<212> TYPE: DNA
<213> ORGANISM: Kosakonia sacchari
<220> FEATURE:
<223> OTHER INFORMATION: nifK2

<400> SEQUENCE: 265

```
atgagccaga ctgctgagaa aatacagaat tgccatcccc tgtttgaaca ggatgcttac     60
cagacgctgt ttgccggtaa acgggcactc gaagaggcgc actcgccgga gcgggtgcag    120
gaagtgtttc aatggaccac taccccggaa tatgaagcgc tgaactttaa acgcgaagcg    180
ctgactatcg acccggcaaa agcctgccag ccgctgggcg cggtgctctg ttcgctgggg    240
tttgccaata ccctaccgta tgtgcacggt tcacagggtt gcgtggccta tttccgcacg    300
tactttaacc gccactttaa agaaccggtg gcctgcgtgt cggattcaat gacggaagac    360
gcggcggtgt tcggcgggaa taacaacctc aacaccggct tacaaaacgc cagcgcgctg    420
tataaaccgg agattatcgc cgtctctacc acctgtatgg cggaagtgat cggtgatgat    480
ttgcaggcct ttatcgccaa cgccaaaaaa gatggttttc tcgatgccgc catccccgtg    540
ccctacgcgc acacccccag ttttatcggc agccatatca ccggctggga taacatgttt    600
```

```
gaaggttttg cccggacctt tacggcagac catgaagctc agcccggcaa actttcacgc    660
atcaacctgg tgaccgggtt tgaaacctat ctcggcaatt tccgcgtgct gaaacgcatg    720
atggaacaaa tggaggtgcc ggcgagtgtg ctctccgatc cgtcggaagt gctggatact    780
cccgccaacg ggcattacca gatgtacgcg ggcgggacga cgcagcaaga gatgcgcgag    840
gcgccggatg ctatcgacac cctgttgctg cagccctggc aactggtgaa aagcaaaaaa    900
gtggtgcagg agatgtggaa tcagcccgcc accgaggttt ctgttcccgt tgggctggca    960
ggaacagacg aactgttgat ggcgattagc cagttaaccg gcaaggccat tcccgattca   1020
ctggcgctgg agcgcgggcg gctggtcgat atgatgctcg attcccacac ctggttgcac   1080
ggtaaaaaat tcggcctgtt tggcgatccg gattttgtca tgggattgac ccgtttcctg   1140
ctggagctgg gctgcgaacc gaccgttatc ctctgccaca acggtaacaa acgctggcag   1200
aaagcaatga agaaaatgct tgacgcctcg ccgtacggcc aggagagcga agtgtttatc   1260
aactgcgatt tgtggcattt ccgctcgctg atgtttaccc gccagccgga ttttatgatt   1320
ggcaactcgt acggcaagtt cattcagcgc gacaccttag ccaaaggcga gcagtttgaa   1380
gttccgctga tccgcctcgg ttttcccctg ttcgaccgcc accatctgca ccgccagacc   1440
acctggggct acgagggcgc catgagcatt ctcactaccc ttgtgaatgc ggtactggag   1500
aaagtggaca aagagaccat caagctcggc aaaaccgact acagcttcga tcttatccgt   1560
taa                                                                 1563
```

<210> SEQ ID NO 266
<211> LENGTH: 1488
<212> TYPE: DNA
<213> ORGANISM: Kosakonia sacchari
<220> FEATURE:
<223> OTHER INFORMATION: nifL

<400> SEQUENCE: 266

```
atgaccctga atatgatgat ggatgccggc gcgcccgagg caatcgccgg tgcgctttcg     60
cgacaccatc ctgggctgtt ttttaccatc gttgaagaag cgcccgtcgc catttcgctg    120
actgatgccg acgcacgcat tgtctatgcc aacccggctt tctgccgcca gaccggctat    180
gaactagaag cgttgttgca gcaaaatccc cgcctgcttg caagtcgcca aaccccacgg    240
gaaatctatc aggatatgtg gcacaccttg ttacaacgcc gaccgtggcg cgggcaattg    300
attaaccgcc accgcgacgg cagcctgtat ctggtcgaga tcgatatcac cccggtgatt    360
aacccgtttg gcgaactgga acactacctg gcaatgcagc gcgatatcag cgccagttat    420
gcgctggagc agcggttgcg caatcacatg acgctgaccg aagcggtgct gaataacatt    480
ccggcggcgg tggttgtagt ggatgaacgc gatcatgtgg ttatggataa ccttgcctac    540
aaaacgttct gtgccgactg cggcggaaaa gagctcctga gcgaactcaa tttttcagcc    600
cgaaaagcgg agctggcaaa cggccaggtc ttaccggtgg tgctgcgcgg tgaggtgcgc    660
tggttgtcgg tgacctgctg ggcgctgccg ggcgtcagcg aagaagccag tcgctacttt    720
attgataaca ggctgacgcg cacgctggtg gtgatcaccg acgacaccca acaacgccag    780
cagcaggaac agggccgact tgaccgcctt aaacagcaga tgaccaacgg caaactactg    840
gcagcgatcc gcgaagcgct tgacgccgcg ctgatccagc ttaactgccc catcaatatg    900
ctggcggcgg cgcgacgttt aaacggcagt gataacaaca atgtggcgct cgacgccgcg    960
tggcgcgaag gtgaagaggc gatggcgcgg ctgaaacgtt gccgcccgtc gctggaactg   1020
```

gaaagtgcgg ccgtctggcc gctgcaaccc ttttttgacg atctgcgcgc gctttatcac 1080
acccgctacg agcaggggaa aaatttgcag gtcacgctgg attcccatca tctggtggga 1140
tttggtcagc gtacgcaact gttagcctgc ctgagtctgt ggctcgatcg cacgctggat 1200
attgccgccg ggctgggtga tttcaccgcg caaacgcaga tttacgcccg cgaagaagag 1260
ggctggctct ctttgtatat cactgacaat gtgccgctga tcccgctgcg ccacacccac 1320
tcgccggatg cgcttaacgc tccgggaaaa ggcatggagc tgcgcctgat ccagacgctg 1380
gtggcacacc accacggcgc aatagaactc acttcacacc ccgaaggggg aagttgcctg 1440
accctacgat tcccgctatt tcattcactg accggaggtt caaaatga 1488

<210> SEQ ID NO 267
<211> LENGTH: 1575
<212> TYPE: DNA
<213> ORGANISM: Kosakonia sacchari
<220> FEATURE:
<223> OTHER INFORMATION: nifA

<400> SEQUENCE: 267
atgacccagc gaaccgagtc gggtaatacc gtctggcgct tcgatttgtc ccagcagttc 60
actgcgatgc agcgcataag cgtggtactc agccgggcga ccgaggtcga tcagacgctc 120
cagcaagtgc tgtgcgtatt gcacaatgac gcctttttgc agcacggcat gatctgtctg 180
tacgacagcc agcaggcgat tttgaatatt gaagcgttgc aggaagccga tcagcagtta 240
atccccggca gctcgcaaat ccgctatcgt ccgggcgaag ggctggtcgg gacggtgctt 300
tcgcagggcc aatcattagt gctggcgcgc gttgctgacg atcagcgctt tcttgaccgg 360
ctcgggttgt atgattacaa cctgccgttt atcgccgtgc cgctgatagg gccagatgcg 420
cagactttcg gtgtgctgac ggcacaaccc atggcgcgtt acgaagagcg attacccgcc 480
tgcacccgct ttctggaaac ggtcgctaac ctggtcgcgc aaaccgtgcg tttgatggca 540
ccaccggcag tgcgcccttc cccgcgcgcc gccataacac aggccgccag cccgaaatcc 600
tgcacggcct cacgcgcatt tggttttgaa aatatggtcg gtaacagtcc ggcgatgcgc 660
cagaccatgg agattatccg tcaggtttcg cgctgggaca ccaccgttct ggtacgcggc 720
gagagtggca ccggcaagga gctgattgcc aacgccatcc accaccattc gccgcgtgcc 780
ggtgcgccat ttgtgaaatt caactgtgcg gcgctgccgg acacactgct ggaaagcgaa 840
ttgttcggtc acgagaaagg ggcatttacc ggcgcggtac gccagcgtaa aggccgtttt 900
gagctggccg atggcggcac gctgtttctt gacgagatcg gcgagagtag cgcctcgttt 960
caggctaagc tgctgcgcat tttgcaggaa ggcgaaatgg aacgcgtcgg cggcgacgag 1020
acattgcaag tgaatgtgcg cattattgcc gcgacgaacc gcaatcttga agatgaagtc 1080
cggctggggc actttcgcga agatctctat tatcgcctga atgtgatgcc catcgccctg 1140
ccgccactac gcgaacgcca ggaggacatt gccgagctgg cgcactttct ggtgcgtaaa 1200
atcgcccata accagagccg tacgctgcgc attagcgagg gcgctatccg cctgctgatg 1260
agctacaact ggcccggtaa tgtgcgcgaa ctggaaaact gccttgagcg ctcagcggtg 1320
atgtcggaga acggtctgat cgatcgggat gtgattttgt ttaatcatcg cgaccagcca 1380
gccaaaccgc cagttatcag cgtctcgcat gatgataact ggctcgataa caaccttgac 1440
gagcgccagc ggctgattgc ggcgctggaa aaagcgggat gggtacaagc caaagccgcg 1500
cgcttgctgg ggatgacgcc gcgccaggtc gcctatcgta ttcagacgat ggatataacc 1560
ctgccaaggc tataa 1575

<210> SEQ ID NO 268
<211> LENGTH: 2850
<212> TYPE: DNA
<213> ORGANISM: Kosakonia sacchari
<220> FEATURE:
<223> OTHER INFORMATION: glnE

<400> SEQUENCE: 268
atgccgcacc acgcaggatt gtcgcagcac tggcaaacgg tattttctcg tctgccggaa 60
tcgctcaccg cgcagccatt gagcgcgcag gcgcagtcag tgctcacttt tagtgatttt 120
gttcaggaca gcatcatcgc gcatcctgag tggctggcag agcttgaaag cgcgccgccg 180
cctgcgaacg aatggcaaca ctatgcgcaa tggctgcaag cggcgctgga tggcgtcacc 240
gatgaagcct cgctgatgcg cgcgctgcgg ctgtttcgcc gtcgcatcat ggtgcgcatc 300
gcctggagcc aggcgttaca gttggtggcg gaagaagata tcctgcaaca gcttagcgtg 360
ctggcggaaa ccctgatcgt cgccgcgcgc gactggcttt atgaggcctg ctgccgtgag 420
tggggaacgc cgagcaatcc acaaggcgtg gcgcagccga tgctggtact cggcatgggc 480
aaactgggtg gcggcgaact caatttctca tccgatatcg atttgatttt cgcctggccg 540
gaaaatggcg caacgcgcgg tggacgccgt gagctggata acgcgcaatt tttcactcgc 600
cttggtcaac ggctgattaa agtcctcgac cagccaacgc aggatggctt tgtctaccgc 660
gtcgatatgc gcttgcgccc gtttggcgac agcggcccgc tggtgctgag ctttgccgcg 720
ctggaagatt actaccagga gcaggggcgc gattgggaac gctacgcgat ggtgaaagcg 780
cgcattatgg gcgataacga cggcgaccat gcgcgggagt tgcgcgcaat gctgcgcccg 840
tttgttttcc gccgttatat cgacttcagc gtgattcagt ccctgcgtaa catgaaaggc 900
atgattgccc gcgaagtgcg tcgccgtggc ctgaaggaca acattaagct cggcgcgggc 960
gggatccgcg aaatagaatt tatcgtccag gttttccagc tgattcgcgg cggtcgcgag 1020
cctgcactgc aatcgcgttc actgttgccg acgcttgctg ccatagatca actgcatctg 1080
ctgccggatg gcgacgcaac ccggctgcgc gaggcgtatt tgtggctgcg acggctggag 1140
aacctgctgc aaagcatcaa tgacgaacag acacagacgc tgccgggcga tgaactgaat 1200
cgcgcgcgcc tcgcctgggg aatgggcaaa gatagctggg aagcgctctg cgaaacgctg 1260
gaagcgcata tgtcggcggt gcgtcagata tttaacgatc tgattggcga tgatgaaacg 1320
gattcgccgg aagatgcgct ttctgagagc tggcgcgaat tgtggcagga tgcgttgcag 1380
gaggaggatt ccacgcccgt gctggcgcat ctctcagagg acgatcgccg ccgcgtggtg 1440
gcgctgattg ccgattttcg caaagagttg gataaacgca ccattggccc gcgagggcgg 1500
caggtactcg atcacttaat gccgcatctg ctcagcgatg tatgctcgcg cgacgatgcg 1560
ccagtaccgc tgtcacgcct gacgccgctg ctcaccggaa ttattacccg caccacttac 1620
cttgagctgc taagtgaatt tcccggcgca ctgaaacacc tcatttccct gtgtgccgcg 1680
tcgccgatgg ttgccagtca gctggcgcgc tacccgatcc tgcttgatga attgctcgac 1740
ccgaatacgc tctatcaacc gacggcgatg aatgcctatc gcgatgagct gcgccaatac 1800
ctgctgcgcg tgccggaaga tgatgaagag caacagcttg aggcgctgcg gcagtttaag 1860
caggcgcagt tgctgcgcgt ggcggcggcg gatattgccg gtacgttgcc agtaatgaaa 1920
gtgagcgatc acttaacctg gctggcggaa gcgattattg atgcggtggt gcagcaagcc 1980
tgggggcaga tggtggcgcg ttatggccag ccaacgcatc tgcacgatcg cgaagggcgc 2040

```
ggttttgcgg tggtcggtta tggcaagctg ggcggctggg agctgggtta cagctccgat   2100
ctggatctgg tattcctgca cgactgcccg atggatgtga tgaccgatgg cgagcgtgaa   2160
atcgatggtc gccagttcta tttgcgtctc gcgcagcgcg tgatgcacct gtttagcacg   2220
cgcacgtcgt ccggcatcct ttatgaagtt gatgcgcgtc tgcgtccatc tggcgctgcg   2280
gggatgctgg tcactactac ggaatcgttc gccgattacc agcaaaacga agcctggacg   2340
tgggaacatc aggcgctggc ccgtgcgcgc gtggtgtacg gcgatccgca actgaccgcc   2400
gaatttgacg ccattcgccg cgatattctg atgacgcctc gcgacggcgc aacgctgcaa   2460
accgacgtgc gagaaatgcg cgagaaaatg cgtgcccatc ttggcaacaa gcataaagac   2520
cgcttcgatc tgaaagccga tgaaggcggt atcaccgaca tcgagtttat cgcccaatat   2580
ctggtgctgc gctttgccca tgacaagccg aaactgacgc gctggtcgga taatgtgcgc   2640
attctcgaag ggctggcgca aaacggcatc atggaggagc aggaagcgca ggcattgacg   2700
ctggcgtaca ccacattgcg tgatgagctg caccacctgg cgctgcaaga gttgccggga   2760
catgtggcgc tctcctgttt tgtcgccgag cgtgcgctta ttaaaaccag ctgggacaag   2820
tggctggtgg aaccgtgcgc cccggcgtaa                                   2850
```

<210> SEQ ID NO 269
<211> LENGTH: 1536
<212> TYPE: DNA
<213> ORGANISM: Kosakonia sacchari
<220> FEATURE:
<223> OTHER INFORMATION: 16S-3
<220> FEATURE:
<221> NAME/KEY: misc_feature
<222> LOCATION: (766)..(776)
<223> OTHER INFORMATION: n is a, c, t, g, unknown or other
<220> FEATURE:
<221> NAME/KEY: misc_feature
<222> LOCATION: (905)..(905)
<223> OTHER INFORMATION: n is a, c, t, g, unknown or other

<400> SEQUENCE: 269

```
attgaagagt ttgatcatgg ctcagattga acgctggcgg caggcctaac acatgcaagt     60
cgaacggtag cacagagagc ttgctctcgg gtgacgagtg gcggacgggt gagtaatgtc    120
tgggaaactg cctgatggag ggggataact actggaaacg gtagctaata ccgcataacg    180
tcgcaagacc aaagaggggg accttcgggc ctcttgccat cagatgtgcc cagatgggat    240
tagctagtag gtggggtaac ggctcaccta ggcgacgatc cctagctggt ctgagaggat    300
gaccagccac actggaactg agacacggtc cagactccta cgggaggcag cagtggggaa    360
tattgcacaa tgggcgcaag cctgatgcag ccatgccgcg tgtgtgaaga aggccttcgg    420
gttgtaaagc actttcagcg gggaggaagg gagtaaggtt aataaccttg ctcattgacg    480
ttacccgcag aagaagcacc ggctaactcc gtgccagcag ccgcggtaat acggagggtg    540
caagcgttaa tcggaattac tgggcgtaaa gcgcacgcag gcggtctgtc aagtcggatg    600
tgaaatcccc gggctcaacc tgggaactgc atccgaaact ggcaggcttg agtctcgtag    660
agggaggtag aattccaggt gtagcggtga aatgcgtaga gatctggagg aataccggtg    720
gcgaaggcgg cctcctggac gaagactgac gctcaggtgc gaaagnnnnn nnnnnnaaca    780
ggattagata ccctggtagt ccatgccgta aacgatgtct actagccgtt ggggcctttg    840
aggctttagt ggcgcagcta acgcgataag tagaccgcct ggggagtacg gtcgcaagac    900
taaanctcaa atgaattgac gggggcccgc acaagcggtg gagcatgtgg tttaattcga    960
tgcaacgcga agaaccttac ctggccttga catagtaaga attttccaga gatggattgg   1020
```

tgccttcggg aacttacata caggtgctgc atggctgtcg tcagctcgtg tcgtgagatg 1080
ttgggttaag tcccgcaacg agcgcaaccc ttgtcattag ttgctacatt tagttgggca 1140
ctctaatgag actgccggtg acaaaccgga ggaaggtggg gatgacgtca agtcctcatg 1200
gcccttatag gtggggctac acacgtcata caatggctgg tacaaagggt tgccaacccg 1260
cgagggggag ctaatcccat aaaaccagtc gtagtccgga tcgcagtctg caactcgact 1320
gcgtgaagtc ggaatcgcta gtaatcgtgg atcagaatgt cacggtgaat acgttcccgg 1380
gtcttgtaca caccgcccgt cacaccatgg gagcgggttc tgccagaagt agttagctta 1440
accgcaagga gggcgattac cacggcaggg ttcgtgactg gggtgaagtc gtaacaaggt 1500
agccgtatcg gaaggtgcgg ctggatcacc tccttt 1536

<210> SEQ ID NO 270
<211> LENGTH: 882
<212> TYPE: DNA
<213> ORGANISM: Kosakonia sacchari
<220> FEATURE:
<223> OTHER INFORMATION: nifD1

<400> SEQUENCE: 270
atgaccatgc gtcaatgcgc catttacggc aaaggtggga tcggcaaatc gaccaccaca 60
cagaacctgg tcgccgcgct ggcggagatg ggtaaaaaag tcatgattgt cggctgtgac 120
ccgaaagccg attccacgcg tttgatcctg catgcgaaag cgcagaacac cattatggag 180
atggctgctg aagtcggctc cgtggaagac ctggagttag aagacgtgct gcaaatcggt 240
tacggcggcg tgcgctgcgc agagtccggc ggcccggagc caggcgtggg ctgtgccggt 300
cgcggggtga tcaccgcgat taacttcctc gaagaagaag gcgcttacgt gccggatctc 360
gattttgttt tctacgacgt gctgggcgac gtggtatgcg gtggtttcgc catgccgatt 420
cgtgaaaaca aagcgcagga gatctacatc gtttgctctg gcgaaatgat ggcgatgtac 480
gccgccaaca acatctccaa aggcatcgtg aaatacgcca aatccggtaa agtgcgcctc 540
ggcgggctga tttgtaactc gcgccagacc gaccgtgaag atgaactgat cattgcgctg 600
gcagaaaaac tcggcacgca gatgatccac tttgttcccc gcgacaacat tgtgcagcgt 660
gcggaaatcc gccgtatgac ggttatcgaa tatgacccga cctgcaatca ggcgaacgaa 720
tatcgcagcc ttgccagcaa aatcgtcaac aacaccaaaa tggtggtgcc cacccccctgc 780 accatggatg aactggaaga actgctgatg gagttcggca ttatggatgt ggaagacacc 840
agcatcattg gtaaaaccgc cgccgaagaa aacgccgtct ga 882

<210> SEQ ID NO 271
<211> LENGTH: 1386
<212> TYPE: DNA
<213> ORGANISM: Kosakonia sacchari
<220> FEATURE:
<223> OTHER INFORMATION: nifK1

<400> SEQUENCE: 271
atggccgaaa ttctgcgcag taaaaaaccg ctggcggtca gcccgataaa aagcggccag 60
ccgctggggg cgatcctcgc aagcctgggt gtcgaacagt gcataccgct ggtacacggc 120
gcacagggat gtagcgcgtt cgcgaaggtg ttctttattc aacattttca cgatccgatc 180
ccgctgcaat cgacggcgat ggatccgact tccaccatta tgggcgccga tgaaaacatt 240
tttaccgcgc tcaatgtgct ctgccagcgc aacgccgcga aagccattgt gctgctcagc 300

```
accgggcttt cagaagccca gggcagcgac atttcgcggg tggtgcgcca gtttcgtgat    360

gattttcccc ggcataaagg cgttgcgctg ctcaccgtca acacacccga tttctacggc    420

tcgctggaaa acggctacag cgccgtgctg gaaagcatga ttgaacagtg ggtacccgca    480

cagcccgccg ccagcctgcg caaccgccgt gtcaacctgc tggtcagcca tttactgaca    540

ccaggcgata tcgaactgtt gcgcagttat gttgaagcct tcggcctgca accggtgatt    600

gtgccggatc tgtcgctgtc gctggacggg catctggcag acggtgattt ttcgcctgtt    660

acccaagggg gaacatcgct gcgcatgatt gaacagatgg ggcaaaacct ggccaccttt    720

gtgattggcg cctcgctggg ccgtgcggcg gcgttactgg cgcagcgcag ccgtggcgag    780

gtgatcgccc tgccgcatct gatgacgctt gcagcctgcg acacgtttat tcatcgactg    840

aaaaccctct ccgggcgcga tgtccccgcg tggattgagc gccagcgcgg ccaagttcag    900

gatgcgatga tcgattgcca tatgtggctg cagggtgcgg ctatcgccat ggcagcagaa    960

ggcgatcacc tggcggcatg gtgcgatttc gcccgcagcc agggcatgat ccccggcccg   1020

attgtcgcac cggtcagcca gccggggttg caaaatctgc cggttgaaac cgtggttatc   1080

ggcgatctgg aagatatgca ggatcggctt tgcgcgacgc ccgccgcgtt actggtggcc   1140

aattctcatg ccgccgatct cgccacgcag tttgatttgt cacttatccg cgccgggttc   1200

ccggtgtatg accggctggg ggaatttcgt cgcctgcgcc aggggtacag cggcattcgt   1260

gacacgctgt ttgagctggc gaatgtgatg cgcgagcgcc atcacccgct tgcaacctac   1320

cgctcgccgc tgcgccagca cgccgacgac aacgttacgc ctggagatct gtatgccgca   1380

tgttaa                                                              1386
```

<210> SEQ ID NO 272
<211> LENGTH: 1287
<212> TYPE: DNA
<213> ORGANISM: Kosakonia sacchari
<220> FEATURE:
<223> OTHER INFORMATION: amtB

<400> SEQUENCE: 272

```
atgaaaaaca caacattaaa aacagcgctt gcttcgctgg cgttactgcc tggcctggcg     60

atggcggctc ccgctgtggc ggataaagcc gacaacggct ttatgatgat ttgcaccgcg    120

ctggtgctgt ttatgaccat tccgggcatt gcgctgttct acggcggttt gatccgcggt    180

aaaaacgtgc tgtcgatgct gacgcaggtt gccgtcacct tcgcactggt gtgcattctg    240

tgggtggtgt atggctactc gctggcattt ggcgagggca acagcttctt cgggagtttt    300

aactgggcga tgttgaaaaa catcgaactg aaagccgtga tgggcagcat ttatcagtat    360

atccacgtgg cgttccaggg ttccttcgcc tgtatcaccg ttggcctgat tgtcggtgca    420

ctggctgagc gtattcgctt ctctgcggtg ctgatttttg tggtggtatg gctgacgctt    480

tcttacgtgc cgattgcaca catggtgtgg ggcggcggtc tgctggcaac ccacggtgcg    540

ctggatttcg caggcggtac ggttgttcac atcaacgctg cgattgcagg tctggtgggg    600

gcttacctga ttggcaaacg cgtgggcttt ggcaaagaag cattcaaacc gcataacctg    660

ccgatggtct tcactggcac cgctatcctg tatgttggct ggtttggttt caacgccggc    720

tccgcaagct cggcgaacga aattgctgcg ctggccttcg tgaacactgt cgttgccact    780

gctgccgcta ttctggcgtg ggtatttggc gaatgggcaa tgcgcggcaa gccgtctctg    840

ctcggtgcct gttctggtgc catcgcgggt ctggttggta tcacccccgc ctgtggttat    900

gtgggtgtcg gcggtgcgct gattgtgggt ctgattgccg gtctggctgg gctgtggggc    960
```

gttactgcgc tgaaacgtat gttgcgtgtc gatgacccgt gtgacgtatt cggtgtgcac 1020
ggcgtgtgcg gcatcgtggg ctgtatcctg acgggtatct tcgcctctac gtcgctgggt 1080
ggtgtcggtt tcgctgaagg tgtgaccatg ggccatcagg tgctggtgca gctggaaagt 1140
gttgccatca ctatcgtgtg gtctggcgtg gtggccttta ttggttacaa actggcggac 1200
atgacggtag gcctgcgcgt accggaagaa caagaacgtg aagggctgga tgtaaacagc 1260
cacggcgaaa acgcctataa cgcctga 1287

<210> SEQ ID NO 273
<211> LENGTH: 348
<212> TYPE: DNA
<213> ORGANISM: Kosakonia sacchari
<220> FEATURE:
<223> OTHER INFORMATION: Prm1

<400> SEQUENCE: 273
cgtcctgtaa taataaccgg acaattcgga ctgattaaaa aagcgccctt gtggcgcttt 60
ttttatattc ccgcctccat ttaaaataaa aaatccaatc ggatttcact atttaaactg 120
gccattatct aagatgaatc cgatggaagc tcgctgtttt aacacgcgtt ttttaacctt 180
ttattgaaag tcggtgcttc tttgagcgaa cgatcaaatt taagtggatt cccatcaaaa 240
aaatattctc aacctaaaaa agtttgtgta atacttgtaa cgctacatgg agattaactc 300
aatctagagg gtattaataa tgaatcgtac taaactggta ctgggcgc 348

<210> SEQ ID NO 274
<211> LENGTH: 313
<212> TYPE: DNA
<213> ORGANISM: Kosakonia sacchari
<220> FEATURE:
<223> OTHER INFORMATION: Prm5

<400> SEQUENCE: 274
ggacatcatc gcgacaaaca atattaatac cggcaaccac accggcaatt tacgagactg 60
cgcaggcatc ctttctcccg tcaatttctg tcaaataaag taaaagaggc agtctacttg 120
aattaccccc ggctggttga gcgtttgttg aaaaaaagta actgaaaaat ccgtagaata 180
gcgccactct gatggttaat taacctattc aattaagaat tatctggatg aatgtgccat 240
taaatgcgca gcataatggt gcgttgtgcg ggaaaactgc ttttttttga aagggttggt 300
cagtagcgga aac 313

<210> SEQ ID NO 275
<211> LENGTH: 1485
<212> TYPE: DNA
<213> ORGANISM: Rahnella aquatilis
<220> FEATURE:
<223> OTHER INFORMATION: nifL

<400> SEQUENCE: 275
atgaccctga atatgatgct cgataacgcc gcgccggagg ccatcgccgg cgcgctgact 60
caacaacatc cggggctgtt ttttaccatg gtggaacagg cctcggtggc catctccctc 120
accgatgcca gcgccaggat catttacgcc aacccggcgt tttgccgcca gaccggctat 180
tcgctggcgc aattgttaaa ccagaacccg cgcctgctgg ccagcagcca gacgccgcgc 240
gagatctatc aggagatgtg gcataccctg ctccagcgtc agccctggcg cggtcagctg 300
attaatcagc gtcgggacgg cggcctgtac ctggtggaga ttgacatcac cccggtgctt 360

```
agcccgcaag gggaactgga gcattatctg gcgatgcagc gggatatcag cgtcagctac    420

accctcgaac agcggctgcg caaccatatg accctgatgg aggcggtgct gaataatatc    480

cccgccgccg tggtagtggt ggacgagcag gatcgggtgg tgatggacaa cctcgcctac    540

aaaaccttct gcgctgactg cggcggccgg gagctgctca ccgagctgca ggtctcccct    600

ggccggatga cgcccggcgt ggaggcgatc ctgccggtgg cgctgcgcgg ggccgcgcgc    660

tggctgtcgg taacctgctg gccgttgccc ggcgtcagtg aagaggccag ccgctacttt    720

atcgacagcg cgctggcgcg gaccctggtg gtgatcgccg actgtaccca gcagcgtcag    780

cagcaggagc aagggcgcct tgaccggctg aagcagcaaa tgaccgccgg caagctgctg    840

gcggcgatcc gcgagtcgct ggacgccgcg ctgatccagc tgaactgccc gattaatatg    900

ctggcggcag cccgtcggct gaacggcgag ggaagcggga atgtggcgct ggaggccgcc    960

tggcgtgaag gggaagaggc gatggcgcgg ctccagcgct gtcgcccatc gctggaactc   1020

gaaaaccccg ccgtctggcc gctgcagccc tttttcgacg atctgtgcgc cctctaccgt   1080

acacgcttcg atcccgacgg gctgcaggtc gacatggcct caccgcatct gatcggcttt   1140

ggccagcgca ccccactgct ggcgtgctta agcctgtggc tcgatcgcac cctggccctc   1200

gccgccgaac tcccctccgt gccgctggcg atgcagctct acgccgagga gaacgacggc   1260

tggctgtcgc tgtatctgac tgacaacgta ccgctgctgc aggtgcgcta cgctcactcc   1320

cccgacgcgc tgaactcgcc gggcaaaggc atggagctgc ggctgatcca gaccctggtg   1380

gcgcaccatc gcggggccat tgagctggct tcccgaccgc agggcggcac ctgcctgacc   1440

ctgcgtttcc cgctgtttaa caccctgacc ggaggtgaag catga                   1485
```

<210> SEQ ID NO 276
<211> LENGTH: 1575
<212> TYPE: DNA
<213> ORGANISM: Rahnella aquatilis
<220> FEATURE:
<223> OTHER INFORMATION: nifA

<400> SEQUENCE: 276

```
atgatccctg aatccgaccc ggacaccacc gtcagacgct tcgacctctc tcagcagttc     60

accgccatgc agcggataag cgtggtgctg agccgggcca ccgaggccag caaaacgctg    120

caggaggtgc tcagcgtatt acacaacgat gcctttatgc agcacgggat gatctgcctg    180

tacgacagcg agcaggagat cctcagtatc gaagcgctgc agcaaaccgg ccagcagccc    240

ctccccggca gcacgcagat ccgctatcgc cccggcgagg gactggtggg gaccgtgctg    300

gcccaggggc agtcgctggt gctgccccgg gtcgccgacg atcagcgttt tctcgaccgc    360

ctgagcctct acgattacga tctgccgttt atcgccgtac cgttgatggg gcccaacgcc    420

cggccaatag gggtgctggc ggcccagccg atggcgcgcc aggaagagcg gctgccggcc    480

tgcacccgtt ttctcgaaac cgtcgccaac ctcgtcgccc agaccatccg gctgatgatc    540

cttccggcct cacccgccct gtcgagccgc cagccgccga aggtggaacg gccgccggcc    600

tgctcgtcgt cgcgcggcgt gggccttgac aatatggtcg gcaagagccc ggcgatgcgc    660

cagatcgtgg aggtgatccg tcaggtttcg cgctgggaca ccaccgtgct ggtacgcggc    720

gaaagcggca ccgggaaaga gctgatcgcc aacgccatcc atcaccattc gccacgggct    780

ggcgccgcct tcgtcaaatt taactgcgcg gcgctgccgg acaccctgct ggaaagcgaa    840

ctgttcggcc atgagaaagg cgcctttacc ggggcggtgc gtcagcgtaa aggacgtttt    900

gagctggcgg atggcggcac cctgttcctc gatgagattg gtgaaagcag cgcctcgttc    960
```

caggccaagc tgctgcgtat cctccaggag ggggagatgg agcgggtcgg cggcgatgag 1020
accctgcggg tgaatgtccg catcatcgcc gccaccaacc gtcacctgga ggaggaggtc 1080
cggctgggcc atttccgcga ggatctctac tatcgtctga acgtgatgcc catcgccctg 1140
cccccgctgc gcgagcgtca ggaggacatc gccgagctgg cgcacttcct ggtgcgcaaa 1200
atcggccagc atcaggggcg cacgctgcgg atcagcgagg gcgcgatccg cctgctgatg 1260
gagtacagct ggccgggtaa cgttcgcgaa ctggagaact gcctcgaacg atcggcggtg 1320
atgtcggaga gtggcctgat cgatcgcgac gtgatcctct tcactcacca ggatcgtccc 1380
gccaaagccc tgcctgccag cgggccagcg gaagacagct ggctggacaa cagcctggac 1440
gaacgtcagc gactgatcgc cgcgctggaa aaagccggct gggtgcaggc caaggcggca 1500
cggctgctgg ggatgacgcc gcgccaggtc gcttatcgga tccagatcat ggatatcacc 1560
ctgccgcgtc tgtag 1575

<210> SEQ ID NO 277
<211> LENGTH: 1540
<212> TYPE: DNA
<213> ORGANISM: Rahnella aquatilis
<220> FEATURE:
<223> OTHER INFORMATION: 16S-1

<400> SEQUENCE: 277
attgaagagt ttgatcatgg ctcagattga acgctggcgg caggcctaac acatgcaagt 60
cgagcggcag cgggaagtag cttgctactt tgccggcgag cggcggacgg gtgagtaatg 120
tctgggaaac tgcctgatgg agggggataa ctactggaaa cggtagctaa taccgcatga 180
cctcgaaaga gcaaagtggg ggatcttcgg acctcacgcc atcggatgtg cccagatggg 240
attagctagt aggtgaggta atggctcacc taggcgacga tccctagctg gtctgagagg 300
atgaccagcc acactggaac tgagacacgg tccagactcc tacgggaggc agcagtgggg 360
aatattgcac aatgggcgca agcctgatgc agccatgccg cgtgtgtgaa gaaggcctta 420
gggttgtaaa gcactttcag cgaggaggaa ggcatcatac ttaatacgtg tggtgattga 480
cgttactcgc agaagaagca ccggctaact ccgtgccagc agccgcggta atacggaggg 540
tgcaagcgtt aatcggaatt actgggcgta aagcgcacgc aggcggtttg ttaagtcaga 600
tgtgaaatcc ccgagcttaa cttgggaact gcatttgaaa ctggcaagct agagtcttgt 660
agaggggggt agaattccag gtgtagcggt gaaatgcgta gagatctgga ggaataccgg 720
tggcgaaggc ggccccctgg acaaagactg acgctcaggt gcgaaagcgt ggggagcaaa 780
caggattaga taccctggta gtccacgctg taaacgatgt cgacttggag gttgtgccct 840
tgaggcgtgg cttccggagc taacgcgtta agtcgaccgc ctggggagta cggccgcaag 900
gttaaaactc aaatgaattg acgggggccc gcacaagcgg tggagcatgt ggtttaattc 960
gatgcaacgc gaagaacctt acctactctt gacatccaga gaatttgcca gagatggcga 1020
agtgccttcg ggaactctga gacaggtgct gcatggctgt cgtcagctcg tgttgtgaaa 1080
tgttgggtta agtcccgcaa cgagcgcaac ccttatcctt tgttgccagc acgtaatggt 1140
gggaactcaa aggagactgc cggtgataaa ccggaggaag gtggggatga cgtcaagtca 1200
tcatggccct tacgagtagg gctacacacg tgctacaatg gcatatacaa agagaagcga 1260
actcgcgaga gcaagcggac ctcataaagt atgtcgtagt ccggattgga gtctgcaact 1320
cgactccatg aagtcggaat cgctagtaat cgtagatcag aatgctacgg tgaatacgtt 1380

```
cccgggcctt gtacacaccg cccgtcacac catgggagtg ggttgcaaaa gaagtaggta   1440

gcttaacctt cgggagggcg cttaccactt tgtgattcat gactggggtg aagtcgtaac   1500

aaggtaaccg taggggaacc tgcggttgga tcacctcctt                         1540


<210> SEQ ID NO 278
<211> LENGTH: 1540
<212> TYPE: DNA
<213> ORGANISM: Rahnella aquatilis
<220> FEATURE:
<223> OTHER INFORMATION: 16S-2
<220> FEATURE:
<221> NAME/KEY: misc_feature
<222> LOCATION: (267)..(267)
<223> OTHER INFORMATION: n is a, c, t, g, unknown or other

<400> SEQUENCE: 278

attgaagagt ttgatcatgg ctcagattga acgctggcgg caggcctaac acatgcaagt     60

cgagcggcat cgggaagtag cttgctactt tgccggcgag cggcggacgg gtgagtaatg    120

tctgggaaac tgcctgatgg agggggataa ctactggaaa cggtagctaa taccgcatga    180

cctcgaaaga gcaaagtggg ggatcttcgg acctcacgcc atcggatgtg cccagatggg    240

attagctagt aggtgaggta atggctnacc taggcgacga tccctagctg gtctgagagg    300

atgaccagcc acactggaac tgagacacgg tccagactcc tacgggaggc agcagtgggg    360

aatattgcac aatgggcgca agcctgatgc agccatgccg cgtgtgtgaa gaaggcctta    420

gggttgtaaa gcactttcag cgaggaggaa ggcatcatac ttaatacgtg tggtgattga    480

cgttactcgc agaagaagca ccggctaact ccgtgccagc agccgcggta atacggaggg    540

tgcaagcgtt aatcggaatt actgggcgta aagcgcacgc aggcggtttg ttaagtcaga    600

tgtgaaatcc ccgagcttaa cttgggaact gcatttgaaa ctggcaagct agagtcttgt    660

agaggggggt agaattccag gtgtagcggt gaaatgcgta gagatctgga ggaataccgg    720

tggcgaaggc ggccccctgg acaaagactg acgctcaggt gcgaaagcgt ggggagcaaa    780

caggattaga taccctggta gtccacgctg taaacgatgt cgacttggag gttgtgccct    840

tgaggcgtgg cttccggagc taacgcgtta agtcgaccgc ctggggagta cggccgcaag    900

gttaaaactc aaatgaattg acgggggccc gcacaagcgg tggagcatgt ggtttaattc    960

gatgcaacgc gaagaacctt acctactctt gacatccaga gaatttgcca gagatggcga   1020

agtgccttcg ggaactctga gacaggtgct gcatggctgt cgtcagctcg tgttgtgaaa   1080

tgttgggtta agtcccgcaa cgagcgcaac ccttatcctt tgttgccagc acgtgatggt   1140

gggaactcaa aggagactgc cggtgataaa ccggaggaag gtggggatga cgtcaagtca   1200

tcatggccct tacgagtagg gctacacacg tgctacaatg gcatatacaa agagaagcga   1260

actcgcgaga gcaagcggac ctcataaagt atgtcgtagt ccggattgga gtctgcaact   1320

cgactccatg aagtcggaat cgctagtaat cgtagatcag aatgctacgg tgaatacgtt   1380

cccgggcctt gtacacaccg cccgtcacac catgggagtg ggttgcaaaa gaagtaggta   1440

gcttaacctt cgggagggcg cttaccactt tgtgattcat gactggggtg aagtcgtaac   1500

aaggtaaccg taggggaacc tgcggttgga tcacctcctt                         1540


<210> SEQ ID NO 279
<211> LENGTH: 1540
<212> TYPE: DNA
<213> ORGANISM: Rahnella aquatilis
<220> FEATURE:
<223> OTHER INFORMATION: 16S-3
```

<220> FEATURE:
<221> NAME/KEY: misc_feature
<222> LOCATION: (455)..(455)
<223> OTHER INFORMATION: n is a, c, t, g, unknown or other

<400> SEQUENCE: 279

```
attgaagagt ttgatcatgg ctcagattga acgctggcgg caggcctaac acatgcaagt     60
cgagcggcag cgggaagtag cttgctactt tgccggcgag cggcggacgg gtgagtaatg    120
tctgggaaac tgcctgatgg agggggataa ctactggaaa cggtagctaa taccgcatga    180
cctcgaaaga gcaaagtggg ggatcttcgg acctcacgcc atcggatgtg cccagatggg    240
attagctagt aggtgaggta atggctcacc taggcgacga tccctagctg gtctgagagg    300
atgaccagcc acactggaac tgagacacgg tccagactcc tacgggaggc agcagtgggg    360
aatattgcac aatgggcgca agcctgatgc agccatgccg cgtgtgtgaa gaaggcctta    420
gggttgtaaa gcactttcag cgaggaggaa ggcancatac ttaatacgtg tggtgattga    480
cgttactcgc agaagaagca ccggctaact ccgtgccagc agccgcggta atacggaggg    540
tgcaagcgtt aatcggaatt actgggcgta aagcgcacgc aggcggtttg ttaagtcaga    600
tgtgaaatcc ccgagcttaa cttgggaact gcatttgaaa ctggcaagct agagtcttgt    660
agaggggggt agaattccag gtgtagcggt gaaatgcgta gagatctgga ggaataccgg    720
tggcgaaggc ggccccctgg acaaagactg acgctcaggt gcgaaagcgt ggggagcaaa    780
caggattaga taccctggta gtccacgctg taaacgatgt cgacttggag gttgtgccct    840
tgaggcgtgg cttccggagc taacgcgtta agtcgaccgc ctggggagta cggccgcaag    900
gttaaaactc aaatgaattg acgggggccc gcacaagcgg tggagcatgt ggtttaattc    960
gatgcaacgc gaagaacctt acctactctt gacatccaga gaatttgcca gagatggcga   1020
agtgccttcg ggaactctga gacaggtgct gcatggctgt cgtcagctcg tgttgtgaaa   1080
tgttgggtta agtcccgcaa cgagcgcaac ccttatcctt tgttgccagc acgtgatggt   1140
gggaactcaa aggagactgc cggtgataaa ccggaggaag gtggggatga cgtcaagtca   1200
tcatggccct tacgagtagg gctacacacg tgctacaatg gcatatacaa agagaagcga   1260
actcgcgaga gcaagcggac ctcataaagt atgtcgtagt ccggattgga gtctgcaact   1320
cgactccatg aagtcggaat cgctagtaat cgtagatcag aatgctacgg tgaatacgtt   1380
cccgggcctt gtacacaccg cccgtcacac catgggagtg ggttgcaaaa gaagtaggta   1440
gcttaacctt cgggagggcg cttaccactt tgtgattcat gactggggtg aagtcgtaac   1500
aaggtaaccg taggggaacc tgcggttgga tcacctcctt                         1540
```

<210> SEQ ID NO 280
<211> LENGTH: 1540
<212> TYPE: DNA
<213> ORGANISM: Rahnella aquatilis
<220> FEATURE:
<223> OTHER INFORMATION: 16S-4
<220> FEATURE:
<221> NAME/KEY: misc_feature
<222> LOCATION: (70)..(70)
<223> OTHER INFORMATION: n is a, c, t, g, unknown or other

<400> SEQUENCE: 280

```
attgaagagt ttgatcatgg ctcagattga acgctggcgg caggcctaac acatgcaagt     60
cgagcggcan cgggaagtag cttgctactt tgccggcgag cggcggacgg gtgagtaatg    120
tctgggaaac tgcctgatgg agggggataa ctactggaaa cggtagctaa taccgcatga    180
```

```
cctcgaaaga gcaaagtggg ggatcttcgg acctcacgcc atcggatgtg cccagatggg    240

attagctagt aggtgaggta atggcttacc taggcgacga tccctagctg gtctgagagg    300

atgaccagcc acactggaac tgagacacgg tccagactcc tacgggaggc agcagtgggg    360

aatattgcac aatgggcgca agcctgatgc agccatgccg cgtgtgtgaa gaaggcctta    420

gggttgtaaa gcactttcag cgaggaggaa ggcatcacac ttaatacgtg tggtgattga    480

cgttactcgc agaagaagca ccggctaact ccgtgccagc agccgcggta atacggaggg    540

tgcaagcgtt aatcggaatt actgggcgta aagcgcacgc aggcggtttg ttaagtcaga    600

tgtgaaatcc ccgagcttaa cttgggaact gcatttgaaa ctggcaagct agagtcttgt    660

agaggggggt agaattccag gtgtagcggt gaaatgcgta gagatctgga ggaataccgg    720

tggcgaaggc ggcccccctgg acaaagactg acgctcaggt gcgaaagcgt ggggagcaaa    780

caggattaga taccctggta gtccacgctg taaacgatgt cgacttggag gttgtgccct    840

tgaggcgtgg cttccggagc taacgcgtta agtcgaccgc ctggggagta cggccgcaag    900

gttaaaactc aaatgaattg acgggggccc gcacaagcgg tggagcatgt ggtttaattc    960

gatgcaacgc gaagaacctt acctactctt gacatccaga gaatttgcca gagatggcga   1020

agtgccttcg ggaactctga gacaggtgct gcatggctgt cgtcagctcg tgttgtgaaa   1080

tgttgggtta agtcccgcaa cgagcgcaac ccttatcctt tgttgccagc acgtgatggt   1140

gggaactcaa aggagactgc cggtgataaa ccggaggaag gtggggatga cgtcaagtca   1200

tcatggccct tacgagtagg gctacacacg tgctacaatg gcatatacaa agagaagcga   1260

actcgcgaga gcaagcggac ctcataaagt atgtcgtagt ccggattgga gtctgcaact   1320

cgactccatg aagtcggaat cgctagtaat cgtagatcag aatgctacgg tgaatacgtt   1380

cccgggcctt gtacacaccg cccgtcacac catgggagtg ggttgcaaaa gaagtaggta   1440

gcttaacctt cgggagggcg cttaccactt tgtgattcat gactggggtg aagtcgtaac   1500

aaggtaaccg taggggaacc tgcggttgga tcacctcctt                         1540
```

<210> SEQ ID NO 281
<211> LENGTH: 1540
<212> TYPE: DNA
<213> ORGANISM: Rahnella aquatilis
<220> FEATURE:
<223> OTHER INFORMATION: 16S-5

<400> SEQUENCE: 281

```
attgaagagt ttgatcatgg ctcagattga acgctggcgg caggcctaac acatgcaagt     60

cgagcggcag cgggaagtag cttgctactt tgccggcgag cggcggacgg gtgagtaatg    120

tctgggaaac tgcctgatgg agggggataa ctactggaaa cggtagctaa taccgcatga    180

cctcgaaaga gcaaagtggg ggatcttcgg acctcacgcc atcggatgtg cccagatggg    240

attagctagt aggtgaggta atggctcacc taggcgacga tccctagctg gtctgagagg    300

atgaccagcc acactggaac tgagacacgg tccagactcc tacgggaggc agcagtgggg    360

aatattgcac aatgggcgca agcctgatgc agccatgccg cgtgtgtgaa gaaggcctta    420

gggttgtaaa gcactttcag cgaggaggaa ggcatcacac ttaatacgtg tgttgattga    480

cgttactcgc agaagaagca ccggctaact ccgtgccagc agccgcggta atacggaggg    540

tgcaagcgtt aatcggaatt actgggcgta aagcgcacgc aggcggtttg ttaagtcaga    600

tgtgaaatcc ccgagcttaa cttgggaact gcatttgaaa ctggcaagct agagtcttgt    660

agaggggggt agaattccag gtgtagcggt gaaatgcgta gagatctgga ggaataccgg    720
```

```
tggcgaaggc ggcccctgg acaaagactg acgctcaggt gcgaaagcgt ggggagcaaa    780

caggattaga taccctggta gtccacgctg taaacgatgt cgacttggag gttgtgccct    840

tgaggcgtgg cttccggagc taacgcgtta agtcgaccgc ctggggagta cggccgcaag    900

gttaaaactc aaatgaattg acgggggccc gcacaagcgg tggagcatgt ggtttaattc    960

gatgcaacgc gaagaacctt acctactctt gacatccaga gaatttgcca gagatggcga   1020

agtgccttcg ggaactctga gacaggtgct gcatggctgt cgtcagctcg tgttgtgaaa   1080

tgttgggtta agtcccgcaa cgagcgcaac ccttatcctt tgttgccagc acgtgatggt   1140

gggaactcaa aggagactgc cggtgataaa ccggaggaag gtggggatga cgtcaagtca   1200

tcatggccct tacgagtagg gctacacacg tgctacaatg gcatatacaa agagaagcga   1260

actcgcgaga gcaagcggac ctcataaagt atgtcgtagt ccggattgga gtctgcaact   1320

cgactccatg aagtcggaat cgctagtaat cgtagatcag aatgctacgg tgaatacgtt   1380

cccgggcctt gtacacaccg cccgtcacac catgggagtg ggttgcaaaa gaagtaggta   1440

gcttaacctt cgggagggcg cttaccactt tgtgattcat gactggggtg aagtcgtaac   1500

aaggtaaccg taggggaacc tgcggttgga tcacctcctt                          1540


<210> SEQ ID NO 282
<211> LENGTH: 1009
<212> TYPE: DNA
<213> ORGANISM: Rahnella aquatilis
<220> FEATURE:
<223> OTHER INFORMATION: 16S-6
<220> FEATURE:
<221> NAME/KEY: misc_feature
<222> LOCATION: (296)..(296)
<223> OTHER INFORMATION: n is a, c, t, g, unknown or other
<220> FEATURE:
<221> NAME/KEY: misc_feature
<222> LOCATION: (311)..(311)
<223> OTHER INFORMATION: n is a, c, t, g, unknown or other
<220> FEATURE:
<221> NAME/KEY: misc_feature
<222> LOCATION: (973)..(973)
<223> OTHER INFORMATION: n is a, c, t, g, unknown or other

<400> SEQUENCE: 282

gtagctaata ccgcatgacc tcgaaagagc aaagtggggg atcttcggac ctcacgccat     60

cggatgtgcc cagatgggat tagctagtag gtgaggtaat ggctcaccta ggcgacgatc    120

cctagctggt ctgagaggat gaccagccac actggaactg agacacggtc cagactccta    180

cgggaggcag cagtggggaa tattgcacaa tgggcgcaag cctgatgcag ccatgccgcg    240

tgtgtgaaga aggccttagg gttgtaaagc actttcagcg aggaggaagg catcanactt    300

aatacgtgtg ntgattgacg ttactcgcag aagaagcacc ggctaactcc gtgccagcag    360

ccgcggtaat acggagggtg caagcgttaa tcggaattac tgggcgtaaa gcgcacgcag    420

gcggtttgtt aagtcagatg tgaaatcccc gagcttaact tgggaactgc atttgaaact    480

ggcaagctag agtcttgtag aggggggtag aattccaggt gtagcggtga aatgcgtaga    540

gatctggagg aataccggtg gcgaaggcgg ccccctggac aaagactgac gctcaggtgc    600

gaaagcgtgg ggagcaaaca ggattagata ccctggtagt ccacgctgta aacgatgtcg    660

acttggaggt tgtgcccttg aggcgtggct tccggagcta acgcgttaag tcgaccgcct    720

ggggagtacg gccgcaaggt taaaactcaa atgaattgac gggggcccgc acaagcggtg    780

gagcatgtgg tttaattcga tgcaacgcga agaaccttac ctactcttga catccagaga    840
```

atttgccaga gatggcgaag tgccttcggg aactctgaga caggtgctgc atggctgtcg 900
tcagctcgtg ttgtgaaatg ttgggttaag tcccgcaacg agcgcaaccc ttatcctttg 960
ttgccagcac gtnatggtgg gaactcaaag gagactgccg gtgataaac 1009

<210> SEQ ID NO 283
<211> LENGTH: 1519
<212> TYPE: DNA
<213> ORGANISM: Rahnella aquatilis
<220> FEATURE:
<223> OTHER INFORMATION: 16S-7

<400> SEQUENCE: 283
attgaagagt ttgatcatgg ctcagattga acgctggcgg caggcctaac acatgcaagt 60
cgagcggcag cgggaagtag cttgctactt tgccggcgag cggcggacgg gtgagtaatg 120
tcctgatgga ggggataact actggaacgg tagctaatac cgcacctcga aagagcaaag 180
tgggggatct tcggacctca cgccatcgga tgtgcccaga tgggattagc tagtaggtga 240
ggtaatggct cacctaggcg acgatcccta gctggtctga gaggatgacc agccacactg 300
gaactgagac acggtccaga ctcctacggg aggcagcagt ggggaatatt gcacaatggg 360
cgcaagcctg atgcagccat gccgcgtgtg tgaagaaggc cttagggttg taaagcactt 420
tcagcgagga ggaaggcatc atacttaata cgtgtggtga ttgacgttac tcgcagaaga 480
agcaccggct aactccgtgc cagcagccgc ggtaatacgg agggtgcaag cttaatcgga 540
attactgggc gtaaagcgca cgcaggcggt tgttaagtca gatgtgaaat ccccgagctt 600
aacttgggaa ctgcatttga aactggcaag ctagagtctt gtagaggggg gtagaattcc 660
aggtgtagcg gtgaaatgcg tagagatctg gaggaatacc ggtggcgaag gcggcccccct 720 ggacaaagac tgacgctcag gtgcgaaagc gtggggagca aacaggatta ataccctggt 780
agtccacgct gtaacgatgt cgacttggag gttgtgccct gaggcgtggc ttccggagct 840
aacgcgttaa gtcgaccgcc tggggagtac ggccgcaagg ttaaaactca aatgaattga 900
cgggggcccg cacaagcggt ggagcatgtg gtttaattcg atgcaacgcg aagaacctta 960
cctactcttg acatccagag aatttgccag agatggcgaa gtgccttcgg gaactctgag 1020
acaggtgctg catggctgtc gtcagctcgt gttgtgaaat gttgggttaa gtcccgcaac 1080
gagcgcaacc cttatccttt gttgccagca cgtaatggtg ggaactcaaa ggagactgcc 1140
ggtgataaac cggaggaagg tggggatgac gtcaagtcat catggccctt acgagtaggg 1200
ctacacacgt gctacaatgg catatacaaa gagaagcgaa ctcgcgagag caagcggacc 1260
tcataaagta tgtcgtagtc cggattggag tctgcaactc gactccatga agtcggaatc 1320
gctagtaatc gtagatcaga atgctacggt gaatacgttc ccgggccttg tacacaccgc 1380
ccgtcacacc atgggagtgg gttgcaaaag aagtaggtag cttaaccttc gggagggcgc 1440
ttaccacttt gtgattcatg actggggtga agtcgtaaca aggtaaccgt aggggaacct 1500
gcggttggat cacctcctt 1519

<210> SEQ ID NO 284
<211> LENGTH: 882
<212> TYPE: DNA
<213> ORGANISM: Rahnella aquatilis
<220> FEATURE:
<223> OTHER INFORMATION: nifH1

<400> SEQUENCE: 284
atgaccatgc gtcaatgcgc tatctacggt aaaggcggta tcggtaaatc caccaccacc 60

```
cagaatctcg tcgcggccct cgccgagatg ggtaagaaag tgatgatcgt cggctgcgat    120

ccgaaagcgg attccacccg tctgatcctc cacgctaaag cccagaacac catcatggag    180

atggcggcgg aagtgggctc ggtcgaggat ctggagctcg aagacgttct gcaaatcggc    240

tatggcgatg tccgttgcgc cgaatccggc ggcccggagc caggcgtcgg ctgcgccgga    300

cgcggggtga tcaccgccat caacttcctc gaggaagaag gcgcctatga agaagatttg    360

gatttcgtct tctatgacgt cctcggcgac gtggtctgcg gcggcttcgc tatgccgatc    420

cgcgaaaaca aagcccagga gatctacatc gtctgctccg gcgagatgat ggcgatgtat    480

gccgccaaca atatctccaa agggatcgtg aagtacgcca aatccggcaa ggtgcgcctc    540

ggcggcctga tctgtaactc gcgcaaaacc gaccgggaag acgaactgat catcgccctg    600

gcggagaagc ttggcacgca gatgatccac ttcgttcccc gcgacaacat tgtgcagcgc    660

gcggagatcc gccggatgac ggtgatcgag tacgacccga cctgtcagca ggcgaatgaa    720

tatcgtcaac tggcgcagaa gatcgtcaat aacaccaaaa aagtggtgcc gacgccgtgc    780

accatggacg agctggaatc gctgctgatg gagttcggca tcatggaaga agaagacacc    840

agcatcattg gtaaaaccgc cgctgaagaa aacgcggcct ga                       882
```

<210> SEQ ID NO 285
<211> LENGTH: 1113
<212> TYPE: DNA
<213> ORGANISM: Rahnella aquatilis
<220> FEATURE:
<223> OTHER INFORMATION: nifH2

<400> SEQUENCE: 285

```
atggttagga aaagtagaag taaaaataca aatatagaac taactgaaca tgaccattta     60

ttaataagtc aaataaaaaa gcttaaaaca caaaccactt gctttttttaa taataaagga    120

ggggttggga agactacatt agtagcaaat ttaggagcag agctatcaat aaactttagt    180

gcaaaagttc ttattgtgga tgccgaccct caatgtaatc tcacgcagta tgtattaagt    240

gatgaagaaa ctcaggactt atatgggcaa gaaaatccag atagtattta tacagtaata    300

agaccactat cctttggtaa aggatatgaa agtgacctcc ctataaggca tgtagagaat    360

ttcggttttg acataattgt cggtgaccct agacttgctt tacaggaaga ccttttagct    420

ggagactggc gagatgccaa aggcggtggg atgcgaggaa ttaggacaac ttttgtattt    480

gcagagttaa ttaagaaagc tcgtgagcta aattatgatt ttgttttctt tgacatggga    540

ccatcattag gcgcaatcaa cagggcagta ttactggcaa tggaattctt tgtcgtccca    600

atgtcaatcg atgtattttc actatgggct attaaaaata ttggctccac ggtttcaata    660

tggaaaaaag aattagacac agggattcgg ctctcagagg aacctagcga attatcacaa    720

ttatcacctc aaggaaaact aaagtttctc ggttacgtca cccaacaaca taaagaacgc    780

tctggatacg atacaattca gcttgagaat actgaggaag aaataaaatc gaaacgtcgg    840

gtaaaggcgt atgaagacat tggagaggtg tttccttcta aaattactga gcatctttct    900

aaactttatg catcaaaaga tatgaaccca caccttggag atatacgtca tttaggtagt    960

ttagctccga aatcacaatc acaacacgtt ccgatgatat cagtgtctgg tacaggaaat   1020

tacaccagac ttagaaaaag cgcgcgtgaa ctttatcgag atattgcaag aagatactta   1080

gagaacattc agactgctaa tggcgagaaa tag                                1113
```

<210> SEQ ID NO 286

<211> LENGTH: 1374
<212> TYPE: DNA
<213> ORGANISM: Rahnella aquatilis
<220> FEATURE:
<223> OTHER INFORMATION: nifD1

<400> SEQUENCE: 286
atgaagggaa aggaaattct ggcgctgctg gacgaacccg cctgcgagca caaccagaag 60
caaaaatccg gctgcagcgc ccctaagccc ggcgctaccg ccggcggttg cgccttcgac 120
ggcgcgcaga taacgctcct gcccatcgcc gacgtcgcgc acctggtgca cggccccatc 180
ggctgcgcgg gcagctcgtg ggataaccgc ggcagcgtca gcgccggccc ggccctcaac 240
cggctcggct ttaccaccga tcttaacgaa caggatgtga ttatgggccg cggcgaacgc 300
cgcctgttcc acgccgtgcg tcacatcgtc gaccgctatc atccggcggc ggtctttatc 360
tacaacacct gcgtaccggc gatggagggc gatgacatcg aggcggtctg ccaggccgca 420
cagaccgcca ccggcgtccc ggtcatcgct attgacgccg ccggtttcta cggcagtaaa 480
aatcttggca accgaatggc gggcgacgtg atgctcaggc aggtgattgg ccagcgcgaa 540
ccggccccgt ggccagacaa cacgcccttt gccccggccc agcgccacga tatcggcctg 600
attggcgaat tcaatatcgc cggcgagttc tggcaggtcc agccgctgct cgacgagctg 660
gggatccgcg tcctcggcag cctctccggc gacggccgct ttgccgagat ccagaccctg 720
caccgggcgc aggccaatat gctggtgtgc tcgcgcgcgc tgatcaacgt cgcccggggg 780
ctggagctgc gctacggcac gccgtggttt gaaggcagct tctacgggat ccgcgccacc 840
tccgacgcct tgcgccagct ggcgacgctg ctgggggatg acgacctgcg ccgccgcacc 900
gaggcgctga tcgcccgcga agagcaggcg gcggagcagg ctcttgcgcc gtggcgtgag 960
cagctccgcg ggcgcaaagt gctgctctat accggcggcg tgaaatcctg gtcggtggta 1020
tcggccctgc aggatctcgg catgaccgtg gtggccaccg gcacgcgcaa atccaccgag 1080
gaggacaaac agcggatccg tgagctgatg ggcgacgagg cggtgatgct tgaggagggc 1140
aatgcccgca ccctgctcga cgtggtgtac cgctatcagg ccgacctgat gatcgccggc 1200
ggacgcaata tgtacaccgc ctggaaagcc cggctgccgt ttctcgatat caatcaggag 1260
cgcgagcacg cctacgccgg ctatcagggc atcatcaccc tcgcccgcca gctctgtctg 1320
accctcgcca gccccgtctg gccgcaaacg catacccgcg ccccgtggcg ctag 1374

<210> SEQ ID NO 287
<211> LENGTH: 1449
<212> TYPE: DNA
<213> ORGANISM: Rahnella aquatilis
<220> FEATURE:
<223> OTHER INFORMATION: nifD2

<400> SEQUENCE: 287
atgaccaacg caacaggcga acgtaacctt gcgctcatcc aggaagtcct ggaggtgttt 60
cccgaaaccg cgcgcaaaga gcgcagaaag cacatgatga tcagcgatcc gcagatggag 120
agcgtcggca agtgcattat ctcgaaccgt aaatcgcagc ccggggtgat gaccgtgcgc 180
ggctgcgcct atgcgggctc gaaaggggtg gtgtttgggc caatcaaaga catggcccat 240
atctcgcacg gccccatcgg ctgcggccag tattcccgcg ccggacggcg caactactat 300
accggcgtca gcggtgtcga cagcttcggc accctgaact tcacctctga ttttcaggag 360
cgcgatattg ttttcggcgg cgataaaaag ctgaccaaac tgatcgaaga gatggagctg 420
ctgttcccgc tgaccaaagg gatcaccatc cagtcggagt gcccggtggg cctgatcggc 480
gatgacatca gcgccgtagc caacgccagc agcaaggcgc tggataaacc ggtgatcccg 540
gtgcgctgcg aaggctttcg cggcgtatcg caatcgctgg gccaccatat cgccaacgac 600
gtggtgcgcg actgggtgct gaacaatcgc gaagggcagc cgtttgccag caccccgtac 660
gatgttgcca tcattggcga ttacaacatc ggcggcgacg cctgggcctc gcgcattctg 720
ctggaagaga tggggctgcg cgtagtggcg cagtggtccg gcgacggcac cctggtggag 780
atggagaaca ccccattcgt taagcttaac ctcgtccact gctaccgttc gatgaactat 840
atcgcccgcc atatggagga gaaacatcag atcccatgga tggaatataa cttcttcggc 900
ccgaccaaaa tcgccgaatc gctgcgcaag atcgccgatc aatttgatga caccattcgc 960
gccaatgcgg aagcggtgat cgccaaatat gaggggcaga tggcggccat catcgccaaa 1020
tatcgcccgc ggctggaggg gcgcaaagtg ctgctgtaca tggggggggct gcggccgcgc 1080 cacgtcatcg gcgcctatga ggatctcggg atggagatca tcgccgccgg ctacgagttt 1140
gcccataacg atgattacga ccgcaccctg ccggacctga aagagggcac cctgctgttt 1200
gacgatgcca gcagctatga gctggaggcc ttcgtcaaag cgctgaaacc tgacctcatc 1260
ggctccggga tcaaagagaa atatatcttc cagaaaatgg gggtgccgtt ccgccagatg 1320
cactcctggg actattccgg cccctatcac ggctatgacg gcttcgccat ctttgcccgc 1380
gatatggata tgaccctgaa caatccggcg tggaacgaac tgactgcccc gtggctgaag 1440
tctgcgtga 1449

<210> SEQ ID NO 288
<211> LENGTH: 1386
<212> TYPE: DNA
<213> ORGANISM: Rahnella aquatilis
<220> FEATURE:
<223> OTHER INFORMATION: nifK1

<400> SEQUENCE: 288
atggcagata ttatccgcag tgaaaaaccg ctggcggtga gcccgattaa aaccgggcaa 60
ccgctcgggg cgatcctcgc cagcctcggg ctggcccagg ccatcccgct ggtccacggc 120
gcccagggct gcagcgcctt cgccaaagtt ttctttattc agcatttcca tgacccggtg 180
ccgctgcagt cgacggccat ggatccgacc gccacgatca tgggggccga cggcaatatc 240
ttcaccgcgc tcgacaccct ctgccagcgc cacagcccgc aggccatcgt gctgctcagc 300
accggtctgg cggaagcgca gggcagcgat atcgcccggg tggtgcgcca gtttcgcgag 360
gcgcatccgc gccataacgg cgtggcgatc ctcaccgtca ataccccgga ttttttggc 420 tctatggaaa acggctacag cgcggtgatc gagagcgtga tcgagcagtg ggtcgcgccg 480
acgccgcgtc cggggcagcg gccccggcgg gtcaacctgc tggtcagcca cctctgttcg 540
ccaggggata tcgaatggct gggccgctgc gtggaggcct ttggcctgca gccggtgatc 600
ctgccggacc tctcgcagtc aatggatggc cacctcggtg aaggggattt tacgcccctg 660
acccagggcg gcgcctcgct gcgccagatt gcccagatgg gccagagtct gggcagcttc 720
gccattggcg tgtcgctcca gcgggcggca tcgctcctga cccaacgcag ccgcggcgac 780
gtgatcgccc tgccgcatct gatgaccctc gaccattgcg atacctttat ccatcagctg 840
gcgaagatgt ccggacgccg cgtaccggcc tggattgagc gccagcgtgg ccagctgcag 900
gatgcgatga tcgactgcca tatgtggctt cagggccagc gcatggcgat ggcggcggag 960
ggcgacctgc tggcggcgtg gtgtgatttc gcccgcagcc aggggatgca gcccggcccg 1020
ctggtcgccc ccaccagcca ccccagcctg cgccagctgc cggtcgagca agtcgtgccg 1080
ggggatcttg aggatctgca gcagctgctg agccaccaac ccgccgatct gctggtggct 1140
aactctcacg cccgcgatct ggcggagcag tttgccctgc cgctgatccg cgtcggtttt 1200
cccctcttcg accggctcgg tgagtttcgt cgcgtccgcc aggggtacgc cggtatgcga 1260
gatacgctgt ttgaactggc caatctgctg cgcgaccgcc atcaccacac cgccctctac 1320
cgctcgccgc ttcgccaggg cgccgacccc cagccggctt caggagacgc ttatgccgcc 1380
cattaa 1386

<210> SEQ ID NO 289
<211> LENGTH: 1563
<212> TYPE: DNA
<213> ORGANISM: Rahnella aquatilis
<220> FEATURE:
<223> OTHER INFORMATION: nifK2

<400> SEQUENCE: 289
atgagccaaa cgatcgataa aattcacagc tgttatccgc tgtttgaaca ggatgaatac 60
cagaccctgt tccagaataa aaagaccctt gaagaggcgc acgacgcgca gcgtgtgcag 120
gaggtttttg cctggaccac caccgccgag tatgaagcgc tgaacttcca gcgcgaggcg 180
ctgaccgtcg acccggccaa agcctgccag ccgctcggcg ccgtactctg cgcgctgggg 240
ttcgccggca ccctgcccta cgtgcacggc tcccagggct gcgtcgccta ttttcgcacc 300
tactttaacc gccattttaa agagccggtc gcctgcgtct ccgactccat gaccgaggac 360
gcggcggtgt tcggcggcaa caacaacatg aatctgggcc tgcagaatgc cagcgcgctg 420
tataaacccg agattatcgc cgtctccacc acctgtatgg ccgaggtgat cggcgacgat 480
ctgcaggcgt ttatcgccaa cgccaaaaaa gagggatttg ttgacgaccg catcgccatt 540
ccttacgccc ataccccccag ctttatcggc agccatgtca ccggctggga caatatgttc 600
gaagggttcg cgaagacctt taccgctgac tacgccgggc agccgggcaa acagcaaaag 660
ctcaatctgg tgaccggatt tgagacctat ctcggcaact tccgcgtgct gaagcggatg 720
atggcgcaga tggatgtccc gtgcagcctg ctctccgacc catcagaggt gctcgacacc 780
cccgccgacg gccattaccg gatgtacgcc ggcggcacca gccagcagga gatcaaaacc 840
gcgccggacg ccattgacac cctgctgctg cagccgtggc agctggtgaa aagcaaaaag 900
gtggttcagg agatgtggaa ccagcccgcc accgaggtgg ccgttccgct gggcctggcc 960
gccaccgacg cgctgctgat gaccgtcagt cagctgaccg gcaaaccgat cgccgacgct 1020
ctgaccctgg agcgcggccg gctggtcgac atgatgctgg attcccacac ctggctgcat 1080
ggcaaaaaat tcggcctcta cggcgatccg gatttcgtga tggggctgac gcgcttcctg 1140
ctggagctgg gctgcgagcc gacggtgatc ctcagtcata acgccaataa acgctggcaa 1200
aaagcgatga agaaaatgct cgatgcctcg ccgtacggtc aggaaagcga agtgttcatc 1260
aactgcgacc tgtggcactt ccggtcgctg atgttcaccc gtcagccgga ctttatgatc 1320
ggtaactcct acggcaagtt tatccagcgc gataccctgg caaagggcaa agccttcgaa 1380
gtgccgctga tccgtctggg ctttccgctg ttcgaccgcc atcatctgca ccgccagacc 1440
acctggggct atgaaggcgc aatgaacatc gtcacgacgc tggtgaacgc cgtgctggaa 1500
aaactggacc acgacaccag ccagttgggc aaaaccgatt acagcttcga cctcgttcgt 1560
taa 1563

<210> SEQ ID NO 290
<211> LENGTH: 2838
<212> TYPE: DNA
<213> ORGANISM: Rahnella aquatilis
<220> FEATURE:
<223> OTHER INFORMATION: glnE

<400> SEQUENCE: 290

```
atgatgccgc tttctccgca attacagcag cactggcaga cggtcgctga ccgtctgcca     60
gcggattttc ccattgccga actgagccca caggccaggt cggtcatggc gttcagcgat    120
tttgtcgaac agagtgtgat cgcccagccg ggctggctga atgagcttgc ggactcctcg    180
ccggaggcgg aagagtggcg gcattacgag gcctggctgc aggatcgcct gcaggccgtc    240
actgacgaag cggggttgat gcgagagctg cgtctcttcc gccgccagat gatggtccgc    300
atcgcctggg cgcaggcgct gtcgctggtg agcgaagaag agactctgca gcagctgagc    360
gtcctggcgg agaccctgat tgtcgccgcc cgcgactggc tgtacgccgc ctgctgtaag    420
gagtggggaa cgccatgcaa tgccgagggc cagccgcagc cgctgctgat cctcgggatg    480
ggaaagctgg gcggcggcga gctgaacttc tcttccgata tcgatctgat ctttgcctgg    540
cctgagcatg gcgccacccg cggcggccgc cgcgagctgg ataacgccca gttctttacc    600
cgtctggggc agcggctgat caaggccctt gaccagccga cgcaggacgg ctttgtctat    660
cgggttgaca tgcgcctgcg gccgtttggc gacagtgggc cgctggtact cagttttgcg    720
gcgctggaag attattacca ggagcagggt cgggactggg aacgctatgc gatggtgaaa    780
gcgcggatca tgggcgataa cgacggcgtg tacgccagcg agttgcgcgc gatgctccgt    840
cctttcgtct tccgccgtta tatcgacttc agcgtgatcc agtcgctgcg taacatgaaa    900
ggcatgatcg cccgcgaagt gcggcgtcgc gggctgaaag acaacatcaa gctcggcgcc    960
ggcgggatcc gtgaaattga gtttatcgtt caggtctttc aactgatccg cggtggtcgc   1020
gaacctgcac tgcagcagcg cgccctgctg ccgacgctgg cggcgattga tgagctacat   1080
ctgctgccgg aaggcgacgc ggcgctgctg cgcgaggcct atctgttcct gcgccggctg   1140
gaaaacctgc tgcaaagcat caacgatgag cagacccaga ccctgccgca ggatgaactt   1200
aaccgcgcca ggctggcgtg gggatgcat accgaagact gggagacgct gagcgcgcag   1260
ctggcgagcc agatggccaa cgtgcggcga gtgtttaatg aactgatcgg cgatgatgag   1320
gatcagtccc cggatgagca actggccgag tactggcgcg agctgtggca ggatgcgctg   1380
gaagaagatg acgccagccc ggcgctggcg catttaaacg ataccgaccg ccgtagcgtg   1440
ctggcgctga ttgccgattt tcgtaaagag ctggatcggc gcaccatcgg cccgcgcggc   1500
cgccaggtgc tggatcagct gatgccgcat ctgctgagcg aaatctgctc gcgcgccgat   1560
gcgccgctgc ctctggcgcg gatcacgccg ctgttgaccg ggatcgtcac ccgtaccacc   1620
tatcttgagc tgctgagcga attccccggc gcgctgaagc acctgatcac gctctgcgcg   1680
gcgtcgccga tggtcgccag ccagctggcg cgccacccgc tgctgctgga tgagctgctg   1740
gatcccaaca ccctctatca gccgacggcg accgatgcct atcgcgacga gctgcgccag   1800
tacctgctgc gcgtgccgga agaggatgaa gagcagcagc tggaggcgtt gcgccagttt   1860
aagcaggcgc agcagctgca tatcgcggcg gcggatatcg ctggtaccct gccggtgatg   1920
aaggtcagcg atcacttaac ctggcttgcc gaagcgatcc tcgacgcggt ggtgcagcag   1980
gcatgggggc agatggtcgc tcgctacggc cagccgaccc acctgcacga tcgccagggt   2040
cgcggcttcg ccgtcgtcgg ctacggtaag cttggcggct gggagctggg ctacagctcc   2100
```

gatctcgatc tggtgttcct ccatgactgc ccggcggagg tgatgaccga cggcgagcgg 2160
gagattgacg gccgtcagtt ctacctgcgg ctggcccagc ggatcatgca cctgttcagc 2220
acccgcacct cgtccggtat tctctacgaa gtggacgccc ggctgcgtcc ttctggcgcg 2280
gcggggatgc tggtcaccac cgccgacgcg tttgctgact atcagcagaa cgaagcctgg 2340
acgtgggaac atcaggcgct ggtgcgcgcc cgcgtggtct atggcgaccc ggcgctgcag 2400
gcgcgctttg acgccattcg tcgcgatatc ctgaccaccc cgcgggaggg gatgaccctg 2460
cagaccgagg ttcgcgagat gcgcgagaag atgcgcgccc accttggcaa caaacatccc 2520
gatcgttttg atatcaaagc cgatgccggc gggatcaccg atattgaatt tattactcag 2580
tatctggtcc tacgctatgc cagtgacaag ccgaagctga cccgctggtc tgacaacgtg 2640
cgtattcttg agctgctggc gcagaacgac atcatggacg aggaggaggc gcgcgcctta 2700
acgcatgcgt acaccacctt gcgtgatgcg ctccatcacc tggccctgca ggagcagccg 2760
ggacacgtgg cgccagaggc cttcagccgg gagcgtcagc aggtcagcgc cagctggcag 2820
aagtggctga tggcttaa 2838

<210> SEQ ID NO 291
<211> LENGTH: 449
<212> TYPE: DNA
<213> ORGANISM: Rahnella aquatilis
<220> FEATURE:
<223> OTHER INFORMATION: Prm4

<400> SEQUENCE: 291
agtctgaact catcctgcgg cagtcggtga gacgtatttt tgaccaaaga gtgatctaca 60
tcacggaatt ttgtggttgt tgctgcttaa aagggcaaat ctacccttag aatcaactgt 120
tatatcaggg ggattcagag agatattagg aatttgcaca agcgcacaat ttaaccacat 180
catgataacg ccatgtaaaa caaagataaa aaaacaaaat gcagtgactt acatcgcaag 240
caaggcattt tcttatccaa ttgctcaaag tttggccttt catatcgcaa cgaaaatgcg 300
taatatacgc gcccttgcgg acatcagtat ggtcattcct agttcatgcg catcggacac 360
caccagctta caaattgcct gattgcggcc ccgatggccg gtatcactga ccgaccattt 420
cgtgccttat gtcatgcgat gggggctgg 449

<210> SEQ ID NO 292
<211> LENGTH: 500
<212> TYPE: DNA
<213> ORGANISM: Rahnella aquatilis
<220> FEATURE:
<223> OTHER INFORMATION: Prm1.2

<400> SEQUENCE: 292
tgaacatcac tgatgcacaa gctacctatg tcgaagaatt aactaaaaaa ctgcaagatg 60
caggcattcg cgttaaagcc gacttgagaa atgagaagat tggctttaaa attcgcgaac 120
acacgctacg ccgtgttcct tatatgttag tttgtggcga taaagaggtc gaagcaggca 180
aagttgctgt tcgtacccgc cgcggcaaag acttaggaag catggatgtt agcgaagtcg 240
ttgacaaact gctggcggaa atccgcagca gaagtcttca tcaactggag gaataaagta 300
ttaaaggcgg aaaacgagtt caaccggcgc gtcctaatcg cattaacaaa gagattcgcg 360
cgcaagaagt tcgcctcaca ggcgtcgatg gcgagcagat tggtattgtc agtctgaatg 420
aagctcttga aaaagctgag gaagcgggcg tcgatttagt agaaatcagt ccgaatgccg 480
agccgccagt ttgtcgaatc 500

<210> SEQ ID NO 293
<211> LENGTH: 170
<212> TYPE: DNA
<213> ORGANISM: Rahnella aquatilis
<220> FEATURE:
<223> OTHER INFORMATION: Prm3.1

<400> SEQUENCE: 293
tacagtagcg cctctcaaaa atagataaac ggctcatgta cgtgggccgt ttatttttc 60 tacccataat cgggaaccgg tgttataatg ccgcgccctc atattgtggg gatttcttaa 120
tgacctatcc tgggtcctaa agttgtagtt gacattagcg gagcactaac 170

<210> SEQ ID NO 294
<211> LENGTH: 142
<212> TYPE: DNA
<213> ORGANISM: Rahnella aquatilis
<220> FEATURE:
<223> OTHER INFORMATION: Prm6.1

<400> SEQUENCE: 294 aattttttt cacaaagcgt agcgttattg aatcgcacat tttaaactgt tggccgctgt 60
ggaagcgaat attggtgaaa ggtgcggttt taaggccttt ttctttgact ctctgtcgtt 120
acaaagttaa tatgcgcgcc ct 142

<210> SEQ ID NO 295
<211> LENGTH: 293
<212> TYPE: DNA
<213> ORGANISM: Rahnella aquatilis
<220> FEATURE:
<223> OTHER INFORMATION: Prm7.1

<400> SEQUENCE: 295
ttaaaaacgt gaccacgagc attaataaac gccacgaaat gtggcgttta tttattcaaa 60
aagtatcttc tttcataaaa agtgctaaat gcagtagcag caaaattggg ataagtccca 120
tggaatacgg ctgttttcgc tgcaattttt aactttttcg taaaaaaaga tgtttctttg 180
agcgaacgat caaaatatag cgttaaccgg caaaaaatta ttctcattag aaaatagttt 240
gtgtaatact tgtaacgcta catggagatt aacttaatct agagggtttt ata 293

<210> SEQ ID NO 296
<211> LENGTH: 1188
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2

<400> SEQUENCE: 296
atggcgctca aacagttaat ccgtctgtgt gccgcctcgc cgatggtcgc gacacaactt 60
gcacgtcatc ctttattgct cgatgaactg ctcgacccgc gcacgcttta ccagccgatt 120
gagccgggcg cttaccgcga cgaactgcgt cagtatctga tgcgggtgcc aacagaagac 180
gaagaacagc agcttgaagc cgtgcgccag ttcaaacagg cccagcattt gcgtatcgca 240
gccggggata tttccggggc attgccggtg atgaaagtca gtgaccattt aacctacctt 300
gccgaggcca ttctcgatgt cgtggtgcag catgcgtggg aacaaatggt cgtaaaatac 360
gggcagcccg cgcatcttca gcaccgtgag gggcgcggtt ttgccgtggt cggttacggg 420
aaactcggtg gctgggagct gggttatagc tcagatctgg atctggtctt cctgctcgat 480
tgcgcgccgg aggtgatgac ggacggcgaa cgcagcatcg acggacgtca gttttatctt 540
cggctggcgc agcgcattat gcacttattc agcacccgga catcgtcagg cattctttac 600
gaggttgatc cgcgtctgcg accttccggc gcatccggca tgctggtcag taccattgaa 660
gcgtttgcag attatcaggc caatgaagcc tggacgtggg agcatcaggc gctggttcgc 720
gcgcgcgtgg tttacgggga tccgcaactg acacagcaat ttaacgccac gcgtcgcgac 780
attctttgcc gccagcgcga tggcgacggc ctgcgtaagg aggtccgtga aatgcgcgag 840
aaaatgtatg cccatctggg gagtaaaaaa gcccacgagt ttgatctgaa agccgatccg 900
ggtggcatca cggatattga attcattgca caatacctgg ttctgcgttt cgcgcatgat 960
gagccgaagc tgacgcgctg gtctgataac gtgcggattt ttgaactgat ggcacgatat 1020
gacatcatgc cggaagagga agcgcgccat ctgacgcagg cttatgtgac gctgcgcgat 1080
gaaattcatc atctggcgtt gcaggaacac agcgggaaag tggccgcgga cagctttgct 1140
actgagcgcg cgcagatccg tgccagctgg gcaaagtggc tcggctga 1188

<210> SEQ ID NO 297
<211> LENGTH: 2188
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: glnE-delta-AR-2 with 500bp flank

<400> SEQUENCE: 297
cggtactgga acagaaatcg gcggatgcgc aggaaatttg ttatgacacg gcctgtctga 60
agtgcaagtt agtgcttact tcctggctgg caacctcagg ctggacgccg tttattgatg 120
ataaatctgc gaagaaactg gacgcttcct tcaaacgttt tgctgacatc atgctcggtc 180
gtaccgcagc ggatctgaaa gaagcctttg cgcagccact gacggaagaa ggttatcgcg 240
atcagctggc gcgcctgaaa cgccagatca ttaccttcca tttgcttgcc ggtgcttacc 300
ctgaaaaaga cgtcgatgcg tatattgccg gctgggtgga cctgcaacag gccatcgttc 360
agcagcaaca cgcctgggag gattcggccc gttctcacgc ggtgatgatg gatgctttct 420
ggttaaacgg gcaacctcgt taactgactg actagcctgg gcaaactgcc cgggcttttt 480
tttgcaagga atctgatttc atggcgctca aacagttaat ccgtctgtgt gccgcctcgc 540
cgatggtcgc gacacaactt gcacgtcatc ctttattgct cgatgaactg ctcgacccgc 600
gcacgcttta ccagccgatt gagccgggcg cttaccgcga cgaactgcgt cagtatctga 660
tgcgggtgcc aacagaagac gaagaacagc agcttgaagc cgtgcgccag ttcaaacagg 720
cccagcattt gcgtatcgca gccggggata tttccggggc attgccggtg atgaaagtca 780
gtgaccattt aacctacctt gccgaggcca ttctcgatgt cgtggtgcag catgcgtggg 840
aacaaatggt cgtaaaatac gggcagcccg cgcatcttca gcaccgtgag ggcgcggtt 900 ttgccgtggt cggttacggg aaactcggtg gctgggagct gggttatagc tcagatctgg 960
atctggtctt cctgctcgat tgcgcgccgg aggtgatgac ggacggcgaa cgcagcatcg 1020
acggacgtca gttttatctt cggctggcgc agcgcattat gcacttattc agcacccgga 1080
catcgtcagg cattctttac gaggttgatc cgcgtctgcg accttccggc gcatccggca 1140
tgctggtcag taccattgaa gcgtttgcag attatcaggc caatgaagcc tggacgtggg 1200
agcatcaggc gctggttcgc gcgcgcgtgg tttacgggga tccgcaactg acacagcaat 1260

```
ttaacgccac gcgtcgcgac attctttgcc gccagcgcga tggcgacggc ctgcgtaagg   1320

aggtccgtga aatgcgcgag aaaatgtatg cccatctggg gagtaaaaaa gcccacgagt   1380

ttgatctgaa agccgatccg ggtggcatca cggatattga attcattgca caatacctgg   1440

ttctgcgttt cgcgcatgat gagccgaagc tgacgcgctg gtctgataac gtgcggattt   1500

ttgaactgat ggcacgatat gacatcatgc cggaagagga agcgcgccat ctgacgcagg   1560

cttatgtgac gctgcgcgat gaaattcatc atctggcgtt gcaggaacac agcgggaaag   1620

tggccgcgga cagctttgct actgagcgcg cgcagatccg tgccagctgg gcaaagtggc   1680

tcggctgagg gtttttattc ggctaacagg cgcttgtgat attatccggc gcattgtatt   1740

tacccgattt gatttatctg ttttggagtc ttgggatgaa agtgactttg cctgattttc   1800

accgcgcagg tgtgctggtt gtcggtgacg taatgttaga ccgttactgg tatggcccga   1860

ccaatcgtat ttctccggaa gctccggtgc cggtggtgaa ggtcagtacc attgaagagc   1920

ggcctggcgg tgcagctaac gtggcgatga acatttcatc tctgggcgcc tcttcctgtc   1980

tgatcggcct gaccggcgta gacgacgctg cgcgtgccct cagtgagcgt ctggcagaag   2040

tgaaagttaa ctgcgatttc gtcgcactat ccacacatcc taccatcacc aaactgcgaa   2100

ttttgtcccg taaccagcaa ctgatccgcc tcgactttga ggaaggtttt gaaggcgttg   2160

atctcgagcc gatgctgacc aaaataga                                      2188
```

<210> SEQ ID NO 298
<211> LENGTH: 524
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::null-v1

<400> SEQUENCE: 298

```
atgagcatca cggcgttatc agcatcattt cctgagggga atatcgccag ccgcttgtcg     60

ctgcaacatc cttcactgtt ttataccgtg gttgaacaat cttcggtggc gatttcgctg    120

accgatccgc aggcgcgcat ttgttatgcc aatccggcat tctgccgcca gacgggtttt    180

gcacttgaga cacttttggg cgagaaccac cgtctgctgg agtctgaact catcctgcga    240

tgggggctgg gccgtctctg aagctctcgg tgaacattgt tgcgaggcag gatgcgagct    300

ggttgtgttt tgacattacc gataatgtgc cgcgtgaacg ggtgcgttat gcccgcccgg    360

aagcggcgtt ttcccgtccg gggaatggca tggagctgcg ccttatccag acgctgatcg    420

cccatcatcg cggttcttta gatctctcgg tccgccctga tggcggcacc ttgctgacgt    480

tacgcctgcc ggtacagcag gttatcaccg gaggcttaaa atga                     524
```

<210> SEQ ID NO 299
<211> LENGTH: 1524
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::null-v1 with 500bp flank

<400> SEQUENCE: 299

```
tgtttcgtct cgaggccggg caactgagcg gccccgttga aaccgacctg ggctggcatc     60

tgttgttgtg cgaacaaatt cgcctgccgc aacccttgcc gaaagccgaa gccttaacgc    120
```

gggtgcgtca gcaactgatt gcccggcaac agaaacatta tcagcgccag tggctgcaac 180
aactgatcaa cgcctgagcc tgttctcctt cttgttgatg cagacgggtt aatgcccgtt 240
ttgcacgaaa aatgcacata aattgcctgc gttgccttat aacagcgcag ggaaatcctg 300
cctccggcct tgtgccacac cgcgctttgc ctggtttgtg gtaaaaactg gcccgctttg 360
catcctgatg cttaaaacac cccgttcaga tcaacctttg ggcagataag cccgcgaaag 420
gcctgcaaat tgcacggtta ttccgggtga gtatatgtgt gatttgggtt ccggcattgc 480
gcaataaagg ggagaaagac atgagcatca cggcgttatc agcatcattt cctgagggga 540
atatcgccag ccgcttgtcg ctgcaacatc cttcactgtt ttataccgtg gttgaacaat 600
cttcggtggc gatttcgctg accgatccgc aggcgcgcat ttgttatgcc aatccggcat 660
tctgccgcca gacgggtttt gcacttgaga cacttttggg cgagaaccac cgtctgctgg 720
agtctgaact catcctgcga tgggggctgg gccgtctctg aagctctcgg tgaacattgt 780
tgcgaggcag gatgcgagct ggttgtgttt tgacattacc gataatgtgc cgcgtgaacg 840
ggtgcgttat gcccgcccgg aagcggcgtt ttcccgtccg ggaatggca tggagctgcg 900 ccttatccag acgctgatcg cccatcatcg cggttcttta gatctctcgg tccgccctga 960
tggcggcacc ttgctgacgt tacgcctgcc ggtacagcag gttatcaccg gaggcttaaa 1020
atgacccagt tacctaccgc gggcccggtt atccggcgct ttgatatgtc tgcccagttt 1080
acggcgcttt atcgcatcag cgtggcgctg agtcaggaaa gcaacaccgg gcgcgcactg 1140
gcggcgatcc tcgaagtgct tcacgatcat gcatttatgc aatacggcat ggtgtgtctg 1200
tttgataaag aacgcaatgc actctttgtg gaatccctgc atggcatcga cggcgaaagg 1260
aaaaaagaga cccgccatgt ccgttaccgc atgggggaag gcgtgatcgg cgcggtgatg 1320
agccagcgtc aggcgctggt gttaccgcgc atttcagacg atcagcgttt tctcgaccgc 1380
ctgaatattt acgattacag cctgccgttg attggcgtgc cgatccccgg tgcggataat 1440
cagccatcgg gcgtgctggt ggcacagccg atggcgttgc acgaagaccg gctgactgcc 1500
agtacgcggt ttttagaaat ggtc 1524

<210> SEQ ID NO 300
<211> LENGTH: 266
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::null-v2

<400> SEQUENCE: 300
atgagcatca cggcgttatc agcatcattt cctgagggga atatcgccag ccgcttgtcg 60
ctgcaacatc cttcactgtt ttataccgtg gttgaacaat cttcggtggc gatttcgctg 120
accgatccgc aggcgcgcat ttgttatgcc aatccggcat tctgccgcca gacgggtttt 180
gcacttgaga cacttttggg cgagaaccac cgtctgctgg ttaaagcctg ccggtacagc 240
aggttatcac cggaggctta aaatga 266

<210> SEQ ID NO 301
<211> LENGTH: 1266
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::null-v2 with 500bp flank

<400> SEQUENCE: 301

```
tgtttcgtct cgaggccggg caactgagcg gccccgttga aaccgacctg ggctggcatc     60
tgttgttgtg cgaacaaatt cgcctgccgc aacccttgcc gaaagccgaa gccttaacgc    120
gggtgcgtca gcaactgatt gcccggcaac agaaacatta tcagcgccag tggctgcaac    180
aactgatcaa cgcctgagcc tgttctcctt cttgttgatg cagacgggtt aatgcccgtt    240
ttgcacgaaa aatgcacata aattgcctgc gttgccttat aacagcgcag ggaaatcctg    300
cctccggcct tgtgccacac cgcgctttgc ctggtttgtg gtaaaaactg gcccgctttg    360
catcctgatg cttaaaacac cccgttcaga tcaacctttg ggcagataag cccgcgaaag    420
gcctgcaaat tgcacggtta ttccgggtga gtatatgtgt gatttgggtt ccggcattgc    480
gcaataaagg ggagaaagac atgagcatca cggcgttatc agcatcattt cctgagggga    540
atatcgccag ccgcttgtcg ctgcaacatc cttcactgtt ttataccgtg gttgaacaat    600
cttcggtggc gatttcgctg accgatccgc aggcgcgcat ttgttatgcc aatccggcat    660
tctgccgcca gacgggtttt gcacttgaga cacttttggg cgagaaccac cgtctgctgg    720
ttaaagcctg ccggtacagc aggttatcac cggaggctta aaatgaccca gttacctacc    780
gcgggcccgg ttatccggcg ctttgatatg tctgcccagt ttacggcgct ttatcgcatc    840
agcgtggcgc tgagtcagga aagcaacacc gggcgcgcac tggcggcgat cctcgaagtg    900
cttcacgatc atgcatttat gcaatacggc atggtgtgtc tgtttgataa agaacgcaat    960
gcactctttg tggaatccct gcatggcatc gacggcgaaa ggaaaaaaga gacccgccat   1020
gtccgttacc gcatggggga aggcgtgatc ggcgcggtga tgagccagcg tcaggcgctg   1080
gtgttaccgc gcatttcaga cgatcagcgt tttctcgacc gcctgaatat ttacgattac   1140
agcctgccgt tgattggcgt gccgatcccc ggtgcggata atcagccatc gggcgtgctg   1200
gtggcacagc cgatggcgtt gcacgaagac cggctgactg ccagtacgcg gtttttagaa   1260
atggtc                                                              1266
```

<210> SEQ ID NO 302
<211> LENGTH: 943
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm4

<400> SEQUENCE: 302

```
atgagcatca cggcgttatc agcatcattt cctgagggga atatcgccag ccgcttgtcg     60
ctgcaacatc cttcactgtt ttataccgtg gttgaacaat cttcggtggc gatttcgctg    120
accgatccgc aggcgcgcat ttgttatgcc aatccggcat tctgccgcca gacgggtttt    180
gcacttgaga cacttttggg cgagaaccac cgtctgctgg agtctgaact catcctgcgg    240
cagtcggtga gacgtatttt tgaccaaaga gtgatctaca tcacggaatt ttgtggttgt    300
tgctgcttaa aagggcaaat ctacccttag aatcaactgt tatatcaggg ggattcagag    360
agatattagg aatttgcaca agcgcacaat ttaaccacat catgataacg ccatgtaaaa    420
caaagataaa aaaacaaaat gcagtgactt acatcgcaag caaggcattt tcttatccaa    480
ttgctcaaag tttggccttt catatcgcaa cgaaaatgcg taatatacgc gcccttgcgg    540
acatcagtat ggtcattcct agttcatgcg catcggacac caccagctta caaattgcct    600
```

```
gattgcggcc ccgatggccg gtatcactga ccgaccattt cgtgccttat gtcatgcgat    660

gggggctggg ccgtctctga agctctcggt gaacattgtt gcgaggcagg atgcgagctg    720

gttgtgtttt gacattaccg ataatgtgcc gcgtgaacgg gtgcgttatg cccgcccgga    780

agcggcgttt tcccgtccgg ggaatggcat ggagctgcgc cttatccaga cgctgatcgc    840

ccatcatcgc ggttctttag atctctcggt ccgccctgat ggcggcacct tgctgacgtt    900

acgcctgccg gtacagcagg ttatcaccgg aggcttaaaa tga                      943
```

<210> SEQ ID NO 303
<211> LENGTH: 1943
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: delta-nifL::Prm4 with 500bp flank

<400> SEQUENCE: 303

```
tgtttcgtct cgaggccggg caactgagcg gccccgttga aaccgacctg ggctggcatc     60

tgttgttgtg cgaacaaatt cgcctgccgc aacccttgcc gaaagccgaa gccttaacgc    120

gggtgcgtca gcaactgatt gcccggcaac agaaacatta tcagcgccag tggctgcaac    180

aactgatcaa cgcctgagcc tgttctcctt cttgttgatg cagacgggtt aatgcccgtt    240

ttgcacgaaa aatgcacata aattgcctgc gttgccttat aacagcgcag ggaaatcctg    300

cctccggcct tgtgccacac cgcgctttgc ctggtttgtg gtaaaaactg gcccgctttg    360

catcctgatg cttaaaacac cccgttcaga tcaacctttg ggcagataag cccgcgaaag    420

gcctgcaaat tgcacggtta ttccgggtga gtatatgtgt gatttgggtt ccggcattgc    480

gcaataaagg ggagaaagac atgagcatca cggcgttatc agcatcattt cctgagggga    540

atatcgccag ccgcttgtcg ctgcaacatc cttcactgtt ttataccgtg gttgaacaat    600

cttcggtggc gatttcgctg accgatccgc aggcgcgcat ttgttatgcc aatccggcat    660

tctgccgcca gacgggtttt gcacttgaga cacttttggg cgagaaccac cgtctgctgg    720

agtctgaact catcctgcgg cagtcggtga gacgtatttt tgaccaaaga gtgatctaca    780

tcacggaatt ttgtggttgt tgctgcttaa aagggcaaat ctacccttag aatcaactgt    840

tatatcaggg ggattcagag agatattagg aatttgcaca agcgcacaat ttaaccacat    900

catgataacg ccatgtaaaa caaagataaa aaaacaaaat gcagtgactt acatcgcaag    960

caaggcattt tcttatccaa ttgctcaaag tttggccttt catatcgcaa cgaaaatgcg   1020

taatatacgc gcccttgcgg acatcagtat ggtcattcct agttcatgcg catcggacac   1080

caccagctta caaattgcct gattgcggcc ccgatggccg gtatcactga ccgaccattt   1140

cgtgccttat gtcatgcgat gggggctggg ccgtctctga agctctcggt gaacattgtt   1200

gcgaggcagg atgcgagctg gttgtgtttt gacattaccg ataatgtgcc gcgtgaacgg   1260

gtgcgttatg cccgcccgga agcggcgttt tcccgtccgg ggaatggcat ggagctgcgc   1320

cttatccaga cgctgatcgc ccatcatcgc ggttctttag atctctcggt ccgccctgat   1380

ggcggcacct tgctgacgtt acgcctgccg gtacagcagg ttatcaccgg aggcttaaaa   1440

tgacccagtt acctaccgcg ggcccggtta tccggcgctt tgatatgtct gcccagttta   1500

cggcgcttta tcgcatcagc gtggcgctga gtcaggaaag caacaccggg cgcgcactgg   1560

cggcgatcct cgaagtgctt cacgatcatg catttatgca atacggcatg gtgtgtctgt   1620

ttgataaaga acgcaatgca ctctttgtgg aatccctgca tggcatcgac ggcgaaagga   1680
```

```
aaaaagagac ccgccatgtc cgttaccgca tgggggaagg cgtgatcggc gcggtgatga   1740

gccagcgtca ggcgctggtg ttaccgcgca tttcagacga tcagcgtttt ctcgaccgcc   1800

tgaatattta cgattacagc ctgccgttga ttggcgtgcc gatccccggt gcggataatc   1860

agccatcggg cgtgctggtg gcacagccga tggcgttgca cgaagaccgg ctgactgcca   1920

gtacgcggtt tttagaaatg gtc                                           1943
```

<210> SEQ ID NO 304
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 304

```
tggtgtccgg gcgaacgtcg ccaggtggca caaattgtca gaactacgac acgactaacc     60

gaccgcagga gtgtgcgatg accctgaata tgatgatgga                         100
```

<210> SEQ ID NO 305
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 305

```
cggaaaacga gttcaaacgg cgcgtcccaa tcgtattaat ggcgagattc gcgccacgga     60

agttcgctta acaggtctgg aaggcgagca gcttggtatt                         100
```

<210> SEQ ID NO 306
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 306

```
cgccagagag ttgaaatcga acatttccgt aataccgcca ttacccagga gccgttctgg     60

ttgcacagcg gaaaacgtta acgaaaggat atttcgcatg                         100
```

<210> SEQ ID NO 307
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 307

```
cgggcgaacg tcgccaggtg gcacaaattg tcagaactac gacacgacta accgaccgca     60

ggagtgtgcg atgaccctga atatgatgat ggatgccagc                         100
```

<210> SEQ ID NO 308
<211> LENGTH: 100
<212> TYPE: DNA

<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 308
tcaacctaaa aaagtttgtg taatacttgt aacgctacat ggagattaac tcaatctaga 60
gggtattaat aatgaatcgt actaaactgg tactgggcgc 100

<210> SEQ ID NO 309
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 309
cgggcgaacg tcgccaggtg gcacaaattg tcagaactac gacacgacta accgaccgca 60
ggagtgtgcg atgaccctga atatgatgat ggatgccagc 100

<210> SEQ ID NO 310
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 310
aattttctgc ccaaatggct gggattgttc attttttgtt tgccttacaa cgagagtgac 60
agtacgcgcg ggtagttaac tcaacatctg accggtcgat 100

<210> SEQ ID NO 311
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 311
gtaaccaata aaggccacca cgccagacca cacgatagtg atggcaacac tttccagctg 60
caccagcacc tgatggccca tggtcacacc ttcagcgaaa 100

<210> SEQ ID NO 312
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 312
tggtattgtc agtctgaatg aagctcttga aaaagctgag gaagcgggcg tcgatttagt 60
agaaatcagt ccgaatgccg agccgccagt ttgtcgaatc 100

<210> SEQ ID NO 313
<211> LENGTH: 100

<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 313
accgatccgc aggcgcgcat ttgttatgcc aatccggcat tctgccgcca gacgggtttt 60
gcacttgaga cacttttggg cgagaaccac cgtctgctgg 100

<210> SEQ ID NO 314
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 314
cgggaaccgg tgttataatg ccgcgccctc atattgtggg gatttcttaa tgacctatcc 60
tgggtcctaa agttgtagtt gacattagcg gagcactaac 100

<210> SEQ ID NO 315
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 315
accgatccgc aggcgcgcat ttgttatgcc aatccggcat tctgccgcca gacgggtttt 60
gcacttgaga cacttttggg cgagaaccac cgtctgctgg 100

<210> SEQ ID NO 316
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 316
tcaacctaaa aaagtttgtg taatacttgt aacgctacat ggagattaac tcaatctaga 60
gggtattaat aatgaatcgt actaaactgg tactgggcgc 100

<210> SEQ ID NO 317
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 317
gggcgacaaa cggcctggtg gcacaaattg tcagaactac gacacgacta actgaccgca 60
ggagtgtgcg atgaccctga atatgatgat ggatgccggc 100

<210> SEQ ID NO 318

<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 318
gggcgacaaa cggcctggtg gcacaaattg tcagaactac gacacgacta actgaccgca 60
ggagtgtgcg atgaccctga atatgatgat ggatgccggc 100

<210> SEQ ID NO 319
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 319
taagaattat ctggatgaat gtgccattaa atgcgcagca taatggtgcg ttgtgcggga 60
aaactgcttt tttttgaaag ggttggtcag tagcggaaac 100

<210> SEQ ID NO 320
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 320
cgccagagag tcgaaatcga acatttccgt aataccgcga ttacccagga gccgttctgg 60
ttgcacagcg gaaaacgtta acgaaaggat atttcgcatg 100

<210> SEQ ID NO 321
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 321
cgccagagag tcgaaatcga acatttccgt aataccgcga ttacccagga gccgttctgg 60
ttgcacagcg gaaaacgtta acgaaaggat atttcgcatg 100

<210> SEQ ID NO 322
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 322
gatgatggat gctttctggt taaacgggca acctcgttaa ctgactgact agcctgggca 60
aactgcccgg gctttttttt gcaaggaatc tgatttcatg 100

<210> SEQ ID NO 323
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 323
accgatccgc aggcgcgcat ttgttatgcc aatccggcat tctgccgcca gacgggtttt 60
gcacttgaga cacttttggg cgagaaccac cgtctgctgg 100

<210> SEQ ID NO 324
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 324
catcggacac caccagctta caaattgcct gattgcggcc ccgatggccg gtatcactga 60
ccgaccattt cgtgccttat gtcatgcgat gggggctggg 100

<210> SEQ ID NO 325
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 325
tcttcaacaa ctggaggaat aaggtattaa aggcggaaaa cgagttcaaa cggcacgtcc 60
gaatcgtatc aatggcgaga ttcgcgccct ggaagttcgc 100

<210> SEQ ID NO 326
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 326
tccgggttcg gcttaccccg ccgcgttttg cgcacggtgt cggacaattt gtcataactg 60
cgacacagga gtttgcgatg accctgaata tgatgctcga 100

<210> SEQ ID NO 327
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 327
atcgcagcgt ctttgaatat ttccgtcgcc aggcgctggc tgccgagccg ttctggctgc 60
atagtggaaa acgataattt caggccaggg agcccttatg 100

<210> SEQ ID NO 328
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 328
tccgggttcg gcttaccccg ccgcgttttg cgcacggtgt cggacaattt gtcataactg 60
cgacacagga gtttgcgatg accctgaata tgatgctcga 100

<210> SEQ ID NO 329
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 329
tcacttttta gcaaagttgc actggacaaa aggtaccaca attggtgtac tgatactcga 60
cacagcatta gtgtcgattt ttcatataaa ggtaattttg 100

<210> SEQ ID NO 330
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 330
tccgggttcg gcttaccccg ccgcgttttg cgcacggtgt cggacaattt gtcataactg 60
cgacacagga gtttgcgatg accctgaata tgatgctcga 100

<210> SEQ ID NO 331
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 331
gttctccttt gcaatagcag ggaagaggcg ccagaaccgc cagcgttgaa gcagtttgaa 60
cgcgttcagt gtataatccg aaacttaatt tcggtttgga 100

<210> SEQ ID NO 332
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 332
tccgggttcg gcttaccccg ccgcgttttg cgcacggtgt cggacaattt gtcataactg 60
cgacacagga gtttgcgatg accctgaata tgatgctcga 100

<210> SEQ ID NO 333
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 333
gatatgcctg aagtattcaa ttacttaggc atttacttaa cgcaggcagg caattttgat 60
gctgcctatg aagcgtttga ttctgtactt gagcttgatc 100

<210> SEQ ID NO 334
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 334
tggtattgtc agtctgaatg aagctcttga aaaagctgag gaagcgggcg tcgatttagt 60
agaaatcagt ccgaatgccg agccgccagt ttgtcgaatc 100

<210> SEQ ID NO 335
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 335
tgcaaattgc acggttattc cgggtgagta tatgtgtgat ttgggttccg gcattgcgca 60
ataaagggga gaaagacatg agcatcacgg cgttatcagc 100

<210> SEQ ID NO 336
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 336
tcagggctgc ggatgtcggg cgtttcacaa cacaaaatgt tgtaaatgcg acacagccgg 60
gcctgaaacc aggagcgtgt gatgaccttt aatatgatgc 100

<210> SEQ ID NO 337
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp upstream of junction

<400> SEQUENCE: 337
cggaaaacga gttcaaacgg cacgtccgaa tcgtatcaat ggcgagattc gcgcccagga 60
agttcgctta actggtctgg aaggtgagca gctgggtatt 100

<210> SEQ ID NO 338
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 338
ttcttggttc tctggagcgc tttatcggca tcctgactga agaatttgca ggcttcttcc 60
caacctggct tgcacccgtg caggtagttg tgatgaacat 100

<210> SEQ ID NO 339
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 339
gcgatagaac tcacttcacg ccccgaaggg ggaagctgcc tgaccctacg attcccgcta 60
tttcattcac tgaccggagg ttcaaaatga cccagcgaac 100

<210> SEQ ID NO 340
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 340
tccctgtgcg ccgcgtcgcc gatggtggcc agccaactgg cgcgctaccc gatcctgctc 60
gatgaactgc tcgacccgaa cacgctctat caaccgacgg 100

<210> SEQ ID NO 341
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 341
cgttctgtaa taataaccgg acaattcgga ctgattaaaa aagcgccctc gcggcgcttt 60
ttttatattc tcgactccat ttaaaataaa aaatccaatc 100

<210> SEQ ID NO 342
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 342
aactcacttc acgccccgaa gggggaagct gcctgaccct acgattcccg ctatttcatt 60
cactgaccgg aggttcaaaa tgacccagcg aaccgagtcg 100

<210> SEQ ID NO 343
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 343
cgcgtcaggt tgaacgtaaa aaagtcggtc tgcgcaaagc acgtcgtcgt ccgcagttct 60
ccaaacgtta attggtttct gcttcggcag aacgattggc 100

<210> SEQ ID NO 344
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 344
aactcacttc acgccccgaa gggggaagct gcctgaccct acgattcccg ctatttcatt 60
cactgaccgg aggttcaaaa tgacccagcg aaccgagtcg 100

<210> SEQ ID NO 345
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 345
ccgatcccca tcactgtgtg tcttgtatta cagtgccgct tcgtcggctt cgccggtacg 60
aatacgaatg acgcgttgca gctcagcaac gaaaattttg 100

<210> SEQ ID NO 346
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 346
ccgtctctga agctctcggt gaacattgtt gcgaggcagg atgcgagctg gttgtgtttt 60
gacattaccg ataatgtgcc gcgtgaacgg gtgcgttatg 100

<210> SEQ ID NO 347
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 347
tgaacatcac tgatgcacaa gctacctatg tcgaagaatt aactaaaaaa ctgcaagatg 60
caggcattcg cgttaaagcc gacttgagaa atgagaagat 100

<210> SEQ ID NO 348
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 348
ccgtctctga agctctcggt gaacattgtt gcgaggcagg atgcgagctg gttgtgtttt 60
gacattaccg ataatgtgcc gcgtgaacgg gtgcgttatg 100

<210> SEQ ID NO 349
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 349
tacagtagcg cctctcaaaa atagataaac ggctcatgta cgtgggccgt ttattttttc 60
tacccataat cgggaaccgg tgttataatg ccgcgccctc 100

<210> SEQ ID NO 350
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 350
aactcacttc acaccccgaa gggggaagtt gcctgaccct acgattcccg ctatttcatt 60
cactgaccgg aggttcaaaa tgacccagcg aaccgagtcg 100

<210> SEQ ID NO 351
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 351
cgtcctgtaa taataaccgg acaattcgga ctgattaaaa aagcgccctt gtggcgcttt 60
ttttatattc ccgcctccat ttaaaataaa aaatccaatc 100

<210> SEQ ID NO 352
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 352
ggacatcatc gcgacaaaca atattaatac cggcaaccac accggcaatt tacgagactg 60
cgcaggcatc ctttctcccg tcaatttctg tcaaataaag 100

<210> SEQ ID NO 353
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 353
aactcacttc acaccccgaa gggggaagtt gcctgaccct acgattcccg ctatttcatt 60
cactgaccgg aggttcaaaa tgacccagcg aaccgagtcg 100

<210> SEQ ID NO 354
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 354
tttaacgatc tgattggcga tgatgaaacg gattcgccgg aagatgcgct ttctgagagc 60
tggcgcgaat tgtggcagga tgcgttgcag gaggaggatt 100

<210> SEQ ID NO 355
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 355
gcactgaaac acctcatttc cctgtgtgcc gcgtcgccga tggttgccag tcagctggcg 60
cgctacccga tcctgcttga tgaattgctc gacccgaata 100

<210> SEQ ID NO 356
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 356
gcgctcaaac agttaatccg tctgtgtgcc gcctcgccga tggtcgcgac acaacttgca 60
cgtcatcctt tattgctcga tgaactgctc gacccgcgca 100

<210> SEQ ID NO 357
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 357
agtctgaact catcctgcgg cagtcggtga gacgtatttt tgaccaaaga gtgatctaca 60
tcacggaatt ttgtggttgt tgctgcttaa aagggcaaat 100

<210> SEQ ID NO 358
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 358
ccgtctctga agctctcggt gaacattgtt gcgaggcagg atgcgagctg gttgtgtttt 60
gacattaccg ataatgtgcc gcgtgaacgg gtgcgttatg 100

<210> SEQ ID NO 359
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 359
gccattgagc tggcttcccg accgcagggc ggcacctgcc tgaccctgcg tttcccgctg 60
tttaacaccc tgaccggagg tgaagcatga tccctgaatc 100

<210> SEQ ID NO 360
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 360
agcgtcaggt accggtcatg attcaccgtg cgattctcgg ttccctggag cgcttcattg 60
gcatcctgac cgaagagttc gctggcttct tcccaacctg 100

<210> SEQ ID NO 361
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 361
gcgctgaagc acctgatcac gctctgcgcg gcgtcgccga tggtcgccag ccagctggcg 60
cgccacccgc tgctgctgga tgagctgctg gatcccaaca 100

<210> SEQ ID NO 362
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 362
gcccgctgac cgaccagaac ttccaccttg gactcggcta tacccttggc gtgacggcgc 60
gcgataactg ggactacatc cccattccgg tgatcttacc 100

<210> SEQ ID NO 363
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 363
gccattgagc tggcttcccg accgcagggc ggcacctgcc tgaccctgcg tttcccgctg 60
tttaacaccc tgaccggagg tgaagcatga tccctgaatc 100

<210> SEQ ID NO 364
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 364
gctaaagttc tcggctaatc gctgataaca tttgacgcaa tgcgcaataa aagggcatca 60
tttgatgccc tttttgcacg ctttcatacc agaacctggc 100

<210> SEQ ID NO 365
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 365
gccattgagc tggcttcccg accgcagggc ggcacctgcc tgaccctgcg tttcccgctg 60
tttaacaccc tgaccggagg tgaagcatga tccctgaatc 100

<210> SEQ ID NO 366
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 366
cgccgtcctc gcagtaccat tgcaaccgac tttacagcaa gaagtgattc tggcacgcat 60
ggaacaaatt cttgccagtc gggctttatc cgatgacgaa 100

<210> SEQ ID NO 367
<211> LENGTH: 100
<212> TYPE: DNA
<213> ORGANISM: Artificial Sequence
<220> FEATURE:
<223> OTHER INFORMATION: Synthetic polynucleotide
<220> FEATURE:

<223> OTHER INFORMATION: 100 bp downstream of junction

<400> SEQUENCE: 367
gccattgagc tggcttcccg accgcagggc ggcacctgcc tgaccctgcg tttcccgctg 60
tttaacaccc tgaccggagg tgaagcatga tccctgaatc 100

<210> SEQ ID NO 368
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 368
tctttagatc tctcggtccg ccctgatggc ggcaccttgc tgacgttacg cctgccggta 60
cagcaggtta tcaccggagg cttaaaatga cccagttacc 100

<210> SEQ ID NO 369
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 369
tgaatatcac tgactcacaa gctacctatg tcgaagaatt aactaaaaaa ctgcaagatg 60
caggcattcg cgttaaagcc gacttgagaa atgagaagat 100

<210> SEQ ID NO 370
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 370
ctggggtcac tggagcgctt tatcggcatc ctgaccgaag aatttgccgg tttcttcccg 60
acctggctgg cccctgttca ggttgtggtg atgaatatca 100

<210> SEQ ID NO 371
<211> LENGTH: 100
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 100 bp downstream of junction

<400> SEQUENCE: 371
gcaatagaac taactacccg ccctgaaggc ggtacctgcc tgaccctgcg attcccgtta 60
tttcattcac tgaccggagg cccacgatga cccagcgacc 100

<210> SEQ ID NO 372
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / PinfC

<400> SEQUENCE: 372
tggtgtccgg gcgaacgtcg ccaggtggca caaattgtca gaactacgac acgactaacc 60
gaccgcagga gtgtgcgatg accctgaata tgatgatgga ttcttggttc tctggagcgc 120
tttatcggca tcctgactga agaatttgca ggcttcttcc caacctggct tgcacccgtg 180
caggtagttg tgatgaacat 200

<210> SEQ ID NO 373
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: PinfC / disrupted nifL gene

<400> SEQUENCE: 373
cggaaaacga gttcaaacgg cgcgtcccaa tcgtattaat ggcgagattc gcgccacgga 60
agttcgctta acaggtctgg aaggcgagca gcttggtatt gcgatagaac tcacttcacg 120
ccccgaaggg ggaagctgcc tgaccctacg attcccgcta tttcattcac tgaccggagg 180
ttcaaaatga cccagcgaac 200

<210> SEQ ID NO 374
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 5' UTR and ATG / truncated glnE gene

<400> SEQUENCE: 374
cgccagagag ttgaaatcga acatttccgt aataccgcca ttacccagga gccgttctgg 60
ttgcacagcg gaaaacgtta acgaaaggat atttcgcatg tccctgtgcg ccgcgtcgcc 120
gatggtggcc agccaactgg cgcgctaccc gatcctgctc gatgaactgc tcgacccgaa 180
cacgctctat caaccgacgg 200

<210> SEQ ID NO 375
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / Prm1

<400> SEQUENCE: 375
cgggcgaacg tcgccaggtg gcacaaattg tcagaactac gacacgacta accgaccgca 60
ggagtgtgcg atgaccctga atatgatgat ggatgccagc cgttctgtaa taataaccgg 120
acaattcgga ctgattaaaa aagcgccctc gcggcgcttt ttttatattc tcgactccat 180
ttaaaataaa aaatccaatc 200

<210> SEQ ID NO 376
<211> LENGTH: 200
<212> TYPE: DNA
<213> ORGANISM: Artificial Sequence
<220> FEATURE:

<223> OTHER INFORMATION: Synthetic polynucleotide
<220> FEATURE:
<223> OTHER INFORMATION: Prm1 / disrupted nifL gene

<400> SEQUENCE: 376
tcaacctaaa aaagtttgtg taatacttgt aacgctacat ggagattaac tcaatctaga 60
gggtattaat aatgaatcgt actaaactgg tactgggcgc aactcacttc acgccccgaa 120
gggggaagct gcctgaccct acgattcccg ctatttcatt cactgaccgg aggttcaaaa 180
tgacccagcg aaccgagtcg 200

<210> SEQ ID NO 377
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / Prm7

<400> SEQUENCE: 377
cgggcgaacg tcgccaggtg gcacaaattg tcagaactac gacacgacta accgaccgca 60
ggagtgtgcg atgaccctga atatgatgat ggatgccagc cgcgtcaggt tgaacgtaaa 120
aaagtcggtc tgcgcaaagc acgtcgtcgt ccgcagttct ccaaacgtta attggtttct 180
gcttcggcag aacgattggc 200

<210> SEQ ID NO 378
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: Prm4 / disrupted nifL gene

<400> SEQUENCE: 378
aattttctgc ccaaatggct gggattgttc attttttgtt tgccttacaa cgagagtgac 60
agtacgcgcg ggtagttaac tcaacatctg accggtcgat aactcacttc acgccccgaa 120
gggggaagct gcctgaccct acgattcccg ctatttcatt cactgaccgg aggttcaaaa 180
tgacccagcg aaccgagtcg 200

<210> SEQ ID NO 379
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 5' UTR up to ATG-4bp of amtB gene / disrupted
      amtB gene

<400> SEQUENCE: 379
gtaaccaata aaggccacca cgccagacca cacgatagtg atggcaacac tttccagctg 60
caccagcacc tgatggccca tggtcacacc ttcagcgaaa ccgatcccca tcactgtgtg 120
tcttgtatta cagtgccgct tcgtcggctt cgccggtacg aatacgaatg acgcgttgca 180
gctcagcaac gaaaattttg 200

<210> SEQ ID NO 380
<211> LENGTH: 200
<212> TYPE: DNA

<213> ORGANISM: Artificial Sequence
<220> FEATURE:
<223> OTHER INFORMATION: Synthetic polynucleotide
<220> FEATURE:
<223> OTHER INFORMATION: Prm1.2 / disrupted nifL gene

<400> SEQUENCE: 380

```
tggtattgtc agtctgaatg aagctcttga aaaagctgag gaagcgggcg tcgatttagt     60

agaaatcagt ccgaatgccg agccgccagt ttgtcgaatc ccgtctctga agctctcggt    120

gaacattgtt gcgaggcagg atgcgagctg gttgtgtttt gacattaccg ataatgtgcc    180

gcgtgaacgg gtgcgttatg                                                200
```

<210> SEQ ID NO 381
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / Prm1.2

<400> SEQUENCE: 381

```
accgatccgc aggcgcgcat ttgttatgcc aatccggcat tctgccgcca gacgggtttt     60

gcacttgaga cacttttggg cgagaaccac cgtctgctgg tgaacatcac tgatgcacaa    120

gctacctatg tcgaagaatt aactaaaaaa ctgcaagatg caggcattcg cgttaaagcc    180

gacttgagaa atgagaagat                                                200
```

<210> SEQ ID NO 382
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: Prm3.1 / disrupted nifL gene

<400> SEQUENCE: 382

```
cgggaaccgg tgttataatg ccgcgccctc atattgtggg gatttcttaa tgacctatcc     60

tgggtcctaa agttgtagtt gacattagcg gagcactaac ccgtctctga agctctcggt    120

gaacattgtt gcgaggcagg atgcgagctg gttgtgtttt gacattaccg ataatgtgcc    180

gcgtgaacgg gtgcgttatg                                                200
```

<210> SEQ ID NO 383
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / Prm3.1

<400> SEQUENCE: 383

```
accgatccgc aggcgcgcat ttgttatgcc aatccggcat tctgccgcca gacgggtttt     60

gcacttgaga cacttttggg cgagaaccac cgtctgctgg tacagtagcg cctctcaaaa    120

atagataaac ggctcatgta cgtgggccgt ttatttttc tacccataat cgggaaccgg     180

tgttataatg ccgcgccctc                                                200
```

<210> SEQ ID NO 384
<211> LENGTH: 200

<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: Prm1 / disrupted nifL gene

<400> SEQUENCE: 384
tcaacctaaa aaagtttgtg taatacttgt aacgctacat ggagattaac tcaatctaga 60
gggtattaat aatgaatcgt actaaactgg tactgggcgc aactcacttc acaccccgaa 120
gggggaagtt gcctgaccct acgattcccg ctatttcatt cactgaccgg aggttcaaaa 180
tgacccagcg aaccgagtcg 200

<210> SEQ ID NO 385
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / Prm1

<400> SEQUENCE: 385
gggcgacaaa cggcctggtg gcacaaattg tcagaactac gacacgacta actgaccgca 60
ggagtgtgcg atgaccctga atatgatgat ggatgccggc cgtcctgtaa taataaccgg 120
acaattcgga ctgattaaaa aagcgccctt gtggcgcttt ttttatattc ccgcctccat 180
ttaaaataaa aaatccaatc 200

<210> SEQ ID NO 386
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / Prm5

<400> SEQUENCE: 386
gggcgacaaa cggcctggtg gcacaaattg tcagaactac gacacgacta actgaccgca 60
ggagtgtgcg atgaccctga atatgatgat ggatgccggc ggacatcatc gcgacaaaca 120
atattaatac cggcaaccac accggcaatt tacgagactg cgcaggcatc ctttctcccg 180
tcaatttctg tcaaataaag 200

<210> SEQ ID NO 387
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: Prm5 / disrupted nifL gene

<400> SEQUENCE: 387
taagaattat ctggatgaat gtgccattaa atgcgcagca taatggtgcg ttgtgcggga 60
aaactgcttt tttttgaaag ggttggtcag tagcggaaac aactcacttc acaccccgaa 120
gggggaagtt gcctgaccct acgattcccg ctatttcatt cactgaccgg aggttcaaaa 180
tgacccagcg aaccgagtcg 200

<210> SEQ ID NO 388

<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 5' UTR and ATG / truncated glnE gene

<400> SEQUENCE: 388
cgccagagag tcgaaatcga acatttccgt aataccgcga ttacccagga gccgttctgg 60
ttgcacagcg gaaaacgtta acgaaaggat atttcgcatg tttaacgatc tgattggcga 120
tgatgaaacg gattcgccgg aagatgcgct ttctgagagc tggcgcgaat tgtggcagga 180
tgcgttgcag gaggaggatt 200

<210> SEQ ID NO 389
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 5' UTR and ATG / truncated glnE gene

<400> SEQUENCE: 389
cgccagagag tcgaaatcga acatttccgt aataccgcga ttacccagga gccgttctgg 60
ttgcacagcg gaaaacgtta acgaaaggat atttcgcatg gcactgaaac acctcatttc 120
cctgtgtgcc gcgtcgccga tggttgccag tcagctggcg cgctacccga tcctgcttga 180
tgaattgctc gacccgaata 200

<210> SEQ ID NO 390
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 5' UTR and ATG / truncated glnE gene

<400> SEQUENCE: 390
gatgatggat gctttctggt taaacgggca acctcgttaa ctgactgact agcctgggca 60
aactgcccgg gctttttttt gcaaggaatc tgatttcatg gcgctcaaac agttaatccg 120
tctgtgtgcc gcctcgccga tggtcgcgac acaacttgca cgtcatcctt tattgctcga 180
tgaactgctc gacccgcgca 200

<210> SEQ ID NO 391
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / Prm4

<400> SEQUENCE: 391
accgatccgc aggcgcgcat ttgttatgcc aatccggcat tctgccgcca gacgggtttt 60
gcacttgaga cacttttggg cgagaaccac cgtctgctgg agtctgaact catcctgcgg 120
cagtcggtga gacgtatttt tgaccaaaga gtgatctaca tcacggaatt ttgtggttgt 180
tgctgcttaa aagggcaaat 200

<210> SEQ ID NO 392
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: Prm4 / disrupted nifL gene

<400> SEQUENCE: 392
catcggacac caccagctta caaattgcct gattgcggcc ccgatggccg gtatcactga 60
ccgaccattt cgtgccttat gtcatgcgat gggggctggg ccgtctctga agctctcggt 120
gaacattgtt gcgaggcagg atgcgagctg gttgtgtttt gacattaccg ataatgtgcc 180
gcgtgaacgg gtgcgttatg 200

<210> SEQ ID NO 393
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: PinfC / disrupted nifL gene

<400> SEQUENCE: 393
tcttcaacaa ctggaggaat aaggtattaa aggcggaaaa cgagttcaaa cggcacgtcc 60
gaatcgtatc aatggcgaga ttcgcgccct ggaagttcgc gccattgagc tggcttcccg 120
accgcagggc ggcacctgcc tgaccctgcg tttcccgctg tttaacaccc tgaccggagg 180
tgaagcatga tccctgaatc 200

<210> SEQ ID NO 394
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / PinfC

<400> SEQUENCE: 394
tccgggttcg gcttaccccg ccgcgttttg cgcacggtgt cggacaattt gtcataactg 60
cgacacagga gtttgcgatg accctgaata tgatgctcga agcgtcaggt accggtcatg 120
attcaccgtg cgattctcgg ttccctggag cgcttcattg gcatcctgac cgaagagttc 180
gctggcttct tcccaacctg 200

<210> SEQ ID NO 395
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: 5' UTR and ATG / truncated glnE gene

<400> SEQUENCE: 395
atcgcagcgt ctttgaatat ttccgtcgcc aggcgctggc tgccgagccg ttctggctgc 60
atagtggaaa acgataattt caggccaggg agcccttatg gcgctgaagc acctgatcac 120
gctctgcgcg gcgtcgccga tggtcgccag ccagctggcg cgccacccgc tgctgctgga 180
tgagctgctg gatcccaaca 200

<210> SEQ ID NO 396
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / Prm1.2

<400> SEQUENCE: 396
tccgggttcg gcttaccccg ccgcgttttg cgcacggtgt cggacaattt gtcataactg 60
cgacacagga gtttgcgatg accctgaata tgatgctcga gcccgctgac cgaccagaac 120
ttccaccttg gactcggcta taccottggc gtgacggcgc gcgataactg ggactacatc 180
cccattccgg tgatcttacc 200

<210> SEQ ID NO 397
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: Prm1.2 / disrupted nifL gene

<400> SEQUENCE: 397
tcacttttta gcaaagttgc actggacaaa aggtaccaca attggtgtac tgatactcga 60
cacagcatta gtgtcgattt ttcatataaa ggtaattttg gccattgagc tggcttcccg 120
accgcagggc ggcacctgcc tgaccctgcg tttcccgctg tttaacaccc tgaccggagg 180
tgaagcatga tccctgaatc 200

<210> SEQ ID NO 398
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / Prm6.2

<400> SEQUENCE: 398
tccgggttcg gcttaccccg ccgcgttttg cgcacggtgt cggacaattt gtcataactg 60
cgacacagga gtttgcgatg accctgaata tgatgctcga gctaaagttc tcggctaatc 120
gctgataaca tttgacgcaa tgcgcaataa aagggcatca tttgatgccc tttttgcacg 180
ctttcatacc agaacctggc 200

<210> SEQ ID NO 399
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: Prm6.2 / disrupted nifL gene

<400> SEQUENCE: 399
gttctccttt gcaatagcag ggaagaggcg ccagaaccgc cagcgttgaa gcagtttgaa 60
cgcgttcagt gtataatccg aaacttaatt tcggtttgga gccattgagc tggcttcccg 120
accgcagggc ggcacctgcc tgaccctgcg tttcccgctg tttaacaccc tgaccggagg 180
tgaagcatga tccctgaatc 200

<210> SEQ ID NO 400
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / Prm8.2

<400> SEQUENCE: 400
tccgggttcg gcttaccccg ccgcgttttg cgcacggtgt cggacaattt gtcataactg 60
cgacacagga gtttgcgatg accctgaata tgatgctcga cgccgtcctc gcagtaccat 120
tgcaaccgac tttacagcaa gaagtgattc tggcacgcat ggaacaaatt cttgccagtc 180
gggctttatc cgatgacgaa 200

<210> SEQ ID NO 401
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: Prm8.2 / disrupted nifL gene

<400> SEQUENCE: 401
gatatgcctg aagtattcaa ttacttaggc atttacttaa cgcaggcagg caattttgat 60
gctgcctatg aagcgtttga ttctgtactt gagcttgatc gccattgagc tggcttcccg 120
accgcagggc ggcacctgcc tgaccctgcg tttcccgctg tttaacaccc tgaccggagg 180
tgaagcatga tccctgaatc 200

<210> SEQ ID NO 402
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: PinfC / disrupted nifL gene

<400> SEQUENCE: 402
tggtattgtc agtctgaatg aagctcttga aaaagctgag gaagcgggcg tcgatttagt 60
agaaatcagt ccgaatgccg agccgccagt ttgtcgaatc tctttagatc tctcggtccg 120
ccctgatggc ggcaccttgc tgacgttacg cctgccggta cagcaggtta tcaccggagg 180
cttaaaatga cccagttacc 200

<210> SEQ ID NO 403
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / PinfC

<400> SEQUENCE: 403
tgcaaattgc acggttattc cgggtgagta tatgtgtgat ttgggttccg gcattgcgca 60
ataaagggga gaaagacatg agcatcacgg cgttatcagc tgaatatcac tgactcacaa 120
gctacctatg tcgaagaatt aactaaaaaa ctgcaagatg caggcattcg cgttaaagcc 180
gacttgagaa atgagaagat 200

<210> SEQ ID NO 404
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: disrupted nifL gene / PinfC

<400> SEQUENCE: 404
tcagggctgc ggatgtcggg cgtttcacaa cacaaaatgt tgtaaatgcg acacagccgg 60
gcctgaaacc aggagcgtgt gatgaccttt aatatgatgc ctggggtcac tggagcgctt 120
tatcggcatc ctgaccgaag aatttgccgg tttcttcccg acctggctgg cccctgttca 180
ggttgtggtg atgaatatca 200

<210> SEQ ID NO 405
<211> LENGTH: 200
<212> TYPE: DNA
<213> ORGANISM: Artificial Sequence
<220> FEATURE:
<223> OTHER INFORMATION: Synthetic polynucleotide
<220> FEATURE:
<223> OTHER INFORMATION: PinfC / disrupted nifL gene

<400> SEQUENCE: 405
cggaaaacga gttcaaacgg cacgtccgaa tcgtatcaat ggcgagattc gcgcccagga 60
agttcgctta actggtctgg aaggtgagca gctgggtatt gcaatagaac taactacccg 120
ccctgaaggc ggtacctgcc tgaccctgcg attcccgtta tttcattcac tgaccggagg 180
cccacgatga cccagcgacc 200

<210> SEQ ID NO 406
<211> LENGTH: 20
<212> TYPE: DNA
<213> ORGANISM: Artificial Sequence
<220> FEATURE:
<223> OTHER INFORMATION: Synthetic primer

<400> SEQUENCE: 406
caagaagttc gcctcacagg 20

<210> SEQ ID NO 407
<211> LENGTH: 20
<212> TYPE: DNA
<213> ORGANISM: Artificial Sequence
<220> FEATURE:
<223> OTHER INFORMATION: Synthetic primer

<400> SEQUENCE: 407
tgcctcgcaa caatgttcac 20

<210> SEQ ID NO 408
<211> LENGTH: 20
<212> TYPE: DNA
<213> ORGANISM: Artificial Sequence
<220> FEATURE:
<223> OTHER INFORMATION: Synthetic primer

<400> SEQUENCE: 408
cgccctcata ttgtggggat 20

<210> SEQ ID NO 409
<211> LENGTH: 19
<212> TYPE: DNA
<213> ORGANISM: Artificial Sequence
<220> FEATURE:
<223> OTHER INFORMATION: Synthetic primer

<400> SEQUENCE: 409
ggcataacgc acccgttca 19

<210> SEQ ID NO 410
<211> LENGTH: 15
<212> TYPE: DNA
<213> ORGANISM: Artificial Sequence
<220> FEATURE:
<223> OTHER INFORMATION: Synthetic probe

<400> SEQUENCE: 410
tctgaagctc tcggt 15

<210> SEQ ID NO 411
<211> LENGTH: 22
<212> TYPE: DNA
<213> ORGANISM: Artificial Sequence
<220> FEATURE:
<223> OTHER INFORMATION: Synthetic primer

<400> SEQUENCE: 411
taaactggta ctgggcgcaa ct 22

<210> SEQ ID NO 412
<211> LENGTH: 23
<212> TYPE: DNA
<213> ORGANISM: Artificial Sequence
<220> FEATURE:
<223> OTHER INFORMATION: Synthetic primer

<400> SEQUENCE: 412
caaatcgaag cgccagacgg tat 23

<210> SEQ ID NO 413
<211> LENGTH: 15
<212> TYPE: DNA
<213> ORGANISM: Artificial Sequence
<220> FEATURE:
<223> OTHER INFORMATION: Synthetic probe

<400> SEQUENCE: 413
gaccctacga ttccc 15

<210> SEQ ID NO 414
<211> LENGTH: 20
<212> TYPE: DNA
<213> ORGANISM: Artificial Sequence
<220> FEATURE:
<223> OTHER INFORMATION: Synthetic primer

<400> SEQUENCE: 414
ggtgcactct ttgcatggtt 20

<210> SEQ ID NO 415
<211> LENGTH: 20
<212> TYPE: DNA
<213> ORGANISM: Artificial Sequence
<220> FEATURE:
<223> OTHER INFORMATION: Synthetic primer

<400> SEQUENCE: 415
gcgcagtctc gtaaattgcc 20

<210> SEQ ID NO 416
<211> LENGTH: 15
<212> TYPE: DNA
<213> ORGANISM: Artificial Sequence
<220> FEATURE:
<223> OTHER INFORMATION: Synthetic probe

<400> SEQUENCE: 416
gcgatgaccc tgaat 15

<210> SEQ ID NO 417
<211> LENGTH: 19
<212> TYPE: DNA
<213> ORGANISM: Artificial Sequence
<220> FEATURE:
<223> OTHER INFORMATION: Synthetic primer

<400> SEQUENCE: 417
ctcggcagca tggacgtaa 19

<210> SEQ ID NO 418
<211> LENGTH: 21
<212> TYPE: DNA
<213> ORGANISM: Artificial Sequence
<220> FEATURE:
<223> OTHER INFORMATION: Synthetic primer

<400> SEQUENCE: 418
agggtgttaa acagcgggaa a 21

<210> SEQ ID NO 419
<211> LENGTH: 15
<212> TYPE: DNA
<213> ORGANISM: Artificial Sequence
<220> FEATURE:
<223> OTHER INFORMATION: Synthetic probe

<400> SEQUENCE: 419
tccgaatcgt atcaa 15

<210> SEQ ID NO 420
<211> LENGTH: 20
<212> TYPE: DNA
<213> ORGANISM: Artificial Sequence
<220> FEATURE:
<223> OTHER INFORMATION: Synthetic primer

<400> SEQUENCE: 420
gagccgttct ggctgcatag 20

<210> SEQ ID NO 421
<211> LENGTH: 18
<212> TYPE: DNA
<213> ORGANISM: Artificial Sequence
<220> FEATURE:
<223> OTHER INFORMATION: Synthetic primer

<400> SEQUENCE: 421
gccgtcggct gatagagg 18

<210> SEQ ID NO 422
<211> LENGTH: 15

-continued

<212> TYPE: DNA
<213> ORGANISM: Artificial Sequence
<220> FEATURE:
<223> OTHER INFORMATION: Synthetic probe

<400> SEQUENCE: 422
tgaagcacct gatca 15

<210> SEQ ID NO 423
<211> LENGTH: 20
<212> TYPE: DNA
<213> ORGANISM: Artificial Sequence
<220> FEATURE:
<223> OTHER INFORMATION: Synthetic primer

<400> SEQUENCE: 423
ggaaaacgag ttcaaccggc 20

<210> SEQ ID NO 424
<211> LENGTH: 20
<212> TYPE: DNA
<213> ORGANISM: Artificial Sequence
<220> FEATURE:
<223> OTHER INFORMATION: Synthetic primer

<400> SEQUENCE: 424
gggcggaccg agagatctaa 20